US011102996B2

(12) United States Patent
Shi et al.

(10) Patent No.: US 11,102,996 B2
(45) **Date of Patent: *Aug. 31, 2021**

(54) SWEETENER AND FLAVOR COMPOSITIONS, METHODS OF MAKING AND METHODS OF USE THEREOF

(71) Applicants: EPC Natural Products Co., Ltd., Beijing (CN); Weiyao Shi, Bethlehem, PA (US)

(72) Inventors: Jingang Shi, Beijing (CN); Hansheng Wang, Beijing (CN); Xin Shi, Beijing (CN); Yi Wang, Beijing (CN); Wei Lyu, Beijing (CN); Yingxiang Xin, Beijing (CN); Thomas Eidenberger, Wels (AT); Weiyao Shi, Beijing (CN)

(73) Assignees: EPC NATURAL PRODUCTS CO., LTD., Beijing (CN); Weiyao Shi, Bethlehem, PA (US)

( * ) Notice: Subject to any disclaimer, the term of this patent is extended or adjusted under 35 U.S.C. 154(b) by 79 days.

This patent is subject to a terminal disclaimer.

(21) Appl. No.: 16/402,641

(22) Filed: May 3, 2019

(65) Prior Publication Data

US 2020/0323243 A1 Oct. 15, 2020

Related U.S. Application Data

(60) Provisional application No. 62/841,858, filed on May 2, 2019, provisional application No. 62/819,980, filed on Mar. 18, 2019, provisional application No. 62/775,983, filed on Dec. 6, 2018, provisional application No. 62/771,485, filed on Nov. 26, 2018, provisional application No. 62/744,755, filed on Oct. 12, 2018, provisional application No. 62/696,481, filed on Jul. 11, 2018, provisional application No. 62/668,580, filed on May 8, 2018.

(51) Int. Cl.

| | |
|---|---|
| ***A23L 2/60*** | (2006.01) |
| ***A23L 27/30*** | (2016.01) |
| ***A23L 2/02*** | (2006.01) |
| ***A23L 2/54*** | (2006.01) |
| ***A23L 2/56*** | (2006.01) |
| ***A23F 5/46*** | (2006.01) |
| *A23L 27/21* | (2016.01) |

(52) U.S. Cl.

CPC ................ *A23L 2/60* (2013.01); *A23F 5/465* (2013.01); *A23L 2/02* (2013.01); *A23L 2/54* (2013.01); *A23L 2/56* (2013.01); *A23L 27/31* (2016.08); *A23L 27/36* (2016.08); *A23L 27/215* (2016.08); *A23V 2002/00* (2013.01)

(58) Field of Classification Search

CPC .......... A23L 27/00; A23L 27/20; A23L 27/21; A23L 27/215; A23L 27/235; A23L 27/29; A23L 27/30; A23L 27/31; A23L 27/32; A23L 27/33; A23L 27/34; A23L 27/84; A23L 27/86; A23L 2/60; A23L 2/56

See application file for complete search history.

(56) References Cited

U.S. PATENT DOCUMENTS

| | | | |
|---|---|---|---|
| 3,620,772 A | 11/1971 | Kitada et al. | |
| 5,089,278 A | 2/1992 | Haynes et al. | |
| 7,029,717 B1 | 4/2006 | Ojima et al. | |
| 2011/0189367 A1 | 8/2011 | Sagalowicz et al. | |
| 2014/0234412 A1* | 8/2014 | Ley | A23K 20/105 424/456 |
| 2015/0216209 A1 | 8/2015 | Lyndon et al. | |
| 2015/0320101 A1 | 11/2015 | Walton et al. | |
| 2016/0029677 A1 | 2/2016 | Prakash et al. | |
| 2016/0183575 A1 | 6/2016 | Galaev et al. | |
| 2018/0116266 A1 | 5/2018 | Jackson | |

FOREIGN PATENT DOCUMENTS

| | | |
|---|---|---|
| CN | 104397371 A | 3/2015 |
| KR | 10-0888694 B1 | 3/2009 |
| WO | 2009/140568 A1 | 11/2009 |
| WO | 2016/157868 A1 | 10/2016 |
| WO | 2017/035524 A1 | 3/2017 |
| WO | 2017/214026 A1 | 12/2017 |
| WO | PCT/US2019/30814 | 5/2019 |
| WO | PCT/US2019/30836 | 5/2019 |
| WO | PCT/US2019/030906 | 5/2019 |
| WO | PCT/US2019/030910 | 5/2019 |

OTHER PUBLICATIONS

Khattab, S.N., Massoud, M.I., El-Sayed Jad, Y., Bekhit, A. A., El-Faham, A., Production and physicochemical assessment of new stevia amino acid sweeteners from the natural stevioside, 2014, Food Chemistry, col. 173, pp. 979-985 (Year: 2014).*

"What temperature does the Maillard reaction occur?", 2015, Seasoned Advice, <https://web.archive.org/web/20150330021935/https://cooking.stackexchange.com/questions/29926/what-temperature-does-the-maillard-reaction-occur> (Year: 2015).*

International Search Report and Written Opinion dated Jul. 27, 2019 in International Application No. PCT/US19/30814.

International Search Report and Written Opinion dated Aug. 27, 2019 in International Application No. PCT/US19/30836.

Younes, Met al. Safety in use of glucosylated steviol glycosides as a food additive in different food categories. European Food Safety Authority Journal, https://doi.org/10.2903/j.efsa.2018.5181, Jan. 31, 2018; abstract; p. 3, eight paragraph; p. 6, third-fourth paragraphs.

Wikipedia Article "Stevioside";ht1ps://en.wikipedia.org/w/index.php title= Stevioside &oldid= 8296117141/4; Mar. 9, 2018 (Mar. 9, 2018) stevioside is artificial sweetener extract.

International Search Report and Written Opinion dated Jul. 5, 2019 in International Application No. PCT/US2019/030906.

International Search Report and Written Opinion dated Jul. 17, 2019 in International Application No. PCT/US2019/030910.

(Continued)

*Primary Examiner* — Jeffrey P Mornhinweg
*Assistant Examiner* — Kelly P Kershaw
(74) *Attorney, Agent, or Firm* — Michael X. Ye; Morris. Manning & Martin, LLP

(57) ABSTRACT

Sweetener and flavor compositions with improved taste profiles are disclosed. Also disclosed are methods of making and methods of using such sweetener and flavor compositions.

17 Claims, 178 Drawing Sheets

(56) References Cited

OTHER PUBLICATIONS

International Search Report and Written Opinion dated Jun. 17, 2020 in International Application No. PCT/US2019/060295.
Yoshikawa, et al. "Transglycosylation of Mogroside V, a Triterpene Glycoside in Siraitia grosvenori, Cyclodextrin Glucanotransferase and Improvement of the Qualities of Sweetness", Journal of Applied Glycoscience, vol. 52, Jan. 1, 2005, pp. 247-252.
U.S. Appl. No. 16/402,641, filed May 3, 2019 Pending.
U.S. Appl. No. 16/403,223, filed May 3, 2019 Pending.
U.S. Appl. No. 16/402,360, filed May 3, 2019 Pending.
U.S. Appl. No. 16/402,413, filed May 3, 2019 Pending.
U.S. Appl. No. 16/402,448, filed May 3, 2019 Pending.
U.S. Appl. No. 16/402,605, filed May 3, 2019 Pending.
U.S. Appl. No. 16/402,728, filed May 3, 2019 Pending.
U.S. Appl. No. 16/402,816, filed May 3, 2019 Pending.
U.S. Appl. No. 16/402,846, filed May 3, 2019 Pending.
U.S. Appl. No. 16/402,991, filed May 3, 2019 Pending.
U.S. Appl. No. 16/402,999, filed May 3, 2019 Pending.
U.S. Appl. No. 16/403,053, filed May 3, 2019 Pending.
U.S. Appl. No. 16/403,061, filed May 3, 2019 Pending.
U.S. Appl. No. 16/403,163, filed May 3, 2019 Pending.
U.S. Appl. No. 16/403,178, filed May 3, 2019 Pending.

* cited by examiner

Figure 18

Perform model reaction:
a) Solvent (negative control)
b) Amino acid + solvent (negative control)
c) Sugar + solvent (negative control)
d) Amino Acid + sugar + solvent
Stop reaction by transferring closed tube into ice-bath

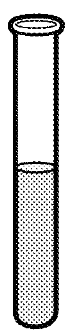

→ Analyze by GC/MS (Head Space or direct injection)
Volatiles, Flavor(s)

→ Analyze by HPLC UV/DAD and MS
Breakdown of amino acids
Breakdown of sugars
Elucidate structures of newly formed compounds ↓ Sensory evaluation:
Color, Appearance, Odor
if applicable: Taste MS-Spectrum:

m/z 309= $[M+H]^+$ (MRI)

m/z 291= $[M+H-H_2O]^+$ m/z 147=$[M+H]^+$ (Lys)

MS-Spectrum:

m/z 298= $[M+H]^+$ (MRI)

m/z 280= $[M+H-H_2O]^+$ m/z 166=$[M+H]^+$ (Lys)

Figure 146a

Coffee Drink "Nescafe, Gold - Type Cappuccino- Reduced Sugar, Joint opinion 18 test persons

| Product | SG-MRPs (ppm) | | | | Sweetness (potency, profile) | Flavor (increase, modified) |
|---|---|---|---|---|---|---|
| | Chocolate | Tangerine | Popcorn | Flora | | |
| Coffee Drink (prepared according to instructions) | - | - | - | - | slightly sweet, too low, slight bitter | Coffee/Chocolate, void |
| | 100 | - | - | - | More Sweet | Increased mouth feel, smoother, coffee/Chocolate |
| | 200 | - | - | - | More Sweet, light lingering | mouth feel ok, smoother, coffee/ intense chocolate |
| | 400 | - | - | - | Pleasant Sweet, slight lingering | mouth feel ok, smooth, coffee/ intense chocolate |
| Coffee Drink (prepared according to instructions +2 % sugar added) | - | - | - | - | Sweetness slightly too low | Coffee/Chocolate, slightly void |
| | 100 | - | - | - | Sweet | Increased mouth feel, smoother, coffee/Chocolate |
| | 200 | - | - | - | Pleasant Sweet | mouth feel ok, smooth, coffee/intense chocolate |
| | 400 | - | - | - | Too Sweet | mouth feel ok, smooth, coffee/ intense chocolate, bitter |

Figure 146b SG-MRPs added to final applications

Linde Coffee (roasted and grinded) mixed with dried chicory root, Joint opinion 18 test persons

| Product | MRPs (ppm) | | | | Sweetness (potency, profile) | Flavor (increase, modified) |
|---|---|---|---|---|---|---|
| | Chocolate | Tangerine | Popcorn | Flora | | |
| Coffee (prepared as American Coffee according to instructions) | - | - | - | - | No sweetness, bitter | typical for the product |
| | 100 | - | - | - | Slightly Sweet and bitter | typical for the product, increased mouth feel, cacao |
| | 200 | - | - | - | Sweet, reduced bitterness | typical for the product, increased mouth feel, cacao |
| | 400 | - | - | - | Pleasant Sweet, no bitterness | typical for the product, mouth feel ok, cacao/ chocolate note |
| Coffee (prepared as American Coffee according to instructions +5 % sugar added) | - | - | - | - | Slightly Sweet and bitter | typical for the product, low mouth feel, cacao |
| | 100 | - | - | - | Pleasant Sweet, no bitterness | typical for the product, mouth feel ok, smooth, caramel, cacao |
| | 200 | - | - | - | Too Sweet, Lingering | typical for the product, sweetness overloaded |
| | 400 | - | - | - | Too Sweet, Lingering | product, sweetness overloaded |

Figure 146c SG-MRPs added to final applications

Milk Cacao, Joint opinion 18 test persons

| Product | SG-MRPs (ppm) | | | | Sweetness (potency, profile) | Flavor (increase, modified) |
|---|---|---|---|---|---|---|
| | Chocolate | Tangerine | Popcorn | Flora | | |
| Cacao (Powder, no sugar, prepared with milk) | - | - | - | - | No sweetness, slightly bitter | typical for the product, cacao |
| | 100 | - | - | - | Slightly Sweet and bitter | typical for the product, increased mouth feel, chocolate |
| | 200 | - | - | - | Sweet, no bitterness | typical for the product, mouth feel ok, chocolate |
| | 400 | - | - | - | Pleasant Sweet, no bitterness | typical for the product, mouth feel ok, chocolate |
| Cacao (Powder, no sugar, prepared with milk, 5 % added sugar) | - | - | - | - | Sweet and slightly bitter | typical for the product, cacao |
| | 100 | - | - | - | Pleasant Sweet, no bitterness | typical for the product, mouth feel ok, cacao |
| | 200 | - | - | - | Too Sweet, Lingering | typical for the product, sweetness overloaded |
| | 400 | - | - | - | Too Sweet, Lingering | product, sweetness overloaded |

Figure 146d SG-MRP added to final applications

Sugar free Orange (Brand Name Gröbi)[1], Joint opinion 18 test persons

| Product | SG-MRPs (ppm) Chocolate | Tangerine | Popcorn | Flora | Sweetness (potency, profile) | Flavor (increase, modified) |
|---|---|---|---|---|---|---|
| Sugar free, Orange Taste | - | - | - | - | Artificial sweet, metallic | Void, typical for the product, orange |
| | - | 100 | - | - | Slightly artificial sweet and metallic | Less void, less intense aroma |
| Sugar free, Orange Taste diluted with 20 %sparkling water | - | 200 | - | - | Pleasant sugar-similar sweetness , not metallic | Mouth feel good, brilliant orange |
| | - | 400 | - | - | Sugar like sweetness | Mouth feel good, brilliant orange |

Figure 146e

Sugar free Drink (Brand Name Gröbi)[1], Joint opinion 18 test persons

| Product | SG-MRPs (ppm) | | | | | |
|---|---|---|---|---|---|---|
| | Chocolate | Tangerine | Popcorn | Flora | Sweetness (potency, profile) | Flavor (increase, modified) |
| Sugar free, Grapefruit Taste | - | - | - | - | Artificial sweet, bitter | Void, typical for the product, grapefruit |
| | - | 100 | - | - | Slightly artificial sweet and bitter | Less void, less intense aroma |
| Sugar free, Grapefruit Taste diluted with 20 %sparkling water | - | 200 | - | - | Pleasant sugar-similar sweetness | Mouth feel good, brilliant grapefruit |
| | - | 400 | - | - | Sugar like sweetness, too sweet, lingering | Mouth feel good, brilliant grapefruit |

[1]... Sweetener: Natriumcyclamat, Acesulfam K, Natriumsaccharin und Aspartam

Figure 146f

Ketchup, Single Opinion

| Product | SG-MRPs (ppm) Chocolate | Tangerine | Popcorn | Flora | Sweetness (potency, profile) | Flavor (increase, modified) |
|---|---|---|---|---|---|---|
| Heinz Ketchup, Original | - | - | - | - | Typical for the product | Typical for the product |
| | - | - | 100 | 100 | More sweet, but smooth, not lingering | Flavor, Mouth feel increased, smoother |
| Felix Ketchup, Hot (Chili) | - | - | - | - | Typical for the product | Typical for the product, pungent spicy |
| | - | - | 100 | 100 | A trace of sugar like sweetness, pleasant | Flavor, Mouth feel increased, spiciness less pungent |

Figure 146g

Savory Sauces, Single Opinion

| Product | SG-MRPs (ppm) Chocolate | Tangerine | Popcorn | Flora | Sweetness (potency, profile) | Flavor (increase, modified) |
|---|---|---|---|---|---|---|
| Bull's Eye Barbecue, Dark Beer | - | - | - | - | Typical for the product | Typical for the product |
| | - | - | - | 200 | Smoother Sweetness, not lingering | Herbal Flavor (Smell) increased |
| Thai Sweet Chili Sauce | - | - | - | - | Typical for the product | Typical for the product, pungent spicy |
| | - | - | - | 200 | A trace of sugar like sweetness, pleasant | Herbal Flavor increased, spiciness less pungent, smoother |

Figure 146h

Savory, Single Opinion

| Product | SG-MRP (ppm) Chocolate | Tangerine | Popcorn | Flora | Sweetness (potency, profile) | Flavor (increase, modified) |
|---|---|---|---|---|---|---|
| Dark roasted onions (Oil and flour) | - | - | - | - | Typical for the product | Typical for the product |
| | - | - | 200 | - | Smoother Sweetness, not lingering | Roasted Flavor increased |
| Homemade tomato sauce (onions, tomatoes, Italian, herbs, vinegar, salt, pepper) | - | - | - | - | Typical for the product | Typical for the product |
| | - | 100 | - | 100 | Smoother sweetness, pleasant | Flavor increased, more fruity, herbal notes |

Figure 146i

Fruits, Single Opinion

| Product | SG-MRP (ppm) Chocolate | Tangerine | Popcorn | Flora | Sweetness (potency, profile) | Flavor (increase, modified) |
|---|---|---|---|---|---|---|
| Cooked apples (no added sugar) | - | - | - | - | Typical for the product | Typical for the product |
| | - | 200 | - | - | Sweeter, Smooth Sweetness, not lingering | Fruity Flavors increased, smoother acid profile |
| Cooked elderberries (no added sugar) | - | - | - | - | Typical for the product | Typical for the product |
| | - | 100 | - | 100 | Smoother sweetness, pleasant | Fruity, herbal Flavor increased, smoother acid profile |

Figure 146j

Bakery products, Single Opinion

| Product | SG-MRP (ppm) Chocolate | Tangerine | Popcorn | Flora | Sweetness (potency, profile) | Flavor (increase, modified) |
|---|---|---|---|---|---|---|
| Chocolate cake | - | - | - | - | Typical for the product | Typical for the product |
| | 300 | - | - | - | Sweeter, Smooth Sweetness, not lingering | Chocolate Flavor increased, Caramel |
| Lemon Biscuits | - | - | - | - | Typical for the product | Typical for the product |
| | - | 100 | - | 100 | Sweeter, Smooth Sweetness, not lingering | More fruity, herbal Flavor |

Figure 147a SG-MRPs flavor threshold determination

Sugar Solution, 5 tasters

| Product | SG-MRP (ppm) Chocolate | Tangerine | Popcorn | Flora | Sweetness (potency, profile) | Flavor (increase, modified) |
|---|---|---|---|---|---|---|
| 5 % Sugar Solution (water) | - | - | - | - | Typical for the product | No flavor, typical for the product |
| | 2.5 | - | - | - | No difference | Different to reference, not identified |
| | 5.0 | - | - | - | Sweetness smoother, more harmonic | Chocolate/ cacao taste |
| | 10.0 | - | - | - | Sweeter, flatter sweetness peak | Chocolate/ cacao taste |

Sugar Solution, 5 tasters

| Product | SG-MRP(ppm) Chocolate | Tangerine | Popcorn | Flora | Sweetness (potency, profile) | Flavor (increase, modified) |
|---|---|---|---|---|---|---|
| 5 % Sugar Solution (water) | - | - | - | - | Typical for the product | No flavor, typical for the product |
| | - | 2.5 | - | - | No difference | Different to reference, citrus note |
| | - | 5.0 | - | - | Slightly more sweet | Citrus and Honey flavor |
| | - | 10.0 | - | - | Sweeter, flatter sweetness peak | Citrus/Orange and honey flavor |

Figure 147b SG-MRPs flavor threshold determination

Sugar Solution, 5 tasters

| Product | SG-MRPs (ppm) | | | | Sweetness | Flavor |
|---|---|---|---|---|---|---|
| | Chocolate | Tangerine | Popcorn | Flora | (potency, profile) | (increase, modified) |
| 5 % Sugar Solution (water) | - | - | - | - | Typical for the product | No flavor, typical for the product |
| | - | - | 2.5 | - | No difference | No difference |
| | - | - | 5.0 | - | Different to reference not identified | Different to reference not identified |
| | - | - | 10.0 | - | Sweeter | Caramel and burnt sugar flavor |

Sugar Solution, 5 tasters

| Product | SG-MRP(ppm) | | | | Sweetness | Flavor |
|---|---|---|---|---|---|---|
| | Chocolate | Tangerine | Popcorn | Flora | (potency, profile) | (increase, modified) |
| 5 % Sugar Solution (water) | - | - | - | - | Typical for the product | No flavor, typical for the product |
| | - | - | - | 2.5 | Different to reference smoother | Flower flavor and taste |
| | - | - | - | 5.0 | Slightly more sweet | Flower flavor and taste |
| | - | - | - | 10.0 | Sweeter, flatter sweetness peak | Intense flower flavor and taste |

Sample A (upper panel), SG-MRP Tangerine (medium panel) and Popcorn (lower panel)

The stevia extract of example 37 (upper panel), sample A (medium panel), sample B (lower panel)

RA20/SG95 (upper panel), SG-MRP Flora (lower panel)

Sample A (upper panel), SG-MRP Tangerine (medium panel) and Popcorn (lower panel)

SWEETENER AND FLAVOR COMPOSITIONS, METHODS OF MAKING AND METHODS OF USE THEREOF

This application claims priority to U.S. Provisional Patent Application Ser. No. 62/668,580, filed May 8, 2018, U.S. Provisional Patent Application Ser. No. 62/696,481, filed Jul. 11, 2018. U.S. Provisional Patent Application Ser. No. 62/744,755, filed Oct. 12, 2018, U.S. Provisional Patent Application Ser. No. 62/771,485, filed Nov. 26, 2018 and U.S. Provisional Patent Application Ser. No. 62/775,983, filed Dec. 6, 2018, U.S. Provisional Application Ser. No. 62/819,980, filed Mar. 18, 2019 and U.S. Provisional Application Ser. No. 62/841,858, filed May 2, 2019, the contents of which are expressly incorporated herein by reference for all purposes.

FIELD

The present disclosure relates generally to the application of Maillard reaction technology to sweeteners and flavoring agents, and their use in food and beverage products.

BACKGROUND

Caloric sugars are widely used in the food and beverage industry. However, there is a growing trend toward use of more healthy alternatives, including non-caloric or low caloric sweeteners. Popular non-caloric sweeteners include high intensity synthetic sweeteners, such as aspartame (e.g., NutraSweet, Equal), sucralose (Splenda), and acesulfame potassium (also known as acesulfame K, or Ace-K), as well as high intensity natural sweeteners, which are typically derived from plants, such as *Stevia*.

Despite the widespread use of non-caloric sweeteners, which are gaining in popularity, many consumers are reluctant to use these products, since their taste properties are often considered to insufficiently mimick the taste profile of caloric sugares, such as sucrose. Therefore, there is a need in further developing and enhancing the taste properties of natural sweeteners to better reproduce the taste properties associated with conventional sugar products, so as to provide increased consumer satisfaction.

SUMMARY

The inventors of the present application have surprisingly found that steviol glycosides can bind the volatiles of various flavors used in food, beverages, cosmetics, feeds and pharmaceuticals. Steviol glycosides treated by the methods disclosed herein are widely soluble in water, water/alcohol, alcohol, and other organic solvents used for the flavor industry at different temperatures. The *Stevia* compositions could naturally encapsulate the flavor produced during the processes described herein. Therefore, they are also excellent carriers for encapsulating material for flavors, including but not limited to flavors and spices originated from plants such as bark, flowers, fruits, leaves, and animals, including concentrated meat and sea food soups etc., and their extracts such as essential oils, etc.

In one aspect, a processed flavor is added to a *Stevia* solution, then dried into a powder by any method, including but not limited to spray-drying, crystallization, tray-drying, freeze drying etc. Thus, volatile flavors can be preserved. Normally, MRP flavors have to be maintained at low temperatures, such as 10° C. An advantage of the present embodiments is that encapsulation of flavors by steviol glycosides can be kept at room temperature or even higher temperatures without significant loss of flavor. Further, the antioxidant properties of MRPs can play an additional role in protecting these flavors. In addition, depending on the desired product(s), compositions can be designed to enhance a foam for a specific application, such as foamed/frothy coffee. In addition, an anti-foaming agent can be added together or separately during the reaction processes described herein, such that the product can be used to prevent foaming for beverage bottling applications.

Maillard reactions create orthonasal and retronasal taste(s). The typically associated off-taste of steviol glycosides is either removed or masked with MRPs added to the steviol glycoside(s) and creates an overall good smell and taste of the resulting composition. MRPs increase the bitterness threshold of steviol glycosides and enhance intensity of sweetness, thus making steviol glycosides useful for sugar replacement or sugar reduction in a product. The inventors have surprisingly found that the flavors of compositions herein are the result of the process not only characterized by Maillard reaction between sugar donor and amine donor, but that the flavors are also synergized by different groups of steviol glycosides with or without non-steviol glycoside substances.

The volatile substances produced during the Maillard reactions are surprisingly retained by the *Stevia*, including non-volatiles, so the processes described herein substantially improve both the taste and odor and consequently, improve the overall profile of steviol glycosides to be sugar-like, honey-like, chocolate, caramel, etc. The mixture of MRPs, including initial and final SGs from the Maillard reaction provide new odor and taste profiles. The initial SGs' typical undesired taste features are therefore reduced by the processes and compositions described herein and are no longer recognized as low purity SGs, which normally possess grassy tastes and smells.

In one aspect, the present application provides a sweetening or flavoring composition comprises: (1) a Maillard reaction product (MRP) composition formed from a reaction mixture comprising: (a) one or more reducing sugars having a free carbonyl group, and (b) one or more amine donors having a free amino group; and (2) a *Stevia* extract, a glycosylated *Stevia* extract, one or more purified steviol glycosides, and/or one or more glycosylated steviol glycosides, wherein the MRP composition is present in the sweetener composition in an amount in the range of 0.1-99 wt %.

In a particular embodiment, the sweetener or flavoring agent composition comprises: (1) a first component comprising Maillard reaction product (MRP) composition formed from a reaction mixture comprising: (a) a *Stevia* extract, a glycosylated *Stevia* extract, one or more purified steviol glycosides, and/or one or more glycosylated steviol glycosides; (b) one or more amine donors having a free amino group; and (2) a second component comprising one or more sweeteners, wherein the first and second components are present in the sweetener composition in an amount in the ranges of 1-100% of the sweetener composition.

In another aspect, the present application provides a non-Steviol glycoside sweetener-derived. MRP composition comprising: a Maillard reaction product (MRP) composition formed from a reaction mixture comprising: (A) a non-*Stevia* sweetener; (B) a reducing sugar having a free carbonyl group; and (C) one or more amine donors having a free amino group, wherein the non-*Stevia* sweetener is selected from the group consisting of sweet tea extracts, swingle extracts, glycosylated sweet tea extracts, glycosylated swingle extracts, glycosylated sweet ea glycosides, glycosylated mogrosides, glycyrrhizin, glycosylated glycyrrhizin, rubusoside, glycosylated rubusoside, suaviosides, glycosylated suaviosides, mogrosides, glycosylated mogrosides and sucralose, and wherein the MRP composition is present in the composition in an amount in the range of 0.0001-100 wt %.

In another embodiment, the present application provides a beverage containing a non-Steviol glycoside sweetener-derived MRP (NS-MRP) composition, wherein the NS-MRP composition is formed from a reaction mixture comprising: (A) a non-*Stevia* sweetener; (B) a reducing sugar having a free carbonyl group; and (C) one or more amine donors having a free amino group; and wherein the non-*Stevia* sweetener is selected from the group consisting of sweet tea extracts, swingle extracts, glycosylated sweet tea extracts, glycosylated swingle extracts, glycosylated sweet tea glycosides, glycyrrhizin, glycosylated glycyrrhizin, rubusoside, glycosylated rubusoside, suaviosides, glycosylated suaviosides, mogrosides, glycosylated mogrosides and sucralose, and wherein the MRP composition is present in the the beverage in an final concentration in the range of 1-15,000 ppm.

In another aspect, the present application provides a beverage containing an MRP composition formed from a reaction mixture comprising: (1) one or more *Stevia* extracts, one or more glycosylated *Stevia* extracts, one or more steviol glycosides, and/or one or more glycosylated steviol glycosides, and (2) one or more amine donors having a free amino group.

In a more particular embodiment, the present application provide a beverage containing an MRP composition formed from a reaction mixture comprising: (1) an added Maillard reaction product (MRP) composition formed from a reaction mixture comprising one or more reducing sugars having a free carbonyl group, and one or more amine donors having a free amino group, and (2) one or more *Stevia* extracts, one or more glycosylated *Stevia* extracts, one or more purified steviol glycosides, and/or one or more glycosylated steviol glycosides, wherein the MRP composition is present in the beverage at a final concentration of 1-15,000 ppm.

In another aspect, the present application provides a beverage comprising a steviol glycoside-derived MRP (S-MRP) composition, wherein the S-MRP composition is formed from a reaction mixture comprising: (1) a *Stevia* extract and/or a glycosylated *Stevia* extracts; and (2) one or more amine donors having a free amino group, wherein the MRP composition comprises an Amadori product, and wherein the S-MRP composition is present in the beverage in a final concentration of 1-15,000 ppm.

In a particular embodiment, the beverage comprises an S-MRP composition formed from a reaction mixture comprising: (1) a *Stevia* extract and/or a glycosylated *Stevia* extract; (2) one or more reducing sugars having a free carbonyl group; and (3) one or more amine donors having a free amino group, wherein the MRP composition comprises an Amadori product, and wherein the MRP composition is present in the beverage in a final concentration of 1-15,000 ppm.

In another aspect, the present application provides a method for improving the taste profile of a beverage by adding an S-MRP composition thereto, wherein the S-MRP composition is produced by: (1) heating a reaction mixture comprising (a) a steviol glycoside (SG) containing composition and one or more amine donors comprising a free amino group; or (2) heating a reaction mixture comprising (a) an SG-containing composition, (b) one or more amine donors comprising a free amino group, and (c) one or more reducing sugars comprising a free carbonyl group.

In a particular embodiment, the method for improving the taste profile of a beverage includes the step of adding an MRP composition to the beverage, wherein the MRP composition is produced by heating a reaction mixture comprising (a) one or more amine donors comprising a free amino group; and (b) one or more reducing sugars comprising a free carbonyl group.

In another embodiment, a method for improving the taste profile of a beverage includes the steps of: (1) adding an MRP composition to the beverage, wherein the MRP composition is produced by heating a reaction mixture for a period of time sufficient to initiate a Maillard reaction, wherein the reaction mixture comprises: (A) one or more reducing sugars comprising a free carbonyl group, and (B) one or more amine donors comprising a free amino group; and (2) adding a sweetener composition to the beverage to produce a final product, wherein the sweetener composition comprises one or more *Stevia* extracts, one or more glycosylated *Stevia* extracts, one or more purified steviol glycosides, and/or one or more glycosylated steviol glycosides, wherein the MRP composition is present in the final product n a concentration of 0.1-15,000 ppm.

In another aspect, a method for improving the taste profile of a bakery product includes the steps of: (1) preparing a dough comprising: (A) a Maillard reaction product (MRP) composition formed from a reaction mixture comprising: (i) one or more reducing sugars having a free carbonyl group, and (ii) one or more amine donors having a free amino group; and (B) one or more amine donors having a free amino group; and (2) baking the dough to produce the bakery product.

In another aspect, the present application provides a food product or beverage comprising a non-volatile component from an S-MRP composition.

In one embodiment, the food product includes one or more non-volatile compounds from an MRP composition formed from a reaction mixture comprising: (i) a *Stevia* extract, a glycosylated *Stevia* extract, one or more purified steviol glycosides, and/or one or more glycosylated steviol glycosides; and (ii) one or more amine donors having a free amino group, wherein the one or more non-volatile compounds are present in the food product in an amount in the range of 0.0001-99 wt % of the food product.

In another embodiment, the beverage includes one or more non-volatile compounds from a Maillard reaction product (MRP) composition formed from a reaction mixture comprising: (i) a *Stevia* extract, a glycosylated *Stevia* extract, one or more purified steviol glycosides, and/or one or more glycosylated steviol glycosides; and (ii) one or more amine donors having a free amino group, wherein the one or more non-volatile compounds are present in the beverage in an final concentration in the range of 1 ppm-15,000 ppm.

In another aspect, a method for improving the taste or mouth feel of a food product comprises the steps of adding an MRP composition during the preparation of a food product to produce a final product, wherein the MRP composition is produced by: (1) heating a reaction mixture comprising (a) an steviol glycoside (SG)-containing composition and (b) one or more amine donors comprising a free amino group; or (2) heating a reaction mixture comprising (a) an SG-containing composition, (b) one or more amine donors comprising a free amino group, and (c) one or more reducing sugars comprising a free carbonyl group; or (3) heating a reaction mixture comprising (a) an SG-containing composition, (b) one or more amine donors comprising a free amino group, (c) one or more reducing sugars comprising a free carbonyl group, and (d) thaumatin.

In another aspect, a method for improving the taste or mouth feel of a sweetener composition comprises the step of adding an MRP composition to the sweetener composition to produce a final product, wherein the MRP composition is produced by heating a reaction mixture comprising: (1) one or more reducing sugars having a free carbonyl group; and (2) one or more amine donors having a free amino group, wherein the MRP composition is present in the final product in an amount of 0.0001-10 wt %.

In a further aspect, the present application provides a dough comprising: (1) a Maillard reaction product (MRP) composition formed from a reaction mixture comprising: (a) a first component comprising one or more reducing sugars having a free carbonyl group, and (b) one or more amine donors having a free amino group; and (2) a second component comprising a Stevia extract, a glycosylated *Stevia* extract, one or more purified steviol glycosides, and/or one or more glycosylated steviol glycosides, wherein the first and second components are present in the dough in a total amount in the range of 0.0001-20 wt % of the dough.

In another embodiment, the present application provides a dough comprising: first component comprising a Maillard reaction product (MRP) composition formed from a reaction mixture comprising: (a) a *Stevia* extract, a glycosylated *Stevia* extract, one or more purified steviol glycosides, and/or one or more glycosylated steviol glycosides, and (b) one or more amine donors having a free amino group; and (2) a second component comprising one or more sweeteners, wherein the first and second components are present in the dough in a total amount in the range of 0.0001-50 wt % of the dough.

In a further aspect, the present application provides a dairy product comprising: (1) a first component comprising an MRP composition formed from a reaction mixture comprising: (a) one or more reducing sugars having a free carbonyl group, and (b) one or more amine donors having a free amino group; and (2) a second component comprising a *Stevia* extract, a glycosylated *Stevia* extract, one or more purified steviol glycosides, and/or one or more glycosylated steviol glycosides, wherein the first and second components are present in the dairy product in a total amount in the range of 0.0001-10 wt % of the dairy product.

In another embodiment, the dairy product comprises: (1) a first component comprising an MRP composition formed from a reaction mixture comprising: (a) a *Stevia* extract, a glycosylated *Stevia* extract, one or more purified steviol glycosides, and/or one or more glycosylated steviol glycosides, and (b) one or more amine donors having a free amino group; and (2) a second component comprising one or more sweeteners, wherein the first and second components are present in the dairy product in a total amount in the range of 0.0001-10 wt % of the dairy product.

While multiple embodiments are disclosed, still other embodiments of the present invention will be apparent to those skilled in the art from the following detailed description. As will be apparent, the invention is capable of modifications in various obvious aspects, without departing from the spirit and scope of the present invention. Accordingly, the detailed descriptions herein are to be regarded as illustrative in nature and not restrictive.

BRIEF DESCRIPTION OF THE DRAWINGS

FIG. 18 depicts a flow diagram for testing of mixtures of amino acids, steviol glycosides and reaction products.

FIG. 125 shows the relationship between the overall likeability results to the ratio of mogroside V50 to MRP-CA of example 133.

FIG. 126 shows the relationship between the sensory evaluation results to the ratio of mogroside V50 to S-MRP-CA of example 134.

FIG. 127 shows the relationship between the overall likeability results to the ratio of mogroside V50 to S-MRP-CA of example 134.

FIG. 128 shows the relationship between the sensory evaluation results to the ratio of mogroside V50 to TS-MRP-CA of example 135.

FIG. 129 shows the relationship between the overall likeability results to the ratio of mogroside V50 to TS-MRP-CA of example 135.

FIG. 130 shows the relationship between the sensory evaluation results to the ratio of sucralose, aspartame to MRP-CH of example 136.

FIG. 131 shows the relationship between the overall likeability results to the ratio of sucralose, aspartame to MRP-CH of example 136.

FIG. 132 shows the relationship between the sensory evaluation results to the ratio of sucralose, aspartame to S-MRP-CH of example 137.

FIG. 133 shows the relationship between the overall likeability results to the ratio of sucralose, aspartame to S-MRP-CH of example 137.

FIG. 134 shows the relationship between the sensory evaluation results to the ratio of sucralose, aspartame to TS-MRP-CH of example 138.

FIG. 135 shows the relationship between the overall likeability results to the ratio of sucralose, aspartame to TS-MRP-CH of example 138.

FIG. 136 shows the relationship between the sensory evaluation results to the ratio of sucralose to MRP-CA of example 139.

Figure 137:
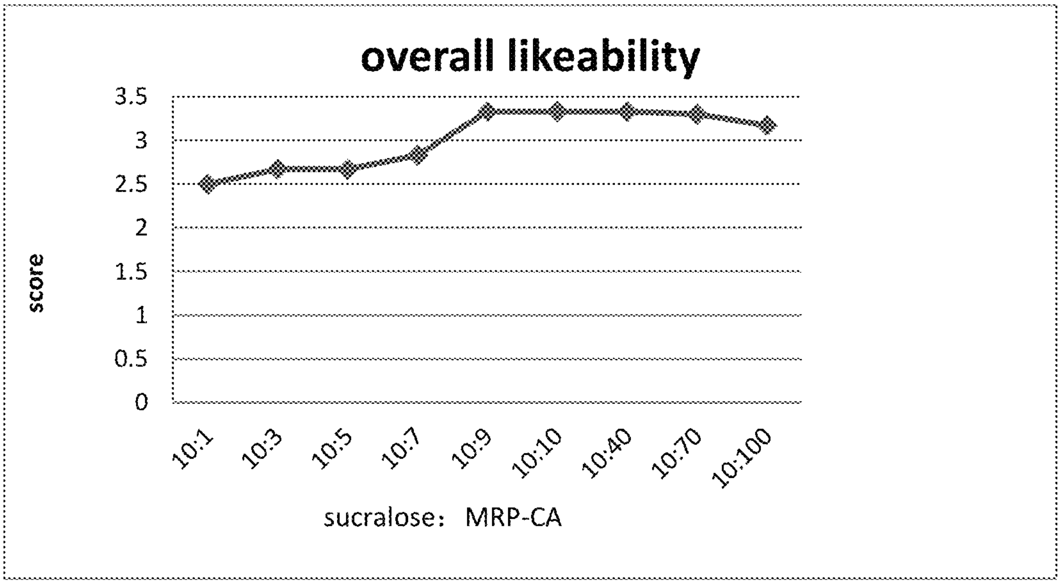

FIG. 137 shows the relationship between the overall likeability results to the ratio of sucralose to MRP-CA of example 139.

Figure 138:
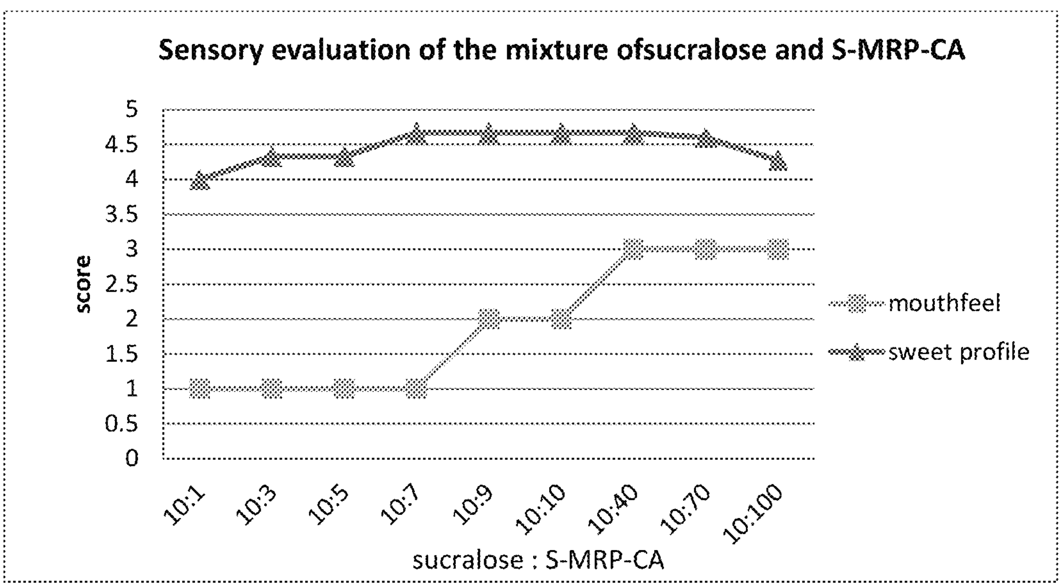

FIG. 138 shows the relationship between the sensory evaluation results to the ratio of sucralose to S-MRP-CA of example 140.

Figure 139:
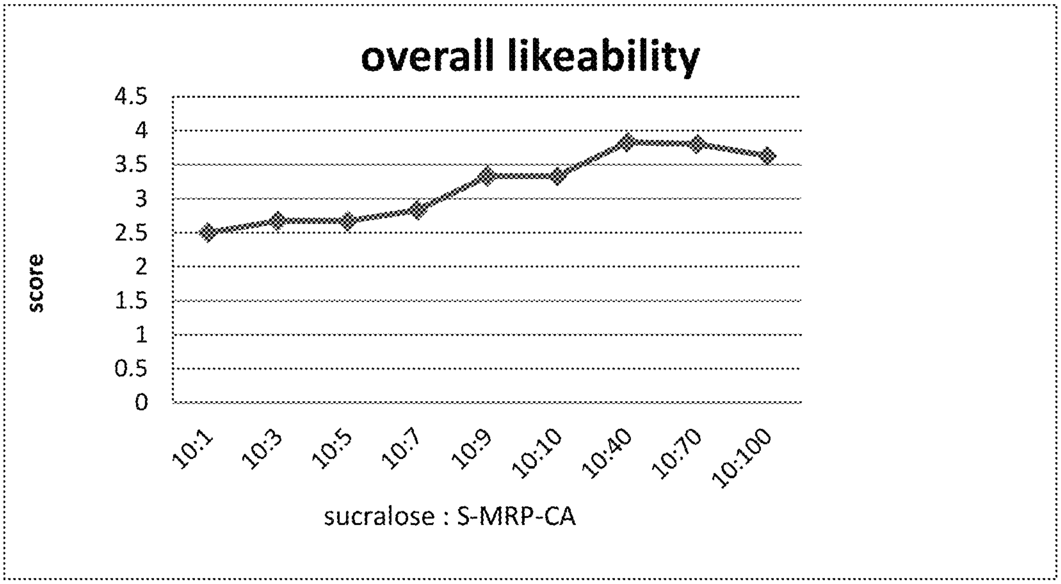

FIG. 139 shows the relationship between the overall likeability results to the ratio of sucralose to S-MRP-CA of example 140.

Figure 140:
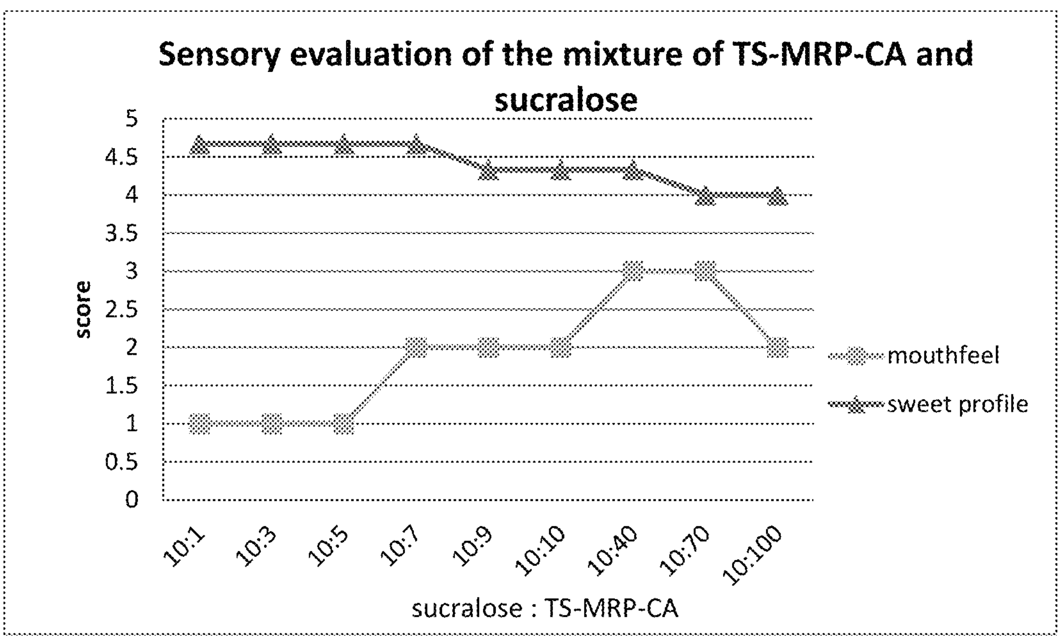

FIG. 140 shows the relationship between the sensory evaluation results to the ratio of sucralose to TS-MRP-CA of example 141.

Figure 141:
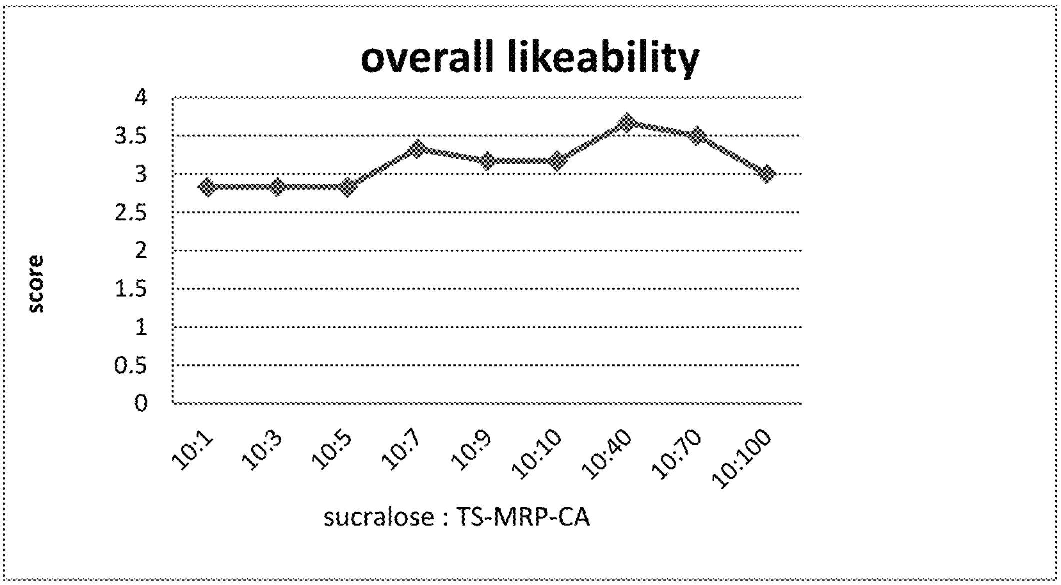

FIG. 141 shows the relationship between the overall likeability results to the ratio of sucralose to TS-MRP-CA of example 141.

Figure 142:
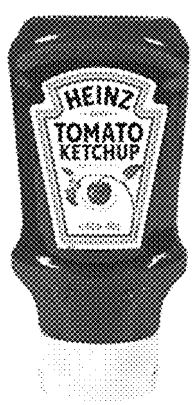

FIG. 142 shows the label of Heinz Ketchup Classic.

Figure 143:

FIG. 143 shows the label of Heinz Ketchup 50% reduced sugar & salt.

Figure 144A:
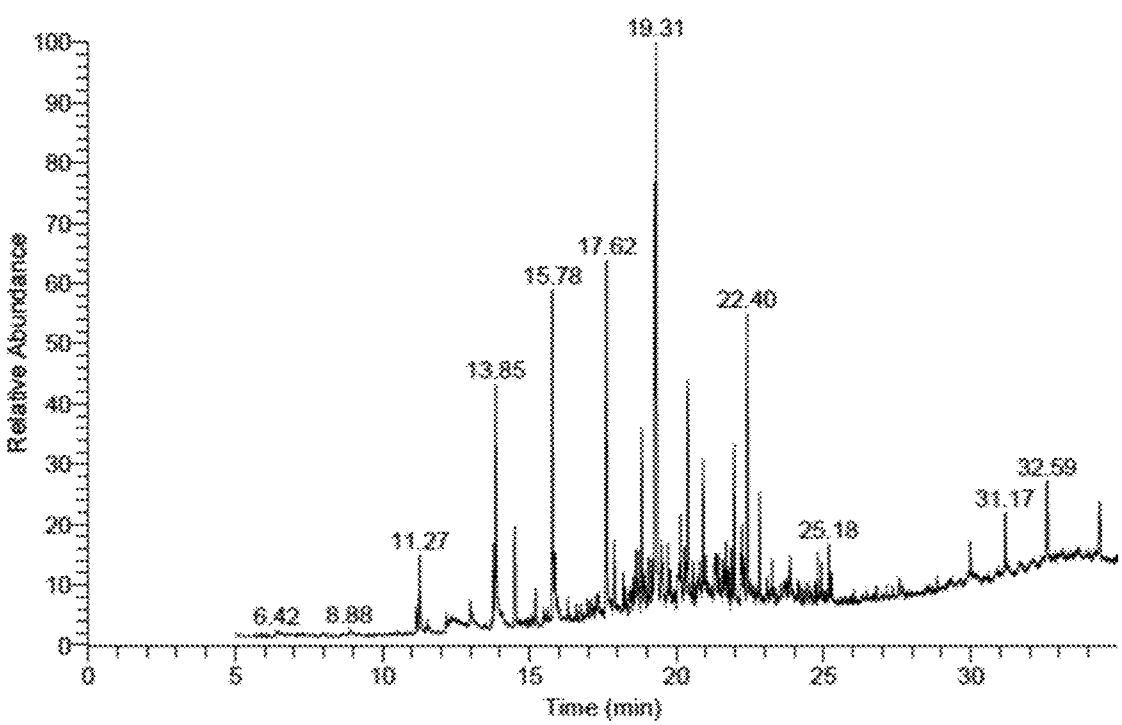

FIG. 144*a* shows TIC of the *Stevia*.

Figure 144B:
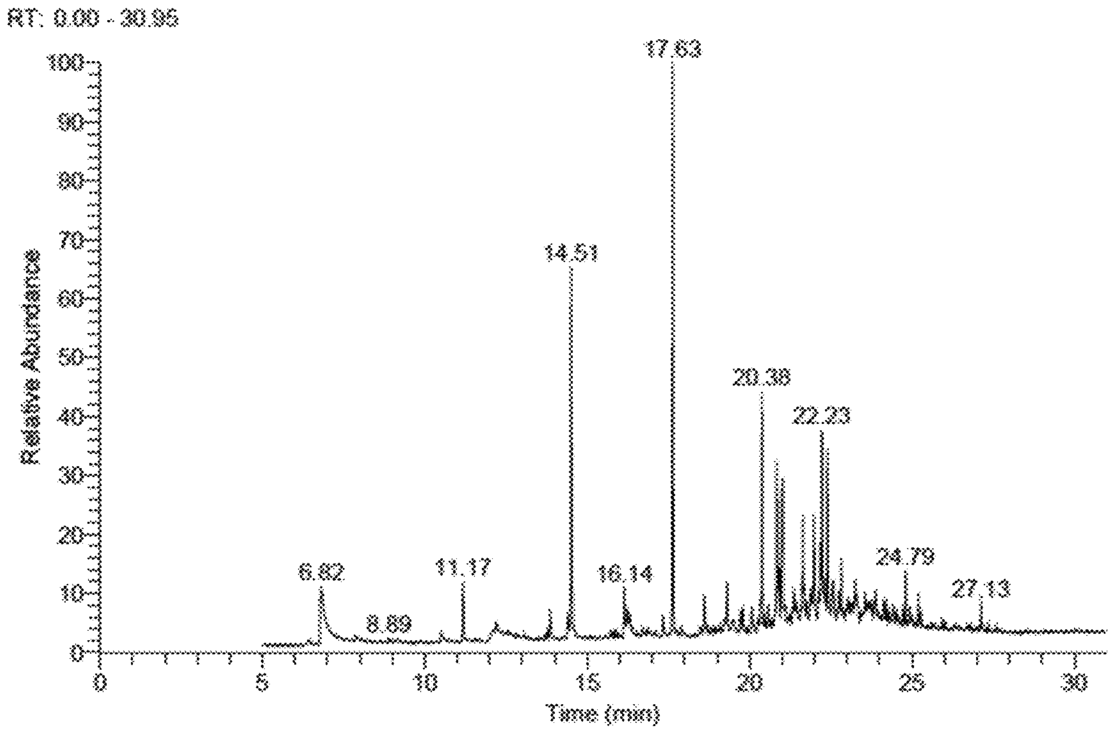

FIG. 144*b* shows TIC of the standard MRPs.

Figure 144C:
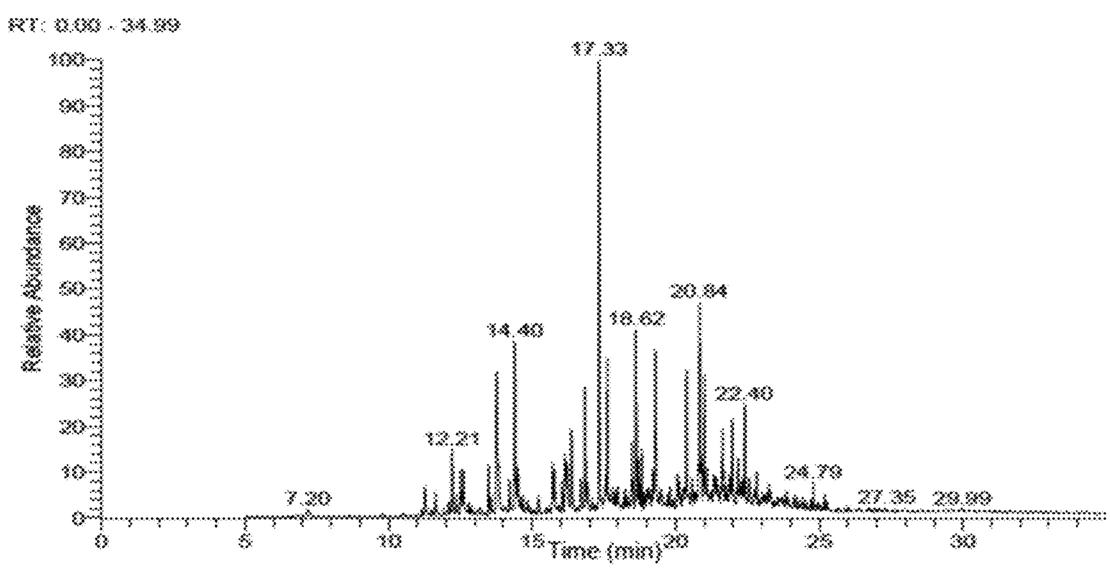

FIG. 144*c* shows TIC of the Citrus MRPs.

Figure 145A:
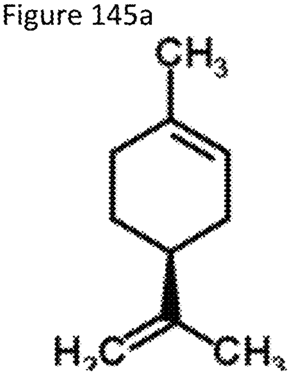

FIG. 145*a* shows the molecular structure of (−)-Limonene.

Figure 145B:
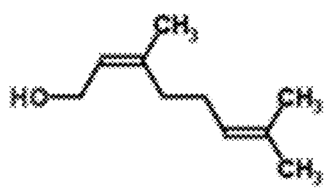

FIG. 145*b* shows the molecular structure of Nerol.

Figure 145C:
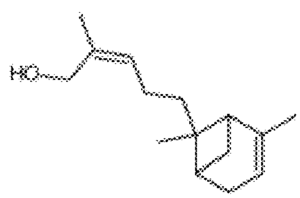

FIG. 145*c* shows the molecular structure of Bergamot.

Figure 145D:
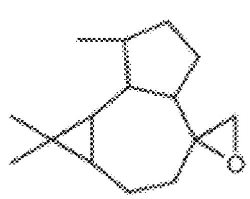

FIG. 145*d* shows the molecular structure of Aromadendrene Oxide.

Figure 145E:
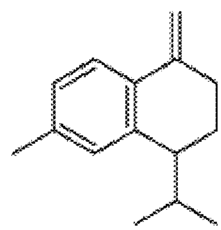

FIG. 145*e* shows the molecular structure of β-Calacorene.

Figure 145F:
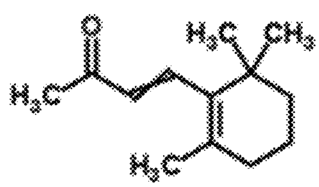

FIG. 145*f* shows the molecular structure of Ionone.

FIGS. 146*a* through 146*j* shows sensory analysis results for tests in final applications.

FIGS. 147*a* and 147*b* show the results of SG-MRPs flavor threshold determination.

FIGS. 148*a* through 148*d* show the HPLC chromatograms of the samples as tested.

Figure 149A:
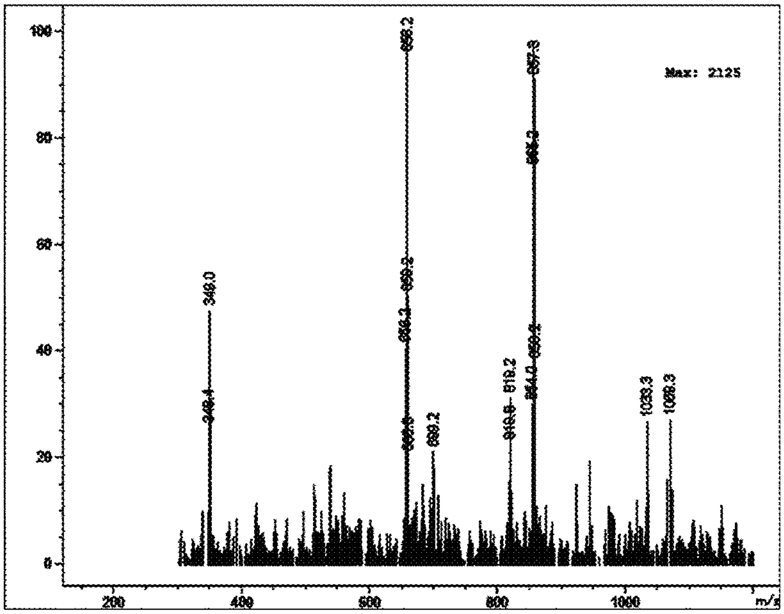
Figure 149B:
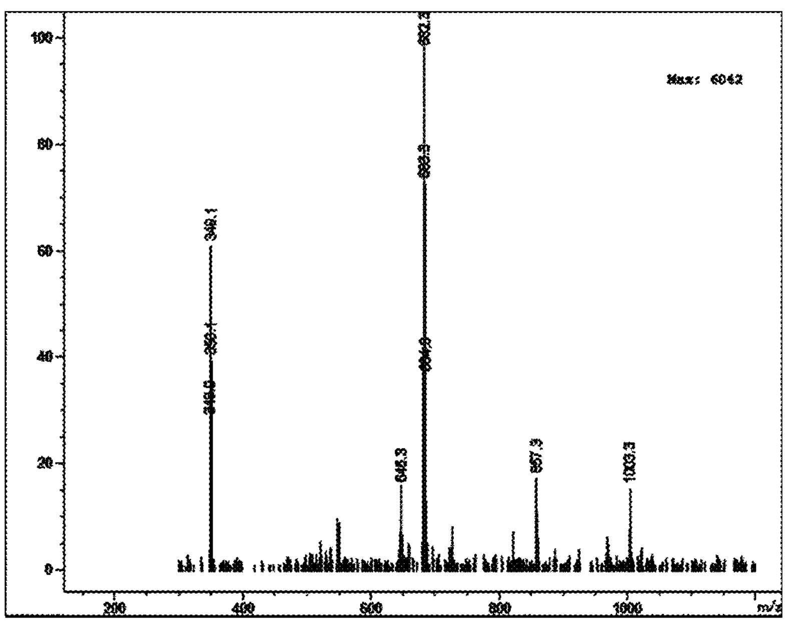
Figure 149C:
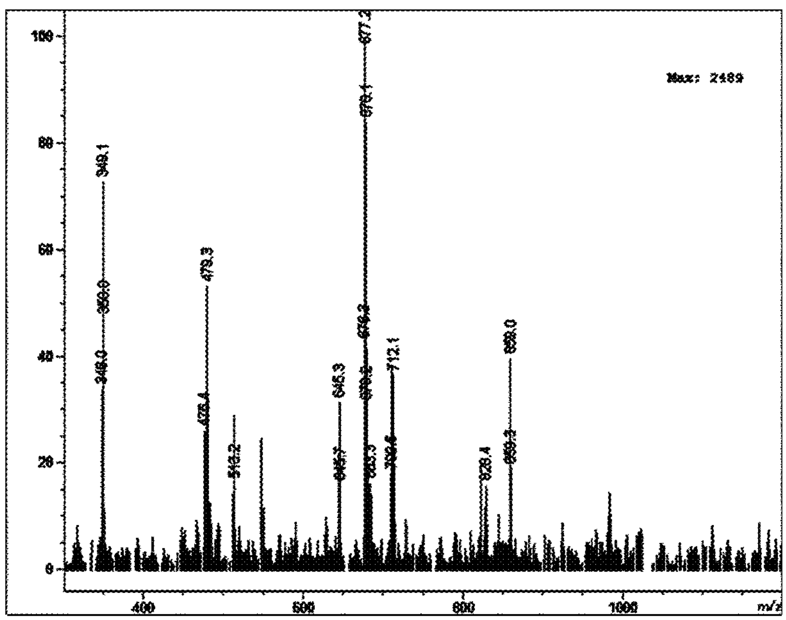

FIGS. 149*a*, 149*b* and 149*c* show ESI-MS spectra of 3 peaks related to the *Stevia* extract of example 37, sample A and sample B (9.8, 10.8 and 12.3 minutes)

Figure 150A:
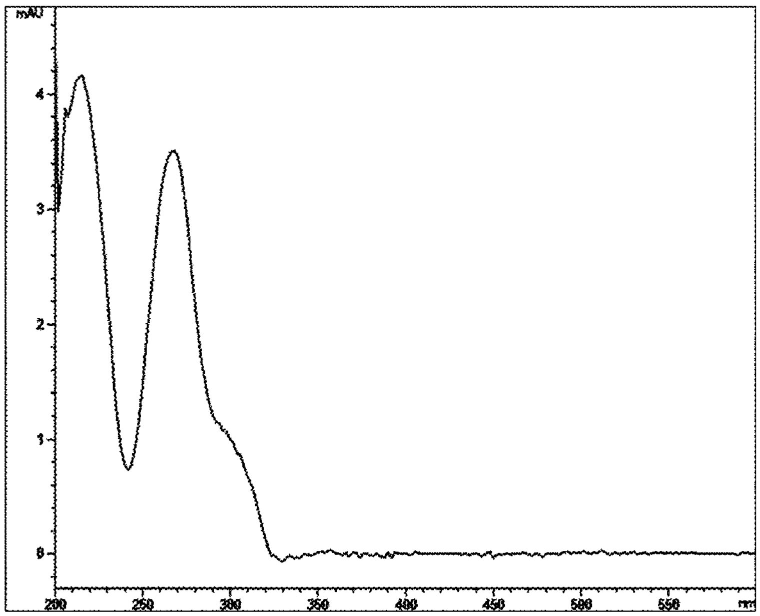
Figure 150B:
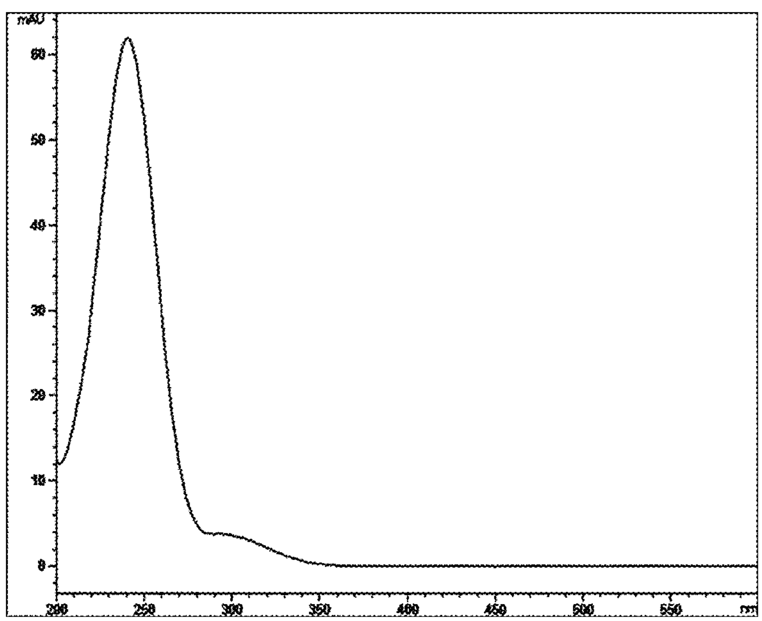
Figure 150C:
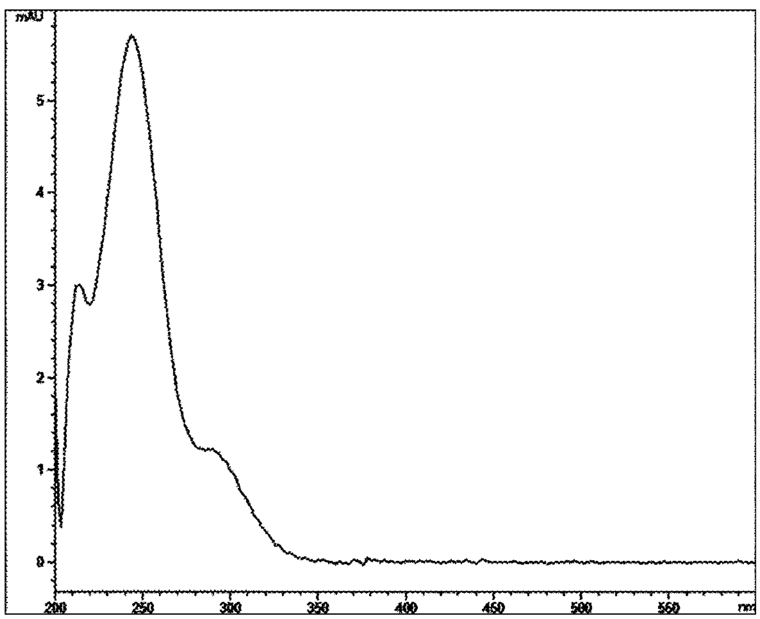

FIGS. 150*a*, 150*b* and 150*c* show UV-VIS spectra of 2 peaks related to the *Stevia* extract from example 37, sample A and sample B (9.8, 10.8 and 12.3 minutes).

Figure 151:
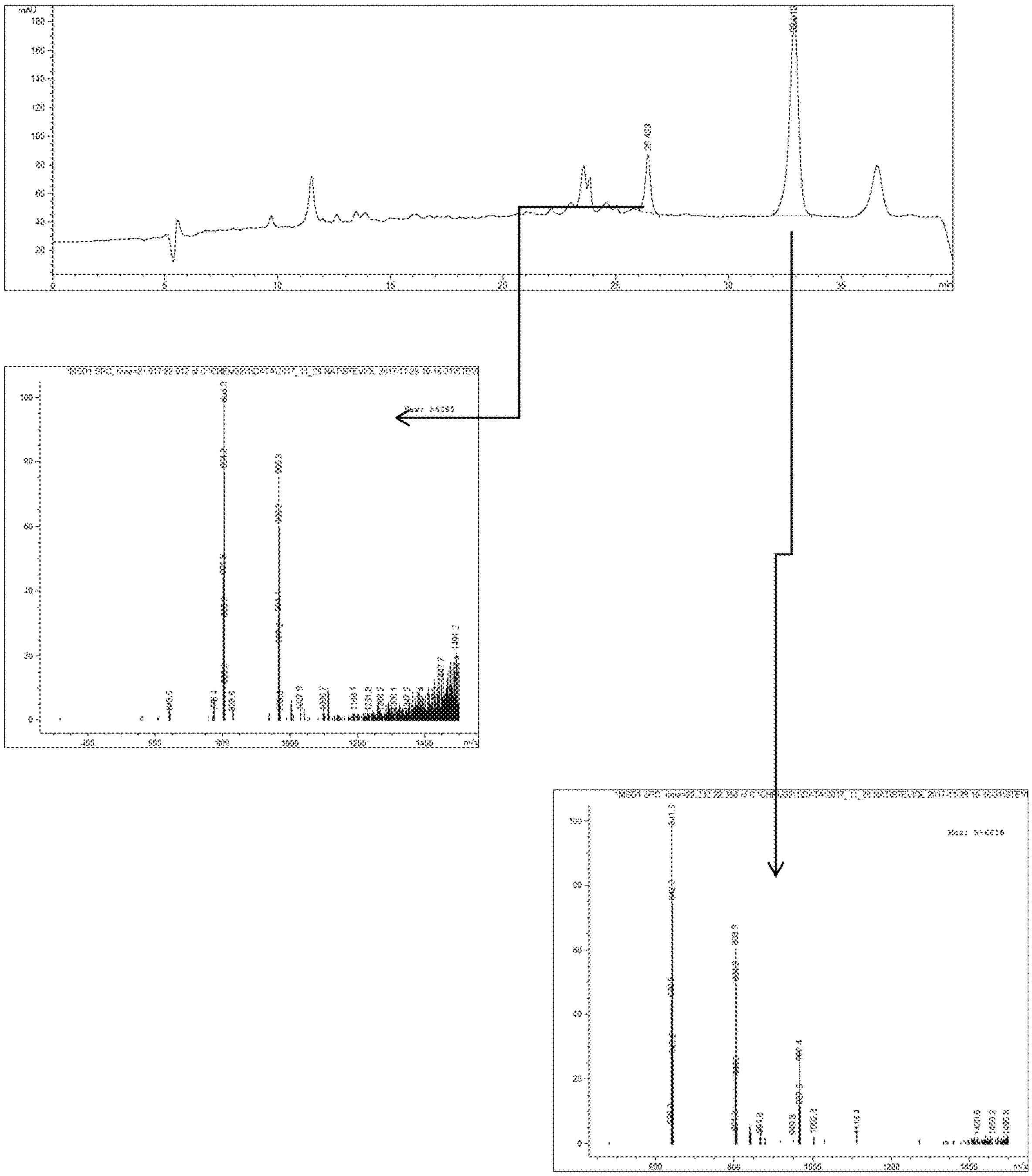

FIG. 151 upper panel depicts Rebaudioside A after reaction with phenylalanine (pH=7.2, Temp=120° C., t=2 h), Middle panel spectrum shows expected m/z for Reb-A (m/z=965). Lower panel spectrum shows expected m/z for Phe+Reb-A (m/z=1113).

Figure 152:
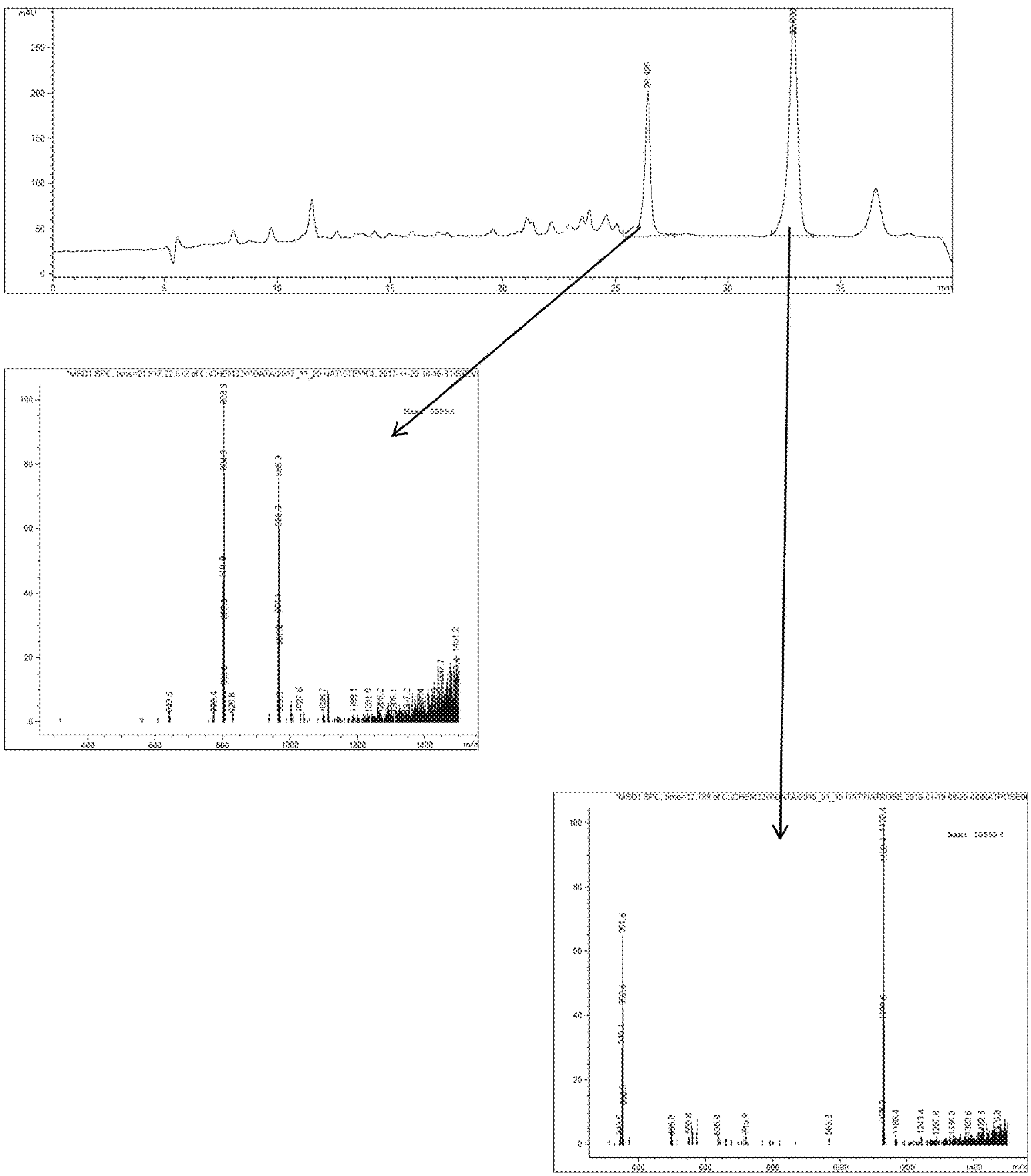

FIG. 152 upper panel depicts Rebaudioside A after reaction with tyrosine (pH=7.2, Temp=120° C., t=2 h). Middle panel spectrum shows expected m/z for Reb-A (m/z=965). Lower panel spectrum shows expected m/z for Tyr+Reb-A (m/z=1094).

Figure 153:
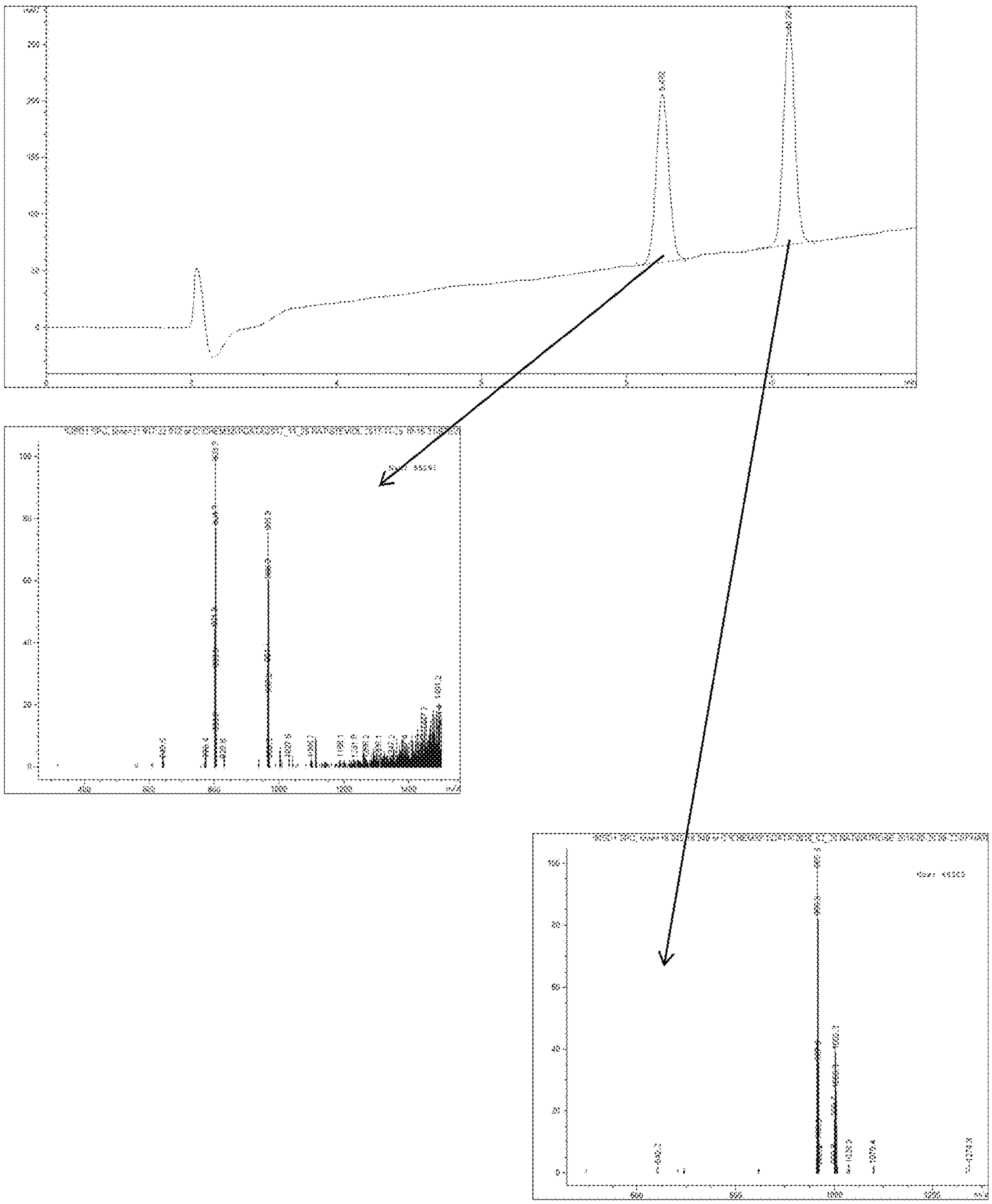

FIG. 153 upper panel depicts Rebaudioside A after reaction with leucine (pH=7.2, Temp=120° C., t=2 h. Middle panel spectrum shows expected m/z for Reb-A (m/z=965). Lower panel spectrum shows expected m/z for Leu+Reb-A (m/z=1079).

Figure 154:
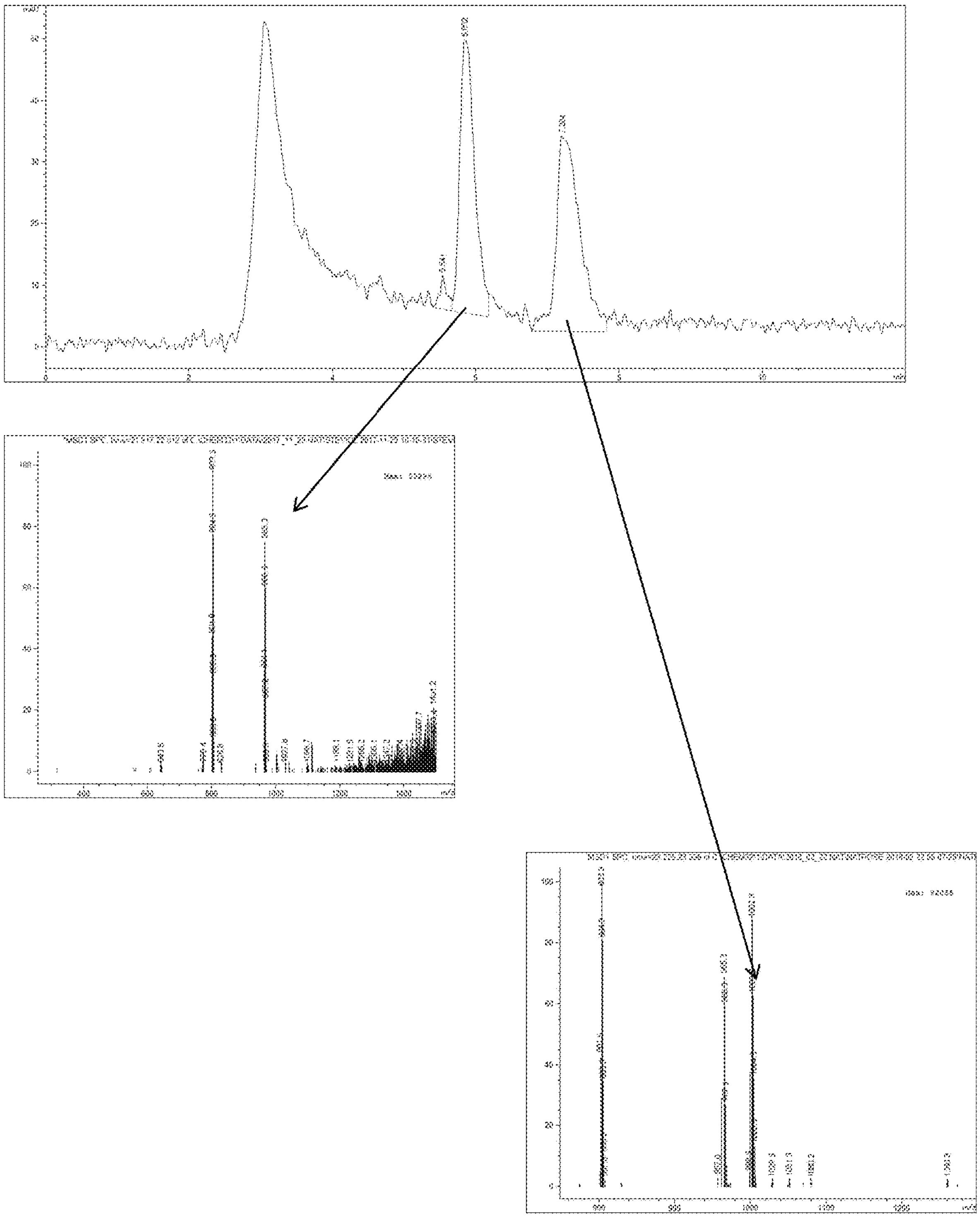

FIG. 154 upper panel depicts Rebaudioside A after reaction with asparagine (pH=7.2, Temp=120° C., t=2 h). Middle panel spectrum shows expected m/z for Reb-A (m/z=965). Lower panel spectrum shows expected m/z for Asn+Reb-A (m/z=1080).

Figure 155:
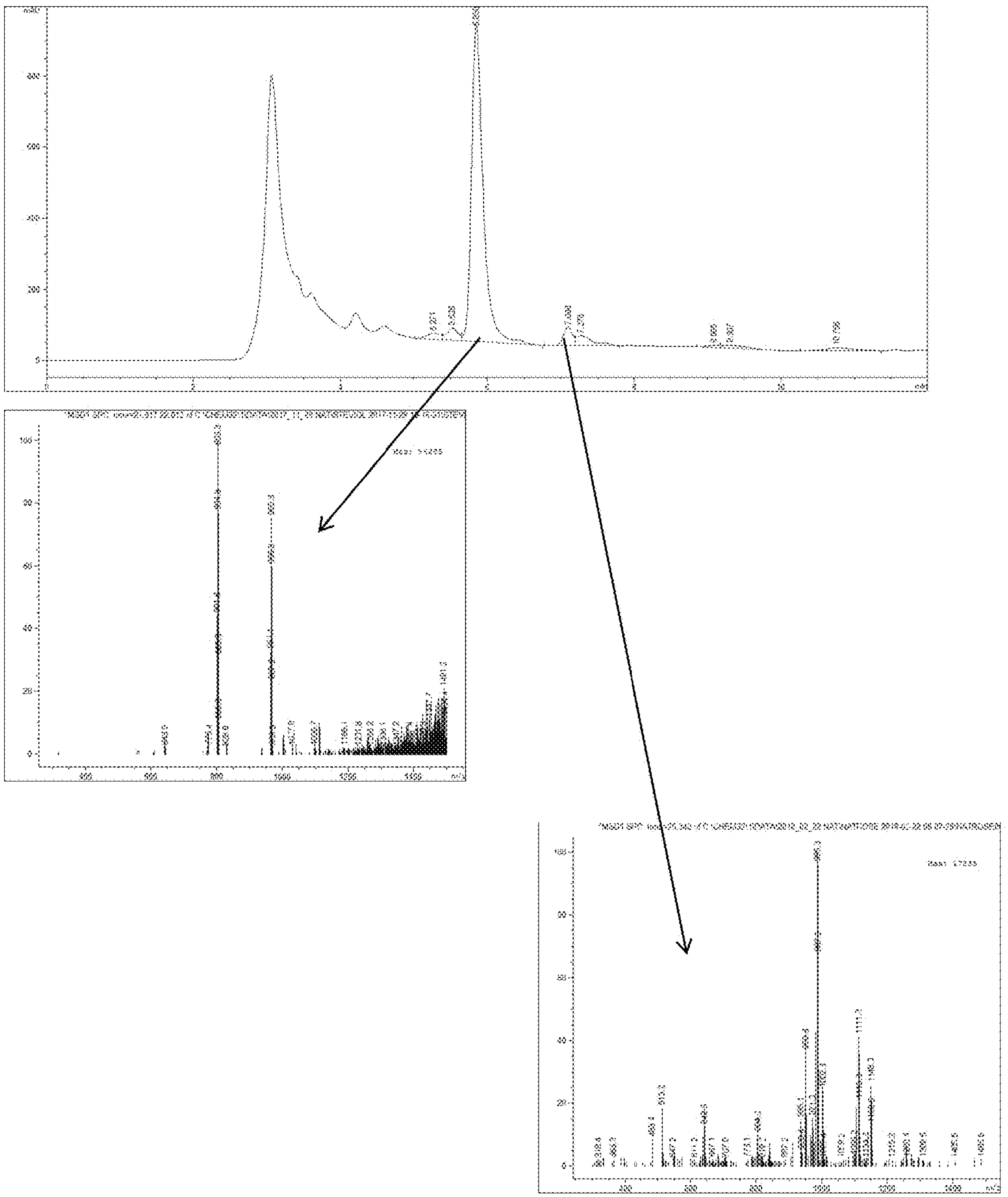

FIG. 155 upper panel depicts Rebaudioside A after reaction with tryptophan (pH=7.2, Temp=120° C., t=2 h). Middle panel spectrum shows expected m/z for Reb-A (m/z=965). Lower panel spectrum shows expected m/z for Trp+Reb-A (m/z=1080).

Figure 156:
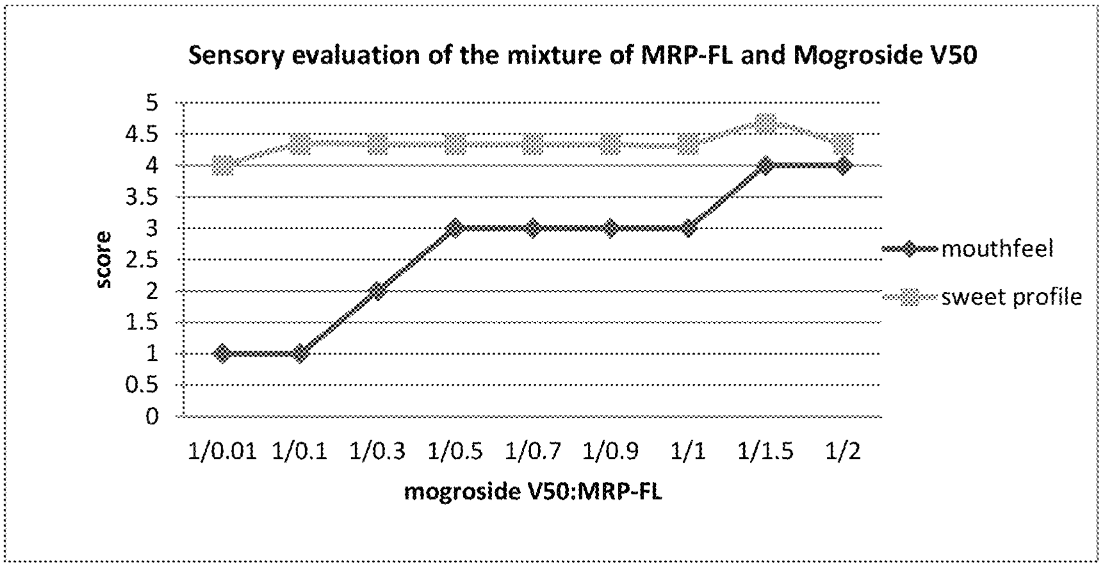

FIG. 156 demonstrates the relationship between the sensory evaluation results to the ratio of mogroside V50 to MRP-FL.

Figure 157:
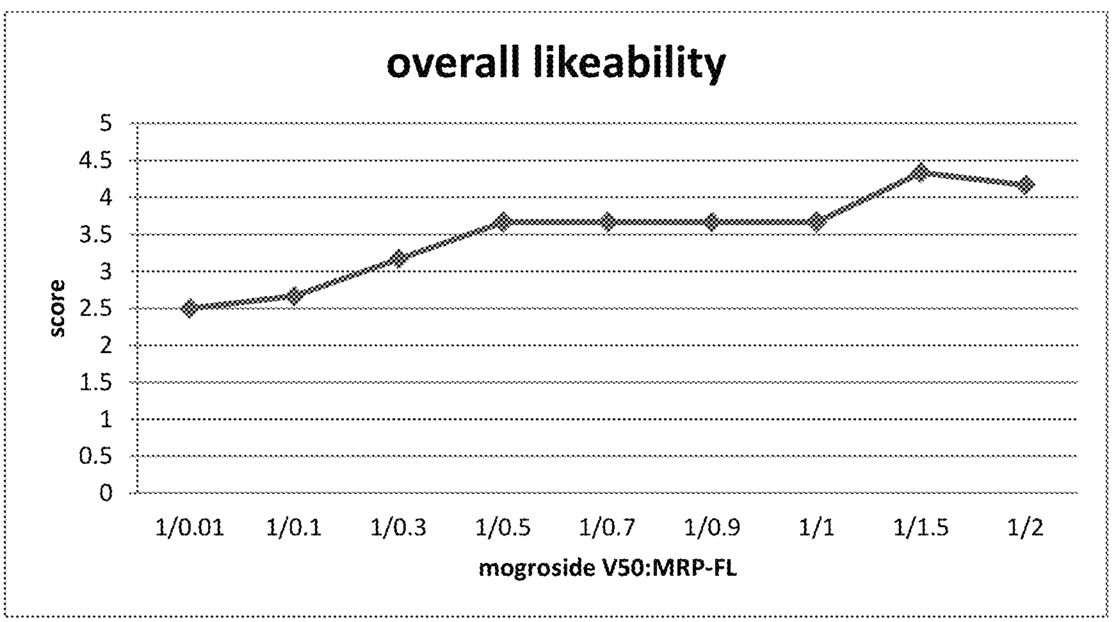

FIG. 157 demonstrates the relationship between the overall likeability results to the ratio of mogroside V50 to MRP-FL.

Figure 158:
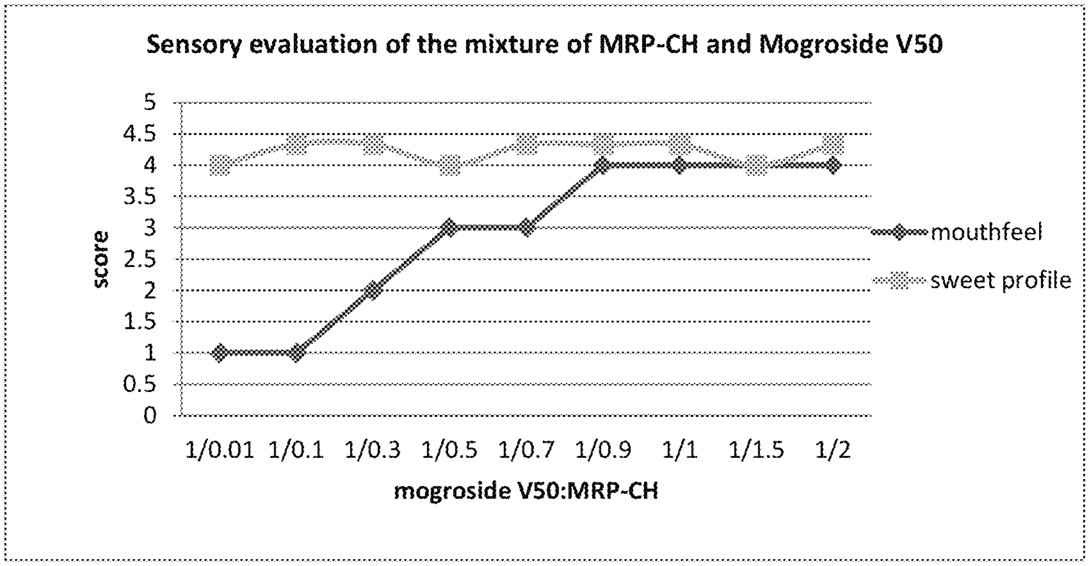

FIG. 158 demonstrates the relationship between the sensory evaluation results to the ratio of mogroside V50 to MRP-CH.

Figure 159:
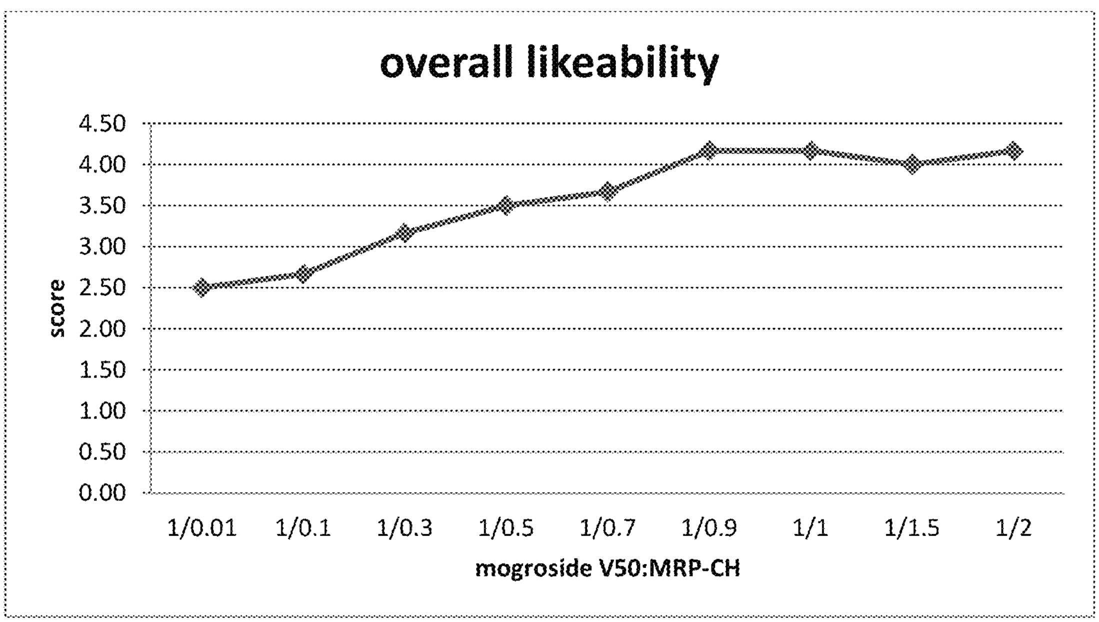

FIG. 159 demonstrates the relationship between the overall likeability results to the ratio of mogroside V50 to MRP-CH.

Figure 160:
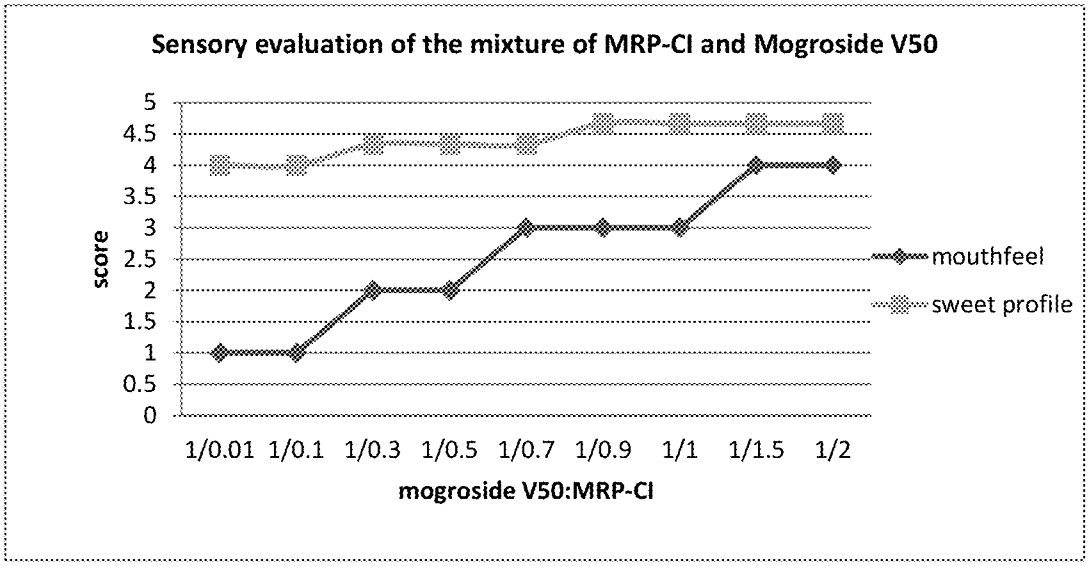

FIG. 160 demonstrates the relationship between the sensory evaluation results to the ratio of mogroside V50 to MRP-CI.

Figure 161:
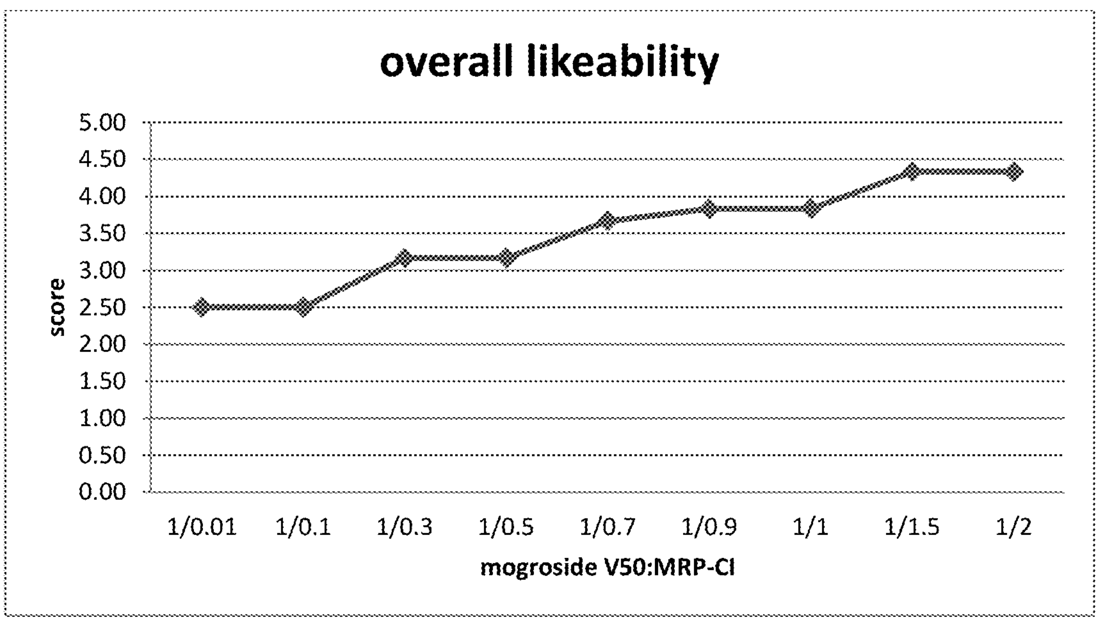

FIG. 161 demonstrates the relationship between the overall likeability results to the ratio of mogroside V50 to MRP-CI.

Figure 162:
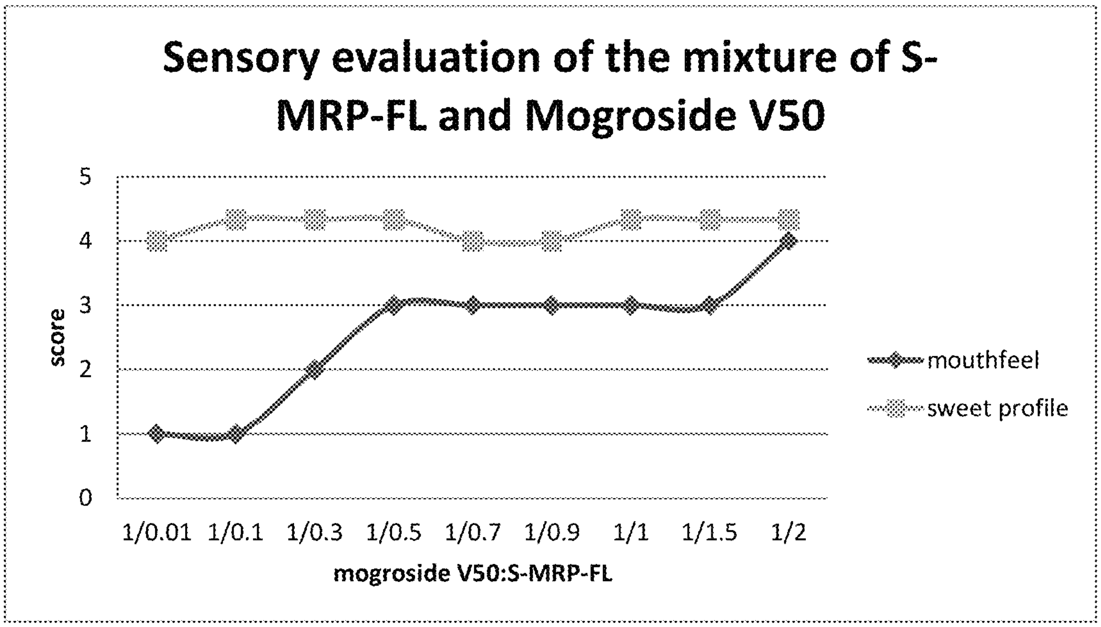

FIG. 162 demonstrates the relationship between the sensory evaluation results to the ratio of mogroside V50 to S-MRP-FL.

Figure 163:
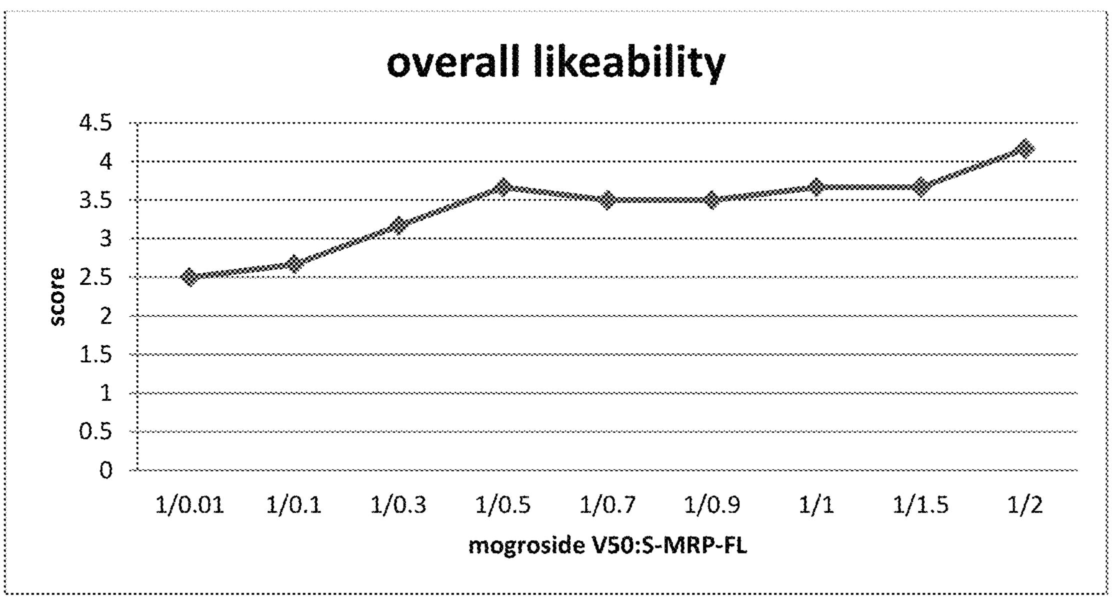

FIG. 163 demonstrates the relationship between the overall likeability results to the ratio of mogroside V50 to S-MRP-FL.

Figure 164:
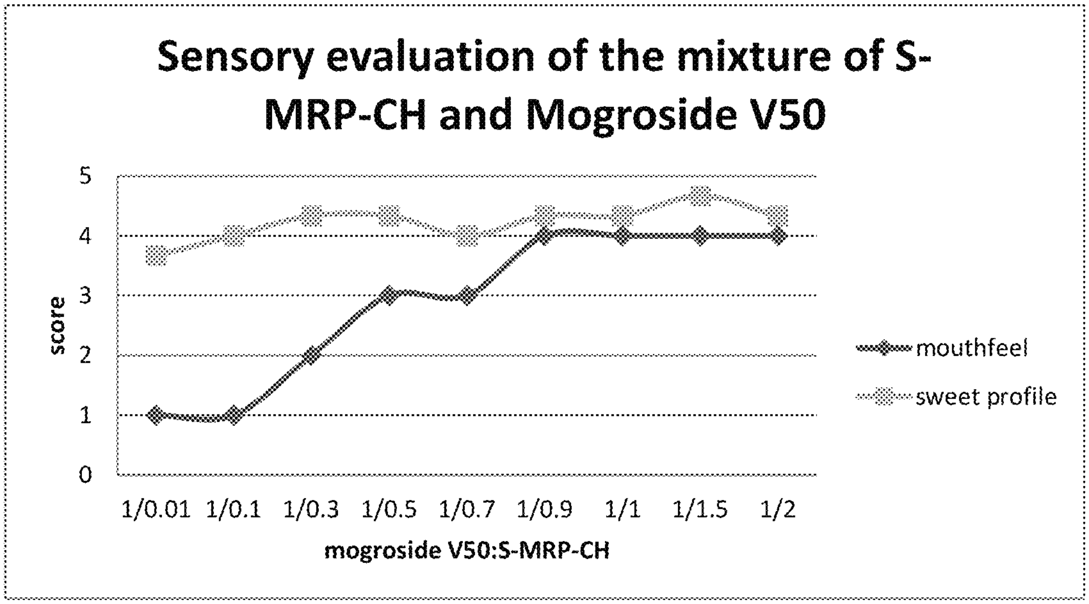
Figure 165:
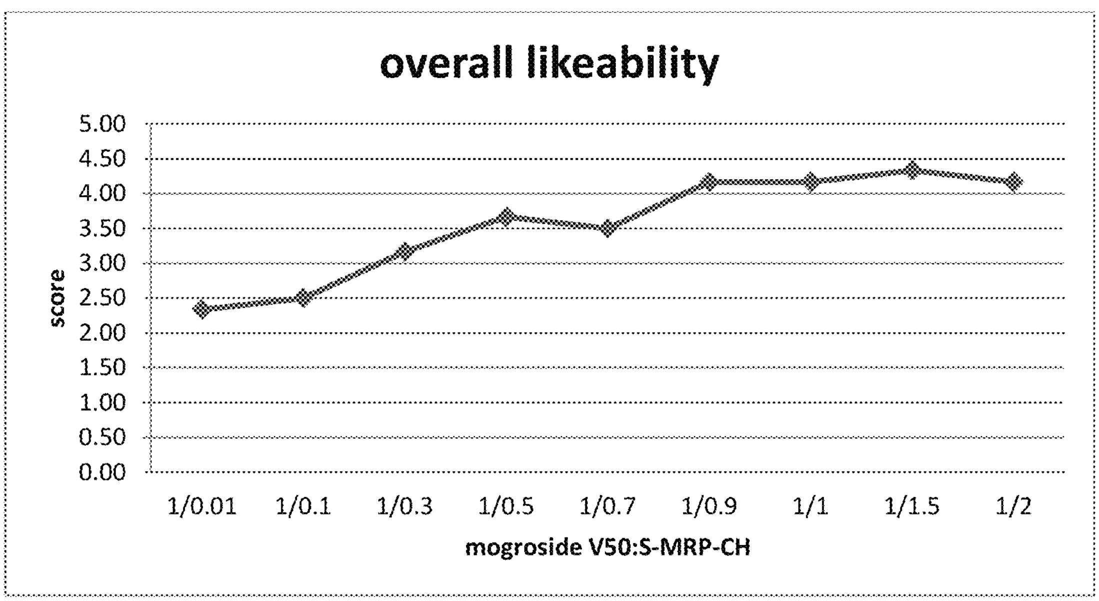

FIG. 164 demonstrates the relationship between the sensory evaluation results to the ratio of mogroside V50 to S-MRP-CH, FIG. 165 demonstrates the relationship between the overall likeability results to the ratio of mogroside V50 to S-MRP-CH.

Figure 166:
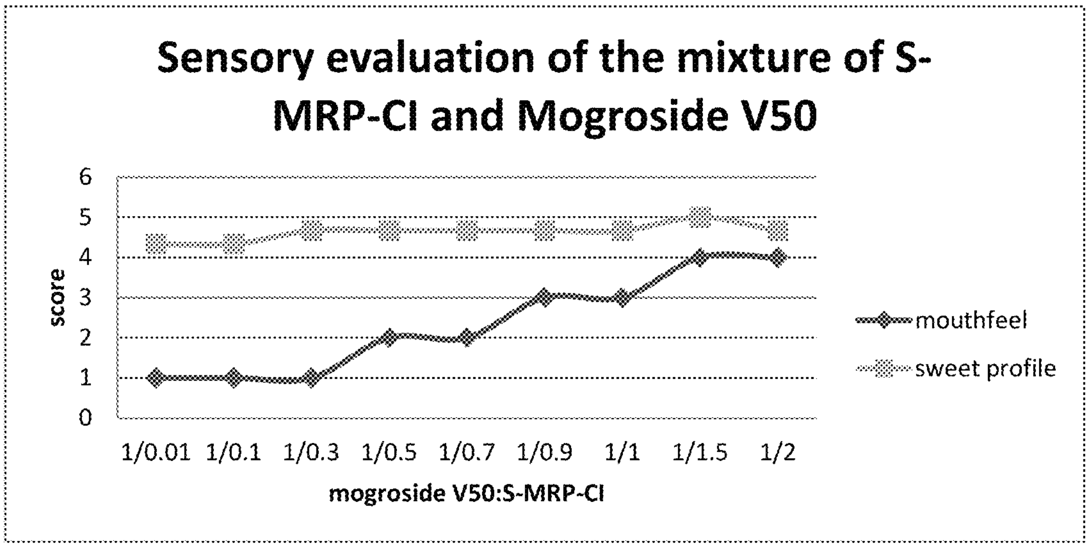

FIG. 166 demonstrates the relationship between the sensory evaluation results to the ratio of mogroside V50 to S-MRP-CI.

Figure 167:
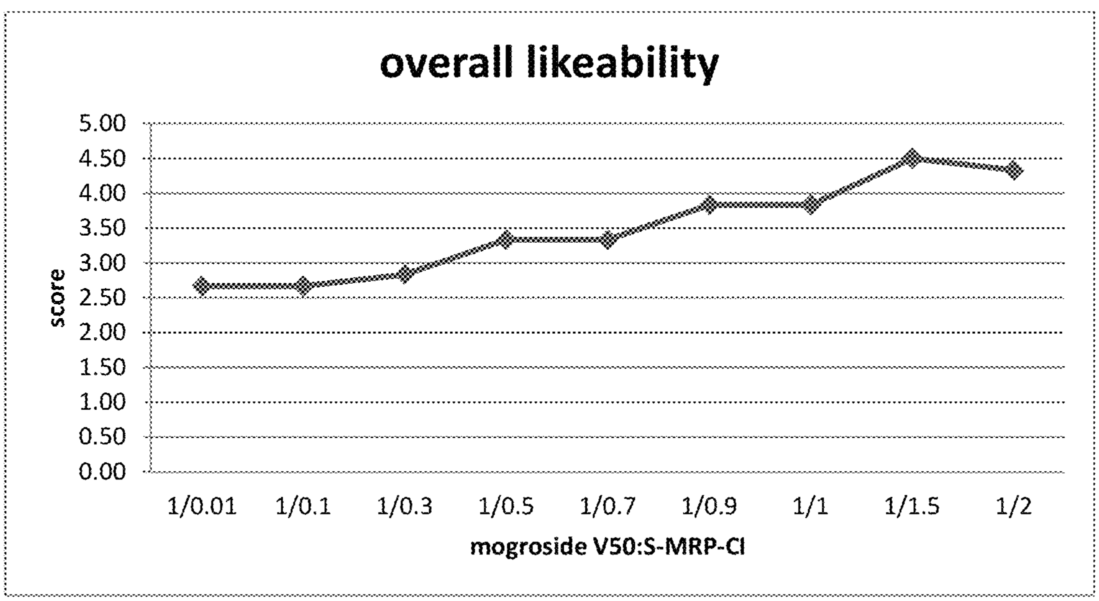

FIG. 167 demonstrates the relationship between the overall likeability results to the ratio of mogroside V50 to S-MRP-CI.

Figure 168:
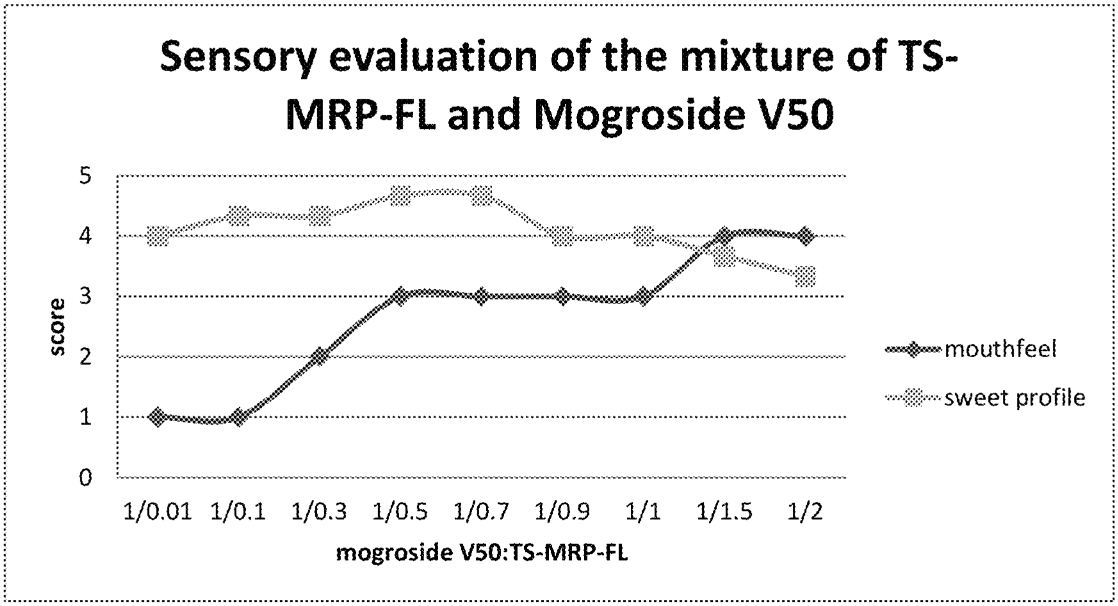

FIG. 168 demonstrates the relationship between the sensory evaluation results to the ratio of mogroside V50 to TS-MRP-FL.

Figure 169:
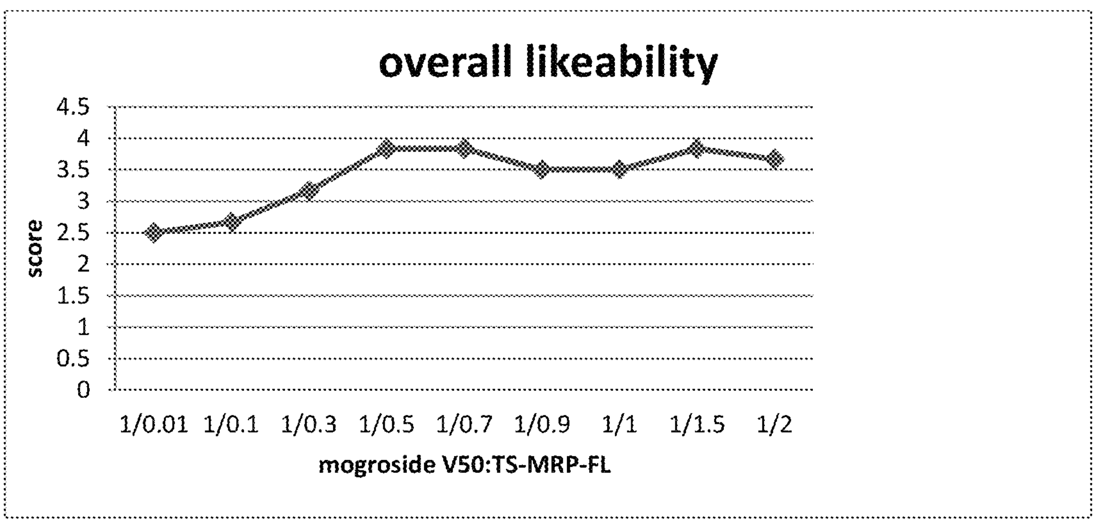

FIG. 169 demonstrates the relationship between the overall likeability results to the ratio of mogroside V50 to TS-MRP-FL.

Figure 170:
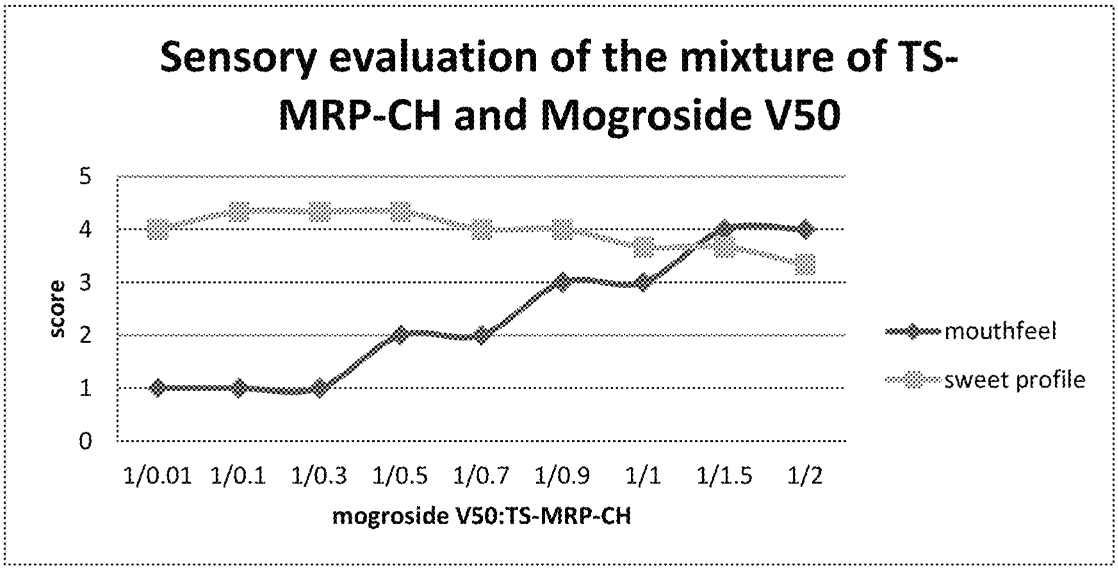

FIG. 170 demonstrates the relationship between the sensory evaluation results to the ratio of mogroside V50 to TS-MRP-CH.

Figure 171:
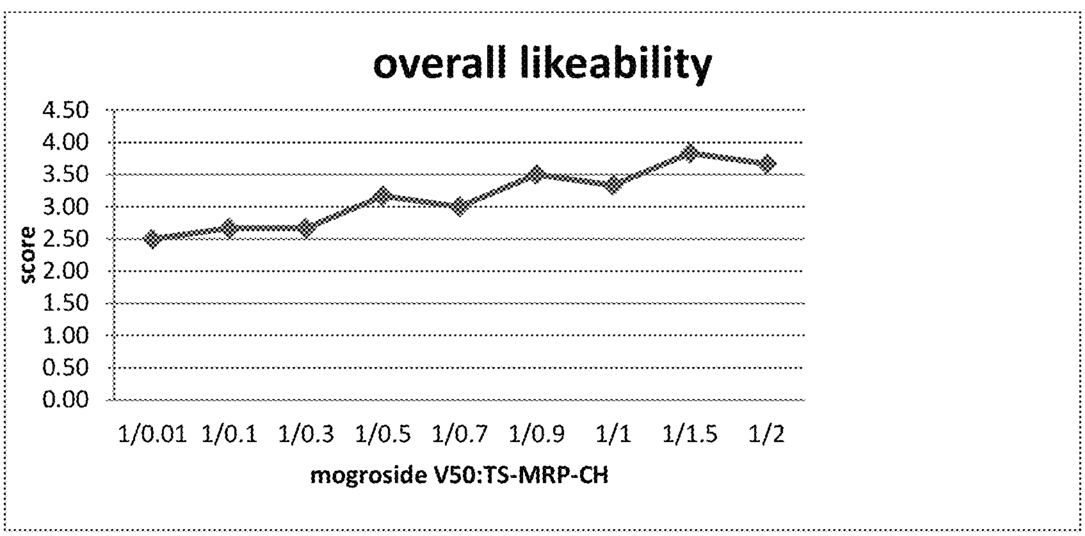

FIG. 171 demonstrates the relationship between the overall likeability results to the ratio of mogroside V50 to TS-MRP-CH.

Figure 172:
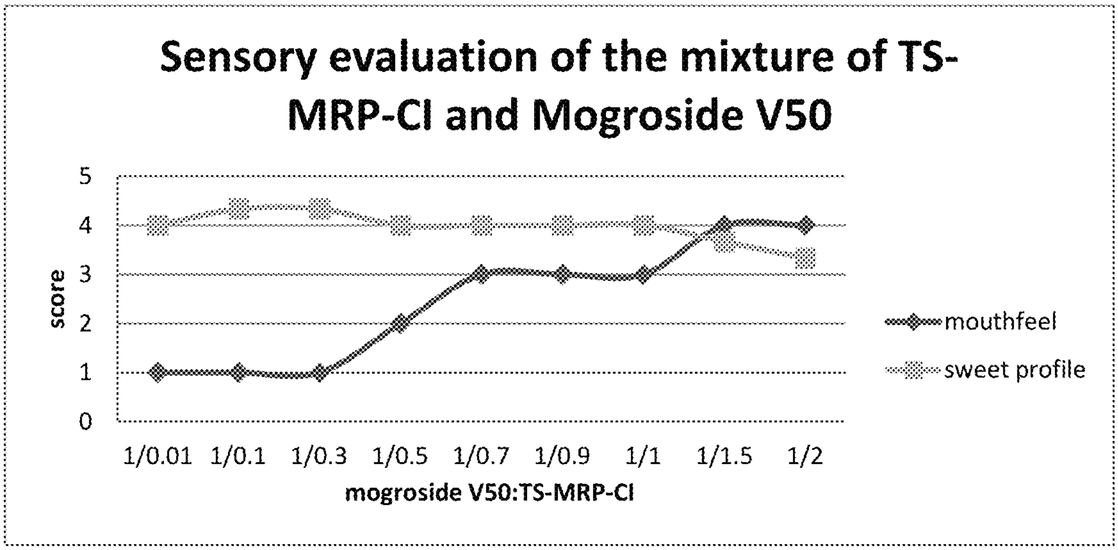

FIG. 172 demonstrates the relationship between the sensory evaluation results to the ratio of mogroside V50 to TS-MRP-CI.

Figure 173:
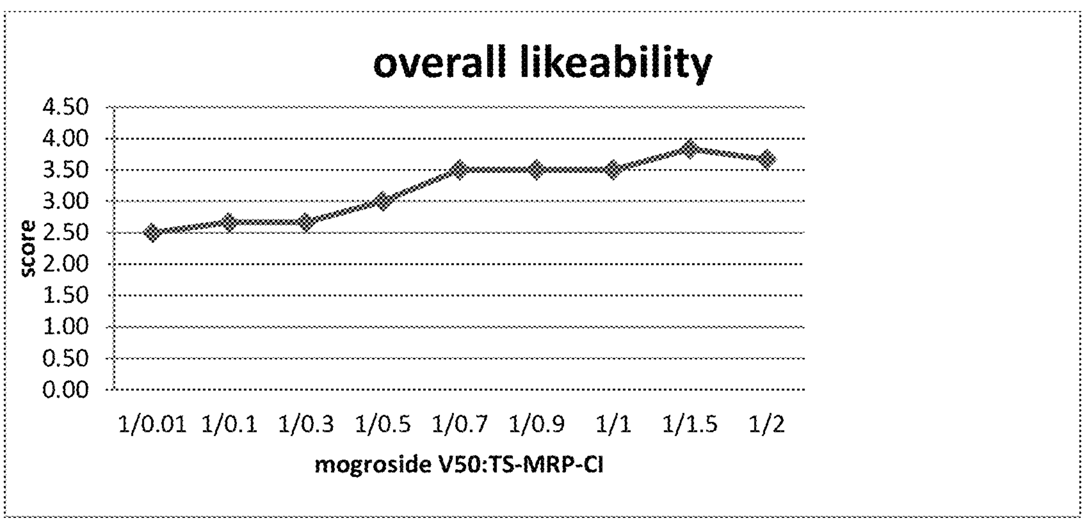

FIG. 173 demonstrates the relationship between the overall likeability results to the ratio of mogroside V50 to TS-MRP-CI.

Figure 174:
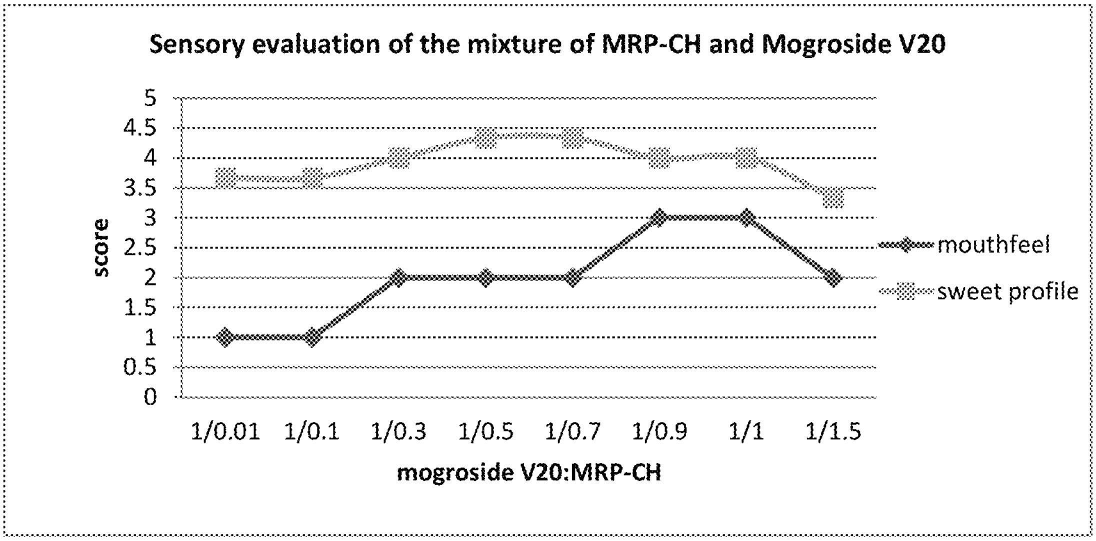

FIG. 174 demonstrates the relationship between the sensory evaluation results to the ratio of mogroside V20 to MRP-CH.

Figure 175:
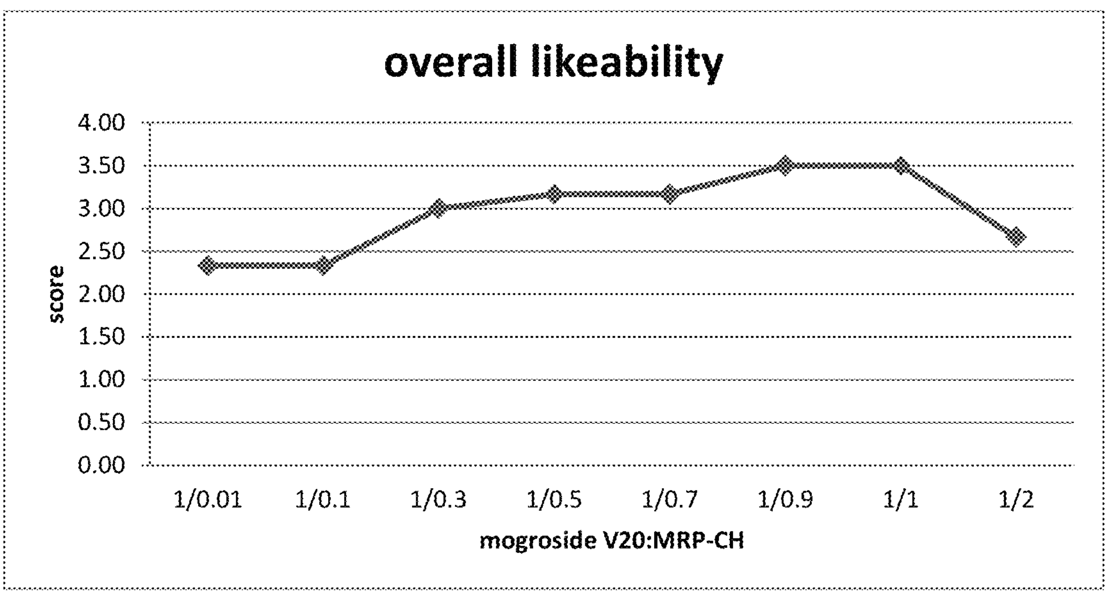

FIG. 175 demonstrates the relationship between the overall likeability results to the ratio of mogroside V20 to MRP-CH.

Figure 176:
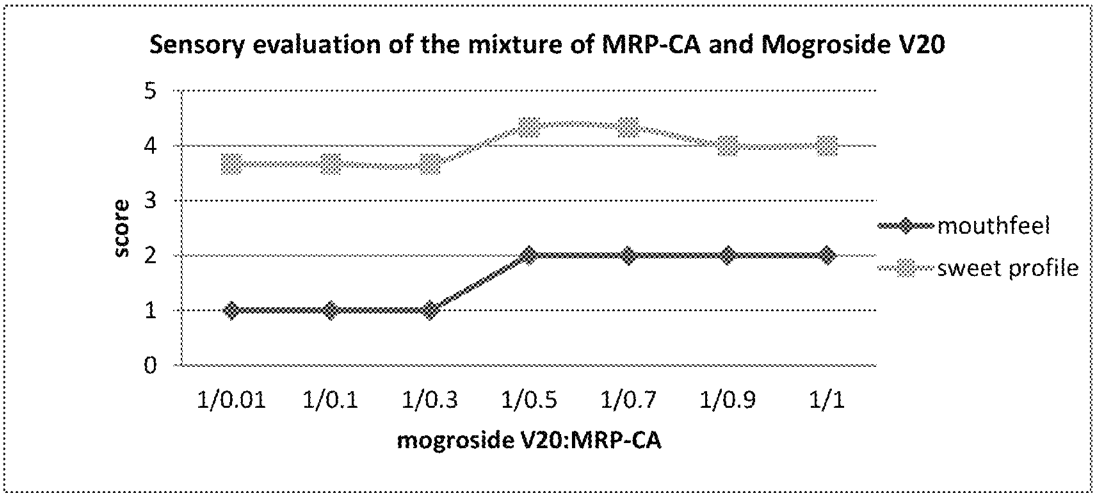

FIG. 176 demonstrates the relationship between the sensory evaluation results to the ratio of mogroside V20 to MRP-CA.

Figure 177:
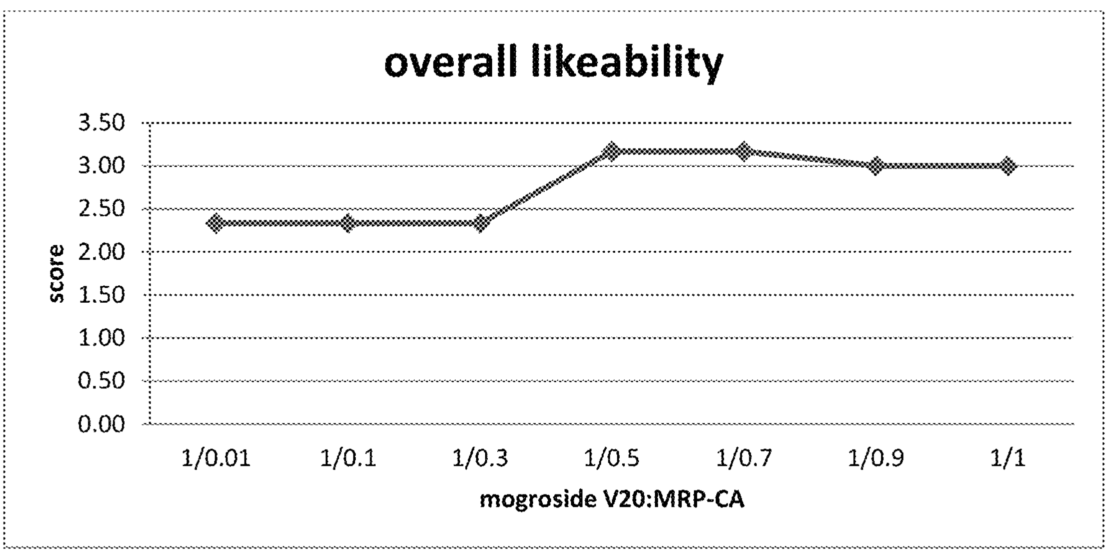
Figure 178:
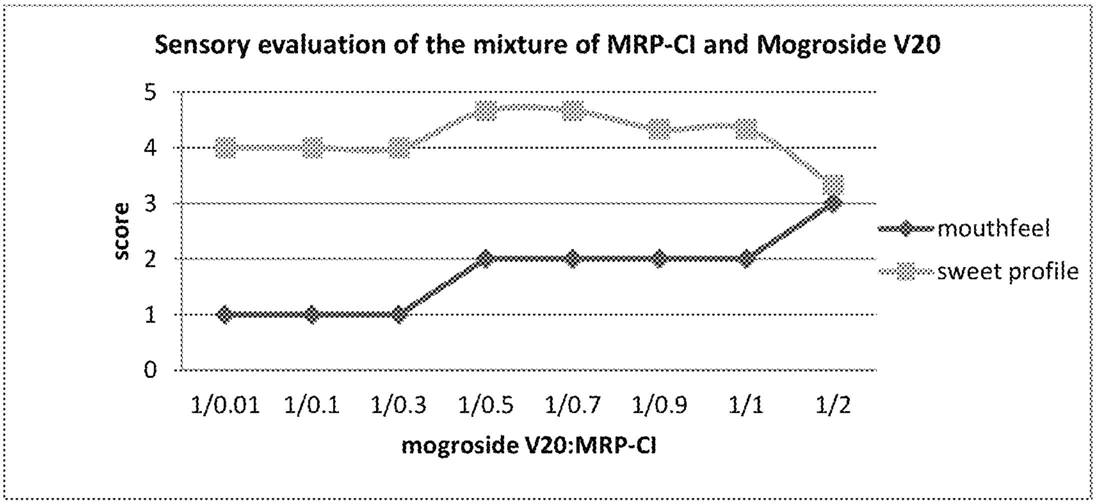

FIG. 177 demonstrates the relationship between the overall likeability results to the ratio of mogroside V20 to MRP-CA, FIG. 178 demonstrates the relationship between the sensory evaluation results to the ratio of mogroside V20 to MRP-CI.

Figure 179:
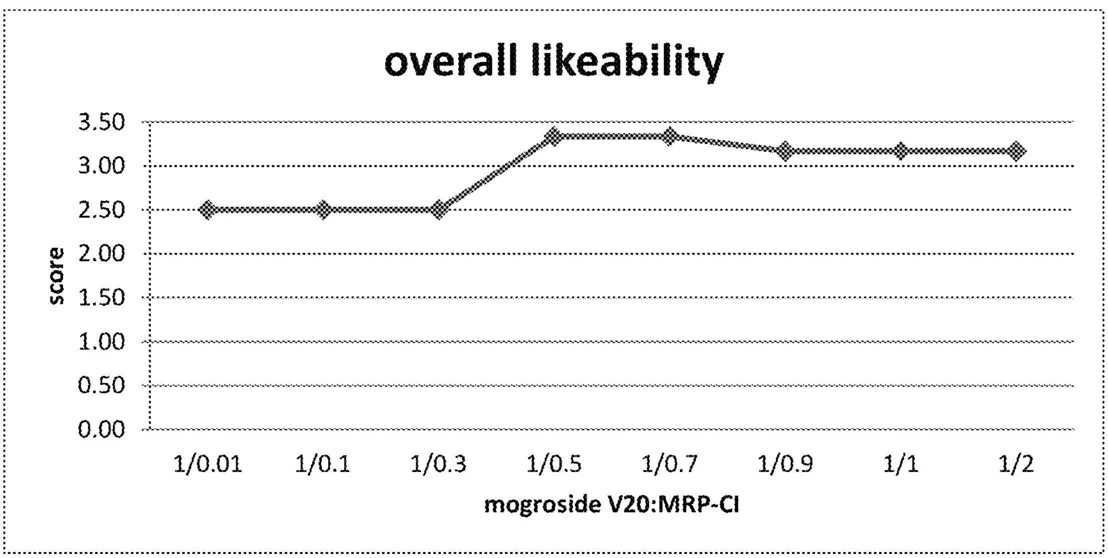

FIG. 179 demonstrates the relationship between the overall likeability results to the ratio of mogroside V20 to MRP-CI.

Figure 180:
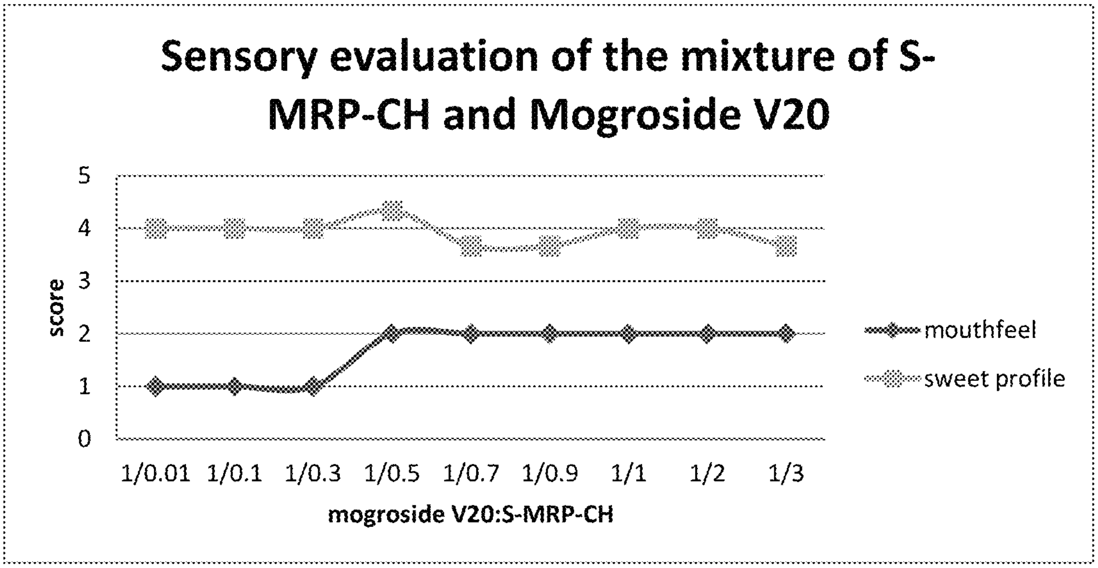

FIG. 180 demonstrates the relationship between the sensory evaluation results to the ratio of mogroside V20 to S-MRP-CH.

Figure 181:
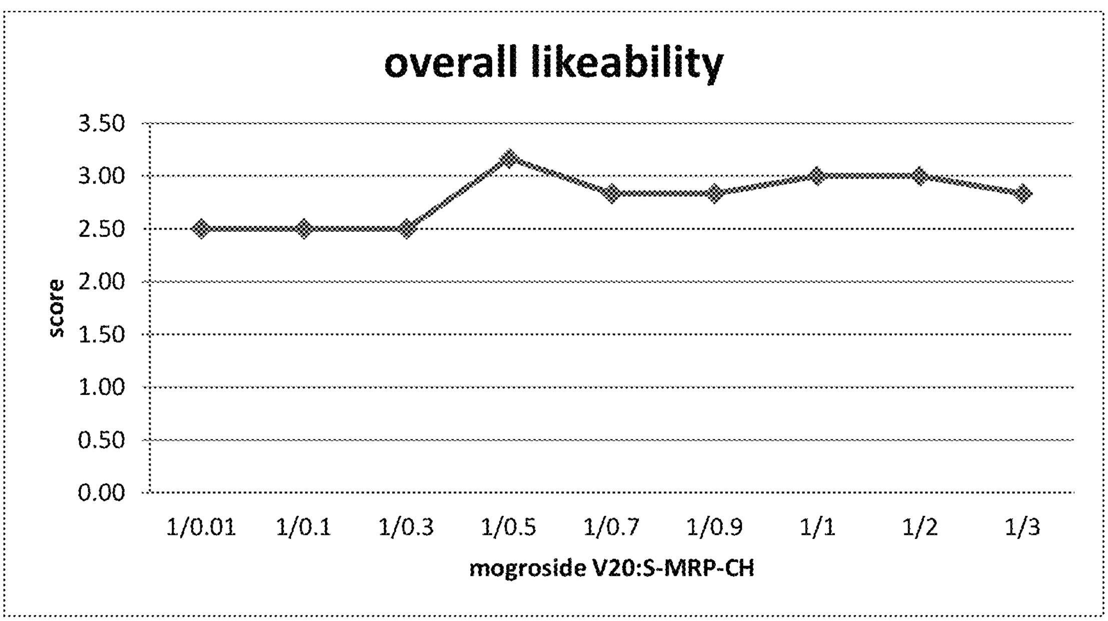

FIG. 181 demonstrates the relationship between the overall likeability results to the ratio of mogroside V20 to S-MRP-CH.

Figure 182:
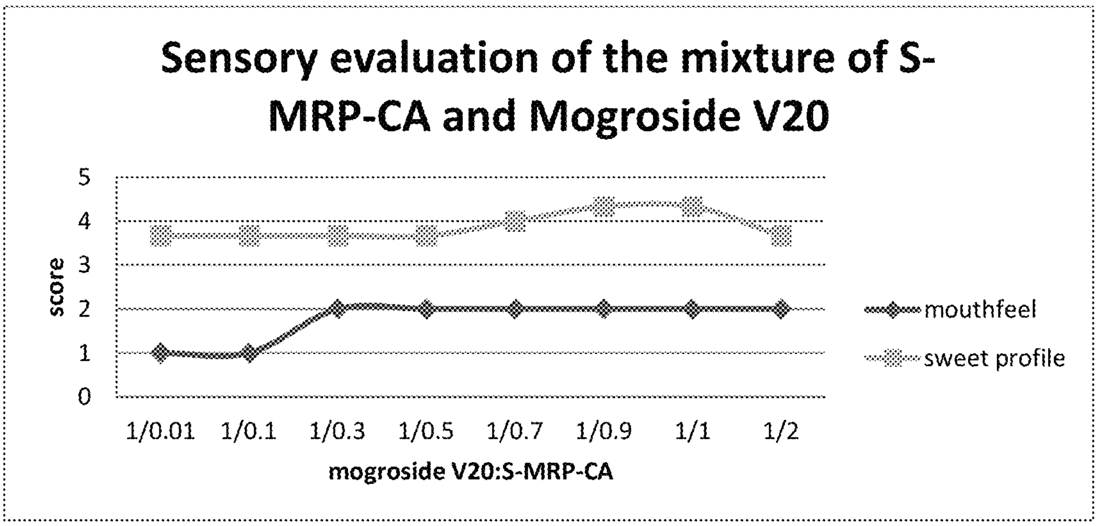

FIG. 182 demonstrates the relationship between the sensory evaluation results to the ratio of mogroside V20 to S-MRP-CA.

Figure 183:
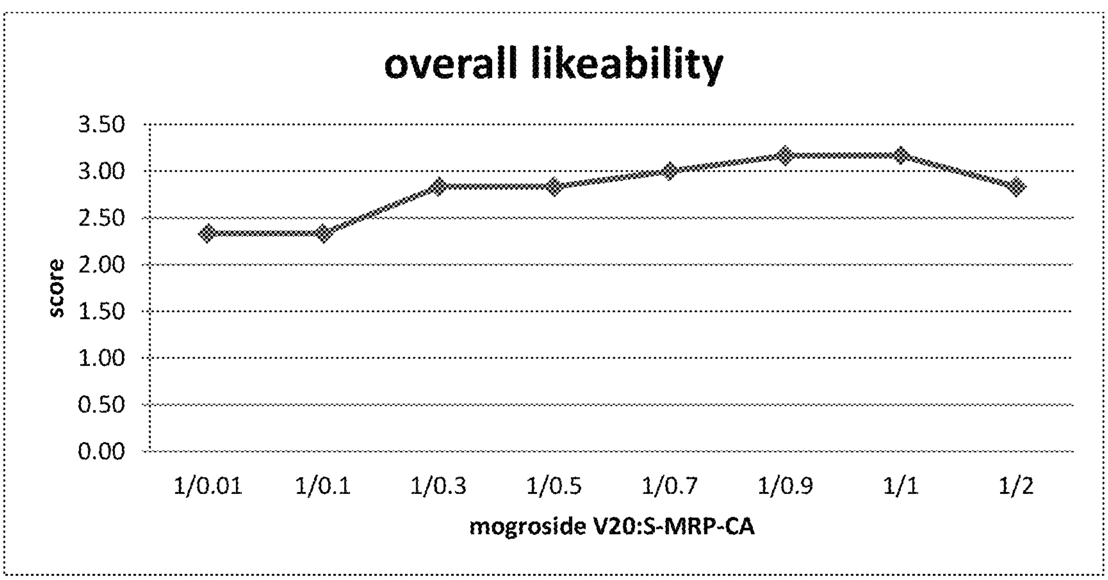

FIG. 183 demonstrates the relationship between the overall likeability results to the ratio of mogroside V20 to S-MRP-CA.

Figure 184:
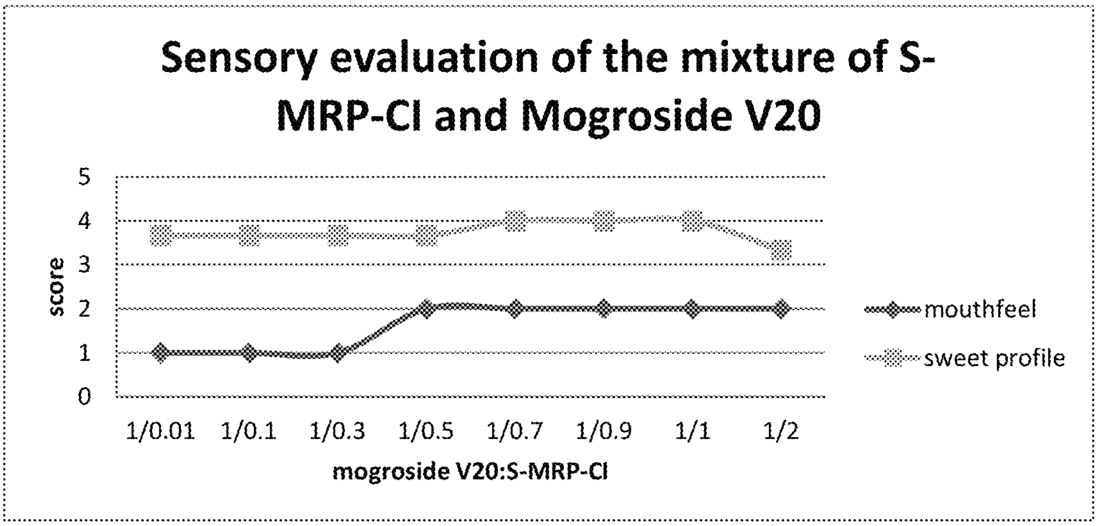

FIG. 184 demonstrates the relationship between the sensory evaluation results to the ratio of mogroside V20 to S-MRP-CI.

Figure 185:
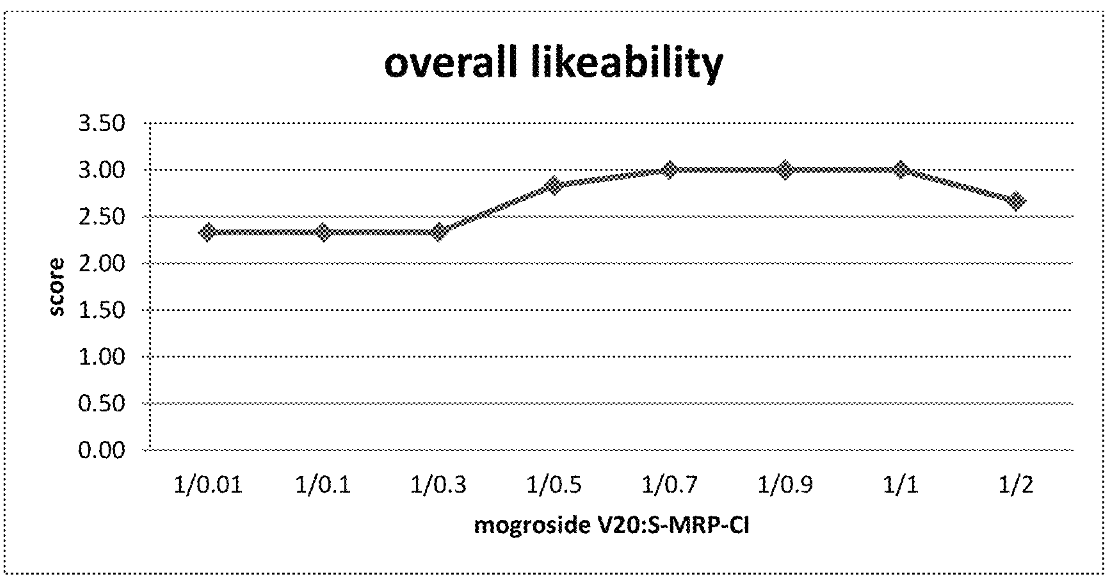

FIG. 185 demonstrates the relationship between the overall likeability results to the ratio of mogroside V20 to S-MRP-CI.

Figure 186:
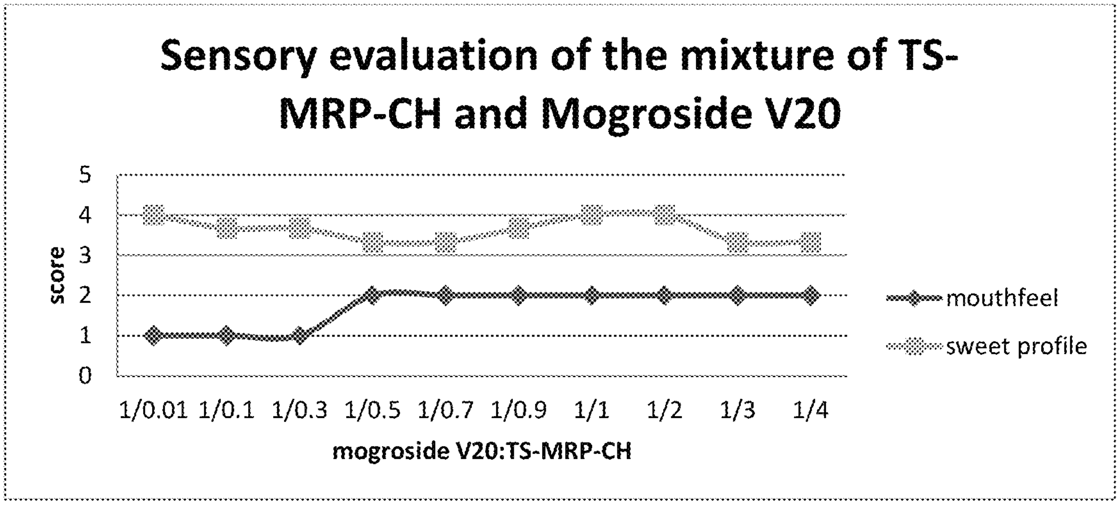

FIG. 186 demonstrates the relationship between the sensory evaluation results to the ratio of mogroside V20 to TS-MRP-CH.

Figure 187:
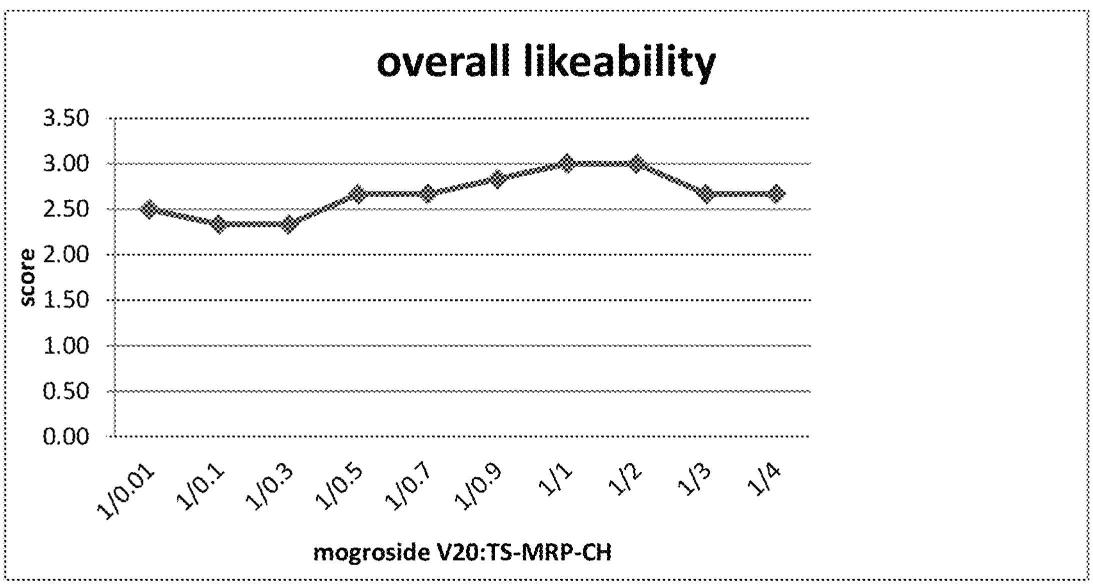

FIG. 187 demonstrates the relationship between the overall likeability results to the ratio of mogroside V20 to TS-MRP-CH.

Figure 188:
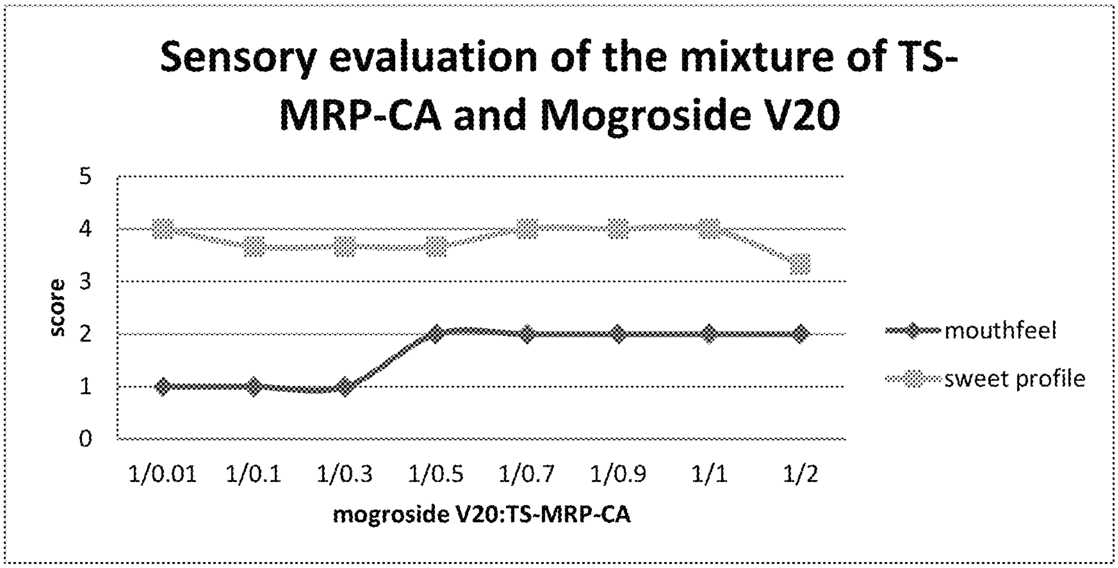

FIG. 188 demonstrates the relationship between the sensory evaluation results to the ratio of mogroside V20 to TS-MRP-CA.

Figure 189:
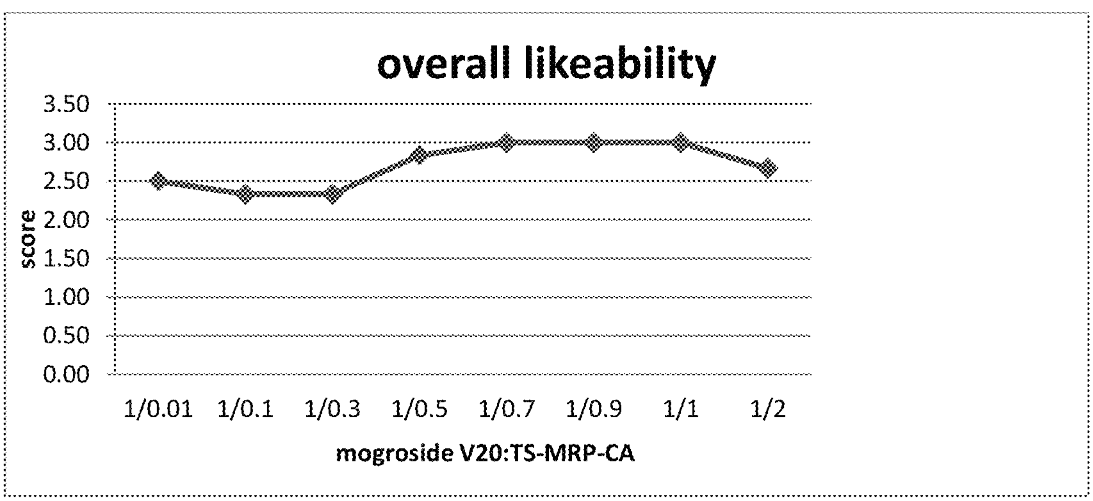

FIG. 189 demonstrates the relationship between the overall likeability results to the ratio of mogroside V20 to TS-MRP-CA.

Figure 190:
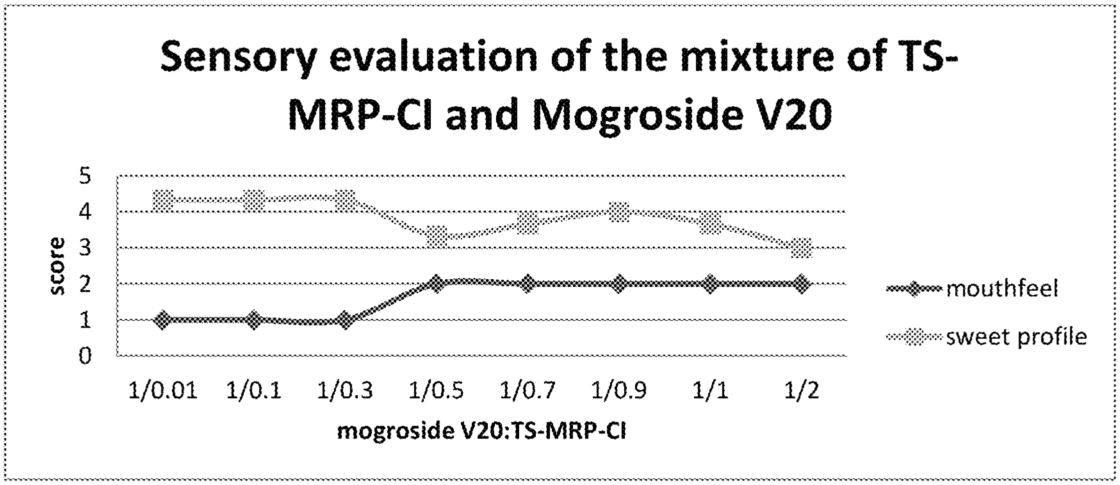

FIG. 190 demonstrates the relationship between the sensory evaluation results to the ratio of mogroside V20 to TS-MRP-CI.

Figure 191:
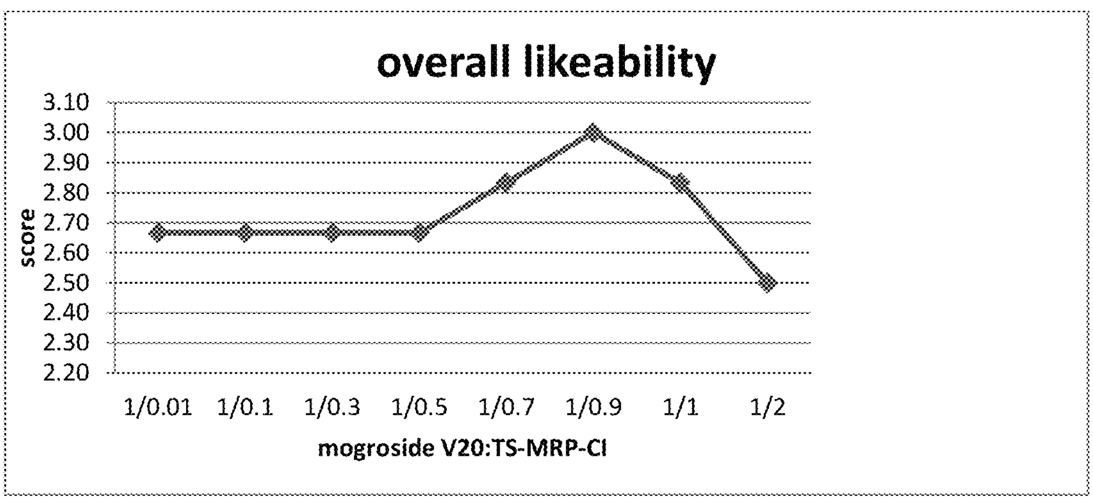

FIG. 191 demonstrates the relationship between the overall likeability results to the ratio of mogroside V20 to TS-MRP-CI.

Figure 192:
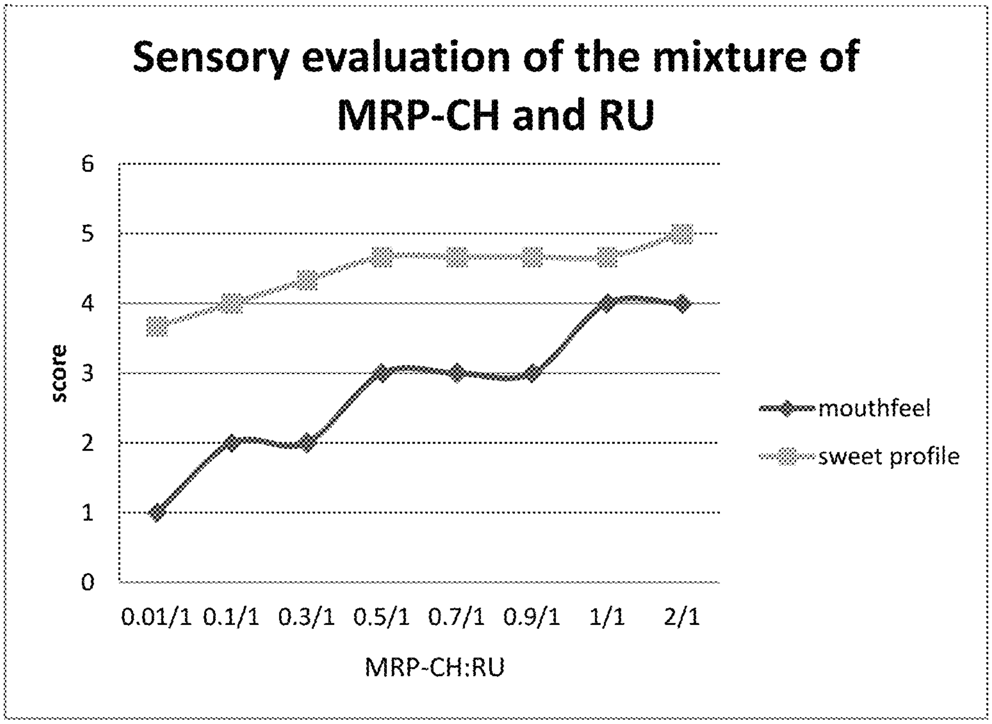

FIG. 192 demonstrates the relationship between the sensory evaluation results to the ratio of MRP-CH to RU.

Figure 193:
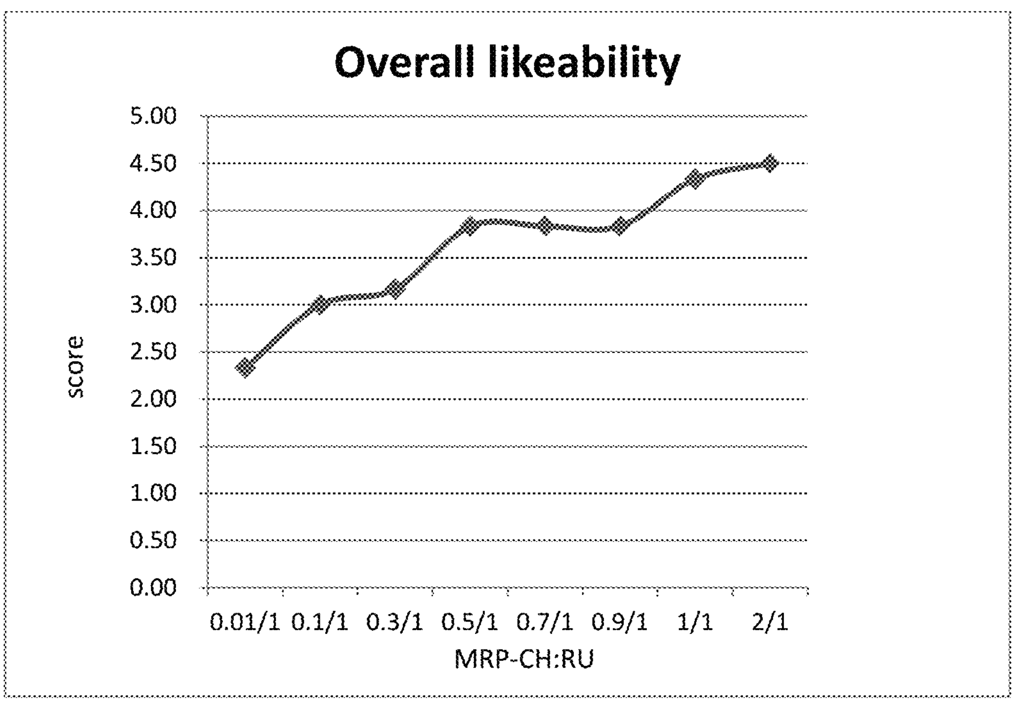

FIG. 193 demonstrates the relationship between the overall likeability results to the ratio of MRP-CH to RU.

Figure 194:
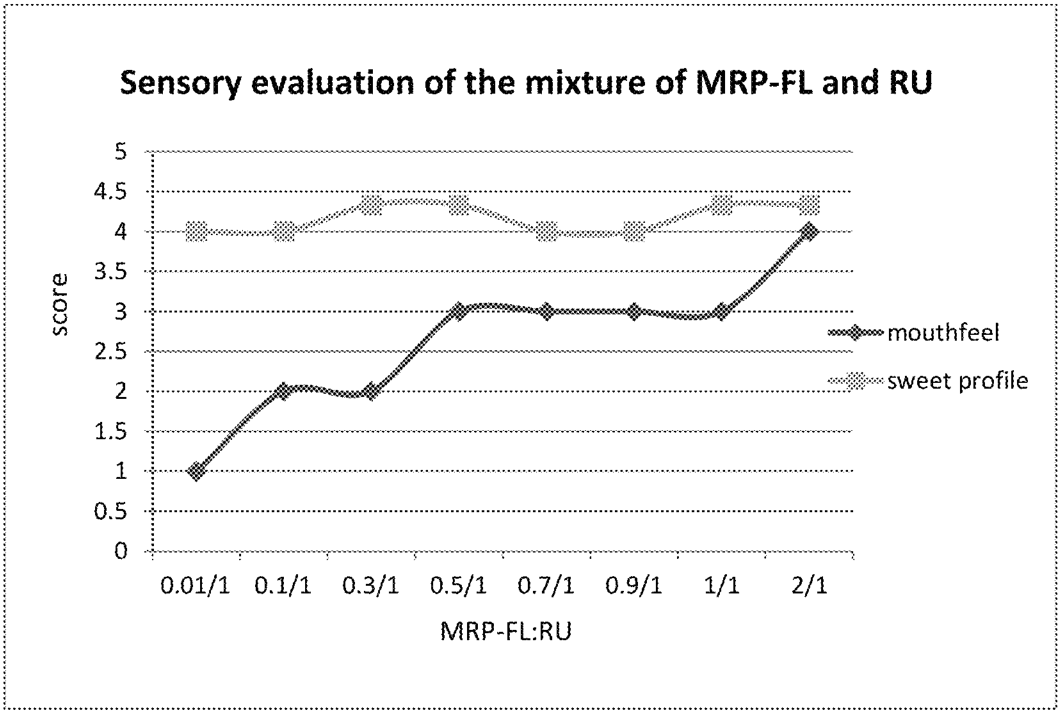

FIG. 194 demonstrates the relationship between the sensory evaluation results to the ratio of MRP-FL to RU.

Figure 195:
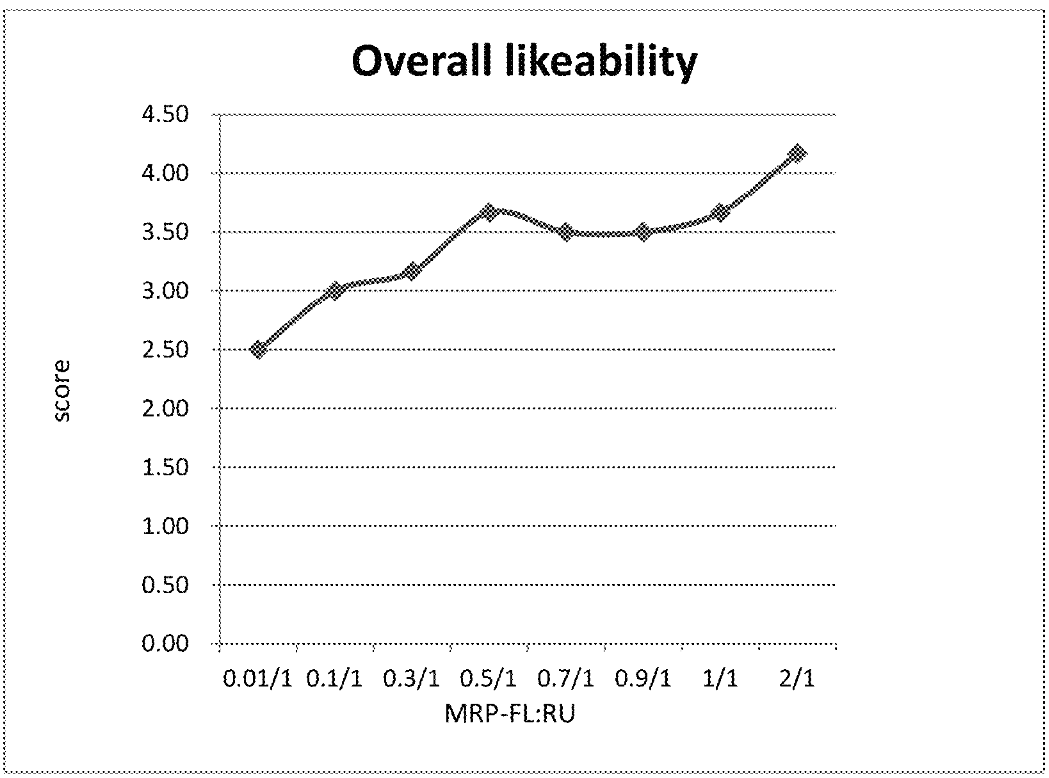

FIG. 195 demonstrates the relationship between the overall likeability results to the ratio of MRP-FL to RU.

Figure 196:
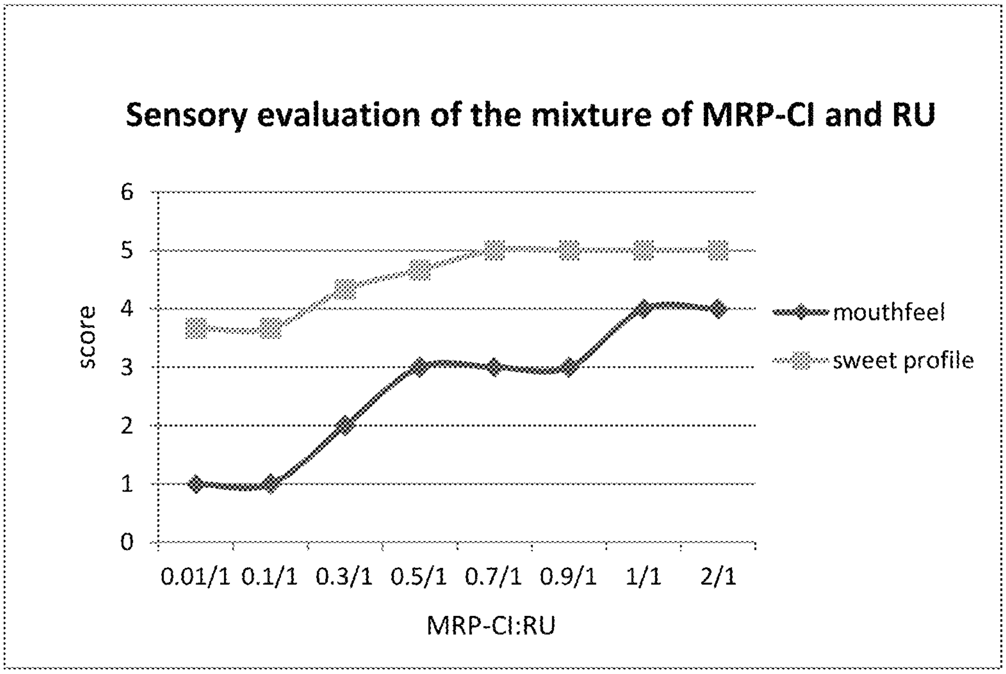

FIG. 196 demonstrates the relationship between the sensory evaluation results to the ratio of MRP-CI to RU.

Figure 197:
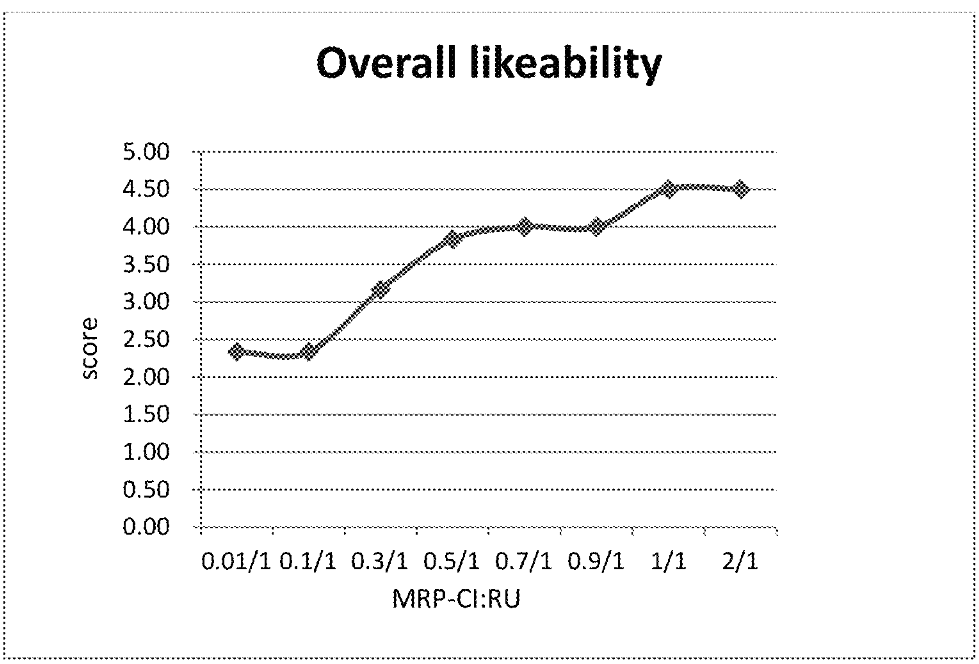

FIG. 197 demonstrates the relationship between the overall likeability results to the ratio of MRP-CI to RU.

Figure 198:
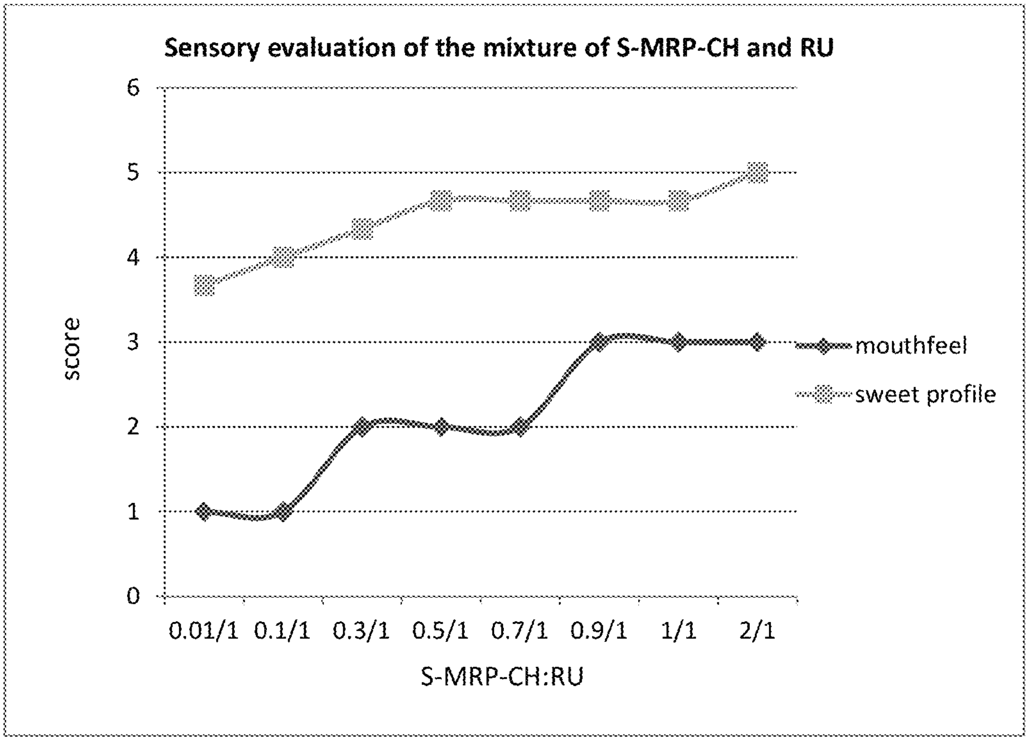

FIG. 198 demonstrates the relationship between the sensory evaluation results to the ratio of S-MRP-CH to RU.

Figure 199:
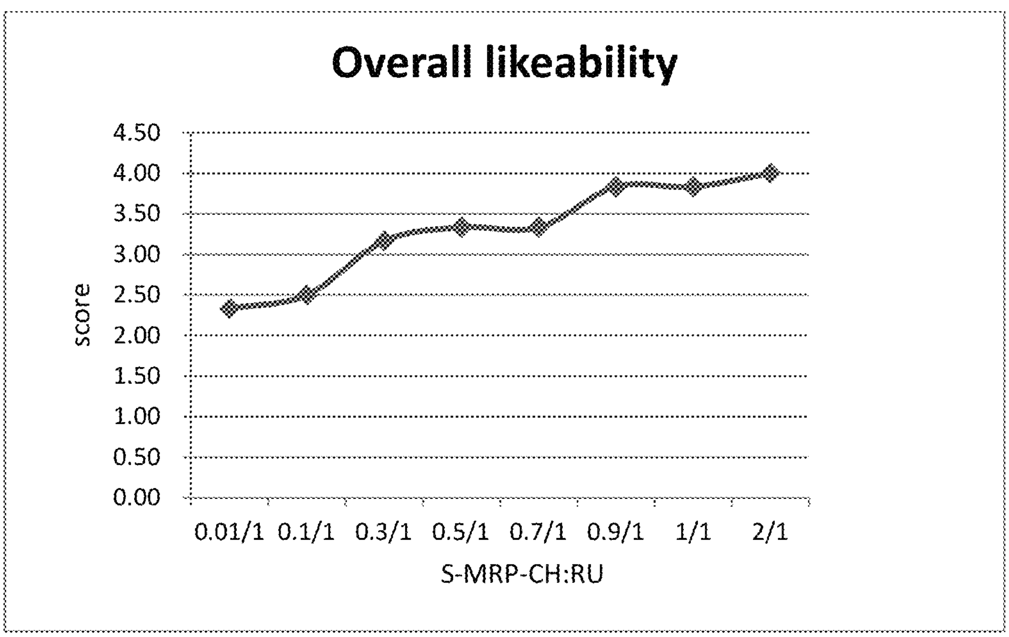

FIG. 199 demonstrates the relationship between the overall likeability results to the ratio of S-MRP-CH to RU.

Figure 200:
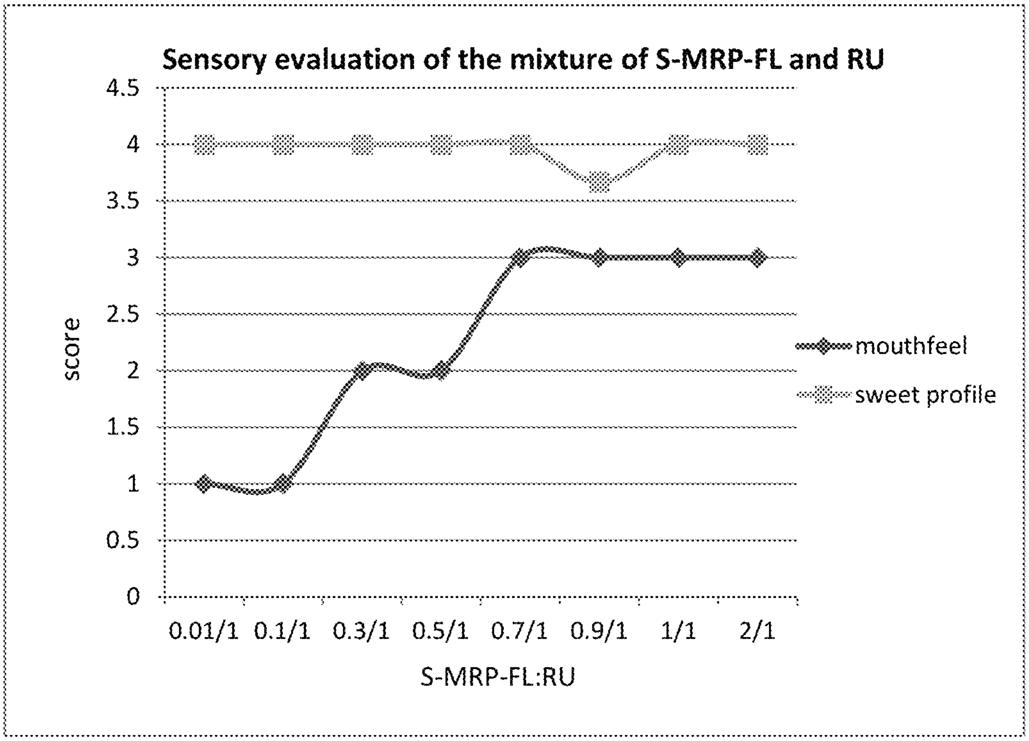

FIG. 200 demonstrates the relationship between the sensory evaluation results to the ratio of S-MRP-FL to RU.

Figure 201:
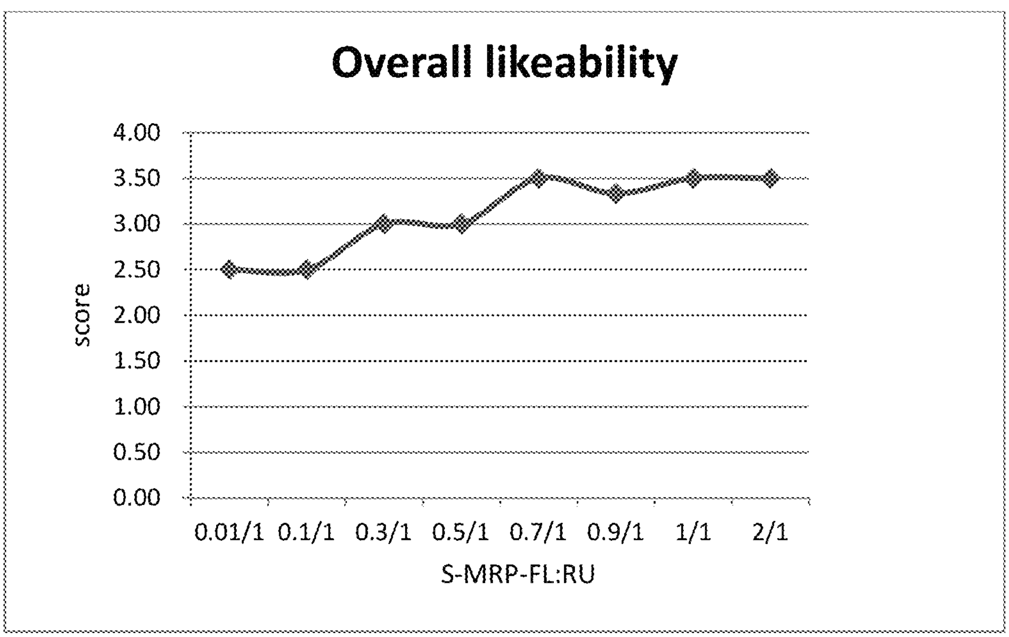

FIG. 201 demonstrates the relationship between the overall likeability results to the ratio of S-MRP-FL to RU.

Figure 202:
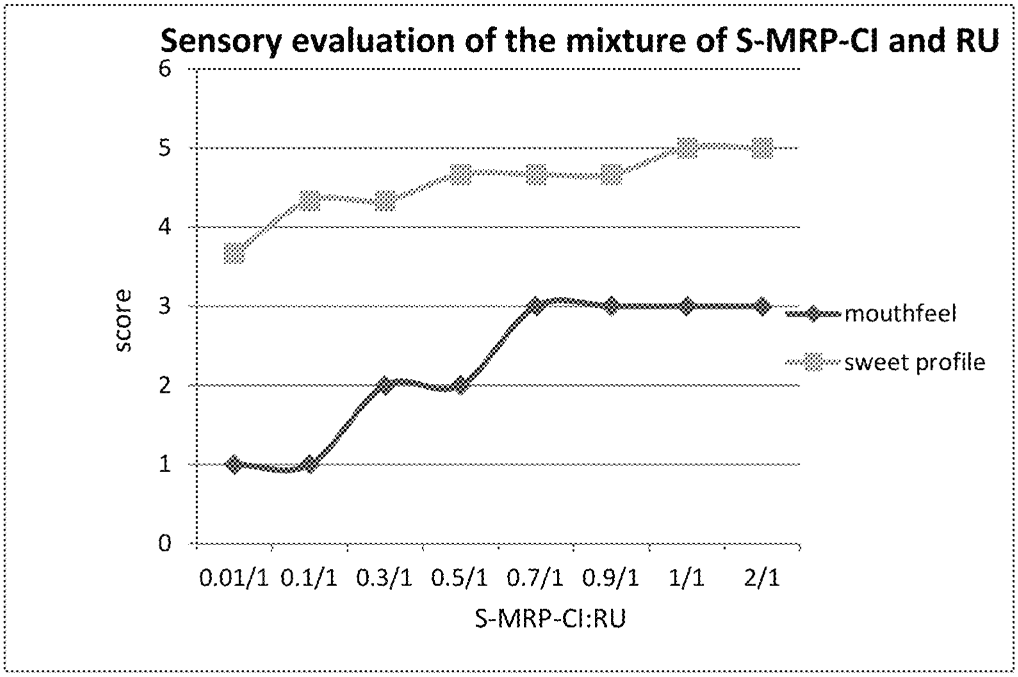

FIG. 202 demonstrates the relationship between the sensory evaluation results to the ratio of S-MRP-CI to RU.

Figure 203:
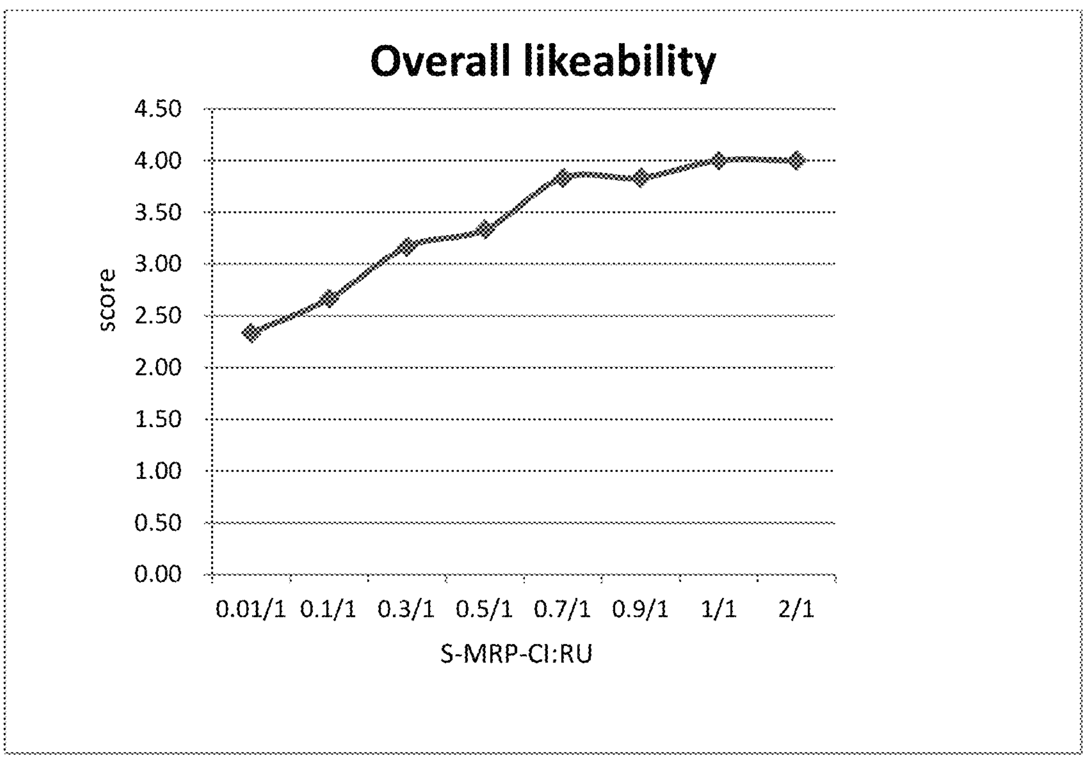

FIG. 203 demonstrates the relationship between the overall likeability results to the ratio of S-MRP-CI to RU.

Figure 204:
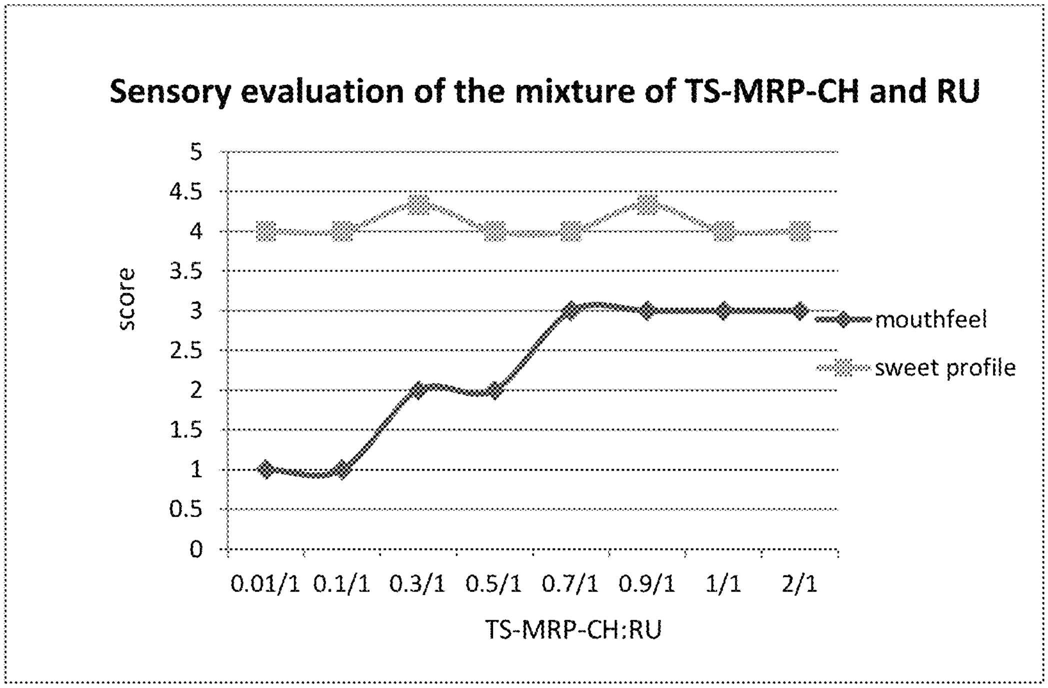
Figure 205:
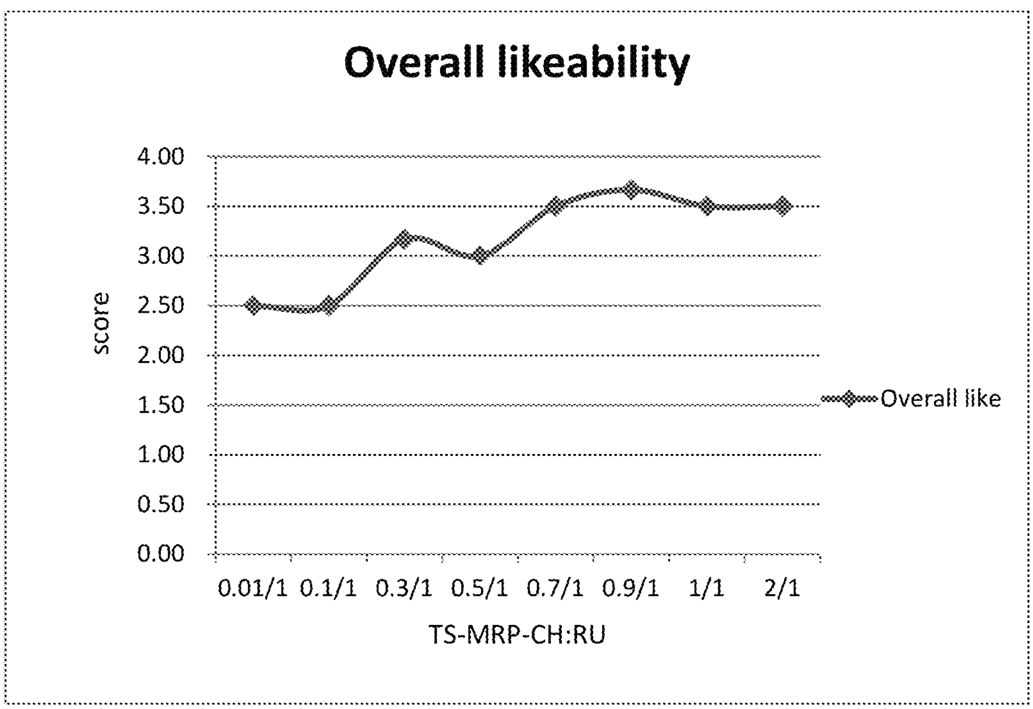

FIG. 204 demonstrates the relationship between the sensory evaluation results to the ratio of TS-MRP-CH to RU FIG. 205 demonstrates the relationship between the overall likeability results to the ratio of TS-MRP-CH to RU.

Figure 206:
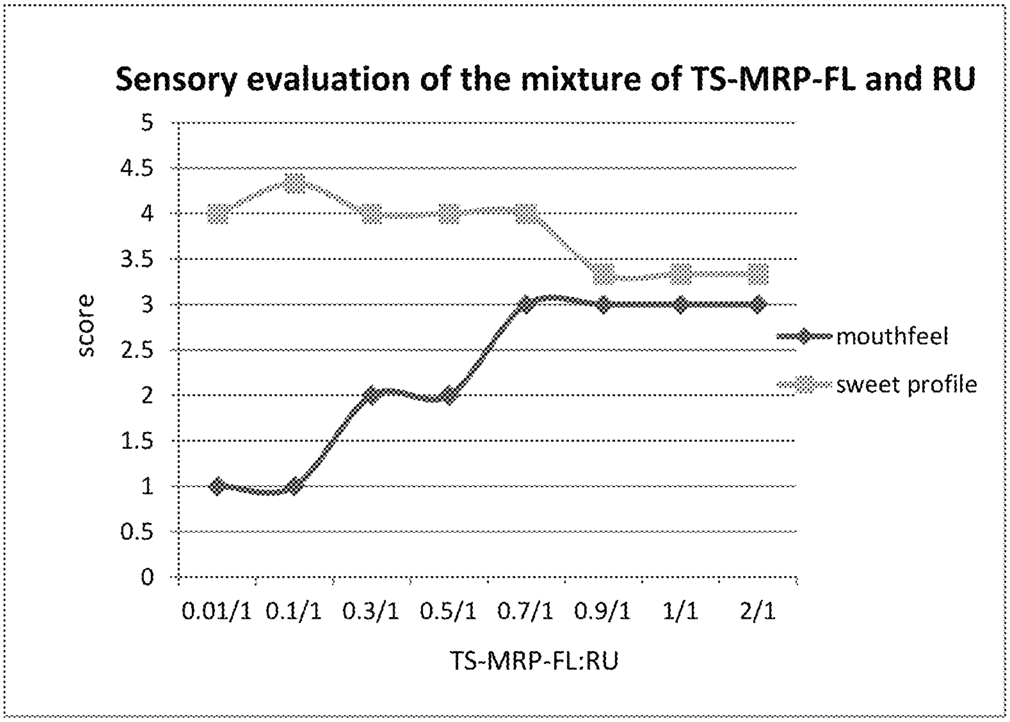

FIG. 206 demonstrates the relationship between the sensory evaluation results to the ratio of TS-MRP-FL to RU.

Figure 207:
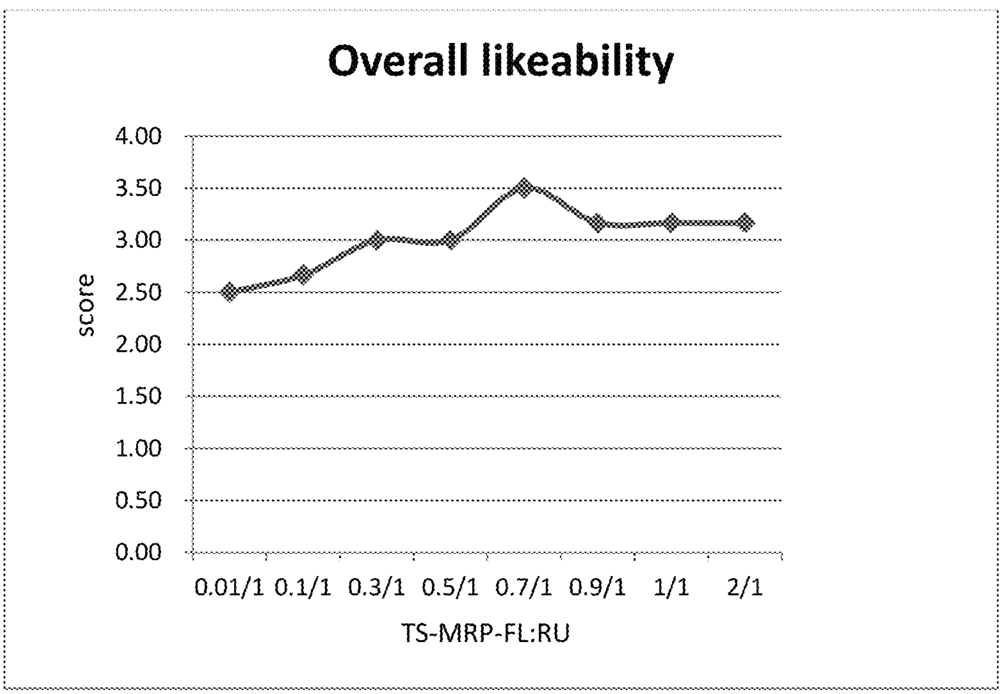

FIG. 207 demonstrates the relationship between the overall likeability results to the ratio of TS-MRP-FL to RU.

Figure 208:
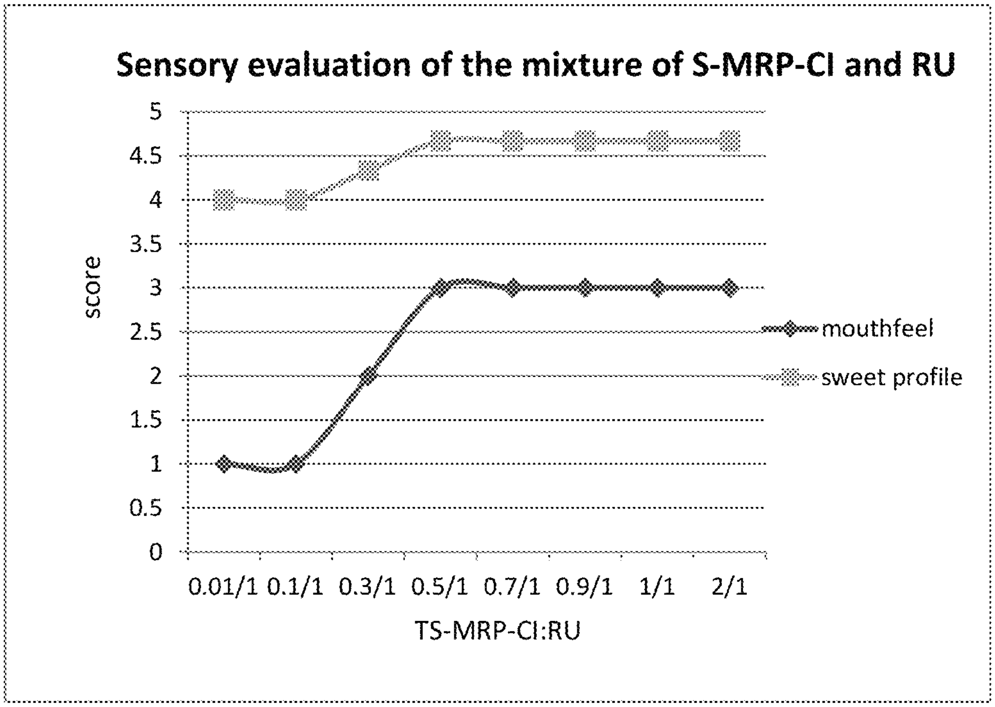

FIG. 208 demonstrates the relationship between the sensory evaluation results to the ratio of TS-MRP-CI to RU.

Figure 209:
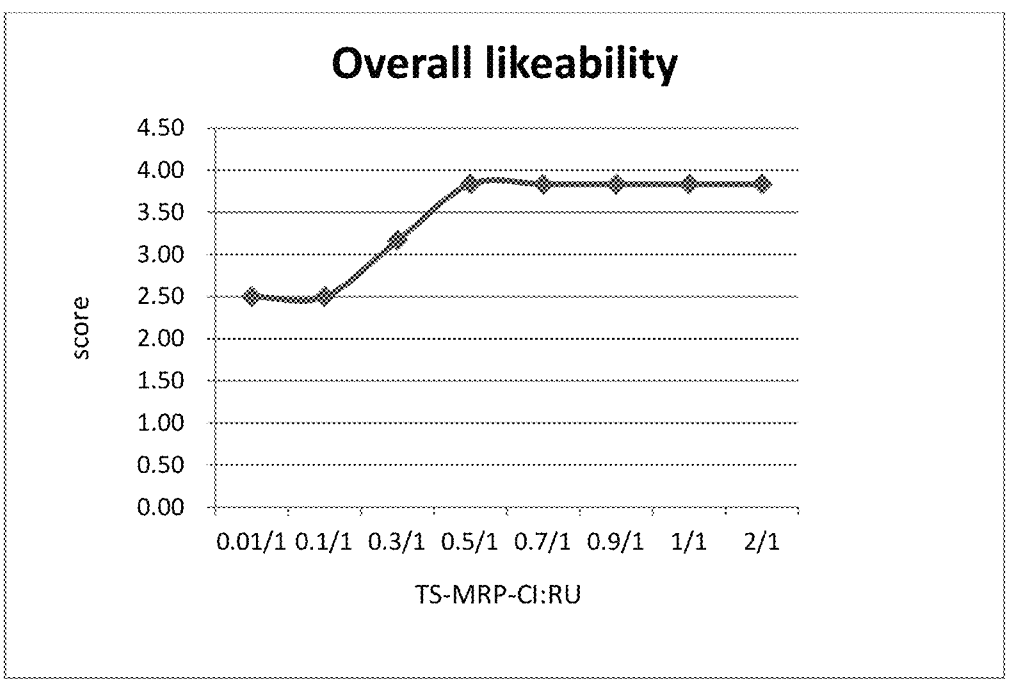

FIG. 209 demonstrates the relationship between the overall likeability results to the ratio of TS-MRP-CI to RU.

Figure 210:
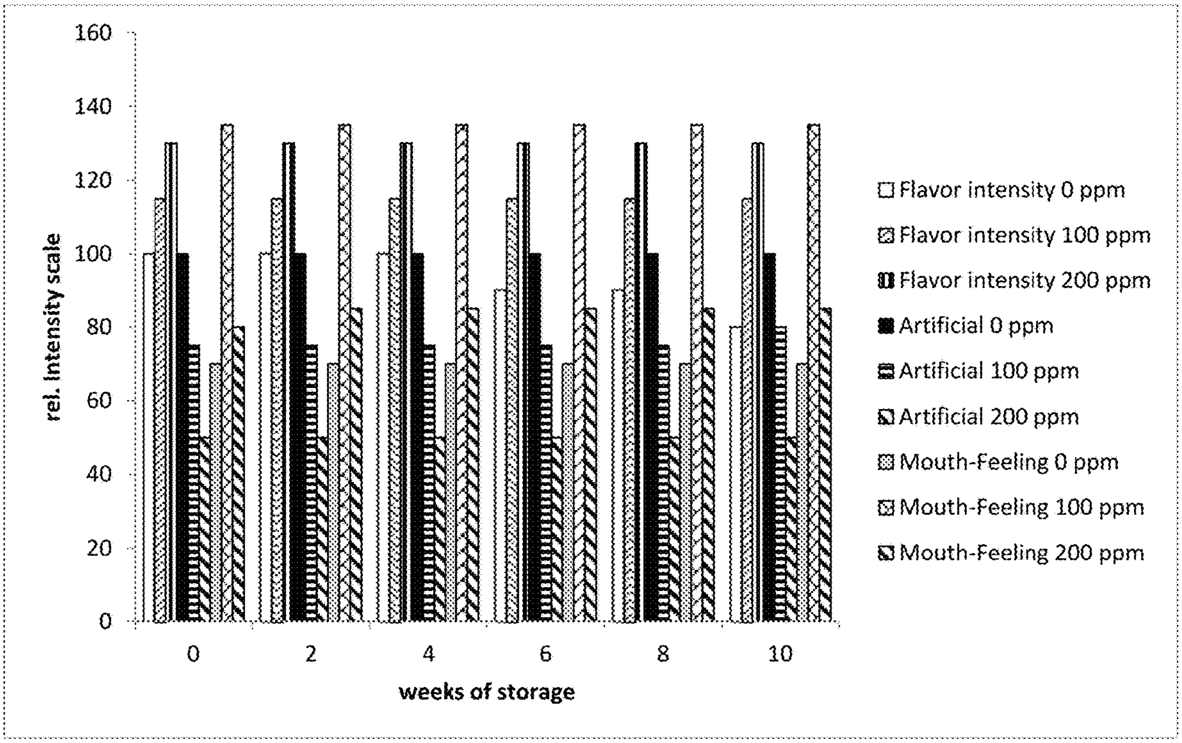

FIG. 210 represents graphically a citrus beverage with a *Stevia* derived MRP stored at 2-4° C. over a period of time (flavor intensity).

Figure 211:
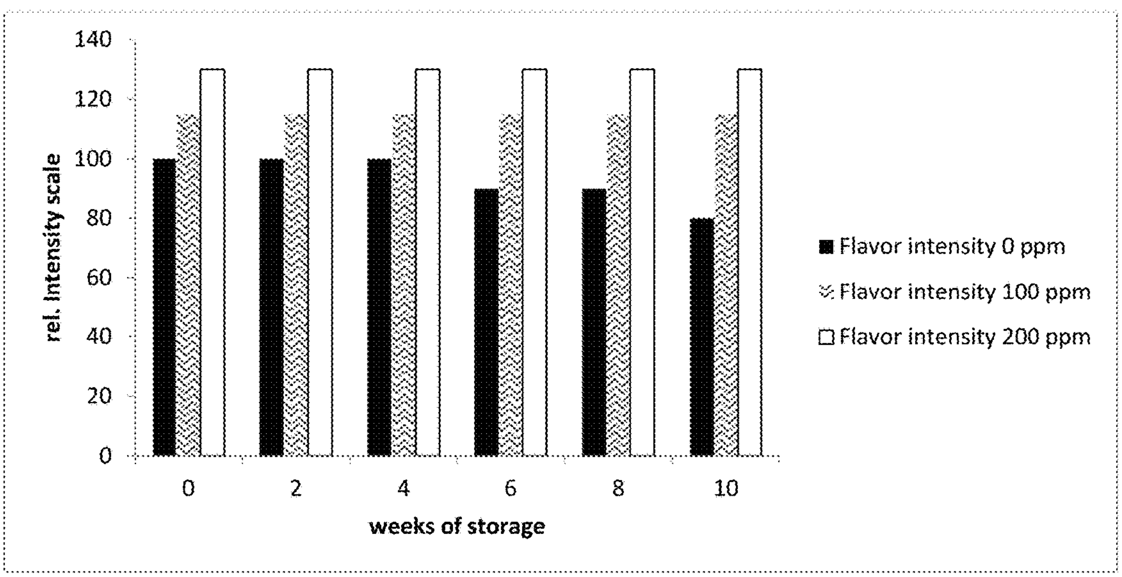

FIG. 211 represents graphically a citrus beverage with a *Stevia* derived MRP stored at 2-4° C. over a period of time (flavor intensity).

Figure 212:
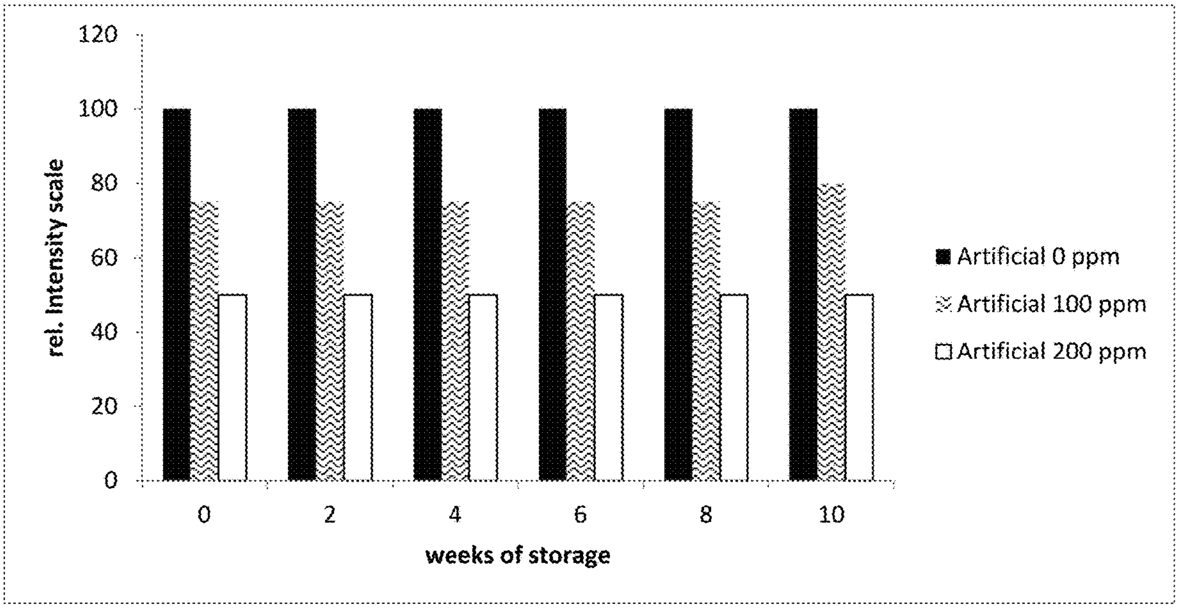

FIG. 212 represents graphically a citrus beverage with a *Stevia* derived MRP stored at 2-4° C. over a period of time.

Figure 213:
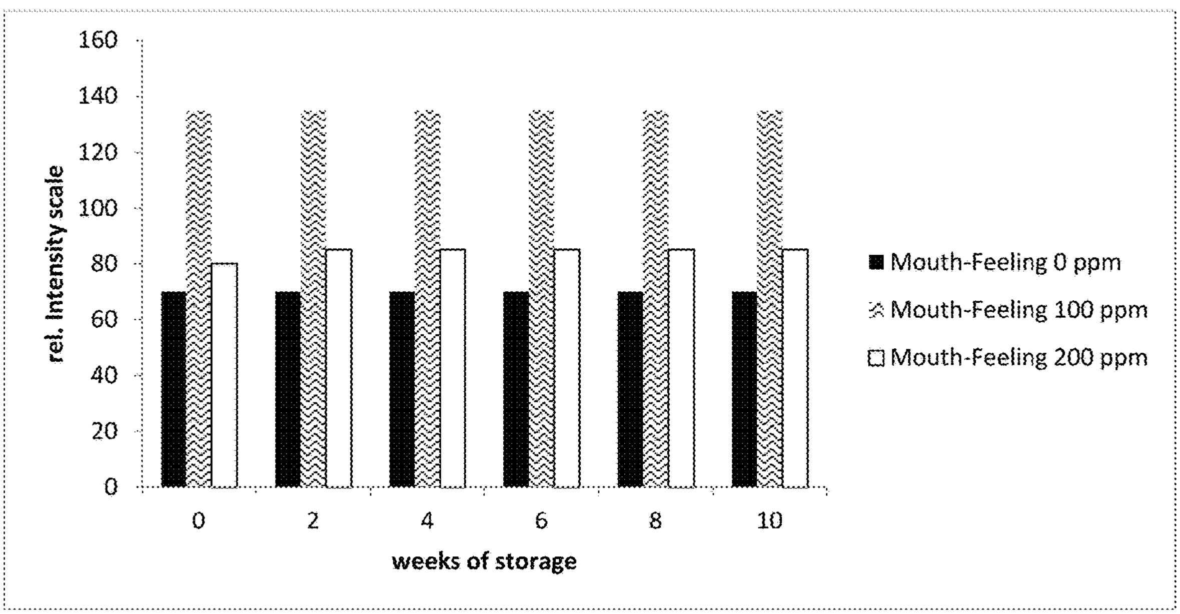

FIG. 213 represents graphically a citrus beverage with a *Stevia* derived MRP stored at 2-4° C. over a period of time (mouth feel).

Figure 214:
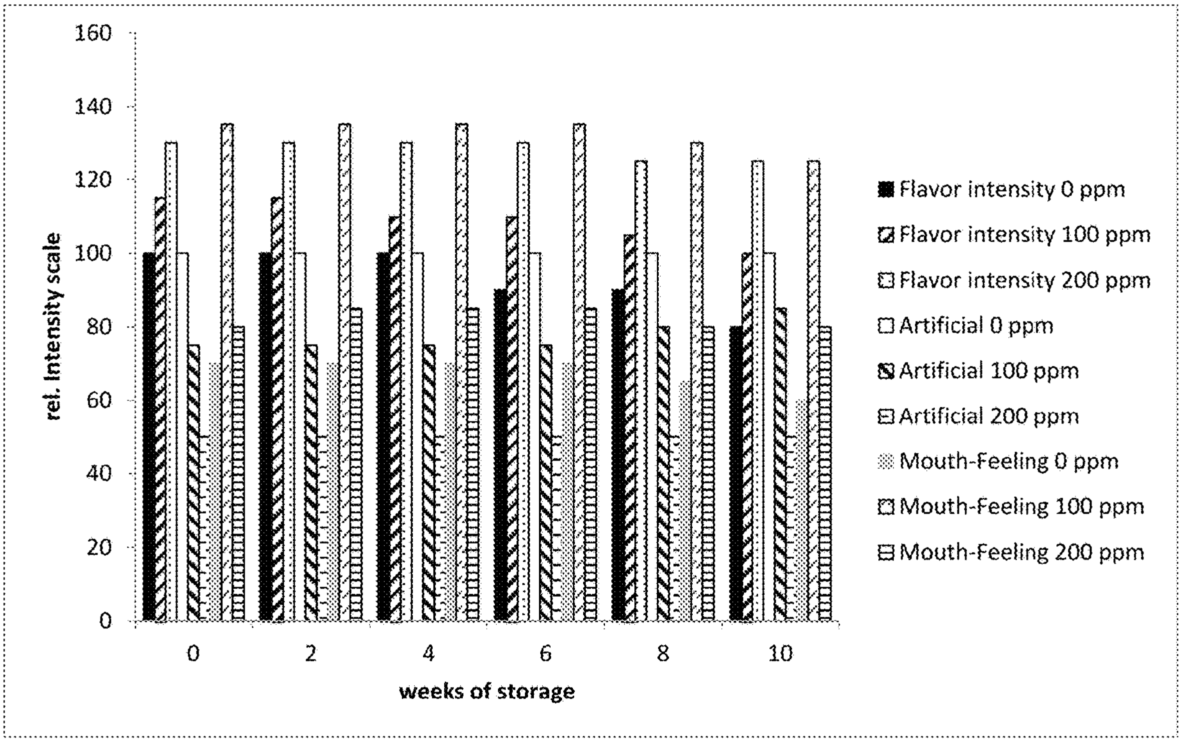

FIG. 214 represents graphically a citrus beverage with a *Stevia* derived MRP stored at 20-22° C. over a period of time (flavor intensity).

Figure 215:
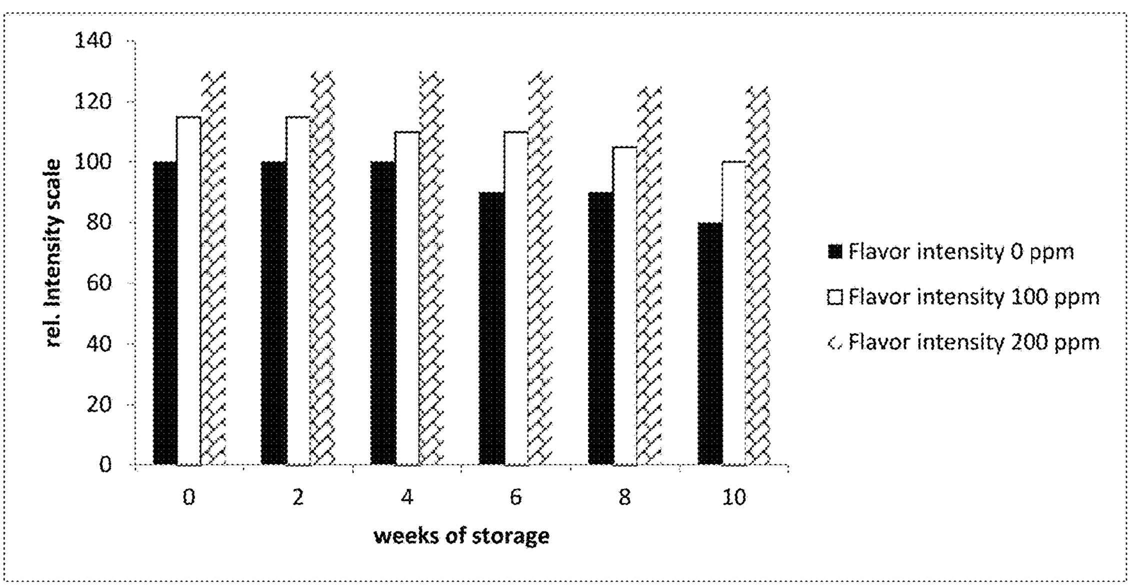

FIG. 215 represents graphically a citrus beverage with a *Stevia* derived MRP stored at 20-22° C. over a period of time (flavor intensity).

Figure 216:
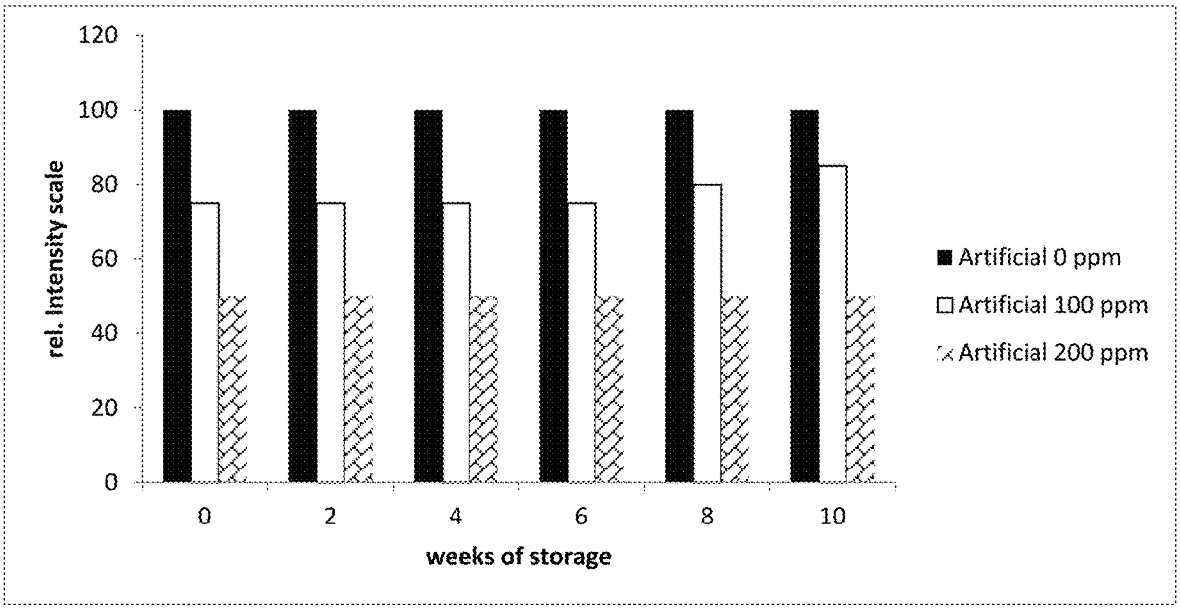

FIG. 216 represents graphically a citrus beverage with a *Stevia* derived MRP stored at 20-22° C. over a period of time.

Figure 217:
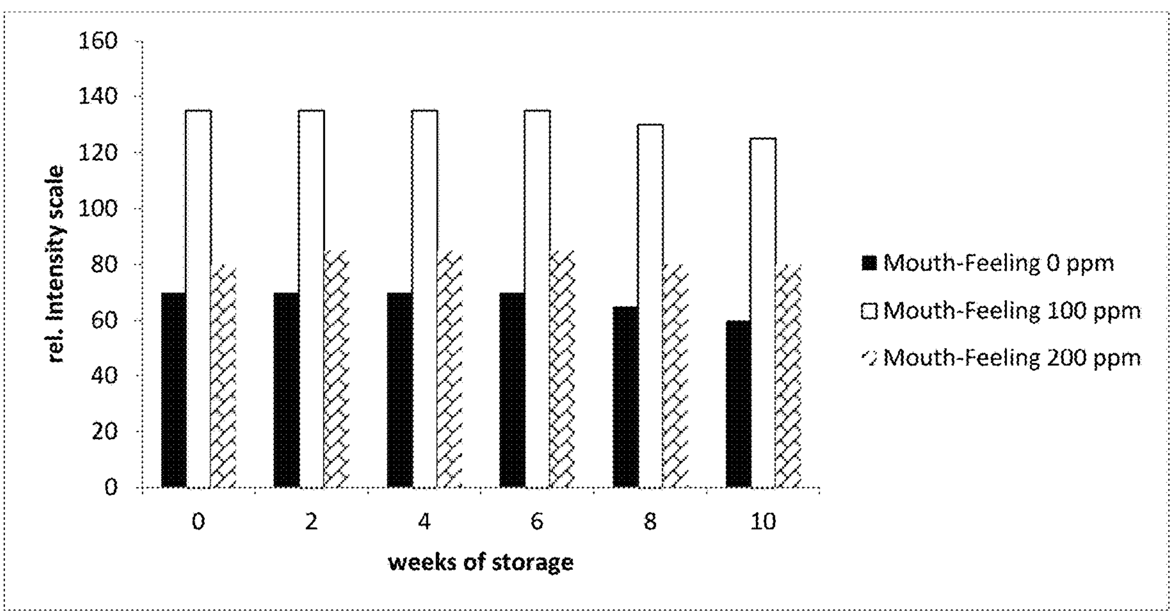

FIG. 217 represents graphically a citrus beverage with a *Stevia* derived MRP stored at 20-22° C. over a period of time (mouth feel).

Figure 218:
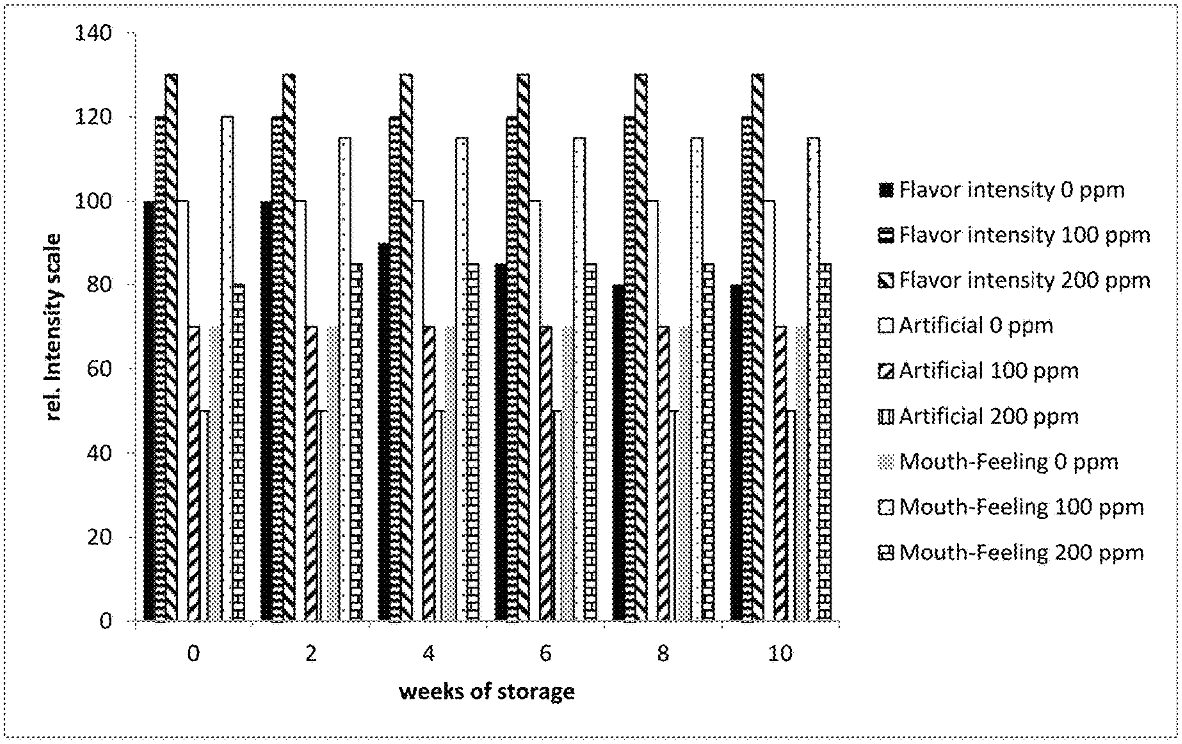

FIG. 218 represents graphically a cola beverage with a *Stevia* derived MRP stored at 2-4° C. over a period of time (flavor intensity).

Figure 219:
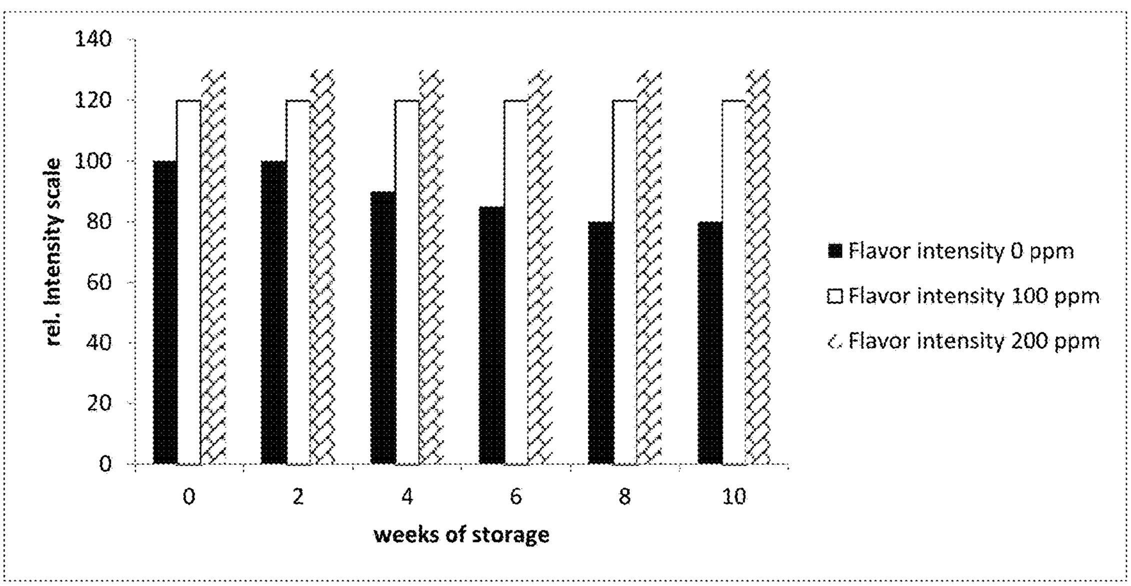

FIG. 219 represents graphically a cola beverage with a *Stevia* derived MRP stored at 2-4° C. over a period of time (flavor intensity).

Figure 220:
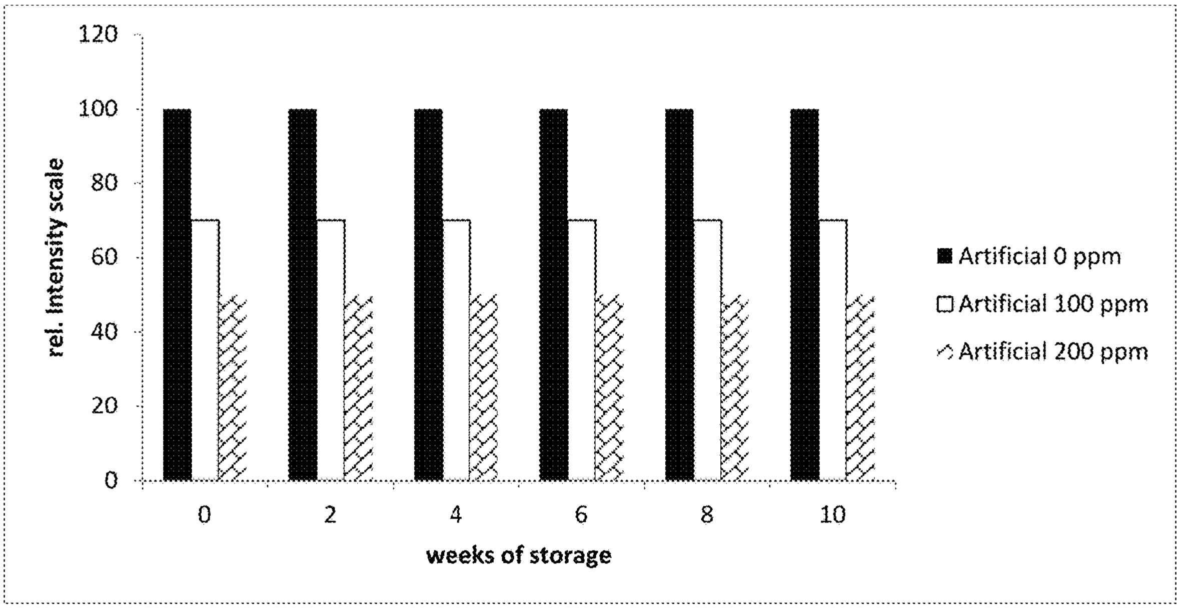

FIG. 220 represents graphically a cola beverage with a *Stevia* derived MRP stored at 2-4° C. over a period of time.

Figure 221:
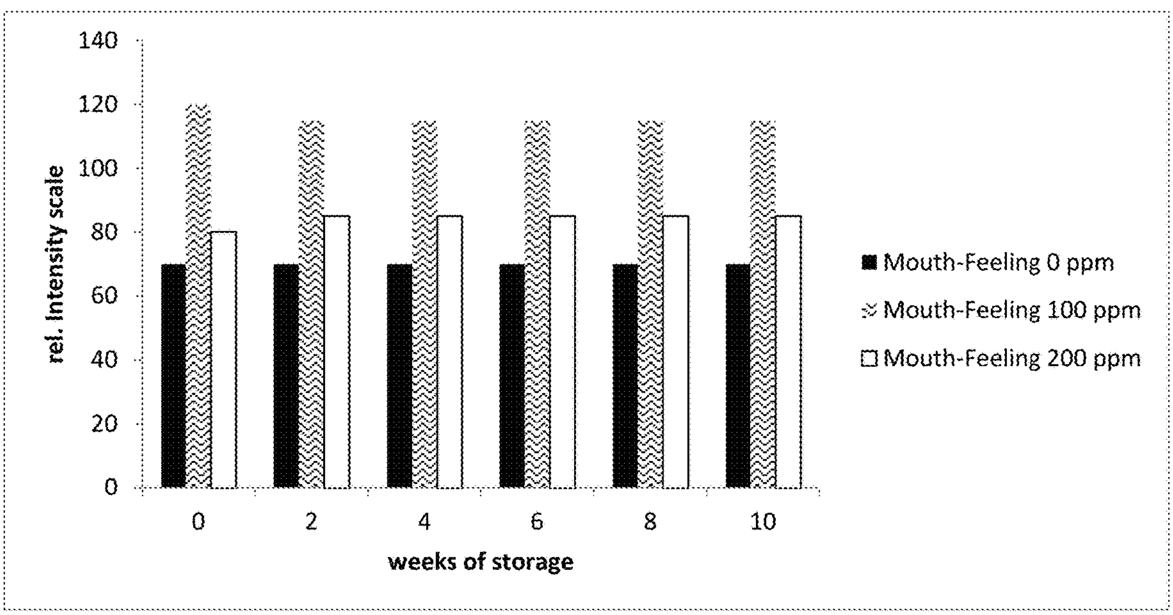

FIG. 221 represents graphically a cola beverage with a *Stevia* derived MRP stored at 2-4° C. over a period of time (mouth feel).

Figure 222:
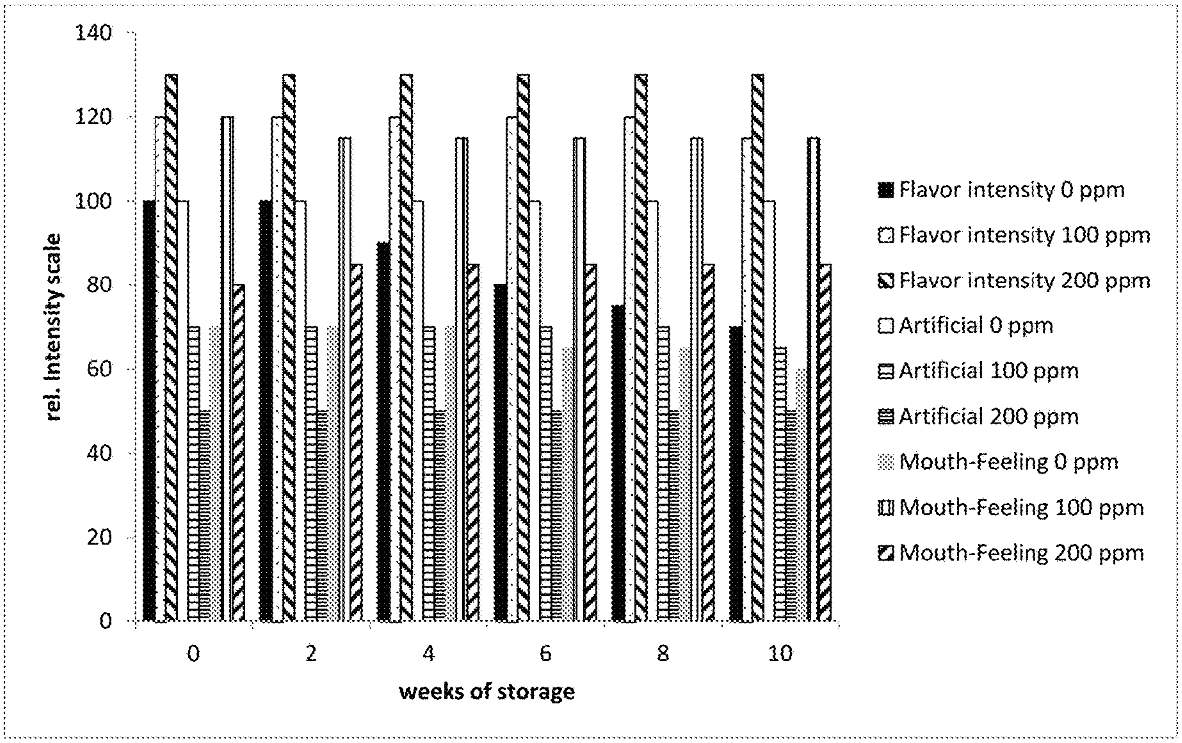

FIG. 222 represents graphically a cola beverage with a *Stevia* derived MRP stored at 20-22° C. over a period of time (flavor intensity).

Figure 223:
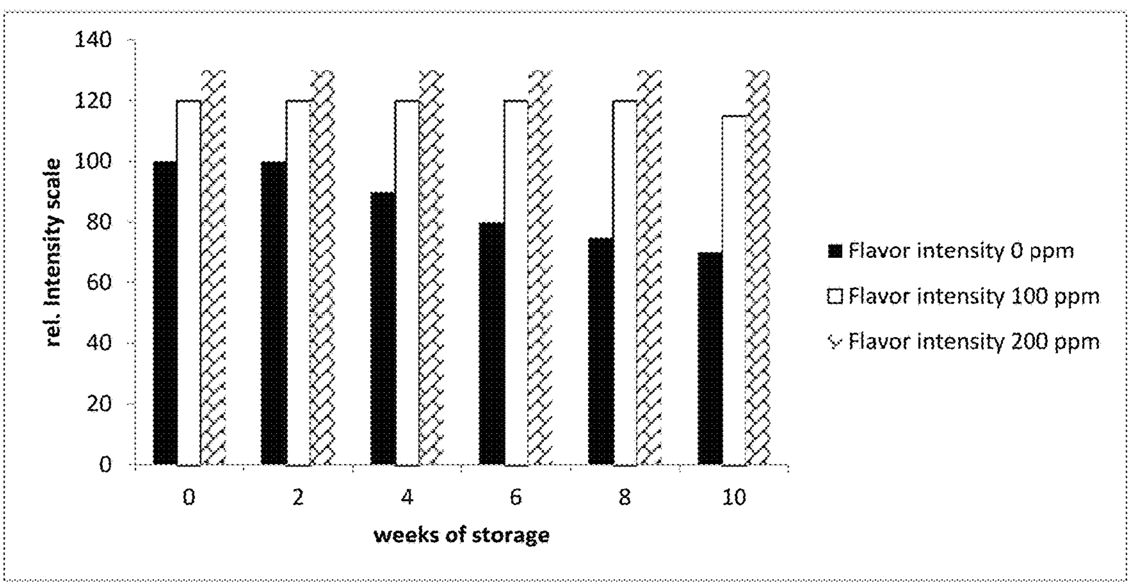

FIG. 223 represents graphically a cola beverage with a *Stevia* derived MRP stored at 20-22° C. over a period of time (flavor intensity).

Figure 224:
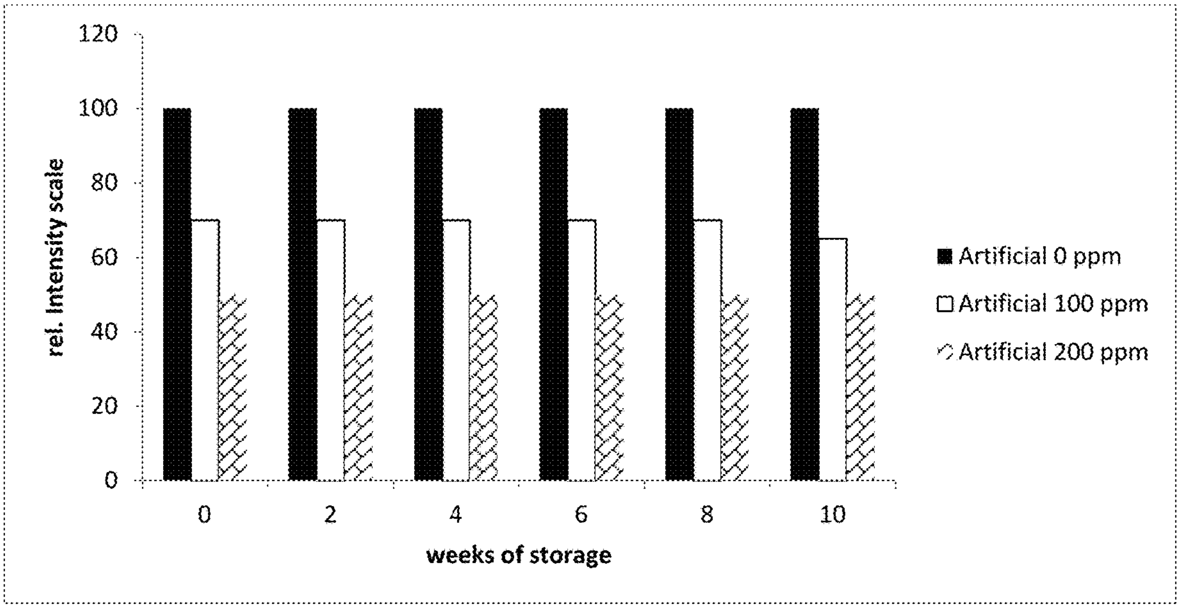

FIG. 224 represents graphically a cola beverage with a *Stevia* derived RP stored at 20-22° C. over a period of time.

Figure 225:
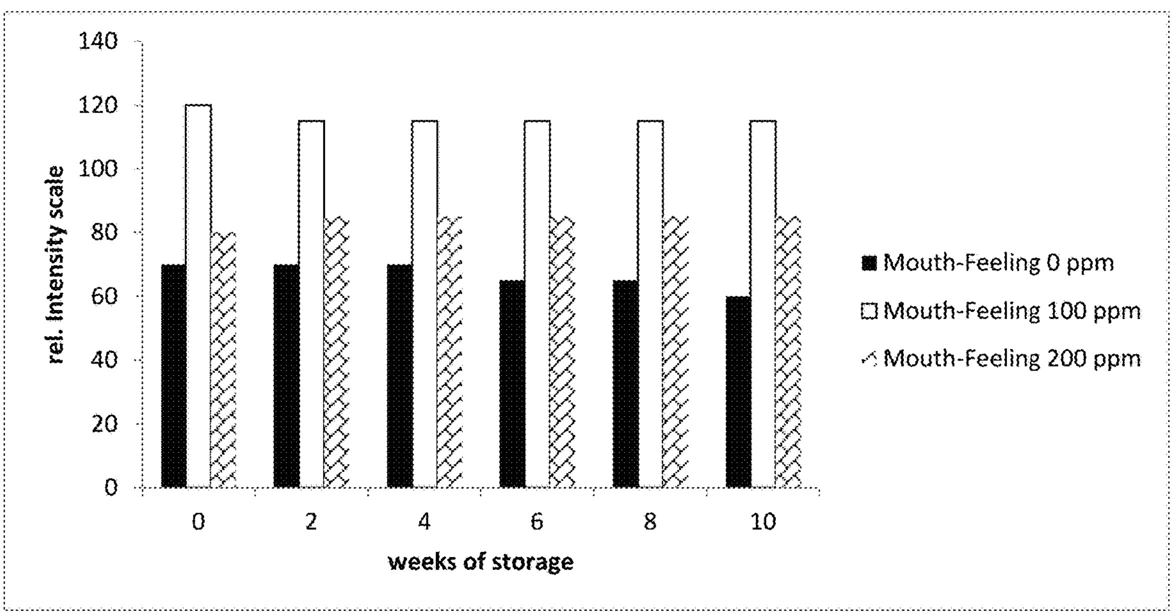

FIG. 225 represents graphically a cola beverage with a *Stevia* derived MRP stored at 20-22° C. over a period of time (mouth feel).

Figure 226:
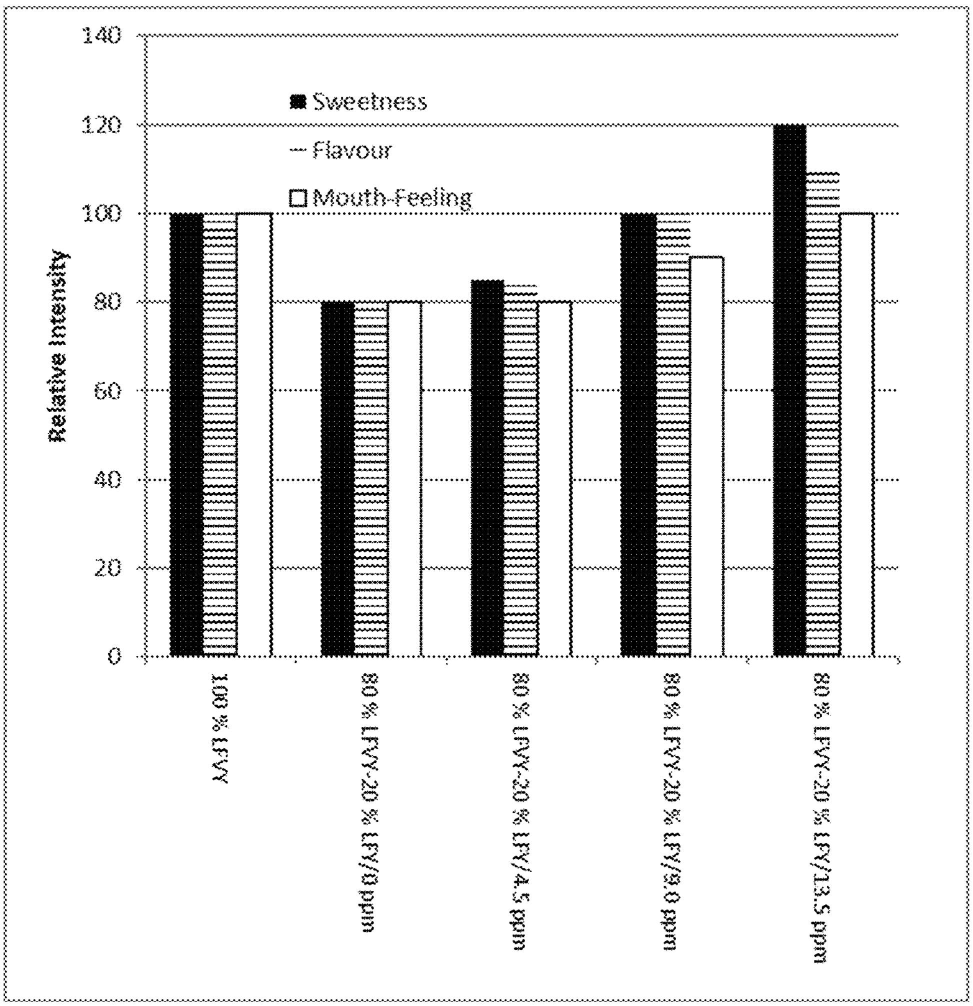
Figure 227:
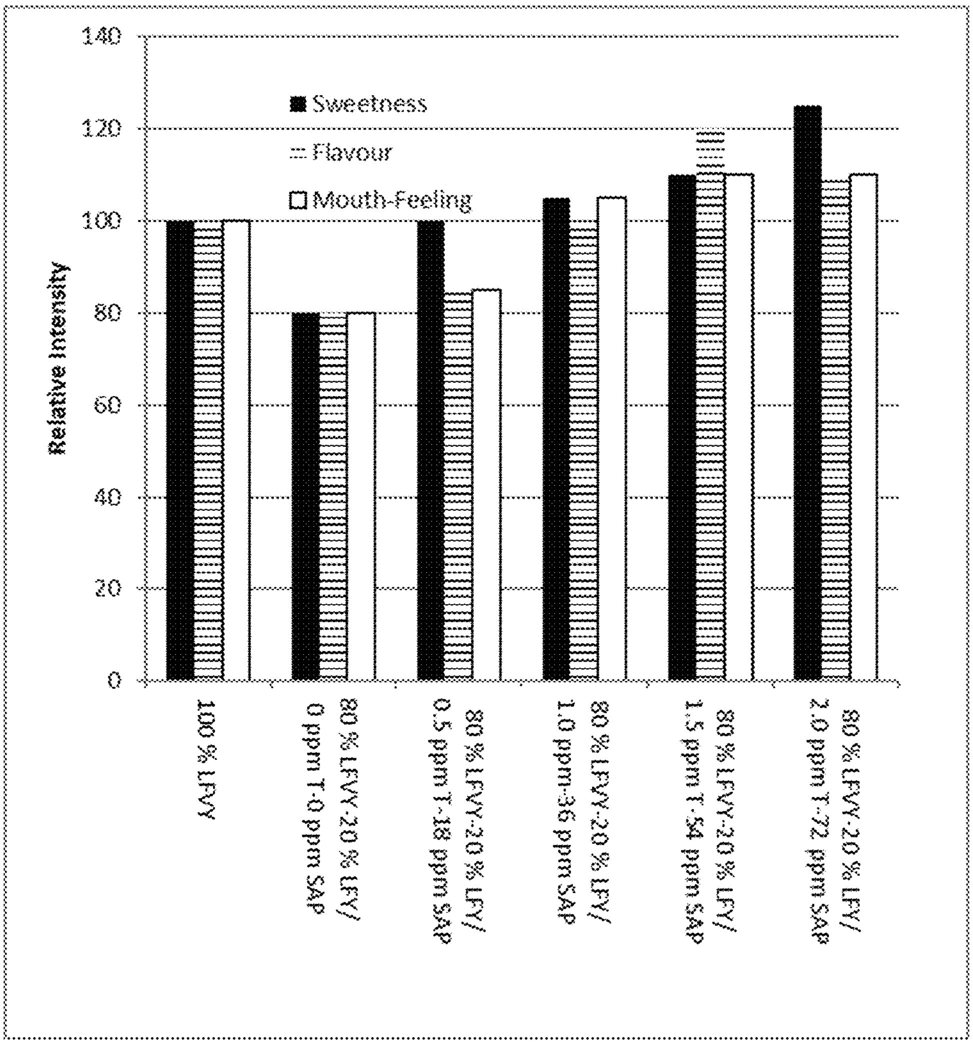

FIG. 226 depicts the sweetness, flavor and mouth feel profiles of samples of low fat vanilla yogurt (LFVY) with *Stevia* MRPs, FIG. 227 depicts the sweetness, flavor and mouth feel profiles of samples of low fat vanilla yogurt (LFVY) with *Stevia*. MRPs and thaumatin.

Figure 228:
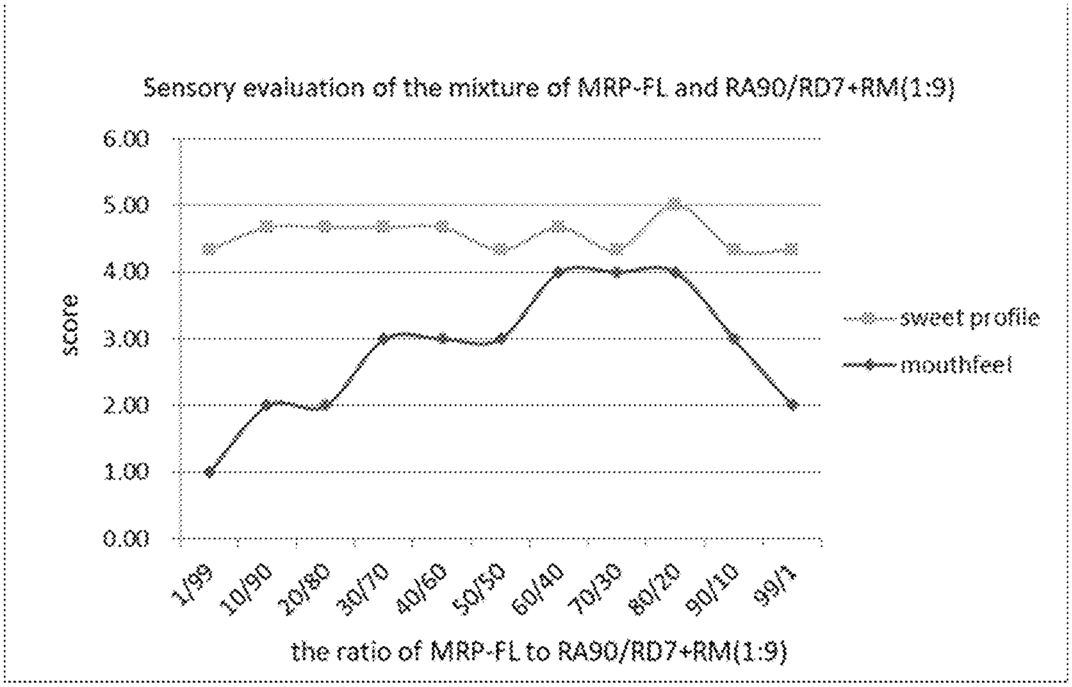

FIG. 228 depicts the relationship between the sensory evaluation results to the ratio of MRP-FL to RA90/RD7+RM (1:9).

Figure 229:
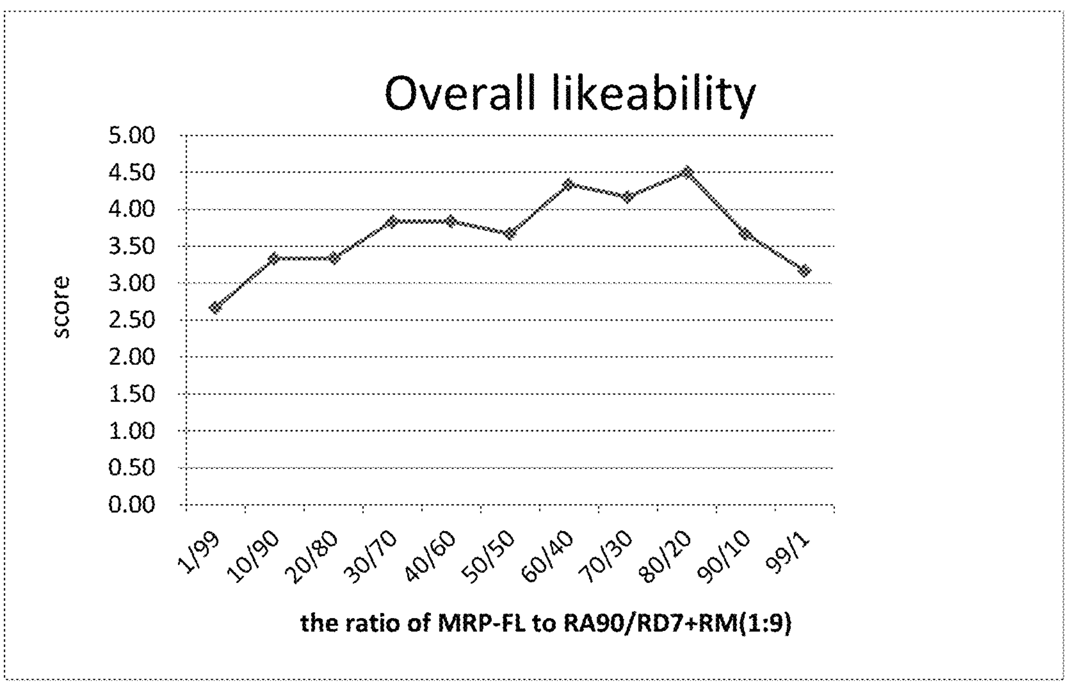

FIG. 229 depicts the relationship between the overall likeability results to the ratio of MRP-FL to RA90/RD7+RM (1:9).

Figure 230:
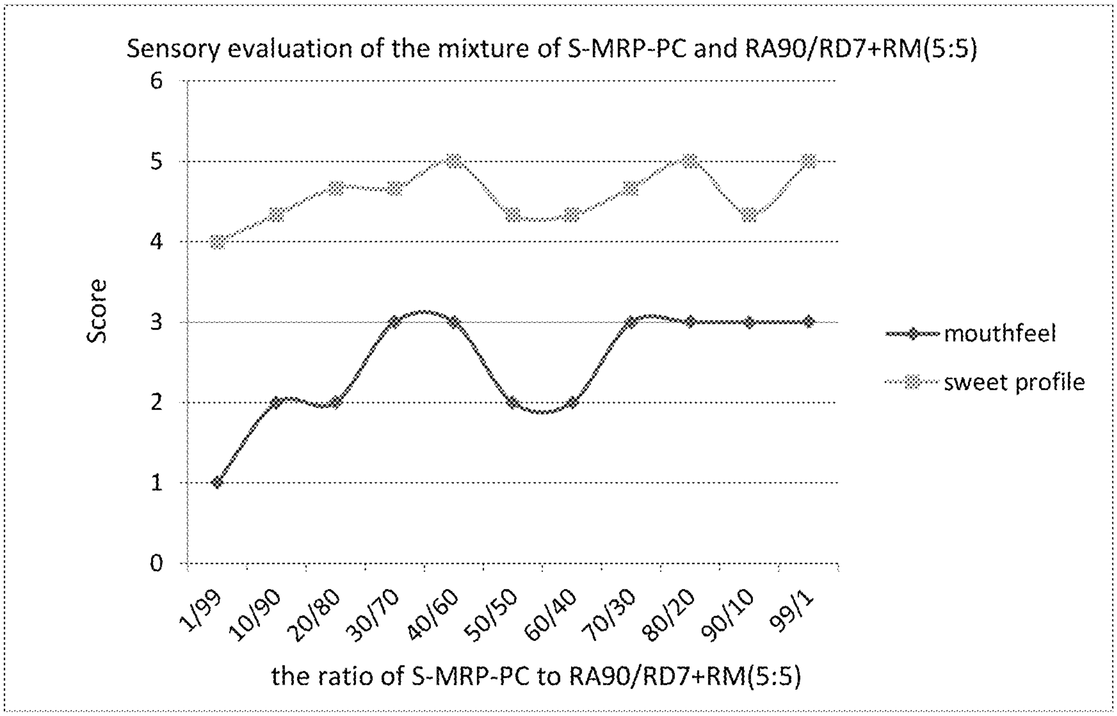

FIG. 230 depicts the relationship between the sensory evaluation results to the ratio of S-MRP-PC to RA90/RD7+RM (5:5).

Figure 231:
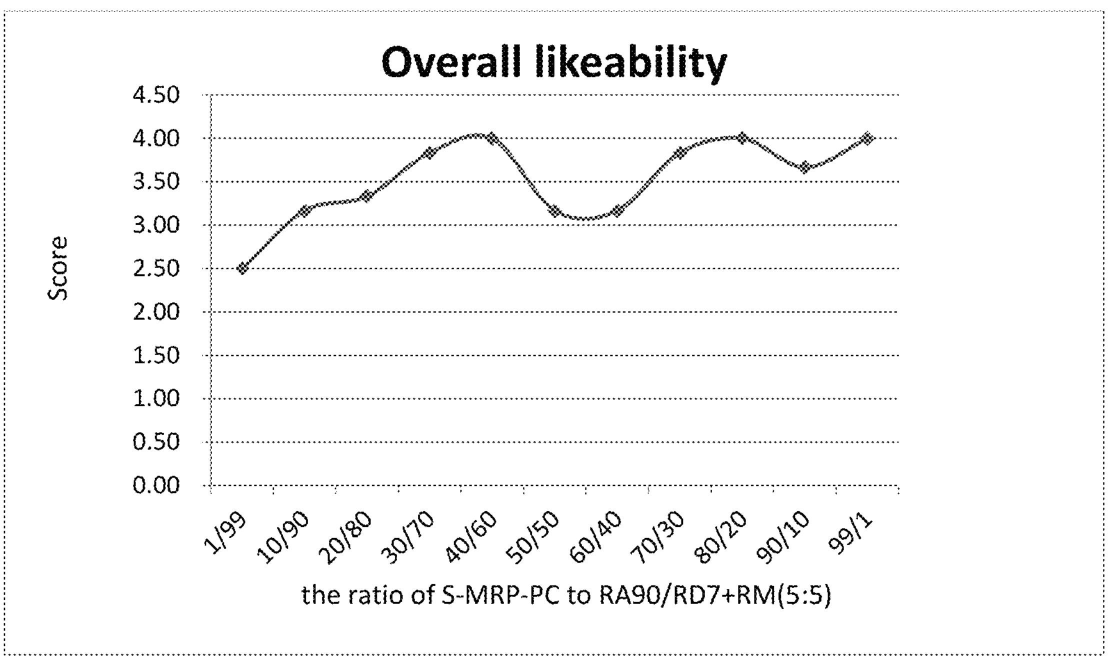

FIG. 231 depicts the relationship between the overall likeability results to the ratio of S-MRP-PC to RA90/RD7+RM (5:5).

Figure 232:
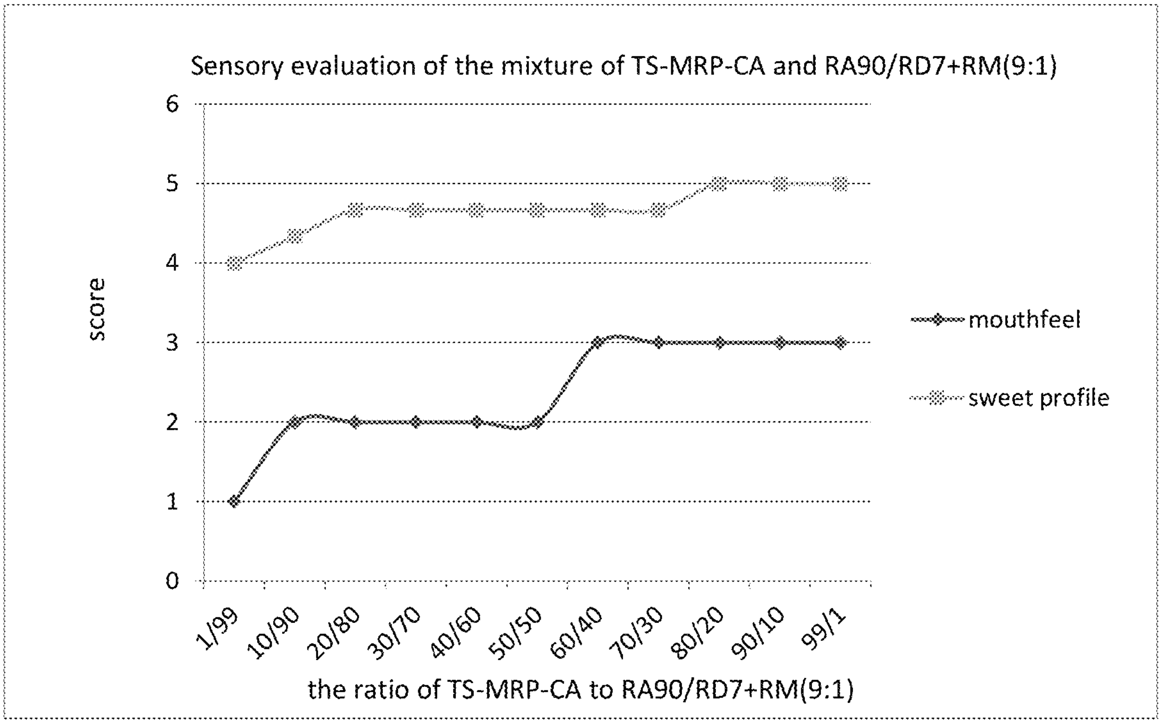

FIG. 232 depicts the relationship between the sensory evaluation results to the ratio of TS-MRP-CA to RA90/RD7+RM (9:1).

Figure 233:
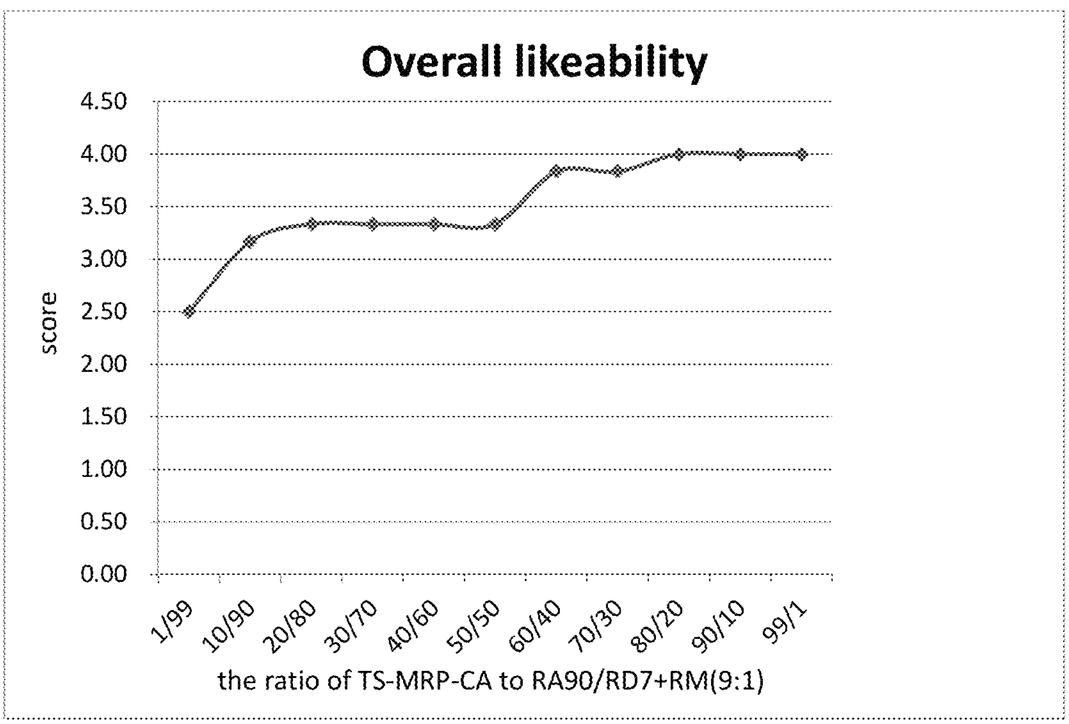

FIG. 233 depicts the relationship between the overall likeability results to the ratio of TS-MRP-CA to RA90/RD7+RM (9:1).

Figure 234:
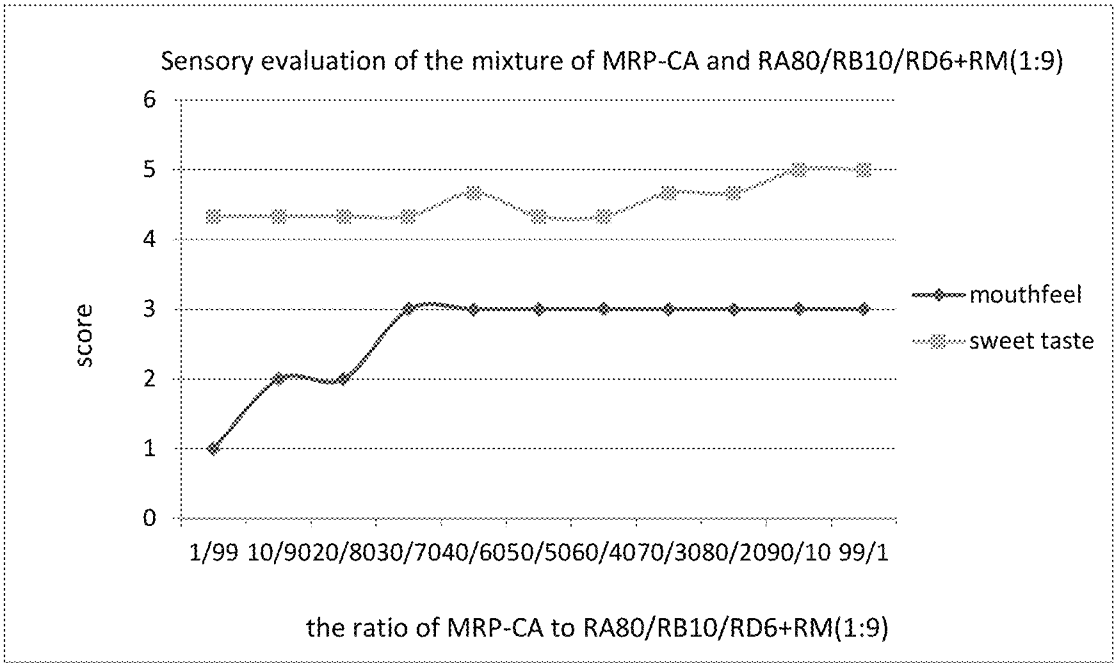

FIG. 234 depicts the relationship between the sensory evaluation results to the ratio of MRP-CA to RA80/RB10/RD6+RM (1:9).

Figure 235:
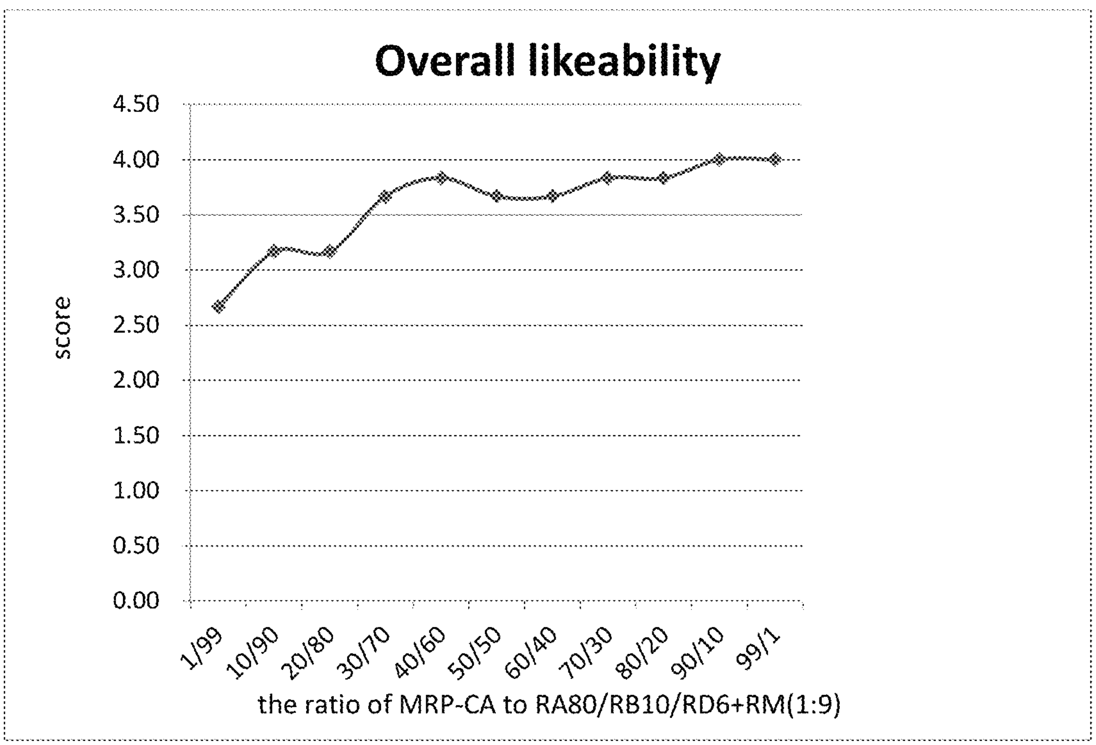

FIG. 235 depicts the relationship between the overall likeability results to the ratio of MRP-CA to RA80/RB10/RD6+RM (1:9).

Figure 236:
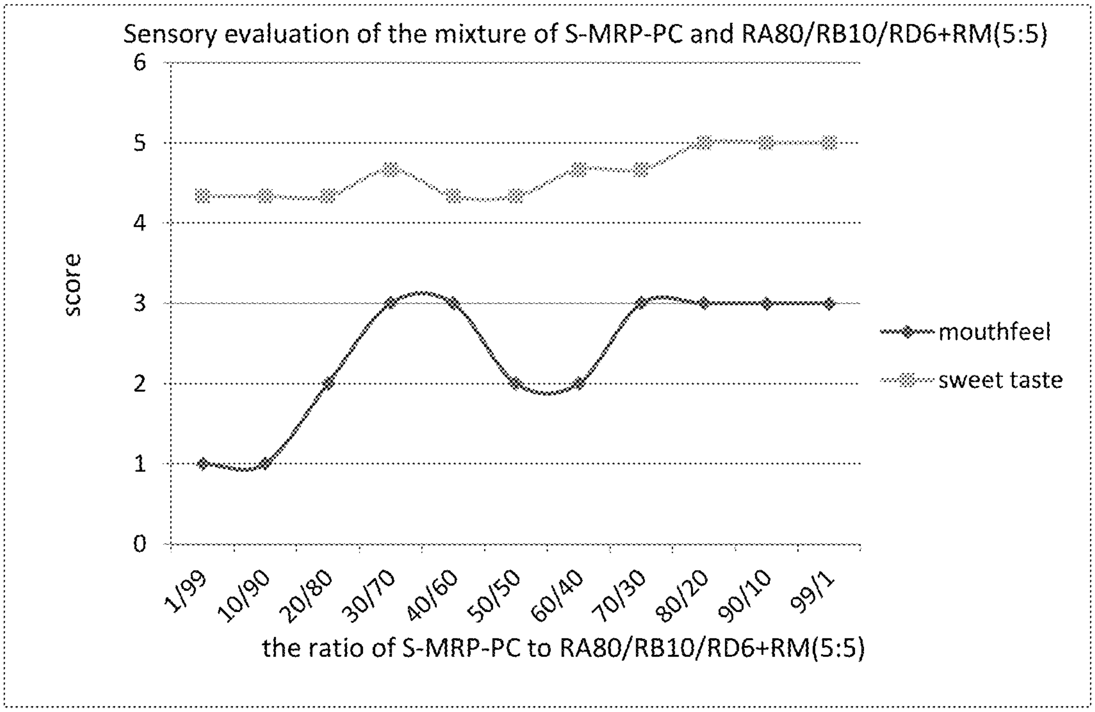

FIG. 236 depicts the relationship between the sensory evaluation results to the ratio of S-MRP-PC to RA80/RB 10/RD6+RM (5:5).

Figure 237:
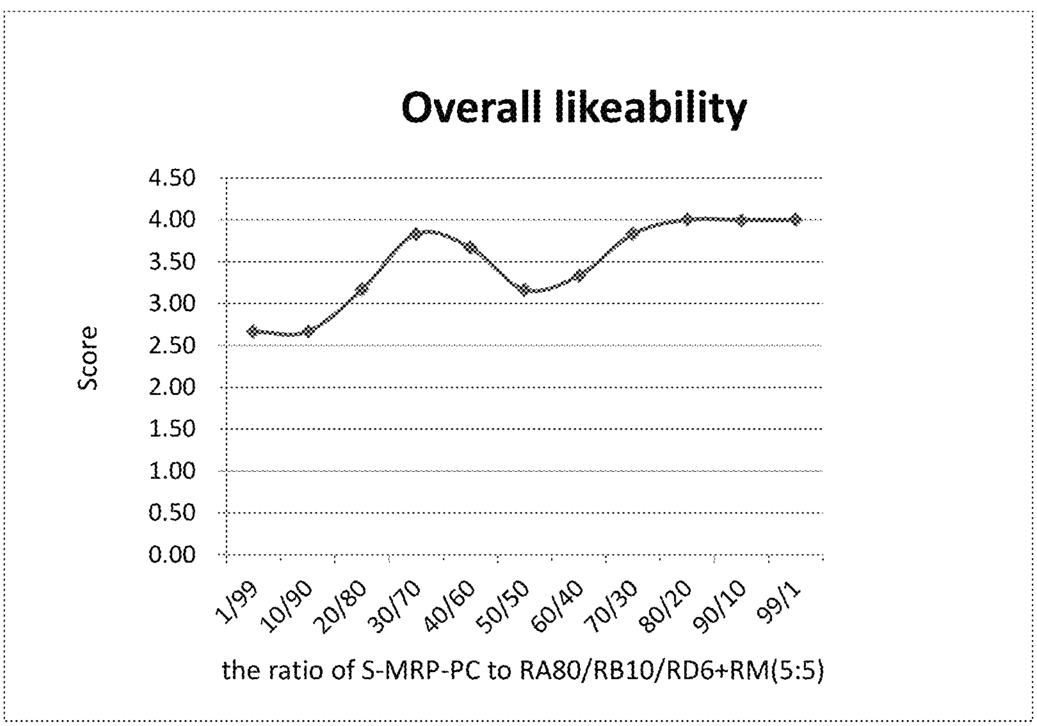

FIG. 237 depicts the relationship between the overall likeability results to the ratio of S-MRP-PC to RA80/RB10/RD6+RM (5:5).

Figure 238:
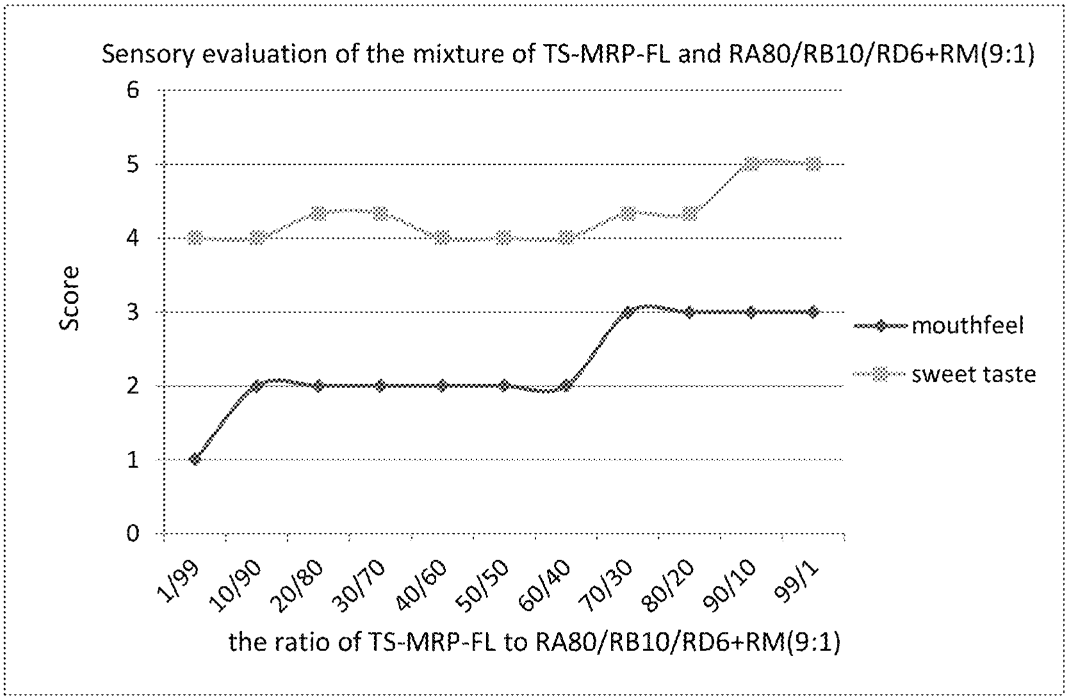

FIG. 238 depicts the relationship between the sensory evaluation results to the ratio of TS-MRP-FL to RA80/RB10/RD6+RM (9:1).

Figure 239:
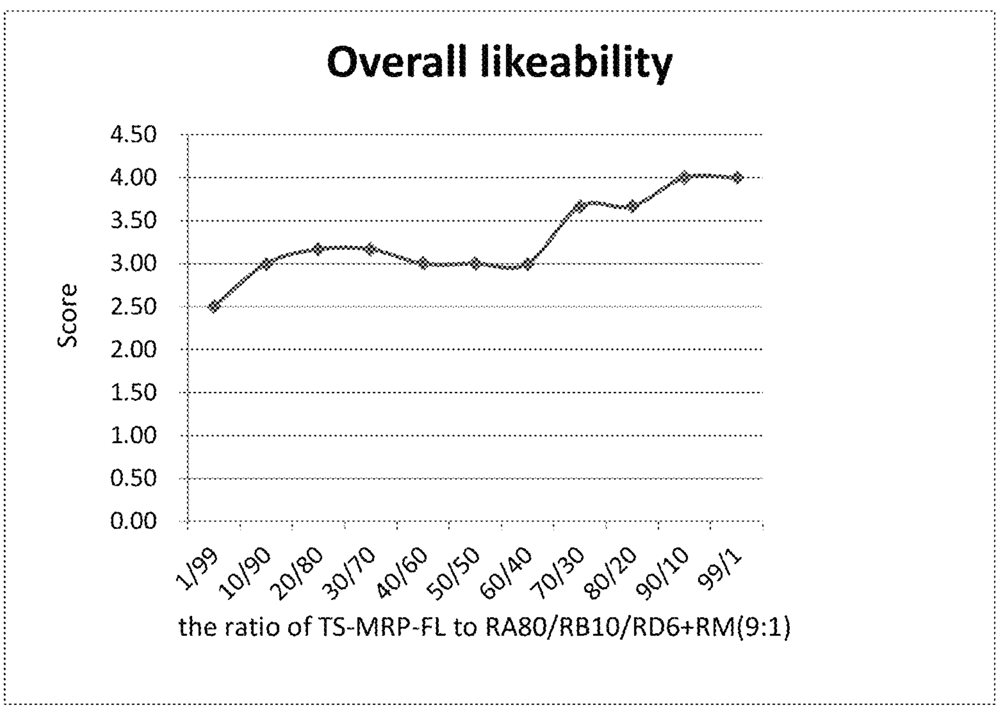

FIG. 239 depicts the relationship between the overall likeability results to the ratio of TS-MRP-FL to RA80/RB10/RD6+RM (9:1).

Figure 240:
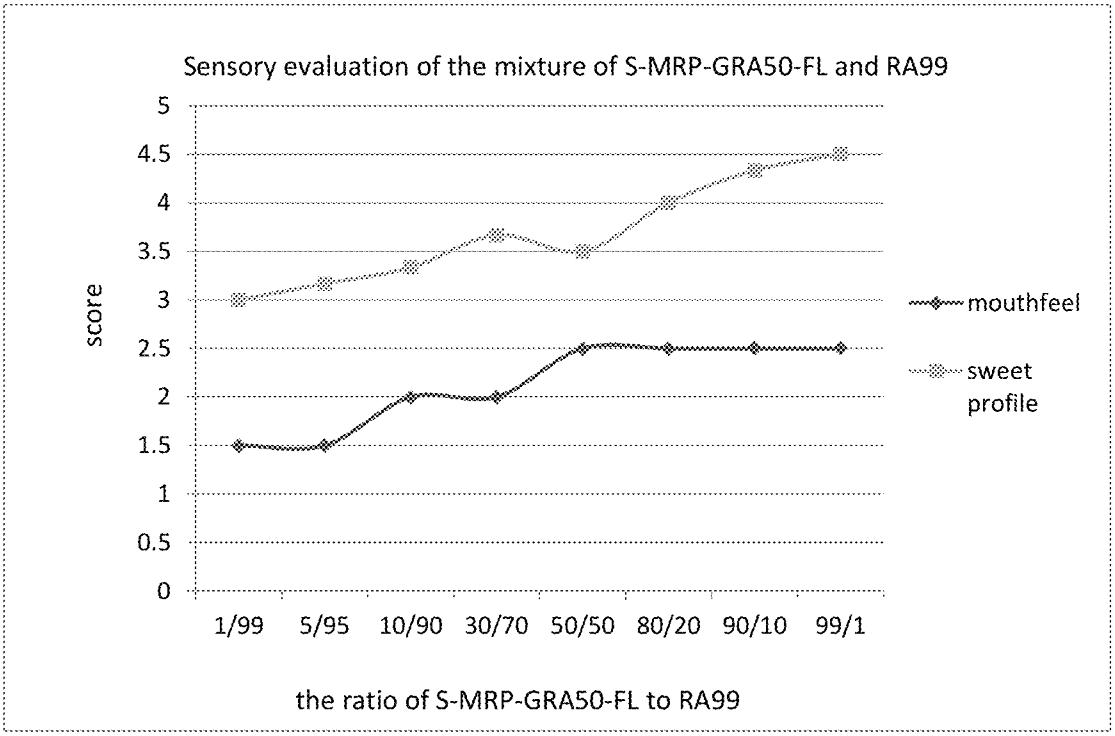

FIG. 240 depicts the relationship between the sensory evaluation results to the ratio of S-MRP-GRA50-FL to RA99.

Figure 241:
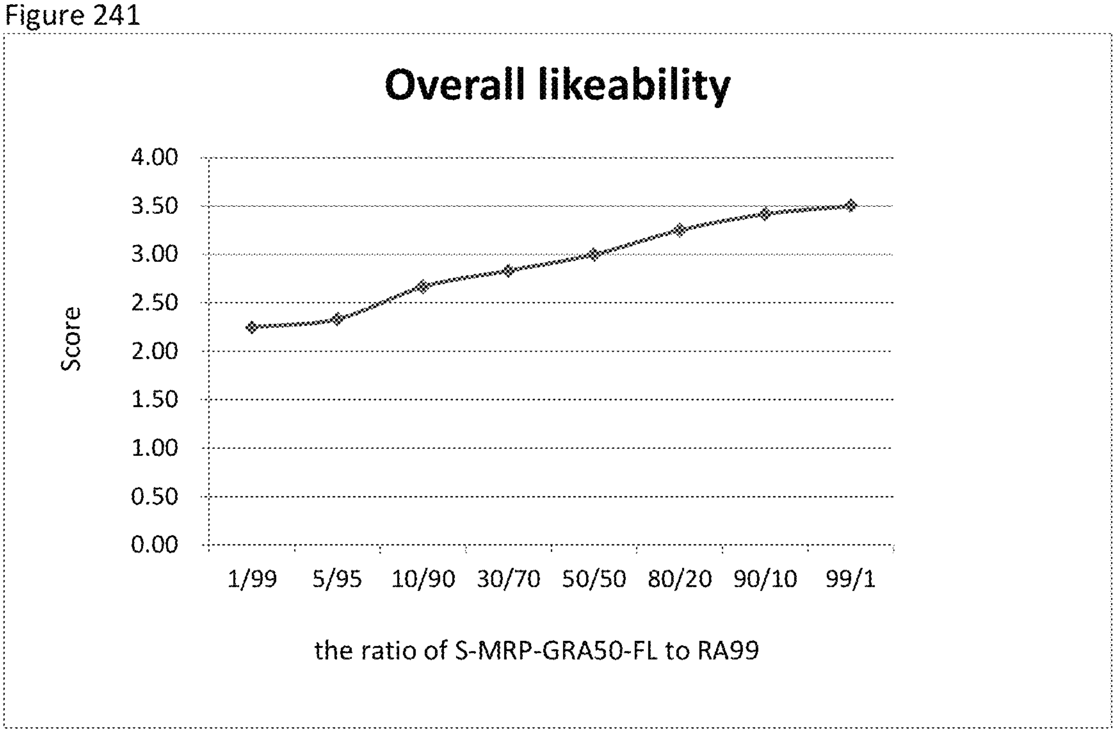

FIG. 241 depicts the relationship between the overall likeability results to the ratio of S-MRP-GRA50-FL to RA99.

Figure 242:
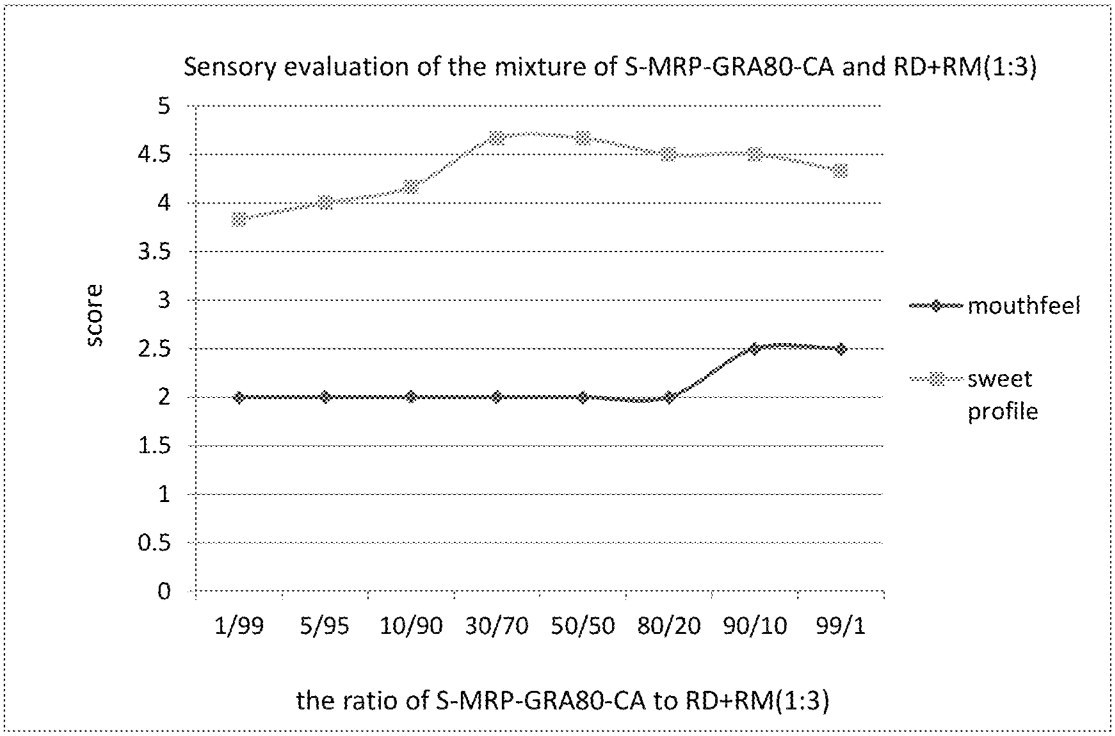

FIG. 242 depicts the relationship between the sensory evaluation results to the ratio of S-MRP-GRA80-CA to RD+RM (1:3).

Figure 243:
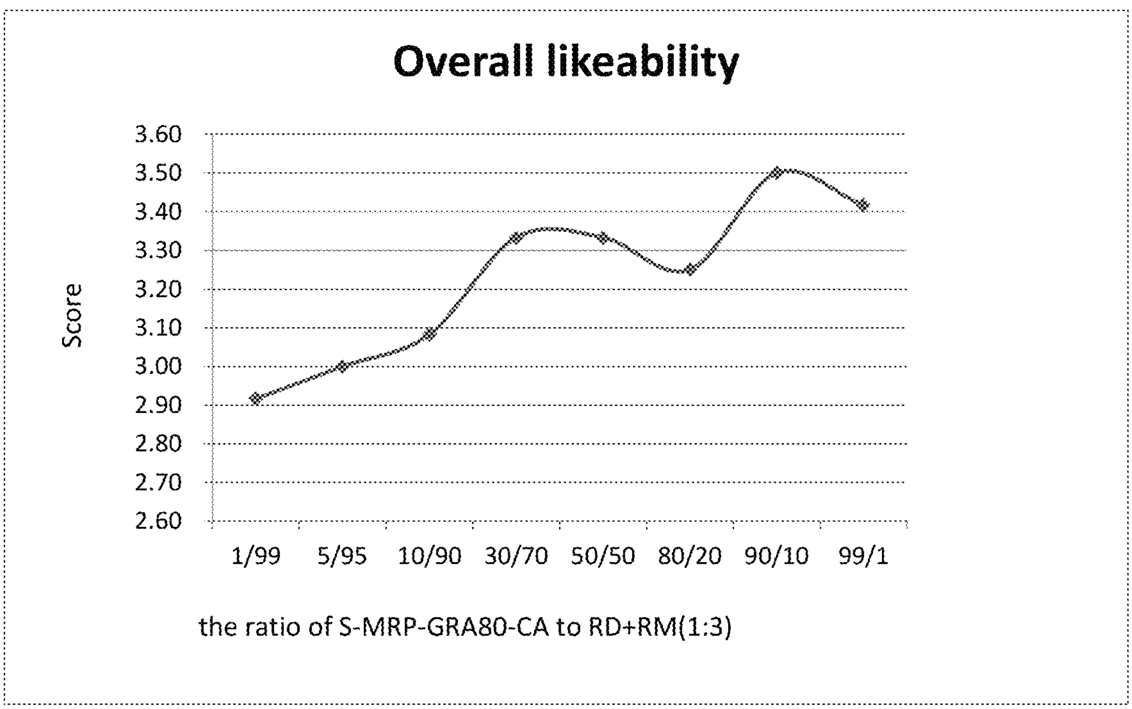

FIG. 243 depicts the relationship between the overall likeability results to the ratio of S-MRP-GRA80-CA to RD+RM (1:3).

Figure 244:
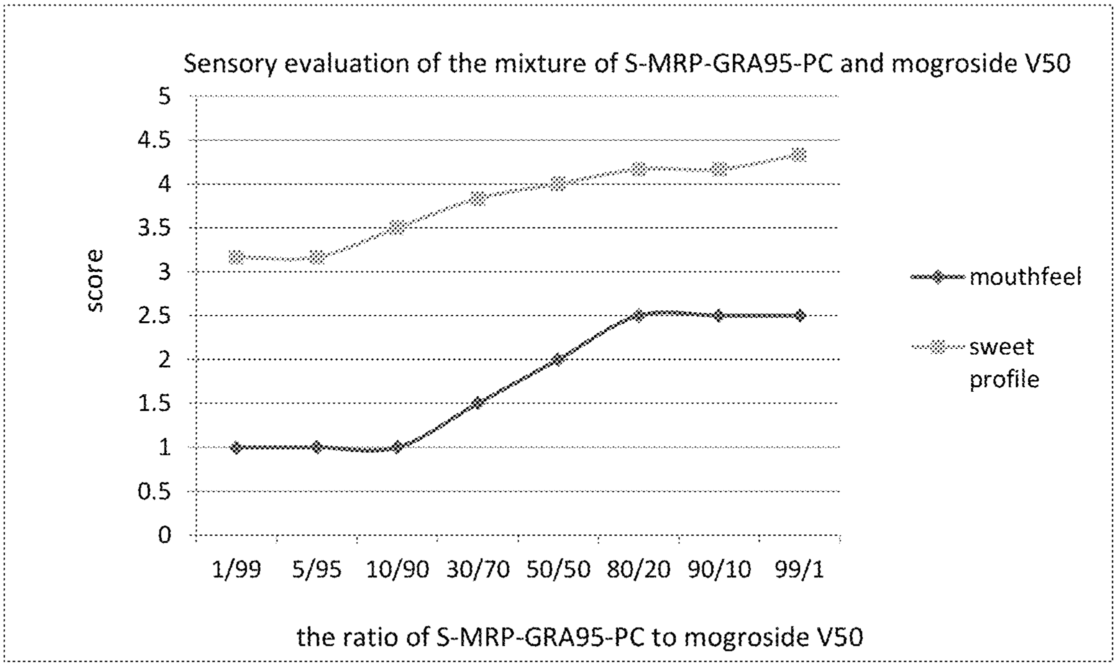

FIG. 244 depicts the relationship between the sensory evaluation results to the ratio of S-MRP-GRA95-PC to mogroside V50.

Figure 245:
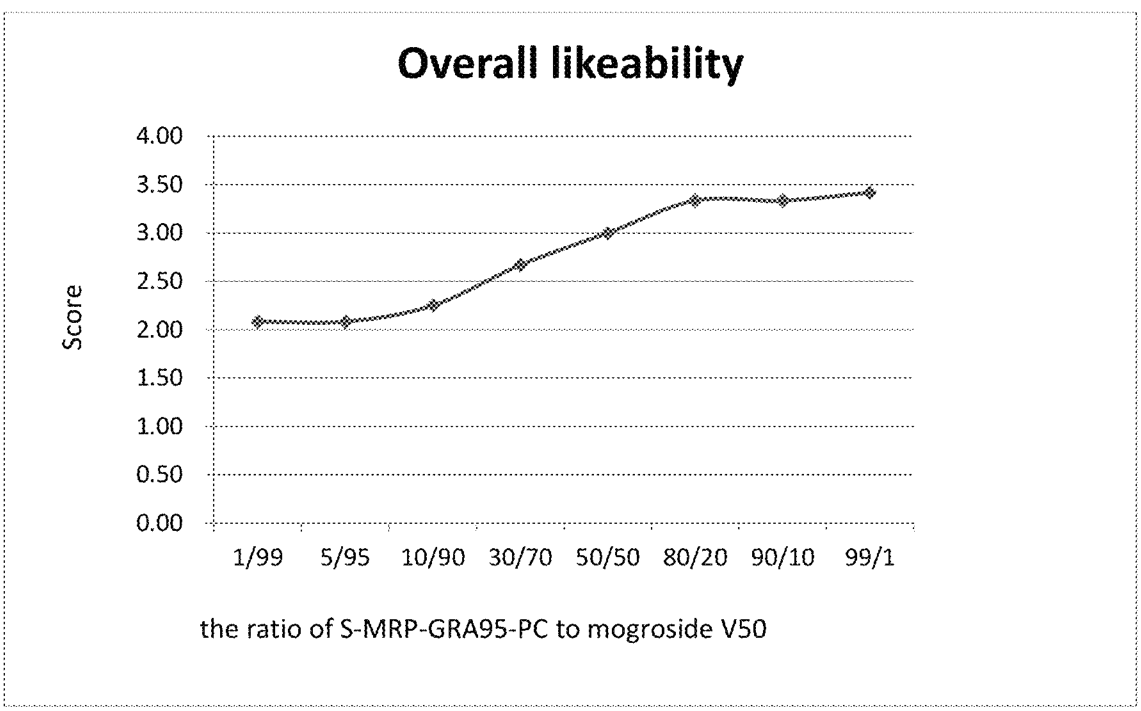

FIG. 245 depicts the relationship between the overall likeability results to the ratio of S-MRP-GRA95-PC to mogroside V50.

Figure 246:
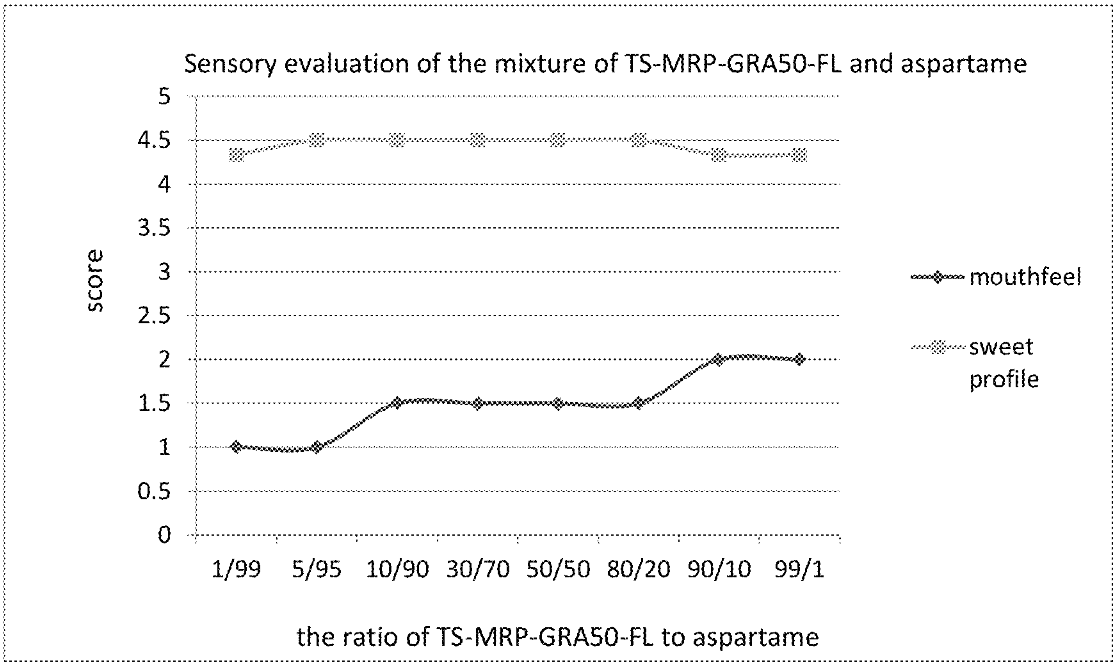

FIG. 246 depicts the relationship between the sensory evaluation results to the ratio of TS-MRP-GRA50-FL to aspartame.

Figure 247:
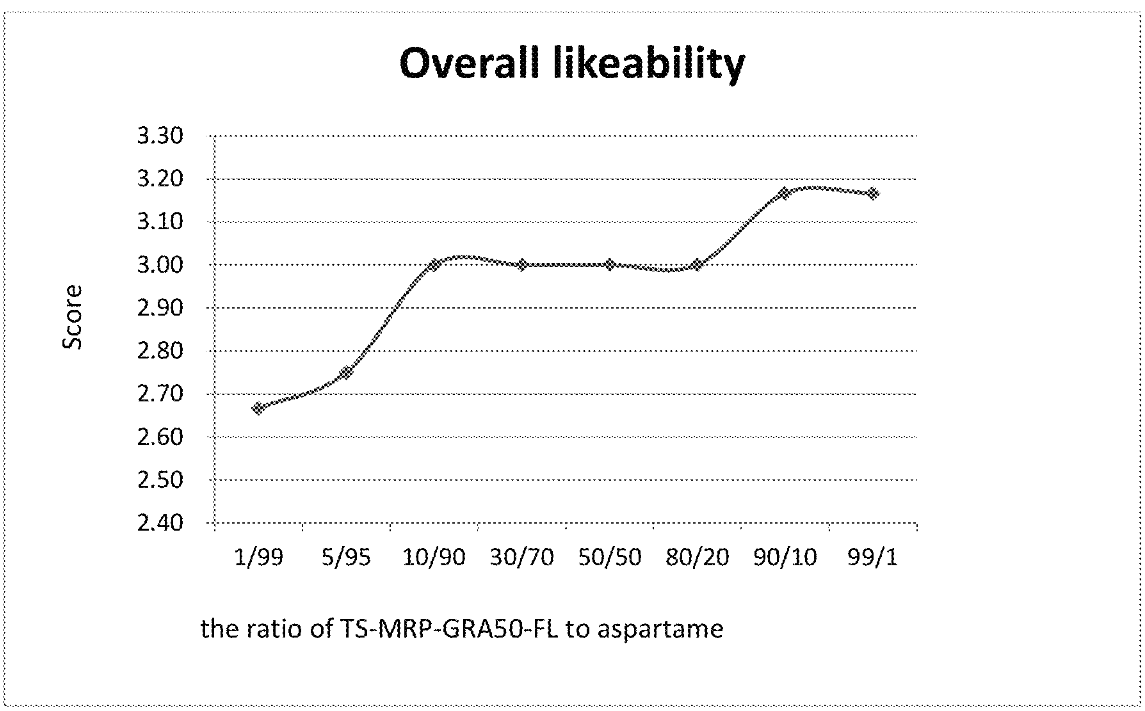

FIG. 247 depicts the relationship between the overall likeability results to the ratio of TS-MRP-GRA50-FL to aspartame.

Figure 248:
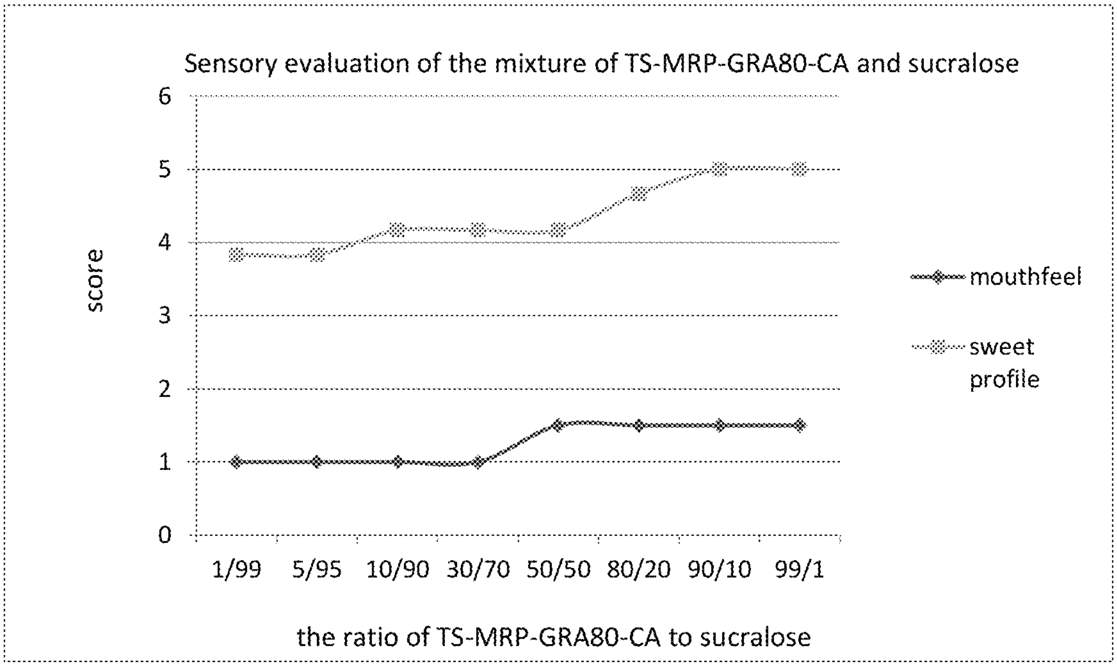

FIG. 248 depicts the relationship between the sensory evaluation results to the ratio of TS-MRP-GRA80-CA to sucralose.

Figure 249:
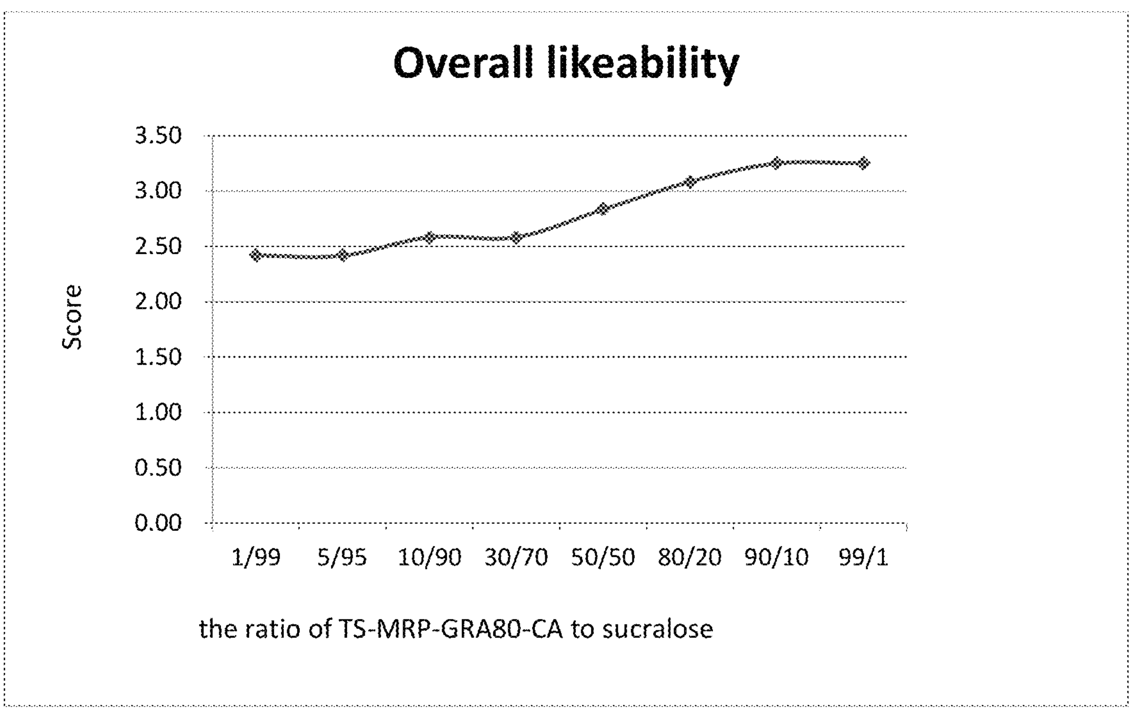

FIG. 249 depicts the relationship between the overall likeability results to the ratio of TS-MRP-GRA80-CA to sucralose.

Figure 250:
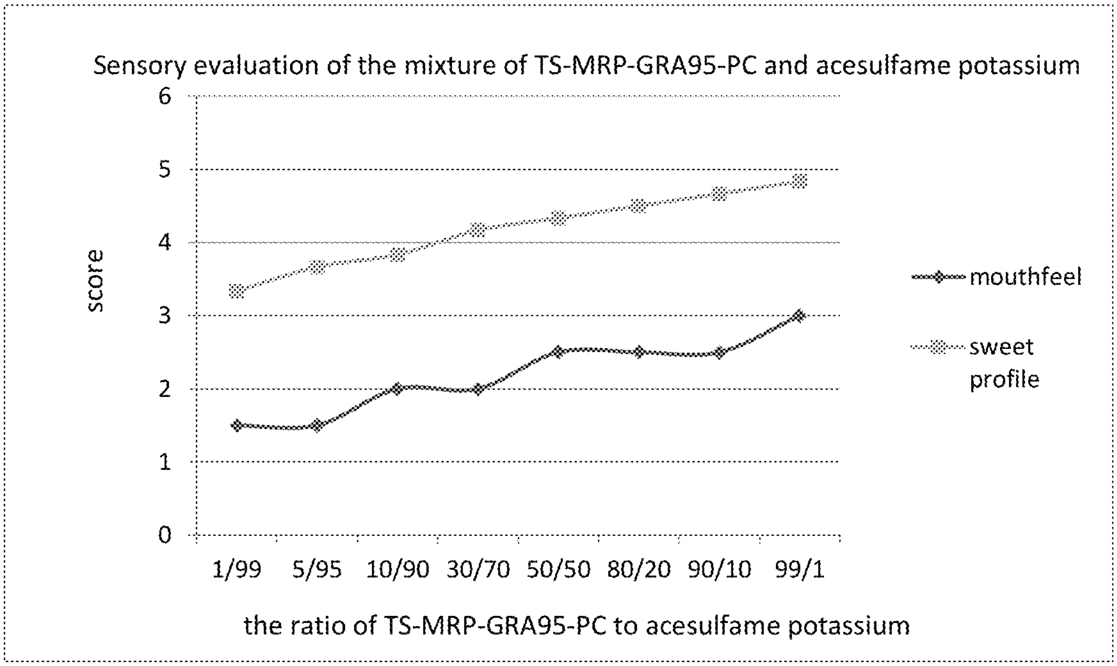

FIG. 250 depicts the relationship between the sensory evaluation results to the ratio of TSMRP-GRA95-PC to Acesulfame potassium.

Figure 251:
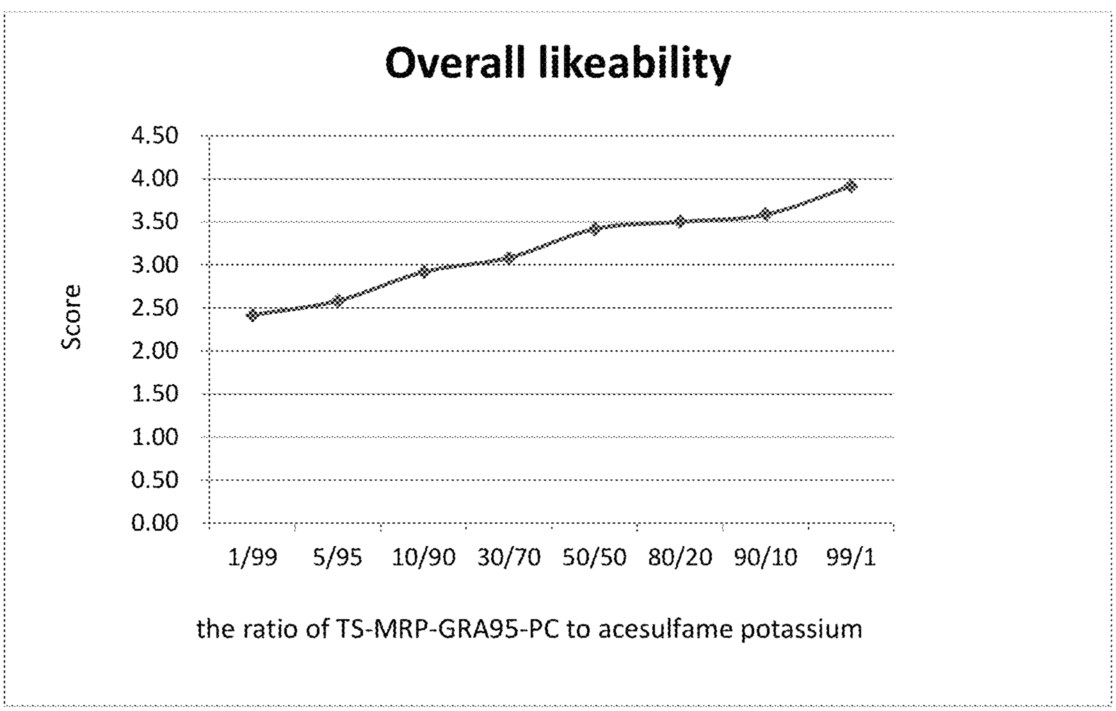

FIG. 251 depicts the relationship between the overall likeability results to the ratio of TS-MRP-GRA95-PC to Acesulfame potassium.

Figure 252:
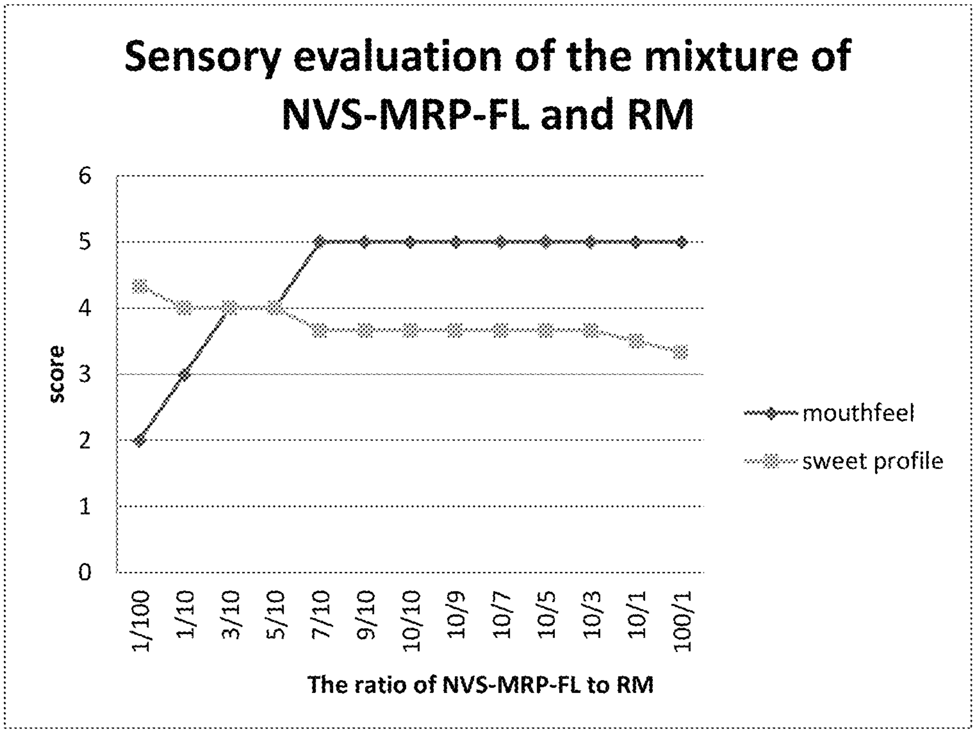

FIG. 252 depicts the relationship between the sensory evaluation results to the ratio of NVS-MRP-FL to RM.

Figure 253:
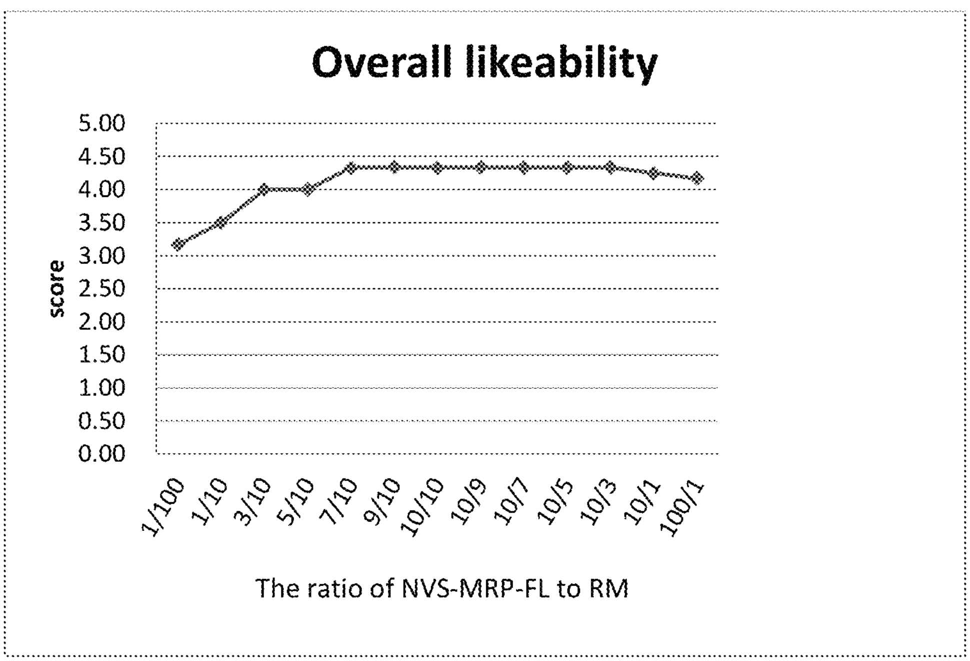

FIG. 253 depicts the relationship between the overall likeability results to the ratio of NVS-MRP-FL to RM.

Figure 254:
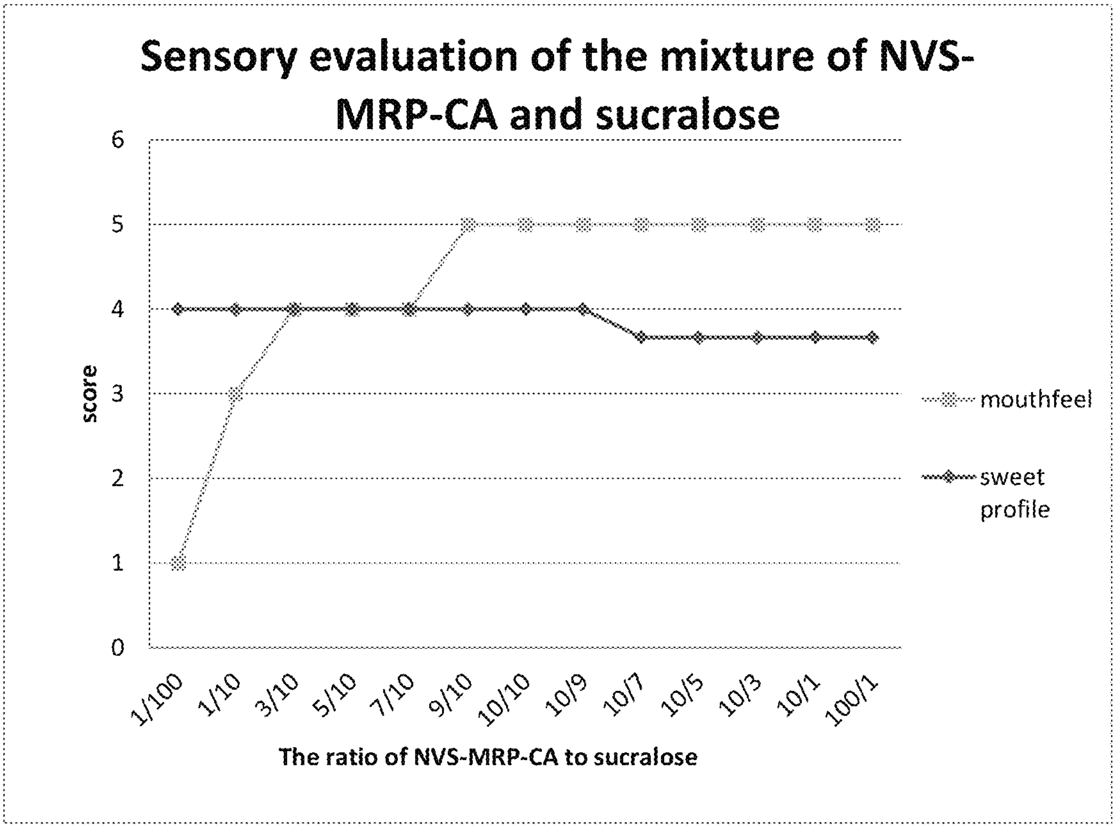

FIG. 254 depicts the relationship between the sensory evaluation results to the ratio of NVS-MRP-CA to sucralose.

Figure 255:
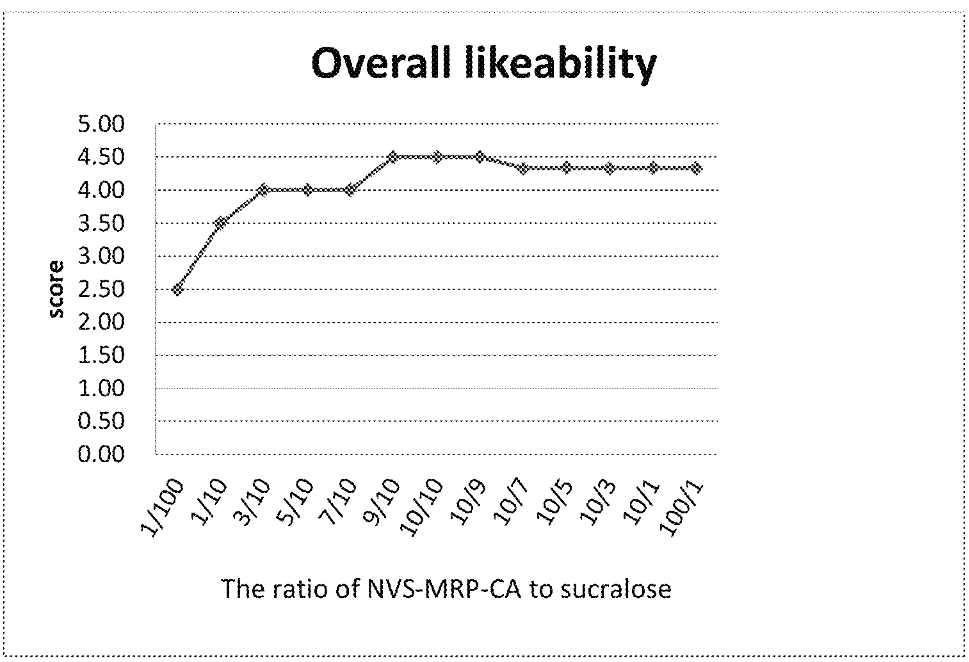

FIG. 255 depicts the relationship between the overall likeability results to the ratio of NVS-MRP-CA to sucralose.

Figure 256:
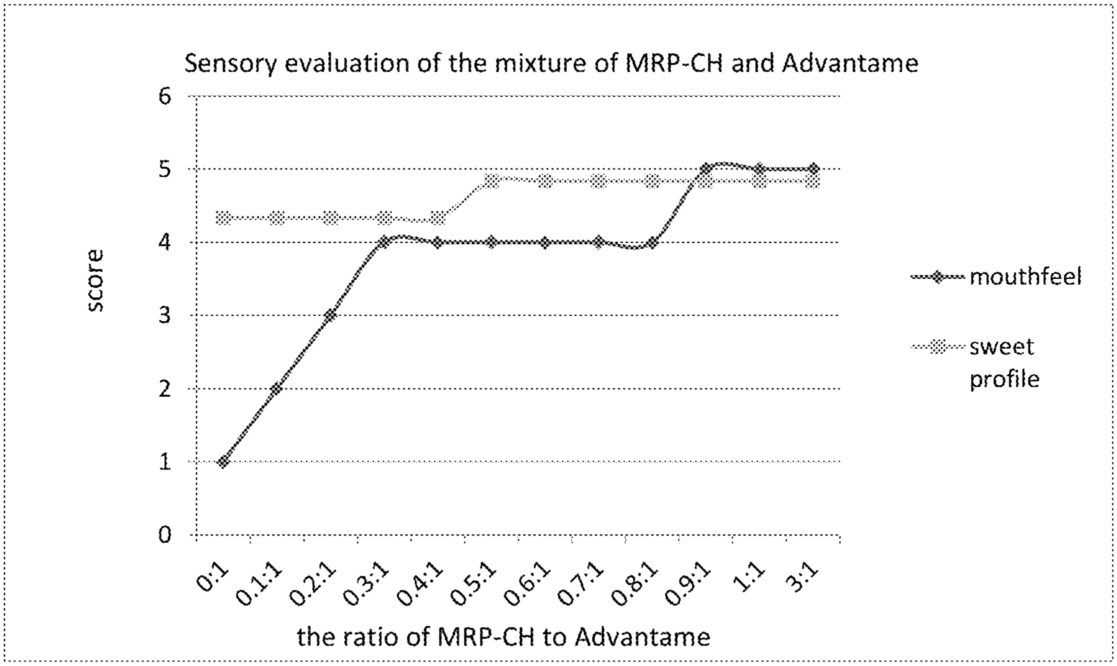

FIG. 256 depicts the relationship between the sensory evaluation results to the ratio of MRP-CH to Advantame.

Figure 257:
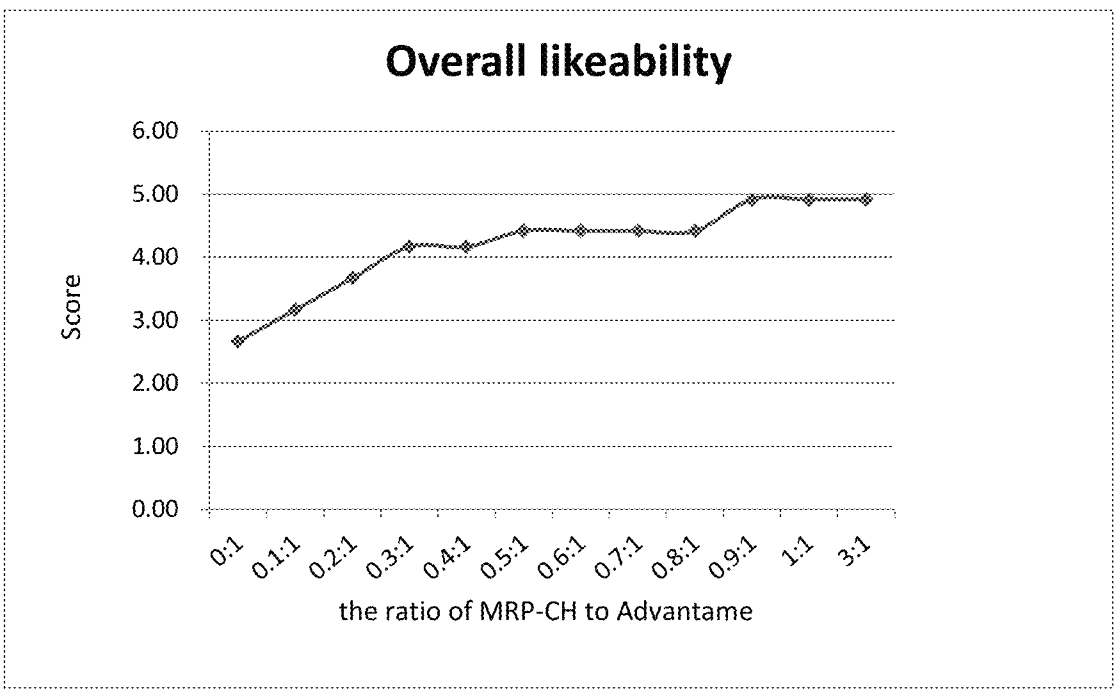

FIG. 257 depicts the relationship between the overall likeability results to the ratio of MRP-CH to Advantame.

Figure 258:
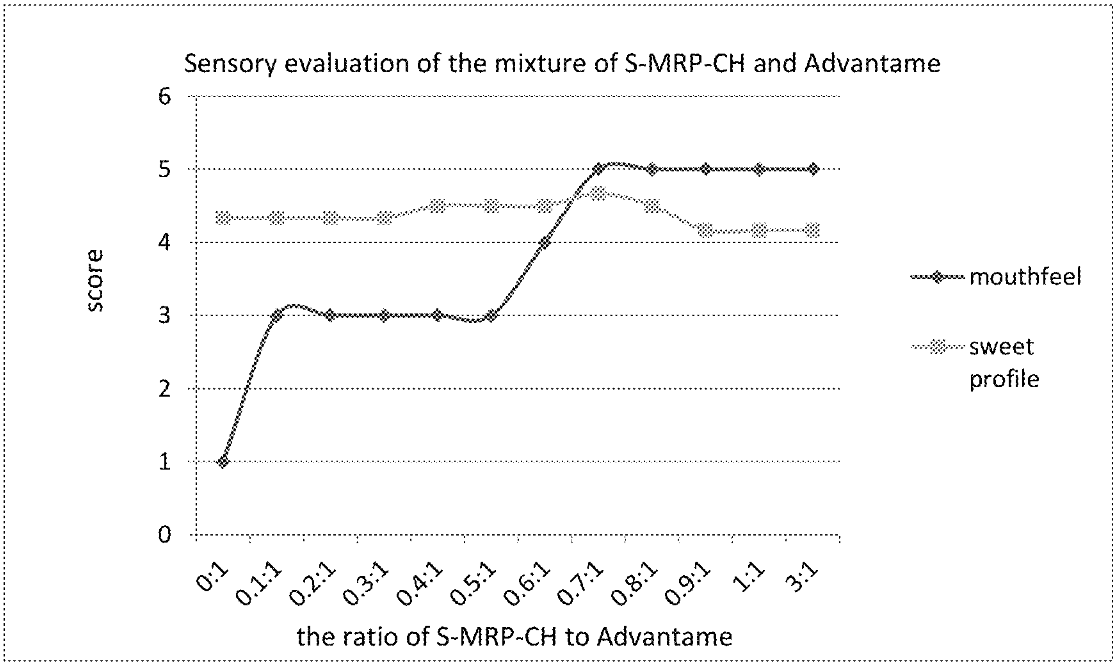

FIG. 258 depicts the relationship between the sensory evaluation results to the ratio of S-MRP-CH to Advantame.

Figure 259:
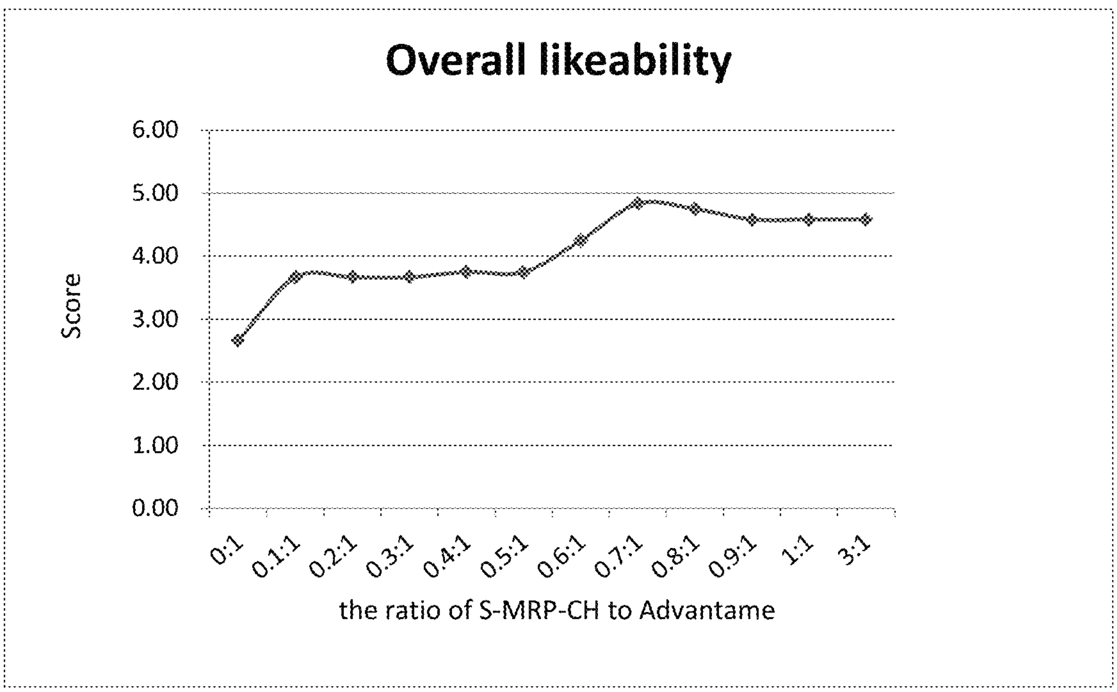

FIG. 259 depicts the relationship between the overall likeability results to the ratio of S-MRP-CH to Advantame.

Figure 260:
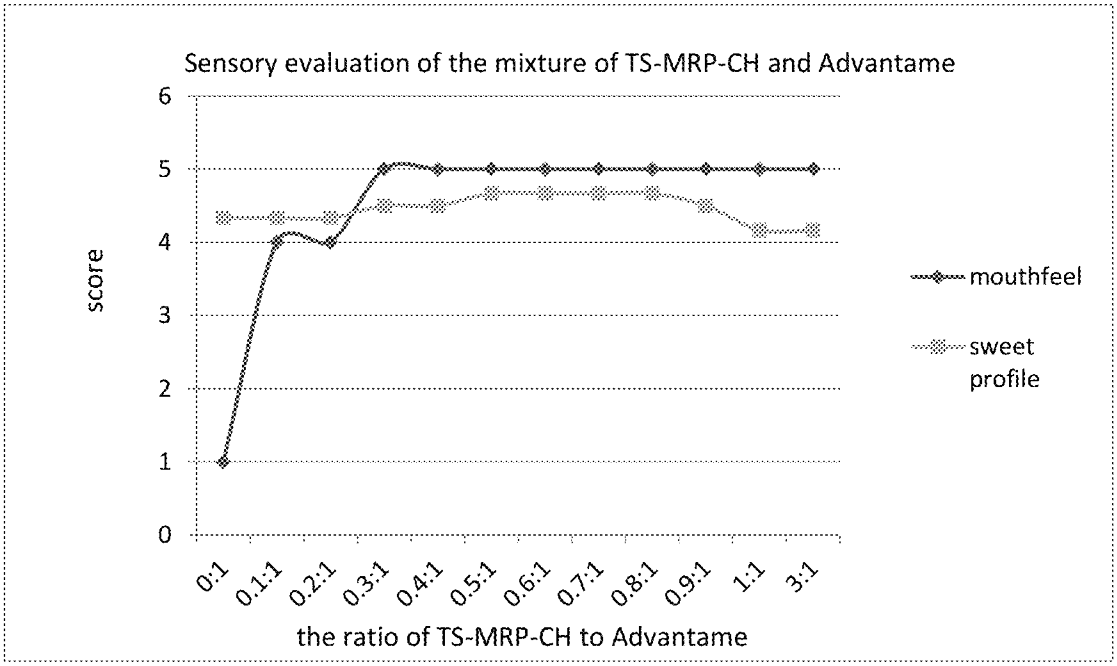

FIG. 260 depicts the relationship between the sensory evaluation results to the ratio of TS-MRP-CH to Advantame.

Figure 261:
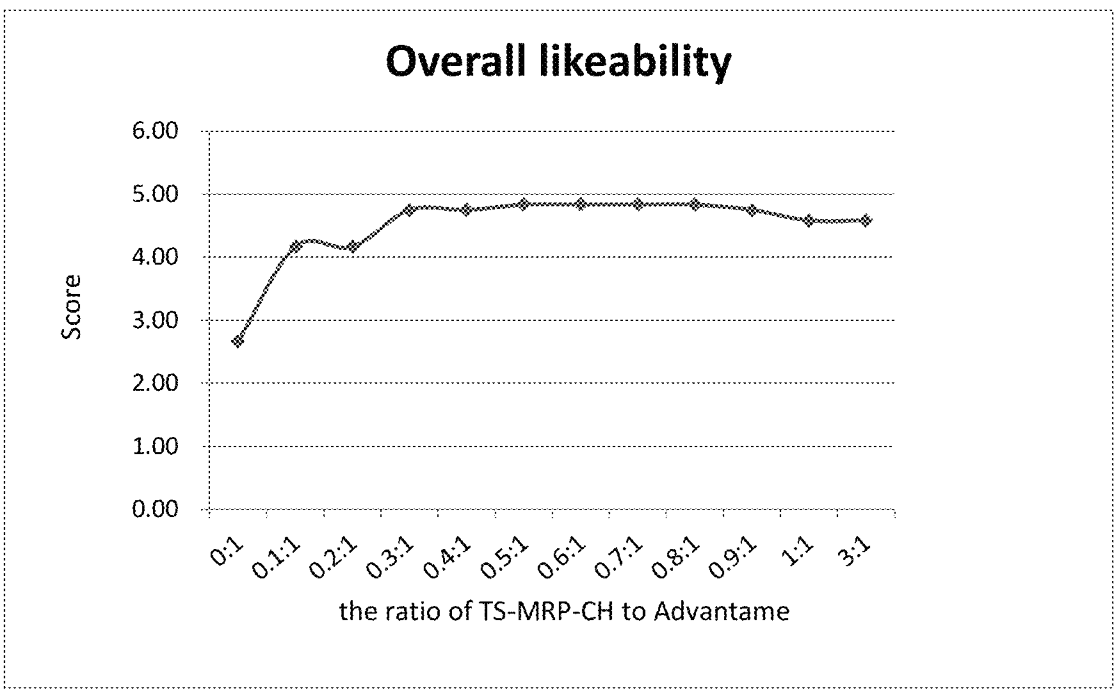
Figure 262:
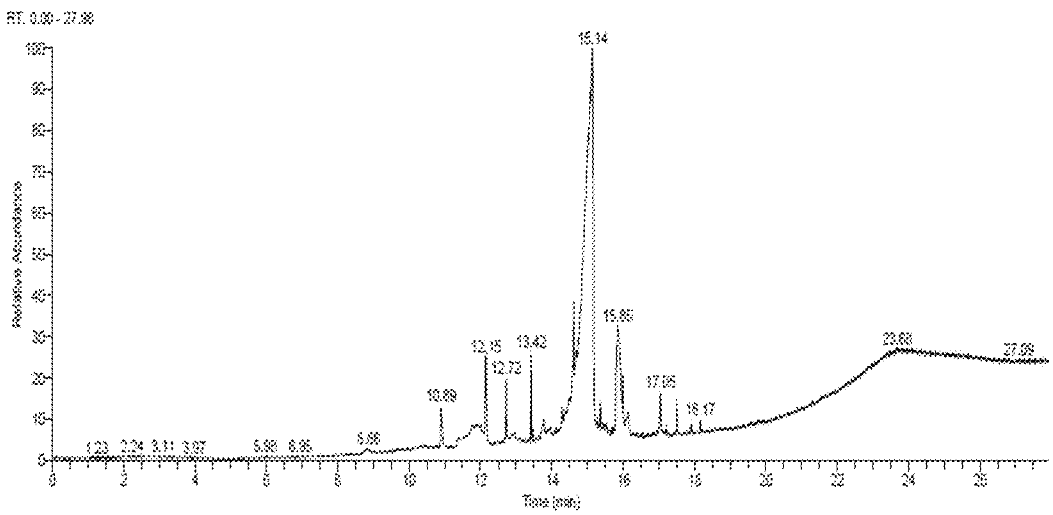

FIG. 261 depicts the relationship between the overall likeability results to the ratio of TS-MRP-CH to Advantame, FIG. 262 depicts the GC/MS spectra of standard MRP-CI.

Figure 263:
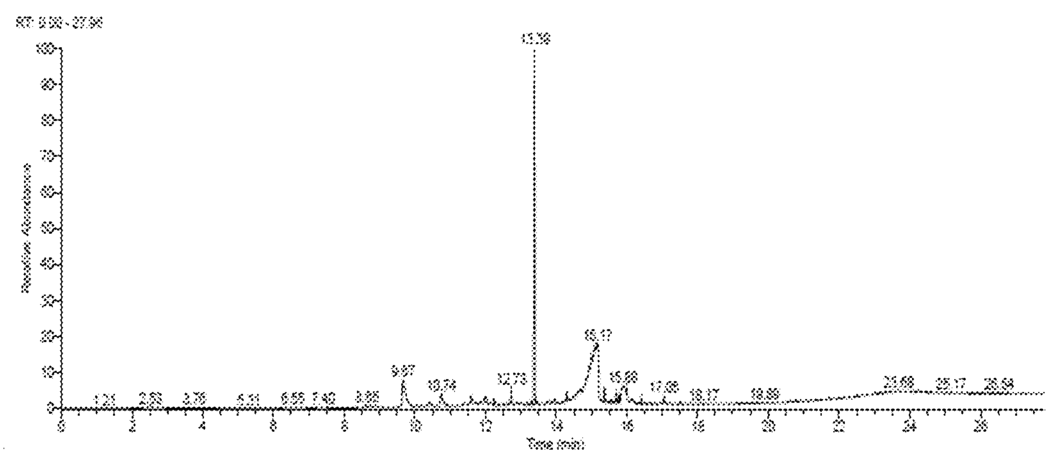

FIG. 263 depicts the GC/MS spectra of CSE.

Figure 264:
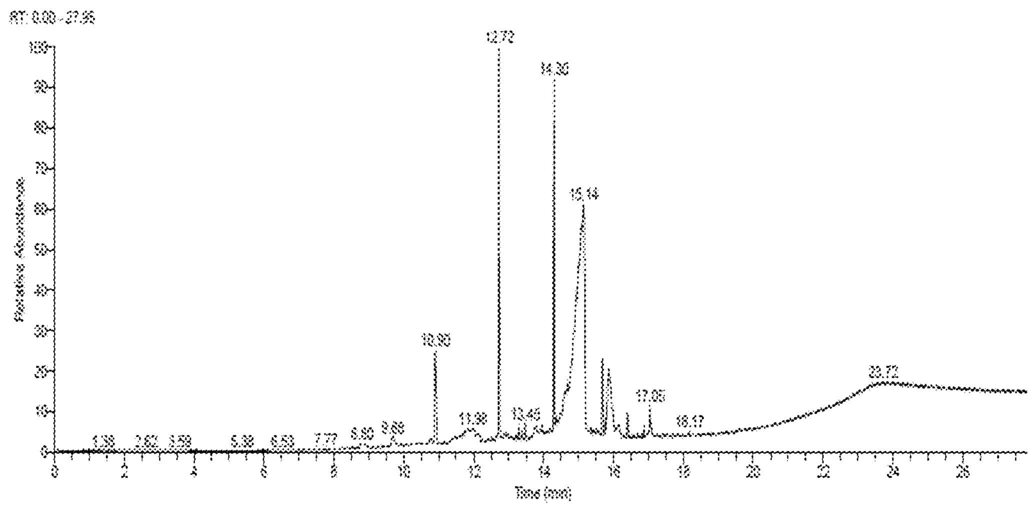

FIG. 264 depicts the GC/MS spectra of RCSE.

Figure 265:
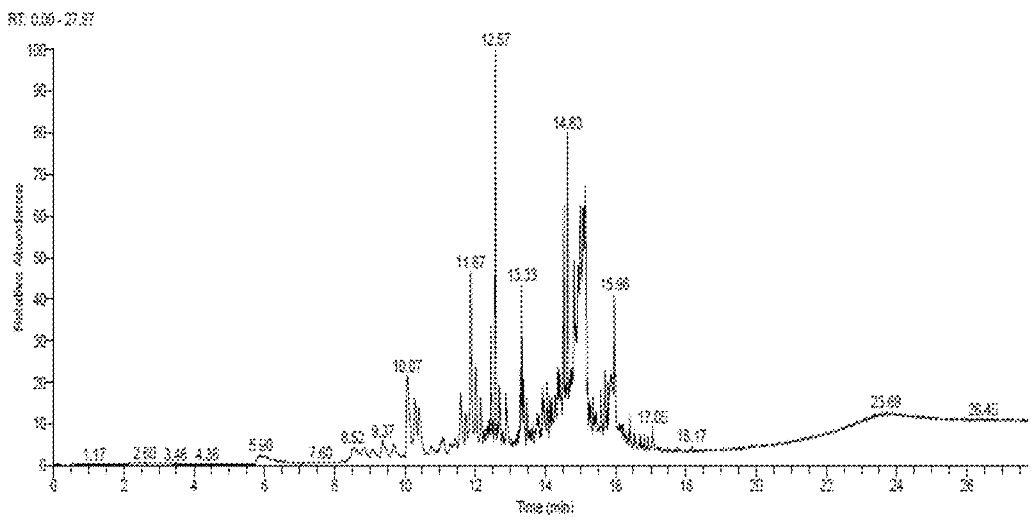

FIG. 265 depicts the GC/MS spectra of RCSE-MRP-CI.

Figure 266:
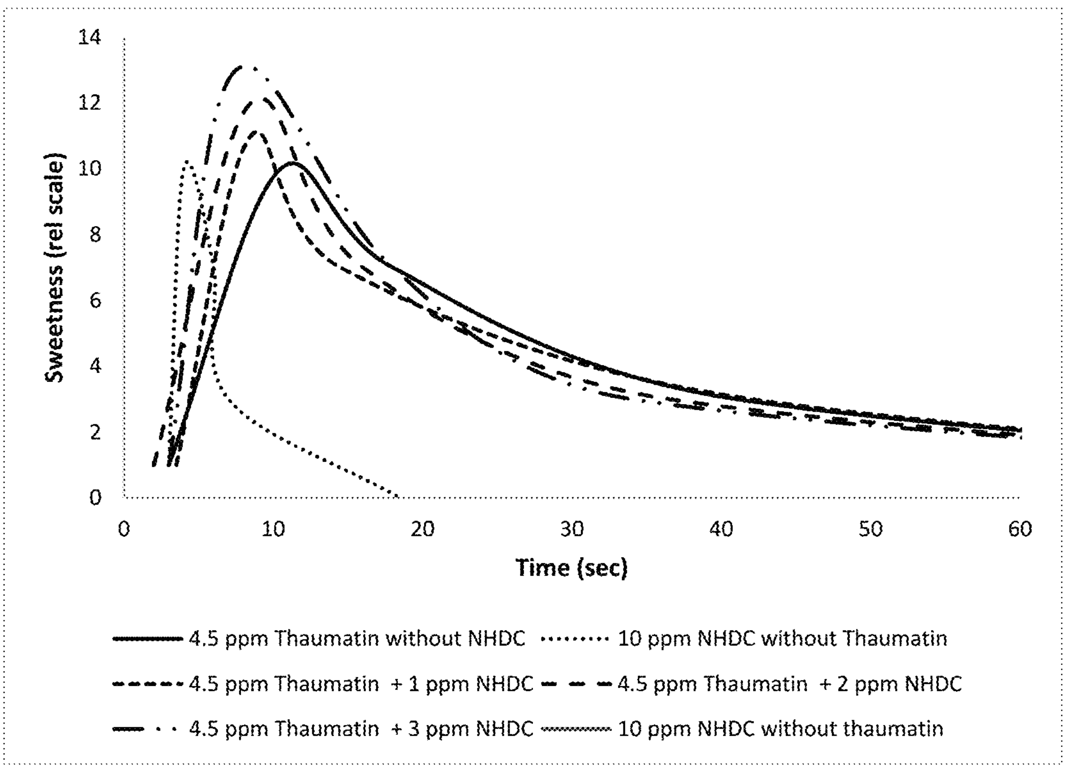

FIG. 266 depicts a graphical representation of the time/intensity profile of NHDC and thaumatin and combinations thereof.

Figure 267:
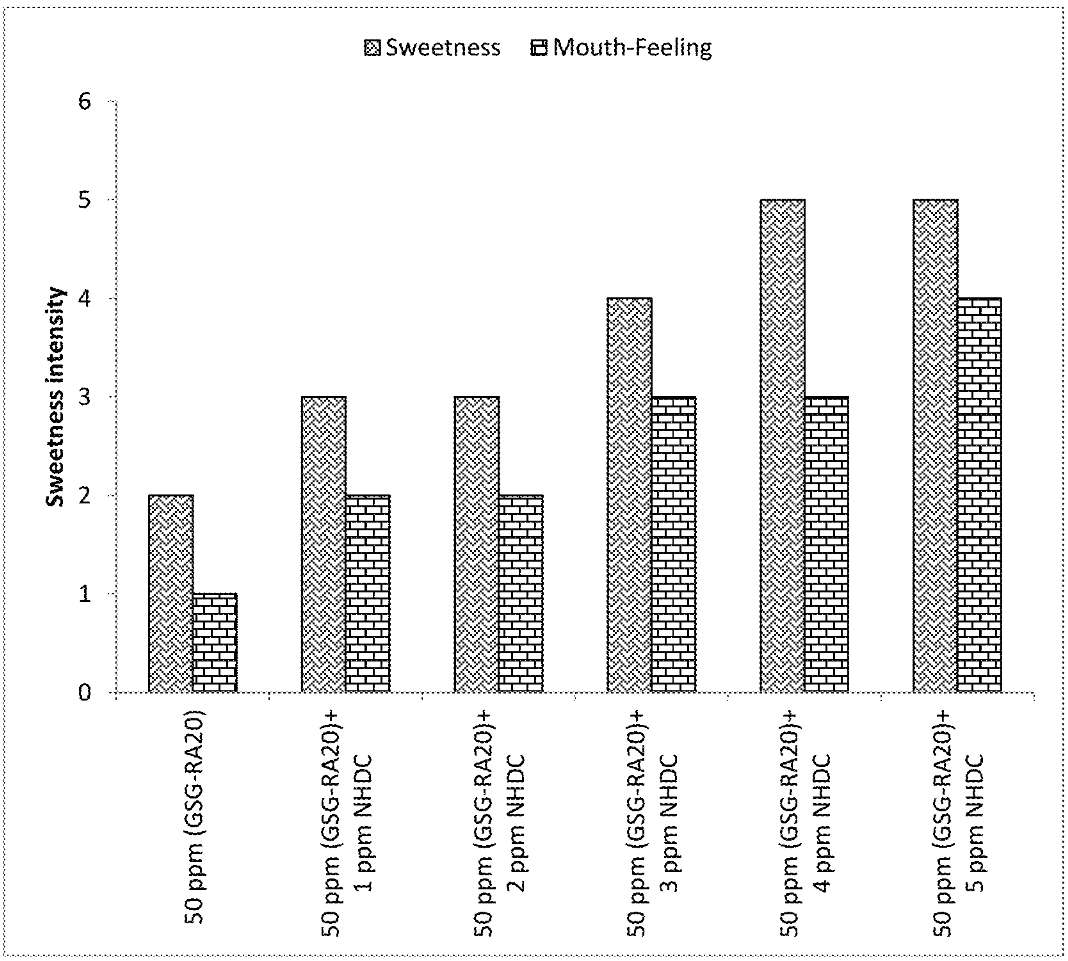

FIG. 267 depicts a graphical representation of sweetness intensity and mouth-feel of combinations with NHDC and Combination of GSGs and SGs.

Figure 268:
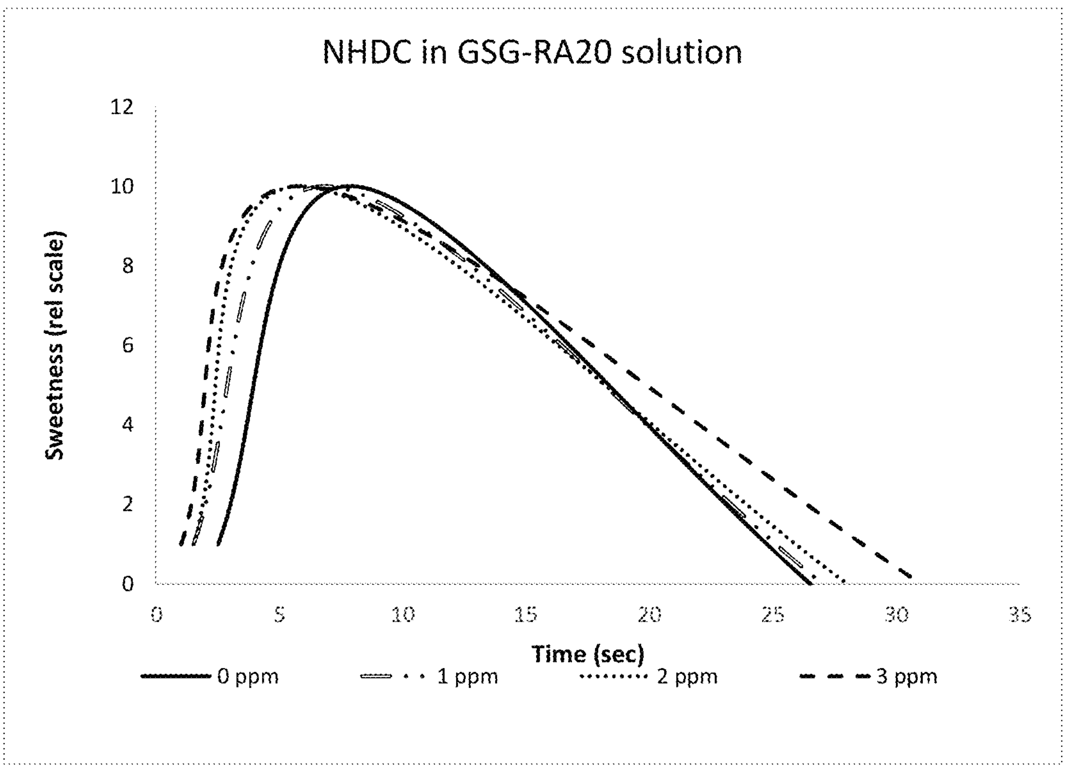

FIG. 268 depicts a graphical representation of time/intensity profile of combinations with NHDC and Combination of GSGs and SGs.

Figure 269:
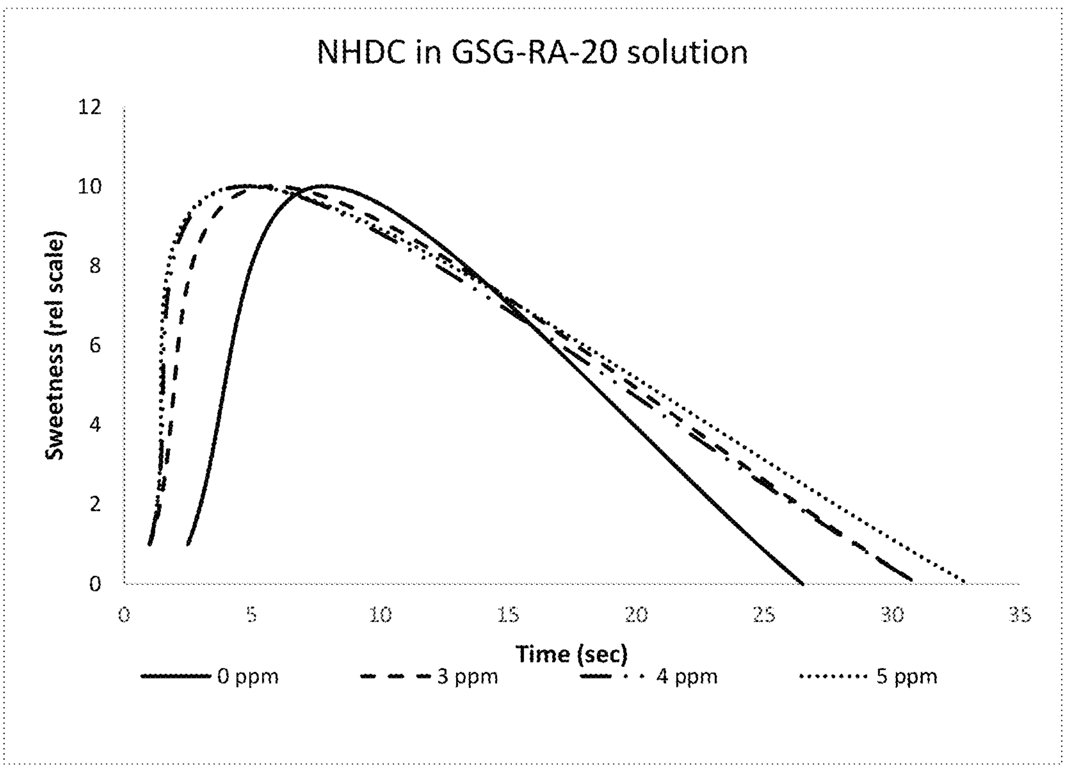

FIG. 269 depicts a graphical representation of time/intensity profile of combinations with NHDC and Combination of GSGs and SGs.

Figure 270:
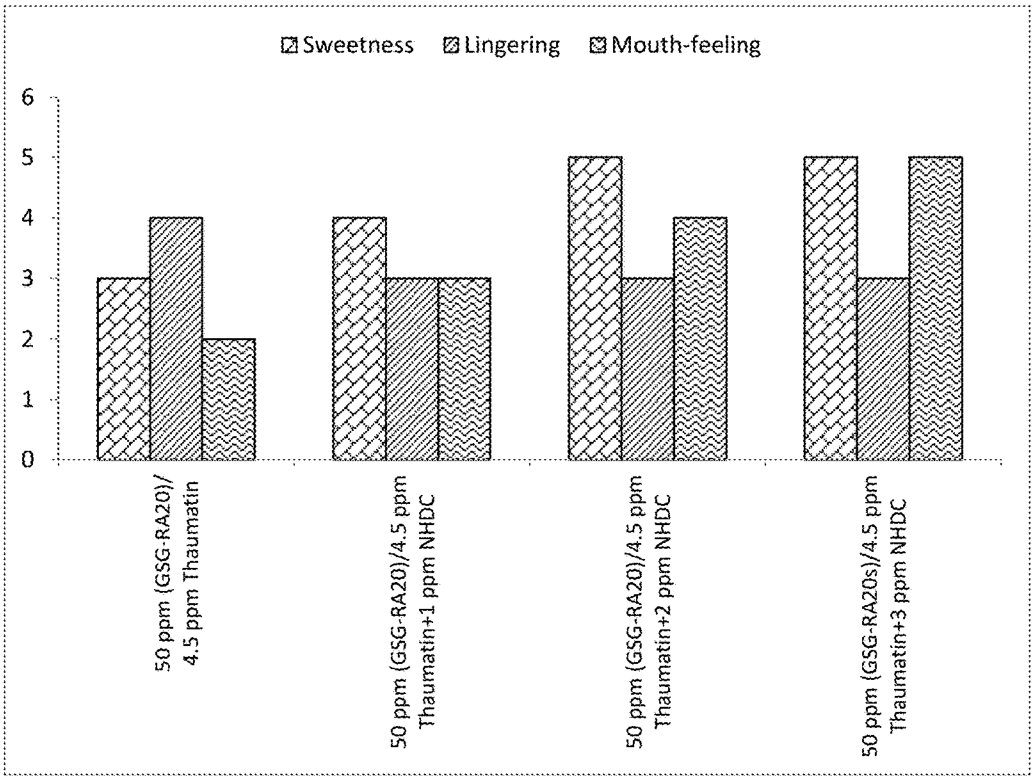
Figure 271:
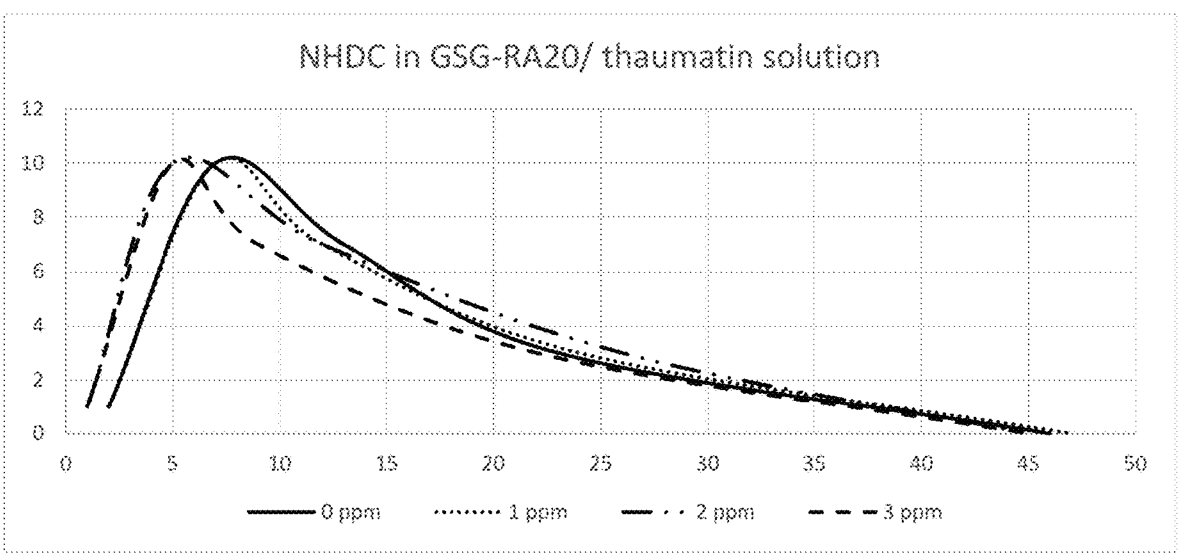

FIG. 270 depicts a graphical representation of the sweetness intensity, lingering and mouth-feel of combinations with NHDC and Combination of GSGs and SGs/EPCalin, FIG. 271 depicts a graphical representation of the time/intensity profile of combinations with NHDC and Combination of GSGs and SGs/EPCalin.

Figure 272:
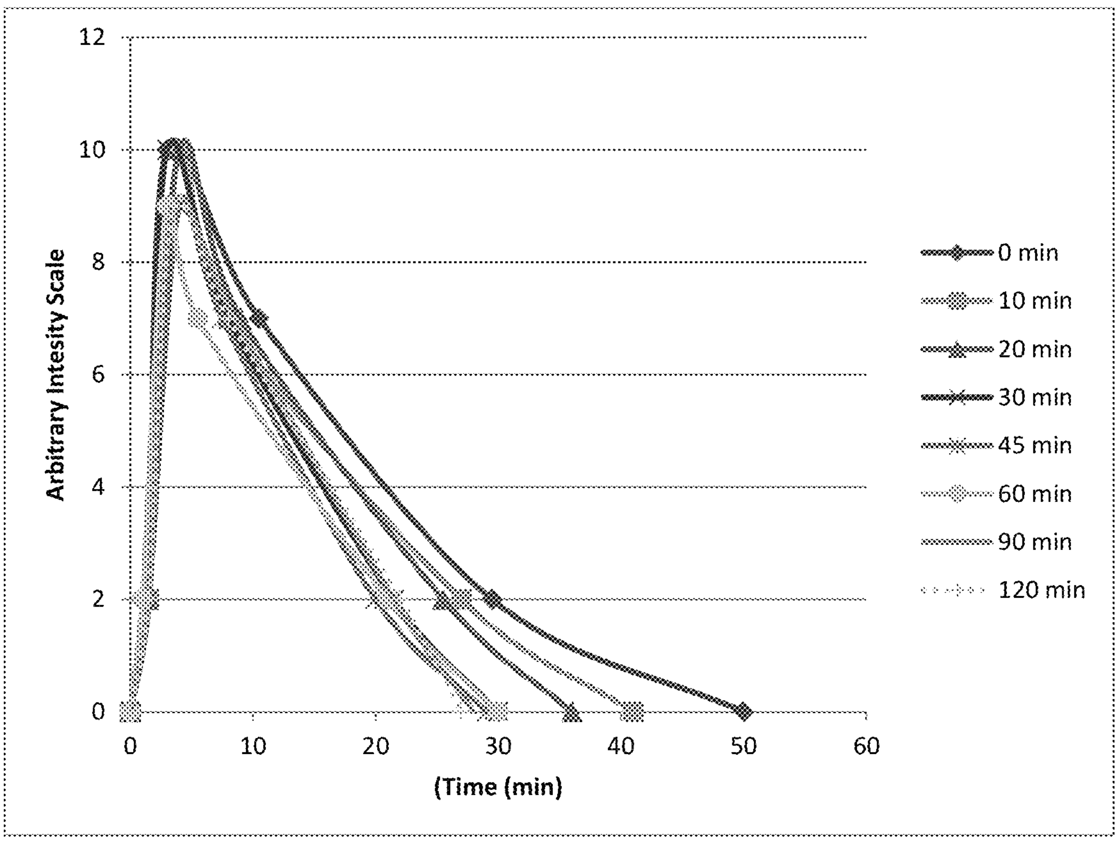

FIG. 272 depicts a graphical description of a Summary View of the sweetness time/intensity profile of the *Stevia*-derived MRP samples with thaumatin in place of an amino acid.

Figure 273:
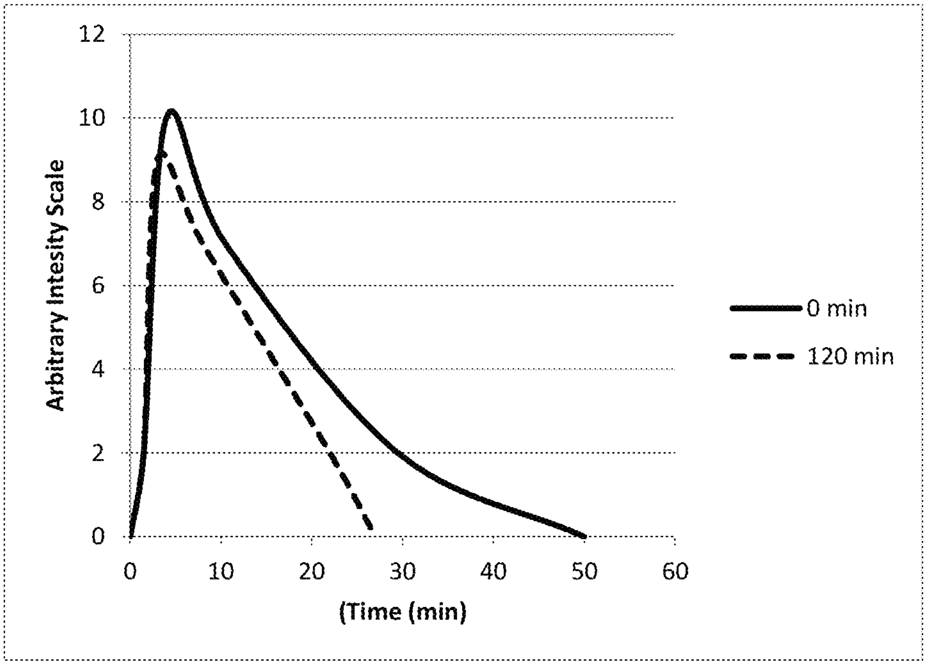

FIG. 273 depicts a graphical description of the sweetness time/intensity profile of the *Stevia*-derived MRP samples with thaumatin in place of an amino acid for selected heating times.

Figure 274:
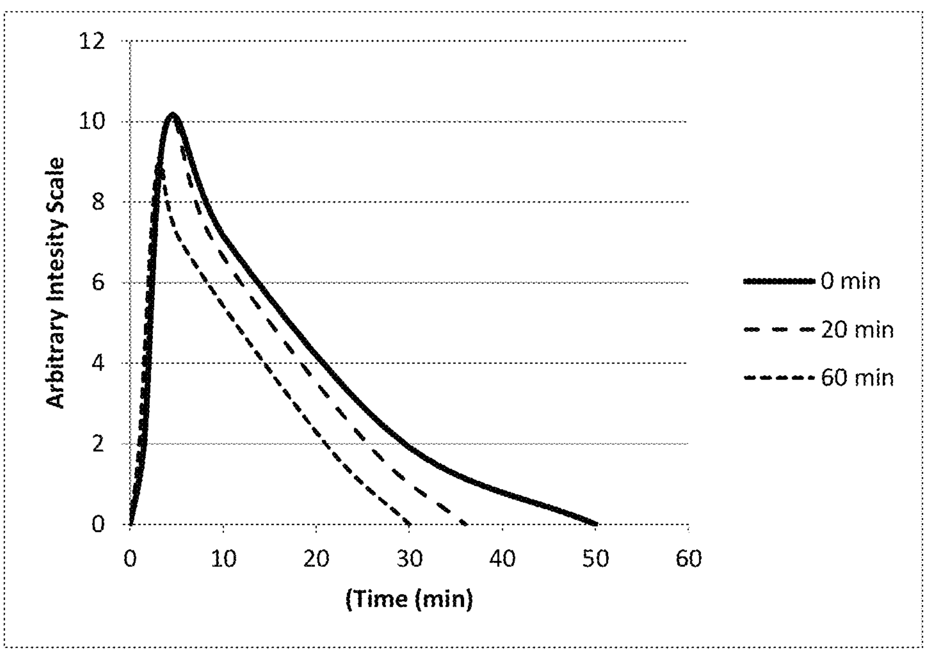

FIG. 274 depicts a graphical description of the sweetness time/intensity profile of the *Stevia*-derived MRP samples with thaumatin in place of an amino acid for selected heating times.

Figure 275:
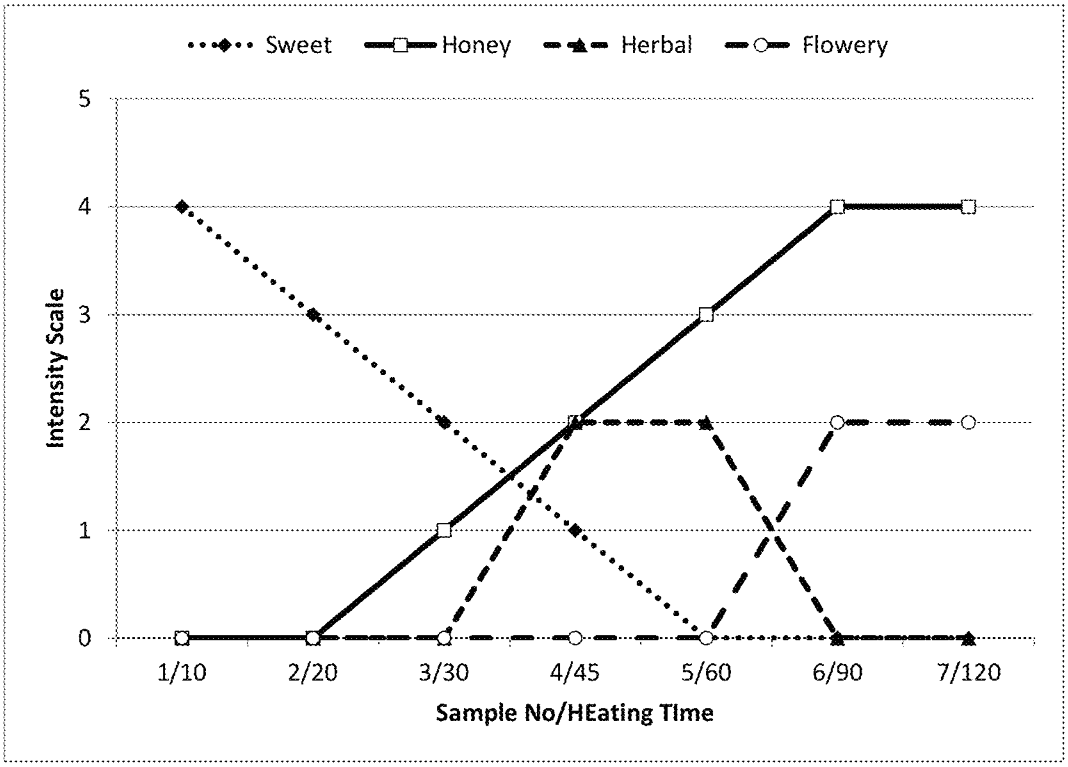

FIG. 275 depicts a graphical description of the sensory test results for the flavor (odor) of *Stevia*-derived MRPs (Lys/Fru/Zo) with increased heating time.

Figure 276:
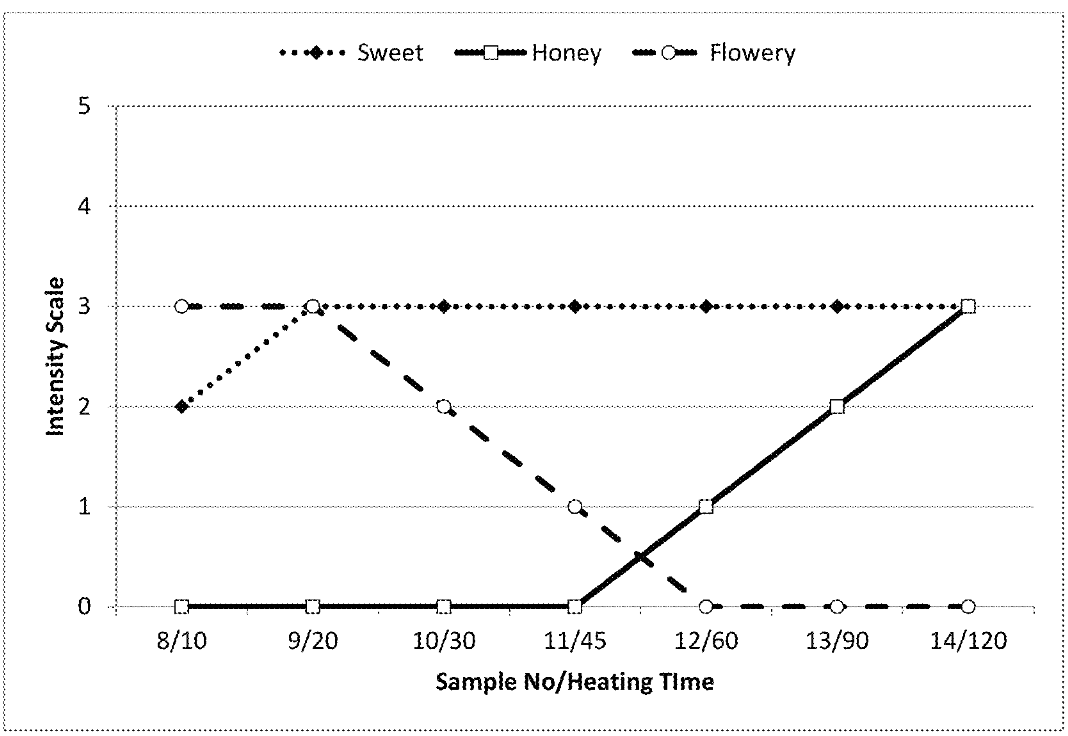

FIG. 276 depicts a graphical description of the sensory test results for the flavor (odor) of *Stevia*-derived MRPs (Lys/Xyl/Zo) with increased heating times.

Figure 277:
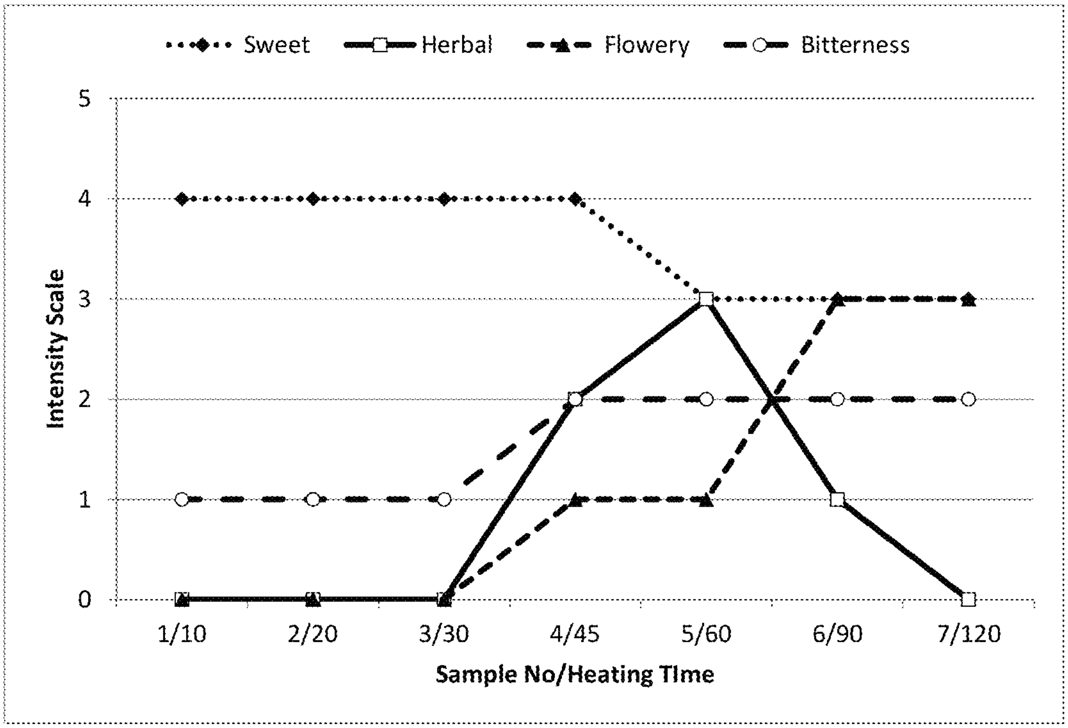

FIG. 277 depicts a graphical description of sensory test results for the taste of *Stevia*-derived MRPs (Lys/Fru/Zo) with increased heating time.

Figure 278:
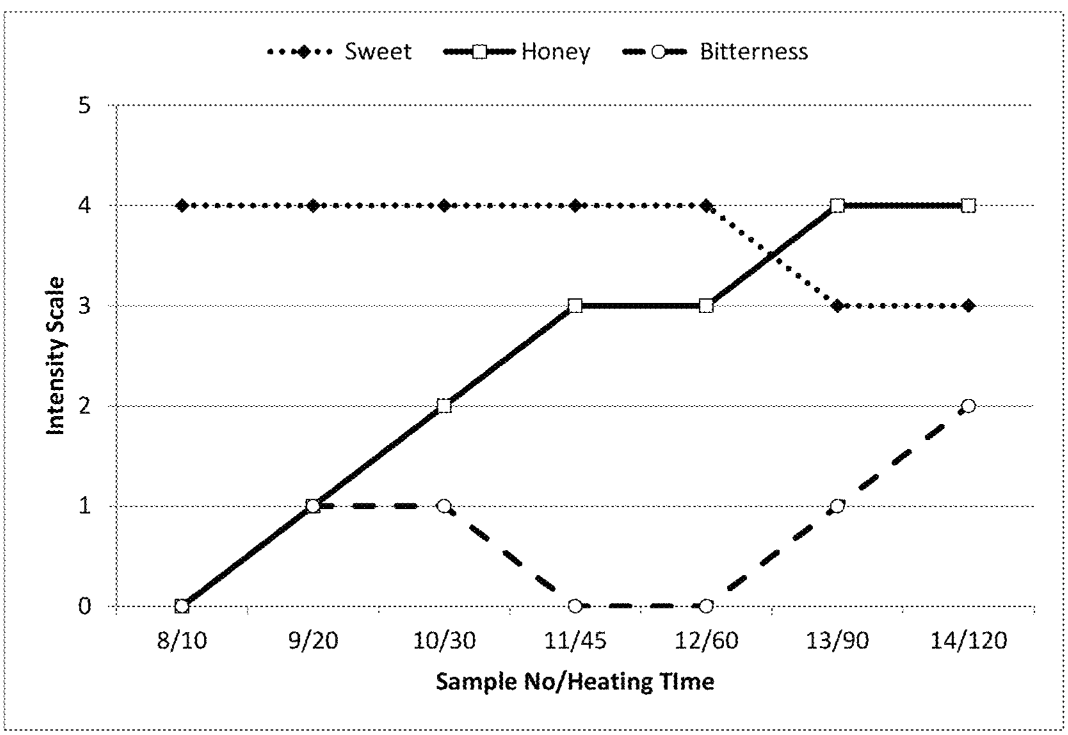

FIG. 278 depicts a graphical description of sensory test results for the taste of *Stevia*-derived MRPs (Lys/Xyl/Zo) with increased heating times.

Figure 279:
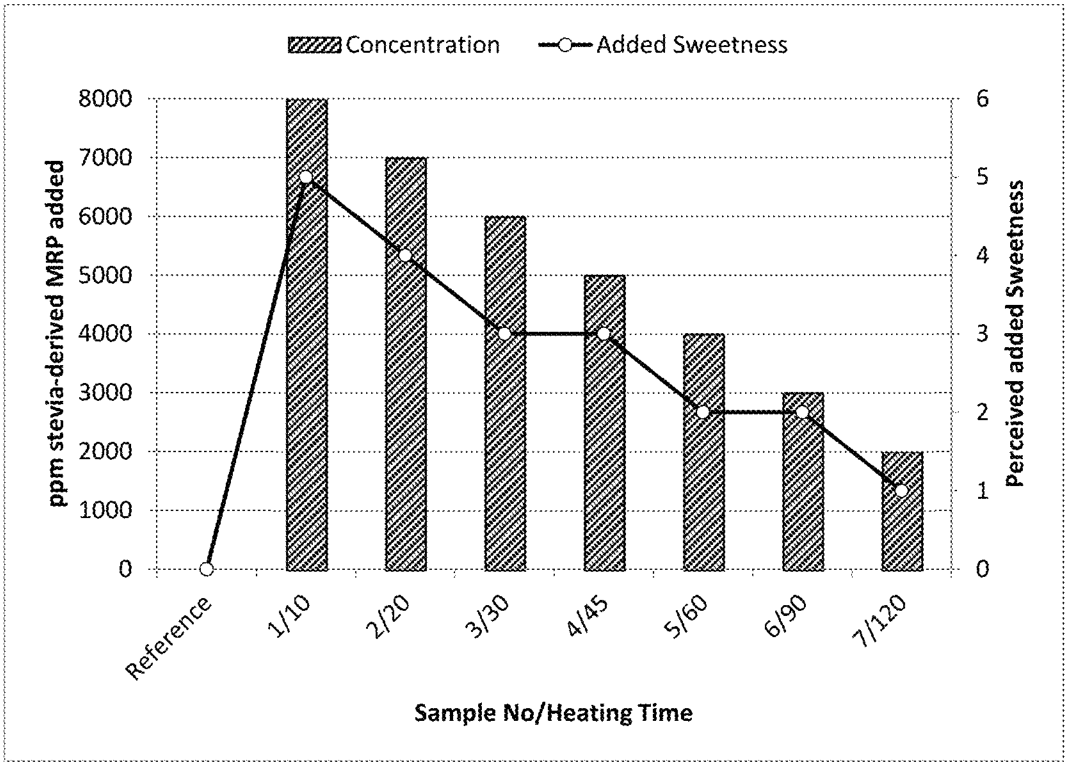

FIG. 279 depicts a comparison of added amounts of *Stevia*-derived MRPs (Lys/Fru/ZO) with different heating times and the perceived added sweetness.

Figure 280:
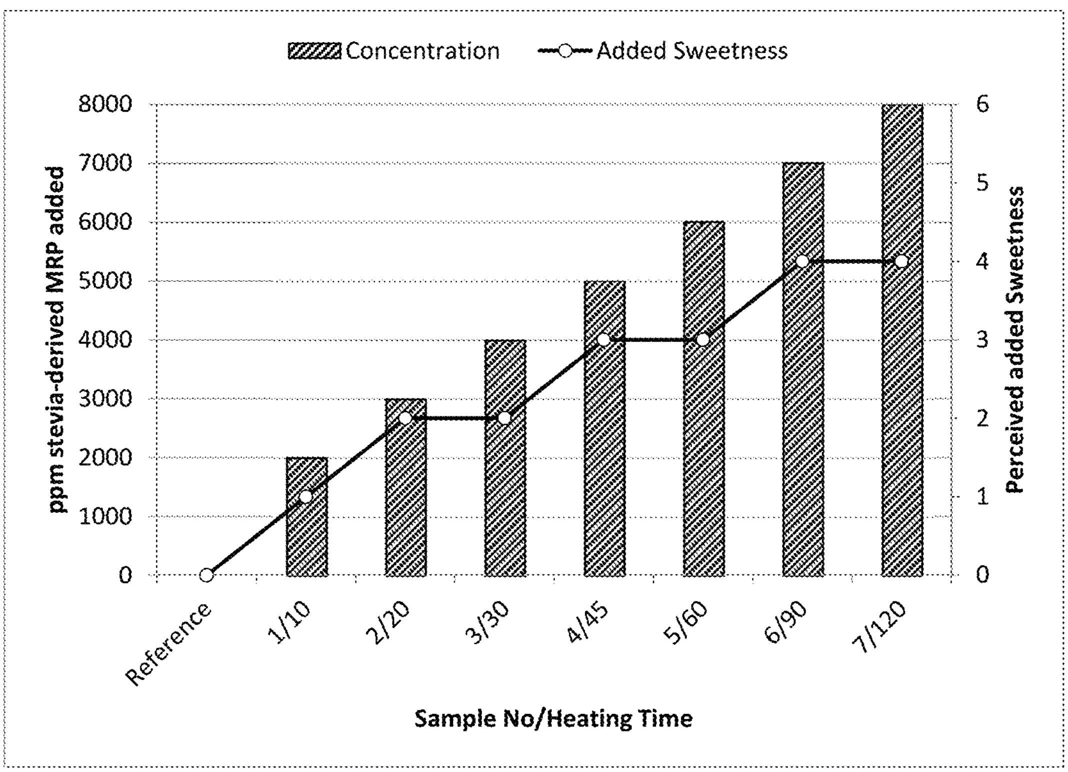

FIG. 280 depicts a comparison of added amounts of *Stevia*-derived MRPs (Lys/Fru/ZO) with different heating times and the perceived added sweetness.

Figure 281:
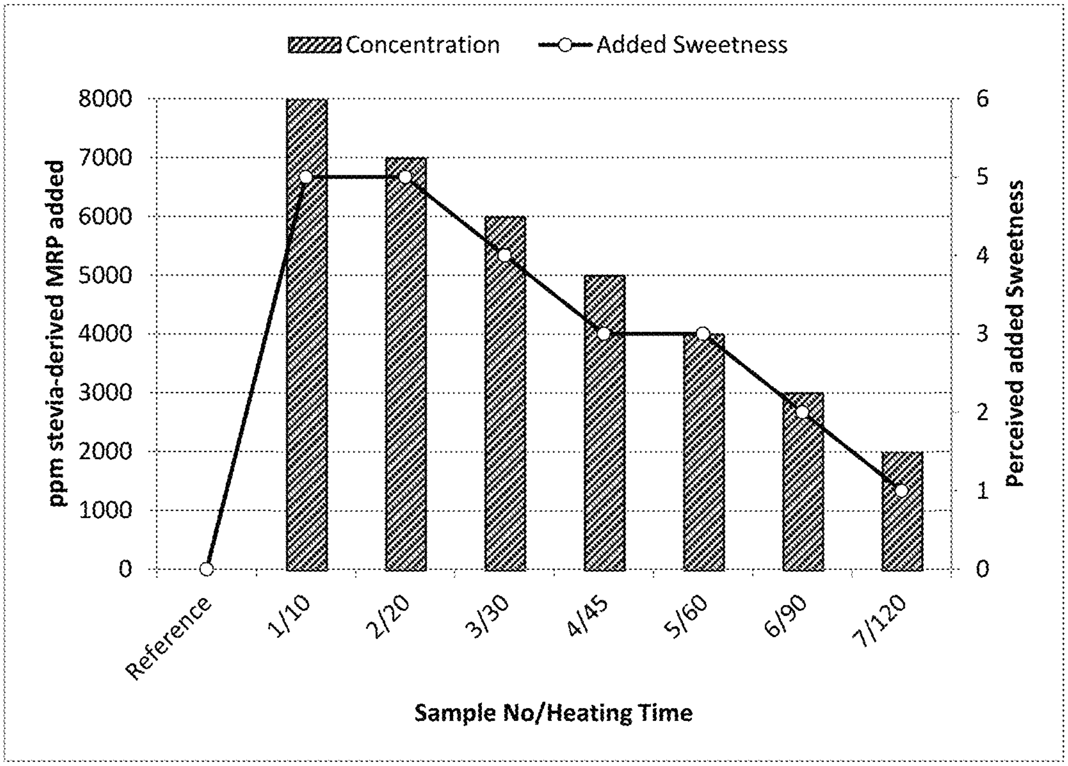

FIG. 281 depicts a comparison of added amounts of *Stevia*-derived MRPs (Lys/Xyl/ZO) with different heating times and the perceived added sweetness.

Figure 282:
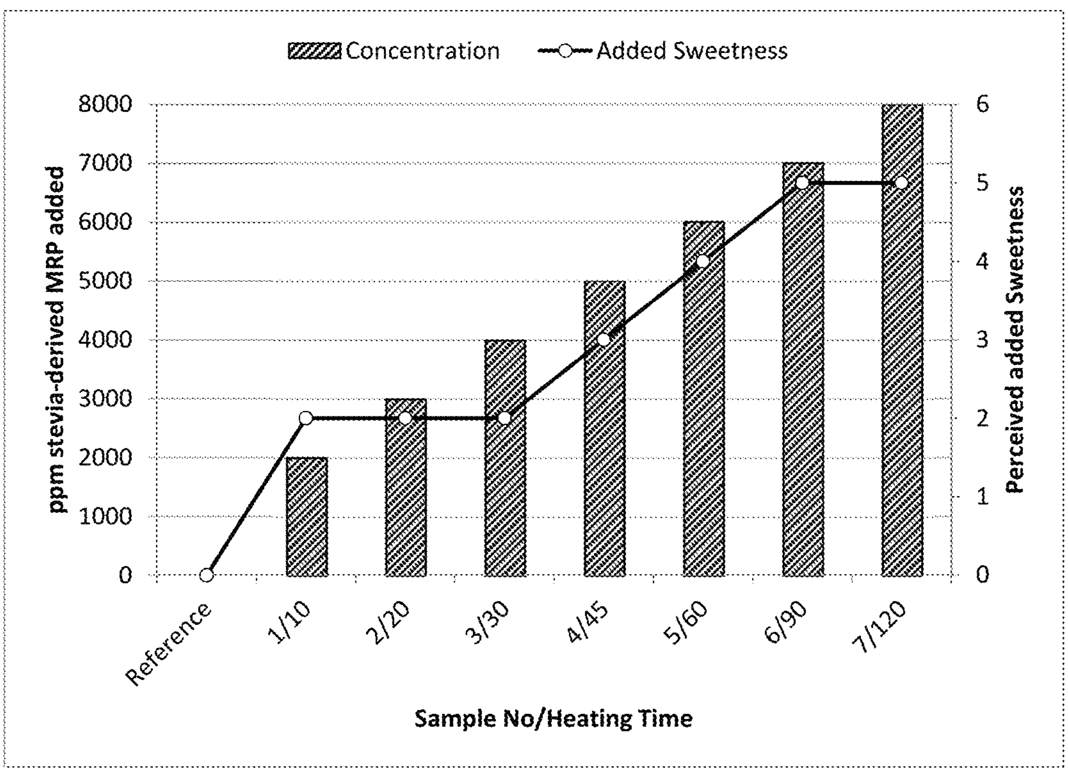

FIG. 282 depicts a comparison of added amounts of *Stevia*-derived MRPs (Lys/Xyl/ZO) with different heating times and the perceived added sweetness.

Figure 283:
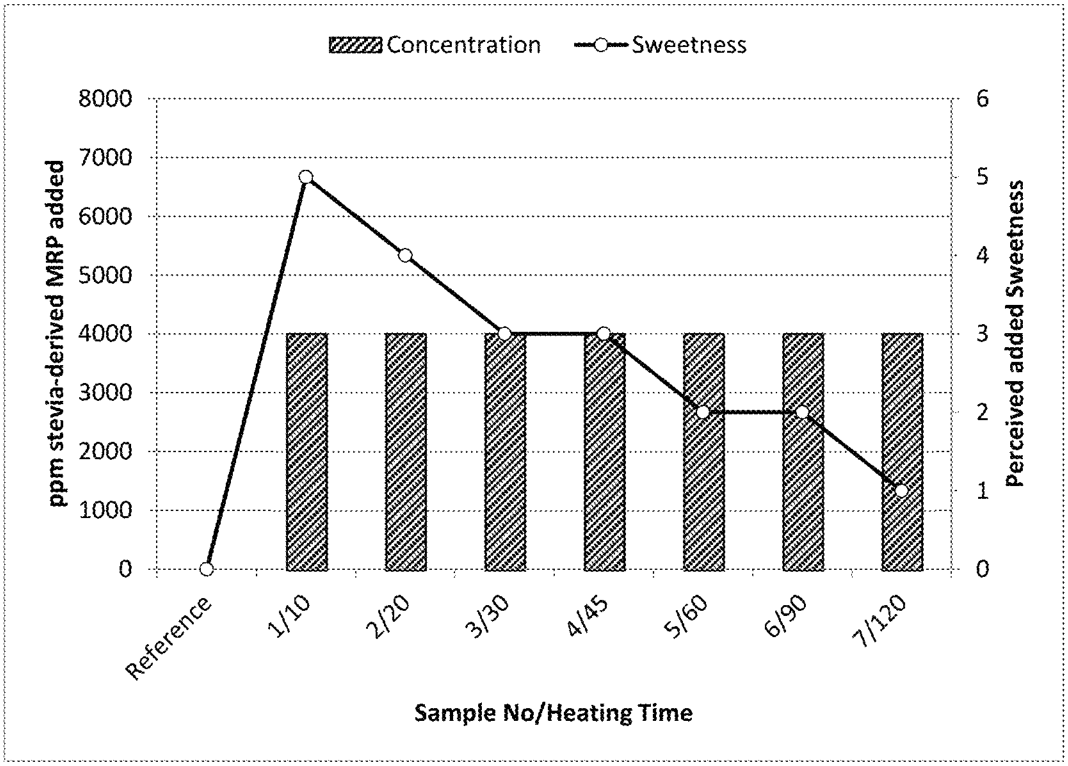

FIG. 283 depicts a comparison of added amounts of *Stevia*-derived (Lys/Fru/ZO) with different heating times and the perceived added sweetness.

Figure 284:
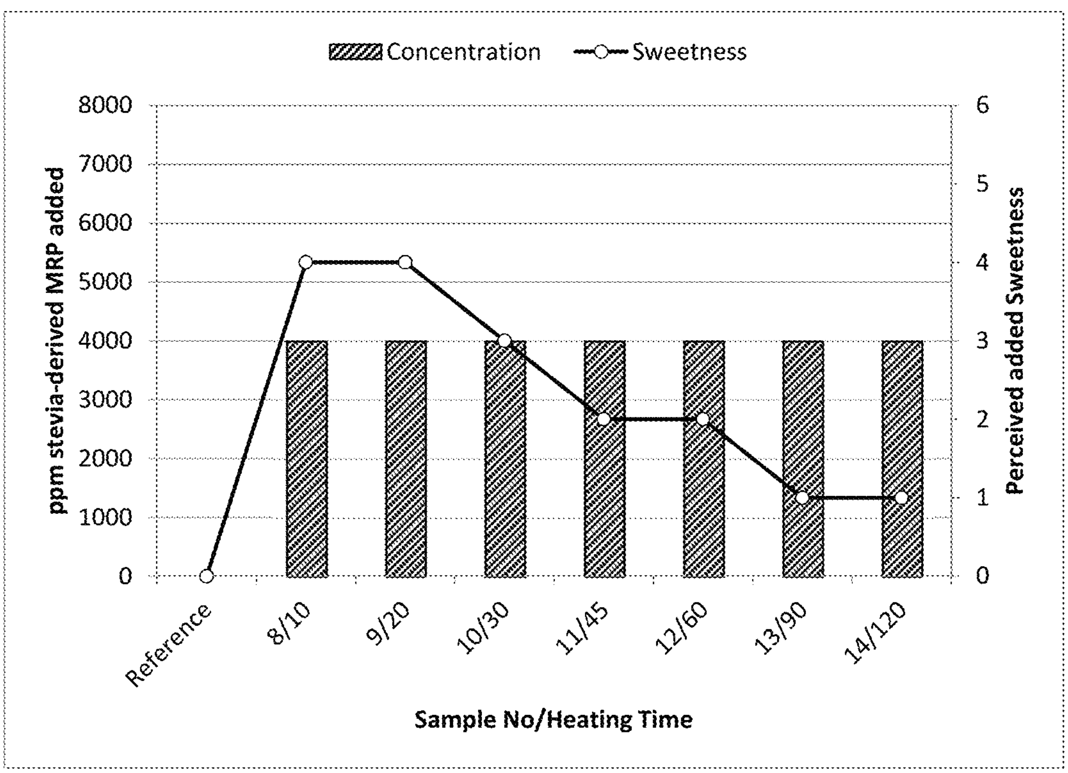

FIG. 284 depicts a comparison of added amounts of *Stevia*-derived MRPs (Lys/Xyl/ZO) with different heating times and the perceived added sweetness.

Figure 285:
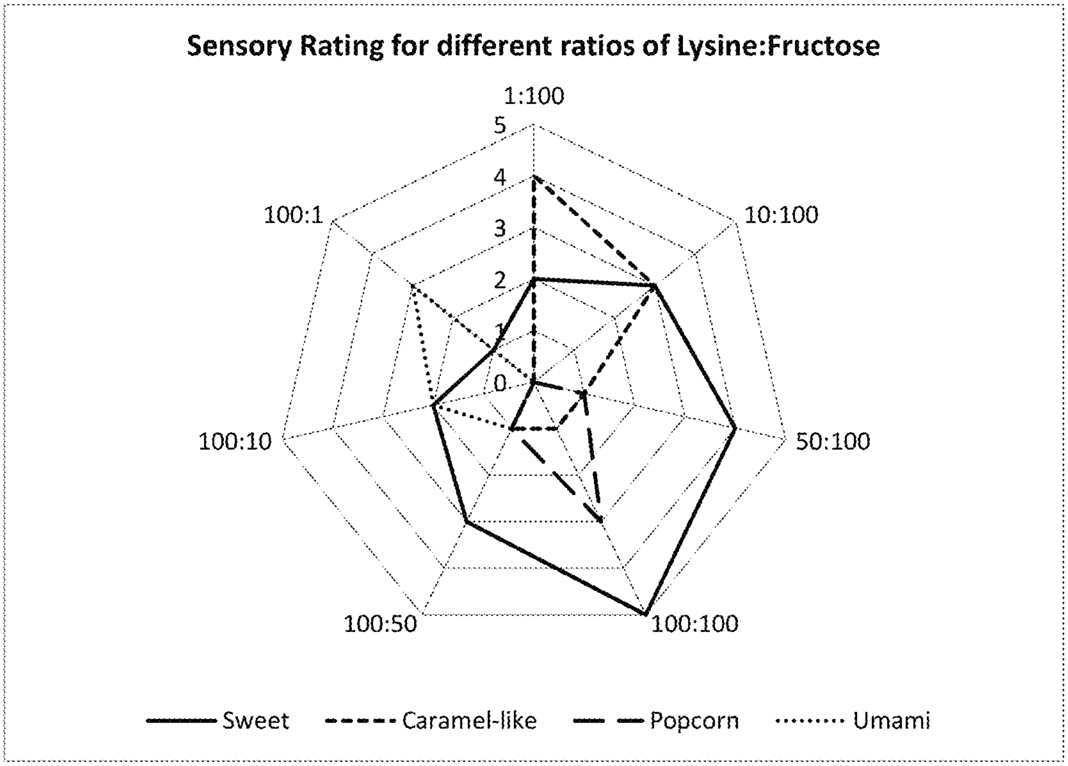

FIG. 285 depicts a graphical representation of sensory test results for varying ratios of lysine:fructose.

Figure 286:
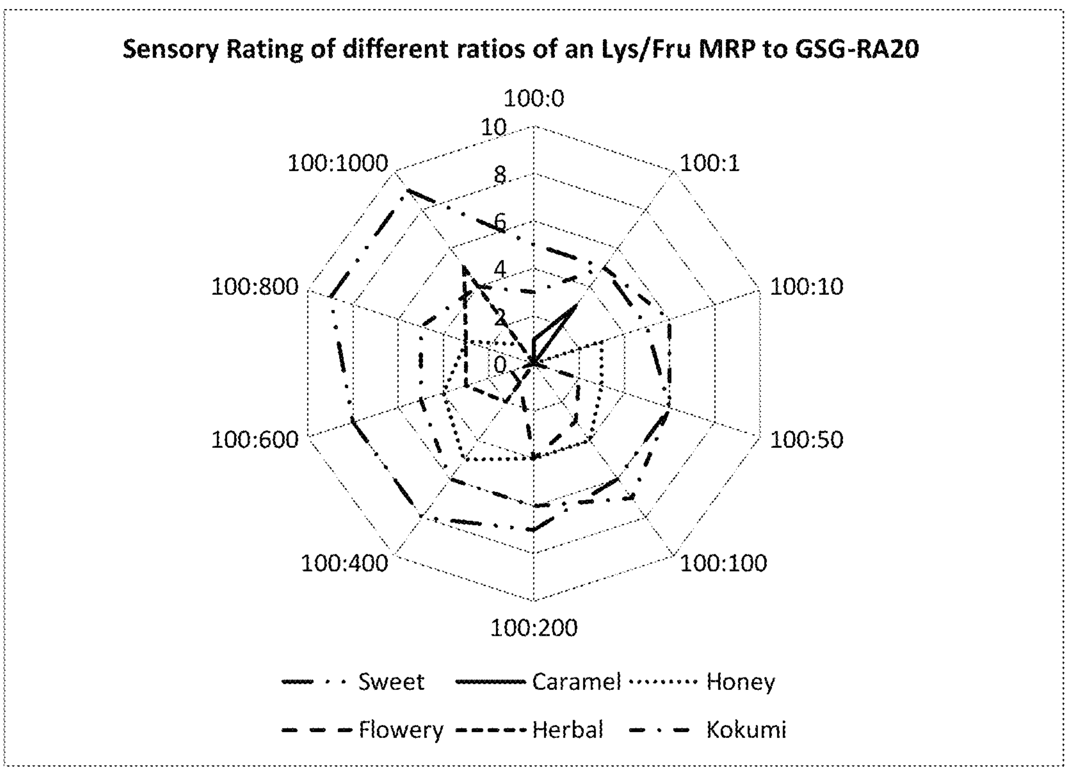

FIG. 286 depicts a graphical representation of sensory test results for varying ratios of SGA (Combination of GSGs and SGs) added to fixed ratio of lysine:fructose.

Figure 287:
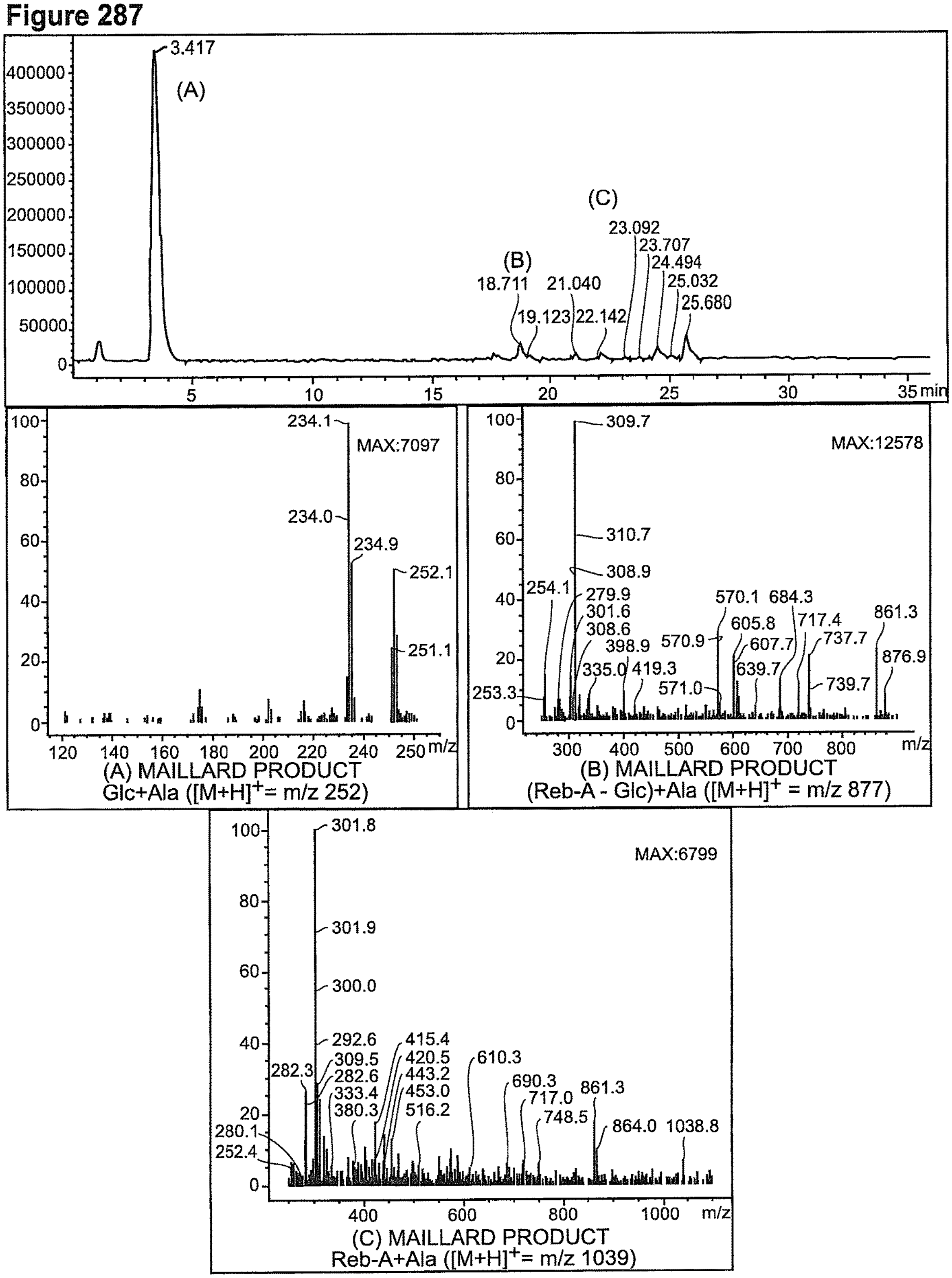

FIG. 287 depicts Chromatogramme (TIC) and Mass spectra for the reaction of Reb-A and Alanine (reflux heating for 4 hours in ethanol).

Figure 288:
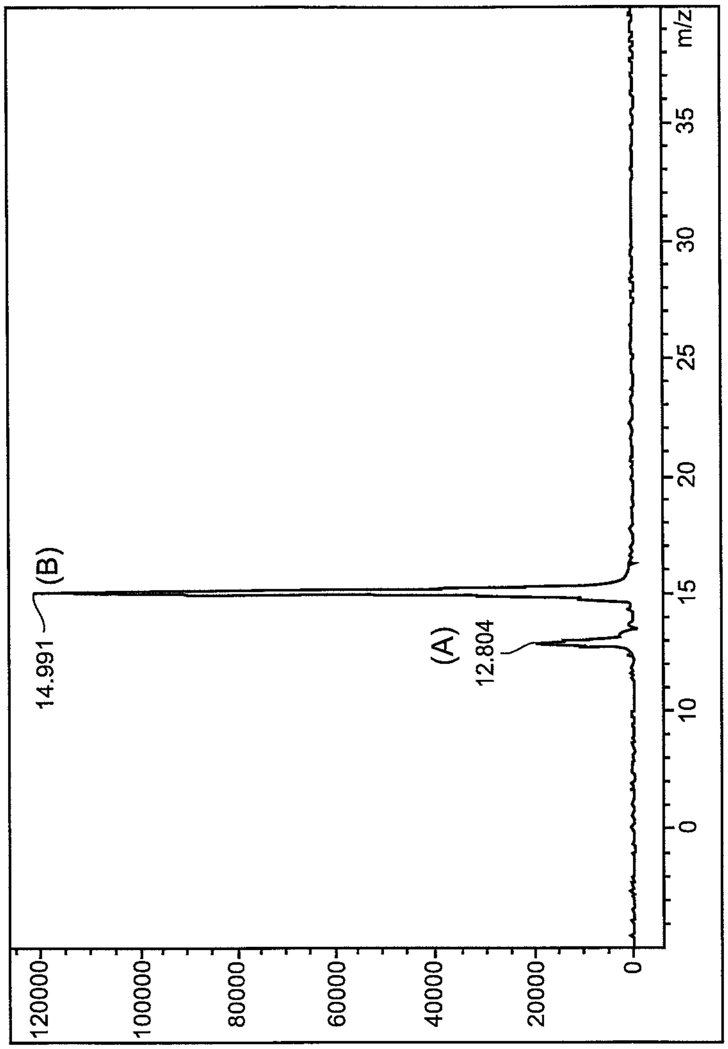
Figure 288:
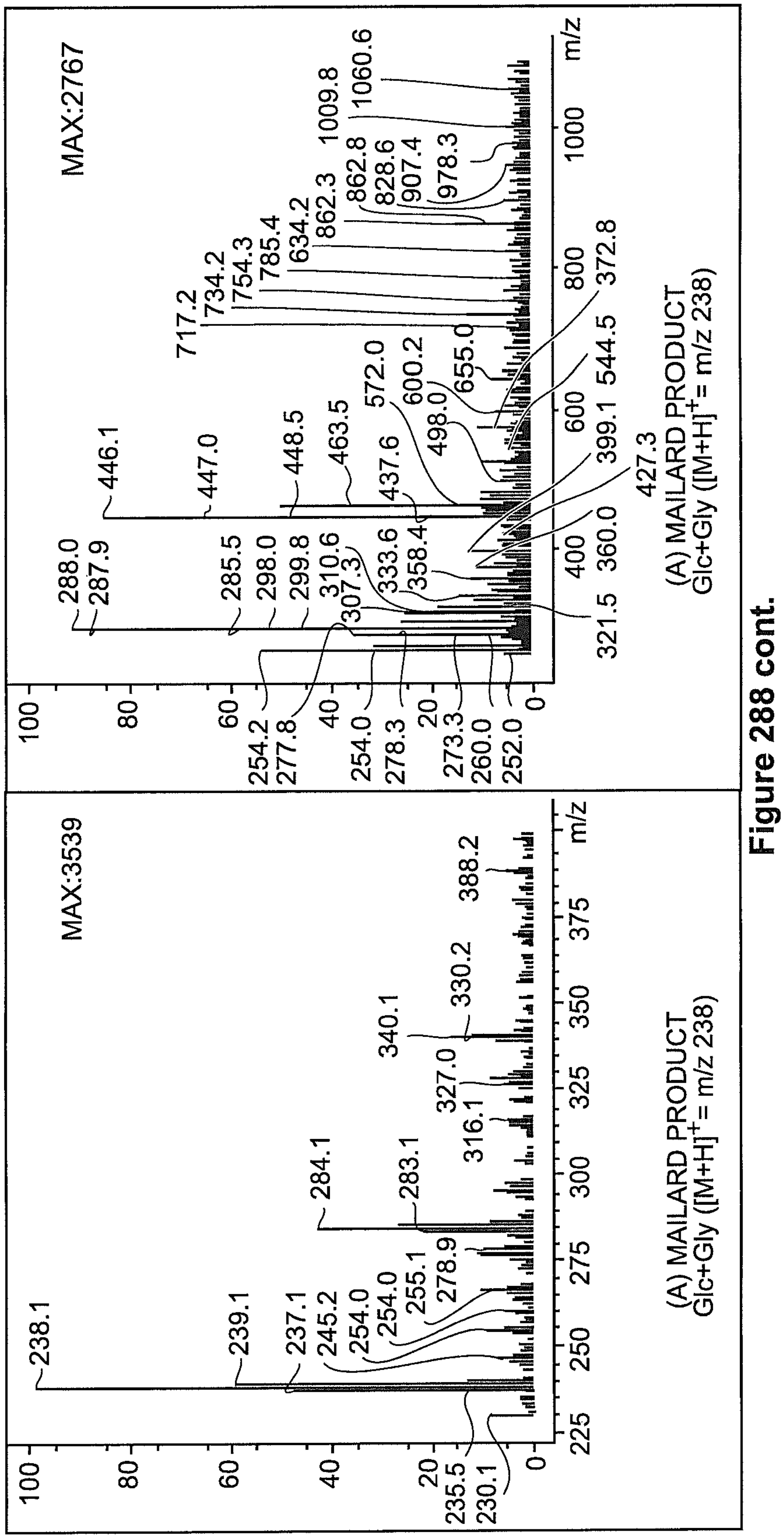

FIG. 288 depicts Chromatogramme (TIC) and Mass spectra for the reaction of Reb-A and Glycine (reflux heating for 4 hours in ethanol).

Figure 289:
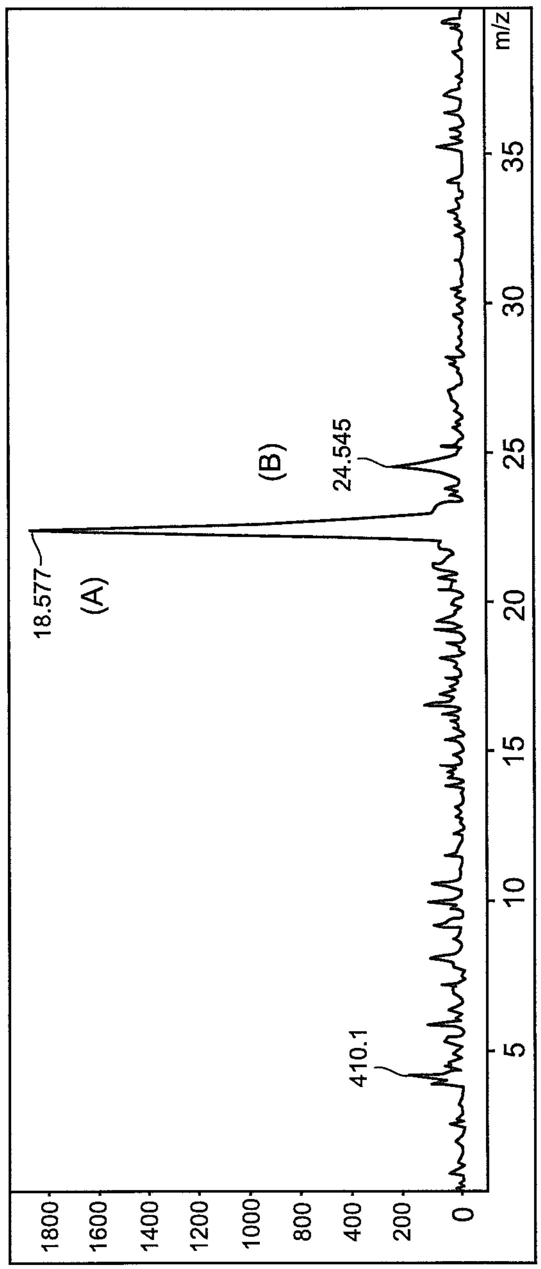
Figure 289:
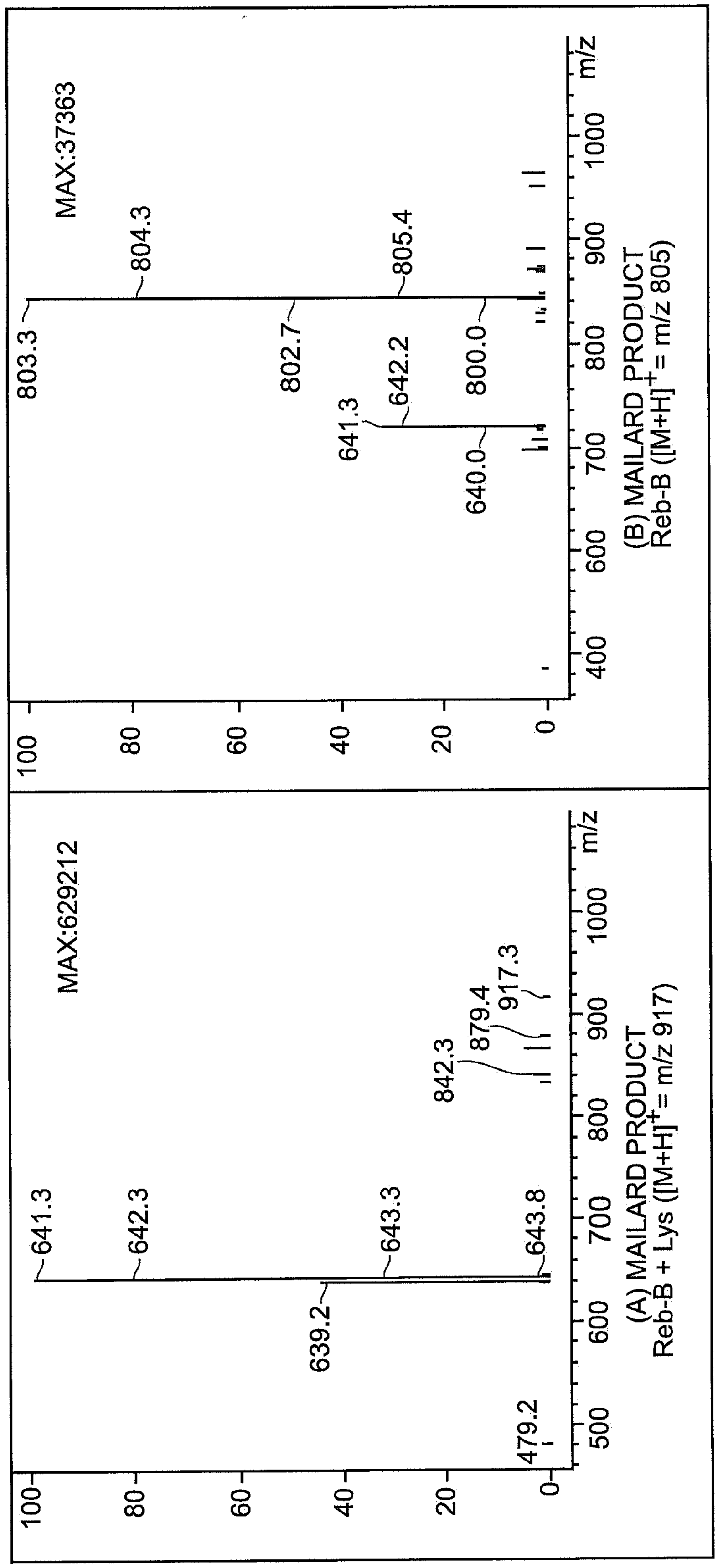

FIG. 289 depicts Chromatogramme (TIC) and Mass spectra for the reaction of Reb-B and Lysine (heating at 90° C. for 2 hours in phosphate buffer, pH=8).

Figure 290:
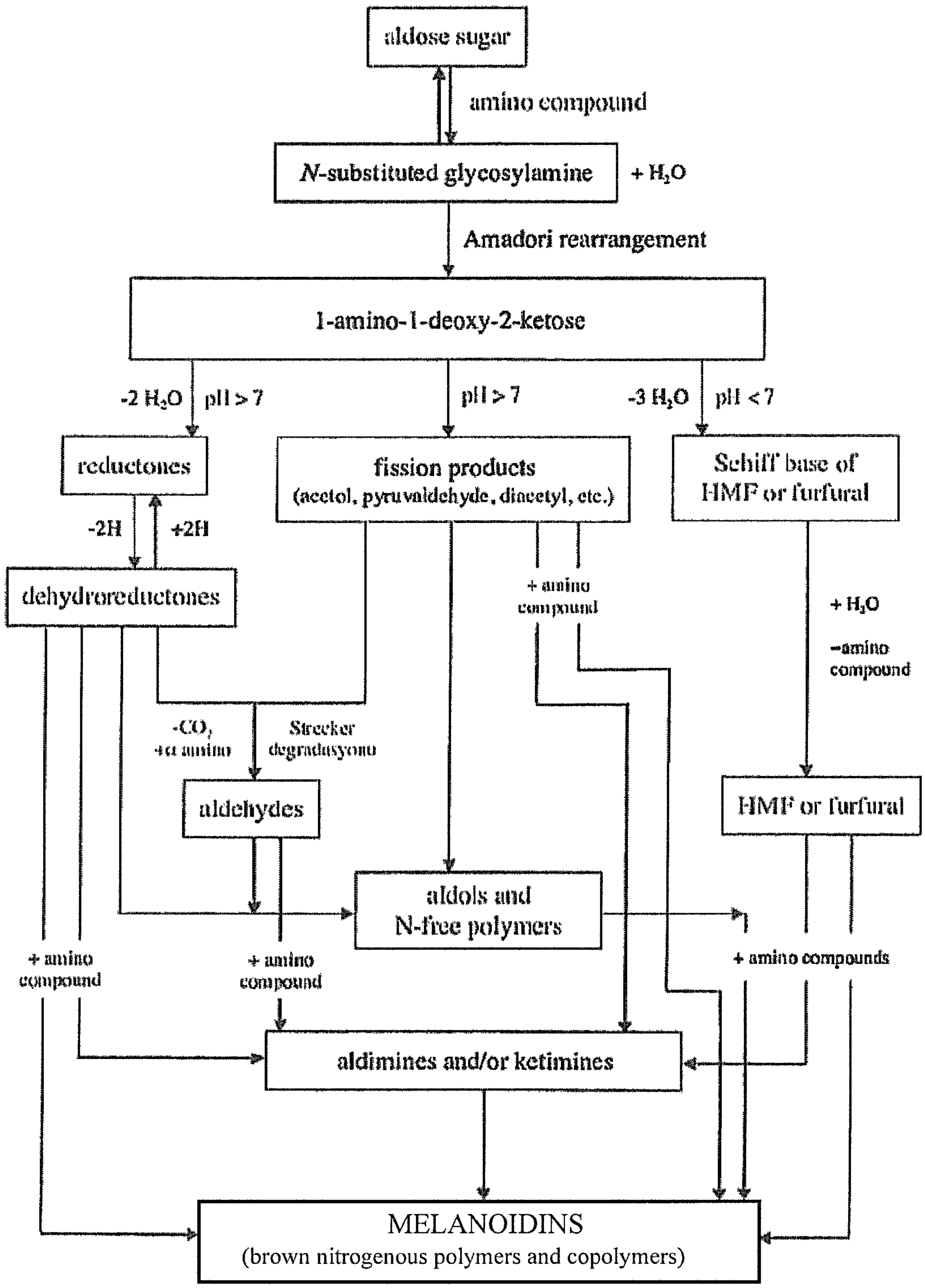

FIG. 290 shows a flow diagram of the MRP reactions.

DETAILED DESCRIPTION

I. Definitions

Unless defined otherwise, all technical and scientific terms used herein have the same meanings as commonly understood by one of ordinary skill in the art to which this application belongs. All publications and patents specifically mentioned herein are incorporated by reference in their entirety for all purposes including describing and disclosing the chemicals, instruments, statistical analyses and methodologies which are reported in the publications which might be used in connection with the application. All references cited in this specification are to be taken as indicative of the level of skill in the art. Nothing herein is to be construed as an admission that the application is not entitled to antedate such disclosure by virtue of prior invention.

In the specification and in the claims, the terms "including" and "comprising" are open-ended terms and should be interpreted to mean "including, but not limited to . . . ." These terms encompass the more restrictive terms "consisting essentially of" and "consisting of."

It must be noted that as used herein and in the appended claims, the singular forms "a," "an," and "the" include plural reference unless the context clearly dictates otherwise. Further, the terms "a" (or "an"), "one or more" and "at least one" can be used interchangeably herein. It is also to be noted that the terms "comprising," "including," "characterized by" and "having" can be used interchangeably. Further, any reactant concentrations described herein should be considered as being described on a weight to weight (w/w) basis, unless otherwise specified to the contrary (e.g., mole to mole, weight to volume (w/v), etc.)

As used herein, the term "Maillard reaction" refers to a non-enzymatic reaction of (1) one or more reducing and/or non-reducing sugars, and (2) one or more amine donors in the presence of heat, wherein the non-enzymatic reaction produces a Maillard reaction product and/or a flavor. Thus, this term is used unconventionally, since it accommodates the use of use of non-reducing sweetening agents as substrates, which were not heretofore believed to serve as subtrates for the Maillard reaction.

The term "reaction mixture" refers to a composition comprising at least one amine donor and one sugar donor, wherein the reaction mixture is to be subjected to a Maillard reaction; a "reaction mixture" is not to be construed as the reaction contents after a Maillard reaction has been conducted, unless otherwise noted.

The term "sugar," as used herein, refers to a sweet-tasting, soluble carbohydrate, typically used in consumer food and beverage products.

The term "sugar donor," as used herein, refers to a sweet-tasting compound or substance from natural or synthetic sources, which can participate as a substrate in a Maillard reaction with an amine group-containing donor molecule.

The term "amine donor," as used herein, refers to a compound or substance containing a free amino group, which can participate in a Maillard reaction.

As used herein, the term "sweetener" generally refers to a consumable product, which produces a sweet taste when consumed alone. Examples of sweeteners include, but are not limited to, high-intensity sweeteners, bulk sweeteners, sweetening agents, and low sweetness products produced by synthesis, fermentation or enzymatic conversion methods.

As used herein the term "high-intensity sweetener," refers to any synthetic or semi-synthetic sweetener or sweetener found in nature. High-intensity sweeteners are compounds or mixtures of compounds which are sweeter than sucrose. High-intensity sweeteners are typically many times (e.g., 20 times and more, 30 times and more, 50 times and more or 100 times sweeter than sucrose). For example, sucralose is about 600 times sweeter than sucrose, sodium cyclamate is about 30 times sweeter, Aspartame is about 160-200 times sweeter, and thaumatin is about 2000 times sweeter then sucrose (the sweeteness depends on the tested concentration compared with sucrose).

High-intensity sweeteners are commonly used as sugar substitutes or sugar alternatives because they are many times sweeter than sugar but contribute only a few to no calories when added to foods. High-intensity sweeteners may also be used to enhance the flavor of foods. High-intensity sweeteners generally will not raise blood sugar levels.

As used herein, the term "high intensity natural sweetener," refers to sweeteners found in nature, typically in plants, which may be in raw, extracted, purified, refined, or any other form, singularly or in combination thereof. High intensity natural sweeteners characteristically have higher sweetness potency, but fewer calories than sucrose, fructose, or glucose.

High intensity natural sweeteners include, but are not limited to, sweet tea extracts, *Stevia* extracts, swingle extracts, sweet tea components, steviol glycosides, mogrosides, glycosylated sweet tea extracts, glycosylated *Stevia* extracts, glycosylated swingle extracts, glycosylated sweet tea glycosides, glycosylated steviol glycosides, glycosylated mogrosides, licorice extracts, glycyrrhizic acid, including mixtures, salts and derivatives thereof.

As used herein, the term "high intensity synthetic sweetener" or "high intensity artificial sweetener" refers to high intensity sweeteners that are not found in nature. High intensity synthetic sweeteners include "high intensity semi-synthetic sweeteners" or "high intensity semi-artificial sweeteners", which are synthesized from, artificially modified from, or derived from, high intensity natural sweeteners.

Examples of high intensity synthetic sweeteners include, but are not limited to, sucralose, aspartame, acesulfame-K, neotarne, saccharin and aspartame, glycyrrhizic acid ammonium salt, sodium cyclamate, saccharin, advantame, neohesperidin dihydrochalcone (NC) and mixtures, salts and derivatives thereof.

As used herein, the term "sweetening agent" refers to a high intensity sweetener.

As used herein, the term "bulk sweetener" refers to a sweetener, which typically adds both bulk and sweetness to a confectionery composition and includes, but is not limited to, sugars, sugar alcohols, sucrose, commonly referred to as "table sugar," fructose, commonly referred to as "fruit sugar," honey, unrefined sweeteners, syrups, such as agave syrup or agave nectar, maple syrup, corn syrup and high fructose corn syrup (or HFCS).

As used herein, the term "sweetener enhancer" refers to a compound (or composition) capable of enhancing or intensifying sensitivity of the sweet taste. The term "sweetener enhancer" is synonymous with a "sweetness enhancer," "sweet taste potentiator," "sweetness potentiator," and/or "sweetness intensifier." A sweetener enhancer enhances the sweet taste, flavor, mouth feel and/or the taste profile of a sweetener without giving a detectable sweet taste by the sweetener enhancer itself at an acceptable use concentration. In some embodiments, the sweetener enhancer provided herein may provide a sweet taste at a higher concentration by itself. Certain sweetener enhancers provided herein may also be used as sweetening agents.

Sweetener enhancers can be used as food additives or flavors to reduce the amounts of sweeteners in foods while maintaining the same level of sweetness. Sweetener enhancers work by interacting with sweet receptors on the tongue, helping the receptor to stay switched "on" once activated by the sweetener, so that the receptors respond to a lower concentration of sweetener. These ingredients could be used to reduce the calorie content of foods and beverages, as well as save money by using less sugar and/or less othersweeteners. Examples of sweetener enhancers include, but are not limited to, brazzein, miraculin, curculin, pentadin, mabinlin, thaumatin, and mixtures thereof.

In some cases, sweetening agents or sweeteners can be used as sweetener enhancers or flavors when their dosages in food and beverage are low. In some cases, sweetener enhancers can be utilized as sweeteners where their dosages in foods and beverages are higher than dosages regulated by FEMA, EFSA or other related authorities.

As used herein, the phrase "low sweetness products produced by synthesis, fermentation or enzymatic conversion" refers to products that have less sweetness or similar sweetness than sucrose. Examples of low sweetness products produced by extraction, synthesis, fermentation or enzymatic conversion method include, but are not limited to, sorbitol, mannitol, erythritol, trehalose, raffinose, cellobiose, tagatose, DOLCIA PRIMA™ allulose, inulin, N—[N-[3-(3-hydroxy-4-methoxyphenyl)propyl]-alpha-aspartyl]-L-phenylalanine 1-methyl ester, glycyrrhizin, and mixtures thereof.

For example, "sugar alcohols" or "polyols" are sweetening and bulking ingredients used in manufacturing of foods and beverages. As sugar substitutes, they supply fewer calories (about a half to one-third fewer calories) than sugar, are converted to glucose slowly, and are not characterized as causing spiked increases in blood glucose levels.

Sorbitol, xylitol, and lactitol are exemplary sugar alcohols (or polyols). These are generally less sweet than sucrose, but have similar bulk properties and can be used in a wide range of food and beverage products. In some case, their sweetness profile can be fine-tuned by being mixed together with high-intensity sweeteners.

The following table illustrates sweetnesses and energy densities of various materials in compared to sucrose:

| Name | Sweetness by weight | Sweetness by food energy | Energy density | Notes |
|---|---|---|---|---|
| Brazzein | 500-2000 | | | Protein |
| Curculin | 430-2070 | | | Protein; also changes the taste of water and sour solutions to sweet |
| Erythritol | 0.6-0.7 | 14 | 0.05 | |
| Fructo-oligosaccharide | 0.3-0.5 | | | |
| Glycyrrhizin | 30-50 | | | |
| Glycerol | 0.6 | 0.55 | 1.075 | E422 |
| Hydrogenated starch hydrolysates | 0.4-0.9 | 0.5 × −1.2 | 0.75 | |
| Inulin | 0.1 | | | |
| Isomalt | 0.45-0.65 | 0.9-1.3 | 0.5 | E953 |
| Isomalto-oligosaccharide | 0.5 | | | |
| Isomaltulose | 0.5 | | | |
| Lactitol | 0.4 | 0.8 | 0.5 | E966 |
| Mogroside mix | 300 | | | |
| Mabinlin | 100 | | | Protein |
| Maltitol | 0.75-0.9 | 1.7 | 0.525 | E965 |
| Maltodextrin | 0.15 | | | |
| Mannitol | 0.5 | 1.2 | 0.4 | E421 |
| Miraculin | | | | A protein that does not taste sweet by itself but modifies taste receptors to make sour things taste sweet temporarily |
| Monatin | 3,000 | | | Sweetener isolated from the plant *Sclerochiton ilicifolius* |
| Monellin | 800-2,000 | | | Protein; the sweetening ingredient in serendipity berries |
| Osladin | 500 | | | |
| Pentadin | 500 | | | Protein |
| Polydextrose | 0.1 | | | |
| Psicose | 0.7 | | | |
| Sorbitol | 0.6 | 0.9 | 0.65 | Sugar alcohol, E420 |
| Stevia | 250 | | | Extracts known as rebiana, Sweet and Fit Stevia, Truvia, PureVia, Enliten; mainly containing rebaudioside A, a steviol glycoside |
| Tagatose | 0.92 | 2.4 | 0.38 | Monosaccharide |
| Thaumatin | 2,000 | | | Protein; E957 |

As used herein, the term "glycoside" refers to a molecule in which a sugar (the "glycine" part or "glycine component" of the glycoside) is bonded to a non-sugar (the "aglycone" part or "aglycone component") via a glycosidic bond.

The terms "terpenoid" are used interchangeably with reference to a large and diverse class of organic molecules derived from terpenes, more specifically five-carbon isoprenoid units assembled and modified in a variety of ways and classified in groups based on the number of isoprenoid units used in group members. The term "terpenoids" includes hemiterpenoids, monoterpenoids, sesquiterpenoids, diterpenoids, sesterterpenoids, triterpenoids, tetraterpenoids and polytemenoids.

The term "terpenoid glycoside" and "terpenoid sweetener" refer to a compound having a terpenoid aglycone linked by a glycosidic bond to a glycine. Exemplary terpenoid glycosides include steviol glycosides, stevioside, rebaudioside A, rebaudioside B, rebaudioside C, rebaudioside D, rebaudioside E, rebaudioside F, rebaudioside G, rebaudioside H, rebaudioside rebaudioside rebaudioside K, rebaudioside rebaudioside M, rebaudioside N, rebaudioside O, dulcoside A, steviolbioside, rubusoside, glycosylated steviol glycosides, as well as any other steviol glycoside(s) found in *Stevia* rebaudiana plant; Luo Han Guo extract, mogrol glycosides, mogrosides, mogroside mogroside II, mogroside II B, mogroside II E, mogroside III, mogroside III A2, mogroside IV, mogroside V, mogroside VI, neomogroside, grosmornoside siamenoside 7-oxo-mogroside II E, 11-oxo-mogroside A1, 11-deoxy-mogroside III, -oxonaogroside IV A, 7-oxo-mogroside V, 11-oxo-mogroside V, as well as any other mogrol glycoside(s) found in the *Siraitia grosvenorii* plant.

The terms "steviol glycoside," and "SG" are used interchangeably with reference to a glycoside of steviol, a diterpene compound shown in Formula I, which is found in *Stevia* leaves. Non-limiting examples of steviol glycosides are shown in Tables A and B below. The steviol glycosides for use in the present application are not limited by source or origin. Steviol glycosides may be extracted from *Stevia* leaves, synthesized by enzymatic processes or chemical syntheses, or produced by fermentation.

The terms "rebaudioside A," "Reb A," and "RA" are equivalent terms referring to the same molecule. The same condition applies to all lettered rebaudiosides.

The terms "steviol glycoside composition" and "SG composition" are used interchangeably with reference to a composition comprising one or more SGs.

The term "*Stevia* extract," as used herein, refers to a plant extract from *Stevia* that contains varying percentages of SGs.

The terms "glycosylated steviol glycoside" and "GSG" are used interchangeably with reference to an SG containing one or more additional glucose residues added relative to the parental SGs (including partially glycosylated steviol glycosides) present in e.g., *Stevia* leaves. A "GSG" may be produced from any known or unknown SG by enzymatic synthesis, chemical synthesis or fermentation. It should be understood that GSG(s) essentially contain a glycosylated steviol glycoside(s), but may also contain unreacted steviol glycosides, dextrins and other non-steviol glycoside substances when using extracts in the starting materials. It should also be understood that the GSG(s) can be purified and/or separated into purified/isolated components.

The terms "glycosylated steviol glycoside composition" or "CiSG composition" refer to any material comprising one or more GSGs.

As used herein, the term "SG/GSG composition" refers to a generic composition that may comprise one or more SGs and/or one or more GSGs.

The terms "SG component," "SG-containing component," "SG-containing composition," "SG-containing product," "*Stevia* sweetener" and "SG sweetener" are used interchangeably with reference to a component, composition, product or sweetener that contains one or more steviol glycosides and/or one or more glycosylated steviol glycosides.

The terms "non-SG component". "non-SG-containing component", "non-SG-containing composition", "non-SG-containing product", "non-*Stevia* sweetener", "non-SG sweetener" and "non-*Stevia* sweetening agent" are used with reference to a component, composition, product, sweetener or sweetening agent that does not contain a steviol glycoside or a glycosylated steviol glycoside.

The phrase "total steviol glycosides" refers to the total amount of SGs and/or GSGs in a composition.

An acronym of the type "YYxx" refers to a composition, where YY refers to a given (such as RA) or collection of compounds (e.g., SGs), where "xx" is typically a percent by weight number between 1 and 100 denoting the level of purity of a given compound (such as RA) or collection of compounds, where the weight percentage of YY in the dried product is equal to or greater than xx. The acronym "YYxx+WWzz" refers to a composition, where each one of "YY" and "WW" refers to a given compound (such as RA) or a collection of compounds (e.g., SGs), and where each of "xx" and "zz" refers to a percent by weight number between 1 and 100 denoting the level of purity of a given compound (such as RA) or a collection of compounds, where the weight percentage of YY in the dried product is equal to or greater than xx, and where the weight percentage of WW in the dried product is equal to or greater than zz.

The acronym "RAx" refers to a *Stevia* composition containing RA in amount of ≥x % and <(x+10)% with the following exceptions: the acronym "RA100" specifically refers to pure RA; the acronym "RA99.5" specifically refers to a composition where the amount of RA is ≥99.5 wt %, but <100 wt %; the acronym "RA99" specifically refers to a composition where the amount of RA is ≥99 wt %, but <100 wt %; the acronym "RA98" specifically refers to a composition where the amount of RA is ≥98 wt %, but <99 wt %; the acronym "RA97" specifically refers to a composition where the amount of RA is ≥97 wt %, but <98 wt %; the acronym "RA95" specifically refers to a composition where the amount of RA is ≥95 wt %, but <97 wt %; the acronym "RA85" specifically refers to a composition where the amount of RA is ≥85 wt %, but <90 wt %; the acronym "RA75" specifically refers to a composition where the amount of RA is ≥75 wt but <80 wt %; the acronym "RA65" specifically refers to a composition where the amount of RA is ≥65 wt %, but <70 wt %; the acronym "RA20" specifically refers to a composition where the amount of RA is ≥15 wt %, but <30 wt %. *Stevia* extracts include, but are not limited to, RA20, RA40, RA50, RA60, RA80, RA 90, RA95, RA97, RA98, RA99, RA99.5, RB8, RB10, RB15, RC1.5, RD6, and combinations thereof.

The acronym "GSG-RAxx" refers to a GSG composition prepared in an enzymatically catalyzed glycosylation process with RAxx as the starting SG material, More generally, acronyms of the type "GSG-YYxx" refer to a composition of the present application where YY refers to a compound (such as RA, RB, RC or RD), or a composition (e.g., RA20), or a mixture of compositions (e.g., RA40+RB8). For example, GSG-RA20 refers to the glycosylation products formed from RA20.

The abbreviation "GX" refers to a glycosyl group "G" where "X" is a value from 1 to 20 and refers to the number of glycosyl groups present in the molecule. For example, Stevioside G1 (ST-G1) has one (1) glycosyl group (G), thus "G1," Stevioside G2 (ST-G2) has two (2) glycosyl groups present, Stevioside G3 (ST-G3) has three (3) glycosyl groups present, Stevioside G4 (ST-G4) has four (4) glycosyl groups present, Stevioside G5 (ST-G5) has five (5) glycosyl groups present, Stevioside G6 (ST-G6) has six (6) glycosyl groups present, Stevioside G7 (ST-G7) has seven (7) groups present, Stevioside G8 (ST-G8) has eight (8) glycosyl groups present, Stevioside G9 (ST-G9) has nine (9) glycosyl groups present, etc. The glycosylation of the molecule can be determined by HPLC-MS.

The term "Maillard reaction product" or "MRP" refers to any compound produced by a Maillard reaction between an amine donor and a sugar donor in the form of a reducing sugar, non-reducing sugar, or both. Preferably, the sugar donor includes at least one carbonyl group. In certain embodiments, the MRP is a compound that provides flavor ("Maillard flavor"), color ("Maillard color"), or a combination thereof.

The term "MRP composition" refers to a composition comprising one or more MRPs produced by a Maillard reaction between an amine donor and a sugar donor in the form of a reducing sugar, non-reducing sugar, or both. Preferably, the sugar donor includes at least one carbonyl group. In certain embodiments, the MRP is a compound that provides flavor ("Maillard flavor"), color ("Maillard color"), or a combination thereof.

The terms "steviol glycoside-derived MRP", "SG-derived MRP", and "S-MRP" are used interchangeably with reference to an MRP or MRP-containing composition produced by a Maillard reaction between an amine donor and a sugar donor comprising a steviol glycoside, a glycosylated steviol glycoside, a *Stevia* extract and/or a glycosylated *Stevia* extract or combination thereof with or without an additional reducing sugar added to the reaction. In some cases, an S-MRP may be used interchangeably with the term "SG-MRP." In some embodiments, S-MRP or SG-MRP refers to an MRP composition in which (1) steviol glycosides, glycosylated steviol glycosides, steviol extracts, and glycosylated steviol extracts, or combination thereof (2) an amine donor, and (3) a reducing sugar, are present in a reaction mixture subjected to the Maillard reaction.

The term "thaumatin", as used herein, is used generically with reference to thaumatin I, II, III, a, c, etc. and/or combinations thereof.

The term "TS-MRP" refers to (1) a thaumatin-containing MRP composition produced by a Maillard reaction, wherein the reaction mixture comprises thaumatin and wherein thaumatin may be present in the beginning of the Maillard reaction or be added during the Maillard reaction, (2) a composition comprising an MRP prepared in the absence of thaumatin and additionally added thaumatin, or (3) a composition comprising a thaumatin-containing MRP composition and additionally added thaumatin.

The term "sweetener-derived MRP" or "sweetening agent-derived MRP" refers to an MRP or MRP-containing composition produced by a Maillard reaction between (1) an amine donor and (2) a sugar donor comprising a sweetener or a sweetening agent, respectively.

The terms "Maillard product composition" and "Maillard flavor composition" are used interchangeably (unless otherwise noted) with reference to a composition comprising MRPs, S-MRPs, as well as any degraded products from the reactants, optionally including any salt(s) present, sweetener(s) present, and/or mixtures thereof.

The term "non-volatile", as used herein, refers to a compound having a negligible vapor pressure at room temperature, and/or exhibits a vapor pressure of less than about 2 mm. of mercury at 20° C.

The term "volatile", as used herein, refers to a compound having a measurable vapor pressure at room temperature, and/or exhibits a vapor pressure of, or greater than, about 2 mm. of mercury at 20° C.

The terms "flavor" and "flavor characteristic" are used interchangeably with reference to the combined sensory perception of one or more components of taste, odor, and/or texture.

The terms "flavoring agent", "flavoring" and "flavorant" are used interchangeably with reference to a product added to food or beverage products to impart, modify, or enhance the flavor of food. As used herein, these terms do not include substances having an exclusively sweet, sour, or salty taste (e.g., sugar, vinegar, and table salt).

The term "natural flavoring substance" refers to a flavoring substance obtained by physical processes that may result in unavoidable but unintentional changes in the chemical structure of the components of the flavoring (e.g., distillation and solvent extraction), or by enzymatic or microbiological processes, from material of plant or animal origin.

The term "synthetic flavoring substance" refers to a flavoring substance formed by chemical synthesis.

The term "enhance," as used herein, includes augmenting, intensifying, accentuating, magnifying, and potentiating the sensory perception of a flavor characteristic without changing the nature or quality thereof.

Unless otherwise specified, the terms "modify" or "modified" as used herein, includes altering, varying, suppressing, depressing, fortifying and supplementing the sensory perception of a flavor characteristic where the quality or duration of such characteristic was deficient.

The phrase "sensory profile" or "taste profile" is defined as the temporal profile of all basic tastes of a sweetener. The onset and decay of sweetness when a sweetener is consumed, as perceived by trained human tasters and measured in seconds from first contact with a taster's tongue ("onset") to a cutoff point (typically 180 seconds after onset), is called the "temporal profile of sweetness". A plurality of such human tasters is called a "sensory panel". In addition to sweetness, sensory panels can also judge the temporal profile of the other "basic tastes": bitterness, saltiness, sourness, piquance (aka spiciness), and umami (aka savoriness or meatiness). The onset and decay of bitterness when a sweetener is consumed, as perceived by trained human tasters and measured in seconds from first perceived taste to the last perceived aftertaste at the cutoff point, is called the "temporal profile of bitterness".

The phrase "sucrose equivalence" or "SE" is the amount of non-sucrose sweetener required to provide the sweetness of a given percentage of sucrose in the same food, beverage, or solution. For instance, a non-diet soft drink typically contains 12 grams of sucrose per 100 ml of water, i.e., 12% sucrose. This means that to be commercially accepted, diet soft drinks must generally have the same sweetness as a 12% sucrose soft drink, i.e., a diet soft drink must have a 12% SE. Soft drink dispensing equipment assumes an SE of 12%, since such equipment is set up for use with sucrose-based syrups.

As used herein, the term "off-taste" refers to an amount or degree of taste that is not characteristically or usually found in a beverage product or a consumable product of the present disclosure. For example, an off-taste is an undesirable taste of a sweetened consumable to consumers, such as, a bitter taste, a licorice-like taste, a metallic taste, an aversive taste, an astringent taste, a delayed sweetness onset, a lingering sweet aftertaste, and the like, etc.

The term "orally ingestible product" refers to a composition comprising substances which are contacted with the mouth of man or animal, including substances which are taken into and subsequently ejected from the mouth and substances which are drunk, eaten, swallowed or otherwise ingested, and are safe for human or animal consumption when used in a generally acceptable range.

Unless otherwise noted, the term "ppm" (parts per million) means parts per million on a w/w or wt/wt basis.

II. The Maillard Reaction

The Maillard reaction (MR) generally refers to a non-enzymatic browning reaction of a sugar donor with an amine donor in the presence of heat which produces flavor. Common flavors produced as a result of the Maillard reaction include, for example, those associated with red meat, poultry, coffee, vegetables, bread crust etc. subjected to heat. A Maillard reaction relies mainly on sugars and amino acids but it can also contain other ingredients including: autolyzed yeast extracts (AYE), hydrolyzed vegetable proteins (HVP), gelatin (protein source), vegetable extracts (i.e. onion powder), enzyme treated proteins, meat fats or extracts and acids or bases to adjust the pH of the reaction. The reaction can be in an aqueous environment with an adjusted pH at specific temperatures for a specified amount of time to produce a variety of flavors. Typical flavors include those associated with chicken, pork, beef, caramel, chocolate etc. However, a wide variety of different taste and aroma profiles can be achieved by adjusting the ingredients, the temperature and/or the pH of the reaction. The main advantage of the reaction flavors is that they can produce characteristic meat, burnt, roasted, caramellic, or chocolate profiles desired by the food industry, which are not typically achievable by using compounding of flavor ingredients.

Reducing groups can be found on reducing sugars (sugar donors) and amino groups can be found on amino donors such as free amino acids, peptides, and proteins. Initially, a reactive carbonyl group of a reducing sugar condenses with a free amino group, with a concomitant loss of a water molecule. A reducing sugar substrate for Maillard reaction typically has a reactive carbonyl group in the form of a free aldehyde or a free ketone. The resultant N-substituted glycoaldosylamine is not stable. The aldosylamine compound rearranges, through an Amadori rearrangement, to form a ketosamine. Ketosamines that are so-formed may further react through any of the following three pathways: (a) further dehydration to form reductones and dehydroreductones; (b) hydrolytic fission to form short chain products, such as diacetyl, acetol, pyruvaldehyde, and the like, which can, in turn, undergo Strecker degradation with additional amino groups to form aldehydes, and condensation, to form aldols; and (c) loss of water molecules, followed by reaction with additional amino groups and water, followed by condensation and/or polymerization into melanoids. Factors that affect the rate and/or extent of Maillard reactions include among others the temperature, water activity, and pH. The Maillard reaction is enhanced by high temperature, low moisture levels, and alkaline pH.

In the Maillard reaction, suitable carbonyl containing reactants include those that comprise a reactive aldehyde (—CHO) or keto (—CO—) group, such that the carbonyl free aldehyde or free keto group is available to react with an amino group associated with the reactant. Typically, the reducing reactant is a reducing sugar, e.g., a sugar that can reduce a test reagent, e.g., can reduce $Cu^{2+}$ to $Cu^{+}$, or can be oxidized by such reagents.

Monosaccharides, disaccharides, oligosaccharides, polysaccharides (e.g., dextrins, starches, and edible gums) and their hydrolysis products are suitable reducing reactants if they have at least one reducing group that can participate in a Maillard reaction. Reducing sugars include aldoses or ketoses such as glucose, fructose, maltose, lactose, glyceraldehyde, dihydroxyacetone, arabinose, xylose, ribose, mannose, erythrose, threose, and galactose. Other reducing reactants include uronic acids (e.g., glucuronic acid, glucuronolactone, and galacturonic acid, mannuronic acid, iduronic acid) or Maillard reaction intermediates bearing at least one carbonyl group such as aldehydes, ketones, alpha-hydroxycarbonyl or dicarbonyl compounds.

A. Maillard Reaction Products (MRPs)

In some embodiments, the Maillard reactants in a reaction mixture include an amino donor and a sugar donor in the form of a reducing sugar and/or a non-reducing sugar that are present as reactants. The Maillard reaction products (MRPs) formed from these reactants encompass MRPs formed with or without sweeteners or sweetening agents.

B. Steviol Glycoside-Derived Maillard Reaction Products (S-MRPs)

In some embodiments, the Maillard reactants in a reaction mixture include (1) an amino donor; and (2) a sugar donor comprising a steviol glycoside, a glycosylated steviol glycoside, a *Stevia* extract, a glycosylated *Stevia* extract, or combinations thereof. The resulting products are referred to as steviol glycoside-derived MRPs, S-MRPs, or SG-MRPs. In some embodiments, S-MRPs or SG-MRPs are produced from a reaction mixture that comprises (1) one or more amine donors, (2) one or more reducing sugar, and (3) one or more steviol glycosides, glycosylated steviol glycosides, *Stevia* extracts, and/or glycosylated *Stevia* extracts.

In one embodiment, the S-MRPs are formed under reaction conditions in which no reducing sugar is present.

The inventors of the present application have surprisingly discovered that certain non-reducing sugars exemplified by high intensity natural sweeteners, including steviol glycosides, glycosylated steviol glycosides, *Stevia* extracts, and/or glycosylated *Stevia* extracts can serve as substrates in the Maillard reaction and provide Maillard reaction product (MRP) compositions having improved taste profiles over previously reported high intensity natural sweetener compositions. As further described herein, steviol glycosides, glycosylated steviol glycosides, *Stevia* extracts, and/or glycosylated *Stevia* extracts have been surprisingly found to undergo a Maillard type reaction to provide MRPs and/or undergo caramelization (to produce caramelization reaction products (CRPs)), even though a ketone or aldehyde is not present in the sweetening agent.

As a result of these unconventional Maillard reactions, steviol glycoside-derived Maillard reaction products (MRPs) can be formed. As used herein, the terms "steviol glycoside-derived. MRP", "SG-derived MRP", and "S-MRP" are used interchangeably with reference to an MRP or MRP-containing composition produced by a Mail lard reaction between an amine donor and one or more steviol glycosides, with or without the addition of reducing sugar(s) being added to the reaction mixture or reaction solution.

Additional high intensity natural sweetening agents for use in the present reactions and product compositions include sweet tea extracts (*Rubus suavissimus* S. Lee (Rosaceae) providing, for example rubusoside and suaviosides which are kaurane-type diterpene glycosides including suaviosides B, G, H, I and J), swingle extracts (mogroside extracts), glycosylated sweet tea extracts, glycosylated *Stevia* extracts, glycosylated swingle extracts, glycosylated sweet tea glycosides, glycosylated steviol glycosides, g ycosylated mogrosides, neohesperidin dihydrochalcone (NHDC), glycosylated NHDC, glycyrrhizin, glycosylated glycyrrhizin, hernandulcin, and mixtures thereof.

It is believed that an amine reacts with the non-reducing sugar component with or without an added reducing sugar to provide new previously unknown MRP compound(s). As such, the MRP compositions of the present application include products preparable (or obtainable) by the reaction of an amine with a non-reducing sugar, for example, a high intensity natural sweetening agent, such as a steviol glycoside (SG), a *Stevia* extract, a mogroside, a sweet tea extract, a glycosylated *Stevia* extract (GSG), NHDC, etc.

C. Sweetening Agent-Derived Maillard Reaction Products (SA-MRPs)

In Maillard reactions other than those involving production of S-MRPs, the Maillard reactions described herein utilize an amine donor in combination with at least one sweetening agent (SA) (or natural high intensity sweetener). The terms "sweetening agent-derived MRP" and "SA-MRP" are used interchangeably with reference to an MRP or MRP-containing composition produced by a Maillard reaction between an amine donor and a sweetening agent, i.e., natural high intensity sweetener. Thus, an S-MRP is a particular type of SA-MRP.

In some embodiments, one or more carbohydrate sweeteners may be added to a reaction mixture subjected to the Maillard reaction. In other embodiments, one or more carbohydrate sweeteners may be added to an MRP composition. Non-limiting examples of carbohydrate sweeteners for use in the present application include caloric sweeteners, such as, sucrose, fructose, glucose, D-tagatose, trehalose, galactose, rhamnose, cyclodextrin (e.g., α-cyclodextrin, β-cyclodextrin, and γ-cyclodextrin), ribulose, threose, arabinose, xylose, lyxose, allose, altrose, mannose, idose, lactose, maltose, invert sugar, isotrehalose, neotrehalose, palatinose or isomaltulose, erythrose, deoxyribose, gulose, idose, talose, erythrulose, xylulose, psicose, turanose, cellobiose, glucosamine, mannosamine, fucose, glucuronic acid, gluconic acid, glucono-lactone, abequose, galactosamine, sugar alcohols, such as erythritol, xylitol, mannitol, sorbitol, maltitol, lactitol, mannitol, and inositol; xylo-oligosaccharides (xylobiose, xylobiose and the like), gentio-oligoscacchatides (gentiobiose, gentiobiose, gentiotetraose and the like), galacto-oligosaccharides, sorbose, nigero-oligosaccharides, fructooligosaccharides (kestose, nystose and the like), tnaltotetraol, maltotriol, malto-oligosaccharides (maltotriose, maltotetraose, maltopentaose, maltohexaose, maltoheptaose and the like), lactulose, melibiose, raffinose, rhamnose, ribose, isomerized liquid sugars such as high fructose corn/starch syrup (containing fructose and glucose, e.g., HFCS55, HFCS42, or HFCS90), coupling sugars, soybean oligosaccharides, and glucose syrup. Additionally, the above carbohydrates may be in either the D- or L-configuration.

It should be noted, however, that not all carbohydrate sweeteners are reducing sugars. Sugars having acetal or ketal linkages are not reducing sugars, as they do not have free aldehyde chains. They therefore do not react with reducing-sugar test solutions (e.g., in a Tollens' test or Benedict's test). However, a non-reducing sugar can be hydrolyzed using diluted hydrochloric acid. Exemplary carbohydrate sweeteners that are not reducing sugars, include e.g., sucrose, trehalose, xylitol, and raffinose.

D. Thaumatin Containing MRPs (TS-MRPs)

Thautnatin is a sweet-tasting protein that can serve as an amino donor in the Maillard reaction. In certain preferred embodiments, thaumatin is added to the reaction mixture subjected to the Maillard reaction or is added to an MRP composition produced with or without thaumatin.

Thaumatin is typically prepared from the katemfe fruit (*Thaumatococcus daniellii* Bennett) of West Africa. Wherever thaumatin is mentioned in this specification, it should be understood to apply to the use of thaumatin prepared from all types of katemfe fruit extracts or any other extracts, or from other plants and plant extracts, including genetically modified plants, as well as protein preparations derived from cell cultures or fermentation processes.

The inventors surprisingly found that inclusion of thaumatin in the Maillard reaction or added to an MRP composition formed therefrom can significantly improve the overall taste profile of food and beverages to have a better mouth feel, a creamy taste, a reduction of bitterness of other ingredients in food and beverage, such as astringency of tea, protein, or their extracts, acidic nature and bitterness of coffee, etc. Thaumatin can also help to reduce lingering, bitterness and metallic aftertaste of natural, synthetic high intensity sweeteners, or their combinations, their combination with other sweeteners, with other flavors much more than thaumatin itself. Thus, it plays a unique function in sugar reduction or sugar free products, and can be used as an additive for improving the taste performance of food and beverage products comprising one or more sweetening agents or sweeteners, such as sucralose, acesulfame-K, aspartame, steviol glycosides, swingle extract, sweet tea extracts, allulose, sodium saccharin, sodium cyclamate or siratose.

In addition to the ability of thaumatin to augment MRP functionality with *Stevia* and other high intensity natural sweeteners, the additional inclusion of malic acid can further improve the taste profile substantially, including less lingering.

E. Flavor Generation

Maillard reaction technology described herein may be used for the production of process or reaction flavors. Process flavors are complex aroma building blocks, which provide similar aroma and taste properties as thermally treated foodstuffs such as cooked meat, chocolate, coffee, caramel, popcorn and bread. Additionally, they can be combined with other flavor ingredients to impart flavor enhancement and/or specific flavor notes in the applications in which they are used. However, such technology currently is mainly used for producing meat flavor and spiciness to enhance the taste of food. It is seldom considered as a tool to improve taste for the beverage industry.

Flavor can be characterized as a complex combination of the olfactory, gustatory and trigeminal sensations perceived during tasting. The flavor can be influenced by tactile, thermal, painful and/or kinaesthetic effects. However the exact mechanisms that lead to our perception of flavor have not yet been elucidated, due to different reasons: i) flavor perception involves a wide range of stimuli, ii) the chemical compounds and food structures that activate the flavor sensors change as food is eaten, iii) the individual modalities interact in a complex way. There is a need first to identify not only the stimuli involved in flavor perception which includes taste and aroma modalities, but also the other senses which can affect flavor perception, such as irritation, temperature, color, texture, and sound. It has been shown, for example, that irritants do interact with the perception of both tastes and smells inhibiting their perceived intensity and that some taste and odor compounds contain an irritating component. Temperature has an impact on taste perception through the triggering of cascade reactions in receptors. In the case of color, learned color—taste associations influence perceived taste. All these sensations experienced while eating are crucial and should have a tremendous impact on whether foods will be accepted or rejected. Moreover, one has also to take into account the influence of the associations between flavor experiences and feelings of contentment or well-being on the overall acceptability of the product.

The Maillard reaction is one of the most important routes to flavor compounds in cooked foods. The initial stages of the reaction involve the condensation of the carbonyl group of a reducing sugar with an amine compound, followed by the degradation of the condensation products to give a number of different oxygenated compounds. The subsequent stages of the Maillard reaction involve the interaction of these compounds with other reactive components, such as amines, amino acids, aldehydes, hydrogen sulfide and ammonia. These additional reactions lead to many important classes of flavor compounds including furans, pyrazines, pyrroles, oxazoles, thiophenes, thiazoles and other heterocyclic compounds. The large number of different reactive intermediates that can be generated in the Maillard reaction gives rise to an extremely complex array of volatile products.

Indeed, the Maillard reaction produces volatile substances (comprising pure and impure substances) and non-volatile substances (comprising pure and impure substances). The Maillard reaction products include various products that can be isolated, either partially volatile substances or partially non-volatile substances removed as a direct result of the Maillard reaction. In certain embodiments, volatile compounds may be separated from non-volatile compounds at e.g., 105° C., which represents a typical temperature to determine the dry mass of compounds. In this case, "dry mass" may be interpreted as "compound-water-volatile compounds".

Extraction with organic solvents generally provides a more complete profile of volatile metabolites including representation from polar hydrophilic species such as the lower molecular weight alcohols, hydroxyl-acids, thiols, and flavor compounds such as acetoin, methionol and furaneol.

However, non-volatile material such as leaf waxes, triterpenes, sterols, triglycerides and more complex lipids, and silicones and plasticizers from laboratory apparatuses are also likely to be extracted and may complicate analysis unless removed or the analytical method is suitably modified. Solvents chosen to optimize the profile of extracted metabolites include pentane-ether mixtures and dichloromethane. Unwanted interfering compounds such as lipids, pigments and hydrocarbons, may be removed by distillation (simultaneous distillation-extraction (SDE), vacuum micro distillation or solvent assisted flavor evaporation (SAFE), or by adsorption chromatography (solid phase extraction). Vacuum micro distillation, using liquid nitrogen to distil and condense organic extracts under vacuum, also appears a useful technique to isolate volatile fractions suitable for instrumental analysis from complex matrices such as urine and faeces. Atmospheric pressure (SDE) and steam distillation (hydrodistillation) methods used to prepare volatile extracts for GC-MS analysis are liable to artifact formation due to the use of heat.

Solvent extracts are routinely concentrated by evaporation before analysis, increasing sensitivity but resulting in selective loss of the more volatile metabolites as a function of the extent of the volume reduction. These losses may be compensated for by the use of internal standards which are generally added during sample extraction and are used to correct for any loss of volatiles that occurs during the process of sample preparation. Internal standards are generally more easily used with solvent extraction than with headspace methods. Since only a small portion (1 μL) of the final solvent extract is usually used for GC-MS analysis, solvent extraction methods offer less sensitivity than direct thermal desorption or SPME. Solvent extracts, prepared either by solvent extraction or elution of headspace sampling adsorbents provide the most convenient method of sample handling. Samples can be easily stored before analysis, introduction into the GC is readily and reliably automated, and there is usually sufficient sample for multiple analyses facilitating robust identification and quantification of both known and unknown volatiles.

An alternative to the use of organic solvents is extraction with supercritical fluids (SCF) usually supercritical carbon dioxide, either pure or in the presence of chemical modifiers. Supercritical carbon dioxide has a polarity comparable to pentane and has been used to obtain volatiles and essential oils from a wide range of plant species. While SCF extraction has the advantage of using totally volatile solvents, specialized equipment is required. SCF extraction has been compared with conventional solvent and Soxhlet extraction, hydrodistillation, and simultaneous distillation-extraction (SDE) methods of volatile extraction.

As further described in the Examples, profiling of volatile compounds can be achieved using gas chromatography mass spectrometry (GC-MS). Further, in some embodiments, GC may be coupled to detection by electron impact mass spectrometry (EI-MS) to provide high chromatographic resolution, sensitivity, compound-specific detection, quantification, and the potential to identify unknown volatiles by characteristic and reproducible fragmentation spectra in addition to their retention times on the gas chromatograph. Sample analysis can be simplified compared with silylation-based methods for the GC analysis of primary metabolites in that no chemical derivatization is required and the chromatograms generally contain fewer metabolites and less chemical noise. A variety of commercial and web-based resources can be used to identify unknown compounds in a given volatile sample including large databases of searchable mass spectral libraries. High-resolution time-of-flight GC-MS instruments enable highly accurate measurement of ion masses (m/z ratios). This allows the calculation of chemical formulae and aids in the identification of unknown metabolites. The use of chemical detectors other than the mass spectrometer, sulfur selective detectors or the human nose in gas chromatography-olfactometry (sniffer port, GC-O), may enable more specific and sensitive detection of particular metabolites.

In addition, Maillard reaction products may include water soluble and/or fat soluble compounds.

F. Maillard Reaction Mechanisms

With respect to flavor generation, the Maillard reaction can be broken down into four stages. The first stage involves the formation of glycosylamines. The second stage involves rearrangement of the glycosylamines to form Amadori and Heyns rearrangement products (often abbreviated in the literature to "ARPs" and "HRPs", respectively). The third stage involves dehydration and/or fission of the Amadori and Heyns rearrangement products to furan derivatives, reductones and other carbonyl compounds (which may have significant organoleptic qualities). These "third stage products" may also be produced without the formation of ARP's or HRP's. The fourth stage involves the conversion of these furan derivatives, reductones and other carbonyl compounds into colored and aroma/flavor compounds. Thus, products and reactants present in both the third and fourth stage of the Maillard reaction contribute towards aroma and/or flavor. During the Maillard reaction, phosphate can be used as catalyst to help the conversion of Amadori compounds to flavor compounds.

The phrase "Amadori rearrangement" refers to an organic reaction describing the acid or base catalyzed isomerization or rearrangement reaction of the N-glycoside of an aldose or the glycosylamine to the corresponding 1-amino-1-deoxy-ketose. The reaction is important in carbohydrate chemistry, specifically the glycation of hemoglobin (as measured by the HbA1c test). The rearrangement is usually preceded by formation of an α-hydroxyimine by condensation of an amine with an aldose sugar in a reaction known as Schiff base formation. The rearrangement itself entails an intramolecular redox reaction, converting this α-hydroxyimine to an α-ketoamine. The formation of imines is generally reversible, but subsequent to conversion to the keto-amine, the attached amine is fixed irreversibly.

As used herein, the term "Amadori product" or "Amadori compound" refers to an intermediate in the Maillard reaction between a compound having a free amino group and a compound having a free aldehyde having a ketoamine structure represented by a general formula —(CO)—CHR—NH— (R represents a hydrogen atom or a hydroxyl group). The Amadori product is formed by a rearrangement of the Schiff base. Flavor compounds and other intermediates may be generated from Amadori products via different degradation pathways. In certain embodiments, the MRP reaction products of the present application may include one or more detectable Amadori products in the final reaction products, as documented in Examples 281 and 282.

When a ketose sugar having a free keto group (such as fructose) is used in a Maillard reaction with an amine donor, the intermediate analogous to the Amadori product is referred to as a "Heyn's product" or "Heyn's compound." The Heyn's product is formed by a rearrangement of the Schiff base. Flavor compounds and other intermediates may be generated from Heyn's products via different degradation pathways. In certain embodiments, the MRP reaction products of the present application may include one or more detectable Heyn's products in the final reaction products.

In one embodiment, the present application provides an MRP composition comprising one or more Amadori products.

In another embodiment, the present application provides an MRP composition comprising one or more Heyn's products.

It should be understood that throughout this specification, when reference is made to an MRP composition, the MRP composition should be considered to further accommodate one or more Amadori products, one or more Heyn's products or a combination thereof.

The following illustrates a general scheme for the Maillard reaction:

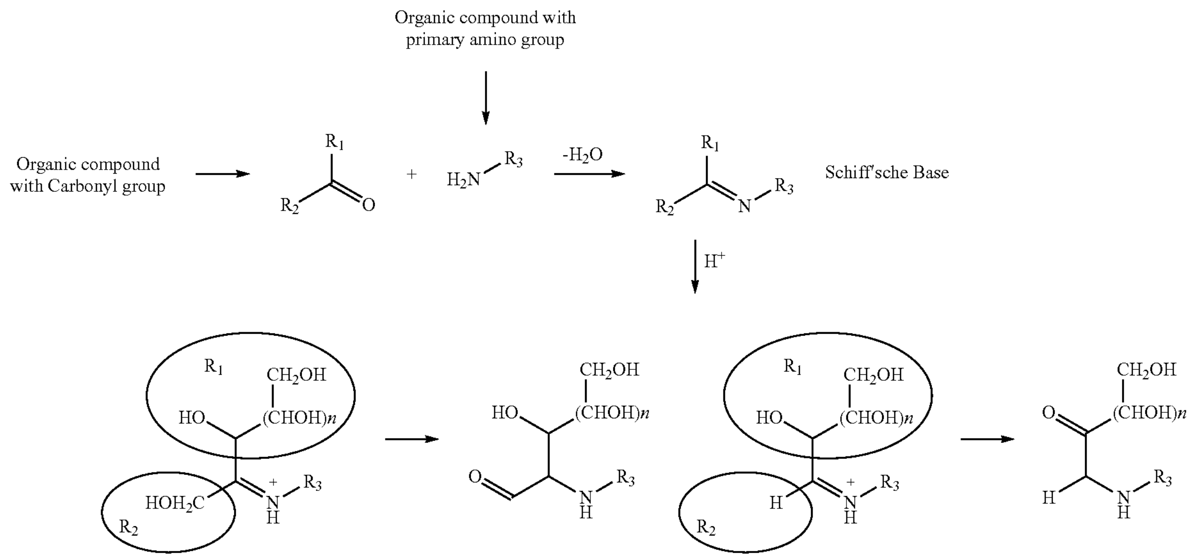

Ketose - Heyns Rearrangement

Aldose - Amadori Rearrangement

Reaction Scheme I below illustrates a classical Mallard reaction between a reducing sugar and an amino group from an amino acid:

Reaction Scheme I:

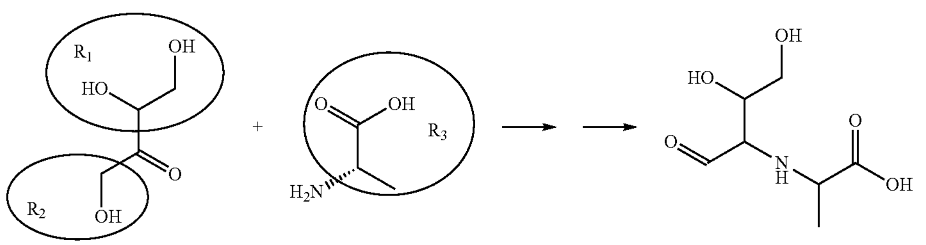

Example: Maillard reaction for Erythrulose + Alanine to the corresponding Heyns product

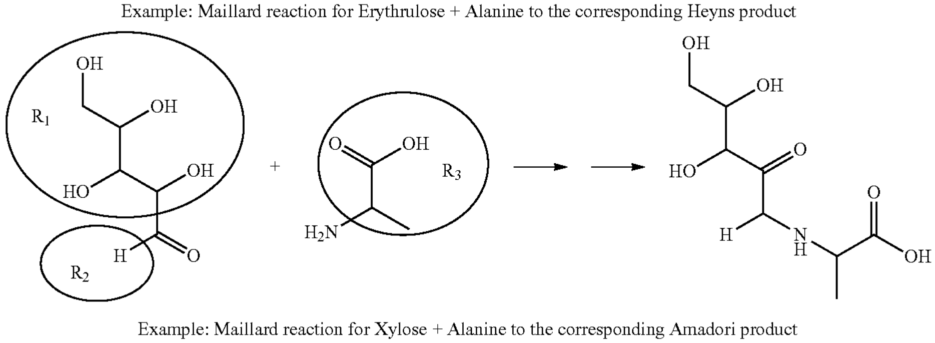

Example: Maillard reaction for Xylose + Alanine to the corresponding Amadori product R1 denotes the residue for any sugar chain in any possible chiral confirguration, including any reducing sugar with an unlimited number of glycosidic bound monosaccharides R2 = H identifies the sugar as aldose in open chain form which is equivalent to the hemiacetal R2 = CH2OH identifies the sugar as ketose in open chain form which is equivalent to the hemiacetal R3 denotes any amino acid residue inclduing its D-, L- isomers, the amino-terminal end of peptides and proteins and any second or third amino group of amino acids.

The following Reaction Scheme II below illustrates the formation of a Schiff base (a very early reaction product) between a ketone/aldehyde and an amino group from an amino acid:

Reaction Scheme II:

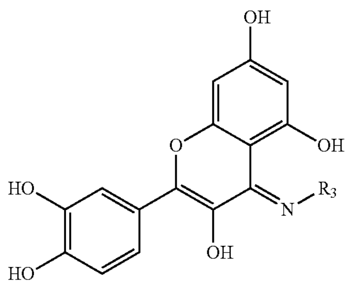

Schiff'sche Base of Quercetin
and a primary amine

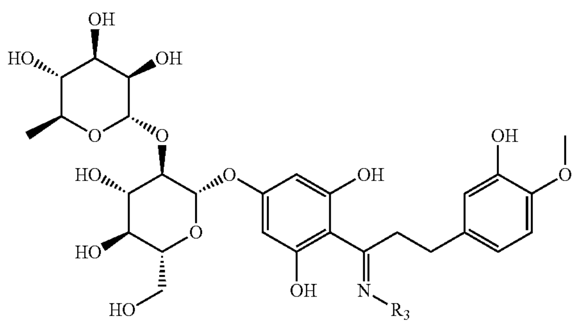

Schiff'sche Base of neohesperidinedihydrochalcone
and a primary amine

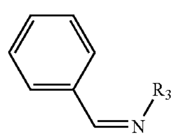

Schiff'sche Base of Benzaldehyde
and a primary amine

A Schiff'sche base is formed by the reaction of a carbonyl- and a primary amino-group. The Schiff'sche base is a very early reaction product of the Maillard Reaction. R3 denotes any amino acid residue inclduing its D-, L- isomers, the amino-terminal end of peptides and proteins and any second amino group of amino acids.

Reaction Scheme III below illustrates the formation of a Schiff base (a very early. Maillard reaction product) between an organic amine and a reducing sugar:

Reaction Scheme III:

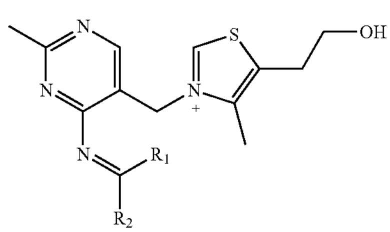

Schiff'sche Base of Thiamine
and a carbonyl-group

-continued

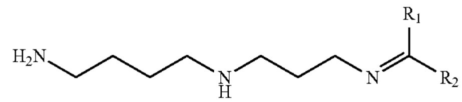

Schiff'sche Base of Spermidine
and a carbonyl-group

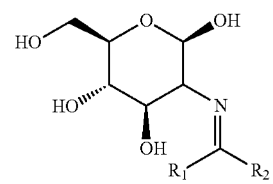

Schiff'sche Base of Glucosamine
and a carbonyl-group

A Schiff'sche base is formed by the reaction of a carbonyl- and a primary amino-group. The Schiff'sche base is a very early reaction product of the Maillard Reaction. R1 denotes the residue for any sugar chain in any possible chiral confirguration, including any reducing sugar with an unlimited number of glycosidic bound monosaccharides R2 = H identifies the sugar as aldose in open chain form which is equivalent to the hemiacetal R2 = CH2OH identifies the sugar as ketose in open chain form which is equivalent to the hemiacetal In summary, a composition of Maillard reaction products includes the raw materials for the reaction, the sugar donor and amine donor; and the finished Maillard products, which include MRP reactant products originating from the reaction between the sugar donor and the amine donor, as well as any unreacted reactants remaining after the reaction, i.e., sugar donors and amine donors. The reactants may be completely or partially consumed.

Where the sugar donor(s) is steviol glycoside, Reaction Scheme IV below illustrates a proposed reaction between a steviol glycosides and a free amino group:

Reaction Scheme IV:

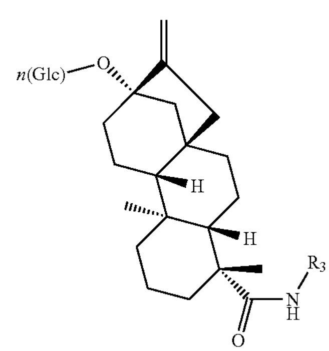

Reaction of Stevioglycoside with
free carboxylic group and primary
amine yields an amide -continued

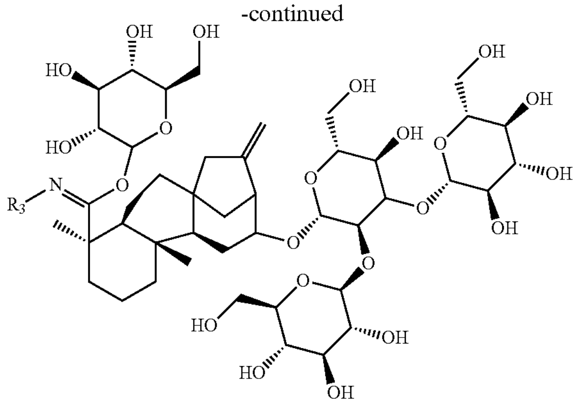

Reaction of Stevioglycoside with ester bound glucose and amine yields a Schiff'sche base.

Stevioglycosides can react with an amino group yielding an amide or a Schiff'sche base (both possible intermediates of the Maillard reaction). Upon heating, monosaccharides are liberated from stevioglycosides which undergo Maillard reaction. R3 denotes any amino acid residue inclduing its D-, L- isomers, the amino-terminal end of peptides and proteins and any second amino groups of amino acids.

Here, the finished S-MRP products are comprised of two parts: (1) unreacted reactants, including sugar donor, amine donor, *Stevia* extract with or without non-steviol glycosides; (2) reactant resultants, including any resultants from the reaction of the sugar donor, amine donor, any resultant from reaction of steviol glycosides and the amino donor, any resultant from non-steviol glycosides exracted from leaves, or other types of method to produce the steviol glycosides (e.g., fermentation, bioconversion) during the heated reaction of amine donors with or without sugar donors.

The proposed Reaction is further applicable to other high intensity natural sweeteners that are not aldoses or ketoses, but have free carboxylic groups for reaction with an amine donor.

Generally, Maillard reaction products can be classified into four groups depending on their aroma type, chemical structure, molecular shape and processing parameters. These include, but are not limited to:

Nitrogen heterocyclics-pyrazines, pyrroles, pyridines, alkyl- and acetyl-substituted saturated N-heterocyclics. These compounds are responsible for corny, nutty, roasted and breadlike odors.

Cylic enolones of maltol or isomaltol, dehydrothranones, dehydropyrones, cyclopentenolones are responsible for typically caramel like odors.

Moncarbonyls; and

Polycarbonyls-2-furaldehydes, 2-pyrrole aldehydes, C3-C6 methyl ketones;

Maillard reaction products (MRPs) include but are not limited to, for example, pyrazines, pyrroles, alkyl pyridines, acyl pyridines, furanones, furans, oxazoles, melanoidins, and thiophenes. Such MRPs impart flavors such as nutty, fruity, caramel, meaty, or combinations thereof.

For example, pyrazines provide cooked, roasted and/or toasted flavors. Pyrroles provide cereal-like or nutty flavors. Alkylpyridines provide bitter, burnt or astringent flavors. Acylpyridines provide cracker-like or cereal flavors. Furanones provide sweet, caramel or burnt flavors. Furans provide meaty, burnt, or caramel-like flavors. Oxazoles provide green, nutty or sweet flavors. Thiophenes provide meaty or roasted flavors.

In certain embodiments, the Maillard reaction products (MRPs) produced may include, but are not limited to, (1) acyclic products, such as methional, phenylacetylaldehyde, 2-mercaptopropionic acid, (E)-2-((methylthio)methyl)but-2-enal glyoxal, butanedione, pyruvaldehyde, prop-2-ene-1, 1-diylbis(methylsulfane), glyceraldehyde, 1,3-dihydroxyacetone, acetoin and glycoladehyde; (2) cyclic products, such as cyclic products including 3,5,6-trimethyhlpyrazin-2(1H)-one, 4,5-dimethyl-2-(2-(methylthio)ethyl)oxazole and 1-(3H-imidazo[4,5-c]pyridine-4-yl)ethan-1-one; (3) heterocyclic products such as 5-(hydroxymethyl)furan-2-carbaldehyde (5-hydroxymethyl furfural), 3-hydroxy-2-methyl-4H-pyran-4-one, 2-hydroxy-2,5-dimethyl-3(2H)-thiophenone, 1-(2, (3-dihydro-1H-pyrrolizin-5-yl)ethan-1-one, 1-(3H-imidazo[4,5-c]pyridine-4-yl)ethan-1-one, 3,5,6-trimethylpyrazin-2(1H)-one and 4,5-dimethyl-2-(2-(methylthio) ethyl)oxazole; (4) pyrazine products, such as 3,5,6-trimethylpyrazin-2(1H)-one; (5) melanoidins, which are poorly characterized, but generally have the following physical properties including: a mass from 1 kda to >24 kda; form oligomers of heterocyclic compounds and/or sugar fragments; form pyridines, pyrazines, pyrroles and imidazoles as determined by 13C-NMR, 15N-NMR, MALDI-TOF mass spec and IR; form oligomers from 14 to >30 identified; and normally 3-4% nitrogen is present in the molecule.

MRPs can act as a coloring agent by optimization of reaction conditions. The MRPs' own color can be combined with natural colors to create new colors. The MRPs can be blended with other colors to remove the unpleasant taste associated with the color/coloring agent.

Additionally, Maillard reactions typically create a brownish color, which might not be desirable in certain applications. The inventors of the present application have successfully developed a method to select optimized reactants and reaction condition for a desired color. Thus the final product may be prepared to provide good color, aroma, taste and texture. Suitable colors include, for example, red, orange, yellow, etc.

Maillard reaction flavors are also called process flavors. The ingredients for reaction or process flavors can include (a) a protein nitrogen source, (b) a carbohydrate source, (c) a fat or fatty acid source and (d) other ingredients including herbs and spices; sodium chloride; polysiloxane acids; bases and salts such as pH regulators; water; the salts and acid forms of thiamine, ascorbic, citric, lactic, inosinic acid and guanylic acids; esters or amino acids; inositol; sodium and ammonium sulfides and hydrosulfides; diacetyl and lecithin.

The Maillard reactions described herein can be advantageously controlled to have only $1^{st}$ or the $2^{nd}$ reaction steps in the overall process if necessary. In one embodiment, the composition(s) would include the product(s) of the first step or from the second step.

As used herein, the term "Maillard reaction" refers to a non-enzymatic reaction of (1) one or more reducing and/or non-reducing sugars, and (2) one or more amine donors in the presence of heat, wheren the non-enzymatic reaction produces a flavor. Thus, this term is used unconventionally, since it accommodates the use of use of non-reducing sweetening agents as substrates, which were not heretofore believed to serve as subtrates for the Maillard reaction, such as sweet tea extracts (*Rubus Suavissimus* S. Lee (Rosaceae) providing, for example rubusoside and suaviosides which are kaurane-type diterpene glycosides including suaviosides B, G, H, I and J), *Stevia* extracts, swingle extracts (mogroside extracts), glycosylated sweet tea extracts, glycosylated *Stevia* extracts, glycosylated swingle extracts, glycosylated sweet tea glycosides, glycosylated steviol glycosides, glycosylated mogrosi des, glycyrrhizine, glycosylated glycyrrhizinse or mixtures thereof could undergo a Maillard type reaction to provide MRPs like substances and/or caramelization to provide CRPs like substances even thought a ketone or aldehyde is not present in the sweetening agent. Not to be bound by theory, it is believed that an amine reacts with the non-reducing sugar component to provide new previously unknown compound(s). As such compositions include products preparable (or obtainable) by the reaction of an amine with a non-reducing sugar, for example, a steviol glycoside, sweet tea extract(s), glycosylated *Stevia* extracts, etc., noted as sweetening agents herein. Although these non-reducing sweetening agents include free carbonyl groups, such as free carboxyl groups, they do not have free aldehyde or free keto groups, characteristic of conventional "reducing sugars" or "caloric carbohydrate sweeteners" used in Maillard reactions.

The Maillard reactions referred to herein result in the formation of MRPs formed from conventional reducing sugar sweeteners, as well as unconventional non-reducing sweetening agents as described herein. It should be understood that Maillard reaction products can include the reaction products resulting from Maillard reactions between one or more donor amine(s) and one or more reducing sugar(s), non-reducing sweetening agents and/or components from extracts, syrups, plants, etc. that provide a source of the reducing sugar(s) and/or the non-reducing sweetening agent(s).

Steviol glycosides are not regarded as reducing sugars in the conventional sense, however, as further documented in the Examples, the inventors have surprisingly found that steviol glycosides can react with amine donors directly. Therefore, the inventors found that glycosides can act as sugar donor replacements with in a Maillard reaction with amine donors. In should be noted, however, that in certain instances steviol glycosides may be degraded to create reducing sugars which can react with amine donors in a conventional sense.

In certain preferred embodiments, a composition of the present application can comprise one or more MRPs formed where the sugar donor(s) (or sweetening agent(s)) comprise one or more glycosides.

The embodiments described herein can also provide the advantages of providing a "kokumi" taste. The term "kokumi" is used for flavors that cannot be represented by any of the five basic taste qualities. Kokumi is Japanese for "rich taste." Kokumi is a taste sensation best known for the hearty, long finish it provides to a flavor. Kokumi also provides a mouthful punch at initial taste, and lends an overall balance and richness to foods, like umami, kokumi heightens the sensation of other flavors. Therefore, kokumi helps developers respond to consumer demands for healthier products, by allowing a reduction of sodium, sugar, oil, fat or MSG content without sacrificing taste.

Kokumi can be classified into four profiles, namely thickness, continuity, mouthfulness and harmony of taste as well as long-lastingness. Compounds with kokumi properties (such as peptides) increase the perception of other tastes, especially saltiness and umami; as such, with the same amount of salt, a food rich in these kokumi compounds will be perceived as saltier and more flavorful.

One of the key performance characteristics of the MRP compositions described herein is the development of improved taste characteristics, exemplified by kokumi. The compositions provided herein have a mouthful punch at initial quick on site sweet, and overall balance and richness, which make the sweetening agents more sugar-like and overcome the disadvantages of the sweetening agents having slow onset, void, bitterness, lingering, aftertaste etc.

In addition, besides the steviol glycosides, which are ent-kaurane-type diterpene glycosides, there are many other constituents in high intensity natural sweeteners, such as phytosterols, non-glycosylated sterebins A-N ent-labdanes glycosides, nonsweet steroid glycosides, lupeol esters, pigments, flavonoids, fatty acids, phospholipids, and glycolipids etc. For example, 30 to over 300 compounds have been detected within the essential and volatile oils of *S. rebaudiand* The inventors of the present application have surprisingly found that retention of some amount of these volatile substances, such as trans-β-farnesene, nerolidol, caryophyllene, caryophyllene oxide, limonene, spathulenol together with other sesqiterpenes, nonoxygenated sesquiterpenes, mono-terpenes could improve the taste profile of steviol glycosides and create unique pleasant flavors. These flavors could also exist in their intact form, react in Maillard reactions, and/or interact with other MRP's to create new, interesting flavors. For example, they can improve the overall taste profile of steviol glycosides and make them more acceptable for consumers.

III. Mallard Reaction Components

The inventors of the present application have surprisingly discovered that non-reducing sugars may serve as substrates in the Maillard reaction and provide Maillard reaction product (MRP) compositions having improved taste profiles over previously reported high intensity natural sweetener compositions.

In one aspect, an MRP sweetening composition comprises one or more Maillard reaction products (MRPs) formed from a Maillard reaction between (1) a high intensity natural sweetening agent composition comprising one or more steviol glycosides, one or more *Stevia* extracts, or a combination thereof: and (2) an amine donor comprising a free amino group, wherein the amine donor is a primary amine compound, a secondary amine compound, an amino acid, a peptide, a protein, a protein extract, or a mixtures thereof.

In another aspect, an MRP sweetening composition comprises one or more Maillard reaction products (MRPs) formed from a Maillard reaction mixture comprising (1) a high intensity natural sweetening agent composition in combination with a reactant mixture comprising (2) an amine donor comprising a free amino group and (3) a reducing sugar comprising a free aldehyde or free ketone group, wherein the high intensity natural sweetening agent composition comprises one or more steviol glycosides, one or more *Stevia* extracts, or a combination thereof, wherein the amine donor is a primary amine compound, a secondary amine compound, an amino acid, a peptide, a protein, a protein extract, or a mixtures thereof, and wherein the reducing sugar is a monosaccharide, disaccharide, oligosaccharide, polysaccharide, or a combinations thereof.

In another aspect, an MRP sweetening composition comprises one or more MRP(s) and at least one sweetening agent or sweetener as defined in the present application.

A. Amine Donor

The term "amine reactant" or "amine donor" refers to a compound or substance containing a free amino group, which can participate in a Maillard reaction. Amine containing reactants include amino acids, peptides (including dipeptides, tripeptides, and oligopeptides), proteins, proteolytic or nonenzymatic digests thereof, and other compounds that react with reducing sugars and similar compounds in a Maillard reaction, such as phospholipids, chitosan, lipids, etc. In some embodiments, the amine reactant also provides one or more sulfur-containing groups.

Exemplary amine donors include amino acids, peptides, proteins, protein extracts.

Exemplary amino acids include, for example, nonpolar amino acids, such as alanine, glycine, isoleucine, leucine, methionine, tryptophan, phenylalanine, proline, valine; polar amino acids, such as cysteine, serine, threonine, tyrosine, asparagine, and glutamine; polar basic (positively charged) amino acids, such as histidine and lysine; and polar acidic (negatively charged) amino acids, such as aspartate and glutamate.

Exemplary peptides include, for example, hydrolyzed vegetable proteins (HYPs) and mixtures thereof.

Exemplary proteins include, for example, sweet taste-modifying proteins, soy protein, sodium caseinate, whey protein, wheat gluten or mixtures thereof. Exemplary sweet taste-modifying proteins include, for example, thaumatin, monellin, brazzein, miraculin, curculin, pentadin, mabinlin, and mixtures thereof. In certain embodiments, the sweet-taste modifying proteins may be used interchangeably with the term "sweetener enhancer."

Exemplary protein extracts include yeast extracts, plant extracts, bacterial extracts and the like.

The nature of the amino donor can play an important role in accounting for the many flavors produced from a Maillard reaction. In some embodiments, the amine donor may account for one or more flavors produced from a Maillard reaction. In some embodiments, a flavor may be produced from a Maillard reaction by using one or more amine donors, or a particular combination of a amine donor and sugar donor.

In certain embodiments, the amine donor is present in the compositions described herein in a range of from about 1 to about 99 weight percent, from about 1 to about 50 weight percent, from about 1 to about 10 weight percent, from about 2 to about 9 weight percent, from about 3 to about 8 weight percent, from about 4 to about 7 weight percent, from about 5 to about 6 weight percent and all values and ranges encompassed over the range of from about 1 to about 50 weight percent.

B. Sugar Donor

The sugar donor may be a reducing sugar, a non-reducing sugar, or a combination thereof.

In some embodiments, the MR reactants include one or more reducing sugars in combination with one or more amine donors. When a reaction mixture contains these reactants in the absence of non-reducing sugars (including high intensity natural sweeteners) an MRP composition is formed.

Reducing groups are found on reducing sugars. Initially, a reactive carbonyl group of a reducing sugar condenses with a free amino group, with a concomitant loss of a water molecule. A reducing sugar substrate for the Maillard reaction typically has a reactive carbonyl group in the form of a free aldehyde (aldose) or a free ketone (ketose).

In some embodiments, the MR reactants include (1) one or more amine donors and (2) one or more reducing sugars.

In other embodiments, the MR reactants include (1) one or more amine donors and (2) one or more non-reducing sugars.

In other embodiments, the MR reactants include (1) one or more amine donors; (2) one or more non-reducing sugars; and (3) one or more reducing sugars.

In some embodiments, non-reducing sugar refers to a sugar or sweetening agent that does not contain free aldehyde or free keto groups. Exemplary non-reducing sugars include sucrose, trehalose, raffinose, stachyose, and verbascose. Exemplary non-reducing sweetening agents include high intensity natural sweetening agents.

In some embodiments, the non-reducing sugars include one or more high intensity natural sweetening agents, which may be included as reactant(s) in the Maillard reaction or are added to MRP compositions formed therefrom. The high intensity natural sweetening agents may comprise the only sugar donor(s) in the Maillard reaction mixture or they may be combined with one or more sweetening agents. Alternatively, or in addition, the natural and/or synthetic sweetening agents may be added to an MRP composition after completion of the MR reaction.

High-intensity natural sweeteners are commonly used as sugar substitutes or sugar alternatives, because they are many times sweeter than sugar, contribute only a few to no calories when added to foods, and enhance the flavor of foods. Because they are many times sweeter than table sugar (sucrose), smaller amounts of high-intensity sweeteners are needed to achieve the same level of sweetness as sugar in food. Moreover, they generally will not raise blood sugar levels.

High intensity synthetic sweeteners are synthetically produced sugar substitutes or sugar alternatives that are similarly many times sweeter than sugar and contribute few to no calories when added to foods. Moreover, they can be similarly used as Maillard reaction components or as flavor enhancers added to MRP compositions of the present application. High intensity synthetic sweeteners include Advantame, Aspartame, Acesulfame potassium (Ace-K), Neotame, Sucralose, and Saccharin.

The present inventor has found that Advantame can boost the flavor and taste profile of the compositions disclosed herein, especially when added after Maillard reaction. Generally, Advantame and other high intensity synthetic sweeteners can be added in the range of 0.01 ppm to 100 ppm.

In some embodiments, the MR reactants include (1) one or more amine donors; and (2) one or more terpenoid glycosides with or without additional sweetening agents and/or reducing sugars.

In some embodiments, the sugar donor may account for one or more flavors produced from a Maillard reaction. More particularly, a flavor may be produced from a Maillard reaction by using one or more sugar donors, wherein at least one sugar donor is selected from a product comprising a glycoside and a free carbonyl group. In some embodiments, glycosidic materials for use in Maillard reactions include natural concentrates/extracts selected from bilberry, raspberry, lingonberry, cranberry, apple, peach, apricot, mango, etc.

Reducing sugars can be derived from various sources for use as a sugar donor in the Maillard reaction or as a component added to an MRP composition. For example, a sugar syrup may be extracted from a natural source, such as Monk fruit, fruit juice or juice concentrate (e.g., grape juice, apple juice, etc.), vegetable juice (e.g., onion etc.), or fruit (e.g., apples, pears, cherries, etc.), could be used as sugar donor. Such a syrup may include any type of juice regardless whether there is any ingredient being isolated from juice, such as purified apple juice with trace amount of malic acid etc. The juice could be in the form of liquid, paste or solid. Reducing sugars may also be extracted from *Stevia*, sweet tea, luohanguo, etc. after isolation of high intensity sweetening agents described herein (containing non-reducing sugars) from crude extracts and mixtures thereof.

The natural extracts used in Maillard reactions described herein can include any solvent extract-containing substances, such as polyphenols, free amino acids, flavonoids etc. The extracts can be further purified by methods such as resin-enriched, membrane filtration, crystallization etc., as further described herein.

In one embodiment, a Maillard reaction mixture or an MRP composition produced thereof may include a sweetener, thaumatin, and optionally one or more MRP products, wherein the sweetener is selected from date paste, apple juice concentrate, monk fruit concentrate, sugar beet syrup, pear juice or puree concentrate, apricot juice concentrate. Alternatively, a root or berry juice may be used as as sugar donor or sweetener added to an MRP composition.

In some embodiments, particular flavors may be produced from a Maillard reaction through the use of one or more sugar donors, where at least one sugar donor is selected from plant juice/powder, vegetable juice/powder, berries juice/powder, fruit juice/powder. In certain preferred embodiments, a concentrate or extract may be used, such as a bilberry juice concentrate or extract having an abundance of anthocyanins. Optionally, at least one sugar donor and/or one amine donor is selected from animal source based products, such as meat, oil etc. Meat from any part of an animal, or protein(s) from any part of a plant could be used as source of amino donor(s) in this application.

In certain embodiments, the sugar donor is present in the compositions described herein in a range of from about 1 to about 99 weight percent, from about 1 to about 50 weight percent, from about 1 to about 10 weight percent, from about 2 to about 9 weight percent, from about 3 to about 8 weight percent, from about 4 to about 7 weight percent, from about 5 to about 6 weight percent and all values and ranges encompassed over the range of from about 1 to about 50 weight percent.

B1. Reducing Sugars and Carbohydrate Sweeteners

In certain embodiments, the sugar donor is a reducing sugar or carbohydrate sweetener. Reducing sugars for use in the present application include, for example, all monosaccharides and some disaccharides, which can be aldose reducing sugars or ketose reducing sugars. Typically, the reducing sugar may be selected from the group consisting of aldotetrose, aldopentose, aldohexose, ketotetrose, ketopentose, and ketohexose reducing sugars. Suitable examples of aldose reducing sugars include erythrose, threose, ribose, arabinose, xylose, lyxose, allose, altrose, glucose, mannose, gulose, idose, galactose and talose. Suitable examples of ketose reducing sugars include erythrulose, ribulose, xylulose, psicose, fructose, sorbose and tagatose. The aldose or the ketose may also be a deoxy-reducing sugar, for example a 6-deoxy reducing sugar, such as fucose or rhamnose.

Specific monosaccharide aldoses include, for example, reducing agents include, for example, where at least one reducing sugar is a monosaccharide, or the one or more reducing sugars are selected from a group comprising monosaccharide reducing sugars, typically at least one monosaccharide reducing sugar is an aldose or a ketose.

Where the reducing sugar is a monosaccharide, the monosaccharide may be in the D- or L-configuration, or a mixture thereof. Typically, the monosaccharide is present in the configuration in which it most commonly occurs in nature. For example, the one or more reducing sugars may be selected from the group consisting of D-ribose, L-arabinose, D-xylose, D-lyxose, D-glucose, D-mannose, D-galactose, D-psicose, D-fructose, L-fucose and L-rhamnose. In a more particular embodiment, the one or more reducing sugars are selected from the group consisting of D-xylose, D-glucose, D-mannose, D-galactose, L-rhamnose and lactose.

Specific reducing sugars include ribose, glucose, fructose, maltose, lyxose, galactose, mannose, arabinose, xylose, rhamnose, rutinose, lactose, maltose, cellobiose, glucuronolactone, glucuronic acid, D-allose, D-psicose, xylitol, allulose, melezitose, D-tagatose, D-altrose, D-aiditol, L-gulose, L-sorbose, D-talitol, inulin, stachyose, including mixtures and derivatives therefrom.

Exemplary disaccharide reducing sugars for use in the present application include maltose, lactose, lactulose, cellobiose, kojibiose, nigerose, sophorose, laminarbiose, gentiobiose, turanose, maltulose, palantinose, gentiobiulose, mannobiose, melibiose, melibiulose, rutinose, rutinulose or xylobiose.

Mannose and glucuronolactone or glucuronic acid can be used as sugar donors under Maillard reaction conditions, although they have seldom been used. Maillard reaction products of mannose, glucuronolactone or glucuronic acid provide yet another unique approach to provide new taste profiles with the sweetening agents described thoughout the specification alone or in combination with additional natural sweeteners, synthetic sweeteners, and/or flavoring agents described herein.

Additionally, the reducing sugars for use in the present application additionally include any of the carbohydrate sweeteners described above in Section II.

B2. Terpenoid Glycosides ("TGs")

Terpenoid glycosides include steviol glycosides and other high intensity natural sweetening agents from plants, including glycosides, which may serve as sugar substitutes, and which are further described below.

A glycoside is a molecule in which a sugar is bound to another functional group via a glycosidic bond. The sugar group is known as the glycone and the non-sugar group as the aglycone or genin part of the glycoside. Glycosides are prevalent in nature and represent a significant portion of all the pharmacologically active constituents of botanicals. As a class, aglycones are much less water-soluble than their glycoside counterparts.

Depending on whether the glycosidic bond lies "below" or "above" the plane of the cyclic sugar molecule, glycosides of the present application can be classified as α-glycosides or β-glycosides. Some enzymes such as α-amylase can only hydrolyze α-linkages; others, such as emulsin, can only affect β-linkages. Further, there are four types of linkages present between glycone and aglycone: a C-linked glycosidic bond, which cannot be hydrolyzed by acids or enzymes; an O-linked glycosidic bond; an N-linked glycosidic bond; or an S-linked glycosidic bond.

The glycone can consist of a single sugar group (monosaccharide) or several sugar groups (oligosaccharide). Exemplary glycones include glucose, galactose, fructose, mannose, rhamnose, rutinose, xylose, lactose, arabinose, glucuronic acid etc. An aglycone is the compound remaining after the glycosyl group on a glycoside is replaced by a hydrogen atom. When combining a glycone with an aglycone, a number of different glycosides may be formed, including steviol glycosides, terpenoid glycosides, alcoholic glycosides, anthraquinone glycosides, coumarin glycosides, chromone glycosides, cucurbitane glycosides, cyanogenic glycosides, flavonoid glycosides, phenolic glycosides, steroidal glycosides, iridoid glycosides, and thioglycosides.

For example, the term "flavonoid aglycone" refers to an unglycosylated flavonoid. Flavonoid aglycones include flavone aglycones, flavanol aglycones, flavanone aglycones, isoflavone aglycones and mixtures thereof. Thus, the terms "flavone aglycone", "flavanol aglycone", "flavanone aglycone" and "isoflavone aglycones" refer to unglycosylated flavones, flavanols, flavanones and isoflavones, respectively. More particularly, the flavonoid aglycone may be selected from the group consisting of apigenin, luteolin, quercetin, kaempferol, myricetin, naringenin, pinocembrin, hesperetin, genistein, and mixtures thereof.

Terpenoid glycosides (TGs) for use in the present application, include e.g., steviol glycosides, *Stevia* extracts, mogrosides (MGs), *Siraitia grosvenorii* (luo han guo or monk fruit) plant extracts, rubusosides (RUs), *Rubus suavissimus* (Chinese sweet tea) plant extracts; flavanoid glycosides, such as neohesperidin dihydrochalcone (NHDC); osladin, a sapogenin steroid glycoside from the rhizome of *Polypodium vulgare*; trilobatin, a dihydrochalcone glucoside from apple leaves; eriodictyol, a bitter-masking flavonoid glycoside extracted from yerba santa (*Eriodictyon californicum*), one of the four flavanones extracted from this plant as having taste-modifying properties, along homoeriodictyol, its sodium salt, and sterubin; polypodoside A (from the rhizome of *Polypodium glycyrrhiza*); phyllodulcin, a coumarin glycoside found in *Hydrangea macrophylla* and *Hydrangea serrata*; swingle glycosides, such as mogroside V, mogroside IV, siamenoside I, and 11-oxomogroside V, which are cucurbitane glycosides; monatin, a naturally occurring, high intensity sweetener isolated from the plant *Sclerochiton ilicifolius*, and its salts (monatin SS, RR, RS, SR); hernandulcin, an intensely sweet chemical compound gained from the chiefly Mexican and South American plant *Lippia dulcis*; phlorizin, plant-derived dihydrochalcone that is a glucoside of phloretin, which is found primarily in unripe *Malus* (apple) and the root bark of apple; glycyphyllin, an alpha-L-rhamnoside derived from phloretin, the aglucone of phlorizin, a plant-derived dihydrochalcone; baiyunoside, a diterpene glycoside isolated from the Chinese drug Bai-Yun-Shen; pterocaryoside A and pterocaryoside B, secodammarane saponin glycosides isolated from *Pterocarya paliurus* Batal. (Juglandaceae), which are native to China; mukuroziosides Ia, Ib, IIa and Iib, acyclic sesquiterpene oligoglycosides isolated from the pericarp of *Sapindus mukurossi* and *Sapindus rarak*; phlomisoside I, a furanolabdane-type diterpene glycoside isolated from the roots of the Chinese plant, *Phlomis betonicoides* Diels (Lamiaceae); periandrin I and V, two sweet-tasting triterpene-glycosides from *Periandra dulcis*; abrusoside A-D, four sweet tasting triterpine glycosides from the leaves of *Abrus precalorius*; cyclocariosides I; II, and III, and synthetically glycosylated compositions thereof (e.g., GSGs, glycosylated *Stevia* extracts etc).

It should be understood that throughout this specification, when reference is made to a specific terpenoid glycoside or high intensity natural sweetening agent, such as an SG, a *Stevia* extract, a mogroside, a swingle extract, a sweet tea extract, NHDC, or any glycosylated derivative thereof, that the example is meant to be inclusive and applicable to all of the other terpenoid glycosides or high intensity natural sweetening agents in these classes. The same applies to other sweeteners; when reference is made to a sweetening agent, such as a terpenoid glycoside sweetener, steviol glycoside sweetener, high intensity natural sweetener, sweetener enhancer, high intensity synthetic sweetener, reducing sugar, or non-reducing sugar, that the example is meant to be inclusive and applicable to all of the other sweeteners or sweetening agents in any given class.

B3. Steviol Glycosides (SGs)

Extracts from *Stevia* plants provide steviol glycosides ("SGs") with varying percentages of components, SGs. The phrase "steviol glycoside" is recognized in the art and is intended to include the major and minor constituents of *Stevia*. These "SGs" include, for example, stevioside, steviolbioside, rebaudioside A (RA), rebaudioside B (RB), rebaudioside C (RC), rebaudioside D (RD), rebaudioside E (RE), rebaudioside F (RF), rebaudioside M (RM), rebaudioside O (RO), rebaudioside H (RH), rebaudioside I (RI), rebaudioside L (RL), rebaudioside N (RN), rebaudioside K (RK), rebaudioside J (RJ), rubusoside, dulcoside A (DA) as well as those listed in Tables A and B (below) or mixtures thereof.

As used herein, the terms "steviol glycoside," or "SG" refers to a glycoside of steviol, a diterpene compound shown in Formula I.

(I)

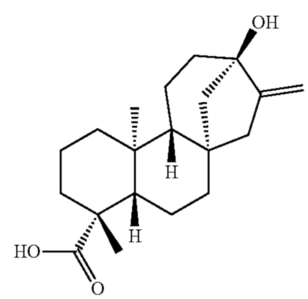

As shown in Formula II, GSGs are comprised of steviol molecules glycosylated at the C13 and/or C19 position(s).

(II)

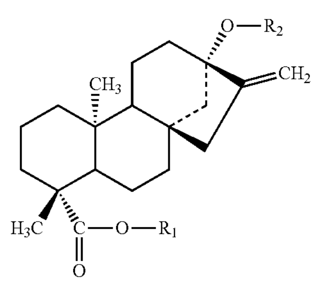

Based on the type of sugar (i.e. glucose, rhamnose/deoxyhexose, xylose/arabinose) SGs can be grouped into three families (1) SGs with glucose; (2) SG with glucose and one rhamnose or deoxyhexose moiety; and (3) SGs with glucose and one xylose or arabinose moiety.

Table A provides a non-limiting list of about 80 SGs grouped according to the molecular weight. The steviol glycosides for use in the present application are not limited by source or origin. Steviol glycosides may be extracted from *Stevia* leaves, synthesized by enzymatic processes, synthesized by chemical syntheses, or produced by fermentation. Steviol glycosides found in the *Stevia* plant include rebaudioside A (RA), rebaudioside B (RB), rebaudioside D (RD), stevioside, rubusoside, as well as those in Table B (below) etc., and further includes mixtures thereof. The steviol glycoside of interest can be purified before use.

TABLE A

| SGs grouped by molecular weight (MW) | | | | | | | |
|---|---|---|---|---|---|---|---|
| SG Name | MW | # Added Glucose moieties mw = 180 | # Added Rhamnose/ Deoxyhexose moieties mw = 164 | # Added Xylose/ Arabinose moieties mw = 150 | R1 (C-19) | R2 (C-13) | Backbone |
| Related SvGn#1 | 457 | — | | | | | |
| Steviol-monoside | 479 | 1 | | | H— | Glcβ1- | Steviol |
| Steviol-monoside A | 479 | 1 | 1 | | Glcβ1- | H— | |
| SG-4 | 611 | 1 | | 1 | H— | Xylβ(1-2)Glcβ1- | Steviol |
| Dulcoside A1 | 625 | 1 | 1 | | H— | Rhaα(1-2)Glcβ1- | Steviol |
| Iso-steviol-bioside | 641 | 2 | | | H— | Glcβ(1-2)Glcβ1- | Isosteviol |
| Reb-G1 | 641 | 2 | | | H— | Glcβ(1-3) Glcβ1- | Steviol |
| Rubusoside | 641 | 2 | | | Glcβ1- | Glcβ1- | Steviol |
| Steviolbioside | 641 | 2 | | | H— | Glcβ(1-2)Glcβ1- | Steviol |
| Related SvGn#3 | 675 | — | | | | | |
| Reb-F1 | 773 | 2 | | 1 | H— | Xylβ(1-2)[Glcβ(1-3)]Glcβ1- | Steviol |
| Reb-R1 | 773 | 2 | | 1 | H— | Glcβ(1-2)[Glcβ1-3)]Xylβ1- | Steviol |
| Slevioside F (SG-1) | 773 | 2 | | 1 | Glcβ1- | Xylβ(1-2)Glcβ1- | Steviol |
| SG-Unk1 | 773 | 2 | | 1 | — | — | Steviol |
| Dulcoside A | 787 | 2 | 1 | | Glcβ1- | Rhaα(1-2)Glcβ1- | Steviol |
| Dulcoside B (JECFA C) | 787 | 2 | 1 | | H— | Rhaα(1-2)[Glcβ1-3)]Glcβ1- | Steviol |
| SG-3 | 787 | 2 | 1 | | H— | 6-deoxyGlcβ(1-2)[Glcβ1-3)]Glcβ1- | Steviol |
| Stevioside D | 787 | 2 | 1 | | Glcβ1- | Glcβ(1-2)6-deoxyGlcβ1- | |
| Iso-Reb B | 803 | 3 | | | H— | Glcβ(1-2)[Glcβ(1-3)]Glcβ1- | Isosteviol |
| Iso-Stevioside | 803 | 3 | | | Glcβ1- | Glcβ(1-2)Glcβ1- | Isosteviol |
| Reb B | 803 | 3 | | | H— | Glcβ(1-2)[Glcβ(1-3)]Glcβ1- | Steviol |
| Reb G | 803 | 3 | | | Glcβ1- | Glcβ(1-3)Glcβ1- | Steviol |
| Reb-KA | 803 | 3 | | | Glcβ(1-2)Glcβ1- | Glcβ1- | Steviol |
| SG-13 | 803 | 3 | | | Glcβ1- | Glcβ(1-2)Glcβ1- | Isomeric steviol (12α-hydroxy) |
| Stevioside | 803 | 3 | | | Glcβ1- | Glcβ(1-2)Glcβ1- | Steviol |
| Stevioside B (SG-15) | 803 | 3 | | | Glcβ(1-3)Glcβ1- | Glcβ1- | Steviol |
| Reb F | 935 | 3 | | 1 | Glcβ1- | Xylβ(1-2)[Glcβ(1-3)]Glcβ1- | Steviol |
| Reb R | 935 | 3 | | 1 | Glcβ1- | Glcβ(1-2)[Glcβ(1-3)]Xylβ1- | Steviol |
| SG-Unk2 | 935 | 3 | | 1 | — | — | Steviol |
| SG-Unk3 | 935 | 3 | | 1 | — | — | Steviol |
| Reb F3 (SG-11) | 935 | 3 | | 1 | Xylβ(1-6)Glcβ1- | Glcβ(1-2)Glcβ1- | Steviol |
| Reb F2 (SG-14) | 935 | 3 | | 1 | Glcβ1- | Glcβ(1-2)[Xylβ(1-3)]Glcβ1- | Steviol |
| Reb C | 949 | 3 | 1 | | Glcβ1- | Rhaα(1-2)[Glcβ(1-3)]Glcβ1- | Steviol |
| Reb C2/Reb S | 949 | 3 | 1 | | Rhaα(1-2)Glcβ1- | Glcβ(1-2)Glcβ1- | Steviol |
| Stevioside E (SG-9) | 949 | 3 | 1 | | Glcβ1- | 6-DeoxyGlcβ(1-2)[Glcβ(1-3)]Glcβ1- | Steviol |
| Stevioside E2 | 949 | 3 | 1 | | 6-DeoxyGlcβ1- | Glcβ(1-2)[Glcβ(1-3)]Glcβ1- | |
| SG-10 | 949 | 3 | 1 | | Glcβ1- | Glcα(1-3)Glcβ(1-2)[Glcβ(1-3])Glcβ1- | Steviol |
| Reb L1 | 949 | 3 | 1 | | H— | Glcβ(1-3)Rhaα(1-2)[Glcβ(1-3)]Glcβ1- | Steviol |
| SG-2 | 949 | 3 | 1 | | Glcβ1- | 6-deoxyGlcβ(1-2)[Glcβ(1-3)]Glcβ1- | Steviol |
| Reb A3 (SG-8) | 965 | 4 (1 Fru) | | | Glcβ1- | Glcβ(1-2)[Fruβ(1-3)]Glcβ1- | |

TABLE A-continued

| SGs grouped by molecular weight (MW) | | | | | | | |
|---|---|---|---|---|---|---|---|
| SG Name | MW | # Added Glucose moieties mw = 180 | # Added Rhamnose/ Deoxyhexose moieties mw = 164 | # Added Xylose/ Arabinose moieties mw = 150 | R1 (C-19) | R2 (C-13) | Backbone |
| Iso-Reb A | 965 | 4 | | | Glcβ1- | Glcβ(1-2)[Glcβ(1-3)]Glcβ1- | Isosteviol |
| Reb A | 965 | 4 | | | Glcβ1- | Glcβ(1-2)[Glcβ(1-3)]Glcβ1- | Steviol |
| Reb A2 (SG-7) | 965 | 4 | | | Glcβ1- | Glcβ(1-6)[Glcβ(1-2)]Glcβ1- | Steviol |
| Reb E | 965 | 4 | | | Glcβ(1-2)Glcβ1- | Glcβ(1-2)Glcβ1- | Steviol |
| Reb H1 | 965 | 4 | | | H— | Glcβ(1-6)Glcβ(1-3)[Glcβ1-3)]Glcβ1- | Steviol |
| Related SvGn#2 | 981 | — | | | | | |
| Related SvGn#5 | 981 | — | | | | | |
| Reb U2 | 1097 | 4 | | 1 | Xylβ(1-2)[Glcβ(1-3)]Glcβ1- | Glcβ(1-2)Glcβ1- | |
| Reb T | 1097 | 4 | | 1 | Xylβ(1-2)Glcβ1- | Glcβ(1-2)[Glcβ(1-3)]Glcβ1- | |
| Reb W | 1097 | 4 | | 1 | Glcβ(1-2)[Araβ(1-3)]Glcβ1- | Glcβ(1-2)Glcβ1- | |
| Reb W2 | 1097 | 4 | | 1 | Araβ(1-2)Glcβ1- | Glcβ(1-2)[Glcβ(1-3)]Glcβ1- | |
| Reb W3 | 1097 | 4 | | 1 | Araβ(1-6)Glcβ1- | Glcβ(1-2)[Glcβ(1-3)]Glcβ1- | |
| Reb U | 1097 | 4 | | 1 | Araα(1-2)-Glcβ1- | Glcβ(1-2)[Glcβ(1-3)]Glcβ1- | Steviol |
| SG-12 | 1111 | 4 | 1 | | Rhaα(1-2)Glcβ1- | Glcβ(1-2)[Glcβ(1-3)]Glcβ1- | Steviol |
| Reb H | 1111 | 4 | 1 | | Glcβ1- | Glcβ(1-3)Rhaα(1-2)[Glcβ(1-3)]Glcβ1- | Steviol |
| Reb J | 1111 | 4 | 1 | | Rhaα(1-2)Glcβ1- | Glcβ(1-2)[Glcβ(1-3)]Glcβ1- | Steviol |
| Reb K | 1111 | 4 | 1 | | Glcβ(1-2)Glcβ1- | Rhaα(1-2)[Glcβ(1-3)]Glcβ1- | Steviol |
| Reb K2 | 1111 | 4 | 1 | | Glcβ(1-6)Glcβ1- | Rhaα(1-2)[Glcβ(1-3)]Glcβ1- | Steviol |
| SG-Unk4 | 1111 | 4 | 1 | | — | — | Steviol |
| SG-Unk5 | 1111 | 4 | 1 | | — | — | Steviol |
| Reb D | 1127 | 5 | | | Glcβ(1-2)Glcβ1- | Glcβ(1-2)[Glcβ(1-3)]Glcβ1- | Steviol |
| Reb I | 1127 | 5 | | | Glcβ(1-3)Glcβ1- | Glcβ(1-2)[Glcβ(1-3)]Glcβ1- | Steviol |
| Reb L | 1127 | 5 | | | Glcβ1- | Glcβ(1-6)Glcβ(1-2)[Glcβ(1-3)]Glcβ1- | Steviol |
| Reb I3 | 1127 | 5 | | | [Glcβ(1-2)Glcβ(1-6)]Glcβ1- | Glcβ(1-2)Glcβ1- | |
| SG-Unk6 | 1127 | 5 | | | — | — | Steviol |
| Reb Q (SG-5) | 1127 | 5 | | | Glcβ1- | Glcα(1-4)Glcβ(1-2)[Glcβ(1-3)]Glcβ1- | Steviol |
| Reb I2 (SG-6) | 1127 | 5 | | | Glcβ1- | Glcα(1-3)Glcβ1-2[Glcβ1-3)]Glcβ1- | Steviol |
| Reb Q2 | 1127 | 5 | | | Glcα(1-2)Glcα(1-4)Glcβ1- | Glcβ(1-2)Glcβ1- | |
| Reb Q3 | 1127 | 5 | | | Glcβ1- | Glcα(1-4)Glcβ(1-3)[Glcβ(1-2)]Glcβ1- | |
| Reb T1 | 1127 | 5 (1 Gal) | | | Galβ(1-2)Glcβ1- | Glcβ(1-2)[Glcβ(1-3)]Glcβ1- | |
| Related SvGn#4 | 1127 | — | | | | | |
| Reb V2 | 1259 | 5 | | 1 | Xylβ(1-2)[Glcβ(1-3)]-Glcβ1- | Glcβ(1-2)[Glcβ(1-3)]Glcβ1- | Steviol |
| Reb V | 1259 | 5 | | 1 | Glcβ(1-2)[Glcβ(1-3)]Glcβ1- | Xylβ(1-2)[Glcβ(1-3)]-Glcβ1- | |
| Reb Y | 1259 | 5 | | 1 | Glcβ(1-2)[Araβ(1-3)]Glcβ1- | Glcβ(1-2)[Glcβ(1-3)]Glcβ1- | |
| Reb N | 1273 | 5 | 1 | | Rhaα(1-2)[Glcβ(1-3)]Glcβ1- | Glcβ(1-2)[Glcβ(1-3)]Glcβ1- | Steviol |
| Reb M | 1289 | 6 | | | Glcβ(1-2)[Glcβ(1-3)]Glcβ1- | Glcβ(1-2)[Glcβ(1-3)]Glcβ1- | Steviol |
| 15α-OH Reb M | 1305 | 6 | | | Glcβ1-2(Glcβ1-3)Glcβ1- | Glcβ(1-2)[Glcβ1-3]Glcβ1- | 15α-Hydroxy-steviol |

TABLE A-continued

| SGs grouped by molecular weight (MW) | | | | | | | |
|---|---|---|---|---|---|---|---|
| SG Name | MW | # Added Glucose moieties mw = 180 | # Added Rhamnose/ Deoxyhexose moieties mw = 164 | # Added Xylose/ Arabinose moieties mw = 150 | R1 (C-19) | R2 (C-13) | Backbone |
| Reb O | 1435 | 6 | 1 | | Glcβ(1-3)Rhaα(1-2)[Glcβ(1-3)]Glcβ1- | Glcβ(1-2)[Glcβ(1-3)]Glcβ1- | Steviol |
| Reb O2 | 1435 | 6 | 1 | | Glcβ(1-4)Rhaα(1-2)[Glcβ(1-3)]Glcβ1- | Glcβ(1-2)[Glcβ(1-3)]Glcβ1- | |

Legend: SG-1 to 16: SGs without a specific name; SG-Unk1-6: SGs without detailed structural proof; Glc: Glucose; Rha: Rhamnose; Xyl: Xylose; Ara: Arabinose.

TABLE B

| | Name | MW | Added Glucose MW = 180 | Added Rhamnoe/ DeoxyHex MW = 164 | Added Xylose/ Arabinose MW = 150 | R1 (C-19) | R2 (C-13) | Backbone |
|---|---|---|---|---|---|---|---|---|
| SG-1G | Steviol-monoside | 480 | 1 | | | H— | Glcβ1- | Steviol |
| | Steviol-monoside A | 480 | 1 | | | Glcβ1- | H— | Steviol |
| SG-1G1R | Dulcoside A1 | 626 | 1 | 1 | | H— | Rhaα(1-2)Glcβ1- | Steviol |
| | Dulcoside A1 | 626 | 1 | 1 | | | | Steviol |
| SG-1G1X | SG-4 | 612 | 1 | | 1 | H— | Xylβ(1-2)Glcβ1- | Steviol |
| SG-2G | Reb-G1 | 642 | 2 | | | H— | Glcβ(1-3)Glcβ1- | Steviol |
| | Rubusoside | 642 | 2 | | | Glcβ1- | Glcβ1- | Steviol |
| | Steviolbioside | 642 | 2 | | | H— | Glcβ(1-2)Glcβ1- | Steviol |
| SG-2G1R | Dulcoside A | 788 | 2 | 1 | | Glcβ1- | Rhaα(1-2)Glcβ1- | Steviol |
| | Dulcoside B (JECFA C) | 788 | 2 | 1 | | H— | Rhaα(1-2)[Glcβ(1-3)]Glcβ1- | Steviol |
| | SG-3 | 788 | 2 | 1 | | H— | 6-deoxyGlcβ(1-2)[Glcβ)1-3)]Glcβ1- | Steviol |
| | Stevioside D | 788 | 2 | 1 | | Glcβ1- | Glcβ(1-2)6-deoxyGlcβ1- | Steviol |
| SG-2G1X | Reb-F1 | 774 | 2 | | 1 | H— | Xylβ(1-2)[Glcβ(1-3)]Glcβ1- | Steviol |
| | Reb-R1 | 774 | 2 | | 1 | H— | Glcβ(1-2)[Glcβ(1-3)]Xlyβ1- | Steviol |
| | Stevioside F (SG-1) | 774 | 2 | | 1 | Glcβ1- | Xylβ(1-2)Glcβ1- | Steviol |
| | SG-Unk1 | 774 | 2 | | 1 | — | — | Steviol |
| SG-3G | Reb B | 804 | 3 | | | H— | Glcβ(1-2)[Glcβ(1-3)]Glcβ1- | Steviol |
| | Reb G | 804 | 3 | | | Glcβ1- | Glcβ(1-3)Glcβ1- | Steviol |
| | Reb-KA | 804 | 3 | | | Glcβ(1-2)Glcβ1- | Glcβ1- | Steviol |
| | Stevioside | 804 | 3 | | | Glcβ1- | Glcβ(1-2)Glcβ1- | Steviol |
| | Stevioside B (SG-15) | 804 | 3 | | | Glcβ(1-3)Glcβ1- | Glcβ1- | Steviol |
| SG-3G1Fru | Reb A3 (SG-8) | 966 | 4 (1 Fru) | | | Glcβ1- | Glcβ(1-2)[Fruβ(1-3)]Glcβ1- | Steviol |
| SG-3G1R | Reb C | 950 | 3 | 1 | | Glcβ1- | Rhaα(1-2)[Glcβ(1-3)]Glcβ1- | Steviol |
| | Reb C2/ RebS | 950 | 3 | 1 | | Rhaα(1-2)Glcβ1- | Glcβ(1-2)Glcβ1- | Steviol |
| | Stevioside E (SG-9) | 950 | 3 | 1 | | Glcβ1- | 6-DeoxyGlcβ(1-2)[Glcβ(1-3)]Glcβ1- | Steviol |
| | Stevioside E2 | 950 | 3 | 1 | | 6-DeoxyGlcβ1- | Glcβ(1-2)[Glcβ(1-3)]Glcβ1- | Steviol |

TABLE B-continued

| | Name | MW | Added Glucose MW = 180 | Added Rhamnoe/ DeoxyHex MW = 164 | Added Xylose/ Arabinose MW = 150 | R1 (C-19) | R2 (C-13) | Backbone |
|---|---|---|---|---|---|---|---|---|
| | SG-10 | 950 | 3 | 1 | | Glcβ1- | Glcα(1-3)Glcβ(1-2)[Glcβ(1-3])Glcβ1- | Steviol |
| | Reb L1 | 950 | 3 | 1 | | H— | Glcβ(1-3)Rhaα(1-2)[Glcβ(1-3)]Glcβ1- | Steviol |
| | SG-2 | 950 | 3 | 1 | | Glcβ1- | 6-deoxyGlcβ(1-2)[Glcβ(1-3)]Glcβ1- | Steviol |
| SG-3G1X | Reb F | 936 | 3 | | 1 | Glcβ1- | Xylβ(1-2)[Glcβ(1-3)lGlcβ1- | Steviol |
| | Reb R | 936 | 3 | | 1 | Glcβ1- | Glcβ(1-2)[Glcβ(1-3)]Xylβ1- | Steviol |
| | SG-Uuk2 | 936 | 3 | | 1 | — | — | Steviol |
| | SG-Unk3 | 936 | 3 | | 1 | — | — | Steviol |
| | Reb F3 (SG-11) | 936 | 3 | | 1 | Xylβ(1-6)Glcβ1- | Glcβ(1-2)Glcβ1- | Steviol |
| | Reb F2 (SG-14) | 936 | 3 | | 1 | Glcβ1- | Glcβ(1-2)[Xylβ(1-3)]Glcβ1- | Steviol |
| SG-4G | Reb A | 966 | 4 | | | Glcβ1- | Glcβ(1-2)[Glcβ(1-3)]Glcβ1- | Steviol |
| | Reb A2 (SG-7) | 966 | 4 | | | Glcβ1- | Glcβ(1-6)[Glcβ(1-2)]Glcβ1- | Steviol |
| | Reb E | 966 | 4 | | | Glcβ(1-2)Glcβ1- | Glcβ(1-2)Glcβ1- | Steviol |
| | Reb H1 | 966 | 4 | | | H— | Glcβ(1-6)Glcβ(1-3)[Glcβ)1-3)]Glcβ1- | Steviol |
| SG-4G1Gal | Reb T1 | 1128 | 5 (1 Gal) | | | Galβ(1-2)Glcβ1- | Glcβ(1-2)[Glcβ)1-3)]Glcβ1- | Steviol |
| SG-4G1R | SG-12 | 1112 | 4 | 1 | | Rhaα(1-2)Glcβ1- | Glcβ(1-2)[Glcβ(1-3)]Glcβ1- | Steviol |
| | Reb H | 1112 | 4 | 1 | | Glcβ1- | Glcβ(1-3)Rhaα(1-2)[Glcβ(1-3)]Glcβ1- | Steviol |
| | Reb J | 1112 | 4 | 1 | | Rhaα(1-2)Glcβ1- | Glcβ(1-2)[Glcβ(1-3)]Glcβ1- | Steviol |
| | Reb K | 1112 | 4 | 1 | | Glcβ(1-2)Glcβ1- | Rhaα(1-2)[Glcβ(1-3)]Glcβ1- | Steviol |
| | Reb K2 | 1112 | 4 | 1 | | Glcβ(1-6)Glcβ1- | Rhaα(1-2)[Glcβ(1-3)]Glcβ1- | Steviol |
| | SG-Unk4 | 1112 | 4 | 1 | | — | — | Steviol |
| | SG-Unk5 | 1112 | 4 | 1 | | — | — | Steviol |
| SG-4G1X | Reb U2 | 1098 | 4 | | 1 | Xylβ(1-2)[Glcβ(1-3)]Glcβ1- | Glcβ(1-2)Glcβ1- | Steviol |
| | Reb T | 1098 | 4 | | 1 | Xylβ(1-2)Glcβ1- | Glcβ(1-2)[Glcβ(1-3)]Glcβ1- | Steviol |
| | Reb W | 1098 | 4 | | 1 | Glcβ(1-2)[Araβ(1-3)]Glcβ1- | Glcβ(1-2)Glcβ1- | Steviol |
| | Reb W2 | 1098 | 4 | | 1 | Araβ(1-2)Glcβ1- | Glcβ(1-2)[Glcβ(1-3)]Glcβ1- | Steviol |
| | Reb W3 | 1098 | 4 | | 1 | Araβ(1-6)Glcβ1- | Glcβ(1-2)[Glcβ(1-3)]Glcβ1- | Steviol |
| | Reb U | 1098 | 4 | | 1 | Araα(1-2)-Glcβ1- | Glcβ(1-2)[Glcβ(1-3)]Glcβ1- | Steviol |

TABLE B-continued

| | Name | MW | Added Glucose MW = 180 | Added Rhamnoe/ DeoxyHex MW = 164 | Added Xylose/ Arabinose MW = 150 | R1 (C-19) | R2 (C-13) | Backbone |
|---|---|---|---|---|---|---|---|---|
| SG-5G | Reb D | 1128 | 5 | | | Glcβ(1-2)Glcβ1- | Glcβ(1-2)[Glcβ(1-3)]Glcβ1- | Steviol |
| | Reb I | 1128 | 5 | | | Glcβ(1-3)Glcβ1- | Glcβ(1-2)[Glcβ(1-3)]Glcβ1- | Steviol |
| | Reb L | 1128 | 5 | | | Glcβ1- | Glcβ(1-6)Glcβ(1-2)[Glcβ(1-3)]Glcβ1- | Steviol |
| | Reb I3 | 1128 | 5 | | | [Glcβ(1-2)Glcβ(1-6)]Glcβ1- | Glcβ(1-2)Glcβ1- | Steviol |
| | SG-Unk6 | 1128 | 5 | | | — | — | Steviol |
| | Reb Q (SG-5) | 1128 | 5 | | | Glcβ1- | Glcα(1-4)Glcβ(1-2)[Glcβ(1-3)]Glcβ1- | Steviol |
| | Reb I2 (SG-6) | 1128 | 5 | | | Glcβ1- | Glcα(1-3)Glcβ1-2[Glcβ1-3)]Glcβ1- | Steviol |
| | Reb Q2 | 1128 | 5 | | | Glcα(1-2)Glcαβ(1-4)Glcβ1- | Glcβ(1-2)Glcβ1- | Steviol |
| | Reb Q3 | 1128 | 5 | | | Glcβ1- | Glcα(1-4)Glcβ(1-3)[Glcβ(1-2)]Glcβ1- | Steviol |
| SG-5G1R | Reb N | 1274 | 5 | 1 | | Rhaα(1-2)[Glcβ(1-3)]Glcβ1- | Glcβ(1-2)[Glcβ(1-3)]Glcβ1- | Steviol |
| SG-5G1X | Reb V2 | 1260 | 5 | | 1 | Xylβ(1-2)[Glcβ(1-3)]-Glcβ1- | Glcβ(1-2)[Glcβ(1-3)]Glcβ1- | Steviol |
| | Reb V | 1260 | 5 | | 1 | Glcβ(1-2)[Glcβ(1-3)]Glcβ1- | Xylβ(1-2)[Glcβ(1-3)]-Glcβ1- | Steviol |
| | Reb Y | 1260 | 5 | | 1 | Glcβ(1-2)[Araβ(1-3)]Glcβ1- | Glcβ(1-2)[Glcβ(1-3)]Glcβ1- | Steviol |
| SG-6G | Reb M | 1290 | 6 | | | Glcβ(1-2)[Glcβ(1-3)]Glcβ1- | Glcβ(1-2)[Glcβ(1-3)]Glcβ1- | Steviol |
| SG-6G1R | Reb O | 1436 | 6 | 1 | | Glcβ(1-3)Rhaα(1-2)[Glcβ(1-3)]Glcβ1- | Glcβ(1-2)[Glcβ(1-3)]Glcβ1- | Steviol |
| | Reb O2 | 1436 | 6 | 1 | | Glcβ(1-4)Rhaα(1-2)[Glcβ(1-3)]Glcβ1- | Glcβ(1-2)[Glcβ(1-3)]Glcβ1- | Steviol |
| SG-Rel | Related SvGn#1 | 458 | — | | | | | Steviol |
| SG-Rel | Related SvGn#2 | 982 | — | | | | | Steviol |
| SG-Rel | Related SvGn#3 | 676 | — | | | | | Steviol |
| SG-Rel | Related SvGn#4 | 1128 | — | | | | | Steviol |
| SG-Rel | Related SvGn#5 | 982 | — | | | | | Steviol |
| — | Iso-Steviolbioside | 642 | 2 | | | H— | Glcβ(1-2)Glcβ1- | Isosteviol |
| — | Iso-Reb B | 804 | 3 | | | H— | Glcβ(1-2)[Glcβ(1-3)]Glcβ1- | Isosteviol |
| — | Iso-Stevioside | 804 | 3 | | | Glcβ1- | Glcβ(1-2)Glcβ1- | Isosteviol |
| — | Iso-Reb A | 966 | 4 | | | Glcβ1- | Glcβ(1-2)[Glcβ(1-3)]Glcβ1- | Isosteviol |
| — | SG-13 | 804 | 3 | | | Glcβ1- | Glcβ(1-2)Glcβ1- | Isomeric steviol (12α-hydroxy) |

TABLE B-continued

| | Name | MW | Added Glucose MW = 180 | Added Rhamnoe/ DeoxyHex MW = 164 | Added Xylose/ Arabinose MW = 150 | R1 (C-19) | R2 (C-13) | Backbone |
|---|---|---|---|---|---|---|---|---|
| — | 15α-OH Reb M | 1306 | 6 | | | Glcβ1-2(Glcβ1-3)Glcβ1- | Glcβ(1-2(Glcβ1-3)Glcβ1- | 15α-Hydroxy-steviol |

Legend: SG-1 to 16:
SGs without a specific name;
SG-Unk1-6: Steviolglycosides without detailed structural proof;
Glc: Glucose;
Rha: Rhamnose;
Xyl: Xylose;
Ara: Arabinose;
Fru: Fructose;
Gal: Galactose Steviol glycosides include a hydrophobic part (steviol) and a hydrophilic part (sugars, such as glucose). When steviol glycosides are dissolved in a suitable solvent, steviol glycosides can form solvate(s). It is assumed that steviol glycosides can form clusters similar with flavor molecules as they do for water and other solvents. Such structures can stabilize the flavor, especially volatile substances, either in an aqueous solution or in solid form. It has been found that three steviol glycosides share one water molecule in its crystal structure. Not to be limited by theory, it is believed that steviol glycosides share one or more flavor molecules which can stabilize the flavor molecule better than in the absence of the *Stevia*. In general, steviol glycosides improve the solubility of flavor substances. It is further believed that *Stevia* extracts and steviol glycosides have attractive forces to hold the flavor, protect the stability of flavor, and hereafter it is referred to as steviol glycoside flavorate (SGF). One embodiment includes a composition comprising a *Stevia* extract with a flavor.

In certain embodiments, compositions of RA+RB, RA+RB+RD, RA+RB+RC, RA+RB+RC+RD, RA+RB+RC+RD+RE, RA+RB+RC+RD+RM, RA+RD+RM, RD+RM, RD+RM+RO+RE, etc. are used. These combinations can be either added to Maillard reaction products produced from a sugar donor and an amine donor, or included in the Maillard reaction with the sugar donor and amine donor, or serve as the substrate(s) for the Maillard reaction in the presence of an amine donor.

As used herein, the term "steviol glycoside composition" or "SG composition" refers to a composition comprising one or more SGs (steviol glycosides).

B4. Steviol Glycoside Extracts

In other embodiments, the sugar donor(s) comprise a plurality of SGs in the form of a *Stevia* extract. Extracts from *Stevia* leaves, for example, provide SGs with varying percentages corresponding to the SGs present in a particular extract. The phrase "steviol glycoside" is recognized in the art and is intended to include the major and minor constituents of *Stevia*. These SGs include, for example, stevioside, steviolbioside, rebaudioside A (RA), rebaudioside B (RB), rebaudioside C (RC), rebaudioside D (RD), rebaudioside E (RE), rebaudioside F (RF), rebaudioside M (RM), rebaudioside O (RO), rebaudioside H (RH), rebaudioside I (RI), rebaudioside L (RL), rebaudioside N (RN), rebaudioside K (RK), rebaudioside J (RJ), rubusoside, dulcoside A (DA), mixtures thereof, as well as those listed in Tables A and B.

A *Stevia* extract may contain various combinations of individual SGs, where the extract may be defined by the proportion of a particular SG in the extract. For example, an analysis of an exemplary RA50 extract prepared by the process described in Example 81 is shown in Table C. An analysis of an exemplary combination extract comprising RA40+RB8 is shown in Table D.

TABLE C

Distribution and concentration of SGs in RA50

| Name | MW | mg/10 ml | % m/m |
|---|---|---|---|
| Related steviol glycoside | 517 or | <0.01 | <0.01 |
| Related steviol glycoside | 981 | 0.23 | 0.130 |
| Related steviol glycoside | 427 or | 0.27 | 0.151 |
| Related steviol glycoside | 675 or | 0.07 | 0.037 |
| Related steviol glycoside | 981 | 2.23 | 1.242 |
| Reb-V | 1259 | <0.01 | <0.01 |
| Reb-T | 1127 | <0.01 | <0.01 |
| Reb-E | 965 | 0.87 | 0.487 |
| Reb-O | 1435 | 0.02 | 0.009 |
| Reb-D | 1127 | 2.63 | 1.464 |
| Reb-K | 1111 | 0.06 | 0.035 |
| Reb-N | 1273 | 0.03 | 0.014 |
| Reb-M | 1289 | 0.07 | 0.038 |
| Reb-S | 949 | 0.00 | −0.002 |
| Reb-J | 1111 | 0.05 | 0.028 |
| Reb-W | 1097 | 0.13 | 0.074 |
| Reb-U2 | 1097 | <0.01 | <0.01 |
| Reb-W2/3 | 1097 | <0.01 | <0.01 |
| Reb-O2 | 965 | 0.08 | 0.047 |
| Reb-Y | 1259 | 0.09 | 0.050 |
| Reb-I | 1127 | <0.01 | <0.01 |
| Reb-V2 | 1259 | <0.01 | <0.01 |
| Reb-K2 | 1111 | 1.19 | 0.661 |
| Reb-H | 1111 | <0.01 | <0.01 |
| Reb-A | 965 | 91.72 | 51.041 |
| Stevioside | 803 | 55.43 | 30.844 |
| Reb-F | 935 | 0.15 | 0.086 |
| Reb-C | 949 | 7.40 | 4.118 |
| Dulcoside-A | 787 | 0.45 | 0.248 |
| Rubusoside | 641 | 0.47 | 0.260 |
| Reb-B | 803 | 4.02 | 2.239 |
| Dulcoside B | 787 | 0.65 | 0.362 |
| Steviolbioside | 641 | 0.96 | 0.531 |
| Reb-R | 935 | 0.01 | 0.005 |
| Reb-G | 803 | 0.23 | 0.128 |
| Stevioside-B | 787 | 0.94 | 0.526 |
| Reb-G1 | 641 | <0.01 | <0.01 |
| Reb-R1 | 773 | 1.39 | 0.771 |
| Reb-F1 | 773 | <0.01 | <0.01 |
| Iso-Steviolbioside | 641 | 0.23 | 0.130 |
| | Sum | 171.33 | 95.34 |

TABLE D

Distribution and concentration of SGs in RA40/RB8

| Name | MW | RA40/RB8 Lot 174-71-01 mg/10 ml | % m/m | ± s.d. % (m/m) |
|---|---|---|---|---|
| Related steviol glycoside #1 | 517 or 427 | 0.08 | 0.05 | 0.01 |
| Related steviol glycoside #2 | 981 | <0.01 | <0.01 | <0.01 |
| Related steviol glycoside #3 | 427 or 735 | 1.01 | 0.67 | 0.13 |
| Related steviol glycoside #4 | 675 or 1127 | 0.21 | 0.14 | 0.03 |
| Related steviol glycoside #5 | 981 | 0.10 | 0.06 | 0.01 |
| Reb-V | 1259 | <0.01 | <0.01 | <0.01 |
| Reb-T | 1127 | <0.01 | <0.01 | <0.01 |
| Reb-E | 965 | 0.74 | 0.49 | 0.10 |
| Reb-O | 1435 | 2.53 | 1.69 | 0.25 |
| Reb-D | 1127 | 1.73 | 1.15 | 0.17 |
| Reb-K | 1111 | <0.01 | <0.01 | <0.01 |
| Reb-N | 1273 | 0.42 | 0.28 | 0.06 |
| Reb-M | 1289 | 0.07 | 0.05 | 0.01 |
| Reb-S | 949 | 0.11 | 0.07 | 0.01 |
| Reb-J | 1111 | 0.11 | 0.07 | 0.01 |
| Reb-W | 1097 | 0.05 | 0.03 | 0.01 |
| Reb-U2 | 1097 | <0.01 | <0.01 | <0.01 |
| Reb-W2/3 | 1097 | 0.05 | 0.03 | 0.01 |
| Reb-O2 | 965 | <0.01 | <0.01 | <0.01 |
| Reb-Y | 1259 | 0.38 | 0.25 | 0.05 |
| Reb-I | 1127 | 1.12 | 0.75 | 0.15 |
| Reb-V2 | 1259 | <0.01 | <0.01 | <0.01 |
| Reb-K2 | 1111 | <0.01 | <0.01 | <0.01 |
| Reb-H | 1111 | <0.01 | <0.01 | <0.01 |
| Reb-A | 965 | 60.36 | 40.30 | 6.04 |
| Stevioside | 803 | 26.66 | 17.80 | 2.67 |
| Reb-F | 935 | <0.01 | <0.01 | <0.01 |
| Reb-C | 949 | 2.91 | 1.94 | 0.29 |
| Dulcoside-A | 787 | 11.92 | 7.96 | 1.19 |
| Rubusoside | 641 | 2.50 | 1.67 | 0.25 |
| Reb-B | 803 | 12.09 | 8.07 | 1.21 |
| Dulcoside B | 787 | 0.36 | 0.24 | 0.05 |
| Steviolbioside | 641 | 0.37 | 0.25 | 0.05 |
| Reb-R | 935 | 0.72 | 0.48 | 0.10 |
| Reb-G | 803 | 1.49 | 1.00 | 0.20 |
| Stevioside-B | 787 | 1.04 | 0.69 | 0.14 |
| Reb-G1 | 641 | <0.01 | <0.01 | <0.01 |
| Reb-R1 | 773 | <0.01 | <0.01 | <0.01 |
| Reb-F1 | 773 | <0.01 | <0.01 | <0.01 |
| Iso-Steviolbioside | 641 | <0.01 | <0.01 | <0.01 |
| | Sum | 129.11 | 86.19 | |

In some embodiments, the *Stevia* extract(s) included in the Maillard reaction or added to an MRP composition may be selected from the group consisting of RA20, RA40, RA50. RA60, RA80, RA 90, RA95, RA97, RA98, RA99, RA99.5, RBS, RB10, RB15, RC15, RD6, STV60, STV90, RA75/RB15, RA90/RD7, RA80/RB10/RD6 and combinations thereof.

In another embodiment, the *Stevia* extract comprises non-steviol glycoside components. Non-steviol glycoside components are volatile substances characterized by a characteristic odor and/or flavor, such as a citrus flavor and other flavors described herein.

In another embodiment, the *Stevia* extract comprises a non-volatile type of non-steviol glycoside substances comprising one or more molecules characterized by terpene, di-terpene, or ent-kaurene structure.

In another embodiment, the *Stevia* extract comprises one or more volatile and one or more non-volatile types of non-steviol glycoside substances.

In some embodiments, the SGs can be fractionated to select for high molecular weight molecules.

In a particular embodiment, the *Stevia* extract comprises 25-35 wt % Reb-A, 0.4-4 wt % Reb-B, 5-15 wt % Reb-C, 1-10 wt % Reb-D, 2-5 wt % Reb-F, 1-5 wt % Reb-K, and 20-40 wt % Stevioside.

In another embodiment, the *Stevia* extract comprises one or more members selected from the group consisting of 1-5 wt % Rubusoside, 1-3 wt % Dulcoside A, 0.01-3 wt % steviolbioside, wt % Dulcoside B, 00.01-2 wt % Reb-O, 0.01-2 wt % Reb-S, 0.01-1.2 wt % Reb-T, 0.01-0.8 wt % Reb-R, 0.01-0.7 wt % Reb-J, 0.01-0.7 wt % Reb-W, 0.01-0.7 wt % Reb-V, 0.01-0.6 wt % Reb-V2, 0.01-0.5 wt % Reb-G, 0.01-0.5 wt % Reb-H, 0.01-0.5 wt % Reb-K2, 0.01-0.5 wt % Reb-U2, 0.01-0.5% Reb-I, 0.01-0.5 wt % Rel SG #4, 0.01-0.5 wt % Rel SG-#5, 0.01-0.4 wt % Reb-M, 0.01-0.4 wt % Reb-N, 0.01-0.4 wt % Reb-E, 0.01-0.4 wt % Reb-F1, 0.01-0.4 wt % Reb-Y, and combinations thereof.

In another embodiment, the *Stevia* extract comprises at least 20, at least 21, at least 22, at least 23 or at least 24 members selected from the group consisting of: 1-5 wt % Rubusoside, 1-3 wt % Dulcoside A, 0.01-3 wt % steviolbioside, 0.2-1.5 wt % Dulcoside B, 00.01-2 wt % Reb-O, 0.01-2 wt % Reb-S, 0.01-1.2 wt % Reb-T, 0.01-0.8 wt % Reb-R, 0.01-0.7 wt % Reb-J, 0.01-0.7 wt % Reb-W, 0.01-0.7 wt % Reb-V, 0.01-0.6 wt % Reb-V2, 0.01-0.5 wt % Reb-G, 0.01-0.5 wt % Reb-H, 0.01-0.5 wt % Reb-K2, 0.01-0.5 wt % Reb-U2, 0.01-0.5% Reb-I, 0.01-0.5 wt % Rel SG #4, 0.01-0.5 wt % Rel SG #5, 0.01-0.4 wt % Reb-M, 0.01-0.4 wt % Reb-N, 0.01-0.4 wt % Reb-E, 0.01-0.4 wt % Reb-F1, and 0.01-0.4 wt % Reb-Y.

In another embodiment, the *Stevia* extract comprises 45-55 wt % Reb-A, 20-40 wt % Stevioside, 2-6 wt % Reb-C, 0.5-3 wt % Reb-B, and 0.5-3 wt % Reb-D.

In another embodiment, the *Stevia* extract comprises one or more members selected from the group consisting of: 0.1-3 wt % Related SG #5, 0.05-1.5 wt % Reb-R1, 0.0.05-1.5 wt % Reb-K2, 0.05-1.5 wt % Reb-E, 0.01-1 wt % Dulcoside A, 0.01-1 wt % Dulcoside B, 0.01-1 wt % Rubusoside, 0.01-1 wt % Steviolbioside, 0.01-1 wt % Iso-steviolbioside, 0.01-1 wt % Stevioside-B, 0.01-1 wt % Related SG #3, 0.01-1 wt % Related SG #2, 0.01-1 wt % Reb-G, 0.01-1 wt % Reb-F, and 0.01-1 wt % Reb-W.

In another embodiment, the *Stevia* extract comprises at least 12, at least 13, at least 14 or at least 15 members selected from the group consisting of: 0.1-3 wt % Related SG #5, 0.05-1.5 wt % Reb-R1, 0.0.05-1.5 wt % Reb-K2, 0.05-1.5 wt % Reb-E, 0.01-1 wt % Dulcoside A, 0.01-1 wt % Dulcoside B, 0.01-1 wt % Rubusoside, 0.01-1 wt % Steviolbioside, 0.01-1 wt % Iso-steviolbioside, 0.01-1 wt % Stevioside-B, 0.01-1 wt % Related SG #3, 0.01-1 wt % Related SG #2, 0.1-1 wt % Reb-G, 0.01-1 wt % Reb-F, and 0.01-1 wt % Reb-W.

In another embodiment, the *Stevia* extract comprises 35-45 wt % Reb-A, 10-25 wt % Stevioside, 4-12 wt % Reb-B, 4-12 wt % Dulcoside A, 0.5-4 wt % Reb-C, and 0.1-4 wt % Reb-O.

In another embodiment, the *Stevia* extract comprises one or more members selected from the group consisting of: 0.3-3 wt % Rubusoside, 0.1-3 wt % Reb-D, 0.1-3 wt % Reb-G, 0.1-3 wt % Reb-I, 0.1-3 wt % Stevioside B, 0.1-3 wt % Related SG #3, 0.05-1.5 wt % Reb-E, 0.05-2 wt % Reb-R, 0.05-1 wt % Dulcoside B, 0.01-1 wt Reb-N, 0.01-1 wt % Reb-Y, 0.1-1 wt % Steviolbioside, 0.01-1 wt % Dulcoside B, and combinations thereof.

In another embodiment, the *Stevia* extract comprises at least 10, at least 11, at least 12 or at least 13 members selected from the group consisting of: 0.3-3 wt % Rubusoside, 0.1-3 wt % Reb-D, 0.1-3 wt % Reb-G, 0.1-3 wt %

Reb-I, 0.1-3 wt % Stevioside B, 0.1-3 wt % Related SG #3, 0.05-1.5 wt % Reb-E, 0.05-2 wt % Reb-R, 0.05-1 wt % Dulcoside B, 0.01-1 wt % Reb-N, 0.01-1 wt % Reb-Y, 0.01-1 wt % Steviolbioside, and 0.01-1 wt % Dulcoside B.

One embodiment includes compositions of *Stevia* derived MRP(s) and/or also the *Stevia* derived MRP(s) and non-steviol glycosides contained within the *Stevia* leaves/extracts. In one embodiment, the steviol glycosides and non-steviol glycoside are extracted directly from leaves together. In other embodiments, the steviol glycosides and non-steviol glycosides may be blended following separate extraction(s) and/or separation(s), and then blended back together. In some embodiments, the non-*Stevia* glycoside substances can be obtained by fermentation or enzymatic conversion. The non-steviol glycoside substances can be used as substrates for the Maillard reaction.

In one embodiment, the inventors of the present application have developed an extraction process from the *Stevia* plant so as to preserve unique flavors, such as citrus (or tangerine). Without being bound by theory, it is believed that the unique citrus (or tangerine) flavor originates from one or more flavor substances in the *Stevia* extract. The flavor substances may be water soluble or they may be dispersible in an oil-in-water solution or *Stevia* flavorate, where the flavor threshold value can be as low as $10^{-ppb.}$ In one embodiment, a composition of steviol glycoside(s) and flavor substances originate from a *Stevia* extract. Flavored *Stevia* extracts may be prepared by processes further described in the Examples. Exemplary flavors that may be formed from the *Stevia* extracts include floral, caramel, citrus, chocolate, orange, violet, nectar, peach, jujube, barbecue, green tea, toast, roast barley, and combinations thereof.

Suitable FEMA recognized *Stevia* based compositions are included herein as noted in Table E. These *Stevia* based compositions can be used in the Maillard reaction as described throughout as the sweetening agent(s).

TABLE E

FEMA GRAS *Stevia* Summary

| FEMA GRAS LIST | FEMA NO. | SUBSTANCE PRIMARY NAME AND SYNONYMS | THE IDENTITY DESCRIPTION AS REVIEWED BY THE FEMA EXCEPT PANEL |
|---|---|---|---|
| 25 | 4720 | Rebaudioside C<br>Dulcoside B | |
| 26 | 4728 | Glucosyl steviol glycosides<br>*Stevia* extract, enzymatically modified | *Not less than 75% total supra-glucosylated steviol glycoside; not more than 6% major steviol glycosides not further glucosylated; not more than 4% individual steviol glycosides not further glucosylated; not more than 20% maltodextrin |
| 26 | 4763 | Stevioside<br>Steviosin<br>(4,alpha)-13-[(2-0-beta-D-Glucopyranosyl-alpha-D-glucopyranosyl)oxy]kaur-16-en-18-oic acid beta-D-glucopyranosyl ester | |
| 26 | 4771 | Steviol glycoside extract,<br>*Stevia rebaudiana*,<br>Rebaudioside A 60% | |
| 26 | 4772 | Steviol glycoside extract,<br>*Stevia rebaudiana*,<br>Rebaudioside A 80% | |
| 27 | 4796 | Steviol glycoside extract,<br>*Stevia rebaudiana*,<br>Rebaudioside C 30% | Total steviol glycosides > 95%, including 28-33% rebaudioside C, 17-23% rebaudioside A, 10-15% stevioside, 25-36% other steviol glycosides (including rebaudiosides B, D, E and F, steviolbioside, rubusoside and dulcoside A) |
| 27 | 4805 | Steviol glycoside extract,<br>*Stevia rebaudiana*,<br>Rebaudioside A 22% | Total principal steviol glycosides 60-63%, including 18-22% rebaudioside A, 5-8% stevioside, 8-14% rebaudioside D; rebaudiosides B, C, E, F, N, O, M, steviolbioside, rubusoside, and dulcoside A individually present at concentrations up to 6%. Additional steviol glycosides, 36-42% |
| 27 | 4806 | Steviol glycoside extract,<br>*Stevia rebaudiana*,<br>Rebaudioside C 22% | Total principal steviol glycosides 56-59%, including 13-22% rebaudioside C, 13-18% rebaudioside A. 5-8% stevioside; rebaudiosides B, D, E, F, N, O, and M, steviolbioside, rubusoside and dulcoside A individually present at concentrations up to 4%. Additional steviol glycosides, 38-45%. |

TABLE E-continued

| FEMA GRAS Stevia Summary | | | |
|---|---|---|---|
| FEMA GRAS LIST | FEMA NO. | SUBSTANCE PRIMARY NAME AND SYNONYMS | THE IDENTITY DESCRIPTION AS REVIEWED BY THE FEMA EXCEPT PANEL |
| 28 (Interim) | 4728 | Glucosyl steviol glycosides | Total steviol glycosides 80-90% inclusive of supraglucosylated steviol glycosides 75-80%; Rebaudioside A 1-6%; stevioside 2-4% and other individual steviol glycosides not further glucosylated each less than 3%. Maltodextrin 3-20% |
| 28 | 4728 | Glucosyl steviol glycosides | Total steviol glycosides 80-90% inclusive of supraglucosylated steviol glycosides 75-80%; Rebaudioside A 1-6%; stevioside 2-4% and other individual steviol glycosides not further glucosylated each less than 3%. Maltodextrin 3-20% |
| 28 | 4845 | Glucosylated *Stevia* extract | At least 80% steviol glycosides, not more than 10% Rebaudioside A, not more than 4% Rebaudioside C, not more than 5% stevioside, and no individual steviol glycosides further glucosylated ≤ 3%. |
| 28 | 4876 | Enzyme modified *Stevia*, stevioside 20% | 90-95% steviol glycosides inclusive of supraglucosylated steviol glycosides 64-70%; rebaudioside A 10-13%; stevioside 20-22%, maltodextrin 1-6%, and other individual steviol glycosides not further glucosylated each less than 1%. |

B5. Glycosylated Steviol Glycosides (GSGs) and Glycosylated *Stevia* Extracts

In another embodiment, the sugar donor(s) comprise one or more glycosylated steviol glycosides (GSGs) originating from one or more SGs listed in Table A or Table B. As used herein, a GSG refers to an SG containing additional glucose residues added relative to the parental (or native) SGs present in e.g., *Stevia* leaves. The additional sugar groups can be added at various positions of the SG molecules. A GSG may be produced from any known or unknown SG by enzymatic synthesis, chemical synthesis or fermentation. In preferred embodiments, the additional sugar groups are added in an enzymatically catalyzed glycosylation process. The glycosylation of an SG can be determined by HPLC-MS as described herein.

GSGs may be obtained by enzymatic processes, for example, by transglycosylating *Stevia* extract containing steviol glycosides, or by common known synthetic manipulation. Herein, the GSGs omprise glycosylated *Stevia* extract containing glycosylated steviol glycoside(s) and also comprises short chain compounds obtained by hydrolyzation of glycosylated product, as well as non-glycosylated components which are the residue of unreacted steviol glycosides, or unreacted components other than steviol glycosides contained in the *Stevia* extract.

Any of the SGs in Tables A-D, for example, STB, ST, RA, RB, RC, RD, rebaudioside E (RE), rebaudioside F (RF), rebaudioside M (RM), rubusoside and dulcoside A can be enzymatically modified to afford, for example, their corresponding multi-glycosylated glycosides as follows: Steviol-G1, Steviol-G2, Steviol-G3, Steviol-G4, Steviol-G5, Steviol-G6, Steviol-G7, Steviol-G8, Steviol-G9, STB-G1, STB-G2, STB-G3, STB-G4, STB-G5, STB-G6, STB-G7, STB-G8, STB-G9, RB-G1, RB-G2, RB-G3, RB-G4, RB-G5, RB-G6, RB-G7, RB-G8, RB-G9, RC-G1, RC-G2, RC-G3, RC-G4, RC-G5, RC-G6, RC-G7, RC-G8, RC-G9, RD-G1, RD-G2, RD-G3, RD-G4, RD-G5, RD-G6, RD-G7, RD-G8, RD-G9, RE-G1, RE-G2, RE-G3, RE-G4, RE-G5, RE-G6, RE-G7, RE-G8, RE-G9, RF-G1, RF-G2, RF-G3, RF-G4, RF-G5, RF-G6, RF-G7, RF-G8, RM-G1, RM-G2, RM-G3, RM-G4, RM-G5, RM-G6, RM-G7, RM-G8, RM-G9, Rubusoside-G1, Rubusoside-G2, Rubusoside-G3, Rubusoside-G4, Rubusoside-G5, Rubusoside-G6, Rubusoside-G7, Rubusoside-G8, Rubusoside-G9, Dulcoside A-G1, Dulcoside A-G2, Dulcoside A-G3, Dulcoside A-G4, Dulcoside A-G5, Dulcoside A-G6, Dulcoside A-G7, Dulcoside A-G8, and Dulcoside A-G9.

For example, G1 and G2 of steviol, STB, ST, RA, RB, RC, RD, RE, RF, RM, rubusoside and dulcoside A are shown below.

Further, by way of example, in one embodiment, GSGs may originate from an SG selected from the group consisting of Reb-D, Reb-I, Reb-L, Reb-Q, and Reb-I2. In this case, the resulting GSGs are included in the group consisting of GSG-5G-1, GSG-5G-2, GSG-5G-3, GSG-5G-4, and GSG-5G-5. These GSGs originate from the SG-5G group.

More extensive non-limiting lists of GSGs are shown in Tables F, G and G.

Table F depicts GSG groups corresponding to parental SGs with glucose ("G"; i.e., 2nd G after hyphen) moieties added thereto. For example, GSG-1G-2 refers to an SG having one glucose added, and "2" is the series number in the row of Table F.

TABLE F

| | | | Steviol + Glucose Glycosylated Steviolglycoside (GSG)-group based on SG-group given | | | | | |
|---|---|---|---|---|---|---|---|---|
| Parental SG | | | MW = 480 | MW = 642 | MW = 804 | MW = 966 | MW = 1128 | MW = 1290 |
| Steviol-glycoside | SG-group | MW | SG-1G | SG-2G | SG-3G | SG-4G | SG-5G | SG-6G |
| Steviolmonoside | SG-1G | 480 | | | | | | |
| Steviolmonoside A | | | | | | | | |
| Iso-Steviolbioside | SG-2G | 642 | GSG-1G-1 | | | | | |
| Reb-G1 | | | | | | | | |
| Rubusoside | | | | | | | | |
| Steviolbioside | | | | | | | | |
| Iso-Reb B | SG-3G | 804 | GSG-1G-2 | GSG-2G-1 | | | | |
| Iso-Stevioside | | | | | | | | |
| Reb B | | | | | | | | |
| Reb G | | | | | | | | |
| Reb-KA | | | | | | | | |
| SG-13 | | | | | | | | |
| Stevioside | | | | | | | | |
| Stevioside B (SG-15) | | | | | | | | |
| Reb A3 (SG-8) | SG-4G | 966 | GSG-1G-3 | GSG-2G-2 | GSG-3G-1 | | | |
| Iso-Reb A | | | | | | | | |
| Reb A | | | | | | | | |
| Reb A2 (SG-7) | | | | | | | | |
| Reb E | | | | | | | | |
| Reb H1 | | | | | | | | |
| Reb D | SG-5G | 1128 | GSG-1G-4 | GSG-2G-3 | GSG-3G-2 | GSG-4G-1 | | |
| Reb I | | | | | | | | |
| Reb L | | | | | | | | |
| Reb I3 | | | | | | | | |
| SG-Unk6 | | | | | | | | |
| Reb Q (SG-5) | | | | | | | | |
| Reb I2 (SG-6) | | | | | | | | |
| Reb Q2 | | | | | | | | |
| Reb Q3 | | | | | | | | |
| Reb T1 | | | | | | | | |
| Related SvGn#4 | | | | | | | | |
| Reb M | SG-6G | 1290 | GSG-1G-5 | GSG-2G-4 | GSG-3G-3 | GSG-4G-2 | GSG-5G-1 | |
| — | — | 1452 | GSG-1G-6 | GSG-2G-5 | GSG-3G-4 | GSG-4G-3 | GSG-5G-2 | GSG-6G-1 |
| — | — | 1614 | GSG-1G-7 | GSG-2G-6 | GSG-3G-5 | GSG-4G-4 | GSG-5G-3 | GSG-6G-2 |
| — | — | 1776 | GSG-1G-8 | GSG-2G-7 | GSG-3G-6 | GSG-4G-5 | GSG-5G-4 | GSG-6G-3 |
| — | — | 1938 | | GSG-2G-8 | GSG-3G-7 | GSG-4G-6 | GSG-5G-5 | GSG-6G-4 |
| — | — | 2100 | | | GSG-3G-8 | GSG-4G-7 | GSG-5G-6 | GSG-6G-5 |

Similarly, other glucose substitutes can be incorporated into the GSG, such as for example, rhamnose or deoxyhexose (see Table G) below. Table G depicts GSG groups corresponding to parental SGs with glucose ("G"; i.e., 2nd G after hyphen) and one moiety of rhamnose or deoxyhexose ("R") added thereto.

TABLE G

| | | | Steviol + Glucose + 1 Rhamnose/Deoxyhexose Glycosylated Steviolglycoside (GSG)-groups based on SG-group given | | | | | |
|---|---|---|---|---|---|---|---|---|
| | | | MW = 626 | MW = 788 | MW = 950 | MW = 1112 | MW = 1274 | MW = 1436 |
| Steviol-glycoside | SG-group | MW | SG-1G1R | SG-2G1R | SG-3G1R | SG-4G1R | SG-5G1R | SG-6G1R |
| Dulcoside A1 | SG-1G1R | 626 | | | | | | |
| Dulcoside A | SG-2G1R | 788 | GSG-1G1R-1 | | | | | |
| Dulcoside B (JECFA C) | | | | | | | | |
| SG-3 | | | | | | | | |
| Stevioside D | | | | | | | | |
| Reb C | SG-3G1R | 950 | GSG-1G1R-2 | GSG-2G1R-1 | | | | |
| Reb C2/Reb S | | | | | | | | |
| Stevioside E (SG-9) | | | | | | | | |
| Stevioside E2 | | | | | | | | |
| SG-10 | | | | | | | | |
| Reb L1 | | | | | | | | |
| SG-2 | | | | | | | | |

TABLE G-continued

| Steviol-glycoside | SG-group | MW | Steviol + Glucose + 1 Rhamnose/Deoxyhexose Glycosylated Steviolglycoside (GSG)-groups based on SG-group given MW = 626 SG-1G1R | MW = 788 SG-2G1R | MW = 950 SG-3G1R | MW = 1112 SG-4G1R | MW = 1274 SG-5G1R | MW = 1436 SG-6G1R |
|---|---|---|---|---|---|---|---|---|
| SG-12 | SG-4G1R | 1112 | GSG-1G1R-3 | GSG-2G1R-2 | GSG-3G1R-1 | | | |
| Reb H | | | | | | | | |
| Reb J | | | | | | | | |
| Reb K | | | | | | | | |
| Reb K2 | | | | | | | | |
| SG-Unk4 | | | | | | | | |
| SG-Unk5 | | | | | | | | |
| Reb N | SG5-G1R | 1274 | GSG-1G1R-4 | GSG-2G1R-3 | GSG-3G1R-2 | GSG-4G1R-1 | | |
| Reb O | SG-6G1R | 1436 | GSG-1G1R-5 | GSG-2G1R-4 | GSG-3G1R-3 | GSG-4G1R2 | GSG-5G1R1 | |
| Reb O2 | | | | | | | | |
| — | — | 1598 | GSG-1G1R-6 | GSG-2G1R-5 | GSG-3G1R-4 | GSG-4G1R-3 | GSG-5G1R-2 | GSG-6G1R-1 |
| — | — | 1760 | GSG-1G1R-7 | GSG-2G1R-6 | GSG-3G1R-5 | GSG-4G1R-4 | GSG-5G1R-3 | GSG-6G1R-2 |
| — | — | 1922 | GSG-1G1R-8 | GSG-2G1R-7 | GSG-3G1R-6 | GSG-4G1R-5 | GSG-5G1R-4 | GSG-6G1R-3 |
| — | — | 2084 | | GSG-2G1R-8 | GSG-3G1R-7 | GSG-4G1R-6 | GSG-5G1R-5 | GSG-6G1R-4 |
| — | — | 2246 | | | GSG-3G1R-8 | GSG-4G1R-7 | GSG-5G1R-6 | GSG-6G1R-5 |

Table H depicts GSG groups corresponding to parental SGs with glucose ("G"; i.e., 2nd G after hyphen) and one moiety of xylose or arabinose ("X") added thereto.

rebaudioside U2, rebaudioside T, rebaudioside W, rebaudioside W2, rebaudioside W3, rebaudioside U, SG-12, rebaudioside K2, SG-Unk4, SG-Unk5, rebaudioside SG-Unk6,

TABLE H

| Steviol-glycoside (GS) | SG-group | MW | Steviol + Glucose + 1 Xylose/Arabinose Glycosylated Steviolglycoside (GSG)-groups based on SG-group given MW = 612 SG-1G1X | MW = 774 SG-2G1X | MW = 936 SG-3G1X | MW = 1098 SG-4G1X | MW = 1260 SG-5G1X | MW = 1422 SG-6G1X |
|---|---|---|---|---|---|---|---|---|
| SG-4 | SG-1G1X | 612 | | | | | | |
| Reb-F1 | SG-2G1X | 774 | GSG-1G1X-1 | | | | | |
| Reb-R1 | | | | | | | | |
| Stevioside F (SG-1) | | | | | | | | |
| SG-Unk1 | | | | | | | | |
| Reb F | SG-3G1X | 936 | GSG-1G1X-2 | GSG-2G1X-1 | | | | |
| Reb R | | | | | | | | |
| SG-Unk2 | | | | | | | | |
| SG-Unk3 | | | | | | | | |
| Reb F3 (SG-11) | | | | | | | | |
| Reb F2 (SG-14) | | | | | | | | |
| Reb U2 | SG-4G1X | 1098 | GSG-1G1X-3 | GSG-2G1X-2 | GSG-3G1X-1 | | | |
| Reb T | | | | | | | | |
| Reb W | | | | | | | | |
| Reb W2 | | | | | | | | |
| Reb W3 | | | | | | | | |
| Reb U | | | | | | | | |
| Reb V | SG-5G1X | 1260 | GSG-1G1X-4 | GSG-2G1X-3 | GSG-3G1X-2 | GSG-4G1X-1 | | |
| Reb Y | | | | | | | | |
| — | — | 1422 | GSG-1G1X-5 | GSG-2G1X-4 | GSG-3G1X-3 | GSG-4G1X-2 | GSG-5G1X-1 | |
| — | — | 1584 | GSG-1G1X-6 | GSG-2G1X-5 | GSG-3G1X-4 | GSG-4G1X-3 | GSG-5G1X-2 | GSG-6G1X-1 |
| — | — | 1746 | GSG-1G1X-7 | GSG-2G1X-6 | GSG-3G1X-5 | GSG-4G1X-4 | GSG-5G1X-3 | GSG-6G1X-2 |
| — | — | 1908 | GSG-1G1X-8 | GSG-2G1X-7 | GSG-3G1X-6 | GSG-4G1X-5 | GSG-5G1X-4 | GSG-6G1X-3 |
| — | — | 2070 | | GSG-2G1X-8 | GSG-3G1X-7 | GSG-4G1X-6 | GSG-5G1X-5 | GSG-6G1X-4 |
| — | — | 2232 | | | GSG-3G1X-8 | GSG-4G1X-7 | GSG-5G1X-6 | GSG-6G1X-5 |

As noted above, the one or more GSGs comprise at least one GSG representing a further glycosylation product of an SG from Table A or Table B. In some embodiments, the one or more GSGs comprise at least one GSG representing a further glycosylation product of an SG selected from the group consisting of SvGn #1, SG-4, iso-steviolbioside, SvGn #3, rebaudioside stevioside F, SG-Unk1, dulcoside B, SG-3, iso-rebaudioside B, iso-stevioside, rebaudioside KA, SG-13, stevioside B, rebaudioside R, SG-Unk2, SG-Unk3, rebaudioside F3, rebaudioside F2, rebaudioside C2, stevioside E, stevioside E2, SG-10, rebaudioside Ll, SG-2, rebaudioside A3, iso-rebaudioside A2, rebaudioside A2, rebaudioside E, rebaudioside H1, SvGn #2, SvGN #5, rebaudioside Q, rebaudioside Q2, rebaudioside Q3, rebaudioside I2, rebaudioside T1, SvGn #4, rebaudioside V, rebaudioside V2, rebaudioside Y, 15α-OH-rebaudioside M, rebaudioside O2, and combinations thereof.

In some embodiments, the one or more GSGs comprise one or more additional glucose moieties.

In some embodiments, the one or more GSGs are selected from the group consisting of: GSG-1G-1, GSG-1G-2, GSG-1G-3, GSG-1G-4, GSG-1G-5, GSG-2G-1, GSG-2G-2, GSG-2G-3, GSG-2G-4, GSG-3G-1, GSG-3G-2, GSG-3G-3, GSG-4G-4, GSG-4G-2, GSG-5G-1, and combinations thereof.

In some embodiments, the one or more GSGs comprise one or more additional glucose moieties and are selected from the group consisting of: GSG-3G-2, (SG-3G-3, GSG-3G-4, CSG-3G-7, GSG-3G-8, GSG-4G-1, GSG-4G-2, GSG-4G-3, GSG-4G-7, GSG-5G-1, GSG-5G-2, GSG-5G-3, GSG-5G-4, GSG-5G-5, GSG-6G-3, and combinations thereof.

In some embodiments, the one or more GSGs comprise one or more rhamnose moieties, one or more deoxyhexose moieties, or a combination thereof.

In certain particular embodiments, the one or more GSGs are selected from the group consisting of: GSG-1G1R-1, GSG-1G1R-2, GSG-2GIR-1, GSG-1G1R-3, GSG-2G1R-2, GSG-3G1R-1, GSG-2G1R-3, GSG-4G-1R-1, GSG-1G1R-5-1, GSG 2G1R-4, GSG-3G1R-3a, GSG-3G1R-3b, GSG-4G1R-2, GSG-5GIR-1, and combinations thereof.

In other embodiments, the one or more GSGs are selected from the group consisting of: GSG-3G1R-3a, GSG-3G1R-3b, GSG-4G1R-2, GSG-4G1R-3, GSG-4G1R-4, GSG-4G1R-6, GSG-5G1R-4, GSG-6G1R-la, GSG-6G1R-1b, GSG-6G1R-2, and combinations thereof.

In some embodiments, the one or more GSGs comprise one or more xylose moieties, arabinose moieties, or a combination thereof.

In certain particular embodiments, the one or more GSGs are selected from the group consisting of: GSG-1G1X-1, GSG-1G1X-2, GSG-1G1X-3, GSG-1G1X-4, GSG-2G1X-1, GSG-2G1X-GSG-2G1X-3, GSG-3G1X-1, GSG-3G1X-2, GSG-4G1X-1, and combinations thereof.

In certain particular embodiments, the one or more GSGs are selected from the group consisting of: GSG-3G1X-4, GSG-3G1X-5, GSG-4G1X-1, GSG-4GIX-2, GSG-4G1X-3, GSG-4G1X-4, and combinations thereof.

In some embodiments, at least one of the one or more GSGs has a molecular weight less than equal to or less than 1128 daltons; less than equal to or less than 966 daltons; or less than equal to or less than 804 daltons.

In other embodiments, at least one of the one or more GSGs has a molecular weight greater than 1128 daltons; equal to or greater than 1260 daltons; equal to or greater than 1422 daltons; equal to or greater than 1746 daltons; or equal to or greater than 1922 daltons.

The one or more GSGs may be present in the composition in a total amount of 0.1-99.5% of the composition by weight. In some embodiments, the one or more GSGs comprise are 50-70% of the composition by weight or 55-65% of the composition by weight.

Glycosylated *Stevia* extracts may be derived from any *Stevia* extract(s). A non-limiting list of exemplary GSGs includes glycosylated *Stevia* extracts including, but not limited to, GSG-RA20, GSG-RA30, GSG-RA40, GSG-RA50, GSG-RA60, GSG-RA70, GSG-RA80, GSG-RA90, GSG-RA95, GSG-RA97, GSG-(RA50+RB8), GSG-(RA30+RC15), and GSG-(RA40+R138).

Different sugar donors, such as glucose, xylose, rhamnose, etc. also can be obtained during degradation of different compositions of steviol glycosides. These combinations of sugar donors could react with different amino acid donors, thus creating many unique and surprisingly pleasant flavors. The reaction removes the typical grassy, bitter, void, lingering and aftertaste of steviol glycosides.

In one embodiment, glycosylated steviol glycosides (GSGs) are obtained for example, by synthetic manipulation or by enzymatic processes. GSGs obtained by these methods are not naturally occurring steviol glycosides. The methods and GSGs found in KR10-2008-0085811 are herein incorporated by reference. Stevioside G1 (ST-G1), Stevioside G2 (ST-G2), Stevioside G3 (ST-G3), Stevioside G4 (ST-G4), Stevioside G5 (ST-G5), Stevioside G6 (ST-G6), Stevioside G7 (ST-G7), Stevioside G8 (ST-G8), Stevioside G9 (ST-G9), Rebaudioside A G1 (RA-G1), Rebaudioside A G2 (RA-G2), Rebaudioside A G3 (RA-G3), Rebaudioside A G4 (RA-G4), Rebaudioside A G5(RA-G5), Rebaudioside A G6 (RA-G6), Rebaudioside A G7 (RA-G7), Rebaudioside A G8 (RA-G8), Rebaudioside A G9 (RA-G9), Rebaudioside B G1 (RB-G1), Rebaudioside B G2 (RB-G2), Rebaudioside B G3 (RB-G3), Rebaudioside B G4 (RB-G4), Rebaudioside B G5 (RB-G5), Rebaudioside B G6 (RB-G6), Rebaudioside B G7 (RB-G7), Rebaudioside B G8 (RB-G8), Rebaudioside B G9 (RB-G9), Rebaudioside C G1 (RC-G1), Rebaudioside C G2 (RC-G2), Rebaudioside C (13 (RC-G3), Rebaudioside C G4 (RC-G4), Rebaudioside C G5 (RC-G5), Rebaudioside C G6 (RC-G6), Rebaudioside C G7 (RC-G7), Rebaudioside C G8 (RC-G8), Rebaudioside C G9 (RC-G9), or any combination thereof can be incorporated into the sweetener compositions of the current invention. Alternatively in the current embodiments, the glycosylation process can be modified as to provide partially glycosylated steviol glycosides that can have further unique taste profiles.

A suitable method to prepare glycosylated steviol glycosides can be found, for example, in Examples 1 and 2 of KR10-2008-0085811. It is also anticipated that other steviol glycosides, for example, steviolbioside, rebaudioside B, rebaudioside C, rebaudioside D, rebaudioside E, rebaudioside F, rebaudioside M, rebaudioside 0, rebaudioside rebaudioside rebaudioside L, rebaudioside N, rebaudioside K, rebaudioside J, rubusoside and dulcoside A can be enzymatically modified to afford their corresponding multiple glycosylated glycosides: Steviol G1, Steviol G2 Steviol G3, Steviol G4, Steviol G5, Steviol G6, Steviol G7, Steviol G8, Steviol G9, Steviobioside G1, Steviobioside G2, Steviobioside G3, Steviobioside G4, Steviobioside G5, Steviobioside G6, Steviobioside G7, Steviobioside G8, Steviobioside G9, Rebaudioside B G1, Rebaudioside B G2, Rebaudioside B G3, Rebaudioside B G4, Rebaudioside B G5, Rebaudioside B G6, Rebaudioside B G7, Rebaudioside B G8, Rebaudioside B G9, Rebaudioside C G1, Rebaudioside C G2, Rebaudioside C G3, Rebaudioside C G4, Rebaudioside C G5, Rebaudioside C G6, Rebaudioside C G7, Rebaudioside C G8, Rebaudioside C G9, Rebaudioside D G1, Rebaudioside D G2, Rebaudioside D G3, Rebaudioside D G4, Rebaudioside D G5, Rebaudioside D G6, Rebaudioside D G7, Rebaudioside D G8, Rebaudioside D G9, Rebaudioside E G1, Rebaudioside E G2, Rebaudioside E G3, Rebaudioside E G4, Rebaudioside E G5, Rebaudioside E G6, Rebaudioside E G7, Rebaudioside E G8, Rebaudioside E G9, Rebaudioside F G1, Rebaudioside G2, Rebaudioside F G3, Rebaudioside F G4, Rebaudioside F G5, Rebaudioside F G6, Rebaudioside F G7, Rebaudioside F G8, Rebaudioside F G9, Rebaudioside M G1, Rebaudioside M G2, Rebaudioside M G3, Rebaudioside E G4, Rebaudioside M G5, Rebaudioside M G6, Rebaudioside M G7, Rebaudioside M G8, Rebaudioside M G9, Rubusoside G1, Rubusoside G2, Rubusoside G3, Rubusoside G4, Rubusoside G5, Rubusoside G6, Rubusoside G7, Rubusoside G8, Rubusoside G9, Dulcoside A G1, Dulcoside A G2, Dulcoside A G3, Dulcoside A G4, Dulcoside A G5, Dulcoside A G6, Dulcoside A G7, Dulcoside A G8, and Dulcoside A G9.

In a particular aspect, GSG-RA20, GSG-RA30, GSG-RA40, GSG-RA50, GSG-RA60, GSG-RA70, GSG-RA80, GSG-RA90, GSG-RA95, GSG-RA97, GSG-(RA50+RB8), GSG-(RA30+RC15), and GSG-(RA40-RB8) are GSGs which are used to be combined with steviol glycosides, such as RA, RB, RD, etc. GSG-RA20 is typically prepared from RA20 as a key starting material, GSG-RA30 is typically prepared from RA30 as a key starting material, GSG-RA40 is typically prepared from RA40 as a key starting material, GSG-RA50 is typically prepared from RA50 as a key starting material, GSG-RA60 is typically prepared from RA60 as a key starting material, GSG-RA70 is typically prepared from RA70 as a key starting material, GSG-RA80 is prepared from RA80 as the key starting material, GSG-RA90 is typically prepared from RA90 as a key starting material, GSG-RA95 is typically prepared from RA95 as a key starting material, and GSG-RA97 is prepared from RA97 as a key starting material. Since each composition contains varying concentrations of GSGs and steviol glycosides, then each composition may have different taste profiles. It is envisioned that specific ratios of GSGs and steviol glycosides may have unique and beneficial physical and chemical properties that are unknown and have not been previously disclosed.

In another aspect, GSGs or GSG extracts can be combined with one or more of steviol, stevioside, stevi olbiosi de, rebaudioside A, rebaudioside B, rebaudioside C, rebaudioside D, rebaudioside E, rebaudioside F, rebaudioside M, rebaudioside O, rebaudioside H, rebaudioside I, rebaudioside L, rebaudioside N, rebaudioside K, rebaudioside J, rubusoside and dulcoside A to provide suitable sweetening agent compositions. The content of GSG or GSGs from any one or more of GSG-RA20, GSG-RA30, GSG-RA40, GSG-RA50, GSG-RA60, GSG-RA70, GSG-RA80, GSG-RA90, GSG-RA95, GSG-RA97, GSG-(RA50+RB8), GSG-(RA30+RC15), and GSG-(RA40+RB8) mixed with the disclosed steviol glycosides such as the steviol glycosides found in the *Stevia* plant or sweet tea extract can be from 1% wt/wt to 100% wt/wt. A GSG or GSGs, such as any one or more of GSG-RA20, GSG-RA30, GSG-RA40, GSG-RA50, GSG-RA60, GSG-RA70, GSG-RA80, GSG-RA90, GSG-RA95, GSG-RA97, GSG-(RA50+RB8), GSG-(RA30+RC15), and GSG-(RA40+RB8) can be included in the compositions described herein at 1% wt/wt, 2% wt/wt, 3% wt/wt, 4% wt/wt, 5% wt/wt, 6% wt/wt, 7% wt/wt, 8% wt/wt. 9% wt/wt, 10% wt/wt, 11% wt/wt, 12% wt/wt, 13% wt/wt, 14% wt/wt, 15% wt/wt, 16% wt/wt, 17% wt/wt, 18% wt/wt, 19% wt/wt, 20% wt/wt, 21%, wt/wt, 22% wt/wt, 23% wt/wt, 24% wt/wt, 25% wt/wt, 26% wt/wt, 27% wt/wt, 28% wt/wt, 29% wt/wt, 30% wt/wt, 31% wt/wt, 32% wt/wt, 33% wt/wt, 34% wt/wt, 35% wt/wt, 36% wt/wt, 37% wt/wt, 38% wt/wt, 39% wt/wt, 40% wt/wt, 41% wt/wt, 42% wt/wt, 43% wt/wt, 44% wt/wt, 45% wt/wt, 46% wt/wt, 47% wt/wt, 48% wt/wt, 49% wt/wt, 50% wt/wt, 51% wt/wt, 52% wt/wt, 53% wt/wt, 54% wt/wt, 55% wt/wt, 56% wt/wt, 57% wt/wt, 58% wt/wt, 59% wt/wt, 60% wt/wt, 61% wt/wt, 62% wt/wt, 63% wt/wt, 64% wt/wt, 65% wt/wt, 66% wt/wt, 67% wt/wt, 68% wt/wt, 69% wt/wt, 70% wt/wt, 71% wt/wt, 72% wt/wt, 73% wt/wt, 74% wt/wt, 75% wt/wt, 76% wt/wt, 77% wt/wt, 78% wt/wt, 79% wt/wt, 80% wt/wt, 81% wt/wt, 82% wt/wt, 83 wt/wt, 84% wt/wt, 85% wt/wt, 86% wt/wt, 87% wt/wt, 88% wt/wt, 89% wt/wt, 90% wt/wt, 91% wt/wt, 92% wt/wt, 93% wt/wt, 94% wt/wt, 95% wt/wt, 96% wt/wt, 97% wt/wt, 98% wt/wt, 99% wt/wt, or 100% wt/wt and all ranges between 1 and 100% wt/wt, for example less than about 70 percentage by weight, less than about 50 percentage by weight, from about 1% wt/wt to about 99% wt/wt, from about 1% wt/wt to about 98% wt/wt, from about 1% wt/wt to about 97% wt/wt, from about 1% wt/wt to about 95% wt/wt, from about 1%) wt/wt to about 90% wt/wt, from about 1% wt/wt to about 80% wt/wt, from about 1% wt/wt to about 70% wt/wt, from about 1% wt/wt to about 60% wt/wt, from about 1% wt/wt to about 50% wt/wt, from about 1% wt/wt to about 40% wt/wt, from about 1% wt/wt to about 30% wt/wt, from about 1% wt/wt to about 20% wt/wt, from about 1% wt/wt to about 10% wt/wt, from about 1% wt/wt to about 5% wt/wt, from about 2% wt/wt to about 99% wt/wt, from about 2% wt/wt to about 98% wt/wt, from about 2% wt/wt to about 97% wt/wt, from about 2% wt/wt to about 95% wt/wt, from about 2% wt/wt to about 90% wt/wt, from about 2% wt/wt to about 80% wt/wt, from about 2% wt/wt to about 70% wt/wt, from about 2% wt/wt to about 60% wt/wt, from about 2% wt/wt to about 50% wt/wt, from about 2% wt/wt to about 40% wt/wt, from about 2% wt/wt to about 30% wt/wt, from about 2% wt/wt to about 20% wt/wt, from about 2% wt/wt to about 10% wt/wt, from about 2% wt/wt to about 5% wt/wt, from about 3% wt/wt to about 99% wt/wt, from about 3% wt/wt to about 98% wt/wt, from about 3% wt/wt to about 97% wt/wt, from about 3% wt/wt to about 95% wt/wt, from about 3% wt/wt to about 90% wt/wt, from about 3% wt/wt to about 80% wt/wt, from about 3% wt/wt to about 70% wt/wt, from about 3% wt/wt to about 60% wt/wt, from about 3% wt/wt to about 50% wt/wt, from about 3% wt/wt to about 40% wt/wt, from about 3% wt/wt to about 30% wt/wt, from about 3% % wt/wt to about 20% wt/wt, from about 3% wt/wt to about 10% wt/wt, from about 3% wt/wt to about 5% wt/wt, from about 5% wt/wt to about 99% wt/wt, from about 5% wt/wt to about 98% wt/wt, from about 5% wt/wt to about 97% wt/wt, from about 5% wt/wt to about 95% wt/wt, from about 5% wt/wt to about 90% wt/wt, from about 5% wt/wt to about 80% wt/wt, from about 5% wt/wt to about 70% wt/wt, from about 5% wt/wt, to about 60% wt/wt, from about 5% wt/wt to about 50% wt/wt, from about 5% wt/wt to about 40% wt/wt, from about 5% wt/wt to about 30% wt/wt, from about 5% wt/wt to about 20% wt/wt, from about 5% wt/wt to about 10% wt/wt, from about 10% wt/wt to about 99% wt/wt, from about 10% wt/wt to about 98% wt/wt, from about 10% wt/wt to about 97% wt/wt, from about 10% wt/wt to about 95% wt/wt, from about 10% wt/wt to about 90% wt/wt, from about 10% wt/wt to about 80% wt/wt, from about 10% wt/wt to about 70% wt/wt, from about 10% wt/wt to about 60% wt/wt, from about 10% wt/wt to about 50% wt/wt, from about 10% wt/wt to about 40% wt/wt, from about 10% wt/wt to about 30% wt/wt, from about 10% wt/wt to about 20% wt/wt, from about 20 to less than about 50 percentage by weight, from about 30 to less than about 50 percentage by weight, from about 40 to less than about 50 percentage by weight, and from about 20 to 45 percentage by weight of the sweetening agent composition.

In another aspect, the one or more steviol glycosides (SG's) including steviol, stevioside, steviolbioside, rebaudioside A, rebaudioside B, rebaudioside C, rebaudioside D, rebaudioside rebaudioside F, rebaudioside M, rebaudioside O, rebaudioside rebaudioside rebaudioside L, rebaudioside N, rebaudioside K, rebaudioside rubusoside, and dulcoside A, as well as those included in Table 2, are contained in the sweetening agent composition. The steviol glycosides of the compositions can make up 1% wt/wt, 2% wt/wt, 3% wt/wt, 4% wt/wt, 5% wt/wt, 6% wt/wt, 7% wt/wt, 8% wt/wt, 9% wt/wt, 10% wt/wt, 11% wt/wt, 12% wt/wt, 13% wt/wt, 14% wt/wt, 15% wt/wt, 16% wt/wt, 17% wt/wt, 18% wt/wt, 19% wt/wt, 20% wt/wt, 21% wt/wt, 22% wt/wt, 23% wt/wt, 24% wt/wt, 25% wt/wt, 26% wt/wt, 27% wt/wt, 28% wt/wt, 29% wt/wt, 30% wt/wt, 31% wt/wt, 32% wt/wt, 33% wt/wt, 34 wt/wt, 35% wt/wt, 36% wt/wt, 37% wt/wt, 38% wt/wt, 39% wt/wt, 40% wt/wt, 41% wt/wt, 42% wt/wt, 43% wt/wt, 44% wt/wt, 45% wt/wt, 46% wt/wt, 47% wt/wt, 48% wt/wt, 49% wt/wt, 50% wt/wt, 51% wt/wt, 52% wt/wt, 53% wt/wt, 54% wt/wt, 55% wt/wt, 56% wt/wt, 57% wt/wt, 58% wt/wt, 59% wt/wt, 60% wt/wt, 61% wt/wt, 62% wt/wt, 63% wt/wt, 64% wt/wt, 65% wt/wt, 66% wt/wt, 67% wt/wt, 68% wt/wt, 69% wt/wt, 70% wt/wt, 71% wt/wt, 72% wt/wt, 73% wt/wt, 74% wt/wt, 75% wt/wt, 76% wt/wt, 77% wt/wt, 78% wt/wt, 79% wt/wt, 80% wt/wt, 81% wt/wt, 82% wt/wt, 83% wt/wt, 84% wt/wt, 85% wt/wt, 86% wt/wt, 87% wt/wt, 88% wt/wt, 89% wt/wt, 90% wt/wt, 91% wt/t, 92% wt/wt, 93% wt/wt, 94% wt/wt, 95% wt/wt, 96% wt, 97% wt/wt, 98% wt/wt, 99% wt/wt, or 100% wt/wt and all ranges between 1 and 100% wt/wt, for example from about 1% wt/wt to about 99% wt/wt, from about 1% wt/wt to about 98% wt/wt, from about 1% wt/wt to about 97% wt/wt, from about 1% wt/wt to about 95% wt/wt, from about 1% wt/wt to about 90% wt/wt, from about 1% wt/wt to about 80% wt/wt, from about 1% wt/wt to about 70% wt/wt, from about 1% wt/wt to about 60% wt/wt from about 1% wt/wt to about 50% wt/wt, from about 1% wt/wt to about 40% wt/wt, from about 1% wt/wt to about 30% wt/wt, from about 1% wt/wt to about 20% wt/wt, from about 1% wt/wt to about 10% wt/wt, from about 1% wt/wt to about 5% wt/wt, from about 2% wt/wt to about 99% wt/wt, from about 2% wt/wt to about 98% wt/wt, from about 2% wt/wt to about 97% wt/wt, from about 2% wt/wt to about 95% wt/wt, from about 2% wt/wt to about 90% wt/wt, from about 2% wt/wt to about 80% wt/wt, from about 2% wt/wt to about 70% wt/wt, from about 2% wt/wt to about 60% wt/wt, from about 2% wt/wt to about 50% wt/wt, from about 2% wt/wt to about 40% wt/wt, from about 2% wt/wt to about 30% wt/wt, from about 2% wt/wt to about 20% wt/wt, from about 2% wt/wt to about 10% wt/wt, from about 2% wt/wt to about 5% wt/wt, from about 3% wt/wt to about 99% wt/wt, from about 3% wt/wt to about 98% wt/wt, from about 3% wt/wt to about 97% wt/wt, from about 3% wt/wt to about 95% wt/wt, from about 3% wt/wt to about 90% wt/wt, from about 3% wt/wt to about 80% wt/wt, from about 3% wt/wt to about 70% wt/wt, from about 3% wt/wt to about 60% wt/wt, from about 3% wt/wt to about 50% wt/wt, from about 3% wt/wt to about 40% wt/wt, from about 3% wt/wt to about 30% wt/wt, from about 3% wt/wt to about 20% wt/wt, from about 3% wt/wt to about 10% wt/wt, from about 3% wt/wt to about 5% wt/wt, from about 5% wi/wi, ,o about 99% wt/wt, from about 5% wt/wt to about 98% wt/wt, from about 5% wt/wt to about 97% wt/wt, from about 5% wt/wt to about 95% wt/wt, from about 5% wt/wt to about 90% wt/wt, from about 5% wt/wt to about 80% wt/wt, from about 5% wt/wt to about 70% wt/wt, from about 5% wt/wt to about 60% wt/wt, from about 5% wt/wt to about 50% wt/wt, from about 5% wt/wt to about 40% wt/wt, from about 5% wt/wt to about 30% wt/wt, from about 5% wt/wt to about 20% wt/wt, from about 5% wt/wt to about 10% wt/wt, from about 10% wt/wt to about 99% wt/wt, from about 10% wt/wt to about 98% wt/wt, from about 10% wt/wt to about 97% wt/wt, from about 10% wt/wt to about 95% wt/wt, from about 10% wt/wt to about 90% wt/wt, from about 10% wt/wt to about 80% wt/wt, from about 10% wt/wt to about 70% wt/wt, from about 10% wt/wt to about 60% wt/wt, from about 10% wt/wt to about 50% wt/wt, from about 10% wt/wt to about 40% wt/wt, from about 10% wt/wt to about 30% wt/wt, and from about 10% wt/wt to about 20% wt/wt, of the sweetening composition.

In certain embodiments, the GSGs used in the present application are prepared as follows: i) dissolving a glucose-donor material in water to form a liquefied glucose-donor material; ii) adding a starting SG composition to liquefied glucose-donor material to obtain a mixture; iii) adding an effective amount of an enzyme to the mixture to form a reaction mixture, wherein the enzyme catalyzes the transfer of glucose moieties from the glucose-donor material to SGs in the starting SG composition, and incubating the reaction mixture at a desired temperature for a desired length of reaction time to glycosylate SGs with glucose moieties present in the glucose-donor molecule. In some further embodiments, after achieving a desired ratio of GSG- and residual SG contents, the reaction mixture can be heated to a sufficient temperature for a sufficient amount of time to inactivate the enzyme. In some embodiments, the enzyme is removed by filtration in lieu of inactivation. In other embodiments, the enzyme is removed by filtration following inactivation. In some embodiments the resulting solution comprising GSG, residual SGs and dextrin is decolorized. In certain embodiments the resulting solution of GSG, residual SGs and dextrin is dried. In some embodiments, the drying is by spray drying. In some embodiments, step (i) comprises the substeps of (a) mixing a glucose-donor material with a desired amount of water to form a suspension, (b) adding a desired amount of enzyme to the suspension and (c) incubate the suspension at a desired temperature for a desired time to form liquefied glucose-donor material. Starch can be a suitable substitute for dextrin(s) and/or dextrin(s) can be obtained by the hydrolysis of starch.

B6. Mogrosides (MGs) and Swingle Extracts

Mogrosides (MGs) are defined by a family of triterpene-glycosides, which are present in the fruit of *Siraitia grosvenorii* (formerly called *Moinordica grosvenori*), a member of the Curcubitaceae (gourd) family, which is native to southern China and northern Thailand. The fruit is also referred to as Luo Han Guo (luohanguo) or monk fruit, Luohanguo has been used in traditional Chinese medicine as a medicinal herb for treating cough and sore throat and is popularly considered, in southern China, to be a longevity aid. The fruit is well-known for its sweet taste, which is attributed to the triterpine glycosides present in the fruit, as well as extracts from the fruit, which are commonly referred to as "swingle" extracts.

Other members of this plant family (Gourd family) also contain remarkably sweet components, including additional species of the genus *Siraitia* (e.g., *S. siarnensis, S. silomaradjae, S. sikkimensis, S. africana, S. borneensis*, and *S. taiwaniana*) and the popular herb jiaogulan (*Gynosteinnia pentaphyllum*). The latter herb, which has both sweet and bitter tasting triterpene glycosides in its leaves, is now sold worldwide as a tea and made into an extract for use in numerous health-care products.

Extracts from the fruits of *Siraitia grosvenorii* (Swingle), also known as *Momordica grosvenori* (Swingle), Luo Han Guo or monk fruit etc. provide a family of triterpene-glycosides and are referred to as mogroside(s) ("MGs") throughout the specification. The extracts include, for example, mogroside V, mogroside IV, siamenoside I, and 11-oxomogroside V. Constituents of the mogroside extracts are referred to by the designation "MG" followed by symbol, such as "V", therefore mogroside V is "MGV", Siamenoside I would be "SSI", 11-oxomogroside V would be "OGV".

The term "mogroside" is used with reference to a triterpene-glycoside that is recognized in the art and is intended to include the major and minor constituents from mogroside extracts.

Exemplary triterpene glycosides for use in the present application include mogrosides, such as mogroside II, mogroside IIIA, mogroside IIIE mogroside IVA, mogroside IVE, siamenoside I, and 11-oxomogroside V.

The juice or extract monk fruit includes mainly non-sugar natural sweeteners, the triterpenoid glycosides, which include mogroside V (esgoside), mogroside IV, and D-mannitol. The natural sweetness of them is 256-344, 126, and 0.55-0.65 times of that of sugar. The juice/extract contains large amounts of glucose, 14% fructose, proteins, vitamin C, and 26 inorganic elements, such as manganese, iron, nickel, selenium, tin, iodine, molybdenum and others. The juice/extract also includes fatty acids, such as linoleic acid, oleic acid, palmitic acid, stearic acid, palmitic acid, myristic acid, lauric acid, and decanoic acid.

It should be understood that monk fruit extracts can contain, for example, a mogroside, such as MGV, in an amount of 3% by weight, 5% by weight, 20% by weight, 40% by weight, 50% by weight, 60% by weight or higher but containing other mogrosides or non-mogrosides in the extracts. In addition, some other polysaccharides or flavonoids may be present. The mogroside(s) of interest can be purified before use.

"Glycosylated mogrosides" or "GMGs" refer to mogrosides that are glycosylated at least at one or more positions in addition to those positions glycosylated in native form, and may be obtained, for example, by synthetic manipulation or by enzymatic processes.

The terms "swingle extract" and "monk fruit extract" are used interchangeably herein. The terms "glycosylated swingle extract" and "glycosylated monk fruit extract" refer to plant extracts comprising compounds obtained by transglycosylating a swingle extract containing mogrosides, or transglycosylating purified mogrosides so as to add glucose units, for example, one, two, three, four, five, or more than five glucose units to the native mogrosides by a glycosyltransferase, preferably, CGTase enzyme (cyclodextringlycosyltransferase). Herein, the glycosylated mogrosides or glycosylated swingle extracts containing glycosylated mogrosides may further comprise short chain compounds obtained by hydrolyzation of glycosylated product and also comprise non-glycosylated ingredients which include the residues of non-reacted mogrosides, or unreacted components other than mogrosides contained in the swingle extract. It should be understood that GMG(s) essentially contains glycosylated mogroside(s), but also contains unreacted mogrosides, dextrin and other non-mogroside substances found in extracts. It should also be understood that the GMG(s) can be purified and/or separated into purified/isolated components.

A swingle extract containing mogrosides may be produced by the method of extracting the fruit of *Siraitia grosvenorii* (Swingle) with an alcohol, a mixture of alcohol and water, or water to obtain mixtures of mogrosides, then purified to provide desired mogrosides, such as mogroside V. Specifically, an exemplary method for producing a swingle extract containing mogrosides may involve: extraction of the fruit of *Siraitia grosvenorii* with an alcohol, a mixture of alcohol and water, or water to obtain the mogrosides (such as mogroside V etc.) component ranging from about 0.1% to 99% by weight of the extract. In a preferred embodiment, the swingle extract contains about 10-90% by weight mogrosides. In another preferred embodiment, the swingle extract contains about 20-80% by weight mogrosides. In another preferred embodiment, the swingle extract contains about 30-70% by weight mogrosides. In another preferred embodiment, the swingle extract contains about 40-60% by weight mogrosides.

A suitable process to obtain a monk fruit extract (swingle extract) is provided as follows. Luo Han Guo fruit is extracted with water or a mixture of water/alcohol (ethanol or methanol) at a temperature of from about 40° C. to about 80° C. with the ratio of fruit to solvent being about 1:10 to about 1:20 (weight to volume). The liquid can be clarified by flocculation or membrane filtration followed by purification through a macroporous resin and ion exchange resin. Decolorization can be accomplished with activated carbon. Solids are then filtered and dried.

In one embodiment, glycosylated mogroside V (GMGV) is produced by dissolving dextrin in water (reverse osmosis water). The ratio of GMGV to water is about 1:10 (weight/volume, (w/v)). A swingle extract with a mogroside content of between 1% and 99% is added to dextrin solution. In some embodiments, the ratio of dextrin to mogrosides/extract is optimized in a ratio of between 100:1 to 1:100 with suitable ranges including 3:1, 2:1, 1.5:1 and 1:1. In one embodiment, the dextrin to swingle extract ratio is between 30:70 and 70:30. CGTase enzyme is added to the mixture (ratio of GMGV to CGTase is about 20:1 (w/v) and incubated at 60-70° C. for a desired length of reaction time (typically from about 2 hours to about 72 hours, more preferably from about 8 hours to about 48 hours, even more preferably from about 12 hours to about 24 hours) to glycosylate mogrosides with glucose molecules derived from dextrin, wherein the added amount of CGTase by volume is about 0.1-0.5 ml based on 1 g mogrosides. In one embodiment, the ratio of GMGV to CGTase is from about 10:1 to about 20:1 w/v. After the desired ratio of GMGs and residual mogroside and dextrin contents are achieved (monitored by HPLC to analyze the content of unreacted MGV), the reaction mixture is heated to 90-100° C. for 30 minutes to inactivate the CGTase, which can then be removed by filtration. The resulting solution of GMGs, residual mogroside and dextrin is decolored and spray dried.

Optionally, amylase can be added to the mixture and the mixture is incubated at 70° C. for a desired length of reaction time to shorten the length of glucose chain(s) in the GMG molecules.

Decolorization and/or spray drying the resulting mixture of GMG, residual mogrosides and dextrin can then be undertaken, Use of the monk fruit extracts with Maillard reaction products described herein are particularly useful in the savory industry to improve overall taste.

B7. Rubusoside (RU) and Sweet Tea Extracts

Rubusoside (RU), a steviol glycoside, and kaurane-type diterpene glycosides, such as suaviosides B, G, H, I and J, constitute a variety of natural sweeteners found in leaves of the Chinese sweet tea plant (*Rubus suavissinius* S. Lee). Rubusoside is 200 times sweeter than cane sugar and is the main steviol glycoside found in the leaves of the sweet tea plant. Sweet tea plant extracts contain rubusoside, as well as the aforementioned suaviosides.

The term "glycosylated RU" refers to a glycosylated rubusoside, while the term "glycosylated sweet tea extract" refers to a *R. suavissimus* leaf extract containing glycosylated RU and/or glycosylated suaviosides B, G, H, I and J. These glycosylated compounds may be obtained by transglycosylating rubusoside or a sweet tea extract containing rubusoside and/or suaviosides so as to add glucose units, for example, one, two, three, four, five or more than five glucose units, to the native rubusoside or suavioside(s) by glycosyltransferase, preferably, CGTase enzyme (cyclodextringlycosyltransferase). Herein, the resulting glycosylated sweet tea glycosylates include short chain compounds obtained by hydrolyzation of glycosylated product and may also include non-glycosylated ingredients which are residues of non-reacted rubusoside or suavioside(s) or unreacted components other than rubusoside or suavioside(s) contained in the sweet tea extract.

B8. Neohesperidin and Naringin Glycosides

Neohesperidin and naringin are flavanone glycosides present in citrus fruits and grapefruit, and are responsible for the bitterness of citrus juices, along with limonin. Neohesperidin, naringin, and their derivatives, such as neohesperidine chalcone, naringin chalcone, phioracetophenone, neohesperidine dihydrochalcone, naringin dihydrochalcone etc. (as further described herein) are good candidates for bitter or sweet enhancers, as they have been found to be effective in masking the bitter tastes of other compounds found in citrus, including limonin and naringin.

An important natural source for these flavanone glycosides is Bitter orange (also known as Seville orange, sour orange, bigarade orange, or marmalade orange) refers to a citrus tree (Citrus x aurantium) and its fruit. It is native to Southeast Asia and has been spread by humans to many parts of the world. The bitter orange is believed to be a cross between *Citrus maxima* x *Citrus reticulate.*

Industrially, neohesperidine dihydrochalcone (NHDC) is produced by extracting neohesperidin from the bitter orange, and then hydrogenating neohesperidin to make NHDC. NHDC is roughly 1500-1800 times sweeter than sugar at threshold concentrations and about 340 times sweeter than sugar weight-for-weight. In certain embodiments, glycosylated derivatives of NHDC prepared by enzymatic processes may be employed.

In certain embodiments, the flavanone glycosides are provided in the form of metal salts. For example, a metal salt of dihydrochalcone has the following formula:

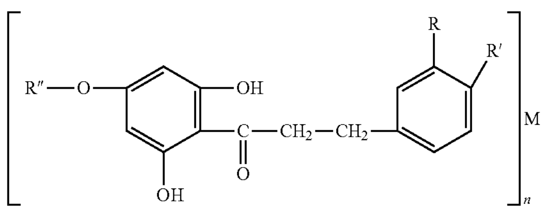

wherein R is selected from the group consisting of hydrogen and hydroxy, R' is selected from the group consisting of hydroxy, methoxy, ethoxy and propoxy, and R" is selected from the group consisting of neohesperidoxyl, B-rutinosyl and β-D-glucosyl, M is a mono- or divalent metal selected from the group consisting of an alkali metal and an alkaline earth metal, and n is an integer from 1 to 2 corresponding to the valence of the selected metal M.

Typical compounds of the above formula are the alkali or alkaline earth metal monosalts having the following structures:

Neohesperidin dihydrochalcone (Formula I)

(I)

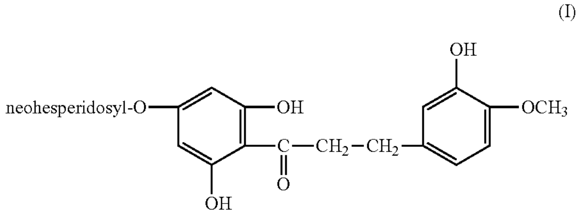

2', 4', 6', 3-tetrahydroxy-4-n-propoxydihydrochalcone 4'-13 neohesperidoside (Formula II):

(II)

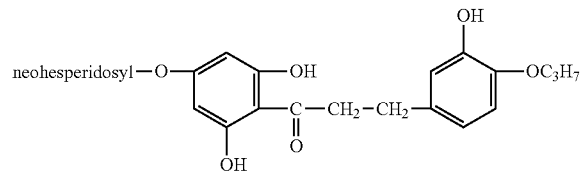

naringin dihydrochalcone (Formula III):

(III)

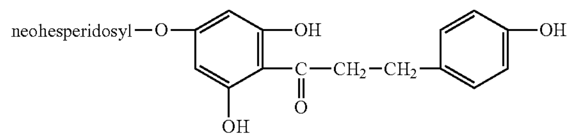

prunin dihydrochalcone (Formula IV):

(IV)

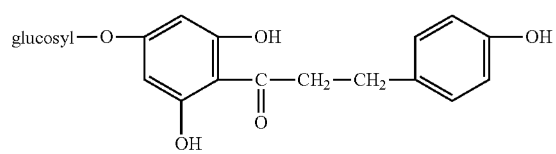

hesperidin dihydrochalcone (Formula V):

(V)

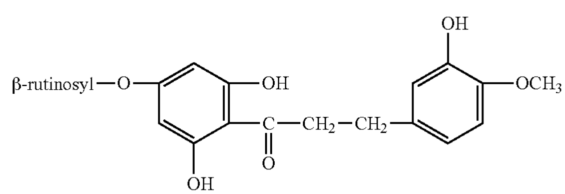

hesperitin dihydrochalcone (Formula VI):

(VI)

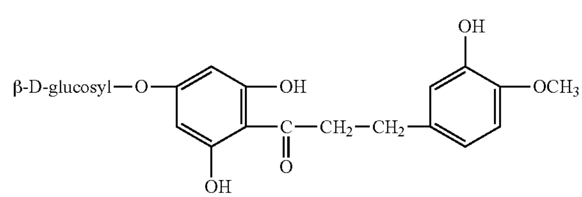

The "alkali metals" include e.g., sodium, potassium, lithium, rubidium, caesium, and ammonium, while the term "alkaline earth metals" includes e.g., calcium, magnesium, strontium, barium, etc. These may be used as salts of dihydrochalcone, along with other alkali amino acids as counterpart ions. Thus, certain embodiments of the present application comprise the use of one or more salts of dihydrochalcone.

B9. Glycyrrhizin

Glycyrrhizin (or glycyrrhizic acid or glycyrrhizinic acid) is the chief sweet-tasting constituent of *Glycyrrhiza glabra* (liquorice) root. Glycyrrhizin is obtained as an extract from licorice root after maceration and boiling in water. Licorice extract provides a source of glycyrrhizin and is sold as a liquid, paste, or spray-dried powder. When used in specified amounts, it is approved for use as a flavor and aroma in manufactured foods, beverages, candies, dietary supplements, and seasonings. It is 30 to 50 times as sweet as sucrose (table sugar). In certain embodiments, glycosylated derivatives of glycyrrhizin prepared by enzymatic processes may be employed.

B10. Fatty Acids

The inventors of the present application have surprisingly found that fatty acids can act as sugar donors in Maillard reactions in combination with *Stevia* extracts, amino acids, and optionally a reducing sugar, such as glucose. This was found by evaluating MRP products formed when subjecting a fatty add and an amine donor, e.g., an amino acid, to the Maillard reaction. In this context, a fatty acid or its derivative refers to aliphatic acid or aliphatic esters of aliphatic acid which can be used as sugar donor in Maillard reaction. An exemplary, non-limiting list of fatty acids includes cinnamic acid, glyceryl stearate, lactic acid, linolenic acid, alpha-linolenic acid, eicosapentaenoic acid, docosahexaenoic acid, stearidonic acid, eicosatetraenoic acid, linoleic acid, gamma-linolenic acid, dihommo-gamma-linolenic acid, arachidonic acid, eicosadienoic acid, docosadienoic acid, adrenic acid, docosapentaenoic acid and combinations thereof.

B11. Additional Embodiments

Various Maillard reaction products (compositions) can be prepared with the components discussed herein including sweet tea extracts, *Stevia* extracts, swingle extracts, MG(s), SG(s), as well as components of sweet tea extract(s), GMG(s), GSG(s) glycosylated sweet tea glycosylates, in combination with an amine donor, and optionally, in combination any of the sugar donors described herein, such as glucose, fructose or galactose.

Thus, the following forty five embodiments are included as suitable Maillard reaction components (along with one or more amine donors) to provide suitable ingestible compositions from a Maillard reaction process. It should also be understood that an amine donor(s) is used in the Mail lard reaction under appropriate reaction conditions (a from about 2 to about 14, e.g., pH≥7, elevated temperature) to produce the resultant Maillard reaction product(s).

(1) A GMG or mixtures of GMGs.

(2) A GMG in combination with a sugar donor.

(3) A GMG in combination with a GSG.

(4) A GMG in combination with an SG.

(5) A GMG in combination with an MG.

(6) A GMG, a GSG and a sugar donor.

(7) A GMG, an SG and a sugar donor.

(8) A GMG, an MG and a sugar donor.

(9) A GMG, a GSG and an SG.

(10) A GMG, a GSG and an MG.

(11) A GMG, an SG and an MG.

(12) A GMG, a GSG, an SG and an MG.

(13) A GMG, a GSG an SG and a sugar donor.

(14) A GMG, a GSG, an MG and a sugar donor.

(15) A GMG, a GSG an SG, an MG and a sugar donor.

(16) An MG, an SG, a GSG and a sugar donor.

(17) An MG and a GSG.

(18) An MG, a GSG and an SG.

(19) An MG, a GSG and a sugar donor.

(20) An MG, a GSG, an SG and a sugar donor.

(21) A *Stevia* extract.

(22) A *Stevia* extract and a sugar donor.

(23) A steviol glycoside (SG).

(24) A steviol glycoside (SG) and a sugar donor.

(25) A glycosylated steviol glycoside (GSG).

(26) A glycosylated steviol glycoside (GSG) and a sugar donor.

(27) A swingle extract (mogroside extract)

(28) A swingle extract (mogroside extract) and a sugar donor.

(29) A glycosylated swingle extract.

(30) A glycosylated swingle extract and a sugar donor.

(31) A mogroside (MG) or a mixture of MGs.

(32) A mogroside (MG) and a sugar donor.

(33) A glycosylated mogroside (GMG).

(34) A glycosylated mogroside and a sugar donor.

(35) A sweet tea extract.

(36) A sweet tea extract and a sugar donor.

(37) A glycosylated sweet tea extract.

(38) A glycosylated sweet tea extract and a sugar donor.

(39) A sweet tea component, e.g., rubusosides, suaviosides.

(40) A glycosylated sweet tea component and a sugar donor.

(41) A steviol glycoside (SG) and a glycosylated steviol glycoside (GSG).

(42) A steviol glycoside (SG), a glycosylated steviol glycoside (GSG) and a sugar donor,

(43) Any of the above forty two combinations further including one or more salts.

(44) Any of the above forty three combinations further including a sweetener.

(45) Any of the above forty four combinations further including a sweetener enhancer.

It should be understood, that in the 45 combinations noted above, that where the singular is used, e.g., a glycosylated sweet tea extract, that the plural of such is included, e.g., glycosylated sweet tea extracts.

B12. Use of Raw Materials in MRP Reactions and/or MRP-Containing Compositions

In some embodiments, the reactants for the Maillard reaction may include a number of different raw materials for producing MRP compositions.

In one aspect, the raw materials may be categorized into the following groups comprsing the following exemplary materials:

1) A protein nitrogen source:

Protein nitrogen containing foods (meat, poultry, eggs, dairy products, cereals, vegetable products, fruits, yeasts) and their extracts;

Hydrolysis products of the above, autolyzed yeasts, peptides, amino acids and/or their salts.

2) A carbohydrate source:

Foods containing carbohydrates (cereals, vegetable products and fruits) and their extracts Mono-, di- and polysaccharides (sugars, dextrins, starchesand edible gums)

Hydrolysis products of the above.

3) A fat or fatty acid source:

Foods containing fats and oils.

Edible fats and oil from animal, marine or vegetable origin.

Hydrogenated, trans-esterified and/or fractionated fats and oils.

Hydrolysis products of the above.

4) Miscellaneous list of additional ingredients:

Foodstuffs, herbs, spices, their extracts and flavoring agents identified therein Water Thiamine and its hydrochloric salt Ascorbic, Citric, Lactic, Fumaric, Malic, Succinic, Tartaric and the Na, K, Ca, Mg and NH4 salts of these acids Guanylic acid and inosinic acid and its Na, K and Ca salts Inositol Sodium, potassium and ammonium sulphides, hydrosulphides and polysulphides Lecithin Acids, bases and salts as pH regulators:

Acetic, hydrochloric, phosphoric and sulphuric acids

Sodium, potassium, calcium and ammonium hydroxide.

Salts of the above acids and bases

Polymethyisiloxane as antifoaming agent.

In another aspect, the present application contemplates the use of any one of a number of raw materials exemplified below to produce NATURAL PRODUCTS:

Sugar Syrups:

Xylose syrup, arabinose syrup and rhatnnose syrup manufactured from beech wood. Ardilla Technologies supply these along with natural crystalline L-xylose, L-arabinose and L-rhamnose. Xylose syrup may also be obtained from natural sources, such as the xylan-rich portion of hemicellulose, mannose syrup from ivory nut, etc. These and other types of syrup described herein can be used as sugar donors in the compositions described herein.

Hydrolyzed Gum Arabic:

Thickeners, such as gum arabic can be hydrolyzed with an organic acid or by enzyme hydrolysis to produce a mixture containing arabinose. Arabinose could also be obtained from other wood-based or biomass hydrolysate. Cellulose enzymes can also be used.

Meat Extracts:

Commercially available from a number of companies, such as flenningsens (Chicken skin and meat). Gives excellent chicken notes.

Jardox: Meat and poultry extracts and stocks.

Kanegrade: Fish powders, anchovy, squid, tuna and others.

Vegetable Powders:

As well as onion and garlic powders, celery, tomato and leek powders are effective flavor contributors to reaction flavors.

Egg Yolk:

Contains 50% fat and 50% protein. The fat contains phospholipids and lecithin. The proteins are coagulating proteins and their activity must be destroyed by hydrolysis with acid or by the use of proteases prior to use. This will also liberate amino acids and peptides useful in reaction flavors. (Allergen activity)

Vegetable Oils:

Peanut (groundnut) oil—Oleic acid 50%, Linoleic acid 32%—beef and lamb profile. Sunflower—linoleic acid 50-75%, oleic 25%—chicken profile.

Canola (rapeseed)—oleic 60%, linoleic 20%, alpha-linoleic 10%, gadoleic 12%.

Sauces:

Fish sauce, soy sauce, oyster sauce, miso.

Enzyme Digests:

Beef heart digest—rich in phospholipids. Liver digest—at low levels <5% gives a rich meaty character. Meat digests can also add authenticity but they are usually not as powerful as yeast extracts and HVPs.

Enzyme enhanced umami products—shitake or porcini mushrooms, kombu, etc Enzyme digested fats—beef, lamb, etc.

All of the components of the compositions disclosed herein can be purchased or made by processes known to those of ordinary skill in the art and combined (e.g., precipitation/co-precipitation, mixing, blending, grounding, mortar and pestle, microemulsion, solvothermal, sonochemical, etc.) or treated as defined by the current invention.

C. Additional Sweeteners

Sweetener(s), including reducing sugars, non-reducing sugars, high intensity natural sweeteners, high intensity synthetic sweeteners, and sweet taste-modifying proteins, can be included in a Maillard reaction or they may be added to an MRP composition in an amount in the range of 1 to about 99 weight percent, from about 1 to about 75 weight percent 1 to about 50 weight percent, from about 1 to about 40 weight percent, from about 1 to about 30 weight percent, from 1 to about 20 weight percent, from about 1 to about 10 weight percent, from about 2 to about 9 weight percent, from about 3 to about 8 weight percent, from about 4 to about 7 weight percent, from about 5 to about 6 weight percent and all values and ranges encompassed over the range of from about 1 to about 99 weight percent including 5 weight percent, 10 weight percent, 15, weight percent, 20 weight percent including increments of 5, for example, through 95 weight percent, and alternatively from about 2 weight percent, 4 weight percent, 6 weight percent, including increments of 2, for example, through 98 weight percent.

In some embodiments, the MR reactants or the MRP composition prepared therefrom includes at least one sweetener enhancer. In certain particular embodiments, the ratio of the MR reactants to the at least one sweetener enhancer is between 20:1 and 1:1, between 15:1 and 2:1, between 10:1 and 5:1, or any ratio or any range derived from any of the aforementioned ratios.

Sweetener enhancer(s) may be present in the MRP reaction mixture or in the MRP composition in a range of from about 0.5 ppm to about 1000 ppm, from about 1 ppm to about 900 ppm, from about 2 ppm to about 800 ppm, from about 3 ppm to about 700 ppm from about 4 ppm to about 600 ppm, about 500 ppm, and all values and ranges encompassed over the range of from about 0.5 ppm to about 1000 ppm, including 5 ppm, 10 ppm, 15 ppm, 20 ppm, including increments of 5, for example, through 1000 ppm, alternatively from about 2 ppm, including 4 ppm, 6 ppm, 8 ppm, 10 ppm, including increments of 2, for example, through 1000 ppm.

Thaumatin may be included in the composition, before, during, or after the Maillard reaction, in a range from 0.01 ppm to 99.9 wt % on the basis of the total weight of the composition, including all specific values in the range and all subranges between any two specific values. For example, thaumatin may be present in the composition in an amount of 0.1%, 0.5%, 1%, 5%, 10%, 20%, 30%, 40%, 50%, 60% 70%, 80%, 90%, 95% by weight of the composition or any range derived therefrom, as well as the subranges of 0.5-95 wt %, 1-90 wt %, 5-80 wt %, 10-70 wt %, 20-60 wt % or 30-50 wt % on the basis of the total weight of the composition. Likewise, NHDC may be included in the composition, with or without thaumatin, before, durng, or after the Maillard reaction in these same amounts.

In a particular embodiment, the MRP composition comprises from 0.01 ppm to 99.9 wt % of thaumatin, one or more MRPs as prepared by the present embodiments, and optionally 0.1-99.9 wt % of a sweetening agent and/or 0.1-99.9 wt % of sweetener. In another embodiment, the MRP composition comprises from 0.01 ppm to 30 wt % of thaumatin, 0.01 ppm to 50 wt % of MRP as prepared by the present embodiments, and optionally 10-30 wt % of sweetening agent, and optionally 10-30 wt % of sweetener.

In some embodiments where thaumatin is added to an MRP or S-MRP composition, the ratio of thaumatin to the MRP or S-MRP may range from 1:100 to 1:0.67, based on pure thawnatin. However, considering that in certain embodiments where the preferred dosage of thaumating is 0.5 ppm to 25 ppm, and the preferred dosage of the MRP/S-MRP composition is 10 ppm to 500 ppm, typical ratios (by weight) of thaumatin:(MRP/S-MRP) may range from 1:1000 to about 1:0.4, more preferably from about 1:200 to about 1:1. Similar ratios may be utilized when substituting or additionally incorporated NHDC.

In some embodiments, thaumatin may be used in a Maillard reaction with e.g., suitable natural sweeteners, such as SGs, *Stevia* extracts, GSGs and/or glycosylated *Stevia* extracts. In addition, NHDC may be ifurther combined in the reaction mixture. Thus, where thaumatin (and/or NHDC) is included in a Maillard reaction with e.g., one or more amino acids (as starting materials) as described in Examples 256, 257, and 261 herein, the ratio of thaumatin to amino acid(s) may encompass exemplary ranges, such as 1:2.64, 1:0, and 1:2424, respectively. Thaumatin, a protein, can be used as an amino donor alone or in combination with other amino acid(s).

In other embodiments, the MR reactants or the MRP composition prepared therefrom includes at least one high intensity synthetic sweetener. Exemplary high intensity synthetic sweeteners include, but are not limited to, sucralose, sorbitol, xylitol, mannitol, sucralose, aspartame, acesulfame-K, neotame, erythritol, trehalose, raffinose, cellobiose, tagatose, DOLCIA PRLMA™ allulose, inulin, N—[N-[3-(3-hydroxy-4-methoxyphenyl)propyl]-alpha-aspartyl]-L-phenylalanine 1-methyl ester, glycyrrhizin, sodium cyclamate, including salts thereof and combinations thereof. In certain particular embodiments, the ratio of the MR reactants to the at least one high intensity synthetic sweetener is between 20:1 and 1:1, between 15:1 and 2:1, between 10:1 and 5:1, or any ratio or any range derived from any of the aforementioned ratios.

In other embodiments, the MR reactants or the MRP composition prepared therefrom includes at least one at least one sweetener enhancer and at least one high intensity synthetic sweetener. In certain particular embodiments, the ratio of the MR reactants to the combination of the sweetener enhancer(s) and the high intensity synthetic sweetener(s) is between 20:1 and 1:1, between 15:1 and 2:1, between 10:1 and 5:1, or any ratio or any range derived from any of the aforementioned ratios.

D. Flavor Substances

The inventors of the present application have also developed a unique process which could preserve useful flavor substances originating from *Stevia* plants and recovered in in the form of *Stevia* extracts. Such substances are further amplified in Maillard reactions involving SGs and Sevier extracts in combination with various amine donors as described herein.

The flavor substances in *Stevia* plants include but are not limited to alkanes, ketones, acids, aldehydes, hydrocarbons, alkenes, aromatics, esters, alcohols, aliphatics or amines. Specifically, the acids comprise Acetic acid, Propanoic acid, Pentanoic acid, Hexanoic acid, Trans 2-hexenoic acid, Heptanoic acid, Octanoic acid, (Z)-9-Octadecenoic acid, decahydro-1-Naphthalenecarboxylic acid, 2,3-dihyd-9,12,15-Octadecatrienoic acid; the alcohols comprise 1-Azabicyclo [3.2.1]octan-6-ol, 2-Ethyl-1-dodecanol, (+) spathulenol, 1,2,3,4,4a,7,8,8a-octahy-1-Naphthalenol, the aldehydes comprise Hexanal, 2,4-Pentadienal, Octanal, Nonanal, Decanal, 1-Cyclohexene-1-carboxaldehyde, 2,5-dimethyl-5-nitrohexanal, (E)-2-Hexenal, (Z)-2-Heptenal; the amines comprise 4-methyl-Pyrimidine, O-decyl-Hydroxylamine, the esters comprise 3-Methyl pentanoic acid, 2-ethyl-4-Pentenal, Triacetin, Heptafluorobutyric acid, n-pentadecyles, Pseudosolasodine diacetate, 2,5,6-trimethyl-Decane; the ketones comprise dihydro-2(3H)-Furanone, 5-ethenyldihydro-5-methy-2(3H)-Furanone, 5-ethyldihydro-2(3H)-Furanone, 4-methyl-Cyclopentadecanone, 3,3-dimethyl-2,7-octanedione, 6,10-dimethyl-5,9-Undecadien-2-one, 3,5,6,8a-tetrahydro-2,52H-1-Benzopyran, 5,6,7,7a-tetrahydro-2(4H)-Benzofuranone, 6,10,14-trimethyl-2-Pentadecanone, trans-β-Ionone, 3-ethyl-4-methyl-1H-Pyrrole-2,5-dione, 1H-Naphtho[2,1-b]pyran, 3-ethenyl-dodecah; the alkanes comprises nitro-Cyclohexane, 2,6-dimethyl-Heptadecane, 2,6,7-trimethyl-Decane, 2,6,7-tdmethyl-Decane, Tetradecane, 2,6,10-trimethyl-Dodecane, 2,3-Dimethyldecane, Undecane, 5-methyl-Undecane, Docosane, Dodecane, Heptadecane, Nonadecane, 1-Bromo-2-methyl-decane, 2,6,10-trimethyl-Tetradecane; the hydrocarbons comprise Bicyclo[4.4.1]undeca-1,3,5,7,9-pentaen-1,3-Isopropoxy-1,1,1,7,7,7-hexamethyl-3,5, the alkenes comprise 3-Cyclohexene-1-methanol, Caryophyllene oxide, Junipene; the aromatics comprise Ethylbenzene, pentamethyl-Benzene, 2-methyl-Naphthalene, (+)-Aromadendrene the aliphatics comprise 1-chloro-Nonadecane, 1-chloro-Octadecane. Additionally, the flavor substances in the *Stevia* plant should also contain any new possible flavor substances from new *Stevia* varieties by hybridizing, grafting and other cultivating methods.

A flavoring agent, other than a flavor derived from a Maillard reaction product as described herein, can be added to the compositions described herein before or after a Maillard reaction has been effected. Suitable flavoring agents include, for example, natural flavors, vitamins, such as vitamin C, artificial flavors, spices, seasonings, and the like. Exemplary flavor agents include synthetic flavor oils and flavoring aromatics and/or oils, uronic acids (e.g., glucuronic acid and galacturonic acid) or oleoresins, essences, and distillates, and a combination comprising at least one of the foregoing.

During the Maillard reaction or following completion of the Maillard reaction, "top note" agents may be added, which are often quite volatile, vaporizing at or below room temperature. "Top notes" are often what give foods their fresh flavors. Suitable top note agents include but are not limited to, for example, furfuryl mercaptan, methional, nonanal, trans,trans-2,4-decadienal, 2,2'-(dithiodimethylene) difuran, 2-methyl-3-furanthiol, 4-methyl-5-thiazoleethanol, pyrazineethanethiol, bis(2-methyl-3-furyl) disulfide, methyl furfuryl disulfide, 2,5-dimethyl-2,5-dihydroxy-1,4-dithiane, 95%, trithioacetone, 2,3-butanedithiol, methyl 2-methyl-3-furyl disulfide, 4-methylnonanoic acid, 4-methyloctanoic acid, or 2-methyl-3-tetrahydrofuranthiol.

Flavor oils include spearmint oil, cinnamon oil, oil of wintergreen (methyl salicylate), peppermint oil, Japanese mint oil, clove oil, bay oil, anise oil, eucalyptus oil, thyme oil, cedar leaf oil, oil of nutmeg, allspice, oil of sage, mace, oil of bitter almonds, and cassia oil; useful flavoring agents include artificial, natural and synthetic fruit flavors, such as vanilla, and citrus oils including lemon, orange, lime, grapefruit, yuzu, sudachi, and fruit essences including apple, pear, peach, grape, raspberry, blackberry, gooseberry, blueberry, strawberry, cherry, plum, prune, raisin, cola, guarana, neroli, pineapple, apricot, banana, melon, apricot, cherry, tropical fruit, mango, mangosteen, pomegranate, papaya, and so forth.

Additional exemplary flavors imparted by a flavoring agent include a milk flavor, a butter flavor, a cheese flavor, a cream flavor, and a yogurt flavor; a vanilla flavor; tea or coffee flavors, such as a green tea flavor, an oolong tea flavor, a tea flavor, a cocoa flavor, a chocolate flavor, and a coffee flavor; mint flavors, such as a peppermint flavor, a spearmint flavor, and a Japanese mint flavor; spicy flavors, such as an asafetida flavor, an ajowan flavor, an anise flavor, an angelica flavor, a fennel flavor, an allspice flavor, a cinnamon flavor, a chamomile flavor, a mustard flavor, a cardamom flavor, a caraway flavor, a cumin flavor, a clove flavor, a pepper flavor, a coriander flavor, a sassafras flavor, a savory flavor, a Zanthoxyli Fructus flavor, a perilla flavor, a juniper berry flavor, a ginger flavor, a star anise flavor, a horseradish flavor, a thyme flavor, a tarragon flavor, a dill flavor, a capsicum flavor, a nutmeg flavor, a basil flavor, a marjoram flavor, a rosemary flavor, a bayleaf flavor, a wasabi (Japanese horseradish) flavor; a nut flavor, such as an almond flavor, a hazelnut flavor, a macadamia nut flavor, a peanut flavor, a pecan flavor, a pistachio flavor, and a walnut flavor; alcoholic flavors, such as a wine flavor, a whisky flavor, a brandy flavor, a rum flavor, a gin flavor, and a liqueur flavor; floral flavors; and vegetable flavors, such as an onion flavor, a garlic flavor, a cabbage flavor, a carrot flavor, a celery flavor, mushroom flavor, and a tomato flavor.

Generally any flavoring agent or food additive, such as those described in "Chemicals Used in Food Processing", Publication No 1274, pages 63-258, by the National Academy of Sciences, can be used. This publication is incorporated herein by reference.

As used herein, a "flavoring agent" or "flavorant" herein refers to a compound or an ingestibly acceptable salt or solvate thereof that induces a flavor or taste in an animal or a human. The flavoring agent can be natural, semi-synthetic, or synthetic. Suitable flavorants and flavoring agents additives for use in the compositions of the present application include, but are not limited to, vanillin, vanilla extract, mango extract, cinnamon, citrus, coconut, ginger, viridiflorol, almond, bay, thyme, cedar leaf, nutmeg, allspice, sage, mace, menthol (including menthol without mint), an essential oil, such as an oil produced from a plant or a fruit, such as peppermint oil, spearmint oil, other mint oils, clove oil, cinnamon oil, oil of wintergreen, or an oil of almonds; a plant extract, fruit extract or fruit essence from grape skin extract, grape seed extract, apple, banana, watermelon, pear, peach, grape, strawberry, raspberry, cherry, plum, pineapple, apricot, a flavoring agent comprising a citrus flavor, such as an extract, essence, or oil of lemon, lime, orange, tangerine, grapefruit, citron, kumquat, or combinations thereof. Flavorants for use in the present application include both natural and synthetic substances which are safe for humans or animals when used in a generally accepted range.

Non-limiting examples of proprietary flavorants include Dohler™ Natural Flavoring Sweetness Enhancer K14323 (Dohler™, Darmstadt, Germany), Symrise™ Natural Flavor Mask for Sweeteners 161453 and 164126 (Symrise™, Holzminden, Germany), Natural Advantage™ Bitterness Blockers 1, 2, 9 and 10 (Natural Advantage™, Freehold, N.J., U.S.A.), and Sucramask™ (Creative Research Management, Stockton, Calif., U.S.A.).

In the any of the embodiments described in the present application, the flavoring agent is present in the composition of the present application in an amount effective to provide a final concentration of about 0.1 ppm, 0.5 ppm, I ppm, 2 ppm, 5 ppm, 10 ppm, 15 ppm, 20 ppm, 25 ppm, 30 ppm, 35 ppm, 40 ppm, 45 ppm, 50 ppm, 55 ppm, 60 ppm, 65 ppm, 70 ppm, 75 ppm, 80 ppm, 85 ppm, 90 ppm, 100 ppm, 110 ppm, 120 ppm, 130 ppm, 140 ppm, 150 ppm, 160 ppm, 170 ppm, 180 ppm, 190 ppm, 200 ppm, 220 ppm, 240 ppm, 260 ppm, 280 ppm, 300 ppm, 320 ppm, 340 ppm, 360 ppm, 380 ppm, 400 ppm, 425 ppm, 450 ppm, 475 ppm, 500 ppm, 550 ppm, 600 ppm, 650 ppm, 700 ppm, 750 ppm, 800 ppm, 850 ppm, 900 ppm, 950 ppm, 1000 ppm, 1500 ppm, 2000 ppm, 2500 ppm, 3000 ppm, 3500 ppm, 4000 ppm, 4500 ppm, 5000 ppm, 6000 ppm, 7000 ppm, 8000 ppm, 9000 ppm, 10,000 ppm, 11,000 ppm, 12,000 ppm, 13,000 ppm, 14,000 ppm, or 15,000 ppm; or to provide a final concentration corresponding to any one of the aforementioned values in this paragraph; or to provide a final concentration range corresponding to any pair of the aforementioned values in this paragraph.

In more particular embodiments, the flavoring agent is present in the composition of the present application in an amount effective to provide a final concentration ranging from 10 ppm to 1000 ppm, from 50 ppm to 900 ppm, from 50 ppm to 600 ppm, from 50 ppm to 500 ppm, from 50 ppm to 400 ppm, from 50 ppm to 300 ppm, from 50 ppm to 200 ppm, from 75 ppm to 600 ppm, from 75 ppm to 500 ppm, from 75 ppm to 400 ppm, from 75 ppm to 300 ppm, from 75 ppm to 200 ppm, from 75 ppm to 100 ppm, from 100 ppm to 600 ppm, from 100 ppm to 500 ppm, from 100 ppm to 400 ppm, from 100 ppm to 300 ppm, from 100 ppm to 200 ppm, from 125 ppm to 600 ppm, from 125 ppm to 500 ppm, from 125 ppm to 400 ppm, from 125 ppm to 300 ppm, from 125 ppm to 200 ppm, from 150 ppm to 600 ppm, from 150 ppm to 500 ppm, from 150 ppm to 500 ppm, from 150 ppm to 400 ppm, from 150 ppm to 300 ppm, from 150 ppm to 200 ppm, from 200 ppm to 600 ppm, from 200 ppm to 500 ppm, from 200 ppm to 400 ppm, from 200 ppm to 300 ppm, from 300 ppm to 600 ppm, from 300 ppm to 500 ppm, from 300 ppm to 400 ppm, from 400 ppm to 600 ppm, from 500 ppm to 600 ppm; or to provide a final concentration corresponding to any one of the aforementioned values in this paragraph; or to provide a final concentration range corresponding to any pair of the aforementioned values in this paragraph.

E. Maillard Reaction Conditions

Maillard reaction conditions are affected by temperature, pressure, pH, reaction times, ratio of different reactants, type of solvent(s) and solvents-to-reactants ratio. Accordingly, in certain embodiments, the reaction mixture may include a pH regulator, which can be an acid or a base. Suitable base regulators include, for example, sodium hydroxide, potassium hydroxide, baking powder, baking soda any useable food grade base salts including alkaline amino acids. Additionally, the Maillard reaction can be conducted in the presence of alkalinic amino acids without the need of an additional base where the alkaline amino acid serves as the base itself. The pH of the reaction mixture can be maintained at any pH suitable for the Maillard reaction. In certain embodiments, the pH is maintained at a pH of from about 2 to about 14, from about 2 to about 7, from about 3 to about 9, from about 4 to about 6, from about 7 to about 14, from about 8 to about 10, from about 9 to about 11, from about 10 to about 12, or any pH range derived from these integer values. In certain embodiments, the reaction mixture contains less than 95 wt %, less than 90 wt %, less than 80 wt %, less than 70 wt %, less than 60 wt %, less than 50 wt less than 40 wt %, less than 30 wt %, less than 20 wt %, less than 15 wt or less than 10 wt % or less than 5 wt %, less than 1 wt % solvent.

In any of the embodiments described in the present application, the reaction temperature in any of the MRP reaction mixtures described in the present application may be 0° C., 5° C., 10° C., 20° C., 25° C., 30° C., 35° C., 40° C., 50° C., 55° C., 60° C., 65° C., 70° C., 80° C., 90° C., 100° C., 110° C., 120° C., 125° C., 130° C., 135° C., 140° C., 150° C., 155° C., 160° C., 165° C., 170° C., 180° C., 190° C., 200° C., 210° C., 220° C., 225° C., 230° C., 235° C., 240° C., 250° C., 255° C., 260° C., 265° C., 270° C., 280° C., 290° C., 300° C., 400° C., 500° C., 600° C., 700° C., 800° C., 900° C., 1000° C., or any temperature range defined by any two temperature values in this paragraph.

In more particular embodiments, the reaction temperature in any of the MRP reaction mixtures described in the present application may range from 0° C. to 1000° C., 10° C. to 300° C., from 15° C. to 250° C., from 20° C. to 250° C., from 40° C. to 250° C., from 60° C. to 250° C., from 80° C. to 250° C., from 100° C. to 250° C., from 120° C. to 250° C., from 140° C. to 250° C., from 160° C. to 250° C., from 180° C. to 250° C., from 200° C. to 250° C., from 2.20° C. to 250° C., from 240° C. to 250° C., from 30° C. to 225° C., from 50° C. to 225° C., from 70° C. to 225° C., from 90° C. to 225° C., from 110° C. to 225° C., from 130° C. to 225° C., from 150° C. to 225° C., from 170° C. to 225° C., from 190° C. to 225° C., from 210° C. to 225° C., from 80° C. to 200° C., from 100° C. to 200° C., from 120° C. to 200° C., from 140° C. to 200° C., from 140° C. to 200° C., from 160° C. to 200° C., from 180° C. to 200° C., from 90° C. to 180° C., from 100° C. to 180° C., from 110° C. to 180° C., from 120° C. to 180° C., from 130° C. to 180° C., from 140° C. to 180° C., from 150° C. to 180° C., from 160° C. to 180° C., from 80° C. to 160° C., from 90° C. to 160° C., from 100° C. to 160° C., from 110° C. to 160° C., from 120° C. to 160° C., from 130° C. to 160° C., from 140° C. to 160° C., from 150° C. to 160° C., from 80° C. to 140° C., from 90° C. to 140° C., from 100° C. to 140° C., from 110° C. to 140° C., from 120° C. to 140° C., from 130° C. to 140° C., from 80° C. to 120° C., from 85° C. to 120° C., from 90° C. to 120° C., from 95° C. to 120° C., from 100° C. to 120° C., from 110° C. to 120° C., from 115° C. to 120° C., from 80° C. to 100° C., from 85° C. to 100° C., from 90° C. to 100° C., from 95° C. to 100° C.; or any aforementioned temperature value in this paragraph, or a temperature range defined by any pair of the aforementioned temperature values in this paragraph.

Maillard reaction(s) can be conducted either under open or sealed conditions. The reaction time is generally from a few seconds to about 100 hours, more particularly from about a few minutes to about 24 hours, from about a few minutes to about 12 hours, from about a few minutes to about 8 hours, from a few minutes to about 5 hours, from about 10 minutes to about 1 hour, from about 20 minutes to about 40 minutes, from about 1 hour to about 3 hours, from about 2 hours to about 4 hours, or any time range thereof. Depending on the desired taste, the reaction can be terminated at any time. The Maillard reaction mixture can contain unreacted reactants, degraded substances from the reactants, pH regulator(s), and/or salt(s).

The Maillard reactions can be conducted at atmospheric pressure or under pressure. When conducted under pressure, the reaction mixture may be subjected to constant pressure or it may be subjected to varying pressures over time. In certain embodiments, the pressure in the reaction vessel is at least 10 MPa, at least 20 MPa, at least 30 MPa, at least 40 MPa, at least 50 MPa, at least 75 MPa, at least 100 MPa, at least 150 MPa, at least 200 MPa, at least 250 MPa, at least 300 MPa, at least 400 MPa, at least 500 MPa, at least 600 MPa, at least 700 MPa, at least 800 MPa, and any pressure range derived from the aforementioned pressure values.

In some embodiments, it is desirable to suppress the Maillard reaction, in part. This can be achieved by exercising one or more of the following approaches, including the use of raw materials that are not susceptible to browning, adjusting the factors affecting the browning velocity of Maillard reaction, lowering the temperature, lowering pH, adjusting water activity, increasing the level of oxygen, using oxidant, introducing enzymes, etc.

In certain embodiments, the use of low solubility- or insoluble amino acids in the Maillard reaction may result in insoluble reactants present in the final MRP composition. In such cases, filtration may be used to remove any insoluble components present in the MRP compositions.

F. Reactant Contents and Reaction Products

In the embodiments of the present application, any one of the high intensity natural sweetening agents described herein, such as steviol, stevioside, steviolbioside, rebaudioside A, rebaudioside B, rebaudioside C, rebaudioside D, rebaudioside E, rebaudioside F, rebaudioside M, rebaudioside O, rebaudioside H, rebaudioside I, rebaudioside L, rebaudioside N, rebaudioside K, rebaudioside J, rubusoside, and dulcoside A, mogrosides, glycosylated mogrosides, GSGs, SGs, rubusosides, glycosylated rubusosides, suaviosides, glycosylated suaviosides, sweet tea extracts, glycosylated sweet tea extracts, as well as those included in Table A; high intensity synthetic sweetening agents described herein; any one of the sweetener enhancers described herein; any one of the reducing sugars described herein; any one of the sweetening agents described herein; any one of the non-reducing sugars described herein; and any one of the amine donors described herein; may be present, individually or collectively in the Maillard reaction, the MRP composition or compositions described herein in an amount of 1 wt %; 2 wt %, 3 wt %, 4 wt %, 5 wt %, 6 wt %, 7 wt %, 8 wt %. 9 wt %, 10 wt %, 11 wt %, 12 wt %, 13 wt %, 14 wt %, 15 wt %, 16 wt %, 17 wt %, 18 wt %, 19 wt %, 20 wt %, 21 wt %, 22 wt %, 23 wt %, 24 wt %, 25%, 26 wt %, 27 wt %, 28 wt %, 29 wt %, 30 wt %, 31 wt %, 32 wt %, 33 wt %, 34 wt %, 15 wt %, 16 wt %, 17 wt %, 18 wt %, 39 wt %, 40 wt %, 41 wt %, 42 wt %, 43 wt %, 44 wt %, 45 wt %, 46 wt %, 47 wt %, 48 wt %, 49 wt %, 50 wt %, 51 wt %, 52 wt %, 53 wt %, 54 wt %, 55 wt %, 56 wt %, 57 wt %, 58 wt %, 59 wt %, 60 wt %, 61 wt %, 62%, 63%, 64 wt %, 65 wt %, 66 wt %, 67 wt %, 68 wt %, 69 wt %, 70 wt %, 71 wt %, 72 wt %, 73 wt %, 74 wt %, 75 wt %, 76 wt %, 77 wt %, 78 wt %, 79 wt %, 80 wt %, 81 wt %, 82 wt %, 83 wt %, 84 wt %, 85 wt %, 86 wt %, 87 wt %, 88 wt %, 89 wt %, 90 wt %, 91 wt %, 92 wt %, 93 wt %, 94 wt %, 95 wt %, 96 wt %, 97 wt %, 98 wt %, 99 wt %, or 100 wt % and all ranges between 1 and 100 wt %, for example less than about 70 wt %, less than about 50 wt %, from about 1 wt % to about 99 wt %, from about 1 wt % to about 98 wt %, from about 1 wt % to about 97 wt %, from about 1 wt % to about 95 wt %, from about 1 wt % to about 90 wt %, from about 1 wt % to about 80 wt %; from about 1 wt % to about 70 wt %, from about 1 wt % to about 60 wt %, from about 1 wt % to about 50 wt %, from about 1 wt % to about 40 wt %, from about 1 wt % to about 30 wt %, from about 1 wt % to about 20 wt %, from about 1 wt % to about 10 wt %, from about 1 wt % to about 5 wt %, from about 2 wt % to about 99 wt %, from about 2 wt % to about 98 wt %, from about 2 wt % to about 97 wt %, from about 2 wt to about 95 wt %, from about 2 wt % to about 90 wt % from about 2 wt % to about 80 wt % from about 2 wt % to about 70 wt %, from about 2 wt % to about 60 wt %, from about 2 wt % to about 50 wt %, from about 2 wt % to about 40 wt %, from about 2 wt % to about 30 wt %, from about 2 wt % to about 20 wt %, from about 2 wt % to about 10 wt %, from about 2 wt % to about 5 wt %, from about 3 wt % to about 99 wt %, from about 3 wt % to about 98 wt %, from about 3 wt % to about 97 wt %, from about 3 wt % to about 95 wt %, from about 3 wt % to about 90 wt %, from about 3 wt % to about 80 wt %, from about 3 wt % to about 70 wt %, from about 3 wt % to about 60 wt %, from about 3 wt % to about 50 wt %, from about 3 wt % to about 40 wt %, from about 3 wt % to about 30 wt %, from about 3 wt % to about 20 wt %, from about 3 wt % to about 10 wt %, from about 3 wt % to about 5 wt %, from about 5 wt % to about 99 wt %, from about 5 wt % to about 98 wt %, from about 5 wt % to about 97 wt %, from about 5 wt % to about 95 wt %, from about 5 wt % to about 90 wt %, from about 5 wt % to about 80 wt %, from about 5 wt % to about 70 wt %, from about 5 wt % to about 60 wt %, from about 5 wt % to about 50 wt %, from about 5 wt % to about 40 wt %, from about 5 wt % to about 30 wt %, from about 5 wt % to about 20 wt % from about 5 wt % to about 10 wt %, from about 10 wt % to about 99 wt %, from about 10 wt % to about 98 wt %, from about 10 wt % to about 97 wt %, from about 10 wt % to about 95 wt %, from about 10 wt % to about 90 wt %, from about 10 wt % to about 80 wt %, from about 10 wt % to about 70 wt %, from about 10 wt % to about 60 wt %, from about 10 wt % to about 50 wt %, from about 10 wt % to about 40 wt %, from about 10 wt % to about 30 wt %, from about 10 wt %, 0 to about 20%, from about 20 to less than about 50 wt %, from about 30 wt % to about 50 wt %, from about 40 to about 50 percentage by weight, and from about 20 to 45 percentage by weight of the sweetening agent composition.

In a particular embodiment, where the Maillard reaction (MR) reactants are limited to a high intensity natural sweetening agent in combination with one or more amino donors, such as one or more amino acids, the ratio of the high intensity natural sweetening agent to the one or more amino acids may be between 99:1 and 85:15, between 95:5 and 90:10, between 90:10 and 85:15, or any ratio or any range derived from any of the aforementioned ratios. Further among these embodiments, where two amino donors or two amino acids are used in the Maillard reaction, the ratio of the amino donors or amino acids to one another may range between 5:1 and 1:5, between 4:1 and 1:4, between 3:1 and 1:3, between 2:1 and 1:2, or any ratio or any range derived from any of the aforementioned ratios.

In one aspect, in an exemplary composition having two different components, the components can have ratios of from 1:99, 2:98, 3:97, 4:96, 5:95, 6:94, 7:93, 8:92, 9:91, 10:90, 11:89, 12:88, 13:87, 14:86, 15:85, 16:84, 17:83, 18:82, 19:81, 20:80, 21:79, 22:78, 23:77, 24:76, 25:75, 26:74, 27:73, 28:72, 29:71, 30:70, 31:69, 32:68, 33:67, 34:66, 35:65, 36:64, 37:63, 38:62, 39:61, 40:60, 41:59, 42:58, 43:57, 44:56, 45:55, 46:54, 47:53, 48:52, 49:51 and 50:50, and all ranges therebetween wherein the ratios are from 1:99 and vice versa, e.g., a ratio of from 1:99 to 50:50, from 30:70 to 42:58, etc.

It should be understood that the different components can be sweeteners, non-nutritive sweeteners, individual components of sweeteners, such as RA, RB, RD, RM, etc., components of *Stevia* extracts, components of mogroside extracts, etc.

Generally in the compositions described herein, there is an excess of Maillard reaction product(s) so if there is a sweetener or sweetener enhancer present, it is present in a lesser amount by weight in comparison to the Maillard reaction product(s). Ratios of Maillard reaction product(s) to sweetener enhancer(s) may range from e.g., 100:1 to 1:100 with all ratios therebetween, including for example 10:1, 20:1, 30:1, 40:1, 50:1, 60:1, 70:1, 80:1, 90:1 and including integer values there between, including for example, 2:1, 3:1, 4:1, 5:1, 6:1,7:1, 8:1, 9:1, 11:1, 12:1, etc. Alternatively, the ratios are from 1:10, 1:20, 1:30, 1:40, 1:50, 1:60, 1:70, 1:80, 1:90 and including integer values there between, including for example, 1:2, 1:3, 1:4, 1:5, 1:6, 1:7, 1:8, 1:9, 1:11, 1:12, etc.

In another aspect, in an exemplary MRP composition having three different components, e.g., SGs, the components can have ratios of from 1:1:98, 1:2:97, 1:3:96, 1:4:95, 1:5:94, 1:6:93, 1:7:92, 1:8:91, 1:9:90, 1:10:89, 1:11:88, 1:12:87, 1:13:86, 1:14:85, 1:15:84, 1:16:83, 1:17:82, 1:18:81, 1:19:80, 1:20:79, 1:21:78, 1:22:77, 1:23:76, 1:24:75, 1:25:74, 1:26:73, 1:27:72, 1:28:71, 1:29:70, 1:30:69, 1:31:68, 1:32:67, 2:3:95, 2:4:94, 2:5:93, 2:6:92, 2:7:91, 2:8:90, 2:9:89, 2:10:88, 2:11:87, 2:12:86, 2:13:85, 2:14:84, 2:15:83, 2:16:82, 2:17:81, 2:18:80, 2:19:79, 2:20:78, 2:21:77, 2:22:76, 2:23:75, 2:24:74, 2:25:73, 2:26:72, 2:27:71, 2:28:70, 2:29:69, 2:30:68, 2:31:67, 2:32:66, 2:3:95, 3:3:94, 3:4:93, 3:5:92, 3:6:91, 3:7:90, 3:8:89, 3:9:88, 3:10:87, 3:11:86, 3:12:85, 3:13:84, 3:14:83, 3:15:82, 3:16:81, 2:17:80, 3:18:79, 3:19:78, 3:20:77, 3:21:76, 3:22:75, 3:23:74, 3:24:73, 3:25:72, 3:26:71, 3:27:70, 3:28:69, 3:29:68, 3:30:67, 3:31:66, 3:32:65, 4:4:92, 4:5:91, 4:6:90, 4:7:89, 4:8:88, 4:9:87, 4:10:86, 4:11:85, 4:12:84, 4:13:83, 4:14:82, 4:15:81, 4:16:80, 4:17:79, 4:18:78, 4:19:77, 4:20:76, 4:21:75, 4:22:74, 4:23:73, 4:24:72, 4:25:71, 4:26:70, 4:27:69, 4:28:68, 4:29:67, 4:30:66, 4:31:65, 4:32:64, 5:5:90, 5:6:89, 5:7:88, 5:8:87, 5:9:86, 5:10:85, 5:11:84, 5:12:83, 5:13:82, 5:14:81, 5:15:80, 5:16:79, 5:17:78, 5:18:77, 5:19:76, 5:20:75, 5:21:74, 5:22:73, 5:23:72, 5:24:71, 5:25:70, 5:26:69, 5:27:68, 5:28:67, 5:29:66, 5:30:65, 5:31:64, 5:32:63, 6:6:88, 6:7:87, 6:8:86, 6:9:85, 6:10:84, 6:11:83, 6:12:82, 6:13:81, 6:14:80, 6:15:79, 6:16:78, 6:17:77, 6:18:76, 6:19:75, 6:20:74, 6:21:73, 6:22:72, 6:23:71, 6:24:70, 6:25:69, 6:26:68, 6:27:67, 6:28:66, 6:29:65, 6:30:64, 6:31:63, 6:32:62, 7:7:86, 7:8:85, 7:9:84, 7:10:83, 7:11:82, 7:12:81, 7:13:80, 7:14:79, 7:15:78, 7:16:77, 717:76, 7:18:75, 7:19:74, 7:20:73, 7:21:72, 7:22:71, 7:23:70, 7:24:69, 7:25:68, 7:26:67, 7:27:66, 7:28:65, 7:29:64, 7:30:63, 7:31:62, 7:32:61, 8:8:84, 8:9:83, 8:10:82, 8:11:81, 8:12:80, 8:13:79, 8:14:78, 8:15:77, 8:16:76, 8:17:75, 8:18:74, 8:19:73, 8:20:72, 8:21:71, 8:22:70, 8:23:69, 8:24:68, 8:25:67, 8:26:66, 8:27:65, 8:28:64, 8:29:63, 8:30:62, 8:31:61, 8:32:60, 9:9:82, 9:10:81, 9:11:80, 9:12:79, 9:13:78, 9:14:77, 9:15:76, 9:16:75, 9:17:74, 9:18:73, 9:19:72, 9:20:71, 9:21:70, 9:22:69, 9:23:68, 9:24:67, 9:25:66, 9:26:65, 9:27:64, 9:28:63, 9:29:62, 9:30:61, 9:31:60, 9:32:59, 10:10:80, 10:11:79, 10:12:78, 10:13:77, 10:14:76, 10:15:75, 10:16:74, 10:17:73, 10:18:72, 10:19:71, 10:20:70, 10:21:69, 10:22:68, 10:23:67, 10:24:66, 10:25:65, 10:26:64, 10:27:63, 10:28:62, 10:29:61, 10:30:60, 10:31:59, 10:32:58, 11:11:78, 11:12:77, 11:13:76, 11:14:75, 11:15:74, 11:16:73, 11:17:72, 11:18:71, 11:19:70, 11:20:69, 11:21:68, 11:22:67, 11:23:66, 11:24:65, 11:25:64, 11:26:63, 11:27:62, 11:28:61, 11:29:60, 11:30:59, 11:31:58, 11:32:57, 12:12:76, 12:13:75, 12:14:74, 12:15:73, 12:16:72, 12:17:71, 12:18:70, 12:19:69, 12:20:68, 12:21:67, 12:22:66, 12:23:65, 12:24:64, 12:25:63, 12:26:62, 12:27:61, 12:28:60, 12:29:59, 12:30:58, 12:31:57, 12:32:56, 13:13:74, 13:14:73, 13:15:72, 13:16:71, 13:17:70, 13:18:69, 13:19:68, 13:20:67, 13:21:66, 13:22:65, 13:23:64, 13:24:63, 13:25:62, 13:26:61, 13:27:60, 13:28:59, 13:29:58, 13:30:57, 13:31:56, 13:32:55, 14:14:72, 14:15:71, 14:16:70, 14:17:69, 14:18:68, 14:19:67, 14:20:66, 14:21:65, 14:22:64, 14:23:63, 14:24:62, 14:25:61, 14:26:60, 14:27:59, 14:28:58, 14:29:57, 14:30:56, 14:31:55, 14:32:54, 15:15:70, 15:16:69, 15:17:68, 15:18:67, 15:19:66, 15:20:65, 15:21:64, 15:22:63, 15:23:62, 15:24:61, 15:25:60, 15:26:59, 15:27:58, 17:28:57, 15:29:56, 15:30:55, 15:31:54, 15:32:53, 16:16:68, 16:17:67, 16:18:66, 16:19:65, 16:20:64, 16:21:63, 16:22:62, 16:23:61, 16:24:60, 16:25:59, 16:26:58, 16:27:57, 16:28:56, 16:29:55, 16:30:54, 16:31:53, 16:32:52, 17:17:66, 17:18:65, 17:19:64, 17:20:63, 17:21:62, 17:22:61, 17:23:60, 17:24:59, 17:25:58, 17:26:57, 17:27:56, 17:28:55, 17:29:54, 17:30:53, 17:31:52, 17:32:51, 18:18:64, 18:19:63, 18:20:62, 18:21:61, 18:22:60, 18:23:59, 18:24:58, 18:25:57, 18:26:56, 18:27:55, 18:28:54, 18:29:53, 18:30:52, 18:31:51, 18:32:50, 19:19:62, 19:20:61, 19:21:60, 19:22:59, 19:23:58, 19:24:57, 19:25:56, 19:26:55, 19:27:54, 19:28:53, 19:29:52, 19:30:51, 19:31:50, 19:32:49, 20:20:60, 20:21:59, 20:22:58, 20:23:57, 20:24:56, 20:25:55, 20:26:54, 20:27:53, 20:28:52, 20:29:51, 20:30:50, 20:31:49, 20:32:48, 21:21:58, 21:22:57, 21:23:56, 21:24:55, 21:25:54, 21:26:53, 21:27:52, 21:28:51, 21:29:50, 21:30:49, 21:31:48, 21:32:47, 22:22:56, 22:23:55, 22:24:54, 22:25:53, 22:26:52, 22:27:51, 22:28:50, 22:29:49, 22:30:48, 22:31:47, 22:32:46, 23:23:54, 23:24:53, 23:25:52, 23:26:51, 23:27:50, 23:28:49, 23:29:48, 23:30:47, 23:31:46, 23:32:45, 24:24:52, 24:25:51, 24:26:50, 24:27:49, 24:28:48, 24:29:47, 24:30:46, 24:31:45, 24:32:44, 25:25:50, 25:26:49, 25:27:48, 25:28:47, 25:29:46, 25:30:45, 25:31:44, 25:32:43, 26:26:48, 26:27:47, 26:28:46, 26:29:45, 26:30:44, 26:31:43, 26:32:42, 27:27:46, 27:28:45, 27:29:44, 27:30:43, 27:31:42, 27:32:41, 28:28:44, 28:29:43, 28:30:42, 28:31:41, 28:32:40, 29:29:42, 29:30:41, 29:31:40, 29:32:39, 30:30:40, 30:31:39, 30:32:38, 31:31:38, 31:32:37, 32:32:36, 32:33:35, and 33.3:33.3:33.3, and all ranges therebetween wherein the ratios are from 1:1:98 and vice versa, e.g., a ratio of from 1:1:98 to 33.3:33.333.3, from 10:30:70 to 15:40:45, etc.

It should be understood that the different components can be sweeteners, non-nutritive sweeteners, individual components of sweeteners, such as RA, RB, RD, RM, etc., components of *Stevia* extracts, components of mogroside extracts, etc.

It should be noted that the present disclosure is not limited to compositions having only two or three different components, e.g., SGs, MGs, GSGs, GMGs, non-nutritive sweeteners, etc. herein, and that the exemplary ratios are non-limiting. Rather, the same formula can be followed for establishing ratios of as many different components as are contained within a given composition. As a further example, in a composition that comprises 20 different components described herein, the components can have ratios of from 1:1:1:1:1:1:1:1:1:1:1:1:1:1:1:1:1:1:1:81 to 5:5:5:5:5:5:5:5:5:5:5:5:5:5:5:5:5:5:5:5, and all possible combinations of ratios therebetween. In some embodiments, a composition of the present disclosure may have up to and including a combination of all compounds, for example but not limited to, those in Table 2.

In any of the embodiments described in the present application, one or more components may be added before, during, or after the Millard reaction to a composition or product, or may be added to an MRP composition, or may be added to a consumable product, such as beverage product or food product, wherein any one of the components is present in any of the aforementioned composition(s) or product(s) at a parts-per-million (ppm) basis (or concentration) relative to the other contents in a composition or product, wherein the one or more components are selected from any one of the high intensity natural sweeteners described herein; any one of the high intensity synthetic sweeteners described herein; any one of the sweetener enhancers described herein; any one of the reducing sugars described herein; any one of the sweetening agents described herein; any one of the non-reducing sugars described herein; any one of the amine donors described herein; any one of the flavor substances described herein, or any of the additional additives described herein, such that any one of these component(s) is present in a reaction mixture, composition or consumable product at a final concentration of about 0.0001 ppm, 0.001 ppm, 0.01 ppm, 0.1 ppm, 1 ppm, 2 ppm, 5 ppm, 10 ppm, 15 ppm, 20 ppm, 25 ppm, 30 ppm, 35 ppm, 40 ppm, 45 ppm, 50 ppm, 55 ppm, 60 ppm, 65 ppm, 70 ppm, 75 ppm, 80 ppm, 85 ppm, 90 ppm, 100 ppm, 110 ppm, 120, ppm, 130 ppm, 140 ppm, 150 ppm, 160 ppm, 170 ppm, 180 ppm, 190 ppm, 200 ppm, 220 ppm, 240 ppm, 260 ppm, 280 ppm, 300 ppm, 320 ppm, 340 ppm, 360 ppm 380 ppm, 400 ppm, 420 ppm, 440 ppm, 460 ppm, 480 ppm, 500 ppm, 525 ppm, 550 ppm, 575 ppm, 600 ppm, 625 ppm, 650 ppm, 675 ppm, 700 ppm, 72.5 ppm, 750 ppm, 775 ppm, 800 ppm, 825 ppm, 850 ppm, 875 ppm, 900 ppm, 925 ppm, 950 ppm, 975 ppm, 1,000 ppm, 1,200 ppm, 1,400 ppm, 1,600 ppm, 1,800 ppm, 2,000 ppm, 2,200 ppm, 2,400 ppm, 2,600 ppm, 2,800 ppm, 3,000 ppm, 3,200 ppm, 3,400 ppm, 3,600 ppm, 3,800 ppm, 4,000 ppm, 4,200 ppm, 4,400 ppm, 4,600 ppm, 4,800 ppm, 5,000 ppm, 5,500 ppm, 6,000 ppm, 6,500 ppm, 7,000 ppm, 7,500 ppm, 8,000 ppm, 8,500 ppm, 9,000 ppm, 9,500 ppm, 10,000 ppm, 11,000 ppm, 12,000 ppm, 13000 ppm, 14,000 ppm, 15,000 ppm, or a range defined by any pair of the aforementioned concentration values in this paragraph.

In any of the embodiments described in the present application, one or more components may be added before, during, or after the Mail lard reaction to a composition or product, or may be added to an MRP composition, or may be added to a consumable product, such as beverage product or food product, wherein any one of the components is present in any of the aforementioned composition(s) or product(s) at a parts-per-million (ppm) basis (or concentration) relative to the other contents in a composition or product, wherein the one or more components are selected from any one of the high intensity natural sweeteners described herein; any one of the high intensity synthetic sweeteners described herein; any one of the sweetener enhancers described herein; any one of the reducing sugars described herein; any one of the sweetening agents described herein; any one of the non-reducing sugars described herein; any one of the amine donors described herein; any one of the flavor substances described herein, or any of the additional additives described herein, such that any one of these component(s) is present in a reaction mixture, composition or consumable product at a final concentration from about 1 ppm to 15,000 ppm, from 1 ppm to 10,000 ppm, from 1 ppm to 5,000 ppm, from 10 ppm to 1,000 ppm, from 50 ppm to 900 ppm, from 50 ppm to 600 ppm, from 50 ppm to 500 ppm, from 50 ppm to 400 ppm, from 50 ppm to 300 ppm, from 50 ppm to 200 ppm, from 100 ppm to 600 ppm, from 100 ppm to 500 ppm, from 100 ppm to 400 ppm, from 100 ppm to 300 ppm, from 100 ppm to 200 ppm, from 125 ppm to 600 ppm, from 125 ppm to 500 ppm, from 125 ppm to 400 ppm, from 125 ppm to 300 ppm, from 125 ppm to 200 ppm, from 150 ppm to 600 ppm, from 150 ppm to 500 ppm, from 150 ppm to 500 ppm, from 150 ppm to 400 ppm, from 150 ppm to 300 ppm, from 150 ppm to 200 ppm, from 200 ppm to 600 ppm, from 200 ppm to 500 ppm, from 200 ppm to 400 ppm, from 200 ppm to 300 ppm, from 300 ppm to 600 ppm, from 300 ppm to 500 ppm, from 300 ppm to 400 ppm, from 400 ppm to 600 ppm, from 500 ppm to 600 ppm, from 20 ppm to 200 ppm, from 20 ppm to 180 ppm, from 20 ppm to 160 ppm, from 20 ppm to 140 ppm, from 20 ppm to 120 ppm, from 20 ppm to 100 ppm, from 20 ppm to 80 ppm, from 20 ppm to 60 ppm, from 20 ppm to 40 ppm, from 40 ppm to 150 ppm, from 40 ppm to 130 ppm, from 40 ppm to 100 ppm, from 40 ppm to 90 ppm, from 40 ppm to 70 ppm, from 40 ppm to 50 ppm, from 20 ppm to 100 ppm, from 40 ppm to 100 ppm, from 50 ppm to 100 ppm, from 60 ppm to 100 ppm, from 80 ppm to 100 ppm, from 5 ppm to 100 ppm, from 5 ppm to 95 ppm, from 5 ppm to 90 ppm, from 5 ppm to 85 ppm, from 5 ppm to 80 ppm, from 5 ppm to 75 ppm, from 5 ppm to 70 ppm, from 5 ppm to 65 ppm, from 5 ppm to 60 ppm, from 5 ppm to 55 ppm, from 5 ppm to 50 ppm, from 5 ppm to 45 ppm, from 5 ppm to 40 ppm, from 5 ppm to 35 ppm, from 5 ppm to 30 ppm, from 5 ppm to 25 ppm, from 5 ppm to 20 ppm, from 5 ppm to 15 ppm, from 5 ppm to 10 ppm, any aforementioned concentration value in this paragraph, or a range defined by any pair of the aforementioned concentration values in this paragraph.

As used herein, "final concentration" refers to the concentration of, for example, any one of the aforementioned components present in any final composition or final orally consumable product (i.e., after all ingredients and/or compounds have been added to produce the composition or to produce the orally consumable product).

In some embodiments, one or more components may be added to the Maillard reaction or added to an MRP composition formed therefrom, wherein any one of the components is expressed in terms of its purity. Thus, with regard to any one of the high intensity natural sweetening agents described herein; any one of the high intensity synthetic sweetening agents described herein; any one of the sweetener enhancers described herein; any one of the reducing sugars described herein; any one of the sweetening agents described herein; any one of the non-reducing sugars described herein; and any one of the amine donors described herein; any one of the components may be characterized by a level of purity of about 50% to about 100% by weight, about 55% to about 100% by weight, about 60% to about 100% by weight, about 65% to about 100% by weight, about 70% to about 100% by weight, about 75% to about 100% by weight, about 80% to about 100% by weight, about 85% to about 100% by weight, about 86% to about 100% by weight, about 87% to about 100% by weight, about 88% to about 100% by weight, about 89% to about 100% by weight, about 90% to about 100% by weight, about 91% to about 100% by weight, about 92% to about 100% by weight, about 93% to about 100% by weight, about 94% to about 100% by weight, about 95% to about 100% by weight, about 96% to about 100% by weight, about 97% to about 100% by weight, about 98% to about 100% by weight, about 99% to about 100% by weight, or any any range defined by any two of the aforementioned values. Alternatively, the purity of the component (w/w) may be at least 50%, at least 55%, at least 60%, at least 65%, at least 70%, at least 75%, at least 80%, at least 85%, at least 86%, at least 87%, at least 88%, at least 89%, at least 90%, at least 91%, at least 92%, at least 93%, at least 94%, at least 95%, at least 96%, at least 97%, at least 98%, at least 99%, at least 99.5%, at least 99.9%, at least 100%, or any any range defined by any two of the aforementioned values.

A general method to prepare *Stevia* derived Maillard reaction product(s) is described as follows. Briefly, an SG or *Stevia* extract is dissolved with or without a sugar donor, and together with amino acid donor in water, followed by heating of the solution at an elevated temperature, for example from about 50 to about 200 degrees centigrade. The reaction time can be varied from more than one second to a few days, more generally a few hours, until Maillard reaction products (MRPs) are formed or the reaction components have been exhausted or the reaction has been completed, with or without formation of caramelization reaction products (CRPs), which are further described below. When required, a pH adjuster or pH buffer can be added to regulate the pH of the reaction mixture before, during or after reaction as father described herein. The resultant solution is dried by spray dryer or hot air oven to remove the water and to obtain the MRP(s).

Interestingly, when a reaction mixture is dried to a powder, such as by spray drying, the resultant powders only have a slight smell associated with them. This is in contrast to regular powdered flavoring agents that generally have a strong smell. The dried powdered reaction mixtures of the embodiments, when dissolved in a solvent, such as water or alcohol or mixtures thereof, release the smell. This demonstrates that the volatile substances of the Maillard reaction products can be preserved by steviol glycosides present in the reaction products and processes employing the compositions of the present application. Powders with strong odor can be obtained too, particularly where the carrier, such as Stevie extract, is much less compared with MRPs flavors or strong flavor substances are used during Maillard reaction.

The Maillard reaction is conducted with a suitable solvent. Additionally, solvents can be employed along with water. Suitable solvents approved for oral use include, for example, alcohols, such as low molecular weight alcohols, e.g., methanol, ethanol, propanol, butanol, pentanol, hexanol, ethylene glycol, propylene glycol, butyl glycol, etc. The following additional solvents may be used in the Mailiard reaction or may act as carriers for Maillard reaction products: acetone, benzyl alcohol, 1,3-butylene glycol, carbon dioxide, castor oil, citric acid esters of mono- and diglycerides, ethyl acetate, ethyl alcohol, ethyl alcohol denatured with methanol, glycerol (glycerin), glyceryl diacetate, glyceryl triacetate (triacetin), glyceryl tributyrate (tributyrin), hexane, isopropyl alcohol, methyl alcohol, methyl ethyl ketone (2-butanone), methylene chloride, monoglycerides and diglycerides, monoglyceride citrate, 1,2-propylene glycol, propylene glycol mono-esters and diesters, triethyl citrate, and mixtures thereof.

Although recognizing that other suitable solvents may be used for flavoring agents, the The International Organization of the Flavor industry (IOFI) Code of Practice (Version 1.3, dated Feb. 29, 2012) lists the following solvents as being appropriate for use in flavoring agents: acetic acid, benzyl alcohol, edible oils, ethyl alcohol, glycerol, hydrogenated vegetable oils, iso-propy alcohol, mannitol, propylene glycol, sorbitol, sorbitol syrup, water, and xylitol. Accordingly, in certain embodiments, these are preferred solvents.

In some embodiments, the Maillard reaction mixtures may further include one or more carriers (or flavor carriers) considered acceptable for use in flavoring agents are therefore suitable for use as solvents for the Maillard reaction: acetylated distarch adipate, acetylated distarch phosphate, agar agar, alginic acid, beeswax, beta-cyclodextrine, calcium carbonate, calcium silicate, calcium sulphate, candelilla wax, carboxymethyl cellulose, Na salt, carnauba wax, carrageenan, microcrystalline cellulose, dextran, dextrin, diammonium phosphate, distarch phosphate, edible fats, elemi resin, ethyl lactate, ethyl cellulose, ethyl hydroxyethyl cellulose, ethyl tartrate, gelatin, gellan gum, ghatti gum, glucose, glyceryl diacetate, glyceryl diesters of aliphatic fatty acids C6-C18, glyceryl monoesters of aliphatic fatty acids C6-C18, gyceryl triacetate (triacetin), glyceryl triesters of aliphatic fatty acids C6-C18, glyceryl tripropanoate, guar gum, gum arabic, hydrolyzed vegetable protein, hydroxyproplymethyl cellulose, hydroxypropyl cellulose, hydroxypropyl distarch phosphate, hydroxypropyl starch, karaya gum, konjac gum, lactic acid, lactose, locust bean gum (carob bean gum), magnesium carbonate, magnesium salts of fatty acids, maltodextrin, methyl cellulose, medium chain triglyceride, modified starches, such as acetylated distarch adipate, acetylated oxidized starch, acid-treated starch, alkaline treated starch, bleached starch, roasted starch dextrins, distarch phosphate, hydroxypropyl distarch phosphate, acetylated distarch phosphate, hydroxypropyl starch, monostarch phosphate, oxidized starch, phosphated distarch phosphate, starch acetate, starch sodium octenyl succinate, and enzyme treated starches; mono-, di- and tri-calcium orthophosphate, Na, K, $NH_4$ and Ca alginate, pectins, processed euchema seaweed, propylene glycol alginate, sodium chloride (salt), silicon dioxide, sodium aluminium diphosphate, sodium aluminium silicate, Sodium, potassium and calcium salts of fatty acids, starch, starch (sodium) octenyl succinate, starch acetate, sacro glycerides, sucrose, sucrose esters of fatty acids, type I and type II sucrose oligoesters, taragum, tragacanth, triethylcitrate, whey powder, and xanthan gum.

Generally, the amount of solvent is sufficient to dissolve the components or provide a heterogeneous mixture. For example, on a weight by weight basis, the amount of water to reaction products ratio is from about 100:1 to about 1:100, for example from about 6:1, 1:1 to about 1:4. Ratios for the Millard reaction components to solvent are thus from 100:1 to 1:100, e.g., 1:99 to 80:20, with all ratios there between, including for example 10:1, 20:1, 30:1, 40:1, 50:1, 60:1, 70:1, 80:1, 90:1 and including integer values there between, including for example, 2:1, 3:1, 4:1, 5:1, 6:1,7:1, 8:1, 9:1, 11:1, 12:1, etc. Alternatively, the ratios are from 1:10, 1:20, 1:30, 1:40, 1:50, 1:60, 1:70, 1:80, 1:90 and including integer values there between, including for example, 1:2, 1:3, 1:4, 1:5, 1:6, 1:7, 1:8, 1:9, 1:11, 1:12, etc.

When the reaction is completed, the product mixture does not need to be neutralized or it can be neutralized. Water and/or solvent(s) do not necessarily need to be removed but can be removed by distillation, spray drying or other known methods if the product is desired as a powder or liquid, whatever the case may be.

It should be understood that the Maillard reaction products can include one or more of the following components after the reaction has occurred. These components include, for example, remaining sweetening agent(s), remaining reducing sugar (sugar donor(s)), remaining amine donor(s), degraded sweetening agent(s); degraded sugar donor(s), degraded amine donor(s), possible salt(s) that occur naturally from the Maillard reaction process and/or added salt(s), remaining sweetener(s), degraded sweetener(s), remaining sweetener enhancer(s), degraded sweetener enhancer(s), MRP(s), CRP(s), additional MRP(s) added to the reaction product and/or additional CRP(s) added to the reaction product.

It should also be understood, for example, that the Maillard reaction can be performed such that there can be an excess of amine donor(s) in comparison to reducing sugar(s) or much less than the amount of reducing sugar present. In the first instance then the resultant Maillard reaction mixture would include remaining amine donor(s), degraded amine donor(s) and/or residue(s) or amine donor(s). Conversely, when there is less amine donor(s) present in the Maillard reaction, the amine donor(s) would be reacted during the course of the reaction. Likewise, in surprising results, where the reducing sugar is replaced with a sweetening agent (e.g., a material such as a *Stevia* extract that does not include a reactive aldehydic or ketone moiety) and subjected to amine donor(s), the amine donor(s) may be present in amounts that would be fully consumed by a Mail lard type reaction or be present in an amount that would provide excess amine donor(s) and consequently amine donor(s), amine donor residue(s) and/or amine degradation product(s) would be present in the Maillard reaction mixture.

There are many ways to control the resulting MRP. For instance, adjusting pH value, pressure, reaction time, addition of different ingredients, to optimize the ratio of raw materials etc. On top of it, the inventors found separation of MRPs products could be another method to have different types of flavor enhancers and flavors. MRPs consist of volatile substances and non-volatile substances. By evaporating the volatile substances, purified non-volatile substances can be obtained. These non-volatile substances (or products) can be used as flavor modifiers or with the top note of final products.

The volatile substances can be used as flavor or flavors enhancers, too. Partial separation of MRPs to remove partial volatile substances, further separation of volatile substances for instance by distillation etc., and non-volatile substances for instance by recrystallization, chromatograph etc. could be done to meet different targets of taste and flavor. Therefore, in this specification, MRPs include a composition including one or more volatile substances, one or more non-volatile substances or mixtures thereof. Non-volatile substances in MRPs or isolated from MRPs can provide a good mouth feel, umami and Kukumi taste.

*Stevia* extracts and MRP compositions derived therefrom contain volatile and unvolatile terpine and/or terpinoid substances that can be further purified in order to obtain substance providing a tasteful, sweet and/or aromatic profile. Treatment of *Stevia* extracts and S-MRP compositions using column chromatography, separation resins, and/or other separation methods, such as distillation, can be employed to retain most of the tasteful aroma terpine and/or terpinoid substances containing oxygen in the structure, while removing other unpleasant taste substances.

In some embodiments, a *Stevia* extract can be enriched for the presence of aromatic terpene substances containing oxygen in the structure. In particular, the inventors of the present application have found a way to enhance a citrus or tangerine taste by heat-treating a terpine- and/or terpinoid rich *Stevia* extract under acidic conditions comprising e.g, citric acid, tartaric acid, fumaric acid, lactic acid, malic acid etc., more preferably citric acid. In addition, substances such as linalool can react with citric acid with or without Maillard reaction. Vacuum distillation of fractions or column chromatography employing macroporous resins and/or silica gels, including ion exchange resins produced by Dow and Sunresin can be used for further purification.

In one embodiment, the present application provides a composition comprising a tangerine (or citrus) flavored *Stevia* extract and method for producing the same as further described in the Examples. In a particular embodiment, a method to produce a citrus flavored *Stevia* extract involves a heat process with or without Maillard reaction under acid conditions, more preferably in a Maillard reaction with citric acid.

One embodiment includes compositions comprising flavor substances from the *Stevia* plant or other natural sweetener plants described herein, including leaves, roots, seeds, etc. therefrom.

In some embodiments, vanilla, maltol or other flavor modifier product(s) "FMPs" can be added to the compositions described herein to further improve the taste. FMPs, such as maltol, ethyl-maltol, vanillin, ethyl vanillin, m-methylphenol, and m-n-propylphenol can further enhance the mouthful, sweetness and aroma of the MRP compositions described herein. Thus, in some embodiments, one or more FMPs may be added before or after the Maillard reaction, such as maltol, ethyl-maltol, vanillin, ethyl vanillin, m-methylphenol, m-n-propylphenoi, or combinations thereof. In certain embodiments, MRPs and/or sweeteners may be combined with one or more FMPs. Particular MRP/FMP combinations include MRPs and maltol; MRPs and vanillin; sweetenens) and maltol; sweetenens) and vanillin etc. Such compositions may be used in any of the food or beverage products described herein.

Production of MRPs or S-MRPs may comprise the use of any of the following methodologies, including reflux at atmospheric pressure, reaction under pressure, oven drying, vacuum oven drying, roller/drum drying, surface scraped heat exchange, and/or extrusion.

G. Taste Profiles and Taste Testing of MRP Compositions

The MRP compositions and methods described herein are useful for improved taste and aroma profiles relative to control samples and for other natural sweeteners and mixtures therefrom, including but not limited to licorice, thaumatin etc., and mixtures with steviol glycosides, mogrosides, rubusosides etc. The phrase "taste profile", which is interchangeable with "sensory profile" and "sweetness profile", may be defined as the temporal profile of all basic tastes of a sweetener. The "temporal profile" may be considered to represent the intensity of sweetness perceived over time in tasting of the composition by a human, especially a trained "taster". Carbohydrate and polyol sweeteners typically exhibit a quick onset followed by a rapid decrease in sweetness, which di sappers realtively quickly on swallowing a food or beverage containing the same. In contrast, high intensity natural sweeteners typically have a slower sweet taste onset reaching a maximal response more slowly, followed by a decline in intensity more slowly than with carbohydrate and polyol sweeteners. This decline in sweetness is often referred to as "sweetness linger" and is a major limitation associated with the use of high intensity natural sweeteners.

In the context of taste tasting, the terms "improve", "improved" and "improvement" are used interchangeably with reference to a perceived advantageous change in a composition or consumable product upon introduction of an MRP composition of the present application from the original taste profile of the composition or consumable product without the added MRP composition in any aspect, such as less bitterness, better sweetness, better sour taste, better aroma, better mouth feel, better flavor, less aftertaste, etc. Depending on the nature of the reactants, ingredients added, and dosages used in the reaction mixtures or MRP compositions described herein, the terms "improve" or "improvement" can refer to a slight change, a change, or a significant change of the original taste profile, etc., which makes the composition more palatable to an individual.

In some embodiments, the MRP compositions and methods described herein are useful for improving the taste and aroma profiles for other synthetic sweeteners, including but not limited to sucralose, ACE-K, aspartame, sodium saccharin, and mixtures thereof.

In some embodiments, the MRP compositions of the present application may be evaluated with reference to the degree of their sucrose equivalence. Accordingly, the MRP compositions of the present application may be diluted or modified with respect to its ingredients to conform with this sucrose equivalence.

The onset and decay of sweetness when an MRP composition is consumed can be perceived by trained human tasters and measured in seconds from first contact with a taster's tongue ("onset") to a cutoff point (typically 180 seconds after onset) to provide a "temporal profile of sweetness". A plurality of such human tasters is called a "sensory panel." In addition to sweetness, sensory panels can also judge the temporal profile of the other "basic tastes": bitterness, saltiness, sourness, piquance (aka spiciness), and umami (aka savoriness or meatiness). The onset and decay of bitterness when a sweetener is consumed, as perceived by trained human tasters and measured in seconds from first perceived taste to the last perceived aftertaste at the cutoff point, is called the "temporal profile of bitterness". Aromas from aroma producing substances are volatile compounds which are perceived by the odor receptor sites of the smell organ, i.e., the olfactory tissue of the nasal cavity. They reach the receptors when drawn in through the nose (orthonasal detection) and via the throat after being released by chewing (retronasal detection). The concept of aroma substances, like the concept of taste substances, is to be used loosely, since a compound might contribute to the typical odor or taste of one food, while in another food it may cause a faulty odor or taste, or both, resulting in an off-flavor. Thus, sensory profile may include evaluation of aroma as well.

The term "mouth feel" involves the physical and chemical interaction of a consumable in the mouth. More specifically, as used herein, the term "mouth feel" refers to the fullness sensation experienced in the mouth, which relates to the body and texture of the consumable such as its viscosity. Mouth feel is one of the most important organoleptic properties and the major criteria that consumers use to judge the quality and freshness of foods. Subtle changes in a food and beverage product's formulation can change mouth feel significantly. Simply taking out sugar and adding a high intensity sweetener can cause noticeable alterations in mouth feel, making a formerly good product unacceptable to consumers. Sugar not only sweetens, it also builds body and viscosity in food and beverage products, and leaves a slight coating on the tongue. For example, reducing salt levels in soup changes not only taste, but can alter mouth feel as well. Primarily it is the mouth feel that is always the compliant with non-sugar sweeteners.

The inventors have surprisingly found Maillard reaction products, commonly taken as volatile substances, can provide great mouth feel and increase consumers' acceptance of using high intensity sweeteners in food and beverage products, preferably high intensity sweetener(s) involved during the Maillard reaction. Maillard reaction products can be used individually or combined with other sweeteners, especially "sugar-free" natural or synthetic sweeteners used for foods and beverages, such as tea, milk, coffee, chocolate etc. Advantageously, when using Maillard reaction products with high intensity sweeteners such as sucralose, the inventors surprisingly found that Maillard reaction products can act as flavor modifier products to improve the taste profile of high intensity natural sweeteners, such as steviol glycosides and/or high intensity synthetic sweeteners, such as sucralose, as reflected in overall-likeability, less lingering, less astringency, less bitterness, quick upfront sweetness, umami, sensation enjoyment, fullness etc. Therefore, MRPs can be excellent flavor enhancers when blended with e.g., steviol glycosides and/or sucralose. This can extend the utility of SGs and others natural or synthetic intensive sweeteners when used in beverages, dairy products, condiments, baked goods, oral care products and other consumable products, as described herein. Depending on the desired target, Maillard reaction products can provide high or low volatile substances especially low volatile flavors to enhance the overall enjoyment of steviol glycosides, sucralose and/or other natural, synthetic intensity sweeteners. Thus, the MRPs disclosed herein can be used as mouth feel enhancers.

The phrase "sweetness detection threshold" refers to the minimum concentration at which panelists consisting of 1-10 persons are able to detect sweetness in a composition, liquid or solid. This is further defined as provided in the Examples herein and are conducted by the methods described in *Sensory Testing for Flavorings with Modifying Properties* by Christie L. Harman, John B. Hallagan, and the FEMA Science, Committee Sensory Data Task Force, November 2013, Volume 67, No. 11 and Appendix A attached thereto, the teachings of which are incorporated herein by reference.

"Threshold of sweetness" refers to a concentration of a material below which sweetness cannot be detected, but can still impart a flavor to a consumable (including water). When half of a trained panel of testers determines something is "sweet" at a given concentration, then the sample meets the threshold. When less than half of a panel of testers cannot discern sweetness at a given concentration, then concentrations of the substance below the sweetness level are considered a flavoring agent.

It should be understood that the flavoring agents described herein, including Maillard reaction products, can be used in combination with *Stevia* blends, including steviol glycosides, to encapsulate and reduce or eliminate the unwanted off taste of the *Stevia* component(s) present in the composition. There is a sequence of steps in Maillard reaction(s) that can be used to produce flavor(s). That is, there can be a first step where a first reaction takes place between a first sugar donor and a first amine donor under appropriate conditions followed by a second reaction with a second sugar donor and a second amine donor, and possible subsequent reactions to provide a complex flavorant composition that is a combination of various Maillard reaction products between, for example, the first sugar donor and first amine donor, along with the reaction between the first sugar donor and a second amine donor or a second sugar donor reacting with the first sugar donor, etc. under the Maillard reaction conditions described herein. The processes described herein can be used to preserve flavors.

For example, to dissolve any flavor or flavor combination in a dissolved steviol glycosides solution, afterwards, the solution could be ready to use, or it could be further concentrated to syrup or powder form. For evaluating the taste profile of a given MRP composition, a sample may be tested by e.g, a panel of 1-10 people. In some cases, a trained taster may independently taste the sample(s) first. The taster may be asked to describe the taste profile and score 0-5 according to the increasing sugar like, bitterness, aftertaste and lingering taste profiles. The taster may be allowed to re-taste, and then make notes for the sensory attributes perceived. Afterwards, another group of 1-10 tasters may similarly taste the sample(s), record its taste attributes and discuss the samples openly to find a suitable description. Where more than 1 taster disagrees with the results, the tasting may be repeated. For example, a "5" for sugar like is the best score for having a taste that is sugar like and conversely a value of 0 or near zero is not sugar like. Similarly, a "5" for bitterness, aftertaste and lingering is not desired. A value of zero or near zero means that the bitterness, aftertaste and/or lingering is reduced or is removed. Other taste attributes may include astringency and overall likeability.

H. Additional Additives

In some embodiments, the composition of the present application further comprises one or more additional additives. Any of the additives described herein may be added before or after the Maillard reaction, Exemplary additives include, but are not limited to, salts, flavoring agents, minerals, organic acids and inorganic acids, polyols, nucleotides, bitter compounds, astringent compounds, proteins or protein hydrolysates, surfactants, gums and waxes, antioxidants, polymers, fatty acids, vitamins, preservatives, hydration agents, dietary fiber, glucosamine, probiotics, prebiotics, weight management agents, osteoporosis management agents, phytoestrogens, and phytosterols, as further described below.

I1. Salts

The Maillard reaction mixture and MRP products can further include a salt. The salt can be added during the Maillard reaction or after the reaction is complete. Suitable salts include, for example, sodium carbonate, sodium bicarbonate, sodium chloride, potassium chloride, magnesium chloride, sodium sulfate, magnesium sulfate, potassium sulfate or mixtures thereof. Salts may form during the Maillard reaction itself from reactants or degraded reactants and be present in the Maillard reaction product(s).

The salt(s) present in the Maillard reaction mixture can be from about 0 percent by weight to about 50 percent by weight, more particularly from about 0 percent to about 15 percent by weight, even more particularly from about 0 percent to about 5 percent by weight, e.g., 0.1, 0.2, 0.5, 0.75, 1, 2, 3 or 4 percent by weight of the Maillard reaction mixture.

The Maillard reaction product(s) and reaction mixture can include a sweetener. The sweetener can be added before, during the Maillard reaction or after the reaction is completed. Suitable sweeteners include non-nutritive sweeteners, such as for example, sorbitol, xylitol, mannitol, sucralose, aspartame, acesulfame-K, neotame, erythritol, trehalose, raffinose, cellobiose, tagatose, DOLCIA PRIMA™ allulose, inulin, N—[N-[3-(3-hydroxy-4-methoxyphenyl)propyl]-alpha-aspartyl]-L-phenylalanine 1-methyl ester, glycyrrhizin, sodium cyclamate, saccharin, or mixtures thereof.

The composition of the present application can comprise one or more salts. As used herein, the term "salt" refers to salts that retain the desired chemical activity of the compositions of the present application and are safe for human or animal consumption in a generally acceptable range.

The one or more salts may be organic or inorganic salts. Nonlimiting examples of salts include sodium carbonate, sodium bicarbonate, sodium chloride, potassium chloride, magnesium chloride, sodium sulfate, magnesium sulfate, and potassium sulfate, or any edible salt, for example calcium salts, metal alkali halides, metal alkali carbonates, metal alkali bicarbonates, metal alkali phosphates, metal alkali sulfates, biphosphates, pyrophospates, triphosphates, metaphosphates, and metabisulfates.

In some embodiments, the one or more salts are salts formed with metal cations such as calcium, bismuth, barium, magnesium, aluminum, copper, cobalt, nickel, cadmium, sodium, potassium, and the like, or with a cation formed from ammonia, N,N-dibenzylethylenediamine, D-glucosamine, ethanolamine, diethanol amine, triethanolamine, N-methylglucamine tetraethylammonium, or ethylenediamine.

In some embodiments, the one or more salts are formed with inorganic acids, such as hydrochloric acid, hydrobromic acid, sulfuric acid, nitric acid, phosphoric acid, and the like; or formed with organic acids, such as acetic acid, propionic acid, hexanoic acid, cyclopentanepropionic acid, glycolic acid, pyruvic acid, lactic acid, malonic acid, succinic acid, malic acid, maleic acid, fumaric acid, tartaric acid, citric acid, benzoic acid, 3-(4-hydroxybenzoyl)benzoic acid, cinnamic acid, mandelic acid, methanesulfonic acid, ethanesulfonic acid, 1,2-ethane-disulfonic acid, 2-hydroxyethanesulfonic acid, benzenesulfonic acid, 4-chlorobenzenesulfonic acid, 2-naphthalenesulfonic acid, 4-toluenesulfonic acid, camphorsulfonic acid, 4-methylbicyclo[2.2.2]-oct-2-ene-1-carboxylic acid, glucoheptonic acid, 3-phenyipropionic acid, trimethylacetic acid, tertiary butylacetic acid, lauryl sulfuric acid, gluconic acid, glutamic acid, hydroxynaphthoic acid, salicylic acid, stearic acid and muconic acid.

In particular embodiments, non-limiting inorganic salts may be selected from the group consisting of sodium chloride, sodium carbonate, sodium bicarbonate, sodium acetate, sodium sulfide, sodium sulfate, sodium phosphate, potassium chloride, potassium citrate, potassium carbonate, potassium bicarbonate, potassium acetate, europium chloride ($EuCl_3$), gadolinium chloride ($GdCl_3$), terbium chloride ($TbCl_3$), magnesium sulfate, alum, magnesium chloride, mono-, di-, tri-basic sodium or potassium salts of phosphoric acid (e.g., inorganic phosphates), salts of hydrochloric acid (e.g., inorganic chlorides), sodium carbonate, sodium bisulfate, and sodium bicarbonate. Exemplary organic salts may be selected from the group consisting of choline chloride, alginic acid sodium salt (sodium alginate), glucoheptonic acid sodium salt, gluconic acid sodium salt (sodium gluconate), gluconic acid potassium salt (potassium gluconate), guanidine HCl, glucosamine amiloride HCl, monosodium glutamate (MSG), adenosine monophosphate salt, magnesium gluconate, potassium tartrate (monohydrate), and sodium tartrate (dihydrate).

In certain embodiments, the salt is a metal or metal alkali halide, a metal or metal alkali carbonate or bicarbonate, or a metal or metal alkali phosphate, bisphosphate, pyrophosphate, triphosphate, metaphosphate, or metabisulfate thereof. In certain particular embodiments, the salt is an inorganic salt that comprises sodium, potassium, calcium, or magnesium. In some embodiments, the salt is a sodium salt or a potassium salt.

The salt forms can be added to the sweetener compositions in the same amounts as their acid or base forms.

Alternative salts include various chloride or sulfate salts, such as sodium chloride, potassium chloride, magnesium chloride, sodium sulfate, magnesium sulfate, and potassium sulfate, or any edible salt.

In some embodiments, the one or more salts comprise one or more salts of steviol glycosides (SG salts) and/or salts of glycosylated steviol glycosides (GSG-salts). In some further embodiments, the one or more SG salts comprise a salt of RB and/or STB.

In some embodiments, the one or more salts comprise one or more amino acid salts. In some embodiments, the one or more salts comprise one or more poly-amino acid salts.

In some embodiments, the one or more salts comprise one or more sugar acid salts, including e.g., aldonic, uronic, aldaric, alginic, gluconic, glucuronic, glucaric, galactaric, galacturonic, and their salts (e.g., sodium, potassium, calcium, magnesium salts or other physiologically acceptable salts), and combinations thereof.

The one or more salts can make up anywhere from about 0.01 wt. % to about 30 wt. % of the composition of the present application, specifically about 0.01 wt. %, about 0.02 wt. %, about 0.03 wt. %, about 0.04 wt. %, about 0.05 wt. about 0.06 wt. %, about 0.07 wt. %, about 0.08 wt. %, about 0.09 wt. %, 0.1 wt. %, about 0.2 wt. %, about 0.3 wt. %, about 0.4 wt. %, about 0.5 wt. %, about 0.6 wt. %, about 0.7 wt. %, about 0.8 wt. %, about 0.9 wt. about 1 wt. %, about 2 wt. %, about 3 wt. %, about 4 wt. %, about 5 wt. %, about 6 wt. ° o, about 7 wt. %, about 8 wt. %, about 9 wt. %, about 10 wt. %, about 11 wt. %, about 12 wt. %, about 13 wt. %, about 14 wt. %, about 15 wt. %, about 16 wt. %, about 17 wt. %, about 18 wt. %, about 19 wt. %, about 20 wt. %, about 21 wt. %, about 22 wt. %, about 23 wt. %, about 24 wt. %, about 25 wt. %, about 26 wt. %, about 27 wt. %, about 28 wt. %, about 29 wt. %, about 30 wt. %, about 31 wt. %, about 32 wt. %, about 33 wt. %, about 34 wt. %, about 35 wt. %, about 36 wt. %, about 37 wt. %, about 38 wt. %, about 39 wt. %, about 40 wt. %, about 41 wt. %, about 42 wt. %, about 43 wt. %, about 44 wt. %, about 45 wt. %, about 46 wt. %, about 47 wt. %, about 48 wt. about 49 wt. %, about 50 wt. %, and all ranges there between, including for example from about 0.01 wt % to about 10 wt %, about 0.03 wt % to about 10 wt %, about 0.05 wt % to about 10 wt %, about 0.07 wt % to about 10 wt ° o, about 0.1 wt % to about 10 wt %, about 0.3 wt % to about 10 wt %, about 0.5 wt % to about 10 wt %, about 0.7 wt % to about 10 wt %, about 1 wt % to about 10 wt %, about 3 wt % to about 10 wt %, about 5 wt % to about 10 wt %, about 7 wt % to about 10 wt %, about 0.01 wt % to about 3 wt %, about 0.03 wt %, to about 3 wt %, about 0.05 wt % to about 3 wt %, about 0.07 wt % to about 3%, about 0.1 wt % to about 3 wt %, about 0.3 wt % to about 3 wt %, about 0.5 wt % to about 3 wt %, about 0.7 wt % to about 3 wt %, about 1 wt % to about 3 wt %, about 0.01 wt % to about 1 wt %, about 0.03 wt % to about 1 wt %, about 0.05 wt % to about 1 wt %, about 0.07 wt % to about 1 wt % about 0.1 wt. % to about 1 wt %, about 0.3 wt % to about 1 wt %, about 0.5 wt % to about 1 wt %, about 0.7 wt % to about 1 wt %, about 0.01 wt % to about 0.3 wt %, about 0.03 wt % to about 0.3 wt %, about 0.05 wt % to about 0.3 wt %, about 0.07 wt % to about 0.3 wt %, about 0.1 wt % to about 0.3 wt %, about 0.01 wt % to about 0.1 wt %, about 0.03 wt % to about 0.1 wt %, about 0.05 wt % to about 0.1%, about 0.07 wt % to about 0.1 wt %, about 0.01 wt % to about 0.03 wt %, about 0.01 wt % to about 0.05 wt %, about 0.01 wt % to about 0.07 wt %, about 5 wt. % to about 30 wt. %, from about 10 wt. % to about 30 wt. %, or from about 20 wt. % to about 30 wt. % of the composition of the present application.

Regardless of the salt used in the present compositions, the salt content in a composition is calculated based on the weight of sodium chloride. More specifically, the salt content (based on weight of NaCl) may be determined by determining the total ash content of a sample according to the general method for determining total ash content as set forth in FAO JECFA MONOGRAPHS, vol. 4, 2007. The weight of sodium chloride is determined from the weight of sodium oxide multiplied by a factor of 1.89. For example, if the total ash content of 100 g the composition of the present application is 1 g, the composition of the present application has a salt content of 1.89 wt %.

I2. Minerals

Minerals comprise inorganic chemical elements required by living organisms. Minerals are comprised of a broad range of compositions (e.g., elements, simple salts, and complex silicates) and also vary broadly in crystalline structure. They may naturally occur in foods and beverages, may be added as a supplement, or may be consumed or administered separately from foods or beverages.

Minerals may be categorized as either bulk minerals, which are required in relatively large amounts, or trace minerals, which are required in relatively small amounts.

Bulk minerals generally are required in amounts greater than or equal to about 100 mg per day and trace minerals are those that are required in amounts less than about 100 mg per day.

In some embodiments of the present application, the minerals are chosen from bulk minerals, trace minerals or combinations thereof. Non-limiting examples of bulk minerals include calcium, chlorine, magnesium, phosphorous, potassium, sodium, and sulfur. Non-limiting examples of trace minerals include chromium, cobalt, copper, fluorine, iron, manganese, molybdenum, selenium, zinc, and iodine. Although iodine generally is classified as a trace mineral, it is required in larger quantities than other trace minerals and often is categorized as a bulk mineral.

In some embodiments, the mineral is a trace mineral, believed to be necessary for human nutrition, non-limiting examples of which include bismuth, boron, lithium, nickel, rubidium, silicon, strontium, tellurium, tin, titanium, tungsten, and vanadium.

The minerals embodied herein may be in any form known to those of ordinary skill in the art. In some embodiments, the minerals are in their ionic form, having either a positive or negative charge. For example, sulfur and phosphorous often are found naturally as sulfates, sulfides, and phosphates. In some embodiment, the minerals are present in their molecular form.

In some embodiments, minerals are present in the composition of the present application in an amount effective to provide an amount of from about 25 ppm to about 25,000 ppm in the final product.

I3. Organic Acids and Inorganic Acids

Suitable organic acid additives include any compound which comprises a —COOH moiety, such as, for example, C2-C30 carboxylic acids, substituted hydroxyl C2-C30 carboxylic acids, butyric acid (ethyl esters), substituted butyric acid (ethyl esters), benzoic acid, substituted benzoic acids (e.g., 2,4-dihydroxybenzoic acid), substituted cinnamic acids, hydroxyacids, substituted hydroxybenzoic acids, anisic acid substituted cyclohexyl carboxylic acids, tannic acid, aconitic acid, lactic acid, tartaric acid, citric acid, isocitric acid, gluconic acid, glucoheptonic acids, adipic acid, hydroxycitric acid, malic acid, fruitaric acid (a blend of malic, fumaric, and tartaric acids), fumaric acid, maleic acid, succinic acid, chlorogenic acid, salicylic acid, creatine, caffeic acid, bile acids, acetic acid, ascorbic acid, alginic acid, erythorbic acid, polyglutamic acid, glucono delta lactone, and their alkali or alkaline earth metal salt derivatives thereof. In addition, the organic acid additives also may be in either the D- or L-configuration.

The examples of the organic acid additives described optionally may be substituted with at least one group chosen from hydrogen, alkyl, alkenyl, alkynyl, halo, haloalkyl, carboxyl, acyl, acyloxy, amino, amido, carboxyl derivatives, alkylamino, dialkylamino, arylamino, alkoxy, aryloxy, nitro, cyano, sulfo, thiol, imine, sulfonyl, sulfenyl, sulfonyl, sulfamyl, carboxalkoxy, carboxamido, phosphoryl, phosphinyl, phosphoryl, phosphine, thioester, thioether, anhydride, oximino, hydrazine, carbamyl, phosphor or phosphonato. In some embodiments, the organic acid additive is present in the composition of the present application in an amount effective to provide an amount of from about 0.5 ppm to about 5,000 ppm in the final product.

Organic acids also include amino acids such as, aspartic acid, arginine, glycine, glutamic acid, proline, threonine, theanine, cysteine, cystine, alanine, valine, tyrosine, leucine, arabinose, trans-4-hydroxyproline, isoleucine, asparagine, serine, lysine, histidine, ornithine, methionine, carnitine, aminobutyric acid (α-, β-, and/or δ-isomers), glutamine, hydroxyproline, taurine, norvaline and sarcosine. The amino acid may be in the D- or L-configuration and in the mono-, di-, or tri-form of the same or different amino acids. Additionally, the amino acids may be α-, β-, γ- and/or δ-isomers if appropriate. Combinations of the foregoing amino acids and their corresponding salts (e.g., sodium, potassium, calcium, magnesium salts or other alkali or alkaline earth metal salts thereof, or acid salts) also are suitable additives in some embodiments. The amino acids may be natural or synthetic. The amino acids also may be modified. Modified amino acids refers to any amino acid wherein at least one atom has been added, removed, substituted, or combinations thereof (e.g., N-alkyl amino acid, N-acyl amino acid, or N-methyl amino acid). Non-limiting examples of modified amino acids include amino acid derivatives such as trimethyl glycine, N-methyl-glycine, and N-methyl-alanine. As used herein, modified amino acids encompass both modified and unmodified amino acids.

As used herein, amino acids also encompass both peptides and polypeptides (e.g., dipeptides, tripeptides, tetrapeptides, and pentapeptides) such as glutathione and L-alanyl-L-glutamine. Suitable polyamino acid additives include poly-L-aspartic acid, poly-L-lysine poly-L-a-lysine or poly-L-s-lysine), poly-L-ornithine (e.g., poly-L-a-ornithine or poly-L-s-ornithine), poly-L-arginine, other polymeric forms of amino acids, and salt forms thereof (e.g., calcium, potassium, sodium, or magnesium salts such as L-glutamic acid mono sodium salt). The poly-amino acid additives also may be in the D- or L-configuration. Additionally, the poly-amino acids may be α-, β-, γ-, δ-, and r-isomers if appropriate. Combinations of the foregoing poly-amino acids and their corresponding salts (e.g., sodium, potassium, calcium, magnesium salts or other alkali or alkaline earth metal salts thereof or acid salts) also are suitable additives in some embodiments. The poly-amino acids described herein also may comprise co-polymers of different amino acids. The poly-amino acids may be natural or synthetic. The poly-amino acids also may be modified, such that at least one atom has been added, removed, substituted, or combinations thereof (e.g., N-alkyl poly-amino acid or N-acyl poly-amino acid). As used herein, poly-amino acids encompass both modified and unmodified poly-amino acids. For example, modified poly-amino acids include, but are not limited to, poly-amino acids of various molecular weights (MW), such as poly-L-a-lysine with a MW of 1,500, MW of 6,000, MW of 25,200, MW of 63,000, MW of 83,000, or MW of 300,000.

In some embodiments, the amino acid is present in the composition of the present application in an amount effective to provide an amount of from about 10 ppm to about 50,000 ppm in the final product.

Suitable inorganic acid additives include, but are not limited to, phosphoric acid, phosphorous acid, polyphosphoric acid, hydrochloric acid, sulfuric acid, carbonic acid, sodium dihydrogen phosphate, and alkali or alkaline earth metal salts thereof (e.g., inositol hexaphosphate Mg/Ca).

In some embodiments, the in organic acid is present in the composition of the present application in an amount effective to provide an amount of from about 25 ppm to about 25,000 ppm in the final product.

I4. Polyols

The term "polyol," as used herein, refers to a molecule that contains more than one hydroxyl group.

A polyol may be a diol, triol, or a tetraol which contains 2, 3, and 4 hydroxyl groups respectively. A polyol also may comprise more than 4 hydroxyl groups, such as a pentaol, hexaol, heptaol, or the like, which comprise 5, 6, or 7 hydroxyl groups, respectively. Additionally, a polyol also may be a sugar alcohol, polyhydric alcohol, or polyalcohol which is a reduced form of carbohydrate, wherein the carbonyl group (aldehyde or ketone, reducing sugar) has been reduced to a primary or secondary hydroxyl group.

Non-limiting examples of polyols in some embodiments include maltitol, mannitol, sorbitol, lactitol, xylitol, isomalt, propylene glycol, glycerol (glycerin), threitol, galactitol, palatinose, reduced isomatto-oligosaccharides, reduced xylo-oligosaccharides, reduced gentio-oligosaccharides, reduced maltose syrup, reduced glucose syrup, and sugar alcohols or any other carbohydrates capable of being reduced which do not adversely affect taste.

In some embodiments, polyol is present in the compositions of the present application in an amount effective to provide an amount of from about 100 ppm to about 250,000 ppm in the final product.

I5. Nucleotides

Suitable nucleotide additives include, but are not limited to, inosine monophosphate ("IMP"), guanosine monophosphate ("GMP"), adenosine monophosphate ("AMP"), cytosine monophosphate (CMP), uracil monophosphate (UMP), inosine diphosphate, guanosine diphosphate, adenosine diphosphate, cytosine diphosphate, uracil diphosphate, inosine triphosphate, guanosine triphosphate, adenosine triphosphate, cytosine triphosphate, uracil triphosphate, alkali or alkaline earth metal salts thereof, or combinations thereof. The nucleotides described herein also may comprise nucleotide-related additives, such as nucleosides or nucleic acid bases (e.g., guanine, cytosine, adenine, thymine, uracil).

In some embodiments, nucleotide is present in the compositions of the present application in an amount effective to provide an amount of from about 5 ppm to about 1,000 ppm in the final product.

I6. Bitter Compounds

Suitable bitter compound additives include, but are not limited to, caffeine, quinine, urea, bitter orange oil, naringin, quassia, and salts thereof.

In some embodiments, bitter compounds are present in the compositions of the present application in an amount effective to provide an amount of from about 25 ppm to about 25,000 ppm in the final product.

I7. Astringent Compounds

Suitable astringent compound additives include, but are not limited to, tannic acid, europium chloride (EuCl3), gadolinium chloride (GdC13), terbium chloride (TbCl3), alum, tannic acid, and polyphenols (e.g., tea polyphenols).

In some embodiments, astringent compound is present in the compositions of the present application in an amount effective to provide an amount of from about 0.5 ppm to about 5,000 ppm in the final product.

I8. Proteins or Protein Hydrolysates

Suitable protein or protein hydrolysate additives include, but are not limited to, bovine serum albumin (BSA), whey protein (including fractions or concentrates thereof such as 90% instant whey protein isolate, 34% whey protein, 50%> hydrolyzed whey protein, and 80%> whey protein concentrate), soluble rice protein, soy protein, protein isolates, protein hydrolysates, reaction products of protein hydrolysates, glycoproteins, and/or proteoglycans containing amino acids (e.g., glycine, alanine, serine, threonine, asparagine, glutamine, arginine, valine, isoleucine, leucine, norvaline, methionine, proline, tyrosine, hydroxyproline, and the like), collagen (e.g., gelatin), partially hydrolyzed collagen (e.g., hydrolyzed fish collagen), and collagen hydrolysates (e.g., porcine collagen hydrolysate).

In some embodiments, proteins or protein hydrolysates are present in the compositions of the present application in an amount effective to provide an amount of from about 100 ppm to about 50,000 ppm in the final product.

I9. Surfactants

Suitable surfactant additives include, but are not limited to, polysorbates polyoxyethylene sorbitan monooleate (polysorbate 80), polysorbate 20, polysorbate 60), sodium dodecylbenzenesulfonate, dioctyl sulfosuccinate or dioctyl sulfosuccinate sodium, sodium dodecyl sulfate, cetylpyridinium chloride (hexadecylpyridinium chloride), hexadecyltnmethylammonium bromide, sodium cholate, carbamoyl, choline chloride, sodium glycocholate, sodium taurodeoxycholate, lauric arginate, sodium stearoyl lactylate, sodium taurocholate, lecithins, sucrose oleate esters, sucrose stearate esters, sucrose palmitate esters, sucrose laurate esters, and other emulsifiers, and the like.

In some embodiments, surfactants are present in the compositions of the present application in an amount effective to provide an amount of from about 20 ppm to about 20,000 ppm in the final product.

I10. Gums and Waxes

Gums and mucilages represent a broad array of different branched structures. Guar gum is a galactomannan produced from the ground endosperm of the guar seed. Guar gum is commercially available (e.g., Benefiber by Novartis AG). Other gums, such as gum arabic and pectins, have still different structures. Still other gums include xanthan gum, gellan gum, tara gum, psyllium seed husk gum, and locust been gum.

Waxes are esters of ethylene glycol and two fatty acids, generally occurring as a hydrophobic liquid that is insoluble in water.

In some embodiments, gums or waxes are present in the compositions of the present application in an amount effective to provide an amount of from about 100 ppm to about 100,000 ppm in the final product.

I11. Antioxidants

As used herein "antioxidant" refers to any substance which inhibits, suppresses, or reduces oxidative damage to cells and biomolecules. Without being bound by theory, it is believed that antioxidants inhibit, suppress, or reduce oxidative damage to cells or biomolecules by stabilizing free radicals before they can cause harmful reactions. As such, antioxidants may prevent or postpone the onset of some degenerative diseases.

Examples of suitable antioxidants for embodiments of this application include, but are not limited to, vitamins, vitamin cofactors, minerals, hormones, carotenoids, carotenoid terpenoids, non-carotenoid terpenoids, flavonoids, flavonoid polyphenolics bioflavonoids), flavonols, flavones, phenols, polyphenols, esters of phenols, esters of polyphenols, nonflavonoid phenolics, isothiocyanates, or combinations thereof. In some embodiments, the antioxidant is vitamin A, vitamin C, vitamin E, ubiquinone, mineral selenium, manganese, melatonin, a-carotene, β-carotene, lycopene, lutein, zeanthin, crypoxanthin, reservatol, eugenol, quercetin, catechin, gossypol, hesperetin, curcumin, ferulic acid, thymol, hydroxytyrosol, tumeric, thyme, olive oil, lipoic acid, glutathinone, gutamine, oxalic acid, tocopherol-derived compounds, butylated hydroxyanisole (BHA), butylated hydroxytoluene (BHT), ethylenediaminetetraacetic acid (EDTA), tert-butylhydroquinone, acetic acid, pectin, tocotrienol, tocopherol, coenzyme Q10, zeaxanthin, astaxanthin, canthaxantin, saponins, limonoids, kaempfedroi, myricetin, isorhamnetin, proanthocyanidins, quercetin, rutin, luteolin, apigenin, tangeritin, hesperetin, naringenin, erodictyol, flavan-3-ols (e.g., anthocyanidins), gallocatechins, epicatechin and its gallate forms, epigallocatechin and its gallate forms (ECGC) theaflavin and its gallate forms, thearubigins, isoflavone, phytoestrogens, genistein, daidzein, glycitein, anythocyanins, cyanidin, delphinidin, malvidin, pelargonidin, peonidin, petunidin, ellagic acid, gallic acid, salicylic acid, rosmarinic acid, cinnamic acid and its derivatives (e.g., ferulic acid), chlorogenic acid, chicoric acid, gallotannins, ellagitannins, anthoxanthins, betacyanins and other plant pigments, silymarin, citric acid, lignan, antinutrients, bilirubin, uric acid, R-a-lipoic acid, N-acetylcysteine, emblicanin, apple extract, apple skin extract (applephenon), rooihos extract red, rooihos extract, green, hawthorn berry extract, red raspberry extract, green coffee antioxidant (GCA), aronia extract 20%, grape seed extract (VinOseed), cocoa extract, hops extract, mangosteen extract, mangosteen hull extract, cranberry extract, pomegranate extract, pomegranate hull extract, pomegranate seed extract, hawthorn berry extract, pomella pomegranate extract, cinnamon bark extract, grape skin extract, bilberry extract, pine bark extract, pycnogenol, elderberry extract, mulberry root extract, woltberry (gogi) extract, blackberry extract, blueberry extract, blueberry leaf extract, raspberry extract, turmeric extract, citrus bioflavonoids, black currant, ginger, acai powder, green coffee bean extract, green tea extract, and phytic acid, or combinations thereof. In alternate embodiments, the antioxidant is a synthetic antioxidant such as butylated hydroxytolune or butylated hydroxyanisole, for example. Other sources of suitable antioxidants for embodiments of this application include, but are not limited to, fruits, vegetables, tea, cocoa, chocolate, spices, herbs, rice, organ meats from livestock, yeast, whole grains, or cereal grains.

Although recognizing that other suitable antioxidants may be used for flavoring agents, the IOFI has acknowledged the following antioxidants for use in flavoring agents: ascorbic acid and salts thereof, ascorbyl palmitate, butylated hydroxyanisole (BHA), butylated hydroxytoluene (BHT), dodecyl gallate, erythorbic acid and salts thereof, octyl gallate, propyl gallate, tert.-butyl hydroquinone (TBHQ), natural tocopherols, and synthetic tocopherols.

Particular antioxidants belong to the class of phytonutrients called polyphenols (also known as "polyphenolics"), which are a group of chemical substances found in plants, characterized by the presence of more than one phenol group per molecule. A variety of health benefits may be derived from polyphenols, including prevention of cancer, heart disease, and chronic inflammatory disease and improved mental strength and physical strength, for example. Suitable polyphenols for embodiments of this application include catechins, proanthocyanidins, procyanidins, anthocyanins, quercerin, rutin, reservatrol, isoflavones, curcumin, punicalagin, ellagitannin, hesperidin, naringin, citrus flavonoids, chlorogenic acid, other similar materials, or combinations thereof.

For example, polyphenolic flavonoids are an an important and widespread group of plant natural products that possess many biological activities and are present in many human dietary sources. Neohesperidin and naringin are flavanone glycosides present in citrus fruits and grapefruit, and are responsible for the bitterness of citrus juices. Neohesperidin, naringin, and their derivatives, such as neohesperidine chalcone, naringin chalcone, phloracetophenone, neohesperidine dihydrochalcone, naringin dihydrochalcone etc. (as further described herein) are good candidates for bitter or sweet enhancers. It has been surprisingly found that adding these components to the MRP compositions of the present invention can help to mask the bitterness and/or aftertaste of other ingredients and make the taste cleaner.

In some embodiments, the antioxidant is a citrus flavonoid or flavanone glycoside, such as hesperidin or naringin. Suitable natural sources of citrus flavonoids, such as hesperidin or naringin, for embodiments of this application include, but are not limited to, oranges, grapefruits, and citrus juices. The ratio of flavonoids in the MRP compositions can range from 0.1 ppm to 99.9% (w/w).

In some embodiments, the antioxidant is a catechin such as, for example, epigallocatechin gallate (EGCG). Suitable sources of catechins for embodiments of this application include, but are not limited to, green tea, white tea, black tea, oolong tea, chocolate, cocoa, red wine, grape seed, red grape skin, purple grape skin, red grape juice, purple grape juice, berries, pycnogenol, and red apple peel.

In some embodiments, the antioxidant is chosen from proanthocyanidins, procyanidins or combinations thereof. Suitable sources of proanthocyanidins and procyanidins for embodiments of this application include, but are not limited to, red grapes, purple grapes, cocoa, chocolate, grape seeds, red wine, cacao beans, cranberry, apple peel, plum, blueberry, black currants, choke berry, green tea, sorghum, cinnamon, barley, red kidney bean, pinto bean, hops, almonds, hazelnuts, pecans, pistachio, pycnogenol, and colorful berries.

In particular embodiments, the antioxidant is an anthocyanin. Suitable sources of anthocyanins for embodiments of this application include, but are not limited to, red berries, blueberries, bilberry, cranberry, raspberry, cherry, pomegranate, strawberry, elderberry, choke berry, red grape skin, purple grape skin, grape seed, red wine, black currant, red currant, cocoa, plum, apple peel, peach, red pear, red cabbage, red onion, red orange, and blackberries.

In some embodiments, the antioxidant is chosen from quercetin, rutin or combinations thereof. Suitable sources of quercetin and rutin for embodiments of this application include, but are not limited to, red apples, onions, kale, bog whortleberry, lingonberrvs, chokeberry, cranberry, blackberry, blueberry, strawberry, raspberry, black currant, green tea, black tea, plum, apricot, parsley, leek, broccoli, chili pepper, berry wine, and ginkgo.

In some embodiments, the antioxidant is reservatrol. Suitable sources of reservatrol for embodiments of this application include, but are not limited to, red grapes, peanuts, cranberry, blueberry, bilberry, mulberry, Japanese litadori tea, and red wine.

In particular embodiments, the antioxidant is an isoflavone. Suitable sources of isoflavones for embodiments of this application include, but are not limited to, soy beans, soy products, legumes, alfalfa sprouts, chickpeas, peanuts, and red clover.

In some embodiments, the antioxidant is curcumin. Suitable sources of curcumin for embodiments of this application include, but are not limited to, turmeric and mustard.

In particular embodiments, the antioxidant is chosen from punicalagin, ellagitannin or combinations thereof. Suitable sources of punicalagin and ellagitannin for embodiments of this application include, but are not limited to, pomegranate, raspberry, strawberry, walnut, and oak-aged red wine.

In particular embodiments, the antioxidant is chlorogenic acid. Suitable sources of chlorogenic acid for embodiments of this application include, but are not limited to, green coffee, yerba mate, red wine, grape seed, red grape skin, purple grape skin, red grape juice, purple grape juice, apple juice, cranberry, pomegranate, blueberry, strawberry, sunflower, Echinacea, pycnogenol, and apple peel In some embodiments, antioxidants are present in the compositions of the present application in an amount effective to provide an amount of from about 100 ppm to about 250,000 ppm in the final product.

I12. Polymers

Suitable polymer additives include, but are not limited to, chitosan, pectin, pectic, pectinic, polyuronic, polygalacturonic acid, starch, food hydrocolloid or crude extracts thereof (e.g., gum acacia Senegal (Fibergum™), gum acacia seyal, carageenan), poly-L-lysine (e.g., poly-L-α-lysine or poly-L-ε-lysine), poly-L-ornithine (e.g., poly-L-α-ornithine or poly-L-ε-ornithine), polypropylene glycol, polyethylene glycol, poly(ethylene glycol methyl ether), polyarginine, polyaspartic acid, polyglutamic acid, polyethylene imine, alginic acid, sodium alginate, propylene glycol alginate, and sodium polyethyleneglycolalginate, sodium hexametaphosphate and its salts, and other cationic polymers and anionic polymers.

In some embodiments, a polymer is present in the compositions of the present application in an amount effective to provide an amount of from about 10 ppm to about 10,000 ppm in the final product.

I13. Fatly Acids

As used herein, a "fatty acid" refers to any straight chain monocarboxylic acid and includes saturated fatty acids, unsaturated fatty acids, long chain fatty acids, medium chain fatty acids, short chain fatty acids, fatty acid precursors (including omega-9 fatty acid precursors), and esterified fatty acids. As used herein, a "long chain polyunsaturated fatty acid" refers to any polyunsaturated carboxylic acid or organic acid with a long aliphatic tail. As used herein, "omega-3 fatty acid" refers to any polyunsaturated fatty acid having a first double bond as the third carbon-carbon bond from the terminal methyl end of its carbon chain. In particular embodiments, the omega-3 fatty acid may comprise a long chain omega-3 fatty acid. As used herein, an "omega-6 fatty acid" refers to any polyunsaturated fatty acid having a first double bond as the sixth carbon-carbon bond from the terminal methyl end of its carbon chain.

Suitable omega-3 fatty acids for use in embodiments of the present application can be produced from algae, fish, animals, plants, or combinations thereof, for example. Examples of suitable omega-3 fatty acids include, but are not limited to, linolenic acid, alpha-linolenic acid, eicosapentaenoic acid, docosahexaenoic acid, stearidonic acid, eicosatetraenoic acid or combinations thereof. In some embodiments, suitable omega-3 fatty acids can be provided in fish oils, (e.g., menhaden oil, tuna oil, salmon oil, bonito oil, and cod oil), microalgae omega-3 oils or combinations thereof. In particular embodiments, suitable omega-3 fatty acids may be produced from commercially available omega-3 fatty acid oils, such as Microalgae DHA oil (from Marteck, Columbia, Md.), OmegaPure (from Omega Protein, Houston, Tex.), Marinol C-38 (from Lipid Nutrition, Channahon, Ill.), Bonito oil and MEG-3 (from Ocean Nutrition, Dartmouth, NS), Evogel (from Symrise, Holzminden, Germany), Marine Oil, from tuna or salmon (from Arista Wilton, Conn.), OmegaSource 2000, Marine Oil, from menhaden and Marine Oil, from cod (from OmegaSource, RTP, N.C.).

Suitable omega-6 fatty acids include, but are not limited to, linoleic acid, gamma-linolenic acid, dihommo-gamma-linolenic acid, arachidonic acid, eicosadienoic acid, docosadienoic acid, adrenic acid, docosapentaenoic acid, or combinations thereof.

Suitable esterified fatty acids for embodiments of the present application may include, but are not limited to, monoacylgycerols containing omega-3 and/or omega-6 fatty acids, diacylgycerols containing omega-3 and/or omega-6 fatty acids, triacylgycerols containing omega-3 and/or omega-6 fatty acids, or combinations thereof.

In some embodiments, fatty acids are present in the compositions of the present application in an amount from about 100 ppm to about 100,000 ppm.

I14. Vitamins

Vitamins are organic compounds that the human body needs in small quantities for normal functioning. The body uses vitamins without breaking them down, unlike other nutrients such as carbohydrates and proteins. To date, thirteen vitamins have been recognized, and one or more can be used in the compositions herein. Suitable vitamins and their alternative chemical names are provided in the accompanying parentheses which follow include, vitamin A retinol, retinaldehyde), vitamin D (calciferol, cholecalciferol, lumisterol, ergocalciferol, dihydrotachysterol, 7-dehydrocholesterol), vitamin E (tocopherol, tocotrienol), vitamin K (phylloquinone, naphthoquinone), vitamin B1 (thiamin), vitamin B2 (riboflavin, vitamin G), vitamin B3 (niacin, nicotinic acid, vitamin PP), vitamin B5 (pantothenic acid), vitamin B6 (pyridoxine, pyridoxal, pyridoxamine), vitamin B7 (biotin, vitamin H), vitamin B9 (folic acid, folate, folacin, vitamin M, pteroyl-L-glutamic acid), vitamin B12 (cobalamin, cyanocobalamin), and vitamin C (ascorbic acid).

Various other compounds have been classified as vitamins by some authorities. These compounds may be termed pseudo-vitamins and include, but are not limited to, compounds such as ubiquinone (coenzyme Q10), pangamic acid, dimethylglycine, taestrile, amygdaline, flavanoids, para-aminobenzoic acid, adenine, adenylic acid, and s-methylmethionine. As used herein, the term vitamin includes pseudo-vitamins.

In some embodiments, the vitamin is a fat-soluble vitamin chosen from vitamin A, D, E, K or combinations thereof. In other embodiments, the vitamin is a water-soluble vitamin chosen from vitamin B1, vitamin B2, vitamin B3, vitamin B6, vitamin B12, folic acid, biotin, pantothenic acid, vitamin C or combinations thereof.

In some embodiments, vitamins are present in the compositions of the present application in an amount effective to provide an amount of from about 10 ppm to about 10,000 ppm in the final product.

I15. Preservatives

In some embodiments of this application, the preservative is chosen from antimicrobials, antienzymatics or combinations thereof.

Non-limiting examples of antimicrobials include sulfites, propionates, benzoates, sorbates, nitrates, nitrites, bacteriocins such as nisin, salts, sugars, acetic acid, dimethyl dicarbonate (DMDC), ethanol, and ozone.

Sulfites include, but are not limited to, sulfur dioxide, sodium bisulfite, and potassium hydrogen sulfite. Propionates include, but are not limited to, propionic acid, calcium propionate, and sodium propionate. Benzoates include, but are not limited to, sodium benzoate and benzoic acid. Sorbates include, but are not limited to, potassium sorbate, sodium sorbate, calcium sorbate, and sorbic acid. Nitrates and nitrites include, but are not limited to, sodium nitrate and sodium nitrite, Non-limiting examples of antienzymatics suitable for use as preservatives in particular embodiments of the application include ascorbic acid, citric acid, and metal chelating agents such as ethylenediaminetetraacetic acid (EDTA). In certain embodiments, preservatives are present in the compositions of the present application in an amount from about 100 ppm to about 5000 ppm.

I16. Hydration Agents

Hydration agents help the body to replace fluids that are lost through excretion. For example, fluid is lost as sweat in order to regulate body temperature, as urine in order to excrete waste substances, and as water vapor in order to exchange gases in the lungs. Fluid loss can also occur due to a wide range of external causes, non-limiting examples of which include physical activity, exposure to dry air, diarrhea, vomiting, hyperthermia, shock, blood loss, and hypotension. Diseases causing fluid loss include diabetes, cholera, gastroenteritis, shigellosis, and yellow fever. Forms of malnutrition causing fluid loss include excessive consumption of alcohol, electrolyte imbalance, fasting, and rapid weight loss.

In some embodiments, the hydration agent helps the body replace fluids that are lost during exercise. Accordingly, in some embodiments, the hydration agent is an electrolyte, non-limiting examples of which include sodium, potassium, calcium, magnesium, chloride, phosphate, bicarbonate, or combinations thereof. Suitable electrolytes for use in some embodiments of this application are also described in U.S. Pat. No. 5,681,569, the disclosure of which is expressly incorporated herein by reference. In some embodiments, the electrolytes are obtained from their corresponding water-soluble salts. Non-limiting examples of salts for use in some embodiments include chlorides, carbonates, sulfates, acetates, bicarbonates, citrates, phosphates, hydrogen phosphates, tartrates, sorbates, citrates, benzoates, or combinations thereof. In other embodiments, the electrolytes are provided by juice, fruit extracts, vegetable extracts, tea, or tea extracts.

In some embodiments, the hydration agent is a flavanol that provides cellular rehydration. Flavanols are a class of natural substances present in plants, and generally comprise a 2-phenylbenzopyrone molecular skeleton attached to one or more chemical moieties. Non-limiting examples of flavanols suitable for use herein include catechin, epicatechin, gallocatechin, epigallocatechin, epicatechin gallate, epigallocatechin 3-gallate, theaflavin, theaflavin 3-gallate, theaflavin 3'-gallate, theaflavin 3,3' gallate, thearubigin or combinations thereof. Several common sources of flavanols include tea plants, fruits, vegetables, and flowers. In preferred embodiments, the flavanol is extracted from green tea.

In some embodiments, the hydration agent is a glycerol solution to enhance exercise endurance. The ingestion of a glycerol containing solution has been shown to provide beneficial physiological effects, such as expanded blood volume, lower heart rate, and lower rectal temperature.

In some embodiments, hydration agents are present in the compositions of the present application in an amount effective to provide an amount of from about 100 ppm to about 250,000 ppm in the final product.

In other embodiments, the composition of the present application further comprises one or more functional ingredients. Examples of additional additives include, but are not limited to, dietary fiber sources, glucosamine, probiotics, prebiotics, weight management agents, osteoporosis management agents, phytoestrogens, phytosterols and combinations thereof.

I17. Dietary Fiber

In certain embodiments, the functional ingredient is at least one dietary fiber source. As used herein, the at least one dietary fiber source can comprise a single dietary fiber source or a plurality of dietary fiber sources as a functional ingredient for the compositions provided herein. Generally, according to particular embodiments of this invention, the at least one dietary fiber source is present in the composition in an amount sufficient to promote health and wellness.

Numerous polymeric carbohydrates having significantly different structures in both composition and linkages fall within the definition of dietary fiber. Such compounds are well known to those skilled in the art, non-limiting examples of which include non-starch polysaccharides, lignin, cellulose, methylcellulose, the hemicelluloses, β-glucans, pectins, gums, mucilage, waxes, inulins, oligosaccharides, fructooligosaccharides, cyclodextrins, chitins, and combinations thereof.

Polysaccharides are complex carbohydrates composed of monosaccharides joined by glycosidic linkages. Non-starch polysaccharides are bonded with β-linkages, which humans are unable to digest due to a lack of an enzyme to break the β-linkages. Conversely, digestible starch polysaccharides generally comprise α(1-4) linkages.

Lignin is a large, highly branched and cross-linked polymer based on oxygenated phenylpropane units. Cellulose is a linear polymer of glucose molecules joined by a β(1-4) linkage, which mammalian amylases are unable to hydrolyze, Methylcellulose is a methyl ester of cellulose that is often used in foodstuffs as a thickener, and emulsifier. It is commercially available (e.g., Citrucel by GlaxoSmithKline, Celevac by Shire Pharmaceuticals). Hemicelluloses are highly branched polymers consisting mainly of glucurone- and 4-O-methylglucuroxylans. β-glucans are mixed-linkage (1-3), (1-4) β-D-glucose polymers found primarily in cereals, such as oats and barley. Pectins, such as beta pectin, are a group of polysaccharides composed primarily of D-galacturonic acid, which is methoxylated to variable degrees.

Gums and mucilages represent a broad array of different branched structures. Guar gum, derived from the ground endosperm of the guar seed, is a galactomannan. Guar gum is commercially available (e.g., Benefiber by Novartis AG). Other gums, such as gum arabic and pectins, have still different structures. Still other gums include xanthan gum, gellan gum, tara gum, psylium seed husk gum, and locust been gum.

Waxes are esters of ethylene glycol and two fatty acids, generally occurring as a hydrophobic liquid that is insoluble in water.

Inulins comprise naturally occurring oligosaccharides belonging to a class of carbohydrates known as fructans. They generally are comprised of fructose units joined by β(2-1) glycosidic linkages with a terminal glucose unit. Oligosaccharides are saccharide polymers containing typically three to six component sugars. They are generally found either O- or N-linked to compatible amino acid side chains in proteins or to lipid molecules. Fructooligosaccharides are oligosaccharides consisting of short chains of fructose molecules.

Food sources of dietary fiber include, but are not limited to, grains, legumes, fruits, and vegetables. Grains providing dietary fiber include, but are not limited to, oats, rye, barley, wheat. Legumes providing fiber include, but are not limited to, peas and beans such as soybeans. Fruits and vegetables providing a source of fiber include, but are not limited to, apples, oranges, pears, bananas, berries, tomatoes, green beans, broccoli, cauliflower, carrots, potatoes, celery. Plant foods such as bran, nuts, and seeds (such as flax seeds) are also sources of dietary fiber. Parts of plants providing dietary fiber include, but are not limited to, the stems, roots, leaves, seeds, pulp, and skin.

Although dietary fiber generally is derived from plant sources, indigestible animal products such as chitins are also classified as dietary fiber. Chitin is a polysaccharide composed of units of acetylglucosamine joined by β(1-4) linkages, similar to the linkages of cellulose.

Sources of dietary fiber often are divided into categories of soluble and insoluble fiber based on their solubility in water. Both soluble and insoluble fibers are found in plant foods to varying degrees depending upon the characteristics of the plant. Although insoluble in water, insoluble fiber has passive hydrophilic properties that help increase bulk, soften stools, and shorten transit time of fecal solids through the intestinal tract.

Unlike insoluble fiber, soluble fiber readily dissolves in water. Soluble fiber undergoes active metabolic processing via fermentation in the colon, increasing the colonic microflora and thereby increasing the mass of fecal solids. Fennentation of fibers by colonic bacteria also yields end-products with significant health benefits. For example, fermentation of the food masses produces gases and short-chain fatty acids. Acids produced during fermentation include butyric, acetic, propionic, and valeric acids that have various beneficial properties such as stabilizing blood glucose levels by acting on pancreatic insulin release and providing liver control by glycogen breakdown. In addition, fiber fermentation may reduce atherosclerosis by lowering cholesterol synthesis by the liver and reducing blood levels of LDL and triglycerides. The acids produced during fermentation lower colonic pH, thereby protecting the colon lining from cancer polyp formation. The lower colonic pH also increases mineral absorption, improves the barrier properties of the colonic mucosal layer, and inhibits inflammatory and adhesion irritants. Fermentation of fibers also may benefit the immune system by stimulating production of T-helper cells, antibodies, leukocytes, splenocytes, cytokinins and lymphocytes.

I18. Glucosamine

In certain embodiments, the functional ingredient is glucosamine.

Generally, according to particular embodiments of this invention, glucosamine is present in the compositions in an amount sufficient to promote health and wellness.

Glucosamine, also called chitosamine, is an amino sugar that is believed to be an important precursor in the biochemical synthesis of glycosylated proteins and lipids. D-glucosamine occurs naturally in the cartilage in the form of glucosamine-6-phosphate, which is synthesized from fructose-6-phosphate and glutamine. However, glucosamine also is available in other forms, non-limiting examples of which include glucosamine hydrochloride, glucosamine sulfate, N-acetyl-glucosamine, or any other salt forms or combinations thereof. Glucosamine may be obtained by acid hydrolysis of the shells of lobsters, crabs, shrimps, or prawns using methods well known to those of ordinary skill in the art. In a particular embodiment, glucosamine may be derived from fungal biomass containing chitin, as described in U.S. Patent Publication No. 2006/0172392.

The compositions can further comprise chondroitin sulfate.

I19. Probiotics/Probiotics

In certain embodiments, the functional ingredient is chosen from at least one probiotic, prebiotic and combination thereof.

As used herein, the at least one probiotic or prebiotic may be single probiotic or prebiotic or a plurality of probiotics or prebiotics as a functional ingredient for the compositions provided herein. Generally, according to particular embodiments of this invention, the at least one probiotic, prebiotic or combination thereof is present in the composition in an amount sufficient to promote health and wellness.

Probiotics, in accordance with the teachings of this invention, comprise microorganisms that benefit health when consumed in an effective amount. Desirably, probiotics beneficially affect the human body's naturally-occurring gastrointestinal microflora and impart health benefits apart from nutrition. Probiotics may include, without limitation, bacteria, yeasts, and fungi.

Prebiotics, in accordance with the teachings of this invention, are compositions that promote the growth of beneficial bacteria in the intestines. Prebiotic substances can be consumed by a relevant probiotic, or otherwise assist in keeping the relevant probiotic alive or stimulate its growth. When consumed in an effective amount, prebiotics also beneficially affect the human body's naturally-occurring gastrointestinal microflora and thereby impart health benefits apart from just nutrition. Prebiotic foods enter the colon and serve as substrate for the endogenous bacteria, thereby indirectly providing the host with energy, metabolic substrates, and essential micronutrients. The body's digestion and absorption of prebiotic foods is dependent upon bacterial metabolic activity, which salvages energy for the host from nutrients that escaped digestion and absorption in the small intestine.

According to particular embodiments, the probiotic is a beneficial microorganism that beneficially affects the human body's naturally-occurring gastrointestinal microflora and imparts health benefits apart from nutrition. Examples of probiotics include, but are not limited to, bacteria of the genus *Lactobacillus, Bifidobacieria, Streptococcus*, or combinations thereof, that confer beneficial effects to humans.

In particular embodiments of the invention, the at least one probiotic is chosen from the genus *Lactobacillus*. *Lactobacilli* (i.e., bacteria of the genus *Lactobacillus*, hereinafter "L.") have been used for several hundred years as a food preservative and for promoting human health. Non-limiting examples of *Lactobacillus* species found in the human intestinal tract include *L. acidophilus, L. casei, L. fermentum, L. saliva roes, L brevis, L. leichmannii, L. plantarum, L. cellobiosus, L. reweri, L. rhamnosus, L. hulgaricus*, and *L. thermophilus*.

According to other particular embodiments of this invention, the probiotic is chosen from the genus *Bifidobacteria*. *Bifidobacteria* also are known to exert a beneficial influence on human health by producing short chain fatty acids (e.g., acetic, propionic, and butyric acids), lactic, and formic acids as a result of carbohydrate metabolism. Non-limiting species of Bifidobacteria found in the human gastrointestinal tract include *B. angulatum, B. animalis, B. asteroides, B. bifdum, B. bourm, B. breve, B. catenulatum, B. choerinum. B. cogneforme, B. cuniculi, B. dentiumn, B. gallicum, B. gallinarum, B indicum, B. longwn, B. magnum, B. merycicum, B. minimum, B. pseudocatenu/atum, B. pseudolongwn, B. psychraerophilum, B. pullorum, B. ruminantium, B. saeculare, B. scardovil, B. simiae, B. subtile, B. thermacidophilum, B. thermophilum, B. urinahs*, and other *B.* sp.

According to other particular embodiments of this invention, the probiotic is chosen from the genus *Streptococcus*. *Streptococcus thermophilus* is a gram-positive facultative anacrobe. It is classified as a lactic acid bacterium, is commonly found in milk and milk products, and is used in the production of yogurt. Other non-limiting probiotic species include *Streptococcus salivarus* and *Streptococcus cremoris*.

Probiotics that may be used in accordance with this invention are well-known to those of skill in the art. Nonlimiting examples of foodstuffs comprising probiotics include yogurt, sauerkraut, kefir, kimchi, fermented vegetables, and other foodstuffs containing a microbial element that beneficially affects the host animal by improving the intestinal microbalance.

Prebiotics, in accordance with the embodiments of this invention, include, without limitation, mucopolysaccharides, oligosaccharides, polysaccharides, amino acids, vitamins, nutrient precursors, proteins and combinations thereof.

According to a particular embodiment of this invention, the prebiotic is chosen from dietary fibers, including, without limitation, polysaccharides and oligosaccharides. These compounds have the ability to increase the number of probiotics, which leads to the benefits conferred by the probiotics. Non-limiting examples of oligosaccharides that are categorized as prebiotics in accordance with particular embodiments of this invention include fructooligosaccharides, inulins, isomalto-oligosaccharides, lactilol, lactosucrose, lactulose, pyrodextrins, soy oligosaccharides, transgalacto-oligosaccharides, and xylo-oligosaccharides.

According to other particular embodiments of the invention, the prebiotic is an amino acid. Although a number of known prebiotics break down to provide carbohydrates for probiotics, some probiotics also require amino acids for nourishment.

Prebiotics are found naturally in a variety of foods including, without limitation, bananas, berries, asparagus, garlic, wheat, oats, barley and other whole grains), flaxseed, tomatoes, Jerusalem artichoke, onions and chicory, greens (e.g., dandelion greens, spinach, collard greens, chard, kale, mustard greens, turnip greens), and legumes (e.g., lentils, kidney beans, chickpeas, navy beans, white beans, black beans).

I20. Weight Management Agents

In certain embodiments, the functional ingredient is at least one weight management agent.

As used herein, the at least one weight management agent may be single weight management agent or a plurality of weight management agents as a functional ingredient for the compositions provided herein. Generally, according to particular embodiments of this invention, the at least one weight management agent is present in the composition in an amount sufficient to promote health and wellness.

As used herein, "a weight management agent" includes an appetite suppressant and/or a thermogenesis agent. As used herein, the phrases "appetite suppressant", "appetite satiation compositions", "satiety agents", and "satiety ingredients" are synonymous. The phrase "appetite suppressant" refers to macronutrients, herbal extracts, exogenous hormones, anorectics, anorexigenics, pharmaceutical drugs, and combinations thereof, that when delivered in effective amount(s), suppress, inhibit, reduce, or otherwise curtail a person's appetite. The phrase "thermogenesis agent" describes macronutrients, herbal extracts, exogenous hormones, anorectics, anorexigenics, pharmaceutical drugs, and combinations thereof, that when delivered in effective amount(s), activate or otherwise enhance a person's thermogenesis or metabolism.

Suitable weight management agents include macronutrient selected from the group consisting of proteins, carbohydrates, dietary fats, and combinations thereof. Consumption of proteins, carbohydrates, and dietary fats stimulates the release of peptides with appetite-suppressing effects. For example, consumption of proteins and dietary fats stimulates the release of the gut hormone cholecytokinin (CCK), while consumption of carbohydrates and dietary fats stimulates release of Glucagon-like peptide 1 (GLP-1).

Suitable macronutrient weight management agents also include carbohydrates. Carbohydrates generally comprise sugars, starches, cellulose and gums that the body converts into glucose for energy. Carbohydrates often are classified into two categories, digestible carbohydrates (e.g., monosaccharides, disaccharides, and starch) and non-digestible carbohydrates (e.g., dietary fiber). Studies have shown that non-digestible carbohydrates and complex polymeric carbohydrates having reduced absorption and digestibility in the small intestine stimulate physiologic responses that inhibit food intake. Accordingly, the carbohydrates embodied herein desirably comprise non-digestible carbohydrates or carbohydrates with reduced digestibility. Non-limiting examples of such carbohydrates include polydextrose; inulin; monosaccharide-derived polyols such as erythritol, mannitol, xylitol, and sorbitol; disaccharide-derived alcohols such as isomalt, lactitol, and maltitol; and hydrogenated starch hydrolysates. Carbohydrates are described in more detail herein.

In another particular embodiment weight management agent is a dietary fat. Dietary fats are lipids comprising combinations of saturated and unsaturated fatty acids. Polyunsaturated fatty acids have been shown to have a greater satiating power than mono-unsaturated fatty acids. Accordingly, the dietary fats embodied herein desirably comprise poly-unsaturated fatty acids, non-limiting examples of which include triacylglycerols.

In a particular embodiment, the weight management agent is an herbal extract. Extracts from numerous types of plants have been identified as possessing appetite suppressant properties. Non-limiting examples of plants whose extracts have appetite suppressant properties include plants of the genus *Hoodia, Trichocaulon, Caralluma, Stapelia, Orbea, Asclepias*, and *Camelia*. Other embodiments include extracts derived from *Gymnema sylvestre, Citrus aurantium, Griffonia simplicifolia, Paullinia cupana* (also known as Guarana), kola nut, Yerba mate, myrrh, guggul lipid, and black current seed oil.

The herbal extracts may be prepared from any type of plant material or plant biomass. Non-limiting examples of plant material and biomass include the stems, roots, leaves, dried powder obtained from the plant material, and sap or dried sap. The herbal extracts generally are prepared by extracting sap from the plant and then spray-drying the sap. Alternatively, solvent extraction procedures may be employed. Following the initial extraction, it may be desirable to further fractionate the initial extract (e.g., by column chromatography) in order to obtain an herbal extract with enhanced activity. Such techniques are well known to those of ordinary skill in the art.

In a particular embodiment, the herbal extract s derived from a plant of the genus *Hoodia*, species of which include *H. alstonii, H. currorii, H. dregei, H. flava, H. gordonii, H. julatae, H. mossamedensis, H. oficinalis, H. parviflorai, H. pedicellata, H. pilifera, H. ruschii*, and *H. triebneri. Hoodia* plants are stem succulents native to southern Africa. A sterol glycoside of *Hoodia*, known as P57, is believed to be responsible for the appetite-suppressant effect of the *Hoodia* species.

In another particular embodiment, the herbal extract is derived from a plant of the genus *Caralluma*, species of which include *C. indica, C. fimbriata, C. attenuate, C. ruberculata, C. edulis, C. adscendens, C. stalagmifera, C. umbellate, C. penicillata, C. russeliana, C. remospicens, C. Arabica*, and *C. lasiantha. Carralluma* plants belong to the same Subfamily as *Hoodia* and *Asclepiadaceae. Caralluma* are small, erect and fleshy plants native to India having medicinal properties, such as appetite suppression, that generally are attributed to glycosides belonging to the pregnane group of glycosides, non-limiting examples of which include caratuberside A, caratuberside B, bouceroside I, bouceroside II, bouceroside III, bouceroside IV, bouceroside V, bouceroside VI, bouceroside VII, bouceroside VIII, bouceroside IX, and bouceroside X.

In another particular embodiment, the at least one herbal extract is derived from a plant of the genus *Trichocaulon*. *Trichocaulon* plants are succulents that generally are native to southern Africa, similar to *Hoodia*, and include the species *T. piliferum* and *T. oficinale*.

In another particular embodiment, the herbal extract is derived from a plant of the genus *Slapelia* or *Orbea*, species of which include *S. gigantean* and *O. variegate*, respectively. Both *Stapelia* and *Orbea* plants belong to the same Subfamily as *Hoodia* and *Asclepiadaceae*. Not wishing to be bound by any theory, it is believed that the compounds exhibiting appetite suppressant activity are saponins, such as pregnane glycosides, which include stavarosides A, B, C, D, E, F, G, J, and K.

In another particular embodiment, the herbal extract is derived from a plant of the genus *Asclepias*. *Asclepias* plants also belong to the Asclepiadaceae family of plants. Non-limiting examples of *Asclepias* plants include *A. incarnate, A. curassayica, A. syriaca*, and *A. tuberose*. Not wishing to be bound by any theory, it is believed that the extracts comprise steroidal compounds, such as pregnane glycosides and pregnane aglycone, having appetite suppressant effects.

In a particular embodiment, the weight management agent is an exogenous hormone having a weight management effect. Non-limiting examples of such hormones include CCK, peptide YY, ghrelin, bombesin and gastrin-releasing peptide (GRP), enlerostatin, apolipoprotein A-IV, GLP-1, amylin, somastatin, and leptin.

In another embodiment, the weight management agent is a pharmaceutical drug. Non-limiting examples include phentenime, diethylpropion, phendimetrazine, sibutramine, rimonabant, oxyntomodulin, floxetine hydrochloride, ephedrine, phenethylamine, or other stimulants.

I21. Osteoporosis Management Agents

In certain embodiments, the functional ingredient is at least one osteoporosis management agent.

As used herein, the at least one osteoporosis management agent may be single osteoporosis management agent or a plurality of osteoporosis management agent as a functional ingredient for the compositions provided herein. Generally, according to particular embodiments of this invention, the at least one osteoporosis management agent is present in the composition in an amount sufficient to promote health and wellness.

Osteoporosis is a skeletal disorder of compromised bone strength, resulting in an increased risk of bone fracture. Generally, osteoporosis is characterized by reduction of the bone mineral density (BMD), disruption of bone micro-architecture, and changes to the amount and variety of non-collagenous proteins in the bone.

In certain embodiments, the osteoporosis management agent is at least one calcium source. According to a particular embodiment, the calcium source is any compound containing calcium, including salt complexes, solubilized species, and other forms of calcium. Non-limiting examples of calcium sources include amino acid chelated calcium, calcium carbonate, calcium oxide, calcium hydroxide, calcium sulfate, calcium chloride, calcium phosphate, calcium hydrogen phosphate, calcium dihydrogen phosphate, calcium citrate, calcium malate, calcium citrate malate, calcium gluconate, calcium tartrate, calcium lactate, solubilized species thereof, and combinations thereof.

According to a particular embodiment, the osteoporosis management agent is a magnesium source. The magnesium source is any compound containing magnesium, including salt complexes, solubilized species, and other forms of magnesium. Non-limiting examples of magnesium sources include magnesium chloride, magnesium citrate, magnesium gluceptate, magnesium gluconate, magnesium lactate, magnesium hydroxide, magnesium picolate, magnesium sulfate, solubilized species thereof, and mixtures thereof. In another particular embodiment, the magnesium source comprises an amino acid chelated or creatine chelated magnesium.

In other embodiments, the osteoporosis agent is chosen from vitamins D, C, K, their precursors and/or beta-carotene and combinations thereof.

Numerous plants and plant extracts also have been identified as being effective in the prevention and treatment of osteoporosis. Not wishing to be bound by any theory, it is believed that the plants and plant extracts stimulates bone morphogenic proteins and/or inhibits bone resorption, thereby stimulating bone regeneration and strength. Non-limiting examples of suitable plants and plant extracts as osteoporosis management agents include species of the genus Taraxacum and Amelanchier, as disclosed in U.S. Patent Publication No. 2005/0106215, and species of the genus *Lindera, Artemisia, Acorus, Carthamus, Carutn, Cnidium, Curcwna, Cyperus, Juniperus, Prunus, Iris, Cichorium, Dodonaea, Epimedium, Erigonoum, Soya, Mentha, Ocimum, thymus, Tanacetum, Planiago, Spearmint, Bixa, Vitis, Rosemarinus, Rhus*, and *Anethum*, as disclosed in U.S. Patent Publication No. 2005/0079232.

I22. Phytoestrogens

In certain embodiments, the functional ingredient is at least one phytoestrogen.

As used herein, the at least one phytoestrogen may be single phytoestrogen or a plurality of phytoestrogens as a functional ingredient for the compositions provided herein. Generally, according to particular embodiments of this invention, the at least one phytoestrogen is present in the composition in an amount sufficient to promote health and wellness.

Phytoestrogens are compounds found in plants which can typically be delivered into human bodies by ingestion of the plants or the plant parts having the phytoestrogens. As used herein, "phytoestrogen" refers to any substance which, when introduced into a body causes an estrogen-like effect of any degree. For example, a phytoestrogen may bind to estrogen receptors within the body and have a small estrogen-like effect.

Examples of suitable phytoestrogens for embodiments of this invention include, but are not limited to, isoflavones, stilbenes, lignans, resorcyclic acid lactones, coumestans, coumestrol, equol, and combinations thereof. Sources of suitable phytoestrogens include, but are not limited to, whole grains, cereals, fibers, fruits, vegetables, black cohosh, agave root, black currant, black haw, chasteberries, cramp bark, duong quai root, devil's club root, false unicorn root, ginseng root, groundsel herb, licorice, liferoot herb, motherwort herb, peony root, raspberry leaves, rose family plants, sage leaves, sarsaparilla root, saw palmetto berried, wild yam root, yarrow blossoms, legumes, soybeans, soy products (e.g., miso, soy flour, soymilk, soy nuts, soy protein isolate, tempen, or tofu) chick peas, nuts, lentils, seeds, clover, red clover, dandelion leaves, dandelion roots, fenugreek seeds, green tea, hops, red wine, flaxseed, garlic, onions, linseed, borage, butterfly weed, caraway, chaste tree, vitex, dates, dill, fennel seed, gotu kola, milk thistle, pennyroyal, pomegranates, southernwood, soya flour, tansy, and root of the kudzu vine (pueraria root) and the like, and combinations thereof.

Isoflavones belong to the group of phytonutrients called polyphenols. In general, polyphenols (also known as "polyphenolics"), are a group of chemical substances found in plants, characterized by the presence of more than one phenol group per molecule.

Suitable phytoestrogen isoflavones in accordance with embodiments of this invention include genistein, daidzein, glycitein, biochanin A, formononetin, their respective naturally occurring glycosides and glycoside conjugates, matairesinol, secoisolariciresinol, enterolactone, enterodiol, textured vegetable protein, and combinations thereof.

Suitable sources of isoflavones for embodiments of this invention include, but are not limited to, soy beans, soy products, legumes, alfalfa sprouts, chickpeas, peanuts, and red clover.

I23. Phytosterols

In certain embodiments, the functional ingredient is at least one phytosterol, phytostanol or combination thereof.

Generally, according to particular embodiments of this invention, the at least one phytosterol, phytostanol or combination thereof is present in the composition in an amount sufficient to promote health and wellness.

As used herein, the phrases "stanol", "plant stanol" and "phytostanol" are synonymous.

Plant sterols and stanols are present naturally in small quantities in many fruits, vegetables, nuts, seeds, cereals, legumes, vegetable oils, bark of the trees and other plant sources. Although people normally consume plant sterols and stanols every day, the amounts consumed are insufficient to have significant cholesterol-lowering effects or other health benefits. Accordingly, it would be desirable to supplement food and beverages with plant sterols and stanols.

Sterols are a subgroup of steroids with a hydroxyl group at C-3. Generally, phytosterols have a double bond within the steroid nucleus, like cholesterol; however, phytosterols also may comprise a substituted sidechain (R) at C-24, such as an ethyl or methyl group, or an additional double bond. The structures of phytosterols are well known to those of skill in the art.

At least 44 naturally-occurring phytosterols have been discovered, and generally are derived from plants, such as corn, soy, wheat, and wood oils; however, they also may be produced synthetically to form compositions identical to those in nature or having properties similar to those of naturally-occurring phytosterols. According to particular embodiments of this invention, non-limiting examples of phytosterols well known to those or ordinary skill in the art include 4-desmethylsterols β-sitosterol, campesterol, stigtnasterol, brassicasterol, 22-dehydrobrassicasterol, and Δ5-avenasterol), 4-monomethyl sterols, and 4,4-dimethyl sterols (triterpene alcohols) (e.g., cycloartenol, 24-methyl enecycloartanol, and cyclobranol).

As used herein, the phrases "stanol", "plant stanol" and "phytostanol" are synonymous. Phytostanols are saturated sterol alcohols present in only trace amounts in nature and also may be synthetically produced, such as by hydrogenation of phytosterols. According to particular embodiments of this invention, non-limiting examples of phytostanols include β-sitostanol, campestanol, cycloartanol, and saturated forms of other triterpene alcohols.

Both phytosterols and phytostanols, as used herein, include the various isomers such as the α and β isomers (e.g., α-sitosterol and β-sitostanol, which comprise one of the most effective phytosterols and phytostanols, respectively, for lowering serum cholesterol in mammals).

The phytosterols and phytostanols of the present invention also may be in their ester form. Suitable methods for deriving the esters of phytosterols and phytostanols are well known to those of ordinary skill in the art, and are disclosed in U.S. Pat. Nos. 6,589,588, 6,635,774, 6,800,317, and U.S. Patent Publication Number 2003/0045473, the disclosures of which are incorporated herein by reference in their entirety. Non-limiting examples of suitable phytosterol and phytostanol esters include sitosterol acetate, sitosterol oleate, stigmasterol oleate, and their corresponding phytostanol esters. The phytosterols and phytostanols of the present invention also may include their derivatives.

I24. Miscellaneous Additives

Other additives can be used in the MRP compositions described herein to enhance flavor characteristics that are sweet, fruity, floral, herbaceous, spicy, aromatic, pungent, "nut-like" (e.g., almond, pecan), "spicy" (e.g., cinnamon, clove, nutmeg, anise and wintergreen), "non-citrus fruit" flavor (e.g., strawberry, cherry, apple, grape, currant, tomato, gooseberry and blackberry), "citrus fruit" flavor (e.g., orange, lemon and grapefruit), and other useful flavors, including coffee, cocoa, peppermint, spearmint, vanilla and maple.

Thickening agents can be included in the compositions described herein. Examples of the thickening agents include, but are not limited to, carbomers, cellulose base materials, gums, algin, agar, pectins, carrageenan, gelatin, mineral or modified mineral thickeners, polyethylene glycol and polyalcohols, polyacrylamide and other polymeric thickeners. Thickening agents which provide stability and optimal flow characteristics of the composition are preferably used.

Emulsification agents can also be included in the compositions described herein. Suitable examples of emulsification agents include, but are not limited to, agar, albumin, alginates, casein, egg yolk, glycerol monostearate, gums, Irish moss, lecithin, and some soaps. Generally, the amount of functional ingredients in the composition may vary widely depending on the particular composition and the desired functional ingredient.

IV. Caramelization Reaction Products (CRPs) and CRP-Containing Compositions

In addition to Maillard reaction products, caramelization can occur with the compositions disclosed herein. Caramelization may sometimes cause browning in which Maillard reactions occur, but the two processes are distinct. They both are promoted by heating, but the Maillard reaction involves amino acids, as discussed above, whereas caramelization involves the pyrolysis of certain sugars. Such pyrolyzed materials are referred to caramelization reaction products (CRPs). CRPs are also included within the scope of the present embodiments. Thus, embodiments disclosed herein may include MRP(s), CRP(s), or combinations thereof.

Like the Maillard reaction, caramelization is a type of non-enzymatic browning. However, unlike the Maillard reaction, caramelization is pyrolytic, as opposed to being a reaction with amino acids. When caramelization involves the disaccharide sucrose, it is broken down into the monosaccharides fructose and glucose.

The caramelization process is temperature-dependent. Specific sugars each have their own point at which the reactions begin to proceed readily. Impurities in the sugar, such as the molasses remaining in brown sugar, greatly speed the reactions.

In certain embodiments, the present application provides methods and compositions producing caramelized products from high intensity natural sweeteners, such as steviol glycosides. This can be accomplished by heating these sweeteners at high temperatures that are sufficient to cause caramelization reactions to occur (e.g, from about 100° C. to about 250° C.). The resulting caramelized products, including caramelized steviol glycoside(s) can be further dried to a powder or made into a syrup. These embodiments provide a *Stevia* composition having a strong caramel aroma.

In certain exemplary embodiments, caramelization reaction is initiated by heating a solution comprising a carbohydrate and acid to a temperature of at least about 100° C., at least about 110° C., at least about 120° C., at least about 130° C., at least about 140° C., at least about 150° C., at least about 160° C., at least about 170° C., at least about 180° C., at least about 190° C., at least about 200° C., at least about 210° C., at least about 220° C., at least about 230° C., at least about 240° C., at least about 250° C., or any temperature range derived from any of the aforementioned temperatures.

In certain non-limiting embodiments, when utilizing fructose as a substrate, the reaction solution may be heated to a temperature between about 100° C. and 120° C. n other non-limiting embodiments, when utilizing glucose, galactose, or sucrose, the reaction solution may be heated to a temperature between about 150° C. and 170° C. When utilizing maltose, the reaction solution may be heated to a temperature between about 170° C. and 190° C.

Caratnelization reactions are also sensitive to the chemical environment. By controlling the level of acidity (pH), the reaction rate (or the temperature at which the reaction occurs readily) can be altered. The rate of caramelization is generally lowest at near-neutral acidity (pH around 7), and accelerated under both acidic especially pH below 3) and basic (especially pH above 9) conditions.

In exemplary embodiments, the method of the present invention is carried out under acid conditions. In certain embodiments, the pH of the reaction mixture is maintained between about 1.2 and about 3.0, or more particularly, between about 1.5 and about 1.8. In one embodiment, the pH of the reaction mixture is between about 1.2 and about 3.0, or more particularly, about 1.2 and about 2.0, and even more particularly, about 1.5 and about 1.8. In a particular embodiment, the pH of the reaction mixture is about 1.2, about 1.3, about 1.4, about 1.5, about 1.6, about 1.7 or about 1.8.

In one embodiment, a method for producing caramelization products (CRPs) includes the steps of: (a) providing a solution comprising a sweetening agent and an acid; (b) initiating a caramelization reaction; (d) adding ammonium and sulfite to the caramelization reaction; and (e) continuing the caramelization reaction, thereby producing one or more CRPs.

In exemplary embodiments, all ammonium and sulfite to be used in the method are added after the caramelization reaction has initiated, i.e., after step (b). In exemplary embodiments, at least a portion of the ammonium and sulfite to be utilized in the method is added before the caramelization reaction has begun, i.e., before step (b).

Caramelization can occur in the course of Maillard reaction. Exemplary caramelization reactions include, for example, equilibration of anomeric and ring forms sucrose inversion to fructose and glucose, condensation, intramolecular bonding, isomerization of aldoses to ketoses, dehydration reactions, fragmentation reactions, and unsaturated polymer formation In some embodiments, one or more of these non-volatile flavor compounds may be produced, along with unreacted sugar donor(s), unreacted amino donor(s), and may further includes caramelized substances such as disaccharides, trisaccharides, tetrasaccharides etc. formed from sugar donors, dimer-peptides, tri-peptides, tetra-peptides etc. resulting from reactions between amine donors, glycosylamine and their derivatives, such as amadori compounds, heyns compounds, enolisated compounds, sugar fragments, amino acid fragments, as well as non-volatile flavor compounds formed by Maillard reactions of sugar- and amine donors.

It should be understood that throughout this specification, when reference is made to a caramelized reaction products or CRPs, the citation is meant to be inclusive and applicable to all applications of MRPs described herein when possible or feasible, unless otherwise noted, or unless the context expressly excludes such an application.

V. Consumable Products Comprising MRP Compositions

As described in the previous section, the MRP compositions and methods described herein are useful in a wide range of orally consumable products.

In one aspect, the present application provides an orally consumable product comprising one or more MRP composition(s) of the present application described herein. The term "consumables", as used herein, refers to substances which are contacted with the mouth of man or animal, including substances, which are taken into and subsequently ejected from the mouth, substances which are drunk, eaten, swallowed or otherwise ingested, and are safe for human or animal consumption when used in a generally acceptable range.

The MRP compositions of the present application can be incorporated into any oral consumable, including but not limited to, for example, beverages and beverage products, food products or foodstuffs (e.g, confections, condiments, baked goods, cereal compositions, dairy products, chewing compositions, and tabletop sweetener compositions), pharmaceutical compositions, smoking compositions, oral hygiene compositions, dental compositions, and the like. Consumables can be sweetened or unsweetened. Consumables employing the MRP compositions of the present application are also suitable for use in processed agricultural products, livestock products or seafood; processed meat products such as sausage and the like; retort food products, pickles, preserves boiled in soy sauce, delicacies, side dishes; soups; snacks, such as potato chips, cookies, or the like; as shredded filler, leaf, stem, stalk, homogenized leaf cured and animal feed.

The MRP compositions of the present application can be added to the consumable composition to provide a sweetened consumable composition or a flavored consumable composition. As described above, the MRP composition(s) may be combined, before or after the Maillard reaction, with one or more sweetening enhancers, one or more high intensity natural sweeteners, one or more high intensity synthetic sweeteners, and/or one or more additives and/or functional ingredients described herein.

A. Beverages and Beverage Products

In some embodiments, a beverage or beverage product comprises an MRP composition of the present application or a sweetener composition comprising the same. The beverage may be sweetened or unsweetened. The composition of the present application, or sweetener composition comprising the same, may be added to a beverage to sweeten the beverage or enhance its existing sweetness or flavor profile.

A "beverage" or "beverage product," is used herein with reference to a ready-to-drink beverage, beverage concentrate, beverage syrup, or powdered beverage. Suitable ready-to-drink beverages include carbonated and non-carbonated beverages. Carbonated beverages include, but are not limited to, frozen carbonated beverages, enhanced sparkling beverages, cola, fruit-flavored sparkling beverages (e.g., lemon-lime, orange, grape, strawberry and pineapple), ginger-ale, soft drinks and root beer. Non-carbonated beverages include, but are not limited to, fruit juice, fruit-flavored juice, juice drinks, nectars, vegetable juice, vegetable-flavored juice, sports drinks, energy drinks, enhanced water drinks, enhanced water with vitamins, near water drinks (e.g., water with natural or synthetic flavorants), coconut water, tea type drinks (e.g., black tea, green tea, red tea, oolong tea), coffee, cocoa drink, broths, beverages comprising milk components (e.g., milk beverages, coffee comprising milk components, cafe au lait, milk tea, fruit milk beverages), beverages comprising cereal extracts, and smoothies. Beverages may be frozen, semi-frozen ("slush"), non-frozen, ready-to-drink, concentrated (powdered, frozen, or syrup), dairy, non-dairy, probiotic, prebiotice, herbal, non-herbal, caffeinated, non-caffeinated, alcoholic, non-alcoholic, flavored, non-flavored, vegetable-based, fruit-based, root/tuber/corm-based, nut-based, other plant-based, cola-based, chocolate-based, meat-based, seafood-based, other animal-based, algae-based, calorie enhanced, calorie-reduced, and calorie-free.

The resulting beverages may be dispensed in open containers, cans, bottles or other packaging. Such beverages and beverage preparations can be in ready-to-drink, ready-to-cook, ready-to-mix, raw, or ingredient form and can use the composition as a sole sweetener or as a co-sweetener.

A significant challenge in the beverage industry is to preserve flavor in drinks. Normally, essential oils and their fractions are used as key flavors. They are prone to be oxidized to create unpleasant flavor(s) or the components easily evaporate to cause the food or beverage to lose their initial designed flavors as they sit on shelves. The embodiments herein provide new methods and compositions to overcome those disadvantages and provide new solutions to the food and flavor industry.

Compared with conventional flavors, which are mainly preserved in different oils or oil soluble solvents, the present embodiments provide new methods to provide water soluble solutions, syrups and powders for flavoring agents.

Compared to conventional isolated flavors, often as extracts from plant or animal sources, which are not always compatible for top note flavor and/or taste when sugar replacement sweeteners are added, the current embodiments provide new types of combined multi components which are compatible for a designed flavor.

The embodiments surprisingly create sugar reduced sweeteners which have better taste than sugar including, for example, sweetening agents such as *Stevia*, monk fruit, licorice etc. and synthetic sweetener such as sucralose.

Beverage concentrates and beverage syrups can be prepared with an initial volume of liquid matrix (e.g., water) and the desired beverage ingredients. Full strength beverages are then prepared by adding further volumes of water. Powdered beverages are prepared by dry-mixing all of the beverage ingredients in the absence of a liquid matrix. Full strength beverages are then prepared by adding the full volume of water.

Beverages comprise a matrix, i.e., the basic ingredient in which the ingredients—including the MRP compositions of the present application—are dissolved. In one embodiment, a beverage comprises water of beverage quality as the matrix, such as, for example deionized water, distilled water, reverse osmosis water, carbon-treated water, purified water, demineralized water or combinations thereof, can be used. Additional suitable matrices include, but are not limited to phosphoric acid, phosphate buffer, citric acid, citrate buffer and carbon-treated water.

The beverage concentrations below can be provided by the composition of the present application or sweetener composition of the present application.

Compared with simple blends of all ingredients together, the degradation of steviol glycosides generates different compositions of sugar donors, which react with amine donors, and have interactions with the taste profile of remaining steviol glycosides, remaining added sugar donor, MRPs, and caramelized substances, thus creating complicated, compatible tastes and aromas with steviol glycosides and other flavors, and substantially enriches the stereoscopic feeling of aroma and taste profile.

Traditionally, the use of regular guar gum and other thickeners have been limited to certain applications due to their notable "beany" or "grassy" off notes in both flavor and odor. These "off notes" are the result of volatile organic compounds such as hexanal and hexanoic acid etc. These compounds can influence the sensation of many delicate flavors in food and beverage applications. The MRPs (as well as the compositions and components described herein) can modify the taste of thickeners, such as guar gum, caragum, xanthan gum etc, so that the taste is more pleasing to the consumer. The MRPs described herein could also partially or totally replace thickeners used in the food and beverage industry. There is a synergy between the MRPs and thickeners to obtain a balance of taste and cost. Use of the MRP compositions described herein can reduce the amount of thickener, antioxidants, emulsifiers etc. required when applied to food and beverages. A desired taste and aroma of a food or beverage product can be obtained by adjusting the type of steviol glycosides and ratio of reactants and reaction conditions, such as temperature, pressure, reaction time etc.

The size of bubbles in a carbonated beverage can significantly affect the mouth feel and flavor of the beverage. It is desirable to manipulate one or more properties of the bubbles produced in a beverage. Such properties can include the size of bubbles produced, the shape of bubbles, the amount of bubbles generated, and the rate at which bubbles are released or otherwise generated. Taste tests revealed a preference for carbonated beverage containing bubbles of smaller size. The inventors of the present application have surprisingly found that adding (1) MRPs, (2) MRPs with sweetening agent(s), or (3) MRPs, sweetening agent(s) and thaumatin can minimize the size of bubbles, thus improving the mouth feel and flavor of beverages. Accordingly, in some embodiments, compositions of MRPs, MRPs with sweetening agent(s), MRPs, sweetening agent(s) and thaumatin, with or without other additives, can be used as additives to manipulate the size of bubbles, preferably for reducing the size of bubbles.

The inventors surprisingly found that inclusion of thaumatin in the Maillard reaction or inclusion of thaumatin in combination of MRPs can significantly improve the overall taste profile of food and beverages to have a better mouth feel, a creamy taste, a reduction of bitterness of other ingredients in food and beverage, such as astringency of tea, protein, or their extracts, acidic nature and bitterness of coffee, etc. It can also reduce lingering, bitterness and metallic aftertaste of natural, synthetic high intensity sweeteners, or their combinations, their combination with other sweeteners, with other flavors much more than thaumatin itself. Thus, it plays a unique function in sugar reduction or sugar free products, and can be used as an additive for improving the taste performance of food and beverage products comprising one or more sweetening agents or sweeteners such as sucralose, acesulfame-K, aspartame, steviol glycosides, swingle extract, sweet tea extracts, allulose, sodium saccharin, sodium cyclamate or siratose.

A probiotic beverage normally is made by fermenting milk, or skimmed milk powder, sucrose and/or glucose with selected bacteria strains, by manufacturers such as Yakult or Weichuan. Normally, a large amount of sugar is added to the probiotic beverage to provide nutrients to the probiotics in order to keep them alive during shelf life. Actually, the main function of such a large amount of sugar is also needed to counteract the sourness of probiotic beverage and enhance its taste. Sweetness and the thickness are the two key attributes that are most affected for the acceptability of the beverage. It is a challenge for the manufacturers to produce tasteful probiotic beverages of reduced sugar versions. The inventors surprisingly found that adding compositions described herein, such as MRPs, sweetening agent(s) and MRPs, sweetening agent(s), or MRPs and thaumatin could substantially improve the overall-likeability, aroma, and mouth feel of probiotic beverages, especially for reduced sugar, or reduced fat versions. Thus embodiments of probiotic beverages include those with MRPs, combinations of MRPs and thaumatin, combinations of sweeting agent(s) and MRPs, or combination of MRPs, sweetening agent and thaumatin.

In any of the embodiments described in the present application, the final concentration of the MRP and/or sweetening agent in the beverage may be 0.0001 ppm, 0.001 ppm, 0.01 ppm, 0.1 ppm, 1 ppm, 2 ppm, 5 ppm, 10 ppm, 15 ppm, 20 ppm, 25 ppm, 30 ppm, 35 ppm, 40 ppm, 45 ppm, 50 ppm, 55 ppm, 60 ppm, 65 ppm, 70 ppm, 75 ppm, 80 ppm, 85 ppm, 90 ppm, 100 ppm, 110 ppm, 120, ppm, 130 ppm, 140 ppm, 150 ppm, 160 ppm, 170 ppm, 180 ppm, 190 ppm, 200 ppm, 220 ppm, 240 ppm, 260 ppm, 280 ppm, 300 ppm, 320 ppm, 340 ppm, 360 ppm 380 ppm, 400 ppm, 420 ppm, 440 ppm, 460 ppm, 480 ppm, 500 ppm, 525 ppm, 550 ppm, 575 ppm, 600 ppm, 625 ppm, 650 ppm, 675 ppm, 700 ppm, 725 ppm, 750 ppm, 775 ppm, 800 ppm, 825 ppm, 850 ppm, 875 ppm, 900 ppm, 925 ppm, 950 ppm, 975 ppm, 1,000 ppm, 1,200 ppm, 1,400 ppm, 1,600 ppm, 1,800 ppm, 2,000 ppm, 2,200 ppm, 2,400 ppm, 2,600 ppm, 2,800 ppm, 3,000 ppm, 3,200 ppm, 3,400 ppm, 3,600 ppm, 3,800 ppm, 4,000 ppm, 4,200 ppm, 4,400 ppm, 4,600 ppm, 4,800 ppm, 5,000 ppm, 5,500 ppm, 6,000 ppm, 6,500 ppm, 7,000 ppm, 7,500 ppm, 8,000 ppm, 8,500 ppm, 9,000 ppm, 9,500 ppm, 10,000 ppm, 11,000 ppm, 12,000 ppm, 13000 ppm, 14,000 ppm, 15,000 ppm, or a range defined by any pair of the aforementioned concentration values in this paragraph.

In more particular embodiments, the sweetening agent may be present in the beverage at a final concentration ranging from 1 ppm to 15,000 ppm, from 1 ppm to 10,000 ppm, from 1 ppm to 5,000 ppm, from 10 ppm to 1,000 ppm, from 50 ppm to 900 ppm, from 50 ppm to 600 ppm, from 50 ppm to 500 ppm, from 50 ppm to 400 ppm, from 50 ppm to 300 ppm, from 50 ppm to 200 ppm, from 100 ppm to 600 ppm, from 100 ppm to 500 ppm, from 100 ppm to 400 ppm, from 100 ppm to 300 ppm, from 100 ppm to 200 ppm, from 125 ppm to 600 ppm, from 125 ppm to 500 ppm, from 125 ppm to 400 ppm, from 125 ppm to 300 ppm, from 125 ppm to 200 ppm, from 150 ppm to 600 ppm, from 150 ppm to 500 ppm, from 150 ppm to 500 ppm, from 150 ppm to 400 ppm, from 150 ppm to 300 ppm, from 150 ppm to 200 ppm, from 200 ppm to 600 ppm, from 200 ppm to 500 ppm, from 200 ppm to 400 ppm, from 200 ppm to 300 ppm, from 300 ppm to 600 ppm, from 300 ppm to 500 ppm, from 300 ppm to 400 ppm, from 400 ppm to 600 ppm, from 500 ppm to 600 ppm, from 20 ppm to 200 ppm, from 20 ppm to 180 ppm, from 20 ppm to 160 ppm, from 20 ppm to 140 ppm, from 20 ppm to 120 ppm, from 20 ppm to 100 ppm, from 20 ppm to 80 ppm, from 20 ppm to 60 ppm, from 20 ppm to 40 ppm, from 40 ppm to 150 ppm, from 40 ppm to 130 ppm, from 40 ppm to 100 ppm, from 40 ppm to 90 ppm, from 40 ppm to 70 ppm, from 40 ppm to 50 ppm, from 20 ppm to 100 ppm, from 40 ppm to 100 ppm, from 50 ppm to 100 ppm, from 60 ppm to 100 ppm, from 80 ppm to 100 ppm, from 5 ppm to 100 ppm, from 5 ppm to 95 ppm, from 5 ppm to 90 ppm, from 5 ppm to 85 ppm, from 5 ppm to 80 ppm, from 5 ppm to 75 ppm, from 5 ppm to 70 ppm, from 5 ppm to 65 ppm, from 5 ppm to 60 ppm, from 5 ppm to 55 ppm, from 5 ppm to 50 ppm, from 5 ppm to 45 ppm, from 5 ppm to 40 ppm, from 5 ppm to 35 ppm, from 5 ppm to 30 ppm, from 5 ppm to 25 ppm, from 5 ppm to 20 ppm, from 5 ppm to 15 ppm, from 5 ppm to 10 ppm, any aforementioned concentration value in this paragraph, or a range defined by any pair of the aforementioned concentration values in this paragraph. As used herein, "final concentration" refers to the concentration of, for example, any one of the aforementioned components present in any final composition or final orally consumable product (i.e., after all ingredients and/or compounds have been added to produce the composition or to produce the orally consumable product).

B. Confections

In some embodiments, the orally consumable composition comprising an MRP composition of the present application is a confection In some embodiments, a "confection" refers to a sweet, a lollipop, a confectionery, or similar term. The confection generally contains a base composition component and a sweetener component. A "base composition" refers to any composition which can be a food item and provides a matrix for carrying the sweetener component. An MRP composition of the present application comprising the same can serve as the sweetener component. The confection may be in the form of any food that is typically perceived to be rich in sugar or is typically sweet.

In other embodiments of the present application, the confection may be a bakery product, such as a pastry, Bavarian cream, blancmange, cake, brownie, cookie, mousse and the like; a dessert, such as yogurt, a jelly, a drinkable jelly, a pudding; a sweetened food product eaten at tea time or following meals; a frozen food; a cold confection, such as ice, ice milk, lacto-ice and the like (food products in which sweeteners and various other types of raw materials are added to milk products, and the resulting mixture is agitated and frozen); ice confections, such as sherbets, dessert ices and the like (food products in which various other types of raw materials are added to a sugary liquid, and the resulting mixture is agitated and frozen); general confections, e.g., baked confections or steamed confections such as crackers, biscuits, buns with bean-jam filling, halvah, alfajor, and the like; rice cakes and snacks; table top products; general sugar confections such as chewing gum (e.g., including compositions which comprise a substantially water-insoluble, chewable gum base, such as chicle or substitutes thereof, including jetulong, guttakay rubber or certain comestible natural synthetic resins or waxes), hard candy, soft candy, mints, nougat candy, jelly beans, fudge, toffee, taffy, Swiss milk tablet, licorice candy, chocolates, gelatin candies, marshmallow, marzipan, divinity, cotton candy, and the like; sauces including fruit flavored sauces, chocolate sauces and the like; edible gels; cremes including butter cremes, flour pastes, whipped cream and the like; jams including strawberry jam, marmalade and the like; and breads including sweet breads and the like or other starch products, or combinations thereof.

Suitable base compositions for embodiments of this application may include flour, yeast, water, salt, butter, eggs, milk, milk powder, liquor, gelatin, nuts, chocolate, citric acid, tartaric acid, fumaric acid, natural flavors, artificial flavors, colorings, polyols, sorbitol, isomalt, maltitol, lactitol, malic acid, magnesium stearate, lecithin, hydrogenated glucose syrup, glycerine, natural or synthetic gum, starch, and the like, or combinations thereof. Such components generally are recognized as safe (GRAS) and/or are U.S. Food and Drug Administration (FDA)-approved.

In any of the condiments described herein, an MRP composition of the present application may be present in the condiment at a final weight concentration of 0.0001 wt %, 0.001 wt %, 0.01 wt %, 0.1 wt %, 1 wt %, 2 wt %, 3 wt %, 4 wt %, 5 wt %, 6 wt %, 7 wt %, 8 wt %. 9 wt %, 10 wt %, 11 wt %, 12 wt %, 13 wt %, 14 wt %, 15 wt %, 16 wt %, 17 wt %, 18 wt %, 19 wt %, 20 wt %, 21 wt %, 22 wt %, 23 wt %, 24 wt %, 25%, 26%, 27%, 2.8%, 29 wt %, 30 wt %, 31 wt %, 32 wt %, 33 wt %, 34 wt %, 35 wt %, 36 wt %, 37 wt %, 38 wt %, 39 wt %, 40 wt %, 41 wt %, 42 wt %, 43 wt %, 44 wt %, 45 wt %, 46 wt %, 47 wt %, 48 wt %, 49 wt %, 50 wt %, 51 wt %, 52 wt %, 53 wt %, 54 wt %, 55 wt %, 56 wt %, 57 wt %, 58 wt %, 59 wt %, 60 wt %, 61 wt %, 62 wt %, 63 wt %, 64 wt %, 65 wt %, 66 wt %, 67 wt %, 68 wt %, 69 wt %, 70 wt %, 71 wt %, 72 wt %, 73 wt %, 74 wt %, 75 wt %, 76 wt %, 77 wt %, 78 wt %, 79 wt %, 80 wt %, or a weight concentration range defined by any two of the aforementioned weight percentages in this paragraph.

In more particular embodiments, an MRP composition of the present application may be present in any of the condiments described herein at a final weight percentage range from 0.001 wt % to 99 wt %, 0.001 wt % to 75 wt %, 0.001 wt % to 50 wt %, 0.001 wt % to 25 wt %. 0.001 wt % to 10 wt %, 0.001 wt % to 5 wt %, 0.001 wt % to 2 wt %, 0,001 wt % to 1 wt %, 0.001 wt % to 0.1 wt %, 0.001 wt % to 0.01 wt %, 0.01 wt % to 99 wt %, 0.01 wt % to 75 wt %, 0.01 wt % to 50 wt %, 0.01 wt % to 25 wt %, 0.01 wt % to 10 wt %, 0.01 wt % to 5 wt %, 0.01 wt % to 2 wt %, 0.01 wt % to 1 wt %, 0.1 wt % to 99 wt %, 0.1 wt % to 75 wt %, 0.1 wt % to 50 wt %, 0.1 wt % to 25 wt %, 0.1 wt % to 10 wt %, 0.1 wt % to 5 wt %, 0.1 wt % to 2 wt %, 0.1 wt % to 1 wt %, 0.1 wt % to 0.5 wt %, 1 wt % to 99 wt %, 1 wt % to 75 wt %, 1 wt % to 50 wt %, 1 wt % to 25 wt %, 1 wt % to 10 wt %, 1 wt % to 5 wt %, 5 wt % to 99 wt %, 5 wt % to 75 wt %, 5 wt % to 50 wt %, 5 wt % to 25 wt %, 5 wt % to 10 wt %, 10 wt % to 99 wt %, 10 wt % to 75 wt %, 10 wt % to 50 wt %, 10 wt to 25 wt %, 10 wt % to 15 wt %, 20 wt to 99 wt %, 20 wt % to 75 wt %, 20 wt % to 50 wt %, 30 wt % to 99 wt %, 30 wt % to 75 wt %, 30 wt % to 50 wt %, 40 wt % to 99 wt %, 40 wt % to 75 wt %, 40 wt % to 50 wt %, 50 wt % to 99 wt %, wt % to 75 wt 60 wt % to 99 wt %, 60 wt % to 75 wt %, 70 wt % to 99 wt %, 70 wt % to 75 wt %, 80 wt % to 99 wt %, 80 wt % to 90 wt %, 90 wt % to 99 wt %, or a weight concentration range defined by any two of the aforementioned weight percentages in this paragraph.

The base composition of the confection may optionally include other artificial or natural sweeteners, bulk sweeteners, or combinations thereof. Bulk sweeteners include both caloric and non-caloric compounds. Non-limiting examples of bulk sweeteners include sucrose, dextrose, maltose, dextrin, dried invert sugar, fructose or fruit sugar, levulose, honey, unrefined sweetener, galactose, syrups, such as agave syrup or agave nectar, maple syrup, corn syrup, including high fructose corn syrup (HFCS); solids, tagatose, polyols (e.g., sorbitol, mannitol, xylitol, lactitol, erythritol, and maltitol), hydrogenated starch hydrolysates, isomalt, trehalose, or mixtures thereof. Generally, the amount of bulk sweetener present in the confection ranges widely depending on the particular embodiment of the confection and the desired degree of sweetness. Those of ordinary skill in the art will readily ascertain the appropriate amount of bulk sweetener.

C. Condiments

In some embodiments, the consumable MRP-containing composition of the present application is a condiment. Condiments, as used herein, are compositions used to enhance or improve the flavor of a food or beverage. Non-limiting examples of condiments include ketchup (catsup); mustard; barbecue sauce; butter; chili sauce; chutney; cocktail sauce; curry; dips; fish sauce; horseradish; hot sauce; jellies, jams, marmalades, or preserves; mayonnaise; peanut butter; relish; remoulade; salad dressings (e.g., oil and vinegar, Caesar, French, ranch, bleu cheese, Russian, Thousand Island, Italian, and balsamic vinaigrette), salsa; sauerkraut; soy sauce; steak sauce; syrups; tartar sauce; and Worcestershire sauce.

Condiment bases generally comprise a mixture of different ingredients, non-limiting examples of which include vehicles (e.g., water and vinegar); spices or seasonings (e.g., salt, pepper, garlic, mustard seed, onion, paprika, turmeric, or combinations thereof); fruits, vegetables, or their products (e.g., tomatoes or tomato-based products (paste, puree), fruit juices, fruit juice peels, or combinations thereof); oils or oil emulsions, particularly vegetable oils; thickeners (e.g., xanthan gum, food starch, other hydrocolloids, or combinations thereof); and emulsifying agents (e.g., egg yolk solids, protein, gum arabic, carob bean gum, guar gum, gum karaya, gum tragacanth, carageenan, pectin, propylene glycol esters of alginic acid, sodium carboxymethyl-cellulose, polysorbates, or combinations thereof). Recipes for condiment bases and methods of making condiment bases are well known to those of ordinary skill in the art.

Generally, condiments also comprise caloric sweeteners, such as sucrose, high fructose corn syrup, molasses, honey, or brown sugar. In exemplary embodiments of the condiments provided herein, an MRP composition of the present application is used instead of traditional caloric sweeteners. Accordingly, a condiment composition desirably comprises an MRP composition of the present application and a condiment base.

The condiment composition optionally may include other natural and/or synthetic high-potency sweeteners, bulk sweeteners, pH modifying agents (e.g., lactic acid, citric acid, phosphoric acid, hydrochloric acid, acetic acid, or combinations thereof), fillers, functional agents (e.g., pharmaceutical agents, nutrients, or components of a food or plant), flavoring agents, colorings, or combinations thereof.

In any of the confections described herein, an MRP composition of the present application may be present in the confection at a final weight concentration of 0.0001 wt %, 0.001 wt %, 0.01 wt %, 0.1 wt %, 1 wt %, 2 wt %, 3 wt %, 4 wt %, 5 wt %, 6 wt %, 8 wt %. 9 wt %, 10 wt %, 11 wt %, 12 wt %, 13 wt %, 14 wt %, 15 wt %, 16 wt %, 17 wt %, 18 wt 19 wt %, 20 wt %, 21 wt %, 22 wt %, 21 wt %, 24 wt %, 25 wt %, 26 wt %, 27 wt %, 28 wt %, 29 wt %, 30 wt %, 31 wt %, 32 wt %, 33 wt %, 34 wt %, 35 wt %, 36 wt %, 37 wt %, 38 wt %, 39 wt %, 40 wt %, 41 wt %, 42 wt %, 43 wt %, 44 wt %, 45 wt %, 46 wt %, 47 wt %, 48 wt %, 49 wt %, 50 wt %, 51 wt %, 52 wt %, 53 wt %, 54 wt %, 55 wt %, 56 wt %, 57 wt %, 58 wt %, 59 wt %, 60 wt %, 61 wt %, 62 wt %, 63 wt %, 64 wt %, 65 wt %, 66 wt %, 67 wt %, 68 wt %, 69 wt %, 70 wt %, 71 wt %, 72 wt %, 73 wt %, 74 wt %, 75 wt %, 76 wt %, 77 wt %, 78 wt %, 79 wt %, 80 wt %, or a weight concentration range defined by any two of the aforementioned weight percentages in this paragraph.

In more particular embodiments, an MRP composition of the present application may be present in any of the confections described herein, at a final weight percentage range from 0.001 wt % to 99 wt %, 0.001 wt % to 75 wt %, 0.001 wt % to 50 wt %, 0.001 wt % to 25 wt %. 0.001 wt % to 10 wt %, 0.001 wt % to 5 wt %, 0.001 wt % to 2 wt %, 0.001 wt % to 1 wt %, 0.001 wt % to 0.1 wt %, 0.001 wt % to 0.01 wt %, 0.01 wt % to 99 wt %, 0.01 wt % to 75 wt %, 0.01 wt %, to 50 wt %, 0.01 wt % to 25 wt %, 0.01 wt % to 10 wt %, 0.01 wt % to 5 wt %, 0.01 wt % to 2 wt %, 0.01 wt % to 1 wt %, 0.1 wt % to 99 wt %, 0.1 wt % to 75 wt %, 0.1 wt % to 50 wt %, 0.1 wt % to 25 wt %, 0.1 wt % to 10 wt %, 0.1 wt % to 5 wt %, 0.1 wt % to 2 wt %, 0.1 wt % to 1 wt %, 0.1 wt % to 0.5 wt % to 1 wt % to 99 wt %, 1 wt % to 75 wt %, 1 wt % to 50 wt %, 1 wt % to 25 wt %, 1 wt % to 10 wt %, 1 wt % to 5 wt %, 5 wt % to 99 wt %, 5 wt % to 75 wt %, 5 wt % to 50 wt %, 5 wt % to 75 wt %, 5 wt % to 10 wt %, 10 wt % to 99 wt %, 10 wt % to 75 wt %, 10 wt % to 50 wt %, 10 wt % to 25 wt %, 10 wt % to 15 wt %, 20 wt % to 99 wt %, 20 wt % to 75 wt %, 20 wt % to 50 wt %, 30 wt % to 99 wt %, 30 wt % to 75 wt %, 30 wt % to 50 wt %, 40 wt % to 99 wt %, 40 wt % to 75 wt %, 40 wt % to 50 wt %, 50 wt % to 99 wt %, 50 wt % to 75 wt %, 60 wt % to 99 wt %, 60 wt % to 75 wt %, 70 wt % to 99 wt %, 70 wt % to 75 wt %, 80 wt % to 99 wt %, 80 wt % to 90 wt %, 90 wt % to 99 wt %, or a weight concentration range defined by any two of the aforementioned weight percentages in this paragraph.

D. Dairy Products

A wide variety of dairy products can be made using the methods and MRP compositions of the present invention. Such products include without limitation, milk, whole milk, buttermilk, skim milk, infant formula, condensed milk, dried milk, evaporated milk, fermented milk, butter, clarified butter, cottage cheese, cream cheese, and various types of cheese.

In any of the solid dairy compositions described herein, an MRP composition of the present application may be present in the solid dairy composition at a final weight concentration of 0.0001 wt %, 0.001 wt %, 0.01 wt %, 0.1 wt %, 1 wt %, 2 wt %, 3 wt %, 4 wt %, 5 wt %, 6 wt %, 7 wt %, 8 wt %. 9 wt %, 10 wt %, 11 wt %, 12 wt %, 13 wt %, 14 wt %, 15 wt %, 16 wt %, 17 wt %, 18 wt %, 19 wt %, 20 wt %, 21 wt %, 22 wt %, 23 wt %, 24 wt %, 25 wt %, 26 wt %, 27 wt %, 28 wt %, 29 wt %, 10 wt %, 31 wt %, 32 wt %, 31 wt %, 34 wt % 35 wt % 36 wt %, 37 wt %, 38 wt %, 39 wt %, 40 wt %, 41 wt %, 42 wt %, 43%, 44%, 45 wt %, 46 wt %, 47 wt, 48 wt %, 49 wt %, 50 wt %, 51 wt %, 52 wt %, 53 wt %, 54 wt %, 55 wt %, 56 wt %, 57 wt %, 58 wt %, 59 wt %, 60 wt %, 61 wt %, 62 wt %, 63 wt %, 64 wt %, 65 wt %, 66 wt %, 67 wt %, 68 wt %, 69 wt %, 70 wt %, 71 wt %, 72 wt %, 73 wt %, 74 wt %, 75 wt %, 76 wt %, 77 wt %, 78 wt %, 79 wt %, 80 wt %, or a weight concentration range defined by any two of the aforementioned weight percentages in this paragraph.

In more particular embodiments, an MRP composition of the present application may be present in any of the confections described herein, at a weight percentage range from 0.001 wt % to 99 wt %, 0.001 wt % to 75 wt %, 0.001 wt % to 50 wt %, 0.001 wt % to 25 wt %, 0.001 wt % to 10 wt %, 0.001 wt % to 5 wt %, 0.001 wt % to 2 wt %, 0.001 wt % to 1 wt %, 0.001 wt to 0.1 wt %, 0.001 wt % to 0.01 wt %, 0.01 wt % to 99 wt %, 0.01 wt % to 75 wt %, 0.01 wt % to 50 wt %, 0.01 wt % to 25 wt %, 0.01 wt % to 10 wt %, 0.01 wt % to 5 wt %, 0.01 wt % to 2 wt %, 0.01 wt % to 1 wt %, 0.1 wt % to 99 wt %, 0.1 wt % to 75 wt %, 0.1 wt % to 50 wt %, 0.1 wt % to 25 wt %, 0.1 wt % to 10 wt %, 0.1 wt % to 5 wt %, 0.1 wt % to 2 wt %, 0.1 wt % to 1 wt %, 0.1 wt % to 0.5 wt %, 1 wt % to 99 wt %, 1 wt % to 75 wt %, 1 wt % to 50 wt %, 1 wt % to 25 wt %, 1 wt % to 10 wt %, 1 wt % to 5 wt %, 5 wt % to 99 wt %, 5 wt % to 75 wt %, 5 wt % to 50 wt %, 5 wt % to 25 wt %, 5 wt % to 10 wt %, 10 wt % to 99 wt %, 10 wt % to 75 wt %, 10 wt % to 50 wt %, 10 wt % to 25 wt %, 10 wt % to 15 wt %, 20 wt % to 99 wt %, 20 wt % to 75 wt %, 20 wt %, 0 to 50 wt %, 30 wt % to 99 wt %, 30 wt % to 75 wt %, 30 wt %, 0 to 50 wt %, 40 wt %, 0 to 99 wt %, 40 wt % to 75 wt %, 40 wt % to 50 wt %, 50 wt % to 99 wt %, 50 wt % to 75 wt %, 60 wt % to 99 wt %, 60 wt % to 75 wt %, 70 wt % to 99 wt %, 70 wt % to 75 wt %, 80 wt %, 0 to 99 wt %, 80 wt % to 90 wt %, 90 wt % to 99 wt %, or a weight concentration range defined by any two of the aforementioned weight percentages in this paragraph.

Alternatively, in any of the liquid dairy compositions described herein, an MRP composition of the present application may be present in the liquid dairy composition at a final concentration of 0.0001 ppm, 0.001 ppm, 0.01 ppm, 0.1 ppm, 1 ppm, 2 ppm, 5 ppm, 10 ppm, 15 ppm, 20 ppm, 25 ppm, 30 ppm, 35 ppm, 40 ppm, 45 ppm, 50 ppm, 55 ppm, 60 ppm, 65 ppm, 70 ppm, 75 ppm, 80 ppm, 85 ppm, 90 ppm, 100 ppm, 110 ppm, 120, ppm, 130 ppm, 140 ppm, 150 ppm, 160 ppm, 170 ppm, 180 ppm, 190 ppm, 200 ppm, 220 ppm, 240 ppm, 260 ppm, 280 ppm, 300 ppm, 320 ppm, 340 ppm, 360 ppm 380 ppm, 400 ppm, 420 ppm, 440 ppm, 460 ppm, 480 ppm, 500 ppm, 525 ppm, 550 ppm, 575 ppm, 600 ppm, 625 ppm, 650 ppm, 675 ppm, 700 ppm, 725 ppm, 750 ppm, 775 ppm, 800 ppm, 825 ppm, 850 ppm, 875 ppm, 900 ppm, 925 ppm, 950 ppm, 975 ppm, 1,000 ppm, 1,200 ppm, 1,400 ppm, 1,600 ppm, 1,800 ppm, 2,000 ppm, 2,200 ppm, 2,400 ppm, 2,600 ppm, 2,800 ppm, 3,000 ppm, 3,200 ppm, 3,400 ppm, 3,600 ppm, 3,800 ppm, 4,000 ppm, 4,200 ppm, 4,400 ppm, 4,600 ppm, 4,800 ppm, 5,000 ppm, 5,500 ppm, 6,000 ppm, 6,500 ppm, 7,000 ppm, 7,500 ppm, 8,000 ppm, 8,500 ppm, 9,000 ppm, 9,500 ppm, 10,000 ppm, 11,000 ppm, 12,000 ppm, 13000 ppm, 14,000 ppm, 15,000 ppm, or a range defined by any pair of the aforementioned concentration values in this paragraph.

In more particular embodiments, the MRP composition may be present in the liquid dairy composition at a final concentration ranging from 1 ppm to 15,000 ppm, from 1 ppm to 10,000 ppm, from 1 ppm to 5,000 ppm, from 10 ppm to 1,000 ppm, from 50 ppm to 900 ppm, from 50 ppm to 600 ppm, from 50 ppm to 500 ppm, from 50 ppm to 400 ppm, from 50 ppm to 300 ppm, from 50 ppm to 200 ppm, from 100 ppm to 600 ppm, from 100 ppm to 500 ppm, from 100 ppm to 400 ppm, from 100 ppm to 300 ppm, from 100 ppm to 200 ppm, from 125 ppm to 600 ppm, from 125 ppm to 500 ppm, from 125 ppm to 400 ppm, from 125 ppm to 300 ppm, from 125 ppm to 200 ppm, from 150 ppm to 600 ppm, from 150 ppm to 500 ppm, from 150 ppm to 500 ppm, from 150 ppm to 400 ppm, from 150 ppm to 300 ppm, from 150 ppm to 200 ppm, from 200 ppm to 600 ppm, from 200 ppm to 500 ppm, from 200 ppm to 400 ppm, from 200 ppm to 300 ppm, from 300 ppm to 600 ppm, from 300 ppm to 500 ppm, from 300 ppm to 400 ppm, from 400 ppm to 600 ppm, from 500 ppm to 600 ppm, from 20 ppm to 200 ppm, from 20 ppm to 180 ppm, from 20 ppm to 160 ppm, from 20 ppm to 140 ppm, from 20 ppm to 120 ppm, from 20 ppm to 100 ppm, from 20 ppm to 80 ppm, from 20 ppm to 60 ppm, from 20 ppm to 40 ppm, from 40 ppm to 150 ppm, from 40 ppm to 130 ppm, from 40 ppm to 100 ppm, from 40 ppm to 90 ppm, from 40 ppm to 70 ppm, from 40 ppm to 50 ppm, from 20 ppm to 100 ppm, from 40 ppm to 100 ppm, from 50 ppm to 100 ppm, from 60 ppm to 100 ppm, from 80 ppm to 100 ppm, from 5 ppm to 100 ppm, from 5 ppm to 95 ppm, from 5 ppm to 90 ppm, from 5 ppm to 85 ppm, from 5 ppm to 80 ppm, from 5 ppm to 75 ppm, from 5 ppm to 70 ppm, from 5 ppm to 65 ppm, from 5 ppm to 60 ppm, from 5 ppm to 55 ppm, from 5 ppm to 50 ppm, from 5 ppm to 45 ppm, from 5 ppm to 40 ppm, from 5 ppm to 35 ppm, from 5 ppm to 30 ppm, from 5 ppm to 25 ppm, from 5 ppm to 20 ppm, from 5 ppm to 15 ppm, from 5 ppm to 10 ppm, any aforementioned concentration value in this paragraph, or a range defined by any pair of the aforementioned concentration values in this paragraph.

E. Cereal Compositions

In some embodiments, the consumable comprising an MRP composition of the present application is a cereal composition. Cereal compositions typically are eaten either as staple foods or as snacks. Non-limiting examples of cereal compositions for use in some embodiments include ready-to-eat cereals as well as hot cereals. Ready-to-eat cereals are cereals which may be eaten without further processing (i.e., cooking) by the consumer. Examples of ready-to-eat cereals include breakfast cereals and snack bars. Breakfast cereals typically are processed to produce a shredded, flaky, puffy, or extruded form. Breakfast cereals generally are eaten cold and are often mixed with milk and/or fruit. Snack bars include, for example, energy bars, rice cakes, granola bars, and nutritional bars. Hot cereals generally are cooked, usually in either milk or water, before being eaten. Non-limiting examples of hot cereals include grits, porridge, polenta, rice, oatmeal, and rolled oats.

Cereal compositions generally comprise at least one cereal ingredient. As used herein, the term "cereal ingredient" denotes materials such as whole or part grains, whole or part seeds, and whole or part grass. Non-limiting examples of cereal ingredients for use in some embodiments include maize, wheat, rice, barley, bran, bran endosperm, bulgur, sorghums, millets, oats, rye, triticale, buckwheat, fonio, quinoa, bean, soybean, amaranth, teff, spelt, and kaniwa.

The cereal composition comprises an MRP composition of the present application and at least one cereal ingredient. An MRP composition of the present application may be added to the cereal composition in a variety of ways, such as, for example, as a coating, as a frosting, as a glaze, or as a matrix blend (i.e., added as an ingredient to the cereal formulation prior to the preparation of the final cereal product).

Accordingly, in some embodiments, an MRP composition of the present application is added to the cereal composition as a matrix blend. In one embodiment, the MRP composition of the present application is blended with a hot cereal prior to cooking to provide a sweetened hot cereal product. In another embodiment, an MRP composition of the present application is blended with the cereal matrix before the cereal is extruded.

In some embodiments, the MRP composition of the present application is added to the cereal composition as a coating, such as, for example, in combination with food grade oil and applying the mixture onto the cereal. In a different embodiment, an MRP composition of the present application and the food grade oil may be applied to the cereal separately, by applying either the oil or the sweetener first. Non-limiting examples of food grade oils for use some embodiments include vegetable oils such as corn oil, soybean oil, cottonseed oil, peanut oil, coconut oil, canola oil, olive oil, sesame seed oil, palm oil, palm kernel oil, or mixtures thereof. In yet another embodiment, food grade fats may be used in place of the oils, provided that the fat is melted prior to applying the fat onto the cereal.

In another embodiment, the MRP composition of the present application is added to the cereal composition as a glaze. Non-limiting examples of glazing agents for use in some embodiments include corn syrup, honey syrups and honey syrup solids, maple syrups and maple syrup solids, sucrose, isomalt, polydextrose, polyols, hydrogenated starch hydrolysate, aqueous solutions thereof, or mixtures thereof. In another such embodiment, an MRP composition of the present application is added as a glaze by combining with a glazing agent and a food grade oil or fat and applying the mixture to the cereal. In yet another embodiment, a gum system, such as, for example, gum acacia, carboxymethyl cellulose, or algin, may be added to the glaze to provide structural support. In addition, the glaze also may include a coloring agent, and also may include a flavor.

In another embodiment, an MRP composition of the present application is added to the cereal composition as a frosting. In one such embodiment, the MRP composition of the present application is combined with water and a frosting agent and then applied to the cereal. Non-limiting examples of frosting agents for use in some embodiments include maltodextrin, sucrose, starch, polyols, or mixtures thereof. The frosting also may include a food grade oil, a food grade fat, a coloring agent, and/or a flavor.

In any of the cereal compositions described herein, an MRP composition of the present application may be present in the cereal composition at a final weight concentration of 0.0001 wt %, 0.001 wt %, 0.01 wt %, 0.1 wt %, 1 wt %, 2 wt %, 3 wt %, 4 wt %, 5 wt %, 6 wt %, 7 wt %, 8 wt %. 9 wt %, 10 wt %, 11 wt %, 12 wt %, 13 wt %, 14 wt %, 15 wt %, 16 wt %, 17%, 18 wt %, 19 wt %, 20 wt %, 21 wt %, 22 wt %, 23 wt %, 24 wt %, 25 wt %, 26 wt %, 27 wt %, 28 wt %, 29 wt %, 30 wt %, 31 wt %, 32 wt %, 33 wt %, 34 wt %, 35 wt %, 36 wt %, 37 wt %, 38 wt %, 39 wt %, 40 wt %, 41 wt %, 42 wt %, 43 wt %, 44 wt %, 45 wt %, 46 wt %, 47 wt %, 48 wt %, 49 wt %, 50 wt %, 51 wt %, 52 wt %, 53 wt %, 54 wt %, 55 wt %, 56 wt %, 57 wt %, 58 wt %, 59 wt %, 60 wt %, 61 wt %, 62 wt %, 63 wt %, 64 wt %, 65 wt %, 66 wt %, 67 wt %, 68 wt %, 69 wt, %, 70 wt %, 71 wt %, 72 wt %, 73 wt %, 74 wt %, 75 wt %, 76 wt %, 77 wt %, 78 wt %, 79 wt %, 80 wt %, or a weight concentration range defined by any two of the aforementioned weight percentages in this paragraph.

In more particular embodiments, an MRP composition of the present application may be present in any of the cereal compositions described herein, at a weight percentage range from 0.001 wt % to 99 wt %, 0.001 wt % to 75 wt %, 0.001 wt % to 50 wt %, 0.001 wt % to 25 wt %, 0.001 wt % to 10 wt %, 0.001 wt % to 5 wt %, 0.001 wt % to 2 wt %, 0.001 wt % to 1 wt %, 0.001 wt % to 0.1 wt %, 0.001 wt % to 0.01 wt %, 0.01 wt % to 99 wt %, 0.01 wt % to 75 wt %, 0.01 wt % to 50 wt %, 0.01 wt % to 25 wt %, 0.01 wt % to 10 wt %, 0.01 wt % to 5 wt %, 0.01 wt % to 2 wt %, 0.01 wt % to 1 wt %, 0.1 wt % to 99 wt %, 0.1 wt % to 75 wt %, 0.1% to 50 wt %, 0.1 wt % to 25 wt %, 0.1 wt %, 10 wt %, 0.1 wt % to 5 wt %, 0.1% to 2 wt %, 0.1 wt % to 1 wt %, 0.1 wt % to 0.5 wt %, 1 wt % to 99 wt %, 1 wt % to 75 wt %, 1 wt % to 50 wt %, 1 wt % to 25 wt %, 1 wt % to 10 wt %, 1% to 5 wt %, 5 wt % to 99 wt %, 5 wt % to 75 wt %, 5 wt % to 50 wt %, 5 wt % to 25 wt %, 5 wt % to 10 wt %, 10 wt % to 99 wt %, 10 wt % to 75 wt %, 10 wt % to 50%, 10 wt % to 25 wt %, 10 wt % to 15 wt %, 20 wt % to 99 wt %, 20 wt % to 75 wt %, 20 wt % to 50 wt %, 30 wt % to 99 wt %, 30 wt % to 75 wt %, 30 wt % to 50 wt %, 40 wt % to 99 wt %, 40 wt % to 75 wt %, 40 wt % to 50 wt %, 50 wt % to 99 wt %, 50 wt % to 75 wt %, 60 wt % to 99 wt %, 60 wt % to 75 wt %, 70 wt % to 99 wt %, 70 wt %, 0 to 75 wt %, 80 wt % to 99 wt %, 80 wt % to 90 wt %, 90 wt % to 99 wt %, or a weight concentration range defined by any two of the aforementioned weight percentages in this paragraph.

F. Chewing Compositions

In some embodiments, the consumable comprising an MRP composition of the present application is a chewing composition. The term "chewing compositions" include chewing gum compositions, chewing tobacco, smokeless tobacco, snuff, chewing gum and other compositions which are masticated and subsequently expectorated.

Chewing gum compositions generally comprise a water-soluble portion and a water-insoluble chewable gum base portion. The water soluble portion, which typically includes an MRP composition of the present application, dissipates with a portion of the flavoring agent over a period of time during chewing while the insoluble gum base portion is retained in the mouth. The insoluble gum base generally determines whether a gum is considered chewing gum, bubble gum, or a functional gum.

The insoluble gum base, which is generally present in the chewing gum composition in an amount in the range of about 15 to about 35 weight percent of the chewing gum composition, generally comprises combinations of elastomers, softeners (plasticizers), emulsifiers, resins, and fillers. Such components generally are considered food grade, recognized as safe (GRA), and/or are U.S. Food and Drug Administration (FDA)-approved.

Elastomers, the primary component of the gum base, provide the rubbery, cohesive nature to gums and can include one or more natural rubbers (e.g., smoked latex, liquid latex, or guayule); natural gums (e.g., jelutong, perillo, sorva, massaranduba balata, massaranduba chocolate, nispero, rosindinha, chicle, and gutta hang kang); or synthetic elastomers (e.g., butadiene-styrene copolymers, isobutylene-isoprene copolymers, polybutadiene, polyisobutylene, and vinyl polymeric elastomers). In a particular embodiment, the elastomer is present in the gum base in an amount in the range of about 3 to about 50 weight percent of the gum base.

Resins are used to vary the firmness of the gum base and aid in softening the elastomer component of the gum base. Non-limiting examples of suitable resins include a rosin ester, a terpene resin (e.g., a terpene resin from α-pinene, β-pinene and/or D-limonene), polyvinyl acetate, polyvinyl alcohol, ethylene vinyl acetate, and vinyl acetate-vinyl laurate copolymers. Non-limiting examples of rosin esters include a glycerol ester of a partially hydrogenated rosin, a glycerol ester of a polymerized rosin, a glycerol ester of a partially dimerized rosin, a glycerol ester of rosin, a pentaerythritol ester of a partially hydrogenated rosin, a methyl ester of rosin, or a methyl ester of a partially hydrogenated rosin. In some embodiment, the resin is present in the gum base in an amount in the range of about 5 to about 75 weight percent of the gum base.

Softeners, which also are known as plasticizers, are used to modify the ease of chewing and/or mouth feel of the chewing gum composition. Generally, softeners comprise oils, fats, waxes, and emulsifiers. Non-limiting examples of oils and fats include tallow, hydrogenated tallow, large, hydrogenated or partially hydrogenated vegetable oils (e.g., soybean, canola, cottonseed, sunflower, palm, coconut, corn, safflower, or palm kernel oils), cocoa butter, glycerol monostearate, glycerol triacetate, glycerol abietate, lecithin, monoglycerides, diglycerides, triglycerides acetylated monoglyceri des, and free fatty acids. Non-limiting examples of waxes include polypropylene/polyethylene/Fisher-Tropsch waxes, paraffin, and microcrystalline and natural waxes (e.g., candelilia, beeswax and carnauba). Microcrystalline waxes, especially those with a high degree of crystallinity and a high melting point, also may be considered as bodying agents or textural modifiers. In some embodiments, the softeners are present in the gum base in an amount in the range of about 0.5 to about 25 weight percent of the gum base.

Emulsifiers are used to form a uniform dispersion of the insoluble and soluble phases of the chewing gum composition and also have plasticizing properties. Suitable emulsifiers include glycerol monostearate (GMS), lecithin (phosphatidyl choline), polyglycerol polyricinoleic acid (PPGR), mono and diglycerides of fatty acids, glycerol distearate, tracetin, acetylated monoglyceride, glycerol triacetate, and magnesium stearate. In some embodiments, the emulsifiers are present in the gum base in an amount in the range of about 2 to about 30 weight percent of the gum base.

The chewing gum composition also may comprise adjuvants or fillers in either the gum base and/or the soluble portion of the chewing gum composition. Suitable adjuvants and fillers include lecithin, inulin, polydextrin, calcium carbonate, magnesium carbonate, magnesium silicate, ground limestone, aluminum hydroxide, aluminum silicate, talc, clay, alumina, titanium dioxide, and calcium phosphate. In some embodiments, lecithin can be used as an inert filler to decrease the stickiness of the chewing gum composition. In other some embodiments, lactic acid copolymers, proteins (e.g., gluten and/or zein) and/or guar can be used to create a gum that is more readily biodegradable. The adjuvants or fillers are generally present in the gum base in an amount up to about 20 weight percent of the gum base. Other optional ingredients include coloring agents, whiteners, preservatives, and flavors.

In some embodiments of the chewing gum composition, the gum base comprises about 5 to about 95 weight percent of the chewing gum composition, more desirably about 15 to about 50 weight percent of the chewing gum composition, and even more desirably from about 20 to about 30 weight percent of the chewing gum composition.

The soluble portion of the chewing gum composition may optionally include other artificial or natural sweeteners, bulk sweeteners, softeners, emulsifiers, flavoring agents, coloring agents, adjuvants, fillers, functional agents (e.g., pharmaceutical agents or nutrients), or combinations thereof. Suitable examples of softeners and emulsifiers are described above.

Bulk sweeteners include both caloric and non-caloric compounds. Non-limiting examples of bulk sweeteners include sucrose, dextrose, maltose, dextrin, dried invert sugar, fructose, high fructose corn syrup, levulose, galactose, corn syrup solids, tagatose, polyols (e.g., sorbitol, mannitol, xylitol, lactitol, erythritol, and maltitol), hydrogenated starch hydrolysates, isomalt, trehalose, or mixtures thereof. In some embodiments, the bulk sweetener is present in the chewing gum composition in an amount in the range of about 1 to about 75 weight percent of the chewing gum composition.

Flavoring agents may be used in either the insoluble gum base or soluble portion of the chewing gum composition. Such flavoring agents may be natural or artificial flavors. In some embodiments, the flavoring agent comprises an essential oil, such as an oil produced from a plant or a fruit, peppermint oil, spearmint oil, other mint oils, clove oil, cinnamon oil, oil of wintergreen, bay, thyme, cedar leaf, nutmeg, allspice, sage, mace, and almonds. In another embodiment, the flavoring agent comprises a plant extract or a fruit essence such as apple, banana, watermelon, pear, peach, grape, strawberry, raspberry, cherry, plum, pineapple, apricot, or mixtures thereof. In still another embodiment, the flavoring agent comprises a citrus flavor, such as an extract, essence, or oil of lemon, lime, orange, tangerine, grapefruit, citron, or kumquat.

In some embodiments, the chewing gum composition comprises an MRP composition of the present application and a gum base.

In any of the chewing gum compositions described herein, an MRP composition of the present application may be present in the chewing gum composition at a final weight concentration of 0.0001 wt %, 0.001 wt %, 0.01 wt %, 0.1 wt %, 1 wt %, 2 wt %, 3 wt %, 4 wt %, 5 wt %, 6 wt %, 7 wt %, 8 wt %. 9 wt %; 10 wt %; 11 wt %, 12 wt %, 13 wt %, 14 wt %, 15 wt %, 16 wt %, 17 wt %, 18 wt %, 19 wt %, 20 wt %, 21 wt %, 22 wt %, 23 wt %, 24 wt %, 25 wt %, 26 wt %, 27 wt %, 28 wt %, 29 wt %, 30 wt %, 31 wt %, 32 wt %, 33 wt %, 34 wt %, 35 wt %, 36 wt %, 37 wt %, 38 wt %, 39 wt %, 40 wt %, 41 wt %, 42 wt %, 43 wt %, 44 wt %, 45 wt %, 46 wt %, 47 wt %, 48 wt %, 49 wt %, 50 wt %, 51 wt %, 52 wt %, 53 wt %, 54 wt %, 55 wt %, 56 wt %, 57 wt %, 58 wt %, 59 wt %, 60 wt %, 61 wt %, 62 wt %, 63 wt %, 64 wt %, 65 wt %, 66 wt %, 67 wt %, 68 wt %, 69 wt %, 70 wt %, 71 wt %, 72 wt %, 73 wt %, 74 wt %, 75 wt %, 76 wt %, 77 wt %, 78 wt %, 79 wt %, 80 wt %, or a weight concentration range defined by any two of the aforementioned weight percentages in this paragraph.

In more particular embodiments, an MRP composition of the present application may be present in any of the chewing gum compositions described herein, at a weight percentage range from 0.001 wt to 99 wt %, 0.001 wt % to 75 wt %, 0.001 wt % to 50 wt %, 0.001 wt % to 25 wt %. 0.001 wt % to 10 wt %, 0.001 wt % to 5 wt %, 0.001 wt % to 2 wt %, 0.001 wt % to 1 wt %, 0.001 wt % to 0.1 wt %, 0.001 wt % to 0.01 wt %, 0.01 wt % to 99 wt %, 0.01 wt % to 75 wt %, 0.01 wt % to 50 wt %, 0.01 wt % to 25 wt %, 0.01 wt % to 10 wt %, 0.01 wt % to 5 wt %, 0.01 wt % to 2 wt %, 0.01 wt % to 1 wt %, 0.1 wt % to 99 wt %, 0.1 wt % to 75 wt %, 0.1 wt % to 50 wt %, 0.1 wt % to 25 wt %, 0.1 wt % to 10 wt %, 0.1 wt % to 5 wt %, 0.1 wt % to 2 wt %, 0.1 wt % to 1 wt %, 0.1 wt % to 0.5 wt %, 1 wt % to 99 wt %, 1 wt % to 75 wt %, 1 wt % to 50 wt %, 1 wt % to 2.5 wt %, 1 wt % to 10 wt %, 1 wt % to 5 wt %, 5 wt % to 99 wt %, 5 wt % to 75 wt %, 5 wt % to 50 wt %, 5 wt % to 25 wt %, 5 wt % to 10 wt %, 10 wt % to 99 wt %, 10 wt % to 75 wt %, 10 wt to 50 wt %, 10 wt % to 25 wt %, 10 wt % to 15 wt %, 20 wt % to 99 wt %, 20 wrt % to 75 wt %, 20 wt % to 50 wt %, 30 wt % to 99 wt %, 30 wt % to 75 wt %, 30 wt % to 50 wt %, 40 wt % to 99 wt %, 40 wt % to 75 wt %, 40 wt % to 50 wt %, 50 wt % to 99 wt %, 50 wt % to 75 wt %, 60 wt % to 99 wt %, 60 wt % to 75 wt %, 70 wt % to 99 wt %, 70 wt % to 75 wt %, 80 wt % to 99 wt %, 80 wt % to 90 wt %, 90 wt % to 99 wt %, or a weight concentration range defined by any two of the aforementioned weight percentages in this paragraph.

G. Tabletop Sweetener Compositions

In general, tabletop sugar replacements lack certain taste attributes associated with sugar, especially for solid tabletop sweeteners. In addressing this need, the inventor of the present application has developed more palatable tabletop sugar replacements than commonly known. Specifically, in some embodiments, the present application provides an orally consumable composition comprising an MRP composition of the present application in the form of an orally consumable tabletop sweetener composition. In one embodiment, the orally consumable tabletop sweetener composition has a taste similar to molasses (Example 241).

In some embodiments, the tabletop sweetener replacement includes one or more *Stevia*-based MRP compositions utilizing glycosylated steviol glycosides as described in the present application. Compared with standard steviol glycosides, such as RA50SG95 and RA80SG95, adding MRPs or S-MRPs in tabletop sweeteners can tastefully enhance, for example, the flavor of tea or coffee. Similarly, these MRPs or S-MRPs can play a similar role when applied to powdered beverages.

In some embodiments, the tabletop sweetener composition may further include at least one bulking agent, additive, anti-caking agent, functional ingredient or combination thereof.

Suitable "bulking agents" include, but are not limited to, maltodextrin (10 DE, 18 DE, or 5 DE), corn syrup solids (20 or 36 DE), sucrose, fructose, glucose, invert sugar, sorbitol, xylose, ribulose, mannose, xylitol, mannitol, galactitol, erythritol, maititol, lactitol, isomalt, maltose, tagatose, lactose, inulin, glycerol, propylene glycol, polyols, polydextrose, fructooligosaccharides, cellulose and cellulose derivatives, and the like, or mixtures thereof. Additionally, in accordance with still other embodiments of the application, granulated sugar (sucrose) or other caloric sweeteners such as crystalline fructose, other carbohydrates, or sugar alcohol can be used as a bulking agent due to their provision of good content uniformity without the addition of significant calories.

As used herein, the phrase "anti-caking agent" and "flow agent" refers to any composition which assists in content uniformity and uniform dissolution. in some embodiments, non-limiting examples of anti-caking agents include cream of tartar, aluminium silicate (Kaolin), calcium aluminium silicate, calcium carbonate, calcium silicate, magnesium carbonate, magnesium silicate, mono-, di- and tri-calcium orthophosphate, potassium aluminium silicate, silicon dioxide, soldium aluminium silicate, salts of steatic acid, microcrystalline cellulose (Avicel, FMC BioPolymer, Philadelphia, Pa.), and tri calcium phosphate. In one embodiment, the anti-caking agents are present in the tabletop sweetener composition in an amount from about 0.001 to about 3% by weight of the tabletop sweetener composition.

The tabletop sweetener compositions can be packaged in any form known in the art. Non-limiting forms include, but are not limited to, powder form, granular form, packets, tablets, sachets, pellets, cubes, solids, and liquids.

In one embodiment, the tabletop sweetener composition is a single-serving (portion control) packet comprising a dry-blend. Dry-blend formulations generally may comprise powder or granules. Although the tabletop sweetener composition may be in a packet of any size, an illustrative non-limiting example of conventional portion control tabletop sweetener packets are approximately 2.5 by 1.5 inches and hold approximately 1 gram of a sweetener composition having a sweetness equivalent to 2 teaspoons of granulated sugar 8 g). The amount of an MRP composition of the present application in a dry-blend tabletop sweetener formulation can vary. In some embodiments, a dry-blend tabletop sweetener formulation may comprise a Composition of the present application in an amount from about 1% (w/w) to about 10% (w/w) of the tabletop sweetener composition, Solid tabletop sweetener embodiments include cubes and tablets. A non-limiting example of conventional cubes is equivalent in size to a standard cube of granulated sugar, which is approximately 2,2×2.2×2.2 $cm^3$ and weighs approximately 8 g. In one embodiment, a solid tabletop sweetener is in the form of a tablet or any other form known to those skilled in the art.

A tabletop sweetener composition also may be embodied in the form of a liquid, wherein an MRP composition of the present application is combined with a liquid carrier. Suitable non-limiting examples of carrier agents for liquid tabletop sweeteners include water, alcohol, polyol, glycerin base or citric acid base dissolved in water, or mixtures thereof. The sweetness equivalent of a tabletop sweetener composition for any of the forms described herein or known in the art may be varied to obtain a desired sweetness profile. For example, a tabletop sweetener composition may have a degree of sweetness comparable to that of an equivalent amount of standard sugar. In another embodiment, the tabletop sweetener composition may comprise a sweetness of up to 100 times that of an equivalent amount of sugar. In another embodiment, the tabletop sweetener composition may comprise a sweetness of up to 90 times, 80 times, 70 times, 60 times, 50 times, 40 times, 30 times, 20 times, 10 times, 9 times, 8 times, 7 times, 6 times, 5 times, 4 times, 3 times, and 2 times that of an equivalent amount of sugar.

In any of the tabletop sweetener compositions described herein, an MRP composition of the present application may be present in the tabletop sweetener composition at a final weight concentration of 0.0001 wt %, 0.001 wt %; 0.01 wt %, 0.1 wt %, 1 wt %; 2 wt %; 3 wt %, 4 wt %, 5 wt %, 6 wt %, 7 wt %, 8 wt %, 9 wt %, 10 wt %, 11 wt %, 12 wt %, 13 wt %, 14 wt %, 15 wt %, 16 wt %, 17 wt %, 18 wt %, 19 wt %, 20 wt %, 21 wt %, 22 wt %, 23 wt %, 24 wt %, 25 wt %, 26 wt %, 27 wt %, 28 wt %, 29 wt %, 30 wt %, 31 wt %, 32 wt %, 33 wt %, 34 wt %, 35 wt %, 36 wt %, 37 wt %, 38 wt %, 39 wt %, 40 wt %, 41 wt %, 42 wt %, 43 wt %, 44 wt %, 45 wt %, 46 wt %, 47 wt %, 48 wt %, 49 wt %, 50 wt %, 51 wt %, 52 wt %, 53 wt %, 54 wt %, 55 wt %, 56 wt %, 57 wt %, 58 wt %, 59 wt %, 60 wt %, 61 wt %, 62 wt %, 63 wt %, 64 wt %, 65 wt %, 66 wt %, 67 wt %, 68 wt %, 69 wt %, 70 wt %, 71 wt %, 72 wt %, 73 wt %, 74 wt %, 75 wt %, 76 wt %, 77 wt %, 78 wt %, 79 wt %, 80 wt %, 81 wt %, 82 wt %, 83 wt %, 84 wt %, 85 wwt %, 86 wt %, 87 wt %, 88 wt %, 89 wt %, 90 wt %, 91 wt %, 92 wt %, 93 wt %, 94 wt %, 95 wt %, 96 wt %, 97 wt %, 98 wt %, 99 wt %, or 100 wt %, or a weight concentration range defined by any two of the aforementioned weight percentages in this paragraph.

In more particular embodiments, an MRP composition of the present application may be present in any of the tabletop sweetener compositions described herein, at a weight percentage range from 0.001 wt % to 99 wt %, 0.001 wt % to 75 wt %, 0.001 wt % to 50 wt %, 0.001 wt % to 25 wt %. 0.001 wt % to 10 wt %, 0,001 wt % to 5 wt %, 0.001 wt % to 2 wt %, 0.001 wt % to 1 wt %, 0.001 wt % to 0.1 wt %, 0.001 wt % to 0.01 wt %, 0.01 wt % to 99 wt %, 0.01 wt % to 75 wt %, 0.01 wt % to 50 wt %, 0.01 wt % to 25 wt %, 0.01 wt % to 10 wt %, 0.01 wt % to 5 wt %, 0.01 wt % to 2 wt %, 0.01 wt % to 1 wt %, 0.1 wt % to 99 wt %, 0.1 wt % to 75 wt %, 0.1 wt % to 50 wt %, 0.1 wt. % to 25 wt %, 0.1 wt % to 10 wt %, 0.1 wt % to 5 wt %, 0.1 wt % to 2 wt %, 0.1 wt % to 1 wt %, 0.1 wt % to 0.5 wt %, 1 wt % to 99 wt %, 1 wt % to 75 wt %, 1 wt % to 50 wt %, 1 wt % to 25 wt %, 1 wt % to 10 wt %, 1 wt % to 5 wt %, 5 wt % to 99 wt %, 5 wt % to 75 wt %, 5 wt % to 50 wt %, 5 wt % to 25 wt %, 5 wt % to 10 wt %, 10 wt % to 99 wt %, 10 wt % to 75 wt %, 10 wt % to 50 wt %, 10 wt % to 25 wt %, 10 wt % to 15 wt %, 20 wt % to 99 wt %, 20 wt % to 75 wt %, 20 wt % to 50 wt %, 30 wt % to 99 wt %, 30 wt % to 75 wt %, 30 wt % to 50 wt %, 40 wt % to 99 wt %, 40 wt % to 75 wt %, 40 wt % to 50 wt %, 50 wt % to 99 wt %, 50 wt % to 75 wt %, 60 wt % to 99 wt %, 60 wt % to 75 wt %, 70 wt % to 99 wt %, 70 wt % to 75 wt %, 80 wt % to 99 wt %, 80 wt % to 90 wt %, 90 wt % to 99 wt %, or a weight concentration range defined by any two of the aforementioned weight percentages in this paragraph.

H. Medicinal Compositions

In certain embodiments, the MRP compositions of the present application may be used in medicinal compositions. As used herein, the term "medicinal composition" includes solids, gases and liquids which are ingestible materials having medicinal value, such as cough syrups, cough drops, medicinal sprays, vitamins, and chewable medicinal tablets that are administered orally or used in the oral cavity in the form of e.g., a pill, tablet, spray, capsule, syrup, drop, troche agent, powder, and the like.

I. Oral Hygiene Compositions

In some embodiments, the MRP compositions of the present application may be used in an oral hygiene composition. As used herein, the "oral hygiene composition" includes mouthwashes, mouth rinses, breath fresheners, toothpastes, tooth polishes, dentifrices, mouth sprays, teeth whitening agents, soaps, perfumes, and the like.

J. Cosmetic Compositions

In some embodiments, the MRP compositions of the present application may be utilized in a cosmetic composition for enhancing the aroma of a cosmetic or skin-care product. As used herein, the term "cosmetic composition" means a composition that is formulated for topical application to skin, which has a pleasant colour, odour and feel, and which does not cause unacceptable discomfort (stinging, tautness or redness) liable to discourage the consumer from using it.

Cosmetic composition may be preferably formulated in the form of an emulsion, e.g., W/O (water-in-oil), O/W (oil-in-water), W/O/W (water-in-oil-in-water), O/W/O (oil-in-water-in-oil) emulsion, PIT emulsion, Pickering emulsion, emulsion with a low oil content, micro- or nanoemulsion, a solution, e.g., in oil (fatty oils or fatty acid esters, in particular $C_6$-$C_{32}$ fatty acid $C_2$-$C_{30}$ esters) or silicone oil, dispersion, suspension, creme, lotion or milk, depending on the production method and ingredients, a gel (including hydrogel, hydrodispersion gel, oleogel), spray (e.g., pump spray or spray with propellant) or a foam or an impregnating solution for cosmetic wipes, a detergent, e.g., soap, synthetic detergent, liquid washing, shower and bath preparation, bath product (capsule, oil, tablet, salt, bath salt, soap, etc.), effervescent preparation, a skin care product such as e.g., an emulsion (as described above), ointment, paste, gel (as described above), oil, balsam, serum, powder (e.g., face powder, body powder), a mask, a pencil, stick, roll-on, pump, aerosol (foaming, non-foaming or post-foaming), a deodorant and/or antiperspirant, mouthwash and mouth rinse, a foot care product (including keratolytic, deodorant), an insect repellent, a sunscreen, aftersun preparation, a shaving product, aftershave balm, pre- and aftershave lotion, a depilatory agent, a hair care product such as e.g., shampoo (including 2-in-1 shampoo, anti-dandruff shampoo, baby shampoo, shampoo for dry scalps, concentrated shampoo), conditioner, hair tonic, hair water, hair rinse, styling creme, pomade, perm and setting lotion, hair spray, styling aid (e.g., gel or wax), hair smoothing agent (detangling agent, relaxer), hair dye such as e.g., temporary direct-dyeing hair dye, semi-permanent hair dye, permanent hair dye, hair conditioner, hair mousse, eye care product, make-up, make-up remover or baby product.

K. Smokable Compositions

In some embodiments, the MRP compositions of the present application may be used in a smokable composition. The term "smokable composition," as used herein, includes any material that can be smoked or inhaled, such as tobacco and cannabis, as well as any smokable material that is burned to provide desirable aromas (e.g., charcoal briquettes for grilling foods, incense etc). The smoking compositions may encompass cigarettes, electronic cigarettes (e-cigarettes), cigars, pipe and cigar tobacco, chew tobacco, vaporizable liquids, and all forms of tobacco such as shredded filler, leaf, stem, stalk, homogenized leaf cured, reconstituted binders, reconstituted tobacco from tobacco dust, fines, or other sources in sheet, pellet or other forms. "Smokable compositions" also include cannabis compositions (e.g., flower materials, leaf materials, extracts, oils, edible candies, vaporizable liquids, cannabis-infused beverages, etc.) and tobacco substitutes formulated from non-tobacco materials.

VI. Use of the MRP Compositions

The compositions and methods described herein are useful in a wide range of orally consumable products. A non-limiting outline of products for application of the MRP compositions described herein includes the following:

1 Dairy Products
1.1 Milk and dairy—based drinks
Milk and buttermilk
Buttermilk (plain)
Dairy based drinks, flavored and/or fermented
1.2 Fermented, renneted milk products (excluding drinks)
1.3 Condensed milk and analogues
Condensed milk (plain)
Beverage whiteners
1.4 Cream (plain) and similar products
Pasteurized cream
Sterilized, UHT, whipping or whipped and reduced-fat creams
Clotted cream
Cream analogues
1.5 Milk or cream powders
Milk or cream powders
Milk or cream powders analogues
1.6 Cheese
Unripened cheese
Ripened cheese
Whey cheese
Processed cheese
Cheese analogues
1.7 Dairy-based desserts (e.g., ice cream, ice milk, pudding, fruit or flavored yogurt)
1.8 Whey and whey products, excluding whey cheese
2 Fats and oils and fat emulsions (type water-in-oil)
2.1 Fats and oils essentially free from water
2.2. Fat emulsions, water-in-oil
2.3 Fat emulsions other than 2.2, including mixed and/or flavored products based on fat emulsions.
2.4 Fat-based desserts (excluding dairy-based desserts)
3 Edible ices, including sherbet and sorbet
4. Fruits and vegetables (including mushrooms and fungi, roots and tubers, pulses and legumes) and nuts and seeds
4.1 Fruit
4.1.1 Fresh fruit
Untreated fruit
Surface—treated fruit
Peeled or cut fruit
4.1.2 Processed fruit
Frozen fruit
Dried fruit
Fruit in vinegar, oil or brine
Canned or bottled (pasteurized) fruit
Jams, jellies and marmalades
Fruit—based spread
Candied fruit
Fruit preparations, including pulp and fruit toppings
Fruit-based desserts, including fruit-flavored water-based desserts
Fermented fruit products
Fruit fillings for pastries
Cooked or fried fruits
4.2 Vegetables (including mushrooms and fungi, roots and tubers, pulses and legumes) and nuts and seeds
4.2.1 Fresh vegetables
Untreated vegetables
Surface treated vegetables
Peeled or cut vegetables
4.2.2 Processed vegetable and nuts and seeds
Frozen vegetable
Dried vegetables
Vegetables in vinegar, oil or brine
Canned or bottled (pasteurized) vegetables
Vegetable, nut and seed purees and spreads
Vegetable, nut and seed pulps and preparations
Fermented vegetable products
Cooked or fried vegetables
5 Confectionery
5.1 Cocoa products and chocolate products, including imitations and chocolate substitutes
Cocoa mixes (powder and syrups)
Cocoa based spreads, including fillings
Cocoa and chocolate products (e.g., milk chocolate bars, chocolate flakes, white chocolate)
Imitation chocolate and chocolate substitute products
5.2 Sugar-based confectionery other than 5.1, 5.3 and 5.4, including hard and soft candy and nougats
5.3 Chewing gum
5.4 Decorations (e.g., for fine bakery wares), toppings (non-fruit) and sweet sauces
6 Cereals and cereal products, including flours and starches from roots and tubers, and pulses and legumes, excluding bakery wares
Whole, broken or flaked grain, including rice
Flours and starches
Breakfast cereals, including rolled oats
Pastas and noodles Cereals and starch-based desserts (e.g., rice pudding, tapioca pudding)

Batters (e.g., for fish or poultry)

7 Bakery wares 7.1 Bread and ordinary bakery wares

Breads and rolls

Crackers, excluding sweet crackers

Other ordinary bakery products e.g, bagels, pitta, English muffins)

Bread-type products, including bread stuffing and breadcrumbs 7.2 Fine bakery wares Cakes, cookies and pies (e.g., fruit-filled or custard types)

Other fine bakery products (e.g., doughnuts, sweet rolls, scones and muffins)

Mixes for fine bakery wares (e.g., cakes, pancakes)

8 Meat and meat products, including poultry and game 8.1 Fresh meat, poultry and game Fresh meat, poultry and game, whole pieces or cuts Fresh meat, poultry and game, comminuted 8.2 Processed meat, poultry and game products in whole pieces or cuts 8.3 Processed comminuted meat, poultry and game products 8.4 Edible casings (e.g., sausage casings)

9 Fish and fish products, including mollusks, crustaceans and echinoderms 9.1 Fish and fish products 9.2 Processed fish and fish products 9.3 Semi-preserved fish and fish products 9.4 Fully preserved fish and fish products 10 Eggs and egg products 10.1 Fresh egg 10.2 Egg products 10.3 Preserved eggs 10.4 Egg-based desserts 11 Sweeteners, including honey 11.1 White and semi-white sugar (sucrose or sacharose), fructose, glucose (dextrose), xylose, sugar solutions and syrups, and (partially) inverted sugars, including molasses, treacle and sugar toppings.

11.2 Other sugar and syrups (e.g., brown sugar, maple syrup)

11.3 Honey 11.4 Table—top sweeteners, including those containing high-intensity sweeteners, other than 11.1-11.3

12 Salt, spices, soups, sauces, salads, protein products, etc 12.1 Salt 12.2 Herbs, spices, seasonings (including salt substitutes) and condiments 12.3 Vinegars 12.4 Mustards 12.5 Soups and broths Ready-to-eat soups and broths, including canned, bottled and frozen Mixes for soups and broths 12.6 Sauces and similar products Emulsified sauces (e.g., mayonnaise, salad dressing)

Non-emulsified sauces (e.g., ketchup, cheese sauce, cream sauce, brown gravy)

Mixes for sauces and gravies 12.7 Salads macaroni salad, potato salad) and sandwich spreads (excluding cocoa- and nut-based spreads)

12.8 Yeast 12.9 Protein products

13 Foodstuffs intended for particular nutritional uses 13.1 Infant formulae and follow-up formulae 13.2 Foods for young children (weaning food)

13.3 Diabetic foods intended for special medical purposes 13.4 Diabetic formulae for slimming purposes and weight reduction 13.5 Diabetic foods other than 13.1-13.4

13.6 Food supplements

14 Beverage excluding dairy products 14.1 Non-alcoholic ("soft") beverages 14.1.1 Waters Natural mineral waters and source waters Table waters and soda waters 14.1.2 Fruit and vegetable juices Canned or bottled (pasteurized) fruit juice Canned or bottled (pasteurized) vegetable juice Concentrates (liquid or solid) for fruit juice Concentrates (liquid or solid) for vegetable juice 14.1.3 Fruit and vegetable nectars Canned or bottled (pasteurized) fruit nectar Canned or bottled (pasteurized) vegetable nectar Concentrate (liquid or solid) for fruit nectar Concentrate (liquid or solid) for vegetable nectar 14.1.4 Water-based flavored drinks, including 'sport' or 'electrolyte" drinks Carbonated drinks Non-carbonated drinks, including punches Concentrates (liquid or solid) for drinks 14.1:15 Coffee, coffee substitutes, tea, herbal infusions and other hot cereal beverages, excluding cocoa 14.2 Alcoholic beverages, including alcohol-free and low-alcoholic counterparts 14.2.1 Beer or malt beverage 14.2.2 Cider and perry 14.2.3 Wines Still wine Sparking and semi-sparkling wines Fortified wine and liquor wine Aromatized wine 14.2.4 Fruit wine 14.2.5 Mead 14.2.6 Spirituous beverages Spirituous beverage containing at least 15% alcohol Spirituous beverage containing less than 15% alcohol 15 Ready-to-eat savories Snacks, potato-, cereal-, flour-, or starch-based (from roots and tubers, pulses and legumes)

Processed nuts, including coated nuts and nut mixtures (with e.g., dried fruit)

16 Composite foods (e.g., casseroles, meat pies, mince-meat) foods that could not be placed in categories 1-15.

The MRP compositor's of the present application address needs in various industries. For example, in view of the increasing demand of natural flavors, such as vanilla, citrus, cocoa, coffee etc., the food and beverage industries face a big challenge to meet consumers' requirements. For example, the harvest of citrus in recent years has been heavily influenced by fruit disease which has created a shortage. Vanilla, coffee and cocoa supply is always strongly influenced by climate. To increase their availability, farmers have to use more land to compete with other necessary cultivation of food and vegetable products, thus there is an additional danger of deforestation. Therefore, there is a need to find alternative sources to complement the market demand. The inventors surprisingly found that adding MRPs could significantly improve the taste profile of flavors, lower the threshold of flavors and reduce the amount of flavors to be used. An embodiment comprises MRPs (or mixture of MRPs and sweetening agent, or mixture of MRPs, sweetening agent and thaumatin) and flavor.

While consumers demand "cleaner" labels, retailers demand longer shelf life. The use of natural antioxidants such as tocopherols and rosemary extracts can solve these problems simultaneously. However, natural antioxidants always retain their own characteristic aroma, which makes it difficult to incorporate them in food and beverages. There is a need to look for alternative solutions. The inventors surprisingly found that adding MRPs to food or beverages can significantly reduce the negative aroma of antioxidants and provide a synergy of positive antioxidant properties. In one embodiment, a composition comprising MRPs (or a mixture of MRPs and sweetening agent(s) with or without thaumatin) and a natural antioxidant is disclosed.

Thaumatin is a good alternative solution for sugar reduction. However, its lingering taste makes it difficult to be used at higher dosages. The inventors surprisingly found adding MRPs could substantially reduce the lingering and bitterness of thaumatin and widen its usage in foods and beverages. In one aspect, compositions comprising MRPs and thaumatin are disclosed, including food or beverages comprising MRPs and thaumatin. Addition, of a sweetening agent, such as *Stevia*, together with MRPs can significantly improve the taste profile of thaumatin, reducing its lingering taste. Thaumatin has synergy with MRPs to reduce the bitterness and/or aftertaste of *Stevia*.

It should be understood throughout that various compositions can include combinations of one or more MRP(s); or one or more MRP(s) with thaumatin (or one or more sweetener(s)); or one or more MRP(s) with one or more sweetening agent(s); or one or more MRP(s) with one or more sweetening agent(s) and one or more sweeteners, e.g., thaumatin.

The intense sweetness and flavor/aroma enhancement properties associated with the MRP technology described herein provides useful applications in improving the palatability of medicines, traditional Chinese medicine, food supplements, beverage, food containing herbs, particularly those with unpleasant long-lasting active ingredients not easily masked by sugar or glucose syrups, let alone sweetening agents or synthetic high intensity sweeteners. The inventor of the present application has surprisingly found that the compositions described herein can mask the unpleasant taste and smell for products containing these substances, for instance Goji berries juice, sea buckthorn juice, milk thistle extract, *Ginkgo biloba* extract etc. Thus, in medicinal compositions, including traditional Chinese medicine, and in food supplements, one or more of compositions described herein may be particularly useful as masking agents.

Thickeners, including hydrocolloids and polyols, may be included in a liquid composition to improve the mouth feel by increasing viscosity, and may also be used in solid base products, as fillers for low cost sugar products. However, they could create a chalky or a floury taste, and higher viscosities would make a beverage less palatable. Therefore, there is a need to find a solution to reduce the amount of thickeners to be used for food and beverage especially for sugar, fat and salt reduction products. The inventors surprisingly found that adding MRPs could enhance the mouth feel of thickeners and have a synergistic effect without necessarily increasing the viscosity, thus improving the palatability of the food or beverage. An embodiment comprises MRPs (or mixture of MRPs and sweetening agent(s), or mixture of MRPs, sweetening agents and thaumatin) and a thickener, wherein the thickener is selected from one or more hydrocolloids and/or polyols.

MRPs create significant challenges for the food industry. A lot of resources have been expended to prevent Maillard reactions in food proceeding in order to preserve food quality. Therefore, there is a need to find methods to produce useful MRPs which the food and beverage industry could benefit from, In one aspect, 2-Amino-1-methyl-6-phenylimidazo (4,5-b)pyridine (PhlP) is formed in high amounts and is usually responsible for around 80% of the aromatic amines present in cooked meat products. It is listed on the IARC list of carcinogens. it is now understood that (HAAs) are over 100 fold more mutagenic than Aflatoxin B1. For example, heterocyclic aromatic amines (HAAs) can be formed under mild conditions—when glucose, glycine and creatine/creatinine are left at room temperature ina phosphate buffer for 84 days HAA's are formed. HAA's are reported in all kinds of cooked meat and fish products especially those that have been grilled, barbecued or roasted. Traditional restaurant food preparation tends to produce more HAA's than fast food outlets. With chicken, deep fat frying produces the highest levels of HAA's. Increasing mutagenic activity correlates with increased weight loss during cooking. In BBQ'd beef additional mutagenic components are present.

Acrylamide, for example, was first identified in 2002 by Margaret Tornquist of Stockholm University. She compared the blood samples of Swedish tunnel builders working with a sealant containing acrylamide with those of the general population. The results showed that the general population was regularly exposed to high levels of acrylamide. Rat feeding studies revealed that acrylamide increased the rates of several types of cancer. All these results showed that there is a need to find alternative solutions to provide the desired taste without these harmful substances, especially for bread, grilled meat, roasted coffee and chocolate.

The inventors' solution was to select suitable sugars and amine donors to create tastes or flavors, which can be added in food or beverages, especially for sweet foods and beverages. The addition of healthier MRPs can allow for conditions of baking, frying, grilling, and roasting of foods to be conducted at lower temperatures, to have shorter heating times, and to reduce the amount of harmful substances, and/or avoid creating harmful substances compared with traditional food process methods. Meanwhile, traditional methods for heating whole foods consume a lot of energy and create more pollution when compared to the methods and compositions of the present invention. The present invention facilitates the use of new methods of baking, frying, grilling and roasting without compromising taste. In one aspect, a food or beverage can include healthier and less harmful MRPs.

The naturally formed MRPs in bread upon baking or in meat products upon grilling do not necessarily provide predictable and/or reproducible aromas or tastes when prepared. The MRP technology employed herein can serve to render the aroma and taste profiles of food and beverages to be more predictable and reproducible, since the same amount(s) of MRPs can be added from different batches to yield the same aroma/taste in the same product.

Proteins constitute an important constituent in foods and beverages for promoting health. However, protein's raw egg taste and smell is an obstacle for wider use. Bean protein, whey protein and coconut protein possess characteristic unpleasant tastes after drying. Accordingly, there is a need for solutions to make them more palatable. The present inventors have surprisingly found that adding compositions of this invention can significantly block the unpleasant taste of certain proteins so as to make them more palatable to consumers.

For example, one embodiment pertains to a composition of protein(s) and MRPs (or mixtures of MRPs and sweetening agent(s), or mixtures of MRPs, sweetening agent(s) and thaumatin). Such compostions may be included in food products and beverages.

Reduced fat foods and beverages are prevalant in the market. However, lack of mouth feel and saturated fat taste on the tongue make them unpalatable for some consumers. Thus, there exists a need to address this problem. The inventors have surprisingly found that adding compositions this invention can significantly improve the mouth feel and overall taste of reduced fat foods and beverages. One embodiment pertains to compositions comprising fats and MRPs (or mixtures of MRPs and sweetening agent(s), or mixture(s) of MRPs, sweetening agent(s) and thaumatin). Another embodiment pertains to partially or completely reduced fat foods and beverages comprising MRPs, mixture(s) of MRPs and sweetening agent(s), or mixture(s) of MRPs, sweetening agent(s) and thaumatin. Furthermore, the present inventors further surprisingly discovered that the Maillard reaction products as prepared herein can be used as a fat substitute in the food and beverage industries.

Reduced salt foods and beverages are in high demand. However, the taste is not very satisfying to most consumers. Thus, there is a need to find a solution to enhance the salty taste without increasing sodium intake. The inventors surprisingly found there is synergy of MRPs, mixture(s) of MRPs and sweetening agent(s), mixture(s) of MRPs and sweetening agent(s) and thaumatin with salt. One embodiment pertains to reduced compositions of salt with MRPs, or mixture(s) of MRPs and sweetening agent(s), mixture(s) of MRPs and sweetening agent(s) and thaumatin. Other embodiments provide salted foods or beverages with MRPs, mixture(s) of MRPs and sweetening agent(s), or mixture(s) of MRPs, sweetening agent(s) and thaumatin.

Foods and beverages containing vegetable or vegetable juices, especially garlic, ginger, beet root etc. have strong characteristic flavors, which can present significant taste barriers for certain consumers. Thus, there is need to neutralize negative tastes and/or enhance positive tastes corresponding to such foods or beverages. The inventors have surprisingly found that adding the compositions the present application can harmonize the taste of such foods and beverages so as to make them more palatable and delicious to consumers. One embodiment provides vegetable-containing foods and beverages comprising MRPs, mixture(s) of MRPs and sweetening agent(s), or mixture(s) of MRPs, sweetening agent(s) and thaumatin.

Vegetables with a bitter taste, such as artichokes, broccoli, radicchio, arugula, brussels sprouts, chicory, white asparagus, endives, kale, brassica plants, dandelions, eggplant and bitter melon provide healthy and nutritious nutrients when present in foods and beverages. However, in view of their bitter and/or otherwise undesirable tastes, there is a need to neutralize or mask the bitter tastes associated with these vegetables. The inventors of the present application have surprisingly found that adding the compositions of the present application can harmonize the taste of such foods and beverages and make them more palatable and delicious. One embodiment pertain to vegetable containing foods and beverages comprising MRPs, mixture(s) of MRPs and sweetening agent(s), or mixture of MRPs, sweetening agent(s) and thaumatin.

Foods and beverages containing juices, juice concentrate, or fruit extract such as cranberry, pomegranate, bilberry, raspberry, lingonberry, grapefruit, lime and citrus have a sour and astringent taste. The inventors surprisingly found that adding compositions of this invention could harmonize the taste and make it acceptable to consumers. One embodiment contains fruit or fruit juice foods or beverages comprising MRPs, or mixture(s) of MRPs and sweetening agent(s), or mixture of MRPs, sweetening agent(s) and thaumatin.

Foods and beverages containing minerals and trace elements can have a metallic taste. There is a need to find a solution to overcome this drawback. The inventors surprisingly found that adding compositions of this invention could block the metallic taste of minerals, thus improving the palatable taste of foods and beverages to consumers. One embodiment pertains to mineral enriched foods or beverages with MRPs, or mixture(s) of MRPs and sweetening agent(s), or mixture(s) of MRPs, sweetening agent(s) and thaumatin.

Vitamin fortified foods and beverages provide challenges to acceptable taste due to bitterness or stale taste associated with Vitamin B series and sour and tingling tastes for Vitamin C. The inventors surprisingly found that adding composition of this invention could block the bitterness of Vitamin B series and improve the taste and mouth feel of Vitamin C as well as overall likeability. One embodiment is a vitamin fortified food or beverage with MRPs, or mixture(s) of MRPs and sweetening agent(s), or mixture of MRPs, sweetening agent(s) and thaumatin.

Foods and beverages containing amino acids such as arginine, aspartic acid, cysteine HCl, glutamine, histidine HCl, isoleucine, lysine HCl, methionite, proline, tryptophan and valine have bitter, metallic or an alkaline taste. A solution is required to overcome these drawbacks. The inventors surprisingly found that adding compositions of this invention to amino acids could block the bitter, metallic or alkaline taste. One embodiment pertains to amino acid enriched foods and beverages with MRPs, or mixture(s) of MRPs and sweetening agent(s), or mixture(s) of MRPs, sweetening agent(s) and thaumatin, Foods and beverages containing fatty acids such as linoleic acid, linolenic acid and palmitoleic acid have a mineral or pungent taste. There is a need to find a solution to overcome these drawbacks. The inventors surprisingly found that adding composition of this invention could block the mineral or pungent taste of fatty acids. One embodiment pertains to fatty acid containing foods and beverages with MRPs, or mixture(s) of MRPs and sweetening agent(s), or mixture(s) of MRPs, sweetening agents) and thaumatin.

Foods and beverages that contain natural herbs, natural herb extracts, concentrates, purified substances from herbs such as tonic water, etc. have earthy, grassy, herb tastes which are unpalatable to a lot of consumers. There is need to find a solution. The inventors surprisingly found that adding the compositions this invention could significantly mask or reduce the grassy, earthy or herb taste in such foods and beverages, One embodiment provides an herb or herb extract enriched food or beverage with MRPs, or mixture(s) of MRPs and sweetening agent(s), or mixture of MRPs, sweetening agent(s) and thaumatin.

Foods and beverages that contain caffeine, tea extract, ginseng juice or ginseng extract, taurine or guarana that function to boost energy, while having an earthy or bitter taste, which requires a solution. The inventors surprisingly found that adding the compositions of this invention could significantly mask or reduce the earthy or bitter taste of such foods and beverages. One embodiment provides an energy food or beverage with MRPs, or mixture(s) of MRPs and sweetening agent(s), or mixture(s) of MRPs, sweetening agent(s) and thaumatin.

Foods and beverages that contain cocoa powder or coffee powder, cocoa or coffee extract, have a bitter taste. The inventors surprisingly found that adding the compositions of this invention could significantly mask the bitter taste and/or enhance the flavor of such foods and beverages. One embodiment provides a cocoa or coffee containing foods or beverages comprising MRPs, or mixture(s) of MRPs and sweetening agent(s), or mixture(s) of MRPs, sweetening agent(s) and thaumatin.

Foods and beverages that contain tea powder or tea extract, or flavored tea have a bitter taste or astringent mouth feel. The inventors surprisingly found that adding the compositions of this invention could significantly mask the bitter taste and/or improve the mouth feel.

An embodiment provides a tea containing food or beverage with MRPs, or mixture(s) of MRPs and sweetening agent(s), or mixture(s) of MRPs, sweetening agent(s) and thaumatin.

Alcoholic products such as wine, liquor, whisky etc. have huge variations in taste due to changes in quality of raw materials from year to year. Also there are customers that can not accept the astringent taste etc. of the alcohol, thus, there is a need to find a solution to produce tasty alcohol products. The inventors surprisingly found that adding the compositions of this invention could block the astringent taste and make the product taste more full. One embodiment of alcohol in products includes MRPs, or mixture(s) of MRPs and sweetening agent(s), or mixture(s) of MRPs, sweetening agent(s) and thaumatin.

Sauces, such as soy bean sauces, jams, chocolate, butter, cheese etc. can not depend upon fermentation to create flavors to meet consumers' demands. There is a need to find a simple solution to enhance the taste and flavor of these products. The inventors found that adding the compositions of this invention could improve the overall taste of these fermented products. One embodiment provides sauces or fermented products with MRPs, or mixture(s) of MRPs and sweetening agent(s), or mixture(s) of MRPs, sweetening agent(s) and thaumatin With the increase of obesity and a diabetic population, limiting sugar has become a top concern for consumers seeking healthy diet choices worldwide, with consumers preferring low sugar foods and beverages, but without the sacrifice in taste. High intensive natural sugar alternatives, such as *Stevia* extract, swingle extract and sweet tea extract, and artificial high intensive sweetener, such as sucralose, ACE-K and aspartame can be utilized to provide reduced sugar foods and beverages, where these highly intensive sugar alternatives have a unique taste profile, but do not taste exactly like sugar. Some bring bitter or metallic off notes, which result in low sugar food and beverages having an unsatisfactory taste to consumers' palates. A solution to improve the taste of low sugar foods and beverages is imperative in the promotion of a healthy diet.

Current beverages with low sugar or sugar free, such as fruit juices and concentrates for fruit juice, vegetable juice and concentrate for vegetable juice, fruit nectars and concentrates from fruit nectar, vegetable nectar and concentrate from vegetable nectar, tastes flat and watery with an unpleasant aftertaste. The inventors surprisingly found that adding the composition of this invention could improve the taste profile, remove bitter or metallic aftertaste, and make the beverage taste more like sugar. One embodiment of low sugar or sugar free beverages includes MRPs, or mixture(s) of MRPs and sweetening agent(s), or mixture(s) of MRPs, sweetening agent(s) and thaumatin.

Water-based flavored beverages, including "sport", "energy" or "electrolyte" beverages and in particular, beverages such as carbonated water-based flavored beverages, non-carbonated water based flavored beverages, concentrates (liquid or solid) for water-based flavored beverages, often taste flat and watery with an unpleasant aftertaste. The inventors surprisingly found that by adding the compositions of this invention to the beverages could improve the taste profile, remove bitter or metallic aftertaste, and/or the flavor is enhanced. One embodiment pertains to low sugar or sugar free water-based flavored beverages with MRPs, or mixture(s) of MRPs and sweetening agent(s), or mixture(s) of MRPs, sweetening agent(s) and thaumatin.

Low sugar or sugar free dairy foods and beverages such as milk and flavored milk, butter milk and flavored butter milk, fermented and renneted milk, flavored fermented and renneted milk, condensed milk and flavored condensed milk, and flavored ice-cream taste flat and watery with an unpleasant aftertaste. The inventors surprisingly found that adding the compositions of this invention can improve the taste profile, remove bitter or metallic aftertaste(s), enhance flavor, improve mouth feel, and/or improve overall likeability. One embodiment pertains to low sugar or sugar free dairy products with MRPs, or mixture(s) of MRPs and sweetening agent(s), or mixture(s) of MRPs, sweetening agent(s) and thaumatin.

Cannabidiol (CBD) oil, for example, is extracted from the stalks, seeds and flower of plants like hemp and has a taste that is commonly described as nutty, earthy or grassy. There is a need to find a solution to make it palatable for eating and smoking. Adding the compositions of this invention to CBD oil could mask the unpleasant taste. One embodiment pertains to of CBD oil with MRPs or mixture(s) of MRPs and sweetening agent(s) or mixture(s) of MRPs, sweetening agent(s) and thaumatin.

Nicotine has a bitter or astringent taste and aroma when inhaled. Popular electronic cigarettes require an improved taste and aroma. Adding the compositions of this invention to nicotine could mask nicotine's unpleasant taste. One embodiment pertains to nicotine contained in a cigarette product, either in solid or liquid form, with MRPs, or mixture(s) of MRPs and sweetening agent(s), or mixture of MRPs, sweetening agent(s) and thaumatin.

Compositions of the present application can be applied to products from the cosmetic industry, pharmaceutical industry, feed industry etc. Such products may employ MRPs, including MRPs with other additives, such as thickener(s), flavor(s), salt(s), fat(s), sweetening agent(s), thaumatin, and combinations thereof.

MRPs produced from Maillard reactions when cooking foods or heating beverages can taste bitter, especially when the reaction times are increased, when the heating is conducted at elevated temperatures, or when the MRPs are produced at higher dosages. For bitterness-sensitive people, however, MRPs are bitter at extended concentrations in foods or in beverages. The inventors have surprisingly found that combining sweetening agent(s) into MRPs can block the bitterness of the MRPs. Moreover, the resulting MRP compositions can modify the lingering, bitterness, aftertaste etc. Surprisingly, the bitterness from MRPs and *Stevia* are not superimposed or multiplied.

Further, although thaumatin has a slow onset of sweetness, the inventors have surprisingly found that when combining MRPs, sweetening agent(s) and thaumatin together, the lingering of *Stevia* and thaumatin are not superimposed or multiplied. Moreover, the bitterness of *Stevia* and MRPs are not superimposed or multiplied, either. On the contrary, *Stevia* acts as bridge between MRPs and thaumatin, such that MRPs act as a bridge between *Stevia* and thaumatin to create a more pleasant integrated taste profile.

In some embodiments, MRP compositions of the present application comprising thaumatin described herein can be added to a food or beverage product. The amount of the thaumatin in the food or beverage product can be from 0.05-2.0 ppm based on the total weight of the composition and the food or beverage product(s), including any specific value in the range, and all subranges between any two specific values. For example, the specific values may include 0.1 ppm, 0.2 ppm, 0.5 ppm, 1 ppm, 2 ppm, 3 ppm, 4 ppm, 5 ppm, 6 ppm, 8 ppm, 10 ppm, 15 ppm and 20 ppm; and the subranges may include 0.1-15 ppm, 0.2-10 ppm, 0.5-8 ppm, 1-3 ppm, etc. based on the total weight of the composition and the food or beverage product(s).

The inventors surprisingly found the combination of MRPs with thaumatin could significantly improve the overall taste profile of food and beverage to have a better mouth feel, creamy taste, a reduction of bitterness of other ingredients in food and beverage, such as astringency of tea, protein, or their extracts, acidic nature and bitterness of coffee, etc. It could also reduce lingering, bitterness and metallic aftertaste of natural, synthetic high intensity sweeteners, or their combinations, their combination with other sweeteners, with other flavors much more than thaumatin itself. Thus, it plays a unique function in sugar reduction or sugar free products, and can be used as additives to improve taste performance of food and beverage products comprising one or more sweetening agents or sweeteners such as sucralose, acesulfame K, aspartame, sodium saccharin, sodium cyclamate or siratose.

Depending on the flavor or flavor enhancing intensity requirements for a given use, sweetener-derived MRPs can be further blended with additional sweetening agent(s), or other ingredients to obtain acceptable taste and aroma profiles.

In one aspect, a flavoring agent(s) in combination with one or more steviol glycosides is provided. It has been found that steviol glycoside(s) surprisingly protect the flavoring agent. Not to be bound by theory, there is a surprising protective effect exerted by the *Stevia* material on the flavoring agent(s).

For example, unlike typical powdered flavoring agents, which have a strong odor, the inventors have surprisingly found that the combination of steviol glycoside(s) and flavoring agent(s) can result in a composition with minimal smell. However, when the steviol glycoside(s)/flavoring agent(s) are dissolved in a solution (e.g., water, alcohol or mixtures thereof), the odor of the flavoring agent(s) are released so as to produce a strong odor.

The above observations are not meant to be limited to powders. The steviol glycoside(s) and the flavoring agent(s) can be part of a liquid composition, such as a syrup.

In some embodiments, the reaction products of the embodiments described herein can be dissolved at neutral pH.

The embodiments described above are applicable for any synthetic sweetener, blends thereof and other natural sweeteners, blends thereof, or mixtures of synthetic and natural sweetener(s), especially sucralose.

The instant application also includes the following aspects.

A first aspect of the application relates to a product preparable by the reaction of starting materials, wherein the starting materials comprise one or more sweeteners, one or more amine donors and optionally one or more reducing sugars. Typically, the product is preparable by the reaction of the starting materials in one or more solvents. Typically, the reaction occurs in a reaction mixture, wherein the reaction mixture comprises the starting materials and one or more solvents.

A second aspect of the application relates to a method of preparing a product, wherein the method comprises the step of reacting starting materials to afford the product, wherein the starting materials comprise one or more sweeteners, one or more amine donors and optionally one or more reducing sugars. Typically, the method comprises the step of reacting the starting materials in one or more solvents. Typically, the reaction occurs in a reaction mixture, wherein the reaction mixture comprises the starting materials and one or more solvents. Also envisaged is a product prepared by or preparable by the method of the second aspect of the application. Typically, the method of the second aspect of the application is a method of preparing a product according to the first aspect of the application.

A third aspect of the application relates to a product obtainable by the heat treatment of starting materials, wherein the starting materials comprise one or more sweeteners, one or more amine donors, and optionally one or more reducing sugars. Typically, the product is obtainable by the heat treatment of the starting materials in one or more solvents. Typically, the heat treatment occurs in a treatment mixture, wherein the treatment mixture comprises the starting materials and one or more solvents.

A fourth aspect of the application relates to a method of preparing a product, wherein the method comprises the step of heat treating starting materials to afford the product, wherein the starting materials comprise one or more sweeteners, one or more amine donors, and optionally one or more reducing sugars. Typically, the method comprises the step of heat treating the starting materials in one or more solvents. Typically, the heat treatment occurs in a treatment mixture, wherein the treatment mixture comprises the starting materials and one or more solvents. Also envisaged is a product obtained by or obtainable by the method of the fourth aspect of the application. Typically, the method of the fourth aspect of the application is a method of preparing a product according to the third aspect of the application.

A fifth aspect of the application relates to a product preparable by the reaction of starting materials, wherein the starting materials comprise one or more amine donors and one or more reducing sugars. Typically, the product is preparable by the reaction of the starting materials in one or more solvents, Typically, the reaction occurs in a reaction mixture, wherein the reaction mixture comprises the starting materials and one or more solvents.

A sixth aspect of the application relates to a method of preparing a product, wherein the method comprises the step of reacting starting materials to afford the product, wherein the starting materials comprise one or more amine donors and one or more reducing sugars. Typically, the method comprises the step of reacting the starting materials in one or more solvents. Typically, the reaction occurs in a reaction mixture, wherein the reaction mixture comprises the starting materials and one or more solvents. Also envisaged is a product prepared by or preparable by the method of the sixth aspect of the application. Typically, the method of the sixth aspect of the application is a method of preparing a product according to the fifth aspect of the application.

A seventh aspect of the application relates to a composition comprising one or more sweeteners, one or more amine donors and optionally one or more reducing sugars. In one embodiment, the composition consists essentially of one or more sweeteners, one or more amine donors and optionally one or more reducing sugars.

An eighth aspect of the application relates to a method of preparing a composition, wherein the method comprises mixing one or more sweeteners with one or more amine donors and optionally one or more reducing sugars. Typically, the method of the eighth aspect of the application is a method of preparing a composition according to the seventh aspect of the application.

A ninth aspect of the application relates to a composition comprising one or more sweeteners and one or more products of the fifth aspect of the application, A tenth aspect of the application relates to a method of preparing a composition, wherein the method comprises combining one or more sweeteners with one or more products of the fifth aspect of the application. Typically, the method of the tenth aspect of the application is a method of preparing a composition according to the ninth aspect of the application.

In any of the first to sixth aspects of the application, where the product is preparable by, prepared by, obtainable by or obtained by the reaction or heat treatment of starting materials, the starting materials may be combined in any order, including sequentially or simultaneously. Where the product is prepayable by, prepared by, obtainable by or obtained by the reaction or heat treatment of starting materials in a reaction mixture or a treatment mixture, any two or more of the staring materials may be added to the reaction mixture or the treatment mixture in a pre-combined form, or separately. For example, in respect of any of the first to fourth aspects of the application, the one or more sweeteners, one or more amine donors and (if present) one or more reducing sugars may be blended and added to the solvent in a combined form. Alternatively, the one or more sweeteners, one or more amine donors and (if present) one or more reducing sugars may be added to the solvent separately, or for example the one or more sweeteners and the one or more amine donors may be blended and added to the solvent in a combined form, and the one or more reducing sugars (if present) may be added to the solvent separately. Where two or more starting materials are added to the solvent separately, the separate additions may be simultaneous, substantially simultaneous (e.g. within 10 minutes), or non-simultaneous. Each starting material or blend of starting materials may be added to the solvent as a single batch, in multiple batches, or continuously. Where each starting material or blend of starting materials is added to the solvent continuously, typically the reaction or heat treatment is part of a continuous flow process. Where each starting material or blend of starting materials is added to the solvent as a single batch, or in multiple batches, typically all starting materials are added to the solvent within a 24 hour period. More typically, all starting materials are added to the solvent within a 1 hour period. More typically still, all starting materials are added to the solvent within a 10 minute period.

Typically, in any of the first to sixth aspects of the application, the product is a mixture of products. For example, the product may be a mixture of reaction or heat treatment products. In one embodiment, the mixture is a crude or semi-purified mixture of reaction or heat treatment products, More typically, the mixture is a crude mixture of reaction or heat treatment products.

In one embodiment of either of the first or fifth aspects of the application, the product is prepared by the reaction of the starting materials.

In one embodiment of the third aspect of the application, the product is obtained by the heat treatment of the starting materials.

As will be understood, any sweetener, amine donor or reducing sugar that is added to a reaction mixture or a treatment mixture of any of the first to sixth aspects of the application is to be considered a starting material.

For the avoidance of doubt, where it is stated that a product is preparable or prepared by the reaction of starting materials, it is to be understood that to prepare the product by the specified route at least some of each class of the specified starting materials must react with each other, in any order. For example, where the starting materials comprise one or more sweeteners and one or more amine donors, at least one of the one or more sweeteners must react with at least one of the one or more amine donors, in order to prepare the product. Where, for example, the starting materials comprise one or more sweeteners, one or more amine donors, and one or more reducing sugars, at least one sweetener may react with at least one amine donor, with the resulting product reacting with at least one reducing sugar, or at least one reducing sugar may react with at least one amine donor, with the resulting product reacting with at least one sweetener, or at least one sweetener may react with at least one reducing sugar, with the resulting product reacting with at least one amine donor, or at least one sweetener, at least one amine donor and at least one reducing sugar may react with each other simultaneously.

Likewise, where it is stated that a product is preparable or prepared by the reaction of starting materials, it is to be understood that the product may consist essentially of reaction products, or may comprise one or more reaction products of the starting materials and one or more unreacted starting materials.

Typically, in any of the first, second, third, fourth, seventh, eighth, ninth or tenth aspects of the application, at least one sweetener is a high intensity sweetener. For example, the one or more sweeteners may be selected from the group consisting of high intensity natural sweeteners and high intensity synthetic sweeteners.

In one embodiment of the first, second, third, fourth, seventh, eighth, ninth or tenth aspect of the application, at least one sweetener is not an aldose; such sweeteners may be described as non-aldose sweeteners. For example, the one or more sweeteners may be selected from the group consisting of non-aldose sweeteners. Typically, at least one sweetener is not a monosaccharide; such sweeteners may be described as non-monosaccharide sweeteners. For example, the one or more sweeteners may be selected from the group consisting of non-monosaccharide sweeteners. More typically still, at least one sweetener is not a sugar; such sweeteners may be described as non-sugar sweeteners. For example, the one or more sweeteners may be selected from the group consisting of non-sugar sweeteners.

In one embodiment of the first, second, third, fourth, seventh, eighth, ninth or tenth aspect of the application, at least one sweetener is not a bulk sweetener.

In another embodiment of the first, second, third, fourth, seventh, eighth, ninth or tenth aspect of the application, at least one sweetener comprises at least one carbonyl, ketal, hemi-ketal, acetal or hemi-acetal group. For example, at least one sweetener may be a sweetening agent, as defined herein, such as a non-reducing sugar. Typically, at least one sweetener is a non-aldose sweetener comprising at least one carbonyl, ketal, hemi-ketal, acetal hemi-acetal group. For example, the one or more sweeteners may be selected from the group consisting of non-aldose sweeteners comprising at least one carbonyl, ketal, hemi-ketal, acetal or hemi-acetal group. More typically, at least one sweetener is a non-monosaccharide sweetener comprising at least one carbonyl, ketal, hemi-ketal, acetal or hemi-acetal group. For example, the one or more sweeteners may be selected from the group consisting of non-monosaccharide sweeteners comprising at least one carbonyl, ketal, hemi-ketal, acetal or hemi-acetal group. More typically still, at least one sweetener is a non-sugar sweetener comprising at least one carbonyl, ketal, hemi-ketal, acetal or hemi-acetal group. For example, the one or more sweeteners may be selected from the group consisting of non-sugar sweeteners comprising at least one carbonyl, ketal, hemi-ketal, acetal or hemi-acetal group.

In yet another embodiment of the first, second, third, fourth, seventh, eighth, ninth or tenth aspect of the application, at least one sweetener is a sweet tea (*Rubus suavissimus*) extract, a glycosylated sweet tea extract, a *Stevia* (*Stevia rebaudiana*) extract, a glycosylated *Stevia* extract, a swingle (*Siraitia grosvenorii* or monk fruit) extract, a glycosylated swingle extract, a liquorice (*Glycyrrhiza glabra*) extract or a glycosylated liquorice extract. Typically, at least one sweetener is a sweet tea extract, a glycosylated sweet tea extract, a *Stevia* extract, a glycosylated *Stevia* extract, a swingle extract or a glycosylated swingle extract. For example, the one or more sweeteners may be selected from the group consisting of sweet tea extracts, glycosylated sweet tea extracts, *Stevia* extracts, glycosylated *Stevia* extracts, swingle extracts and glycosylated swingle extracts.

In one embodiment of the first, second, third, fourth, seventh, eighth, ninth or tenth aspect of the application, at least one sweetener is a terpenoid sweetener or a terpenoid glycoside sweetener. Typically in such an embodiment, at least one sweetener is a terpenoid glycoside sweetener. Typically, at least 50 wt. % of the one or more sweeteners are terpenoid glycoside sweeteners. More typically, at least 75 wt. % or at least 90 wt. % of the one or more sweeteners are terpenoid glycoside sweeteners. More typically still, at least 95 wt. % of the one or more sweeteners are terpenoid glycoside sweeteners. In one aspect of such an embodiment, the one or more sweeteners may be selected from the group consisting of terpenoid sweeteners and terpenoid glycoside sweeteners, typically wherein at least one sweetener is a terpenoid glycoside sweetener. In one embodiment, the one or more sweeteners are selected from the group consisting of terpenoid glycoside sweeteners.

As used herein, the term "terpenoid sweetener" refers to any sweet-tasting terpenoid. Such terpenoid sweeteners include, for example, steviol and mogrol. Similarly, the term "terpenoid glycoside sweetener" refers to any sweet-tasting glycoside of a terpenoid. Terpenoid glycoside sweeteners that may be used in the application include, for example, diterpenoid glycoside sweeteners such as steviol glycosides, gaudichaudiosides and sweet tea glycosides (e.g. rubusosides and sauviosides), and triterpenoid glycoside sweeteners such as mogrosides, glycyrrhizin, periandrins, abalsosides and pterocaryosides. Typically, in any embodiment of the first to fourth aspects of the application where at least one sweetener is a terpenoid sweetener or a terpenoid glycoside sweetener, the product comprises at least one terpenoid derivative.

In one embodiment of the first, second, third, fourth, seventh, eighth, ninth or tenth aspect of the application, at least one sweetener is a steviol glycoside, a sweet tea glycoside, a mogroside or glycyrrhizin, or a corresponding terpenoid sweetener such as steviol or mogrol. Typically in such an embodiment at least one sweetener is a steviol glycoside, a sweet tea glycoside, a mogroside or glycyrrhizin. For example the one or more sweeteners may be an extract selected from a sweet tea extract, a glycosylated sweet tea extract, a *Stevia* extract, a glycosylated *Stevia* extract, a swingle extract, a glycosylated swingle extract, a liquorice extract or a glycosylated liquorice extract, wherein the extract comprises at least one steviol glycoside, sweet tea glycoside, mogroside or glycyrrhizin. Typically, at least 50 wt. % of the one or more sweeteners are steviol glycosides, sweet tea glycosides, mogrosides or glycyrrhizin. More typically, at least 75 wt. % or at least 90 wt. % of the one or more sweeteners are steviol glycosides, sweet tea glycosides, mogrosides or glycyrrhizin. More typically still, at least 95 wt. % of the one or more sweeteners are steviol glycosides, sweet tea glycosides, mogrosides or glycyrrhizin. In one aspect of such an embodiment, the one or more sweeteners may be selected from the group consisting of steviol glycosides, sweet tea glycosides, mogrosides, glycyrrhizin and corresponding terpenoid sweeteners. In one embodiment, the one or more sweeteners are selected from the group consisting of steviol glycosides, sweet tea glycosides, mogrosides and glycyrrhizin.

In another embodiment of the first, second, third, fourth, seventh, eighth, ninth or tenth aspect of the application, at least one sweetener is a steviol glycoside, a sweet tea glycoside or a mogroside, or a corresponding terpenoid sweetener such as steviol or mogrol. Typically in such an embodiment at least one sweetener is a steviol glycoside, a sweet tea glycoside or a mogroside. For example the one or more sweeteners may be an extract selected from a sweet tea extract, a glycosylated sweet tea extract, a *Stevia* extract, a glycosylated *Stevia* extract, a swingle extract or a glycosylated swingle extract, wherein the extract comprises at least one steviol glycoside, sweet tea glycoside or mogroside. Typically, at least 50 wt. % of the one or more sweeteners are steviol glycosides, sweet tea glycosides or mogrosides. More typically, at least 75 wt. % or at least 90 wt. % of the one or more sweeteners are steviol glycosides, sweet tea glycosides or mogrosides. More typically still, at least 95 wt. % of the one or more sweeteners are steviol glycosides, sweet tea glycosides or mogrosides. In one aspect of such an embodiment, the one or more sweeteners may be selected from the group consisting of steviol glycosides, sweet tea glycosides, mogrosides, and corresponding terpenoid sweeteners, typically wherein at least one sweetener is a steviol glycoside, a sweet tea glycoside, or a mogroside. In one embodiment, the one or more sweeteners are selected from the group consisting of steviol glycosides, sweet tea glycosides and mogrosides.

In yet another embodiment of the first, second, third, fourth, seventh, eighth, ninth or tenth aspect of the application, at least one sweetener is a sweet tea glycoside, a mogroside or glycyrrhizin, or a corresponding terpenoid sweetener such as mogrol, Typically in such an embodiment at least one sweetener is a sweet tea glycoside, a mogroside or glycyrrhizin. For example the one or more sweeteners may be an extract selected from a sweet tea extract, a glycosylated sweet tea extract, a swingle extract, a glycosylated swingle extract, a liquorice extract or a glycosylated liquorice extract, wherein the extract comprises at least one sweet tea glycoside, mogroside or glycyrrhizin. Typically, at least 50 wt. % of the one or more sweeteners are sweet tea glycosides, mogrosides or glycyrrhizin. More typically, at least 75 wt. % or at least 90 wt. % of the one or more sweeteners are sweet tea glycosides, mogrosides or glycyrrhizin. More typically still, at least 95 wt. % of the one or more sweeteners are sweet tea glycosides, mogrosides or glycyrrhizin. In one aspect of such an embodiment, the one or more sweeteners may be selected from the group consisting of sweet tea glycosides, mogrosides, glycyrrhizin and corresponding terpenoid sweeteners. In one embodiment, the one or more sweeteners are selected from the group consisting of sweet tea glycosides, mogrosides and glycyrrhizin.

In one embodiment of the first, second, third, fourth, seventh, eighth, ninth or tenth aspect of the application, at least one sweetener is steviol or a steviol glycoside. Typically in such an embodiment, at least one sweetener is a steviol glycoside. For example the one or more sweeteners may be an extract selected from a *Stevia* extract or a glycosylated *Stevia* extract, wherein the extract comprises at least one steviol glycoside.

Typically, at least 50 wt. % of the one or more sweeteners are steviol glycosides. More typically, at least 75 wt. % or at least 90 wt. % of the one or more sweeteners are steviol glycosides. More typically still, at least 95 wt. % of the one or more sweeteners are steviol glycosides. In one aspect of such an embodiment, the one or more sweeteners may be selected from the group consisting of steviol and steviol glycosides. For example, the one or more sweeteners may be selected from the group consisting of steviol and steviol glycosides, provided that at least one sweetener is a steviol glycoside. Alternatively, the one or more sweeteners may be selected from the group consisting of steviol glycosides. Typically, in any embodiment of the first to fourth aspects of the application where at least one sweetener is steviol or a steviol glycoside, the product comprises at least one steviol derivative.

Where at least one sweetener is a steviol glycoside, typically at least one steviol glycoside is selected from the group consisting of stevioside, steviolbioside, rebaudioside A, rebaudioside B, rebaudioside C, rebaudioside D, rebaudioside E, rebaudioside F, rebaudioside M, rebaudioside O, rebaudioside H. rebaudioside I, rebaudioside L, rebaudioside N, rebaudioside K, rebaudioside J, rubusoside, and dulcoside A. More typically, where at least one sweetener is a steviol glycoside, at least one sweetener is rebaudioside A. For example, the one or more sweeteners may be selected from the group consisting of steviol and steviol glycosides, provided that at least one sweetener is rebaudioside A. Alternatively, the one or more sweeteners may be selected from the group consisting of steviol glycosides, provided that at least one sweetener is rebaudioside A.

In another embodiment of the first, second, third, fourth, seventh, eighth, ninth or tenth aspect of the application, at least one sweetener is mogrol or a mogroside. Typically in such an embodiment, at least one sweetener is a mogroside. For example the one or more sweeteners may be an extract selected from a swingle extract or a glycosylated swingle extract, wherein the extract comprises at least one mogroside. Typically, at least 50 wt. % of the one or more sweeteners are mogrosides. More typically, at least 75 wt. % or at least 90 wt. % of the one or more sweeteners are mogrosides. More typically still, at least 95 wt. % of the one or more sweeteners are mogrosides. In one aspect of such an embodiment, the one or more sweeteners may be selected from the group consisting of mogrol and mogrosides. For example, the one or more sweeteners may be selected from the group consisting of mogrol and mogrosides, provided that at least one sweetener is a mogroside. Alternatively, the one or more sweeteners may be selected from the group consisting of mogrosides. Typically, in any embodiment of the first to fourth aspects of the application where at least one sweetener is mogrol or a mogroside, the product comprises at least one mogrol derivative.

Where at least one sweetener is a mogroside, typically at least one mogroside is selected from the group consisting of mogroside IA1, mogroside IE, mogroside IE1, mogroside IIA1 mogroside IIA2, mogroside IIB, mogroside IIE, mogroside III, mogroside IIIA1, mogroside IIIA2, mogroside TILE, mogroside IV, mogroside IVA, mogroside mogroside V, mogroside VI, mogroside VIA, mogroside VIB, siamenoside I, 11-oxomogroside V and iso-mogroside V. More typically, where at least one sweetener is a mogroside, at least one sweetener is mogroside V. For example, the one or more sweeteners may be selected from the group consisting of mogrol and mogrosides, provided that at least one sweetener is mogroside V. Alternatively, the one or more sweeteners may be selected from the group consisting of mogrosides, provided that at least one sweetener is mogroside V.

In one embodiment of the first, second, third, fourth, seventh, eighth, ninth or tenth aspect of the application, at least one sweetener is a naturally occurring terpenoid sweetener or a naturally occurring terpenoid glycoside sweetener. For example, the one or more sweeteners may be selected from the group consisting of naturally occurring terpenoid sweeteners and naturally occurring terpenoid glycoside sweeteners. Typically, at least one sweetener is a naturally occurring terpenoid glycoside sweetener. For example, the one or more sweeteners may be selected from the group consisting of naturally occurring terpenoid sweeteners and naturally occurring terpenoid glycoside sweeteners, provided that at least one sweetener is a naturally occurring terpenoid glycoside sweetener.

As used herein, the terms "naturally occurring terpenoid sweetener" and "naturally occurring terpenoid glycoside sweetener" refer to any terpenoid sweetener or terpenoid glycoside sweetener respectively that may be extracted from a natural, e.g. plant, source without chemical modification. For example, naturally occurring steviol glycosides include any steviol glycosides that may be extracted from the *Stevia* rebaudiana plant, naturally occurring sweet tea glycosides include any sweet tea glycosides that may be extracted from the *Rubus suavissimus* plant, and naturally occurring mogrosides include any mogrosides that may be extracted from the *Siraitia grosvenorii* plant.

In another embodiment of the first, second, third, fourth, seventh, eighth, ninth or tenth aspect of the application, at least one sweetener is a glycosylated terpenoid glycoside sweetener. For example, the one or more sweeteners may be selected from the group consisting of terpenoid sweeteners and terpenoid glycoside sweeteners, provided that at least one sweetener is a glycosylated terpenoid glycoside sweetener. Typically in such an embodiment, the one or more sweeteners are selected from the group consisting of terpenoid sweeteners and terpenoid glycoside sweeteners, provided that at least 50 wt. % of the one or more sweeteners are glycosylated terpenoid glycoside sweeteners. More typically, at least 75 wt. % or at least 90 wt. % of the one or more sweeteners are glycosylated terpenoid glycoside sweeteners. More typically still, at least 95 wt. % of the one or more sweeteners are glycosylated terpenoid glycoside sweeteners.

In another embodiment of the first, second, third, fourth, seventh, eighth, ninth or tenth aspect of the application, at least one sweetener is a glucosylated terpenoid glycoside sweetener. For example, the one or more sweeteners may be selected from the group consisting of terpenoid sweeteners and terpenoid glycoside sweeteners, provided that at least one sweetener is a glucosylated terpenoid glycoside sweetener. Typically in such an embodiment, the one or more sweeteners are selected from the group consisting of terpenoid sweeteners and terpenoid glycoside sweeteners, provided that at least 50 wt. % of the one or more sweeteners are glucosylated terpenoid glycoside sweeteners. More typically, at least 75 wt. % or at least 90 wt. % of the one or more sweeteners are glucosylated terpenoid glycoside sweeteners. More typically still, at least 95 wt. % of the one or more sweeteners are glucosylated terpenoid glycoside sweeteners.

As used herein, the term "gycosylated terpenoid glycoside sweetener" refers to any terpenoid glycoside sweetener that is preparable by the glycosylation of a naturally occurring terpenoid or terpenoid glycoside. Likewise the term "glucosylated terpenoid glycoside sweetener" refers to any terpenoid glycoside sweetener that is preparable by the glucosylation of a naturally occurring terpenoid or terpenoid glycoside.

Examples of glycosylated terpenoid glycoside sweeteners include glycosylated steviol glycosides, glycosylated sweet tea glycosides, glycosylated mogrosides and glycosylated glycyrrhizin. Similarly examples of glucosylated terpenoid glycoside sweeteners include glucosylated steviol glycosides, glucosylated sweet tea glycosides, glucosylated mogrosides and glucosylated glycyrrhizin.

In one embodiment of the first, second, third, fourth, seventh, eighth, ninth or tenth aspect of the application, at least one sweetener is sucralose.

In a first mode of the first aspect of the application, the product is preparable by the reaction of starting materials comprising one or more sweeteners and one or more amine donors, without the addition of one or more reducing sugars. In a corresponding first mode of the second aspect of the application, the method comprises the step of reacting starting materials comprising one or more sweeteners and one or more amine donors, without the addition of one or more reducing sugars. For example, in the first or second aspect of the application, the product may be preparable by or prepared by the reaction of the starting materials in a reaction mixture, wherein the reaction mixture comprises the starting materials and one or more solvents, wherein the starting materials comprise one or more sweeteners and one or more amine donors, but substantially no reducing sugars, and wherein no reducing sugars are added to the reaction mixture. In one aspect of such a mode, the starting materials consist essentially of one or more sweeteners and one or more amine donors. Typically in such a mode, the starting materials comprise one or more terpenoid glycoside sweeteners and one or more amine donors, but substantially no reducing sugars. For example, in such a mode the ratio of the total amount of the one or more terpenoid glycoside sweeteners to the total amount of any reducing sugars present in the starting materials may be >100:1 by weight. More typically, the ratio of the total amount of the one or more terpenoid glycoside sweeteners to the total amount of any reducing sugars present is >1000:1 or >10000:1 by weight. For the avoidance of doubt, such a mode does not exclude the possibility that one or more reducing sugars may be present in trace amounts, for example as impurities in the starting materials, or as intermediates generated by the hydrolysis of glycosylated compounds.

In a first mode of the third aspect of the application, the product is obtainable by the heat treatment of starting materials comprising one or more sweeteners and one or more amine donors, without the addition of one or more reducing sugars. In a corresponding first mode of the fourth aspect of the application, the method comprises the step of heat treating starting materials comprising one or more sweeteners and one or more amine donors, without the addition of one or more reducing sugars. For example, in the third or fourth aspect of the application, the product may obtainable by or obtained by the heat treatment of the starting materials in a treatment mixture, wherein the treatment mixture comprises the starting materials and one or more solvents, wherein the starting materials comprise one or more sweeteners and one or more amine donors, but substantially no reducing sugars, and wherein no reducing sugars are added to the treatment mixture. In one aspect of such a mode, the starting materials consist essentially of one or more sweeteners and one or more amine donors. Typically in such a mode, the starting materials comprise one or more terpenoid glycoside sweeteners and one or more amine donors, but substantially no reducing sugars. For example, in such a mode the ratio of the total amount of the one or more terpenoid glycoside sweeteners to the total amount of any reducing sugars present in the starting materials may be >100:1 by weight. More typically, the ratio of the total amount of the one or more terpenoid glycoside sweeteners to the total amount of any reducing sugars present is >1000:1 or >10000:1 by weight.

In a first mode of the seventh or eighth aspect of the application, the composition comprises one or more sweeteners and one or more amine donors, but substantially no reducing sugars. In one embodiment of such a mode, the composition consists essentially of one or more sweeteners and one or more amine donors. Typically, the composition of the first mode of the seventh or eighth aspect of the application is suitable for use as a blend of starting materials to manufacture the product of the first mode of any of the first to fourth aspects of the application.

In one embodiment of the first mode of any of the first to fourth or seventh or eighth aspects of the application, the ratio of the total amount of the one or more sweeteners to the total amount of the one or more amine donors in the starting materials or the composition is from 500:1 to 1:2 by weight. More typically, the ratio is from 250:1 to 1:1, more typically still from 150:1 to 2:1, and even more typically from 100:1 to 3:1 by weight. in an exemplary embodiment of the first mode of any of the first to fourth or seventh or eighth aspects of the application, the ratio of the total amount of the one or more sweeteners to the total amount of the one or more amine donors in the starting materials or the composition is from 99:1 to 4:1 by weight. More typically still, the ratio is from 40:1 to 8:1 by weight.

In a second mode of the first aspect of the application, the product is preparable by the reaction of starting materials, wherein the starting materials comprise one or more sweeteners, one or more amine donors and one or more reducing sugars. In a corresponding second mode of the second aspect of the application, the method comprises the step of reacting starting materials comprising one or more sweeteners, one or more amine donors, and one or more reducing sugars. In one aspect of such a mode of either the first or the second aspect of the application, the starting materials consist essentially of one or more sweeteners, one or more amine donors, and one or more reducing sugars.

In a second mode of the third aspect of the application, the product is obtainable by the heat treatment of starting materials, wherein the starting materials comprise one or more sweeteners, one or more amine donors and one or more reducing sugars. In a corresponding second mode of the fourth aspect of the application, the method comprises the step of heat treating starting materials comprising one or more sweeteners, one or more amine donors and one or more reducing sugars. In one aspect of such a mode of either the third or the fourth aspect of the application, the starting materials consist essentially of one or more sweeteners, one or more amine donors, and one or more reducing sugars.

In a second mode of the seventh or eighth aspect of the application, the composition comprises one or more sweeteners, one or more amine donors and one or more reducing sugars. In one embodiment of such a mode, the composition consists essentially of one or more sweeteners, one or more amine donors, and one or more reducing sugars. Typically, the composition of the second mode of the seventh or eighth aspect of the application is suitable for use as a blend of starting materials to manufacture the product of the second mode of any of the first to fourth aspects of the application.

In one embodiment of the second mode of any of the first to fourth or seventh or eighth aspects of the application, at least one reducing sugar is a monosaccharide or a disaccharide. Similarly, in one embodiment of the fifth or sixth aspect of the application, at least one reducing sugar is a monosaccharide or a disaccharide. For example, in any of these embodiments, the one or more reducing sugars may be selected from the group consisting of monosaccharide reducing sugars and disaccharide reducing sugars. Where at least one reducing sugar is a disaccharide, or the one or more reducing sugars are selected from a group comprising disaccharide reducing sugars, typically at least one disaccharide reducing sugar is maltose, lactose, lactulose, cellubiose, kojibiose, nigerose, sophorose, latninarbiose, gentiobiose, turanose, maltulose, palantinose, gentiobiulose, mannobiose, melibiose, melibiulose, rutinose, rutinulose or xylobiose. Where at least one reducing sugar is a monosaccharide, or the one or more reducing sugars are selected from a group comprising monosaccharide reducing sugars, typically at least one monosaccharide reducing sugar is an aldose or a ketose. For example, the one or more reducing sugars may be selected from the group consisting of aldose and ketose reducing sugars. Typically the one or more reducing sugars are selected from the group consisting of aldotetrose, aldopentose, aldohexose, ketotetrose, ketopentose, and ketohexose reducing sugars. Suitable examples of aldose reducing sugars include erythrose, threose, ribose, arabinose, xylose, lyxose, allose, altrose, glucose, mannose, gulose, idose, galactose and talose. Suitable examples of ketose reducing sugars include erythrulose, ribulose, xylulose, psicose, fructose, sorbose and tagatose. The aldose or the ketose may also be a deoxy-reducing sugar, for example a 6-deoxy reducing sugar such as fucose or rhamnose.

Where the reducing sugar is a monosaccharide, the monosaccharide may be in the D- or L-configuration, or a mixture thereof. Typically, the monosaccharide is present in the configuration in which it most commonly occurs in nature. For example, the one or more reducing sugars may be selected from the group consisting of D-ribose, L-arabinose, D-xylose, D-lyxose, D-glucose, D-mannose, D-galactose, D-psicose, D-fructose, L-fucose and L-rhamnose.

In an exemplary embodiment, the one or more reducing sugars are selected from the group consisting of D-xylose, D-glucose, D-mannose, D-galactose, L-rhamnose and lactose.

In one embodiment of the second mode of any of the first to fourth or seventh or eighth aspects of the application, the ratio of the total amount of the one or more sweeteners to the total combined amount of the one or more amine donors and the one or more reducing sugars in the starting materials or the composition is from 99:1 to 1:99 by weight. More typically, the ratio is from 95:5 to 10:90 by weight, more typically still from 90:10 to 20:80 by weight. In an exemplary embodiment of the second mode of any of the first to fourth or seventh or eighth aspects of the application, the ratio of the total amount of the one or more sweeteners to the total combined amount of the one or more amine donors and the one or more reducing sugars in the starting materials or the composition is from 80:20 to 40:60 by weight.

In another embodiment of the second mode of any of the first to fourth or seventh or eighth aspects of the application, the ratio of the total amount of the one or more reducing sugars to the total amount of the one or more amine donors in the starting materials or the composition is from 99:1 to 1:99 by weight. More typically, the ratio is from 95:5 to 5:95 by weight, more typically still from 90:10 to 10:90 by weight. In an exemplary embodiment of the second mode of any of the first to fourth or seventh or eighth aspects of the application, the ratio of the total amount of the one or more reducing sugars to the total amount of the one or more amine donors in the starting materials or the composition is from 5:1 to 1:5 by weight. More typically still, the ratio is from 2:1 to 1:1 by weight.

In one embodiment of the fifth or sixth aspect of the application, the starting materials consist essentially of one or more amine donors and one or more reducing sugars.

In another embodiment of the fifth or sixth aspect of the application, the ratio of the total amount of the one or more reducing sugars to the total amount of the one or more amine donors in the starting materials is from 99:1 to 1:99 by weight. More typically, the ratio is from 95:5 to 10:90 by weight, more typically still from 90:10 to 25:75 by weight. In an exemplary embodiment of the fifth or sixth aspect of the application, the ratio of the total amount of the one or more reducing sugars to the total amount of the one or more amine donors in the starting materials is from 75:25 to 50:50 by weight. More typically in such an embodiment, the ratio is from 70:30 to 60:40 by weight. More typically still, the ratio is about 2:1 by weight.

In one embodiment of the ninth or tenth aspect of the application, the total amount of the one or more products of the fifth aspect of the application constitutes from 0.1 to 99 wt. % of the composition. More typically in such an embodiment, the total amount of the one or more products of the fifth aspect of the application constitutes from 1 to 99 wt. % of the composition.

In one embodiment of the ninth or tenth aspect of the application, the ratio of the total amount of the one or more sweeteners to the total amount of the one or more products of the fifth aspect of the application in the composition is from 200:11. to 1:100 by weight. More typically, the ratio is from 150:1 to 5:95, more typically still from 100:1 to 1:10, and even more typically from 95:5 to 20:80 by weight. In an exemplary embodiment of ninth or tenth aspect of the application, the ratio of the total amount of the one or more sweeteners to the total amount of the one or more products of the fifth aspect of the application in the composition is from 90:10 to 70:30 by weight.

In one embodiment of any of the first to eighth aspects of the application, at least one amine donor is a primary amine, a secondary amine, an amino acid, a peptide, or a protein. More typically, at least one amine donor is an amino acid, a peptide, or a protein. For example, the one or more amine donors may be selected from the group consisting of amino acids, peptides and proteins.

In another embodiment of any of the first to eighth aspects of the application, at least one amine donor is an amino acid. For example, the one or more amine donors may be selected from the group consisting of amino acids. Typically, at least one amine donor is an a-amino acid. More typically, the one or more amine donors are selected from the group consisting of a-amino acids. For example, the one or more amine donors may be selected from the group consisting of alanine, arginine, asparagine, aspartic acid, cysteine, glutamine, glutamic acid, glycine, histidine, isoleucine, leucine, lysine, methionine, phenylalanine, proline, serine, threonine, tryptophan, tyrosine and valine. More typically still, at least one amino acid is a proteinogenic amino acid. For example, the one or more amine donors may be selected from the group consisting of L-alanine, L-arginine, L-asparagine, L-aspartic acid, L-cysteine, L-glutamine, L-glutamic acid, L-glycine, L-histidine, L-isoleucine, L-leucine, L-lysine, L-methionine, L-phenylalanine, L-proline, L-serine, L-threonine, L-tryptophan, L-tyrosine and L-valine.

In another embodiment of any of the first to eighth aspects of the application, at least one amine donor is L-alanine, L-arginine, L-glutamic acid, L-lysine, L-phenylalanine, L-proline, L-threonine or L-valine. For example, the one or more amine donors may be selected from the group consisting of L-alanine, L-arginine, L-glutamic acid, L-lysine, L-phenylalanine, L-proline, L-threonine and L-valine.

In an exemplary embodiment of the first mode of any of the first to fourth or seventh or eighth aspects of the application, at least one amine donor is L-alanine or L-phenylalanine. For example, the one or more amine donors may be selected from the group consisting of L-alanine and L-phenylalanine.

In an exemplary embodiment of the second mode of any of the first to fourth or seventh or eighth aspects of the application, at least one amine donor is L-alanine, L-arginine, L-glutamic acid, L-lysine, L-phenylalanine, L-proline or L-valine. For example, the one or more amine donors may be selected from the group consisting of L-alanine, L-arginine, L-glutamic acid, L-lysine, L-phenylalanine, L-proline and L-valine.

In a further exemplary embodiment of the first mode of the first aspect of the application, the product is preparable by the reaction of starting materials in a reaction mixture, wherein the reaction mixture comprises the starting materials and one or more solvents, wherein the starting materials comprise:

(i) one or more sweeteners selected from the group consisting of terpenoid sweeteners and terpenoid glycoside sweeteners, wherein at least one sweetener is a terpenoid glycoside sweetener;

(ii) one or more amine donors selected from the group consisting of a-amino acids; and (iii) substantially no reducing sugars;

wherein the ratio of the total amount of the one or more sweeteners to the total amount of the one or more amine donors in the starting materials is from 99:1 to 4:1 by weight.

In a corresponding exemplary embodiment of the first mode of the third aspect of the application, the product is obtainable by the heat treatment of starting materials in a treatment mixture, wherein the treatment mixture comprises the starting materials and one or more solvents, wherein the starting materials comprise:

(i) one or more sweeteners selected from the group consisting of terpenoid sweeteners and terpenoid glycoside sweeteners, wherein at least one sweetener is a terpenoid glycoside sweetener;

(ii) one or more amine donors selected from the group consisting of a-amino acids; and (iii) substantially no reducing sugars;

wherein the ratio of the total amount of the one or more sweeteners to the total amount of the one or more amine donors in the starting materials is from 99:1 to 4:1 by weight.

In an exemplary embodiment of the second mode of the first aspect of the application, the product is preparable by the reaction of starting materials in a reaction mixture, wherein the reaction mixture comprises the starting materials and one or more solvents, wherein the starting materials comprise:

(i) one or more sweeteners selected from the group consisting of terpenoid sweeteners and terpenoid glycoside sweeteners, wherein at least one sweetener is a terpenoid glycoside sweetener;

(ii) one or more amine donors selected from the group consisting of a-amino acids; and (iii) one or more reducing sugars selected from the group consisting of monosaccharide reducing sugars and disaccharide reducing sugars;

wherein the ratio of the total amount of the one or more sweeteners to the total combined amount of the one or more amine donors and the one or more reducing sugars in the starting materials is from 90:10 to 20:80 by weight; and wherein the ratio of the total amount of the one or more reducing sugars to the total amount of the one or more amine donors in the starting materials is from 5:1 to 1:5 by weight.

In a corresponding exemplary embodiment of the second mode of the third aspect of the application, the product is obtainable by the heat treatment of starting materials in a treatment mixture, wherein the treatment mixture comprises the starting materials and one or more solvents, wherein the starting materials comprise:

(i) one or more sweeteners selected from the group consisting of terpenoid sweeteners and terpenoid glycoside sweeteners, wherein at least one sweetener is a terpenoid glycoside sweetener;

(ii) one or more amine donors selected from the group consisting of a-amino acids; and (iii) one or more reducing sugars selected from the group consisting of monosaccharide reducing sugars and disaccharide reducing sugars;

wherein the ratio of the total amount of the one or more sweeteners to the total combined amount of the one or more amine donors and the one or more reducing sugars in the starting materials is from 90:10 to 20:80 by weight; and wherein the ratio of the total amount of the one or more reducing sugars to the total amount of the one or more amine donors in the starting materials is from 5:1 to 1:5 by weight.

In an exemplary embodiment of the ninth aspect of the application, the composition comprises one or more sweeteners and one or more products preparable by the reaction of starting materials in a reaction mixture, wherein the one or more sweeteners are selected from the group consisting of terpenoid sweeteners and terpenoid glycoside sweeteners, wherein at least one sweetener is a terpenoid glycoside sweetener, wherein the starting materials comprise:

(i) one or more amine donors selected from the group consisting of α-amino acids; and (ii) one or more reducing sugars selected from the group consisting of monosaccharide reducing sugars and disaccharide reducing sugars;

wherein the ratio of the total amount of the one or more reducing sugars to the total amount of the one or more amine donors in the starting materials is from 75:25 to 50:50 by weight; and wherein the ratio of the total amount of the one or more sweeteners to the total amount of the one or more products in the composition is from 90:10 to 70:30 by weight.

In one embodiment any of the first to eighth aspects of the application, at least one amine donor is thaumatin. For example, the one or more amine donors may consist substantially of thaumatin. In another aspect of such an embodiment, the one or more amine donors comprise thaumatin and one or more amino acids, such as any of the amino acids discussed above. For example, the one or more amine donors may be selected from the group consisting of thaumatin and amino acids, provided that at least one amine donor is thaumatin and at least one amine donor is an amino acid.

Where the one or more amine donors comprise thaumatin and one or more amino acids, the ratio of the amount of thaumatin to the total amount of the one or more amino acids in the starting materials may be from 100:1 to 1:100 by weight. Typically, the ratio is from 1:1 to 1:10 by weight. More typically, the ratio is from 1:2 to 1:3 by weight.

In another embodiment of any of the first to eighth aspects of the application, at least one amine donor is provided in the form of a vegetable, fimgal or meat extract, wherein the vegetable, fungal or meat extract comprises one or more amine donors such as amino acids, peptides and/or proteins. Typically in such an embodiment, the at least one amine donor is provided in the form of a yeast extract. More typically, the one or more amine donors are a yeast extract.

In an exemplary embodiment of the first mode of any of the first to fourth or seventh or eighth aspects of the application, at least one amine donor is a yeast extract. Typically in such an embodiment, the starting materials comprise one or more sweeteners and one or more yeast extracts. More typically, the starting materials consist essentially of one or more sweeteners and one or more yeast extracts.

In one embodiment of the first, second, fifth or sixth aspect of the application, the product is preparable by or prepared by the reaction, in the substantial absence of additional acids or bases, of the starting materials. Typically in such an embodiment, the product is preparable by or prepared by the reaction of the starting materials in a reaction mixture, wherein the reaction mixture comprises the starting materials and one or more solvents, and wherein the reaction mixture comprises substantially no additional acids or bases. For example, the reaction mixture may comprise less than 0.1% by weight of additional acids or bases, or more typically less than 0.01% or less than 0.001% by weight of additional acids or bases, relative to the total amount of the starting materials.

As used herein, the term "additional acids or bases" is understood to refer to any acids or bases other than any sweeteners, amine donors or reducing sugars which form the starting materials and which may themselves be considered acids or bases. In other words, in the above embodiment the one or more sweeteners, one or more amine donors, and (if present) one or more reducing sugars may be acids or bases, but the reaction mixture is substantially free of other acids or bases.

In a corresponding embodiment of the third or fourth aspect of the application, the product is obtainable by the heat treatment, in the substantial absence of additional acids or bases, of the starting materials. Typically in such an embodiment, the product is obtainable by the heat treatment of the starting materials in a treatment mixture, wherein the treatment mixture comprises the starting materials and one or more solvents, and wherein the treatment mixture comprises substantially no additional acids or bases. For example, the treatment mixture may comprise less than 0.1% by weight of additional acids or bases, or more typically less than 0.01% or less than 0.001% by weight of additional acids or bases, relative to the total amount of the starting materials.

In another embodiment of the first, second, fifth or sixth aspect of the application, the product is preparable by the reaction of the starting materials, in the presence of one or more additional acids or bases. Typically in such an embodiment, the product is preparable by the reaction of the starting materials in a reaction mixture, wherein the reaction mixture comprises the starting materials, one or more additional acids or bases, and one or more solvents. In one aspect of such an embodiment, the product is preparable by the reaction of the starting materials, in the presence of one or more additional acids. In another aspect of such an embodiment, the product is preparable by the reaction of the starting materials, in the presence of one or more additional bases.

In a corresponding embodiment of the third or fourth aspect of the application, the product is obtainable by the heat treatment of the starting materials, in the presence of one or more additional acids or bases. Typically in such an embodiment, the product is obtainable by the heat treatment of the starting materials in a treatment mixture, wherein the treatment mixture comprises the starting materials, one or more additional acids or bases, and one or more solvents. In one aspect of such an embodiment, the product is obtainable by the heat treatment of the starting materials, in the presence of one or more additional acids. In another aspect of such an embodiment, the product is obtainable by the heat treatment of the starting materials, in the presence of one or more additional bases.

Typically, in either of the above two embodiments, the one or more additional acids are suitable for human consumption. Typically, the one or more additional acids are selected from the group consisting of carboxylic acids, such as acetic acid, citric acid, tartaric acid and malic acid. In an exemplary embodiment, the additional acid is citric acid.

Typically, in either of the above two embodiments, the one or more additional bases are suitable for human consumption. Typically, the one or more additional bases are selected from the group consisting of carbonate or bicarbonate bases, such as sodium carbonate, potassium carbonate, magnesium carbonate, sodium bicarbonate, and potassium bicarbonate. In an exemplary embodiment, the additional base is sodium carbonate.

In one embodiment of any of the first to sixth aspects of the application, the product is preparable by, prepared by, obtainable by or obtained by the reaction or heat treatment of the starting materials at a pH of from 2 to 14. For example, the reaction mixture or treatment mixture may contain one or more additional acids or bases in an amount sufficient to achieve the specified pH. In one aspect of such an embodiment, the product is preparable by, prepared by, obtainable by or obtained by the reaction or heat treatment of the starting materials at a pH of from 7 to 14, more typically at a pH of from 7.5 to 12, and more typically still at a pH of from 8 to 10. For example, the reaction mixture or treatment mixture may contain one or more additional bases in an amount sufficient to achieve a pH of from 8 to 10. In another aspect of such an embodiment, the product is preparable by, prepared by, obtainable by or obtained by the reaction or heat treatment of the starting materials at a pH of from 2 to 7, more typically at a pH. of from 2.5 to 6, and more typically still at a pH of from 3 to 5. For example, the reaction mixture or treatment mixture may contain one or more additional acids in an amount sufficient to achieve a pH of from 3 to 5.

As stated above, in one embodiment of any of the first to sixth aspects of the application, the product is preparable by, prepared by, obtainable by or obtained by the reaction or heat treatment of the starting materials in one or more solvents. The starting materials may form a slurry and/or a solution in the one or more solvents. Typically, the one or more solvents are selected from the group consisting of water and alcohols. More typically, the one or more solvents are selected from the group consisting of water, monohydric aliphatic alcohols (such as methanol, ethanol, propanol, butanol and pentanol), and glycols (such as ethylene glycol and propylene glycol). Typically at least one solvent is water. For instance, the one or more solvents may be water or a mixture of water and an alcohol such as propylene glycol. More typically, the solvent is water, i.e. the product is preparable by the reaction of the starting materials in water. Typically, the water is deionised water.

Typically, where the product is preparable by, prepared by, obtainable by or obtained by the reaction or heat treatment of the starting materials in one or more solvents, the total amount of the one or more solvents constitutes from 5 wt. % to 99 wt. % of the reaction mixture or the heat treatment mixture. More typically, the total amount of the one or more solvents constitutes from 10 wt. % to 95 wt. % of the reaction mixture or the heat treatment mixture. Yet more typically, the total amount of the one or more solvents constitutes from 15 wt. % to 90 wt. % of the reaction mixture or the heat treatment mixture. More typically still, the total amount of the one or more solvents constitutes from 30 wt. % to 80 wt. % of the reaction mixture or the heat treatment mixture.

Typically, where the product is preparable by, prepared by, obtainable by or obtained by the reaction or heat treatment of the starting materials in one or more solvents, the total amount of the starting materials (before reaction or heat treatment) constitutes from 1 wt. % to 95 wt. % of the reaction mixture or the heat treatment mixture. More typically, the total amount of the starting materials constitutes from 5 wt. % to 90 wt. % of the reaction mixture or the heat treatment mixture. Yet more typically, the total amount of the starting materials constitutes from 10 wt. % to 85 wt. % of the reaction mixture or the heat treatment mixture. More typically still, the total amount of the starting materials constitutes from 20 wt. % to 70 wt. % of the reaction mixture or the heat treatment mixture.

In one embodiment of the first or second aspect of the application, the product is preparable by or prepared by the reaction of the starting materials in a reaction mixture, wherein the reaction mixture consists essentially of one or more sweeteners, one or more amine donors, one or more solvents, optionally one or more reducing sugars, optionally one or more acids or bases, optionally one or more inert components, and any reaction product or products.

In one embodiment of the third or fourth aspect of the application, the product is obtainable by or obtained by the heat treatment of the starting materials in a treatment mixture, wherein the treatment mixture consists essentially of one or more sweeteners, one or more amine donors, one or more solvents, optionally one or more reducing sugars, optionally one or more acids or bases, optionally one or more inert components, and any heat treatment product or products.

In one embodiment of the fifth or sixth aspect of the application, the product is preparable by or prepared by the reaction of the starting materials in a reaction mixture, wherein the reaction mixture consists essentially one or more amine donors, one or more reducing sugars, one or more solvents, optionally one or more acids or bases, optionally one or more inert components, and any reaction product or products.

As used herein, the term "inert component" refers to any component of the reaction or treatment mixture that does not undergo chemical transformation under the reaction or heat treatment conditions.

In one embodiment of any of the first to sixth aspects of the application of the application, the product is preparable by, prepared by, obtainable by or obtained by the reaction or heat treatment of the starting materials at a temperature of at least 50° C. Typically, the product is preparable by, prepared by, obtainable by or obtained by the reaction or heat treatment at a temperature of from 50 to 200° C. More typically, the temperature is from 60 to 150° C. More typically still, the temperature is from 80 to 120° C.

In one embodiment of any of the first, second, fifth or sixth aspects of the application, the product is preparable by or prepared by the reaction of the starting materials for a reaction period of from 1 minute to one week. In a corresponding embodiment of the third and fourth aspects of the application, the product is obtainable by or obtained by the heat treatment of the starting materials for a treatment period of from 1 minute to one week. More typically, the reaction period or the treatment period is from 10 minutes to 48 hours. Yet more typically, the reaction period or the treatment period is from 30 minutes to 24 hours. More typically still, the reaction period or the treatment period is from 45 minutes to 6 hours.

In another embodiment of the first, second, fifth or sixth aspects of the application, the product is preparable by or prepared by the steps of (i) reacting the starting materials in a reaction mixture, wherein the reaction mixture comprises the starting materials and one or more solvents; and (ii) removing the one or more solvents from the reaction mixture to afford the product. In a corresponding embodiment of the third and fourth aspects of the application, the product is obtainable by or obtained by the steps of (i) heating the starting materials in a treatment mixture, wherein the treatment mixture comprises the starting materials and one or more solvents; and (ii) removing the one or more solvents from the treatment mixture to afford the product. Typically in such embodiments, the one or more solvents are removed from the reaction mixture without any intermediate work-up steps.

In one aspect of the above embodiments, substantially all of the one or more solvents are removed from the reaction mixture or the treatment mixture. For example, at least 90% by weight of the one or more solvents may be removed from the reaction mixture or the treatment mixture. Typically, at least 95% by weight of the one or more solvents are removed from the reaction mixture or the treatment mixture. More typically, at least 99% by weight of the one or more solvents are removed from the reaction mixture or the treatment mixture.

In one aspect of the above embodiments, the one or more solvents are removed by evaporating the solvent, typically at elevated temperature. For example, the one or more solvents may be removed by evaporating the solvent at a temperature of at least 50° C. Typically, the one or more solvents may be removed by evaporating the solvent at a temperature of from 50° C. to 150° C. More typically, the one or more solvents may be removed by evaporating the solvent at a temperature of from 60° C. to 100° C.

In another aspect of the above embodiments, the one or more solvents may be removed by spray drying the reaction mixture or the treatment mixture.

In one embodiment of any of the first to sixth aspects of the application, the product is suitable for human consumption. Typically the product is suitable for use as a food or drink additive. More typically, the product is suitable for use as a sweetener.

In one embodiment of any of the first to sixth aspects of the application, the product is a sensory modulator. For example the product may be a taste modulator, such as flavour and/or smell modulator. In another embodiment, the sensory modulator is a mouthfeel (or kokumi) modulator.

In one embodiment of any of the first to sixth aspects of the application, the product has a citrus or tangerine flavor.

In one embodiment of any of the first to sixth aspects of the application, the product is a solid. Typically, the product is in powdered form.

In one embodiment of any of the first to sixth aspects of the application, the product is a Maillard reaction product, or a mixture of Hard reaction products. Typically in such an embodiment, the product comprises at least one Amadori product. In one embodiment, at least one Amadori product is an Amadori product of rebaudioside A, rebaudiosode B, rebaudioside D, rebaudioside E, rebaudioside I or rebaudioside M. Typically, at least one Amadori product is an Amadori product of rebaudioside A, rebaudiosode B or rebaudioside In another embodiment of any of the first to sixth aspects of the application, the product comprises one or more non-volatile compounds. For example, the product may be a. product of the first aspect of the application, wherein the product is a Maillard reaction product, or a mixture of Maillard reaction products, comprising one or more non-volatile compounds. Typically, where the product comprises one or more non-volatile compounds, the total amount of the one or more non-volatile compounds constitutes from 0.0001 to 99.99 wt. % of the product, More typically, the total amount of the non-volatile compounds constitutes from 50 to 99.9 wt. % of the product. More typically still, the total amount of the non-volatile compounds constitutes from 95 to 99 wt. % of the product.

Optionally the composition of the ninth aspect of the application further comprises one or more additional components that are suitable for human consumption. Similarly the method of the tenth aspect of the application may comprise combining the one or more sweeteners and the one or more products of the fifth aspect of the application with one or more additional components that are suitable for human consumption. Typically such additional components are non-sweetening components, such as non-sweetening food or drink additives.

In one embodiment of the ninth or tenth aspect of the application, the total amount of the one or more sweeteners and the one or more products of the fifth aspect of the application constitutes at least 0.1 wt. % of the composition. In further embodiments, the total amount of the one or more sweeteners and the one or more products of the fifth aspect of the application constitutes at least 1 wt. %, at least 10 wt. %, or at least 50 wt % of the composition. Typically, the total amount of the one or more sweeteners and the one or more products of the fifth aspect of the application constitutes at least 75 wt. %, at least 90 wt. %, or at least 95 wt. % of the composition. In one embodiment of the ninth or tenth aspect of the application, the composition consists essentially of one or more sweeteners and one or more products of the fifth aspect of the application.

An eleventh aspect of the application relates to a composition comprising one or more products of the first or third or fifth aspects of the application, wherein the composition further comprises one or more additional components that are suitable for human consumption.

A twelfth aspect of the application relates to a method of preparing a composition, wherein the method comprises combining one or more products of the first, third or fifth aspects of the application with one or more additional components that are suitable for human consumption. Typically, the method of the twelfth aspect of the application is a method of preparing a composition according to the eleventh aspect of the application.

In one embodiment of the eleventh aspect of the application, the composition comprises one or more products of the first or third aspects of the application, and one or more additional components that are suitable for human consumption. In a corresponding embodiment of the twelfth aspect of the application, the method comprises combining one or more products of the first or third aspects of the application with one or more additional components that are suitable for human consumption.

In one embodiment of the eleventh or twelfth aspect of the application, the total amount of the one or more products of the first, third or fifth aspects of the application constitutes at least 0.01 wt. % of the composition. More typically, the total amount of the one or more products of the first, third or fifth aspects of the application constitutes at least 0.1 wt. % or at least 1 wt. % of the composition. For example, the total amount of the one or more products of the first, third or fifth aspects of the application may constitute from 0.1 to 99 wt. % of the composition, or from 1 to 99 wt. % of the composition. In one embodiment, the total amount of the one or more products of the first, third or fifth aspects of the application constitutes at least 10 wt. % of the composition.

Typically, in accordance with any of the ninth to twelfth aspects of the application, the one or more additional components that are suitable for human consumption are selected from the group consisting of co-sweeteners and non-sweetening components. More typically, the one or more additional components that are suitable for human consumption are selected from the group consisting of co-sweeteners, sweetener enhancers and non-sweetening food or drink additives.

The non-sweetening food or drink additives may comprise one or more flavourings or flavour agents (such as those described herein), one or more thickening agents (such as those described herein), one or more emulsification agents (such as those described herein), and/or one or more salts (such as sodium chloride and potassium chloride). In one embodiment, the non-sweetening food or drink additives are selected from the group consisting of flavourings, flavour agents, thickening agents, emulsification agents and salts.

The co-sweeteners may be any of the one or more sweeteners discussed above in relation to the first to fourth or seventh to tenth aspects of the application, or may be a sugar such as a reducing sugar.

In one embodiment, the co-sweeteners are selected from the group consisting of any bulk sweetener or high intensity sweetener as defined herein. Typically, at least one co-sweetener is a high intensity sweetener.

In one embodiment, at least one co-sweetener is a high intensity natural sweetener. For example, at least one co-sweetener may be a steviol glycoside, such as a naturally occurring steviol glycoside or a glycosylated steviol glycoside.

In another embodiment, at least one co-sweetener is a high intensity synthetic sweetener, typically selected from the group consisting of sorbitol, xylitol, mannitol, sucralose, aspartame, acesulfame-K, neotame, erythritol, trehalose, raffinose, cellobiose, tagatose, allulose, inulin, N—[N-[3-(3- hydroxy-4-methoxyphenyl)propyl]-alpha-aspartyl]-L-phenylalanine 1-methyl ester, glycyrrhizin, sodium cyclamate, brazzein, miraculin, curculin, pentadin, mabinlin, thamatin, neohesperidin dihydrochalcone (NMC), maltol, ethyl maltol and advantame. More typically still, at least one co-sweetener is sucralose or aspartame.

The one or more sweetener enhancers may be selected from the group consisting of brazzein, miraculin, curculin, pentadin, mabinlin and thaumatin. Typically one or more sweetener enhancers comprise thaumatin.

In one embodiment of the ninth or tenth aspect of the application, where the composition comprises thaumatin, the ratio of the amount of thaumatin to the total amount of the one or more products of the fifth aspect of the application in the composition is from 1:1000 to 5:2 by weight. More typically, the ratio is from 1:500 to 3:2 by weight. More typically still, the ratio is from 1:200 to 1:1 by weight.

In one embodiment of the eleventh aspect of the application, the composition comprises one or more products of the first or third aspects of the application, and one or more co-sweeteners. In a corresponding embodiment of the twelfth aspect of the application, the method comprises combining one or more products of the first or third aspects of the application with one or more co-sweeteners. Typically in such embodiments, the one or more products of the first or third aspects of the application are one or more products of the second mode of the first or third aspects of the application. In one aspect of such embodiments, the one or more co-sweeteners are selected from the group consisting of terpenoid sweeteners and terpenoid glycoside sweeteners, wherein at least one co-sweetener is a terpenoid glycoside sweetener. In another aspect of such embodiments, the one or more co-sweeteners are selected from the group consisting of high intensity synthetic sweeteners, such as sucralose and aspartame.

In another embodiment of the eleventh aspect of the application, the composition comprises one or more products of the first or third aspects of the application, one or more sweetener enhancers, and optionally one or more co-sweeteners. in a corresponding embodiment of the twelfth aspect of the application, the method comprises combining one or more products of the first or third aspects of the application with one or more sweetener enhancers, and optionally one or more co-sweeteners. Typically in such embodiments, the one or more products of the first or third aspects of the application are one or more products of the second mode of the first or third aspects of the application. In one aspect of such embodiments, the one or more sweetener enhancers comprise thaumatin.

In one embodiment of the eleventh or twelfth aspect of the application, where the one or more sweetener enhancers comprise thaumatin, the ratio of the amount of thaumatin to the total amount of the one or more products of the first or third aspects of the application in the composition is from 1:1000 to 5:2 by weight More typically, the ratio is from 1:500 to 3:2 by weight. More typically still, the ratio is from 1:200 to 1:1 by weight.

In one embodiment, where the composition of the eleventh or twelfth aspect of the application comprises one or more products of the first or third aspects of the application, and one or more co-sweeteners, the ratio of the total amount of the one or more products of the first or third aspects of the application to the total amount of the one or more co-sweeteners in the composition is from 1:99 to 99:1 by weight. More typically, the ratio is from 5:95 to 80:20 by weight. More typically still, the ratio is from 15:85 to 60:40 by weight.

In another embodiment, where the composition of the eleventh or twelfth aspect of the application comprises one or more products of the first or third aspects of the application, and one or more co-sweeteners, the total amount of the one or more products of the first or third aspects of the application and the one or more co-sweeteners constitute at least 0.1 wt. % of the composition. In further embodiments, the total amount of the one or more products of the first or third aspects of the application and the one or more co-sweeteners constitutes at least 1 wt. %, at least 10 wt. %, or at least 50 wt. % of the composition. Typically, the total amount of the one or more products of the first or third aspects of the application and the one or more co-sweeteners constitutes at least 75 wt. %. at least 90 wt. %, or at least 95 wt. % of the composition. In one embodiment of the eleventh or twelfth aspect of the application, the composition consists essentially of one or more products of the first or third aspects of the application and one or more co-sweeteners.

In one embodiment of any of the seventh to twelfth aspects of the application, the composition is suitable for human consumption. Typically the composition is suitable for use as a food or drink additive. More typically, the composition is suitable for use as a sweetener or a flavouring agent.

In another embodiment of any of the seventh to twelfth aspects of the application, the composition is a pharmaceutical composition, wherein the additional components that are suitable for human consumption comprise one or more active pharmaceutical ingredients and optionally one or more pharmaceutically acceptable excipients.

In one embodiment of any of the seventh to twelfth aspects of the application, the composition is a solid. Typically, the composition is in powdered form.

In another embodiment of any of the seventh to twelfth aspects of the application, the composition is in liquid form. For example, the composition may be a solution, a suspension or an emulsion.

A thirteenth aspect of the application provides a food or beverage comprising one or more products of any of the first, third or fifth aspects of the application, or one or more compositions of any of the seventh, ninth or eleventh aspects of the application.

In one embodiment of the thirteenth aspect of the application, where the food or beverage comprises one or more products of any of the first, third or fifth aspects of the application, the total amount of the one or more products of any of the first, third or fifth aspects of the application constitutes from 0.0001 to 1.5 wt. % of the food or beverage. More typically the total amount constitutes from 0.0005 to 0.5 wt. % of the food or beverage. More typically still, the total amount constitutes from 0.001 to 0.1 wt. % of the food or beverage.

In one embodiment of the thirteenth aspect of the application, where the food or beverage comprises one or more products of any of the first, third or fifth aspects of the application, the food or beverage further comprises one or more co-sweeteners, sweetener enhancers or non-sweetening food or drink additives, such as any described above in relation to the ninth to twelfth aspects of the application. In one aspect of such an embodiment, the food or beverage comprises one or more sweetener enhancers such as thaumatin. Typically, where present, the total amount of the one or more sweetener enhancers constitutes from 0.00001 to 0.05 wt. % of the food or beverage. More typically, where present, the total amount of the one or more sweetener enhancers constitutes from 0.00005 to 0.0025 wt. % of the food or beverage. In another aspect of such an embodiment, the food or beverage comprises one or more co-sweeteners, such as one or more natural or synthetic high intensity sweeteners. For example, the food or beverage may comprise a steviol glycoside, such as a naturally occurring steviol glycoside or a glycosylated steviol glycoside. Alternatively or in addition, the food or beverage may comprise a co-sweetener selected from the group consisting of sorbitol, xylitol, mannitol, sucralose, aspartame, acesulfame-K, neotame, erythritol, trehalose, raffinose, cellobiose, tagatose, allulose, inulin, N—[N-[3-(3-hydroxy-4-methoxyphenyl) propyl]-alpha-aspartyl]-L-phenylalanine 1-methyl ester, glycyrrhizin, sodium cyclamate, brazzein, miraculin, curculin, pentadin, tnabinlin, thaumatin, neohesperidin dihydrochalcone (NHDC), maltol, ethyl maltol and advantame. Typically, where the food or beverage comprises one or more co-sweeteners, the total amount of the one or more co-sweeteners constitutes from 0.001 to 10 wt. % of the food or beverage. More typically the total amount of the one or more co-sweeteners constitutes from 0.005 to 5 wt. % of the food or beverage. More typically still the total amount of the one or more co-sweeteners constitutes from 0.01 to 2 wt. % of the food or beverage.

In one embodiment of the thirteenth aspect of the application, where the food or beverage comprises one or more compositions of any of the seventh, ninth or eleventh aspects of the application, the total amount of the one or more compositions of any of the seventh, ninth or eleventh aspects of the application constitutes from 0.0001 to 10 wt. % of the food or beverage. More typically the total amount constitutes from 0.001 to 5 wt. % of the food or beverage. More typically still, the total amount constitutes from 0.01 to 1 wt. % of the food or beverage.

In one embodiment of the thirteenth aspect of the application, the food or beverage is a beverage.

In one embodiment, where the thirteenth aspect of the application provides a beverage, the beverage does not contain any product made from roasted coffee beans.

In another embodiment, where the thirteenth aspect of the application provides a beverage, the beverage is a carbonated soft beverage. For example, such a beverage may be a cola, lemonade, orangeade, or other fruit flavoured carbonated soft beverage.

In yet another embodiment, where the thirteenth aspect of the application provides a beverage, the beverage is a flavoured water. For example, such a beverage may be a fruit-flavoured water.

In yet another embodiment, where the thirteenth aspect of the application provides a beverage, the beverage is a fruit juice or a beverage comprising a fruit juice.

In one embodiment, where the thirteenth aspect of the application provides a beverage, the beverage is a diary beverage or a beverage comprising a dairy product. For example, the beverage may be a milk-shake.

In one embodiment, where the thirteenth aspect of the application provides a beverage, the beverage comprises a product of the first aspect of the application, wherein the product is a Maillard reaction product, or a mixture of Maillard reaction products, wherein the Maillard reaction product(s) comprise one or more non-volatile compounds.

In one embodiment of the thirteenth aspect of the application, the food or beverage is a food.

In one embodiment, where the thirteenth aspect of the application provides a food, the food is a bakery product, such as a bread-based product.

In one embodiment, where the thirteenth aspect of the application provides a food, the food is a biscuit or a cake.

In one embodiment, where the thirteenth aspect of the application provides a food, the food comprises a product of the first aspect of the application, wherein the product is a Maillard reaction product, or a mixture of Maillard reaction products, wherein the Maillard reaction product(s) comprise one or more non-volatile compounds.

In one embodiment of the thirteenth aspect of the application, the food or beverage is a dairy product. The dairy product may be a dairy beverage or a dairy food. In one aspect of such an embodiment, the dairy product is a milk, cream, milkshake or flavoured cream. In another aspect of such an embodiment, the dairy product is a yoghurt. In yet another aspect of such an embodiment, the dairy product is a cheese or butter.

In one embodiment, where the thirteenth aspect of the application provides a dairy product, the dairy product is a pasteurized or sterilized dairy product. Typically in such an embodiment, the dairy product comprises a product of any of the first, third or fifth aspects of the application, wherein the product of the first, third or fifth aspect of the application (which may optionally be part of a composition according to any of the seventh, ninth or eleventh aspects of the application) is formed prior to pasteurization or sterilization.

A fourteenth aspect of the application provides a food or beverage precursor comprising one or more products of any of the first, third or fifth aspects of the application, or one or more compositions of any of the seventh, ninth or eleventh aspects of the application.

As used herein, a food or beverage precursor refers to any product that may be transformed into a food or beverage by reconstitution (e.g. with water and/or milk) and/or by heat treatment (e.g. by baking), optionally with mixing. Typically, no further ingredients (other than any reconstituting liquid) need to be added to the food or beverage precursor to form the food or beverage. Examples of such food precursors include doughs, cake mixes, biscuit mixes, and the like. Examples of such beverage precursors include powdered drinks (e.g. instant coffee or hot chocolate) and liquid concentrates (e.g. to prepare a fruit-flavoured drink when added to water).

In one embodiment of the fourteenth aspect of the application, where the precursor comprises one or more products of any of the first, third or fifth aspects of the application, the total amount of the one or more products of any of the first, third or fifth aspects of the application constitutes from 0.0001 to 15 wt. % of the precursor. More typically the total amount constitutes from 0.0005 to 5 wt. % of the precursor. More typically still, the total amount constitutes from 0.001 to 1 wt. % of the precursor.

In one embodiment of the fourteenth aspect of the application, where the precursor comprises one or more products of any of the first, third or fifth aspects of the application, the precursor may further comprise one or more co-sweeteners, sweetener enhancers or non-sweetening food or drink additives, such as any described above in relation to the ninth to twelfth aspects of the application. In one aspect of such an embodiment, the precursor comprises one or more sweetener enhancers such as thaumatin. Typically, where present, the total amount of the one or more sweetener enhancers constitutes from 0.00001 to 0.5 wt. % of the precursor. More typically, where present, the total amount of the one or more sweetener enhancers constitutes from 0.00005 to 0.025 wt.

% of the precursor. in another aspect of such an embodiment, the precursor comprises one or more co-sweeteners, such as one or more natural or synthetic high intensity sweeteners. For example, the precursor may comprise a steviol glycoside, such as a naturally occurring steviol glycoside or a glycosylated steviol glycoside. Alternatively or in addition, the precursor may comprise a co-sweetener selected from the group consisting of sorbitol, xylitol, mannitol, sucralose, aspartame, acesulfame-K, neotame, erythritol, trehalose, raffinose, cellobiose, tagatose, allulose, inulin, N—[N-[3-(3-hydroxy-4-methoxyphenyl)propyl]-alphaspartyl]-L-phenylalanine 1-methyl ester, glycyrrhizin, sodium cyclamate, brazzein, miraculin, curculin, pentadin, mabinlin, thaumatin, neohesperidin dihydrochalcone (NHDC), maltol, ethyl maltol and advantame. Typically, where the precursor comprises one or more co-sweeteners, the total amount of the one or more co-sweeteners constitutes from 0.001 to 50 wt. % of the precursor. More typically the total amount of the one or more co-sweeteners constitutes from 0.005 to 20 wt % of the precursor. More typically still the total amount of the one or more co-sweeteners constitutes from 0.01 to 10 wt. % of the precursor.

In another embodiment of the fourteenth aspect of the application, where the precursor comprises one or more compositions of any of the seventh, ninth or eleventh aspects of the application, the total amount of the one or more compositions of any of the seventh, ninth or eleventh aspects of the application constitutes from 0.0001 to 50 wt % of the precursor. More typically the total amount constitutes from 0.001 to 20 wt % of the precursor. More typically still, the total amount constitutes from 0.01 to 10 wt. % of the precursor.

A fifteenth aspect of the application provides a method of making a food or a beverage, the method comprising the reconstitution and/or heat treatment of a food or beverage precursor of the fourteenth aspect of the application. Also envisaged are foods or beverages that are made or makeable via the fifteenth aspect of the application. Typically, the food or beverage is a food or beverage of the fourteenth aspect of the application.

The food or beverage precursor of the fourteenth aspect of the application may be a precursor of any food or beverage described above in relation to the thirteenth aspect of the application.

In one embodiment of the fourteenth aspect of the application, the food or beverage precursor is a beverage precursor. In one aspect of such an embodiment, the beverage precursor is a powdered or granulated drink. For example, the beverage precursor may be a powdered or granulated coffee, tea, drinking chocolate, malt drink, or orange drink. Typically the powdered or granulated drink is suitable for reconstitution into a beverage by mixing with water and/or milk, optionally at a temperature above room temperature (25° C.), e.g. at 80-100° C. In another aspect of such an embodiment, the beverage precursor is a syrup or concentrate. For example the beverage precursor may be a fruit flavoured syrup or concentrate, such as an orange, lemon, apple, pear, strawberry, raspberry, blackcurrent or cherry flavoured syrup or concentrate. Typically the syrup or concentrate is suitable for reconstitution into a beverage by mixing with water and/or milk, to generate a fruit-flavoured water, or a milkshake, optionally at a temperature between 0° C. and 30° C.

In one embodiment, where the fourteenth aspect of the application provides a beverage precursor, the beverage precursor does not contain any product made from roasted coffee beans.

In one embodiment of the fifteenth aspect of the application, the method comprises reconstituting a beverage precursor of the fourteenth aspect of the application, such as a powdered or granulated drink, or a syrup or concentrate, with water and/or milk, to provide a beverage.

In one embodiment, where the fourteenth aspect of the application provides a beverage precursor, the beverage precursor comprises a product of the first aspect of the application, wherein the product is a Maillard reaction product, or a mixture of Maillard reaction products, wherein the Maillard reaction product(s) comprise one or more non-volatile compounds.

In one embodiment of the fourteenth aspect of the application, the food or beverage precursor is a food precursor.

In one embodiment of the fourteenth aspect of the application, the food or beverage precursor is a dough. The dough may be suitable for baking into a bakery product such as a bread based product. In a corresponding embodiment of the fifteenth aspect of the application, the method comprises baking a dough of the fourteenth aspect of the application to provide a bakery product.

In another embodiment of the fourteenth aspect of the application, the food or beverage precursor is a biscuit mix or a cake mix. The biscuit mix or the cake mix may be suitable for baking into a biscuit or cake. In a corresponding embodiment of the fifteenth aspect of the application, the method comprises baking the biscuit mix or the cake mix of the fourteenth aspect of the application into a biscuit or cake.

In one embodiment, where the fourteenth aspect of the application provides a food precursor, the food precursor comprises a product of the first aspect of the application, wherein the product is a Maillard reaction product, or a mixture of Maillard reaction products, wherein the Maillard reaction product(s) comprise one or more non-volatile compounds.

A sixteenth aspect of the application provides a method of manufacturing a food or beverage, or a food or beverage precursor, wherein the method comprises the step of combining one or more products of any of the first, third or fifth aspects of the application, or one or more compositions of any of the seventh, ninth or eleventh aspects of the application, with one or more other ingredients of the food or beverage, or the food or beverage precursor. Typically the method further comprises the step of processing the combined ingredients to afford the food or beverage, or the food or beverage precursor. In one embodiment, the sixteenth aspect of the application provides a method of manufacturing a food or beverage according to the thirteenth aspect of the application. In another embodiment, the sixteenth aspect of the application provides a method of manufacturing a food or beverage precursor according to the fourteenth aspect of the application.

A seventeenth aspect of the application provides a method of modulating one or more sensory properties of a food or a beverage, wherein the method comprises the step of adding to the food, beverage or food or beverage ingredients one or more products of any of the first, third or fifth aspects of the application, or one or more compositions of any of the seventh, ninth or eleventh aspects of the application.

Where the method of the seventeenth aspect of the application comprises the step of adding to the food, beverage or food or beverage ingredients one or more products of any of the first, third or fifth aspects of the application, typically the one or more products are added in an amount such that the total amount of the one or more products of any of the first, third or fifth aspects of the application constitutes from 0.0001 to 1.5 wt. % of the food or beverage. More typically the total amount constitutes from 0.0005 to 0.5 wt. % of the food or beverage. More typically still, the total amount constitutes from 0.001 to 0.1 wt. % of the food or beverage.

Where the method of the seventeenth aspect of the application comprises the step of adding to the food, beverage or food or beverage ingredients one or more compositions of any of the seventh, ninth or eleventh aspects of the application, typically the one or more compositions added in an amount such that the total amount of the one or more compositions of any of the seventh, ninth or eleventh aspects of the application constitutes from 0.0001 to 10 wt. % of the food or beverage. More typically the total amount constitutes from 0.001 to 5 wt. % of the food or beverage. More typically still, the total amount constitutes from 0.01 to 1 wt. % of the food or beverage.

In one embodiment of the seventeenth aspect of the application, the method is a method of modulating the taste and/or smell of the food or beverage. For example, the method may be a method of improving the taste profile of the food or beverage.

In one embodiment of the seventeenth aspect of the application, the method is a method of improving the taste profile of a beverage, wherein the method comprises the step of adding to the beverage or beverage ingredients one or more products of either of the first or third aspects of the application. The beverage produced may be a beverage in accordance with any embodiment of the thirteenth aspect of the application. In one aspect of such an embodiment, the method comprises the step of adding to the beverage or beverage ingredients one or more products of the first mode of any of the first or third aspects of the application. In another aspect of such an embodiment, the method comprises the step of adding to the beverage or beverage ingredients one or more products of the second mode of any of the first or third aspects of the application. Typically in such an embodiment, the one or more sweeteners used in the first or third aspects of the application comprise at least one terpenoid glycoside sweetener, more typically at least one steviol glycoside. Typically in such an embodiment, the one or more amine donors used in the first or third aspects of the application comprise thaumatin, or thaumatin and one or more amino acids. Optionally, the method further comprises the step of adding to the beverage or beverage ingredients one or more co-sweeteners or sweetener enhancers, as described above in relation to the ninth to twelfth aspects of the application. The one or more co-sweeteners or sweetener enhancers may be added concurrently with, or separately from, each other and/or the one or more products of either of the first or third aspects of the application.

In another embodiment of the seventeenth aspect of the application, the method is a method of improving the taste profile of a beverage, wherein the method comprises the step of adding to the beverage or beverage ingredients one or more products of the fifth aspect of the application. The beverage produced may be a beverage in accordance with any embodiment of the thirteenth aspect of the application. Typically in such an embodiment, the one or more amine donors used in the fifth aspect of the application comprise thaumatin, or thaumatin and one or more amino acids. Optionally, the method further comprises the step of adding to the beverage or beverage ingredients one or more co-sweeteners or sweetener enhancers, as described above in relation to the ninth to twelfth aspects of the application. The one or more co-sweeteners or sweetener enhancers may be added concurrently with, or separately from, each other and/or the one or more products of the fifth aspect of the application.

In another embodiment of the seventeenth aspect of the application, the method is a method of improving the taste profile of a bakery product, wherein the method comprises the steps of (i) preparing a dough, wherein the dough comprises one or more products of the fifth aspect of the application, and one or more sweeteners; and (ii) baking the dough to produce the bakery product. Typically in such an embodiment, the one or more sweeteners are selected in accordance with the ninth aspect of the application. For example the one or more sweeteners may comprise at least one terpenoid glycoside sweetener, more typically at least one steviol glycoside. Typically in such an embodiment, the one or more amine donors used in the fifth aspect of the application comprise thaumatin, or thaumatin and one or more amino acids. Optionally, the method further comprises the step of adding to the dough one or more co-sweeteners or sweetener enhancers, as described above in relation to the ninth to twelfth aspects of the application. The one or more co-sweeteners or sweetener enhancers may be added concurrently with, or separately from, each other and/or the one or more products of the fifth aspect of the application. In one aspect of such an embodiment, the the total amount of the one or more products of the fifth aspect of the application constitutes from 0.0001 to 20 wt. % of the dough. Typically in such an embodiment, the total amount of the one or more products of the fifth aspect of the application constitutes from 0.0001 to 1.5 wt. % of the dough. More typically the total amount constitutes from 0.0005 to 0.5 wt. % of the dough. More typically still, the total amount constitutes from 0.001 to 0.1 wt. % of the dough. Typically in such an embodiment, the total combined amount of the one or more sweeteners and the one or more products of the fifth aspect of the application constitutes from 0.0001 to 10 wt. % of the dough. More typically the total amount constitutes from 0.001 to 5 wt. % of the dough. More typically still, the total amount constitutes from 0.01 to 1 wt. % of the dough.

In one embodiment of the seventeenth aspect of the application, the method is a method of sweetening the food or beverage.

In another embodiment of the seventeenth aspect of the application, the method is a method of increasing the kokumi or mouthfeel of the food or beverage.

In one embodiment of the seventeenth aspect of the application, the method is a method of increasing the kokumi or mouthfeel of a beverage, wherein the method comprises the step of adding to the beverage or beverage ingredients one or more products of either of the first or third aspects of the application. The beverage produced may be a beverage in accordance with any embodiment of the thirteenth aspect of the application. In one aspect of such an embodiment, the method comprises the step of adding to the beverage or beverage ingredients one or more products of the first mode of any of the first or third aspects of the application. In another aspect of such an embodiment, the method comprises the step of adding to the beverage or beverage ingredients one or more products of the second mode of any of the first or third aspects of the application. Typically in such an embodiment, the one or more sweeteners used in the first or third aspects of the application comprise at least one terpenoid glycoside sweetener, more typically at least one steviol glycoside. Typically in such an embodiment, the one or more amine donors used in the first or third aspects of the application comprise thautnatin, or thautnatin and one or more amino acids. Optionally, the method further comprises the step of adding to the beverage or beverage ingredients one or more co-sweeteners or sweetener enhancers, as described above in relation to the ninth to twelfth aspects of the application. The one or more co-sweeteners or sweetener enhancers may be added concurrently with, or separately from, each other and/or the one or more products of either of the first or third aspects of the application.

In another embodiment of the seventeenth aspect of the application, the method is a method of increasing the kokumi or mouthfeel of a food, such as a dairy food, a bakery product, a biscuit or a cake, wherein the method comprises the step of adding to the food or food ingredients one or more products of either of the first or third aspects of the application. The food produced may be a food in accordance with any embodiment of the thirteenth aspect of the application. In one aspect of such an embodiment, the method comprises the step of adding to the food or food ingredients one or more products of the first mode of any of the first or third aspects of the application. In another aspect of such an embodiment, the method comprises the step of adding to the food or food ingredients one or more products of the second mode of any of the first or third aspects of the application. Typically in such an embodiment, the one or more sweeteners used in the first or third aspects of the application comprise at least one terpenoid glycoside sweetener, more typically at least one steviol glycoside. Typically in such an embodiment, the one or more amine donors used in the first or third aspects of the application comprise thaumatin, or thaumatin and one or more amino acids. Optionally, the method further comprises the step of adding to the food or food ingredients one or more co-sweeteners or sweetener enhancers, as described above in relation to the ninth to twelfth aspects of the application. The one or more co-sweeteners or sweetener enhancers may be added concurrently with, or separately from, each other and/or the one or more products of either of the first or third aspects of the application.

An eighteenth aspect of the application provides the use of any of the products of any of the first, third or fifth aspects of the application, or of any of the compositions of any of the seventh, ninth or eleventh aspects of the application, to modulate one or more sensory properties of a food or a beverage. In one embodiment the use is to modulate the taste and/or smell of the food or beverage. Typically in such an embodiment the use is to sweeten the food or beverage, in another embodiment, the use is to increase the kokumi or mouthfeel of the food or beverage.

The methods of the second, fourth, tenth and twelfth aspects of the application may also be used to modulate one or more sensory properties of the one or more sweeteners.

In one embodiment of the any of the second, fourth, or tenth aspects of the application, the method is a method of modulating the taste and/or smell of the one or more sweeteners, by preparing the product or composition. For example, the method may be a method of improving the taste profile of the one or more sweeteners. In one aspect of such an embodiment, the method is a method of increasing the taste and/or smell of the one or more sweeteners, by preparing the product or composition. For example, in one embodiment of the tenth aspect of the application, or of the second mode of the second or fourth aspect of the application, the method may be a method of increasing the taste and/or smell of the one or more sweeteners, by preparing the product or composition, wherein the one or more sweeteners are selected from the group consisting of terpenoid sweeteners and terpenoid glycoside sweeteners, wherein at least one sweetener is a terpenoid glycoside sweetener. In another example, in one embodiment of the tenth aspect of the application, or of the second mode of the second or fourth aspect of the application, the method may be a method of increasing the taste and/or smell of the one or more sweeteners, by preparing the product or composition, wherein the one or more sweeteners are selected from the group consisting of high intensity synthetic sweeteners such as sucralose and aspartame.

In one embodiment of the twelfth aspect of the application, the method is a method of modulating the taste and/or smell of one or more co-sweeteners, by combining the one or more co-sweeteners with one or more products of the first or third aspects of the application, to prepare the composition. In one aspect of such an embodiment, the method is a method of increasing the taste and/or smell of the one or more co-sweeteners, by preparing the composition. For example, in one embodiment of the twelfth aspect of the application, the method may be a method of increasing the taste and/or smell of the one or more co-sweeteners, by combining the one or more co-sweeteners with one or more products of the second mode of the first or third aspects of the application, to prepare the composition, wherein the one or more co-sweeteners are selected from the group consisting of terpenoid sweeteners and terpenoid glycoside sweeteners, wherein at least one co-sweetener is a terpenoid glycoside sweetener. In another example, in one embodiment of the twelfth aspect of the application, the method may be a method of increasing the taste and/or smell of the one or more co-sweeteners, by combining the one or more co-sweeteners with one or more products of the second mode of the first or third aspects of the application, to prepare the composition, wherein the one or more co-sweeteners are selected from the group consisting of high intensity synthetic sweeteners, such as sucralose and aspartame.

In another embodiment of the any of the second, fourth, or tenth aspects of the application, the method is a method of increasing the kokumi or mouthfeel of the one or more sweeteners, by preparing the product or composition. For example, in one embodiment of the tenth aspect of the application, or of the second mode of the second or fourth aspect of the application, the method may be a method of increasing the kokumi or mouthfeel of the one or more sweeteners, by preparing the product or composition, wherein the one or more sweeteners are selected from the group consisting of terpenoid sweeteners and terpenoid glycoside sweeteners, wherein at least one sweetener is a terpenoid glycoside sweetener. In another example, in one embodiment of the second mode of the second or fourth aspect of the application, the method may be a method of increasing the kokumi or mouthfeel of the one or more sweeteners, by preparing the product or composition, wherein the one or more sweeteners are selected from the group consisting of high intensity synthetic sweeteners such as sucralose and aspartame.

In a similar embodiment of the twelfth aspect of the application, the method is a method of increasing the kokumi or mouthfeel of the one or more co-sweeteners, by combining the one or more co-sweeteners with one or more products of the first or third aspects of the application, to prepare the composition. For example, in one embodiment of the twelfth aspect of the application, the method may be a method of increasing the kokumi or mouthfeel of the one or more co-sweeteners, by combining the one or more co-sweeteners with one or more products of the second mode of the first or third aspects of the application, to prepare the composition, wherein the one or more co-sweeteners are selected from the group consisting of terpenoid sweeteners and terpenoid glycoside sweeteners, wherein at least one co-sweetener is a terpenoid glycoside sweetener. In another example, in one embodiment of the twelfth aspect of the application, the method may be a method of increasing the kokumi or mouthfeel of the one or more co-sweeteners, by combining the one or more co-sweeteners with one or more products of the second mode of the first or third aspects of the application, to prepare the composition, wherein the one or more co-sweeteners are selected from the group consisting of high intensity synthetic sweeteners, such as sucralose and aspartame.

In one embodiment of the any of the second, fourth, or tenth aspects of the application, the method is a method of reducing the aftertaste and/or the extent of taste lingering of the one or more sweeteners, by preparing the product or composition. For example, in one embodiment of the first mode of the second or fourth aspect of the application, the method may be a method of reducing the aftertaste and/or the extent of taste lingering of the one or more sweeteners, by preparing the product, wherein the one or more sweeteners are selected from the group consisting of terpenoid sweeteners and terpenoid glycoside sweeteners, wherein at least one sweetener is a terpenoid glycoside sweetener.

In a similar embodiment of the twelfth aspect of the application, the method is a method of reducing the aftertaste and/or the extent of taste lingering of the one or more co-sweeteners, by combining the one or more co-sweeteners with one or more products of the first or third aspects of the application, to prepare the composition. For example, in one embodiment of the twelfth aspect of the application, the method may be a method of reducing the aftertaste and/or the extent of taste lingering of the one or more co-sweeteners, by combining the one or more co-sweeteners with one or more products of the second mode of the first or third aspects of the application, to prepare the composition, wherein the one or more co-sweeteners are selected from the group consisting of terpenoid sweeteners and terpenoid glycoside sweeteners, wherein at least one co-sweetener is a terpenoid glycoside sweetener. In another example, in one embodiment of the twelfth aspect of the application, the method may be a method of reducing the aftertaste and/or the extent of taste lingering of the one or more co-sweeteners, by combining the one or more co-sweeteners with one or more products of the second mode of the first or third aspects of the application, to prepare the composition, wherein the one or more co-sweeteners are selected from the group consisting of high intensity synthetic sweeteners, such as sucralose and aspartame.

A nineteenth aspect of the application provides a sealed container comprising a product of any of the first, third or fifth aspects of the application, or a composition of any of the seventh, ninth or eleventh aspects of the application, or a food or beverage of the thirteenth aspect of the application, or a food or beverage precursor of the fourteenth aspect of the application. Typically, the product, composition, food, beverage, or food or beverage precursor is sealed within the sealed container.

In one embodiment of the nineteenth aspect of the application, the sealed container further comprises a label attached to or printed on the sealed container. Typically the label provides information concerning the content of the container.

In one embodiment, the sealed container is selected from a sachet, wrapper (e.g. foil or plastic), can, bottle or carton.

In another embodiment, the sealed container is selected from a drum, keg or sack.

For the avoidance of doubt, insofar as is practicable any embodiment of a given aspect of the present application may occur in combination with any other embodiment of the same aspect of the present application. In addition, insofar as is practicable it is to be understood that any preferred, typical or optional embodiment of any aspect of the present application should also be considered as a preferred, typical or optional embodiment of any other aspect of the present application.

VII. Additional Embodiments

Some embodiments of the present application include a sweetening agent, the product(s) of a hydrolyzed sweetening agent (e.g., treated by a base such as by aqueous sodium hydroxide) and a Maillard flavoring agent (Maillard reaction product).

In still yet another aspect, the embodiments include a sweetening agent, the product(s) of a hydrolyzed sweetening agent (e.g., treated by a base such as by aqueous sodium hydroxide) a Maillard flavoring agent and a flavoring agent.

In yet another aspect, the embodiments include a sweetening agent, a Maillard flavoring agent and a flavoring agent.

All of these compositions can be provided as a liquid, such as a syrup or a solid.

It has surprisingly been found that there is flavor synergy between sweetening agents, such as steviol glycosides, and at least one component selected from Maillard Reactant product(s) from sweetening agent(s), such as steviol glycosides, a non-steviol glycoside sugar donor (including vitamin C, fats, and fat degraded products, lipids, etc. compounds having a carbonyl donor), and an amine donor and Maillard reactants from non-steviol glycosides sugar donor.

The present embodiments provide a method to produce multi characteristic flavoring components, which are much closer in taste to the desired flavor than flavoring agents that are currently in the marketplace.

Another advantage is that *Stevia* binds at least three or more water molecules and acts as moisture preserver.

Another advantage of the present embodiments is that flavors could be absorbed in or to the inner surface of pores of steviol glycoside powders. Flavors are preserved and can be released when in solution. The present embodiments avoid the use of starch, or dextrin as a carrier which can bring wheat taste to the flavors.

In another surprising advantage, it was found that by adding thaumatin to the MRP compositions described herein, thaumatin provided a great advantage by lowering the threshold of aroma and the taste of substances significantly.

Blending of Maillard reaction products with *Stevia* or other sweeteners, in particular involving sweetening agents, more particularly involving high molecular weight sweetening agents in the Maillard type reaction as one of the sugar donors as described throughout the specification, show significant improvement of taste and aroma profiles of steviol glycosides including slow onsite, void, lingering, bitterness and aftertaste. Depending on the initial taste profile of steviol glycosides, the type and ratio of sugar, and/or amine donor, the reaction conditions can be adjusted and/or optimized in order to obtain a desired profile of taste and aroma of the finished product.

The current embodiments significantly boost favorable sensory aspects, such as the flavor and aroma characteristics of sweetening agents described herein, or synthetic sweeteners or mixtures thereof, and help to eliminate their disadvantages of bitterness, lingering aftertaste, etc. as flavoring agents and sweeteners used for food and beverages.

The current embodiments surprisingly provide MRP compositions, processes, methods, and concentrations of components which create a better taste and aroma based on sweetening agents described herein in place of sugar.

The present embodiments provide that there is strong synergy between steviol glycosides and MRPs in the profiles of taste and aroma. An advantageous range of ratio of steviol glycosides to MRPs reactants is in range of 20:80 and 80:20. Surprisingly, the taste and aroma when MRP components are 90:10 or even 99:1 do not provide the strongest aroma.

Mannose (and/or its oligosaccharides) can be used as a flavoring agent to help improve the taste of sweetening agents, such as steviol glycosides, especially when it is utilized as a sugar donor. Uronic acids, such as glucuronolactone (and/or glucuronic acid) can be used as a flavoring agent to help improve the taste of sweetening agents, such as steviol glycosides, especially when it is utilized as a sugar donor.

Products that originate from natural plants or animal sources, especially natural plant extracts, often contain characteristic tastes or flavors, which in lot of cases, are unpleasant. It has been surprisingly found that adding Maillard reaction products, or using these extracts as basis for a Mail lard reaction, together with an amino acid and/or a reducing sugar can create pleasant tastes and flavors which are easily incorporated into other food ingredients for consumables, thus eliminating the unpleasant smells and/or tastes associated with the natural plant or animal product.

Additionally, more and more people prefer vegetable protein. Thus, vegetable protein provides a good source of amine donors for creating great tasting consumable MRP products.

Natural food colors, including extracts or their concentrates, typically possess earthy, unpleasant tastes and smells, and are difficult to be used in food. Manufacturers have tried various means to remove the unpleasant tastes and smells in order to have neutral tasting or smelling colorants or color extracts. Most food colorants or extracts contain certain amounts of sugar and/or amino acids, which are valuable nutrients. Adding MRPs to the colorants or extracts, or combining them with an amino acid and/or a sugar can create a pleasant taste and smell so that the coloring could be easily incorporated into foods and beverages without the present disadvantages.

Spices, similarly have similar issues like that of natural food colors. Thus the present technology can be used to overcome undesirable tastes and smells, especially with extracts such as Ginger Extract, paprika extract, or pepper extract.

A composition comprising steviol glycosides and flavors is an embodiment.

A composition comprising steviol glycosides and an amino acid donor, which is heated is an embodiment.

A composition comprising steviol glycosides, a sugar donor and an amino acid donor is still another embodiment.

A composition comprising steviol glycosides, an unreacted sugar donor, a Maillard reaction flavoring and other unreacted reaction components from the Maillard reaction is still yet another embodiment which can further include a pH adjustor.

A composition comprising steviol glycosides, an unreacted amino acid donor, Maillard reaction flavoring agent and other unreacted reaction components from the Maillard reaction is another embodiment which can further include a pH adjustor In one aspect, the sugar donor is selected from glucose, rahmnose, etc.

In another aspect, a further reactant includes a salt.

A composition comprising steviol glycosides, an unreacted sugar donor and an unreacted amino acid donor and Maillard reaction flavoring agent and other unreacted reaction components from the Maillard reaction is an embodiment.

The above compositions can include Maillard reactants containing unreacted acid or base, or their salts.

The above compositions can further comprise additional flavors.

The above compositions can further comprise additional sweeteners.

The above compositions can further comprise flavors and sweeteners.

Not to be limited by the following, common methods of manufacturing of the sweetening agents (e.g., *Stevia* extract) are as follows. The method presented should not be considered limiting.

Extract *Stevia* leaves with water at 20-80° C. with the ratio of leaves to water being about 1:10 to 1:20 (w/v). The mixture can be clarified by flocculation or membrane filtration. The mixture can then be purified through a macroporous resin and ion exchange resin. The filtrate is then crystallized with a mixture of water/alcohol (ethanol or methanol) to obtain a precipitate which is then filtered and dried.

The Maillard reaction product(s) described herein can be added to food products as described below. The amount of the Maillard reaction product added to a food product can be from $10^{-9}$ ppb (parts per billion) to up to 99% by weight. Therefore, this includes from about $10^{-9}$ ppb to about 100 ppb, from about 1 ppm (part per million) to about 1000 ppm, from about 1 ppm to about 10 ppm, from about 1 ppm to about 100 ppm, from about 100 ppm to about 1000 ppm, from about 0.1% by weight to about 0.99% by weight, from about 1% by weight to about 10% by weight, from about 10% by weight to about 50% by weight and from about 50% by weight to 100% by weight, based on the total weight of the food product and the Maillard reaction product(s).

The Maillard reaction product(s) noted herein can be used in foods and food preparations (e.g., sweeteners, soups, sauces, flavoring agents, spices, oils, fats, and condiments) from dairy-based, cereal-based, baked, vegetable-based, fruit-based, root/tuber/corm-based, nut-based, other plant-based, egg-based, meat-based, seafood-based, other animal-based, algae-based, processed (e.g., spreads), preserved (e.g., meals-ready-to-eat rations), and synthesized (e.g., gels) products.

For example, there is a growing demand by consumers to utilize spices having unique flavors, such as tamarind, lemongrass, ginger, kaffir lime, cinnamon and clove. From candy to beer to tea, everything with ginger is hot. Ginger works well in alcoholic beverages as a mixer, in ginger beer itself, in confections, muffins and cookies. Sodium metabisulfite, olive oil and ascorbic acid were found to be effective to stabilize the antibacterial activity. 1.5% carboxymethylcellulose (CMC) shows good performance too.

Ginseng is one of the top 10 best selling herbal dietary supplements in the United States. However, the use of ginseng-containing products has been limited in beverages, despite a. growing functional food market. The original ginseng flavors exhibiting bitterness and earthiness can be minimized using the Maillard technology described herein in order to meet the growing demand for such products. The technology can address the limitations of ginseng and provide for new and better tasting ginseng-based food products when applied to e.g., cookies, snacks, cereals energy bars, chocolates and coffee.

In Asia, especially Southeast Asia, rose, jasmine, pandan, lemon grass, yellow ginger, blue ginger, lime leaf, curry leave, lilies, basil, coriander, coconut etc. constitue important flavors utilized in their local cuisine. In East Asia, many herbs are used in the cooking and traditional Chinese medicine, such as *Artemisia argyi* (Chinese mugwort), *Taraxacum officinale* (dandelion), *Codonopsis pilosida* (dang shen or poor man's ginseng), *Radix Salviae miltiorrhizae* (red sage or tan shen), *Astragalus* sp., including (milk-vetch) *A. membranaceus* (membranous milk-vetch), *Rhizoma gastrodiae* (Tian ma) etc. The Inventor have found that adding MRPs, or combination of MRPs and sweetening agent, or combination of MRPs, weetening agent and thaumatin could significantly improve the taste profile of these flavors and their added products. For example, one or more composition selected from sweetening agent, sweetener, sweetness enhancers could be added in ratio of 1~99% (w/w) of total raw material may be used in the following process to prepare such flavored products.

In one exemplary embodiment, lilies are used as a raw material, which is washed and milled to provide a lily slurry. Alpha-amylase (0.1-0.8%) is added and treated at 70° C. for about 1.5 hours. Protease (0.05-0.20% by mass of the lily) can then be added and heated at 55° C. for 70 minutes. One or more sweetening agent(s), sweetener(s), sweetener enhancer(s) can then be added along with fenugreek seed extract as follows. Briefly, fenugreek seeds are roasted and crushed uniformly. The seeds are extracted with ethyl alcohol, filtered to obtain a yellowish brown solution and concentrated to form the extract. The extact is then combined with glucose and proline in a 10:1:0.6 weight ratio (respectively) and heated under Maillard reactions conditions at 110-120 degree C. for 4-6 hours.

The Maillard reaction product(s) noted herein can be used in candies, confections, desserts, and snacks selected from the group comprising dairy-based, cereal-based, baked, vegetable-based, fruit-based, root/tuber/corn-based, nut-based, gum-based, other plant-based, egg-based, meat-based, seafood-based, other animal-based, algae-based, processed (e.g., spreads), preserved (e.g., meals-ready-to-eat rations), and synthesized (e.g., gels) products. Such candies, confections, desserts, and snacks can be in ready-to-eat, ready-to-cook, ready-to-mix, raw, or in ingredient form, and can use the compositions as a sole sweetener or as a co-sweetener.

In the context of foods and beverages, the following products may be included with any composition described herein.

It is known that different acids, either organic or inorganic acids, have different taste profiles. It is desirable for the food and beverage industry to find solutions which could control the acid taste profile when designing the products. The inventors surprisingly found that adding MRPs, MRPs with sweetening agent(s), MRPs, sweetening agent(s) and thaumatin could harmonize the acid or sour taste profile in foods and beverages, especially the foods and beverages comprising acetic acid such as ketchup, pickles, etc. One embodiment pertains to compositions of MRPs, MRPs with sweetening agent(s), MRPs, sweetening agent(s) and thaumatin, and one or more food grade acid(s) to provide desirable acid taste profile.

MRPs, MRPs with sweetening agent(s), MRPs, sweetening agent(s) and thaumatin can be used in foods to enhance the taste profile, especially for sugar, salt, fat reducing products. One embodiment pertains to food or beverage compositions of MRPs, MRPs with sweetening agent(s), MRPs, sweetening agent(s) and thaumatin, and one or more low calories sweeteners, such as allulose, tagatose. Another embodiment pertains to food or beverage compositions of MRPs, URN with sweetening agent(s), MRPs, sweetening agent(s) and thaumatin, and one or more fibers and/or polyols, such as Inulin, or polydextrose. The MRP technology described herein can be used for improving the taste profile of allulose and other sweetening agents.

With globalization and internet development, spicy food has become more popular all over the world. However, not everyone can tolerate the strong spicy taste of spicy foods by using strong spicy chilies, curry, horseradish, mustard, garlic, ginger, wasabi etc. The inventors surprisingly found that using compositions of this invention, MRPs, MRPs with sweetening agent(s), MRPs, sweetening agent(s) and thaumatin, thaumatin etc. could significantly reduce or harmonize the spiciness of these foods and make it palatable for more people. One embodiment pertains to food or beverages of MRPs, MRPs with sweetening agent(s), MRPs, sweetening agent(s) and thaumatin, thaumatin and one or more spicy foodstuff selected from chilies, curry, horseradish, mustard, wasabi, garlic, or ginger.

The inventors also found adding thaumatin, MRPs, MRPs with sweetening agent(s), MRPs, sweetening agent(s) and thaumatin in foods such as jams, scrambled eggs, butter, goulash soup, cheese etc. could significantly modify or change the taste profile of whole foods and make them more palatable. One embodiment pertains to food compositions of thaumatin, MRPs, MRPs with sweetening agent(s), MRPs, sweetening agent(s) and thaumatin and one or more other food ingredients.

The Maillard reaction product(s) noted herein can be used in prescription and over-the-counter pharmaceuticals, assays, diagnostic kits, and various therapies selected from the group comprising weight control, nutritional supplement, vitamins, infant diet, diabetic diet, athlete diet, geriatric diet, low carbohydrate diet, low fat diet, low protein diet, high carbohydrate diet, high fat diet, high protein diet, low calorie diet, non-caloric diet, oral hygiene products (e.g., toothpaste, mouthwash, rinses, floss, toothbrushes, other implements), personal care products (e.g., soaps, shampoos, rinses, lotions, balms, salves, ointments, paper goods, perfumes, lipstick, other cosmetics), professional dentistry products in which taste or smell is a factor (e.g., liquids, chewables, inhalables, injectables, salves, resins, rinses, pads, floss, implements), medical, veterinarian, and surgical products in which taste or smell is a factor (e.g., liquids, chewables, inhalables, injectables, salves, resins, rinses, pads, floss, implements), and pharmaceutical compounding fillers, syrups, capsules, gels, and coating products.

The Maillard reaction product(s) noted herein can be used in consumer goods packaging materials and containers selected from the group comprising plastic film, thermoset and thermoplastic resin, gum, foil, paper, bottle, box, ink, paint, adhesive, and packaging coating products.

The Maillard reaction product(s) noted herein can be used in goods including sweeteners, co-sweeteners, coated sweetener sticks, frozen confection sticks, medicine spoons (human and veterinary uses), dental instruments, presweetened disposable tableware and utensils, sachets, edible sachets, potpourris, edible potpourris, artificial flowers, edible artificial flowers, clothing, edible clothing, massage oils, and edible massage oils.

Reb M has a good sweet taste profile when freshly prepared. However, the taste of Reb M can change into an unpleasant taste profile likeability Reh A when it is stored in liquid form after many weeks. It is assumed that its structure changes in solution with time. The inventors surprisingly found the present embodiments described herein could significantly change the structure and improve the stability and make Reb M usable as a good sweetener even if stored for long periods of time. One embodiment comprises Reb M and MRP(s), A method can be to blend MRPs with Reb M contained in *Stevia* extract, or preferably the Reb M is utilized during the Maillard reaction either using it as non-reducing sugar donor or as diluting agent. Embodiments include compositions comprising Reb M and one or more components selected from MRP(s), combination of MRP(s) and sweetening agent(s), combination of MRPs and thaumatin, or combination of MRP(s), sweetening agent(s) and thaumatin. Not to be limited by theory, MRP(s) may act as an emulsifier to change the structure/conformation of steviol glycosides in solution.

In recent years, large molecular weight steviol glycosides such as Reb D, Reb E, Reb M, or their mixtures with/without Reb A etc. can be obtained via enzymatic conversion, or fermentation. However, the final products typically contain an unpleasant smell like that of fermented food or enzymatic food ingredients. Such unpleasant smells limit their application, especially with the taste of food and beverages. Therefore, it is necessary to find solutions to overcome these disadvantages so that steviol glycosides have a better taste. The inventors surprisingly found that adding MRP(s), MRP (s) and steviol glycosides, MRP(s), steviol glycosides and thaumatin, or MRP(s) and thaumatin could significantly improve the taste of steviol glycosides made via enzymatic conversion or fermentation processes, preferably when adding steviol glycosides made by these methods in the production of MRPs. One embodiment comprises compositions that include steviol glycosides and MRPs, wherein steviol glycosides are made via an enzymatic or a fermenting method. Another embodiment is a method to improve the taste of steviol glycosides made by enzymatic or fermentation methods, where the method includes addition of Maillard reaction products. An embodiment of consumables comprises Maillard reaction treated steviol glycosides, where resultant MRPs are above $10^{-9}$ ppb.

Aquaplants and seafood cultivated from fresh water or sea water always have a fish smell or marine odor. Examples of odoriferous aquatic foodstuffs include spirulina powder or its enriched protein extract, protein extracted from duckweeds (lemnoideae family), fish protein, fish meal etc. There is a need to minimize or cover the unpleasant odor to make the food product palatable. The inventors surprisingly found that compositions described herein could be added in these products to minimize the odors to make them more acceptable to consumers, including feeds for animals.

For example, pigs, especially young pigs, appreciate good and pleasant taste and aroma much the way young children do. Cats are notoriously fussy about the taste and smell of their feed. An animal feed, such as rapeseed meal have a bitter taste, but is nonetheless used, since it provides a good protein source for cattle, sheep, and horses. Even chickens, which are not known for their taste discrimination, are still selective to their feeds. Green, natural or organic farming of animals as become increasingly popular. Therefore, there is a need to find a solution to satisfy these market considerations. Therefore, the present application provides feeds and feed additives comprising the MRP compositions described herein.

Embodiments of consumables may further comprise components from aquaplants and/or seafood, and any of the compositions described herein.

Foods and beverages containing acids can irritate the tongue. For instance, products containing acetic acid can irritate the tongue and make that product unpalatable. The inventors surprisingly found that adding thaumatin, MRP(s) and thaumatin, MRP(s) and sweeting agent(s), or MRP(s), sweeting agent(s) and thaumatin could significantly balance the acid taste and make the products palatable.

Beverages containing vinegar, such as apple cider vinegar drink, shrub, switchel etc. have become popular in the market due to vinegar's health attributes. The acetic acid can be naturally occurring, for instance it is originated from fermentation of fruits such as apple, pear, persimmon etc., grains such as rice, wheat etc. It can also be synthetically produced. However, the taste of acetic acid is strong and sour and tends to burn the throat. Therefore, there is a need to find a solution to harmonize it. The inventors have surprisingly found that adding thaumatin and MRP(s); combination(s) of MRP(s) and thaumatin; combinations of MRP(s), sweetening agent(s) and thaumatin; or a combination of MRP(s), high intensity sweeteners (either synthetic, natural, or both), and thaumatin in consumable products can strongly harmonize the taste their taste, especially when used with acetic acid to make it more palatable In certain embodiments, the MRP compositions of the present application can facilitate their use in beverages containing acetic acid, where the dosage of the composition(s) described herein is above $10^{-9}$ ppb.

The inventors have further found that thermotreating sweetening agents (especially thereto-reaction treatment) can improve the taste of sweetening agent(s). Further, the inventors have surprisingly found that adding thaumatin, NHDC, MRP(s), combinations of MRP(s) and sweetening agent(s), combinations of MRP(s) and thaumatin, combinations of NHDC and MRP(s), combinations of thaumatin and NHDC, combinations of MRP(s), NHDC and thaumatin, combinations of MRP(s), sweetening agent(s) and thaumatin in food and beverages containing alcohol can enhance the strength of alcohol. Embodiments provide food and beverages containing alcohol comprising composition selected from thaumatin, NHDC, MRP(s), combinations of MRP(s) and sweetening agent(s), combinations of NHDC and other sweetenting agents, combinations of MRP(s) and thaumatin, combinations of MRP(s) and NHDC, combinations of thaumatin and NHDC or combinations of MRP(s), sweetening agent(s) and thaumatin.

Thermo-treatment is similar to caratnelization of a sweetening agent (without MRP(s)). The temperature range can be from 0-1000° C., in particular from about 20 to about 200° C., more particularly from about 60 to about 120° C. The period of treatment can be from a few seconds to a few days, more particularly about one day, and even more particularly from about 1 hour to about 5 hours.

For example, adding thaumatin, MRP(s), combinations of MRP(s) and sweetening agent(s), combinations of MRP(s) and thaumatin, or combination(s) of MRP(s), sweetening agent(s) and thaumatin in beer, or non-alcoholic beer, can enhance the strength of beer taste.

Flavor of beer, the size and the amount of bubbles are important factors in measuring the quality of beer, Compositions described herein can be used for enhancing the flavor of beer taste and to adjust the size and amount of bubbles.

In one embodiment, beer or beer containing products can include thaumatin, MRP(s), combinations of MRP(s) and thaumatin, combinations of MRP(s), sweetening agent(s), or combination of MRP(s), sweetening agent(s) and thaumatin.

Foods having high sugar content such as area catechu, spicy bar (or called spicy strip, hot strip, spicy glutein), pickled vegetables, meat and fishes, or fermented foods always require large amounts of sugar in order to balance the total taste profile and make them more palatable. The inventors surprisingly found that adding thaumatin, MRP(s), combinations of MRP(s) and thaumatin, combinations of MRP(s), sweetening agent(s) and thaumatin, or combinations of sweeting agent(s) and MRP(s) could significantly improve the taste profile and/or palatability, especially when sugar reduction is required for such foods. For example, embodiments of such compositions include area catechu, spicy bar, pickled food, or fermented foods with one of composition(s) described herein.

In some embodiments, a sweet enhanced meat process flavor can be obtained by adding sweetening agents, along with one or more of following ingredients, which may include a source of sulfur, e.g. cysteine, (cystine), glutathione, methionine, thiamine, inorganic sulfides; meat extracts, egg derivatives; a source of nitrogen, e.g., amino acids, hydrolyzed vegetable proteins (HVPs), yeast extracts, meat extracts; sugar component, e.g., pentose sugars, hexose sugars, vegetable powders, (onion powder, tomato powder), hydrolysed gums, dextrins, pectins, and alginates; fats and oils, e.g., animal fats, vegetable oils, coconut oil, as well as enzyme hydrolyzed oils and fats; and other components, such as herbs, spices, IMP, GMP, acids, etc.

Vegetarian foods have become increasingly popular, and there is great demand for creating vegetarian substitutes for animal meat. Indeed, vegetable burgers have become popular in recent years, but the taste is still not palatable to most consumers. Compositions described herein can be used for enhancing the flavor and taste of the vegetable burger. In one embodiment, a vegetable burger comprises thaumatin, MRP(s), combinations of MRP(s) and thaumatin, combinations of MRP(s) and sweetening agent(s), or combinations of thaumatin, MRP(s) and sweetening agent(s).

Grilled foods often incorporate sugar to enhance the taste. However, sugar creates strong colors during grilling, and when the fried foods become cold, the sugar syrup becomes sticky. The inventors found that by adding the compositions described herein to the food to be grilled, these disadvantages can be overcome. For example, embodiments include grilled foods that include thaumatin, MRP(s), combinations of thaumatin and MRP(s), combinations of MRP(s) and sweetening agent(s), or combinations of MRP(s), sweeting agents and thaumatin. The compositions or processes described herein can further applied in modifying the flavors of beef, chicken, cocoa, pork, chocolate, coffee, and the like Unless defined otherwise, all technical and scientific terms used herein have the same meanings as commonly understood by one of ordinary skill in the art to which this invention belongs. All publications and patents specifically mentioned herein are incorporated by reference in their entirety for all purposes including describing and disclosing the chemicals, instruments, statistical analyses and methodologies which are reported in the publications which might be used in connection with the invention. All references cited in this specification are to be taken as indicative of the level of skill in the art. Nothing herein is to be construed as an admission that the invention is not entitled to antedate such disclosure by virtue of prior invention.

The following paragraphs enumerated consecutively from 1 through 219 provide for various aspects of the present invention and are referred herein as "Set 1 embodiments."

Additional Embodiments, Set 1

In one embodiment, the present invention provides:

1. A composition comprising a Maillard reaction product and at least one of a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated triogroside, or a mixture thereof, 2. The composition of paragraph 1, wherein the Maillard reaction product is the result of the Maillard reaction without separation of purification of reaction components.

3. The composition of paragraph 1 or 2, wherein the Maillard reaction product consists of volatile substances and non-volatile substances.

4. The composition of paragraph 1, wherein the Maillard reaction product is partially isolated products, either partially volatile substance or partially non-volatile substances are removed from the direct resultant of Maillard reaction.

5. The composition of paragraph 1, wherein the Maillard reaction product is a pure volatile substance.

6. The composition of paragraph 1, wherein the Maillard reaction product is pure non-volatile substance.

7. The composition of any of paragraphs 1-6, wherein the Maillard reaction product is a water soluble compound.

8. The composition of paragraph 1, wherein the *Stevia* extract comprises one or more *Stevia* extract components.

9. The composition of paragraph 8, wherein the *Stevia* extract component is a steviol glycoside and is one or more of rebaudioside A, rebaudioside 13, rebaudioside D, rebaudioside E, rebaudioside M, rebaudioside O, or mixtures thereof.

In some embodiments, the composition comprises one or more steviol glycosides having a molecular weight of greater than 965 daltons and is selected from the group consisting of Related SG #2, Related SG #5, RU2, RT, RW, RW2, RW3, RU, SG-12, RH, RJ, RK, RK2, SG-Ukn4, SG-Ukn5, RD, RI, RL, R13, SG-Ukn6, RQ, R12, RQ2, RQ3, RTI, Related SG #4, RV2, RV, RY, RN, RM, 15α-OH RM, RO, and RO2.

In some embodiments, the composition comprises one or more SGs having a molecular weight equal to or greater than 981 daltons. In some embodiments, the composition comprises one or more SGs having a molecular weight equal to or greater than 1097 daltons. In some embodiments, the composition comprises one or more SGs having a molecular weight equal to or greater than 1111 daltons. In some embodiments, the composition comprises one or more SGs having a molecular weight equal to or greater than 1127 daltons. In some embodiments, the composition comprises one or more SGs having a molecular weight equal to or greater than 1259 daltons. In some embodiments, the composition comprises one or more SGs having a molecular weight equal to or greater than 1273 daltons. In some embodiments, the composition comprises one or more SGs having a molecular weight equal to or greater than 1289 daltons. In some embodiments, the composition comprises one or more SGs having a molecular weight equal to or greater than 1305 daltons. In some embodiments, the composition comprises one or more SGs having a molecular weight equal to or greater than 1435 daltons.

10. The composition of paragraph 9, wherein the *Stevia* extract component is rebaudioside A with a purity of 20%, 30%, 40%, 50%, 60%, 80%, 90%, 95%, 97%, 98%, 99% or 100%.

11. The composition of paragraph 9, wherein the *Stevia* extract component is a salt form.

12. The composition of paragraph 8, wherein the *Stevia* extract further comprises non-steviol glycoside components.

13. The composition of paragraph 12, wherein the non-steviol glycosides components are volatile substances characterized by citrus flavor.

14. The composition of paragraph 13, wherein the non-volatile substances of non-steviol glycoside components comprises one or more molecules characterized by terpene, di-terpene, or ent-kaurene structure.

15. The composition of paragraph 12, wherein the non-steviol glycoside components consist of volatile and non-volatile substances.

16. The composition of paragraph 1, wherein the swingle extract comprises one or more mogroside extract components.

17. The composition of paragraph 16, wherein the mogroside extract component is one or more of mogroside V, mogroside IV, siamenoside I, 11-oxomogroside V or mixtures thereof.

18. The composition of paragraph 17, wherein the mogroside extract component is a salt form.

19. The composition of paragraph 1, wherein the glycosylated *Stevia* extract comprises glycosylation products of stevioside, steviolbioside, rebaudioside A, rebaudioside B, rebaudioside C, rebaudioside D, rebaudioside E, rebaudioside F, rebaudioside M, rebaudioside O, rebaudioside H, rebaudioside I, rebaudioside L, rebaudioside N, rebaudioside K, rebaudioside rubusoside, dulcoside A or mixtures thereof.

20. The composition of paragraph 1, wherein the glycosylated steviol glycoside comprises glycosylation products of stevioside, steviolbioside, rebaudioside A, rebaudioside B, rebaudioside C, rebaudioside D, rebaudioside E, rebaudioside F, rebaudioside M, rebaudioside O, rebaudioside H, rebaudioside I, rebaudioside L, rebaudioside N, rebaudioside K, rebaudioside rubusoside, dulcoside A or mixtures thereof.

21. The composition of paragraph 20, wherein the glycosylated steviol glycoside is a salt form.

22. The composition of paragraph 1, wherein the glycosylated swingle extract comprises a glycosylated mogroside II, a glycosylated mogroside III, a glycosylated mogroside IV, a glycosylated mogroside V, a glycosylated siamenoside I or a glycosylated 11-oxomogroside V or mixtures thereof.

23. The composition of paragraph 1, wherein the glycosylated mogroside comprises a glycosylated mogroside II, a glycosylated mogroside III, a glycosylated mogroside IV, a. glycosylated mogroside V, a glycosylated siamenoside I or a glycosylated 11-oxomogroside V or mixtures thereof.

24. The composition of paragraph 23, wherein the glycosylated mogroside is a salt form.

25. The composition of any one of paragraphs 1 through 24, wherein the Maillard reaction product(s) are formed from a sugar donor comprising a reducing sugar, and an amine donor comprising one or more primary amine compounds, one or more secondary amine compounds, one or more amino acids, one or more proteins, one or more peptides, or any any combination thereof.

26. The composition of paragraph 25, wherein the reducing sugar comprises a one or more monosaccharides, one or more disaccharides, one or more oligosaccharides, one or more polysaccharides, or a any combination thereof.

27. The composition of paragraph 26, wherein the monosaccharide comprises galactose, glucose, glyceraldehyde, fructose, ribose, xylose or a combination thereof.

28. The composition of paragraph 26, wherein the disaccharide comprises cellobiose, lactose, maltose or a combination thereof.

29. The composition of paragraph 26, wherein the polysaccharide comprises starch.

30. The composition of paragraph 25, wherein the reducing sugar is burnt sugar.

31. The composition of paragraph 25, wherein the reducing sugar comprises a pentose or a hexose.

32. The composition of paragraph 31, wherein the pentose comprises an aldopentose or a ketopentose.

33. The composition of paragraph 32, wherein the aldopentose comprises an arabinose, a xylose, a ribose, a xylose or combinations thereof.

34. The composition of paragraph 32, wherein the ketopentose is a ribulose or a xylulose or combinations thereof.

35. The composition of any of paragraphs 25 through 34, wherein the amino acid comprises alanine, arginine, asparagine, aspartic acid, cysteine, glutamine, glutamic acid, glycine, histidine, isoleucine, leucine, lysine, methionine, phenylalanine, proline, serine, threonine, tryptophan, tyrosine, valine or mixtures thereof.

36. The composition of any of paragraphs 25 through 35, wherein the peptide comprises HVP or mixtures thereof.

37. The composition of any of paragraphs 25 through 36, wherein the protein comprises soy protein, sodium caseinate, whey protein, wheat gluten or mixtures thereof.

38. The composition of any of paragraphs 25 through 37, further comprising an alkaline pH adjuster.

39. The composition of paragraph 38, wherein the alkaline pH adjuster is sodium hydroxide.

40. The composition of any of paragraphs 25 through 39, further comprising a salt.

41. The composition of paragraph 40, wherein the salt comprises sodium carbonate, sodium bicarbonate, sodium chloride, potassium chloride, magnesium chloride, sodium sulfate, magnesium sulfate, potassium sulfate or mixtures thereof 42. The composition of any of paragraphs 1 through 41, further comprising a sweetener.

43. The composition of paragraph 42, wherein the sweetener comprises sorbitol, mannitol, sucralose, aspartame, acesulfame-K, neotame, erythritol, trehalose, raffinose, cellobiose, tagatose, DOLCIA PRIMA™ allulose, inulin, N—[N-[3-(3-hydroxy-4-methoxyphenyl)propyl]-alpha-aspartyl]-L-phenylalanine 1-methyl ester, glycyrrhizin, sodium cyclamate, or mixtures thereof.

44. The composition of any of paragraphs 25 through 43, further comprising a sweetener enhancer.

45. The composition of paragraph 44, wherein the sweetener enhancer comprises brazzein, miraculin, curculin, pentadin, mabinlin, thaumatin, or mixtures thereof.

45a. The composition of paragraph 45, wherein the sweetener enhancer is thaumatin.

45b. The composition of paragraph 45a, wherein the ratio of the Maillard Reaction product to the thaumatin is from 100:1 to 1:100 with all ratio there between.

46. The composition of any of paragraphs 1 through 45, wherein the composition is used as a flavor and/or as a sweetener.

47. The composition of paragraph 46, wherein the Maillard reaction product is present from about $10^{-9}$ ppb to about 99% by weight of the total weight of the composition.

48. The composition of paragraph 47, wherein the Maillard reaction product(s) is/are present from about $10^{-9}$ ppb to about 10% by weight of the total weight of the composition.

49. A flavored food product comprising a food or beverage and any of the compositions of paragraphs 1 through 46.

50. The flavored food product of paragraph 49, wherein the Maillard reaction product(s) is/are present from about $10^{-9}$ ppb to about 99% by weight of the total weight of the food product.

51. The flavored food product of paragraph 50, wherein the Maillard reaction product(s) is/are present from about $10^{9}$ ppb to about 10% by weight of the total weight of the food product.

52. A flavored pharmaceutical composition comprising a pharmaceutical agent and any of the compositions of paragraphs 1 through 46.

53. The flavored pharmaceutical composition of paragraph 52, wherein the Maillard reaction product(s) is/are present from about $10^{-9}$ ppb to about 99% by weight of the total weight of the pharmaceutical composition.

54. The flavored pharmaceutical composition of paragraph 53, wherein the Maillard reaction product(s) is/are present from about $10^{-9}$ ppb to about 10% by weight of the total weight of the pharmaceutical composition.

55. A method to improve the taste profile of a product comprising the step of combining a Maillard reaction product with at least one of a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof.

56. A composition comprising one or more Maillard reaction products formed from an amine donor, a reducing sugar, and at least one member selected from the group consisting of one or more: sweet tea extract(s), *Stevia* extract(s), swingle extract(s), glycosylated sweet tea extract(s), glycosylated *Stevia* extract(s), glycosylated swingle extract(s), glycosylated sweet tea glycoside(s), glycosylated steviol glycoside(s), glycosylated mogroside(s), and any mixture thereof.

57. The composition of paragraph 56, wherein the Maillard reaction product is the direct result of Maillard reaction without separation of purification of reaction components.

58. The composition of paragraph 56 or 57, wherein the Maillard reaction product consists of volatile substances and non-volatile substances.

59. The composition of paragraph 56 or 57, wherein the Maillard reaction product is partially isolated products, either partially volatile substance or partially non-volatile substances are removed from the direct resultant of Maillard reaction.

60. The composition of paragraph 56, wherein the Maillard reaction product is pure volatile substance.

61. The composition of paragraph 56, wherein the Maillard reaction product is a pure non-volatile substance.

62. The composition of any of paragraphs 56-61, wherein the Maillard reaction product is a water soluble compound.

63. The composition of paragraph 56, wherein the *Stevia* extract comprises one or more *Stevia* extract components.

64. The composition of paragraph 63, wherein the *Stevia* extract component is one or more of rebaudioside A, rebaudioside B, rebaudioside D, rebaudioside E, rebaudioside M, rebaudioside O, or mixtures thereof.

65. The composition of paragraph 64, wherein the *Stevia* extract component is rebaudioside A with a purity of 20%, 30%, 40%, 50%, 60%, 80%, 90%, 95%, 97%, 98%, 99% or 100%.

66. The composition of paragraph 64, wherein the *Stevia* extract component is a salt form.

67. The composition of paragraph 56, wherein the *Stevia* extract further comprises non-steviol glycoside components.

68. The composition of paragraph 67, wherein the non-steviol glycosides components are volatile substances characterized by citrus flavor.

69. The composition of paragraph 68, wherein the non-volatile substances of non-steviol glycoside components comprises one or more molecules characterized by terpene, di-terpene, or ent-kaurene structure.

70. The composition of paragraph 67, wherein the non-steviol glycoside components consist of volatile and non-volatile substances.

71. The composition of paragraph 56, wherein the swingle extract comprises one or more mogroside extract components.

72. The composition of paragraph 71, wherein the mogroside extract component is one or more of mogroside V, mogroside IV, siamenoside I, 1,1-oxomogroside V or mixtures thereof.

73. The composition of paragraph 72, wherein the mogroside extract component is a salt form.

74. The composition of paragraph 56, wherein the glycosylated *Stevia* extract comprises glycosylation products of stevioside, steviolbioside, rebaudioside A, rebaudioside B, rebaudioside C, rebaudioside D, rebaudioside E, rebaudioside F, rebaudioside M, rebaudioside O, rebaudioside H, rebaudioside I, rebaudioside L, rebaudioside N, rebaudioside K, rebaudioside rubusoside, dulcoside A or mixtures thereof.

75. The composition of paragraph 56, wherein the glycosylated steviol glycoside comprises glycosylation products of stevioside, steviolbioside, rebaudioside A, rebaudioside B, rebaudioside C, rebaudioside D, rebaudioside E, rebaudioside F, rebaudioside M, rebaudioside O, rebaudioside H, rebaudioside I, rebaudioside L, rebaudioside N, rebaudioside K, rebaudioside J, rubusoside, dulcoside A or mixtures thereof.

76. The composition of paragraph 75, wherein the glycosylated steviol glycoside is a salt form.

77. The composition of paragraph 56, wherein the glycosylated swingle extract comprises a glycosylated mogroside II, a glycosylated mogroside III, a glycosylated mogroside IV, a glycosylated mogroside V, a glycosylated siamenoside I or a glycosylated 11-oxomogroside V or mixtures thereof.

78. The composition of paragraph 56, wherein the glycosylated mogroside comprises a glycosylated mogroside II, a glycosylated mogroside III, a glycosylated mogroside IV, a glycosylated mogroside V, a glycosylated siamenoside I or a glycosylated 11-oxomogroside V or mixtures thereof.

79. The composition of paragraph 78, wherein the glycosylated mogroside is a salt form.

80. The composition of any of paragraphs 56 through 79, wherein the Maillard reaction product(s) are formed from the reducing sugar and/or the sweet tea extract, the *Stevia* extract, the swingle extract, the glycosylated sweet tea extract, the glycosylated *Stevia* extract, the glycosylated swingle extract, the glycosylated sweet tea glycoside, the glycosylated steviol glycoside, the glycosylated mogroside, or any mixture thereof, with an amine donor comprising a primary amine compound, a secondary amine compound, an amino acid, a protein, a peptide or mixtures thereof.

81. The composition of paragraph 80, wherein the reducing sugar comprises monosaccharides, disaccharides, oligosaccharides and polysaccharides.

82. The composition of paragraph 81, wherein the monosaccharide comprises galactose, glucose, glyceraldehyde, fructose, ribose, xylose or combinations thereof.

83. The composition of paragraph 81, wherein the disaccharide comprises cellobiose, lactose, maltose or combinations thereof.

84. The composition of paragraph 81, wherein the polysaccharide comprises starch.

85. The composition of paragraph 80, wherein the reducing sugar is burnt sugar.

86. The composition of paragraph 80, wherein the reducing sugar comprises a pentose or a hexose.

87. The composition of paragraph 86, wherein the pentose comprises an aldopentose or a ketopentose.

88. The composition of paragraph 87, wherein the aldopentose comprises an arabinose, a xylose, a ribose, a xylose or combinations thereof.

89. The composition of paragraph 87, wherein the ketopentose is a ribulose or a xylulose or combinations thereof.

90. The composition of any of paragraphs 80 through 89, wherein the amino acid comprises alanine, arginine, asparagine, aspartic acid, cysteine, glutamine, glutamic acid, glycine, histidine, isoleucine, leucine, lysine, methionine, phenylalanine, proline, serine, threonine, tryptophan, tyrosine, valine or mixtures thereof.

91. The composition of any of paragraphs 80 through 90, wherein the peptide comprises HVP or mixtures thereof.

92. The composition of any of paragraphs 80 through 91, wherein the protein comprises soy protein, sodium caseinate, whey protein, wheat gluten or mixtures thereof.

93. The composition of any of paragraphs 80 through 92, further comprising an alkaline pH adjuster.

94. The composition of paragraph 93, wherein the alkaline pH adjuster is sodium hydroxide.

95. The composition of any of paragraphs 80 through 94, further comprising a salt.

96. The composition of paragraph 95, wherein the salt comprises sodium carbonate, sodium bicarbonate, sodium chloride, potassium chloride, magnesium chloride, sodium sulfate, magnesium sulfate, potassium sulfate or mixtures thereof.

97. The composition of any of paragraphs 80 through 96, further comprising a sweetener.

98. The composition of paragraph 97, wherein the sweetener comprises sorbitol, xylitol, mannitol, sucralose, aspartame, acesulfame-K, neotame, erythritol, trehalose, raffinose, cellobiose, tagatose, DOLCIA PRIMA™ allulose inulin, N—[N-[3-(3-hydroxy-4-methoxyphenyl)propyl]-alpha-aspartyl]-L-phenylalanine 1-methyl ester, glycyrrhizin, sodium cyclamate, or mixtures thereof.

99. The composition of any of paragraphs 80 through 98, further comprising a sweetener enhancer.

100. The composition of paragraph 99, wherein the sweetener enhancer comprises brazzein, miraculin, curculin, pentadin, mabinlin, thaumatin, or mixtures thereof.

101. The composition of any of paragraphs 56 through 100, wherein the composition is used as a flavor or as a sweetener.

102. The composition of paragraph 101, wherein the Maillard reaction product(s) is/are present from about $10^{-9}$ ppb to about 99% by weight of the total weight of the composition.

103. The composition of paragraph 102, wherein the Maillard reaction product(s) is/are present from about $10^{-9}$ ppb to about 10% by weight of the total weight of the composition.

104. A flavored food product comprising a food or beverage and any of the compositions of paragraphs 56 through 101.

105. The flavored food product of paragraph 104, wherein the Maillard reaction product(s) is/are present from about $10^{-9}$ ppb to about 99% by weight of the total weight of the food product.

106. The flavored food product of paragraph 105, wherein the Maillard reaction product(s) is/are present from about $10^{-9}$ ppb to about 10% by weight of the total weight of the food product.

107. A flavored pharmaceutical composition comprising a pharmaceutical agent and any of the compositions of paragraphs 56 through 101.

108. The flavored pharmaceutical composition of paragraph 107, wherein the Maillard reaction product(s) is/are present from about $10^{-9}$ ppb to about 99% by weight of the total weight of the pharmaceutical composition.

109. The flavored pharmaceutical composition of paragraph 108, wherein the Maillard reaction product(s) is/are present from about $10^{-9}$ ppb to about 10% by weight of the total weight of the pharmaceutical composition.

110. A method to improve the taste profile of a product comprising the step of combining a reducing sugar, at least one of a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof, with an amine donor under conditions that a Maillard reaction occurs to provide Maillard reaction product(s).

111. A composition comprising Maillard reaction products of at least one of a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof.

112. The composition of paragraph 111, wherein the Maillard reaction product is the direct result of Maillard reaction without separation of purification of reaction components.

113. The composition of paragraph 111 or 112, wherein the Maillard reaction production consists of volatile substances and non-volatile substances.

114. The composition of paragraph 111 or 112, wherein the Maillard reaction product is partially isolated products, either partially volatile substance or partially non-volatile substances are removed from the direct resultant of Maillard reaction.

115. The composition of paragraph 111, wherein the Maillard reaction product is a pure volatile substance.

116. The composition of paragraph 111, wherein the Maillard reaction product is a pure non-volatile substance.

117. The composition of any of paragraphs 111-116, wherein the Maillard reaction product is a water soluble compound.

118 The composition of paragraph 111, wherein the *Stevia* extract comprises one or more *Stevia* extract components.

119. The composition of paragraph 118, wherein the *Stevia* extract component is one or more of rebaudioside A, rebaudioside B, rebaudioside D, rebaudioside E, rebaudioside M, rebaudioside O, or mixtures thereof.

120. The composition of paragraph 119, wherein the *Stevia* extract component is rebaudioside A with a purity of 20%, 30%, 40%, 50%, 60%, 80%, 90%, 95%, 97%, 98%, 99% or 100%.

121. The composition of paragraph 119, wherein the *Stevia* extract component s a salt form.

122. The composition of paragraph 111, wherein the *Stevia* extract further comprises non-steviol glycoside components.

123. The composition of paragraph 122, wherein the non-steviol glycosides components are volatile substances characterized by citrus flavor.

124. The composition of paragraph 123, wherein the non-steviol glycoside components non-volatile substances comprises one or more molecules characterized by e ene, di-terpene, or ent-kaurene structure.

125, The composition of paragraph 122, wherein the non-steviol glycoside components consist of volatile and non-volatile substances.

126. The composition of paragraph 111, wherein the swingle extract comprises one or more mogroside extract components, 127. The composition of paragraph 126, wherein the mogroside extract component is one or more of mogroside V, mogroside IV, siamenoside I, 11-oxomogroside V or mixtures thereof.

128. The composition of paragraph 127, wherein the mogroside extract component is a salt form.

129. The composition of paragraph 111, wherein the glycosylated *Stevia* extract comprises glycosylation products of stevioside, steviolbioside, rebaudioside A, rebaudioside B, rebaudioside C, rebaudioside D, rebaudioside E, rebaudioside F, rebaudioside M, rebaudioside O, rebaudioside rebaudioside I, rebaudioside L, rebaudioside N, rebaudioside K, rebaudioside rubusoside, dulcoside A or mixtures thereof.

130. The composition of paragraph 111, wherein the glycosylated steviol glycoside comprises glycosylation products of stevioside, steviolbioside, rebaudioside A, rebaudioside B, rebaudioside C, rebaudioside D, rebaudioside E, rebaudioside F, rebaudioside M, rebaudioside O, rebaudiosideR rebaudioside I, rebaudioside L, rebaudioside N, rebaudioside K, rebaudioside rubusoside, dulcoside A or mixtures thereof.

131. The composition of paragraph 130, wherein the glycosylated steviol glycoside is a salt form.

132. The composition of paragraph 131, wherein the glycosylated swingle extract comprises a glycosylated mogroside II, a glycosylated mogroside III a glycosylated mogroside IV, a glycosylated mogroside V, a glycosylated siamenoside I or a glycosylated 11-oxomogroside V or mixtures thereof.

133. The composition of paragraph 131, wherein the glycosylated mogroside comprises a glycosylated mogroside II, a glycosylated mogroside III, a glycosylated mogroside IV, a glycosylated mogroside V, a glycosylated siamenoside I or a glycosylated 11-oxomogroside V or mixtures thereof.

134, The composition of paragraph 133, wherein the glycosylated mogroside is a salt form.

135. The composition of any of paragraphs 111 through 134, wherein the Maillard reaction product(s) are formed from:

one or more members selected from the group consisting of sweet tea extract(s), steviol glycoside(s), *Stevia* extract(s), swingle extract(s), glycosylated sweet tea extract(s), glycosylated *Stevia* extract(s), glycosylated swingle extract(s), glycosylated sweet tea glycoside(s), glycosylated steviol glycoside(s), glycosylated mogroside(s), and any combination(s) thereof; and one or more amine donor(s) selected from the group consisting of primary amine compound(s), secondary amine compound(s), amino acid(s), protein(s), peptide(s) or mixture(s) thereof.

136. The composition of paragraph 135, wherein the amino acid comprises alanine, arginine, asparagine, aspartic acid, cysteine, glutamine, glutamic acid, glycine, histidine, isoleucine, leucine, lysine, methionine, phenylalanine, proline, serine, threonine, tryptophan, tyrosine, valine or mixtures thereof.

137. The composition of either paragraphs 135 or 136, wherein the peptide comprises HVP or mixtures thereof.

138. The composition of any of paragraphs 135 through 137, wherein the protein comprises soy protein, sodium caseinate, whey protein, wheat gluten or mixtures thereof.

139. The composition of any of paragraphs 135 through 138, further comprising an alkaline pH adjuster.

140. The composition of paragraph 139, wherein the alkaline pH adjuster is sodium hydroxide.

141. The composition of any of paragraphs 135 through 140, further comprising a salt.

142. The composition of paragraph 141, wherein the salt comprises sodium carbonate, sodium bicarbonate, sodium chloride, potassium chloride, magnesium chloride, sodium sulfate, magnesium sulfate, potassium sulfate or mixtures thereof.

143. The composition of any of paragraphs 135 through 142, further comprising a sweetener.

144. The composition of paragraph 143, wherein the sweetener comprises sorbitol, xylitol, mannitol, sucralose, aspartame, acesulfame-K, neotame, erythritol, trehalose, raffinose, cellobiose, tagatose, DOLCIA PRIMA™ allulose, inulin, N—[N-[3-(3-hydroxy-4-methoxyphenyl)propyl]-alpha-aspartyl]-L-phenylalanine 1-methyl ester, glycyrrhizin, sodium cyclamate, or mixtures thereof.

145. The composition of any of paragraphs 135 through 44, further comprising a sweetener enhancer.

146. The composition of paragraph 145, wherein the sweetener enhancer comprises brazzein, miraculin, curculin, pentadin, mabinlin, thaumatin, or mixtures thereof.

147. The composition of any of paragraphs 111 through 146, wherein the composition is used as a flavor or as a sweetener.

148. The composition of paragraph 147, wherein the Maillard reaction product(s) is/are present from about $10^{-9}$ ppb to about 99% by weight of the total weight of the composition.

149. The composition of paragraph 148, wherein the Maillard reaction product(s) is/are present from about $10^{-9}$ ppb to about 10% by weight of the total weight of the composition.

150. A flavored food product comprising a food or beverage and any of the compositions of paragraphs 111 through 147.

151. The flavored food product of paragraph 150, wherein the Maillard reaction product(s) is/are present from about $10^{-9}$ ppb to about 99% by weight of the total weight of the food product.

152. The flavored food product of paragraph 151, wherein the Maillard reaction product(s) is/are present from about $10^{-9}$ ppb to about 10% by weight of the total weight of the food product.

153. A flavored pharmaceutical composition comprising a pharmaceutical agent and any of the compositions of paragraphs 111 through 147.

154. The flavored pharmaceutical composition of paragraph 153, wherein the Maillard reaction product(s) is/are present from about $10^{-9}$ ppb to about 99% by weight of the total weight of the pharmaceutical composition.

155. The flavored pharmaceutical composition of paragraph 154, wherein the Maillard reaction product(s) is/are present from about $10^{-9}$ ppb to about 10% by weight of the total weight of the pharmaceutical composition.

156. A method to improve the taste profile of a product comprising the step of combining at least one of a sweet tea extract, a steviol glycoside, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof with an amine donor under conditions that a Maillard reaction occurs to provide Maillard reaction product(s).

157. A compositions comprising one or more MRPs and one or more sweeteners.

158. A composition comprising one or more MRPs and one or more amine donors.

159. A composition comprising one or more MRPs and one or more sugar donors (reducing sugars).

160. A composition comprising one or more MRPs and one or more salts.

161. A composition comprising one or more MRPs and one or more sweetening agents.

162. A composition comprising one or more MRPs, one or more sweetening agents and one or more salts.

163. A composition comprising one or more MRPs, one or more sweetening agents and one or more amine donors.

164. A composition comprising one or more MRPs, one or more sweetening agents and one or more sweeteners.

165. A composition comprising one or more MRPs, one or more sweetening agents and one or more sugar donors.

166. A composition comprising one or more MRPs, one or more sweeteners and one or more salts.

167. A composition comprising one or more MRPs, one or more sweeteners and one or more amine donors.

168. A composition comprising one or more MRPs, one or more sweeteners and one or more sugar donors.

169. A composition comprising one or more MRPs, one or more sweeteners and one or more sweetening agents.

170. A composition comprising one or more MRPs, one or more sweeteners, one or more sweetening agents and one or more salts.

171. A composition comprising one or more MRPs, one or more sweeteners, one or more sweetening agents and one or more amine donors.

172. A composition comprising one or more MRPs, one or more sweeteners, one or more sweetening agents and one or more sugar donors.

173. A composition comprising one or more MRPs, one or more sweeteners, one or more sweetening agents, one or more salts and one or more amine donors.

174. A composition comprising one or more MRPs, one or more sweeteners, one or more sweetening agents, one or more salts and one or more sugar donors.

175. A composition comprising one or more MRPs, one or more sweeteners, one or more sweetening agents, one or more amine donors and one or more sugar donors.

176. A composition comprising one or more MRPS, one or more sweeteners, one or more sweetening agents, one or more amine donors, one or more salts, and one or more sugar donors.

177. The composition of paragraph 9, wherein the *Stevia* extract component is rebaudiosideD or rebaudioside M or a mixture of both and the rebaudioside(s) are present at least by 0.5% by weight, 2% by weight, 5% by weight, 10% by weight, 20% by weight, 30% by weight, 40% by weight, 50% by weight, 60% by weight, 70% by weight, 80% by weight, 90% by weight, or 95% by weight.

178, The composition of paragraph 64, wherein the *Stevia* extract component is rebaudioside D or rebaudioside M or a mixture of both and the rebaudioside(s) are present at least by 0.5% by weight, 2% by weight, 5% by weight, 10% by weight, 20% by weight, 30% by weight, 40% by weight, 50% by weight, 60% by weight, 70% by weight, 80% by weight, 90% by weight, or 95% by weight.

179. The composition of paragraph 119, wherein the *Stevia* extract component is rebaudioside D or rebaudioside M or a mixture of both and the rebaudioside(s) are present at least by 0.5% by weight, 2% by weight, 5% by weight, 10% by weight, 20% by weight, 30% by weight, 40% by weight, 50% by weight, 60% by weight, 70% by weight, 80% by weight, 90% by weight, or 95% by weight.

180. The composition of paragraph 135, wherein the Maillard reaction product(s) are formed rebaudioside D, rebaudioside M, or a mixture thereof, and the rebaudioside(s) are present in the composition, individually or collectively, in amounts of at least by 0.5% by weight, 2% by weight, 5% by weight, 10% by weight, 20% by weight, 30% by weight, 40% by weight, 50% by weight, 60% by weight, 70% by weight, 80% by weight, 90% by weight, or 95% by weight.

181. A Maillard reaction product(s), formed from the reaction of one or more sugar donor(s) and one or more amine donor(s), wherein the sugar donor is one or more of galactose, mannose, arabinose, rhamnose, lactose, mixtures thereof, or derivatives thereof.

182. A Maillard reaction product(s), formed from the reaction of one or more sugar donor(s) and one or more amine donor(s), wherein the sugar donor is one or more of a plant juice, a plant powder, a vegetable juice, a vegetable powder, a berry juice, a berry powder a fruit juice, a berry powder or mixtures thereof.

183. The Maillard reaction product of paragraph 182, wherein the fruit juice, concentrate, or extract is enriched in anthocyanins.

184. The Maillard reaction product of paragraph 183, wherein the fruit juice is bilberry juice, a concentrate, or an extract.

185. A Maillard reaction product formed from the reaction of one or more sugar donor(s) and one or more amine donor(s), wherein the sugar donor is comprises a glycoside.

186. The Maillard reaction product of paragraph 185, wherein the glycoside is a monosaccharide.

187. The Maillard reaction product of paragraph 185, wherein the glycoside is an oligosaccharide.

188. The Maillard reaction product of paragraph 185, wherein the sugar donor is one or more of glucose, galactose, mannose, rhamnose, lactose, arabinose, or mixtures thereof 189. The Maillard reaction product of paragraph 185, wherein the glycoside comprises concentrates or extracts from one or more of bilberry, raspberry, lingonberry, cranberry, apple, peach, apricot, mango, or mixtures thereof.

190. Any composition of paragraphs 1 through 156, further comprising a sweetening agent.

191. Any composition of paragraphs 1 through 157, further comprising malic acid.

192. The MRP composition of paragraph 190, wherein the Maillard reaction product is formed from the sweetening agent and the amine donor.

193. The MRP composition of paragraph 190, wherein the Maillard reaction product is formed from the sweetening agent, the reducing sugar and the amine donor.

194. The MRP composition of any of paragraphs 190 through 193, wherein the unreacted sweetening agent is selected from one or more of a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof.

195. The MRP composition of paragraph 194, wherein the *Stevia* extract comprises one or more steviol glycosides selected from rebaudioside A, rebaudioside B, rebaudioside D, rebaudioside E, rebaudioside M, rebaudioside O, or any mixture thereof.

196. The MRP composition of paragraph 194, wherein the *Stevia* extract comprises rebaudioside A with a purity of 20%, 30%, 40%, 50%, 60%, 80%, 90%, 95%, 97%, 98%, 99% or 100%.

197. The MRP composition of any of paragraphs 190 through 196, wherein the unreacted reducing sugar is selected from one or more of the group consisting of monosaccharides, disaccharides, oligosaccharides and polysaccharides or mixtures thereof.

198. The MRP composition of any of paragraphs 190 through 197, wherein the unreacted amine donor is selected from one or more of the group consisting of a primary amine compound, a secondary amine compound, an amino acid, a protein, a peptide, yeast extract or mixtures thereof.

199. The MRP composition of any of paragraphs 190 through 198, wherein the MRP composition comprises 0-50 wt % of the unreacted reducing sugar; 0-50 wt % of the unreacted amine donor; and greater than 10 wt % of the unreacted sweetening agent, wherein all percentages are based on the total weight of the MRP composition.

200. The MRP composition of any of paragraphs 190 through 199, wherein the MRP composition is present in the form of a solid or a liquid.

201. The MRP composition of any of paragraphs 190 through 199, further comprising a carrier.

202. The MRP composition of paragraph 200, wherein the carrier comprises those that can absorb or encapsulate the Maillard reaction product.

203, The MRP composition of paragraph 201, wherein the carrier comprises a starch or a dextrin.

204. A method for preparing the MRP composition of any of paragraphs 190 through 203, wherein the method includes the steps of (1) mixing all reactants including an amine donor, a reducing agent and/or a sweetening agent; (2) dissolving the mixture into a solvent; and (3) heating the mixture.

205. The method of paragraph 204, wherein the solvent comprises water, ethanol, or any other solvent approved for oral use by the International Organization fo the Flavor Industry (IOFI).

206. The method of any of paragraphs 204 through 205, wherein the method further includes the step of adding a pH adjuster.

207. The method of paragraph 206, wherein the pH adjuster comprises $Na_2CO_3$ or citric acid.

208. The method of any of paragraphs 204-207, further comprising the step of spray-drying after the step of (3).

209. A composition, comprising the MRP composition of any of paragraphs 204 through 208, further comprising an additional sweetening agent and/or a sweetener.

210. The composition of paragraph 209, wherein the additional sweetening agent is selected from one or more of a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof.

211. The composition of paragraph 209, wherein the sweetener is selected from one or more of the group consisting of sorbitol, xylitol, mannitol, sucralose, aspartame, acesulfame-K, neotame, erythritol, trehalose, raffinose, cellobiose, tagatose, DOLCIA PRIMA™ allulose, inulin, N—[N-[3-(3-hydroxy-4-methoxyphenyl)propyl]-alpha-aspartyl]-L-phenylalanine 1-methyl ester, glycyrrhizin, sodium cyclamate, or mixtures thereof.

212. The composition of paragraph 209, wherein the sweetener is sucralose.

213. The composition of paragraphs 209 through 212, wherein the ratio of the MRP composition and an additional sweetening agent and/or a sweetener is from 1:99 to 99:1.

214. A flavored food product comprising a food or beverage, and the MRP composition of any of paragraphs 190 through 213.

215. A flavored food product comprising a food or beverage, and the composition of any of paragraphs 209 through 213.

216. The flavored food product of paragraphs 214 or 215, wherein the MRP composition is present from 1-99% by weight of the total weight of the flavored food product.

217. A flavored pharmaceutical composition comprising a pharmaceutical agent and the MRP composition of any of paragraphs 180 through 203.

218. A flavored pharmaceutical composition comprising a pharmaceutical agent and the composition any of paragraphs 209 through 213.

219. The flavored pharmaceutical composition of paragraphs 217 or 218, wherein the pharmaceutical agent is present from 1-99% by weight of the total weight of the flavored pharmaceutical composition.

Additional Embodiments, Set 2

1. A composition comprising: (1) a sweetening agent selected from the group consisting of a sweet tea extract, a *Stevia* extract, a swingle extract, a glycosylated sweet extract, a glycosylated *Stevia* extract, a glycosylated swingle extract, a glycosylated sweet tea glycoside, a glycosylated steviol glycoside, a glycosylated mogroside, or any mixture thereof; and (2) a Maillard reaction product comprising a nitrogen heterocylic functionality, a reaction product comprising cyclic enolone functionality, a reaction product comprising polycarbonyl functionality, a reaction product comprising monocarbonyl functionality, or any mixture of one of more of the reaction products.

2. A composition of paragraph 1, wherein the sweetening agent is a *Stevia* extract, *Stevia* material, or one or more constituents of the *Stevia* plant.

3. The composition of paragraph 1, wherein the sweetening agent is a mogroside extract, a mogroside material or one or more constituents of a mogroside product.

4. The composition of any of paragraphs 1 through 3, wherein the reaction product comprises nitrogen heterocyclic functionality includes pyrazines, pyrroles, pyridines, alkyl and acetyl-substituted saturated N-heterocycles.

5. The composition of any of paragraphs 1 through 3, wherein the reaction product comprises cyclic enolone functionality includes tnaltol, isomaitol, dehydrofuranones, dehydropyrones and cyclopentenolones.

6. The composition of any of paragraphs 1 through 3, wherein the reaction product comprises polycarbonyls includes 2-furaldehydes, 2-pyrrole aldehydes and C3-C6 methyl ketones.

7. The composition of paragraphs 1 through 4, wherein the composition has a corny, nutty, roasted or breadlike flavor.

8. The compostion of paragraphs 1 through 3 and 5, wherein the composition has a caramel like flavor 9. The composition of any of paragraphs 1 through 6, wherein the Maillard reaction product is present in an amount of from about $10^{-9}$ ppb to about 99.9 wt %.

10. The composition of any of paragraphs 1 through 6, wherein the Maillard reaction product enhances mouth feel.

11. A food or beverage comprising the composition of any of paragraphs 1 through 10.

12. The food or beverage of paragraph 11, wherein the beverage is tea, cocoa, juice, soda, milk, water or coffee; or fruit or vegetable juice; or fruit or vegetable nectar; water-based flavored drink; herbal infusion; hot cereal beverage; non-alcoholic beverage; alcoholic beverage; beer or malt beverage; cider and perry; wine; fruit wine; or a spirituous beverage.

13. The food or beverage of any of paragraphs 1 through 12, wherein Maillard reaction composition comprises unreacted starting components.

14. A composition comprising: sucralose or acesulfame-K and a Maillard reaction product comprising a nitrogen heterocylic functionality, a reaction product comprising cyclic enolone functionality, a reaction product comprising polycarbonyl functionality, a reaction product comprising monocarbonyl functionality or mixtures of one of more of the reaction products.

15. The composition of paragraph 14, wherein the reaction product comprises nitrogen heterocyclic functionality includes pyrazines, pyrroles, pyridines, alkyl and acetyl-substituted saturated N-heterocycles.

16. The composition of paragraph 14, wherein the reaction product comprises cyclic enolone functionality includes maltol, isomaltol, dehydrofuranones, dehydropyrones and cyclopentenolones.

17. The composition of paragraph 14, wherein the reaction product comprises polycarbonyis includes 2-furaldehydes, 2-pyrrole aldehydes and C3-C6 methyl ketones.

18. The composition of paragraphs 14 or 15, wherein the composition has a corny, nutty, roasted or breadlike flavor.

19. The compostion of paragraphs 14 or 15, wherein the composition has a caramel like flavor.

20. The composition of any of paragraphs 14 through 19, wherein the Maillard reaction product is present in an amount of from about 1 ppb to about 99.9 wt %.

21. The composition of any of paragraphs 14 through 19, wherein the Maillard reaction product enhances mouth feel.

22. The composition of any of paragraphs 14 through 21, wherein the composition is included in a food or beverage.

23. The composition of paragraph 22, wherein the beverage is tea, cocoa, juice, soda, or coffee.

24. The composition of any of paragraphs 14 through 23, wherein Maillard reaction components are not all consumed during the Maillard reaction process and are present in the composition.

25. A method to enhance mouth feel comprising the step of adding a composition of paragraphs 1 through 10 or 14 through 20 to a food product or a beverage, resulting in an enhanced mouth feel of the food product or the beverage.

26. A composition of paragraphs 1 through 10 or 14 through 20 for use in a food product or a beverage, to color the food product or the beverage.

27. The composition of paragraph 26, wherein the resultant food product or beverage has a red color, 28. The composition of paragraph 26, wherein the resultant food product or beverage has an orange color.

29. The composition of paragraph 26, wherein the resultant food product or beverage has a caramel color.

30. A flavoring composition prepared by reacting one or more amino compounds and one or more carbonyl compounds to obtain a composition of Maillard reaction products.

31, The flavoring composition of paragraph 30, wherein the one or more amino compounds and the one or more carbonyl compounds are equivalent on a molar basis.

32. The flavoring composition of paragraph 30, wherein excess amino compound and/or excess carbonyl compound are present in the Maillard reaction product composition.

33. The flavoring composition of any of paragraphs 30 through 32, wherein the amino compounds are selected from the group consisting of amino acids, amines, peptides, proteins, protein hydrolysates, hydrolyzes vegetable protein, yeast extracts, yeast hydrolysates, soy extract, and any mixture thereof.

34. The flavoring composition of any of paragraphs 30 through 33, wherein the carbonyl compounds are selected from the group consisting of monosaccharides, disaccharides, sugar derivatives, hydrolyzed pectins, and any combination thereof.

35. The flavoring composition of paragraph 34, wherein the carbonyl compounds are selected from the group consisting of xylose, glucose, fructose, rhamnose, lactose, and any combination thereof.

36. The flavoring composition of any of paragraphs 30 through 35, further comprising a sweetening agent selected from the group consisting of a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, and any mixture thereof.

37. The flavoring composition of any of paragraphs 30 through 36, further comprising a sweetener selected from the group consisting of sucralose, sorbitol, xylitol, mannitol, sucralose, aspartame, acesulfame-K, neotame, erythritol, trehalose, raffinose, cellobiose, tagatose, inulin, N—[N-[3-(3-hydroxy-4-methoxyphenyl)propyl]-alpha-aspartyl]-L-phenylalanine 1-methyl ester, glycyrrhizin, sodium cyclamate, any mixture thereof.

38. The flavoring composition of any of paragraphs 30 through 37, wherein the flavoring composition is included in a food or beverage.

39. The flavoring composition of paragraph 38, wherein the beverage is tea, cocoa, juice, soda, or coffee.

40. The composition of any of paragraphs 30 through 39, wherein Mail lard reaction components are not all consumed during the Maillard reaction process and are present in the composition.

41. A flavoring composition prepared by a Maillard reaction between: (1) one or more sweetening agents selected from the group consisting of a sweet tea extract, a *Stevia* extract, a swingle extract, a glycosylated sweet tea extract, a glycosylated Stavin extract, a glycosylated swingle extract, a glycosylated sweet tea glycoside, a glycosylated steviol glycoside, a glycosylated mogroside, or any mixture thereof; and (2) one or more amino compounds.

42. The flavoring composition of paragraph 41, wherein the one or more amino compounds and the one or more sweetening agents are equivalent on a molar basis.

43. The flavoring composition of paragraph 41, wherein excess amino compound and/or excess sweetening agents are present in the Maillard reaction.

44. The flavoring composition of any of paragraphs 41-43, wherein the amino compounds are selected from the group consisting of amino acids, amines, peptides, proteins, protein hydrolysates, hydrolyzes vegetable protein, yeast extracts, yeast hydrolysates, soy extract, and any mixture thereof.

45. The flavoring composition of any of paragraphs 41 through 44, further comprising a carbonyl containing compound.

46. The flavoring composition of paragraph 45, wherein the carbonyl compound is selected from the group consisting of monosaccharides, disaccharides, sugar derivatives, hydrolyzed pectins, and any combination thereof.

47. The flavoring composition of paragraph 45, wherein the carbonyl compound is selected from the group consisting of xylose, glucose, fructose, rhamnose, lactose, and any combination thereof.

48. The flavoring composition of any of paragraphs 41 through 47, further comprising a sweetener selected from the group consisting of sucralose, sorbitol, xylitol, mannitol, sucralose, aspartame, acesulfame-K, neotame, erythritol, trehalose, raffinose, cellobiose, tagatose, allulose, inulin, N—[N-[3-(3-hydroxy-4-methoxyphenyl)propyl]-alpha-aspartyl]-L-phenylalanine 1-methyl ester, glycyrrhizin, sodium cyclamate, and any mixture thereof.

49. The flavoring composition of any of paragraphs 41 through 48, wherein the flavoring composition is included in a food or beverage.

50. The flavoring composition of paragraph 49, wherein the beverage is tea, cocoa, juice, soda, or coffee, 51. The flavoring composition of any of paragraphs 41 through 50, wherein Maillard reaction components are not all consumed during the Maillard reaction process and are present in the composition.

Additional Embodiments, Set 3

1. A *Stevia* extract comprising a steviol glycoside and a non-steviol glycoside flavor.

2. The *Stevia* extract of paragraph 1, wherein the non-steviol glycoside flavor comprises one or more volatile substances.

3. The *Stevia* extract of paragraph 2, wherein the volatile substance is one or more substances extracted from *Stevia* plants by water distillation, solvent extraction or supercritical extraction.

4. The *Stevia* extract of paragraph 2 or paragraph 3, wherein the volatile substance comprises alkanes, ketones, acids, aldehydes, hydrocarbons, alkenes, aromatics, esters, alcohols, aliphatics or amines.

5. The *Stevia* extract of paragraph 4, wherein the acids comprise acetic acid, Propanoic acid, Pentanoic acid, Hexanoic acid, Trans 2-hexenoic acid, Heptanoic acid, Octanoic acid, (Z)-9-Octadecenoic acid, decahydro-1-Naphthalenecarboxylic acid, 2,3-dihyd-9,12,15-Octadecatrienoic acid; the alcohols comprise 1-Azabicyclo[3.2.1]octan-6-ol, 2-Ethyl-1-dodecanol, spathulenol, 1,2,3,4,4a,7,8,8a-octahy-1-Naphthalenol; the aldehydes comprise Hexanal, 2,4-Pentadienal, Octanal, Nonanal, Decanal, 1-Cyclohexene-1-carboxaldehyde, 2,5-dimethyl-5-nitrohexanal, (E)-2-Hexenal, (Z)-2-Heptenal; the amines comprise 4-methyl-Pyrimidine, O-decyl-Hydroxyl amine, the esters comprise 3-Methyl pentanoic acid, 2-ethyl-4-Pentenal, Triacetin, Heptafluorobutyric acid, n-pentadecyl es, Pseudosolasodine diacetate, 2,5,6-trimethyl-Decane; the ketones comprise dihydro-2(3H)-Furanone, 5-ethenyldihydro-5-methy-2(3H)-Furanone, 5-ethyldihydro-2(3H)-Furanone, 4-methyl-Cyclopentadecanone, 3,3-dirnethyl-2,7-octanedione, 6,10-dimethyl-5,9-Undecadien-2-one, 3,5,6,8a-tetrahydro-2,52H-1-Benzopyran, 5,6,7,7a-tetrahydro-2(4H)-Benzofuranone, 6,10,14-trimethyl-2-Pentadecanone, trans-β-Ionone, 3-ethyl-4-methyl-1H-Pyrrole-2,5-dione, 1H-Naphtho[2,1-b]pyran, 3-ethenyldodecah; the alkanes comprises nitro-Cyclohexane, 2,6-dimethyl-Heptadecane, 2,6,7-trimethyl-Decane, 2,6,7-trimethyl-Decane, Tetradecane, 2,6,10-trimethyl-Dodecane, 2,3-Dimethyldecane, Undecane, 5-methyl-Undecane, Docosane, Dodecane, Heptadecane, Nonadecane, 1-Brotno-2-methyl-decane, 2,6,10-trimethyl-Tetradecane; the hydrocarbons comprise Bicyclo[4.4.1]undeca-1,3,5,7,9-pentaen-1, 3-Isopropoxy-1,1,1,7,7,7-hexamethyl-3,5, the alkenes comprise 3-Cyclohexene-1-methanol, Caryophyllene oxide, Junipene, the aromatics comprise Ethylbenzene, pentamethyl-Benzene, 2-methyl-Naphthalene, (+)-Aromadendrene; the aliphatics comprise 1-chloro-Nonadecane, 1-chloro-Octadecane.

6. The *Stevia* extract of any of paragraphs 1-5, wherein the *Stevia* extract is obtained from *Stevia* leaves, preferably fresh leaves, low temperature-dried leaves or sun-dried leaves.

7. The *Stevia* extract of any of paragraphs 1-6, wherein the non-steviol glycoside flavor is present at an amount of from $10^{-9}$ ppb to 99.5 wt by weight of the *Stevia* extract.

8. The *Stevia* extract of any of paragraphs 1-7, wherein the *Stevia* extract is a solid or liquid solution.

9. The *Stevia* extract of paragraph 8, wherein the steviol glycoside forms clusters.

10. The *Stevia* extract of paragraph 9, wherein the non-steviol glycoside flavor is embedded in and/or absorbed onto the clusters.

11. The *Stevia* extract of any of paragraphs 1 through 10, wherein the *Stevia* extract is citrus flavor.

12. A composition comprising one or more steviol glycosides, a Maillard reaction product, resulting from the reaction between Maillard reaction product reactants comprising a sugar and amine donor without a steviol glycoside present, residue of unreacted Maillard reaction reactants, non-steviol glycosides components from *Stevia* plants, and at least one steviol glycoside involved in a Maillard reaction to form steviol glycoside derived MRPs and residue of the unreacted steviol glycoside.

13. A Maillard reaction product of a *Stevia* extract comprising steviol glycosides and non-steviol glycoside substances and an amine donor.

14. The Maillard reaction product of paragraph 13, wherein the non-steviol glycoside substances are essential oils extracted from *Stevia* plants, 15. A method for producing fermented yogurt, comprising subjecting a *Stevia* extract to Maillard reaction conditions in the presence of milk, sugar donors and amine donors to provide a reaction mixture.

16. The method of paragraph 15, wherein the reaction mixture can be further fermented.

Additional Embodiments, Set 4

1. A composition comprising a Maillard reaction product, wherein the Maillard reaction product is formed from the reaction of reactants comprising an amine donor and a sugar donor.

2. The composition of paragraph 1, wherein the Mail lard reaction product is present from about 0.1 ppm to about 100% by weight of the total weight of the composition.

3. The composition of paragraph 1, wherein the amine donor and the sugar donor have a ratio of from 1:99 to 99:1 by weight.

4. The composition of any of paragraphs 1-3, wherein the amine donor comprises a compound having a free amino group.

5. The composition of any of paragraphs 1-3, wherein the amine donor comprises an amine comprising primary amine compounds and secondary amine compounds, an amino acid, a protein, a peptide, yeast extracts or mixtures thereof.

6. The composition of paragraph 5, wherein the amino acid is selected from the group consisting of alanine, arginine, asparagine, aspartic acid, cysteine, cystine, glutamine, glutamic acid, glycine, histidine, isoleucine, leucine, lysine, methionine, phenylalanine, proline, serine, threonine, tryptophan, tyrosine, valine, and any combinations thereof.

7. The composition of paragraph 5, wherein the peptide comprises HVP or mixtures thereof.

8. The composition of paragraph 5, wherein the protein is selected from one or more of soy protein, sodium caseinate, whey protein, wheat gluten or mixtures thereof 9. The composition of any of paragraphs 1-3, wherein the sugar donor comprises a compound having a free carbonyl group.

10. The composition of any of paragraphs 1-3, wherein the sugar donor comprises monosaccharides, disaccharides, oligosaccharides and polysaccharides.

11. The composition of paragraph 10, wherein the monosaccharide comprises glucose, xylose, rhamnose, arabinose, galactose, glyceraldehyde, fructose, ribose, ribulose, xylulose or combinations thereof.

12. The composition of paragraph 10, wherein the disaccharide comprises cellobiose, lactose, maltose or combinations thereof.

13. The composition of paragraph 10, wherein the polysaccharide comprises starch.

14. The composition of any of paragraphs 1-3, wherein the sugar donor is burnt sugar.

15. The composition of any of paragraphs 1-3, wherein the reactants further comprise an alkaline pH adjuster.

16. The composition of paragraph 15, wherein the alkaline pH adjuster is sodium hydroxide.

17. The composition of any of paragraphs 1-16, wherein the composition further comprises unreacted amine donor or unreacted sugar donor.

18. The composition of paragraph 17, wherein the unreacted amine donor is present at an amount of from 0-99% by weight of the composition.

19. The composition of paragraph 17, wherein the unreacted sugar donor is present at an amount of from 0-99% by weight of the composition.

20. The composition of any of paragraphs 1-19, wherein the composition further comprises sweetener or sweetening agent.

21. The composition of paragraph 20, wherein the sweetener comprises one or more of sucralose, sorbitol, xylitol, mannitol, sucralose, aspartame, acesulfame-K, neotame, erythritol, trehalose, raffinose, cellobiose, tagatose, DOLCIA. PRIMA™ allulose, inulin, N—[N-[3-(3-hydroxy-4-methoxyphenyl)propyl]-alpha-aspartyl]-L-phenylalanine 1-methyl ester, glycyrrhizin, sodium cyclamate, or mixtures thereof.

22. The composition of paragraph 20, wherein the sweetening agent comprises one or more of sweet tea extracts, *Stevia* extracts, swingle (mogroside) extracts, one or more sweet tea glycosides (rubusoside and suaviosides), steviol glycosides, one or more mogrosides, one or more glycosylated sweet tea glycosides, glycosylated steviol glycosides, one or more glycosylated mogrosides or mixtures thereof.

23. The composition of any of paragraphs 0-22, wherein the sweetener or the sweetening agent is present from about 0.1 ppm to about 99% by weight of the total weight of the beverage or food composition.

24. The composition of any of paragraphs 1-23, wherein the composition is a solid or liquid.

25. The composition of any of paragraphs 24, wherein the composition is absorbed and/or encapsulated in a carrier.

26. The composition of paragraph 25, wherein the carrier comprises a starch, a dextrin.

27. The composition of paragraph 22, wherein the Maillard reaction product is absorbed and/or encapsulated in or on the *Stevia* extract.

28. A method for preparing the composition of any of paragraphs 1-19, wherein the method includes the steps of:

1) dissolving an amino donor and a sugar donor into a solvent to obtain a solution;

2) heating the solution to 10-2.00° C. to obtain a slurry;

3) drying the slurry to obtain a powder Maillard reaction product.

29. The method of paragraph 28, wherein the solvent comprises water or ethanol.

30. The method of paragraph 28, wherein the method further includes the step of adding a pH adjuster after step 1).

31. The method of paragraph 28, wherein the drying manner is a spray-drying process.

32. A beverage or food product having improved mouth feel comprising the composition of any of paragraphs 1-27 and a beverage or food material.

33. The beverage or food product of paragraph 32, wherein the composition is present from about 0.1 ppm to about 99% by weight of the total weight of the beverage or food product.

34. The product of paragraph 32 or paragraph 33, wherein the beverage or food material is selected from tea, cocoa, juice, or coffee.

35. The composition of any of paragraphs 1 through 27, which can be used as fat substitutes and in food and beverage industries.

36. A composition of any of paragraphs 1 through 2.7 further comprising one or more thickener, wherein the one or more thickeners is selected from xanlhan gum, food starch, hydrocolloids, or combinations thereof.

37. A method to reduce the amount of thickener to be used in a food, a beverage, a feed or a pharmaceutical product by adding the composition of any of paragraphs 1 through 27 to the food, beverage, feed or pharmaceutical product.

38. A food or beverage comprising the composition of any of paragraphs 1 through 27, a food or a beverage and one or more thickener.

39. The food or beverage of paragraph 38, wherein the amount of added composition is above 1 ppm.

40. A composition of any of paragraphs 1 through 27, further comprising one or more flavor.

41. A method to reduce the amount of a flavor to be used in a food, a beverage, a feed or a pharmaceutical product by adding any composition of any of paragraphs 1 through 27.

42. A food or beverage comprising a composition of any of paragraphs 1 through 27 and a flavor.

43. The food or beverage of paragraph 42, wherein the amount of added composition is above 1 ppm.

44. A composition of any of paragraphs 1 through 27 further comprising one or more antioxidants, wherein the one or more antioxidant is selected from vitamins, vitamin cofactors, minerals, hormones, carotenoids, carotenoid terpenoids, non-carotenoid terpenoids, flavonoids, flavonoid polyphenolics (e.g., bioflavonoids), flavonols, flavones, phenols, polyphenols, esters of phenols, esters of polyphenols, nonflavonoid phenolics, isothiocyanates, or combinations thereof.

45. A method to reduce the amount of an antioxidant to be used in a food, a beverage, a feed, or a pharmaceutical product comprising the step of adding any composition of any of paragraphs 1 through 27.

46. A food or beverage comprising the composition of any of paragraphs 1 through 27, a food or beverage and an antioxidant.

47. The food or beverage of paragraph 46, wherein the added amount of composition is above 1 ppm.

48. A composition of any of paragraphs 1 through 2.7 further comprising one or more salt, the one or more salts is selected from sodium carbonate, sodium bicarbonate, sodium chloride, potassium chloride, magnesium chloride, sodium sulfate, magnesium sulfate, potassium sulfate or mixtures thereof.

49. A method to reduce the amount of salt to be used in a food, a beverage, a feed or a pharmaceutical product comprising the step of adding any composition of any of paragraphs 1 through 27.

50. A food or beverage comprising a composition of any of paragraphs 1 through 27, a food or beverage and a salt.

51. The food or beverage of paragraph 50, wherein the added amount of the composition is above 1 ppm.

52. A composition of any of paragraphs 1 through 27 further comprising one or more fat, wherein the one or more fat is selected from tallow, hydrogenated tallow, large, hydrogenated or partially hydrogenated vegetable oils (e.g., soybean, canola, cottonseed, sunflower, palm, coconut, corn, safflower, or palm kernel oils), cocoa butter, glycerol monostearate, glycerol tri acetate, glycerol abietate, lecithin, monoglycerides, diglycerides, triglycerides acetylated monoglycerides, and free fatty acids.

53. A method to reduce the amount of fat to be used in a food, a beverage, a feed or a pharmaceutical product, comprising the step of adding any composition of any of paragraphs 1 through 27 to a food, a beverage, a tee or a pharmaceutical product.

54. A food or beverage comprising the composition of any of paragraphs 1 through 27, a food or beverage and a fat.

55. The food or beverage of paragraph 54, wherein the added amount of the composition is above 1 ppm.

Use of Thauniatin as Amine Donor, NHDC, Advantame, Maltol

56. The composition of paragraph 1, wherein the amine donor comprises asweetener enhancer.

57. The composition of paragraph 56, wherein the sweetener enhancer is present n the composition in range of 0.1% to 99.5% on a weight to weight basis.

58. A method to prepare a MRPs by using an amine donor comprising a sweetener enhancer.

59. A food, beverage, feed or pharmaceutical composition comprising an MRP, wherein the MRP is produced by amine donor comprising a sweetener enhancer.

60. The food, beverage, feed or pharmaceutical composition of paragraph 59, wherein the MRP concentration is above 1 ppm.

61. The composition of any of paragraphs 56 through 59, wherein the sweetener enhancer is Thaumatin.

62. The food, beverage, feed or pharmaceutical composition of paragraph 59, wherein the amount of Thaumatin in the product is in a range of from about 0.1 ppm to about 20 ppm.

63. The composition of paragraph 1 or paragraph 56, wherein the composition further comprises one or more ingredients selected from Advantame, Trilobatin, phyllodulcin, Osladin, Polypodoside A, Eriodictyol, Homoeriodicyol, Neohesperidine, naringin, neohesperidine chalcone, naringin chalcone, phloracetophenone, neohesperidine dihydrochalcone, naringin dihydrochalcone, and their salts, maltol, ethyl-maltol, vanillin, ethyl vanillin, m-methylphenol, and m-n-propylphenol.

64. The composition of paragraph 63, whereinthe added amount of one or more ingredients selected from Advantame, Trilobatin, phyllodulcin, Osladin, Polypodoside A, Eriodictyol, Homoeriodicyol, Neohesperidine, naringin, neohesperidine chalcone, naringin chalcone, phloracetophenone, neohesperidine dihydrochalcone, naringin dihydrochalcone, and their salts, maltol, ethyl-maltol, vanillin, ethyl vanillin, m-methylphenol, and m-n-propylphenol is in a range of from about 0.1 ppm to about 99.5%.

65. A method to produce a flavor or flavor enhancer by adding one or more sweetener enhancers and/or ingredients selected from Advantame, Trilobatin, phyllodulcin, Osladin, Polypodoside A, Eriodictyol, Homoeriodicyol, Neohesperidine, naringin, neohesperidine chalcone, naringin chalcone, phloracetophenone, neohesperidine dihydrochalcone, naringin dihydrochalcone, and their salts, maltol, ethyl-maltol, vanillin, ethyl vanillin, m-methylphenol, and m-n-propylphenol into Maillard reaction products or a Maillard reaction.

66. A food, a beverage, a feed or a pharmaceutical product comprising components preparable by any of paragraphs 63 through 65.

67. The food, beverage, feed or pharmaceutical product of paragraph 66, wherein the ingredients selected from Advantame, Trilobatin, phyllodulcin, Osladin, Polypodoside A, Eriodictyol, Homoeriodicyol, Neohesperidine, naringin, neohesperidine chalcone, naringin chalcone, phloracetophenone, neohesperidine dihydrochalcone, naringin dihydrochalcone, and their salts, maltol, ethyl-maltol, vanillin, ethyl vanillin, m-methylphenol, and m-n-propylphenol in food, beverage, feed or pharmaceutical product is in a range of from about 0.1 to about 10%.

68. The composition of any of paragraphs 1, 56 and 63, further comprising one or more sweetener.

Use of Neohesperdine Hydrochalcone in the Composition and Maillard Reaction.

68. The composition of paragraph 1, wherein the composition further comprises one or more ingredients selected from Trilobatin, phyllodulcin, Osladin, Polypodoside A, Eriodictyol, Homoeriodicyol, Neohesperidine, naringin, neohesperidine chalcone, naringin chalcone, phloracetophenone, neohesperidine dihydrochalcone, naringin dihydrochalcone, their salts and mixtures thereof.

69. The composition of paragraph 68, wherein the amount of one or more of Trilobatin, phyllodulcin, Osladin, Polypodoside A, Eriodictyol, Homoeriodicyol, Neohesperidine, naringin, neohesperidine chalcone, naringin chalcone, phloracetophenone, neohesperidine dihydrochalcone, naringin dihydrochalcone, and their salts or mixtures thereof is in a range of from about 0.1 ppm to about 99.5%.

70. A method to produce a flavor or flavor enhancer by adding one or more of Trilobatin, phyllodulcin, Osladin, Polypodoside A, Eriodictyol, Homoeriodicyol, Neohesperidine, naringin, neohesperidine chalcone, naringin chalcone, phloracetophenone, neohesperidine dihydrochalcone, naringin dihydrochalcone, and their salts or mixturese thereof into Maillard reaction products or a Maillard reaction.

71. A food, beverage, feed or pharmaceutical product comprising components of any of paragraphs 68 through 70.

72. The food, beverage, feed or pharmaceutical product of paragraph 71, wherein the added amount of one or more ingredients selected from Trilobatin, phyllodulcin, Osladin, Polypodoside A, Eriodictyol, Homoeriodicyol, Neohesperidine, naringin, neohesperidine chalcone, naringin chalcone, phloracetophenone, neohesperidine dihydrochalcone, naringin dihydrochalcone, and their salts in food and beverage is in a range of from about 0.1 to about 500 ppm.

Use of Maltol, Ethyl-Maltol, Vanillin, Ethyl Vanillin, m-methylphenol, and m-n-propylphenol 71. The composition of paragraph 1, wherein the composition further comprises one or more ingredients selected from maltol, ethyl-maltol, vanillin, ethyl vanillin, m-methylphenol, and m-n-propylphenol.

72. The composition of paragraph 71, wherein the added amount of one or more ingredients selected from maltol, ethyl-maltol, vanillin, ethyl vanillin, m-methylphenol, and m-n-propylphenol is in a range of fro about 0.1 ppm to about 99.5%.

73. A method to produce a flavor or flavor enhancer by adding one or more ingredients selected from maltol, ethyl-maltol, vanillin, ethyl vanillin, m-methylphenol, and m-n-propylphenol into Maillard reaction products or a Maillard reaction.

74. A food, beverage, feed or pharmaceutical product comprising components from any of paragraphs 71 through 73.

75. The composition of paragraph 71, wherein the added amount of one or more ingredients selected from maltol, ethyl-maltol, vanillin, ethyl vanillin, m-methylphenol, and m-n-propylphenol in a food or beverage is in a range of from about 1 ppm to about 10%.

Additional Embodiments, Set 5

1. A composition comprising a Maillard reaction product, wherein the Maillard reaction product is formed from the reaction of reactants comprising amine donor and sugar donor, wherein the sugar donor comprises a sweetener or a sweetening agent.

2. The composition of paragraph 1, wherein the sugar donor further comprises reducing sugar.

3. The composition of paragraph 1 or paragraph 2, wherein the sweetening agent is selected from one or more of a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof.

4. The composition of paragraph 3, wherein the *Stevia* extract comprises steviol glycoside components and/or non-steviol glycoside components.

5. The composition of paragraph 4, wherein the steviol glycoside components are present at an amount of less than 99 wt %, less than 80 wt %, less than 60%, less than 30%, or equal to 0 wt % of the total weight of the *Stevia* extract.

6. The composition of paragraph 5, wherein the non-steviol glycoside components comprise one or more volatile components.

7. The composition of paragraph 6, wherein the one or more volatile components are present at an amount of 0.1 ppb to 10% by weight of the non-steviol glycoside components.

8. The composition of paragraph 3, wherein the *Stevia* extract comprises one or more *Stevia* extract components.

9. The composition of paragraph 8, wherein the *Stevia* extract component is one or more of rebaudioside A, rebaudioside B, rebaudioside D, rebaudioside E, rebaudioside M, rebaudioside O, or mixtures thereof.

10. The composition of paragraph 9, wherein the *Stevia* extract component comprises rebaudioside A with a content of 0.1%, 1%, 5%, 10%, 20%, 30%, 40%, 50%, 60%, 80%, 90%, 95%, 97%, 98%, 99% or 100%.

11. The composition of paragraph 8, wherein the *Stevia* extract component comprises a salt form.

12. The composition of paragraph 3, wherein the swingle extract comprises one or more mogroside components and/or one or more non-mogroside components.

13. The composition of paragraph 12, wherein the one or more mogroside components are present at an amount of less than 99 wt %, less than 80 wt %, less than 60%, less than 30%, or equal to 0 wt % of the total weight of the swingle extract.

14. The composition of paragraph 12 or paragraph 13, wherein the one or more non-mogroside components comprise one or more volatile components.

15. The composition of paragraph 14, wherein the one or more volatile components are present at an amount of 0.1 ppb to 10% by weight of the non-mogroside components.

16. The composition of paragraph 3, wherein the mogroside extract component is one or more of mogroside V, mogroside IV, siatnenoside I, 11-oxomogroside V or mixtures thereof.

17. The composition of paragraph 16, wherein the mogroside extract component comprises a salt form.

18. The composition of paragraph 3, wherein the glycosylated *Stevia* extract comprises glycosylation compositions of stevioside, steviolbioside, rebaudioside A, rebaudioside rebaudioside C, rebaudioside D, rebaudioside E, rebaudioside F, rebaudioside M, rebaudioside O, rebaudioside H, rebaudioside I, rebaudioside L, rebaudioside N, rebaudioside K, rebaudioside J, rubusoside, dulcoside A or mixtures thereof.

19. The composition of paragraph 3, wherein the glycosylated steviol glycoside comprises glycosylation compositions of stevioside, steviolbioside, rebaudioside A, rebaudioside B, rebaudioside C, rebaudioside I), rebaudioside E, rebaudioside F, rebaudioside M, rebaudioside O, rebaudioside H, rebaudioside rebaudioside L, rebaudioside N, rebaudioside K, rebaudioside J, rubusoside, dulcoside A or mixtures thereof.

20. The composition of paragraph 19, wherein the glycosylated steviol glycoside comprises a salt form.

21. The composition of paragraph 3, wherein the glycosylated swingle extract comprises a glycosylated mogroside II, a glycosylated mogroside III, a glycosylated mogroside IV, a glycosylated mogroside V, a glycosylated siamenoside I or a glycosylated 11-oxomogroside V or mixtures thereof.

22. The composition of paragraph 3, wherein the glycosylated mogroside comprises a glycosylated mogroside II, a glycosylated mogroside III, a glycosylated mogroside IV, a glycosylated mogroside V, a glycosylated siamenoside I or a glycosylated 11-oxomogroside V or mixtures thereof.

23. The composition of paragraph 22, wherein the glycosylated mogroside is a salt form.

24. The composition of paragraph 1 or paragraph 2, wherein the sweetener is selected from one or more of the group consisting of sorbitol, xylitol, mannitol, sucralose, aspartame, acesulfame-K, neotame, erythritol, trehalose, raffinose, cellobiose, tagatose, DOLCIA PRIMA™ allulose, inulin, N—[N-[3-(3-hydroxy-4-methoxyphenyl)propyl]-alpha-aspartyl]-L-phenylalanine 1-methyl ester, glycyrrhizin, sodium cyclamate, or mixtures thereof.

25. The composition of paragraph 1 or paragraph 2, wherein the sweetener is sucralose.

26. The composition of paragraph 2, wherein the reducing sugar comprises compounds having a free carbonyl group.

27. The composition of paragraph 2, wherein the reducing sugar comprises monosaccharides, disaccharides, oligosaccharides and polysaccharides, 28. The composition of paragraph 27, wherein the monosaccharide comprises glucose, xylose, rhamnose, arabinose, galactose, glyceraldehyde, fructose, ribose, ribulose, xylulose or combinations thereof.

29. The composition of paragraph 27, wherein the disaccharide comprises cellobiose, lactose, maltose or combinations thereof.

30. The composition of paragraph 27, wherein the polysaccharide comprises starch.

31. The composition of paragraph 2, wherein the reducing sugar is burnt sugar.

32. The composition of paragraph 1 or paragraph 2, wherein the amine donor comprises a compound having a free amino group, 33. The composition of paragraph 1 or paragraph 2, wherein the amine donor comprises an amine comprising primary amine compounds and secondary amine compounds, an amino acid, a protein, a peptide, yeast extracts or mixtures thereof.

34. The composition of paragraph 33, wherein the amino acid is selected from the group consisting of alanine, arginine, asparagine, aspartic acid, cysteine, cysteine, glutamine, glutamic acid, glycine, histidine, isoleucine, leucine, lysine, methionine, phenylalanine, proline, seine, threonine, tryptophan, tyrosine, valine, and any combination thereof.

35. The composition of paragraph 33, wherein the peptide comprises HVP or mixtures thereof.

36. The composition of paragraph 33, wherein the protein is selected from one or more of soy protein, sodium caseinate, whey protein, wheat gluten or mixtures thereof.

37. The composition of any of paragraphs 1-36, the ratio of sugar donor and amine donor is from 1:99 to 99:1.

38. The composition of any of paragraphs 1-37, wherein the composition further comprises one or more of an unreacted sweetening agent, an unreacted sweetener, an unreacted reducing sugar or an unreacted amine donor.

39. The composition of paragraph 38, wherein the composition comprises 0-99 wt % of the Maillard reaction product on the basis of the weight of the composition.

40. The composition of paragraph 38, wherein the unreacted amine donor is present at an amount of from 0-99% by weight of the composition.

41. The composition of paragraph 38, wherein the unreacted sweetening agent is present at an amount of from 0-99% by weight of the composition.

42. The composition of paragraph 38, wherein the unreacted sweetener is present at an amount of from 0-99% by weight of the composition.

43. The composition of paragraph 38, wherein the unreacted reducing sugar is present at an amount of from 0-99% by weight of the composition.

44. The composition of any of paragraphs 1-43, wherein the reactants further comprise an alkaline pH adjuster.

45. The composition of paragraph 44, wherein the alkaline pH adjuster is sodium hydroxide.

46. The composition of any of paragraphs 1-45, wherein the composition is a solid or liquid.

47. A method for preparing the composition of any of paragraphs 1-46, wherein the method includes the steps of:

1) dissolving an amino donor and a sugar donor into a solvent to obtain a solution;

2) heating the solution to 10-200° C. to obtain a slurry;

3) drying the slurry to obtain a powder Maillard reaction products.

48. The method of paragraph 47, wherein the solvent comprises water or ethanol.

49. The method of paragraph 47 or paragraph 48, wherein the method further includes the step of adding a pH adjuster after step 1).

50. The method of paragraph 49, wherein the pH adjuster comprises $Na_2CO_3$ or citric acid.

51. The method of paragraph 47, wherein the drying manner is a spray-drying process.

52. The composition of any of paragraphs 1-46, wherein the composition is used as a flavor or as a sweetener.

52a. The composition of any of paragraphs 1-46, wherein the composition is used as a fat substitute, salt substitute, antioxidant substitute or functions in a synergistic effect in foods and beverages.

53. A flavor with citrus aroma comprising the composition of any of paragraphs 1-46, wherein the amine donor comprises histidine or glutamic acid; and wherein the sugar donor is a *Stevia* extract of any of paragraphs 4-7. In this specification, citrus aroma or flavor is similar to an orange or tangerine.

54. The flavor of paragraph 53, wherein the composition comprises one or more volatile components.

55. The flavor of paragraph 54, wherein the volatile components comprise one or more of Pyridine; 1,6-Octadiene, 2,6-dimethyl-, (Z)-; 3-Methyl-4-cyclohexene-1,2-dicarboxylic anhydride; 1,4-Pentadiene, 3-propyl-; Nonanal; cis-Linaloloxide; Linalool oxide trans; 1-Hexanol, 2-ethyl-; Pentadecane; Hexadecane; Bicyclo[2.2.1]hept-2-ene, 1,7,7-trimethyl-; 3-Buten-2-one, 4-(2,6,6-trimethyl-2-cyclohexen-1-yl)-, (E)-; 3-Buten-2-one, 4-(2,6,6-trimethyl-2-cyclohexen-l-yl)-; 1,6-Octadien-3-ol, 3,7-dimethyl-; Naphthalene, 1,2,3,4-tetrahydro-1,1,6-trimethyl-; 4-(4-Chlorophenyl)-2,6-diphenylpyidine; 1,5,7-Octatrien-3-ol, 3,7-dimethyl-8-Azabicyclo[3.2.1]oct-2-ene, 8-methyl-; 3-Cyclohexene-1-acetaldehyde, alpha,4-dimethyl-; Cyclohexanol, 5-methyl-2-(1-methylethyl)-, (1α,2β,5α)-(+/−)-; Isoborneol; 3-Cyclohexene-1-acetaldehyde, α,4-dimethyl-; 3-Cyclohexene-1-methanol, α,α4-trimethyl-; Borneol; 2H-1-Benzopyran-2-one, 7-hydroxy-6-methoxy-4-methyl-; 2H-Pyran-2-one, 6-[4,4-bis(methylthio)-1,2,3-butatrienyl]-; Methanethioamide, N,N-dimethyl-; 3-Cycloheptadiene; Acetic acid, phenylmethyl ester; 2-Cyclohexen-1-one, 2-methyl-5-(1-methylethenyl)-, (S)—; Naphthalene; Oxime-, methoxy-phenyl-; Acetic acid, cyano-, 1,1-dimethylethyl ester; 3-(2,4-Dimethoxy-phenyl)-2-formylamino-propionic acid, ethyl ester; Naphthalene, 1,2,3,4-tetrahydro-1,5-dimethyl-; [1,2,4]Triazolo[1,5-a]pyrimidine-6-carboxylic acid, 4,7-dihydro-7-amino-, ethyl ester; 1,2,3-Propatriol, 1-indol-4-yl(ether); 2,3-dihydro-; 2-Buten-1-one, 1-(2,6,6-trimethyl-1,3-cyclohexadien-1-yl)-, (E)-; 2,6-Octadien-1-ol, 3,7-dimethyl-, (E)-; Pentanoic acid, 2,2,4-trimethyl-3-carboxyisopropyl, isobutyl ester; Naphthalene, 1,2,3,4-tetrahydro-1,5-dimethyl-; 2,6-Bis(1,1-dimethylethyl)-4-(1-oxopropyl)phenol; 1-(4-tert-Butylphenyl)propan-2-one; 1-Oxaspiro[2.5]octane, 4,4-dimethyl-8-methylene-; 4-(2,6,6-Trimethylcyclohexa-1,3-dienyl)but-3-en-2-one; 4H-Pyran-4-one, 2-ethyl-3-hydroxy-; 2-Propenoic acid, 3-phenyl-, methyl ester; beta.-Vatirenene; 2-Furanmethanol, tetrahydro-α,α,5-trimethyl-5-(4-methtl-3-cyclohexen-1-yl)-, [2S-[2α,5β(R*)]]-; 2H-Pyran-3-ol, tetrahydro-2,2,6-trimethyl-6-(4-methyl-3-cyclohexen-1-yl)-, [3S-[3α, 6α(R*)]]-; Bergamotol, Z-α-trans-; trans-Z-α-Bisabolene epoxide; Nonanoic acid; Hexadecanoic acid, methyl ester; Benzoic acid, 2-amino-, methyl ester; Dimethyl phthalate; Phenol, 2,4-bis(1,1-dimethylethyl)-; Hexagol; Octadecanoic acid, methyl ester; 1,3,6-Octatriene, 3,7-dimethyl-, (Z)-; 1,2-Benzenedicarboxylic acid, butyl methyl ester; 1,2-Benzenedicarboxylic acid, bis(2-methylpropyl) ester; 1,2-Benzenedicarboxylic acid, butyl 2-methylpropyl ester; Phenanthrene.

55a. The flavor of paragraph 55, wherein the volatile components are present in the flavor in an amount of from $10^{-9}$ ppb to 10 wt % based on the weight of the flavor.

56. A flavor with flora aroma comprising the composition of any of paragraphs 1-46, wherein the amine donor comprises phenylalanine; and wherein the sugar donor comprises xylose or a *Stevia* extract or the combination thereof.

57. The flavor of paragraph 41, wherein the composition comprises one or more volatile components.

58. The flavor of paragraph 57, wherein the volatile components comprise one or more of Nonanal; Bicyclo[2.2.1]hept-2-ene, 1,7,7-trimethyl-; Benzaldehyde; 1,6-Octadien-3-ol, 3,7-dimethyl-; 1,5,7-Octatrien-3-ol, 3,7-dimethyl-; Cyclohexanol, 5-methyl-2-(1-methylethyl)-, (1α,2β,5α)-(+/−)-; Benzeneacetaldehyde; Tridecanal; Acetic acid, phenylmethyl ester; Naphthalene; 2-Dodecanol, 2-methyl-; Furan, 3-phenyl-; Naphthalene, 1,2,3,4-tetrahydro-1,5-dimethyl-; 4-(2,6,6-Trimethylcyclohexa-1,3-dienyl)but-3-en-2-one; 2-Propenoic acid, 3-phenyl-, methyl ester; Phenol, 2,4-bis(1,1-dimethylethyl)-; 1,2-Benzenedicarboxylic acid, bis(2-methylpropyl) ester.

59. A flavor with corn aroma comprising the composition of any of paragraphs 1-46, wherein the amine donor is proline; and wherein the sugar donor comprises galactose or a Sievia extract or the combination thereof.

59a. The flavor of paragraph 59, wherein the volatile components are present in the flavor in an amount of from $10^{-9}$ ppb to 10 wt % based on the weight of the flavor.

60. The flavor of paragraph 59, wherein the composition comprises one or more volatile components.

61. The flavor of paragraph 60, wherein the volatile components comprise one or more of Nonanal; Naphthalene; 4-(2,6,6-Trimethylcyclohexa-1,3-dienyl)but-3-en-2-one; 2-Propenoic acid, 3-phenyl-, methyl ester; Phenol, 2,4-bis(1,1-dimethylethyl)-; 1,2-Benzenedicarboxylic acid, bis(2-methylpropyl) ester; 1,2-Benzenedicarboxylic acid, butyl 2-methylpropyl ester.

61a. The flavor of paragraph 61, wherein the volatile components are present in the flavor in an amount of from $10^{-9}$ ppb to 10 wt % based on the weight of the flavor.

62. A flavor with chocolate aroma comprising the composition of any of paragraphs 1-46, wherein the amine donor is valine; and wherein the sugar donor comprises rhamnose or a *Stevia* extract or the combination thereof.

63. The flavor of paragraph 62, wherein the composition comprises one or more volatile components.

64. The flavor of paragraph 63, wherein the volatile components comprise one or more of Propanal, 2-methyl-; Furan, 2-methyl-; 1,3,5-Cycloheptatriene; 3-Hexanone, 2,5-dimethyl-; 4-Heptanone, 2,6-dimethyl-; 1-Octadecanol, tert-butyldimethylsilyl ether; 2,5-Dimethylanisole; Nonanal; 1-Butanamine, N-butyl-N-2-propenyl-; Cyclohexane; Carane, 4,5-epoxy-, trans; Furfural; 4(1H)-Pyrimidinone, 6-methyl-; Bicyclo[2.2.1]hept-2-ene, 1,7,7-trimethyl-; 5-isoxazolecarboxylic acid, 4,5-dihydro-3,5-dimethyl-, methyl ester, (S)-; 1,6-Octadien-3-ol, 3,7-dimethyl-; 2-Coumaranone; 4-Octanone, 5-hydroxy-2,7-dimethyl-; Furan, 2,2'-methylenebis-; Cyclobutyl methylphosphonofluoridoate; 2-Furanmethanol; 2-Methoxyformanilide; 3-Cyclohexene-1-methanol, α,α,4-trimethyl-, (S)-; Naphthalene; 1H-Pyrrole, 1-(2-furanylmethyl)-; α-Cubebene; 2,4,6-Cycloheptatrien-1-one, 2-hydroxy-4-(1-methylethyl)-; Furan, 2,2'-(1,2-ethenediyl)bis-, (E)-; 2-Propenoic acid, 3-phenyl-, methyl ester; 4'-Ethoxybenzenesulfonanilide; 1H-Pyrrole, 1-(2-furanylmethyl)-; Phenol, 2,4-bis(1,1-dimethylethyl)-; 1,2-Benzenedicarboxylic acid, butyl octyl ester.

64a. The flavor of paragraph 64, wherein the volatile components are present in the flavor in an amount of from $10^{-9}$ ppb to 10 wt % based on the weight of the flavor.

65. A food or beverage product comprising the composition of any of paragraphs 1-46 or the flavor of any of paragraphs 53-64a, and a food or a beverage material.

66. The food or beverage product of paragraph 65, wherein the composition or flavor is present from about $10^{-9}$ ppb to about 99% by weight of the total weight of the product.

67. The product of paragraph 65 or paragraph 66, wherein the beverage or food material is selected from one of tea, cocoa, juice, coffee.

68. A pharmaceutical composition comprising the composition of any of paragraphs 1-46 or the flavor of any of paragraphs 53-64a, and food or beverage material.

69. The pharmaceutical composition of paragraph 68, wherein the composition or flavor is present from about $10^{-9}$ ppb to about 99% by weight of the total weight of the product.

Additional Embodiments, Set 6

1. A composition comprising a Maillard reaction product and a thaumatin.

2. The composition of paragraph 1, wherein the Maillard reaction product is formed from the reaction of reactants comprising amine donor and sugar donor.

3. The composition according to paragraph 1 or 2, wherein, the Maillard reaction product is direct resultant of Maillard reaction without separation of purification.

4. The composition according to any one of paragraphs 1-3, wherein, the Maillard reaction consists of volatile substances and non-volatile substances.

5. The composition according to paragraph 1 or 2, wherein, the Maillard reaction product is partially isolated products, either partially volatile substance or partially non-volatile substances are removed from the direct resultant of Maillard reaction 6. The composition according to paragraph 1 or 2, wherein, the Maillard reaction products are pure volatile substances.

7. The composition according to paragraph 1 or 2, wherein, the Maillard reaction products are pure non-volatile substances.

8. The composition according to any one of paragraphs 1-5 or 7, wherein, the Maillard reaction product is a water soluble compound.

9. The composition according to any one of paragraphs 2-8, wherein the sugar donor comprises a reducing sugar, sweetener and/or sweetening agent.

10. The composition of paragraph 9, wherein the sweetening agent is selected from one or more of a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof.

11. The composition of paragraph 10, wherein the *Stevia* extract comprises one or more steviol glycoside components.

12. The composition of paragraph 11, wherein, the *Stevia* extract further comprises non-steviol glycoside components.

13. The composition according to paragraph 12, wherein, the non-steviol glycosides components are volatile substances characterized by citrus flavor.

14. The composition according to paragraph 12, wherein, the non-volatile substances of non-steviol glycoside components comprises one or more molecules characterized by terpene, di-terpene, or ent-kaurene structure.

15. The composition according to paragraph 12, wherein, the non-steviol glycoside components consist of volatile and non-volatile substances.

16. The composition of any one of paragraphs 9-15, wherein the steviol glycoside components are present at an amount of less than 99 wt %, less than 80 wt %, less than 60%. less than 30%, or equal to 0 wt % of the total weight of the *Stevia* extract.

17. The composition of paragraph 9, wherein the sweetener is selected from one or more of the group consisting of sorbitol, xylitol, mannitol, sucralose, aspartame, acesulfame-K, neotame, erythritol, trehalose, raffinose, cellobiose, tagatose, DOLCIA PRIMA™ allulose inulin, N—[N-[3-(3-hydroxy-4-methoxyphenyl)propyl]-alpha-aspartyl]-L-phenylalanine 1-methyl ester, glycyrrhizin, sodium cyclamate, or mixtures thereof.

18, The composition of paragraph 2, wherein the amine donor comprises compounds having a free amino group.

19. The composition of paragraph 18, wherein the amine donor comprises an amine comprising primary amine compounds and secondary amine compounds, an amino acid, a protein, a peptide, yeast extracts or mixtures thereof.

20. The composition of paragraph 1, wherein the thaumatin comprises thaumatin III, a, b, c and/or combinations thereof.

21. The composition of any of paragraphs 1-20, wherein the ratio of the thaumatin to the Maillard reaction product is from 1:100 to 100:1 by weight.

22. The composition of paragraph 1, wherein the composition comprises a further sweetening agent and/or sweetener.

23. A food or beverage product comprisingthe composition of any of paragraphs 1-22 and a food or a beverage material.

24. The food or beverage product of paragraph 23, wherein the thautnatin is present from about 0.01 ppm to 20 ppm by weight of the total weight of the product.

25. The food or beverage product according to paragraph 23, wherein the composition in the beverage is less than 10%, 1%, 5,000 ppm, 2,000 ppm, 1,000 ppm, 500 ppm, 200 ppm.

26. The composition according to any one of paragraphs 1-22, wherein, the composition is used for sugar reduction, salt reduction, or fat reduction.

27. The composition according to any one of paragraphs 1-22, wherein, the composition is used to enhance the mouth feel, flavor or overall-likeability of a food or beverage.

28. The food or beverage product of paragraph 23 or 24, wherein the beverage or food material is selected from a carbonated drink, coffee, chocolate milk, tea, juice, or flavored waters, etc.

29. The food or beverage product of paragraph 23 or 24, wherein the beverage or food material is selected from one of tea, cocoa, juice, coffee; fruit or vegetable juice; or fruit or vegetable nectar; water-based flavored drink; herbal infusion; hot cereal beverage; non-alcoholic beverage; alcoholic beverage; beer or malt beverage; cider and perry; wine; fruit wine; or a spirituous beverage.

Additional Embodiments, Set 7

1. A consumable comprising MRPs.

2. The consumable according to paragraph 1, wherein the MRPs is one or more MRPs substances or chemically identical MMPs substances.

3. A consumable comprising sweetening agent-derived MRPs.

4. The consumable according to paragraph 3, wherein the sweetening agent is selected from one or more of Sievia, monk fruit, or sweet tea extract.

5. The consumable according to any one of paragraphs 1-4, wherein the consumable is one of beverage selected from tea, flavored water, energy drink, juice concentrate, carbonate drink, coffee drink, chocolate drink; fruit or vegetable juice; or fruit or vegetable nectar; water-based flavored drink; herbal infusion; hot cereal beverage; non-alcoholic beverage; alcoholic beverage; beer or malt beverage; cider and perry; wine; fruit wine; or a spirituous beverage.

6. The consumable according to any one of paragraphs 1-4, wherein the consumable is one of a food selected from a dairy product, fat emulsion, fruit or vegetable, juice, tea, coffee, fruit or vegetable nectar, water-based flavored drink, herbal infusion, hot cereal beverage, non-alcoholic beverage, alcoholic beverage, beer or malt beverage, cider and perry, wine, fruit wine, spirituous beverages, dessert, cream, milk or cream powder, cheese, whey product, edible ice, a fruit product, a vegetable product, nut or seed product, jam, jelly, spread, fruit topping, fruit filling, candy, cocoa product, sugar-based confectionery, chewing gum, decoration product, sauce, grain product, flour or starch, breakfast cereal product, rolled oats product, pastas or noodle, cereal, bread, cracker, cake, cookie, pie, bakery ware, doughnut, sweet roll, scone, muffin, meat product, fish product, egg product, salt, seasoning, vinegar, mustard product, spice product, soup, sauce, salad, yeast product, protein product, foodstuff, ready-to-eat savory, or a composite food.

7. The consumable according to paragraph 5, wherein the beverage has sugar or is without added sugar.

8. The consumable according to paragraph 5, wherein the beverage has reduced sugar content or is sugar free, 9. The consumable according to paragraph 7, wherein the sugar is one or more sugar selected from lactose, maltose, glucose, fructose, galactose, sucrose, or any combination thereof.

10. The consumable according to paragraph 8, wherein the sugar reduced consumable comprises one or more *Stevia* extract, swingle extract and sweet tea extract, and artificial high intensive sweetener such as sucralose, ACE-K and aspartame.

11. The consumable according to any one of paragraphs 1-4, wherein the consumable is one of salted, salt reduced or free salt product.

12. The consumable according to any one of paragraphs 1-4, wherein the consumable is one of a fatty, fat reduction or free fat product.

13. The consumable according to any one of paragraphs 1-4, wherein the content of MRP or sweetener-derived MRPs in the food or beverage is from $10^{-9}$ ppm to 99.9%, Additional Embodiments, Set 8

1. A composition comprising MRPs and a flavor.

2. The composition according to paragraph 1, wherein the flavor is one or more selected from vanilla, mint, chocolate, mango extract, cinnamon, citrus, coconut, ginger, viridiflorol, almond, bay, thyme, cedar leaf, nutmeg, allspice, sage, mace, menthol (including menthol without mint), or an essential oil.

3. A composition comprises MRPs and sweeteners.

4. A composition comprises MRPs and texturing agent.

5. A composition comprising MRPs and antioxidant.

6. A composition comprising URN and small bubble reducing agent.

7. A composition comprising MRPs and one or more food ingredients selected from a sweetener, a texture, a flavor, an acid or antioxidants.

8. The composition according to paragraph 7, wherein the composition further comprises flavor, sweetener, texture or MRPs (or a sweetening agent derived from MRPs).

9. A food or beverage comprising the compositions of any one of paragraphs 1-8.

10. The composition of paragraphs 1-8, comprising combinations of thaumatin and MRPs, combinations of sweetening agent(s) and MRPs, or combination of thaumatin, sweetening agent, and MRPs.

11. The composition according to any one of paragraphs 1-8, wherein the individual components in the composition are from $10^{-9}$ ppb to 99.9% in the composition. The ratio of different component; in composition could be varied as per previous paragraphs the composition.

Additional Embodiments, Set 9

1. A composition comprising a sweetening agent and an MRP.

2. The composition according to paragraph 1, wherein the MRPs is a water soluble substance and the sweetening agent is a *Stevia* extract.

3. The composition according to any one of paragraphs 1-2, the MRPs are non-volatile substances or partially isolated non-volatile substances from MRI's.

4. The composition according to any one of paragraphs 1-2, wherein the MRPs are volatile substances or partially isolated volatile substances.

5. The composition according to paragraph 2, wherein the *Stevia* extract comprises non-steviol glycoside flavor derived from leaves.

Additional Embodiments, Set 10

1. A composition comprising MRPs.

2. The composition according to paragraph 1, wherein the MRPs are water soluble substances.

3. The composition according to paragraph 1, wherein the MRI's comprises minimized aroma.

4. The composition according to any one of paragraphs 1-3, the MRPs are used for mouth feel enhancers.

5. The composition according to any one of paragraphs 1-4, the MRPs are less colored.

When using an amine donor and a sugar donor to effect a Maillard reaction, normally it is very difficult to control the stages of the reaction. Either the speed of reaction is controlled but maximum or satisfying flavor is not obtained, or the reaction creates an unpleasant taste with insoluble substances. The sweetening agent is an excellent reaction retardant which can help to control the reaction to reach maximum yield of flavor obtained from amine donor and sugar donor, reduce or avoid resulting insoluble substances. It should be understood that any other inert or non-reacted substances could be added during the Maillard reaction in order to control the reaction. It should be also understood that herbs, spice and other flavor substances etc. could be added before, during or after the reaction, preferably during the reaction in order to optimize the overall flavor profile.

In some embodiments, the composition comprises MRPs and inert or less reactive food ingredients, wherein, the inert or less reactive food ingredients are used for controlling the Maillard reaction.

Additional Embodiments, Set 11

1. A composition comprising one or more Maillard reaction products (MRPs) formed from one or more sugar donors and one or more amine donors comprising a free amino group, wherein the one or more sugar donors comprise one or more sweetening agents, one or more reducing sugars comprising a free carbonyl group, or both, and wherein the one or more sweetening agents are added to the MRI's when the one or more sugar donors in the Maillard reaction do not include the one or more sweetening agents.

2. The composition of paragraph 1, wherein the sugar donor comprises one or more sweetening agents.

3. The composition of paragraph 1, wherein the sugar donor comprises one or more sweetening agents and one or more reducing sugars.

4. The composition of paragraph I, wherein the sugar donor comprises one or more sugar donors in the Maillard reaction do not include the one or more sweeteners.

5. The composition of any one of paragraphs 1-4, wherein the one or more sweetening agents comprise one or more steviol glycosides, one or more glycosylated steviol glycosides, one or more mogrosides, one or more glycosylated mogrosides, one or more sweet tea glycosides, one or more glycosyl sated sweet tea glycosides, or combinations thereof.

6. The composition of paragraph 5, wherein the one or more sweetening agents comprise one or more steviol glycosides.

7. The composition of paragraph 6, wherein the one or more SGs are selected from Table A.

8. The composition of paragraph 6, wherein the one or more SGs comprise at least one SG selected from the group consisting of SvGn #1, SG-4, iso-steviolbioside, SvGn #3, rebaudioside R1, stevioside F, SG-Unk1, dulcoside B, SG-3, iso-rebaudioside B, iso-stevioside, rebaudioside KA, SG-13, stevioside B, rebaudioside R, SG-Unk2, SG-Unk3, rebaudioside F3, rebaudioside F2, rebaudioside C2, stevioside E, stevioside E2, SG-10, rebaudioside L1, SG-2, rebaudioside A3, iso-rebaudioside A2, rebaudioside A2, rebaudioside E, rebaudioside SvGn #2, SvGN #5, rebaudioside U2, rebaudioside T, rebaudioside W, rebaudioside W2, rebaudioside W3, rebaudioside U, SG-12, rebaudioside K2, SG-Unk4, SG-Unk5, rebaudioside 13, SG-Unk6, rebaudioside Q, rebaudioside Q2, rebaudioside Q3, rebaudioside 12, rebaudioside SvGn #4, rebaudioside V, rebaudioside V2, rebaudioside Y, 15α-OH-rebaudioside M, rebaudioside O2, and any combination thereof.

9. The composition of paragraph 6, wherein the one or more SGs are selected from SG-1G, SG-2G, SG-3G, SG-4G, SG-5G, SG-6G, SG1G1R, SG-2G1R, SG-3G1R, SG-4G1R, SG-5G1R, SG-6(31R, SG-1G1X, SG-2G1X, SG-3G1X, SG-4G1X, SG-5G1X, or combinations thereof.

10. The composition of any one of paragraphs 6-9, wherein the one or more SGs comprise at least one SG having a molecular weight less than equal to or less than 965 daltons.

11. The composition of paragraph 10, wherein the one or more SGs comprise at least one SG having a molecular weight less than equal to or less than 804 daltons.

12. The composition of any one of paragraphs 6-9, wherein the one or more SGs comprise at least one SG having a molecular weight greater than 804 daltons.

13. The composition of paragraph 12, wherein the one or more SGs comprise at least one SG having a molecular weight greater than 965 daltons.

14. The composition of paragraph 13, wherein the one or more SGs comprise at least one SG having a molecular weight equal to or greater than 1127 daltons.

15. The composition of paragraph 14, wherein the one or more SGs comprise at least one SG having a molecular weight equal to or greater than 1259 daltons.

16. The composition of any one of paragraphs 1-4, wherein the one or more sweetening agents comprise one or more glycosylated steviol glycosides (GSGs).

17. The composition of paragraph 16, wherein the one or more GSGs are further glycosylation products from one or more SGs in Table A.

18. The composition of paragraph 16 or paragraph 17, wherein the one or more GSGs are further glycosylation products from one or more SGs selected from SvGn #1, SG-4, iso-steviothioside, SvGn #3, rebaudioside 1Z1, stevioside F, SG-Unkl, dulcoside B, SG-3, iso-rebaudioside B, iso-stevioside, rebaudioside KA, SG-13, stevioside B, rebaudioside R, SG-Unk2, SG-Unk3, rebaudioside F3, rebaudioside F2, rebaudioside C2, stevioside E, stevioside E2, SG-10, rehaudioside L1, SG-2, rebaudioside A3, iso-rebaudioside A2, rebaudioside A2, rehaudioside E. rebaudioside H1, SvGn #2, SvGN #5, rebaudioside U2, rebaudioside T, rebaudioside W, rebaudioside W2, rebaudioside W3, rebaudioside U, SG-12, rebaudioside K2, SG-Unk4, SG-Unk5, rebaudioside 13, SG-Unk6, rebaudioside Q, rebaudioside Q2, rebaudioside Q3, rebaudioside I2, rebaudioside T1, SvGn #4, rebaudioside V, rebaudioside V2, rebaudioside Y, 15α-OH-rebaudioside NI, rebaudioside O2, or any combination thereof.

19. The composition of any one of paragraphs 16-18, wherein the one or more GSGs comprise at least one GSG selected from GSG-1G-1, GSG-1G-2, GSG-1G-3, GSG-1G-4, GSG-1G-5, GSG-2G-1, GSG-2G-2, GSG-2G-3, GSG-2G-4, GSG-3G-1, GSG-3G-2, GSG-3G-3, GSG-5G-4, GSG-4G-2, GSG-5G-1, or any combination thereof.

20. The composition of any one of paragraphs 16-18, wherein the one or more GSGs comprise at least one GSG selected from GSG-3G-2, GSG-3G-3, GSG-3G-4, GSG-3G-7, GSG-3G-8, GSG-4G-1, GSG-4G-2, GSG-4G-3, GSG-4G-7, GSG-5G-1, GSG-5G-2, GSG-5G-3, GSG-5G-4, GSG-5G-5, GSG-6G-3, or any combinations thereof.

21. The composition of any one of paragraphs 16-18, wherein the one or more GSGs comprise one or more rhamnose moieties, one or more deoxyhexose moieties, or combination thereof.

22. The composition of paragraph 21, wherein the one or more GSGs are selected from GSG-1G1R-1, GSG-1G1R-2, GSG-2G1R-1, GSG-1G1R-3, GSG-2G1R-2, GSG-3G1R-1, GSG-1G1R-4, GSG-2G1R-3, GSG-3G1R-2, GSG-4G-1R-1, GSG-1G1R-5-1, GSG-2G1R-4, GSG-3G1R-3a, GSG-3G1R-3b, GSG-4G1R-2, GSG-5G1R-1, or any combination thereof.

23. The composition of paragraph 21, wherein the one or more GSGs are selected from GSG-3G1R-3a, GSG-3G1R-3b, GSG-4G1R-2, GSG-4G1R-3, GSG-4G1R-4, GSG-4G1R-6, GSG-5G1R-4, GSG-6G1R-1a, GSG-6G1R-1b, GSG-6G1R-2, or any combination thereof.

24. The composition of any one of paragraph 16-18, wherein the one or more GSGs comprise one or more xylose moieties, arabinose moieties, or combination thereof.

25. The composition of paragraph 24, wherein the one or more GSGs are selected from GSG-1G1X-1, GSG-1G1X-2, GSG-1G1X-3, GSG-1G1X-4, GSG-2G1X-1 GSG-2G1X-2, GSG-2G1X-3, GSG-3G1X-1, GSG-3G1X-2, GSG-4G1X-1, or any combination thereof.

26. The composition of paragraph 24, wherein the one or more GSGs are selected from GSG-3G1X-4, GSG-3G1X-5, GSG-4G1X-1, GSG-4G1X-2, GSG-4G1X-3, GSG-4G1X-4, or any combination thereof.

27. The composition of any one of paragraphs 16-26, wherein at least one of the one or more GSGs has a molecular weight less than equal to or less than 1128 daltons.

28. The composition of paragraph 27, wherein at least one of the one or more GSGs has a molecular weight less than equal to or less than 966 daltons.

29. The composition of paragraph 28, wherein at least one of the one or more GSGs has a molecular weight less than equal to or less than 804 daltons.

30. The composition of any one of paragraph 16-26, wherein at least one of the one or more GSGs has a molecular weight greater than 1128 daltons.

31. The composition of paragraph 30, wherein at least one of the one or more GSGs has a molecular weight equal to or greater than 1260 daltons.

32. The composition of paragraph 31, wherein at least one of the one or more GSGs has a molecular weight equal to or greater than 1422 daltons, 33. The composition of paragraph 32, wherein at least one of the one or more GSGs has a molecular weight equal to or greater than 1746 daltons.

34. The composition of paragraph 33, wherein at least one of the one or more GSGs has a molecular weight equal to or greater than 1922 daltons, 35. The composition of any one of paragraphs 1-4, wherein the one or more sweetening agents comprise one or more mogrosides (MGs).

36. The composition of paragraph 35, wherein the one or more MGs are selected from mogroside II, mogroside III, mogroside IV, mogroside V, siamenoside I, 11-oxomogroside V, or any mixture thereof.

37. The composition of any one of paragraphs 1-4, wherein the one or more sweetening agents comprise one or more glycosylated mogrosides (GMGs).

38. The composition of paragraph 37, wherein the one or more GIVIGs are selected from glycosylated mogroside II, glycosylated mogroside III, glycosylated mogroside glycosylated mogroside V, glycosylated siamenoside glycosylated 11-oxomogroside V, or any mixture thereof.

39. The composition of paragraph 38, comprising a glycosylated mogroside V selected from GMG-V20L, GMG-V20S, GMG-V40, GMG-V60, or any combination thereof.

40. The composition of any one of paragraphs 1-4, wherein the one or more sweetening agents comprise one or more sweet tea glycosides (STGs).

41. The composition of paragraph 40, wherein the one or more STGs comprise rubusoside, a suavioside or a combination thereof.

42. The composition of paragraph 41, wherein the one or more STGs comprise rubusoside.

43. The composition of paragraph 41, wherein the one or more STGs comprise a suavioside selected from suavioside A, suavioside B, suavioside Ct, suavioside Di, suavioside $D_2$, suavioside E, suavioside F, suavioside G suavioside H, suavioside I, suavioside J, or any combination thereof.

44. The composition of any one of paragraphs 1-4, wherein the one or more sweetening agents comprise one or more glycosylated sweet tea glycosides (GSTGs).

45. The composition of paragraph 44, wherein the one or more GSTGs comprise a glycosylated rubusoside, a glycosylated suavioside or a combination thereof.

46. The composition of paragraph 45, wherein the one or more GSTGs comprise a glycosylated rubusoside.

47. The composition of paragraph 45, wherein the one or more GSTGs comprise a glycosylated suavioside, wherein the glycosylated suavioside is selected from glycosylated suavioside A, glycosylated suavioside B, glycosylated suavioside $C_1$, glycosylated suavioside glycosylated suavioside $D_2$, glycosylated suavioside E, glycosylated suavioside F, glycosylated suavioside G, glycosylated suavioside H, glycosylated suavioside I, glycosylated suavioside J, or any combination thereof.

48. The composition of any one of paragraphs 1-47, wherein the one or more sweetening agents are in the form of a salt.

49. The composition of any one of paragraphs 1-4, wherein the one or more sweetening agents comprise a *Stevia* extract, a glycosylated *Stevia* extract, a swingle extract, a glycosylated swingle extract, a sweet tea extract, glycosylated sweet tea extract, or a mixture thereof.

50. The composition of paragraph 49, wherein the one or more sweetening agents comprise a *Stevia* extract.

51. The composition of paragraph 50, wherein the *Stevia* extract is selected from RA20, RA40, RA50, RA60, RA80, RA 90, RA95, RA97, RA98, RA99, RA99.5, RB8, RB10, RB15, RC15, RD6, or any combination thereof.

52. The composition of paragraph 49, wherein the one or more sweetening agents comprise a glycosylated *Stevia* extract.

53. The composition of paragraph 52, wherein the *Stevia* extract is selected from glycosylated RA20, glycosylated RA40, glycosylated RA50, glycosylated RA60, glycosylated RA80, glycosylated RA 90, glycosylated RA95, glycosylated RA97, glycosylated RA98, glycosylated RA99, glycosylated RA99.5, glycosylated RB8, glycosylated RB10, glycosylated RB15, glycosylated RC15, glycosylated RD6, or any combination thereof.

54. The composition of paragraph 49, wherein the one or more sweetening agents comprise a swingle extract.

55. The composition of paragraph 49, wherein the one or more sweetening agents comprise a glycosylated swingle extract.

56. The composition of paragraph 49, wherein the one or more sweetening agents comprise a sweet tea extract.

57. The composition of paragraph 49, wherein the one or more sweetening agents comprise a glycosylated sweet tea extract.

58. The composition of any one of paragraphs 1-57, wherein the one or more reducing sugars comprising a free carbonyl group are selected from monosaccharide, a disaccharide, an oligosaccharide, a polysaccharide, or any combination thereof 59. The composition of paragraph 58, wherein the one or more reducing sugars comprise a monosaccharide.

60. The composition of paragraph 59, wherein the monosaccharide is selected from glucose, galactose, fructose, mannose, glyceraldehyde, ribose, xylose, or any combination thereof.

61. The composition of paragraph 58, wherein the one or more reducing sugars comprise a disaccharide.

62. The composition of paragraph 61, wherein the disaccharide is selected from cellobiose, lactose, maltose, or any combination thereof.

63. The composition of paragraph 58, wherein the one or more reducing sugars comprise a polysaccharide.

64. The composition of paragraph 63, wherein the polysaccharide is starch.

65. The composition of paragraph 58, wherein the one or more reducing sugars comprise one or more pentoses, one or more hexoses, or a combination thereof.

66. The composition of paragraph 65, comprising one or more pentoses, wherein the one or more pentoses comprise one or more aldopentoses, one or more ketopentoses, one or more deoxypentoses, or any combination thereof.

67. The composition of paragraph 66, comprising one or more aldopentoses, wherein the one or more aldopentoses comprise an arabinose, a xylose, a ribose, a lyxose, or any combination thereof.

68. The composition of paragraph 66, comprising one or more ketopentoses, wherein the one or more ketopentoses comprise a ribulose, a xylulose, or any combination thereof.

69. The composition of paragraph 58, wherein the one or more reducing sugars comprise one or more glycosides, wherein each of the glycosides comprises a glycone and an aglycone.

70. The composition of paragraph 69, wherein at least one glycoside comprises a glycone selected from glucose, galactose, fructose, mannose, rhamnose, rutinose, xylose, lactose, arabinose, or glucuronic acid.

71. The composition of paragraph 58, wherein the one or more reducing sugars are in the form of a plant juice, a plant powder, a vegetable juice, a vegetable powder, a berry juice, a berry powder a fruit juice, a berry powder or any mixture thereof.

72. The composition of paragraph 58, wherein the one or more reducing sugars comprise a burnt sugar.

73. The composition of any one of paragraphs 1-72, wherein the one or more amine donors comprise a primary amine compound, a secondary amine compound, an amino acid, a peptide, a protein, or a mixture thereof.

74. The composition of paragraph 73, wherein the one or more amine donors comprise a primary amine compound or a secondary amine compound.

75. The composition of paragraph 73, wherein the one or more amine donors comprise one or more amino acids.

76. The composition of paragraph 75, wherein the one or more amino acids are selected from alanine, arginine, asparagine, aspartic acid, cysteine, glutamine, glutamic acid, glycine, histidine, isoleucine, leucine, lysine, methionine, phenylalanine, proline, serine, threonine, tryptophan, tyrosine, valine, or any mixture thereof.

77. The composition of paragraph 73, wherein the one or more amine donors comprise a peptide or protein.

78. The composition of paragraph 77, wherein the peptide or protein is selected from hydrolyzed vegetable proteins (HVPs), soy protein, sodium caseinate, whey protein, wheat gluten, yeast extract, or any mixture thereof.

79. The composition of any one of paragraphs 1-78, further comprising one or more sweetener enhancers.

80. The composition of paragraph 79, wherein the one or more sweetener enhancers comprise thaumatin, brazzein, miraculin, curculin, pentadin, mabinlin, or any mixture thereof.

81. The composition of paragraph 80, wherein at least one of the sweetener enhancers is thaumatin.

82. The composition of any one of paragraphs 1-81, further comprising one or more sweeteners.

83. The composition of paragraph 82, wherein the one or more sweeteners are selected from sucralose, sorbitol, xylitol, mannitol, sucralose, aspartame, acesulfame-K, neotame, erythritol, trehalose, raffinose, cellobiose, tagatose, DOLCIA PRIMA™ allulose, inulin, N—[N-[3-(3-hydroxy-4-methoxyphenyl)propyl]-alpha-aspartyl]-L-phenylalanine 1-methyl ester, glycyrrhizin, sodium cyclamate, or any mixtures thereof.

84. The composition of paragraph 83, wherein the one or more sweeteners comprise sucralose.

85. The composition of any one of paragraphs 1-84, further comprising one or more salts.

86. The composition of paragraph 85, wherein the one or more salts are selected from sodium carbonate, sodium bicarbonate, sodium chloride, potassium chloride, magnesium chloride, sodium sulfate, magnesium sulfate, potassium sulfate, or any mixture thereof.

87. The composition of any one of paragraphs 1-86, further comprising an alkaline pH adjuster.

88. The composition of paragraph 87, wherein the alkaline pH adjuster is sodium hydroxide.

89. The composition of any one of paragraphs 1-88, further comprising one or more flavoring agents.

90. The composition of paragraph 89, wherein the one or more flavoring agents comprise flavors or spices originating from plants or animals.

91. The composition of paragraph 90, wherein the one or more flavoring agents comprise flavors or spices from bark, flowers, fruits, or leaves.

92. The composition of any one of paragraphs 89-91, wherein the one or more flavoring agents comprise artificial, natural or synthetic fruit flavors.

93. The composition of any one of paragraphs 89-91, wherein the one or more flavoring agents comprise at least one citrus oil.

94. The composition of paragraph 93, wherein the at least one citrus oil is selected. from lemon, orange, lime, grapefruit, yuzu, sudachi, or any combination thereof.

95. The composition of any one of paragraphs 89-91, wherein the one or more flavoring agents comprise at least one fruit essence, 96. The composition of paragraph 95, wherein the at least one fruit essence is from apple, pear, peach, grape, raspberry, blackberry, gooseberry, blueberry, strawberry, cherry, plum, prune, raisin, cola, guarana, neroli, pineapple, apricot, banana, melon, apricot, cherry, tropical fruit, mango, mangosteen, pomegranate, papaya, or any combination thereof.

97. The composition of paragraph 89, wherein the one or more flavoring agents comprise at least one flavor from milk, butter, cheese, cream, yogurt, vanilla, tea, coffee, green tea, oolong tea, cocoa, chocolate, a mint, peppermint, spearmint, Japanese mint, a spice, asafetida, ajowan, anise, angelica, fennel, allspice, cinnamon, chamomile, mustard, cardamom, caraway, cumin, a clove, a pepper, coriander, sassafras, a savory, Zanthoxyli fructus, a perilla, a juniper berry, ginger, star anise, horseradish, thyme, tarragon, dill, capsicum, nutmeg, basil, marjoram, rosemary, bayleaf, wasabi, a nut, almond, hazelnut, macadamia nut, peanut, pecan, pistachio, and walnut, an alcoholic beverage, a wine, a whisky, a brandy, a rum, a gin, a liqueur, a floral, a vegetable, an onion, a garlic, a cabbage, a carrot, a celery, a mushroom, a tomato, concentrated meat soup, concentrated seafood soup, or any combination thereof.

98. The composition of any one of paragraphs 1-97, further comprising one or more reducing sugars.

99. The composition of paragraph 98, wherein the one or more reducing sugars are selected from galactose, mannose, arabinose, rhamnose, lactose, D-allose, D-psicose, xylitol, allulose, melezitose, D-tagatose, D-altrose, D-alditol, L-gulose, L-sorbose, D-talitol, inulin, stachyose, or any combination thereof.

100. The composition of paragraph 98, wherein the one or more reducing sugars are selected from monosaccharides, disaccharides, oligosaccharides, polysaccharides, or any combination thereof.

101. The composition of paragraph 100, wherein the reducing sugar is a monosaccharide.

102. The composition of paragraph 101, wherein the monosaccharide is selected from glucose, galactose, fructose, mannose, glyceraldehyde, ribose, xylose, or any combination thereof.

103. The composition of paragraph 100, wherein the reducing sugar is a disaccharide.

104. The composition of paragraph 103, wherein the disaccharide is selected from cellobiose, lactose, maltose, or any combination thereof.

105. The composition of paragraph 100, wherein the reducing sugar is a polysaccharide.

106. The composition of paragraph 105, wherein the polysaccharide is starch.

107. The composition of paragraph 98, wherein the one or more reducing sugars comprise at least one burnt sugar.

108. The composition of paragraph 98, wherein the one or more reducing sugars comprise one or more pentoses, one or more hexoses, or a combination thereof.

109. The composition of paragraph 108, comprising one or more pentoses, wherein the one or more pentoses comprise one or more aldopentoses, one or more ketopentoses, one or more deoxypentoses, or any combination thereof.

110. The composition of paragraph 108, comprising one or more aldopentoses, wherein the one or more aldopentoses comprise an arabinose, a xylose, a ribose, a lyxose, or any combination thereof.

111. The composition of paragraph 108, comprising one or more ketopentoses, wherein the one or more ketopentoses comprise a ribulose, a xylulose, or any combination thereof.

112. The composition of paragraph 108, comprising one or more deoxypentoses.

113. The composition of paragraph 98, wherein the one or more reducing sugars comprise one or more glycosides, wherein each of the glycosides comprises a glycone and an aglycone.

114. The composition of paragraph 113, wherein at least one glycoside comprises a glycone selected from glucose, galactose, fructose, mannose, rhamnose, rutinose, xylose, lactose, arabinose, or glucuronic acid.

115. The composition of paragraph 98, wherein the one or reducing sugars are in the form of a plant juice, a plant powder, a vegetable juice, a vegetable powder, a berry juice, a berry powder, a fruit juice, a fruit powder, a billberrry juice, a bil lberry powder, or any mixture thereof.

116. The composition of paragraph 98, wherein the one or more reducing sugars are in the form of a concentrate or extract from one or more of bilberry, raspberry, lingonberry, cranberry, apple, peach, apricot, mango, or any combination thereof.

117. The composition of any one of paragraphs 1-116, further comprising one or more amine donors.

118. The composition of paragraph 117, wherein the one or more amine donors comprise a primary amine compound, a secondary amine compound, an amino acid, a peptide, a protein, or a mixture thereof.

119. The composition of paragraph 118, wherein the one or more amine donors comprise a primary amine compound, a secondary amine compound, or a combination thereof.

120. The composition of paragraph 118, wherein the one or more amine donors comprise one or more amino acids.

121. The composition of paragraph 120, wherein the one or more amino acids are selected from alanine, arginine, asparagine, aspartic acid, cysteine, glutamine, glutamic acid, glycine, histidine, isoleucine, leucine, lysine, methionine, phenylalanine, proline, serine, threonine, tryptophan, tyrosine, valine, or any combination thereof.

122. The composition of paragraph 118, wherein the one or more amine donors comprise a peptide, a protein, or a combination thereof.

123. The composition of paragraph 122, wherein the peptide or protein is selected from hydrolyzed vegetable proteins, soy protein, sodium caseinate, whey protein, wheat gluten, or any combination thereof.

124. The composition of any one of paragraphs 1-123, further comprising one or more caramelized sugars.

125. The composition of any one of paragraphs 1-124, wherein at least one MRP comprises a nitrogen heterocylic functionality, a cyclic enolone functionality, a polycarbonyl functionality, a monocarbonyl functionality, or a combination thereof.

126. The composition of paragraph 125, comprising a nitrogen heterocylic functionality, wherein the nitrogen heterocylic functionality comprises a pyrazine, a pyrrole, a pyridine, an alkyl or acetyl-substituted saturated N-heterocycle, or a combination thereof.

127. The composition of paragraph 125, comprising a cyclic enolone functionality, wherein the cyclic enolone functionality comprises a maltol, an isomaltol, a dehydrofuranone, a dehydropyrone, a cyclopentenolone, or a combination thereof.

128. The composition of paragraph 125, comprising a polycarbonyl functionality, wherein the polycarbonyl functionality comprises a 2-furaldehyde, a 2-pyrrole aldehyde, a C3-C6 methyl ketone, or a combination thereof.

129. The composition of paragraph 125, comprising a polycarbonyl functionality, wherein the polycarbonyl functionality comprises a 2-furaldehyde, a 2-pyrrole aldehyde, a C3-C6 methyl ketone, or a combination thereof.

130. The composition of any one of paragraphs 1-129, wherein the composition has a corny, nutty, roasted or breadlike flavor.

131. The composition of any one of paragraphs 1-129, wherein the composition has a caramel-like flavor.

132, The composition of any one of paragraphs 1-131 whereincomposition is in solid form.

133. The composition of paragraph 132, wherein the composition comprises a powder.

134. The composition of any one of paragraphs 1-133, wherein the composition is in liquid form.

135. An orally consumable product comprising the composition of any one of paragraphs 1-134.

136. The orally consumable product of paragraph 135, wherein the product is a food. product, 137. The orally consumable product of paragraph 136, wherein the food product s selected from dairy products, fats, oils, fat emulsions, edible ices, fruits, vegetables, confectionery, cereals, cereal products, bakery wares, meat, meat products, fish, fish products, eggs, egg products, salt, spices, soups, sauces, salads, protein products, foodstuffs, or any combination thereof.

138. The orally consumable product of paragraph 135, wherein the product is a beverage.

139. The orally consumable product of paragraph 138, wherein the beverage is tea, cocoa, juice, soda, milk, water or coffee.

140. The orally consumable product of paragraph 139, wherein the beverage is an alcoholic beverage.

141. The orally consumable product of paragraph 135, wherein the product is a pharmaceutical product.

142. The orally consumable product of any one of paragraphs 135-141, wherein the composition is formulated to act as a product sweetener.

143. The orally consumable product of paragraph 142, wherein the composition is present in the product in an amount to exceed a sucrose equivalence of 1.5%.

144. The orally consumable product of any one of paragraphs 135-143, wherein the composition is formulated to act as a product flavorant.

145. The orally consumable product of paragraph 144, wherein the composition is present in the product in an amount not to exceed a sucrose equivalence of 1.5%.

146. A method for preparing the composition of paragraph 1, comprising the steps of:

(a) preparing a reaction mixture comprising one or more sugar donors and one or more amine donors having a free amine group, wherein the one or more sugar donors comprise one or more sweetening agents, one or more reducing sugars comprising a free carbonyl group, or both;

(b) combining the reaction mixture with one or more solvents; and (c) heating the components in step (b) under conditions suitable forming a solution or slurry comprising one or more Maillard reaction products (MRPs), wherein one or more sweetening agents are added to the composition when the reaction mixture does not include the one or more sweetening agents.

147. The method of paragraph 146, wherein the reaction mixture comprises one or more sweetening agents.

148. The method of paragraph 146, wherein the reaction mixture comprises one or more reducing sugars.

149. The method of paragraph 146, wherein the reaction mixture comprises one or more sweetening agents and one or more reducing sugars.

150. The method of any one of paragraphs 146, 148 or 149, wherein the one or more sugar donors comprise one or more reducing sugars selected from monosaccharides, disaccharides, oligosaccharides, polysaccharides, or any combination thereof.

151. The method of paragraph 150, wherein the one or more reducing sugars comprise a monosaccharide.

152. The method of paragraph 151, wherein the monosaccharide is selected from glucose, galactose, fructose, mannose, glyceraldehyde, ribose, xylose, or any combination thereof.

153. The method of paragraph 150, wherein the one or more reducing sugars comprise a disaccharide.

154. The method of paragraph 153, wherein the disaccharide is selected from cellobiose, lactose, maltose, or any combination thereof.

155. The method of paragraph 150, wherein the one or more reducing sugars comprise a polysaccharide.

156. The method of paragraph 155, wherein the polysaccharide is starch.

157. The method of any one of paragraphs 150 to 156, wherein the one or more reducing sugars comprise one or more pentoses, one or more hexoses, or a combination thereof.

158. The method of paragraph 157, comprising one or more pentoses, wherein the one or more pentoses comprise one or more aldopentoses, one or more ketopentoses, one or more deoxypentoses, or any combination thereof.

159. The method of paragraph 158, comprising one or more aldopentoses, wherein the one or more aldopentoses comprise an arabinose, a xylose, a ribose, a lyxose, or any combination thereof.

160. The method of paragraph 158, comprising one or more ketopentoses, wherein the one or more ketopentoses comprise a ribulose, a xylulose, or any combination thereof.

161. The method of any one of paragraphs 150, wherein the one or more reducing sugars comprise one or more glycosides, wherein each of the glycosides comprises a glycone and an aglycone.

162. The method of paragraph 161, wherein at least one glycoside comprises a glycone selected from glucose, galactose, fructose, mannose, rhamnose, rutinose, xylose, lactose, arabinose, or glucuronic acid.

163. The method of paragraph 150, wherein the one or more reducing sugars are in the form of a plant juice, a plant powder, a vegetable juice, a vegetable powder, a berry juice, a berry powder a fruit juice, a berry powder or any mixture thereof.

164. The method of paragraph 150, wherein the one or more reducing sugars comprise a burnt sugar.

165. The method of any one of paragraphs 146-164, wherein the one or more amine donors comprise a primary amine compound, a secondary amine compound, an amino acid, a peptide, a protein, or a mixture thereof.

166. The method of paragraph 165, wherein the one or more amine donors comprise a primary amine compound or a secondary amine compound.

167. The method of paragraph 165, wherein the one or more amine donors comprise one or more amino acids.

168. The method of paragraph 167, wherein the one or more amino acids are selected from alanine, arginine, asparagine, aspartic acid, cysteine, glutamine, glutamic acid, glycine, histidine, isoleucine, leucine, lysine, methionine, phenylalanine, proline, serine, threonine, tryptophan, tyrosine, valine, or any mixture thereof.

169. The method of paragraph 165, wherein the one or more amine donors comprise a peptide or protein.

170. The method of paragraph 169, wherein the peptide or protein is selected from hydrolyzed vegetable proteins (HVPs), soy protein, sodium caseinate, whey protein, wheat gluten, yeast extract, or any mixture thereof.

171. The method of any one of paragraphs 149-170, wherein the one or more sweetening agents comprise one or more steviol glycosides (SGs), one or more glycosylated steviol glycosides (GSGs), one or more mogrosides (MGs), one or more glycosylated mogrosides (GMGs), one or more sweet tea glycosides (STGs), one or more glycosylsated sweet tea glycosides (GSTGs), or a combination thereof.

172. The method of paragraph 171, wherein the one or more sweetening agents comprise one or more steviol glycosides.

173. The method of paragraph 172, wherein the one or more SGs are selected from Table 174. The method of paragraph 172, wherein the one or more SGs comprise at least one SG selected from SvGn #1, SG-4, iso-steviolbioside, SvGn #3, rebaudioside R1, stevioside F, SG-Unkl, dulcoside B, SG-3, iso-rebaudioside B, iso-stevioside, rebaudiosi de KA, SG-13, stevioside B, rebaudioside R, SG-Unk2, SG-Unk3, rebaudioside F3, rebaudioside F2, rebaudioside C2, stevioside 1, stevioside E2, SG-10, rebaudioside L1, SG-2, rebaudioside A3, iso-rebaudioside A2, rebaudioside A2, rebaudioside E, rebaudioside H1, SvGn #2, SvGN #5, rebaudioside U2, rebaudioside T, rebaudioside W, rebaudioside W2, rebaudioside W3, rebaudioside U, SG-12, rebaudioside 1K2, SG-Unk4, SG-Unk5, rebaudioside 13, SG-Unk6, rebaudioside Q, rebaudioside Q2, rebaudioside Q3, rebaudioside 12, rebaudioside T1, SvGn #4, rebaudioside V, rebaudioside V2, rebaudioside Y, 15α-OH-rebaudioside M, rebaudioside O2, or any combination thereof.

175. The method of paragraph 172, wherein the one or more SGs are selected from SG-1G, SG-2G, SG-3G, SG-4G, SG-5G, SG-6G, SG-1G1R, SG-2G1R, SG-3G1R, SG-4G1R, SG-5GIR, SG-6G1R, SG-1G1X, SG-2G1X, SG-3G1X, SG-4G1, SG-5G1X, or combinations thereof.

176. The method of any one of paragraphs 172-175, wherein the one or more SGs comprise at least one SG having a molecular weight less than equal to or less than 965 daltons.

177. The method of paragraph 176, wherein the one or more SGs comprise at least one SG having a molecular weight less than equal to or less than 804 daltons.

178. The method of any one of paragraphs 172-175, wherein the one or more SGs comprise at least one SG having a molecular weight greater than 804 daltons.

179. The method of paragraph 178, wherein the one or more SGs comprise at least one SG having a molecular weight greater than 965 daltons.

180. The method of paragraph 179, wherein the one or more SGs comprise at least one SG having a molecular weight equal to or greater than 1127 daltons.

181. The method of paragraph 180, wherein the one or more SGs comprise at least one SG having a molecular weight equal to or greater than 1259 daltons.

182. The method of paragraph 171, wherein the one or more sweetening agents comprise one or more glycosylated steviol glycosides (GSGs).

183. The method of paragraph 182, wherein the one or more GSGs are further glycosylation products from one or more SGs in Table A.

184. The method of paragraph 182 or paragraph 183, wherein the one or more GSGs are further glycosylation products from one or more SGs selected from SvGn #1, SG-4, iso-steviothioside, SvGn #3, rebaudioside 1Z1, stevioside F, SG-Unk1, dulcoside B, SG-3, iso-rebaudioside B, iso-stevioside, rebaudioside KA, SG-13, stevioside B, rebaudioside R, SG-Unk2, SG-Unk3, rebaudioside F3, rebaudioside F2, rebaudioside C2, stevioside E, stevioside 12, SG-10, rebaudioside L1, SG-2, rebaudioside A3, iso-rebaudioside A2, rebaudioside A2, rebaudioside E. rebaudioside H1, SvGn #2, SvGN #5, rebaudioside U2, rebaudioside T, rebaudioside W, rebaudioside W2, rebaudioside W3, rebaudioside U, SG-12, rebaudioside K2, SG-Unk4, SG-Unk5, rebaudioside I3, SG-Unk6, rebaudioside Q, rebaudioside Q2, rebaudioside Q3, rebaudioside I2, rebaudioside T1, SvGn #4, rebaudioside V, rebaudioside V2, rebaudioside Y, 15α-OH-rebaudioside N1, rebaudioside O2, or any combination thereof.

185. The method of any one of paragraphs 182-184, wherein the one or more GSGs comprise at least one GSG selected from GSG-1G-1, GSG-1G-2, GSG-1G-3, GSG-1G-4, GSG-1G-5, GSG-2G-1, GSG-2G-2, GSG-2G-3, GSG-2G-4, GSG-3G-1, GSG-3G-2, GSG-3G-3, GSG-4G-1, GSG-4G-2, GSG-5G-1, or any combination thereof.

186. The method of any one of paragraphs 182-184, wherein the one or more GSGs comprise at least one GSG selected from GSG-3G-2, GSG-3G-3, GSG-3G-4, GSG-3G-7, GSG-3G-8, GSG-4G-1, GSG-4G-2, GSG-4G-3, GSG-4G-7, GSG-5G-1, GSG-5G-2, GSG-5G-3, GSG-5G-4, GSG-5G-5, GSG-6G-3, or any combination thereof.

187. The method of any one of paragraphs 182-184, wherein the one or more GSGs comprise one or more rhamnose moieties, one or more deoxyhexose moieties, or combination thereof.

188. The method of paragraph 187, wherein the one or more GSGs are selected from GSG-1G1R1, GSG-1G1R-2, GSG-2G1R-1, GSG-1G1R-3, GSG-2G1R-2, GSG-3G1R-1, GSG-1G1R-4, GSG-2G1R-3, GSG-3G1R-2, GSG-4G-1R-1, GSG-1G1R-5-1, GSG-2G1R-4, GSG-3G1R-3a, GSG-3G1R-3b, GSG-4G1R-2, GSG-5G1R-1, or any combination thereof.

189. The method of paragraph 187, wherein the one or more GSGs are selected from GSG-3GIR-3a, GSG-3G1R-3b, GSG-4G1R-2, GSG-4G1R-3, GSG-4G1R-4, GSG-4G1R-6, GSG-5G1R-4, GSG-6G1R-1a, GSG-6G-1R-1b, GSG-6G-1R-2, or any combination thereof.

190. The method of any one of paragraphs 182-184, wherein the one or more GSGs comprise one or more xylose moieties, arabinose moieties, or combination thereof.

191. The method of paragraph 190, wherein the one or more GSGs are selected from GSG-1G1X-1, GSG-1G1X-2, GSG-1G1X-3, GSG-1G1X-4, GSG-2G1X-1, GSG-2G1X-2, GSG-2G-1X-3, GSG-3G1X-1, GSG-3G1X-2, GSG-4G1X-1, or any combination thereof.

192. The method of paragraph 190, wherein the one or more GSGs are selected from GSG-3G1X-4, GSG-3G1X-5, GSG-4G1X-1 GSG-4G1X-2, GSG-4G-1X-3, GSG-4G1X-4, or any combination thereof.

192. The method of any one of paragraphs 182-192, wherein at least one of the one or more GSGs has a molecular weight less than equal to or less than 1128 daltons.

193. The method of paragraph 192, wherein at least one of the one or more GSGs has a molecular weight less than equal to or less than 966 daltons.

194. The method of paragraph 193, wherein at least one of the one or more GSGs has a molecular weight less than equal to or less than 804 daltons.

195. The method of any one of paragraphs 182-192, wherein at least one of the one or more GSGs has a molecular weight greater than 1128 daltons.

196. The method of paragraph 195, wherein at least one of the one or more GSGs has a molecular weight equal to or greater than 1260 daltons.

197. The method of paragraph 196, wherein at least one of the one or more GSGs has a molecular weight equal to or greater than 1422 daltons.

198, The method of paragraph 197, wherein at least one of the one or more GSGs has a molecular weight equal to or greater than 1746 daltons.

199. The method of paragraph 198, wherein at least one of the one or more GSGs has a molecular weight equal to or greater than 1922 daltons.

200. The method of paragraph 171, wherein the one or more sweetening agents comprise one or more mogrosides (MGs).

201. The method of paragraph 200, wherein the one or more MGs are selected from mogroside II, mogroside III, mogroside IV, mogroside V, siamenoside I, 11-oxomogroside V, or any mixture thereof.

201. The method of paragraph 171, wherein the one or more sweetening agents comprise one or more glycosylated mogrosides (GMGs).

202. The method of paragraph 201, wherein the one or more GMG's are selected from a glycosylated mogroside II, a glycosylated mogroside III, a glycosylated mogroside IV, a glycosylated mogroside V, a glycosylated siamenoside I, a glycosylated 11-oxomogroside V, or any mixture thereof.

203. The method of paragraph 202, comprising a glycosylated mogroside V, wherein the mogroside V is selected from GMG-V20L, GMG-V20S, GMG-V40, GMG-V60, or any combination thereof.

204. The method of paragraph 171, wherein the one or more sweetening agents comprise one or more sweet tea glycosides (STGs).

205. The method of paragraph 204, wherein the one or more STGs comprise rubusoside, a suavioside or a combination thereof.

206. The method of paragraph 205, wherein the one or more STGs comprise rubusoside.

207. The method of paragraph 205, wherein the one or more STGs comprise a suavioside selected from suavioside A, suavioside B, suavioside Cr, suavioside $D_1$, suavioside $D_2$, suavioside F, suavioside F, suavioside G, suavioside H, suavioside I, suavioside J, or any combination thereof.

208. The method of paragraph 171, wherein the one or more sweetening agents comprise one or more glycosylated sweet tea glycosides (GSTGs).

209. The method of paragraph 208, wherein the one or more GSTGs comprise a glycosylated rubusoside, a glycosylated suavioside or a combination thereof.

210. The method of paragraph 209, wherein the one or more GSTGs comprise a glycosylated rubusoside.

211. The method of paragraph 209, wherein the one or more GSTGs comprise a glycosylated suavioside selected from glycosylated suavioside A, glycosylated suavioside B, glycosylated suavioside $C_1$, glycosylated suavioside $D_1$, glycosylated suavioside $D_2$, glycosylated suavioside E, glycosylated suavioside F, glycosylated suavioside G, glycosylated suavioside H, glycosylated suavioside I, glycosylated suavioside J, or any combination thereof.

212. The method of any one of paragraphs 146-211, wherein the one or more sweetening agents are in the form of a salt.

213. The method of paragraph 171, wherein the one or more sweetening agents comprise a *Stevia* extract, a glycosylated *Stevia* extract, a swingle extract, a glycosylated swingle extract, a sweet tea extract, glycosylated sweet tea extract, or a mixture thereof.

214. The method of paragraph 213, wherein the one or more sweetening agents comprise a *Stevia* extract.

215. The method of paragraph 214, wherein the *Stevia* extract is selected from RA20, RA40, RA50, RA60, RA80, RA 90, RA95, RA97, RA98, RA99, RA99.5, RB8, RB10, RB15, RC15, RD6, or any combination thereof.

216. The method of paragraph 213, wherein the one or more sweetening agents comprise a glycosylated *Stevia* extract.

217. The method of paragraph 261, wherein the *Stevia* extract is selected from glycosylated RA20, glycosylated. RA40, glycosylated RA50, glycosylated RA60, glycosylated RA80, glycosylated RA 90, glycosylated RA95, glycosylated RA.97, glycosylated RA98, glycosylated RA99, glycosylated RA99.5, glycosylated RB8, glycosylated RB10, glycosylated RB15, glycosylated RC15, glycosylated RD6, or any combination thereof.

218. The method of paragraph 213, wherein the one or more sweetening agents comprise a swingle extract.

219. The method of paragraph 213, wherein the one or more sweetening agents comprise a glycosylated swingle extract.

220, The method of paragraph 213, wherein the one or more sweetening agents comprise a sweet tea extract.

221. The method of paragraph 213, wherein the one or more sweetening agents comprise a glycosylated sweet tea extract.

222. The method of any one of paragraphs 146-221, further comprising the step of adding one or more sweetener enhancers.

223. The method of paragraph 222, wherein the one or more sweetener enhancers are added to the reaction mixture in step (a).

224. The method of paragraph 222, wherein the one or more sweetener enhancers are added after step (c).

225. The method of any one of paragraphs 222-224, wherein the one or more sweetener enhancers comprise thaumatin, brazzein, miraculin, curculin, pentadin, mabinlin, or any mixture thereof.

226. The method of paragraph 225, wherein at least one of the sweetenerenhancers is thaumatin.

227. The method of any one of paragraphs 146-226, further comprising the step of adding one or more sweeteners.

228. The method of paragraph 227, wherein the one or more sweeteners are added to the reaction mixture in step (a).

229. The method of paragraph 227, wherein the one or more sweeteners are added after step (c).

230. The method of any one of paragraphs 227-229, wherein the one or more sweeteners are selected from sucralose, sorbitol, xylitol, mannitol, sucralose, aspartame, acesulfame-K, neotame, erythritol, trehalose, raffinose, cellobiose, tagatose, DOLCIA PRIMA™ allulose, inulin, N—[N-[3-(3-hydroxy-4-methoxyphenyl)propyl]-alpha-aspartyl]-L-phenylalanine 1-methyl ester, glycyrrhizin, sodium cyclamate, or any mixture thereof.

231. The method of paragraph 230, wherein the one or more sweeteners comprise sucralose.

232. The method of any one of paragraphs 146-231, further comprising the step of adding one or more salts.

233. The method of paragraph 232, wherein the one or more salts are added to the reaction mixture in step (a).

234. The method of paragraph 232, wherein the one or more salts are added after step (c).

235. The method of any one of paragraphs 232-234, wherein the one or more salts are selected from sodium carbonate, sodium bicarbonate, sodium chloride, potassium chloride, magnesium chloride, sodium sulfate, magnesium sulfate, potassium sulfate, or any mixture thereof.

236. The method of any one of paragraphs 146-235, further comprising the step of adding an alkaline pH adjuster.

237. The method of paragraph 236, wherein the alkaline pH adjuster is added to the reaction mixture in step (a).

238. The method of paragraph 236, wherein the alkaline pH adjuster is added after step (c).

239. The method of paragraph 238, wherein the alkaline pH adjuster is sodium hydroxide.

240. The method of any one of paragraphs 146-239, further comprising the step of adding one or more flavoring agents.

241. The method of paragraph 236, wherein the one or more flavoring agents are added to the reaction mixture in step (a).

242. The method of paragraph 236, wherein the one or more flavoring agents are added after step (c).

243. The method of any one of paragraphs 240-242, wherein the one or more flavoring agents comprise flavors or spices originating from plants or animals.

244. The method of paragraph 243, wherein the one or more flavoring agents comprise flavors or spices from bark, flowers, fruits, or leaves.

245. The method of any one of paragraphs 240-242, wherein the one or more flavoring agents comprise artificial, natural or synthetic fruit flavors.

246. The method of any one of paragraphs 240-242, wherein the one or more flavoring agents comprise at least one citrus oil.

247. The method of paragraph 246, wherein the at least one citrus oil is selected from lemon, orange, lime, grapefruit, yuzu, sudachi, or any combination thereof.

248. The method of any one of paragraphs 240-242, wherein the one or more flavoring agents comprise at least one fruit essence.

249. The method of paragraph 248, wherein the at least one fruit essence is from apple, pear, peach, grape, raspberry, blackberry, gooseberry, blueberry, strawberry, cherry, plum, prune, raisin, cola, guarana, neroli, pineapple, apricot, banana, melon, apricot, cherry, tropical fruit, mango, mangosteen, pomegranate, papaya, or any combination thereof.

250. The method of any one of paragraphs 240-242, wherein the one or more flavoring agents comprise at least one flavor from milk, butter, cheese, cream, yogurt, vanilla, tea, coffee, green tea, oolong tea, cocoa, chocolate, a mint, peppermint, spearmint, Japanese mint, a spice, asafetida, ajowan, anise, angelica, fennel, allspice, cinnamon, chamomile, mustard, cardamom, caraway, cumin, a clove, a pepper, coriander, sassafras, a savory, Zanthoxyli fructus, a perilla, a juniper berry, ginger, star anise, horseradish, thyme, tarragon, dill, capsicum, nutmeg, basil, marjoram, rosemary, bayleaf, wasabi, a nut, almond, hazelnut, macadamia nut, peanut, pecan, pistachio, and walnut, an alcoholic beverage, a wine, a whisky, a brandy, a rum, a gin, a liqueur, a floral, a vegetable, an onion, a garlic, a cabbage, a carrot, a celery, a mushroom, a tomato, concentrated meat soup, concentrated seafood soup, or any combination thereof.

251. The method of any one of paragraphs 146-250, further comprising the step of adding one or more reducing sugars after step (c).

252. The method of paragraph 251, wherein the one or more reducing sugars comprise a reducing sugar selected from galactose, mannose, arabinose, rhamnose, lactose, D-allose, D-psicose, xylitol, allulose, melezitose, D-tagatose, D-altrose, D-alditol, L-gulose, L-sorbose, D-talitol, inulin, stachyose, or any combination thereof.

253. The method of paragraph 251, wherein the one or more reducing sugars are selected from monosaccharides, disaccharides, oligosaccharides, polysaccharides, or any combination thereof.

254. The method of paragraph 253, wherein the reducing sugar is a monosaccharide.

255. The method of paragraph 254, wherein the monosaccharide is selected from glucose, galactose, fructose, mannose, glyceraldehyde, ribose, xylose, or any combination thereof.

256. The method of paragraph 253, wherein the reducing sugar is a disaccharide.

257. The method of paragraph 256, wherein the disaccharide is selected from cellobiose, lactose, maltose, or any combination thereof.

258. The method of paragraph 253, wherein the reducing sugar is a polysaccharide.

259. The method of paragraph 258, wherein the polysaccharide is starch.

260. The method of paragraph 251, wherein the one or more reducing sugars comprise at least one burnt sugar.

261. The method of paragraph 251, wherein the one or more reducing sugars comprise one or more pentoses, one or more hexoses, or a combination thereof.

262. The method of paragraph 261, comprising one or more pentoses, wherein the one or more pentoses comprise one or more aldopentoses, one or more ketopentoses, one or more deoxypentoses, or any combination thereof.

263. The method of paragraph 262, comprising one or more aldopentoses, wherein the one or more aldopentoses comprise an arabinose, a xylose, a ribose, a lyxose, or any combination thereof.

264. The method of paragraph 262, comprising one or more ketopentoses, wherein the one or more ketopentoses comprise a ribulose, a xylulose, or any combination thereof.

265. The method of paragraph 262, comprising one or more deoxypentoses.

266. The method of paragraph 251, wherein the one or more reducing sugars comprise one or more glycosides, wherein each of the glycosides comprises a glycone and an aglycone.

267. The method of paragraph 266, wherein at least one glycoside comprises a glycone selected from glucose, galactose, fructose, mannose, rhamnose, rutinose, xylose, lactose, arabinose, or glucuronic acid.

268. The method of paragraph 251, wherein the one or more reducing sugars are in the form of a plant juice, a plant powder, a vegetable juice, a vegetable powder, a berry juice, a berry powder, a fruit juice, a fruit powder, a billberrry juice, a billberry powder, or any mixture thereof.

269. The method of paragraph 251, wherein the one or more reducing sugars are in the form of a concentrate or extract from one or more of bilberry, raspberry, lingonberry, cranberry, apple, peach, apricot, mango, or any combination thereof.

270. The method of any one of paragraphs 146-269, further comprising the step of adding one or more amine donors after step (c).

271. The method of paragraph 270, wherein the one or more amine donors comprise a primary amine compound, a secondary amine compound, an amino acid, a peptide, a protein, or a mixture thereof.

272. The method of paragraph 271, wherein the one or more amine donors comprise a primary amine compound, a secondary amine compound, or a combination thereof.

273. The method of paragraph 271, wherein the one or more amine donors comprise one or more amino acids.

274. The method of paragraph 273, wherein the one or more amino acids are selected from alanine, arginine, asparagine, aspartic acid, cysteine, glutamine, glutamic acid, glycine, histidine, isoleucine, leucine, lysine, methionine, phenylalanine, proline, serine, threonine, tryptophan, tyrosine, valine, or any combination thereof, 275. The method of paragraph 271, wherein the one or more amine donors comprise a peptide, a protein, or a combination thereof.

276. The method of paragraph 275, wherein the peptide or protein is selected from hydrolyzed vegetable proteins (HVPs), soy protein, sodium caseinate, whey protein, wheat gluten, or any combination thereof, 277. The method of any one of paragraphs 146-276, further comprising the step of adding one or more caramelized sugars.

278. The method of paragraph 277, wherein the one or more caramelized sugars are added to the reaction mixture.

279, The method of paragraph 277, wherein the one or more caramelized sugars are added after step (c).

280. The method of any one of paragraphs 146-279, wherein at least one MRP comprises a nitrogen heterocylic functionality, a cyclic enolone functionality, a polycarbonyl functionality, a monocarbonyl functionality, or a combination thereof.

281. The method of paragraph 280, comprising a nitrogen heterocylic functionality, wherein the nitrogen heterocylic functionality comprises a pyrazine, a pyrrole, a pyridine, an alkyl or acetyl-substituted saturated N-heterocycle, or a combination thereof.

282. The method of paragraph 280, comprising a cyclic enolone functionality, wherein the cyclic enolone functionality comprises a maltol, an isomaltol, a dehydrofuranone, a dehydropyrone, a cyclopentenolone, or a combination thereof.

283. The method of paragraph 280, comprising a polycarbonyl functionality, wherein the polycarbonyl functionality comprises a 2-furaldehyde, a 2-pyrrole aldehyde, a C3-C6 methyl ketone, or a combination thereof.

284. The method of paragraph 280, comprising a polycarbonyl functionality, wherein the polycarbonyl functionality comprises a 2-furaldehyde, a 2-pyrrole aldehyde, a C3-C6 methyl ketone, or a combination thereof.

285. The method of any one of paragraphs 146-284, wherein the composition is formulated to have a corny, nutty, roasted or breadlike flavor.

286. The method of any one of paragraphs 146-284, wherein the composition is formulated to have a caramel-like flavor.

287. The method of any one of paragraphs 146-286, wherein the reaction mixture in step (c) is heated at a temperature between about 50° C. and about 250° C.

288. The method of paragraph 287, wherein the reaction mixture in step (c) is heated at a temperature between about 50° C. and about 150° C.

289. The method of any one of paragraphs 146-286, wherein the reaction mixture in step (c) is heated for a period of time between about 10 min. and 5 hours, 290. The method of paragraph 289, wherein the reaction mixture n step (c) is heated for a period of time between about 20 min. and 2 hour.

291. The method of paragraph 289, wherein the reaction mixture in step (c) is heated for a period of time between about 2 and 5 hours.

292. The method of any one of paragraphs 146-286, wherein the reaction mixture in step (c) is or is formulated to have a pH between about 2 and 14.

293. The method of paragraph 291, wherein the reaction mixture in step (c) is or is formulated to have a pH between about 4 and 9.

294. The method of paragraph 291, wherein the reaction mixture n step (c) is or is formulated to have a pH between about 9 and 11.

Additional Embodiments, Set 12

1. A dairy product comprising an added Maillard reaction product.

2. The dairy product of paragraph 1, wherein the dairy further comprises a sugar donor.

3. The dairy product of paragraph 2, wherein the sugar donor comprises a sweetening agent, a sweetener, and/or a sweetener enhancer.

4. The dairy product of paragraph 3, wherein the sugar donor comprises a sweetening agent.

5. The dairy product of paragraph 4, wherein the sweetening agent is selected from one or more of a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof.

6. The dairy product of paragraph 3, wherein the sugar donor comprises a sweetener enhancer.

7. The dairy product of paragraph 6, wherein the sweetener enhancer is one or more selected from brazzein, miraculin, curculin, pentadin, mabinlin, thaumatin, or any mixture thereof.

8. The dairy product of paragraph 7, wherein the sweetener enhancer comprises thaumatin.

9. The dairy product of paragraph 3, wherein the sugar donor comprises a sweetening agent and a sweetener enhancer.

10. The dairy product of paragraph 9, wherein the sweetening agent is selected from one or more of a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof.

11. The dairy product of paragraph 9, wherein the sweetener enhancer is one or more selected from brazzein, miraculin, curculin, pentadin, mabinlin, thautnatin, or any mixture thereof.

12. The dairy product of paragraph 9, wherein the sweetener enhancer is thaumatin.

13. The dairy product of paragraph 3, wherein the sugar donor comprises a sweetening agent, a sweetener enhancer and a sweetener.

14. The dairy product of paragraph 13, wherein the sweetener is a natural sweetener or a synthetic sweetener.

15. The dairy product of paragraph 14, wherein the synthetic sweeteners is a high intensity synthetic sweetener.

16. The dairy product of paragraph 13, wherein the sweetening agent is selected from one or more of a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof.

17. The dairy product of paragraph 13, wherein the sweetener enhancer is one or more selected from brazzein, miraculin, curculin, pentadin, mabinlin, thaumatin, or any mixture thereof.

18. The dairy product of paragraph 17, wherein the sweetener enhancer is thaumatin.

19. The dairy product of paragraph 14, wherein the synthetic sweetener is one or more selected from sorbitol, xylitol, mannitol, sucralose, aspartame, acesulfame-K, neotame, erythritol, trehalose, raffinose, cellobiose, tagatose, DOLCIA PRIMA™ allulose, inulin, N—[N-[3-(3-hydroxy-4-methoxyphenyl)propyl]alpha-aspartyl]-L-phenyl alanine 1-methyl ester, glycyrrhizin, sodium cyclamate, or any mixture thereof.

20. The dairy product of paragraph 19, wherein the synthetic sweetener is allulose or tagatose or their mixtures.

21. The dairy product of paragraph 20, wherein the content of synthetic sweetener is above 5%, 10%, 20%, 30%, 40%, 50%, 60%, 70%, 80%, 90%, 95%, 99%, 99.5%.

22. The dairy product of paragraph 13, wherein the sweetening agent is a Stevia extract.

23. The dairy product of paragraph 20, wherein the *Stevia* extract is a steviol glycoside.

24. The dairy product of paragraph 1, wherein the dairy product is a milk or dairy based drink; or a fermented, rennected milk products or a condensed milk or analogue; or a. cream or similar product; or milk or cream powders; or cheese; or dairy based desserts; or whey or a whey product including whey cheese.

Additional Embodiments, Set 13

1. A fat emulsion which is water-in oil, comprising an added Maillard reaction product.

2. The fat emulsion of paragraph 1, wherein the fat emulsion comprises a sugar donor.

3. The fat emulsion of paragraph 2, wherein the sugar donor comprises a sweetening agent, a sweetener, and/or a sweetener enhancer.

4. The fat emulsion of paragraph 3, wherein the sugar donor comprises a sweetening agent.

5. The fat emulsion of paragraph 4, wherein the sweetening agent is selected from one or more of a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof.

6. The fat emulsion of paragraph 3, wherein the sugar donor comprises a sweetener enhancer.

7. The fat emulsion of paragraph 6, wherein the sweetener enhancer is one or more selected from brazzein, miraculin, curculin, pentadin, mabinlin, thaumatin, or any mixture thereof.

8. The fat emulsion of paragraph 7, wherein the sweetener enhancer comprises thaumatin, 9. The fat emulsion of paragraph 3, wherein the sugar donor comprises a sweetening agent and a sweetener enhancer.

10. The fat emulsion of paragraph 9, wherein the sweetening agent is selected from one or more of a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated tnogroside, or any mixture thereof.

11. The fat emulsion of paragraph 9, wherein the sweetener enhancer is selected from brazzein, miraculin, curculin, pentadin, thaumatin, or mixtures thereof.

12. The fat emulsion of paragraph 9, wherein the sweetener enhancer is thaumatin.

13. The fat emulsion of paragraph 3, wherein the sugar donor comprises a sweetening agent, a sweetener enhancer and a sweetener.

14. The fat emulsion of paragraph 13, wherein the sweetener is a natural sweetener or synthetic sweetener.

15. The fat emulsion of paragraph 14, wherein the synthetic sweetener is a high intensity synthetic sweetener.

16. The fat emulsion of paragraph 13, wherein the sweetening agent is selected from one or more of a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof.

17. The fat emulsion of paragraph 13, wherein the sweetener enhancer is selected from brazzein, miraculin, curculin, pentadin, mabinlin, thaumatin, or any mixture thereof.

18. The fat emulsion of paragraph 17, wherein the sweetener enhancer is thaumatin.

19. The fat emulsion of paragraph 14, wherein the synthetic sweetener is selected from sorbitol, xylitol, mannitol, sucralose, aspartame, acesulfame-K, neotame, erythritol, trehalose, raffinose, cellobiose, tagatose, DOLCIA PRIMA™ allulose, inulin, N—[N-[3-(3-hydroxy-4-methoxyphenyl)propyl]-alpha-aspartyl]-L-phenylalanine 1-methyl ester, glycyrrhizin, sodium cyclamate, or any mixture thereof.

20. The fat emulsion of paragraph 19, wherein the synthetic sweetener is allulose, tagatose, or a mixture thereof.

21. The fat emulsion of paragraph 20, wherein the content of synthetic sweetener is above 5%, 10%, 20%, 30%, 40%, 50%, 60%, 70%, 80%, 90?/o, 95%, 99%, 99.5%.

22. The fat emulsion of paragraph 13, wherein the sweetening agent is a *Stevia* extract.

23. The fat emulsion of paragraph 20, wherein the *Stevia* extract is a steviol glycoside.

24. The fat emulsion of paragraph 1, wherein the fat emulsion is fats and oils essentially free from water; or water-in-oil; or mixed and/or flavored products based on fat emulsions other than fats and oils essentially free from water and mainly water-in-oil; or fat-based desserts (or excluding dairy based desserts).

Additional Embodiments, Set 14

1. A fruit or vegetable juice, comprising an added Maillard reaction product.

2. The fruit or vegetable juice of paragraph 1, wherein the fruit or vegetable further comprises a sugar donor.

3. The fruit or vegetable juice of paragraph 2, wherein the sugar donor comprises a sweetening agent, a sweetener, and/or a sweetener enhancer.

4. The fruit or vegetable juice of paragraph 3, wherein the sugar donor comprises a sweetening agent.

5. The fruit or vegetable juice of paragraph 4, wherein the sweetening agent is selected from a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof.

6. The fruit or vegetable juice of paragraph 3, wherein the sugar donor comprises a sweetener enhancer.

7. The fruit or vegetable juice of paragraph 6, wherein the sweetener enhancer is selected from brazzein, miraculin, curculin, pentadin, mabinlin, thaumatin, or any mixture thereof.

8. The fruit or vegetable juice of paragraph 7, wherein the sweetener enhancer comprises thaumatin.

9. The fruit or vegetable juice of paragraph 3, wherein the sugar donor comprises a sweetening agent and a sweetener enhancer.

10. The fruit or vegetable juice of paragraph 9, wherein the sweetening agent is selected from a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof.

11. The fruit or vegetable juice of paragraph 9, wherein the sweetener enhancer is selected from brazzein, miraculin, curculin, pentadin, mabinlin, thaumatin, or any mixture thereof.

12. The fruit or vegetable juice of paragraph 9, wherein the sweetener enhancer is thaumatin.

13. The fruit or vegetable juice of paragraph 3, wherein the sugar donor comprises a sweetening agent, a sweetener enhancer and a sweetener.

14. The fruit or vegetable juice of paragraph 13, wherein the sweetener is a natural sweetener or synthetic sweetener.

15. The fruit or vegetable juice of paragraph 14, wherein the synthetic sweetener is a high intensity synthetic sweetener.

16. The fruit or vegetable juice of paragraph 13, wherein the sweetening agent is selected from a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixtures thereof.

17. The fruit or vegetable juice of paragraph 13, wherein the sweetener enhancer is selected from brazzein, miraculin, curculin, pentadin, mabinlin, thautnatin, or any mixture thereof.

18. The fruit or vegetable juice of paragraph 17, wherein the sweetener enhancer is thaumatin, 19. The fruit or vegetable juice of paragraph 14, wherein the synthetic sweetener is selected from sorbitol, xylitol, mannitol, sucralose, aspartame, acesulfame-K, neotame, erythritol, trehalose, raffinose, cellobiose, tagatose, DOLCIA PRIMA™ allulose, inulin, N—[N-[3-(3-hydroxy-4-methoxyphenyl)propyl]-alpha-aspartyl]-L-phenylalanine 1-methyl ester, glycyrrhizin, sodium cyclamate, or any mixture thereof.

20. The fruit or vegetable juice of paragraph 19, wherein the synthetic sweetener is allulose or tagatose or their mixtures.

21. The fruit or vegetable juice of paragraph 20, wherein the content of synthetic sweetener is above 5%, 10%, 20%, 30%, 40%, 50%, 60%, 70%, 80%, 90%, 95%, 99%, 99.5%.

22. The fruit or vegetable juice of paragraph 13, wherein the sweetening agent is a *Stevia* extract.

23. The fruit or vegetable juice of paragraph 20, wherein the *Stevia* extract is a steviol glycoside.

24. The fruit or vegetable juice of paragraph 1, wherein the fruit or vegetable juice is fresh fruit juice, processed fruit juice, fresh vegetables fruit juice, or processed vegetables fruit juice.

25. The fruit or vegetable juice of paragraph 22, wherein the fruit juice comprises fruit juice containing vinegar or oil or brine, and fermented fruit juice; the vegetable juice comprises the vegetable juice containing vinegar or oil or brine.

26. The fruit or vegetable juice of paragraph 22, wherein the vegetable juice comprises the juice made from mushrooms and fungi, roots and tubers, pulses and legumes.

27. The fruit or vegetable juice of paragraph 22, wherein the fruit or vegetable juice is canned or bottled fruit juice or vegetable juice; or concentrates for fruit juice or vegetable juice; or the juice or concentrates for fruit juice or vegetable juice containing dried fruit.

28. The fruit or vegetable juice of paragraph 25, wherein the fruit is processed nuts; the juice or concentrates for fruit juice is potato juice, cereal juice, starch based juice from roots and tubers, pulses and legumes.

Additional Embodiments, Set 15

1. A tea comprising an added Maillard reaction product.

2. The tea of paragraph 1, wherein the tea further comprises a sugar donor.

3. The tea of paragraph 2, wherein the sugar donor comprises a sweetening agent, a sweetener, and/or a sweetener enhancer.

4. The tea of paragraph 3, wherein the sugar donor comprises a sweetening agent.

5. The tea of paragraph 4, wherein the sweetening agent is selected from a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof.

6. The tea of paragraph 3, wherein the sugar donor comprises a sweetener enhancer.

7. The tea of paragraph 6, wherein the sweetener enhancer is selected from brazzein, miraculin, curculin, pentadin, mabinlin, thaumatin, or any mixture thereof.

8. The tea of paragraph 7, wherein the sweetener enhancer comprises thaumatin.

9. The tea of paragraph 3, wherein the sugar donor comprises a sweetening agent and a sweetener enhancer.

10. The tea of paragraph 9, wherein the sweetening agent is selected from a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof.

11. The tea of paragraph 9, wherein the sweetener enhancer is selected from brazzein, miraculin, curculin, pentadin, mabinlin, thaumatin, or any mixture thereof.

12. The tea of paragraph 9, wherein the sweetener enhancer is thaumatin.

13. The tea of paragraph 3, wherein the sugar donor comprises a sweetening agent, a sweetener enhancer and a sweetener.

14. The tea of paragraph 13, wherein the sweetener is a natural sweetener or synthetic sweetener.

15. The tea of paragraph 14, wherein the synthetic sweetener is a high intensity synthetic sweetener.

16. The tea of paragraph 13, wherein the sweetening agent is selected from a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof.

17. The tea of paragraph 13, wherein the sweetener enhancer is selected from brazzein, miraculin, curculin, pentadin, mabinlin, thaumatin, or any mixture thereof.

18. The tea of paragraph 17, wherein the sweetener enhancer is thaumatin,

19. The tea of paragraph 14, wherein the synthetic sweetener is selected from sorbitol, xylitol, mannitol, sucralose, aspartame, acesulfame-K, neotame, erythritol, trehalose, raffinose, cellobiose, tagatose, DOLCIA PRIMA™ allulose, inulin, N—[N-[3-(3-hydroxy-4-methoxyphenyl)propyl]-alpha-aspartyl]-L-phenylalanine 1-methyl ester, glycyrrhizin, sodium cyclamate, or any mixture thereof.

20. The tea of paragraph 19, wherein the synthetic sweetener is allulose or tagatose or their mixtures.

21. The tea of paragraph 20, wherein the content of synthetic sweetener is above 5%, 10%, 20%, 30%, 40%, 50%, 60%, 70'%, 80%, 90%, 95%, 99%, 99.5%.

22. The tea of paragraph 13, wherein the sweetening agent is a *Stevia* extract.

23. The tea of paragraph 20, wherein the *Stevia* extract is a steviol glycoside.

24. The tea of paragraph 1, wherein the tea is concentrated or non-concentrated tea; or canned or bottled tea.

25. The tea of paragraph 1, wherein the tea can be a tea substitute.

Additional Embodiments, Set 16

1. A coffee comprising an added Maillard reaction product.

2. The coffee of paragraph 1, wherein the coffee further comprises a sugar donor.

3. The coffee of paragraph 2, wherein the sugar donor comprises a sweetening agent, a sweetener, and/or a sweetener enhancer.

4. The coffee of paragraph 3, wherein the sugar donor comprises a sweetening agent.

5. The coffee of paragraph 4, wherein the sweetening agent selected from a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixtures thereof.

6. The coffee of paragraph 3, wherein the sugar donor comprises a sweetener enhancer.

7. The coffee of paragraph 6, wherein the sweetener enhancer is selected from brazzein, miraculin, curculin, pentadin, thaumatin, or any mixture thereof.

8. The coffee of paragraph 7, wherein the sweetener enhancer comprises thaumatin.

9. The coffee of paragraph 3, wherein the sugar donor comprises a sweetening agent and a sweetener enhancer.

10. The coffee of paragraph 9, wherein the sweetening agent is selected from a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof 11. The coffee of paragraph 9, wherein the sweetener enhancer is selected from brazzein, miraculin, curculin, pentadin, mabinlin, thaumatin, or any mixture thereof.

12. The coffee of paragraph 9, wherein the sweetener enhancer is thaumatin.

13. The coffee of paragraph 3, wherein the sugar donor comprises a sweetening agent, a sweetener enhancer and a sweetener.

14. The coffee of paragraph 13, wherein the sweetener is a natural sweetener or synthetic sweetener.

15. The coffee of paragraph 14, wherein the synthetic sweetener is a high intensity synthetic sweetener, 16. The coffee of paragraph 13, wherein the sweetening agent is selected from a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof.

17. The coffee of paragraph 13, wherein the sweetener enhancer is selected from brazzein, miraculin, curculin, pentadin, mabinlin, thaumatin, or any mixture thereof.

18. The coffee of paragraph 17, wherein the sweetener enhancer is thaumatin.

19. The coffee of paragraph 14, wherein the synthetic sweetener is one or more selected from sorbitol, xylitol, mannitol, sucralose, aspartame, acesulfame-K, neotatne, erythritol, trehalose, raffinose, cellobiose, tagatose, DOLCIA PRIMA™ allulose, inulin, N—[N-[3-(3-hydroxy-4-methoxyphenyl)propyl]-alpha-aspartyl]-L-phenylalanine 1-methyl ester, glycyrrhizin, sodium cyclamate, or any mixture thereof.

20. The coffee of paragraph 19, wherein the synthetic sweetener is allulose or tagatose or their mixtures.

21. The coffee of paragraph 20, wherein the content of synthetic sweetener is above 5%, 10%, 20%, 30%, 40%, 50%, 60%, 70%, 80%, 90%, 95%, 99%, 99.5%.

22. The coffee of paragraph 13, wherein the sweetening agent is a *Stevia* extract.

23. The coffee of paragraph 20, wherein the *Stevia* extract is a steviol glycoside.

24. The coffee of paragraph 1, wherein the coffee is concentrated or non-concentrated coffee; or canned or bottled coffee.

25. The coffee of paragraph 1, wherein the coffee can be a coffee substitute.

Additional Embodiments, Set 17

1. A fruit and/or vegetable nectar comprising a reaction product.

2. The fruit and/or vegetable nectar of paragraph 1, wherein the fruit and vegetable nectar further comprises a sugar donor.

3. The fruit and/or vegetable nectar of paragraph 2, wherein the sugar donor comprises a sweetening agent, a sweetener, and/or a sweetener enhancer.

4. The fruit and/or vegetable nectar of paragraph 3, wherein the sugar donor comprises a sweetening agent.

5. The fruit and/or vegetable nectar of paragraph 4, wherein the sweetening agent is selected from a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof.

6. The fruit and/or vegetable nectar of paragraph 3, wherein the sugar donor comprises a sweetener enhancer.

7. The fruit and/or vegetable nectar of paragraph 6, wherein the sweetener enhancer is selected from brazzein, miraculin, curculin, pentadin, mabinlin, thaumatin, or any mixture thereof.

8. The fruit and/or vegetable nectar of paragraph 7, her the sweetener enhancer comprises thaumatin.

9. The fruit and/or vegetable nectar of paragraph 3, wherein the sugar donor comprises a sweetening agent and a sweetener enhancer.

10. The fruit and/or vegetable nectar of paragraph 9, wherein the sweetening agent is selected from a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixtures thereof.

11. The fruit and/or vegetable nectar of paragraph 9, wherein the sweetener enhancer is selected from brazzein, miraculin, curculin, pentadin, mabinlin, thaumatin, or any mixture thereof.

12. The fruit and/or vegetable nectar of paragraph 9, wherein the sweetener enhancer is thaumatin.

13. The fruit and/or vegetable nectar of paragraph 3, wherein the sugar donor comprises a sweetening agent, a sweetener enhancer and a sweetener.

14. The fruit and/or vegetable nectar of paragraph 13, wherein the sweetener a natural sweetener or synthetic sweetener.

15. The fruit and/or vegetable nectar of paragraph 14, wherein the synthetic sweetener is a high intensity synthetic sweetener.

16. The fruit and/or vegetable nectar of paragraph 13, wherein the sweetening agent is selected from a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside or any mixture thereof.

17. The fruit and/or vegetable nectar of paragraph 13, wherein the sweetener enhancer is selected from brazzein, miraculin, curculin, pentadin, mabinlin, thaumatin, or any mixture thereof.

18. The fruit and/or vegetable nectar of paragraph 17, wherein the sweetener enhancer is thaumatin.

19. The fruit and/or vegetable nectar of paragraph 14, wherein the synthetic sweetener is selected from sorbitol, xylitol, mannitol, sucralose, aspartame, acesulfame-K, neotame, erythritol, trehalose, raffinose, cellobiose, tagatose, DOLCIA PRIMA™ allulose, inulin, N—[N-[3-(3-hydroxy-4-methoxyphenyl)propyl]-alpha-aspartyl]-L-phenylalanine 1-methyl ester, glycyrrhizin, sodium cyclamate, or any mixture thereof.

20. The fruit and/or vegetable nectar of paragraph 19, wherein the synthetic sweetener is allulose or tagatose or their mixtures.

21. The fruit and/or vegetable nectar of paragraph 20, wherein the content of synthetic sweetener is above 5%, 10%, 20%, 30%, 40%, 50%, 60%, 70%, 80%, 90%, 95%, 99%, 99.5%.

22. The fruit and/or vegetable nectar of paragraph 13, wherein the sweetening agent is a *Stevia* extract.

23. The fruit and/or vegetable nectar of paragraph 20, wherein the *Stevia* extract is a stevuol glycoside.

24. The fruit and/or vegetable nectar of paragraph 1, wherein the fruit and vegetable nectar is concentrated or non-concentrated fruit or vegetable nectar; or canned or bottled water-based fruit and vegetable nectar.

Additional Embodiments, Set 18

1. A water-based flavored drink comprising an added Maillard reaction product.

2. The water-based flavored drink of paragraph 1, wherein the water-based flavored drink further comprises a sugar donor.

3. The water-based flavored drink of paragraph 2, wherein the sugar donor comprises a sweetening agent, a sweetener, and/or a sweetener enhancer.

4. The water-based flavored drink of paragraph 3, wherein the sugar donor comprises a sweetening agent.

5. The water-based flavored drink of paragraph 4, wherein the sweetening agent is selected from a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof.

6. The water-based flavored drink of paragraph 3, wherein the sugar donor comprises a sweetener enhancer.

7. The water-based flavored drink of paragraph 6, wherein the sweetener enhancer is selected from brazzein, miraculin, curculin, pentadin, mabinlin, thautnatin, or any mixture thereof.

8. The water-based flavored drink of paragraph 7, wherein the sweetener enhancer comprises thaumatin.

9. The water-based flavored drink of paragraph 3, wherein the sugar donor comprises a sweetening agent and a sweetener enhancer.

10. The water-based flavored drink of paragraph 9, wherein the sweetening agent is selected from a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof 11. The water-based flavored drink of paragraph 9, wherein the sweetener enhancer is selected from brazzein, miraculin, curculin, pentadin, mabinlin, thaumatin, or any mixture thereof.

12. The water-based flavored drink of paragraph 9, wherein the sweetener enhancer is thaumatin.

13. The water-based flavored drink of paragraph 3, wherein the sugar donor comprises a sweetening agent, a sweetener enhancer and a sweetener.

14. The water-based flavored drink of paragraph 13, wherein the sweetener is a natural sweetener or synthetic sweetener.

15. The water-based flavored drink of paragraph 14, wherein the synthetic sweetener is a high intensity synthetic sweetener.

16. The water-based flavored drink of paragraph 13, wherein the sweetening agent is selected from a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof.

17. The water-based flavored drink of paragraph 13, wherein the sweetener enhancer is selected from brazzein, miraculin, curculin, pentadin, mabinlin, thaumatin, or any mixture thereof.

18. The water-based flavored drink of paragraph 17, wherein the sweetener enhancer is thaumatin.

19. The water-based flavored drink of paragraph 14, wherein the synthetic sweetener is selected from sorbitol, xylitol, mannitol, sucralose, aspartame, acesulfame-K, neotame, erythritol, trehalose, raffinose, cellobiose, tagatose, DOLCIA PRIMA™ allulose, inulin, N—[N-[3-(3-hydroxy-4-methoxyphenyl)propyl]-alpha-aspartyl]-L-phenylalanine 1-methyl ester, glycyrrhizin, sodium cyclamate, or any mixture thereof.

20. The water-based flavored drink of paragraph 19, wherein the synthetic sweetener is allulose or tagatose or their mixtures.

21. The water-based flavored drink of paragraph 20, wherein the content of synthetic sweetener is above 5%, 10%, 20%, 30%, 40%, 50%, 60%, 70%, 80%, 90%, 95%, 99%, 99.5%.

22. The water-based flavored drink of paragraph 13, wherein the sweetening agent is a *Stevia* extract.

23. The water-based flavored drink of paragraph 20, wherein the *Stevia* extract is a steviol glycoside.

24. The water-based flavored drink of paragraph 1, wherein the water-based flavored drink is concentrated or non-concentrated water-based flavored drink; or canned or bottled water-based flavored drink.

25. The water-based flavored drink of paragraph 1, wherein the water-based flavored drink is carbonated drink, non-carbonated drink or a concentrate.

Additional Embodiments, Set 19

1. A herbal infusion comprising an added Maillard reaction product.

2. The herbal infusion of paragraph 1, wherein the herbal infusion further comprises a sugar donor.

3. The herbal infusion of paragraph 2, wherein the sugar donor comprises a sweetening agent, a sweetener, and/or a sweetener enhancer.

4. The herbal infusion of paragraph 3, wherein the sugar donor comprises a sweetening agent.

5. The herbal infusion of paragraph 4, wherein the sweetening agent is selected from a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof.

6. The herbal infusion of paragraph 3, wherein the sugar donor comprises a sweetener enhancer.

7. The herbal infusion of paragraph 6, wherein the sweetener enhancer is selected from brazzein, miraculin, curculin, pentadin, mabinlin, thaumatin, or any mixture thereof.

8. The herbal infusion of paragraph 7, wherein the sweetener enhancer comprises thaumatin.

9. The herbal infusion of paragraph 3, wherein the sugar donor comprises a sweetening agent and a sweetener enhancer.

10. The herbal infusion of paragraph 9, wherein the sweetening agent is a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside or any mixture thereof.

11. The herbal infusion of paragraph 9, wherein the sweetener enhancer is brazzein, miraculin, curculin, pentadin, mabinlin, thaumatin, or any mixture thereof.

12. The herbal infusion of paragraph 9, wherein the sweetener enhancer is thaumatin.

13. The herbal infusion of paragraph 3, wherein the sugar donor comprises a sweetening agent, a sweetener enhancer and a sweetener.

14. The herbal infusion of paragraph 13, wherein the sweetener is a natural sweetener or synthetic sweetener.

15. The herbal infusion of paragraph 14, wherein the synthetic sweetener is a high intensity synthetic sweetener.

16. The herbal infusion of paragraph 13, wherein the sweetening agent is selected from a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof.

17. The herbal infusion of paragraph 13, wherein the sweetener enhancer is selected from brazzein, miraculin, curculin, pentadin, mabinlin, thaumatin, or any mixture thereof.

18. The herbal infusion of paragraph 17, wherein the sweetener enhancer is thaumatin.

19. The herbal infusion of paragraph 14, wherein the synthetic sweetener is selected from sorbitol, xylitol, mannitol, sucralose, aspartame, acesulfame-K, neotame, erythritol, trehalose, raffinose, cellobiose, tagatose, DOLCIA PRIMA™ allulose, inulin, N—[N-[3-(3-hydroxy-4-methoxyphenyl)propyl]-alpha-aspartyl]-L-phenylalanine 1-methyl ester, glycyrrhizin, sodium cyclamate, or any mixture thereof.

20. The herbal infusion of paragraph 19, wherein the synthetic sweetener is allulose or tagatose or their mixtures.

21. The herbal infusion of paragraph 20, wherein the content of synthetic sweetener is above 5%, 10%, 20%, 30%, 40%, 50%, 60%, 70%, 80%, 90?/o, 95%, 99%, 99.5%.

22. The herbal infusion of paragraph 13, wherein the sweetening agent is a *Stevia* extract.

23. The herbal infusion of paragraph 20, wherein the *Stevia* extract is a steviol glycoside.

24. The herbal infusion of paragraph 1, wherein the herbal infusion is a concentrated or non-concentrated herbal infusion; or canned or bottled herbal infusion.

25. The herbal infusion of paragraph 1, wherein the herbal infusion can be an herbal infusion substitute.

Additional Embodiments, Set 20

1. A hot cereal beverage comprising an added Maillard reaction product.

2. The hot cereal beverage of paragraph 1, wherein the hot cereal beverage further comprises a sugar donor.

3. The hot cereal beverage of paragraph 2, wherein the sugar donor comprises a sweetening agent, a sweetener, and/or a sweetener enhancer.

4. The hot cereal beverage of paragraph 3, wherein the sugar donor comprises a sweetening agent.

5. The hot cereal beverage of paragraph 4, wherein the sweetening agent is selected from a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof.

6. The hot cereal beverage of paragraph 3, wherein the sugar donor comprises a sweetener enhancer.

7. The hot cereal beverage of paragraph 6, wherein the sweetener enhancer is selected from brazzein, miraculin, curculin, pentadin, mabinlin, thaumatin, or any mixture thereof.

8. The hot cereal beverage of paragraph 7, wherein the sweetener enhancer comprises thaumatin.

9. The hot cereal beverage of paragraph 3, wherein the sugar donor comprises a sweetening agent and a sweetener enhancer.

10. The hot cereal beverage of paragraph 9, wherein the sweetening agent is selected from a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof.

11. The hot cereal beverage of paragraph 9, wherein the sweetener enhancer is selected from brazzein, miraculin, curculin, pentadin, mabinlin, thaumatin, or any mixture thereof.

12. The hot cereal beverage of paragraph 9, wherein the sweetener enhancer is thaumatin.

13. The hot cereal beverage of paragraph 3, wherein the sugar donor comprises a sweetening agent, a sweetener enhancer and a sweetener.

14. The hot cereal beverage of paragraph 13, wherein the sweetener is a natural sweetener or synthetic sweetener.

15. The hot cereal beverage of paragraph 14, wherein the synthetic sweetener high intensity synthetic sweetener.

16. The hot cereal beverage of paragraph 13, wherein the sweetening agent is selected from a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof.

17. The hot cereal beverage of paragraph 13, wherein the sweetener enhancer is selected from brazzein, miraculin, curculin, pentadin, mabinlin, thautnatin, or any mixture thereof.

18. The hot cereal beverage of paragraph 17, wherein the sweetener enhancer is thaumatin, 19. The hot cereal beverage of paragraph 14, wherein the synthetic sweetener is selected from sorbitol, xylitol, mannitol, sucralose, aspartame, acesulfame-K, neotame, erythritol, trehalose, raffinose, cellobiose, tagatose, DOLCIA PRIMA™ allulose, inulin, N—[N-[3-(3-hydroxy-4-methoxyphenyl)propyl]-alpha-aspartyl]-L-phenylalanine 1-methyl ester, glycyrrhizin, sodium cyclamate, or any mixture thereof.

20. The hot cereal beverage of paragraph 19, wherein the synthetic sweetener is allulose or tagatose or their mixtures.

21. The hot cereal beverage of paragraph 20, wherein the content of synthetic sweetener is above 5%, 10%, 20%, 30%, 40%, 50%, 60%, 70%, 80%, 90%, 95%, 99%, 99.5%.

22. The hot cereal beverage of paragraph 13, wherein the sweetening agent is a Stevia extract.

23. The hot cereal beverage of paragraph 20, wherein the *Stevia* extract is a steviol glycoside.

24. The hot cereal beverage of paragraph 1, wherein the hot cereal beverage is concentrated or non-concentrated hot cereal beverage; or canned or bottled hot cereal beverage.

25. The hot cereal beverage of paragraph 1, wherein the hot cereal beverage can be a hot cereal beverage substitute.

Additional Embodiments, Set 21

1. A non-alcoholic beverage comprising an added reaction product.

2. The non-alcoholic beverage of paragraph 1, wherein the non-alcoholic beverage further comprises a sugar donor.

3. The non-alcoholic beverage of paragraph 2, wherein the sugar donor comprises a sweetening agent, a sweetener, and/or a sweetener enhancer.

4. The non-alcoholic beverage of paragraph 3, wherein the sugar donor comprises a sweetening agent.

5. The non-alcoholic beverage of paragraph 4, wherein the sweetening agent is selected from a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof.

6. The non-alcoholic beverage of paragraph 3, wherein the sugar donor comprises a sweetener enhancer.

7. The non-alcoholic beverage of paragraph 6, wherein the sweetener enhancer is selected from brazzein, miraculin, curculin, pentadin, mabinlin, thaumatin, or any mixture thereof.

8. The non-alcoholic beverage of paragraph 7, wherein the sweetener enhancer comprises thaumatin.

9. The non-alcoholic beverage of paragraph 3, wherein the sugar donor comprises a sweetening agent and a sweetener enhancer.

10. The non-alcoholic beverage of paragraph 9, wherein the sweetening agent is selected from a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof.

11. The non-alcoholic beverage of paragraph 9, wherein the sweetener enhancer is selected from brazzein, miraculin, curculin, pentadin, mabinlin, thaumatin, or any mixture thereof.

12 The non-alcoholic beverage of paragraph 9, wherein the sweetener enhancer is thaumatin.

13. The non-alcoholic beverage of paragraph 3, wherein the sugar donor comprises a sweetening agent, a sweetener enhancer and a sweetener.

14. The non-alcoholic beverage of paragraph 13, wherein the sweetener is a natural sweetener or synthetic sweetener.

15. The non-alcoholic beverage of paragraph 14, wherein the synthetic sweetener is a high intensity synthetic sweetener.

16. The non-alcoholic beverage of paragraph 13, wherein the sweetening agent is selected from a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof.

17. The non-alcoholic beverage of paragraph 13, wherein the sweetener enhancer is selected from brazzein, miraculin, curculin, pentadin, mabinlin, thaumatin, or any mixture thereof.

18. The non-alcoholic beverage of paragraph 17, wherein the sweetener enhancer is thaumatin.

19. The non-alcoholic beverage of paragraph 14, wherein the synthetic sweetener is selected from sorbitol, xylitol, mannitol, sucralose, aspartame, acesulfame-K, neotame, erythritol, trehalose, raffinose, cellobiose, tagatose, DOLCIA PRIMA™ allulose, inulin, N—[N-[3-(3-hydroxy-4-methoxyphenyl)propyl]-alpha-aspartyl]-L-phenylalanine 1-methyl ester, glycyrrhizin, sodium cyclamate, or any mixture thereof.

20. The non-alcoholic beverage of paragraph 19, wherein the synthetic sweetener is allulose or tagatose or their mixtures.

21. The non-alcoholic beverage of paragraph 20, wherein the content of synthetic sweetener is above 5%, 10%, 20%, 30%, 40%, 50%, 60%, 70%, 80%, 90%, 95%, 99%, 99.5%.

22. The non-alcoholic beverage of paragraph 13, wherein the sweetening agent is a *Stevia* extract.

23. The non-alcoholic beverage of paragraph 20, wherein the *Stevia* extract is a steviol glycoside.

24. The non-alcoholic beverage of paragraph 1, wherein the non-alcoholic beverage is concentrated or non-concentrated non-alcoholic beverage; or canned or bottled non-alcoholic beverage.

25. The non-alcoholic beverage of paragraph 1, wherein the non-alcoholic beverage can be the non-alcoholic beverage substitute.

26. The non-alcoholic beverage of paragraph 1, wherein the non-alcoholic beverage is a natural mineral water or source water, or table waters or soda waters.

Additional Embodiments, Set 22

1. An alcoholic beverage comprising an added Maillard reaction product.

2. The alcoholic beverage of paragraph 1, wherein the alcoholic beverage further comprises a sugar donor.

3. The alcoholic beverage of paragraph 2, wherein the sugar donor comprises a sweetening agent, a sweetener, and/or a sweetener enhancer.

4. The alcoholic beverage of paragraph 3, wherein the sugar donor comprises a sweetening agent.

5. The alcoholic beverage of paragraph 4, wherein the sweetening agent is selected from a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof.

6. The alcoholic beverage of paragraph 3, wherein the sugar donor comprises a sweetener enhancer.

7. The alcoholic beverage of paragraph 6, wherein the sweetener enhancer is selected from brazzein, miraculin, curculin, pentadin, mabinlin, thaumatin, or any mixture thereof.

8. The alcoholic beverage of paragraph 7, wherein the sweetener enhancer comprises thaumatin.

9. The alcoholic beverage of paragraph 3, wherein the sugar donor comprises a sweetening agent and a sweetener enhancer.

10. The alcoholic beverage of paragraph 9, wherein the sweetening agent is selected from a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof.

11. The alcoholic beverage of paragraph 9, wherein the sweetener enhancer is selected from brazzein, miraculin, curculin, pentadin, mabinlin, thaumatin, or any mixture thereof.

12. The alcoholic beverage of paragraph 9, wherein the sweetener enhancer is thaumatin.

13. The alcoholic beverage of paragraph 3, wherein the sugar donor comprises a sweetening agent, a sweetener enhancer and a sweetener.

14. The alcoholic beverage of paragraph 13, wherein the sweetener is a natural sweetener or synthetic sweetener.

15. The alcoholic beverage of paragraph 14, wherein the synthetic s intensity synthetic sweetener.

16. The alcoholic beverage of paragraph 13, wherein the sweetening agent is selected from a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof.

17. The alcoholic beverage of paragraph 13, wherein the sweetener enhancer is selected from brazzein, miraculin, curculin, pentadin, mabinlin, thautnatin, or any mixture thereof.

18. The alcoholic beverage of paragraph 17, wherein the sweetener enhancer is thaumatin.

19. The alcoholic beverage of paragraph 14, wherein the synthetic sweetener is selected from sorbitol, xylitol, mannitol, sucralose, aspartame, acesulfame-K, neotame, erythritol, trehalose, raffinose, cellobiose, tagatose, DOLCIA PRIMA™ allulose, inulin, N—[N-[3-(3-hydroxy-4-methoxyphenyl)propyl]-alpha-aspartyl]-L-phenylalanine 1-methyl ester, glycyrrhizin, sodium cyclamate, or any mixture thereof.

20. The alcoholic beverage of paragraph 19, wherein the synthetic sweetener is allulose or tagatose or their mixtures.

21. The alcoholic beverage of paragraph 20, wherein the content of synthetic sweetener is above 5%, 10%, 20%, 30%, 40%, 50%, 60%, 70%, 80%, 90%, 95%, 99%, 99.5%.

22. The alcoholic beverage of paragraph 13, wherein the sweetening agent is a Stevia extract.

23. The alcoholic beverage of paragraph 20, wherein the *Stevia* extract is a steviol glycoside.

24. The alcoholic beverage of paragraph 1, wherein the alcoholic beverage is a concentrated or non-concentrated alcoholic beverage; or a canned or bottled alcoholic beverage.

25. The alcoholic beverage of paragraph 1, wherein the alcoholic beverage can be an alcoholic beverage substitute.

26. The alcoholic beverage of paragraph 1, wherein the alcoholic beverage is alcohol-free or a low-alcoholic counterpart.

Additional Embodiments, Set 23

1. A beer or malt beverage comprising an added Maillard reaction product.

2. The beer or malt beverage of paragraph 1, wherein the beer or malt beverage further comprises a sugar donor.

3. The beer or malt beverage of paragraph 2, wherein the sugar donor comprises a sweetening agent, a sweetener, and/or a sweetener enhancer.

4. The beer or malt beverage of paragraph 3, wherein the sugar donor comprises a sweetening agent.

5. The beer or malt beverage of paragraph 4, wherein the sweetening agent is selected from a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof.

6. The beer or malt beverage of paragraph 3, wherein the sugar donor comprises a sweetener enhancer.

7. The beer or malt beverage of paragraph 6, wherein the sweetener enhancer is selected from brazzein, miraculin, curculin, pentadin, mabinlin, thautnatin, or any mixture thereof.

8. The beer or malt beverage of paragraph 7, wherein the sweetener enhancer comprises thaumatin.

9. The beer or malt beverage of paragraph 3, wherein the sugar donor comprises a sweetening agent and a sweetener enhancer.

10. The beer or malt beverage of paragraph 9, wherein the sweetening agent is selected from a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof.

11. The beer or malt beverage of paragraph 9, wherein the sweetener enhancer is selected from brazzein, miraculin, curculin, pentadin, mabinlin, thaumatin, or any mixture thereof.

12 The beer or malt beverage of paragraph 9, wherein the sweetener enhancer is

13. The beer or malt beverage of paragraph 3, wherein the sugar donor comprises a sweetening agent, a sweetener enhancer and a sweetener.

14. The beer or malt beverage of paragraph 13, wherein the sweetener is a natural sweetener or synthetic sweetener.

15. The beer or malt beverage of paragraph 14, wherein the synthetic sweetener is a high intensity synthetic sweetener.

16. The beer or malt beverage of paragraph 13, wherein the sweetening agent is selected from a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof.

17. The beer or malt beverage of paragraph 13, wherein the sweetener enhancer is selected from brazzein, miraculin, curculin, pentadin, mabinlin, thaumatin, or any mixture thereof.

18. The beer or malt beverage of paragraph 17, wherein the sweetener enhancer is thaumatin.

19. The beer or malt beverage of paragraph 14, wherein the synthetic sweetener is selected from sorbitol, xylitol, mannitol, sucralose, aspartame, acesulfame-K, neotame, erythritol, trehalose, raffinose, cellobiose, tagatose, DOLCIA PRIMA™ allulose, inulin, N—[N-[3-(3-hydroxy-4-methoxyphenyl)propyl]-alpha-aspartyl]-L-phenylalanine 1-methyl ester, glycyrrhizin, sodium cyclamate, or any mixture thereof.

20. The beer or malt beverage of paragraph 19, wherein the synthetic; sweetener is allulose or tagatose or their mixtures.

21. The beer or malt beverage of paragraph 20, wherein the content of synthetic sweetener is above 5%, 10%, 20%, 30%, 40%, 50%, 60%, 70%, 80%, 90%, 95%, 99%, 99.5%.

22. The beer or malt beverage of paragraph 13, wherein the sweetening agent is a *Stevia* extract.

23. The beer or malt beverage of paragraph 20, wherein the *Stevia* extract s a steviol glycoside.

24. The beer or malt beverage of paragraph 1, wherein the beer or malt beverage is a concentrated or non-concentrated beer or malt beverage; or a canned or bottled beer or malt beverage.

25. The beer or malt beverage of paragraph 1, wherein the beer or malt beverage can be a beer or a malt beverage substitute.

Additional Embodiments, Set 24

1. A cider and perry comprising an added Maillard reaction product.

2. The cider and perry of paragraph I, wherein the cider and perry further comprises a sugar donor.

3. The cider and perry of paragraph 2, wherein the sugar donor comprises a sweetening agent, a sweetener, and/or a sweetener enhancer.

4. The cider and perry of paragraph 3, wherein the sugar donor comprises a sweetening agent.

5. The cider and perry of paragraph 4, wherein the sweetening agent is selected from a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof.

6. The cider and perry of paragraph 3, wherein the sugar donor comprises a sweetener enhancer.

7. The cider and perry of paragraph 6, wherein the sweetener enhancer is selected from brazzein, miraculin, curculin, pentadin, mabinlin, thaumatin, or any mixture thereof.

8. The cider and perry of paragraph 7, wherein the sweetener enhancer comprises thaumatin.

9. The cider and perry of paragraph 3, w herein the sugar donor comprises a sweetening agent and a sweetener enhancer.

10. The cider and perry of paragraph 9, wherein the sweetening agent is selected from a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof.

11. The cider and perry of paragraph 9, wherein the sweetener enhancer is selected from brazzein, miraculin, curculin, pentadin, mabinlin thaumatin, or any mixture thereof.

12. The cider and perry of paragraph 9, wherein the sweetener enhancer is thaumatin.

13. The cider and perry of paragraph 3, wherein the sugar donor comprises a sweetening agent, a sweetener enhancer and a sweetener.

14. The cider and perry of paragraph 13, wherein the sweetener is a natural sweetener or synthetic sweetener.

15. The cider and perry of paragraph 14, wherein the synthetic sweetener is a high intensity synthetic sweetener.

16. The cider and perry of paragraph 13, wherein the sweetening agent is selected from a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof.

17. The cider and perry of paragraph 13, wherein the sweetener enhancer is selected from brazzein, miraculin, curculin, pentadin, mabinlin, thaumatin, or any mixture thereof.

18. The cider and perry of paragraph 17, wherein the sweetener enhancer is thaumatin.

19. The cider and perry of paragraph 14, wherein the synthetic sweetener is selected from sorbitol, xylitol, mannitol, sucralose, aspartame, acesulfame-K, neotame, erythritol, trehalose, raffinose, cellobiose, tagatose, DOLCIA PRIMA™ allulose inulin N—[N-[3-(3-hydroxy-4-methoxyphenyl)propyl]-alpha-aspartyl]-L-phenylalanine 1-methyl ester, glycyrrhizin, sodium cyclamate, or any mixture thereof.

20. The cider and perry of paragraph 19, wherein the synthetic sweetener is allulose or tagatose or their mixtures.

21. The cider and perry of paragraph 20, wherein the content of synthetic sweetener is above 5%, 10%, 20%, 30%, 40%, 50%, 60%, 70%, 80%, 90%, 95%, 99%, 99.5%, 22. The cider and perry of paragraph 13, wherein the sweetening agent is a Stevia extract.

23. The cider and perry of paragraph 20, wherein the *Stevia* extract is a steviol glycoside.

24. The cider and perry of paragraph 1, wherein the cider and perry is concentrated or non-concentrated cider and perry; or a canned or bottled cider and perry.

25. The cider and perry of paragraph 1, wherein the cider and perry can be a cider and perry substitute.

Additional Embodiments, Set 25

1. A wine comprising an added Maillard reaction product.

2. The wine of paragraph 1, wherein the wine further comprises a sugar donor.

3. The wine of paragraph 2, wherein the sugar donor comprises a sweetening agent, a sweetener, and/or a sweetener enhancer.

4. The wine of paragraph 3, wherein the sugar donor comprises a sweetening agent.

5. The wine of paragraph 4, wherein the sweetening agent is selected from a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof.

6. The wine of paragraph 3, wherein the sugar donor comprises a sweetener enhancer.

7. The wine of paragraph 6, wherein the sweetener enhancer is selected from brazzein, miraculin, curculin, pentadin, mabinlin, thaumatin, or any mixture thereof.

8. The wine of paragraph 7, wherein the sweetener enhancer comprises thaumatin.

9. The wine of paragraph 3, wherein the sugar donor comprises a sweetening agent and a sweetener enhancer.

10. The wine of paragraph 9, wherein the sweetening agent is selected from a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof.

11. The wine of paragraph 9, wherein the sweetener enhancer is selected from brazzein, miraculin, curculin, pentadin, mabinlin, thaumatin, or any mixture thereof.

12. The wine of paragraph 9, wherein the sweetener enhancer is thaumatin.

13. The wine of paragraph 3, wherein the sugar donor comprises a sweetening agent, a sweetener enhancer and a sweetener.

14. The wine of paragraph 13, wherein the sweeteners a natural sweetener or synthetic sweetener.

15. The wine of paragraph 14, wherein the synthetic sweetener is a high intensity synthetic sweetener.

16. The wine of paragraph 13, wherein the sweetening agent is selected from a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof 17. The wine of paragraph 13, wherein the sweetener enhancer is selected from brazzein, miraculin, curculin, pentadin, mabinlin, thaumatin, or any mixture thereof.

18. The wine of paragraph 17, wherein the sweetener enhancer is thaumatin.

19. The wine of paragraph 14, wherein the synthetic sweetener is selected from sorbitol, xylitol, mannitol, sucralose, aspartame, acesulfame-K, neotame, erythritol, trehalose, raffinose, cellobiose, tagatose, DOLCIA PRIMA™ allulose, inulin, N—[N-[3-(3-hydroxy-4-methoxyphenyl) propyl]-alpha-aspartyl]-L-phenylalanine 1-methyl ester, glycyrrhizin, sodium cyclamate, or any mixture thereof.

20. The wine of paragraph 19, wherein the synthetic sweetener is allulose or tagatose or their mixtures.

21. The wine of paragraph 20, wherein the content of synthetic sweetener is above 5%, 10%, 20%, 30%, 40%, 50%, 60%, 70%, 80%, 90%, 95%, 99%, 99.5%.

22. The wine of paragraph 13, wherein the sweetening agent is a *Stevia* extract.

23. The wine of paragraph 20, wherein the *Stevia* extract is a steviol glycoside.

24. The wine of paragraph 1, wherein the wine is a concentrated or non-concentrated wine; or a canned or bottled wine.

25. The wine of paragraph 1, wherein the wine can be a wine substitute.

26. The wine of paragraph 1, wherein the wine is still wine, sparkling and semi-sparkling wine, a fortified wine or a liquor wine or an aromatized wine.

Additional Embodiments, Set 26

1. A fruit wine comprising an added Maillard reaction product.

2. The fruit wine of paragraph 1, wherein the fruit wine further comprises a sugar donor.

3. The fruit wine of paragraph 2, wherein the sugar donor comprises a sweetening agent, a sweetener, and/or a sweetener enhancer.

4. The fruit wine of paragraph 3, wherein the sugar donor comprises a sweetening agent.

5. The fruit wine of paragraph 4, wherein the sweetening agent is selected from a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof.

6. The fruit wine of paragraph 3, wherein the sugar donor comprises a sweetener enhancer.

7. The fruit wine of paragraph 6, wherein the sweetener enhancer is selected from brazzein, miraculin, curculin, pentadin, mabinlin, thaumatin, or any mixture thereof.

8. The fruit wine of paragraph 7, wherein the sweetener enhancer comprises thaumatin.

9. The fruit wine of paragraph 3, wherein the sugar donor comprises a sweetening agent and a sweetener enhancer.

10. The fruit wine of paragraph 9, wherein the sweetening agent is selected from a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof.

11. The fruit wine of paragraph 9, wherein the sweetener enhancer is selected from brazzein, miraculin, curculin, pentadin, thaumatin, or any mixture thereof.

12. The fruit wine of paragraph 9, wherein the sweetener enhancer is thaumatin.

13. The fruit wine of paragraph 3, wherein the sugar donor comprises a sweetening agent, a sweetener enhancer and a sweetener.

14. The fruit wine of paragraph 13, wherein fire sweetener is a natural sweetener or synthetic sweetener.

15. The fruit wine of paragraph 14, wherein the synthetic sweetener is a high intensity synthetic sweetener.

16. The fruit wine of paragraph 13, wherein the sweetening agent is selected from a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof.

17. The fruit wine of paragraph 13, wherein the sweetener enhancer is selected from brazzein, miraculin, curculin, pentadin, mabinlin, thaumatin, or any mixture thereof.

18. The fruit wine of paragraph 17, wherein the sweetener enhancer is thaumatin.

19. The fruit wine of paragraph 14, wherein the synthetic sweetener is selected from sorbitol, xylitol, mannitol, sucralose, aspartame, acesulfame-K, neotame, erythritol, trehalose, raffinose, cellobiose, tagatose, DOLCIA PRIMA™ allulose, inulin, N—[N-[3-(3-hydroxy-4-methoxyphenyl) propyl]-alpha-aspartyl]-L-phenylalanine 1-methyl ester, glycyrrhizin, sodium cyclamate, or any mixture thereof.

20. The fruit wine of paragraph 19, wherein the synthetic sweetener s allulose or tagatose or their mixtures.

21. The fruit wine of paragraph 20, wherein the content of synthetic sweetener is above 5%, 10%, 20%, 30%, 40%, 50%, 60%, 70%, 80%, 90?/o, 95%, 99%, 99.5%.

22. The fruit wine of paragraph 13, wherein the sweetening agent is a *Stevia* extract.

23. The fruit wine of paragraph 20, wherein the *Stevia* extract is a steviol glycoside.

24. The fruit wine of paragraph 1, wherein the fruit wine is a concentrated or a non-concentrated fruit wine; or a canned or bottled fruit wine.

25. The fruit wine of paragraph 1, wherein the fruit wine can be a fruit wine substitute.

Additional Embodiments, Set 27

1. A spirituous beverage comprising an added Maillard reaction product.

2. The spirituous beverage of paragraph 1, wherein the spirituous beverage further comprises a sugar donor.

3. The spirituous beverage of paragraph 2, wherein the sugar donor comprises a sweetening agent, a sweetener, and/or a sweetener enhancer.

4. The spirituous beverage of paragraph 3, wherein the sugar donor comprises a sweetening agent.

5. The spirituous beverage of paragraph 4, wherein the sweetening agent is selected from a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof.

6. The spirituous beverage of paragraph 3, wherein the sugar donor comprises a sweetener enhancer.

7. The spirituous beverage of paragraph 6, wherein the sweetener enhancer is selected from brazzein, miraculin, curculin, pentadin, mabinlin, thaumatin, or any mixture thereof.

8. The spirituous beverage of paragraph 7, wherein the sweetener enhancer comprises thaumatin.

9. The spirituous beverage of paragraph 3, wherein the sugar donor comprises a sweetening agent and a sweetener enhancer.

10. The spirituous beverage of paragraph 9, wherein the sweetening agent is selected from a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof.

11. The spirituous beverage of paragraph 9, wherein the sweetener enhancer is selected from brazzein, miraculin, curculin, pentadin, mabinlin, thaumatin, or any mixture thereof.

12 The spirituous beverage of paragraph 9, wherein the sweetener enhancer is thaumatin.

13. The spirituous beverage of paragraph 3, wherein the sugar donor comprises a sweetening agent, a sweetener enhancer and a sweetener.

14. The spirituous beverage of paragraph 13, wherein the sweetener is a natural sweetener or synthetic sweetener.

15. The spirituous beverage of paragraph 14, wherein the synthetic sweetener is a high intensity synthetic sweetener.

16. The spirituous beverage of paragraph 13, wherein the sweetening agent is selected from a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof.

17. The spirituous beverage of paragraph 13, wherein the sweetener enhancer is selected from brazzein, miraculin, curculin, pentadin, mabinlin, thaumatin, or any mixture thereof.

18. The spirituous beverage of paragraph 17, wherein the sweetener enhancer is thaumatin.

19. The spirituous beverage of paragraph 14, wherein the synthetic sweetener is selected from sorbitol, xylitol, mannitol, sucralose, aspartame, acesulfame-K, neotame, erythritol, trehalose, raffinose, cellobiose, tagatose, DOLCIA PRIMA™ allulose, inulin, N—[N-[3-(3-hydroxy-4-methoxyphenyl)propyl]-alpha-aspartyl]-L-phenylalanine 1-methyl ester, glycyrrhizin, sodium cyclamate, or any mixture thereof.

20. The spirituous beverage of paragraph 19, wherein the synthetic sweetener is allulose or tagatose or their mixtures.

21. The spirituous beverage of paragraph 20, wherein the content of synthetic sweetener is above 5%, 10%, 20%, 30%, 40%, 50%, 60%, 70%, 80%, 90%, 95%, 99%, 99.5%.

22. The spirituous beverage of paragraph 13, wherein the sweetening agent is a *Stevia* extract.

23. The spirituous beverage of paragraph 20, wherein the *Stevia* extract is a steviol glycoside.

24. The spirituous beverage of paragraph 1, wherein the spirituous beverages is a concentrated or non-concentrated spirituous beverage; or a canned or bottled spirituous beverage.

25. The spirituous beverage of paragraph 1, wherein the spirituous beverage can be a spirituous beverage substitute.

26. The spirituous beverage of paragraph 1, wherein the spirituous beverage contains at least 15% alcohol or containing less than 15% alcohol.

Additional Embodiments, Set 28

1. A dessert comprising an added Mailiard reaction product.

2. The dessert of paragraph 1, wherein the dessert further comprises a sugar donor.

3. The dessert of paragraph 2, wherein the sugar donor comprises a sweetening agent, a sweetener, and/or a sweetener enhancer.

4. The dessert of paragraph 3, wherein the sugar donor comprises a sweetening agent.

5. The dessert of paragraph 4, wherein the sweetening agent is selected from a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof.

6. The dessert of paragraph 3, wherein the sugar donor comprises a sweetener enhancer.

7. The dessert of paragraph 6, wherein the sweetener enhancer is selected from brazzein, miraculin, curculin, pentadin, mabinlin, thaumatin, or any mixture thereof.

8. The dessert of paragraph 7, wherein the sweetener enhancer comprises thaumatin.

9. The dessert of paragraph 3, wherein the sugar donor comprises a sweetening agent and a sweetener enhancer.

10. The dessert of paragraph 9, wherein the sweetening agent is selected from a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof.

11. The dessert of paragraph 9, wherein the sweetener enhancer is selected from brazzein, miraculin, curculin, pentadin, mabinlin, thaumatin, or any mixture thereof.

12. The dessert of paragraph 9, wherein the sweetener enhancer is thaumatin.

13. The dessert of paragraph 3, wherein the sugar donor comprises a sweetening agent, a sweetener enhancer and a sweetener.

14. The dessert of paragraph 13, wherein the sweetener is a natural sweetener or synthetic sweetener.

15. The dessert of paragraph 14, wherein the synthetic sweetener is a high intensity synthetic sweetener.

16. The dessert of paragraph 13, wherein the sweetening agent is selected from a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof.

17. The dessert of paragraph 13, wherein the sweetener enhancer is selected from brazzein, miraculin, curculin, pentadin, mabinlin, thaumatin, or any mixture thereof.

18. The dessert of paragraph 17, wherein the sweetener enhancer is thaumatin.

19. The dessert of paragraph 14, wherein the synthetic sweetener is selected from sorbitol, xylitol, mannitol, sucralose, aspartame, acesulfame-K, neotame, erythritol, trehalose, raffinose, cellobiose, tagatose, DOLCIA PRIMA™ allulose, inulin, N—[N-[3-(3-hydroxy-4-methoxyphenyl) propyl]-alpha-aspartyl]-L-phenylalanine 1-methyl ester, glycyrrhizin, sodium cyclamate, or any mixture thereof.

20. The dessert of paragraph 19, wherein the synthetic sweetener is allulose or tagatose or their mixtures.

21. The dessert of paragraph 20, wherein the content of synthetic sweetener is above 5%, 10%, 20%, 30%, 40%, 50%, 60%, 70%, 80%, 90?/o, 95%, 99%, 99.5%.

22. The dessert of paragraph 13, wherein the sweetening agent is a *Stevia* extract.

23. The dessert of paragraph 20, wherein the *Stevia* extract is a steviol glycoside.

24. The dessert of paragraph 1, wherein the dessert is concentrated or non-concentrated dessert; or canned or bottled dessert.

25. The dessert of paragraph 1, wherein the dessert can be the dessert substitute.

26. The dessert of paragraph 1, wherein the dessert is dairy based dessert.

27. The dessert of paragraph 1, wherein the dessert is ice cream, ice milk, pudding, fruit or flavored yogurt.

28. The dessert of paragraph 1, wherein the dessert is fruit flavored dessert or water based dessert; or a starch based dessert including rice pudding or tapioca pudding.

Additional Embodiments, Set 29

1. A cream comprising an added Maillard reaction product.

2. The cream of paragraph 1, wherein the cream further comprises a sugar donor.

3. The cream of paragraph 2, wherein the sugar donor comprises a sweetening agent, a sweetener, and/or a sweetener enhancer.

4. The cream of paragraph 3, wherein the sugar donor comprises a sweetening agent.

5. The cream of paragraph 4, wherein the sweetening agent is selected from a licorice extract, a sweet tea extract, a *Stevia* extract, a swingle extract, a glycosylated sweet tea extract, a. glycosylated *Stevia* extract, a glycosylated swingle extract, a glycosylated sweet tea glycoside, a glycosylated steviol glycoside, a glycosylated mogroside, or any mixture thereof.

6. The cream of paragraph 3, wherein the sugar donor comprises a sweetener enhancer.

7. The cream of paragraph 6, wherein the sweetener enhancer is selected from brazzein, miraculin, curculin, pentadin, mabinlin, thaumatin, or any mixture thereof.

8. The cream of paragraph 7, wherein the sweetener enhancer comprises thaumatin.

9. The cream of paragraph 3, wherein the sugar donor comprises a sweetening agent and a sweetener enhancer.

10. The cream of paragraph 9, wherein the sweetening agent is selected from a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof.

11. The cream of paragraph 9, wherein the sweetener enhancer is selected from brazzein, miraculin, curculin, pentadin, mabinlin, thaumatin, or any mixture thereof.

12. The cream of paragraph 9, wherein the sweetener enhancer is thaumatin.

13. The cream of paragraph 3, wherein the sugar donor comprises a sweetening agent, a sweetener enhancer and a sweetener.

14. The cream of paragraph 13, wherein the sweetener is a natural sweetener or synthetic sweetener.

15. The cream of paragraph 14, wherein the synthetic sweetener is a high intensity synthetic sweetener, 16. The cream of paragraph 13, wherein the sweetening agent is selected from a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof.

17. The cream of paragraph 13, wherein the sweetener enhancer is selected from brazzein, miraculin, curculin, pentadin, mabinlin, thaumatin, or any mixture thereof.

18. The cream of paragraph 17, wherein the sweetener enhancer is thaumatin,

19. The cream of paragraph 14, wherein the synthetic sweetener is selected from sorbitol, xylitol, mannitol, sucralose, aspartame, acesulfame-K, neotame, erythritol, trehalose, raffinose, cellobiose, tagatose, DOLCIA PRIMA™ allulose, inulin, N—[N-[3-(3-hydroxy-4-methoxyphenyl)propyl]-alpha-aspartyl]-L-phenylalanine 1-methyl ester, glycyrrhizin, sodium cyclamate, or any mixture thereof.

20. The cream of paragraph 19, wherein the synthetic sweetener is allulose or tagatose or their mixtures.

21. The cream of paragraph 20, wherein the content of synthetic sweetener is above 5%, 10%, 20%, 30%, 40%, 50%, 60%, 70%, 80%, 90%, 95%, 99%, 99.5%.

22. The cream of paragraph 13, wherein the sweetening agent is a *Stevia* extract.

23. The cream of paragraph 20, wherein the *Stevia* extract is a steviol glycoside.

24. The cream of paragraph 1, wherein the cream is a concentrated or non-concentrated cream; or a canned or bottled cream.

25. The cream of paragraph 1, wherein the cream can be a cream substitute.

Additional Embodiments, Set 30

1. A milk or cream powder comprising an added Maillard reaction product.

2. The milk or cream powder of paragraph 1, wherein the milk or cream powder further comprises a sugar donor.

3. The milk or cream powder of paragraph 2, wherein the sugar donor comprises a sweetening agent, a sweetener, and/or a sweetener enhancer.

4. The milk or cream powder of paragraph 3, wherein the sugar donor comprises a sweetening agent.

5. The milk or cream powder of paragraph 4, wherein the sweetening agent is selected from a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof.

6. The milk or cream powder of paragraph 3, wherein the sugar donor comprises a sweetener enhancer.

7. The milk or cream powder of paragraph 6, wherein the sweetener enhancer is selected from brazzein, miraculin, curculin, pentadin, mabinlin, thaumatin, or any mixture thereof.

8. The milk or cream powder of paragraph 7, wherein the sweetener enhancer comprises thaumatin.

9. The milk or cream powder of paragraph 3, wherein the sugar donor comprises a sweetening agent and a sweetener enhancer.

10. The milk or cream powder of paragraph 9, wherein the sweetening agent is selected from a licorice extract, a sweet tea extract, a *Srevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof.

11. The milk or cream powder of paragraph 9, wherein the sweetener enhancer is selected from brazzein, miraculin, curculin, pentadin, mabinlin, thaumatin, or any mixture thereof.

12. The milk or cream powder of paragraph 9, wherein the sweetener enhancer is thaumatin.

13. The milk or cream powder of paragraph 3, wherein the sugar donor comprises a sweetening agent, a sweetener enhancer and a sweetener.

14. The milk or cream powder of paragraph 13, wherein the sweetener is a natural sweetener or synthetic sweetener.

15. The milk or cream powder of paragraph 14, wherein the synthetic sweetener is a high intensity synthetic sweetener.

16. The milk or cream powder of paragraph 13, wherein the sweetening agent is selected from a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof.

17. The milk or cream powder of paragraph 13, wherein the sweetener enhancer is selected from brazzein, miraculin, curculin, pentadin, mabinlin, thaumatin, or any mixture thereof.

18. The milk or cream powder of paragraph 17, wherein the sweetener enhancer is thaumatin.

19. The milk or cream powder of paragraph 14, wherein the synthetic sweetener is selected from sorbitol, xylitol, mannitol, sucralose, aspartame, acesulfame-K, neotame, erythritol, trehalose, raffinose, cellobiose, tagatose, DOLCIA PRIMA™ allulose, inulin, N—[N-[3-(3-hydroxy-4-methoxyphenyl)propyl]-alpha-aspartyl]-L-phenylalanine 1-methyl ester, glycyrrhizin, sodium cyclamate, or any mixture thereof.

20. The milk or cream powder of paragraph 19, wherein the synthetic sweetener is allulose or tagatose or their mixtures.

21. The milk or cream powder of paragraph 20, wherein the content of synthetic sweetener is above 5%, 10%, 20%, 30%, 40%, 50%, 60%, 70%, 80%, 90%, 95%, 99%, 99.5%.

22. The milk or cream powder of paragraph 13, wherein the sweetening agent is a *Stevia* extract.

23. The milk or cream powder of paragraph 20, wherein the *Stevia* extract is a steviol glycoside.

24. The milk or cream powder of paragraph 1, wherein the milk or cream powder is a concentrated or non-concentrated milk or cream powder; or a canned or bottled milk or cream powder.

25. The milk or cream powder of paragraph 1, wherein the milk or cream powder can be a milk or cream powder substitute or an analogue.

Additional Embodiments, Set 31

1. A cheese comprising an added Maillard reaction product.

2. The cheese of paragraph 1, wherein the cheese further comprises a sugar donor.

3. The cheese of paragraph 2, wherein the sugar donor comprises a sweetening agent, a sweetener, and/or a sweetener enhancer.

4. The cheese of paragraph 3, wherein the sugar donor comprises a sweetening agent.

5. The cheese of paragraph 4, wherein the sweetening agent is selected from a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof.

6. The cheese of paragraph 3, wherein the sugar donor comprises a sweetener enhancer.

7. The cheese of paragraph 6, wherein the sweetener enhancer is selected from brazzein, miraculin, curculin, pentadin, mabinlin, thaumatin, or any mixture thereof.

8. The cheese of paragraph 7, wherein the sweetener enhancer comprises thaumatin.

9. The cheese of paragraph 3, wherein the sugar donor comprises a sweetening agent and a sweetener enhancer.

10. The cheese of paragraph 9, wherein the sweetening agent is selected from a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof.

11. The cheese of paragraph 9, wherein the sweetener enhancer is selected from brazzein, miraculin, curculin, pentadin, mabinlin, thaumatin, or any mixture thereof.

12. The cheese of paragraph 9, wherein the sweetener enhancer is thaumatin.

13. The cheese of paragraph 3, wherein the sugar donor comprises a sweetening agent, a sweetener enhancer and a sweetener.

14. The cheese of paragraph 13, wherein the sweetener is a natural sweetener or synthetic sweetener.

15. The cheese of paragraph 14, wherein the synthetic sweetener is a high intensity synthetic sweetener, 16. The cheese of paragraph 13, wherein the sweetening agent is selected from a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof.

17. The cheese of paragraph 13, wherein the sweetener enhancer is selected from brazzein, miraculin, curculin, pentadin, mabinlin, thaumatin, or any mixture thereof.

18. The cheese of paragraph 17, wherein the sweetener enhancer is thaumatin.

19. The cheese of paragraph 14, wherein the synthetic sweetener is selected from sorbitol, xylitol, mannitol, sucralose, aspartame, acesulfame-K, neotame, erythritol, trehalose, raffinose, cellobiose, tagatose, DOLCIA PRIMA™ allulose, inulin, N—[N-[3-(3-hydroxy-4-methoxyphenyl)

propyl]-alpha-aspartyl]-L-phenylalanine 1-methyl ester, glycyrrhizin, sodium cyclamate, or any mixture thereof.

20. The cheese of paragraph 19, wherein the synthetic sweetener is allulose or tagatose or their mixtures.

21. The cheese of paragraph 20, wherein the content of synthetic sweetener is above 5%, 10%, 20%, 30%, 40%, 50%, 60%, 70%, 80%, 90%, 95%, 99%, 99.5%.

22. The cheese of paragraph 13, wherein the sweetening agent is a *Stevia* extract.

23. The cheese of paragraph 20, wherein the *Stevia* extract is a steviol glycoside.

24. The cheese of paragraph 1, wherein the cheese is a concentrated or non-concentrated cheese; or a canned or packaged cheese.

25. The cheese of paragraph 1, wherein the cheese can be a cheese substitute.

26. The cheese of paragraph 1, wherein the cheese is unripened cheese, ripened cheese, whey cheese, processed cheese or a cheese derivative.

Additional Embodiments, Set 32

1. A whey product comprising an added Maillard reaction product.

2. The whey product of paragraph 1, wherein the whey product further comprises a sugar donor.

3. The whey product of paragraph 2, wherein the sugar donor comprises a sweetening agent, a sweetener, and/or a sweetener enhancer.

4. The whey product of paragraph 3, wherein the sugar donor comprises a sweetening agent.

5. The whey product of paragraph 4, wherein the sweetening agent is selected from a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof.

6. The whey product of paragraph 3, wherein the sugar donor comprises a sweetener enhancer.

7. The whey product of paragraph 6, wherein the sweetener enhancer is selected from brazzein, miraculin, curculin, pentadin, mabinlin, thaumatin, or any mixture thereof.

8. The whey product of paragraph 7, wherein the sweetener enhancer comprises thaumatin.

9. The whey product of paragraph 3, wherein the sugar donor comprises a sweetening agent and a sweetener enhancer.

10. The whey product of paragraph 9, wherein the sweetening agent is selected from a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof.

11. The whey product of paragraph 9, wherein the sweetener enhancer is selected from brazzein, miraculin, curculin, pentadin, mabinlin, thaumatin, or any mixture thereof.

12. The whey product of paragraph 9, wherein the sweetener enhancer is thaumatin.

13. The whey product of paragraph 3, wherein the sugar donor comprises a sweetening agent, a sweetener enhancer and a sweetener.

14. The whey product of paragraph 13, wherein the sweetener is a natural sweetener or synthetic sweetener.

15. The whey product of paragraph 14, wherein the synthetic sweetener is a high intensity synthetic sweetener.

16. The whey product of paragraph 13, wherein the sweetening agent is selected from a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof.

17. The whey product of paragraph 13, wherein the sweetener enhancer is selected from brazzein, miraculin, curculin, pentadin, mabinlin, thaumatin, or any mixture thereof.

18. The whey product of paragraph 17, wherein the sweetener enhancer is thaumatin.

19. The whey product of paragraph 14, wherein the synthetic sweetener is selected from sorbitol, xylitol, mannitol, sucralose, aspartame, acesulfame-K, neotame, erythritol, trehalose, raffinose, cellobiose, tagatose, DOLCIA PRIMA™ allulose, inulin, N—[N-[3-(3-hydroxy-4-methoxyphenyl)propyl]-alpha-aspartyl]-L-phenylalanine 1-methyl ester, glycyrrhizin, sodium cyclamate, or any mixture thereof.

20. The whey product of paragraph 19, wherein the synthetic sweetener is allulose or tagatose or their mixtures.

21. The whey product of paragraph 20, wherein the content of synthetic sweetener is above 5%, 10%, 20%, 30%, 40%, 50%, 60%, 70%, 80%, 90%, 95%, 99%, 99.5%.

22. The whey product of paragraph 13, wherein the sweetening agent is a *Stevia* extract.

23. The whey product of paragraph 20, wherein the *Stevia* extract is a steviol glycoside.

24. The whey product of paragraph 1, wherein the whey product is a concentrated or non-concentrated whey product; or a canned or bottled whey product.

25. The whey product of paragraph 1, wherein the whey product can be the whey product substitute.

Additional Embodiments, Set 33

1. A edible ice comprising an added Maillard reaction product.

2. The edible ice of paragraph 1, wherein the edible ice further comprises a sugar donor.

3. The edible ice of paragraph 2, wherein the sugar donor comprises a sweetening agent, a sweetener, and/or a sweetener enhancer.

4. The edible ice of paragraph 3, wherein the sugar donor comprises a sweetening agent.

5. The edible ice of paragraph 4, wherein the sweetening agent is selected from a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof.

6. The edible ice of paragraph 3, wherein the sugar donor comprises a sweetener enhancer.

7. The edible ice of paragraph 6, wherein the sweetener enhancer is selected from brazzein, miraculin, curculin, pentadin, mabinlin, thaumatin, or any mixture thereof.

8. The edible ice of paragraph 7, wherein the sweetener enhancer comprises thaumatin.

9. The edible ice of paragraph 3, wherein the sugar donor comprises a sweetening agent and a sweetener enhancer.

10. The edible ice of paragraph 9, wherein the sweetening agent is selected from a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof.

11. The edible ice of paragraph 9, wherein the sweetener enhancer is selected from brazzein, miraculin, curculin, pentadin, mabinlin, thaumatin, or any mixture thereof.

12. The edible ice of paragraph 9, wherein the sweetener enhancer is thaumatin.

13. The edible ice of paragraph 3, wherein the sugar donor comprises a sweetening agent, a sweetener enhancer and a sweetener.

14. The edible ice of paragraph 13, wherein the sweetener is a natural sweetener or synthetic sweetener.

15. The edible ice of paragraph 14, wherein the synthetic sweetener is a high intensity synthetic sweetener.

16. The edible ice of paragraph 13, wherein the sweetening agent is selected from a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof.

17. The edible ice of paragraph 13, wherein the sweetener enhancer is selected from brazzein, miraculin, curculin, pentadin, mabinlin, thaumatin, or any mixture thereof.

18. The edible ice of paragraph 17, wherein the sweetener enhancer is thaumatin.

19. The edible ice of paragraph 14, wherein the synthetic sweetener is selected from sorbitol, xylitol, mannitol, sucralose, aspartame, acesulfame-K, neotame, erythritol, trehalose, raffinose, cellobiose, tagatose, DOLCIA PRIMA™ allulose, inulin, N—[N-[3-(3-hydroxy-4-methoxyphenyl) propyl]-alpha-aspartyl]-L-phenylalanine 1-methyl ester, glycyrrhizin, sodium cyclamate, or any mixture thereof.

20. The edible ice of paragraph 19, wherein the synthetic sweetener is allulose or tagatose or their mixtures.

21. The edible ice of paragraph 20, wherein the content of synthetic sweetener is above 5%, 10%, 20%, 30%, 40%, 50%, 60%, 70%, 80%, 90%, 95%, 99%, 99.5%.

22. The edible ice of paragraph 13, wherein the sweetening agent is a *Stevia* extract.

23. The edible ice of paragraph 20, wherein the *Stevia* extract is a steviol glycoside.

24. The edible ice of paragraph 1, wherein the edible ice is a concentrated or non-concentrated edible ice; or a canned or bottled edible ice, 25. The edible ice of paragraph 1, wherein the edible ice is sherbet or sorbet.

Additional Embodiments, Set 34

1. A fruit product comprising an added Maillard reaction product.

2. The fruit product of paragraph 1, wherein the fruit product further comprises a sugar donor.

3. The fruit product of paragraph 2, wherein the sugar donor comprises a sweetening agent, a sweetener, and/or a sweetener enhancer.

4. The fruit product of paragraph 3, wherein the sugar donor comprises a sweetening agent.

5. The fruit product of paragraph 4, wherein the sweetening agent is selected from a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof.

6. The fruit product of paragraph 3, wherein the sugar donor comprises a sweetener enhancer.

7. The fruit product of paragraph 6, wherein the sweetener enhancer is selected from brazzein, miraculin, curculin, pentadin, mabinlin, thaumatin, or any mixture thereof.

8. The fruit product of paragraph 7, wherein the sweetener enhancer comprises thaumatin.

9. The fruit product of paragraph 3, wherein the sugar donor comprises a sweetening agent and a sweetener enhancer, 10. The fruit product of paragraph 9, wherein the sweetening agent is selected from a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof.

11. The fruit product of paragraph 9, wherein the sweetener enhancer is selected from brazzein, miraculin, curculin, pentadin, mabinlin, thaumatin, or any mixture thereof.

12. The fruit product of paragraph 9, wherein the sweetener enhancer is thaumatin, 13. The fruit product of paragraph 3, wherein the sugar donor comprises a sweetening agent, a sweetener enhancer and a sweetener.

14. The fruit product of paragraph 13, wherein the sweetener is a natural sweetener or synthetic sweetener.

15. The fruit product of paragraph 14, wherein the synthetic sweetener is a high intensity synthetic sweetener.

16. The fruit product of paragraph 13, wherein the sweetening agent is selected from a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof.

17. The fruit product of paragraph 13, wherein the sweetener enhancer is selected from brazzein, miraculin, curculin, pentadin, mabinlin, thaumatin, or any mixture thereof.

18. The fruit product of paragraph 17, wherein the sweetener enhancer is thaumatin.

19. The fruit product of paragraph 14, wherein the synthetic sweetener is selected from sorbitol, xylitol, mannitol, sucralose, aspartame, acesulfame-K, neotame, erythritol, trehalose, raffinose, cellobiose, tagatose, DOLCIA PRIMA™ allulose, inulin, N—[N-[3-(3-hydroxy-4-methoxyphenyl)propyl]-alpha-aspartyl]-L-phenylalanine 1-methyl ester, glycyrrhizin, sodium cyclamate, or any mixture thereof.

20. The fruit product of paragraph 19, wherein the synthetic sweetener is allulose or tagatose or their mixtures.

21. The fruit product of paragraph 20, wherein the content of synthetic sweetener is above 5%, 10%, 20%, 30%, 40%, 50%, 60%, 70%, 80%, 90%, 95%, 99%, 99.5%.

22. The fruit product of paragraph 13, wherein the sweetening agent is a Stevia extract.

23. The fruit product of paragraph 20, wherein the *Stevia* extract is a steviol glycoside.

24. The fruit product of paragraph 1, wherein the fruit product is a concentrated or non-concentrated fruit product; or a canned or bottled fruit product.

25. The fruit product of paragraph 1, wherein the fruit product can be a fruit product substitute.

26. The fruit product of paragraph 1, wherein the fruit product is frozen fruit, dried fruit, or fruit in vinegar, oil or brine; or a fermented fruit product, or a cooked or a fired fruit; or a marmalade.

Additional Embodiments, Set 35

1. A vegetable product comprising an added Maillard reaction product.

2. The vegetable product of paragraph 1, wherein the vegetable product further comprises a sugar donor.

3. The vegetable product of paragraph 2, wherein the sugar donor comprises a sweetening agent, a sweetener, and/or a sweetener enhancer.

4. The vegetable product of paragraph 3, wherein the sugar donor comprises a sweetening agent.

5. The vegetable product of paragraph 4, wherein the sweetening agent is selected from a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof.

6. The vegetable product of paragraph 3, wherein the sugar donor comprises a sweetener enhancer.

7. The vegetable product of paragraph 6, wherein the sweetener enhancer is selected from brazzein, miraculin, curculin, pentadin, mabinlin, thaumatin, or any mixture thereof.

8. The vegetable product of paragraph 7, wherein the sweetener enhancer comprises thaumatin.

9. The vegetable product of paragraph 3, wherein the sugar donor comprises a sweetening agent and a sweetener enhancer.

10. The vegetable product of paragraph 9. wherein the sweetening agent is selected from a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof.

11. The vegetable product of paragraph 9, wherein the sweetener enhancer is selected from brazzein, miraculin, curculin, pentadin, mabinlin, thaumatin, or any mixture thereof.

12. The vegetable product of paragraph 9, wherein the sweetener enhancer is thaumatin.

13. The vegetable product of paragraph 3, wherein the sugar donor comprises a sweetening agent, a sweetener enhancer and a sweetener.

14. The vegetable product of paragraph 13, wherein the sweetener is a natural sweetener or synthetic sweetener.

15. The vegetable product of paragraph 14, wherein the synthetic sweetener is a high intensity synthetic sweetener.

16. The vegetable product of paragraph 13, wherein the sweetening agent is selected from a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof.

17. The vegetable product of paragraph 13, wherein the sweetener enhancer is selected from brazzein, miraculin, curculin, pentadin, mabinlin, thaumatin, or any mixture thereof.

18. The vegetable product of paragraph 17, wherein the sweetener enhancer is thaumatin.

19. The vegetable product of paragraph 14, wherein the synthetic sweetener is selected from sorbitol, xylitol, mannitol, sucralose, aspartame, acesulfame-K, neotame, erythritol, trehalose, raffinose, cellobiose, tagatose, DOLCIA PRIMA™ allulose, inulin, N—[N-[3-(3-hydroxy-4-methoxyphenyl)propyl]-alpha-aspartyl]-L-phenylalanine 1-methyl ester, glycyrrhizin, sodium cyclamate, or any mixture thereof.

20. The vegetable product of paragraph 19, wherein the synthetic sweetener is allulose or tagatose or their mixtures.

21. The vegetable product of paragraph 20, wherein the content of synthetic sweetener is above 5%, 10%, 20%, 30%, 40%, 50%, 60%, 70%, 80%, 90%, 95%, 99%, 99.5%.

22. The vegetable product of paragraph 13, wherein the sweetening agent is a Stevia extract.

23. The vegetable product of paragraph 20, wherein the *Stevia* extract is a steviol glycoside.

24. The vegetable product of paragraph 1, wherein the vegetable product is a canned or bottled vegetable product.

25. The vegetable product of paragraph 1, wherein the vegetable product is a frozen vegetable, dried vegetable, or vegetable in vinegar, oil or brine; or a fermented vegetable product, or a cooked or a fired vegetable; or a processed mushroom or fungi, or a processed root or tuber, or processed pulses or legumes.

Additional Embodiments, Set 36

1. A nut or seed product comprising an added Maillard reaction product.

2. The nut or seed product of paragraph 1, wherein the nut or seed product further comprises a sugar donor.

3. The nut or seed product of paragraph 2, wherein the sugar donor comprises a sweetening agent, a sweetener, and/or a sweetener enhancer.

4. The nut or seed product of paragraph 3, wherein the sugar donor comprises a sweetening agent.

5. The nut or seed product of paragraph 4, wherein the sweetening agent is selected from a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof.

6. The nut or seed product of paragraph 3, wherein the sugar donor comprises a sweetener enhancer.

7. The nut or seed product of paragraph 6, wherein the sweetener enhancer is selected from brazzein, miraculin, curculin, pentadin, mabinlin, thaumatin, or any mixture thereof.

8. The nut or seed product of paragraph 7, wherein the sweetener enhancer comprises thaumatin.

9. The nut or seed product of paragraph 3, wherein the sugar donor comprises a sweetening agent and a sweetener enhancer.

10. The nut or seed product of paragraph 9, wherein the sweetening agent is selected from a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof.

11. The nut or seed product of paragraph 9, wherein the sweetener enhancer is selected from brazzein, miraculin, curculin, pentadin, mabinlin, thaumatin, or any mixture thereof.

12. The nut or seed product of paragraph 9, wherein the sweetener enhancer is thaumatin.

13. The nut or seed product of paragraph 3, wherein the sugar donor comprises a sweetening agent, a sweetener enhancer and a sweetener.

14. The nut or seed product of paragraph 13, wherein the sweetener is a natural sweetener or synthetic sweetener.

15. The nut or seed product of paragraph 14, wherein the synthetic sweetener is a high intensity synthetic sweetener.

16. The nut or seed product of paragraph 13, wherein the sweetening agent is selected from a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof.

17. The nut or seed product of paragraph 13, wherein the sweetener enhancer is selected from brazzein, miraculin, curculin, pentadin, mabinlin, thautnatin, or any mixture thereof.

18. The nut or seed product of paragraph 1.7, wherein the sweetener enhancer is thaumatin.

19. The nut or seed product of paragraph 14, wherein the synthetic sweetener is selected from sorbitol, xylitol, mannitol, sucralose, aspartame, acesulfame-K, neotame, erythritol, trehalose, raffinose, cellobiose, tagatose, DOLCIA PRIMA™ allulose, inulin, N—[N-[3-(3-hydroxy-4-methoxyphenyl)propyl]-alpha-aspartyl]-L-phenylalanine 1-methyl ester, glycyrrhizin, sodium cyclamate, or any mixture thereof.

20. The nut or seed product of paragraph 19, wherein the synthetic sweetener is allulose or tagatose or their mixtures.

21. The nut or seed product of paragraph 20, wherein the content of synthetic sweetener is above 5%, 10%, 20%, 30%, 40%, 50%, 60%, 70%, 80%, 90%, 95%, 99%, 99.5%.

22. The nut or seed product of paragraph 13, wherein the sweetening agent is a Stevia extract.

23. The nut or seed product of paragraph 20, wherein the *Stevia* extract is a steviol glycoside.

24. The nut or seed product of paragraph 1, wherein the nut or seed product is canned or bottled nut or seed product.

24. The nut or seed product of paragraph 1, wherein the nut or seed product can be a nut or seed product substitute.

25. The nut or seed product of paragraph 1, wherein the nut or seed product is nut or seed puree or spread; a nut or seed pulp or preparation.

Additional Embodiments, Set 37

1. A jam comprising a Maillard reaction product.

2. The jam of paragraph 1, wherein the jam further comprises a sugar donor.

3. The jam of paragraph 2, wherein the sugar donor comprises a sweetening agent, a sweetener, and/or a sweetener enhancer.

4. The jam of paragraph 3, wherein the sugar donor comprises a sweetening agent.

5. The jam of paragraph 4, wherein the sweetening agent is selected from a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof.

6. The jam of paragraph 3, wherein the sugar donor comprises a sweetener enhancer.

7. The jam of paragraph 6, wherein the sweetener enhancer is selected from brazzein, miraculin, curculin, pentadin, mabinlin, thaumatin, or any mixture thereof.

8. The jam of paragraph 7, wherein the sweetener enhancer comprises thaumatin.

9. The jam of paragraph 3, wherein the sugar donor comprises a sweetening agent and a sweetener enhancer.

10. The jam of paragraph 9, wherein the sweetening agent is selected from a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof.

11. The jam of paragraph 9, wherein the sweetener enhancer is selected from brazzein, miraculin, curculin, pentadin, mabinlin, thaumatin, or any mixture thereof.

12. The jam of paragraph 9, wherein the sweetener enhancer is thaumatin.

13. The jam of paragraph 3, wherein the sugar donor comprises a sweetening agent, a sweetener enhancer and a sweetener.

14. The jam of paragraph 13, wherein the sweetener is a natural sweetener or synthetic sweetener.

15. The jam of paragraph 14, wherein the synthetic sweetener is a high intensity synthetic sweetener.

16. The jam of paragraph 13, wherein the sweetening agent is selected from a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof.

17. The jam of paragraph 13, wherein the sweetener enhancer is selected from brazzein, miraculin, curculin, pentadin, mabinlin, thaumatin, or any mixture thereof.

18. The jam of paragraph 17, wherein the sweetener enhancer is thaumatin.

19. The jam of paragraph 14, wherein the synthetic sweetener is selected from sorbitol, xylitol, mannitol, sucralose, aspartame, acesulfame-K, neotame, erythritol, trehalose, raffinose, cellobiose, tagatose, DOLCIA PRIMA™ allulose, inulin, N—[N-[3-(3-hydroxy-4-methoxyphenyl)propyl]-alpha-aspartyl]-L-phenylalanine 1-methyl ester, glycyrrhizin, sodium cyclamate, or any mixture thereof.

20. The jam of paragraph 19, wherein the synthetic sweetener is allulose or agatose or their mixtures.

21. The jam of paragraph 20, wherein the content of synthetic sweetener is above 5%, 10%, 20%, 30%, 40%, 50%, 60%, 70'%, 80%, 90%, 95%, 99%, 99.5%.

22. The jam of paragraph 13, wherein the sweetening agent is a *Stevia* extract.

23. The jam of paragraph 20, wherein the *Stevia* extract is a steviol glycoside.

24. The jam of paragraph 1, wherein the jam is a concentrated or non-concentrated jam; or a canned or bottled jam.

25. The jam of paragraph 1, wherein the jam can be a jam substitute.

Additional Embodiments, Set 38

1. A jelly comprising an added Maillard reaction product.

2. The jelly of paragraph 1, wherein the jelly further comprises a sugar donor.

3. The jelly of paragraph 2, wherein the sugar donor comprises a sweetening agent, a sweetener, and/or a sweetener enhancer.

4. The jelly of paragraph 3, wherein the sugar donor comprises a sweetening agent.

5. The jelly of paragraph 4, wherein the sweetening agent is selected from a licorice extract, a sweet tea extract, a

*Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof.

6. The jelly of paragraph 3, wherein the sugar donor comprises a sweetener enhancer.

7. The jelly of paragraph 6, wherein the sweetener enhancer is selected from brazzein, miraculin, curculin, pentadin, mabinlin, thaumatin, or any mixture thereof.

8. The jelly of paragraph 7, wherein the sweetener enhancer comprises thaumatin.

9. The jelly of paragraph 3, wherein the sugar donor comprises a sweetening agent and a sweetener enhancer.

10. The jelly of paragraph 9, wherein the sweetening agent is selected from a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof.

11. The jelly of paragraph 9, wherein the sweetener enhancer is selected from brazzein, miraculin, curculin, pentadin, mabinlin, thaumatin, or any mixture thereof.

12. The jelly of paragraph 9, wherein the sweetener enhancer is thaumatin.

13. The jelly of paragraph 3, wherein the sugar donor comprises a sweetening agent, a sweetener enhancer and a sweetener.

14. The jelly of paragraph 13, wherein the sweetener is a natural ener or synthetic sweetener.

15. The jelly of paragraph 14, wherein the synthetic sweetener is a high intensity synthetic sweetener.

16. The jelly of paragraph 13, wherein the sweetening agent is selected from a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof.

17. The jelly of paragraph 13, wherein the sweetener enhancer is selected from brazzein, miraculin, curculin, pentadin, mabinlin, thaumatin, or any mixture thereof.

18. The jelly of paragraph 17, wherein the sweetener enhancer is thautnatin.

19. The jelly of paragraph 14, wherein the synthetic sweetener is selected from sorbitol, xylitol, mannitol, sucralose, aspartame, acesulfame-K, neotame, erythritol, trehalose, raffinose, cellobiose, tagatose, DOLCIA PRIMA™ allulose, inulin, N—[N-[3-(3-hydroxy-4-methoxyphenyl) propyl]-alpha-aspartyl-]-L-phenylalanine 1-methyl ester, glycyrrhizin, sodium cyclamate, or any mixture thereof.

20. The jelly of paragraph 19, wherein the synthetic sweetener is allulose or tagatose or their mixtures.

21. The jelly of paragraph 20, wherein the content of synthetic sweetener is above 5%, 10%, 20%, 30%, 40%, 50%, 60%, 70%, 80%, 90%, 95%, 99%, 99.5%.

22. The jelly of paragraph 13, wherein the sweetening agent is a *Stevia* extract, 23. The jelly of paragraph 20, wherein the *Stevia* extract is a steviol glycoside.

24. The jelly of paragraph 1, wherein the jelly is a concentrated or non-concentrated jelly; or a canned or bottled jelly.

25. The jelly of paragraph 1, wherein the jelly can be a jelly substitute.

Additional Embodiments, Set 39

1. A spread comprising an added Maillard reaction product.

2. The spread of paragraph 1, wherein the spread further comprises a sugar donor.

3. The spread of paragraph 2, wherein the sugar donor comprises a sweetening agent, a sweetener, and/or a sweetener enhancer.

4. The spread of paragraph 3, wherein the sugar donor comprises a sweetening agent.

5. The spread of paragraph 4, wherein the sweetening agent is selected from a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof.

6. The spread of paragraph 3, wherein the sugar donor comprises a sweetener enhancer.

7. The spread of paragraph 6, wherein the sweetener enhancer is selected from brazzein, miraculin, curculin, pentadin, mabinlin, thaumatin, or any mixture thereof.

8. The spread of paragraph 7, wherein the sweetener enhancer comprises thaumatin.

9. The spread of paragraph 3, wherein the sugar donor comprises a sweetening agent and a sweetener enhancer.

10. The spread of paragraph 9, wherein the sweetening agent is selected from a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof.

11. The spread of paragraph 9, wherein the sweetener enhancer is selected from brazzein, miraculin, curculin, pentadin, mabinlin, thaumatin, or any mixture thereof.

12. The spread of paragraph 9, wherein the sweetener enhancer is thaumatin.

13. The spread of paragraph 3, wherein the sugar donor comprises a sweetening agent, a sweetener enhancer and a sweetener.

14. The spread of paragraph 13, wherein the sweetener is a natural sweetener or synthetic sweetener.

15. The spread of paragraph 14, wherein the synthetic sweetener is a high intensity synthetic sweetener.

16. The spread of paragraph 13, wherein the sweetening agent is selected from a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof.

17. The spread of paragraph 13, wherein the sweetener enhancer is selected from brazzein, miraculin, curculin, pentadin, mabinlin, thaumatin, or any mixture thereof.

18. The spread of paragraph 17, wherein the sweetener enhancer is thaumatin.

19. The spread of paragraph 14, wherein the synthetic sweetener is selected from sorbitol, xylitol, mannitol, sucralose, aspartame, acesulfame-K, neotame, erythritol, trehalose, raffinose, cellobiose, tagatose, DOLCIA PRIMA™ allulose, inulin, N—[N-[3-(3-hydroxy-4-methoxyphenyl)

propyl]-alpha-aspartyl]-L-phenylalanine 1-methyl ester, glycyrrhizin, sodium cyclamate, or any mixture thereof.

20. The spread of paragraph 19, wherein the synthetic sweetener is allulose or tagatose or their mixtures.

21. The spread of paragraph 20, wherein the content of synthetic sweetener is above 5%, 10%, 20%, 30%, 40%, 50%, 60%, 70%, 80%, 90%, 95%, 99%, 99.5%.

22. The spread of paragraph 13, wherein the sweetening agent is a *Stevia* extract.

23. The spread of paragraph 20, wherein the *Stevia* extract is a steviol glycoside.

24. The spread of paragraph 1, wherein the spread can be a spread substitute.

Additional Embodiments, Set 40

1. A fruit topping comprising an added Maillard reaction product.

2. The fruit topping of paragraph 1, wherein the fruit topping further comprises a sugar donor.

3. The fruit topping of paragraph 2, wherein the sugar donor comprises a sweetening agent, a sweetener, and/or a sweetener enhancer.

4. The fruit topping of paragraph 3, wherein the sugar donor comprises a sweetening agent.

5. The fruit topping of paragraph 4, wherein the sweetening agent is selected from a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof.

6. The fruit topping of paragraph 3, wherein the sugar donor comprises a sweetener enhancer.

7. The fruit topping of paragraph 6, wherein the sweetener enhancer is selected from brazzein, miraculin, curculin, pentadin, mabinlin, thaumatin, or any mixture thereof.

8. The fruit topping of paragraph 7, wherein the sweetener enhancer comprises thaumatin.

9. The fruit topping of paragraph 3, wherein the sugar donor comprises a sweetening agent and a sweetener enhancer.

10. The fruit topping of paragraph 9, wherein the sweetening agent is selected from a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof.

11. The fruit topping of paragraph 9, wherein the sweetener enhancer is selected from brazzein, miraculin, curculin, pentadin, mabinlin, thaumatin, or any mixture thereof.

12. The fruit topping of paragraph 9, wherein the sweetener enhancer is thaumatin.

13. The fruit topping of paragraph 3, wherein the sugar donor comprises a sweetening agent, a sweetener enhancer and a sweetener.

14. The fruit topping of paragraph 13, wherein the sweetener is a natural sweetener or synthetic sweetener.

15. The fruit topping of paragraph 14, wherein the synthetic sweetener is a high intensity synthetic sweetener, 16. The fruit topping of paragraph 13, wherein the sweetening agent is selected from a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof.

17. The fruit topping of paragraph 13, wherein the sweetener enhancer is selected from brazzein, miraculin, curculin, pentadin, mabinlin, thaumatin, or any mixture thereof.

18. The fruit topping of paragraph 17, wherein the sweetener enhancer is thaumatin.

19. The fruit topping of paragraph 14, wherein the synthetic sweetener is selected from sorbitol, xylitol, mannitol, sucralose, aspartame, acesulfame-K, neotame, erythritol, trehalose, raffinose, cellobiose, tagatose, DOLCIA PRIMA™ allulose, inulin, N—[N-[3-(3-hydroxy-4-methoxyphenyl)propyl]-alpha-aspartyl]-L-phenylalanine 1-methyl ester, glycyrrhizin, sodium cyclamate, or any mixture thereof.

20. The fruit topping of paragraph 19, wherein the synthetic sweetener is allulose or tagatose or their mixtures.

21. The fruit topping of paragraph 20, wherein the content of synthetic sweetener is above 5%, 10%, 20%, 30%, 40%, 50%, 60%, 70%, 80%, 90%, 95%, 99%, 99.5%.

22. The fruit topping of paragraph 13, wherein the sweetening agent is a *Stevia* extract.

23. The fruit topping of paragraph 20, wherein the *Stevia* extract is a steviol glycoside.

24. The fruit topping of paragraph 1, wherein the fruit topping is a canned or bottled fruit topping.

25. The fruit topping paragraph wherein the fruit topping can be a fruit topping substitute.

Additional Embodiments, Set 41

1. A fruit filling comprising an added Maillard reaction product.

2. The fruit filling of paragraph 1, wherein the fruit filling further comprises a sugar donor.

3. The fruit filling of paragraph 2, wherein the sugar donor comprises a sweetening agent, a sweetener, and/or a sweetener enhancer.

4. The fruit filling of paragraph 3, wherein the sugar donor comprises a sweetening agent.

5. The fruit filling of paragraph 4, wherein the sweetening agent is selected from a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof.

6. The fruit filling of paragraph 3, wherein the sugar donor comprises a sweetener enhancer.

7. The fruit filling of paragraph 6, wherein the sweetener enhancer is selected from brazzein, miraculin, curculin, pentadin, mabinlin, thaumatin, or any mixture thereof.

8. The fruit filling of paragraph 7, wherein the sweetener enhancer comprises thaumatin.

9. The fruit filling of paragraph 3, wherein the sugar donor comprises a sweetening agent and a sweetener enhancer.

10. The fruit filling of paragraph 9, wherein the sweetening agent is selected from a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof.

11. The fruit filling of paragraph 9, wherein the sweetener enhancer is selected from brazzein, miraculin, curculin, pentadin, mabinlin, thaumatin, or any mixture thereof.

12. The fruit filling of paragraph 9, wherein the sweetener enhancer is thaumatin.

13. The fruit filling of paragraph 3, wherein the sugar donor comprises a sweetening agent, a sweetener enhancer and a sweetener.

14. The fruit filling of paragraph 13, wherein the sweetener is a natural sweetener or synthetic sweetener.

15. The fruit filling of paragraph 14, wherein the synthetic sweetener is a high intensity synthetic sweetener.

16. The fruit filling of paragraph 13, wherein the sweetening agent is selected from a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof.

17. The fruit filling of paragraph 13, wherein the sweetener enhancer is selected from brazzein, miraculin, curculin, pentadin, mabinlin, thaumatin, or any mixture thereof.

18. The fruit filling of paragraph 17, wherein the sweetener enhancer is thaumatin.

19. The fruit filling of paragraph 14, wherein the synthetic sweetener is selected from sorbitol, xylitol, mannitol, sucralose, aspartame, acesulfame-K, neotame, erythritol, trehalose, raffinose, cellobiose, tagatose, DOLCIA PRIMA™ allulose, inulin, N—[N-[3-(3-hydroxy-4-methoxyphenyl) propyl]-alpha-aspartyl]-L-phenylalanine 1-methyl ester, glycyrrhizin, sodium cyclamate, or any mixture thereof.

20. The fruit filling of paragraph 19, wherein the synthetic sweetener is allulose or tagatose or their mixtures, 21. The fruit filling of paragraph 20, wherein the content of synthetic sweetener is above 5%, 10%, 20'%, 30%, 40%, 50%, 60%, 70%, 80%, 90%, 95%, 99%, 99.5%.

22. The fruit filling of paragraph 13, wherein the sweetening agent is a *Stevia* extract.

23. The fruit filling of paragraph 20, wherein the *Stevia* extract is a steviol glycoside.

24. The fruit filling of paragraph 1, wherein the fruit filling is a canned or bottled fruit filling.

25. The fruit filling of paragraph 1, wherein the fruit filling can be a fruit filling substitute.

26. The fruit filling of paragraph 1, wherein the fruit filling is for pastries.

Additional Embodiments, Set 42

1. A candy comprising an added Maillard reaction product.

2. The candy of paragraph 1, wherein the candy further comprises a sugar donor.

3. The candy of paragraph 2, wherein the sugar donor comprises a sweetening agent, a sweetener, and/or a sweetener enhancer.

4. The candy of paragraph 3, wherein the sugar donor comprises a sweetening agent.

5. The candy of paragraph 4, wherein the sweetening agent is selected from a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof.

6. The candy of paragraph 3, wherein the sugar donor comprises a sweetener enhancer.

7. The candy of paragraph 6, wherein the sweetener enhancer is selected from brazzein, miraculin, curculin, pentadin, mabinlin, thaumatin, or any mixture thereof.

8. The candy of paragraph 7, wherein the sweetener enhancer comprises thaumatin.

9. The candy of paragraph 3, wherein the sugar donor comprises a sweetening agent and a sweetener enhancer.

10. The candy of paragraph 9, wherein the sweetening agent is selected from a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof.

11. The candy of paragraph 9, wherein the sweetener enhancer is selected from brazzein, miraculin, curculin, pentadin, mabinlin, thaumatin, or any mixture thereof.

12. The candy of paragraph 9, wherein the sweetener enhancer is thaumatin,

13. The candy of paragraph 3, wherein the sugar donor comprises a sweetening agent, a sweetener enhancer and a sweetener.

14. The candy of paragraph 13, wherein the sweetener is a natural sweetener or synthetic sweetener.

15. The candy of paragraph 14, wherein the synthetic sweetener is a high intensity synthetic sweetener.

16. The candy of paragraph 13, wherein the sweetening agent is selected from a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof.

17. The candy of paragraph 13, wherein the sweetener enhancer is selected from brazzein, miraculin, curculin, pentadin, mabinlin, thaumatin, or any mixture thereof.

18. The candy of paragraph 17, wherein the sweetener enhancer is thaumatin.

19. The candy of paragraph 14, wherein the synthetic sweetener is selected from sorbitol, xylitol, mannitol, sucralose, aspartame, acesulfame-K, neotame, erythritol, trehalose, raffinose, cellobiose, tagatose, DOLCIA PRIMA™ allulose, inulin, N—[N-[3-(3-hydroxy-4-methoxyphenyl) propyl]-alpha-aspartyl]-L-phenylalanine 1-methyl ester, glycyrrhizin, sodium cyclamate, or any mixture thereof.

20. The candy of paragraph 19, wherein the synthetic sweetener is allulose or tagatose or their mixtures.

21. The candy of paragraph 20, wherein the content of synthetic sweetener is above 5%, 10%, 20%, 30%, 40%, 50%, 60%, 70%, 80%, 90%, 95%, 99%, 99.5%.

22. The candy of paragraph 13, wherein the sweetening agent is a *Stevia* extract.

23. The candy of paragraph 20, wherein the *Stevia* extract is a steviol glycoside.

24. The candy of paragraph 1, wherein the candy is a canned or bottled candy.

25. The candy of paragraph 1, wherein the candy can be a candy substitute.

Additional Embodiments, Set 43

1. A cocoa product comprising an added Maillard reaction product.

2. The cocoa product of paragraph 1, wherein the cocoa product further comprises a sugar donor.

3. The cocoa product of paragraph 2, wherein the sugar donor comprises a sweetening agent, a sweetener, and/or a sweetener enhancer.

4. The cocoa product of paragraph 3, wherein the sugar donor comprises a sweetening agent.

5. The cocoa product of paragraph 4, wherein the sweetening agent is selected from a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof.

6. The cocoa product of paragraph 3, wherein the sugar donor comprises a sweetener enhancer.

7. The cocoa product of paragraph 6, wherein the sweetener enhancer is selected from brazzein, miraculin, curculin, pentadin, mabinlin, thaumatin, or any mixture thereof.

8. The cocoa product of paragraph 7, wherein the sweetener enhancer comprises thaumatin.

9. The cocoa product of paragraph 3, wherein the sugar donor comprises a sweetening agent and a sweetener enhancer.

10. The cocoa product of paragraph 9, wherein the sweetening agent is selected from a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof.

11. The cocoa product of paragraph 9, wherein the sweetener enhancer is selected from brazzein, miraculin, curculin, pentadin, mabinlin, thaumatin, or any mixture thereof.

12. The cocoa product of paragraph 9, wherein the sweetener enhancer is thaumatin.

13. The cocoa product of paragraph 3, wherein the sugar donor comprises a sweetening agent, a sweetener enhancer and a sweetener.

14. The cocoa product of paragraph 13, wherein the sweetener is a natural sweetener or synthetic sweetener.

15. The cocoa product of paragraph 14, wherein the synthetic sweetener is a high intensity synthetic sweetener.

16. The cocoa product of paragraph 13, wherein the sweetening agent is selected from a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof.

17. The cocoa product of paragraph 13, wherein the sweetener enhancer is selected from brazzein, miraculin, curculin, pentadin, mabinlin, thaumatin, or any mixture thereof.

18. The cocoa product of paragraph 17, wherein the sweetener enhancer is thaumatin.

19. The cocoa product of paragraph 14, wherein the synthetic sweetener is selected from sorbitol, xylitol, mannitol, sucralose, aspartame, acesulfame-K, neotame, erythritol, trehalose, raffinose, cellobiose, tagatose, DOLCIA PRIMA™ allulose, inulin, N—[N-[3-(3-hydroxy-4-methoxyphenyl)propyl]-alpha-aspartyl]-L-phenylalanine 1-methyl ester, glycyrrhizin, sodium cyclamate, or any mixture thereof.

20. The cocoa product of paragraph 19, wherein the synthetic sweetener is allulose or tagatose or their mixtures.

21. The cocoa product of paragraph 20, wherein the content of synthetic sweetener is above 5%, 10%, 20%, 30%, 40%, 50%, 60%, 70%, 80%, 90%, 95%, 99%, 99.5%.

22. The cocoa product of paragraph 13, wherein the sweetening agent is a *Stevia* extract.

23. The cocoa product of paragraph 20, wherein the *Stevia* extract is a steviol glycoside.

24. The cocoa product of paragraph 1, wherein the cocoa product is canned or bottled cocoa product.

25. The cocoa product of paragraph 1, wherein the cocoa product is an imitation cocoa or a substitute.

26. The cocoa product of paragraph 1, wherein the cocoa product is a cocoa mixer including powder or syrups; cocoa based spreads including filings; a milk chocolate bar, chocolate flakes, or white chocolate; or imitation chocolate or chocolate substitute products.

Additional Embodiments, Set 44

1. A sugar-based confectionery comprising an added Maillard reaction product.

2. The sugar-based confectionery of paragraph 1, wherein the sugar-based confectionery further comprises a sugar donor.

3. The sugar-based confectionery of paragraph 2, wherein the sugar donor comprises a sweetening agent, a sweetener, and/or a sweetener enhancer.

4. The sugar-based confectionery of paragraph 3, wherein the sugar donor comprises a sweetening agent.

5. The sugar-based confectionery of paragraph 4, wherein the sweetening agent is selected from a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof.

6. The sugar-based confectionery of paragraph 3, wherein the sugar donor comprises a sweetener enhancer.

7. The sugar-based confectionery of paragraph 6, wherein the sweetener enhancer is selected from brazzein, miraculin, curculin, pentadin, mabinlin, thaumatin, or any mixture thereof.

8. The sugar-based confectionery of paragraph 7, wherein the sweetener enhancer comprises thautnatin.

9. The sugar-based confectionery of paragraph 3, wherein the sugar donor comprises a sweetening agent and a sweetener enhancer.

10. The sugar-based confectionery of paragraph 9, wherein the sweetening agent is selected from a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof.

11. The sugar-based confectionery of paragraph 9, wherein the sweetener enhancer is selected from brazzein, miraculin, curculin, pentadin, mabinlin, thaumatin, or any mixture thereof.

12. The sugar-based confectionery of paragraph 9, wherein the sweetener enhancer is thaumatin.

13. The sugar-based confectionery of paragraph 3, wherein the sugar donor comprises a sweetening agent, a sweetener enhancer and a sweetener.

14. The sugar-based confectionery of paragraph 13, wherein the sweetener is a natural sweetener or synthetic sweetener.

15. The sugar-based confectionery of paragraph 14, wherein the synthetic sweetener is a high intensity synthetic sweetener.

16. The sugar-based confectionery of paragraph 13, wherein the sweetening agent is selected from a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof.

17. The sugar-based confectionery of paragraph 13, wherein the sweetener enhancer is selected from brazzein, miraculin, curculin, pentadin, mabinlin, thaumatin, or any mixture thereof.

18. The sugar-based confectionery of paragraph 17, wherein the sweetener enhancer is thaumatin.

19. The sugar-based confectionery of paragraph 14, wherein the synthetic sweetener is selected from sorbitol, xylitol, mannitol, sucralose, aspartame, acesulfame-K, neotame, erythritol, trehalose, raffinose, cellobiose, tagatose, DOLCIA PRIMA™ allulose, inulin, N—[N-[3-(3-hydroxy-4-methoxyphenyl)propyl]-alpha-aspartyl]-L-phenylalanine 1-methyl ester, glycyrrhizin, sodium cyclamate, or any mixture thereof.

20. The sugar-based confectionery of paragraph 19, wherein the synthetic sweetener is allulose or tagatose or their mixtures.

21. The sugar-based confectionery of paragraph 20, wherein the content of synthetic sweetener is above 5%, 10%, 20%, 30%, 40%, 50%, 60%, 70%, 80%, 90%, 95%, 99%, 99.5%.

22. The sugar-based confectionery of paragraph 13, wherein the sweetening agent is a *Stevia* extract.

23. The sugar-based confectionery of paragraph 20, wherein the *Stevia* extract is a steviol glycoside.

24. The sugar-based confectionery of paragraph 1, wherein the sugar-based confectionery is a canned or bottled sugar-based confectionery.

25. The sugar-based confectionery of paragraph 1, wherein the sugar-based confectionery is hard or soft candy or nougats; or a sugar-based confectionery substitute.

Additional Embodiments, Set 45

1. A chewing gum comprising an added Maillard reaction product.

2. The chewing gum of paragraph 1, wherein the chewing gum further comprises a sugar donor.

3. The chewing gum of paragraph 2, wherein the sugar donor comprises a sweetening agent, a sweetener, and/or a sweetener enhancer.

4. The chewing gum of paragraph 3, wherein the sugar donor comprises a sweetening agent.

5. The chewing gum of paragraph 4, wherein the sweetening agent is selected from a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof.

6. The chewing gum of paragraph 3, wherein the sugar donor comprises a sweetener enhancer.

7. The chewing gum of paragraph 6, wherein the sweetener enhancer is selected from brazzein, miraculin, curculin, pentadin, mabinlin, thaumatin, or any mixture thereof, 8. The chewing gum of paragraph 7, wherein the sweetener enhancer comprises thaumatin.

9. The chewing gum of paragraph 3, wherein the sugar donor comprises a sweetening agent and a sweetener enhancer.

10. The chewing gum of paragraph 9, wherein the sweetening agent is selected from a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof.

11. The chewing gum of paragraph 9, wherein the sweetener enhancer is selected from brazzein, miraculin, curculin, pentadin, mabinlin, thaumatin, or any mixture thereof.

12. The chewing gum of paragraph 9, wherein the sweetener enhancer is thaumatin.

13. The chewing gum of paragraph 3, wherein the sugar donor comprises a sweetening agent, a sweetener enhancer and a sweetener.

14. The chewing gum of paragraph 13, wherein the sweetener is a natural sweetener or synthetic sweetener.

15. The chewing gum of paragraph 14, wherein the synthetic sweetener is a high intensity synthetic sweetener.

16. The chewing gum of paragraph 13, wherein the sweetening agent is selected from a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof.

17. The chewing gum of paragraph 13, wherein the sweetener enhancer is selected from brazzein, miraculin, curculin, pentadin, mabinlin, thaumatin, or any mixture thereof.

18. The chewing gum of paragraph 17, wherein the sweetener enhancer is thaumatin.

19. The chewing gum of paragraph 14, wherein the synthetic sweetener is selected from sorbitol, xylitol, mannitol, sucralose, aspartame, acesulfame-K, neotame, erythritol, trehalose, raffinose, cellobiose, tagatose, DOLCIA PRIMA™ allulose inulin N—[N-[3-(3-hydroxy-4-methoxyphenyl)propyl]-alpha-aspartyl]-L-phenylalanine 1-methyl ester, glycyrrhizin, sodium cyclamate, or any mixture thereof.

20. The chewing gum of paragraph 19, wherein the synthetic sweetener is allulose or tagatose or their mixtures.

21. The chewing gum of paragraph 20, wherein the content of synthetic sweetener is above 5%, 10%, 20%, 30%, 40%, 50%, 60%, 70%, 80%, 90%, 95%, 99%, 99.5%.

22. The chewing gum of paragraph 13, wherein the sweetening agent is a *Stevia* extract.

23. The chewing gum of paragraph 20, wherein the *Stevia* extract is a steviol glycoside.

24. The chewing gum of paragraph 1, wherein the chewing gum is canned or packaged chewing gum.

25. The chewing gum of paragraph 1, wherein the chewing gum can be a chewing gum substitute.

Additional Embodiments, Set 46

1. A decoration product comprising an added Maillard reaction product.

2. The decoration product of paragraph 1, wherein the decoration product further comprises a sugar donor.

3. The decoration product of paragraph 2, wherein the sugar donor comprises a sweetening agent, a sweetener, and/or a sweetener enhancer.

4. The decoration product of paragraph 3, wherein the sugar donor comprises a sweetening agent, 5. The decoration product of paragraph 4, wherein the sweetening agent is selected from a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof.

6. The decoration product of paragraph 3, wherein the sugar donor comprises a sweetener enhancer.

7. The decoration product of paragraph 6, wherein the sweetener enhancer is selected from brazzein, miraculin, curculin, pentadin, mabinlin, thaumatin, or any mixture thereof.

8. The decoration product of paragraph 7, wherein the sweetener enhancer comprises thaumatin.

9. The decoration product of paragraph 3, wherein the sugar donor comprises a sweetening agent and a sweetener enhancer.

10. The decoration product of paragraph 9, wherein the sweetening agent is selected from a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof.

11. The decoration product of paragraph 9, wherein the sweetener enhancer is selected from brazzein, miraculin, curculin, pentadin, mabinlin, thaumatin, or any mixture thereof.

12. The decoration product of paragraph 9, wherein the sweetener enhancer is thaumatin.

13. The decoration product of paragraph 3, wherein the sugar donor comprises a sweetening agent, a sweetener enhancer and a sweetener.

14. The decoration product of paragraph 13, wherein the sweetener is a natural sweetener or synthetic sweetener.

15. The decoration product of paragraph 14, wherein the synthetic sweetener is a high intensity synthetic sweetener.

16. The decoration product of paragraph 13, wherein the sweetening agent is selected from a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof.

17. The decoration product of paragraph 13, wherein the sweetener enhancer is selected from brazzein, miraculin, curculin, pentadin, mabinlin, thaumatin, or any mixture thereof.

18. The decoration product of paragraph 17, wherein the sweetener enhancer is thaumatin.

19. The decoration product of paragraph 14, wherein the synthetic sweetener is selected from sorbitol, xylitol, mannitol, sucralose, aspartame, acesulfame-K, neotame, erythritol, trehalose, raffinose, cellobiose, tagatose, DOLCIA PRIMA™ allulose, inulin, N—[N-[3-(3-hydroxy-4-methoxyphenyl)propyl]-alpha-aspartyl]-L-phenylalanine 1-methyl ester, glycyrrhizin, sodium cyclamate, or any mixture thereof.

20. The decoration product of paragraph 19, wherein the synthetic sweetener is allulose or tagatose or their mixtures.

21. The decoration product of paragraph 20, wherein the content of synthetic sweetener is above 5%, 10%, 20%, 30%, 40%, 50%, 60%, 70%, 80%, 90%, 95%, 99%, 99.5%.

22. The decoration product of paragraph 13, wherein the sweetening agent is a *Stevia* extract.

23. The decoration product of paragraph 20, wherein the *Stevia* extract is a steviol glycoside.

24. The decoration product of paragraph 1, wherein the decoration product is for fine bakery ware or toppings.

25. The decoration product of paragraph 1, wherein the decoration product can be a decoration product substitute.

Additional Embodiments, Set 47

1. A sauce comprising an added Maillard reaction product.

2. The sauce of paragraph 1, wherein the sauce further comprises a sugar donor.

3. The sauce of paragraph 2, wherein the sugar donor comprises a sweetening agent, a sweetener, and/or a sweetener enhancer.

4. The sauce of paragraph 3, wherein the sugar donor comprises a sweetening agent.

5. The sauce of paragraph 4, wherein the sweetening agent is selected from a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof.

6. The sauce of paragraph 3, wherein the sugar donor comprises a sweetener enhancer.

7. The sauce of paragraph 6, wherein the sweetener enhancer is selected from brazzein, miraculin, curculin, pentadin, mabinlin, thaumatin, or any mixture thereof.

8. The sauce of paragraph 7, wherein the sweetener enhancer comprises thaumatin.

9. The sauce of paragraph 3, wherein the sugar donor comprises a sweetening agent and a sweetener enhancer.

10. The sauce of paragraph 9, wherein the sweetening agent is selected from a licorice extract, a sweet tea extract, a *Stevia* extract, a swingle extract, a glycosylated sweet tea extract, a. glycosylated *Stevia* extract, a glycosylated swingle extract, a glycosylated sweet tea glycoside, a glycosylated steviol glycoside, a glycosylated mogroside, or any mixture thereof.

11 The sauce of paragraph 9, wherein the sweetener enhancer is selected from brazzein, miraculin, curculin, pentadin, mabinlin, thaumatin, or any mixture thereof.

12. The sauce of paragraph 9, wherein the sweetener enhancer is thaumatin,

13. The sauce of paragraph 3, wherein the sugar donor comprises a sweetening agent, a sweetener enhancer and a sweetener.

14. The sauce of paragraph 13, wherein the sweetener is a natural sweetener or synthetic sweetener.

15. The sauce of paragraph 14, wherein the synthetic sweetener is a high intensity synthetic sweetener.

16. The sauce of paragraph 13, wherein the sweetening agent is selected from a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof.

17. The sauce of paragraph 13, wherein the sweetener enhancer is selected from brazzein, miraculin, curculin, pentadin, mabinlin, thaumatin, or any mixture thereof.

18. The sauce of paragraph 17, wherein the sweetener enhancer is thaumatin.

19. The sauce of paragraph 14, wherein the synthetic sweetener is selected from sorbitol, xylitol, mannitol, sucralose, aspartame, acesulfame-K, neotame, erythritol, trehalose, raffinose, cellobiose, tagatose, DOLCIA PRIMA™ allulose, inulin, N—[N-[3-(3-hydroxy-4-methoxyphenyl) propyl]-alpha-aspartyl]-L-phenylalanine 1-methyl ester, glycyrrhizin, sodium cyclamate, or any mixture thereof.

20. The sauce of paragraph 19, wherein the synthetic sweetener is alluloseatose or their mixtures.

21. The sauce of paragraph 20, wherein the content of synthetic sweetener is above 5%, 10%, 20%, 30%, 40%, 50%, 60%, 70%, 80%, 90%, 95%, 99%, 99.5%, 22. The sauce of paragraph 13, wherein the sweetening agent is a *Stevia* extract.

23. The sauce of paragraph 20, wherein the *Stevia* extract is a steviol glycoside.

24. The sauce of paragraph 1, wherein the sauce is a canned or bottled sauce.

25. The sauce of paragraph 1, wherein the sauce can be a sauce substitute.

26. The sauce of paragraph 1, wherein the sauce is a sweet sauce.

Additional Embodiments, Set 48

1. A grain product comprising an added Mail lard reaction product.

2. The grain product of paragraph 1, wherein the grain product further comprises a sugar donor.

3. The grain product of paragraph 2, wherein the sugar donor comprises a sweetening agent, a sweetener, and/or a sweetener enhancer.

4. The grain product of paragraph 3, wherein the sugar donor comprises a sweetening agent.

5. The grain product of paragraph 4, wherein the sweetening agent is selected from a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof.

6. The grain product of paragraph 3, wherein the sugar donor comprises a sweetener enhancer.

7. The grain product of paragraph 6, wherein the sweetener enhancer is selected from brazzein, miraculin, curculin, pentadin, mabinlin, thaumatin, or any mixture thereof.

8. The grain product of paragraph 7, wherein the sweetener enhancer comprises thaumatin.

9. The grain product of paragraph 3, wherein the sugar donor comprises a sweetening agent and a sweetener enhancer.

10. The grain product of paragraph 9, wherein the sweetening agent is selected from a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof.

11. The grain product of paragraph 9, wherein the sweetener enhancer is selected from brazzein, miraculin, curculin, pentadin, mabinlin, thaumatin, or any mixture thereof.

12. The grain product of paragraph 9, wherein the sweetener enhancer is thaumatin.

13. The grain product of paragraph 3, wherein the sugar donor comprises a sweetening agent, a sweetener enhancer and a sweetener.

14. The grain product of paragraph 13, wherein the sweetener is a natural r or synthetic sweetener.

15. The grain product of paragraph 14, wherein the synthetic sweetener is a high intensity synthetic sweetener.

16. The grain product of paragraph 13, wherein the sweetening agent is selected from a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof.

17. The grain product of paragraph 13, wherein the sweetener enhancer is selected from brazzein, miraculin, curculin, pentadin, mabinlin, thaumatin, or any mixture thereof.

18. The grain product of paragraph 17, wherein the sweetener enhancer is thaumatin.

19. The grain product of paragraph 14, wherein the synthetic sweetener is selected from sorbitol, xylitol, mannitol, sucralose, aspartame, acesulfame-K, neotame, erythritol, trehalose, raffinose, cellobiose, tagatose, DOLCIA PRIMA™ allulose, inulin, N—[N-[3-(3-hydroxy-4-methoxyphenyl)propyl]-alpha-aspartyl]-L-phenylalanine 1-methyl ester, glycyrrhizin, sodium cyclamate, or any mixture thereof.

20. The grain product of paragraph 19, wherein the synthetic sweetener is allulose or tagatose or their mixtures.

121. The grain product of paragraph 20, wherein the content of synthetic sweetener is above 5%, 10%, 20%, 30%, 40%, 50%, 60%, 70%, 80%, 90%, 95%, 99%, 99.5%.

22. The grain product of paragraph 13, wherein the sweetening agent is a *Stevia* extract.

23. The grain product of paragraph 20, wherein the *Stevia* extract is a steviol glycoside.

24. The grain product of paragraph 1, wherein the grain product is a canned or bottled grain product.

25. The grain product of paragraph 1, wherein the grain product can be a grain product substitute.

26. The grain product of paragraph 1, wherein the grain product is a whole, milled or flaked grain including rice.

Additional Embodiments, Set 49

1. A flour or starch comprising an added Maillard reaction product.

2. The flour or starch of paragraph 1, wherein the flour or starch further comprises a sugar donor, 3. The flour or starch of paragraph 2, wherein the sugar donor comprises a sweetening agent, a sweetener, and/or a sweetener enhancer.

4. The flour or starch of paragraph 3, wherein the sugar donor comprises a sweetening agent.

5. The flour or starch of paragraph 4, wherein the sweetening agent is selected from a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof.

6. The flour or starch of paragraph 3, wherein the sugar donor comprises a sweetener enhancer.

7. The flour or starch of paragraph 6, wherein the sweetener enhancer is selected from brazzein, miraculin, curculin, pentadin, mabinlin, thaumatin, or any mixture thereof.

8. The flour or starch of paragraph 7, wherein the sweetener enhancer comprises thaumatin.

9. The flour or starch of paragraph 3, wherein the sugar donor comprises a sweetening agent and a sweetener enhancer.

10. The flour or starch of paragraph 9, wherein the sweetening agent is selected from a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof.

11. The flour or starch of paragraph 9, wherein the sweetener enhancer is selected from brazzein, miraculin, curculin, pentadin, mabinlin, thaumatin, or any mixture thereof.

12. The flour or starch of paragraph 9, wherein the sweetener enhancer is thaumatin.

13. The flour or starch of paragraph 3, wherein the sugar donor comprises a sweetening agent, a sweetener enhancer and a sweetener.

14. The flour or starch of paragraph 13, wherein the sweetener is a natural sweetener or synthetic sweetener.

15. The flour or starch of paragraph 14, wherein the synthetic sweetener is a high intensity synthetic sweetener.

16. The flour or starch of paragraph 13, wherein the sweetening agent is selected from a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof.

17. The flour or starch of paragraph 13, wherein the sweetener enhancer is selected from brazzein, miraculin, curculin, pentadin, mabinlin, thaumatin, or any mixture thereof.

18. The flour or starch of paragraph 17, wherein the sweetener enhancer is thaumatin.

19. The flour or starch of paragraph 14, wherein the synthetic sweetener is selected from sorbitol, xylitol, mannitol, sucralose, aspartame, acesulfame-K, neotame, erythritol, trehalose, raffinose, cellobiose, tagatose, DOLCIA PRIMA™ allulose, inulin, N—[N-[3-(3-hydroxy-4-methoxyphenyl)propyl]-alpha-aspartyl]-L-phenyl alanine 1-methyl ester, glycyrrhizin, sodium cyclamate, or any mixture thereof.

20. The flour or starch of paragraph 19, wherein the synthetic sweetener is allulose or tagatose or their mixtures, 21. The flour or starch of paragraph 20, wherein the content of synthetic sweetener is above 5%, 10%, 20%, 30%, 40%, 50%, 60%, 70%, 80%, 90%, 95%, 99%, 99.5%.

22. The flour or starch of paragraph 13, wherein the sweetening agent is a Stevia extract.

23. The flour or starch of paragraph 20, wherein the *Stevia* extract is a steviol glycoside.

24. The flour or starch of paragraph 1, wherein the flour or starch is a canned or bottled flour or starch.

25. The flour or starch of paragraph 1, wherein the flour or starchcan be a flour or starch substitute.

Additional Embodiments, Set 50

1. A breakfast cereal product comprising an added Mail lard reaction product.

2. The breakfast cereal product of paragraph 1, wherein the breakfast cereal product further comprises a sugar donor.

3. The breakfast cereal product of paragraph 2, wherein the sugar donor comprises a sweetening agent, a sweetener, and/or a sweetener enhancer.

4. The breakfast cereal product of paragraph 3, wherein the sugar donor comprises a sweetening agent.

5. The breakfast cereal product of paragraph 4, wherein the sweetening agent is selected from a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof.

6. The breakfast cereal product of paragraph 3, wherein the sugar donor comprises a sweetener enhancer, 7. The breakfast cereal product of paragraph 6, wherein the sweetener enhancer is selected from brazzein, miraculin, curculin, pentadin, mabinlin, thaumatin, or any mixture thereof.

8. The breakfast cereal product of paragraph 7, wherein the sweetener enhancer comprises thaumatin.

9. The breakfast cereal product of paragraph 3, wherein the sugar donor comprises a sweetening agent and a sweetener enhancer.

10. The breakfast cereal product of paragraph 9, wherein the sweetening agent is selected from a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof.

11. The breakfast cereal product of paragraph 9, wherein the sweetener enhancer is selected from brazzein, miraculin, curculin, pentadin, mabinlin, thautnatin, or any mixture thereof.

12. The breakfast cereal product of paragraph 9, wherein the sweetener enhancer is thaumatin.

13. The breakfast cereal product of paragraph 3, wherein the sugar donor comprises a sweetening agent, a sweetener enhancer and a sweetener.

14. The breakfast cereal product of paragraph 13, wherein the sweetener is a natural sweetener or synthetic sweetener.

15. The breakfast cereal product of paragraph 14, wherein the synthetic sweetener is a high intensity synthetic sweetener.

16. The breakfast cereal product of paragraph 13, wherein the sweetening agent is selected from a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof.

17. The breakfast cereal product of paragraph 13, wherein the sweetener enhancer is selected from brazzein, miraculin, curculin, pentadin, mabinlin, thaumatin, or any mixture thereof.

18. The breakfast cereal product of paragraph 17, wherein the sweetener enhancer is thaumatin.

19. The breakfast cereal product of paragraph 14, wherein the synthetic sweetener is selected from sorbitol, xylitol, mannitol, sucralose, aspartame, acesulfame-K, neotame, erythritol, trehalose, raffinose, cellobiose, tagatose, DOLCIA PRIMA™ allulose, inulin, N—[N-[3-(3-hydroxy-4-methoxyphenyl)propyl]-alpha-aspartyl]-L-phenylalanine 1-methyl ester, glycyrrhizin, sodium cyclamate, or any mixture thereof.

20. The breakfast cereal product of paragraph 19, wherein the synthetic sweetener is allulose or tagatose or their mixtures, 21. The breakfast cereal product of paragraph 20, wherein the content of synthetic sweetener is above 5%, 10%, 20%, 30%, 40%, 50%, 60%, 70%, 80%, 90%, 95%, 99%, 99.5%.

22. The breakfast cereal product of paragraph 13, wherein the sweetening agent is a *Stevia* extract.

23. The breakfast cereal product of paragraph 20, wherein the *Stevia* extract is a steviol glycoside.

24. The breakfast cereal product of paragraph 1, wherein the breakfast cereal product is a canned or packaged breakfast cereal product.

25. The breakfast cereal product of paragraph 1, wherein the breakfast cereal product can be a breakfast cereal product substitute.

Additional Embodiments, Set 51

1. A rolled oats product comprising an added Maillard reaction product.

2. The rolled oats product of paragraph 1, wherein the rolled oats product further comprises a sugar donor.

3. The rolled oats product of paragraph 2, wherein the sugar donor comprises a sweetening agent, a sweetener, and/or a sweetener enhancer.

4. The rolled oats product of paragraph 3, wherein the sugar donor comprises a sweetening agent.

5. The rolled oats product of paragraph 4, wherein the sweetening agent is selected from a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof.

6. The rolled oats product of paragraph 3, wherein the sugar donor comprises a sweetener enhancer.

7. The rolled oats product of paragraph 6, wherein the sweetener enhancer is selected from brazzein, miraculin, curculin, pentadin, mabinlin, thaumatin, or any mixture thereof.

8. The rolled oats product of paragraph 7, wherein the sweetener enhancer comprises thaumatin.

9. The rolled oats product of paragraph 3, wherein the sugar donor comprises a sweetening agent and a sweetener enhancer.

10. The rolled oats product of paragraph 9, wherein the sweetening agent is selected from a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof.

11. The rolled oats product of paragraph 9, wherein the sweetener enhancer is selected from brazzein, miraculin, curculin, pentadin, mabinlin, thaumatin, or any mixture thereof.

12. The rolled oats product of paragraph 9, wherein the sweetener enhancer is thaumatin.

13. The rolled oats product of paragraph 3, wherein the sugar donor comprises a sweetening agent, a sweetener enhancer and a sweetener.

14. The rolled oats product of paragraph 13, wherein the sweetener is a natural sweetener or synthetic sweetener.

15. The rolled oats product of paragraph 14, wherein the synthetic sweetener is a high intensity synthetic sweetener.

16. The rolled oats product of paragraph 13, wherein the sweetening agent is selected from a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof.

17. The rolled oats product of paragraph 13, wherein the sweetener enhancer is selected from brazzein, miraculin, curculin, pentadin, mabinlin, thaumatin, or any mixture thereof.

18. The rolled oats product of paragraph 17, wherein the sweetener enhancer is thaumatin.

19. The rolled oats product of paragraph 14, wherein the synthetic sweetener is selected from sorbitol, xylitol, mannitol, sucralose, aspartame, acesulfame-K, neotame, erythritol, trehalose, raffinose, cellobiose, tagatose, DOLCIA PRIMA™ allulose, inulin, N—[N-[3-(3-hydroxy-4-methoxy phenyl)propyl]-alpha-aspartyl]-L-phenylalanine 1-methyl ester, glycyrrhizin, sodium cyclamate, or any mixture thereof.

20. The rolled oats product of paragraph 19, wherein the synthetic sweetener is allulose or tagatose or their mixtures.

21. The rolled oats product of paragraph 20, wherein the content of synthetic sweetener is above 5%, 10%, 20%, 30%, 40%, 50%, 60%, 70%, 80%, 90%, 95%, 99%, 99.5%.

22. The rolled oats product of paragraph 13, wherein the sweetening agent is a Stevia extract.

23. The rolled oats product of paragraph 20, wherein the *Stevia* extract is a steviol glycoside.

24. The rolled oats product of paragraph 1, wherein the rolled oats product is canned or packaged rolled oats product.

25. The rolled oats product of paragraph 1, wherein the rolled oats product can be a rolled oats product substitute.

Additional Embodiments, Set 52

1. A pasta or noodle comprising an added Maillard reaction product.

2. The pasta or noodle of paragraph 1, wherein the pasta or noodle further comprises a sugar donor.

3. The pasta or noodle of paragraph 2, wherein the sugar donor comprises a sweetening agent, a sweetener, and/or a sweetener enhancer.

4. The pasta or noodle of paragraph 3, wherein the sugar donor comprises a sweetening agent.

5. The pasta or noodle of paragraph 4, wherein the sweetening agent is selected from a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof.

6. The pasta or noodle of paragraph 3, wherein the sugar donor comprises a sweetener enhancer.

7. The pasta or noodle of paragraph 6, wherein the sweetener enhancer is selected from brazzein, miraculin, curculin, pentadin, mabinlin, thaumatin, or any mixture thereof.

8. The pasta or noodle of paragraph 7, wherein the sweetener enhancer comprises thaumatin.

9. The pasta or noodle of paragraph 3, herein the sugar donor comprises a sweetening agent and a sweetener enhancer.

10. The pasta or noodle of paragraph 9, wherein the sweetening agent is selected from a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof.

11. The pasta or noodle of paragraph 9, wherein the sweetener enhancer is selected from brazzein, miraculin, curculin, pentadin, mabinlin, thaumatin, or any mixture thereof.

12. The pasta or noodle of paragraph 9, wherein the sweetener enhancer is thaumatin.

13. The pasta or noodle of paragraph 3, wherein the sugar donor comprises a sweetening agent, a sweetener enhancer and a sweetener.

14. The pasta or noodle of paragraph 13, wherein the sweetener is a natural sweetener or synthetic sweetener.

15. The pasta or noodle of paragraph 14, wherein the synthetic sweetener is a high intensity synthetic sweetener.

16. The pasta or noodle of paragraph 13, wherein the sweetening agent is selected from a licorice extract, a sweet tea extract, a *Stevia* extract, a swingy: extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof.

17. The pasta or noodle of paragraph 13, wherein the sweetener enhancer is selected from brazzein, miraculin, curculin, pentadin, mabinlin, thaumatin, or any mixture thereof.

18. The pasta or noodle of paragraph 17, wherein the sweetener enhancer is thaumatin.

19. The pasta or noodle of paragraph 14, wherein the synthetic sweetener is selected from sorbitol, xylitol, mannitol, sucralose, aspartame, acesulfame-K, neotame, erythritol, trehalose, raffinose, cellobiose, tagatose, DOLCIA PRIMA™ allulose, inulin, N—[N-[3-(3-hydroxy-4-methoxyphenyl)propyl]-alpha-aspartyl]-L-phenylalanine 1-methyl ester, glycyrrhizin, sodium cyclamate, or any mixture thereof.

20. The pasta or noodle of paragraph 19, wherein the synthetic sweetener is allulose or tagatose or their mixtures.

21. The pasta or noodle of paragraph 20, wherein the content of synthetic sweetener is above 5%, 10%, 20%, 30%, 40%, 50%, 60%, 70%, 80%, 90%, 95%, 99%, 99.5%.

22. The pasta or noodle of paragraph 13, wherein the sweetening agent is a Stevia extract.

23. The pasta or noodle of paragraph 20, wherein the *Stevia* extract is a steviol glycoside.

24. The pasta or noodle of paragraph 1, wherein the pasta or noodle is a canned or packaged pasta or noodle.

25. The pasta or noodle of paragraph 1, wherein the pasta or noodle can be a pasta or noodle substitute.

Additional Embodiments, Set 53

1. A cereal comprising an added Maillard reaction product.

2. The cereal of paragraph 1, wherein the cereal further comprises a sugar donor.

3. The cereal of paragraph 2, wherein the sugar donor comprises a sweetening agent, a sweetener, and/or a sweetener enhancer.

4. The cereal of paragraph 3, wherein the sugar donor comprises a sweetening agent.

5. The cereal of paragraph 4, wherein the sweetening agent is selected from a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof.

6. The cereal of paragraph 3, wherein the sugar donor comprises a sweetener enhancer.

7. The cereal of paragraph 6, wherein the sweetener enhancer is selected from brazzein, miraculin, curculin, pentadin, mabinlin, thaumatin, or any mixture thereof.

8. The cereal of paragraph 7, wherein the sweetener enhancer comprises thautnatin.

9. The cereal of paragraph 3, wherein the sugar donor comprises a sweetening agent and a sweetener enhancer.

10. The cereal of paragraph 9, wherein the sweetening agent is selected from a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof.

11. The cereal of paragraph 9, wherein the sweetener enhancer is selected from brazzein, miraculin, curculin, pentadin, mabinlin, thaumatin, or any mixture thereof.

12. The cereal of paragraph 9, wherein the sweetener enhancer is thaumatin.

13, The cereal of paragraph 3, wherein the sugar donor comprises a sweetening agent, a sweetener enhancer and a sweetener.

14. The cereal of paragraph 13, wherein the sweetener is a natural sweetener or synthetic sweetener.

15. The cereal of paragraph 14, wherein the synthetic sweetener is a high intensity synthetic sweetener.

16. The cereal of paragraph 13, wherein the sweetening agent is selected from a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof.

17. The cereal of paragraph 13, wherein the sweetener enhancer is selected from brazzein, miraculin, curculin, pentadin, mabinlin, thaumatin, or any mixture thereof.

18. The cereal of paragraph 17, wherein the sweetener enhancer is thaumatin.

19. The cereal of paragraph 14, wherein the synthetic sweetener is selected from sorbitol, xylitol, mannitol, sucralose, aspartame, acesulfame-K, neotame, erythritol, trehalose, raffinose, cellobiose, tagatose, DOLCIA PRIMA™ allulose, inulin, N—[N-[3-(3-hydroxy-4-methoxyphenyl)propyl]-alpha-aspartyl]-L-phenylalanine 1-methyl ester, glycyrrhizin, sodium cyclamate, or any mixture thereof.

20. The cereal of paragraph 19, wherein the synthetic sweetener is allulose or tagatose or their mixtures.

21. The cereal of paragraph 20, wherein the content of synthetic sweetener is above 5%, 10%, 20%, 30%, 40%, 50%, 60%, 70%, 80%, 90%, 95%, 99%, 99.5%.

22. The cereal of paragraph 13, wherein the sweetening agent is a *Stevia* extract.

23. The cereal of paragraph 20, wherein the *Stevia* extract is a steviol glycoside.

24. The cereal of paragraph 1, wherein the cereal is a canned or packaged cereal.

25. The cereal of paragraph 1, wherein the cereal is from roots or tubers, or pulses or legumes.

Additional Embodiments, Set 54

1. A bread comprising an added Maillard reaction product.

2. The bread of paragraph 1, wherein the bread further comprises a sugar donor.

3. The bread of paragraph 2, wherein the sugar donor comprises a sweetening agent, a sweetener, and/or a sweetener enhancer.

4. The bread of paragraph 3, wherein the sugar donor comprises a sweetening agent.

5. The bread of paragraph 4, wherein the sweetening agent is selected from a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof.

6. The bread of paragraph 3, wherein the sugar donor comprises a sweetener enhancer.

7. The bread of paragraph 6, wherein the sweetener enhancer is selected from brazzein, miraculin, curculin, pentadin, mabinlin, thaumatin, or any mixture thereof.

8. The bread of paragraph 7, wherein the sweetener enhancer comprises thaumatin.

9. The bread of paragraph 3, wherein the sugar donor comprises a sweetening agent and a sweetener enhancer.

10. The bread of paragraph 9, wherein the sweetening agent is selected from a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof.

11. The bread of paragraph 9, wherein the sweetener enhancer is selected from brazzein, miraculin, curculin, pentadin, mabinlin, thaumatin, or any mixture thereof.

12. The bread of paragraph 9, wherein the sweetener enhancer is thaumatin.

13. The bread of paragraph 3, wherein the sugar donor comprises a sweetening agent, a sweetener enhancer and a sweetener.

14. The bread of paragraph 13, wherein the sweetener is a natural sweetener or synthetic sweetener.

15. The bread of paragraph 14, wherein the synthetic sweetener is a high intensity synthetic sweetener.

16. The bread of paragraph 13, wherein the sweetening agent is selected from a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof.

17. The bread of paragraph 13, wherein the sweetener enhancer is selected from brazzein, miraculin, curculin, pentadin, mabinlin, thaumatin, or any mixture thereof.

18. The bread of paragraph 17, wherein the sweetener enhancer is thaumatin,

19. The bread of paragraph 14, wherein the synthetic sweetener is selected from sorbitol, mannitol, sucralose, aspartame, acesulfame-K, neotame, erythritol, trehalose, raffinose, cellobiose, tagatose, DOLCIA PRIMA™ allulose, inulin, N—[N-[3-(3-hydroxy-4-methoxyphenyl)propyl]-alpha-aspartyl]-L-phenylalanine 1-methyl ester, glycyrrhizin, sodium cyclamate, or any mixture thereof.

20. The bread of paragraph 1.9, wherein the synthetic sweetener is allulose or tagatose or their mixtures.

21. The bread of paragraph 20, wherein the content of synthetic sweetener is above 5%, 10%, 20%, 30%, 40%, 50%, 60%, 70%, 80%, 90%, 95%, 99%, 99.5%.

22. The bread of paragraph 13, wherein the sweetening agent is a *Stevia* extract.

23. The bread of paragraph 20, wherein the *Stevia* extract is a steviol glycoside.

24. The bread of paragraph 1, wherein the bread is a baked roll, or bread-type product such as: bread stuffing or breadcrumbs 25. The bread of paragraph 1, wherein the bread can be a bread substitute.

Additional Embodiments, Set 55

1. A cracker comprising an added Maillard reaction product.

2. The cracker of paragraph 1, wherein the cracker further comprises a sugar donor.

3. The cracker of paragraph 2, wherein the sugar donor comprises a sweetening agent, a sweetener, and/or a sweetener enhancer.

4. The cracker of paragraph 3, wherein the sugar donor comprises a sweetening agent.

5. The cracker of paragraph 4, wherein the sweetening agent is selected from a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof.

6. The cracker of paragraph 3, wherein the sugar donor comprises a sweetener enhancer.

7. The cracker of paragraph 6, wherein the sweetener enhancer is selected from brazzein, miraculin, curculin, pentadin, mabinlin, thaumatin, or any mixture thereof.

8. The cracker of paragraph 7, wherein the sweetener enhancer comprises thaumatin.

9. The cracker of paragraph 3, wherein the sugar donor comprises a sweetening agent and a sweetener enhancer.

10. The cracker of paragraph 9, wherein the sweetening agent is selected from a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof.

11. The cracker of paragraph 9, wherein the sweetener enhancer is selected from brazzein, miraculin, curculin, pentadin, mabinlin, thaumatin, or any mixture thereof.

12. The cracker of paragraph 9, wherein the sweetener enhancer is thaumatin.

13. The cracker of paragraph 3, wherein the sugar donor comprises a sweetening agent, a sweetener enhancer and a sweetener.

14. The cracker of paragraph 13, wherein the sweetener is a natural sweetener or synthetic sweetener.

15. The cracker of paragraph 14, wherein the synthetic sweetener is a high intensity synthetic sweetener.

16. The cracker of paragraph 13, wherein the sweetening agent is selected from a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof.

17. The cracker of paragraph 13, wherein the sweetener enhancer is selected from brazzein, miraculin, curculin, pentadin, mabinlin, thaumatin, or any mixture thereof.

18. The cracker of paragraph 17, wherein the sweetener enhancer is thaumatin.

19. The cracker of paragraph 14, wherein the synthetic sweetener is selected from sorbitol, xylitol, mannitol, sucralose, aspartame, acesulfame-K, neotame, erythritol, trehalose, raffinose, cellobiose, tagatose, DOLCIA PRIMA™ allulose, inulin, N—[N-[3-(3-hydroxy-4-methoxyphenyl)propyl]-alpha-aspartyl]-L-phenylalanine 1-methyl ester, glycyrrhizin, sodium cyclamate, or any mixture thereof.

20. The cracker of paragraph 1.9, wherein the synthetic sweetener is allulose or tagatose or their mixtures.

21. The cracker of paragraph 20, wherein the content of synthetic sweetener is above 5%, 10%, 20%, 30%, 40%, 50%, 60%, 70%, 80%, 90%, 95%, 99%, 99.5%.

22. The cracker of paragraph 13, wherein the sweetening agent is a *Stevia* extract.

23, The cracker of paragraph 20, wherein the *Stevia* extract is a steviol glycoside.

24. The cracker of paragraph 1, wherein the cracker is a canned or packaged cracker.

25. The cracker of paragraph 1, wherein the cracker can be a cracker substitute.

Additional Embodiments, Set 56

1. A cake comprising an added Maillard reaction product.

2. The cake of paragraph 1, wherein the cake further comprises a sugar donor.

3. The cake of paragraph 2, wherein the sugar donor comprises a sweetening agent, a sweetener, and/or a sweetener enhancer.

4. The cake of paragraph 3, wherein the sugar donor comprises a sweetening agent.

5. The cake of paragraph 4, wherein the sweetening agent is selected from a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof.

6. The cake of paragraph 3, wherein the sugar donor comprises a sweetener enhancer.

7. The cake of paragraph 6, wherein the sweetener enhancer is selected from brazzein, miraculin, curculin, pentadin, mabinlin, thaumatin, or any mixture thereof.

8. The cake of paragraph 7, wherein the sweetener enhancer comprises thaumatin.

9. The cake of paragraph 3, wherein the sugar donor comprises a sweetening agent and a sweetener enhancer.

10. The cake of paragraph 9, wherein the sweetening agent is selected from a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof.

11. The cake of paragraph 9, wherein the sweetener enhancer is selected from brazzein, miraculin, curculin, pentadin, mabinlin, thaumatin, or any mixture thereof.

12, The cake of paragraph 9, wherein the sweetener enhancer is thaumatin.

13. The cake of paragraph 3, wherein the sugar donor comprises a sweetening agent, a sweetener enhancer and a sweetener.

14. The cake of paragraph 13, wherein the sweetener is a natural sweetener or synthetic sweetener.

15. The cake of paragraph 14, wherein the synthetic sweetener is a high intensity synthetic sweetener.

16. The cake of paragraph 13, wherein the sweetening agent is selected from a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof.

17. The cake of paragraph 13, wherein the sweetener enhancer is selected from brazzein, miraculin, curculin, pentadin, mabinlin, thaumatin, or any mixture thereof.

18. The cake of paragraph 17, wherein the sweetener enhancer is thaumatin.

19. The cake of paragraph 14, wherein the synthetic sweetener is selected from sorbitol, xylitol, mannitol, sucralose, aspartame, acesulfame-K, neotame, erythritol, trehalose, raffinose, cellobiose, tagatose, DOLCIA PRIMA™ allulose, inulin, N—[N-[3-(3-hydroxy-4-methoxyphenyl) propyl]-alpha-aspartyl]-L-phenylalanine 1-methyl ester, glycyrrhizin, sodium cyclamate, or any mixture thereof.

20. The cake of paragraph 19, wherein the synthetic sweetener is allulose or tagatose or their mixtures.

21. The cake of paragraph 20, wherein the content of synthetic sweetener is above 5%, 10%, 20%, 30?/o, 40%, 50%, 60%, 70%, 80%, 90%, 95%, 99%, 99.5%.

22. The cake of paragraph 13, wherein the sweetening agent is a *Stevia* extract.

23. The cake of paragraph 20, wherein the *Stevia* extract is a steviol glycoside.

24. The cake of paragraph 1, wherein the cake is a canned or packaged cake.

25. The cake of paragraph 1, wherein the cake can be a cake substitute.

Additional Embodiments, Set 57

1. A cookie comprising an added Maillard reaction product.

2. The cookie of paragraph 1, wherein the cookie further comprises a sugar donor.

3. The cookie of paragraph 2, wherein the sugar donor comprises a sweetening agent, a sweetener, and/or a sweetener enhancer.

4. The cookie of paragraph 3, wherein the sugar donor comprises a sweetening agent.

5. The cookie of paragraph 4, wherein the sweetening agent is selected from a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof.

6. The cookie of paragraph 3, wherein the sugar donor comprises a sweetener enhancer.

7. The cookie of paragraph 6, wherein the sweetener enhancer is selected from brazzein, miraculin, curculin, pentadin, mabinlin, thaumatin, or any mixture thereof.

8. The cookie of paragraph 7, wherein the sweetener enhancer comprises thaumatin.

9. The cookie of paragraph 3, wherein the sugar donor comprises a sweetening agent and a sweetener enhancer.

10. The cookie of paragraph 9, wherein the sweetening agent is selected from a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof.

11. The cookie of paragraph 9, wherein the sweetener enhancer is selected from brazzein, miraculin, curculin, pentadin, mabinlin, thaumatin, or any mixture thereof.

12. The cookie of paragraph 9, wherein the sweetener enhancer is thaumatin.

13. The cookie of paragraph 3, wherein the sugar donor comprises a sweetening agent, a sweetener enhancer and a sweetener.

14. The cookie of paragraph 13, wherein the sweetener is a natural sweetener or synthetic sweetener.

15. The cookie of paragraph 14, wherein the synthetic sweetener is a high intensity synthetic sweetener.

16, The cookie of paragraph 13, wherein the sweetening agent is selected from a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof.

17. The cookie of paragraph 13, wherein the sweetener enhancer is selected from brazzein, miraculin, curculin, pentadin, mabinlin, thaumatin, or any mixture thereof.

18. The cookie of paragraph 17, wherein the sweetener enhancer is thaumatin.

19. The cookie of paragraph 14, wherein the synthetic sweetener is selected from sorbitol, xylitol, mannitol, sucralose, aspartame, acesulfame-K, neotame, erythritol, trehalose, raffinose, cellobiose, tagatose, DOLCIA PRIMA™ allulose, inulin, N—[N-[3-(3-hydroxy-4-methoxyphenyl) propyl]-alpha-aspartyl]-L-phenylalanine 1-methyl ester, glycyrrhizin, sodium cyclamate, or any mixture thereof.

20. The cookie of paragraph 19, wherein the synthetic sweetener is allulose or tagatose or their mixtures.

21. The cookie of paragraph 20, wherein the content of synthetic sweetener is above 5%, 10%, 20%, 30%, 40%, 50%, 60%, 70%, 80%, 90%, 95%, 99%, 99.5%.

22. The cookie of paragraph 13, wherein the sweetening agent is a *Stevia* extract.

23. The cookie of paragraph 20, wherein the *Stevia* extract is a steviol glycoside.

24. The cookie of paragraph 1, wherein the cookie is a canned or packaged cookie.

25. The cookie of paragraph 1, wherein the cookie can be a cookie substitute.

Additional Embodiments, Set 58

1. A pie comprising an added Maillard reaction product.

2. The pie of paragraph 1, wherein the pie further comprises a sugar donor.

3. The pie of paragraph 2, wherein the sugar donor comprises a sweetening agent, a sweetener, and/or a sweetener enhancer.

4. The pie of paragraph 3, wherein the sugar donor comprises a sweetening agent.

5. The pie of paragraph 4, wherein the sweetening agent is selected from a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof.

6. The pie of paragraph 3, wherein the sugar donor comprises a sweetener enhancer.

7. The pie of paragraph 6, wherein the sweetener enhancer is selected from brazzein, miraculin, curculin, pentadin, mabinlin, thaumatin, or any mixture thereof.

8. The pie of paragraph 7, wherein the sweetener enhancer comprises thaumatin.

9. The pie of paragraph 3, wherein the sugar donor comprises a sweetening agent and a sweetener enhancer.

10. The pie of paragraph 9, wherein the sweetening agent is selected from a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof.

11. The pie of paragraph 9, wherein the sweetener enhancer is selected from brazzein, miraculin, curculin, pentadin, mabinlin, thaumatin, or any mixture thereof.

12. The pie of paragraph 9, wherein the sweetener enhancer is thaumatin.

13. The pie of paragraph 3, wherein the sugar donor comprises a sweetening agent, a sweetener enhancer and a sweetener.

14. The pie of paragraph 13, wherein the sweetener is a natural sweetener or synthetic sweetener.

15. The pie of paragraph 14, wherein the synthetic sweetener is a high intensity synthetic sweetener.

16. The pie of paragraph 13, wherein the sweetening agent is selected from a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof.

17. The pie of paragraph 13, wherein the sweetener enhancer is selected from brazzein, miraculin, curculin, pentadin, mabinlin, thaumatin, or any mixture thereof.

18. The pie of paragraph 17, wherein the sweetener enhancer is thaumatin,

19. The pie of paragraph 14, wherein the synthetic sweetener is selected from sorbitol, xylitol, mannitol, sucralose, aspartame, acesulfame-K, neotame, erythritol, trehalose, raffinose, cellobiose, tagatose, DOLCIA PRIMA™ allulose, inulin, N—[N-[3-(3-hydroxy-4-methoxyphenyl)propyl]-alpha-aspartyl]-L-phenylalanine 1-methyl ester, glycyrrhizin, sodium cyclamate, or any mixture thereof.

20. The pie of paragraph 19, wherein the synthetic sweetener is allulose or tagatose or their mixtures.

21. The pie of paragraph 20, wherein the content of synthetic sweetener is above 5%, 10%, 20%, 30%, 40%, 50%, 60%, 70%, 80%, 90%, 95%, 99%, 99.5%.

22. The pie of paragraph 13, wherein the sweetening agent is a *Stevia* extract.

23. The pie of paragraph 20, wherein the *Stevia* extract is a steviol glycoside.

24. The pie of paragraph 1, wherein the pie is a canned or packaged pie.

25. The pie of paragraph 1, wherein the pie is fruit-filled or a custard type.

Additional Embodiments, Set 59

1. A bakery ware comprising an added Maillard reaction product.

2. The bakery ware of paragraph 1, wherein the bakery ware further comprises a sugar donor.

3. The bakery ware of paragraph 2, wherein the sugar donor comprises a sweetening agent, a sweetener, and/or a sweetener enhancer.

4. The bakery ware of paragraph 3, wherein the sugar donor comprises a sweetening agent.

5. The bakery ware of paragraph 4, wherein the sweetening agent is selected from a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof.

6. The bakery ware of paragraph 3, wherein the sugar donor comprises a sweetener enhancer.

7. The bakery ware of paragraph 6, wherein the sweetener enhancer is selected from brazzein, miraculin, curculin, pentadin, mabinlin, thaumatin, or any mixture thereof.

8. The bakery ware of paragraph 7, wherein the sweetener enhancer comprises thaumatin.

9. The bakery ware of paragraph 3, wherein the sugar donor comprises a sweetening agent and a sweetener enhancer.

10. The bakery ware of paragraph 9, wherein the sweetening agent is selected from a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof.

11. The bakery ware of paragraph 9, wherein the sweetener enhancer is selected from brazzein, miraculin, curculin, pentadin, mabinlin, thaumatin, or any mixture thereof.

12. The bakery ware of paragraph 9, wherein the sweetener enhancer is thaumatin.

13. The bakery ware of paragraph 3, wherein the sugar donor comprises a sweetening agent, a sweetener enhancer and a sweetener.

14. The bakery ware of paragraph 13, wherein the sweetener is a natural sweetener or synthetic sweetener.

15. The bakery ware of paragraph 14, wherein the synthetic sweetener is a high intensity synthetic sweetener.

16. The bakery ware of paragraph 13, wherein the sweetening agent is selected from a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof.

17. The bakery ware of paragraph 13, wherein the sweetener enhancer is selected from brazzein, miraculin, curculin, pentadin, mabinlin, thaumatin, or any mixture thereof.

18. The bakery ware of paragraph 17, wherein the sweetener enhancer is thaumatin.

19. The bakery ware of paragraph 14, wherein the synthetic sweetener is selected from sorbitol, xylitol, mannitol, sucralose, aspartame, acesulfame-K, neotame, erythritol, trehalose, raffinose, cellobiose, tagatose, DOLCIA PRIMA™ allulose, inulin, N—[N-[3-(3-hydroxy-4-methoxyphenyl)propyl]-alpha-aspartyl]-L-phenylalanine 1-methyl ester, glycyrrhizin, sodium cyclamate, or any mixture thereof.

20. The bakery ware of paragraph 19, wherein the synthetic sweetener is allulose or tagatose or their mixtures.

21. The bakery ware of paragraph 20, wherein the content of synthetic sweetener is above 5%, 10%, 20%, 30%, 40%, 50%, 60%, 70%, 80%, 90%, 95%, 99%, 99.5%.

22. The bakery ware of paragraph 13, wherein the sweetening agent is a *Stevia* extract.

23. The bakery ware of paragraph 20, wherein the *Stevia* extract is a steviol glycoside.

24. The bakery ware of paragraph 1, wherein the bakery ware is a bread or ordinary bakery ware; a bagel, pita, or English muffin; a fine bakery ware mix such as cake or a pancake mixture; a doughnut; a sweet roll; a scone; or a muffin.

Additional Embodiments, Set 60

1. A doughnut comprising an added Mail lard reaction product.

2. The doughnut of paragraph 1, wherein the doughnut further comprises a sugar donor.

3. The doughnut of paragraph 2, wherein the sugar donor comprises a sweetening agent, a sweetener, and/or a sweetener enhancer.

4. The doughnut of paragraph 3, wherein the sugar donor comprises a sweetening agent.

5. The doughnut of paragraph 4, wherein the sweetening agent is selected from a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof.

6. The doughnut of paragraph 3, wherein the sugar donor comprises a sweetener enhancer.

7. The doughnut of paragraph 6, wherein the sweetener enhancer is selected from brazzein, miraculin, curculin, pentadin, mabinlin, thaumatin, or any mixture thereof.

8. The doughnut of paragraph 7, wherein the sweetener enhancer comprises thaumatin.

9. The doughnut of paragraph 3, wherein the sugar donor comprises a sweetening agent and a sweetener enhancer.

10. The doughnut of paragraph 9, wherein the sweetening agent is selected from a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof.

11. The doughnut of paragraph 9, wherein the sweetener enhancer is selected from brazzein, miraculin, curculin, pentadin, mabinlin, thaumatin, or any mixture thereof.

12. The doughnut of paragraph 9, wherein the sweetener enhancer is thaumatin.

13. The doughnut of paragraph 3, wherein the sugar donor comprises a sweetening agent, a sweetener enhancer and a sweetener, 14. The doughnut of paragraph 13, wherein the sweetener is a natural sweetener or synthetic sweetener.

15. The doughnut of paragraph 14, wherein the synthetic sweetener is a high intensity synthetic sweetener.

16. The doughnut of paragraph 13, wherein the sweetening agent is selected from a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof.

17. The doughnut of paragraph 13, wherein the sweetener enhancer is selected from brazzein, miraculin, curculin, pentadin, mabinlin, thaumatin, or any mixture thereof.

18. The doughnut of paragraph 17, wherein the sweetener enhancer is thaumatin.

19. The doughnut of paragraph 14, wherein the synthetic sweetener is selected from sorbitol, xylitol, mannitol, sucralose, aspartame, acesulfame-K, neotame, erythritol, trehalose, raffinose, cellobiose, tagatose, DOLCIA PRIMA™ allulose, inulin, N—[N-[3-(3-hydroxy-4-methoxyphenyl)propyl]-alpha-aspartyl]-L-phenylalanine 1-methyl ester, glycyrrhizin, sodium cyclamate, or any mixture thereof.

20. The doughnut of paragraph 19, wherein the synthetic sweetener is allulose or tagatose or their mixtures.

21. The doughnut of paragraph 20, wherein the content of synthetic sweetener is above 5%, 10%, 20%, 30%, 40%, 50%, 60%, 70%, 80%, 90%, 95%, 99%, 99.5%.

22. The doughnut of paragraph 13, wherein the sweetening agent is a *Stevia* extract, 23. The doughnut of paragraph 20, wherein the *Stevia* extract is a steviol glycoside.

24. The doughnut of paragraph 1, wherein the doughnut is a canned or packaged doughnut.

Additional Embodiments, Set 61

1. A sweet roll comprising an added Maillard reaction product.

2. The sweet roll of paragraph 1, wherein the sweet roll further comprises a sugar donor.

3. The sweet roll of paragraph 2, wherein the sugar donor comprises a sweetening agent, a sweetener, and/or a sweetener enhancer.

4. The sweet roll of paragraph 3, wherein the sugar donor comprises a sweetening agent.

5. The sweet roll of paragraph 4, wherein the sweetening agent is selected from a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof.

6. The sweet roll of paragraph 3, wherein the sugar donor comprises a sweetener enhancer.

7. The sweet roll of paragraph 6, wherein the sweetener enhancer is selected from brazzein, miraculin, curculin, pentadin, mabinlin, thaumatin, or any mixture thereof.

8. The sweet roll of paragraph 7, wherein the sweetener enhancer comprises thaumatin, 9. The sweet roll of paragraph 3, wherein the sugar donor comprises a sweetening agent and a sweetener enhancer.

10. The sweet roll of paragraph 9, wherein the sweetening agent is selected from a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof.

11. The sweet roll of paragraph 9, wherein the sweetener enhancer is selected from brazzein, miraculin, curculin, pentadin, mabinlin, thaumatin, or any mixture thereof.

12. The sweet roll of paragraph 9, wherein the sweetener enhancer is thaumatin.

13. The sweet roll of paragraph 3, wherein the sugar donor comprises a sweetening agent, a sweetener enhancer and a sweetener.

14. The sweet roll of paragraph 13, wherein the sweetener is a natural sweetener or synthetic sweetener.

15. The sweet roll of paragraph 14, wherein the synthetic sweetener is a high intensity synthetic sweetener.

16. The sweet roll of paragraph 13, wherein the sweetening agent is selected from a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof.

17. The sweet roll of paragraph 13, wherein the sweetener enhancer is selected from brazzein, miraculin, curculin, pentadin, mabinlin, thaumatin, or any mixture thereof.

18, The sweet roll of paragraph 17, wherein the sweetener enhancer is thaumatin.

19. The sweet roll of paragraph 14, wherein the synthetic sweetener is selected from sorbitol, xylitol, mannitol, sucralose, aspartame, acesulfame-K, neotame, erythritol, trehalose, raffinose, cellobiose, tagatose, DOLCIA PRIMA™ allulose, inulin, N—[N-[3-(3-hydroxy-4-methoxyphenyl) propyl]-alpha-aspartyl]-L-phenylalanine 1-methyl ester, glycyrrhizin, sodium cyclamate, or any mixture thereof.

20. The sweet roll of paragraph 19, wherein the synthetic sweetener is allulose or tagatose or their mixtures.

21. The sweet roll of paragraph 20, wherein the content of synthetic sweetener is above 5%, 10%, 20%, 30%, 40%, 50%, 60%, 70%, 80%, 90%, 95%, 99%, 995%.

22. The sweet roll of paragraph 13, wherein the sweetening agent is a *Stevia* extract.

23. The sweet roll of paragraph 20, wherein the *Stevia* extract is a steviol glycoside.

24. The sweet roll of paragraph 1, wherein the sweet roll is a canned or packaged sweet roll.

Additional Embodiments, Set 62

1. A scone comprising an added Mailiard reaction product.

2. The scone of paragraph 1, wherein the scone further comprises a sugar donor.

3. The scone of paragraph 2, wherein the sugar donor comprises a sweetening agent, a sweetener, and/or a sweetener enhancer.

4. The scone of paragraph 3, wherein the sugar donor comprises a sweetening agent.

5. The scone of paragraph 4, wherein the sweetening agent is selected from a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof.

6. The scone of paragraph 3, wherein the sugar donor comprises a sweetener enhancer.

7. The scone of paragraph 6, wherein the sweetener enhancer is selected from brazzein, miraculin, curculin, pentadin, mabinlin, thaumatin, or any mixture thereof.

8. The scone of paragraph 7, wherein the sweetener enhancer comprises thaumatin.

9. The scone of paragraph 3, wherein the sugar donor comprises a sweetening agent and a sweetener enhancer.

10. The scone of paragraph 9, wherein the sweetening agent is selected from a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof.

11. The scone of paragraph 9, wherein the sweetener enhancer is selected from brazzein, miraculin, curculin, pentadin, mabinlin, thaumatin, or any mixture thereof, 12. The scone of paragraph 9, wherein the sweetener enhancer is thaumatin.

13. The scone of paragraph 3, wherein the sugar donor comprises a sweetening agent, a sweetener enhancer and a sweetener.

14. The scone of paragraph 13, wherein the sweetener is a natural sweetener or synthetic sweetener.

15. The scone of paragraph 14, wherein the synthetic sweetener is a high intensity synthetic sweetener.

16. The scone of paragraph 13, wherein the sweetening agent is selected from a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof.

17. The scone of paragraph 13, wherein the sweetener enhancer is selected from brazzein, miraculin, curculin, pentadin, mabinlin, thaumatin, or any mixture thereof.

18. The scone of paragraph 17, wherein the sweetener enhancer is thaumatin.

19. The scone of paragraph 14, wherein the synthetic sweetener is selected from sorbitol, xylitol, mannitol, sucralose, aspartame, acesulfame-K, neotame, erythritol, trehalose, raffinose, cellobiose, tagatose, DOLCIA PRIMA™ allulose, inulin, N—[N-[3-(3-hydroxy-4-methoxyphenyl) propyl]-alpha-aspartyl]-L-phenylalanine 1-methyl ester, glycyrrhizin, sodium cyclamate, or any mixture thereof.

20. The scone of paragraph 19, wherein the synthetic sweetener is allulose or tagatose or their mixtures.

21. The scone of paragraph 20, wherein the content of synthetic sweetener is above 5%, 10%, 20%, 30%, 40%, 50%, 60%, 70%, 80%, 90%, 95%, 99%, 99.5%.

22. The scone of paragraph 13, wherein the sweetening agent is a *Stevia* extract.

23. The scone of paragraph 20, wherein the *Stevia* extract is a steviol glycoside.

24. The scone of paragraph 1, wherein the scone is a canned or packaged scone.

Additional Embodiments, Set 63

1. A muffin comprising an added Maillard reaction product.

2. The muffin of paragraph 1, wherein the muffin further comprises a sugar donor.

3. The muffin of paragraph 2, wherein the sugar donor comprises a sweetening agent, a sweetener, and/or a sweetener enhancer.

4. The muffin of paragraph 3, wherein the sugar donor comprises a sweetening agent.

5. The muffin of paragraph 4, wherein the sweetening agent is selected from a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof.

6. The muffin of paragraph 3, wherein the sugar donor comprises a sweetener enhancer.

7. The muffin of paragraph 6, wherein the sweetener enhancer is selected from brazzein, miraculin, curculin, pentadin, mabinlin, thaumatin, or any mixture thereof.

8. The muffin of paragraph 7, wherein the sweetener enhancer comprises thaumatin.

9. The muffin of paragraph 3, wherein the sugar donor comprises a sweetening agent and a sweetener enhancer.

10. The muffin of paragraph 9, wherein the sweetening agent is selected from a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof.

11. The muffin of paragraph 9, wherein the sweetener enhancer is selected from brazzein, miraculin, curculin, pentadin, mabinlin, thaumatin, or any mixture thereof.

12. The muffin of paragraph 9, wherein the sweetener enhancer is thaumatin.

13. The muffin of paragraph 3, wherein the sugar donor comprises a sweetening agent, a sweetener enhancer and a sweetener.

14. The muffin of paragraph 13, wherein the sweetener is a natural sweetener or synthetic sweetener.

15. The muffin of paragraph 14, wherein the synthetic sweetener is a high intensity synthetic sweetener.

16. The muffin of paragraph 13, wherein the sweetening agent is selected from a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof.

17. The muffin of paragraph 13, wherein the sweetener enhancer is selected from brazzein, miraculin, curculin, pentadin, mabinlin, thaumatin, or any mixture thereof.

18. The muffin of paragraph 17, wherein the sweetener enhancer is thaumatin.

19. The muffin of paragraph 14, wherein the synthetic sweetener is selected from sorbitol, xylitol, mannitol, sucralose, aspartame, acesulfame-K, neotame, erythritol, trehalose, raffinose, cellobiose, tagatose, DOLCIA PRIMA™ allulose, inulin, N—[N-[3-(3-hydroxy-4-methoxyphenyl) propyl]-alpha-aspartyl]-L-phenylalanine 1-methyl ester, glycyrrhizin, sodium cyclamate, or any mixture thereof.

20. The muffin of paragraph 19, wherein the synthetic sweetener is allulose or tagatose or their mixtures.

21. The muffin of paragraph 20, wherein the content of synthetic sweetener is above 5%, 10%, 20%, 30%, 40%, 50%, 60%, 70%, 80%, 90%, 95%, 99%, 99.5%.

22. The muffin of paragraph 13, wherein the sweetening agent is a *Stevia* extract.

23. The muffin of paragraph 20, wherein the *Stevia* extract is a steviol glycoside.

24. The muffin of paragraph 1, wherein the muffin is a canned or packaged muffin.

Additional Embodiments, Set 64

1. A meat product comprising an added Maillard reaction product.

2. The meat product of paragraph 1, wherein the meat product further comprises a sugar donor.

3. The meat product of paragraph 2, wherein the sugar donor comprises a sweetening agent, a sweetener, and/or a sweetener enhancer.

4. The meat product of paragraph 3, wherein the sugar donor comprises a sweetening agent.

5. The meat product of paragraph 4, wherein the sweetening agent is selected from a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof.

6. The meat product of paragraph 3, wherein the sugar donor comprises a sweetener enhancer.

7. The meat product of paragraph 6, wherein the sweetener enhancer is selected from brazzein, miraculin, curculin, pentadin, mabinlin, thaumatin, or any mixture thereof.

8. The meat product of paragraph 7, wherein the sweetener enhancer comprises thaumatin.

9. The meat product of paragraph 3, wherein the sugar donor comprises a sweetening agent and a sweetener enhancer.

10. The meat product of paragraph 9, wherein the sweetening agent is selected from a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof.

11. The meat product of paragraph 9, wherein the sweetener enhancer is selected from brazzein, miraculin, curculin, pentadin, mabinlin, thaumatin, or any mixture thereof.

12. The meat product of paragraph 9, wherein the sweetener enhancer is thaumatin.

13. The meat product of paragraph 3, wherein the sugar donor comprises a sweetening agent, a sweetener enhancer and a sweetener, 14. The meat product of paragraph 13, wherein the sweetener is a natural sweetener or synthetic sweetener.

15. The meat product of paragraph 14, wherein the synthetic sweetener is a high intensity synthetic sweetener.

16. The meat product of paragraph 13, wherein the sweetening agent is selected from a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof.

17. The meat product of paragraph 13, wherein the sweetener enhancer is selected from brazzein, miraculin, curculin, pentadin, mabinlin, thaumatin, or any mixture thereof.

18. The meat product of paragraph 17, wherein the sweetener enhancer is thaumatin.

19. The meat product of paragraph 14, wherein the synthetic sweetener is selected from sorbitol, xylitol, mannitol, sucralose, aspartame, acesulfame-K, neotame, erythritol, trehalose, raffinose, cellobiose, tagatose, DOLCIA PRIMA™ allulose, inulin, N—[N-[3-(3-hydroxy-4-methoxyphenyl)propyl]-alpha-aspartyl]-L-phenylalanine 1-methyl ester, glycyrrhizin, sodium cyclamate, or any mixture thereof.

20. The meat product of paragraph 19, wherein the synthetic sweete cr rs allulose or tagatose or their mixtures.

521. The meat product of paragraph 20, wherein the content of synthetic sweetener is above 5%, 10%, 20%, 30%, 40%, 50%, 60%, 70%, 80%, 90%, 95%, 99%, 99.5%.

22. The meat product of paragraph 13, wherein the sweetening agent is a S tevia extract.

23. The meat product of paragraph 20, wherein the *Stevia* extract is a steviol glycoside.

24, The meat product of paragraph 1, wherein the meat product is a canned or packaged meat product.

25. The meat product of paragraph 1, wherein the meat product can be a meat product substitute.

26. The meat product of paragraph 1, wherein the meat product is a processed meat, poultry or game product in whole pieces or cuts; or processed comminuted meat, poultry or game product.

27. The meat product of paragraph 1, wherein the meat product is an edible casing such as a sausage casing.

Additional Embodiments, Set 65

1. A fish product comprising an added Maillard reaction product.

2. The fish product of paragraph 1, wherein the fish product further comprises a sugar donor.

3. The fish product of paragraph 2, wherein the sugar donor comprises a sweetening agent, a sweetener and/or a sweetener enhancer.

4. The fish product of paragraph 3, wherein the sugar donor comprises a sweetening agent.

5. The fish product of paragraph 4, wherein the sweetening agent is selected from a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof.

6. The fish product of paragraph 3, wherein the sugar donor comprises a sweetener enhancer.

7. The fish product of paragraph 6, wherein the sweetener enhancer is selected from brazzein, miraculin, curculin, pentadin, mabinlin, thaumatin, or any mixture thereof.

8. The fish product of paragraph 7, wherein the sweetener enhancer comprises thaumatin.

9. The fish product of paragraph 3, wherein the sugar donor comprises a sweetening agent and a sweetener enhancer.

10. The fish product of paragraph 9, wherein the sweetening agent is selected from a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof.

11. The fish product of paragraph 9, wherein the sweetener enhancer is selected from brazzein, miraculin, curculin, pentadin, mabinlin, thaumatin, or any mixture thereof.

12. The fish product of paragraph 9, wherein the sweetener enhancer is thaumatin.

13. The fish product of paragraph 3, wherein the sugar donor comprises a sweetening agent, a sweetener enhancer and a sweetener, 14. The fish product of paragraph 13, wherein the sweetener is a natural sweetener or synthetic sweetener, 15. The fish product of paragraph 14, wherein the synthetic sweetener is a high intensity synthetic sweetener.

16. The fish product of paragraph 13, wherein the sweetening agent is selected from a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof.

17. The fish product of paragraph 13, wherein the sweetener enhancer is selected from brazzein, miraculin, curculin, pentadin, mabinlin, thaumatin, or any mixture thereof.

18. The fish product of paragraph 17, wherein the sweetener enhancer is thaumatin.

19. The fish product of paragraph 14, wherein the synthetic sweetener is selected from sorbitol, xylitol, mannitol, sucralose, aspartame, acesulfame-K, neotame, erythritol, trehalose, raffinose, cellobiose, tagatose. DOLCIA PRIMA™ allulose, inulin, N—[N-[3-(3-hydroxy-4-methoxyphenyl)propyl]-alpha-aspartyl]-L-phenylalanine 1-methyl ester, glycyrrhizin, sodium cyclamate, or any mixture thereof.

20. The fish product of paragraph 19, wherein the synthetic sweetener is allulose or tagatose or their mixtures.

21. The fish product of paragraph 20, wherein the content of synthetic sweetener is above 5%, 10%, 20%, 30%, 40%, 50%, 60%, 70%, 80%, 90%, 95%, 99%, 99.5%.

22. The fish product of paragraph 13, wherein the sweetening agent is a *Stevia* extract.

23. The fish product of paragraph 20, wherein the *Stevia* extract is a steviol glycoside.

24. The fish product of paragraph 1, wherein the fish product is a canned or bottled fish product.

25. The fish product of paragraph 1, wherein the fish product can be a fish product substitute.

26. The fish product of paragraph 1, wherein the fish product is a processed fish or fish product, semi-preserved fish or fish product, or a fully preserved fish or fish product; or a mollusk, a crustacean or, crustaceans or echinoderms egg products.

Additional Embodiments, Set 66

1. An egg product comprising an added Maillard reaction product.

2. The egg product of paragraph 1, wherein the egg product further comprises a sugar donor.

3. The egg product of paragraph 2, wherein the sugar donor comprises a sweetening agent, a sweetener, and/or a sweetener enhancer.

4. The egg product of paragraph 3, wherein the sugar donor comprises a sweetening agent.

5. The egg product of paragraph 4, wherein the sweetening agent is selected from a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof.

6. The egg product of paragraph 3, wherein the sugar donor comprises a sweetener enhancer.

7. The egg product of paragraph 6, wherein the sweetener enhancer is selected from brazzein, miraculin, curculin, pentadin, tnabinlin, thaumatin, or any mixture thereof.

8. The egg product of paragraph 7, wherein the sweetener enhancer comprises thaumatin.

9. The egg product of paragraph 3, wherein the sugar donor comprises a sweetening agent and a sweetener enhancer.

10. The egg product of paragraph 9, wherein the sweetening agent is selected from a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof.

11. The egg product of paragraph 9, wherein the sweetener enhancer is selected from brazzein, miraculin, curculin, pentadin, thaumatin, or any mixture thereof.

12. The egg product of paragraph 9, wherein the sweetener enhancer is thaumatin.

13. The egg product of paragraph 3, wherein the sugar donor comprises a sweetening agent, a sweetener enhancer and a sweetener.

14. The egg product of paragraph 13, wherein the sweetener is a natural sweetener or synthetic sweetener.

15. The egg product of paragraph 14, wherein the synthetic sweetener is a high intensity synthetic sweetener.

16. The egg product of paragraph 13, wherein the sweetening agent is selected from a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof.

17. The egg product of paragraph 13, wherein the sweetener enhancer is selected from brazzein, miraculin, curculin, pentadin, tnabinlin, thaumatin, or any mixture thereof, 18. The egg product of paragraph 17, wherein the sweetener enhancer is thaumatin.

19. The egg product of paragraph 14, wherein the synthetic sweetener is selected from sorbitol, xylitol, mannitol, sucralose, aspartame, acesulfame-K, neotame, erythritol, trehalose, raffinose, cellobiose, tagatose, DOLCIA PRIMA™ allulose, inulin, N—[N-[3-(3-hydroxy-4-methoxyphenyl)propyl]-alpha-aspartyl]-L-phenylalanine 1-methyl ester, glycyrrhizin, sodium cyclamate, or any mixture thereof.

20. The egg product of paragraph 19, wherein the synthetic sweetener is allulose or tagatose or their mixtures.

21. The egg product of paragraph 20, wherein the content of synthetic sweetener is above 5%, 10%, 20%, 30%, 40%, 50%, 60%, 70%, 80%, 90?/o, 95%, 99%, 99.5%.

22. The egg product of paragraph 13, wherein the sweetening agent is a *Stevia* extract.

23. The egg product of paragraph 20, wherein the *Stevia* extract is a steviol glycoside.

24. The egg product of paragraph 1, wherein the egg product is a canned or packaged egg product.

25. The egg product of paragraph 1, wherein the egg product can be an egg product substitute.

26. The egg product of paragraph 1, wherein the egg product is preserved eggs, or egg-based desserts.

Additional Embodiments, Set 67

1. A salt comprising an added Maillard reaction product.

2. The salt of paragraph 1, wherein the salt further comprises a sugar donor.

3. The salt of paragraph 2, wherein the sugar donor comprises a sweetening agent, a sweetener, and/or a sweetener enhancer.

4. The salt of paragraph 3, wherein the sugar donor comprises a sweetening agent.

5. The salt of paragraph 4, wherein the sweetening agent is selected from a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof.

6. The salt of paragraph 3, wherein the sugar donor comprises a sweetener enhancer.

7. The salt of paragraph 6, wherein the sweetener enhancer is selected from brazzein, miraculin, curculin, pentadin, mabinlin, thaumatin, or any mixture thereof.

8. The salt of paragraph 7, wherein the sweetener enhancer comprises thaumatin.

9. The salt of paragraph 3, wherein the sugar donor comprises a sweetening agent and a sweetener enhancer.

10. The salt of paragraph 9, wherein the sweetening agent is selected from a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof.

11. The salt of paragraph 9, wherein the sweetener enhancer is selected from brazzein, miraculin, curculin, pentadin, mabinlin, thaumatin, or any mixture thereof.

12. The salt of paragraph 9, wherein the sweetener enhancer is thaumatin,

13. The salt of paragraph 3, wherein the sugar donor comprises a sweetening agent, a sweetener enhancer and a sweetener.

14. The salt of paragraph 13, wherein the sweetener is a natural sweetener or synthetic sweetener.

15. The salt of paragraph 14, wherein the synthetic sweetener is a high intensity synthetic sweetener.

16, The salt of paragraph 13, wherein the sweetening agent is selected from a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof.

17. The salt of paragraph 13, wherein the sweetener enhancer is selected from brazzein, miraculin, curculin, pentadin, mabinlin, thaumatin, or any mixture thereof.

18. The salt of paragraph 17, wherein the sweetener enhancer is thaumatin,

19. The salt of paragraph 14, wherein the synthetic sweetener is selected from sorbitol, xylitol, mannitol, sucralose, aspartame, acesulfame-K, neotame, erythritol, trehalose, raffinose, cellobiose, tagatose, DOLCIA PRIMA™ allulose, inulin, N—[N-[3-(3-hydroxy-4-methoxyphenyl) propyl]-alpha-aspartyl]-L-phenylalanine 1-methyl ester, glycyrrhizin, sodium cyclamate, or any mixture thereof.

20. The salt of paragraph 19, wherein the synthetic sweetener is allulose or tagatose or their mixtures.

21. The salt of paragraph 20, wherein the content of synthetic sweetener is above 5%, 10%, 20%, 30%, 40%, 50%, 60%, 70%, 80%, 90%, 95%, 99%, 99.5%.

22. The salt of paragraph 13, wherein the sweetening agent is a *Stevia* extract.

23. The salt of paragraph 20, wherein the *Stevia* extract is a steviol glycoside.

24. The salt of paragraph 1, wherein the salt is a canned or bottled salt.

25. The salt of paragraph 1, wherein the salt can be a salt substitute.

Additional Embodiments, Set 68

1. A seasoning comprising an added Maillard reaction product.

2. The seasoning of paragraph 1, wherein the seasoning further comprises a sugar donor.

3. The seasoning of paragraph 2, wherein the sugar donor comprises a agent, a sweetener, and/or a sweetener enhancer.

4. The seasoning of paragraph 3, wherein the sugar donor comprises a sweetening agent.

5. The seasoning of paragraph 4, wherein the sweetening agent is selected from a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof.

6. The seasoning of paragraph 3, wherein the sugar donor comprises a sweetener enhancer.

7. The seasoning of paragraph 6, wherein the sweetener enhancer is selected from brazzein, miraculin, curculin, pentadin, mabinlin, thaumatin, or any mixture thereof.

8. The seasoning of paragraph 7, wherein the sweetener enhancer comprises thaumatin.

9. The seasoning of paragraph 3, wherein the sugar donor comprises a sweetening agent and a sweetener enhancer.

10. The seasoning of paragraph 9, wherein the sweetening agent is selected from a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof.

11. The seasoning of paragraph 9, wherein the sweetener enhancer is selected from brazzein, miraculin, curculin, pentadin, mabinlin, thaumatin, or any mixture thereof.

12. The seasoning of paragraph 9, wherein the sweetener enhancer is thaumatin.

13. The seasoning of paragraph 3, wherein the sugar donor comprises a sweetening agent, a sweetener enhancer and a sweetener.

14. The seasoning of paragraph 13, wherein the sweetener is a natural sweetener or synthetic sweetener.

15. The seasoning of paragraph 14, wherein the synthetic sweetener is a high intensity synthetic sweetener.

16. The seasoning of paragraph 13, wherein the sweetening agent is selected from a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof.

17. The seasoning of paragraph 13, wherein the sweetener enhancer is selected from brazzein, miraculin, curculin, pentadin, mabinlin, thaumatin, or any mixture thereof.

18. The seasoning of paragraph 17, wherein the sweetener enhancer is thaumatin.

19. The seasoning of paragraph 14, wherein the synthetic sweetener is selected from sorbitol, xylitol, mannitol, sucralose, aspartame, acesulfame-K, neotame, erythritol, trehalose, raffinose, cellobiose, tagatose, DOLCIA PRIMA™ allulose, inulin, N—[N-[3-(3-hydroxy-4-methoxyphenyl) propyl]-alpha-aspartyl]-L-phenylalanine 1-methyl ester, glycyrrhizin, sodium cyclamate, or any mixture thereof.

20. The seasoning of paragraph 19, wherein the synthetic sweetener is allulose or tagatose or their mixtures.

21. The seasoning of paragraph 20, wherein the content of synthetic sweetener is above 5%, 10%, 20%, 30%, 40%, 50%, 60%, 70%, 80%, 90%, 95%, 99%, 99.5%.

22. The seasoning of paragraph 13, wherein the sweetening agent is a *Stevia* extract.

23. The seasoning of paragraph 20, wherein the *Stevia* extract is a steviol glycoside.

24. The seasoning of paragraph 1, wherein the seasoning is a canned or bottled seasoning.

25. The seasoning of paragraph 1, wherein the seasoning can be a seasoning substitute.

26. The seasoning of paragraph 1, wherein the seasoning is from an herb or a spice.

Additional Embodiments, Set 69

1. A vinegar comprising an added Maillard reaction product.

2. The vinegar of paragraph 1, wherein the vinegar further comprises a sugar donor.

3. The vinegar of paragraph 2, wherein the sugar donor comprises a sweetening agent, a sweetener, and/or a sweetener enhancer.

4. The vinegar of paragraph 3, wherein the sugar donor comprises a sweetening agent.

5. The vinegar of paragraph 4, wherein the sweetening agent is selected from a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof.

6. The vinegar of paragraph 3, wherein the sugar donor comprises a sweetener enhancer.

7. The vinegar of paragraph 6, wherein the sweetener enhancer is selected from brazzein, miraculin, curculin, pentadin, tnabinlin, thaumatin, or any mixture thereof, 8. The vinegar of paragraph 7, wherein the sweetener enhancer comprises thaumatin.

9. The vinegar of paragraph 3, wherein the sugar donor comprises a sweetening agent and a sweetener enhancer.

10. The vinegar of paragraph 9, wherein the sweetening agent is selected from a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof.

11. The vinegar of paragraph 9, wherein the sweetener enhancer is selected from brazzein, miraculin, curculin, pentadin, tnabinlin, thaumatin, or any mixture thereof.

12. The vinegar of paragraph 9, wherein the sweetener enhancer is thaumatin.

13. The vinegar of paragraph 3, wherein the sugar donor comprises a sweetening agent, a sweetener enhancer and a sweetener.

14. The vinegar of paragraph 13, wherein the sweetener is a natural sweetener or synthetic sweetener.

15. The vinegar of paragraph 14, wherein the synthetic sweetener is a high intensity synthetic sweetener.

16. The vinegar of paragraph 13, wherein the sweetening agent is selected from a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof.

17. The vinegar of paragraph 13, wherein the sweetener enhancer is selected from brazzein, miraculin, curculin, pentadin, mabinlin, thaumatin, or any mixture thereof.

18. The vinegar of paragraph 17, wherein the sweetener enhancer is thaumatin.

19. The vinegar of paragraph 14, wherein the synthetic sweetener is selected from sorbitol, xylitol, mannitol, sucralose, aspartame, acesulfame-K, neotame, erythritol, trehalose, raffinose, cellobiose, tagatose. DOLCIA PRIMA™ allulose, inulin, N—[N-[3-(3-hydroxy-4-methoxyphenyl) propyl]-alpha-aspartyl]-L-phenylalanine 1-methyl ester, glycyrrhizin, sodium cyclamate, or any mixture thereof.

20. The vinegar of paragraph 19, wherein the synthetic sweetener is allulose tagatose or their mixtures.

21. The vinegar of paragraph 20, wherein the content of synthetic sweetener is above 5%, 10%, 20%, 30%, 40%, 50%, 60%, 70%, 80%, 90%, 95%, 99%, 99.5%.

22. The vinegar of paragraph 13, wherein the sweetening agent is a *Stevia* extract.

23. The vinegar of paragraph 20, wherein the *Stevia* extract is a steviol glycoside.

24. The vinegar of paragraph 1, wherein the vinegar is a canned or bottled vinegar.

25, The vinegar of paragraph 1, wherein the vinegar can be a vinegar substitute.

Additional Embodiments, Set 70

1. A mustard product comprising an added Maillard reaction product.

2. The mustard product of paragraph 1, wherein the mustard product further comprises a sugar donor, 3. The mustard product of paragraph 2, wherein the sugar donor comprises a sweetening agent, a sweetener, and/or a sweetener enhancer.

4. The mustard product of paragraph 3, wherein the sugar donor comprises a sweetening agent.

5. The mustard product of paragraph 4, wherein the sweetening agent is selected from a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof.

6. The mustard product of paragraph 3, wherein the sugar donor comprises a sweetener enhancer.

7. The mustard product of paragraph 6, wherein the sweetener enhancer is selected from brazzein, miraculin, curculin, pentadin, mabinlin, thaumatin, or any mixture thereof.

8. The mustard product of paragraph 7, wherein the sweetener enhancer comprises thaumatin.

9. The mustard product of paragraph 3, wherein the sugar donor comprises a sweetening agent and a sweetener enhancer.

10. The mustard product of paragraph 9, wherein the sweetening agent is selected from a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof.

11. The mustard product of paragraph 9, wherein the sweetener enhancer is selected from brazzein, miraculin, curculin, pentadin, mabinlin, thaumatin, or any mixture thereof.

12. The mustard product of paragraph 9, wherein the sweetener enhancer is thaumatin.

13. The mustard product of paragraph 3, wherein the sugar donor comprises a sweetening agent, a sweetener enhancer and a sweetener.

14. The mustard product of paragraph 13, wherein the sweetener is a natural sweetener or synthetic sweetener.

15. The mustard product of paragraph 14, wherein the synthetic sweetener is a high intensity synthetic sweetener.

16. The mustard product of paragraph 13, wherein the sweetening agent is selected from a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof.

17. The mustard product of paragraph 13, wherein the sweetener enhancer is selected from brazzein, miraculin, curculin, pentadin, mabinlin, thaumatin, or any mixture thereof.

18. The mustard product of paragraph 17, wherein the sweetener enhancer is thaumatin.

19. The mustard product of paragraph 14, wherein the synthetic sweetener is selected from sorbitol, xylitol, mannitol, sucralose, aspartame, acesulfame-K, neotame, erythritol, trehalose, raffinose, cellobiose, tagatose, DOLCIA PRLMA™ allulose, inulin, N—[N[3-(3-hydroxy-4-methoxyphenyl)propyl]alpha-aspartyl]-L-phenylalanine 1-methyl ester, glycyrrhizin, sodium cyclamate, or any mixture thereof.

20. The mustard product of paragraph 19, wherein the synthetic sweetener is allulose or tagatose or their mixtures.

21. The mustard product of paragraph 20, wherein the content of synthetic sweetener is above 5%, 10%, 20%, 30%, 40%, 50%, 60%, 70%, 80%, 90%, 95%, 99%, 99.5%, 22. The mustard product of paragraph 13, wherein the sweetening agent is a *Stevia* extract.

23. The mustard product of paragraph 20, wherein the *Stevia* extract is a steviol glycoside.

24. The mustard product of paragraph 1, wherein the mustard product is a canned or bottled mustard product.

25. The mustard product of paragraph 1, wherein the mustard product can be a mustard product substitute.

Additional Embodiments, Set 71

1. A spice product comprising an added Maillard reaction product.

2. The spice product of paragraph 1, wherein the spice product further comprises a sugar donor.

3. The spice product of paragraph 2, wherein the sugar donor comprises a sweetening agent, a sweetener, and/or a sweetener enhancer.

4. The spice product of paragraph 3, wherein the sugar donor comprises a sweetening agent.

5. The spice product of paragraph 4, wherein the sweetening agent is selected from a licorice extract, a sweet tea extract, a *Stevia* extract, a swingle extract, a glycosylated sweet tea extract, a glycosylated Sevier extract, a glycosylated swingle extract, a glycosylated sweet tea glycoside, a glycosylated steviol glycoside, a glycosylated mogroside, or any mixture thereof.

6. The spice product of paragraph 3, wherein the sugar donor comprises a sweetener enhancer.

7. The spice product of paragraph 6, wherein the sweetener enhancer is selected from brazzein, miraculin, curculin, pentadin, mabinlin, thaumatin, or any mixture thereof.

8. The spice product of paragraph 7, wherein the sweetener enhancer comprises thaumatin.

9. The spice product of paragraph 3, wherein the sugar donor comprises a sweetening agent and a sweetener enhancer.

10. The spice product of paragraph 9, wherein the sweetening agent is selected from a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof.

11. The spice product of paragraph 9, wherein the sweetener enhancer is selected from brazzein, miraculin, curculin, pentadin, mabinlin, thaumatin, or any mixture thereof.

12. The spice product of paragraph 9, wherein the sweetener enhancer is thaumatin.

13. The spice product of paragraph 3, wherein the sugar donor comprises a sweetening agent, a sweetener enhancer and a sweetener.

14. The spice product of paragraph 13, wherein the sweetener is a natural sweetener or synthetic sweetener.

15. The spice product of paragraph 14, wherein the synthetic sweetener is a high intensity synthetic sweetener.

16. The spice product of paragraph 13, wherein the sweetening agent is selected from a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof.

17. The spice product of paragraph 13, wherein the sweetener enhancer is selected from brazzein, miraculin, curculin, pentadin, mabinlin, thaumatin, or any mixture thereof.

18. The spice product of paragraph 17, wherein the sweetener enhancer is thaumatin.

19. The spice product of paragraph 14, wherein the synthetic sweetener is selected from sorbitol, xylitol, mannitol, sucralose, aspartame, acesulfame-K, neotame, erythritol, trehalose, raffinose, cellobiose, tagatose, DOLCIA PRIMA™ allulose, inulin, N—[N-[3-(3-hydroxy-4-methoxyphenyl)propyl]-alpha-aspartyl]-L-phenylalanine 1-methyl ester, glycyrrhizin, sodium cyclamate, or any mixture thereof.

20. The spice product of paragraph 19, wherein the synthetic sweetener is allulose or tagatose or their mixtures.

21. The spice product of paragraph 20, wherein the content of synthetic sweetener is above 5%, 10%, 20%, 30%, 40%, 50%, 60%, 70%, 80%, 90%, 95%, 99%, 99.5%.

22. The spice product of paragraph 13, wherein the sweetening agent is a *Stevia* extract.

23. The spice product of paragraph 20, wherein the *Stevia* extract is a steviol glycoside.

24. The spice product of paragraph 1, wherein the spice product is a canned or bottled spice product.

25. The spice product of paragraph 1, wherein the spice product can be a spice product substitute.

Additional Embodiments, Set 72

1. A soup comprising an added Maillard reaction product.

2. The soup of paragraph 1, wherein the soup further comprises a sugar donor.

3. The soup of paragraph 2, wherein the sugar donor comprises a sweetening agent, a sweetener, and/or a sweetener enhancer.

4. The soup of paragraph 3, wherein the sugar donor comprises a sweetening agent.

5. The soup of paragraph 4, wherein the sweetening agent is selected from a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof.

6. The soup of paragraph 3, wherein the sugar donor comprises a sweetener enhancer.

7. The soup of paragraph 6, wherein the sweetener enhancer is selected from brazzein, miraculin, curculin, pentadin, mabinlin, thaumatin, or any mixture thereof.

8. The soup of paragraph 7, wherein the sweetener enhancer comprises thaumatin.

9. The soup of paragraph 3, wherein the sugar donor comprises a sweetening agent and a sweetener enhancer.

10. The soup of paragraph 9, wherein the sweetening agent is selected from a licorice extract, a sweet tea extract, a *Stevia* extract, a swingle extract, a glycosylated sweet tea extract, a. glycosylated *Stevia* extract, a glycosylated swingle extract, a glycosylated sweet tea glycoside, a glycosylated steviol glycoside, a glycosylated mogroside, or any mixture thereof.

11. The soup of paragraph 9, wherein the sweetener enhancer is selected from brazzein, miraculin, curculin, pentadin, mabinlin, thaumatin, or any mixture thereof.

12. The soup of paragraph 9, wherein the sweetener enhancer is thaumatin.

13. The soup of paragraph 3, wherein the sugar donor comprises a sweetening agent, a sweetener enhancer and a sweetener.

14. The soup of paragraph 13, wherein the sweetener is a natural sweetener or synthetic sweetener.

15. The soup of paragraph 14, wherein the synthetic sweetener is a high intensity synthetic sweetener.

16. The soup of paragraph 13, wherein the sweetening agent is selected from a licorice extract, a sweet tea extract, a *Stevia* extract, a swingle extract, a glycosylated sweet tea extract, a. glycosylated *Stevia* extract, a glycosylated swingle extract, a glycosylated sweet tea glycoside, a glycosylated steviol glycoside, a glycosylated mogroside, or any mixture thereof, 17. The soup of paragraph 13, wherein the sweetener enhancer is selected from brazzein, miraculin, curculin, pentadin, mabinlin, thaumatin, or any mixture thereof.

18. The soup of paragraph 17, wherein the sweetener enhancer is thaumatin.

19. The soup of paragraph 14, wherein the synthetic sweetener is selected from sorbitol, xylitol, mannitol, sucralose, aspartame, acesulfame-K, neotame, erythritol, trehalose, raffinose, cellobiose, tagatose, DOLCIA PRIMA™ allulose, inulin, N—[N-[3-(3-hydroxy-4-methoxyphenyl) propyl]-alpha-aspartyl]-L-phenylalanine 1-methyl ester, glycyrrhizin, sodium cyclamate, or any mixture thereof.

The soup of paragraph 19, wherein the synthetic sweetener is allulose or tagatose or their mixtures.

21. The soup of paragraph 20, wherein the content of synthetic sweetener is above 5%, 10%, 20%, 30%, 40%, 50%, 60%, 70%, 80%, 90%, 95%, 99%, 99.5%.

22. The soup of paragraph 13, wherein the sweetening agent is a *Stevia* extract.

23. The soup of paragraph 20, wherein the *Stevia* extract is a steviol glycoside.

24. The soup of paragraph 1, wherein the soup is a canned or bottled or frozen soup.

25. The soup of paragraph 1, wherein the soup can be a soup substitute.

26. The soup of paragraph 1, wherein the soup is ready-to-eat soup or broth; or a mix for soup or broths.

Additional Embodiments, Set 73

1. A sauce comprising an added Maillard reaction product.

2. The sauce of paragraph 1, wherein the sauce further comprises a sugar donor.

3. The sauce of paragraph 2, wherein the sugar donor comprises a sweetening agent, a sweetener, and/or a sweetener enhancer.

4. The sauce of paragraph 3, wherein the sugar donor comprises a sweetening agent.

5. The sauce of paragraph 4, wherein the sweetening agent is selected from a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof.

6. The sauce of paragraph 3, wherein the sugar donor comprises a sweetener enhancer.

7. The sauce of paragraph 6, wherein the sweetener enhancer is selected from brazzein, miraculin, curculin, pentadin, rnabinlirr thaumatin, or any mixture thereof.

8. The sauce of paragraph 7, wherein the sweetener enhancer comprises thaumatin.

9. The sauce of paragraph 3, wherein the sugar donor comprises a sweetening agent and a sweetener enhancer.

10. The sauce of paragraph 9, wherein the sweetening agent is selected from a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof.

11. The sauce of paragraph 9, wherein the sweetener enhancer is selected from brazzein, miraculin, curculin, pentadin, mabinlin, thaumatin, or any mixture thereof.

12. The sauce of paragraph 9, wherein the sweetener enhancer is thaumatin.

13. The sauce of paragraph 3, wherein the sugar donor comprises a sweetening agent, a sweetener enhancer and a sweetener.

14. The sauce of paragraph 13, wherein the sweetener is a natural sweetener or synthetic sweetener.

15. The sauce of paragraph 14, wherein the synthetic sweetener s a high intensity synthetic sweetener, 16. The sauce of paragraph 13, wherein the sweetening agent is selected from a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof.

17. The sauce of paragraph 13, wherein the sweetener enhancer is selected from brazzein, miraculin, curculin, pentadin, mabinlin, thaumatin, or any mixture thereof.

18. The sauce of paragraph 17, wherein the sweetener enhancer is thaumatin.

19. The sauce of paragraph 14, wherein the synthetic sweetener is selected from sorbitol, xylitol, mannitol, sucralose, aspartame, acesulfame-K, neotame, erythritol, trehalose, raffinose, cellobiose, tagatose, DOLCIA PRIMA™ allulose, inulin, N—[N-[3-(3-hydroxy-4-methoxyphenyl) propyl]-alpha-aspartyl]-L-phenylalanine 1-methyl ester, glycyrrhizin, sodium cyclamate, or any mixture thereof.

20. The sauce of paragraph 9, wherein the synthetic sweetener is allulose or tagatose or their mixtures.

21. The sauce of paragraph 20, wherein the content of synthetic sweetener is above 5%, 10%, 20%, 30%, 40%, 50%, 60%, 70%, 80%, 90%, 95%, 99%, 99.5%.

22. The sauce of paragraph 13, wherein the sweetening agent is a *Stevia* extract.

23, The sauce of paragraph 20, wherein the *Stevia* extract is a steviol glycoside.

24. The sauce of paragraph 1, wherein the sauce is a canned or bottled sauce.

25. The sauce of paragraph 1, wherein the sauce can be a sauce substitute.

26. The sauce of paragraph 1, wherein the sauce is an emulsified sauce or non-emulsified sauce or a mix for sauce or gravy.

27. The sauce of paragraph 26, wherein the non-emulsified sauce is a ketchup, cheese sauce, cream sauce, or brown gravy.

Additional Embodiments, Set 74

1. A salad comprising an added Maillard reaction product.

2. The salad of paragraph 1, wherein the salad further comprises a sugar donor.

3. The salad of paragraph 2, wherein the sugar donor comprises a sweetening agent, a sweetener, and/or a sweetener enhancer.

4. The salad of paragraph 3, wherein the sugar donor comprises a sweetening agent.

5. The salad of paragraph 4, wherein the sweetening agent is selected from a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof.

6. The salad of paragraph 3, wherein the sugar donor comprises a sweetener enhancer.

7. The salad of paragraph 6, wherein the sweetener enhancer is selected from brazzein, miraculin, curculin, pentadin, mabinlin, thaumatin, or any mixture thereof.

8. The salad of paragraph 7, wherein the sweetener enhancer comprises thaumatin.

9. The salad of paragraph 3, wherein the sugar donor comprises a sweetening agent and a sweetener enhancer.

10. The salad of paragraph 9, wherein the sweetening agent is selected from a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof.

11. The salad of paragraph 9, wherein the sweetener enhancer is selected from brazzein, miraculin, curculin, pentadin, mabinlin, thaumatin, or any mixture thereof.

12. The salad of paragraph 9, wherein the sweetener enhancer is thaumatin.

13. The salad of paragraph 3, wherein the sugar donor comprises a sweetening agent, a sweetener enhancer and a sweetener.

14. The salad of paragraph 13, wherein the sweetener is a natural sweetener or synthetic sweetener.

15. The salad of paragraph 14, wherein the synthetic sweetener is a high intensity synthetic sweetener, 16. The salad of paragraph 13, wherein the sweetening agent is selected from a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof.

17. The salad of paragraph 13, wherein the sweetener enhancer is selected from brazzein, miraculin, curculin, pentadin, mabinlin, thaumatin, or any mixture thereof.

18. The salad of paragraph 17, wherein the sweetener enhancer is thaumatin.

19. The salad of paragraph 14, wherein the synthetic sweetener is selected from sorbitol, xylitol, mannitol, sucralose, aspartame, acesulfame-K, neotame, erythritol, trehalose, raffinose, cellobiose, tagatose, DOLCIA PRIMA™ allulose, inulin, N—[N-[3-(3-hydroxy-4-methoxyphenyl) propyl]-alpha-aspartyl]-L-phenylalanine 1-methyl ester, glycyrrhizin, sodium cyclamate, or any mixture thereof.

20. The salad of paragraph 19, wherein the synthetic sweetener is allulose or tagatose or their mixtures.

21. The salad of paragraph 20, wherein the content of synthetic sweetener is above 5%, 10%, 20%, 30%, 40%, 50%, 60%, 70%, 80%, 90%, 95%, 99%, 99.5%.

22, The salad of paragraph 13, wherein the sweetening agent is a *Stevia* extract.

23. The salad of paragraph 20, wherein the *Stevia* extract is a steviol glycoside.

24. The salad of paragraph 1, wherein the salad is a canned or packaged salad.

25. The salad of paragraph 1, wherein the salad can be a salad substitute.

26. The salad of paragraph 1, wherein the salad is a macaroni salad, or potato salad; or a sandwich spread.

Additional Embodiments, Set 75

1. A yeast product comprising an added Maillard reaction product.

2. The yeast product of paragraph 1, wherein the yeast product further comprises a sugar donor.

3. The yeast product of paragraph 2, wherein the sugar donor comprises a sweetening agent, a sweetener, and/or a sweetener enhancer.

4. The yeast product of paragraph 3, wherein the sugar donor comprises a sweetening agent.

5. The yeast product of paragraph 4, wherein the sweetening agent is selected from a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof.

6. The yeast product of paragraph 3, wherein the sugar donor comprises a sweetener enhancer.

7. The yeast product of paragraph 6, wherein the sweetener enhancer is selected from brazzein, miraculin, curculin, pentadin, mabinlin, thaumatin, or any mixture thereof.

8. The yeast product of paragraph 7, wherein the sweetener enhancer comprises thaumatin.

9. The yeast product of paragraph 3, wherein the sugar donor comprises a sweetening agent and a sweetener enhancer.

10. The yeast product of paragraph 9, wherein the sweetening agent is selected from a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof.

11. The yeast product of paragraph 9, wherein the sweetener enhancer is selected from brazzein, miraculin, curculin, pentadin, mabinlin, thaumatin, or any mixture thereof.

12. The yeast product of paragraph 9, wherein the sweetener enhancer is thaumatin.

13. The yeast product of paragraph 3, wherein the sugar donor comprises a sweetening agent, a sweetener enhancer and a sweetener.

14. The yeast product of paragraph 13, wherein the sweetener is a natural sweetener or synthetic sweetener.

15. The yeast product of paragraph 14, wherein the synthetic sweetener is a high intensity synthetic sweetener.

16. The yeast product of paragraph 13, wherein the sweetening agent is selected from a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof.

17. The yeast product of paragraph 13, wherein the sweetener enhancer is selected from brazzein, miraculin, curculin, pentadin, mabinlin, thaumatin, or any mixture thereof.

18. The yeast product of paragraph 17, wherein the sweetener enhancer is thaumatin, 19. The yeast product of paragraph 14, wherein the synthetic sweetener is selected from sorbitol, xylitol, mannitol, sucralose, aspartame, acesulfame-K, neotame, erythritol, trehalose, raffinose, cellobiose, tagatose, DOLCIA PRIMA™ allulose inulin N—[N-[3-(3-hydroxy-4-methoxyphenyl)propyl]-alpha-aspartyl]-L-phenylalanine 1-methyl ester, glycyrrhizin, sodium cyclamate, or any mixture thereof.

20. The yeast product of paragraph 19, wherein the synthetic sweetener is allulose or tagatose or their mixtures.

21. The yeast product of paragraph 20, wherein the content of synthetic sweetener is above 5%, 10%, 20%, 30%, 40%, 50%, 60%, 70%, 80%, 90%, 95%, 99%, 99.5%.

22. The yeast product of paragraph 13, wherein the sweetening agent is a Stevia extract.

23. The yeast product of paragraph wherein the *Stevia* extract is a steviol glycoside.

24. The yeast product of paragraph 1, wherein the yeast product is a canned or bottled yeast product.

25. The yeast product of paragraph 1, wherein the yeast product can be a yeast product substitute.

Additional Embodiments, Set 76

1. A protein product comprising an added Maillard reaction product.

2. The protein product of paragraph 1, wherein the protein product further comprises a sugar donor.

3. The protein product of paragraph 2, wherein the sugar donor comprises a sweetening agent, a sweetener, and/or a sweetener enhancer.

4. The protein product of paragraph 3, wherein the sugar donor comprises a sweetening agent.

5. The protein product of paragraph 4, wherein the sweetening agent is selected from a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof.

6. The protein product of paragraph 3, wherein the sugar donor comprises a sweetener enhancer, 7. The protein product of paragraph 6, wherein the sweetener enhancer is selected from brazzein, miraculin, curculin, pentadin, mabinlin, thaumatin, or any mixture thereof.

8. The protein product of paragraph 7, wherein the sweetener enhancer comprises thaumatin.

9. The protein product of paragraph 3, wherein the sugar donor comprises a sweetening agent and a sweetener enhancer.

10. The protein product of paragraph 9, wherein the sweetening agent is selected from a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof.

11. The protein product of paragraph 9, wherein the sweetener enhancer is selected from brazzein, miraculin, curculin, pentadin, mabinlin, thaumatin, or any mixture thereof.

12. The protein product of paragraph 9, wherein the sweetener enhancer is thaumatin.

13. The protein product of paragraph 3, wherein the sugar donor comprises a sweetening agent, a sweetener enhancer and a sweetener.

14. The protein product of paragraph 13, wherein the sweetener is a natural sweetener or synthetic sweetener.

15. The protein product of paragraph 14, wherein the synthetic sweetener is a high intensity synthetic sweetener.

16. The protein product of paragraph 13, wherein the sweetening agent is selected from a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof.

17. The protein product of paragraph 13, wherein the sweetener enhancer is selected from brazzein, miraculin, curculin, pentadin, mabinlin, thaumatin, or any mixture thereof.

18. The protein product of paragraph 17, wherein the sweetener enhancer is thaumatin.

19. The protein product of paragraph 14, wherein the synthetic sweetener is selected from sorbitol, xylitol, mannitol, sucralose, aspartame, acesulfame-K, neotame, erythritol, trehalose, raffinose, cellobiose, tagatose, DOLCIA PRIMA™ allulose, inulin, N—[N-[3-(3-hydroxy-4-methoxyphenyl)propyl]-alpha-aspartyl]-L-phenylalanine 1-methyl ester, glycyrrhizin, sodium cyclamate, or any mixture thereof.

20, The protein product of paragraph 19, wherein the synthetic sweetener is allulose or tagatose or their mixtures.

21. The protein product of paragraph 20, wherein the content of synthetic sweetener is above 5%, 10%, 20%, 30%, 40%, 50%, 60%, 70%, 80%, 90%, 95%, 99%, 99.5%.

22. The protein product of paragraph 13, wherein the sweetening agent is a Stevia extract.

23. The protein product of paragraph 20, wherein the *Stevia* extract is a steviol glycoside.

24. The protein product of paragraph 1, wherein the protein product is a canned or bottled protein product.

25. The protein product of paragraph 1, wherein the protein product can be a protein product substitute.

Additional Embodiments, Set 77

1. A foodstuff comprising an added Maillard reaction product.

2. The foodstuff of paragraph 1, wherein the foodstuff further comprises a sugar donor.

3. The foodstuff of paragraph 2, wherein the sugar donor comprises a sweetening agent, a sweetener, and/or a sweetener enhancer.

4. The foodstuff of paragraph 3, wherein the sugar donor comprises a sweetening agent.

5. The foodstuff of paragraph 4, wherein the sweetening agent is selected from a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof.

6. The foodstuff of paragraph 3, wherein the sugar donor comprises a sweetener enhancer.

7. The foodstuff of paragraph 6, wherein the sweetener enhancer is selected from brazzein, miraculin, curculin, pentadin, mabinlin, thaumatin, or any mixture thereof.

8. The foodstuff of paragraph 7, wherein the sweetener enhancer comprises thaumatin.

9. The foodstuff of paragraph 3, wherein the sugar donor comprises a sweetening agent and a sweetener enhancer.

10. The foodstuff of paragraph 9, wherein the sweetening agent is selected from a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof.

11. The foodstuff of paragraph 9, wherein the sweetener enhancer is selected from brazzein, miraculin, curculin, pentadin, mabinlin, thaumatin, or any mixture thereof.

12. The foodstuff of paragraph 9, wherein the sweetener enhancer is thaumatin.

13. The foodstuff of paragraph 3, wherein the sugar donor comprises a sweetening agent, a sweetener enhancer and a sweetener.

14. The foodstuff of paragraph 13, wherein the sweetener is a natural sweetener or synthetic sweetener.

15. The foodstuff of paragraph 14, wherein the synthetic sweetener is a high intensity synthetic sweetener.

16. The foodstuff of paragraph 13, wherein the sweetening agent is selected from a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof.

17. The foodstuff of paragraph 13, wherein the sweetener enhancer is selected from brazzein, miraculin, curculin, pentadin, mabinlin, thaumatin, or any mixture thereof.

18. The foodstuff of paragraph 17, wherein the sweetener enhancer is thaumatin.

19. The foodstuff of paragraph 14, wherein the synthetic sweetener is selected from sorbitol, xylitol, mannitol, sucralose, aspartame, acesulfame-K, neotame, erythritol, trehalose, raffinose, cellobiose, tagatose, DOLCIA PRIM A™ allulose, inulin, N—[N-[3-(3-hydroxy-4-methoxyphenyl) propyl]-alpha-aspartyl]-L-phenylalanine 1-methyl ester, glycyrrhizin, sodium cyclamate, or any mixture thereof.

20. The foodstuff of paragraph 19, wherein the synthetic sweetener is allulose or tagatose or their mixtures.

21. The foodstuff of paragraph 20, wherein the content of synthetic sweetener is above 5%, 10%, 20%, 30%, 40%, 50%, 60%, 70%, 80%, 90%, 95%, 99%, 99.5%.

22. The foodstuff of paragraph 13, wherein the sweetening agent is a *Stevia* extract.

23. The foodstuff of paragraph 20, wherein the *Stevia* extract is a steviol glycoside.

24. The foodstuff of paragraph 1, wherein the foodstuff is a canned or bottled foodstuff.

25. The foodstuff of paragraph 1, wherein the foodstuff can be a foodstuff substitute or intended for a particular nutritional use.

26. The foodstuff of paragraph 1, wherein the foodstuff is an infant formulae or follow-up formulae; or foods for young children (weaning food); or diabetic foods intended for special medical purposes; diabetic formulae for slimming purposes or weight reduction; or other diabetic foods; or a food supplement.

Additional Embodiments, Set 78

1. A ready-to-eat savory comprising an added Maillard reaction product.

2. The ready-to-eat savory of paragraph 1, wherein the ready-to-eat savory further comprises a sugar donor.

3. The ready-to-eat savory of paragraph 2, wherein the sugar donor comprises a sweetening agent, a sweetener, and/or a sweetener enhancer.

4. The ready-to-eat savory of paragraph 3, wherein the sugar donor comprises a sweetening agent.

5. The ready-to-eat savory of paragraph 4, wherein the sweetening agent is selected from a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof.

6. The ready-to-eat savory of paragraph 3, wherein the sugar donor comprises a sweetener enhancer.

7. The ready-to-eat savory of paragraph 6, wherein the sweetener enhancer is selected from brazzein, miraculin, curculin, pentadin, mabinlin, thaumatin, or any mixture thereof.

8. The ready-to-eat savory of paragraph 7, wherein the sweetener enhancer comprises thaumatin.

9. The ready-to-eat savory of paragraph 3, wherein the sugar donor comprises a sweetening agent and a sweetener enhancer.

10. The ready-to-eat savory of paragraph 9, wherein the sweetening agent is selected from a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof.

11. The ready-to-eat savory of paragraph 9, wherein the sweetener enhancer is selected from brazzein, miraculin, curculin, pentadin, mabinlin, thaumatin, or any mixture thereof.

12. The ready-to-eat savory of paragraph 9, wherein the sweetener enhancer is thaumatin.

13. The ready-to-eat savory of paragraph 3, wherein the sugar donor comprises a sweetening agent, a sweetener enhancer and a sweetener.

14. The ready-to-eat savory of paragraph 13, wherein the sweetener is a natural sweetener or synthetic sweetener.

15. The ready-to-eat savory of paragraph 14, wherein the synthetic sweetener is a high intensity synthetic sweetener.

16. The ready-to-eat savory of paragraph 13, wherein the sweetening agent is selected from a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof.

17, The ready-to-eat savory of paragraph 13, wherein the sweetener enhancer is selected from brazzein, miraculin, curculin, pentadin, mabinlin, thaumatin, or any mixture thereof.

18. The ready-to-eat savory of paragraph 17, wherein the sweetener enhancer is thaumatin.

19. The ready-to-eat savory of paragraph 14, wherein the synthetic sweetener is selected from sorbitol, xylitol, tnannitol, sucralose, aspartame, acesulfame-K, neotame, erythritol, trehalose, raffinose, cellobiose, tagatose, DOLCIA PRIMA™ allulose inulin N—[N-[3-(3-hydroxy-4-methoxyphenyl)propyl]-alpha-aspartyl]-L-phenylalanine 1-methyl ester, glycyrrhizin, sodium cyclamate, or any mixture thereof.

20. The ready-to-eat savory of paragraph 19, wherein the synthetic sweetener is allulose or tagatose or their mixtures.

21. The ready-to-eat savory of paragraph 20, wherein the content of synthetic sweetener is above 5%, 10%, 20%, 30%, 40%, 50%, 60%, 70%, 80%, 90%, 95%, 99%, 99.5%.

22. The ready-to-eat savory of paragraph 13, wherein the sweetening agent is a *Stevia* extract.

23. The ready-to-eat savory of paragraph 20, wherein the *Stevia* extract is a steviol glycoside.

24. The ready-to-eat savory of paragraph 1, wherein the ready-to-eat a savory is canned or bottled ready-to-eat savory.

25. The ready-to-eat savory of paragraph 1, wherein the ready-to-eat savory can be a ready-to-eat savory substitute.

26, The ready-to-eat savory of paragraph 1, wherein the ready-to-eat savory is a snack, potato-, cereal-, flour-, or starch-based savory.

27. The ready-to-eat savory of paragraph 26, wherein the ready-to-eat savory is from roots or tubers; or pulses or legumes.

28. The ready-to-eat savory of paragraph 1, wherein the ready-to-eat savory is processed nuts, including coated nuts and nut mixtures (with e.g. dried fruit).

Additional Embodiments, Set 79

1. A composite food comprising an added Maillard reaction product.

2. The composite food of paragraph 1, wherein the composite food further comprises a sugar donor.

3. The composite food of paragraph 2, wherein the sugar donor comprises a sweetening agent, a sweetener, and/or a sweetener enhancer.

4. The composite food of paragraph 3, wherein the sugar donor comprises a sweetening agent, 5. The composite food of paragraph 4, wherein the sweetening agent is selected from a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof.

6. The composite food of paragraph 3, wherein the sugar donor comprises a sweetener enhancer.

7. The composite food of paragraph 6, wherein the sweetener enhancer is selected from brazzein, miraculin, curculin, pentadin, mabinlin, thaumatin, or any mixture thereof.

8. The composite food of paragraph 7, wherein the sweetener enhancer comprises thaumatin.

9. The composite food of paragraph 3, wherein the sugar donor comprises a sweetening agent and a sweetener enhancer.

10. The composite food of paragraph 9, wherein the sweetening agent is selected from a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof.

11. The composite food of paragraph 9, wherein the sweetener enhancer is selected from brazzein, miraculin, curculin, pentadin, mabinlin, thaumatin, or any mixture thereof.

12. The composite food of paragraph 9, wherein the sweetener enhancer is thaumatin, 13. The composite food of paragraph 3, wherein the sugar donor comprises a sweetening agent, a sweetener enhancer and a sweetener.

14. The composite food of paragraph 13, wherein the sweetener is a natural sweetener or synthetic sweetener.

15. The composite food of paragraph 14, wherein the synthetic sweetener is a high intensity synthetic sweetener.

16. The composite food of paragraph 13, wherein the sweetening agent is selected from a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside, or any mixture thereof.

17. The composite food of paragraph 13, wherein the sweetener enhancer is selected from brazzein, miraculin, curculin, pentadin, mabinlin, thaumatin, or any mixture thereof.

18. The composite food of paragraph 17, wherein the sweetener enhancer is thaumatin.

19. The composite food of paragraph 14, wherein the synthetic sweetener is selected from sorbitol, xylitol, mannitol, sucralose, aspartame, acesulfame-K, neotame, erythritol, trehalose, raffinose, cellobiose, tagatose, DOLCIA PRLMA™ allulose, inulin, N—[N-[3-(3-hydroxy-4-methoxyphenyl)propyl]-alpha-aspartyl]-L-phenylalanine 1-methyl ester, glycyrrhizin, sodium cyclamate, or any mixture thereof.

20. The composite food of paragraph 19, wherein the synthetic sweetener is allulose or tagatose or their mixtures.

21. The composite food of paragraph 20, wherein the content of synthetic sweetener is above 5%, 10%, 20%, 30%, 40%, 50%, 60%, 70%, 80%, 90%, 95%, 99%, 99.5%, 22. The composite food of paragraph 13, wherein the sweetening agent is a Stevia extract.

23. The composite food of paragraph 20, wherein the *Stevia* extract is a steviol glycoside.

24, The composite food of paragraph 1, wherein the composite food is a canned or bottled composite food.

25. The composite food of paragraph 1, wherein the composite food is a casserole, meat pie, or mincemeat.

Additional Embodiments, Set 80

1. A composition comprising a Maillard reaction product and a thaumatin.

2. The composition of paragraph 1, wherein the Maillard reaction product is formed from the reaction of reactants comprising amine donor and sugar donor.

3. The composition of paragraph 2, wherein the sugar donor comprises a reducing sugar, sweetener or sweetening agent.

4. The composition of paragraph 3, wherein the sweetening agent is selected from one or more of the group consisting of a licorice extract, a sweet tea extract, a *Stevia* extract, a swingle extract, a glycosylated sweet tea extract, a glycosylated *Stevia* extract, a glycosylated swingle extract, a glycosylated sweet tea glycoside, a glycosylated steviol glycoside, a glycosylated mogroside or mixtures thereof.

5. The composition of paragraph 4, wherein the *Stevia* extract comprises one or more steviol glycoside components.

6. The composition of paragraph 5, wherein the steviol glycoside components are present at an amount of less than 99 wt %, less than 80 wt %, less than 60%, less than 30%, or equal to 0 wt % of the total weight of the *Stevia* extract.

7. The composition of paragraph 3, wherein the sweetener is selected from one or more of the group consisting of sorbitol, xylitol, mannitol, aspartame, acesulfame-K, neotame, erythritol, trehalose, raffinose, cellobiose, tagatose, DOLCIA PRIMA™ allulose, inulin, N—[N-[3-(3-hydroxy-4-methoxyphenyl)propyl]-alpha-aspartyl]-L-phenylalanine 1-methyl ester, glycyrrhizin, sodium cyclamate, or mixtures thereof.

8. The composition of paragraph 2, wherein the amine donor comprises compounds having a free amino group.

9. The composition of paragraph 8, wherein the amine donor comprises an amine comprising primary amine compounds and secondary amine compounds, an amino acid, a. protein, a peptide, yeast extracts or mixtures thereof.

10. The composition of paragraph 1, wherein the thaumatin comprises thaumatin a, b, c and/or combinations thereof.

11. The composition of any of paragraphs 1-10, wherein the ratio of the thaumatin to the Mail lard reaction product is from 1:100 to 100:1 by weight.

12. The composition of paragraph 1, wherein the composition further comprise a sweetening agent and/or a sweetener.

13. A food or beverage product comprising the composition of any of paragraphs 1-12 and a food or a beverage material, 14. The food or beverage product of paragraph 13, wherein the thaumatins present from about 0.01 ppm to 20 ppm by weight of the total weight of the product.

15, The product of paragraph 14, wherein the beverage or food material is selected from one of tea, cocoa, juice, coffee, etc.

Additional Embodiments, Set 81

1. A composition comprising:

one or more Maillard reaction product(s) formed from a *Stevia* extract;

one or more reducing sugar(s) comprising one or more of mannose, glucose, rhamnose, fructose, arabinose, lactose, galactose, xylose or raffi nose or any mixture thereof; and one or more amine donor(s) comprising glutamic acid, valine, serine, proline, lysine, tryptophan, threonine, histidine, glycine, glutamine or any mixture thereof.

2. The composition of paragraph 1, wherein the reducing sugar is galactose and the amine donor is glutamic acid.

3. The composition of paragraph 1, wherein, optionally, a portion of unreacted *Stevia* extract and/or unreacted reducing sugar(s) and/or a portion of unreacted amine donor(s) remain in the composition.

4. The composition of paragraph 1, further comprising further sorbitol, xylitol, mannitol, sucralose, aspartame, acesulfame-K, neotame, erythritol, trehalose, raffinose, cellobiose, tagatose, allulose, inulin, N—[N-[3-(3-hydroxy-4-methoxyphenyl)propyl]-alpha-aspartyl]-L-phenylalanine 1-methyl ester, glycyrrhizin, sodium cyclamate, brazzein, miraculin, curculin, pentadin, mabinlin, thaumatin, neohesperidin dihydrochalcone (NHDC), maltol, advantame or combinations thereof.

5. The composition of any of paragraphs 1 through 4, wherein the composition has a citrus or tangerine taste.

6. A method for preparing a citrus flavored composition, comprising the steps:

preparing a reaction mixture comprising:

a *Stevia* extract;

one or more reducing sugar(s),) comprising one or more of mannose, glucose, rhamnose, fructose, arabinose, lactose, galactose, xylose or raffinose or combinations thereof; and one or more amine donor(s) comprising, glutamic acid, valine, serine, proline, lysine, tryptophan, threonine, histidine, glycine, glutamine or combinations thereof;

optionally, combining the reaction mixture with one or more solvents to provide a reaction solution;

heating the reaction solution under conditions suitable for forming a solution or slurry, optionally, wherein the *Stevia* extract is added during or after the completion of the conventional Maillard reaction, to form a Maillard reaction mixture composition; and optionally, isolating the Maillard reaction mixture composition.

7. The method of paragraph 6, wherein the reducing sugar is galactose and the amine donor is glutamic acid.

8. The method of paragraph 6, wherein, optionally, a portion of unreacted Stevia extract and/or unreacted reducing sugar(s) and/or a portion of unreacted amine donor(s) remain in the composition.

9. The method of paragraph 6, further comprising sorbitol, xylitol, mannitol, sucralose, aspartame, acesulfame-K, neotame, erythritol, trehalose, raffinose, cellobiose, tagatose, allulose, inulin, N—[N-[3-(3-hydroxy-4-methoxyphenyl) propyl]-alpha-aspartyl]-L-phenylalanine 1-methyl ester, glycyrrhizin, sodium cyclamate, brazzein, miraculin, curculin, pentadin, mabinlin, thaumatin, neohesperidin dihydrochalcone (NHDC), maltol, advantame or combinations thereof.

10. The method of any of paragraphs 6 through 9, wherein the Maillard reaction mixture has a citrus or tangerine taste.

11. A method for improving taste and/or mouthfeel profile of a food or beverage composition, comprising the steps:

preparing a reaction mixture comprising:

a *Stevia* extract;

one or more reducing sugar(s),) comprising one or more of mannose, glucose, rhamnose, fructose, arabinose, lactose, galactose, xylose or raffinose or combinations thereof, and one or more amine donor(s) comprising, glutamic acid, valine, serine, proline, lysine, tryptophan, threonine, histidine, glycine, glutamine;

optionally, combining the reaction mixture with one or more solvents to provide a reaction solution;

heating the reaction solution under conditions suitable for forming a solution or slurry, optionally, wherein the *Stevia* extract is added during or after the completion of the conventional Maillard reaction, to form a Maillard reaction mixture composition;

optionally, isolating the Maillard reaction mixture composition; and adding the Maillard reaction mixture composition to provide a flavor modified food or beverage composition, wherein the taste and/or mouthfeel profile of the food or beverage is improved.

12. The method of paragraph 11, wherein the reducing sugar is galactose and the amine donor is glutamic acid.

13. The method of paragraph 11, wherein, optionally, a portion of unreacted *Stevia* extract and/or unreacted reducing sugar(s) and/or a portion of unreacted amine donor(s) remain in the composition.

14. The method of either of paragraph 11, further comprising sorbitol, xylitol, mannitol, sucralose, aspartame, acesulfame-K, neotame, erythritol, trehalose, raffinose, cellobiose, tagatose, allulose, inulin, N—[N-[3-(3-hydroxy-4- methoxyphenyl)propyl]-alpha-aspartyl]-L-phenylalanine 1-methyl ester, glycyrrhizin, sodium cyclamate, brazzein, miraculin, curculin, pentadin, mabinlin, thaumatin, neohesperidin dihydrochalcone (NHDC), maltol, advantame or combinations thereof.

15. The method of any of paragraphs 11 through 14, wherein the modified food or beverage has a citrus or tangerine taste.

16. An improved taste and/or mouthfeel food or beverage composition, comprising one or more Maillard reaction product(s) formed from:

a *Stevia* extract;

one or more reducing sugar(s) comprising one or more of mannose, glucose, rhamnose, fructose, arabinose, lactose, galactose, xylose or raffinose or any mixture thereof; and one or more amine donor(s) comprising glutamic acid, valine, serine, proline, lysine, tryptophan, threonine, hi stidine, glycine, glutamine or any mixture thereof.

17. The improved food or beverage composition of paragraph 16, wherein the reducing sugar is galactose and the amine donor is glutamic acid.

18. The improved food or beverage composition of paragraph 16, wherein, optionally, a portion of unreacted *Stevia* extract and/or unreacted reducing sugar(s) and/or a portion of unreacted amine donor(s) remain in the composition.

19. The improved food or beverage composition of paragraph 16, further comprising further sorbitol, xylitol, mannitol, sucralose, aspartame, acesulfame-K, neotame, erythritol, trehalose, raffinose, cellobiose, tagatose, allulose, inulin, N—[N-[3-(3-hydroxy-4-methoxyphenyl)propyl]-alpha-aspartyl]-L-phenylalanine 1-methyl ester, glycyrrhizin, sodium cyclamate, brazzein, miraculin, curculin, pentadin, thaumatin, neohesperidin dihydrochalcone (NHDC), maltol, advantame or combinations thereof.

20. The improved food or beverage composition of any of paragraphs 16 through 19, wherein the improved food or beverage composition has a citrus or tangerine taste.

Additional Embodiments, Set 82

1. A composition comprising a Maillard reaction product(s) (MRPs) formed from one or more reducing sugar(s) having a free carbonyl group and one or more amine donor(s) having a free amino group and one or more non-nutritive sweeteners or one or more sweetener enhancer(s).

2. The composition of paragraph 1, wherein the reducing sugar comprises monosaccharides, disaccharides, oligosaccharides, polysaccharides, and combinations thereof 3. The composition of paragraph 1, wherein the amine donor comprises one or more of a primary amine compound, a secondary amine compound, an amino acid, a protein, a peptide, a yeast extract or any mixture thereof.

4. The composition of paragraph 3, wherein the amino acid comprises alanine, arginine, asparagine, aspartic acid, cysteine, glutamine, glutamic acid, glycine, histidine, isoleucine, leucine, lysine, methionine, phenylalanine, proline, serine, threonine, tryptophan, tyrosine, valine or any mixture thereof.

5. The composition of paragraph 1, wherein the one or more non-nutritive sweetener(s) or one or more sweetener enhancer(s) comprises sorbitol, xylitol, mannitol, sucralose, aspartame, acesulfame-K, neotame, erythritol, trehalose, raffinose, cellobiose, tagatose, allulose, inulin, N—[N-[3-(3-hydroxy-4-methoxyphenyl)propyl]-alpha-aspartyl]-L-phenylalanine 1-methyl ester, glycyrrhizin, sodium cyclamate, brazzein, miraculin, curculin, pentadin, mabinlin, thaumatin, neohesperidin dihydrochalcone (NHDC), maltol, advantame or combinations thereof.

6. The composition of any of paragraphs 1 through 5, wherein, optionally, a portion of unreacted reducing sugar(s) and/or a portion of unreacted amine donor(s) and/or a portion of unreacted non-nutritive sweetener(s) and/or sweetener enhancer(s) remain in the composition.

7. The composition of paragraph 6, further comprising a sweetening agent comprising sweet tea extracts, swingle (mogroside) extracts, one or more sweet tea glycosides (rubusoside and suaviosides), one or more mogrosides, one or more glycosylated sweet tea glycosides, one or more glycosylated mogrosides or any mixture thereof.

8. A method for preparing a composition, the composition comprising a Maillard reaction product(s) (MRPs) and one or more non-nutritive sweetener(s) or one or more sweetener enhancer(s), wherein the MRP(s) is formed from one or more reducing sugar(s) having a free carbonyl group and one or more amine donor(s) having a free amino group, comprising the steps:

preparing a reaction mixture comprising one or more reducing sugar(s) and one or more amine donor(s) comprising a free amino group(s);

optionally, combining the reaction mixture with one or more solvents to provide a reaction solution;

heating the reaction solution under conditions suitable for forming a solution or slurry comprising one or more Maillard reaction product(s) (MRPs);

adding the one or more non-nutritive sweetener(s) or one or more sweetener enhancer(s) to the reaction solution to form a Maillard reaction mixture; and optionally, isolating the Maillard reaction mixture composition.

9. The method of paragraph 8, wherein the reducing sugar comprises monosaccharides, disaccharides, oligosaccharides, polysaccharides, and combinations thereof.

10. The method of paragraph 8, wherein the amine donor comprises one or more of a primary amine compound, a secondary amine compound, an amino acid, a protein, a peptide, a yeast extract or any mixture thereof.

11. The method of paragraph 8, wherein the amino acid comprises alanine, arginine, asparagine, aspartic acid, cysteine, glutamine, glutamic acid, glycine, histidine, isoleucine, leucine, lysine, methionine, phenylalanine, proline, serine, threonine, tryptophan, tyrosine, valine or any mixture thereof.

12. The method of paragraph 8, wherein the one or more non-nutritive sweetener(s) or one or more sweetener enhancer(s) comprises sorbitol, xylitol, mannitol, sucralose, aspartame, acesulfame-K, neotame, erythritol, trehalose, raffinose, cellobiose, tagatose, allulose, inulin, N-[N-[3-(3-hydroxy-4-methoxyphenyl)propyl]-alpha-aspartyl]-L-phenylalanine 1-methyl ester, glycyrrhizin, sodium cyclamate, brazzein, miraculin, curculin, pentadin, mabinlin, thaumatin, neohesperidin dihydrochaicone (NHDC), maltol, advantame or combinations thereof.

13. The method of any of paragraphs 8 through 12, wherein, optionally, a portion of unreacted reducing sugar(s) and/or a portion of unreacted amine donor(s) and/or a portion of unreacted non-nutritive sweetener(s) and/or sweetener enhancer(s) remain in the composition.

14. The method of paragraph 13, further comprising a sweetening agent comprising sweet tea extracts, swingle (mogroside) extracts, one or more sweet tea glycosides (rubusoside and suaviosides), one or more mogrosides, one or more glycosylated sweet tea glycosides, one or more glycosylated mogrosides or any mixture thereof.

15. A method for improving taste and/or mouthfeel profile of a food or beverage composition, comprising the steps:

preparing a reaction mixture comprising one or more reducing sugar(s) and one or more amine donor(s) comprising a free amino group(s);

optionally, combining the reaction mixture with one or more solvents to provide a reaction solution;

heating the reaction solution under conditions suitable for forming a solution or slurry comprising one or more Maillard reaction product(s) (MRPs);

adding one or more non-nutritive sweetener(s) or one or more sweetener enhancer(s) to the reaction solution to form a Maillard reaction mixture; and optionally, isolating the Maillard reaction mixture composition; and adding the Maillard reaction mixture to a food or beverage composition, wherein the taste and/or mouthfeel profile of the food or beverage is improved.

16. The method of paragraph 15, wherein the reducing sugar comprises monosaccharides, disaccharides, oligosaccharides, polysaccharides, and combinations thereof.

17. The method of paragraph 15, wherein the amine donor comprises one or more of a primary amine compound, a secondary amine compound, an amino acid, a protein, a peptide, a yeast extract or any mixture thereof.

18. The method of paragraph 15, wherein the amino acid comprises alanine, arginine, asparagine, aspartic acid, cysteine, glutamine, glutamic acid, glycine, histidine, isoleucine, leucine, lysine, methionine, phenylalanine, proline, serine, threonine, tryptophan, tyrosine, valine or any mixture thereof.

19. The method of paragraph 15, wherein the one or more non-nutritive sweetener(s) or one or more sweetener enhancer(s) comprises sorbitol, xylitol, mannitol, sucralose, aspartame, acesulfame-K, neotame, erythritol, trehalose, raffinose, cellobiose, tagatose, allulose, inulin, N—[N-[3-(3-hydroxy-4-methoxyphenyl)propyl]-alpha-aspartyl]-L-phenylalanine 1-methyl ester, glycyrrhizin, sodium cyclamate, brazzein, miraculin, curculin, pentadin, mabinlin, thaumatin, neohesperidin dihydrochalcone (NHDC), maltol, advantame or combinations thereof.

20. The method of any of paragraphs 15 through 19, wherein, optionally, a portion of unreacted reducing sugar(s) and/or a portion of unreacted amine donor(s) and/or a portion of unreacted non-nutritive sweetener(s) and/or sweetener enhancer(s) remain in the composition.

21. The method of paragraph 20, further comprising a sweetening agent comprising sweet tea extracts, swingle (mogroside) extracts, one or more sweet tea glycosides (rubusoside and suaviosides), one or more mogrosides, one or more glycosylated sweet tea glycosides, one or more glycosylated mogrosides or any mixture thereof.

22. An improved taste and/or mouthfeel food or beverage composition, comprising one or more Maillard reaction product(s) (MRPs) formed from:

one or more reducing sugar(s) having a free carbonyl group;

one or more amine donor(s) having a free amino group; and one or more non-nutritive sweeteners or one or more sweetener enhancer(s).

23. The improved food or beverage composition of paragraph 22, wherein the reducing sugar comprises monosaccharides, disaccharides, oligosaccharides, polysaccharides, and combinations thereof.

24. The improved food or beverage composition of paragraph 22, wherein the amine donor comprises one or more of a primary amine compound, a secondary amine compound, an amino acid, a protein, a peptide, a yeast extract or any mixture thereof.

25. The improved food or beverage composition of paragraph 24, wherein the amino acid comprises alanine, arginine, asparagine, aspartic acid, cysteine, glutamine, glutamic acid, glycine, histidine, isoleucine, leucine, lysine, methionine, phenylalanine, proline, serine, threonine, tryptophan, tyrosine, valine or any mixture thereof.

26. The improved food or beverage composition of paragraph 22, wherein the one or more non-nutritive sweetener(s) or one or more sweetener enhancer(s) comprises sorbitol, xylitol, mannitol, sucralose, aspartame, acesulfame-K, neotame, erythritol, trehalose, raffinose, cellobiose, tagatose, allulose, inulin, N—[N-[3-(3-hydroxy-4-methoxyphenyl)propyl]-alpha-aspartyl]-L-phenylalanine 1-methyl ester, glycyrrhizin, sodium cyclamate, brazzein, miraculin, curculin, pentadin, mabinlin, thaumatin, neohesperidin dihydrochalcone (NHDC), maltol, advantame or combinations thereof.

27. The improved food or beverage composition of any of paragraphs 22 through 27, wherein, optionally, a portion of unreacted reducing sugar(s) and/or a portion of unreacted amine donor(s) and/or a portion of unreacted non-nutritive sweetener(s) and/or sweetener enhancer(s) remain in the composition.

28. The improved food or beverage of paragraph 27, further comprising a sweetening agent comprising sweet tea extracts, swingle (mogroside) extracts, one or more sweet tea glycosides (rubusoside and suaviosides), one or more mogrosides, one or more glycosylated sweet tea glycosides, one or more glycosylated mogrosides or any mixture thereof.

Additional Embodiments, Set 83

1. A composition comprising a Maillard reaction product(s) of (1) one or more of a *Stevia* extract, a steviol glycoside(s), a glycosylated steviol glycoside, or any mixture thereof; and (2) one or more amine donor(s).

2. The composition of paragraph 1, wherein the steviol glycoside comprises rebaudioside A, rebaudioside B, rebaudioside D, rebaudioside rebaudioside M, rebaudioside O, or any mixture thereof.

3. The composition of paragraph 1, wherein the glycosylated steviol glycoside comprises glycosylation products of stevioside, steviolbioside, rebaudioside A, rebaudioside B, rebaudioside C, rebaudioside D, rebaudioside E, rebaudioside F, rebaudioside M, rebaudioside O, rebaudioside H, rebaudioside I, rebaudioside L, rebaudioside N, rebaudioside K, rebaudioside rubusoside, dulcoside A or any mixture thereof.

4. The composition of paragraph 1, wherein the amine donor comprises one or more of a primary amine compound, a secondary amine compound, an amino acid, a protein, a peptide, a yeast extract or any mixture thereof.

5. The composition of paragraph 4, wherein the amino acid comprises alanine, arginine, asparagine, aspartic acid, cysteine, glutamine, glutamic acid, glycine, histidine, isoleucine, leucine, lysine, methionine, phenylalanine, proline, serine, threonine, tryptophan, tyrosine, valine or any mixture thereof.

6. The composition of any of paragraphs 1 through 5, wherein, optionally, a portion of unreacted *Stevia* extract, unreacted steviol glycoside or unreacted glycosylated steviol glycoside and/or a portion of unreacted amine donor remain in the composition.

7. The composition of paragraph 6, further comprising sorbitol, xylitol, mannitol, sucralose, aspartame, acesulfame-K, neotame, erythritol, trehalose, raffinose, cellobiose, tagatose, allulose, inulin, N—[N-[3-(3-hydroxy-4-methoxyphenyl)propyl]-alpha-aspartyl]-L-phenylalanine 1-methyl ester, glycyrrhizin, sodium cyclamate, brazzein, miraculin, curculin, pentadin, mabinlin, thaumatin, neohesperidin dihydrochalcone (NHDC), maltol, advantame or combinations thereof.

8. The composition of paragraph 6, further comprising a sweetening agent comprising sweet tea extracts, *Stevia* extracts, swingle (mogroside) extracts, one or more sweet tea glycosides (rubusoside and suaviosides), steviol glycosides, one or more mogrosides, one or more glycosylated sweet tea glycosides, glycosylated steviol glycosides, one or more glycosylated mogrosides or any mixture thereof.

9. A method for preparing a composition of steviol glycoside Maillard reaction product(s) (S-MRPs) and/or a glycosylated steviol glycoside MRP(s) (GSG-MRPs) or any mixture thereof, comprising the steps:

preparing a reaction mixture comprising a *Stevia* extract, a steviol glycoside and/or a glycosylated steviol glycoside or any mixture thereof and one or more amine donors comprising a free amino group;

optionally, combining the reaction mixture with one or more solvents to provide a reaction solution;

heating the reaction solution under conditions suitable for forming a solution or slurry comprising one or more steviol glycoside Maillard reaction product(s) (SG-MPRs) and/or one or more glycosylated steviol glycoside Maillard reaction products (GSG-MRPs); and optionally, isolating the S-MRP(s) and/or GSG-MPR(s) compositions.

10. The method of paragraph 9, wherein the steviol glycoside comprises rebaudioside A, rebaudioside B, rebaudioside D, rebaudioside E, rebaudioside M, rebaudioside O, or any mixture thereof.

11. The method of paragraph 9, wherein the glycosylated steviol glycoside comprises glycosylation products of stevioside, steviolbioside, rebaudioside A, rebaudioside B, rebaudioside C, rebaudioside D, rebaudioside E, rebaudioside F, rebaudioside M, rebaudioside O, rebaudioside rebaudioside I, rebaudioside L, rebaudioside N, rebaudioside K, rebaudioside rubusoside, dulcoside A or any mixture thereof.

12. The method of paragraph 9, wherein the amine donor comprises one or more of a primary amine compound, a secondary amine compound, an amino acid, a protein, a peptide, a yeast extract or any mixture thereof.

13. The method of paragraph 12, wherein the amino acid comprises alanine, arginine, asparagine, aspartic acid, cysteine, glutamine, glutamic acid, glycine, histidine, isoleucine, leucine, lysine, methionine, phenylalanine, proline, serine, threonine, tryptophan, tyrosine, valine or any mixture thereof.

14. The method of any of paragraphs 9 through 13, wherein, optionally, a portion of unreacted steviol glycoside or unreacted glycosylated steviol glycoside and/or a portion of unreacted amine donor remain in the S-MRP(s) and/or GSG-MRP(s) compositiond.

15. The method of paragraph 14, further comprising adding sorbitol, xylitol, mannitol, sucralose, aspartame, acesulfame-K, neotame, erythritol, trehalose, raffinose, cellobiose, tagatose, allulose, inulin, N—[N-[3-(3-hydroxy-4-methoxyphenyl)propyl]-alpha-aspartyl]-L-phenylalanine 1-methyl ester, glycyrrhizin, sodium cyclamate, brazzein, miraculin, curculin, pentadin, mabinlin, thaumatin, neohesperidin dihydrochalcone (NHDC), maltol, advantame or combinations thereof, to the reaction solution or the S-MRP(s) and/or GSG-MRP(s) compositiond.

16. The composition of paragraph 14, further comprising a sweetening agent comprising sweet tea extracts, *Stevia* extracts, swingle (mogroside) extracts, one or more sweet tea glycosides (nibusoside and suaviosides), steviol glycosides, one or more mogrosides, one or more glycosylated sweet tea glycosides, glycosylated steviol glycosides, one or more glycosylated mogrosides or any mixture thereof.

17. A method for improving taste and/or mouthfeel profile of a food or beverage composition, comprising the steps:

preparing a reaction mixture comprising a *Stevia* extract, a steviol glycoside and/or a glycosylated steviol glycoside or any mixture thereof and one or more amine donors comprising a free amino group;

optionally, combining the reaction mixture with one or more solvents to provide a reaction solution;

heating the reaction solution under conditions suitable for forming a solution or slurry comprising one or more steviol glycoside Maillard reaction product(s) (SG-MPRs) and/or one or more glycosylated steviol glycoside Maillard reaction products (GSG-MRPs), and optionally, isolating the SG-MPR(s) and/or GSG-MRP(s) compositions; and adding the one or more S-MRP(s) and/or GSG-MRP(s) to a food or beverage composition, wherein the taste and/or mouthfeel profile of the food or beverage is improved.

18. The method of paragraph 17, wherein the steviol glycoside comprises rebaudioside A, rebaudioside B, rebaudioside D, rebaudioside E, rebaudioside M, rebaudioside O, or any mixture thereof.

19. The method of paragraph 17, wherein the glycosylated steviol glycoside comprises glycosylation products of stevioside, steviolbioside, rebaudioside A, rebaudioside rebaudioside C, rebaudioside D, rebaudioside E, rebaudioside F, rebaudioside M, rebaudioside O, rebaudioside rebaudioside I, rebaudioside L, rebaudioside N, rebaudioside K, rebaudioside rubusoside, dulcoside A or any mixture thereof.

20. The method of paragraph 17, wherein the amine donor comprises one or more of a primary amine compound, a secondary amine compound, an amino acid, a protein, a peptide, a yeast extract or any mixture thereof.

21. The method of paragraph 20, wherein the amino acid comprises alanine, arginine, asparagine, aspartic acid, cysteine, glutamine, glutamic acid, glycine, histidine, isoleucine, leucine, lysine, methionine, phenylalanine, proline, serine, threonine, tryptophan, tyrosine, valine or any mixture thereof.

22. The method of any of paragraphs 17 through 21, wherein, optionally, a portion of unreacted steviol glycoside or unreacted glycosylated steviol glycoside and/or a portion of unreacted amine donor remain in the S-MRP(s) and/or GSG-MRP(s) compositions.

23. The method of paragraph 15, further comprising adding sorbitol, xylitol, mannitol, sucralose, aspartame, acesulfame-K, neotame, erythritol, trehalose, raffinose, cellobiose, tagatose, allulose, inulin, N—[N-[3-(3-hydroxy-4-methoxyphenyl)propyl]-alpha-aspartyl]-phenylalanine 1-methyl ester, glycyrrhizin, sodium cyclamate, brazzein, miraculin, curculin, pentadin, mabinlin, thaumatin, neohesperidin dihydrochalcone (NHDC), advantame or combinations thereof, to the reaction solution or the S-MRP(s) and/or GSG-MRP(s) composition.

24. The composition of paragraph 22, further comprising a sweetening agent comprising sweet tea extracts, *Stevia* extracts, swingle (mogroside) extracts, one or more sweet tea glycosides (rubusoside and suaviosides), steviol glycosides, one or more mogrosides, one or more glycosylated sweet tea glycosides, glycosylated steviol glycosides, one or more glycosylated mogrosides or any mixture thereof.

25. An improved taste and/or mouthfeel food or beverage composition, comprising one or more Maillard reaction product(s) formed from:

one or more *Stevia* extract(s);

one or more steviol glycoside(s), or more glycosylated steviol glycoside(s), or any mixture thereof; and one or more amine donor(s).

26. The improved food or beverage of paragraph 25, wherein the steviol glycoside comprises rebaudioside A, rebaudioside B, rebaudioside D, rebaudioside E, rebaudioside M, rebaudioside O, or any mixture thereof.

27. The improved food or beverage of paragraph 25, wherein the glycosylated steviol glycoside comprises glycosylation products of stevioside, steviolbioside, rebaudioside rebaudioside B, rebaudioside C, rebaudioside D, rebaudioside E, rebaudioside F, rebaudioside M, rebaudioside O, rebaudioside H, rebaudioside I, rebaudioside L, rebaudioside N, rebaudioside K, rebaudioside J, rubusoside, dulcoside A or any mixture thereof.

28. The improved food or beverage of paragraph 25, wherein the amine donor comprises one or more of a primary amine compound, a secondary amine compound, an amino acid, a protein, a peptide, a yeast extract or any mixture thereof.

29. The improved food or beverage of paragraph 28, wherein the amino acid comprises alanine, arginine, asparagine, aspartic acid, cysteine, glutamine, glutamic acid, glycine, histidine, isoleucine, leucine, lysine, methionine, phenylalanine, proline, serine, threonine, tryptophan, tyrosine, valine or any mixture thereof.

30. The improved food or beverage of any of paragraphs 25 through 29, wherein, optionally, a portion of unreacted *Stevia* extract, unreacted steviol glycoside or unreacted glycosylated steviol glycoside and/or a portion of unreacted amine donor remain in the composition.

31. The improved food or beverage of paragraph 30, further comprising sorbitol, xylitol, mannitol, sucralose, aspartame, acesulfame-K, neotame, erythritol, trehalose, raffinose, cellobiose, tagatose, allulose, inulin, N—[N-[3-(3-hydroxy-4-methoxyphenyl)propyl]-alpha-aspartyl]-L-phenylalanine 1-methyl ester, glycyrrhizin, sodium cyclamate, brazzein, miraculin, curculin, pentadin, mabinlin, thaumatin, neohesperi din dihydrochalcone (NHDC), advantame or combinations thereof.

32. The improved food or beverage of paragraph 30, further comprising a sweetening agent comprising sweet tea extracts, *Stevia* extracts, swingle (mogroside) extracts, one or more sweet tea glycosides (rubusoside and suaviosides), steviol glycosides, one or more mogrosides, one or more glycosylated sweet tea glycosides, glycosylated steviol glycosides, one or more glycosylated mogrosides or any mixture thereof.

Additional Embodiments, Set 84

1. A composition comprising one or more Mail lard reaction product(s) (MRPs) formed from (1) one or more reducing sugar(s) having a free carbonyl group in combination with one or more amine donor(s) having a free amino group or any mixtures thereof; and (2) one or more Maillard reaction product(s) formed from one or more of a *Stevia* extract(s) (*Stevia*-MPRs), one or more steviol glycoside(s) (S-MRPs), one or more glycosylated steviol glycoside(s) (GSG-MRPs) in combination with one or more amine donors, or any mixture thereof.

2. The composition of paragraph 1, wherein the reducing sugar comprises monosaccharides, disaccharides, oligosaccharides, polysaccharides, and combinations thereof.

3. The composition of paragraph 1, wherein the amine donor comprises one or more of a primary amine compound, a secondary amine compound, an amino acid, a protein, a peptide, a yeast extract or any mixture thereof.

4. The composition of paragraph 3, wherein the amino acid comprises alanine, arginine, asparagine, aspartic acid, cysteine, glutamine, glutamic acid, glycine, histidine, isoleucine, leucine, lysine, methionine, phenylalanine, proline, serine, threonine, tryptophan, tyrosine, valine or any mixture thereof.

5. The composition of paragraph 1, wherein the steviol glycoside comprises rebaudioside A, rebaudioside B, rebaudioside D, rebaudioside E, rebaudioside M, rebaudioside O, or any mixture thereof.

6. The composition of paragraph I, wherein the glycosylated steviol glycoside comprises glycosylation products of stevioside, steviolbioside, rebaudioside A, rebaudioside B, rebaudioside C, rebaudioside D, rebaudioside E. rebaudioside F, rebaudioside M, rebaudioside O, rebaudioside H, rebaudioside I, rebaudioside L, rebaudioside N, rebaudioside K, rebaudioside rubusoside, dulcoside A or any mixture thereof.

7. The composition of any of paragraphs 1 through 6, wherein, optionally, a portion of unreacted reducing sugar(s), *Stevia* extract, steviol glycoside(s), glycosylated steviol glycoside(s) and/or a portion of unreacted amine donor(s) remain in the composition.

8. The composition of paragraph 7, further comprising sorbitol, xylitol, mannitol, sucralose, aspartame, acesulfame-K, neotame, erythritol, trehalose, raffinose, cellobiose, tagatose, allulose, inulin, N—[N-[3-(3-hydroxy-4-methoxyphenyl)propyl]-alpha-aspartyl]-L-phenylalanine 1-methyl ester, glycyrrhizin, sodium cyclamate, brazzein, miraculin, curculin, pentadin, mabinlin, thaumatin, neohesperidin dihydrochalcone (NHDC), maltol, advantame or combinations thereof.

9. The composition of paragraph 7, further comprising a sweetening agent comprising sweet tea extracts, swingle (mogroside) extracts, one or more sweet tea glycosides (rubusoside and suaviosides), one or more mogrosides, one or more glycosylated sweet tea glycosides, one or more glycosylated mogrosides or any mixture thereof.

10. A method for preparing a composition, the composition comprising one or more reducing sugar based. Maillard reaction product(s) (MRPs) and one or more Maillard reaction products formed from one or more *Stevia* extract(s) (*Stevia*-MRPs), one or more steviol glycoside(s) (S-MRPs), one or more glycosylated steviol glycoside(s) (GSG-MRPs), or any mixture thereof, in combination with one or more amine donor(s), wherein the reducing sugar based MRP(s) are formed from one or more reducing sugar(s) having a free carbonyl group and one or more amine donor(s) having a free amino group, wherein the method comprises the steps of:

preparing a reaction mixture comprising one or more reducing sugar(s), one or more of *Stevia* extract, a steviol glycoside(s) and/or a glycosylated steviol glycoside(s) and one or more amine donor(s) comprising a free amino group(s);

optionally, combining the reaction mixture with one or more solvents to provide a reaction solution;

heating the reaction solution under conditions suitable for forming a solution or slurry comprising one or more reducing sugar Maillard reaction product(s) (MRPs) and one or more *Stevia*-MRP(s), S-MRP(s) and/or GSG-MRP(s), wherein optionally, the *Stevia* extract, the steviol glycoside(s) and/or the glycosylated steviol glycoside(s) is added during or after the completion of the conventional Maillard reaction, to form a Maillard reaction mixture composition; and optionally, isolating the Maillard reaction mixture composition.

11. The method of paragraph 10, wherein the reducing sugar comprises monosaccharides, disaccharides, oligosaccharides, polysaccharides, and combinations thereof.

12. The method of paragraph 10, wherein the amine donor comprises one or more of a primary amine compound, a secondary amine compound, an amino acid, a protein, a peptide, a yeast extract or any mixture thereof.

13. The method of paragraph 12, wherein the amino acid comprises alanine, arginine, asparagine, aspartic acid, cysteine, glutamine, glutamic acid, glycine, histidine, isoleucine, leucine, lysine, methionine, phenylalanine, proline, serine, threonine, tryptophan, tyrosine, valine or any mixture thereof.

14. The method of paragraph 10, wherein the steviol glycoside comprises rebaudioside A, rebaudioside B, rebaudioside D, rebaudioside E, rebaudioside M, rebaudioside O, or any mixture thereof.

15. The method of paragraph 10, wherein the glycosylated steviol glycoside comprises glycosylation products of stevioside, steviolbioside, rebaudioside A, rebaudioside B, rebaudioside C, rebaudioside D, rebaudioside E, rebaudioside F, rebaudioside M, rebaudioside O, rebaudioside H, rebaudioside I, rebaudioside L, rebaudioside N, rebaudioside K, rebaudioside rubusoside, dulcoside A or any mixture thereof.

16. The method of any of paragraphs 10 through 15, wherein, optionally, a portion of unreacted reducing sugar(s) and/or a portion of unreacted amine donor(s) remain in the composition, 17. The method of paragraph 16, further comprising sorbitol, xylitol, mannitol, sucralose, aspartame, acesulfame-K, neotarne, erythritol, trehalose, raffinose, cellobiose, tagatose, allulose, inulin, N—[N-[3-(3-hydroxy-4-methoxyphenyl)propyl]-alpha-aspartyl]-L-phenylalanine 1-methyl ester, glycyrrhizin, sodium cyclamate, brazzein, miraculin, curculin, pentadin, mabinlin, thaumatin, neohesperidin dihydrochalcone (NHDC), maltol, advantame or combinations thereof.

18. The method of paragraph 16, further comprising a sweetening agent comprising sweet tea extracts, swingle (mogroside) extracts, one or more sweet tea glycosides (rubusoside and suaviosides), one or more mogrosides, one or more glycosylated sweet tea glycosides, one or more glycosylated mogrosides or any mixture thereof.

19. A method for improving taste and/or mouthfeel profile of a food or beverage composition, comprising the steps:

preparing a reaction mixture comprising one or more reducing sugar(s), one or more of a *Stevia* extract, a steviol glycoside(s) and/or a glycosylated steviol glycoside(s) and one or more amine donor(s) comprising a free amino group(s);

optionally, combining the reaction mixture with one or more solvents to provide a reaction solution;

heating the reaction solution under conditions suitable for forming a solution or slurry comprising one or more reducing sugar Maillard reaction product(s) (MRPs) and Maillard reaction product(s) of the *Stevia* extract (*Stavia*-MRPs), the steviol glycoside(s) (S-MRPs) and/or the glycosylated steviol glycoside(s) (GSG-MRPs), optionally, wherein the *Stevia* extract, the steviol glycoside(s) and/or the glycosylated steviol glycoside(s) are added during or after the completion of the conventional Maillard reaction, to form a Maillard reaction mixture composition, optionally, isolating the Maillard reaction mixture composition; and adding the Maillard reaction mixture composition to a food or beverage composition, wherein the taste and/or mouthfeel profile of the food or beverage is improved.

20. The method of paragraph 19, wherein the reducing sugar comprises monosaccharides, disaccharides, oligosaccharides, polysaccharides, and combinations thereof.

21. The method of paragraph 19, wherein the amine donor comprises one or more of a primary amine compound, a secondary amine compound, an amino acid, a protein, a peptide, a yeast extract or any mixture thereof.

22. The method of paragraph 21, wherein the amino acid comprises alanine, arginine, asparagine, aspartic acid, cysteine, glutamine, glutamic acid, glycine, histidine, isoleucine, leucine, lysine, methionine, phenylalanine, proline, serine, threonine, tryptophan, tyrosine, valine or any mixture thereof.

23. The method of paragraph 19, wherein the steviol glycoside comprises rebaudioside A, rebaudioside B, rebaudioside D, rebaudioside E, rebaudioside M, rebaudioside O, or any mixture thereof.

24. The method of paragraph 19, wherein the glycosylated steviol glycoside comprises glycosylation products of stevioside, steviolbioside, rebaudioside A, rebaudioside B, rebaudioside C, rebaudioside D, rebaudioside E, rebaudioside F, rebaudioside M, rebaudioside O, rebaudioside H, rebaudioside I, rebaudioside L, rebaudioside N, rebaudioside K, rebaudioside J, rubusoside, dulcoside A or any mixture thereof.

25. The method of any of paragraphs 19 through 24, wherein, optionally, a portion of unreacted reducing sugar(s) and/or a portion of unreacted amine donor(s) remain in the composition.

26. The method of paragraph 15, further comprising sorbitol, xylitol, mannitol, sucralose, aspartame, acesulfame-K, neotame, erythritol, trehalose, raffinose, cellobiose, tagatose, allulose, inulin, N—[N-[3-(3-hydroxy-4-methoxyphenyl)propyl]-alpha-aspartyl]-L-phenylalanine 1-methyl ester, glycyrrhizin, sodium cyclamate, brazzein, miraculin, curculin, pentadin, mabinlin, thaumatin, neohesperidin dihydrochalcone (NHDC), maltol, advantame or combinations thereof.

27. The method of paragraph 25, further comprising a sweetening agent comprising sweet tea extracts, swingle (mogroside) extracts, one or more sweet tea glycosides (rubusoside and suaviosides), one or more mogrosides, one or more glycosylated sweet tea glycosides, one or more glycosylated mogrosides or any mixture thereof.

28. An improved taste and/or mouthfeel food or beverage, comprising:

(1) one or more Maillard reaction product(s) (MRPs) formed from one or more reducing sugar(s) having a free carbonyl group, and one or more amine donor(s) having a free amino group; and (2) one or more MRPs formed from one or more of a *Stevia* extract (*Stevia*-MPRs), a steviol glycoside(s)

(S-MRPs) and/or a glycosylated steviol glycoside(s) (GSG-MRPs), and one or more amine donors.

29. The improved food or beverage of paragraph 28, wherein the reducing sugar comprises monosaccharides, disaccharides, oligosaccharides, polysaccharides, and combinations thereof.

30. The improved food or beverage of paragraph 28, wherein the amine donor comprises one or more of a primary amine compound, a secondary amine compound, an amino acid, a protein, a peptide, a yeast extract or any mixture thereof.

31. The improved food or beverage of paragraph 30, wherein the amino acid comprises alanine, arginine, asparagine, aspartic acid, cysteine, glutamine, glutamic acid, glycine, histidine, isoleucine, leucine, lysine, methionine, phenylalanine, proline, serine, threonine, tryptophan, tyrosine, valine or any mixture thereof.

32. The improved food or beverage of paragraph 28, wherein the steviol glycoside comprises rebaudioside A, rebaudioside B, rebaudioside D, rebaudioside E, rebaudioside M, rebaudioside O, or any mixture thereof.

33. The improved food or beverage of paragraph 28, wherein the glycosylated steviol glycoside comprises glycosylation products of stevioside, steviolbioside, rebaudioside A, rebaudioside B, rebaudioside C, rebaudioside D, rebaudioside E, rebaudioside F, rebaudioside M, rebaudioside O, rebaudioside H. rebaudioside I, rebaudioside L, rebaudioside N, rebaudioside K, rebaudioside J, rubusoside, dulcoside A or any mixture thereof.

34. The improved food or beverage of any of paragraphs 28 through 33, wherein, optionally, a portion of unreacted reducing sugar(s), *Stevia* extract, steviol glycoside(s), glycosylated steviol glycoside(s) and/or a portion of unreacted amine donor(s) remain in the composition.

35. The improved food or beverage of paragraph 34, further comprising sorbitol, xylitol, mannitol, sucralose, aspartame, acesulfame-K, neotame, erythritol, trehalose, raffinose, cellobiose, tagatose, allulose, inulin, N—[N-[3-(3-hydroxy-4-methoxyphenyl)propyl]-alpha-aspartyl]-L-phenylalanine 1-methyl ester, glycyrrhizin, sodium cyclamate, brazzein, miraculin, curculin, pentadin, mabinlin, thaumatin, neohesperi din dihydrochalcone (NHDC), advantame or combinations thereof.

36. The improved food or beverage of paragraph 34, further comprising a sweetening agent comprising sweet tea extracts, swingle (mogroside) extracts, one or more sweet tea glycosides (rubusoside and suaviosides), one or more mogrosides, one or more glycosylated sweet tea glycosides, one or more glycosylated mogrosides or any mixture thereof.

Additional Embodiments, Set 85

1. A Maillard reaction product (MRP) composition comprising one or more Maillard reaction product(s) formed from a reaction mixture comprising: (1) one or more reducing sugar(s) having a free carbonyl group; (2) one or more amine donor(s) having a free amino group; and (3) a *Stevia* extract, a steviol glycoside(s) and/or a glycosylated steviol glycosides) or any mixture thereof.

2. The composition of paragraph 1, wherein the reducing sugar comprises monosaccharides, disaccharides, oligosaccharides, polysaccharides, and combinations thereof.

3. The composition of paragraph 1, wherein the amine donor comprises one or more of a primary amine compound, a secondary amine compound, an amino acid, a protein, a peptide, a yeast extract or any mixture thereof.

4. The composition of paragraph 3, wherein the amino acid comprises alanine, arginine, asparagine, aspartic acid, cysteine, glutamine, glutamic acid, glycine, histidine, isoleucine, leucine, lysine, methionine, phenylalanine, proline, serine, threonine, tryptophan, tyrosine, valine or any mixture thereof.

5. The composition of paragraph 1, wherein the steviol glycoside comprises rebaudioside A, rebaudioside B, rebaudioside D, rebaudioside E, rebaudioside M, rebaudioside O, or any mixture thereof.

6. The composition of paragraph I, wherein the glycosylated steviol glycoside comprises glycosylation products of stevioside, steviolbioside, rebaudioside A, rebaudioside B, rebaudioside C, rebaudioside D, rebaudioside E, rebaudioside F, rebaudioside M, rebaudioside O, rebaudioside H, rebaudioside I, rebaudioside rebaudioside N, rebaudioside K, rebaudioside rubusoside, dulcoside A or any mixture thereof.

7. The composition of any of paragraphs 1 through 6, wherein, optionally, a portion of unreacted reducing sugar(s) and/or a portion of unreacted amine donor(s) remain in the composition.

8. The composition of paragraph 7, wherein the reaction mixture or MRP composition further comprises sorbitol, xylitol, mannitol, sucralose, aspartame, acesulfame-K, neotame, erythritol, trehalose, raffinose, cellobiose, tagatose, allulose, inulin, N—[N-[3-(3-hydroxy-4-methoxyphenyl) propyl]-alpha-aspartyl]-L-phenylalanine 1-methyl ester, glycyrrhizin, sodium cyclamate, brazzein, miraculin, curculin, pentadin, mabinlin, thaumatin, neohespetidin dihydrochalcone (NHDC), maltol, Advantame or combinations thereof.

9. The composition of paragraph 7, wherein the reaction mixture or MRP composition further comprises a sweetening agent comprising sweet tea extracts, swingle (mogroside) extracts, one or more sweet tea glycosides (rubusoside and suaviosides), one or more mogrosides, one or more glycosylated sweet tea glycosides, one or more glycosylated mogrosides or any mixture thereof.

10. A method for preparing a composition, the composition comprising one or more Maillard reaction product(s) (MRPs) formed from (1) one or more *Stevia* extract(s), one or more steviol glycoside(s), one or more glycosylated steviol glycoside(s), or any mixture thereof, (2) one or more reducing sugar(s) having a free carbonyl group; and (3) one or more amine donor(s) having a free amino group, wherein the method comprises the steps:

preparing a reaction mixture comprising one or more reducing sugar(s) and one or more amine donor(s) comprising a free amino group(s), optionally, combining the reaction mixture with one or more solvents to provide a reaction solution;

heating the reaction mixture or reaction solution under conditions suitable for a Maillard reaction so as to form a solution or slurry comprising one or more Maillard reaction product(s) (MRPs);

adding the *Stevia* extract(s), the steviol glycoside(s), the glycosylated steviol glycoside(s), or any mixture thereof to the reaction mixture or the reaction solution to form a Maillard product composition.

11. The method of paragraph 10, wherein the reducing sugar comprises monosaccharides, disaccharides, oligosaccharides, polysaccharides, and combinations thereof.

12. The method of paragraph 10, wherein the amine donor comprises one or more of a primary amine compound, a secondary amine compound, an amino acid, a protein, a peptide, a yeast extract or any mixture thereof.

13. The method of paragraph 12, wherein the amino acid comprises alanine, arginine, asparagine, aspartic acid, cysteine, glutamine, glutamic acid, glycine, histidine, isoleucine, leucine, lysine, methionine, phenylalanine, proline, serine, threonine, tryptophan, tyrosine, valine or any mixture thereof.

14. The method of paragraph 10, wherein the steviol glycoside comprises rebaudioside A, rebaudioside B, rebaudioside D, rebaudioside E, rebaudioside M, rebaudioside O, or any mixture thereof.

15. The method of paragraph 10, wherein the glycosylated steviol glycoside comprises glycosylation products of stevioside, steviolbioside, rebaudioside A, rebaudioside B, rebaudioside C, rebaudioside D, rebaudioside E, rebaudioside F, rebaudioside M, rebaudioside O, rebaudioside H, rebaudioside I, rebaudioside L, rebaudioside N, rebaudioside K, rebaudioside rubusoside, dulcoside A or any mixture thereof.

16. The method of any of paragraphs 10 through 15, wherein, optionally, a portion of unreacted reducing sugar(s) and/or a portion of unreacted amine donor(s) remain in the composition.

17. The method of paragraph 16, further comprising adding to the Maillard reaction mixture or to the MRP composition formed therefrom sorbitol, xylitol, mannitol, sucralose, aspartame, acesulfame-K, neotame, erythritol, trehalose, raffinose, cellobiose, tagatose, allulose, inulin, N—[N-[3-(3-hydroxy-4-methoxyphenyl)propyl]-alpha-aspartyl]-L-phenylalanine 1-methyl ester, glycyrrhizin, sodium cyclamate, brazzein, miraculin, curculin, pentadin, mabinlin, thaumatin, neohesperidin dihydrochalcone (NHDC), maltol, Advantame, or any combination thereof.

18. The method of paragraph 16, further comprising adding to the Maillard reaction mixture or to the MRP composition formed therefrom a sweet tea extract, a swingle (mogroside) extract, a sweet tea glycosider, such as rubusoside, a suavioside or both, a mogroside, a glycosylated sweet tea glycoside, a glycosylated mogroside or any mixture thereof.

19. A method for improving taste and/or mouthfeel profile of a food or beverage composition, comprising the steps:

preparing a reaction mixture comprising one or more reducing sugar(s) and one or more amine donor(s) comprising a free amino group(s), optionally, combining the reaction mixture with one or more solvents to provide a reaction solution; and heating the reaction mixture or reaction solution under conditions suitable for forming a solution or slurry comprising one or more Maillard reaction product(s) (MRPs); and adding one or more *Stevia* extract(s), one or more steviol glycoside(s), one or more glycosylated steviol glycoside(s), or any mixture thereof to the reaction mixture or reaction solution to form a Maillard product composition, wherein, optionally, the Maillard product composition is added to a food or beverage composition in a sufficient amount so that the taste and/or mouthfeel profile of the food or beverage is improved relative to the food or beverage without the Maillard product composition.

20. The method of paragraph 19, wherein the reducing sugar comprises monosaccharides, disaccharides, oligosaccharides, polysaccharides, and combinations thereof 21. The method of paragraph 19, wherein the amine donor comprises one or more of a primary amine compound, a secondary amine compound, an amino acid, a protein, a peptide, a yeast extract or any mixture thereof.

22. The method of paragraph 21, wherein the amino acid comprises alanine, arginine, asparagine, aspartic acid, cysteine, glutamine, glutamic acid, glycine, histidine, isoleucine, leucine, lysine, methionine, phenylalanine, proline, serine, threonine, tryptophan, tyrosine, valine or any mixture thereof.

23. The method of paragraph 19, wherein the steviol glycoside comprises rebaudioside A, rebaudioside B, rebaudioside D, rebaudioside E, rebaudioside M, rebaudioside O, or any mixture thereof.

24. The method of paragraph 19, wherein the glycosylated steviol glycoside comprises glycosylation products of stevioside, steviolbioside, rebaudioside A, rebaudioside B, rebaudioside C, rebaudioside D, rebaudioside E, rebaudioside F, rebaudioside M, rebaudioside O, rebaudioside 14, rebaudioside I, rebaudioside L, rebaudioside N, rebaudioside K, rebaudioside J, rubusoside, dulcoside A or any mixture thereof.

25. The method of any of paragraphs 19 through 24, wherein, optionally, a portion of unreacted reducing sugar(s) and/or a portion of unreacted amine donor(s) remain in the composition.

26. The method of of any of paragraphs 19 through 24, further comprising adding to the Maillard reaction mixture or to the Maillard product composition formed therefrom sorbitol, xylitol, mannitol, sucralose, aspartame, acesulfame-K, neotame, erythritol, trehalose, raffinose, cellobiose, tagatose, allulose, inulin, N—[N-[3-(3-hydroxy-4-methoxyphenyl)propyl]-alpha-aspartyl]-L-phenylalanine 1-methyl ester, glycyrrhizin, sodium cyclamate, brazzein, miraculin, curculin, pentadin, mabinlin, thaumatin, neohesperidin dihydrochalcone (NHDC), maltol, Advantame, or any combination thereof.

27. The method of of any of paragraphs 19 through 24, further comprising adding to the Maillard reaction mixture or to the Maillard product composition formed therefrom a sweet tea extract, a swingle (mogroside) extract, a sweet tea glycosider, such as rubusoside, a suavioside or both, a mogroside, a glycosylated sweet tea glycoside, a glycosylated mogroside, or any mixture thereof.

28. An improved taste and/or mouthfeel food or beverage, comprising:

a food or beverage;

one or more Maillard reaction product(s) (MRPs) formed from one or more reducing sugar(s) having a free carbonyl group and one or more amine donor(s) having a free amino group; and one or more *Stevia* extract(s), one or more steviol glycoside(s), one or more glycosylated steviol glycoside(s), or any mixture thereof.

29. The improved food or beverage of paragraph 28, wherein the reducing sugar comprises monosaccharides, disaccharides, oligosaccharides, polysaccharides, and combinations thereof.

30. The improved food or beverage of paragraph 28, wherein the amine donor comprises one or more of a primary amine compound, a secondary amine compound, an amino acid, a protein, a peptide, a yeast extract or any mixture thereof.

31. The improved food or beverage of paragraph 30, comprising an amino acid, wherein the amino acid is alanine, arginine, asparagine, aspartic acid, cysteine, glutamine, glutamic acid, glycine, histidine, isoleucine, leucine, lysine, methionine, phenylalanine, proline, seine, threonine, tryptophan, tyrosine, valine or any mixture thereof.

32. The improved food or beverage of paragraph 28, comprising one or more steviol glycosides, wherein the one or more steviol glycosides comprise rebaudioside A, rebaudioside B, rebaudioside D, rebaudioside E, rebaudioside M, rebaudioside O, or any mixture thereof.

33. The improved food or beverage of paragraph 28, comprising one or more glycosylated steviol glycosides, wherein the one or more glycosylated steviol glycosides comprise one or more glycosylation products of stevioside, steviolbioside, rebaudioside A, rebaudioside B, rebaudioside C, rebaudioside D, rebaudioside E, rebaudioside F, rebaudioside M, rebaudioside O, rebaudioside H, rebaudioside I, rebaudioside L, rebaudioside N, rebaudioside K, rebaudioside J, rubusoside, dulcoside A or any mixture thereof.

34. The improved food or beverage of any of paragraphs 28 through 33, wherein, optionally, a portion of unreacted reducing sugar(s) and/or a portion of unreacted amine donor(s) remain in the composition.

35. The improved food or beverage of paragraph 34, further comprising sorbitol, xylitol, mannitol, sucralose, aspartame, acesulfame-K, neotame, erythritol, trehalose, raffinose, cellobiose, tagatose, allulose, inulin, N—[N-[3-(3-hydroxy-4-methoxyphenyl)propyl]-alpha-aspartyl]-L-phenylalanine 1-methyl ester, glycyrrhizin, sodium cyclamate, brazzein, miraculin, curculin, pentadin, mabinlin, thaumatin, neohesperidin dihydrochalcone (NHDC), maltol, Avantame, or any combination thereof.

36. The improved food or beverage of paragraph 34, further comprising a sweet tea extract, a swingle (mogroside) extract, a sweet tea glycoside, such as rubusoside or suaviosides, a mogroside, a glycosylated sweet tea glycoside, a glycosylated mogroside, or any mixture thereof.

Additional Embodiments, Set 86

1. A sweetening composition comprising a steviol glycoside Maillard reaction product (S-MRP) composition formed from a Maillard reaction between a high intensity natural sweetening agent composition comprising one or more steviol glycosides, one or more *Stevia* extracts, or a combination thereof; and an amine donor comprising a free amino group, wherein the amine donor is selected from the group consisting of primary amine compounds, secondary amine compounds, amino acids, peptides, proteins, protein extracts, and mixtures thereof.

2. The sweetening composition of paragraph 1, the ratio of the high intensity natural sweetening agent composition to the amino donor is between 99:1 and 1:99, between 95:5 and 5:95, between 90:10 and 10:90, or between 85:15 and 15:85, or any ratio or any range derived thereof.

3. The sweetening composition of paragraph 1 in liquid form.

4. The sweetening composition of paragraph 1 in powdered form.

5. A sweetening composition comprising an S-MRP composition formed from a Maillard reaction mixture comprising a high intensity natural sweetening agent composition in combination with a reactant mixture comprising an amine donor comprising a free amino group and a reducing sugar comprising a free aldehyde or free ketone group, wherein the high intensity natural sweetening agent composition comprises one or more SGs, one or more SGEs, or a combination thereof, wherein the amine donor is selected from the group consisting of primary amine compounds, secondary amine compounds, amino acids, peptides, proteins, protein extracts, and mixtures thereof, and wherein the reducing sugar is selected from the group consisting of monosaccharides, disaccharides, oligosaccharides, polysaccharides, and combinations thereof.

6. The sweetening composition of paragraph 5 in liquid form.

7. The sweetening composition of paragraph 5 in powdered form.

8. The sweetening composition of paragraph 5, wherein the high intensity natural sweetening agent composition comprises one or more SGs.

9. The sweetening composition of paragraph 5, wherein n s natural sweetening agent composition comprises one or more SGEs.

10. The sweetening composition of paragraph 9, wherein the one or more SGEs comprise at least one member selected from the group consisting of: RA20, RA40, RA50, RA60, RA80, RA 90, RA95, RA97, RA98, RA99, RA99.5, RB8, RB 10, RB15, RC15, RD6, STV60, STV90, RA75/RB15, RA80/RB10/RD6, and any combination thereof.

11. The sweetening composition of paragraph 5, wherein the one or more amine donors comprise at least one amino acid.

12. The sweetening composition of paragraph 11, wherein the at least one amino acid is selected from the group consisting of alanine, glutamic acid, phenylalanine, and valine.

13. The sweetening composition of paragraph 5, wherein the one or more reducing sugars comprise at least one monosaccharide.

14. The sweetening composition of paragraph 13, wherein the at least one monosaccharide is selected from the group consisting of glucose, galactose, fructose, mannose, rhamnose, xylose, and any combination thereof.

15. The sweetening composition of paragraph 5, wherein the one or more reducing sugars comprise at least one disaccharide.

16. The sweetening composition of paragraph 15, wherein the at least one disaccharide is selected from the group consisting of cellobiose, lactose, maltose, and any combination thereof.

17. The sweetening composition of paragraph 5, wherein the ratio of the high intensity natural sweetening agent composition to the reactant mixture is between 99:1 and 1:99.

18. The sweetening composition of paragraph 5, wherein the ratio of the high intensity natural sweetening agent composition to the reactant mixture is between 96:4 and 40:60.

19. The sweetening composition of paragraph 5, further comprises at least one sweetener enhancer selected from the group consisting of thaumatin, brazzein, miraculin, curculin, pentadin, mabinlin, any any combination thereof.

20. The sweetening composition of paragraph 19, wherein the at least one sweetener enhancer is thaumatin.

21. The sweetening composition of paragraph 5, further comprises at least one high intensity synthetic sweetener.

22. The sweetening composition of paragraph 21, wherein the at least one high intensity synthetic sweetener is sucralose, sorbitol, xylitol, mannitol, sucralose, aspartame, acesulfame-K, neotame, erythritol, trehalose, raffinose, cellobiose, tagatose, DOLCIA PRIMA™ allulose, inulin, N—[N-[3-(3-hydroxy-4-methoxyphenyl)propyl]-alpha-aspartyl]-L-phenylalanine 1-methyl ester, glycyrrhizin, sodium cyclamate, or a combination thereof.

23. The sweetening composition of paragraph 5, further comprises at least one sweetener enhancer and at least one high intensity synthetic sweetener.

24. The sweetening composition of paragraph 5, further comprising at least one high intensity natural sweetener.

25. The sweetening composition of paragraph 24, wherein the at least one high intensity natural sweetener is an SG, a *Stevia* extract, a mogroside, a monk fruit plant extract, rubusoside, a sweet tea extract, or a combination thereof.

26. The sweetening composition of paragraph 6, wherein the reactant mixture comprises a pair of compounds selected from the group consisting of xylose and phenylalanine; rhamnose and arginine, xylose and alanine; galactose and glutamic acid; and rhamnose and valine.

27. The sweetening composition of paragraph 26, wherein the reactant mixture comprises xylose and phenylalanine in amounts effective to produce a floral flavor and/or aroma.

28. The sweetening composition of paragraph 27, wherein the ratio of the high intensity natural sweetening agent composition to the reactant mixture is between 80:20 to 40:60, and wherein the ratio of xylose to phyenylalanine in the reactant mixture is between 2:1 and 1:2.

29. The sweetening composition of paragraph 26, further comprising a stevioside (STV) composition, wherein the ratio of the sweetening composition to the STV composition is between 7:10 and 4:1.

30. The sweetening composition of paragraph 26, wherein the reactant mixture comprises rhamnose and arginine in amounts effective to produce a sunflower seed flavor and/or aroma.

31. The sweetening composition of paragraph 30, wherein the ratio of the high intensity natural sweetening agent composition to the reactant mixture is between 70:30 and 40:60, and wherein the ratio of rhamnose to arginine in the reactant mixture is between 2:1 and 1:2.

32. The sweetening composition of paragraph 26, wherein the reactant mixture comprises xylose and alanine in amounts effective to produce a caramel flavor and/or aroma.

33. The sweetening composition of paragraph 32, wherein the ratio of the high intensity natural sweetening agent composition to the reactant mixture is between 80:20 and 40:60, and wherein the ratio of xylose to alanine in the reactant mixture is between 5:1 and 1:5.

34. The sweetening composition of paragraph 32, further comprising a rebaudioside M (RM) composition, wherein the ratio of the S-MRP composition to the RM composition is between 0.3:1 and 0.9:1.

35. The sweetening composition of paragraph 26, wherein the reactant mixture comprises glutamic acid and galactose in amounts effective to produce a citrus flavor and/or aroma.

36. The sweetening composition of paragraph 35, further comprising a mogroside V20 or V50 composition, wherein the ratio of the high intensity natural sweetening agent composition to the mogroside V20 or V50 composition is between 1:2 and 2:1.

37. The sweetening composition of paragraph 26, wherein the reactant mixture comprises valine and rhamnose in amounts effective to produce a chocolate flavor and/or aroma.

38. The sweetening composition of paragraph 37, further comprising a rebaudioside A (RA) composition, wherein the ratio of of the MRP composition to the RA composition is 0.01:1 to 3:1.

39. The sweetening composition of paragraph 37, further comprising an SG composition comprising rebaudioside D and rebaudioside M, wherein the ratio of the MRP composition to the SG composition is between 9:1 and 1:9.

Additional Embodiments, Set 87

1. A method for improving the taste of a beverage product, comprising the steps of:

(a) preparing a reaction mixture comprising one or more sweetening agents comprising one or more steviol glycosides or one or more *Stevia* extracts in combination with one or more amine donors comprising a free amino group, wherein the reaction mixture does not comprise a reducing sugar;

(b) combining the reaction mixture with one or more solvents to form a reaction solution;

(c) heating the reaction solution in step (b) under conditions suitable for forming an MRP composition comprising one or more MRP products; and (d) adding the MRP composition to a beverage in an amount effective to form an MRP-containing beverage having an enhanced taste profile.

2. The method of paragraph 1, wherein the MRP composition is dried, thereby forming a powdered MRP composition that is added to the beverage.

3. The method of paragraph 1, wherein the beverage is selected from the group consisting of water, flavored water, carbonated water, tea, milk, cocoa, diet beverage, juice, fruit juice, vegetable juice, fruit nectar, vegetable nectar, energy drink, protein shake, diet soda, fermented beverage, kombucha, probiotic beverage, prebiotic beverage, coffee, herbal infusion, hot cereal beverage, alcoholic beverage, beer, malt beverage, cider, perry, wine, fruit wine, rice wine, and spirituous beverage.

4. The method of paragraph 1, wherein the beverage is a sugar free beverage or a reduced sugar beverage.

5. The method of paragraph 1, wherein the MRP composition is added to the beverage product in an amount sufficient to improve mouth feel, improve sweetness intensity, improve overall likeability, provide less lingering, provide less astringency, and/or provide less bitterness compared to a control beverage product that does not contain the MRP composition.

6. The method of paragraph 1, wherein the ratio of the one or more steviol glycosides or one or more *Stevia* extracts to the amine donor is between 99:1 and 1:99, between 95:5 and 5:95, between 90:10 and 10:90, or between 85:15 and 15:85, or any ratio or any range derived thereof.

7. The method of paragraph 1, wherein the MRP composition is added to the beverage product at a final concentration between 10 ppm and 1000 ppm.

8. The method of paragraph 1, wherein the MRP composition is added to the beverage product at a final concentration between 50 ppm and about 400 ppm.

9. A method for improving the taste of a beverage product, comprising the steps of:

(a) preparing a first reaction mixture comprising one or more SGs or one or more SGEs in combination with a second reaction mixture to form a final reaction mixture, wherein the second reaction mixture comprises an amine donor comprising a free amino group and a reducing sugar comprising a free aldehyde or free ketone group;

(b) combining the final reaction mixture with one or more solvents to form a reaction solution:

(c) heating the reaction solution in step (b) under conditions suitable for forming an MRP composition comprising one or more MRP products; and (d) adding the MRP composition to the beverage in an amount effective to form an MRP-containing beverage having an enhanced taste profile.

10. The method of paragraph 9, wherein the MRP composition is dried, thereby forming a powdered. MRP composition that is added to the beverage.

11. The method of paragraph 9, wherein the beverage is selected from the group consisting of water, flavored water, carbonated water, tea, milk, cocoa, diet beverage, juice, fruit juice, vegetable juice, fruit nectar, vegetable nectar, energy drink, protein shake, diet soda, fermented beverage, kombucha, probiotic beverage, prebiotic beverage, coffee, herbal infusion, hot cereal beverage, alcoholic beverage, beer, malt beverage, cider, perry, wine, fruit wine, rice wine, and spirituous beverage.

12. The method of paragraph 9, wherein the beverage is a sugar free beverage, a reduced sugar beverage, carbonated water, an energy drink, coffee, tea, milk, vegetable juice, non-alcoholic beer, a spirituous beverage.

13. The method of paragraph 9, wherein the MRP composition is added to the beverage product in an amount sufficient to improve mouth feel, improve sweetness intensity, improve overall likeability, provide less lingering, provide less astringency, and/or provide less bitterness compared to a control beverage product that does not contain the MRP composition.

14. The method of paragraph 9, wherein the MRP composition is added to the beverage product at a final concentration between 10 ppm and 1000 ppm.

15. The method of paragraph 9, wherein the MRP composition is added to the beverage product at a final concentration between 50 ppm and about 400 ppm.

16. The method of paragraph 9, wherein the first reaction mixture comprises a *Stevia* extract selected from the group consisting of RA20, RA40, RA50, RA60, RA80, RA 90, RA95, RA97, RA98, RA99, RA99.5, RB8, RB10, RB15, RC15, RD6, STV60, STV90, RA75/RB15, RA80/RB10/RD6, and any combination thereof.

17. The method of paragraph 9, wherein the second reactant mixture comprises a pair of compounds selected from the group consisting of xylose and phenylalanine; rhamnose and arginine; xylose and alanine; galactose and glutamic acid; and rhamnose and valine.

18. The method of paragraph 9, wherein the weight ratio of the first reaction mixture to the second reaction mixture is between 20:1 and 1:1.

19. The method of paragraph 9, wherein the weight ratio of the reducing sugar to amine donor in the second reaction mixture is between 5:1 and 1:5.

20. The method of paragraph 9, wherein the final reaction mixture in step (a) further comprises a sweetener enhancer selected from the group consisting of thaumatin, monellin, brazzein, miraculin, curculin, pentadin, mabinlin, and any combination thereof.

21. The method of paragraph 9, wherein the final reaction mixture in step (a) further comprises thaumatin.

22. The method of paragraph 9, wherein the final reaction mixture in step (a) further comprises a high intensity natural sweetener added thereto.

23. The method of paragraph 22, wherein the high intensity natural sweetener is an SG, a *Stevia* extract, a mogroside, a monk fruit plant extract, rubusoside (RU), a sweet tea extract, or a combination thereof.

24. The method of paragraph 9, wherein the MRP composition further comprises a sweetener enhancer added thereto, wherein the sweetness enhancer is thaumatin, monellin, brazzein, miraculin, curculin, pentadin, mabinlin, and any combination thereof.

25. The method of paragraph 9, wherein the MRP composition further comprises thaumatin added thereto.

26. The method of paragraph 25 wherein the weight ratio of the MRP composition to thaumatin is between 20:1 and 1:1.

27. The method of paragraph 9, wherein the MRP composition further comprises a high intensity natural sweetener added thereto.

28. The method of paragraph 27, wherein the high intensity natural sweetener is an SG, a *Stevia* extract, a mogroside, a swingle extract, rubusoside, a sweet tea extract, or a combination thereof.

29. The method of paragraph 9, wherein the MRP composition further comprises a high intensity natural sweetener added thereto.

30. The method of paragraph 29, wherein the high intensity natural sweetener is an SG, a *Stevia* extract, a mogroside, a swingle extract, rubusoside, a sweet tea extract, or a combination thereof.

31. The method of paragraph 9, wherein the MRP composition further comprises a high intensity synthetic sweetener added thereto, wherein the high intensity synthetic sweetener is sucralose, sorbitol, xylitol, mannitol, sucralose, aspartame, acesulfame-K, neotame, erythritol, trehalose, raffinose, cellobiose, tagatose, DOLCIA PRIMA™ all lose inulin N—[N-[3-(3-hydroxy-4-methoxyphenyl)propyl]-alpha-aspartyl]-L-phenylalanine 1-methyl ester, glycyrrhizin, sodium cyclamate, or a combination thereof.

Additional Embodiments, Set 88

1. A method for enhancing the flavor of a food product, comprising the steps of:

(a) preparing a reaction mixture one or more sweetening agents comprising one or more steviol glycosides or one or more *Stevia* extracts in combination with one or more amine donors comprising a free amino group, wherein the reaction mixture does not comprise a reducing sugar;

(b) combining the reaction mixture with one or more solvents to form a reaction solution;

(c) heating the reaction solution in step (b) under conditions suitable for forming an MRP composition comprising one or more MRP products; and (d) adding the MRP composition to a food product in an amount effective to form an MRP-containing food product having an enhanced taste profile.

2. The method of paragraph 1, wherein the food product is selected from the group consisting of wherein the MRP composition in step (d) is added to a food product selected from the group consisting of confections, condiments, dairy products, cereal compositions, chewing compositions, and tabletop sweetener compositions.

3. The method of paragraph 1, wherein the MRP composition in step (d) is added to chocolate, cookies, muffins, pizza dough, eggs, ketchup, jam, yogurt or sour cream.

4. The method of paragraph 1, wherein the MRP composition is added to the food product in an amount sufficient to improve mouth feel, improve sweetness intensity, and/or improve overall likeability.

5. The method of paragraph 1, wherein the ratio of the one or more SGs or one or more SGEs to the amine donor is between 99: 1 and 1:99, between 95:5 and 5:95, between 90:10 and 10:90, or between 85:15 and 15:85, or any ratio or any range derived thereof.

6. The method of paragraph 1, wherein the MRP composition is added to the food product at a final concentration between 10 ppm and 1000 ppm.

7. The method of paragraph 1, wherein the MRP composition is added to the food product at a final concentration between 50 ppm and about 400 ppm.

8. A method for improving the taste of a food product, comprising the steps of:

(a) preparing a first reaction mixture comprising one or more SGs or one or more *Stevia* extracts in combination with a second reaction mixture comprising an amine donor comprising a free amino group and a reducing sugar comprising a free aldehyde or free ketone group to form a final reaction mixture;

(b) combining the final reaction mixture with one or more solvents to form a reaction solution;

(c) heating the reaction solution in step (b) under conditions suitable for forming an MRP composition comprising one or more MRP products; and (d) adding the MRP composition to the food product in an amount effective to form an MRP-containing food product having an enhanced taste profile.

9. The method of paragraph 8, wherein the food product is selected from the group consisting of confections, condiments, dairy products, cereal compositions, chewing compositions, and tabletop sweetener compositions.

10. The method of paragraph 8, wherein the MRP composition in step (d) is added to chocolate, cookies, muffins, pizza dough, eggs, ketchup, jam, yogurt or sour cream.

11. The method of paragraph 8, wherein the MRP composition is added to the food product in an amount sufficient to improve mouth feel, improve sweetness intensity, and/or improve overall likeability.

12. The method of paragraph 8, wherein the MRP composition is added to the food product at a final concentration between 10 ppm and 1000 ppm.

13. The method of paragraph 8, wherein the MRP composition is added to the food product at a final concentration between 50 ppm and about 400 ppm.

14. The method of paragraph 8, wherein the first reaction mixture comprises a Stevia extract selected from the group consisting of RA20, RA40, RA50, RA60, RA80, RA 90, RA95, RA97, RA98, RA99, RA99.5, RB8, RB10, RB15, RC15, RD6, STV60, STV90, RA75/RB15, RA80/RB10/RD6, and any combination thereof.

15. The method of paragraph 8, wherein the second reactant mixture comprises a pair of compounds selected from the group consisting of xylose and phenylalanine; rhamnose and arginine; xylose and alanine; galactose and glutamic acid; and rhamnose and valine.

16. The method of paragraph 8, wherein the weight ratio of the first reaction mixture to the second reaction mixture is between 20:1 and 1:1, 17. The method of paragraph 8, wherein the weight ratio of the reducing sugar to the amine donor in the second reaction mixture is between 5:1 and 1:5.

18. The method of paragraph 8, wherein the final reaction mixture in step (a) further comprises a sweetener enhancer selected from the group consisting of thautnatin, monellin, brazzein, miraculin, curculin, pentadin, mabinlin, and any combination thereof.

19. The method of paragraph 8, wherein the final reaction mixture in step (a) further comprises thaumatin.

20. The method of paragraph 8, wherein the final reaction mixture in step (a) further comprises a high intensity natural sweetener added thereto.

21. The method of paragraph 20, wherein the high intensity natural sweetener is an SG, a *Stevia* extract, a mogroside, a monk fruit plant extract, rubusoside, a sweet tea extract, or a combination thereof.

22. The method of paragraph 8, wherein the MRP composition further comprises a sweetener enhancer added thereto, wherein the sweetness enhancer is thaumatin, brazzein, miraculin, curculin, pentadin, mabinlin, and any combination thereof.

23. The method of paragraph 8 wherein the MRP composition further comprises thaumatin added thereto.

24. The method of paragraph 23 wherein the weight ratio of the MRP composition to thaumatin is between 20:1 and 25. The method of paragraph 8, wherein the MRP composition further comprises a high intensity natural sweetener added thereto.

26. The method of paragraph 25, wherein the high intensity natural sweetener is an SG, a *Stevia* extract, a mogroside, a swingle extract, rubusoside, a sweet tea extract, or a combination thereof.

27. The method of paragraph 8, wherein the MRP composition further comprises a high intensity synthetic sweetener added thereto, wherein the high intensity synthetic sweetener is sucralose, sorbitol, xylitol, mannitol, sucralose, aspartame, acesulfame-K, neotame, erythritol, trehalose, raffinose, cellobiose, tagatose, DOLCIA PRIMA™ allulose, inulin, N—[N-[3-(3-hydroxy-4-methoxyphenyl)propyl]-alpha-aspartyl]-L-phenylalanine 1-methyl ester, glycyrrhizin, sodium cyclamate, or a combination thereof.

Additional Embodiments, Set 89

1. A method for preparing a steviol glycoside Maillard reaction product (S-MRP) composition, comprising the steps of:

(a) preparing a reaction mixture comprising one or more steviol glycosides or one or more *Stevia* extracts in combination with one or more amine donors comprising a free amino group, wherein the reaction mixture does not comprise a reducing sugar;

(b) combining the reaction mixture with one or more solvents to form a reaction solution; and (c) heating the reaction solution in step (b) under conditions suitable for forming an S-MRP composition comprising one or more MRP products.

2. The method of paragraph 1, wherein the pH of the reaction solution in step (c) has a pH from about 5 to about 9.

3. The method of paragraph 1, wherein the temperature in step (c) is between 50° C. to about 150° C.

4. The method of paragraph 1, wherein the reaction solution is heated for a period of 30 min. to 3 hours.

5. The method of paragraph 1, wherein the ratio (w/w) of the high intensity natural sweetening agent composition to the amino donor is between 99:1 and 1:99, between 95:5 and 5:95, between 90:10 and 10:90, or between 85:15 and 15:85, or any ratio or any range derived thereof.

6. The method of paragraph 1, wherein the S-MRP composition is dried, thereby forming a powdered. S-MRP composition.

7. A method for preparing a steviol glycoside MRP (S-MRP) composition, comprising the steps of:

(a) preparing a reaction mixture comprising (i) one or more SGs, one or more SGEs, or a combination thereof; (ii) one or more reducing sugars comprising a free aldehyde or keto group; and (iii) one or more amine donors comprising a free amino group;

(b) combining the reaction mixture with one or more solvents to form a reaction solution; and (c) heating the reaction solution in step (b) under conditions suitable for forming a solution or slurry comprising an S-MRP composition comprising one or more S-MRPs.

8. The method of paragraph 7, wherein the reaction mixture comprises one or more SGs.

9. The method of paragraph 7, wherein the reaction mixture comprises one or more SGEs.

10. The method of paragraph 9, wherein the one or more SGEs comprise at least one member selected from the group consisting of: RA20, RA40, RA50, RA60, RA80, RA 90, RA95, RA97, RA98, RA99, RA99.5, RB8, RB 10, RB15, RC15, RD6, STV60, STV90, RA75/RB15, RA90/RD7, RA80/RB10/RD6, and any combination thereof.

11. The method of paragraph 7, wherein the one or more amine donors comprise at least one amino acid.

12. The method of paragraph 11, wherein the at least one amino acid is selected from the group consisting of alanine, glutamic acid, phenylalanine, and valine.

13. The method of paragraph 7, wherein the one or more reducing sugars comprise at least one monosaccharide.

14. The method of paragraph 13, wherein the at least one monosaccharide is selected from the group consisting of glucose, galactose, fructose, mannose, rhamnose, xylose, and any combination thereof.

15. The method of paragraph 7, wherein the one or more reducing sugars comprise at least one disaccharide.

16. The method of paragraph 15, wherein the at least one disaccharide is selected from the group consisting of cellobiose, lactose, maltose, and any combination thereof.

17. The method of paragraph 7, wherein the ratio of the high intensity natural sweetening agent composition to the reactant mixture is between 99:1 and 1:99.

18. The method of paragraph 7, wherein the ratio of the high intensity natural sweetening agent composition to the reactant mixture is between 96:4 and 40:60.

19. The method of paragraph 7, wherein the S-MRP composition is dried, thereby forming a powdered S-MRP composition.

20. The method of paragraph 7, further comprising the step of adding to the S-MRP composition at least one sweetener enhancer selected from the group consisting of thaumatin, brazzein, miraculin, curculin, pentadin, mabinlin, and any combination thereof.

21. The method of paragraph 20, wherein the at least one sweetener enhancer is thaumatin.

22. The method of paragraph 7, further comprising the step of adding to the S-MRP composition at least one high intensity synthetic sweetener.

23. The method of paragraph 22, wherein the at least one high intensity synthetic sweetener is sucralose, sorbitol, xylitol, mannitol, sucralose, aspartame, acesulfame-K, neotame, erythritol, trehalose, raffinose, cellobiose, tagatose, DOLCIA PRIMA™ allulose, inulin, N—[N-[3-(3-hydroxy-4-methoxyphenyl)propyl]-alpha-aspartyl]-L-phenylalanine 1-methyl ester, glycyrrhizin, sodium cyclamate, or a combination thereof.

24. The method of paragraph 7, further comprising the step of adding to the S-MRP composition at least one sweetener enhancer and at least one high intensity synthetic sweetener.

25. The method of paragraph 7, further comprising the step of adding to the S-MRP composition at least one high intensity natural sweetener.

26. The method of paragraph 25, wherein the at least one high intensity natural sweetener is an SG, a *Stevia* extract, a mogroside, a monk fruit plant extract, rubusoside, a sweet tea extract, or a combination thereof.

27. The method of paragraph 7, wherein the reactant mixture comprises a pair of compounds selected from the group consisting of xylose and phenylalanine; rhamnose and arginine; xylose and alanine; galactose and glutamic acid; and rhamnose and valine.

28. The method of paragraph 27, wherein the reactant mixture comprises xylose and phenylalanine in amounts effective to produce a floral flavor and/or aroma.

29. The method of paragraph 28, wherein the ratio of the high intensity natural sweetening agent composition to the reactant mixture is between 80:20 and 40:60, and wherein the ratio of xylose to phyenylalanine in the reactant mixture is between 2:1 to 1:2

30. The method of paragraph 27, further comprising the step of adding to the S-MRP composition a stevioside (STV) composition, wherein the ratio of the S-MRP composition to the STV composition is between 7:10 and 4:1.

31. The method of paragraph 27, wherein the reactant mixture comprises rhamnose and arginine in amounts effective to produce a sunflower seed flavor and/or aroma.

32. The method of paragraph 31, wherein the ratio of the high intensity natural sweetening agent composition to the reactant mixture is between 70:30 and 40:60, and wherein the ratio of rhamnose to arginine in the reactant mixture is between 2:1 and 1:2.

33. The method of paragraph 27, wherein the reactant mixture comprises xylose and alanine in amounts effective to produce a caramel flavor and/or aroma.

34. The method of paragraph 33, wherein the ratio of the high intensity natural sweetening agent composition to the reactant mixture is between 80:20 and 40:60, and wherein the ratio of xylose to alanine in the reactant mixture is between 5:1 and 1:5.

35. The method of paragraph 34, further comprising the step of adding to the S-MRP composition a rebaudioside M (RM) composition, wherein the ratio of the S-MRP composition to the RM composition is between 0.3:1 and 0.9:1.

36. The method of paragraph 27, wherein the reactant mixture comprises glutamic acid and galactose in amounts effective to produce a citrus flavor and/or aroma.

37. The method of paragraph 36, further comprising the step of adding the S-MRP composition to a mogroside V20 or V50 composition, wherein the ratio of the MRP composition to the mogroside V20 or V50 composition is between 0.01:1 and 2:1.

38. The method of paragraph 27, wherein the mixture comprises valine and rhamnose in amounts effective to produce a chocolate flavor and/or aroma.

39. The method of paragraph 38, further comprising the step of adding to the S-MRP composition a rebaudioside A (RA) composition, wherein the ratio of of the S-MRP composition to the RA composition is 0.01:1 to 3:1.

40. The method of paragraph 38, further comprising the step of adding to the S-MRP composition a SG composition comprising rebaudioside D and rebaudioside M, wherein the ratio of the S-MRP composition to the SG composition is between 9:1 and 1:9.

Additional Embodiments, Set 90

1. A flavoring composition comprising comprising a Maillard reaction product (MRP) composition formed from one or more steviol glycosides, glutamic acid, and galactose, wherein the composition is prepared by a method comprising the steps of:

(a) preparing a reaction mixture comprising one or more steviol glycosides or one or more *Stevia* extracts; glutamic acid; and galactose;

(b) combining the reaction mixture with one or more solvents to form a reaction solution; and (c) heating the reaction solution under conditions suitable for forming an MRP composition comprising one or more Maillard reaction products (MRPs).

2. The composition of paragraph 1, wherein the MRP composition is dried, thereby forming a powdered MRP composition.

3. The composition of paragraph 1, wherein the reaction mixture in step (a) further comprises a sweetener enhancer selected from the group consisting of thautnatin, monellin, brazzein, miraculin, curculin, pentadin, mabinlin, and any combination thereof.

4. The composition of paragraph 1, wherein the reaction mixture in step (a) further comprises thaumatin.

5. The composition of paragraph 1, wherein the reaction mixture in step (a) further comprises neohesperidin dihydrochalcone (NHDC), naringin dihydrochalcone, or a combination thereof.

6. The composition of paragraph 1, wherein the reaction mixture in step (a) further comprises a high intensity natural sweetener added thereto.

7. The composition of paragraph 6, wherein the high intensity natural sweetener is an SG, a *Stevia* extract, a mogroside, a swingle extract, rubusoside, a sweet tea extract, or a combination thereof.

8. The composition of paragraph 1, wherein the MRP composition further comprises a sweetener enhancer added thereto, wherein the sweetness enhancer is thaumatin, monellin, brazzein, miraculin, curculin, pentadin, mabinlin, and any combination thereof.

9. The composition of paragraph 1, wherein the MRP composition further comprises thaumatin added thereto.

10. The composition of paragraph 9, wherein the weight ratio of the MRP composition to thaumatin is between 20:1 and 1:1.

11. The composition of paragraph 1, wherein the MRP composition further comprises NHDC, naringin dihydrochalcone, or a combination thereof added thereto.

12. The composition of paragraph 1, wherein the MRP composition further comprises a high intensity natural sweetener added thereto.

13. The composition of paragraph 12, wherein the high intensity natural sweetener is an SG, a *Stevia* extract, a mogroside, a monk fruit plant extract, rubusoside, a sweet tea extract, or a combination thereof.

14. The composition of paragraph 13, wherein the high intensity natural sweetener is a swingle extract.

15. The composition of paragraph 14, wherein the weight ratio of the MRP composition to the swingle extract is between 0.01:1 and 2:1.

16. The composition of paragraph 13, wherein the high intensity natural sweetener is RU.

17. The composition of paragraph 16, wherein the weight ratio of the MRP composition to RU is between 0.01:1 and 2:1.

18. The composition of paragraph 1, wherein the MRP composition further comprises a flavor modifier product (FMP) added thereto.

19. The composition of paragraph 18, wherein the FMP is maltol, ethyl-maltol, vanillin, ethyl vanillin, m-methylphenol, m-n-propylphenol, or a combination thereof.

20. The composition of paragraph 1, wherein the MRP composition further comprises a high intensity synthetic sweetener added thereto, wherein the high intensity synthetic sweetener is sucralose, sorbitol, xylitol, mannitol, sucralose, aspartame, acesulfame-K, neotame, erythritol, trehalose, raffinose, cellobiose, tagatose, DOLCIA PRIMA™ allulose, inulin, N—[N-[3-(3-hydroxy-4-methoxyphenyl)propyl]-alpha-aspartyl]-L-phenyl alanine 1-methyl ester, glycyrrhizin, sodium cyclamate, or a combination thereof.

21. The composition of paragraph 1, wherein the one or more MRPs comprise one or more compounds corresponding to one or more CAS numbers selected from the group consisting of 98-01-1, 620-02-0, 36879-73-9, 67-47-0, 2443-46-1, 581-42-0, 92368-82-6, 6217-54-5, 21391-99-1, 50704-01-3, 7325-84-0, 6846-50-0, 81968-62-9, 20129-39-9, 16714-85-5, 22599-96-8, 483-78-3, 54105-67-8, 61868-03-9, 1560-88-9, 638-36-8, 84-74-2.

22. The composition of paragraph 1, wherein the one or more MRPs comprise at least five compounds corresponding to one or more CAS numbers selected from the group consisting of 98-01-1, 620-02-0, 36879-73-9, 67-47-0, 2443-46-1, 581-42-0, 92368-82-6, 6217-54-5, 21391-99-1, 50704-01-3, 7325-84-0, 6846-50-0, 81968-62-9, 20129-39-9, 16714-85-5, 22599-96-8, 483-78-3, 54105-67-8, 61868-03-9, 1560-88-9, 638-36-8, 84-74-2.

23. The composition of paragraph 1, wherein the one or more MRPs comprise at least ten compounds corresponding to one or more GAS numbers selected from the group consisting of 98-01-1, 620-02-0, 36879-73-9, 67-47-0, 2443-46-i, 581-42-0, 92368-82-6, 6217-54-5, 21391-99-1, 50704-01-3, 7325-84-0, 6846-50-0, 81968-62-9, 20129-39-9, 16714-85-5, 22599-96-8, 483-78-3, 54105-67-8, 61868-03-9, 1560-88-9, 638-36-8, 84-74-2.

Additional Embodiments, Set 91

1. A method for improving the taste profile of a product, comprising the steps of:

(a) preparing a first reaction mixture comprising one or more steviol glycosides or one or more *Stevia* extracts in combination with a second reaction mixture comprising glutamic acid and galactose to form a final reaction mixture;

(b) combining the final reaction mixture with one or more solvents to form a reaction solution;

(c) heating the reaction solution under conditions suitable for forming a steviol glycoside Maillard reaction product (S-MRP) composition comprising one or more Maillard reaction products (MRPs); and (d) adding the S-MRP composition to a beverage product or food product.

2. The method of paragraph 1, wherein the S-MRP composition in step (d) is added to a beverage product.

3. The method of paragraph 1, wherein the S-MRP composition in step (c) is dried, thereby forming a powdered S-MRP composition that is added to a beverage product.

4. The method of paragraph 2, wherein the beverage product is selected from the group consisting of water, flavored water, carbonated water, tea, milk, cocoa, diet beverage, juice, fruit juice, vegetable juice, fruit nectar, vegetable nectar, energy drink, protein shake, diet soda, fermented beverage, kombucha, probiotic beverage, prebiotic beverage, coffee, herbal infusion, hot cereal beverage, alcoholic beverage, beer, malt beverage, cider, perry, wine, fruit wine, rice wine, and spirituous beverage.

5. The method of paragraph 3, wherein the beverage product is selected from the group consisting of water, flavored water, carbonated water, tea, milk, cocoa, diet beverage, juice, fruit juice, vegetable juice, fruit nectar, vegetable nectar, energy drink, protein shake, diet soda, fermented beverage, kombucha, probiotic beverage, prebiotic beverage, coffee, herbal infusion, hot cereal beverage, alcoholic beverage, beer, malt beverage, cider, perry, wine, fruit wine, rice wine, and spirituous beverage.

6. The method of paragraph 2, wherein the S-MRP composition is added to the beverage product in an amount sufficient to improve mouth feel, improve sweetness intensity, improve overall likeability, provide less lingering, provide less astringency, and/or provide less bitterness compared to a control beverage product that does not contain the S-MRP composition.

7. The method of paragraph 2, wherein the S-MRP composition is added to the beverage product at a final concentration between 10 ppm and 1000 ppm.

8. The method of paragraph 2, wherein the S-MRP composition is added to the beverage product at a final concentration between 50 ppm and about 400 ppm.

9. The method of paragraph 1, wherein the S-MRP composition in step (d) is added to a food product.

10. The method of paragraph 9, wherein the S-MRP composition in step (d) is added to a food product selected from the group consisting of condiments, baked goods, confections, chewing gum, cereal compositions, dairy products, and tabletop sweetener compositions.

11. The method of paragraph 9, wherein the S-MRP composition in step (d) is added to chocolate, cookies, muffins, pizza dough, eggs, ketchup, jam, yogurt or sour cream.

12. The method of paragraph 9, wherein the S-MRP composition is added to the food product in an amount sufficient to improve mouth feel, improve sweetness intensity, and/or improve overall likeability compared to a control food product that does not contain the S-MRP composition.

13. The method of paragraph 9, wherein the S-MRP composition is added to the food product at a final concentration between 10 ppm and 1000 ppm.

14. The method of paragraph 9, wherein the S-MRP composition is added to the food product at a final concentration between 50 ppm and about 400 ppm.

15. The method of paragraph 1, wherein the first reaction mixture comprises rebaudioside A and rebaudioside D.

16. The method of paragraph 1, wherein the first reaction mixture comprises a Stevia extract selected from the group consisting of RA20, RA40, RA50, RA60, RA80, RA 90, RA95, RA97, RA98, RA99, RA99.5, RB8, RB10, RB15, RC15, RD6, STV60, STV90, RA75/RB15, RA80/RB10/RD6, and any combination thereof.

17. The method of paragraph 1, wherein the weight ratio of the first reaction mixture to the second reaction mixture is between 20:1 and 1:1.

18. The method of paragraph 1, wherein the weight ratio of galactose to glutamic acid in the second reaction mixture is between 5:1 and 1:5.

19. The method of paragraph 1, wherein the final reaction mixture in step (a) further comprises a sweetener enhancer selected from the group consisting of thaumatin, monellin, brazzein, miraculin, curculin, pentadin, mabinlin, and any combination thereof.

20. The method of paragraph 1, wherein the final reaction mixture in step (a) further comprises thaumatin.

21. The method of paragraph 1, wherein the reaction mixture in step (a) further comprises neohesperidin dihydrochalcone (NEMC), naringin dihydrochalcone, or a combination thereof.

22. The method of paragraph 1, wherein the reaction mixture in step (a) further comprises a high intensity natural sweetener added thereto.

23. The method of paragraph 22, wherein the high intensity natural sweetener is an SG, a *Stevia* extract, a mogroside, a monk fruit plant extract, rubusoside, a sweet tea extract, or a combination thereof.

24. The method of paragraph 1, wherein the S-MRP composition further comprises a sweetener enhancer added thereto, wherein the sweetness enhancer is thaumatin, monellin, brazzein, miraculin, curculin, pentadin, mabinlin, and any combination thereof.

25. The method of paragraph 1, wherein the S-MRP composition further comprises thaumatin added thereto.

26. The method of paragraph 25 wherein the weight ratio of the S-MRP composition to thaumatin is between 20:1 and 1:1.

27. The method of paragraph 1, wherein the S-MRP composition further comprises naringin dihydrochalcone, or a combination thereof added thereto.

28. The method of paragraph 1, wherein the S-MRP composition further comprises a high intensity natural sweetener added thereto.

29. The method of paragraph 28, wherein the high intensity natural sweetener is an SG, a *Stevia* extract, a mogroside, a monk fruit plant extract, rubusoside, a sweet tea extract, or a combination thereof.

30. The method of paragraph 1, wherein the S-MRP composition further comprises a flavor modifier product (FNP) added thereto.

31. The method of paragraph 30, wherein the FMP is maltol, ethyl-maltol, vanillin, ethyl vanillin, m-methylphenol, m-n-propylphenol, or a combination thereof.

32. The method of paragraph 1, wherein the S-MRP composition further comprises a high intensity natural sweetener added thereto.

33. The method of paragraph 32, wherein the high intensity natural sweetener is an SG, a *Stevia* extract, a mogroside, a monk fruit plant extract, rubusoside, a sweet tea extract, or a combination thereof.

34. The method of paragraph 32, wherein the high intensity natural sweetener is a swingle extract.

35. The method of paragraph 34, wherein the weight ratio of the S-MRP composition to the swingle extract is between 0.01:1 and 2:1.

36. The method of paragraph 32, wherein the high intensity natural sweetener is RU.

37. The method of paragraph 36, wherein the weight ratio of the S-MRP composition to RU is between 0.01:1 and 2:1.

38. The method of paragraph 1, wherein the S-MRP composition further comprises a high intensity synthetic sweetener added thereto, wherein the high intensity synthetic sweetener is sucralose, sorbitol, xylitol, mannitol, sucralose, aspartame, acesulfame-K, neotame, erythritol, trehalose, raffinose, cellobiose, tagatose, DOLCIA PRIMA™ allulose, inulin, N—[N-[3-(3-hydroxy-4-methoxyphenyl)propyl]alpha-aspartyl]-L-phenyl alanine 1-methyl ester, glycyrrhizin, sodium cyclamate, or a combination thereof.

39. The method of paragraph 1, wherein the one or more MRPs comprise one or more compounds corresponding to one more CAS numbers selected from the group consisting of 98-01-1, 620-02-0, 36879-73-9, 67-47-0, 2443-46-1, 581-42-0, 92368-82-6, 6217-54-5, 21391-99-1, 50704-01-3, 7325-84-0, 6846-50-0, 81968-62-9, 20129-39-9, 16714-85-5, 22599-96-8, 483-78-3, 54105-67-8, 61868-03-9, 1560-88-9, 638-36-8, 84-74-2.

40. The method of paragraph 1, wherein the one or more MRPs comprise at least five compounds corresponding to one more CAS numbers selected from the group consisting of 98-01-1, 620-02-0, 36879-73-9, 67-47-0, 2443-46-1, 581-42-0, 92368-82-6, 6217-54-5, 21391-99-1, 50704-01-3, 7325-84-0, 6846-50-0, 81968-62-9, 20129-39-9, 16714-85-5, 22599-96-8, 483-78-3, 54105-67-8, 61868-03-9, 1560-88-9, 638-36-8, 4-2.

41. The method of paragraph 1, wherein the one or more MRPs comprise at least ten compounds corresponding to one more CAS numbers selected from the group consisting of 98-01-1, 620-02-0, 36879-73-9, 67-47-0, 2443-46-1, 581-42-0, 92368-82-6, 6217-54-5, 21391-99-1, 50704-01-3, 7325-84-0, 6846-50-0, 81968-62-9, 20129-39-9, 16714-85-5, 22599-96-8, 483-78-3, 54105-67-8, 61868-03-9, 1560-88-9, 638-36-8, 84-74-2.

Additional Embodiments, Set 92

1. A beverage comprising a steviol glycoside Maillard reaction product (S-MRP) composition formed from one or more steviol glycosides, glutamic acid and galactose, wherein the S-MRP composition is prepared by a method comprising the steps of:

(a) preparing a first reaction mixture comprising one or more steviol glycosides and/or *Stevia* extracts in combination with a second reaction mixture comprising glutamic acid. and galactose to form a final reaction mixture;

(b) combining the final reaction mixture with one or more solvents to form a reaction solution;

(c) heating the reaction solution under conditions suitable for forming an S-MRP composition comprising one or more MRPs, and (d) adding the S-MRP composition to a beverage.

2. The beverage of paragraph 1, wherein the S-MRP composition in step (c) is dried, thereby forming a powdered S-MRP composition that is added to the beverage.

3. The beverage of paragraph 1, wherein the beverage is selected from the group consisting of water, flavored water, carbonated water, tea, milk, cocoa, diet beverage, juice, fruit juice, vegetable juice, fruit nectar, vegetable nectar, energy drink, protein shake, diet soda, fermented beverage, kombucha, probiotic beverage, prebiotic beverage, coffee, herbal infusion, hot cereal beverage, alcoholic beverage, beer, malt beverage, cider, perry, wine, fruit wine, rice wine, and spirituous beverage.

4. The beverage of paragraph 1, wherein the beverage is a sugar-free beverage, a reduced sugar beverage, carbonated water, tea, or diet soda.

5. The beverage of paragraph 1, wherein the S-MRP composition is added to the beverage in an amount sufficient to improve mouth feel, improve sweetness intensity, improve overall likeability, provide less lingering, provide less astringency, and/or provide less bitterness compared to a control beverage product that does not contain the S-MRP composition.

6. The beverage of paragraph 1, wherein the beverage comprises products of the S-MRP composition at a concentration between 10 ppm and 1000 ppm.

7. The beverage of paragraph 1, wherein the beverage comprises products of the S-MRP composition at a concentration between 50 ppm and about 400 ppm.

8. The beverage of paragraph 1, wherein the first reaction mixture comprises rebaudioside A and rebaudioside D.

9. The beverage of paragraph 1, wherein the first reaction mixture comprises a *Stevia* extract selected from the group consisting of RA 20, RA40, RA50, RA60, RA80, RA 90, RA95, RA97, RA98, RA99, RA99.5, RB8, RB10, RB15, RC15, RD6, STV60, STV90, RA75/RB15, RA80/RB10/RD6, and any combination thereof.

10. The beverage of paragraph 1, wherein the weight ratio of the first reaction mixture to the second reaction mixture is between 20:1 and 1:1.

11. The beverage of paragraph 1, wherein the weight ratio of galactose to glutamic acid in the second reaction mixture is between 5:1 and 1:5.

12. The beverage of paragraph 1, wherein the final reaction mixture in step (a) further comprises a sweetener enhancer selected from the group consisting of thaumatin, monellin, brazzein, miraculin, curculin, pentadin, mabinlin, and any combination thereof.

13. The beverage of paragraph 1, wherein the final reaction mixture in step (a) further comprises thaumatin.

14. The beverage of paragraph 1, wherein the reaction mixture in step (a) further comprises neohesperidin dihydrochalcone (NHDC), naringin dihydrochalcone, or a combination thereof.

15. The beverage of paragraph 1, wherein the reaction mixture in step further comprises a high intensity natural sweetener added thereto.

16. The beverage of paragraph 15, wherein the high intensity natural sweetener is an SG, a *Stevia* extract, a mogroside, a monk fruit plant extract, rubusoside, a sweet tea extract, or a combination thereof.

17. The beverage of paragraph 1, wherein the S-MRP composition further comprises a sweetener enhancer added thereto, wherein the sweetness enhancer is thaumatin, monellin, brazzein, miraculin, curculin, pentadin, mabinlin, and any combination thereof.

18. The beverage of paragraph 1, wherein the S-MRP composition further comprises thaumatin added thereto.

19. The beverage of paragraph 18 wherein the weight ratio of the S-MRP composition to thaumatin is between 20:1 and 1:1.

20. The beverage of paragraph 1, wherein the S-MRP composition further comprises neohesperidin dihydrochalcone (NHDC), naringin dihydrochalcone, or a combination thereof added thereto.

21. The beverage of paragraph 1, wherein the S-MRP composition further comprises a high intensity natural sweetener added thereto.

22. The beverage of paragraph 21, wherein the high intensity natural sweetener is an SG, a *Stevia* extract, a mogroside, a monk fruit plant extract, rubusoside, a sweet tea extract, or a combination thereof.

23. The beverage of paragraph 1, wherein the S-MRP composition further comprises a flavor modifier product (FMP) added thereto.

24. The beverage of paragraph 23, wherein the FIV1P is maltol, ethyl-maltol, vanillin, ethyl vanillin, m-methylphenol, m-n-propylphenol, or a combination thereof.

25. The beverage of paragraph 1, wherein the S-MRP composition further comprises a high intensity natural sweetener added thereto.

26. The beverage of paragraph 25, wherein the high intensity natural sweetener is an SG, a *Stevia* extract, a mogroside, a monk fruit plant extract, rubusoside, a sweet tea extract, or a combination thereof.

27. The beverage of paragraph 26, wherein the high intensity natural sweetener is a swingle extract.

28. The beverage of paragraph 27, wherein the weight ratio of the composition to the swingle extract is between 0.01:1 and 2:1.

29. The beverage of paragraph 26, wherein the high intensity natural sweetener is RU.

30. The beverage of paragraph 29, wherein the weight ratio of the S-MRP composition to RU is between 0.01:1 and 2:1.

31. The beverage of paragraph 1, wherein the S-MRP composition further comprises a high intensity synthetic sweetener added thereto, wherein the high intensity synthetic sweetener is sucralose, sorbitol, xylitol, mannitol, sucralose, aspartame, acesulfame-K, neotame, erythritol, trehalose, raffinose, cellobiose, tagatose, DOLCIA PRIMA™ allulose, inulin. N—[N-[3-(3-hydroxy-4-methoxyphenyl)propyl]-alpha-aspartyl]-L-phenylalanine 1-methyl ester, glycyrrhizin, sodium cyclamate, or a combination thereof.

32. The beverage of paragraph 1, wherein the one or more MRPs comprise one or more compounds corresponding to one more CAS numbers selected from the group consisting of 98-01-1, 620-02-0, 36879-73-9, 67-47-0, 2443-46-1, 581-42-0, 92368-82-6, 6217-54-5, 21391-99-1, 50704-01-3, 7325-84-0, 6846-50-0, 81968-62-9, 20129-39-9, 16714-85-5, 22599-96-8, 483-78-3, 54105-67-8, 61868-03-9, 1560-88-9, 638-36-8, 84-74-2.

33. The beverage of paragraph 1, wherein the one or more MRPs comprise at least five compounds corresponding to one more CAS numbers selected from the group consisting of 98-01-1, 620-02-0, 36879-73-9, 67-47-0, 2443-46-1, 581-42-0, 92368-82-6, 6217-54-5, 21391-99-1, 50704-01-3, 7325-84-0, 6846-50-0, 81968-62-9, 20129-39-9, 16714-85-5, 22599-96-8, 483-78-3, 54105-67-8, 61868-03-9, 1560-88-9, 638-36-8, 84-74-2.

44. The beverage of paragraph 1, wherein the one or more MRPs comprise at least ten compounds corresponding to one more CAS numbers selected from the group consisting of 98-01-1, 620-02-0, 36879-73-9, 67-47-0, 2443-46-1, 581-42-0, 92368-82-6, 6217-54-5, 21391-99-1, 50704-01-3, 7325-84-0, 6846-50-0, 81968-62-9, 20129-39-9, 16714-85-5, 22599-96-8, 483-78-3, 54105-67-8, 61868-03-9, 1560-88-9, 638-36-8, 84-74-2.

Additional Embodiments, Set 93

1. A beverage comprising a Maillard reaction product (MRP) composition formed from a reaction mixture comprising:

(1) one or more *Stevia*-related components selected from the group consisting of *Stevia* extracts, glycosylated *Stevia* extracts, steviol glycosides, and glycosylated steviol glycosides, and (2) one or more amine donors having a free amino group.

2. The beverage of paragraph 1, wherein the MRP composition is present in the beverage in a final concentration range of 1 ppm to 15,000 ppm, 1 ppm to 10,000 ppm, 1 ppm to 5,000 ppm, 1 ppm to 2,000 ppm, 1 ppm to 1,000 ppm, 1 ppm to 500 ppm, 1 ppm to 400 ppm, 1 ppm to 300 ppm, 1 ppm to 200 ppm, 1 ppm to 100 ppm, 1 ppm to 80 ppm, 1 ppm to 50 ppm, 1 ppm to 25 ppm, 1 ppm to 10 ppm, 1 ppm to 5 ppm, or any range derived from these values.

3. The beverage of paragraph 1, wherein the reaction mixture further comprises one or more reducing sugars having a free carbonyl group.

4. The beverage of paragraph 1, wherein the beverage comprises thaumatin, or neohesperidin dihydrochalcone (NHDC) or both.

5. The beverage of paragraph 1, wherein the reaction mixture further comprises thaumatin, or NHDC, or both, 6. The beverage of any one of paragraphs 1-5, wherein the beverage further comprises a high intensity natural sweetener, wherein the natural high intensity sweetener comprises one mor more *Stevia*-related components selected from the group consisting of Stevia extracts, glycosylated *Stevia* extracts, steviol glycosides, glycosylated steviol glycosides and combinations thereof.

7. The beverage of any one of paragraphs 1-6, wherein the beverage further comprises one or more sweeteners selected from the group consisting of sorbitol, xylitol, mannitol, sucralose, aspartame, acesulfame-K, neotame, erythritol, trehalose, raffinose, cellobiose, tagatose, allulose, inulin, N—[N-[3-(3-hydroxy-4-methoxyphenyl)propyl]-alpha-aspartyl]-L-phenylalanine 1-methyl ester, glycyrrhizin, sodium cyclamate, brazzein, miraculin, curculin, pentadin, mabinlin, thaumatin, neohesperidin dihydrochalcone (NHDC), maltol, ethyl maltol and advantame.

8. The beverage of paragraph 1, wherein the MRP composition has a citrus or tangerine flavor.

9. The beverage of paragraph 1, wherein the beverage does not contain any product made from roasted coffee beans.

10. The beverage of paragraph 1, wherein the beverage further comprises a product from roasted coffee beans and wherein the added MRP composition is not made from roasted coffee beans.

11. The beverage of any one of paragraphs 1-10, wherein the beverage is a carbonated soft beverage or a flavored water.

12. The beverage of any one of paragraphs 1-10, wherein the beverage is a fruit juice or a beverage comprising a fruit juice.

13. The beverage of any one of paragraphs 1-10, wherein the beverage is a diary beverage or a beverage comprising a dairy product.

14. The beverage of any one of paragraphs 1-10, wherein the MRP composition comprises a non-SG component present in the MRP composition in a concentration ranging from 0.1 wt % to 99 wt %, 0.1 wt % to 75 wt %, 0.1 wt % to 50 wt %, 0.1 wt % to 25 wt %. 0.1 wt % to 10 wt %, 0.1 wt % to 5 wt %, 0.1 wt % to 2 wt %, 0.1 wt % to 1 wt %. 0.1 wt % to 0.5 wt %, or any range derived from these values.

15. A beverage comprising:

(1) an added Maillard reaction product (MRP) composition formed from a reaction mixture comprising one or more reducing sugars having a free carbonyl group, and one or more amine donors having a free amino group, and (2) one or more *Stevia*-related components selected from the group consisting of *Stevia* extracts, glycosylated *Stevia* extracts, steviol glycosides, and glycosylated steviol glycosides, wherein the MRP composition is present in the beverage in a final concentration range of 1 ppm to 15,000 ppm, 1 ppm to 10,000 ppm, 1 ppm to 5,000 ppm, 1 ppm to 2,000 ppm, 1 ppm to 1,000 ppm, 1 ppm to 500 ppm, 1 ppm to 400 ppm, 1 ppm to 300 ppm, 1 ppm to 200 ppm, 1 ppm to 100 ppm, 1 ppm to 80 ppm, 1 ppm to 50 ppm, 1 ppm to 25 ppm, 1 ppm to 10 ppm, 1 ppm to 5 ppm, or any range derived from these values.

16. The beverage of paragraph 15, further comprising thaumatin or neohesperidin dihydrochalcone (NHDC), or both.

17. The beverage of paragraph 15 or 16, wherein the one or more amine donors comprise thaumatin or neohesperidin dihydrochalcone (NHDC) or both.

18. The beverage of any one of paragraphs 15-17, wherein the one or more amine donors comprise an amino acid and thaumatin.

19. The beverage of any one of paragraphs 15-18, wherein the beverage further comprises one or more sweeteners selected from the group consisting of sorbitol, xylitol, mannitol, sucralose, aspartame, acesulfame-K, neotame, erythritol, trehalose, raffinose, cellobiose, tagatose, allulose, inulin, N—[N-[3-(3-hydroxy-4-methoxyphenyl)propyl]-alpha-aspartyl]-L-phenylalanine 1-methyl ester, glycyrrhizin, sodium cyclamate, brazzein, miraculin, curculin, pentadin, mabinlin, thaumatin, neohesperidin dihydrochalcone (NHDC), maltol, ethyl maltol and advantame, 20. The beverage of paragraph 15, wherein the MRP composition has a citrus or tangerine flavor.

21. The beverage of paragraph 15, wherein the beverage does not contain any product made from roasted coffee beans.

22. The beverage of paragraph 15, wherein the beverage further comprises a product from roasted coffee beans and wherein the added MRP composition is not made form roasted coffee beans.

23. The beverage of any one of paragraphs 15-22, wherein the beverage is a carbonated soft beverage or a flavored water.

24. The beverage of any one of paragraphs 15-22, wherein the beverage is a fruit juice or a beverage comprising a fruit juice.

25. The beverage of any one of paragraphs 15-22, wherein the beverageis a diary beverage or a beverage comprising a dairy product.

26. The beverage of any one of paragraphs 15-22, wherein the MRP composition comprises a non-SG component present in the MRP composition in a concentration ranging from 0.1 wt % to 99 wt %, 0.1 wt % to 75 wt %, 0.1 wt % to 50 wt %, 0.1 wt % to 25 wt %. 0.1 wt % to 10 wt %, 0.1 wt % to 5 wt %, 0.1 wt % to 2 wt %, 0.1 wt % to 1 wt %. 0.1 wt. % to 0.5 wt %, or any range derived from these values.

Additional Embodiments, Set 94

1. A beverage comprising:

an added Maillard reaction product (MRP) composition formed from a reaction mixture comprising:

(1) one or more *Stevia*-related components selected from the group consisting of *Stevia* extracts, glycosylated *Stevia* extracts, steviol glycosides, glycosylated steviol glycosides and combinations thereof; and (2) one or more amine donors having a free amino group, wherein the MRP composition comprises an Amadori product, and wherein the MRP composition is present in the beverage in a final concentration range of 1 ppm to 15,000 ppm, 1 ppm to 10,000 ppm, 1 ppm to 5,000 ppm, 1 ppm to 2,000 ppm, 1 ppm to 1,000 ppm, 1 ppm to 500 ppm, 1 ppm to 400 ppm, 1 ppm to 300 ppm, 1 ppm to 200 ppm, 1 ppm to 100 ppm, 1 ppm to 80 ppm, 1 ppm to 50 ppm, 1 ppm to 25 ppm, 1 ppm to 10 ppm, 1 ppm to 5 ppm, or any range derived from these values.

2. The beverage of paragraph 1, further comprising thaumatin or neohesperidin dihydrochalcone (NHDC), or both.

3. The beverage of paragraph 1, wherein the one or more amine donor comprises thaumatin or NHDC, or both.

4. The beverage of paragraph 1, wherein the one or more amine donors comprise an amino acid selected from the group consistin of alanine, arginine, asparagine, aspartic acid, cysteine, glutamic acid, glutamine glycine, histidine, isoleucine, leucine, lysine, methionine, phenylalanine, proline, serine, tyrosine, tryptophan, threonine and valine.

5. The beverage of paragraph 4, wherein the one or more amine donors further comprise thaumatin.

6. The beverage of any one of paragraphs 1-5, further comprising a sweetener, sweetener enhancer and/or flavoring agent selected from the group consisting of sorbitol, xylitol, mannitol, sucralose, aspartame, acesulfame-K, neotame, erythritol, trehalose, raffinose, cellobiose, tagatose, allulose, inulin, N—[N-[3-(3-hydroxy-4-methoxyphenyl)propyl]-alpha-aspartyl]-L-phenylalanine 1-methyl ester, glycyrrhizin, sodium cyclamate, brazzein, miraculin, curculin, pentadin, mabinlin, thaumatin, neohesperidin dihydrochalcone (NHDC), tnaltol, ethyl maltol and advantame and combinations thereof.

7. The beverage of any one of paragraphs 1-6, wherein the MRP composition has a citrus or tangerine flavor.

8. The beverage of any one of paragraphs 1-6, wherein the beverage does not contain any product made from roasted coffee beans.

9. The beverage of any one of paragraphs 1-6, wherein the beverage further comprises a product from roasted coffee beans and wherein the added MRP composition is not made from roasted coffee beans.

10. The beverage of any one of paragraphs 1-6, wherein the beverage is a carbonated soft beverage or a flavored water.

11. The beverage of any one of paragraphs 1-6, wherein the beverage is a fruit juice or a beverage comprising a fruit juice.

12. The beverage of any one of paragraphs 1-6, wherein the beverage is a diary beverage or a beverage comprising a dairy product.

13. The beverage of any one of paragraphs 1-6, wherein the MRP composition comprises a non-SG component present in the MRP composition in a concentration ranging from 0.1 wt % to 99 wt %, 0.1 wt % to 75 wt %, 0.1 wt % to 50 wt %, 0.1 wt % to 25 wt %, 0.1 wt % to 10 wt %, 0.1 wt % to 5 wt %, 0.1 wt % to 2 wt %, 0.1 wt % to 1 wt %, 0.1 wt % to 0.5 wt %, or any range derived from these values.

14. The beverage of any one of paragraphs 1-6, wherein the Amadori product is an Amadori product of RA, RB or RM.

15. A beverage comprising:

an added Maillard reaction product (MRP) composition formed from a reaction mixture comprising:

(1) one or more *Stevia*-related components selected from the group consisting of *Stevia* extracts, glycosylated *Stevia* extracts, steviol glycosides, glycosylated steviol glycosides and combinations thereof;

(2) one or more reducing sugars having a free carbonyl group; and (3) one or more amine donors having a free amino group, wherein the MRP composition comprises an Amadori product, and wherein the MRP composition is present in the beverage in a final concentration range of 1 ppm to 15,000 ppm, 1 ppm to 10,000 ppm, 1 ppm to 5,000 ppm, 1 ppm to 2,000 ppm, 1 ppm to 1,000 ppm, 1 ppm to 500 ppm, 1 ppm to 400 ppm, 1 ppm to 300 ppm, 1 ppm to 200 ppm, 1 ppm to 100 ppm, 1 ppm to 80 ppm, 1 ppm to 50 ppm, 1 ppm to 25 ppm, 1 ppm to 10 ppm, 1 ppm to 5 ppm, or any range derived from these values.

16. The beverage of paragraph 15, further comprising thanmath or neohesperidin dihydrochalcone (NHDC), or both.

17. The beverage of paragraph 15, wherein the one or more amine donor comprises thaumatin or NHDC, or both.

18. The beverage of any one of paragraphs 15-17, wherein the one or more amine donors comprise an amino acid selected from the group consisting of alanine, arginine, asparagine, aspartic acid, cysteine, glutamic acid, glutamine glycine, histidine, isoleucine, leucine, lysine, methionine, phenylalanine, proline, serine, tyrosine, tryptophan, threonine and valine.

19. The beverage of paragraph 18, wherein the one or more amine donors further comprise thaumatin.

20. The beverage of any one of paragraphs 15-19, further comprising a sweetener, sweetener enhancer and/or flavoring agent selected from the group consisting of sorbitol, xylitol, mannitol, sucralose, aspartame, acesulfame-K, neotame, erythritol, trehalose, raffinose, cellobiose, tagatose, allulose, inulin, N—[N-[3-(3-hydroxy-4-methoxyphenyl) propyl]-alpha-aspartyl]-L-phenylalanine 1-methyl ester, glycyrrhizin, sodium cyclamate, brazzein, miraculin, curculin, pentadin, tnabinlin, thaumatin, neohesperidin dihydrochalcone (NHDC), maltol, ethyl maltol and advantame and combinations thereof.

21. The beverage of any one of paragraphs 15-19, wherein the MRP composition has a citrus or tangerine flavor.

22. The beverage of any one of paragraphs 15-19, wherein the beverage does not contain any product made from roasted coffee beans.

23. The beverage of any one of paragraphs 15-19, wherein the beverage further comprises a product from roasted coffee beans and wherein the added MRP composition is not made from roasted coffee beans.

24. The beverage of any one of paragraphs 15-19, wherein the beverage is a carbonated soft beverage or a flavored water.

25. The beverage of any one of paragraphs 15-19, wherein the beverage is a fruit juice or a beverage comprising a fruit juice.

26. The beverage of any one of paragraphs 15-19, wherein the beverage is a diary beverage or a beverage comprising a dairy product.

27. The beverage of any one of paragraphs 15-19, wherein the MRP composition comprises a non-SG component present in the MRP composition in a concentration ranging from 0.1 wt % to 99 wt %, 0.1 wt % to 75 wt %, 0.1 wt % to 50 wt %, 0.1 wt % to 25 wt %. 0.1 wt % to 10 wt %, 0.1 wt % to 5 wt %, 0.1 wt % to 2 wt %, 0.1 wt % to 1 wt %. 0.1 wt % to 0.5 wt %, or any range derived from these values.

28. The beverage of any one of paragraphs 15-19, wherein the Amadori products are one or more Amadori product selected from RA, RB, RD, RE, RI or RM.

Additional Embodiments, Set 95

1. A sweetener or flavoring agent composition comprising:

(1) a Maillard reaction product (MRP) composition formed from a reaction mixture comprising:

(a) one or more reducing sugars having a free carbonyl group, and (b) one or more amine donors having a free amino group; and (2) one or more *Stevia*-related components selected from the group consisting of *Stevia* extracts, glycosylated *Stevia* extracts, steviol glycosides, and glycosylated steviol glycosides, wherein the MRP composition is present in the sweetener composition in a concentration ranging from 0.1 wt % to 99 wt %, 0.1 wt % to 75 wt %, 0.1 wt % to 50 wt %, 0.1 wt % to 25 wt %. 0.1 wt % to 10 wt %, 0.1 wt % to 5 wt %, 0.1 wt % to 2 wt %, 0.1 wt % to 1 wt %, 0.1 wt % to 0.5 wt %, or any range derived from these values.

2. The sweetener or flavoring agent composition of paragraph 1, wherein the one or more amine donors comprise thaumatin.

3. The sweetener or flavoring agent composition of paragraph 1, wherein the one or more amine donors comprise an amino acid and thawnatin.

4. The sweetener or flavoring agent composition of any one of paragraphs 1-3, further comprising one or more sweeteners selected from the group consisting of sorbitol, xylitol, mannitol, sucralose, aspartame, acesulfame-K, neotame, erythritol, trehalose, raffinose, cellobiose, tagatose, allulose, inulin, N—[N-[3-(3-hydroxy-4-methoxyphenyl) propyl]-alpha-aspartyl]-L-phenylalanine 1-methyl ester, glycyrrhizin, sodium cyclamate, brazzein, miraculin, curculin, pentadin, mabinlin, thaumatin, neohesperidin dihydrochalcone (NHDC), maltol, ethyl maltol, advantame, and combinations thereof.

5. The sweetener or flavoring agent composition of paragraph 4, wherein the one or more sweeteners comprise thaumatin or NHDC, or both.

6. The sweetener or flavoring agent composition of any one of paragraphs 1-5, wherein the MRP composition has a citrus or tangerine flavor.

7. The sweetener or flavoring agent composition of any one of paragraphs 1-6, wherein the MRP composition is present in the sweetener composition in a concentration ranging from 0.5 wt % to 50 wt %, 0.5 wt % to 20 wt %, 0.5 wt % to 10 wt %, 0.5 wt % to 5 wt %, 0.5 wt % to 2 wt %, or any range derived from these values.

8. The sweetener or flavoring agent composition of any one of paragraphs 1-6, wherein the MRP composition is present in the sweetener composition in a concentration ranging from 2 wt % to 50 wt %, 2 wt % to 20 wt %, 2 wt % to 10 wt %, 2 wt % to 5 wt %, or any range derived from these values.

9. The sweetener or flavoring agent composition of paragraph 1, wherein the amine donors comprise one or more of a primary amine compound, a secondary amine compound, an amino acid, a protein, a peptide, a yeast extract or mixtures thereof.

10. The sweetener or flavoring agent composition of paragraph 1, wherein the one or more amine donors comprise an amino acid selected from the group consisting of alanine, arginine, asparagine, aspartic acid, cysteine, glutamic acid, glutamine glycine, histidine, isoleucine, leucine, lysine, methionine, phenylalanine, proline, serine, tyrosine, tryptophan, threonine and valine.

11. A sweetener or flavoring agent composition comprising:

(1) a first component comprising a Maillard reaction product (MRP) composition formed from a reaction mixture comprising:

(a) one or more *Stevia*-related components selected from the group consisting of *Stevia* extracts, glycosylated *Stevia* extracts, steviol glycosides, and glycosylated steviol glycosides, and (b) one or more amine donors having a free amino group; and (2) a second component comprising one or more sweeteners, wherein the first and second components are present in the sweetener composition in a concentration ranging from 1 wt % to 99 wt %, 1 wt % to 75 wt %, 1 wt % to 50 wt %, 1 wt % to 25 wt %, 1 wt % to 15 wt %, 1 wt % to 10 wt %, 1 wt % to 5 wt %, 1 wt % to 2 wt %, or any range derived from these values.

12. The sweetener composition of paragraph 11, wherein the MRP composition is present in the sweetener composition in a concentration ranging from 0.01 wt % to 99 wt %, 0.01 wt % to 75 wt %, 0.01 wt % to 50 wt %, 0.01 wt % to 25 wt %, 0.01 wt % to 10 wt %, 0.01 wt % to 5 wt %, 0.01 wt % to 2 wt %, 0.01 wt % to 0.5 wt %, 0.01 wt % to 0.1 wt %, 0.001 wt % to 0.005 wt %, or any range derived from these values.

13. The sweetener composition of paragraph 11, wherein the reaction mixture further comprises: (C) one or more reducing sugars having a free carbonyl group.

14. The sweetener composition of any one of paragraphs 11-13, wherein the one or more sweeteners are selected from the group consisting of sorbitol, xylitol, mannitol, sucralose, aspartame, acesulfame-K, neotame, erythritol, trehalose, raffinose, cellobiose, tagatose, inulin, N—[N-[3-(3-hydroxy-4-methoxyphenyl)propyl]-alpha-aspartyl]-L-phenylalanine 1-methyl ester, glycyrrhizin, sodium cyclamate, brazzein, miraculin, curculin, pentadin, thaumatin, neohesperidin dihydrochalcone (NHDC), maltol, ethyl malto and advantame.

15. The sweetener composition of any one of paragraphs 11-14, wherein the MRP composition comprises a non-SG component present in the MRP composition in a concentration ranging from 0.1 wt % to 99 wt %, 0.1 wt % to 75 wt %, 0.1 wt % to 50 wt %, 0.1 wt % to 25 wt %. 0.1 wt % to 10 wt %, 0.1 wt % to 5 wt %, 0.1 wt % to 2 wt %, 0.1 wt % to 1 wt %. 0.1 wt % to 0.5 wt %, or any range derived from these values.

16. The sweetener or flavoring agent composition of any one of paragraphs 11-15, wherein the reaction mixture comprises thaumatin, or NHDC, or both.

17. The sweetener or flavoring agent composition of any one of paragraphs 11-16, wherein the MRP composition has a citrus or tangerine flavor.

18. The sweetener or flavoring agent composition of any one of paragraphs 11-16, wherein the MRP composition is present in the sweetener composition in a concentration ranging from 0.001 wt % to 99 wt %, 0.001 wt % to 75 wt %, 0.001 wt % to 50 wt %, 0.001 wt % to 20 wt %, 0.001 wt % to 10 wt %, 0.001 wt % to 5 wt %, 0.001 wt % to 2 wt %, 0.001 wt % to 0.5 wt %, 0.001 wt % to 0.01 wt %, or any range derived from these values.

19. The sweetener or flavoring agent composition of any one of paragraphs 11-16, wherein the MRP composition is present in the sweetener composition in a concentration ranging from 0.5 wt % to 99 wt %, 0.5 wt % to 75 wt %, 0.5 wt % to 50 wt %, 0.5 wt % to 20 wt %, 0.5% to 10 wt %, 0.5 wt % to 5 wt %, 0.5 wt % to 2 wt %, or any range derived from these values.

20. The sweetener or flavoring agent composition of paragraph 11, wherein the one or more amine donors comprise one or more of a primary amine compound, a secondary amine compound, an amino acid, a protein, a peptide, a yeast extract or mixtures thereof.

21. The sweetener or flavoring agent composition of paragraph 1, wherein the one or more amine donors comprise an amino acid selected from the group consistin of alanine, arginine, asparagine, aspartic acid, cysteine, glutamic acid, glutamine glycine, histidine, isoleucine, leucine, lysine, methionine, phenylalanine, proline, serine, tyrosine, tryptophan, threonine and valine.

Additional Embodiments, Set 96

1. A dough comprising:

(1) a first component comprising a Maillard reaction product (MRP) composition formed from a reaction mixture comprising:

(a) one or more reducing sugars having a free carbonyl group, and (b) one or more amine donors having a free amino group; and (2) one or more *Stevia*-related components selected from the group consisting of *Stevia* extracts, glycosylated *Stevia* extracts, steviol glycosides, and glycosylated steviol glycosides, wherein the first and second components are present in the dough in a concentration ranging from 0.001 wt % to 20 wt %, 0.001 wt % to 10 wt %, 0.001 wt % to 5 wt %, 0.001 wt % to 2 wt %, 0.001 wt % to 0.5 wt %, 0.001 wt % to 0.01 wt %, 0.001 wt % to 0.005 wt % or any range derived from these values.

2. The dough of paragraph 1, wherein the one or more amine donors comprise thaurnatin 3. The dough of paragraph 1, wherein the one or more amine donors comprise an amino acid and thaumatin.

4. The dough of any one of paragraphs 1-3, further comprising one or more sweeteners selected from the group consisting of sorbitol, xylitol, mannitol, sucralose, aspartame, acesulfame-K, neotame, erythritol, trehalose, raffinose, cellobiose, tagatose, allulose, inulin, N-[N-[3-(3-hydroxy-4-methoxyphenyl)propyl]-alpha-aspartyl]-L-phenylalanine 1-methyl ester, glycyrrhizin, sodium cyclamate, brazzein, miraculin, curculin, pentadin, mabinlin, thaumatin, neohesperidin dihydrochalcone (NHDC), maltol, ethyl maltol and advantame.

5. The dough of any one of paragraphs 1-4, wherein the reaction misture comprises thaumatin, or NHDC, or both.

6. The dough of any one of paragraphs 1-4, wherein the first component is present in the dough in an amount ranging from 0.0001 wt % to 1 wt %, 0.0001 wt % to 0.5 wt %, 0.0001 wt % to 0.2 wt %, 0.0001 wt to 0.05 wt %, 0.0001 wt % to 0.01 wt %, 0.0001 wt % to 0.0005 wt %, or any range derived from these values.

7. The dough of any one of paragraphs 1, wherein the amine donors comprise one or more of a primary amine compound, a secondary amine compound, an amino acid, a protein, a peptide, a yeast extract or mixtures thereof.

8. The dough of paragraph 1, wherein the one or more reducing sugars comprise a monosaccharide, a disaccharide, an oligosaccharide, an polysaccharide, or a combination thereof.

9. The dough of any one of paragraphs 1-4, further comprising a sweetener selected from the group consisting of sweet tea extracts, swingle extracts, sweet tea glycosides, mogrosides, glycosylated sweet tea glycosides, and glycosylated mogrosides.

10. A bakery product made from the dough of paragraph 1.

11. A dough comprising:

(1) a first component comprising a Maillard reaction product (MRP) composition formed from a reaction mixture comprising:

(a) one or more *Stevia*-related components selected from the group consisting of *Stevia* extracts, glycosylated *Stevia* extracts, steviol glycosides, and glycosylated steviol glycosides, and (b) one or more amine donors having a free amino group; and (2) a second component comprising one or more sweeteners, wherein the first and second components are present in the dough in a total concentration ranging from 0.0001 wt % to 50 wt %, 0.0001 wt % to 25 wt %, 0.0001 wt % to 10 wt %, 0.0001 wt % to 5 wt %, 0.0001 wt % to 1 wt %; 0.0001 wt % to 1 wt %, 0.0001 wt % to 0.5 wt %, 0.0001 wt % to 0.2 wt %, 0.0001 wt % to 0.05 wt %, 0.0001 wt % to 0.01 wt %, 0.0001 wt % to 0.005 wt %, or any range derived from these values.

12. The dough of paragraph 11, wherein the reaction mixture further comprises one or more reducing sugars having a free carbonyl group.

13. The dough of paragraph 12, wherein the one or more reducing sugars comprise a monosaccharide, a disaccharide, an oligosaccharide, an polysaccharide, or a combination thereof.

14. The dough of paragraph 11, further comprising thaumatin.

15. The dough of paragraph 11, wherein the reaction mixture further comprises thaumatin, or NHDC, or both.

16. The dough of any one of paragraphs 11-15, wherein the one or more sweeteners comprise a sweetener selected from the group consisting of sorbitol, xylitol, mannitol, sucralose, aspartame, acesulfame-K, neotame, erythritol, trehalose, raffinose, cellobiose, tagatose, allulose, inulin, N—[N-[3-(3-hydroxy-4-methoxyphenyl)propyl]-alpha-aspartyl]-L-phenylalanine 1-methyl ester, glycyrrhizin, sodium cyclamate, brazzein, miraculin, curculin, pentadin, mabinlin, thaumatin, neohesperidin dihydrochalcone maltol, ethyl maltol and advantame.

17. The dough of any one of paragraphs 11-16, wherein the first component is present in the dough in a concentration ranging from 0,001 wt % to 20 wt %, 0.001 wt % to 15 wt 0.001 wt % to 10 wt %, 0.001 wt % to 5 wt %, 0.001 wt % to 2 wt %, 0.001 wt % to 1 wt %, 0.001 wt % to 0.2 wt %, 0.001 wt % to 0.005 wt %, or any range derived from these values.

18. The dough of any one of paragraphs 11-16, wherein the first component is present in the dough in a concentration ranging from 0.01 wt % to 2 wt %, 0.01 wt % to 1 wt %, 0.01 wt % to 0.5 wt %, 0.01 wt % to 0.1 wt %, 0.01 wt % to 0.05 wt %, or any range derived from these values.

19. The dough of paragraph 11, wherein the amine donors comprise one or more of a primary amine compound, a secondary amine compound, an amino acid, a protein, a peptide, a yeast extract or mixtures thereof.

20. A bakery product made from the dough of any one of paragraphs 11-19.

Additional Embodiments, Set 97

1. A dairy product comprising:

(1) a first component comprising a Maillard reaction product (MRP) composition formed from a reaction mixture comprising:

(a) one or more reducing sugars having a free carbonyl group, and (b) one or more amine donors having a free amino group; and (2) one or more *Stevia*-related components selected from the group consisting of *Stevia* extracts, glycosylated *Stevia* extracts, steviol glycosides, and glycosylated steviol glycosides, wherein the first and second components are present in the dairy product in a total concentration ranging from 0.0001 wt % to 10 wt %, 0.0001 wt % to 5 wt %, 0.0001 wt % to 2 wt %, 0.0001 wt to 1 wt %; 0.0001 wt % to 0.5 wt %, 0.0001 wt % to 0.2 wt %, 0.0001 wt % to 0.05 wt %, 0.0001 wt % to 0.01 wt %, 0.0001 wt % to 0.005 wt %, 0.0001 wt % to 0.0005 wt %, or any range derived from these values.

2. The dairy product of paragraph 1, wherein the dairy product is a pasteurized or sterilized dairy product and wherein the MRP composition is formed prior to pasteurization or sterilization.

3. The dairy product of paragraph 1, wherein the one or more amine donors comprise thaumatin, NHDC, or both.

4. The dairy product of paragraph 1, wherein the one or more amine donors comprise an amino acid and thaumatin.

5. The dairy product of paragraph 1, further comprising thaumatin, NHDC, or both.

6. The dairy product of any one of paragraphs 1-5, further comprising one or more sweeteners selected from the group consisting of sorbitol, xylitol, mannitol, sucralose, aspartame, acesulfame-K, neotame, erythritol, trehalose, raffinose, cellobiose, tagatose, allulose, inulin, N-[N-[3-(3-hydroxy-4-methoxyphenyl)propyl]-alpha-aspartyl]-L-phenylalanine 1-methyl ester, glycyrrhizin, sodium cyclamate, brazzein, miraculin curculin, pentadin, mabinlin, thaumatin, neohesperidin dihydrochalcone (NHDC), maltol, ethyl maltol and advantame.

7. The dairy product of any one of paragraphs 1-6, wherein the first and second components are present in the dairy product in a total concentration ranging from 0.001 wt % to 2 wt %, 0.001 wt % to 0.5 wt %, 0.001 wt % to 0.2. wt %, 0.001 wt % to 0.005 wt %, or any range derived from these values.

8. The dairy product of any one of paragraphs 1-6, wherein the first and second components are present in the dairy product in a total concentration ranging from 0.01 wt % to 2 wt %, 0.01 wt % to 1 wt %, 0.01 wt % to 0.5 wt %, 0.01 wt % to 0.1 wt %, 0.01 wt % to 0.05 wt %, or any range derived from these values.

9. The dairy product of paragraph 1, wherein the amine donors comprise one or more of a primary amine compound, a secondary amine compound, an amino acid, a protein, a peptide, a yeast extract or mixtures thereof.

10. The dairy product of paragraph 1, wherein the one or more reducing sugars comprise a monosaccharide, a disaccharide, an oligosaccharide, an polysaccharide, or a combination thereof.

11. A dairy product comprising:

(1) a first component comprising a Maillard reaction product (MRP) composition formed from a reaction mixture comprising:

(a) one or more *Stevia*-related components selected from the group consisting of *Stevia* extracts, glycosylated *Stevia* extracts, steviol glycosides, and glycosylated steviol glycosides, and (b) one or more amine donors having a free amino group; and (2) a second component comprising one or more sweeteners, wherein the first and second components are present in the dairy product in a total concentration ranging from 0.0001 wt % to 10 wt %, 0.0001 wt % to 5 wt %, 0.0001 wt % to 2 wt %, 0.0001 wt % to 1 wt %, 0.0001 wt % to 0.5 wt %, 0.0001 wt % to 0.2 wt %, 0.0001 wt % to 0.05 wt %, 0.0001 wt % to 0.01 wt %, 0.0001 wt % to 0.005 wt %, 0.0001 wt % to 0.0005 wt %, or any range derived from these values, 12. The dairy product of paragraph 11, wherein the dairy product is a pasteurized or sterilized dairy product and wherein the MRP composition is formed prior to pasteurization or sterilization.

13. The dairy product of paragraph 11, wherein the one or more amine donors comprise thaumatin, NHDC, or both.

14. The dairy product of paragraph 11, wherein the one or more amine donors comprise an amino acid and thaumatin.

15. The dairy product of paragraph 11, wherein the one or more sweeteners comprise thaumatin, NHDC, or both.

16. The dairy product of any one of paragraphs 11-15, wherein the one or more sweeteners comprise a sweetener selected from the group consisting of sorbitol, xylitol, mannitol, sucralose, aspartame, acesulfame-K, neotame, erythritol, trehalose, raffinose, cellobiose, tagatose, allulose, inulin, N—[N-[3-(3-hydroxy-4-methoxyphenyl)propyl]-alpha-aspartyl]-L-phenylalanine 1-methyl ester, glycyrrhizin, sodium cyclamate, brazzein, miraculin, curculin, pentadin, mabinlin, thaumatin, neohesperidin dihydrochalcone (NHDC), maltol, ethyl maltol and advantame.

17. The dairy product of any one of paragraphs 11-16, wherein the first and second components are present in the dairy product in a total concentration ranging from 0.001 wt % to 2 wt %, 0.001 wt % to 0.5 wt %, 0.001 wt % to 0.2 wt %, 0.001 wt % to 0.005 wt %, or any range derived from these values.

18. The dairy product of any one of paragraphs 11-16, wherein the first component is present in the dairy product in a total concentration ranging from 0.01 wt % to 2 wt %, 0.01 wt % to 1 wt %, 0.01 wt % to 0.5 wt %, 0.01 wt % to 0.1 wt %, 0.01 wt % to 0.05 wt %, or any range derived from these values.

19. The dairy product of paragraph 11, wherein the amine donors comprise one or more of a primary amine compound, a secondary amine compound, an amino acid, a protein, a peptide, a yeast extract or mixtures thereof.

20. The dairy product of paragraph 11, wherein the one or more reducing sugars comprise a monosaccharide, a disaccharide, an oligosaccharide, an polysaccharide, or a combination thereof.

Additional Embodiments, Set 98

1. A food product comprising:

one or more non-volatile compounds from a Maillard reaction product (MRP) composition formed from a reaction mixture comprising:

(i) one or more *Stevia*-related components selected from the group consisting of *Stevia* extracts, glycosylated *Stevia* extracts, steviol glycosides, and glycosylated steviol glycosides; and (ii) one or more amine donors having a free amino group, wherein the one or more non-volatile compounds are present in the food product in a concentration ranging from 0.0001 wt % to 99 wt %, 0.0001 wt % to 75 wt %, 0.0001 wt % to 50 wt %, 0.0001 wt % to 25 wt %, 0.0001 wt % to 10 wt %, 0.0001 wt % to 5 wt %, 0.0001 wt % to 1 wt %, 0.0001 wt % to 1 wt %, 0.0001 wt % to 0.5 wt %, 0.0001 wt % to 0.2 wt %, 0.0001 wt % to 0.05 wt %, 0,0001 wt % to 0.01 wt %, 0.0001 wt % to 0.005 wt %, or any range derived from these values.

2. The food product of paragraph 1, wherein the reaction mixture further comprises one or more reducing sugars having a free carbonyl group.

3. The food product of paragraph 1, further comprising thaumatin, NHDC, or both.

4. The foodproduct of paragraph 1, wherein the reaction mixture further comprises thaumatin, NHDC, or both.

5. The food product of any one of paragraphs 1-4, further comprising a sweetener.

6. The food product of paragraph 5, wherein the sweetener is selected from the group consisting of sorbitol, xylitol, mannitol, sucralose, aspartame, acesulfame-K, neotame, erythritol, trehalose, raffinose, cellobiose, tagatose, allulose, inulin, N—[N-[3-(3-hydroxy-4-methoxyphenyl)propyl]-alpha-aspartyl]-L-phenylalanine 1-methyl ester, glycyrrhizin, sodium cyclamate, brazzein, miraculin, curculin, pentadin, thaumatin, neohesperidin dihydrochalcone (NHDC), maltol, ethyl maltol and advantame.

7. The food product of any one of paragraphs 1-6, wherein the one or more non-volatile compounds are present in the food product in a total concentration ranging from 0.001 wt % to 20 wt %, 0.001 wt % to 15 wt %, 0.001 wt % to 10 wt %, 0.001 wt % to 5 wt %, 0.001 wt % to 2 wt %, 0.001 wt % to 1 wt %, 0.001 wt % to 0.2 wt %, 0.001 wt % to 0.005 wt %, or any range derived from these values.

8. The food product of any one of paragraphs 1-6, wherein one or more non-volatile compounds are present in the food product in a total concentration ranging from 0.01 wt % to 2 wt %, 0.01 wt % to 1 wt %, 0.01 wt % to 0.5 wt %, 0.01 wt % to 0.1 wt %, 0.01 wt % to 0.05 wt %, or any range derived from these values.

9. The food product of paragraph 1, wherein the amine donors comprise one or more of a primary amine compound, a secondary amine compound, an amino acid, a protein, a peptide, a yeast extract or mixtures thereof.

10. The dairy product of paragraph 1, wherein the reaction mixture further comprises one or more reducing sugars, and wherein the one or more reducing sugars comprise a monosaccharide, a disaccharide, an oligosaccharide, an polysaccharide, or a combination thereof.

11. A beverage comprising:

one or more non-volatile compounds from a Maillard reaction product (MRP) composition formed from a reaction mixture comprising:

(i) one or more *Stevia*-related components selected from the group consisting of *Stevia* extracts, glycosylated *Stevia* extracts, steviol glycosides, and glycosylated steviol glycosides; and (ii) one or more amine donors having a free amino group, wherein the one or more non-volatile compounds are present in the beverage in a final concentration range of 1 ppm to 15,000 ppm, 1 ppm to 10,000 ppm, 1 ppm to 5,000 ppm, 1 ppm to 2,000 ppm, 1 ppm to 1,000 ppm, 1 ppm to 500 ppm, 1 ppm to 400 ppm, 1 ppm to 300 ppm, 1 ppm to 200 ppm, 1 ppm to 100 ppm, 1 ppm to 80 ppm, 1 ppm to 50 ppm, 1 ppm to 25 ppm, 1 ppm to 10 ppm, or 1 ppm to 5 ppm.

12. The beverage of paragraph 11, wherein the reaction mixture further comprises one or more reducing sugars having a free carbonyl group.

13. The beverage of paragraph 11, further comprising thaumatin, NHDC, or both.

14. The beverage of paragraph 11, wherein the reaction mixture further comprises thaumatin, NHDC, or both.

15. The beverage of any one of paragraphs 11-14, further comprising a sweetener.

16. The beverage of paragraph 15, wherein the sweetener is selected from the group consisting of sorbitol, xylitol, mannitol, sucralose, aspartame, acesulfame-K, neotame, erythritol, trehalose, raffinose, cellobiose, tagatose, allulose, inulin, N—[N-[3-(3-hydroxy-4-methoxyphenyl)propyl]-alpha-aspartyl]-L-phenylalanine 1-methyl ester, glycyrrhizin, sodium cyclamate, brazzein, miraculin, curculin, pentadin, mabinlin, thaumatin, neohesperidin dihydrochalcone (NHDC), maltol, ethyl maltol and advantame.

17. The beverage of any one of paragraphs 11-16, wherein the beverage does not contain any product made from roasted coffee beans.

18. The beverage of any one of paragraphs 11-16, wherein the beverage further comprises a product from roasted coffee beans and wherein the added MRP composition is not made from roasted coffee beans.

19. The beverage of any one of paragraphs 11-16, wherein the beverage is a carbonated soft beverage or a flavored water.

20. The beverage of any one of paragraphs 11-16, wherein the beverage is a fruit juice or a beverage comprising a fruit juice.

Additional Embodiments, Set 99

1. A composition comprising:

a Maillard reaction product (MRP) composition formed from a reaction mixture comprising:

(A) a non-*Stevia* sweetening agent;

(B) a reducing sugar having a free carbonyl group; and (C) one or more amine donors having a free amino group; and wherein the non-*Stevia* sweetening agent is selected from the group consisting of sweet tea extracts, swingle extracts, glycosylated sweet tea extracts, glycosylated swingle extracts, glycosylated sweet tea glycosides, glycosylated mogrosides, glycyrrhizin, glycosylated glycyrrhizin, rubusoside, glycosylated rubusoside, suaviosides, glycosylated suaviosides, mogrosides, glycosylated mogrosides and sucralose, and wherein the MRP composition is present in the composition in a concentration ranging from ranging from 0.0001 wt % to 100 wt %, 0.0001 wt % to 75 wt %, 0.0001 wt % to 50 wt %, 0.0001 wt % to 25 wt %, 0.0001 wt % to 10 wt %, 0.0001 wt % to 5 wt %, 0.0001 wt % to 1 wt %, 0.0001 wt % to 1 wt %, 0.0001 wt % to 0.5 wt %, 0.0001 wt % to 0.2 wt %, 0.0001 wt % to 0.05 wt %, 0.0001 wt % to 0.01 wt %, 0.0001 wt % to 0.005 wt %, or any range derived from these values.

2. The composition of paragraph 1, wherein the composition is a sweetener composition and wherein the MRP composition is present in a concentration ranging from 0.1-100 wt %, 0.1 wt % to 75 wt %, 0.1 wt % to 50 wt %, 0.1 wt % to 25 wt %, 0.1 wt % to 10 wt %, 0.1 wt % to 5 wt %, 0.1 wt % to 1 wt %, 0.1 wt % to 1 wt %, 0.1 wt % to 0.5 wt %, or any range derived from these values.

3. The composition of paragraph 1, wherein the composition is a food product and wherein the MRP composition is present in a concentration ranging from 0.001 wt % to 1 wt %, 0.001 wt % to 0.5 wt %, 0.001 wt % to 0.2 wt %, 0.001 wt % to 0.005 wt %, or any range derived from these values.

4. The composition of paragraph 1 or 2, wherein the composition is a bakery product and wherein the MRP composition is present in a concentration ranging from 0.0001 wt % to 1 wt %, 0.0001 wt % to 0.5 wt %, 0.0001 wt % to 0.2 wt %, 0.0001 wt % to 0.05 wt %, 0.0001 wt % to 0.01 wt %, 0.0001 wt % to 0.0005 wt %, or any range derived from these values.

5. The composition of paragraph 1 or 2, wherein the composition is a dairy product and wherein the MRP composition is present in a concentration ranging from 0.0001 wt % to 1 wt %, 0.0001 wt % to 0.5 wt %, 0.0001 wt % to 0.2 wt %, 0.0001 wt % to 0.05 wt %, 0.0001 wt % to 0.01 wt %, 0.0001 wt % to 0.0005 wt %, or any range derived from these values.

6. The composition of paragraph 1, wherein the reaction mixture further comprises thaumatin, or NHDC, or both.

7. The composition of paragraph 1, wherein the one or more amine donors consist of thaumatin.

8. The composition of paragraph 1, wherein the one or more amine donors comprise an amino acid and thaumatin.

9. The composition of any one of paragraphs 1, 6, 7, or 8, further comprising one or more sweetening agents selected from the group consisting of sorbitol, xylitol, mannitol, sucralose, aspartame, acesulfame-K, neotame, erythritol, trehalose, raffinose, cellobiose, tagatose, allulose, inulin, N—[N-[3-(3-hydroxy-4-methoxyphenyl)propyl]-alpha-aspartyl]-L-phenylalanine 1-methyl ester, glycyrrhizin, sodium cyclamate, brazzein, miraculin, curculin, pentadin, mabinlin, thaumatin, neohesperidin dihydrochalcone (NHDC), maltol, ethyl maltol and advantame.

10. The composition of paragraph 1, wherein the amine donors comprise one or more of a primary amine compound, a secondary amine compound, an amino acid, a protein, a peptide, a yeast extract or mixtures thereof.

11. A beverage comprising:

a Maillard reaction product (MRP) composition formed from a reaction mixture comprising:

(A) a non-*Stevia* sweetening agent;

(B) a reducing sugar having a free carbonyl group; and (C) one or more amine donors having a free amino group; and wherein the non-*Stevia* sweetening agent is selected from the group consisting of sweet tea extracts, swingle extracts, glycosylated sweet tea extracts, glycosylated swingle extracts, glycosylated sweet tea glycosides, glycosylated mogrosides, glycyrrhizin, glycosylated glycyrrhizin, rubusoside, glycosylated rubusoside, suaviosides, glycosylated suaviosides, mogrosides, glycosylated mogrosides and sucralose, wherein the MRP composition is present in the the beverage in a final concentration range of 1 ppm to 15,000 ppm, 1 ppm to 10,000 ppm, 1 ppm to 5,000 ppm, 1 ppm to 2,000 ppm, 1 ppm to 1,000 ppm, 1 ppm to 500 ppm, 1 ppm to 400 ppm, 1 ppm to 300 ppm, 1 ppm to 200 ppm, 1 ppm to 100 ppm, 1 ppm to 80 ppm, 1 ppm to 50 ppm, 1 ppm to 25 ppm, 1 ppm to 10 ppm, or 1 ppm to 5 ppm.

12. The beverage of paragraph 11, wherein the MRP composition is present in a concentration ranging from 10 ppm to 10,000 ppm, 20 ppm to 5,000 ppm, 30 ppm to 2,000 ppm, 40 ppm to 1,000 ppm, 50 ppm to 500 ppm, 75 ppm to 300 ppm, or 100 ppm to 200 ppm.

13. The beverage of paragraph 11, wherein the reaction mixture further comprises thaumatin, or NHDC, or both.

14. The beverage of paragraph 11, wherein the one or more amine donors consist of thaumatin.

15. The beverage of paragraph 11, wherein the one or more amine donors comprise an amino acid and thaumatin.

16. The beverage of any one of paragraphs 11-15, further comprising a sweetening agent selected from the group consisting of sorbitol, xylitol, mannitol, sucralose, aspartame, acesulfame-K, neotame, erythritol, trehalose, raffinose, cellobiose, tagatose, allulose, inulin, N [N-[3-(3-hydroxy-4-methoxyphenyl)propyl]-alpha-aspartyl]-L-phenylalanine 1-methyl ester, glycyrrhizin, sodium cyclamate, brazzein, miraculin, curculin, pentadin, mabinlin, thaumatin, neohesperidin dihydrochalcone (NHDC), maltol, ethyl maltol and advantame.

17. The beverage of any one of paragraphs 11-16, wherein the beverage does not contain any product made from roasted coffee beans.

18. The beverage of any one of paragraphs 11-16, wherein the beverage further comprises a product from roasted coffee beans and wherein the added MRP composition is not made from roasted coffee beans.

19. The beverage of any one of paragraphs 11-16, wherein the beverage is a carbonated soft beverage or a flavored water.

20. The beverage of any one of paragraphs 11-16, wherein the beverage is a fruit juice or a beverage comprising a fruit juice.

Additional Embodiments, Set 100

1. A method for improving the taste profile of a beverage, comprising the steps of:

adding an S-MRP composition to the beverage, wherein the S-MRP composition is produced by:

(1) heating a reaction mixture comprising (a) a steviol glycoside (SG) containing composition and one or more amine donors comprising a free amino group; or (2) heating a reaction mixture comprising (a) an SG-containing composition, (b) one or more amine donors comprising a free amino group, and (c) one or more reducing sugars comprising a free carbonyl group.

2. The method of paragraph 1, wherein the MRP composition is added to the beverage at a final concentration range of 1 ppm to 15,000 ppm, 1 ppm to 10,000 ppm, 1 ppm to 5,000 ppm, 1 ppm to 2,000 ppm, 1 ppm to 1,000 ppm, 1 ppm to 500 ppm, 1 ppm to 400 ppm, 1 ppm to 300 ppm, 1 ppm to 200 ppm, 1 ppm to 100 ppm, 1 ppm to 80 ppm, 1 ppm to 50 ppm, 1 ppm to 25 ppm, 1 ppm to 10 ppm, 1 ppm to 5 ppm, or any range derived from these values.

3. The method of paragraph 1 or paragraph 2, wherein the one or more amine donors comprise thaumatin, or NHDC, or both 4. The method of any one of paragraphs 1-3, wherein the one or more amine donors comprise thaumatin and an amino acid.

5. The method of any one of paragraphs 1-4, further comprising the step of adding one or more sweeteners to the beverage, wherein the one or more sweeteners are added concurrently with, or separately from, the MRP composition.

6. The method of any one of paragraph 5, wherein the one or more sweeteners are selected from the group consisting of sweet tea extracts, *Stevia* extracts, swingle (mogroside) extracts, sweet tea glycosides, steviol glycosides mogrosides, glycosylated sweet tea glycosides, glycosylated steviol glycosides, glycosylated mogrosides, sorbitol, xylitol, mannitol, sucralose, aspartame, acesulfame-K, neotame, erythritol, trehalose, raffi nose, cellobiose, tagatose, inulin, N—[N-[3-(3-hydroxy-4-methoxyphenyl)propyl]-alpha-aspartyl]-L-phenylalanine 1-methyl ester, glycyrrhizin, sodium cyclamate, brazzein, miraculin, curculin, pentadin, mabinlin, thaumatin, neohesperidin dihydrochalcone (NHDC), naringin dihydrochalcone, maltol, ethyl maltol and advantame.

7. The method of any one of paragraph 6, wherein the one or more sweeteners comprise thaumatin, or NIIDC, or both.

8. The method of any one of paragraphs 1-7, wherein the beverage does not contain any product made from roasted coffee beans.

9. The method of any one of paragraphs 1-8, wherein the MRP composition does not contain any product made from roasted coffee beans.

10. The method of any one of paragraphs 1-9, wherein the MRP composition has a citrus or tangerine flavor.

11. The method of any one of paragraphs claim 1-10, wherein the beverage is a carbonated soft beverage, a flavored water, a fruit juice or a beverage comprising a fruit juice.

12. A method for improving the taste profile of a beverage, comprising the steps of:

adding a Maillard reaction product (MRP) composition to the beverage, wherein the MRP composition is produced byheating a reaction mixture comprising:

(a) one or more amine donors comprising a free amino group; and (b) one or more reducing sugars comprising a free carbonyl group.

13. The method of paragraph 12, wherein the MRP composition is added to the beverage at a final concentration range of 1 ppm to 15,000 ppm, 1 ppm to 10,000 ppm, 1 ppm to 5,000 ppm, 1 ppm to 2,000 ppm, 1 ppm to 1,000 ppm, 1 ppm to 500 ppm, 1 ppm to 400 ppm, 1 ppm to 300 ppm, 1 ppm to 200 ppm, 1 ppm to 100 ppm, 1 ppm to 80 ppm, 1 ppm to 50 ppm, 1 ppm to 25 ppm, 1 ppm to 10 ppm, 1 ppm to 5 ppm, or any range derived by these values.

14. The method of paragraphs 12 or 13, wherein the one or more amine donors comprise thaumatin.

15. The method of any one of paragraphs 12-14, wherein the one or more amine donors comprise thaumatin and an amino acid.

16. The method of any one of paragraphs 12-15, further comprising the step of adding one or more sweeteners to the beverage, wherein the one or more sweeteners are added concurrently with, or separately from, the MRP composition.

17. The method of any one of paragraphs 16, wherein the one or more sweeteners are selected from the group consisting of sweet tea extracts, *Stevia* extracts, swingle (mogroside) extracts, sweet tea glycosides, steviol glycosides mogrosides, glycosylated sweet tea glycosides, glycosylated steviol glycosides, glycosylated mogrosides, sorbitol, xylitol, mannitol, sucralose, aspartame, acesulfame-K, neotame, erythritol, trehalose, raffinose, cellobiose, tagatose, allulose, inulin, N—[N-[3-(3-hydroxy-4-methoxyphenyl)propyl]-alpha-aspartyl]-L-phenylalanine 1-methyl ester, glycyrrhizin, sodium cyclamate, brazzein, miraculin, curculin, pentadin, mabinlin, thaumatin, neohesperidin dihydrochalcone (NHDC), naringin dihydrochalcone, maltol, ethyl maltol and advantame, 18. The method of paragraphs 16 or 17, wherein the one or more sweeteners comprise thaumatin, or NHDC, or both.

19. The method of any one of paragraphs 12-18, wherein the beverage does not contain any product made from roasted coffee beans.

20. The method of any one of paragraphs 12-18, wherein the beverage further comprises a product from roasted coffee beans and wherein the added MRP composition is not made from roasted coffee beans.

21. The method of any one of paragraphs 12-20, wherein the MRP composition has a citrus or tangerine flavor.

22. The method of any one of paragraphs 12-20, wherein the beverage is a carbonated soft beverage, a flavored water, a fruit juice, or a beverage comprising a fruit juice.

Additional Embodiments, Set 101

1. A method for improving the taste profile of a beverage, comprising the steps of:

(1) adding a Maillard reaction product (MRP) composition to the beverage, wherein the MRP composition is produced by heating a reaction mixture for a period of time sufficient to initiate a Maillard reaction, wherein the reaction mixtures comprises: (A) one or more reducing sugars comprising a free carbonyl group, and (B) one or more amine donors comprising a free amino group at a temperature; and (2) adding a sweetener composition to the beverage to produce a final product, wherein the sweetener composition comprises one or more *Stevia*-related components selected from the group consisting of *Stevia* extracts, glycosylated *Stevia* extracts, steviol glycosides, and glycosylated steviol glycosides to produce a final product, wherein the MRP composition is present in the final product at a concentration range of 0.1 ppm to 15,000 ppm, 1 ppm to 15,000 ppm, 1 ppm to 10,000 ppm, 1 ppm to 5,000 ppm, 1 ppm to 2,000 ppm, 1 ppm to 1,000 ppm, 1 ppm to 500 ppm, 1 ppm to 400 ppm, 1 ppm to 300 ppm, 1 ppm to 200 ppm, 1 ppm to 100 ppm, 1 ppm to 80 ppm, 1 ppm to 50 ppm, 1 ppm to 25 ppm, 1 ppm to 10 ppm, 1 ppm to 5 ppm, or any range derived from these values.

2. The method of paragraph 1, wherein the one or more amine donors comprise thaumatin.

3. The method of paragraph 1, wherein the one or more amine donors comprise an amino acid and thaumatin.

4. The method of any one of paragraphs 1-3, wherein the sweetener composition comprises one or more sweeteners selected from the group consisting of sorbitol, xylitol, mannitol, sucralose, aspartame, acesulfatne-K, neotame, erythritol, trehalose, raffinose, cellobiose, tagatose, allulose, inulin, N—[N-[3-(3-hydroxy-4-methoxyphenyl)propyl]-alpha-asparttyl]-L-phenylalanine 1-methyl ester, glycyrrhizin, sodium cyclamate, brazzein, miraculin, curculin, pentadin, mabinlin, thaumatin, neohesperi din dihydrochalcone (NHDC), maltol, ethyl maltol and advantame.

5. The method of any one of paragraphs 1-4, wherein the reaction mixture comprises thaumatin, or NHDC, or both.

6. The method of any one of paragraphs 1-4, wherein the MRP composition has a. citrus or tangerine flavor.

7. The method of any one of paragraphs 1-4, wherein the final product does not contain any product made from roasted coffee beans.

8. The method of any one of paragraphs 1-4, wherein the beverage further comprises a product from roasted coffee beans and wherein the added MRP composition is not made from roasted coffee beans.

9. The method of any one of paragraphs 1-4, wherein the beverage is a carbonated soft beverage or a flavored water.

10. The method of any one of paragraphs 1-4, wherein the beverage is a fruit juice or a beverage comprising a fruit juice.

11. The method of any one of paragraphs 1-4, further comprising the step of adding thaumatin, or NHDC, or both thaumatin and NHDC, to the beverage.

12. A method for improving the taste profile of a bakery product, comprising:

(1) preparing a dough comprising:

(A) a first component comprising a Maillard reaction product (MRP) composition formed from a reaction mixture comprising:

(i) one or more reducing sugars having a free carbonyl group, and (ii) one or more amine donors having a free amino group; and (B) a second component comprising one or more *Stevia*-related components selected from the group consisting of *Stevia* extracts, glycosylated *Stevia* extracts, steviol glycosides, and glycosylated steviol glycosides, wherein the MRP composition is present in the dough in a concentration ranging from 0.001 wt % to 20 wt %, 0.005 wt % to 10 wt %, 0.01 wt % to 5 wt %, 0.05 wt % to 2 wt %, 0.1 wt % to 1 wt %, or any range derived from these values, and (2) baking the dough to produce the bakery product.

13. The method of paragraph 12, wherein the one or more amine donors comprise thaumatin.

14. The method of paragraph 12, wherein the one or more amine donors comprise an amino acid and thaumatin.

15. The method of any one of paragraphs 12-14, wherein the dough further comprises one or more sweeteners selected from the group consisting of sorbitol, xylitol, mannitol, sucralose, aspartame, acesulfame-K, neotame, erythritol, trehalose, raffinose, cellobiose, tagatose, allulose, inulin, N—[N-[3-(3-hydroxy-4-methoxyphenyl)propyl]-alpha-aspartyl]-L-phenylalanine 1-methyl ester, glycyrrhizin, sodium cyclamate, brazzein, miraculin, curculin, pentadin, mabinlin, thaumatin, neohesperidin dihydrochalcone (NHDC), maltol, ethyl maltol and advantame.

16. The method of any one of paragraphs 12-15, wherein the first and second components are present in the dough in a total concentration ranging from 0.01 wt % to 10 wt %, 0.01 wt % to 5 wt %, 0.01 wt % to 2 wt %, 0.01 wt % to 0.5 wt %, 0.01 wt % to 0.1 wt %, 0.001 wt % to 0.005 wt %, or any range derived from these values.

17. The method of any one of paragraphs 12-15, wherein the first component is present in the dough in an amount in the range of 0.0001 wt % to 5 wt %, 0.0001 wt % to 2 wt %, 0.0001 to 1 wt %, 0.0001 to 0.5 wt %, 0.0001 wt % to 0.1 wt %, 0.0001 wt % to 0.02 wt %, 0.0001 wt to 0.005 wt %, or any range derived from these values.

18. The method of any one of paragraphs 12-15, wherein the first component is present in the dough in an 1 amount in the range of 0.001-5 wt %, 0.001 wt % to 2 wt %, 0.001 to 1 wt %, 0.001 to 0.5 wt %, 0.001 wt % to 0.1 wt %, 0.001 wt % to 0.02 wt %, 0.001 wt % to 0.005 wt %, or any range derived from these values.

19. The method of paragraph 12, wherein the reaction mixture comprises thaumatin, or NHDC, or both.

20. The method of paragraph 12, wherein the amine donors comprise one or more of a primary amine compound, a secondary amine compound, an amino acid, a protein, a peptide, a yeast extract or mixtures thereof.

21. The method of paragraph 12, wherein the one or more reducing sugars comprise a monosaccharide, a disaccharide, an oligosaccharide, an polysaccharide, or a combination thereof.

22. The method of any one of paragraphs 12, 19, or 20, wherein the dough further comprises a sweetener selected from the group consisting of sweet tea extracts, swingle extracts, sweet tea glycosides, mogrosides, glycosylated sweet tea glycosides, and glycosylated mogrosides.

Additional Embodiments, Set 102

1. A method for improving the taste or mouth feel of a food product, comprising:

adding a Maillard reaction product (MRP) composition during preparation of the food product to produce a final product, wherein the MRP composition is produced by (1) heating a reaction mixture comprising (a) an steviol glycoside (SG)-containing composition and (b) one or more amine donors comprising a free amino group; or (2) heating a reaction mixture comprising (a) an SG-containing composition, (b) one or more amine donors comprising a free amino group, and (c) one or more reducing sugars comprising a free carbonyl group; or (3) heating a reaction mixture comprising (a) an SG-containing composition, (b) one or more amine donors comprising a free amino group, (c) one or more reducing sugars comprising a free carbonyl group, and (d) thaumatin.

2. The method of paragraph 1, wherein the one or more amine donors comprise thaumatin.

3. The method of paragraph 1, wherein the one or more amine donors comprise an amino acid and thaumatin.

4. The method of any one of paragraphs 1-3, further comprising the step of adding thaumatin to the food, wherein thaumatin is added concurrently with, or separately from, the MRP composition.

5. The method of any one of paragraphs 1-4, further comprising the step of adding one or more sweeteners during preparation of the food product, wherein the one or more sweeteners are added concurrently with, or separately from, the MRP composition.

6. The method of paragraph 5, wherein the one or more sweeteners are selected from the group consisting of sweet tea extracts, *Stevia* extracts, swingle (mogroside) extracts, sweet tea glycosides, steviol glycosides mogrosides, glycosylated sweet tea glycosides, glycosylated steviol glycosides, glycosylated mogrosides, sorbitol, xylitol, mannitol, sucralose, aspartame, acesulfame-K, neotame, erythritol, trehalose, raffinose, cellobiose, tagatose, allulose, inulin, N [N-[3-(3-hydroxy-4-methoxyphenyl)propyl]-alpha-aspartyl]-L-phenylalanine 1-methyl ester, glycyrrhizin, sodium cyclamate, brazzein, miraculin, curculin, pentadin, tnabinlin, thaumatin, neohesperidin dihydrochalcone (NHDC), maltol, ethyl maltol and advantame.

7. The method of any one of paragraphs 1-6, wherein the MRP composition is present in the final product in a concentration ranging from 0.0001 wt to 20 wt %, 0.0001 wt % to 10 wt %, 0.0001 wt to 5 wt %, 0.0001 wt % to 1 wt %, 0.0001 wt % to 1 wt %, 0.0001 wt % to 0.5 wt %, 0.0001 wt % to 0.2 wt %, 0.0001 wt % to 0.05 wt %, 0.0001 wt % to 0.01 wt %, 0.0001 wt % to 0.005 wt %, or any range derived from these values.

8. The method of paragraph 1, wherein the reaction mixture comprises thaumatin, or NHDC, or both.

9. The method of paragraph 1, further comprising the step of: adding thaumatin, or NHDC, or both, during preparation of the food product.

10. The method of any one of paragraphs 1-9, wherein the food product is a bakery product, 11. The method of any one of paragraphs 1-9, wherein the food product is a dairy product.

12. A method for improving the taste of mouth feel of a profile of a sweetener composition, comprising:

adding a Maillard reaction product (MRP) corrrposition to the sweetener composition to product a final product, wherein the MRP composition is produced by heating a reaction mixture comprising:

(a) one or more reducing sugars having a free carbonyl group; and (b) one or more amine donors having a free amino group, wherein the MRP composition is present in the final product in a concentration ranging from 0.0001 wt % to 10 wt %, 0.0001 wt % to 5 wt %, 0.0001 wt % to 1 wt %, 0.0001 wt % to 1 wt %, 0.0001 wt % to 0.5 wt %, 0.0001 wt % to 0.2 wt %, 0.0001 wt % to 0.05 wt %, 0.0001 wt % to 0.01 wt %, 0.0001 wt % to 0.005 wt %, or any range derived from these values.

13. The method of paragraph 12, wherein the one or more amine donors comprise thaumatin.

14. The method of paragraph 12, wherein the one or more amine donors comprise an amino acid and thaumatin.

15. The method of paragraph 12, wherein the reaction mixture comprises thaumatin, or NHDC, or both.

16. The method of any one of paragraphs 12-15, wherein the MRP composition is present in the final product in a concentration ranging from 0.001-5 wt %, 0.001 wt % to 2 wt %, 0.001 to 1 wt %, 0.001 to 0.5 wt %, 0.001 wt % to 0.1 wt %, 0.001 wt % to 0.02 wt %, 0.001 wt % to 0.005 wt %, or any range derived from these values.

17. The method of paragraph 12, wherein the amine donors comprise one or more of a primary amine compound, a secondary amine compound, an amino acid, a protein, a peptide, a yeast extract or mixtures thereof.

18. The method of paragraph 12, wherein the one or more reducing sugars comprise a monosaccharide, a disaccharide, an oligosaccharide, an polysaccharide, or a combination thereof.

19. The method of paragraph 12, wherein the sweetener comprises one or more components selected from a *Stevia* extract, a sweet tea extract, a swingle extract, a sweet tea glycoside, a mogrosides, a glycosylated steviol glycoside, a glycosylated sweet tea glycoside, a glycosylated mogroside, acesulfame K, Sucralose, sodium saccharin, Aspartame, or combinations thereof.

20. The method of paragraph 12, further comprising the step of: adding thaumatin, or NHDC, or both, during preparation of the sweetener.

Additional Embodiments, Set 103

1. A beverage comprising one or more sensory modifiers, wherein the sensory modifiers are preparable by the reaction of starting materials, wherein the starting materials comprise one or more steviol glycosides, one or more amine donors and optionally one or more reducing sugars.

2. The beverage of paragraph 1, wherein at least one steviol glycoside is a naturally occurring steviol glycoside.

3. The beverage of paragraphs 1 or 2, wherein at least one steviol glycoside is a glycosylated steviol glycoside.

4. The beverage of any one of paragraphs 1-3, wherein at least one amine donor is an amino acid.

5. The beverage of paragraph 4, wherein at least one amine donor is L-alanine, arginine, L-glutamic acid, L-lysine, L-phenylalanine, L-proline, L-threonine or L-valine.

6. The beverage of any one of paragraphs 1-5, wherein at least one amine donor is thaumatin.

7. The beverage of any one of paragraphs 1-6, wherein at least one amine donor is provided from a yeast extract.

8. The beverage of any one of paragraphs 1-7, wherein the one or more sensory modifiers are preparable by the reaction of the starting materials in a reaction mixture, wherein the reaction mixture comprises the starting materials, one or more reaction solvents and optionally one or more additional acids or bases.

9. The beverage of paragraph 8, wherein at least one reaction solvent is water.

10. The beverage of paragraphs 8 or 9, wherein the concentration of starting aterials constitutes from 1 wt % to 95 wt % of the reaction mixture.

11. The beverage of any one of paragraphs 8-10, wherein the one or more sensory modifiers are preparable by the steps of (i) reacting the starting materials in the reaction mixture; and (ii) removing the one or more reaction solvents from the reaction mixture to afford the one or more sensory modifiers.

12. The beverage of paragraph 11, wherein the one or more reaction solvents are removed by spray drying the reaction mixture.

13. The beverage of any one of paragraphs 1-12, wherein the one or more sensory modifiers are preparable by the reaction of the starting materials at a temperature of from 60 to 150° C., for a reaction period of from 30 minutes to 24 hours.

14. The beverage of any one of paragraphs 1-13, wherein the starting materials comprise one or more steviol glycosides and one or more amine donors, but substantially no reducing sugars.

15. The beverage of paragraph 14, wherein the ratio of the total amount of the one or more steviol glycosides to the total amount of the one or more amine donors in the starting materials is from 99:1 to 4:1 by weight.

16. The beverage of any one of paragraphs 1-13, wherein the starting materials comprise one or more steviol glycosides, one or more amine donors and one or more reducing sugars.

17. The beverage of paragraph 16, wherein at least one reducing sugar is a monosaccharide or a disaccharide.

18. The beverage of paragraph 16 or 17, wherein the one or more reducing sugars are selected from the group consisting of D-xylose, D-glucose, D-mannose, D-galactose, rhamnose and lactose.

19. The beverage of any one of paragraphs 16-18, wherein the ratio of the total amount of the one or more steviol glycosides to the total combined amount of the one or more amine donors and the one or more reducing sugars in the starting materials is from 90:10 to 20:80 by weight.

20. The beverage of any one of paragraphs 16-19, wherein the ratio of the total amount of the one or more reducing sugars to the total amount of the one or more amine donors in the starting materials is from 90:10 to 10:90 by weight.

21. The beverage of any one of paragraphs 1-20, wherein the one or more sensory modifiers have a citrus or tangerine flavor.

22. The beverage of any one of paragraphs 1-21, wherein the total amount of the one or more sensory modifiers constitutes from 0.0001 to 1.5 wt. % of the beverage.

23. The beverage of any one of paragraphs 1-22, wherein the beverage further comprises one or more co-sweeteners, sweetener enhancers and/or non-sweetening drink additives.

24. The beverage of paragraph 3, wherein the beverage comprises one or more sweetener enhancers.

25. The beverage of paragraph 24, wherein the beverage comprises thaumatin.

26, The beverage of any one of paragraphs 23-25, wherein the beverage comprises one or more co-sweeteners.

27. The beverage of paragraph 26, wherein at least one co-sweetener is a high intensity natural sweetener.

28. The beverage of paragraph 27, wherein at least one co-sweetener is a steviol glycoside, such as a naturally occurring steviol glycoside or a glycosylated steviol glycoside.

29. The beverage of any one of paragraphs 26-28, wherein at least one co-sweetener is a high intensity synthetic sweetener.

30. The beverage of any one of paragraphs 26-28, wherein at least one co-sweetener is selected from the group consisting of sorbitol, xylitol, mannitol, sucralose, aspartame, acesulfame-K, neotame, erythritol, trehalose, raffinose, cellobiose, tagatose, allulose, inulin, N [N-[3-(3-hydroxy-4-methoxyphenyl)propyl]-alpha-aspartyl]-L-phenylalanine 1-methyl ester, glycyrrhizin, sodium cyclamate, brazzein, miraculin, curculin, pentadin, mabinlin, thaumatin, neohesperidin dihydrochaicone (NHDC), maltol, ethyl maltol and advantame, 31. The beverage of any one of paragraphs 26-30, wherein the ratio of the total amount of the one or more sensory modifiers to the total amount of the one or more co-sweeteners is from 1:99 to 99:1 by weight.

32. A beverage comprising:

(i) one or more sensory modifiers preparable by the reaction of starting materials, wherein the starting materials comprise one or more amine donors and one or more reducing sugars; and (ii) one or more steviol glycosides.

33. The beverage of paragraph 32, wherein at least one reducing sugar is a monosaccharide or a disaccharide.

34. The beverage of paragraph 32 or 33, wherein the one or more reducing sugars are selected from the group consisting of D-xylose, D-glucose, D-mannose, D-galactose, L-rhamnose and lactose.

35. The beverage of any one of paragraphs 32-34, wherein the ratio of the total amount of the one or more reducing sugars to the total amount of the one or more amine donors in the starting materials is from 75:25 to 50:50 by weight.

36. The beverage of any one of paragraphs 32-35, wherein at least one amine donor is thaumatin.

37. The beverage of any one of paragraphs 32-35, wherein at least one amine donor is an amino acid.

38. The beverage of paragraph 37, at least one amine donor is thaumatin.

39. The beverage of paragraph 37 or 38, wherein at least one amine donor is L-alanine, L-arginine, L-glutamic acid, L-lysine, L-phenylalanine, L-proline or L-valine.

40. The beverage of any one of paragraphs 32-39, wherein the one or more sensory modifiers are preparable by the reaction of the starting materials in a reaction mixture, wherein the reaction mixture comprises the starting materials, one or more reaction solvents and optionally one or more additional acids or bases.

41. The beverage of paragraph 40, wherein at least one reaction solvent is water.

42. The beverage of paragraph 40 or 41, wherein the total amount of the starting materials constitutes from 1 wt. % to 95 wt. % of the reaction mixture.

43. The beverage of any one of paragraphs 40-42, wherein the one or more sensory modifiers are preparable by the steps of (i) reacting the starting materials in the reaction mixture; and (ii) removing the one or more reaction solvents from the reaction mixture to afford the one or more sensory modifiers.

44. The beverage of paragraph 43, wherein the one or more reaction solvents are removed by spray drying the reaction mixture.

45. The beverage of any one of paragraphs 32-44, wherein the one or more sensory modifiers are preparable by the reaction of the starting materials at a temperature of from 60 to 150° C., for a reaction period of from 30 minutes to 24 hours.

46. The beverage of any one of paragraphs 32-45, wherein the one or more sensory modifiers have a citrus or tangerine flavor.

47. The beverage of any one of paragraphs 32-46, wherein the total amount of the one or more sensory modifiers constitutes from 0.0001 to 1.5 wt. % of the beverage.

48. The beverage of any one of paragraphs 32-47, wherein the beverage further comprises one or more co-sweeteners, sweetener enhancers and/or non-sweetening drink additives.

49. The beverage of paragraph 48, wherein the beverage comprises one or more sweetener enhancers.

50. The beverage of paragraph 49, wherein the beverage comprises thaumatin.

51. The beverage of any one of paragraphs 32-50, wherein the beverage comprises one or more co-sweeteners.

52. The beverage of paragraph 51, wherein at least one co-sweetener is a high intensity synthetic sweetener.

53. The beverage of paragraph 51 or 52, wherein at least one co-sweetener is selected from the group consisting of sorbitol, xylitol, mannitol, sucralose, aspartame, acesulfame-K, neotame, erythritol, trehalose, raffinose, cellobiose, tagatose, allulose, inulin, N—[N-[3-(3-hydroxy-4-methoxyphenyl)propyl]alpha-aspartyl]-L-phenyl alanine 1-methyl ester, glycyrrhizin, sodium cyclamate, brazzein, miraculin, curculin, pentadin, mabinlin, thaumatin, neohesperidin dihydrochalcone (NHDC), maltol, ethyl maltol and advantame.

54. The beverage of any one of paragraphs 1-53, wherein the beverage does not contain any product made from roasted coffee beans.

55. The beverage of any one of paragraphs 1-54, wherein the beverage is a carbonated soft beverage.

56. The beverage of any one of paragraphs 1-54, wherein the beverage is a flavored water.

57. The beverage of any one of paragraphs 1-54, wherein the beverage is a fruit juice or a beverage comprising a fruit juice.

58. The beverage of any one of paragraphs 1-54, wherein the beverage is a dietary beverage or a beverage comprising a dairy product.

Additional Embodiments, Set 104

1. A product preparable by the reaction of starting materials, wherein the starting materials comprise one or more sweeteners, one or more amine donors and optionally one or more reducing sugars.

2. A product of paragraph 1, wherein at least one sweetener is a non-sugar sweetener.

3. A product of paragraphs 1 or 2, wherein at least one sweetener is a terpenoid sweetener or a terpenoid glycoside sweetener.

4. A product of paragraph 3, wherein at least one sweetener is a steviol glycoside, a sweet tea glycoside or a mogroside.

5. A product of paragraph 4, wherein at least one sweetener is a steviol glycoside.

6. A product of paragraph 3, wherein at least one sweetener is a sweet tea glycoside, a mogroside or glycyrrhizin.

7. A product of any one of paragraphs 3 to 6, wherein at least one sweetener is a naturally occurring terpenoid glycoside sweetener.

8. A product of any one of paragraphs 3 to 7, wherein at least one sweetener is a glycosylated terpenoid glycoside sweetener.

9. A product of paragraphs 1 or 2, wherein at least one sweetener is sucralose,

10. A product of any one of paragraphs 1 to 9, wherein at least one amine donor is an amino acid.

11, A product of paragraph 10, wherein at least one amine donor is L-alanine, L-arginine, L-glutamic acid, L-lysine, L-phenylalanine, L-proline, L-threonine or L-valine.

12. A product of anyone of paragraphs 1 to 11, wherein at least one amine donor is thaumatin.

13. A product of anyone of paragraphs 1 to 12, wherein at least one amine donor is provided in the form of a yeast extract.

14. A product of any one of paragraphs 1 to 13, wherein the product is preparable by the reaction of the starting materials in a reaction mixture, wherein the reaction mixture comprises the starting materials, one or more solvents and optionally one or more additional acids or bases.

15. A product of paragraph 14, wherein at least one solvent is water.

16. A product of paragraphs 14 or 15, wherein the total amount of the starting materials constitutes from 1 wt. % to 95 wt. % of the reaction mixture.

17. A product of any one of paragraphs 14 to 16, wherein the product is preparable by the steps of (i) reacting the starting materials in the reaction mixture; and (ii) removing the one or more solvents from the reaction mixture to afford the product.

18. A product of paragraph 17, wherein the one or more solvents are removed by spray drying the reaction mixture.

19. A product of any one of paragraphs 1 to 18, wherein the product is preparable by the reaction of the starting materials at a temperature of from 60 to 150° C., for a reaction period of from 30 minutes to 24 hours.

20. A product of any one of paragraphs 1 to 19, wherein the product is a Maillard reaction product, or a mixture of Maillard reaction products.

21. A product of paragraph 20, wherein the product comprises at least one Amadori product.

22. A product of paragraphs 20 or 21, wherein the product comprises one or more non-volatile compounds.

23. A product of any one of paragraphs 1 to 22, wherein the starting materials comprise one or more sweeteners and one or more amine donors, but substantially no reducing sugars.

24. A product of paragraph 23, wherein the ratio of the total amount of the one or more sweeteners to the total amount of the one or more amine donors in the starting materials is from 99:1 to 4.1 by weight.

25. A product of any one of paragraphs 1 to 22, wherein the starting materials comprise one or more sweeteners, one or more amine donors and one or more reducing sugars.

26. A product of paragraph 25, wherein at least one reducing sugar is a monosaccharide or a disaccharide.

27. A product of paragraphs 25 or 26, wherein the one or more reducing sugars are selected from the group consisting of D-xylose, D-glucose, D-mannose, D-galactose, L-rhamnose and lactose.

28. A product of any one of paragraphs 25 to 27, wherein the ratio of the total amount of the one or more sweeteners to the total combined amount of the one or more amine donors and the one or more reducing sugars in the starting materials is from 90:10 to 20:80 by weight.

29. A product of any one of paragraphs 25 to 28, wherein the ratio of the total amount of the one or more reducing sugars to the total amount of the one or more amine donors in the starting materials is from 90:10 to 10:90 by weight, 30. A method of preparing a product of any one of pragraphs 1 to 29, wherein the method comprises the step of reacting the starting materials to afford the product.

31. A method of paragraph 30, wherein the method is a method of increasing the taste and/or smell of the one or more sweeteners of the starting materials by preparing the product.

32, A method of paragraphs 30 or 31, wherein the method is a method of increasing the kokumi of the one or more sweeteners of the starting materials by preparing the product.

33. A method of paragraphs 31 or 32, wherein the product is a product of any one of paragraphs 25 to 29.

34. A method of paragraph 30, wherein the method is a method of reducing the aftertaste and/or the extent of taste lingering of the one or more sweeteners of the starting materials.

35. A method of paragraph 34, wherein the product is a product of paragraphs 23 or 24.

36. A food or beverage comprising one or more products of any one of pragraphs 1 to 29.

37. A food or beverage of paragraph 36, wherein the total amount of the one or more products constitutes from 0.0001 to 1.5 wt. % of the food or beverage.

38. A food or beverage precursor comprising one or more products of any one of paragraphs 1 to 29.

39. A food or beverage precursor of paragraph 38, wherein the total amount of the one or more products as claimed in any one of paragraphs 1 to 29 constitutes from 0.0001 to 15 wt. % of the precursor.

40. A food or beverage precursor of paragraphs 38 or 39, wherein the food or beverage precursor is suitable for transformation into a food or beverage by reconstitution and/or by heat treatment, optionally with mixing.

41. A method of modulating one or more sensory properties of a food or a beverage, wherein the method comprises the step of adding to the food, beverage, or food or beverage ingredients, one or more products of any one of paragraphs 1 to 29.

42. A method of paragraph 41, wherein the method is a method of sweetening the food or beverage.

43. A method of of paragraphs 41 or 42, wherein the method is a method of increasing the kokumi of the food or beverage.

44. A composition comprising one or more sweeteners, one or more amine donors and optionally one or more reducing sugars.

45. A composition of paragraph 44, wherein the composition comprises one or more sweeteners and one or more amine donors, but substantially no reducing sugars.

46. A composition of paragraph 45, wherein the composition is suitable for use as a blend of starting materials to manufacture the product of paragraphs 23 or 24.

47. A composition of paragraph 44, wherein the composition comprises one or more sweeteners, one or more amine donors and one or more reducing sugars.

48. A composition of paragraph 47, wherein the composition is suitable for use as a blend of starting materials to manufacture the product of any one of paragraphs 25 to 29.

49. A composition comprising one or more products of any one of paragraphs 1 to 29, and one or more additional components that are suitable for human consumption.

50. A composition of paragraph 49, wherein the composition is suitable for use as a sweetener or a flavouring agent.

51. A composition of paragraphs 49 or 50, wherein the total amount of the one or more products constitutes at least 1 wt. % of the composition.

52. A composition of any one of paragraphs 49 to 51, wherein the one or more additional components are selected from the group consisting of co-sweeteners, sweetener enhancers and non-sweetening food or drink additives.

53. A composition of paragraph 52, wherein the composition comprises one or more sweetener enhancers.

54. A composition of paragraph 53, wherein the composition comprises thaumatin.

55. A composition of any one of paragraphs 49 to 54, comprising one or more products of any one of paragraphs 25 to 29, and one or more co-sweeteners.

56. A composition of paragraph 55, wherein at least one co-sweetener is a terpenoid sweetener or a terpenoid glycoside sweetener.

57. A composition of paragraph 56, wherein at least one co-sweetener is a steviol glycoside, a sweet tea glycoside or a mogroside.

58. A composition of paragraphs 56 or 57, wherein at least one co-sweetener is a naturally occurring terpenoid glycoside sweetener.

59. A composition of any one of paragraphs 56 to 58, wherein at least one co-sweetener is a glycosylated terpenoid glycoside sweetener.

60. A composition of paragraph 55, wherein at least one co-sweetener is a high intensity synthetic sweetener.

61. A composition of any one of paragraphs 55 to 60, wherein the ratio of the total amount of the one or more products to the total amount of the one or more co-sweeteners is from 1:99 to 99:1 by weight.

62. A method of preparing a composition of any one of paragraphs 49 to 61, wherein the method comprises combining one or more products of any one of paragraphs 1 to 29, with one or more additional components that are suitable for human consumption.

63. A method of preparing a composition of any one of paragraphs 55 to 61, wherein the method comprises combining one or more products in any one of paragraphs 25 to 29, with one or more co-sweeteners.

64. A method of paragraph 63, wherein the method is a method of increasing the taste and/or smell of the one or more co-sweeteners.

65. A method of paragraphs 63 or 64, wherein the method is a method of increasing the kokumi of the one or more co-sweeteners.

66. A method of any one of paragraphs 63 to 65, wherein the method is a method of reducing the aftertaste and/or the extent of taste lingering of the one or more co-sweeteners.

67. A food or beverage comprising one or more compositions in any one of paragraphs 49 to 61.

68. A food or beverage of paragraph 67, wherein the total amount of the one or more compositions constitutes from 0.0001 to 10 wt. % of the food or beverage.

69. A food or beverage precursor comprising one or more compositions in any one of paragraphs 49 to 61.

70. A food or beverage precursor of paragraph 69, wherein the total amount of the one or more compositions of any one of paragraphs 49 to 61 constitutes from 0.0001 to 50 wt. % of the precursor.

71. A food or beverage precursor of paragraphs 69 or 70, wherein the food or beverage precursor is suitable for transformation into a food or beverage by reconstitution and/or by heat treatment, optionally with mixing.

72. A method of modulating one or more sensory properties of a food or a beverage, wherein the method comprises the step of adding to the food, beverage, or food or beverage ingredients, one or more compositions of any one of paragraphs 49 to 61.

73. A method of paragraph 72, wherein the method is a method of sweetening the food or beverage.

74. A method of paragraphs 72 or 73, wherein the method is a method of increasing the kokumi of the food or beverage.

75. A product preparable by the reaction of starting materials, wherein the starting materials comprise one or more amine donors and one or more reducing sugars.

76. A product of paragraph 75, wherein at least one reducing sugar is a monosaccharide or a disaccharide, 77. A product of paragraphs 75 or 76, wherein the one or more reducing sugars are selected from the group consisting of D-xylose, D-glucose, D-mannose, D-galactose, L-rhamnose and lactose.

78. A product of any one of paragraphs 75 to 77, wherein the ratio of the total amount of the one or more reducing sugars to the total amount of the one or more amine donors in the starting materials is from 75:25 to 50:50 by weight.

79. A product of any one of paragraphs 75 to 78, wherein at least one amine donor is an amino acid.

80. A product of paragraph 79, wherein at least one amine donor is L-alanine, L-arginine, L-glutamic acid, L-lysine, L-phenylalanine, L-proline or L-valine.

81. A product of any one of paragraphs 75 to 80, wherein the product is preparable by the reaction of the starting materials in a reaction mixture, wherein the reaction mixture comprises the starting materials, one or more solvents and optionally one or more additional acids or bases.

82, A product of paragraph 81, wherein at least one solvent is water.

83. A product of paragraphs 81 or 82, wherein the total amount of the starting materials constitutes from 1 wt. % to 95 wt. % of the reaction mixture.

84. A product of any one of paragraphs 81 to 83, wherein the product is preparable by the steps of (i) reacting the starting materials in the reaction mixture; and (ii) removing the one or more solvents from the reaction mixture to afford the product.

85. A product of paragraph 84, wherein the one or more solvents are removed by spray drying the reaction mixture.

86. A product of any one of paragraphs 75 to 85, wherein the product is preparable by the reaction of the starting materials at a temperature of from 60 to 150° C., for a reaction period of from 30 minutes to 24 hours.

87. A method of preparing a product of any one of paragraphs 75 to 86, wherein the method comprises the step of reacting the starting materials to afford the product.

88. A food or beverage comprising one or more products of any one of paragraphs 75 to 87.

89. A food or beverage of paragraph 88, wherein the total amount of the one or more products constitutes from 0.0001 to 1.0 wt. % of the food or beverage.

90. A food or beverage precursor comprising one or more products of any one of paragraphs 75 to 87.

91. A food or beverage precursor of paragraph 90, wherein the total amount of the one or more products of any one of paragraphs 75 to 87 constitutes from 0.0001 to 15 wt. % of the precursor.

92. A food or beverage precursor of paragraphs 90 or 91, wherein the food or beverage precursor is suitable for transformation into a food or beverage by reconstitution and/or by heat treatment, optionally with mixing.

93. A method of modulating one or more sensory properties of a food or a beverage, wherein the method comprises the step of adding to the food, beverage, or food or beverage ingredients, one or more products of any one of paragraphs 75 to 87.

94. A method of paragraph 93, wherein the method is a method of sweetening the food or beverage.

95. A method of paragraphs 93 or 94, wherein the method is a method of increasing the kokumi of the food or beverage.

96. A composition comprising one or more sweeteners and one or more products of any one of paragraphs 75 to 87.

97. A composition of paragraph 96, wherein at least one sweetener is a non-sugar sweetener.

98. A composition of paragraphs 96 or 97, wherein at least one sweetener is a terpenoid sweetener or a terpenoid glycoside sweetener.

99. A composition of paragraph 98, wherein at least one sweetener is a steviol glycoside, a sweet tea glycoside or a mogroside.

100. A composition of paragraphs 98 or 99, wherein at least one sweetener is a naturally occurring terpenoid glycoside sweetener.

101. A composition of any one of paragraphs 98 to 100, wherein at least one sweetener is a glycosylated terpenoid glycoside sweetener.

102. A composition of any one of paragraphs 96 or 97, wherein at least one sweetener is sucralose.

103. A composition of any one of paragraphs 96 to 102, wherein the ratio of the total amount of the one or more sweeteners to the total amount of the one or more products is from 100:1 to 1:10 by weight.

104. A composition of any one of paragraphs 96 to 103, wherein the composition further comprises one or more additional components that are suitable for human consumption.

105. A composition of paragraph 104, wherein the composition further comprises one or more sweetener enhancers.

106. A composition of paragraph 105, wherein the composition further comprises thaumatin.

107. A composition of any one of paragraphs 96 to 106, wherein the total amount of the one or more sweeteners and the one or more products constitutes at least 1 wt. % of the composition.

108. A composition of any one of paragraphs 96 to 107, wherein the composition is suitable for use as a sweetener or a flavouring agent.

109. A method of preparing a composition of any one of paragraphs 96 to 108, wherein the method comprises combining one or more sweeteners with one or more products of any one of paragraphs 75 to 87.

110. method of paragraph 109, wherein the method is a method of increasing the taste and/or smell of the one or more sweeteners by preparing the composition.

111. A method of paragraphs 109 or 110, wherein the method is a method of increasing the kokumi of the one or more sweeteners by preparing the composition.

112. A method of any one of paragraphs 109 to 111, wherein the method is a method of reducing the aftertaste and/or the extent of taste lingering of the one or more sweeteners of the starting materials.

113. A food or beverage comprising one or more compositions of any one of paragraphs 96 to 108.

114. A food or beverage of paragraph 113, wherein the total amount of the one or more compositions constitutes from constitutes from 0.0001 to 10 wt. % of the food or beverage.

115. A food or beverage precursor comprising one or more compositions of any one of paragraphs 96 to 108.

116. A food or beverage precursor of paragraph 115, wherein the total amount of the one or more compositions as claimed in any one of paragraphs 96 to 108 constitutes from 0.0001 to 50 wt. % of the precursor.

117. A food or beverage precursor of paragraphs 115 or 116, wherein the food or beverage precursor is suitable for transformation into a food or beverage by reconstitution and/or by heat treatment, optionally with mixing.

118. A method of modulating one or more sensory properties of a food or a beverage, wherein the method comprises the step of adding to the food, beverage, or food or beverage ingredients, one or more compositions of any one of paragraphs 96 to 107.

119. A method of paragraph 118, wherein the method is a method of sweetening the food or beverage.

120. A method of paragraphs 118 or 119, wherein the method is a method of increasing the kokumi of the food or beverage.

Additional Embodiments, Set 105

1. A food, beverage, or food or beverage precursor comprising one or more sensory modifiers, wherein the sensory modifiers are preparable by the reaction of starting materials, wherein the starting materials comprise one or more terpenoid glycoside sweeteners, one or more amine donors and optionally one or more reducing sugars, 2. A food, beverage, or food or beverage precursor of paragraph 1, wherein at least one terpenoid glycoside sweetener is a steviol glycoside.

3. A food, beverage, or food or beverage precursor of paragraph 2, wherein at least one steviol glycoside is a naturally occurring steviol glycoside.

4. A food, beverage, or food or beverage precursor of paragraphs 2 or 3, wherein at least one steviol glycoside is a glycosylated steviol glycoside.

5. A food, beverage, or food or beverage precursor of paragraph 1, wherein at least one terpenoid glycoside sweetener is a sweet tea glycoside, a mogroside or glycyrrhizin.

6. A food, beverage, or food or beverage precursor of any one of paragraphs 1 to 5, wherein at least one amine donor is an amino acid.

7. A food, beverage, or food or beverage precursor of paragraph 6, wherein at least one amine donor is L-alanine, L-arginine, L-glutamic acid, L-lysine, L-phenylalanine, L-proline, L-threonine or L-valine.

8. A food, beverage, or food or beverage precursor of any one of paragraphs 1 to 7, wherein at least one amine donor is thaumatin.

9. A food, beverage, or food or beverage precursor of any one of paragraphs 1 to 8, wherein at least one amine donor is provided in the form of a yeast extract.

10. A food, beverage, or food or beverage precursor of any one of paragraphs 1 to 9, wherein the one or more sensory modifiers are preparable by the reaction of the starting materials in a reaction mixture, wherein the reaction mixture comprises the starting materials, one or more solvents and optionally one or more additional acids or bases.

11. A food, beverage, or food or beverage precursor of paragraph 10, wherein at least one solvent is water.

12. A food, beverage, or food or beverage precursor of paragraphs 10 or 11, wherein the total amount of the starting materials constitutes from 1 wt. % to 95 wt. % of the reaction mixture.

13. A food, beverage, or food or beverage precursor of any one of paragraphs 10 to 12, wherein the one or more sensory modifiers are preparable by the steps of (i) reacting the starting materials in the reaction mixture; and (ii) removing the one or more solvents from the reaction mixture to afford the one or more sensory modifiers.

14. A food, beverage, or food or beverage precursor of paragraph 13, wherein the one or more solvents are removed by spray drying the reaction mixture.

15. A food, beverage, or food or beverage precursor of any one of paragraphs 1 to 14, wherein the one or more sensory modifiers are preparable by the reaction of the starting materials at a temperature of from 60 to 150° C., for a reaction period of from 30 minutes to 24 hours.

16. A food, beverage, or food or beverage precursor of any one of paragraphs 1 to 15, wherein one or more sensory modifiers are a Maillard reaction product, or a mixture of Maillard reaction products.

17. A food, beverage, or food or beverage precursor of paragraph 16, wherein the one or more sensory modifiers comprise at least one Amadori product.

18. A food, beverage, or food or beverage precursor of paragraphs 16 or 17, wherein the one or more sensory modifiers comprise one or more non-volatile compounds.

19. A food, beverage, or food or beverage precursor of any one of paragraphs 1 to 18, wherein the starting materials comprise one or more terpenoid glycoside sweeteners and one or more amine donors, but substantially no reducing sugars.

20. A food, beverage, or food or beverage precursor of paragraph 19, wherein the ratio of the total amount of the one or more terpenoid glycoside sweeteners to the total amount of the one or more amine donors in the starting materials is from 99:1 to 4:1 by weight.

21. A food, beverage, or food or beverage precursor of any one of paragraphs 1 to 18, wherein the starting materials comprise one or more terpenoid glycoside sweeteners, one or more amine donors and one or more reducing sugars.

22. A food, beverage, or food or beverage precursor of paragraph 21, wherein at least one reducing sugar is a monosaccharide or a disaccharide, 23. A food, beverage, or food or beverage precursor of paragraphs 21 or 22, wherein the one or more reducing sugars are selected from the group consisting of D-xylose, D-glucose, D-mannose, D-galactose, L-rhamnose and lactose.

24. A food, beverage, or food or beverage precursor of any one of paragraphs 21 to 23, wherein the ratio of the total amount of the one or more terpenoid glycoside sweeteners to the total combined amount of the one or more amine donors and the one or more reducing sugars in the starting materials is from 90:10 to 20:80 by weight.

25. A food, beverage, or food or beverage precursor of any one of paragraphs 21 to 24, wherein the ratio of the total amount of the one or more reducing sugars to the total amount of the one or more amine donors in the starting materials is from 90:10 to 10:90 by weight.

26. A food, beverage, or food or beverage precursor of any one of paragraphs 1 to 25, wherein the one or more sensory modifiers have a citrus or tangerine flavor.

27. A food, beverage, or food or beverage precursor of any one of paragraphs 1 to 26, wherein the food, beverage, or food or beverage precursor is a food or beverage, and wherein the total amount of the one or more sensory modifiers constitutes from 0.0001 to 1.5 wt. % of the food or beverage.

28. A food, beverage, or food or beverage precursor of any one of paragraphs 1 to 26, wherein the food, beverage, or food or beverage precursor is a food precursor or a beverage precursor, and wherein the total amount of the one or more sensory modifiers constitutes constitutes from 0.0001 to 15 wt. % of the precursor.

29. A food, beverage, or food or beverage precursor of any one of paragraphs 1 to 29, wherein the food, beverage, or food or beverage precursor further comprises one or more co-sweeteners, sweetener enhancers and/or non-sweetening drink additives, 30. A food, beverage, or food or beverage precursor of paragraph 29, wherein the food, beverage, or food or beverage precursor comprises one or more sweetener enhancers.

31. A food, beverage, or food or beverage precursor of paragraph 30, wherein the food, beverage, or food or beverage precursor comprises thaumatin.

32. A food, beverage, or food or beverage precursor of any one of paragraphs 29 to 31, wherein the food, beverage, or food or beverage precursor comprises one or more co-sweeteners.

33. A food, beverage, or food or beverage precursor of paragraph [004549], wherein at least one co-sweetener is a high intensity natural sweetener.

34. A food, beverage, or food or beverage precursor of paragraph 32 or 33, wherein at least one co-sweetener is a steviol glycoside, such as a naturally occurring steviol glycoside or a glycosylated steviol glycoside.

35. A food, beverage, or food or beverage precursor of any one of paragraphs 32 to 34, wherein at least one co-sweetener is a high intensity synthetic sweetener.

36. A food, beverage, or food or beverage precursor of any one of paragraphs 32 to 35, wherein at least one co-sweetener is selected from the group consisting of sorbitol, xylitol, mannitol, sucralose, aspartame, acesulfame-K, neotame, erythritol, trehalose, raffinose, cellobiose, tagatose, allulose, inulin, N—[N-[3-(3-hydroxy-4-methoxyphenyl) propyl]-alpha-aspartyl]-L-phenylalanine 1-methyl ester, glycyrrhizin, sodium cyclamate, brazzein, miraculin, curculin, pentadin, mabinlin, thaumatin, neohesperi din dihydrochalcone (NHDC), maltol, ethyl maltol and advantame.

37. A food, beverage, or food or beverage precursor of any one of paragraphs 32 to 36, wherein the ratio of the total amount of the one or more sensory modifiers to the total amount of the one or more co-sweeteners is from 1:99 to 99:1 by weight.

38. A food, beverage, or food or beverage precursor of any one of paragraphs 32 to 37, wherein the food, beverage, or food or beverage precursor is a food or beverage, and wherein the total amount of the one or more co-sweeteners constitutes from 0.001 to 10 wt. % of the food or beverage.

39. A food, beverage, or food or beverage precursor of any one of paragraphs 32 to 37, wherein the food, beverage, or food or beverage precursor is a food precursor or a beverage precursor, and wherein the total amount of the one or more co-sweeteners constitutes from 0.001 to 40 wt. % of the precursor.

40. A food, beverage, or food or beverage precursor comprising one or more sensory modifiers, wherein the sensory modifiers are preparable by the reaction of starting materials, wherein the starting materials comprise one or more amine donors and one or more reducing sugars.

41. A food, beverage, or food or beverage precursor of paragraph 40, wherein at least one reducing sugar is a monosaccharide or a disaccharide.

42. A food, beverage, or food or beverage precursor of paragraphs 40 or 41, wherein the one or more reducing sugars are selected from the group consisting of D-xylose, D-glucose, D-mannose, D-galactose, L-rhamnose and lactose.

43. A food, beverage, or food or beverage precursor of any one of paragraphs 40 to 42, wherein the ratio of the total amount of the one or more reducing sugars to the total amount of the one or more amine donors in the starting materials is from 75:25 to 50:50 by weight.

44. A food, beverage, or food or beverage precursor of any one of paragraphs 40 to 43, wherein at least one amine donor is thaumatin 45. A food, beverage, or food or beverage precursor of any one of paragraphs 40 to 43, wherein at least one amine donor is an amino acid.

46. A food, beverage, or food or beverage precursor of paragraph 45, wherein at least one amine donor is thaumatin.

47. A food, beverage, or food or beverage precursor of paragraphs 45 or 46, wherein at least one amine donor is L-alanine, L-arginine, L-glutamic acid, L-lysine, L-phenylalanine, L-proline or L-valine.

48. A food, beverage, or food or beverage precursor of any one of paragraphs 40 to 47, wherein the one or more sensory modifiers are preparable by the reaction of the starting materials in a reaction mixture, wherein the reaction mixture comprises the starting materials, one or more solvents and optionally one or more additional acids or bases.

49. A food, beverage, or food or beverage precursor of paragraph 48, wherein at least one solvent is water.

50. A food, beverage, or food or beverage precursor of paragraphs 48 or 49, wherein the total amount of the starting materials constitutes from 1 wt. % to 95 wt. % of the reaction mixture.

51. A food, beverage, or food or beverage precursor of any one of paragraphs 48 to 50, wherein the one or more sensory modifiers are preparable by the steps of (i) reacting the starting materials in the reaction mixture; and (ii) removing the one or more solvents from the reaction mixture to afford the one or more sensory modifiers.

52. A food, beverage, or food or beverage precursor of paragraph 51, wherein the one or more solvents are removed by spray drying the reaction mixture.

53, A food, beverage, or food or beverage precursor of any one of paragraphs 40 to 52, wherein the one or more sensory modifiers are preparable by the reaction of the starting materials at a temperature of from 60 to 150° C., for a reaction period of from 30 minutes to 24 hours.

54. A food, beverage, or food or beverage precursor of any one of paragraphs 40 to 53, wherein the one or more sensory modifiers have a citrus or tangerine flavor.

55. A food, beverage, or food or beverage precursor of any one of paragraphs 40 to 54, wherein the food, beverage, or food or beverage precursor is a food or beverage, and wherein the total amount of the one or more sensory modifiers constitutes from 0.0001 to 1.5 wt. % of the food or beverage.

56. A food, beverage, or food or beverage precursor of any one of paragraphs 40 to 54, wherein the food, beverage, or food or beverage precursor is a food precursor or a beverage precursor, and wherein the total amount of the one or more sensory modifiers constitutes constitutes from 0.0001 to 15 wt. % of the precursor.

57. A food, beverage, or food or beverage precursor of any one of paragraphs 40 to 55, wherein the food, beverage, or food or beverage precursor further comprises one or more co-sweeteners, sweetener enhancers and/or non-sweetening drink additives.

58. A food, beverage, or food or beverage precursor of paragraph 57, wherein the food, beverage, or food or beverage precursor comprises one or more sweetener enhancers.

59. A food, beverage, or food or beverage precursor of paragraph 58, wherein the food, beverage, or food or beverage precursor comprises thaumatin.

60. A food, beverage, or food or beverage precursor of any one of paragraphs 40 to 59, wherein the food, beverage, or food or beverage precursor comprises one or more co-sweeteners.

61. A food, beverage, or food or beverage precursor of paragraph 60, wherein at least one co-sweetener is a terpenoid glycoside sweetener.

62. A food, beverage, or food or beverage precursor of paragraph 61, wherein at least one co-sweetener is a steviol glycoside, such as a naturally occurring steviol glycoside or a glycosylated steviol glycoside.

63. A food, beverage, or food or beverage precursor of any one of paragraphs 60 to 62, wherein at least one co-sweetener is a high intensity synthetic sweetener.

64. A food, beverage, or food or beverage precursor of any one of paragraphs 60 to 63, wherein at least one co-sweetener is selected from the group consisting of sorbitol, mannito, sucralose, aspartame, acesulfame-K, neotame, erythritol, trehalose, raffinose, cellobiose, tagatose, allulose, inulin, N—[N-[3-(3-hydroxy-4-methoxyphenyl)propyl]-alpha-aspartyl]-L-phenylalanine 1-methyl ester, glycyrrhizin, sodium cyclamate, brazzein, miraculin, curculin, pentadin, mabinlin, thaumatin, neohesperidin dihydrochalcone (NHDC), maltol, ethyl maltol and advantame.

65. A food, beverage, or food or beverage precursor of any one of paragraphs 60 to 64, wherein the food, beverage, or food or beverage precursor is a food or beverage, and wherein the total amount of the one or more co-sweeteners constitutes from 0.001 to 10 wt. % of the food or beverage.

66. A food, beverage, or food or beverage precursor of any one of paragraphs 60 to 64, wherein the food, beverage, or food or beverage precursor is a food precursor or a beverage precursor, and wherein the total amount of the one or more co-sweeteners constitutes from 0.001 to 50 wt. % of the precursor.

67. A food, beverage, or food or beverage precursor of any one of paragraphs 1 to 66, wherein the food, beverage, or food or beverage precursor is a beverage.

68. A beverage of paragraph 67, wherein the beverage does not contain any product made from roasted coffee beans.

69. A beverage of paragraphs 67 or 68, wherein the beverage is a carbonated soft beverage.

70. A beverage of any one of paragraphs 67 to 69, wherein the beverage is a flavored water.

71. A beverage of any one of paragraphs 67 to 70, wherein the beverage is a fruit juice or a beverage comprising a fruit juice.

72. A beverage of paragraphs 67 or 68, wherein the beverage is a diary beverage or a beverage comprising a dairy product.

73. A food, beverage, or food or beverage precursor of any one of paragraphs 1 to 66, wherein the food, beverage, or food or beverage precursor is a food.

74. A food of paragraph 73, wherein the food is a bakery product.

75. A food of paragraph 73, wherein the food is a biscuit or a cake.

76. A food, beverage, or food or beverage precursor of any one of paragraphs 1 to 66, wherein the food, beverage, or food or beverage precursor is a food or beverage, and wherein the food or beverage is a dairy product.

77. A food, beverage, or food or beverage precursor of any one of paragraphs 1 to 76, wherein the food, beverage, or food or beverage precursor is a food precursor or a beverage precursor.

78. A food precursor or a beverage precursor of paragraph 77, wherein the food or beverage precursor is suitable for transformation into a food or beverage by reconstitution and/or by heat treatment, optionally with mixing.

79. A food precursor or a beverage precursor of paragraphs 77 or 78, wherein the food or beverage precursor is a beverage precursor.

80. A beverage precursor of paragraph 79, wherein the beverage precursor is a powdered or granulated drink, or a syrup or concentrate.

81. A food precursor or a beverage precursor of paragraphs 77 or 78, wherein the food or beverage precursor is a food precursor.

82. A food precursor of paragraph 81, wherein the food or beverage precursor is a dough.

83. A food precursor of paragraph 81, wherein the food or beverage precursor is a biscuit mix or a cake mix.

84. A sealed container comprising a food, beverage, or food or beverage precursor of any one of paragraphs 1 to 83, wherein the food, beverage, or food or beverage precursor is sealed within the sealed container.

85. A method of making a bakery product, the method comprising the baking of a dough of paragraph 82 into a bakery product.

86. A bakery product preparable by the method of paragraph 85.

87. A method for improving the aste profile of a bakery product, wherein the method comprises the steps of:

(i) preparing a dough of paragraph 82; and (ii) baking the dough to produce the bakery product.

88. A method of making a biscuit or a cake, the method comprising the baking of a biscuit mix or a cake mix of paragraph 83 into a biscuit or a cake.

89. A biscuit or a cake preparable by the method of paragraph 88.

90. A method for improving the taste profile of a biscuit or a cake, wherein the method comprises the steps of:

(i) preparing a biscuit mix or cake mix of paragraph 83; and (ii) baking the biscuit mix or the cake mix to produce the biscuit or cake.

91. A method for improving the taste profile of a beverage, wherein the method comprises the step of adding to the beverage or beverage ingredients one or more sensory modifiers, wherein the sensory modifiers are preparable by the reaction of starting materials, wherein the starting materials comprise one or more terpenoid glycoside sweeteners, one or more amine donors and optionally one or more reducing sugars.

92. A method of paragraph 91, wherein at least one terpenoid glycoside sweetener is a steviol glycoside.

93. A method of paragraph 92, wherein at least one steviol glycoside is a naturally occurring steviol glycoside.

94. A method of paragraphs 92 or 93, wherein at least one steviol glycoside is a glycosylated steviol glycoside.

95. A method of paragraph 91, wherein at least one terpenoid glycoside sweetener is a sweet tea glycoside, a mogroside or glycyrrhizin.

96. A method of any one of paragraphs 91 to 95, wherein at least one amine donor is an amino acid.

97. A method of paragraph 96, wherein at least one amine donor is L-alanine, L-arginine, L-glutamic acid, L-lysine, L-phenylalanine, L-proline, L-threonine or L-valine.

98. A method of any one of paragraphs 91 to 97, wherein at least one amine donor is thaumatin.

99. A method of any one of paragraphs 91 to 98, wherein at least one amine donor is provided in the form of a yeast extract.

100. A method of any one of paragraphs 91 to 99, wherein the starting materials comprise one or more terpenoid glycoside sweeteners and one or more amine donors, but substantially no reducing sugars.

101. A method of paragraph 100, wherein the ratio of the total amount of the one or more terpenoid glycoside sweeteners to the total amount of the one or more amine donors in the starting materials is from 99:1 to 4:1 by weight.

102. A method of any one of paragraphs 91 to 99, wherein the starting materials comprise one or more terpenoid glycoside sweeteners, one or more amine donors and one or more reducing sugars.

103. A method of paragraph 103, wherein at least one reducing sugar is a monosaccharide or a disaccharide.

104. A method of paragraphs 102 or 103, wherein the one or more reducing sugars are selected from the group consisting of D-xylose, D-glucose, D-mannose, D-galactose, rhamnose and lactose.

105. A method of any one of paragraphs 102 to 104, wherein the ratio of the total amount of the one or more terpenoid glycoside sweeteners to the total combined amount of the one or more amine donors and the one or more reducing sugars in the starting materials is from 90:10 to 20:80 by weight.

106. A method of any one of paragraphs 102 to 105, wherein the ratio of the total amount of the one or more reducing sugars to the total amount of the one or more amine donors in the starting materials is from 90:10 to 10:90 by weight.

107. A method of any one of paragraphs 91 to 106, wherein the one or more sensory modifiers have a citrus or tangerine flavor.

108. A method of any one of paragraphs 91 to 107, wherein the one or more sensory modifiers are added in an amount such that the total amount of the one or more sensory modifiers constitutes from 0.0001 to 1.5 wt. % of the final beverage.

109. A method of any one of paragraphs 91 to 108, wherein method further comprises the step of adding one or more co-sweeteners, sweetener enhancers and/or non-sweetening drink additives to the beverage or beverage ingredients.

110. A method of paragraph 109, wherein the method comprises the step of adding one or more sweetener enhancers to the beverage or beverage ingredients.

111. A method of paragraph 110, wherein the method comprises the step of adding thaurnatin to the beverage or beverage ingredients.

112. A method of any one of paragraphs 109 to 111, wherein the method comprises the step of adding one or more co-sweeteners to the beverage or beverage ingredients.

113. A method of paragraph 112, wherein at least one co-sweetener is a high intensity natural sweetener.

114. A method of paragraphs 112 or 113, wherein at least one co-sweetener is a steviol glycoside, such as a naturally occurring steviol glycoside or a glycosylated steviol glycoside.

115. A method of any one of paragraphs 112 to 114, wherein at least one co-sweetener is a high intensity synthetic sweetener.

116. A method of any one of paragraphs 112 to 115, wherein at least one co-sweetener is selected from the group consisting of sorbitol, xylitol, mannitol, sucralose, aspartame, acesulfame-K, neotame, erythritol, trehalose, raffinose, cellobiose, tagatose, inulin, N—[N-[3-(3-hydroxy-4-methoxyphenyl)propyl]-alpha-aspartyl]-L-phenylalanine 1-methyl ester, glycyrrhizin, sodium cyclamate, brazzein, miraculin, curculin, pentadin, tnabinlin, thaumatin, neohesperidin dihydrochalcone (NHDC), maltol, ethyl maltol and advantame.

117. A method of any one of paragraphs 112 to 116, wherein the ratio of the total amount of the one or more sensory modifiers to the total amount of the one or more co-sweeteners in the final beverage is from 1:99 to 99:1 by weight.

118. A method of any one of paragraphs 112 to 117, wherein the one or more co-sweeteners are added in an amount such that the total amount of the one or more co-sweeteners constitutes from 0.001 to 10 wt. % of the final beverage.

119. A method for improving the taste profile of a beverage, wherein the method comprises the step of adding to the beverage or beverage ingredients one or more sensory modifiers, wherein the sensory modifiers are prepayable by the reaction of starting materials, wherein the starting materials comprise one or more amine donors and one or more reducing sugars.

120. A method of paragraph 119, wherein at least one reducing sugar is a monosaccharide or a disaccharide.

121. A method of paragraphs 119 or 120, wherein the one or more reducing sugars are selected from the group consisting of D-xylose, D-glucose, D-mannose, D-galactose, L-rhamnose and lactose.

122. A method of any one of paragraphs 119 to 121, wherein the ratio of the total amount of the one or more reducing sugars to the total amount of the one or more amine donors in the starting materials is from 75:25 to 50:50 by weight.

123. A method of any one of paragraphs 119 to 122, wherein at least one amine donor is thaumatin 124. A method of any one of paragraphs 119 to 123, wherein at least one amine donor is an amino acid.

125. A method of paragraph 124, wherein at least one amine donor is thaumatin.

126. A method of paragraphs 124 or 125, wherein at least one amine donor is L-alanine, L-arginine, L-glutamic acid, L-lysine, L-phenylalanine, L-proline or L-valine.

127. A method of any one of paragraphs 119 to 126, wherein the one or more sensory modifiers have a citrus or tangerine flavor.

128. A method of any one of paragraphs 119 to 127, wherein the one or more sensory modifiers are added in an amount such that the total amount of the one or more sensory modifiers constitutes from 0.0001 to 1.5 wt. % of the final beverage.

129. A method of any one of paragraphs 119 to 128, wherein method further comprises the step of adding one or more co-sweeteners, sweetener enhancers and/or non-sweetening drink additives to the beverage or beverage ingredients.

130. A method of paragraph 129, wherein the method comprises the step of adding one or more sweetener enhancers to the beverage or beverage ingredients.

131. A method of paragraph 130, wherein the method comprises the step of adding thaumatin to the beverage or beverage ingredients.

132. A method of any one of paragraphs 129 to 131, wherein the method comprises the step of adding one or more co-sweeteners to the beverage or beverage ingredients.

133. A method of paragraph 132 wherein at least one co-sweetener is a high intensity natural sweetener.

134. A method of paragraphs 132 or 133, wherein at least one co-sweetener is a steviol glycoside, such as a naturally occurring steviol glycoside or a glycosylated steviol glycoside.

135. A method of any one of paragraphs 132 to 134, wherein at least one co-sweetener is a high intensity synthetic sweetener.

136. A method of any one of paragraphs 132 to 135, wherein at least one co-sweetener is selected from the group consisting of sorbitol, xylitol, mannitol, sucralose, aspartame, acesulfame-K, neotame, erythritol, trehalose, raffinose, cellobiose, tagatose, allulose, inulin, N—[N-[3-(3-hydroxy-4-methoxyphenyl)propyl]-alpha-aspartyl]-L-phenylalanine 1-methyl ester, glycyrrhizin, sodium cyclamate, brazzein, miraculin, curculin, pentadin, mabinlin, thaumatin, neohesperidin dihydrochalcone (NHDC), maltol, ethyl maltol and advantame.

137. A method of any one of paragraphs 132 to 136, wherein the one or more co-sweeteners are added in an amount such that the total amount of the one or more co-sweeteners constitutes from 0.001 to 10 wt. % of the final beverage.

138. A method of any one of paragraphs 91 to 137, wherein the beverage does not contain any product made from roasted coffee beans.

139. A method of any one of paragraphs 91 to 138, wherein the beverage is a carbonated soft beverage.

140. A method of any one of paragraphs 91 to 138, wherein the beverage is a flavored water.

141. A method of any one of paragraphs 91 to 138, wherein the beverage is a fruit juice or a beverage comprising a fruit juice.

142. A method of any one of paragraphs 91 to 138, whereinbeverage is a diary beverage or a beverage comprising a dairy product.

Additional Embodiments Set 106

1. A flavor or sweetener composition comprising a Maillard reaction product and a first sweetening agent, wherein the Maillard reaction product is a reaction product of a mixture comprising a sugar donor and an amine donor; the first sweetening agent is one or more selected from a licorice extract, a sweet tea extract, a *Stevia* extract, a swingle extract, sweet tea glycoside (rubusoside and suaviosides), a steviol glycoside, a mogroside, a glycosylated sweet tea extract, a glycosylated *Stevia* extract, a glycosylated swingle extract, a glycosylated sweet tea glycoside, a glycosylated steviol glycoside, a glycosylated mogroside and mixtures thereof.

2. The composition of paragraph 1, the sugar donor comprises a reducing sugar; preferably, the reducing sugar is one or more selected from monosaccharides, disaccharides, oligosaccharides, polysaccharides, and combinations thereof; preferably, the reducing sugar is one or more selected from mannose, glucose, rhamnose, fructose, arabinose, lactose, galactose, xylose, raffinose or mixtures thereof.

3. The composition of paragraph 2, the sugar donor comprises the second sweetening agent, and the second sweetening agent is one or more selected from a licorice extract, a sweet tea extract, a *Stevia* extract, a swingle extract, sweet tea glycoside (rubusoside and suaviosides), a steviol glycoside, a mogroside, a glycosylated sweet tea extract, a glycosylated *Stevia* extract, a glycosylated swingle extract, a glycosylated sweet tea glycoside, a glycosylated steviol glycoside, a glycosylated mogroside or mixtures thereof.

4. The composition of paragraph 3, the second sweetening agent is one or more selected from a *Stevia* extract, a steviol glycoside or a glycosylated steviol glycoside.

5. The composition of paragraph 1, the sugar donor comprises the second sweetening agent, and the second sweetening agent is one or more selected from a licorice extract, a sweet tea extract, a *Stevia* extract, a swingle extract, sweet tea glycoside (rubusoside and suaviosides), a steviol glycoside, a mogroside, a glycosylated sweet tea extract, a glycosylated *Stevia* extract, a glycosylated swingle extract, a glycosylated sweet tea glycoside, a glycosylated steviol glycoside, a glycosylated mogroside or mixtures thereof.

6. The composition of paragraph 5, the second sweetening agent is one or more selected from a *Stevia* extract, a steviol glycoside or a glycosylated steviol glycoside.

7. The composition of any one of paragraphs 4 or 6, the amine donor comprises one or more of a primary amine compound, a secondary amine compound, an amino acid, a protein, a peptide, a yeast extract or mixtures thereof.

8. The composition of paragraph 7, wherein the amino acid is one or more selected from alanine, arginine, asparagine, aspartic acid, cysteine, glutamine, glutamic acid, glycine, histidine, isoleucine, leucine, lysine, methionine, phenylalanine, proline, serine, threonine, tryptophan, tyrosine, valine or mixtures thereof.

9. The composition of paragraph 7 or 8, wherein the steviol glycoside is one or more selected from stevioside, steviolbioside, rebaudioside A, rebaudioside B, rebaudioside C, rebaudioside D, rebaudioside E, rebaudioside F, rebaudioside M, rebaudioside O, rebaudioside H, rebaudioside I, rebaudioside L, rebaudioside N, rebaudioside K, rebaudioside J, rubusoside, dulcoside A or mixtures thereof; Preferably, the *Stevia* extract comprises combination of rebaudioside A with at least one selected from steviol, stevioside, steviolbioside, rebaudioside B, rebaudioside C, rebaudioside D, rebaudioside E, rebaudioside F, rebaudioside M, rebaudioside O, rebaudioside H, rebaudioside rebaudioside L, rebaudioside N, rebaudioside K, rebaudioside J, rubusoside, dulcoside A or any mixtures thereof; More preferably, the *Stevia* extract comprises combination of at least two selected from rebaudioside A, rebaudioside B, rebaudioside D, and rebaudioside M.

10. The composition of paragraph 7 or 8, wherein the steviol glycoside is one or more selected from rebaudioside A, rebaudioside B, rebaudioside D, rebaudioside E, rebaudioside M, rebaudioside O, or mixtures thereof.

11. The composition of paragraph 7 or 8, wherein the steviol glycoside is rebaudioside A and rebaudioside B; rebaudioside B and rebaudioside D; rebaudioside D and rebaudioside M; rebaudioside A and rebaudioside M; rebaudioside A, rebaudioside B, and rebaudioside D; rebaudioside B, rebaudioside D, and rebaudioside M; rebaudioside A, rebaudioside D, and rebaudioside M.

12. The composition of paragraph 7 or 8, wherein the glycosylated steviol glycoside is one or more selected from glycosylation products of steviol, stevioside, steviolbioside, rebaudioside A, rebaudioside B, rebaudioside C, rebaudioside D, rebaudioside E, rebaudioside F, rebaudioside M, rebaudioside O, rebaudioside H, rebaudioside I, rebaudioside L, rebaudioside N, rebaudioside K, rebaudioside J, rubusoside, dulcoside A or mixtures thereof.

13. The composition of paragraph 7 or 8, wherein the glycosylated steviol glycoside is one or more selected from glycosylation products of rebaudioside A and rebaudioside B; rebaudioside B and rebaudioside D; rebaudioside D and rebaudioside M; rebaudioside A and rebaudioside M; rebaudioside A, rebaudioside B, and rebaudioside D; rebaudioside B, rebaudioside D, and rebaudioside M; rebaudioside A, rebaudioside D, and rebaudioside M.

14. The composition of paragraph 7 or 8, wherein the steviol glycoside is A with a purity of at least 20%, 30%, 40%, 50%, 60%, 80%, 90%, 95%, 97%, 98%, 99% or 100%.

15. The composition of any one of paragraphs 9-14, wherein the composition further comprises the sweetener enhancer; preferably, the sweetener enhancer is one or more selected from the group consisting of brazzein, miraculin, curculin, pentadin, mabinlin, thaumatin, or mixtures thereof.

16. The composition of any one of paragraphs 9-14, wherein the sweetener enhancer is thaumatin.

17. The composition of paragraph 16, wherein the sweetener enhancer is 0.01 ppm-60%, preferably 1 ppm-50%, more preferably 1%-40% by weight of the total weight of the composition.

18. The composition of paragraph 16, wherein the Maillard reaction product is present from about $10^{-9}$ ppb to about 99% by weight of the total weight of the composition.

19. The composition of paragraph 16, wherein the weight ratio of the Maillard reaction product to the first sweetening agent is 0.5:99.5 to 99.5:0.5, preferably, 1:50:50:1.

20. The composition of any one of paragraph 1-19, wherein the composition comprises the one or more non-nutritive sweetener(s) or one or more sweetener enhancer(s).

21. The composition of paragraph 20, wherein the one or more non-nutritive sweetener(s) or one or more sweetener enhancer(s) comprises sorbitol, xylitol, mannitol, sucralose, aspartame, acesulfame-K, neotame, erythritol, trehalose, raffinose, cellobiose, tagatose, allulose, inulin, N—[N-[3-(3-hydroxy-4-methoxyphenyl)propyl]-alpha-aspartyl]-L-phenylalanine 1-methyl ester, glycyrrhizin, sodium cyclamate, brazzein, miraculin, curculin, pentadin, mabinlin, thaumatin, neohesperidin dihydrochalcone (NHDC), maltol, advantame or combinations thereof.

22. The composition of any one of paragraph 1-19, wherein the Maillard reaction product is the result of the Maillard reaction without separation or purification from reaction component.

23. The composition of paragraph 22, wherein the Maillard reaction product consists of volatile substances and non-volatile substances.

24. The composition of paragraph 23, wherein the weight ratio of the volatile substances and the non-volatile substances is 1:99: to 99:1.

25. The composition of paragraph 22, wherein the Maillard reaction product comprises the direct resultant of the *Stevia* or steviol glycosides and unreacted *Stevia* extract or steviol glycosides.

26. The composition of paragraph 25, wherein the direct resultant of the *Stevia* or steviol glycosides comprises volatile substances of non-*Stevia* glycoside components, which is preferably characterized by citrus flavor.

27. The composition of paragraph 25, wherein the direct resultant of the *Stevia* or steviol glycosides comprises non-volatile substances of non-*Stevia* glycoside, which is preferably one or more molecules characterized by terpene, di-terpene, or ent-kaurene structure.

28. The composition of any one of paragraphs 1-27, wherein the composition further comprises an alkaline pH adjuster.

29. The composition of paragraph 28, wherein the alkaline pH adjuster is sodium hydroxide.

30. The composition of any one of paragraphs 1-29, wherein the composition further comprises a salt.

31. The composition of paragraph 30, wherein the salt is sodium carbonate, sodium bicarbonate, sodium chloride, potassium chloride, magnesium chloride, sodium sulfate, magnesium sulfate, potassium sulfate or mixtures thereof.

32. The composition of any one of paragraphs 1-31, wherein the composition further comprises acids, which is preferably one or more selected from acetic acid, propanoic acid, pentanoic acid, hexanoic acid, trans 2-hexenoic acid, heptanoic acid, octanoic acid, (Z)-9-octadecenoic acid, decahydro-1-naphthalenecarboxylic acid, 2,3-dihyd-9,12,15-octadecattienoic acid and or mixture thereof.

33. The composition of paragraph 3, the second sweetening agent is one or more selected from a sweet tea extract, rubusoside, suavioside, glycosylated sweet tea extract, or glycosylated rubusoside, glycosylated suavioside and/or mixtures thereof.

34. The composition of paragraph 1, the sugar donor comprises a second sweetening agent, and the second sweetening agent is one or more selected from a sweet tea extract, rubusoside, suavioside, glycosylated sweet tea extract, or glycosylated rubusoside, glycosylated suaviosides and/or mixtures thereof.

35. The composition of paragraph 1, the sugar donor comprises a second sweetening agent, and the second sweetening agent is one or more selected from a swingle extract, a mogroside, a glycosylated mogroside or mixtures thereof.

36. The composition of paragraph 3, the second sweetening agent is one or more selected from a sweet tea extract, rubusoside, suavioside, glycosylated sweet tea extract, or glycosylated rubusoside, glycosylated suaviosides and/or mixtures thereof.

37. The composition of paragraph 3, the second sweetening agent is one or more selected from a swingle extract, a mogroside, a glycosylated mogroside or mixtures thereof.

38. A food or beverage with decreased unsatisfactory or unpleasant taste, which comprises foodstuff and the composition of any one of paragraphs 1-37, said unsatisfactory or unpleasant taste is one or more of sour, astringent, bitter taste or aftertaste, metallic taste, stale taste, an alkaline taste, a mineral or pungent taste, the grassy, earthy or herb taste.

39. The food or beverage of paragraph 38, wherein the composition of any one of paragraphs 1-37 is 1 ppm-99%, more preferably 0.001-20 wt %, further preferably 0.001-1 wt % by weight of the food.

40. The food or beverage of paragraph 38 or 39, the food is reduced salt food.

41. The food or beverage of 40, the food or beverage is enhanced salty taste without increasing sodium intake.

42. The food or beverage of paragraph 38 or 39, the food or beverage is vegetable or vegetable juices, especially garlic, ginger, or beet root.

43. The food or beverage of paragraph 38 or 39, the food or beverage contains vegetables with a bitter taste, which is preferably artichoke, broccoli, radicchio, arugula, brussel sprouts, chicory, white asparagus, endive, kale and brassica, dandelion, eggplant or bitter melon.

44. The food or beverage of paragraph 38 or 39, the food or beverage is a juice, juice concentrate, or fruit extract, which is preferably cranberry, pomegranate, bilberry, raspberry, lingonberry, grapefruit, lime and citrus.

45. The food or beverage of paragraph 38 or 39, the food or beverage contains minerals and trace elements.

46. The food or beverage of paragraph 38 or 39, the food or beverage is vitamin fortified food or a beverage with vitamin B and vitamin C.

47. The food or beverage of paragraph 38 or 39, the food or beverage contains amino acids, which is preferably selected from arginine, aspartic acid, cysteine HCl, glutamine, histidine HCl, isoleucine, lysine HCl, methionine, proline, tryptophan, valine, and any mixture thereof.

48. The food or beverage of paragraph 38 or 39, the food or beverage contains fatty acids, which is preferably linoleic acid, linolenic acid or palmitoleic acid.

49. The food or beverage of paragraph 38 or 39, the food or beverage contains natural herbs, natural herb extracts, concentrates, or purified substances from herbs.

50. The food or beverage of paragraph 38 or 39, the food or beverage is caffeine, tea extract, ginseng juice or ginseng extract, taurine or guarana that function to boost energy.

51. The food or beverage of paragraph 38 or 39, the food or beverage is cocoa powder or coffee powder, cocoa or coffee extract; or tea powder or tea extract, or flavored tea.

52. The food or beverage of any one of paragraphs 38-51, the food or beverage contains natural antioxidant, which is preferably enriched in anthocyanins.

53. A food or beverage with kokumi, which comprises foodstuff and the composition of any one of paragraphs 1-37; preferably, wherein the MRP composition is present in the final food or beverage in an amount of 0.001-20 wt %, more preferably 0.001-1 wt %.

54. A method for producing the composition of any one of paragraphs 1-37, comprising the step of mixing the Maillard reaction product and a first sweetening agent.

55. The method of paragraph 54, wherein the Maillard reaction product is obtained from the step comprising:

preparing a reaction mixture comprising:

the sugar donor and amine donor;

combining the reaction mixture with one or more solvents to provide a reaction solution; and heating the reaction solution under conditions suitable for forming a solution or slurry;

wherein the first sweetening agent is added to the solution or slurry during or after the completion of the Maillard reaction, to form a Maillard reaction mixture composition.

56. The method of paragraph 55, the sugar donor is the reducing sugar.

57. The method of paragraph 55, the sugar donor is the mixture of reducing sugar and the second sweetening agent.

58. The method of paragraph 55, the sugar donor is the second sweetening agent.

59. The method of paragraph 58, the second sweetening agent is one or more selected from a *Stevia* extract, a steviol glycoside or a glycosylated steviol glycoside.

60. The method of paragraph 58, the first sweetening agent is one or more selected from a *Stevia* extract, a steviol glycoside or a glycosylated steviol glycoside.

61. The method of any one of paragraphs 54-60, comprising isolating the Maillard reaction mixture composition.

62. A method for producing the food or beverage of any one of paragraphs 38-56, comprising the step of mixing the Maillard reaction product, a first sweetening agent and the foodstuff.

63. The method of paragraph 62, wherein the Maillard reaction product is obtained from the step comprising:

preparing a reaction mixture comprising:

the sugar donor and amine donor;

combining the reaction mixture with one or more solvents to provide a reaction solution; and heating the reaction solution under conditions suitable for forming a solution or slurry;

wherein the first sweetening agent is added to the solution or slurry during or after the completion of the Maillard reaction, to form a Maillard reaction mixture composition; and adding the Maillard reaction mixture composition to provide a food or beverage, wherein the taste and/or mouthfeel profile of the food or beverage is improved.

64. The method of paragraph 63, the sugar donor is the reducing sugar.

65. The method of paragraph 63, the sugar donor is the mixture of reducing sugar and the second sweetening agent.

66. The method of paragraph 63, the sugar donor is the second sweetening agent.

67. The method of paragraph 66, the second sweetening agent is one or more selected from a *Stevia* extract, a steviol glycoside or a glycosylated steviol glycoside.

68. The method of paragraph 66, the first sweetening agent is one or more selected from a *Stevia* extract, a steviol glycoside or a glycosylated steviol glycoside.

69. The method of any one of paragraphs 62-68, comprising isolating the Maillard reaction mixture composition, 70. A Maillard reaction product which is formed by a reaction mixture containing a sweetening agent and an amine donor, the sweetening agent is one or more selected from a licorice extract, a sweet tea extract, a *Stevia* extract, a swingle extract, sweet tea glycoside (rubusoside and suaviosides), a steviol glycoside, a mogroside, a glycosylated sweet tea extract, a glycosylated *Stevia* extract, a glycosylated swingle extract, a glycosylated sweet tea glycoside, a glycosylated steviol glycoside, a glycosylated mogroside or mixtures thereof.

71. The Maillard reaction product of paragraph 70, wherein the sweetening agent is one or more selected from a *Stevia* extract, a steviol glycoside, a glycosylated *Stevia* extract, a glycosylated steviol glycoside and mixtures thereof, 72. The Maillard reaction product of paragraph 70, the amine donor comprises one or more of a primary amine compound, a secondary amine compound, an amino acid, a protein, a peptide, a yeast extract or mixtures thereof.

73. The Maillard reaction product of paragraph 70 or 72, the amine donor comprises thaumatin, preferably, thaumatin is 0.01 ppm-90%, preferably 1 ppm-80%, more preferably 1%-70% by weight of the reaction mixture from which the Maillard reaction product is formed.

74. The Maillard reaction product of paragraph 70 or 72, wherein the amino acid is one or more selected from alanine, arginine, asparagine, aspartic acid, cysteine, glutamine, glutamic acid, glycine, histidine, isoleucine, leucine, lysine, methionine, phenylalanine, proline, serine, threonine, tryptophan, tyrosine, valine or mixtures thereof.

75. The Maillard reaction product of paragraph 74, wherein the steviol glycoside is one or more selected from steviol, stevioside, steviolbioside, rebaudioside A, rebaudioside B, rebaudioside C, rebaudioside D, rebaudioside E, rebaudioside F, rebaudioside M, rebaudioside O, rebaudioside H, rebaudioside I, rebaudioside L, rebaudioside N, rebaudioside K, rebaudioside J, rubusoside, dulcoside A or mixtures thereof; Preferably, the *Stevia* extract comprises combination of rebaudioside A with at least one selected from steviol, stevioside, steviolbioside, rebaudioside B, rebaudioside C, rebaudioside D, rebaudioside E, rebaudioside F, rebaudioside M, rebaudioside O, rebaudioside H, rebaudioside I, rebaudioside L, rebaudioside N, rebaudioside rebaudioside J, rubusoside, dulcoside A or any mixtures thereof; More preferably, the *Stevia* extract comprises combination of at least two selected from rebaudioside A, rebaudioside B, rebaudioside D, and rebaudioside M.

76. The Maillard reaction product of paragraph 74, wherein the steviol glycoside is rebaudioside A and rebaudioside B; rebaudioside B and rebaudioside D; rebaudioside D and rebaudioside M; rebaudioside A and rebaudioside M; rebaudioside A, rebaudioside B, and rebaudioside D; rebaudioside B, rebaudioside D, and rebaudioside M; rebaudioside A, rebaudioside D, and rebaudioside M.

77. The Maillard reaction product of paragraph 74, wherein the glycosylated steviol glycoside is one or more selected from glycosylation products of steviol, stevioside, steviolbioside, rebaudioside A, rebaudioside B, rebaudioside C, rebaudioside D, rebaudioside E, rebaudioside F, rebaudioside M, rebaudioside O, rebaudioside H, rebaudioside I, rebaudioside rebaudioside N, rebaudioside K, rebaudioside J, rubusoside, dulcoside A or mixtures thereof.

78. The Maillard reaction product of paragraph 74, wherein the glycosylated steviol glycoside is one or more selected from glycosylation products of rebaudioside A and rebaudioside B; rebaudioside B and rebaudioside D; rebaudioside D and rebaudioside M; rebaudioside A and rebaudioside M; rebaudioside A, rebaudioside B, and rebaudioside D; rebaudioside B, rebaudioside D, and rebaudioside M; rebaudioside A, rebaudioside D, and rebaudioside M.

79. The Maillard reaction product of any one of paragraphs 74-78, the steviol glycoside is A with a purity of at least 20%, 30%, 40%, 50%, 60%, 80%, 90%, 95%, 97%, 98%, 99% or 100%.

80. The Maillard reaction product of any one of paragraphs 74-79, the Maillard reaction product comprises the direct resultant of the *Stevia* or steviol glycosides and unreacted *Stevia* extract or steviol glycosides.

81. The Maillard reaction product of paragraph 80, the direct resultant of the *Stevia* or steviol glycosides comprise volatile substances of non-*Stevia* glycoside components, which is preferably characterized by citrus flavor.

82. The Maillard reaction product of paragraph 80 or 81, the direct resultant of the *Stevia* or steviol glycosides comprises non-volatile substances of non-*Stevia* glycoside, which is preferably one or more molecules characterized by terpene, di-terpene, or ent-kaurene structure.

83. A food or beverage with decreased unsatisfactory or unpleasant taste, which comprises foodstuff and the Maillard reaction product of any one of paragraphs 70-82.

84. The food or beverage of paragraph 83, wherein said unsatisfactory or unpleasant taste is one or more of sour, astringent, bitter taste or aftertaste, metallic taste, stale taste, an alkaline taste, a mineral or pungent taste, the grassy, earthy or herb taste.

85. The food or beverage of paragraph 83, wherein the food comprises a sweetening agent, which is preferably one or more selected from a licorice extract, a sweet tea extract, a *Stevia* extract, a swingle extract, sweet tea glycoside (rubusoside and suaviosides), a steviol glycoside, a mogroside, a glycosylated sweet tea extract, a glycosylated *Stevia* extract, a glycosylated swingle extract, a glycosylated sweet tea glycoside, a glycosylated steviol glycoside, a glycosylated mogroside and mixtures thereof.

86. The food or beverage of paragraph 85, wherein the sweetening agent is one or more selected from a *Stevia* extract, a steviol glycoside or a glycosylated steviol glycoside.

87. The food or beverage of any one of paragraphs 83-86, wherein the product of any one of paragraphs 70-82 is added to the foodstuff to obtain the food or beverage; preferably, wherein the MRP product is present in the final food or beverage in an amount of 0.001-20 wt %, more preferably 0.001-1 wt %.

88. The food or beverage of any one of paragraphs 85-87, wherein the steviol glycoside is one or more selected from steviol, stevioside, steviolbioside, rebaudioside A, rebaudioside B, rebaudioside C, rebaudioside D, rebaudioside E, rebaudioside F, rebaudioside M, rebaudioside O, rebaudioside H, rebaudioside I, rebaudioside L, rebaudioside N, rebaudioside K, rebaudioside J, rubusoside, dulcoside A or mixtures thereof; Preferably, the *Stevia* extract comprises combination of rebaudioside A with at least one selected from steviol, stevioside, steviolbioside, rebaudioside B, rebaudioside C, rebaudioside D, rebaudioside E, rebaudioside rebaudioside M, rebaudioside O, rebaudioside H, rebaudioside I, rebaudioside L, rebaudioside N, rebaudioside K, rebaudioside J, rubusoside, dulcoside A or any mixtures thereof; More preferably, the *Stevia* extract comprises combination of at leak two selected from rebaudioside A, rebaudioside B, rebaudioside D, and rebaudioside M.

89. The food or beverage of any one of paragraphs 85-87, wherein the steviol glycoside is rebaudioside A and rebaudioside B; rebaudioside B and rebaudioside D; rebaudioside D and rebaudioside M; rebaudioside A and rebaudioside M; rebaudioside A, rebaudioside B, and rebaudioside D; rebaudioside B, rebaudioside D, and rebaudioside M; rebaudioside A, rebaudioside D, and rebaudioside M.

90. The food or beverage of any one of paragraphs 85-87, wherein the glycosylated steviol glycoside is one or more selected from glycosylation products of steviol, stevioside, steviolbioside, rebaudioside A, rebaudioside B, rebaudioside C, rebaudioside D, rebaudioside E, rebaudioside F, rebaudioside M, rebaudioside O, rebaudioside H, rebaudioside I, rebaudioside L, rebaudioside N, rebaudioside K, rebaudioside J, rubusoside, dulcoside A or mixtures thereof.

91. The food or beverage of any one of paragraphs 85-87, wherein the glycosylated steviol glycoside one or more selected from glycosylation products of rebaudioside A and rebaudioside B; rebaudioside B and rebaudioside D; rebaudioside D and rebaudioside M; rebaudioside A and rebaudioside M; rebaudioside A, rebaudioside B, and rebaudioside D; rebaudioside B, rebaudioside D, and rebaudioside M; rebaudioside A, rebaudioside D, and rebaudioside M.

92. The food or beverage of any one of paragraphs 85-87, wherein the steviol glycoside is A with a purity of at least 20%, 30%, 40%, 50%, 60%, 80%, 90%, 95%, 97%, 98%, 99% or 100%.

93. The food or beverage of any one of paragraphs 83-92, wherein the Maillard reaction product is present from about $10^{-9}$ ppb to about 99% by weight of the total weight of the food or beverage.

94. The food or beverage of any one of paragraphs 83-92, wherein the composition comprises the one or more non-nutritive sweetener(s) or one or more sweetener enhancer(s).

95. The food or beverage of paragraph 94, wherein the one or more non-nutritive sweetener(s) or one or more sweetener enhancer(s) comprises sorbitol, xylitol, mannitol, sucralose, aspartame, acesulfame-K, neotame, erythritol, trehalose, raffinose, cellobiose, tagatose, allulose, inulin, N—[N-[3-(3-hydroxy-4-methoxyphenyl)propyl]-alpha-aspartyl]-L-phenylalanine 1-methyl ester, glycyrrhizin, sodium cyclamate, brazzein, miraculin, curculin, pentadin, tnabinlin, neohesperidin dihydrochal cone (NHDC), advantame or combinations thereof.

96. The food or beverage of any one of paragraphs 86-95, wherein the food or beverage further comprises an alkaline pH adjuster, which is preferably sodium hydroxide.

97. The food or beverage of any one of paragraphs 86-96, wherein the food or beverage contains a salt; preferably, the salt is sodium carbonate, sodium bicarbonate, sodium chloride, potassium chloride, magnesium chloride, sodium sulfate, magnesium sulfate, potassium sulfate or mixtures thereof; more preferably, the weight content of the salt in the total weight of the food or beverage is 0.01%-40%.

98. The food or beverage of any one of paragraphs 86-97, wherein the food or beverage further comprises acids, which is preferably one or more selected from acetic acid, propanoic acid, pentanoic acid, hexanoic acid, trans 2-hexenoic acid, heptanoic acid, octanoic acid, (Z)-9-octadecenoic acid, decahydro-1-naphthalenecarboxylic acid, 2,3-dihyd-9,12, 15-octadecatrienoic acid and or mixture thereof; more preferably, the weight content of the acids in the total weight of the food or beverage is 0.01%-60%.

99. The food or beverage of any one of paragraphs 86-98, wherein the food or beverage is enhanced salty taste without increasing sodium intake.

100. The food or beverage of any one of paragraphs 86-99, wherein the food or beverage is vegetable or vegetable juices, especially garlic, ginger, or beet root.

101. The food or beverage of any one of paragraphs 86-99, wherein the food or beverage contains vegetables with a bitter taste, which is preferably artichoke, broccoli, radicchio, arugula, brussel sprouts, chicory, white asparagus, endive, kale and brassica, dandelion, eggplant or bitter melon.

102. The food or beverage of any one of paragraphs 86-99, wherein the food or beverage is juices, juice concentrate, or fruit extract, which is preferably cranberry, pomegranate, bilberry, raspberry, lingonberry, grapefruit, lime and citrus.

103. The food or beverage of any one of paragraphs 86-99, wherein the food or beverage is vitamin fortified food or beverage with vitamin B and vitamin C; or the food or beverage contains minerals and trace elements.

104. The food or beverage of any one of paragraphs 86-99, wherein the food or beverage contains amino acids, which is preferably selected from arginine, aspartic acid, cysteine HCl, glutamine, histidine HCl, isoleucine, lysine HCl, methionine, proline, tryptophan, valine, and any mixture thereof.

105. The food or beverage of any one of paragraphs 86-99, wherein the food or beverage contains natural herbs, natural herb extracts, concentrates, or purified substances from herbs.

106. The food or beverage of any one of paragraphs 86-99, wherein the food or beverage is caffeine, tea extract, ginseng juice or ginseng extract, taurine or guarana that function to boost energy.

107. The food or beverage of any one of paragraphs 86-99, wherein the food or beverage is cocoa powder or coffee powder, cocoa or coffee extract; or tea powder or tea extract, or flavored tea.

108. The food or beverage of any one of paragraphs 86-107, wherein the food or beverage contains natural antioxidant, which is preferably enriched in anthocyanins.

109. A food or beverage with kokumi, which comprises foodstuff and the product of any one of paragraphs 70-82.

110. The food or beverage with kokumi, wherein the MRP product is present in the final food or beverage in an amount of 0.001-20 wt %, more preferably 0.001-1 wt %.

111. A method for producing the composition of any one of paragraphs 70-82, comprising the step of combining the reaction mixture with one or more solvents to provide a reaction solution; and heating the reaction solution under conditions suitable for forming a solution or slurry to carry out the Maillard reaction, to form the Maillard reaction mixture composition.

112. A method for producing the food or beverage of any one of paragraphs 83-110, comprising the step of mixing the Maillard reaction product and the foodstuff.

113. The method of paragraph 112, during or after the completion of the Maillard reaction, the Maillard reaction mixture or product is mixed with the foodstuff to obtain the food or beverage.

EXAMPLES

A general method to prepare the *Stevia* derived Maillard reaction product(s) is described as follows.

A *Stevia* extract is dissolved with/without a sugar donor, together with amino acid donor in deionized water. When required, a pH adjuster or pH buffer can be added to regulate the pH of the reaction mixture. Generally, the pH of the reaction mixture should be from about a pH of 7 to a pH of about 14. The solution is then heated at an elevated temperature, for example, from about 50 to about 100 degrees centigrade. The reaction time can be varied from more than one second to few days, more generally a few hours, until MRPs (Maillard Reacted Products) with or without CRPs (Caramelization Reacted Products) are formed or the reaction between components is completed. When the reaction is completed, if needed, a pH adjuster or pH buffer can be added to regulate the pH of reaction mixture to about pH 6-7. The resultant solution is dried by spray dryer or hot air oven to remove the water and to obtain the MRP(s).

Example 1

Preparation of MRPs from RA97 and Alanine 0.9 g RA97 (available from Sweet Green Fields) was dissolved together with 0.1 g DL-alanine (available from Anhui Huaheng Biological Engineering Co., Ltd., China) in 2 ml deionized water. The water content in the reaction mixture was about 67%. The weight to weight ratio of *Stevia* extract to amino acid was 9:1. $Na_2CO_3$ was added to adjust the pH of the reaction mixture to a of about 10. The solution was heated to about 80 to about 85 degrees centigrade for about 2 hours. When the reaction was completed, the solution was dried by hot air oven at 80 degrees centigrade for about 3 hours to provide about 1 g of an off white powder MRP.

Example 2

Preparation of MRPs from RA75/RB15 and Alanine 99 g RA75/RB15 (available from Sweet Green Fields) was dissolved together with 2.25 g DL-alanine (available from Anhui Huaheng Biological Engineering Co., Ltd., China) in 2 ml deionized water. The water content in the reaction mixture was about 15%, The weight to weight ratio of *Stevia* extract to amino acid was 4:1. The solution was heated to about 80 to about 85 degrees centigrade for about 2 hours. When the reaction was completed, the slurry was dried by hot air oven at 80 degrees centigrade for about 2 hours to provide about 11 g of the off white powder MRP.

Example 3

Preparation of MRPs from RA97 and Alanine

In this example several MRPs were prepared according to the process of Example 1 except that the *Stevia* extract, its ratio to DL-alanine, and the water content in the reaction mixture were changed. The details were as follow:

TABLE 3.1

| Sample No. | *Stevia* extract reactant | Ratio of *Stevia* extract to DL-alanine (w:w) | Water content |
|---|---|---|---|
| 3-1 | RA97 | 99:1 | 15% |
| 3-2 | RA97 | 99:1 | 50% |
| 3-3 | RA97 | 99:1 | 80% |

Example 4

Preparation of MRPs from RA50 and Alanine

In this example several MRPs were prepared according to the process of Example 1 except for the *Stevia* extract, its ratio to DL-alanine, and the water content in the reaction mixture were changed. The details were as follow:

TABLE 4.1

| Sample No. | *Stevia* extract reactant | Ratio of *Stevia* extract to DL-alanine (w:w) | Water content |
|---|---|---|---|
| 4-1 | RA50 | 99:1 | 80% |
| 4-2 | RA50 | 99:5 | 80% |
| 4-3 | RA50 | 90:10 | 80% |

Example 5

Preparation of MRI's from Glucose and Alanine 1.98 g glucose monohydrate was dissolved together with 1.78 g DL-alanine (available from Anhui Huaheng Biological Engineering Co., Ltd., China) in 0.45 ml deionized water. The water content in the reaction mixture was about 10%. The mole to mole ratio of glucose to amino acid was 1:2. The solution was heated at about 80 to about 85 degrees centigrade for about 2 hours. When the reaction was completed, the slurry was dried by hot air oven at 80 degrees centigrade for about 2 hours to provide about 3.2 g of a light brown powder MRP.

Example 6

Preparation of MRPs from GSG-RA20 and Alanine 9 g Glycosylated steviol glycoside (GSG-RA20, available from Sweet Green Fields) was dissolved together with 1 g DL-alanine (available from Anhui Huaheng Biological Engineering Co., Ltd., China) in 20 ml deionized water. The water content in the reaction mixture was about 50%. The weight to weight ratio of *Stevia* extract to amino acid was 9:1. Sodium carbonate was added to the reaction mixture to adjust the pH to about 10. The solution was then heated to about 100 degrees centigrade for about 2 hours. When the reaction was completed, the slurry was dried by spray dryer to provide about 9.5 g of an off white powder MRP.

The information provided as follows provides the compositional make up of GSG-RA20 and the analytical processes to determine the composition.

Materials:

Reference standards for steviol glycosides (Reb A, Reb B, Reb C, Reb D, Reb E, Reb F, Reb G, Reb I, Reb M, Reb N, Reb O, Isoreb A, Isostevioside) were obtained from Chromadex (LGC Germany). Solvents and reagents (HPLC grade) were obtained from VWR (Vienna) or Sigma-Aldrich (Vienna).

Davisil Grade 633 (high-purity grade silica gel, pore size 60 Å, 200-425 mesh particle size was obtained from Sigma-Aldrich (Vienna).

Sample Preparation:

All samples were fractionated over a glass column (100×5 mm) filled with Davisil Grade 633. The column was equilibrated with ethyl acetate/Acetic acid/$H_2O$=8/3/2 (v/v/v). 100 mg sample, dissolved in 2 ml 1-120, were loaded on the column and eluted with ethyl acetate/Acetic acid/$H_2O$=8/3/2 at a flow rate of 2 ml/min. The first 6 ml of the eluate were discarded and the next 30 ml containing unreacted steviol-glycosides were collected. Enzymatically reacted steviol-glycosides eluted in the range of 36-70 ml and were again collected.

After fractionation of 3 samples, the pooled eluates were evaporated to dryness and reconstituted in 20 ml Acetonitrile/$H_2O$=9/1 (v/v) corresponding to an equivalent sample concentration of 150 mg sample/10 ml.

The method was qualified by fractionation of steviol glycoside standards and enzymatically reacted steviol-glycosides. An elution yield of >97% of steviol-glycosides and of >95% enzymatically reacted steviol-glycosides was observed, the carry over between the fraction was calculated to less than 3%.

The pooled, evaporated samples were used for further analysis.

HPLC-Method:

The HPLC system consisted of an Agilent 1100 system (autosampler, ternary gradient pump, column thermostat, VWD-UV/VIS detector, DAD-UV/VIS detector) connected in-line to an Agilent mass spectrometer (ESI-MS quadrupole G1956A. For HPLC analysis 150 mg of the corresponding sample was dissolved in Acetonitrile (1 ml) and filled up to 10 ml with $H_2O$.

The samples were separated at 0.8 mi/min on a Phenomenex Synergi Hydro-RP (150×3 mm) followed by a Macherey-Nagel Nucleosil 100-7 C18 (250×4.6 mm) at 45° C. by gradient elution. Mobile Phase A consisted of a 0.01 molar NFL-Acetate buffer (native pH) with 0.1% acetic acid, 0.05% trimethylamine and 0.001% dichloromethane. Mobile Phase B consisted of 0.01 molar $NH_4$-Acetate buffer (native pH) and Acetonitrile (1/9 v/v) with 0.1% acetic acid, 0.05% trimethylamine and 0.001% dichloromethane. The gradient started with 22% B, was increased linearly in 20 minutes to 45% B and kept at this condition for another 15 minutes. Injection volume was set to 10 µl.

The detectors were set to 210 nm (VWD), to 205 and 254 nm (DAD with spectra collection between 200-600 nm) and to ESI negative mode TIC m/z 300-1500. Fragmentor 200, Gain 2 (MS, 300° C., nitrogen 12 l/min, nebulizer setting 50 psig. Capillary voltage 4500 V).

Detections at 205 and 210 nm were used to quantify the chromatograms, the MS-spectra were used to determine the molar mass and structural information of individual peaks. Detection at 254 nm was used to identify non-steviol glycoside peaks, Samples were quantified by external standardization against reference compounds, in case where no authentic reference standard was available, the peak area was quantified against the reference standard with the most similar mass and corrected for the molar mass differences. The maximum calibration range of reference standards was in a range 0.1-50 mg/10 ml (dissolved in Acetonitrile/$H_2O$=9/1 (v/v)).

Identification and Quantification:

Steviol-glycosides and enzymatically reacted steviol-glycosides were identified by comparison of retention times to authentic reference standards and/or by evaluation of the mass spectra obtained (including interpretation of the fragmentation pattern and double charged ions triggered by the presence of dichloromethane).

Steviol-glycosides were quantified against external standards. In case that no reference standard was available quantification was performed against the reference standard with the most similar molar mass.

Steviol glycosides (SGs) are molecules composed of a steviol-backbone with a series of sugars attached.

Based on the type of sugar (i.e. glucose, rhamnose/deoxyhexose, xylose/arabinose) SGs are grouped into three families:

SGs with glucose (Table 6.1)

SGs with glucose and 1 rhamnose/deoxyhexose (Table 6.2)

SGs with glucose and 1 xylose/arabinose (Table 6.3)

The nomenclature introduced is to be interpreted as follows (x is between 2 and 6):

SG-xG: Steviol glycoside composed of steviol and "x" attached glucose molecules

SG-xG1R: Steviol glycoside composed of steviol and "x" attached glucose molecules and 1 rhamnose or deoxyhexose molecule SG-xGiX: Steviol glycoside composed of steviol and "x" attached glucose molecules and 1 xylose or arabinose molecule Any number between −1 and −8 given additionally represents the number of glucose molecules attached to the SG.

Examples: SG-4G-2 represents an SG with four glucose molecules to which 2 glucose molecules were added during enzymatic treatment.

SG-3G1R-4 represents an SG with 3 glucose molecules and 1 rhatnnoseldeoxyhexose molecule to which 4 glucose molecules were added during enzymatic treatment.

SG-4G1X-3 represents an SG with 4 glucose molecules and 1 xylose/arabinose molecule to which 3 glucose molecules were added during enzymatic treatment.

TABLE 6.1

SGs with glucose

| SG-group | Individual SG (unreacted part) | SG-{ }-Added Glucose (reacted part) | [Mr] | mg/10 ml | % (m/m) |
|---|---|---|---|---|---|
| SG-2G | Rubusoside | — | 642 | 1.16 | 0.77 |
| | Stev-Bios | — | 642 | 0.41 | 0.27 |
| SG-3G | Reb-B | — | 804 | 1.29 | 0.86 |
| | Reb-G | — | 804 | 0.83 | 0.55 |
| | Stevioside | — | 804 | 5.05 | 3.36 |
| | Re-KA | — | 804 | <0.05 | <0.05 |
| | Stevioside B | — | 804 | <0.05 | <0.05 |
| | | SG-3G-2 | 1128 | 13.02 | 8.68 |
| | | SG-3G-3 | 1290 | 4.50 | 3.00 |
| | | SG-3G-4 | 1452 | 2.25 | 1.50 |
| | | SG-3G-7 | 1938 | 3.72 | 2.48 |
| | | SG-3G-8 | 2100 | 4.43 | 2.96 |
| SG-4G | Reb-A | — | 966 | 4.67 | 3.11 |
| | Reb-E | — | 966 | 1.33 | 0.88 |
| | Reb-A2 | — | 966 | <0.05 | <0.05 |
| | Reb-H1 | — | 966 | <0.05 | <0.05 |
| | | GSG-4G-1 | 1128 | 8.60 | 5.73 |
| | | GSG-4G-2 | 1290 | 1.47 | 0.98 |
| | | GSG-4G-3 | 1452 | 1.89 | 1.26 |
| | | GSG-4G-7 | 2100 | 4.93 | 3.29 |

TABLE 6.1-continued

SGs with glucose

| SG-group | Individual SG (unreacted part) | SG-{ }-Added Glucose (reacted part) | [Mr] | mg/10 ml | % (m/m) |
|---|---|---|---|---|---|
| SG-5G | Reb-D | — | 1128 | 0.96 | 0.64 |
| | Reb I | — | 1128 | <0.05 | <0.05 |
| | Reb L | — | 1128 | <0.05 | <0.05 |
| | Reb Q | — | 1128 | <0.05 | <0.05 |
| | Reb I2 | — | 1128 | <0.05 | <0.05 |
| | | GSG-5G-1 | 1290 | 0.42 | 0.28 |
| | | GSG-5G-2 | 1452 | 0.23 | 0.15 |
| | | GSG-5G-3 | 1614 | 1.90 | 1.27 |
| | | GSG-5G-4 | 1776 | 0.09 | 0.06 |
| | | GSG-5G-5 | 1938 | 4.14 | 2.76 |
| SG-6G | Reb-M | — | 1290 | 0.36 | 0.24 |
| | | GSG-6G-3 | 1776 | 0.15 | 0.10 |

"[Mr]" refers to molecular mass.
m/m refers to mass/mass.

TABLE 6.2

SGs with glucose and 1 rhamnose/deoxyhexose

| SG-group | Individual SG (unreacted part) | SG-{ }-Added Glucose (reacted part) | [Mr] | mg/10 ml | % (m/m) |
|---|---|---|---|---|---|
| SG-2G1R | Dulcoside A | — | 788 | 0.33 | 0.22 |
| | Dulcoside B | — | 788 | 2.35 | 1.57 |
| SG-3G1R | Reb-C | — | 950 | 0.92 | 0.62 |
| | Reb-S | — | 950 | 2.18 | 1.46 |
| | Reb-H | — | 950 | <0.05 | <0.05 |
| | | GSG-3G1R-3 | 1436 | 0.78 | 0.52 |
| | | GSG-3G1R-3 | 1436 | 4.25 | 2.83 |
| SG-4G1R | Reb J | — | 1112 | <0.05 | <0.05 |
| | Reb K | — | 1112 | <0.05 | <0.05 |
| | Reb K2 | — | 1112 | <0.05 | <0.05 |
| | | GSG-4G1R-2 | 1436 | 0.65 | 0.44 |
| | | GSG-4G1R-3 | 1598 | 0.33 | 0.22 |
| | | GSG-4G1R-4 | 1760 | 1.67 | 1.12 |
| | | GSG-4G1R-6 | 2084 | 2.75 | 1.84 |
| SG-5G1R | Reb-N | — | 1274 | <0.05 | <0.05 |
| | | GSG-5G1R-4 | 1922 | 4.72 | 3.15 |
| SG-6G1R | Reb-O | — | 1436 | 0.32 | 0.21 |
| | | GSG-6G1R-1 | 1598 | 0.81 | 0.54 |
| | | GSG-6G1R-1 | 1598 | 0.77 | 0.52 |
| | | GSG-6G1R-2 | 1760 | 1.72 | 1.14 |

TABLE 6.3

SGs with glucose and 1 xylose/arabinose

| SG-group | Individual SG (unreacted part) | SG-{ }-Added Glucose (reacted part) | [Mr] | mg/10 ml | % (m/m) |
|---|---|---|---|---|---|
| SG-3G1X | Reb-F | — | 936 | 0.81 | 0.54 |
| | Reb-R | — | 936 | 0.75 | 0.50 |
| | | GSG-3G1X-4 | 1584 | 4.93 | 3.29 |
| | | GSG-3G1X-5 | 1746 | 1.86 | 1.24 |
| SG-4G1X | Reb U | — | 1098 | <0.05 | <0.05 |
| | Reb T | — | 1098 | <0.05 | <0.05 |
| | Reb W | — | 1098 | <0.05 | <0.05 |
| | Reb W2 | — | 1098 | <0.05 | <0.05 |
| | | GSG-4G1X-1 | 1260 | 1.34 | 0.89 |
| | | GSG-4G1X-2 | 1422 | 1.10 | 0.73 |
| | | GSG-4G1X-3 | 1584 | 5.89 | 3.93 |
| | | GSG-4G1X-4 | 1746 | 1.73 | 1.15 |

TABLE 6.3-continued

| SGs with glucose and 1 xylose/arabinose | | | | | |
|---|---|---|---|---|---|
| SG-group | Individual SG (unreacted part) | SG-{ }-Added Glucose (reacted part) | [Mr] | mg/10 ml | % (m/m) |
| SG-5G1X | Reb V | — | 1260 | <0.05 | <0.05 |
| | | GSG-5G1X-1 | 1422 | 2.94 | 1.96 |

Example 7

Preparation of MRPs from Rubusoside 90 and Alanine

In this example several MRPs were prepared according to the process of Example 6 except for the *Stevia* extract, its ratio to DL-alanine, and the water content in the reaction mixture. The details were as follow.

TABLE 7.1

| Sample No. | *Stevia* extract reactant | Ratio of *Stevia* extract to DL-alanine (w:w) | Water content | Weight of Rubusoside 90 | Weight of DL-alanine | Volume of water |
|---|---|---|---|---|---|---|
| 7-1 | Rubusoside 90 | 95:5 | 50% | 9.5 g | 0.5 g | 10 ml |
| 7-2 | Rubusoside 90 | 90:10 | 50% | 9 g | 1 g | 10 ml |

Example 8

Preparation of MRPs from Stevioside 90 and Alanine

In this example several MRPs were prepared according to the process of Example 6 except for the *Stevia* extract, its ratio to DL-alanine, and the water content in the reaction mixture. The details were as follow.

TABLE 8.1

| Sample No. | *Stevia* extract reactant | Ratio of *Stevia* extract to DL-alanine (w:w) | Water content | Weight of stevioside 90 | Weight of DL-alanine | Volume of water |
|---|---|---|---|---|---|---|
| 8-1 | Stevioside 90 | 95:5 | 50% | 9.5 g | 0.5 g | 10 ml |
| 8-2 | Stevioside 90 | 90:10 | 50% | 9 g | 1 g | 10 ml |

Example 9

Preparation of MRPs from RA50 and Yeast Extract

RA50 (available from Sweet Green Fields) was dissolved together with Yeast Extract (available from Leiber GmbH, Germany) in deionized water, Sodium carbonate was added to the reaction mixture to adjust the pH to about 10. The solution was heated to about 100 degrees centigrade for about 2 hours. When the reaction was completed, the slurry was dried by spray dryer to provide an off white powder MRP.

Two MRPs in this Example were prepared with the parameters as follow.

TABLE 9.1

| Sample No. | *Stevia* extract reactant | Weight of *Stevia* extract | Weight of yeast extract | Ratio of *Stevia* extract to Yeast Extract (w:w) | Water content |
|---|---|---|---|---|---|
| 9-1 | RA 50 | 9.5 g | 0.5 g | 95:5 | 50% |
| 9-2 | RA 50 | 9 g | 1 g | 90:10 | 50% |

Example 10

Preparation of MRPs from RA 80 and Yeast Extract

RA80 was dissolved together with Yeast Extract (available from Leiber GmbH, Germany) in 10 ml deionized water. Sodium carbonate was added to the reaction mixture to adjust the pH to about 10. The solution was then heated at about 100 degrees centigrade for about 2 hours. When the reaction was complete, the slurry was dried by spray dryer to obtain an off white powder MRP.

Two RMPs in this Example were prepared with the parameters as follow:

TABLE 10.1

| Sample No. | *Stevia* extract reactant | Weight of *Stevia* extract | Weight of yeast extract | Ratio of *Stevia* extract to Yeast Extract (w:w) | Water content |
|---|---|---|---|---|---|
| 10-1 | RA80 | 9.5 g | 0.5 g | 95:5 | 50% |
| 10-2 | RA 80 | 9 g | 1 g | 90:10 | 50% |

Example 11

Preparation of MRPs from RA90/RD7 Alanine or Yeast Extract

A *Stevia* composition of RA 90% and RD 7% (available from Sweet Green Fields) was dissolved together with Yeast Extract (available from Leiber GmbH, Germany) or DL-alanine (available from Anhui Huaheng Biological Engineering Co., Ltd., China) in 10 ml deionized water. Sodium carbonate was added to the reaction mixture to adjust the pH to about 10. The solution was then heated at about 100 degrees centigrade for about 2 hours. When the reaction was complete, the slurry was dried by spray dryer to obtain an off white powder MRP, Four MRPs in this Example were prepared with the parameters as follow.

TABLE 11.1

| Sample No. | *Stevia* extract reactant | Weight of *Stevia* extract | Weight of DL-alanine | Ratio of *Stevia* extract to DL-alanine (w:w) | Water content |
|---|---|---|---|---|---|
| 11-1 | RA90/RD7 | 9.5 g | 0.5 g | 95:5 | 50% |
| 11-2 | RA90/RD7 | 9 g | 1 g | 90:10 | 50% |
| **Sample No.** | ***Stevia* extract reactant** | **Weight of *Stevia* extract** | **Weight of yeast extract** | **Ratio of *Stevia* extract to Yeast Extract (w:w)** | **Water content** |
| 11-3 | RA90/RD7 | 9.5 g | 0.5 g | 95:5 | 50% |
| 11-4 | RA90/RD7 | 9 g | 1 g | 90:10 | 50% |

Example 12

Preparation of MRPs from RA80/RB10/RD6 and Alanine or Yeast Extract

A *Stevia* composition of RA 80%, RB 10% and RD 6% (available from Sweet Green Fields) was dissolved together with Yeast Extract (available from Leiber GmbH, Germany) or DL-alanine (available from Anhui Huaheng Biological Engineering Co., Ltd., China) in 10 ml deionized water. Sodium carbonate was added to the reaction mixture to adjust the pH to about 10. The solution was heated at about 100 degrees centigrade for about 2 hours. When the reaction was complete, the slurry was dried by spray dryer to obtain an off white powder MRP.

Four MRPs in this Example were prepared with the parameters as follow.

TABLE 12.1

| Sample No. | *Stevia* extract reactant | Weight of *Stevia* extract | Weight of DL-alanine | Ratio of *Stevia* extract to DL-alanine (w:w) | Water content |
|---|---|---|---|---|---|
| 12-1 | RA80/RB10/RD6 | 9.5 g | 0.5 g | 95:5 | 50% |
| 12-2 | RA80/RB10/RD6 | 9 g | 1 g | 90:10 | 50% |
| **Sample No.** | ***Stevia* extract reactant** | **Weight of *Stevia* extract** | **Weight of yeast extract** | **Ratio of *Stevia* extract to Yeast Extract (w:w)** | **Water content** |
| 12-3 | RA80/RB10/RD6 | 9.5 g | 0.5 g | 95:5 | 50% |
| 12-4 | RA80/RB10/RD6 | 9 g | 1 g | 90:10 | 50% |

Example 13

Preparation of MRPs from RD6/TSG(40+)95 and Alanine or Yeast Extract

RD6/TSG(40+)95 (available from Sweet Green Fields) was dissolved together with Yeast Extract (available from Leiber GmbH, Germany) or DL-alanine (available from Anhui Huaheng Biological Engineering Co., Ltd., China) in 10 ml deionized water. Sodium carbonate was added to the reaction mixture to adjust the pH to about 10. The solution was heated at about 100 degrees centigrade for about 2 hours. When the reaction was complete, the slurry was dried by spray dryer to obtain the off white powder MRP.

The composition of RD6/TSG(40+)95 is depicted in more detail below:

Materials:

Reference standards for steviol glycosides (Reb A, Reb B, Reb C, Reb D, Reb E, Reb F, Reb G, Reb M, Reb N) were obtained from Chromadex (LGC Germany). Solvents and reagents (HPLC grade) were obtained from VWR (Vienna) or Sigma-Aldrich (Vienna).

Davisil Grade 633 (high-purity grade silica gel, pore size 60 Å, 200-425 mesh particle size was obtained from Sigma-Aldrich (Vienna).

Sample Preparation:

300 mg sample was dissolved in 20 ml Acetonitrile/$H_2O$=9/1 (v/v)

HPLC-Method:

The HPLC system consisted of an Agilent 1100 system (autosampler, ternary gradient pump, column thermostat, VWD-UV/VIS detector, DAD-UV/VIS detector) connected in-line to an Agilent mass spectrometer (ESI-MS quadrupole G1956A VL). For HPLC analysis 150 mg of the corresponding sample was dissolved in Acetonitrile (1 ml) and filled up to 10 ml with $H_2O$.

The samples were separated at 0.8 ml/min on a Phenomenex Synergi Hydro-RP (150×3 mm) followed by a Macherey-Nagel Nucleosil 100-7 C18 (250×4.6 mm) at 45° C. by gradient elution. Mobile Phase A consisted of a 0.01 molar NH4-Acetate buffer (native pH) with 0.1% acetic acid, 0.05% trimethylamine and 0.001% dichloromethane. Mobile Phase B consisted of 0.01 molar NH4-Acetate buffer (native pH) and Acetonitrile (1/9 v/v) with 0.1% acetic acid, 0.05% trimethylamine and 0.001% dichloromethane. The gradient started with 22% B, was increased linearly in 20 minutes to 45% B and kept at this condition for another 15 minutes. Injection volume was set to 10 μl.

The detectors were set to 210 nm (VWD), to 205 and 254 nm (DAD with spectra collection between 200-600 nm) and to EST negative mode TIC m/z 300-1500, Fragmentor 200, Gain 2 (MS, 300° C., nitrogen 12 l/min, nebulizer setting 50 psig. Capillary voltage 4500 V).

Detection at 210 nm was used to quantify the chromatograms, the MS-spectra were used to determine the molar mass and structural information of individual peaks. Detection at 254 nm was used to identify non-steviol glycoside peaks.

Identification and Quantification:

Steviol-glycosides were identified by comparison of retention times to authentic reference standards and/or by evaluation of the mass spectra obtained (including interpretation of the fragmentation pattern and double charged ions triggered by the presence of dichloromethane).

Steviol-glycosides were quantified against external standards. In case that no reference standard was available quantification was performed against Reb-A.

The maximum calibration range of reference standards was in a range 0.1-50 mg/10 ml (dissolved in Acetonitrile/$H_2O$=9/1 (v/v)).

TABLE 13.1

| Steviol glycosides sample (151.4 mg/10 ml) | | | |
|---|---|---|---|
| Name | m/z [M − H]⁻ | mg/10 ml | % m/m |
| Related steviol glycoside #1 | 517 or 427 | <0.01 | <0.01 |
| Related steviol glycoside #2 | 981.00 | <0.01 | <0.01 |
| Related steviol glycoside #3 | 427 or 735 | <0.01 | <0.01 |
| Related steviol glycoside #4 | 675 or 1127 | <0.01 | <0.01 |
| Related steviol glycoside #5 | 981 | 0.15 | 0.10 |
| Reb-V | 1259 | 0.71 | 0.47 |
| Reb-T | 1127 | 0.94 | 0.62 |
| Reb-E | 965 | 0.30 | 0.20 |
| Reb-O | 1435 | 1.39 | 0.92 |
| Reb-D | 1127 | 9.34 | 6.17 |
| Reb-K | 1111 | 4.98 | 3.29 |
| Reb-N | 1273 | <0.01 | <0.01 |
| Reb-M | 1289 | 0.28 | 0.19 |
| Reb-S | 949 | 1.85 | 1.22 |
| Reb-J | 1111 | 0.27 | 0.18 |
| Reb-W | 1097 | 0.40 | 0.27 |
| Reb-U2 | 1097 | 0.59 | 0.39 |
| Reb-W2/3 | 1097 | 0.27 | 0.18 |
| Reb-O2 | 965 | 0.21 | 0.14 |
| Reb-Y | 1259 | 0.46 | 0.31 |
| Reb-I | 1127 | 0.85 | 0.56 |
| Reb-V2 | 1259 | 0.67 | 0.44 |
| Reb-K2 | 1111 | 0.20 | 0.13 |
| Reb-H | 1111 | <0.01 | <0.01 |
| Reb-A | 965 | 43.90 | 29.00 |
| Stevioside | 803 | 44.06 | 29.10 |
| Reb-F | 935 | 4.65 | 3.07 |
| Reb-C | 949 | 16.80 | 11.09 |
| Dulcoside-A | 787 | 2.40 | 1.59 |
| Rubusoside | 641 | 3.15 | 2.08 |
| Reb-B | 803 | 1.91 | 1.26 |
| Dulcoside B | 787 | 0.62 | 0.41 |
| Steviolbioside | 641 | 2.32 | 1.54 |
| Reb-R | 935 | 0.27 | 0.18 |
| Reb-G | 803 | <0.01 | <0.01 |
| Stevioside-B | 787 | <0.01 | <0.01 |
| Reb-G1 | 641 | <0.01 | <0.01 |
| Reb-R1 | 773 | <0.01 | <0.01 |
| Reb-F1 | 773 | <0.01 | <0.01 |
| Iso-Steviolbioside | 641 | <0.01 | <0.01 |
| | Sum | 143.96 | 95.09 |

m/m refers to mass/mass

Four MRPs in this Example were prepared with the parameters as follow.

TABLE 13.2

| Sample No. | *Stevia* extract reactant | Weight of *Stevia* extract | Weight of DL-alanine | Ratio of *Stevia* extract to DL-alanine (w:w) | Water content |
|---|---|---|---|---|---|
| 13-1 | RD6/TSG(40+)95 | 9.7 g | 0.3 g | 97:3 | 50% |
| 13-2 | RD6/TSG(40+)95 | 9.5 g | 0.5 g | 95:5 | 50% |
| **Sample No.** | ***Stevia extract* reactant** | **Weight of *Stevia* extract** | **Weight of yeast extract** | **Ratio of *Stevia* extract to Yeast Extract (w:w)** | **Water content** |
| 13-3 | RD6/TSG(40+)95 | 9.7 g | 0.3 g | 97:3 | 50% |
| 13-4 | RD6/TSG(40+)95 | 9.5 g | 0.5 g | 95:5 | 50% |

Example 14

Preparation of MRPs from RA99 (with NaOH) and Yeast Extract 20 g RA99 (available from Sweet Green Fields) was dissolved together with 90 mg NaOH in 180 ml deionized water. The solution was heated to 85° C.-90° C. The reaction solution was stirred at that temperature for 1 hour. Then 0.3 g Yeast Extract (available from Leiber GmbH, Germany) was added. Stirring was continued at that temperature for another 2 hours. When the reaction was complete, the solution was dried by spray dryer to obtain an off white powder MRP. It contained 88% of RA, 6.6% of RB and 95.7% of TSG(9).

Example 15

Evaluate the Taste Profile of MRPs Compare to their Starting Materials

Test Method:

The samples were dissolved in deionized water with ultrasound at room temperature and left to equilibrate for 30 min. The concentrations of the solutions were all 500 ppm.

Panel: 4 Persons

For evaluation of the taste profile, the samples were tested by a panel of four people. I trained taster tasted independently the samples first The taster was asked to describe the taste profile and score 0-5 according to the increasing sugar like, bitterness, aftertaste and lingering taste profiles. The first taster was allowed to re-taste, and then make notes for the sensory attributes perceived. Afterwards, another 3 tasters tasted and the attributes were noted and discussed openly to find a suitable description. In case that more than 1 taster disagreed with the results, the tasting was repeated. For example, a "5" for sugar like is the best score for having a taste that is sugar like and conversely a value of 0 or near zero is not sugar like. Similarly, a "5" for bitterness, aftertaste and lingering is not desired. A value of zero or near zero means that the bitterness, aftertaste and/or lingering is reduced or is removed. This method can also be used in Example 18.

Result:

TABLE 15.1

| MRP of Example 1 comparing to RA97 | | | | | |
|---|---|---|---|---|---|
| sample | Taste profile description | Sugar like | Bitterness | aftertaste | lingering |
| RA97 | Bitter, flat, sweet lingering | 3 | 3 | 4 | 3 |
| MRP of Ex. 1 | Almost no bitterness, full mouth feel, caramel aroma | 4.5 | 0.5 | 1 | 2 |

TABLE 15.2

| MRP of Example 2 comparing to RA75/RB15 | | | | | |
|---|---|---|---|---|---|
| sample | Taste profile description | Sugar like | Bitterness | aftertaste | lingering |
| RA75/RB15 | flat, sweet lingering | 4 | 0.5 | 0.5 | 2 |
| MRP of Ex. 2 | full mouth feel, short sweet lingering, caramel aroma | 4.5 | 0.5 | 0 | 1 |

TABLE 15.3

Comparison of RA97, MRP of Example 3 and the blend of RA97 with MRP of Example 5 (99:1, w/w)

| sample | Taste profile description | Sugar like | Bitter-ness | after-taste | lingering |
|---|---|---|---|---|---|
| RA97 | Bitter, flat, sweet lingering | 3 | 3 | 4 | 3 |
| 3-1 | full mouth feel, no off-note | 4 | 0.5 | 0 | 2 |
| 3-2 | full mouth feel, no off-note | 4 | 0.5 | 0.5 | 2 |
| 3-3 | full mouth feel, a little bitter aftertaste | 4 | 0.5 | 1 | 2 |
| blend of RA97 with MRP of Ex. 5 (99:1, w/w) | More full mouth feel than RA97 but less than the MRPs of Ex 3, bitter aftertaste | 3.5 | 0.5 | 2 | 3 |

TABLE 15.4

Comparison of RA50, MRP of Ex. 4 and the blend of RA50 with MRP of Example 5 (99:1, w/w)

| sample | Taste profile description | Sugar like | Bitter-ness | after-taste | lingering |
|---|---|---|---|---|---|
| RA50 | Very bitter, bitter and licorice aftertaste, flat, strong sweet lingering | 2 | 4.5 | 4 | 4 |
| 4-1 | full mouth feel, a little bitter and licorice aftertaste | 3.5 | 1.5 | 2 | 3 |
| 4-2 | full mouth feel, less bitter but less sweet, short sweet lingering | 4 | 1 | 1 | 2 |
| 4-3 | full mouth feel, almost no bitterness, a little licorice aftertaste, short sweet lingering | 4 | 0.5 | 1 | 2 |
| blend of RA50 with MRP of Ex. 5 (99:1, w/w) | full mouth feel, a little bitter, obvious licorice aftertaste, sweet lingering | 3 | 1.5 | 3.5 | 3 |

TABLE 15.5

Comparison of GSG-RA20 to MRP of Example 6

| sample | Taste profile description | Sugar like | Bitterness | aftertaste | lingering |
|---|---|---|---|---|---|
| GSG-RA20 | flat, obviously licorice aftertaste, sweet lingering | 3.5 | 1 | 2 | 2 |
| MRP of Ex. 6 | Almost no licorice aftertaste, full mouth feel, caramel aroma | 4.5 | 0.5 | 1 | 2 |

TABLE 15.6

Comparison of RU90 to MRP of Example 7

| sample | Taste profile description | Sugar like | Bitterness | aftertaste | lingering |
|---|---|---|---|---|---|
| RU 90 | Very bitter, licorice aftertaste, sweet and bitter lingering | 2 | 5 | 3.5 | 3.5 |
| MRP of Ex. 7 | less bitterness, full mouth feel, caramel aroma, almost no licorice aftertaste | 3.5 | 2 | 1 | 2.5 |

TABLE 15.7

Comparison of STV90 to MRP of Example 8

| sample | Taste profile description | Sugar like | Bitterness | aftertaste | lingering |
|---|---|---|---|---|---|
| STV 90 | Bitter, licorice aftertaste, sweet and bitter lingering | 2 | 4.5 | 3.5 | 3.5 |
| MRP of Ex. 8 | less bitterness, full mouth feel, caramel aroma, almost no licorice aftertaste | 3.5 | 2 | 1.5 | 2 |

TABLE 15.8

Comparison of RA50 to MRPs of Example 9

| sample | Taste profile description | Sugar like | Bit-terness | aftertaste | lingering |
|---|---|---|---|---|---|
| RA50 | Very bitter, bitter and licorice aftertaste, flat, strong sweet lingering | 2 | 4.5 | 4 | 4 |
| 9-1 | full mouth feel, a pleasant aftertaste | 4 | 1 | 1 | 3 |
| 9-2 | Sweeter, full mouth feel, a very strong pleasant aftertaste, less lingering | 4.5 | 0.5 | 1 | 2 |

TABLE 15.9

Comparison of RA80 to MRPs of Example 10

| sample | Taste profile description | Sugar like | Bitterness | aftertaste | lingering |
|---|---|---|---|---|---|
| RA80 | Bitter; bitter and licorice aftertaste; flat; sweet lingering | 2 | 4 | 3.5 | 4 |
| 10-1 | full mouth feel pleasant aftertaste short lingering | 4 | 0.5 | 1 | 2.5 |
| 10-2 | Sweeter full mouth feel very strong pleasant barbecue flavor less lingering | 4.5 | 0.5 | 1 | 2 |

TABLE 15.10

| Comparison of RA90/RD7 to MRPs of Example 11 | | | | | |
|---|---|---|---|---|---|
| sample | Taste profile description | Sugar like | Bitterness | aftertaste | lingering |
| RA90/RD7 | Fruit aftertaste; flat; sweet lingering | 4 | 0.5 | 3 | 3 |
| 11-1 | full mouth feel caramel aroma short lingering | 4 | 0.5 | 1 | 2 |
| 11-2 | full mouth feel caramel aroma less lingering | 4 | 0.5 | 1 | 2 |
| 11-3 | full mouth feel umami aroma short lingering | 4.5 | 0 | 1 | 1.5 |
| 11-4 | Sweeter full mouth feel very strong pleasant barbecue flavor less lingering | 4.5 | 0 | 1 | 1 |

TABLE 15.11

| Comparison of RA80/RB10/RD6 to MRPs of Example 12 | | | | | |
|---|---|---|---|---|---|
| sample | Taste profile description | Sugar like | Bitterness | aftertaste | lingering |
| RA80/RB10/RD6 | flat; sweet lingering | 4 | 0.5 | 2 | 2 |
| 12-1 | full mouth feel caramel aroma short lingering | 4.5 | 0 | 1 | 1.5 |
| 12-2 | full mouth feel caramel aroma less lingering | 4.5 | 0 | 1 | 1 |
| 12-3 | full mouth feel umami aroma short lingering | 4.5 | 0 | 1 | 1.5 |
| 12-4 | Sweeter full mouth feel very strong pleasant barbecue flavor less lingering | 4.5 | 0 | 1 | 1 |

TABLE 15.12

| Comparison of RD6/TSG(40+)95 to MRPs of Example 13 | | | | | |
|---|---|---|---|---|---|
| sample | Taste profile description | Sugar like | Bitterness | after-taste | lingering |
| RD6/TSG(40+)95 | Less sweet; flat; strong herbal aftertaste; sweet lingering | 3 | 0.5 | 3 | 2 |
| 13-1 | full mouth feel less herbal aftertaste caramel aroma short lingering | 4 | 0 | 2 | 1.5 |
| 13-2 | full mouth feel almost no herbal aftertaste caramel aroma less lingering | 4 | 0 | 1.5 | 1 |

TABLE 15.12-continued

| Comparison of RD6/TSG(40+)95 to MRPs of Example 13 | | | | | |
|---|---|---|---|---|---|
| sample | Taste profile description | Sugar like | Bitterness | after-taste | lingering |
| 13-3 | full mouth feel no herbal aftertaste umami aroma short lingering | 4 | 0 | 1.5 | 1.5 |
| 13-4 | Sweeter full mouth feel no herbal aftertaste strong umami aroma less lingering | 4.5 | 0 | 1 | 1 |

TABLE 15.13

| MRP of Example 14 comparing to RA75/RB15 | | | | | |
|---|---|---|---|---|---|
| Sample | Taste profile description | Sugar like | Bitterness | aftertaste | lingering |
| RA75/RB15 | Flat; sweet lingering | 4 | 0.5 | 0.5 | 2 |
| MRP of Ex. 14 | Very sugar like; full mouth feel; sweeter; | 4.5 | 0 | 1.5 | 1 |

Conclusion:

The taste profile of *Stevia* extract components can be improved by Maillard reaction. It provides the *Stevia* component with full mouth feel, decreased or eliminated bitterness and a shortened sweet lingering.

Example 16

Evaluate the Taste Profile of MRPs Before and After the Reaction

*Stevia* Extract Material:

W6/TSG(40+)95, available from Sweet Green Fields.

RA99: contain 99,36% of Reb A, available from Sweet Green Fields.

Procedure: *Stevia* extract material was dissolved together with amino acid and/or sugar donor in deionized water. Sodium carbonate was added to the reaction mixture to adjust the pH to about 8. The solution was heated at about 100 degrees centigrade for about 2 hours. When the reaction was completed, the slurry was dried by spray dryer to provide an off white powder MRP.

Several MRPs in this Example were prepared. The parameters and the taste profiles of the products are as follow in the following table.

TABLE 16.1

| Sample # | *Stevia* extract material/weight | Amino acid Type/weight | Amino acid Weight ratio to *Stevia* extract | sugar donor Type/weight | sugar donor Weight ratio to *Stevia* extract | Water in reaction mixture | Taste profile (after reaction compared with before reaction)** |
|---|---|---|---|---|---|---|---|
| 16-1 | RA99/9.5 g | Phenylalanine/0.5 g | 5:95 | — | — | 10 ml | 1. Increased sweetness; 2. Violet flavor |
| 16-2 | RA99/9.5 g | lysine/0.5 g | 5:95 | — | — | 10 ml | 1. Toast flavor; 2. A little more bitter |
| 16-3 | RA99/9.5 g | glutamate/0.5 g | 5:95 | — | — | 10 ml | 1. Full mouth feel 2. Less sweet lingering 3. Little bit bitter |
| 16-4 | RA99/9.5 g | Alanine/0.25 g | 2.5:95 | Glucose/0.25 g | 2.5:95 | 10 ml | 1. Full mouth feel 2. Less sweet lingering 3. Quick onsite |
| 16-5 | RA99/9.5 g | Alanine/0.25 g | 2.5:95 | Galactose/0.25 g | 2.5:95 | 10 ml | 1. Full mouth feel 2. Less sweet lingering 3. Quick onsite |
| 16-6 | RA99/9.5 g | Alanine/0.25 g | 2.5:95 | Mannose/0.25 g | 2.5:95 | 10 ml | 1. Full mouth feel 2. Less sweet lingering 3. Quick onsite |
| 16-7 | RA99/9.5 g | Alanine/0.25 g | 2.5:95 | Xylose/0.25 g | 2.5:95 | 10 ml | 1. Full mouth feel 2. Less sweet lingering 3. Quick onsite |
| 16-8 | RA99/9.5 g | Alanine/0.17 g | 1.7:95 | Glucose/0.33 g | 3.3:95 | 10 ml | 1. Full mouth feel 2. Less sweet lingering 3. Quick onsite |
| 16-9 | RA99/9.5 g | Alanine/0.125 g | 1.25:95 | Glucose/0.375 g | 3.75:95 | 10 ml | 1. Increased sweetness; 2. Full mouth feel 3. Quick onsite |
| 16-10 | RD6/TSG(40+)95/9 g | Alanine/0.33 g | 3.3:90 | Glucose/0.67 g | 6.7:90 | 5 ml | 1. Full mouth feel 2. Pleasant herbal smell and taste |
| 16-11 | RD6/TSG(40+)95/ 9.6 g | Phenylalanine/0.4 g | 4:96 | — | — | 5 ml | 1. Violet flavor 2. Full mouth feel |
| 16-12 | RD6/TSG(40+)95/9 g | Phenylalanine/ 0.33 g | 3.3:90 | Glucose/0.67 g | 6.7:90 | 5 ml | 1. Violet flavor, more intense than 16-9 2. Full mouth feel |
| 16-13 | RD6/TSG(40+)95/9 g | lysine/0.33 g | 3.3:90 | glucose/0.67 g | 6.7:90 | 5 ml | 1. Nut flavor 2. Full mouth feel 3. Less sweet lingering |
| 16-14 | RD6/TSG(40+)95/9 g | Glutamic acid/0.33 g | 3.3:90 | glucose/0.67 g | 6.7:90 | 5 ml | 1. Jasmine flavor 2. Full mouth feel 3. Less sweet lingering |
| 16-15 | RD6/TSG(40+)95/9 g | threonine/0.33 g | 3.3:90 | glucose/0.67 g | 6.7:90 | 5 ml | 1. Caramel flavor 2. Full mouth feel 3. Less sweet lingering |
| 16-16 | RD6/TSG95(40+)/9 g | valine/0.33 g | 3.3:90 | glucose/0.67 g | 6.7:90 | 5 ml | 1. Full mouth feel 2. Less sweet lingering |

Taste and smell were evaluated under following conditions: room temperature (around 25 centigrade), neutral water, 500 ppm of test material, each sample tested two times. Method: I trained taster tasted independently the samples first. The taster was allowed to re-taste, and then made notes for the sensory attributes perceived. Afterwards, another 3 tasters tasted and the attributes were noted and discussed openly to find a suitable description. In case that more than 1 taster disagreed with the result, the tasting was repeated. This method was also used in Examples 16, 17, 20, 21, 24, 26-28.

Example 17

Evaluate the Taste Profile of MRPs Compared to Their Starting Materials

Monk Fruit Extract Materials:

Mogroside V 25%: contains 25.56% of Mogroside V, available from Hunan Huacheng Biotech, Inc., China; Mogroside V 60%: contain 60.18% of Mogroside V, available from Hunan Huacheng Biotech, Inc., China.

Common process: Monk fruit extract material was dissolved together with amino acid in deionized water. 10 ml deionized water was added to make the solid contents of the reaction to 50%. Sodium carbonate was added to the reaction mixture to adjust the pH to about 10. The solution was then heated at about 100 degrees centigrade for about 2 hours. When the reaction was completed, the slurry was dried by spray dryer to provide an off white powder MRP.

Several MRPs in this Example were prepared. The parameters and the taste profile of the products are as follow (taste profile compared with initial Monk Fruit extract). The test procedure was that as described in Example 16.

TABLE 17.1

| Results | | | | |
|---|---|---|---|---|
| Sample # | Monk fruit extract material/weight | Amino acid Type/weight | Amino acid Weight ratio to Monk fruit extract | Taste profile |
| 17-1 | Mogroside V 25%/9.5 g | Alanine/0.5 g | 5:95 | 1. Full mouth feel; 2. Caramel 3. Reduced sweet lingering |

TABLE 17.1-continued

| Results | | | | |
|---|---|---|---|---|
| | | Amino acid | | |
| Sample # | Monk fruit extract material/weight | Type/weight | Weight ratio to Monk fruit extract | Taste profile |
| 17-2 | Mogroside V 25%/9 g | Alanine/1 g | 10:90 | 1. Full mouth feel; 2. Caramel richer than 17-1 3. Reduced sweet lingering |
| 17-3 | Mogroside V 60%/9.5 g | Alanine/0.5 g | 5:95 | 1. Full mouth feel 2. Reduced sweet lingering 3. less bitter than material 4. Caramel |
| 17-4 | Mogroside V 60%/9 g | Alanine/1 g | 10:90 | 1. Full mouth feel 2. Reduced sweet lingering 3. less bitter than material 4. Caramel richer than 17-3 |

Example 18

Evaluation of the Taste Profiles of MRPs Compared to Their Starting Material Materials: RA99 (contains 99.1% of Reb A), RD90 (contains 93.1% of Reb D) and RM90 (contains 93.1% of Reb M) are all available from Sweet Green Fields.

Common process: *Stevia* extract material was dissolved together with an amino acid in deionized water. 10 ml deionized water was added to make the solid contents of the reaction to 50%. Sodium carbonate was added to the reaction mixture to adjust the pH to about 10. The solution was then heated at about 100 degrees centigrade for about 2 hours. When the reaction was completed, the slurry was dried by spray dryer to provide an off white powder MRP.

Several MRPs in this Example were prepared. The parameters and the taste profile of the products are as follow. (Taste profile is compared with initial steviol glycosides). The test procedure was the same as that of Example 16.

TABLE 18.1

| Results | | | | |
|---|---|---|---|---|
| | | Amino acid | | |
| Sample # | *Stevia* extract material/weight | Type/weight | Weight ratio to Monk fruit extract | Taste profile |
| 18-1 | RD90/9.5 g | Alanine/0.5 g | 5:95 | 1. Full mouth feel; 2. Caramel 3. Reduced sweet lingering |
| 18-2 | Blend of RD90 and RM90 with the ratio of 9:1/9.5 g | Alanine/0.5 g | 5:95 | 1. Full mouth feel; 2. Caramel 3. Reduced sweet lingering 4. Reduced aftertaste |
| 18-3 | Blend of RA99, RD90 and RM90 with the ratio of 1:8.1:0.9/9.5 g | Alanine/0.5 g | 5:95 | 1. Full mouth feel 2. Reduced sweet lingering 3. Caramel |
| 18-4 | Blend of RA99, RD90 and RM90 with the ratio of 4:5.4:0.6/9.5 g | alanine/0.5 g | 5:95 | 1. Full mouth feel 2. Reduced sweet lingering 3. Caramel |

Example 19

Evaluation of the Improvement Effects of MRPs to Common *Stevia* Extract Products Materials:

MRP—Product of Example 16-1

*Stevia* extract—RA97 (Available from Sweet Green Fields)

TABLE 19.1

| Samples | | |
|---|---|---|
| | composition | |
| Sample # | MRP | RA97 |
| control | | 500 ppm |
| 19-1 | 475 ppm | 25 ppm |
| 19-2 | 450 ppm | 50 ppm |
| 19-3 | 350 ppm | 150 ppm |

Evaluation of the taste profile of the samples according to the method used in Example 15, The test results were as follow.

TABLE 19.2

| Taste profiles | | | | | |
|---|---|---|---|---|---|
| sample | Taste profile description | Sugar like | Bitterness | aftertaste | lingering |
| control | Bitter, flat, sweet lingering | 3 | 3 | 4 | 3 |
| 19-1 | 1. A little fragrance of a flower 2. Less bitter and less aftertaste | 4 | 1.5 | 2 | 2 |
| 19-2 | 1. full mouth feel 2. fragrance of violet flower 3. less bitter 4. reduced sweet lingering | 4 | 0.5 | 0.5 | 1 |
| 19-3 | 1. full mouth feel 2. strong fragrance of violet flower 3. less bitter 4. reduced sweet lingering | 4.5 | 0.5 | 0 | 0.5 |

Conclusion: MRP can improve the taste profile of the common *Stevia* extract significantly. It can give special flavor, improve the mouth feel and reduce the bitter and sweet lingering.

Example 20

Comparison of Steviol Glycoside Composition Before and After Maillard Reaction

Materials:

Reference standards for steviol glycosides (Reb A, Reb B, Reb C, Reb D, Reb E, Reb F, Reb G, Reb M, Reb N) were obtained from Chromadex (LGC Germany). Solvents and reagents (HPLC grade) were obtained from VWR (Vienna) or Sigma-Aldrich (Vienna).

Davisil Grade 633 (high-purity grade silica gel, pore size 60 Å, 200-425 mesh particle size was obtained from Sigma-Aldrich (Vienna).

Sample Preparation:

300 mg sample was dissolved in 20 ml Acetonitrile/$H_2O$=9/1 (v/v).

HPLC-Method:

The HPLC system consisted of an Agilent 1100 system (autosampler, ternary gradient pump, column thermostat, VWD-UV/VIS detector, DAD-UV/VIS detector) connected in-line to an Agilent mass spectrometer (ESI-MS quadrupole G1956A. VL). For HPLC analysis 150 mg of the corresponding sample was dissolved in Acetonitrile (1 ml) and filled up to 10 ml with $H_2O$.

The samples were separated at 0.8 ml/min on a Phenomenex Synergi Hydro-RP (150×3 mm) followed by a Macherey-Nagel Nucleosil 100-7 C18 (250×4.6 mm) at 45° C. by gradient elution. Mobile Phase A consisted of a 0.01 molar $NH_4$-Acetate buffer (native pH) with 0.1% acetic acid, 0.05% trimethylamine and 0.001% dichloromethane. Mobile Phase B consisted of 0.01 molar $NH_4$-Acetate buffer (native pH) and Acetonitrile (1/9 v/v) with 0.1% acetic acid, 0.05% trimethylamine and 0.001% dichloromethane. The gradient started with 22% B, was increased linearly in 2.0 minutes to 45% B and kept at this condition for another 15 minutes. Injection volume was set to 10 μl.

The detectors were set to 210 nm (VWD), to 205 and 254 nm (DAD with spectra collection between 200-600 nm) and to ESI negative mode TIC m/z 300-1500, Fragmentor 200, Gain 2 (MS, 300° C., nitrogen 12 l/min, nebulizer setting 50 psig. Capillary voltage 4500 V).

Detection at 210 nm was used to quantify the chromatograms, the MS-spectra were used to determine the molar mass and structural information of individual peaks. Detection at 254 nm was used to identify non-steviol glycoside peaks.

Identification and Quantification:

Steviol-glycosides were identified by comparison of retention times to authentic reference standards and/or by evaluation of the mass spectra obtained (including interpretation of the fragmentation pattern and double charged ions triggered by the presence of dichloromethane).

Steviol-glycosides were quantified against external standards. In case that no reference standard was available quantification was performed against Reb-A.

The maximum calibration range of reference standards was in a range 0.1-50 mg/10 ml (dissolved in Acetonitrile/$H_2O$=9/1 (v/v)).

The Tables 20.1 and 20.2 provide detailed data evaluation and quantification of steviol-glycosides in all *Stevia* extract of Example 37 as tested. Peaks without structural information are not shown.

TABLE 20.1

RA50 after Maillard Reaction.

| Name | m/z [M − H]⁻ | mg/10 ml | % m/m |
|---|---|---|---|
| Related steviol glycoside #1 | 517 or 427 | <0.01 | <0.01 |
| Related steviol glycoside #2 | 981 | <0.01 | <0.01 |
| Related steviol glycoside #3 | 427 or 735 | <0.01 | <0.01 |
| Related steviol glycoside #4 | 675 or 1127 | 0.54 | 0.336 |
| Related steviol glycoside #5 | 981 | 2.35 | 1.457 |
| Reb-V | 1259 | <0.01 | <0.01 |
| Reb-T | 1127 | <0.01 | <0.01 |
| Reb-E | 965 | 1.01 | 0.625 |
| Reb-O | 1435 | 0.44 | 0.275 |
| Reb-D | 1127 | 2.05 | 1.268 |
| Reb-K | 1111 | 0.10 | 0.060 |
| Reb-N | 1273 | 0.16 | 0.097 |
| Reb-M | 1289 | 0.09 | 0.054 |
| Reb-S | 949 | 0.19 | 0.118 |
| Reb-J | 1111 | <0.01 | <0.01 |
| Reb-W | 1097 | <0.01 | <0.01 |
| Reb-U2 | 1097 | 0.05 | 0.031 |
| Reb-W2/3 | 1097 | 0.19 | 0.119 |
| Reb-O2 | 965 | 0.18 | 0.112 |
| Reb-Y | 1259 | <0.01 | <0.01 |
| Reb-I | 1127 | <0.01 | <0.01 |
| Reb-V2 | 1259 | <0.01 | <0.01 |
| Reb-K2 | 1111 | <0.01 | <0.01 |
| Reb-H | 1111 | <0.01 | <0.01 |
| Reb-A | 965 | 69.53 | 43.054 |
| Stevioside | 803 | 48.01 | 29.730 |
| Reb-F | 935 | 1.52 | 0.942 |
| Reb-C | 949 | 8.60 | 5.322 |
| Dulcoside-A | 787 | 0.32 | 0.197 |
| Rubusoside | 641 | 0.80 | 0.495 |
| Reb-B | 803 | 6.34 | 3.925 |
| Dulcoside B | 787 | 0.90 | 0.555 |
| Steviolbioside | 641 | 1.16 | 0.719 |
| Reb-R | 935 | 0.03 | 0.020 |
| Reb-G | 803 | 0.21 | 0.131 |
| Stevioside-B | 787 | 0.77 | 0.475 |
| Reb-G1 | 641 | 0.23 | 0.144 |
| Reb-R1 | 773 | 1.74 | 1.080 |
| Reb-F1 | 773 | <0.01 | <0.01 |
| Iso-Steviolbioside | 641 | <0.01 | <0.01 |
| | Sum | 147.52 | 91.34 |

TABLE 20.2

Typical Steviol glycosides in RA50

| Name | m/z [M − H]⁻ | mg/10 ml | % m/m |
|---|---|---|---|
| Related steviol glycoside #1 | 517 or 427 | <0.01 | <0.01 |
| Related steviol glycoside #2 | 981 | 0.23 | 0.130 |
| Related steviol glycoside #3 | 427 or 735 | 0.27 | 0.151 |
| Related steviol glycoside #4 | 675 or 1127 | 0.07 | 0.037 |
| Related steviol glycoside #5 | 981 | 2.23 | 1.242 |
| Reb-V | 1259 | <0.01 | <0.01 |
| Reb-T | 1127 | <0.01 | <0.01 |
| Reb-E | 965 | 0.87 | 0.487 |
| Reb-O | 1435 | 0.02 | 0.009 |
| Reb-D | 1127 | 2.63 | 1.464 |
| Reb-K | 1111 | 0.06 | 0.035 |
| Reb-N | 1273 | 0.03 | 0.014 |
| Reb-M | 1289 | 0.07 | 0.038 |
| Reb-S | 949 | 0.00 | -0.002 |
| Reb-J | 1111 | 0.05 | 0.028 |
| Reb-W | 1097 | 0.13 | 0.074 |
| Reb-U2 | 1097 | <0.01 | <0.01 |
| Reb-W2/3 | 1097 | <0.01 | <0.01 |

TABLE 20.2-continued

| Typical Steviol glycosides in RA50 | | | |
|---|---|---|---|
| Name | m/z [M − H]⁻ | mg/10 ml | % m/m |
| Reb-O2 | 965 | 0.08 | 0.047 |
| Reb-Y | 1259 | 0.09 | 0.050 |
| Reb-I | 1127 | <0.01 | <0.01 |
| Reb-V2 | 1259 | <0.01 | <0.01 |
| Reb-K2 | 1111 | 1.19 | 0.661 |
| Reb-H | 1111 | <0.01 | <0.01 |
| Reb-A | 965 | 91.72 | 51.041 |
| Stevioside | 803 | 55.43 | 30.844 |
| Reb-F | 935 | 0.15 | 0.086 |
| Reb-C | 949 | 7.40 | 4.118 |
| Dulcoside-A | 787 | 0.45 | 0.248 |
| Rubusoside | 641 | 0.47 | 0.260 |
| Reb-B | 803 | 4.02 | 2.239 |
| Dulcoside B | 787 | 0.65 | 0.362 |
| Steviolbioside | 641 | 0.96 | 0.531 |
| Reb-R | 935 | 0.01 | 0.005 |
| Reb-G | 803 | 0.23 | 0.128 |
| Stevioside-B | 787 | 0.94 | 0.526 |
| Reb-G1 | 641 | <0.01 | <0.01 |
| Reb-R1 | 773 | 1.39 | 0.771 |
| Reb-F1 | 773 | <0.01 | <0.01 |
| Iso-Steviolbioside | 641 | 0.23 | 0.130 |
| | Sum | 171.33 | 95.34 |

Example 21

Evaluation of the Taste Profiles of MRPs Compared to Their Starting Material

*Stevia* Extract Material:

RD6/TSG(40+)95: available from Sweet Green Fields;

Common process: *Stevia* extract material RD6/TSG(40+)95 was dissolved together with an amino acid and a reducing sugar in deionized water. Sodium carbonate was added to the reaction mixture to adjust the pH to about 8. The solution was then heated at about 100 degrees centigrade for about 2 hours. When the reaction was completed, the slurry was dried by spray dryer to afford an off white powder MRP.

Several MRPs in this Example were prepared. The parameters and the taste profile of the products are as follow. The test procedure was the same as that of Example 16.

TABLE 21.1

| | | Amino acid | | reducing sugar | | | |
|---|---|---|---|---|---|---|---|
| Sample # | Weight of *Stevia* extract | Type/weight | Weight ratio to *Stevia* extract | Type/weight | Weight ratio to *Stevia* extract | Water in reaction mixture | Taste profile |
| 21-1 | 9.5 g | Valine/0.17 g | 1.7:95 | Fructose/0.33 g | 3.3:95 | 5 ml | 1. Full mouth feel; 2. caramel |
| 21-2 | 9.5 g | glutamic acid/0.17 g | 1.7:95 | Fructose/0.33 g | 3.3:95 | 5 ml | 1. Quick onsite; 2. Orange flavor |
| 21-3 | 9.5 g | Aspartic acid/0.17 g | 1.7:95 | Fructose/0.33 g | 3.3:95 | 5 ml | 1. Full mouth feel; 2. Very sugar-like |
| 21-4 | 9.5 g | Phenylalanine/0.17 g | 1.7:95 | Fructose/0.33 g | 3.3:95 | 5 ml | 1. Quick onsite; 2. Reduced sweet lingering; 3. Fragrance of flowers |
| 21-5 | 9.5 g | Lysine/0.17 g | 1.7:95 | Fructose/0.33 g | 3.3:95 | 5 ml | 1. Quick onsite; 2. Toast flavor |
| 21-6 | 9.5 g | glutamic acid/0.17 g | 1.7:95 | Rhamnose/0.33 g | 3.3:95 | 5 ml | 1. Full mouth feel 2. Caramel flavor 3. Fruity flavor |
| 21-7 | 9.5 g | Lysine/0.17 g | 1.7:95 | Rhamnose/0.33 g | 3.3:95 | 5 ml | 1. Full mouth feel; 2. Barbecue flavor |
| 21-8 | 8.5 g | Phenylalanine/0.7 g | 7:85 | Galactose/0.8 g | 8:85 | 3.3 ml | Violet flavor |
| 21-9 | 8.5 g | glutamic acid/0.7 g | 7:85 | Galactose/0.8 g | 8:85 | 3.3 ml | 1. Fragrance of flowers; 2. Lemon flavor |
| 21-10 | 7.4 g | glutamic acid/1.1 g | 11:74 | Galactose/1.5 g | 15:74 | 3 ml | Fruity flavor |
| 21-11 | 8.5 g | Valine/0.7 g | 7:85 | Galactose/0.8 g | 8:85 | 3.3 ml | Caramel flavor |

TABLE 21.1-continued

| Sample # | Weight of *Stevia* extract | Amino acid Type/weight | Amino acid Weight ratio to *Stevia* extract | reducing sugar Type/weight | reducing sugar Weight ratio to *Stevia* extract | Water in reaction mixture | Taste profile |
|---|---|---|---|---|---|---|---|
| 21-12 | 8.5 g | Phenylalanine/0.7 g | 7:85 | Lactose/0.8 g | 8:85 | 3.3 ml | 1. Fragrance of flowers; 2. Green tea flavor |
| 21-13 | 8.5 g | glutamic acid/0.7 g | 7:85 | Lactose/0.8 g | 8:85 | 3.3 ml | Orange flavor |
| 21-14 | 8.5 g | Valine/0.7 g | 7:85 | Lactose/0.8 g | 8:85 | 3.3 ml | Caramel flavor |
| 21-15 | 8.5 g | Phenylalanine/0.7 g | 7:85 | Mannose/0.8 g | 8:85 | 3.3 ml | Nectar flavor |
| 21-16 | 8.5 g | Lysine/0.7 g | 7:85 | Mannose/0.8 g | 8:85 | 3.3 ml | Peach flavor |
| 21-17 | 8.5 g | Valine/0.7 g | 7:85 | Mannose/0.8 g | 8:85 | 3.3 ml | Jujube flavor |

Example 22

Evaluation of Taste Profiles of MRPs in Different Concentration

Different concentrations of MRP samples were prepared from *Stevia* extract: RD6/TSG(40-+)95 and then evaluated for their flavor. The parameters and result are as follow.

The MRP sample is the product of Sample 21-8, 21-9, 21-11 and 21-15.

TABLE 22.1

| | EX. 21-8 | EX. 21-9 | EX. 21-11 | EX. 21-15 |
|---|---|---|---|---|
| 50 ppm | No flavor | Slight fragrance | Slight caramel flavor | — |
| 100 ppm | Slight violet flavor | Fragrance of flowers | Slight caramel flavor | Slight violet and caramel flavor |
| 500 ppm | Thick lilac flower flavor | Nectar flavor | Caramel flavor | Nectar flavor; Reduced sweet lingering |
| 1000 ppm | Rose flavor | Lemon flavor | Chocolate flavor | Thick nectar flavor; More sweet |
| 2000 ppm | — | — | — | Thick nectar flavor; More sweet; A little bitter |
| 3000 ppm | — | — | — | Very thick nectar flavor; More sweet; A litter bitter |

This demonstrates that the identical MRP at different concentrations can provide different flavors.

It was found that even for same MRP, different concentrations can provide different flavors. The test method was the same as that of Example 16.

Example 23

Preparation of MRP from Sucralose, Phenylalanine and Galactose 10 g of sucralose (available from ANHUI JINHE INDUSTRIAL CO., LTD, China) was dissolved together with 1, phenylalanine and 0.8 g galactose in 4 g deionized water. Sodium carbonate was added to the reaction mixture to adjust the pH to about 8. The solution was heated. at about 100 degrees centigrade for about 2 hours. When the reaction was completed, the slurry was dried by spray dryer to provide an off white powder MRP. Compared to unreacted sucralose, the MRP provided thick violet flavor as well as a reduction of the sweet lingering.

Example 24

Preparation of MRP from RD6/TSG(40+)95, Amino Acid Blend and Reducing Sugar Blend 3.8 g RD6/TSG(40+)95 was dissolved together with an amino acid blend (mixture of 0.1 g lysine, 0.1 g alanine, 0.1 g serine, 0.1 g glycine and 0.1 g threonine) and a reducing sugar blend (mixture of 0.2 g glucose and 0.6 g fructose) in deionized water. The solution was heated at about 100 degrees centigrade for about 2 hours. When the reaction was completed, the slurry was dried by spray dryer to provide an off white powder MRP.

The MRP prepared in this Example gave a pleasant nut flavor.

Example 25

Comparison of the Taste Profiles of MRPs Plus Sugar to Sugar

Enough citric acid was dissolved in deionized water to obtain a solution with pH 3.0. The solution was used to dissolve sugar and several MRPs prepared in above examples obtain several solutions as shown in the table below.

TABLE 25.1

| | | concentration | |
|---|---|---|---|
| Solution# | MRP used | sugar | MRP |
| 1 | — | 10% | — |
| 2 | EX. 16-10 | 5% | 700 ppm |
| 3 | EX. 21-15 | 5% | 700 ppm |
| 4 | EX. 21-9 | 5% | 700 ppm |
| 5 | EX. 21-11 | 5% | 700 ppm |
| 6 | EX. 24 | 5% | 700 ppm |

The sugar solution (solution 1) was used as a control. A panel including 8 persons was asked to taste the solutions and make a comparison between each of solutions 2. through 6 in comparison to solution 1. The panel evaluated the sweetness, described the taste and mouth feel and chose which solution(s) performed best. The results are as follow:

TABLE 25.2

| | sweetness | | | | favorite | |
|---|---|---|---|---|---|---|
| Solution# | Less than solution 1 | Same as solution 1 | More than solution 1 | Taste Description | control | MRP |
| 2 | 0 | 4 | 4 | 1. Very full body 2. Obvious violet note and taste 3. No bitter | 0 | 8 |
| 3 | 0 | 3 | 5 | 1. Very full body 2. Nectar flavor 3. plum mouth feel 4. no bitter | 0 | 8 |
| 4 | 0 | 3 | 5 | 1. Very full body 2. Fruity taste; 3. Orange note and taste | 0 | 8 |
| 5 | 0 | 4 | 4 | 1. Very full body 2. Caramel taste 3. Obvious toffee taste 4. A little bitter | 1 | 7 |
| 6 | 0 | 4 | 4 | 1. Very full body 2. Fried nut taste | 3 | 5 |

It can be concluded that MRPs can reduce the usage of sugar by 50% or more without losing any good mouth feel, even when the total sugar equivalence (SE) reaches up to 11.0%-11%. The MRPs can give other pleasant notes and tastes, which makes the taste of sugar reduction products better than that of sugar.

Example 26

Taste Profiles of MRPs from RA90/RD7, Amino Acid and/or Vitamin C and Reducing Sugar

*Stevia* Extract Material:

RA90/RD7: available from Sweet Green Fields.

General process for Samples 26-1 through 26-18:

5 g *Stevia* extract material was dissolved with 0.1 g amino acid and/or vitamin C and 0.1 g of a reducing sugar in 5 g deionized water. The solution was then heated at about 100 degrees centigrade for about 2 hours. When the reaction was completed, the slurry was dried by spray dryer to provide an off white powdered MRP. The test method was the same as that of Example 16.

TABLE 26.1

The parameters and the taste profiles of the products.

| Sample # | Amino acid and/or vitamin C | reducing sugar | Taste profile |
|---|---|---|---|
| 26-1 | Phenylalanine | Lactose | Violet flavor |
| 26-2 | Valine | Lactose | Caramel flavor |
| 26-3 | Glutamic acid | Lactose | acid |
| 26-4 | Tryptophan | Lactose | No other flavor, just sweet |
| 26-5 | Proline | Lactose | woody |
| 26-6 | Vitamin C | Lactose | Slight chocolate flavor; Milky aftertaste |
| 26-7 | Phenylalanine | Galactose | Violet flavor |
| 26-8 | glutamic acid | Galactose | acid |
| 26-9 | Valine | Galactose | Toast flavor |
| 26-10 | Tryptophan | Galactose | No other flavor, just sweet |
| 26-11 | Phenylalanine | Mannose | Nectar |
| 26-12 | Glutamic acid | Mannose | No other flavor, just sweet |

TABLE 26.1-continued

The parameters and the taste profiles of the products.

| Sample # | Amino acid and/or vitamin C | reducing sugar | Taste profile |
|---|---|---|---|
| 26-13 | Valine | Mannose | Toast flavor |
| 26-14 | Tryptophan | Mannose | No other flavor, just sweet |
| 26-15 | Phenylalanine | Rhamnose | Fruity |
| 26-16 | Glutamic acid | Rhamnose | Roast barley flavor |
| 26-17 | Valine | Rhamnose | Caramel flavor |
| 26-18 | Tryptophan | Rhamnose | No other flavor, just sweet |

Example 27

Comparison of the Taste Profiles of MRPs Plus Sugar and Thaumatin to Sugar

Enough citric acid was dissolved in deionized water to obtain a solution with pH 3.0. The solution was used to dissolve sugar, thaumatin (available from Sweet Green Fields) and an MRP prepared in Example 26-1 to make several solutions as shown in the table below.

TABLE 27.1

| | | concentration | | |
|---|---|---|---|---|
| Solution# | MRP used | sugar | MRP | Thaumatin |
| 1 | — | 10% | — | — |
| 2 | EX. 26-1 | — | 1000 ppm | — |
| 3 | EX. 26-1 | — | 800 ppm | 0.5 ppm |
| 4 | EX. 26-1 | — | 600 ppm | 1 ppm |
| 5 | EX. 26-1 | 2% | 500 ppm | 1 ppm |

The sugar solution (solution 1) was used as a control. A panel including 6 persons was asked to taste the solutions and make comparisons between each of solutions 2 through 5 in comparison to solution 1. The panel evaluated the sweetness and described the taste and mouth feel. The results are as follow:

TABLE 26.2

| | sweetness | | | |
|---|---|---|---|---|
| Solution# | Less than solution 1 | Same as solution 1 | More than solution 1 | Taste Description |
| 2 | 0 | | 6 | 1. Obvious violet note and taste<br>2. Full body<br>3. Obvious bitter aftertaste<br>4. Sweet lingering |
| 3 | 1 | 5 | 0 | 1. Significant violet note and taste<br>2. Full body<br>3. Obvious bitter aftertaste<br>4. Sweet lingering |
| 4 | 0 | 5 | 1 | 1. Significant violet note and taste<br>2. Full body<br>3. A little bitter aftertaste<br>4. Sweet lingering |
| 5 | 0 | | 6 | 1. Very full body<br>2. Significant violet note and taste<br>3. Slightly bitter aftertaste<br>4. Slightly sweet lingering |

It can be seen that MRP of RA901/RD7 together with thaumatin can reduce the usage of sugar by 80% or more as well as keep good mouth feel, even when the total sugar equivalence (SE) reached up to 10%-12%. However, for full sugar reduction application, although the MRP of RA90/RD7 alone or together with thaumatin can reach up to 10% SE, it did not provide a satisfactory taste because of the bitter aftertaste.

Example 28

Evaluation of the Taste Profiles of MRPs from RA80, Amino Acids and/or Vitamin C and Reducing Sugar

*Stevia* Extract Material:

RA80: available from Sweet Green Fields.

General process for Samples 28-1 through 28-6: 5 g *Stevia* extract material was dissolved together with 0.1 g of an amino acid and/or vitamin C and 0.1 g of a reducing sugar in 5 g deionized water. The solution was then heated at about 100 degrees centigrade for about 2 hours. When the reaction was completed, the slurry was dried by spray dryer to provide an off white powdered MRP. The test method was the same as that of Example 16.

TABLE 28.1

| the parameters and the taste profile of the products | | | |
|---|---|---|---|
| Sample # | Amino acid and/or vitamin C | reducing sugar | Taste profile |
| 28-1 | Phenylalanine | Mannose | 1. Thick violet and nectar flavor<br>2. Almost no bitter |
| 28-2 | Phenylalanine | Lactose | No other flavor, just sweet |
| 28-3 | Phenylalanine | Galactose | 1. Thick violet flavor<br>2. slightly bitter |
| 28-4 | Phenylalanine | Rhamnose | No other flavor, just sweet |
| 28-5 | Phenylalanine | Raffinose | 1. Thick violet flavor<br>2. slightly bitter |
| 28-6 | Leucine + Vitamin C (1:1 w/w) | Glucose | 1. Pancake flavor<br>2. Milky aftertaste |

These samples were evaluated by 4 persons. For RA80, the MRPs prepared provided a pleasant flavor/taste and improved mouth feel.

Example 29

Evaluation of the Taste Profiles of MRPs from RA80, Amino Acids and Reducing Sugar

*Stevia* Extract Material:

RA80: available from Sweet Green Fields.

General process for Samples 29-1 through 29-4: 5 g *Stevia* extract material was dissolved with 0.4 g of an amino acid and 0.4 g of a reducing sugar in 5 g deionized water and 10 g glycerin. The solution was heated to about 120 degrees centigrade for about 1 hour. When the reaction was completed, the slurry was dried by spray dryer to provide an off white powder MRP.

TABLE 29.1

| the parameters and the taste profile of the products | | | |
|---|---|---|---|
| Sample # | Amino acid | reducing sugar | Taste profile |
| 29-1 | Phenylalanine | Glucose | No other flavor, just sweet |
| 29-2 | valine | Mannose | 1. Caramel flavor<br>2. Black chocolate flavor<br>3. Cocoa aftertaste |

TABLE 29.1-continued

| the parameters and the taste profile of the products | | | |
|---|---|---|---|
| Sample # | Amino acid | reducing sugar | Taste profile |
| 29-3 | valine | Raffinose | 1. Fried nut smell<br>2. Black chocolate flavor |
| 29-4 | valine | Glucose | 1. Fried nut smell<br>2. Significant black chocolate flavor |

The samples were evaluated by 4 persons. For RA80, the MRPs prepared provided a pleasant chocolate flavor/taste and improved mouth feel. The test method was the same as that of Example 16.

Example 30

Evaluation of the Taste Profile of MRP Plus Sugar Compared to Sugar

Enough citric acid was dissolved in deionized water to obtain a solution with pH 3.0. The solution was used to dissolve sugar or the MRP prepared in example 29-2 to make solutions as shown in the table below:

TABLE 30.1

| | | concentration | |
|---|---|---|---|
| Solution# | MRP used | sugar | MRP |
| 1 | — | 10% | — |
| 2 | EX. 29-2 | 5% | 250 ppm |

The sugar solution (solution 1) was used as a control. A panel including 6 persons was asked to taste the solutions and to make a comparison. The panel compared the sweetness and described the taste and mouth feel. The test method was the same as that of Example 16. The results are as follow:

TABLE 30.2

| | sweetness | | | |
|---|---|---|---|---|
| Solution# | Less than solution 1 | Same as solution 1 | More than solution 1 | Taste Description |
| 2 | 0 | 6 | 0 | 1. Very full body<br>2. Significant chocolate milk taste<br>3. Slightly bitter aftertaste |

It can be seen that MRP of RA80 can reduce the usage of sugar by 50% or more as well as provide good mouth feel, even when the total sugar equivalence (SE) reaches up to 10%. In addition, it can give a very pleasant taste like that of chocolate milk.

Example 31

Evaluation of the Taste Profiles of MRPs from *Stevia* Extract, Glucose and Phenylalanine

*Stevia* Extract Material:

*Stevia* extract: the product of Example 37.

General process for Samples 31-1-1 through 31-6-3:

Glucose and phenylalanine were blended in particular ratios and noted as a G&P mixture in the table below. The *Stevia* extract material was dissolved together with the G&P mixture in 5 ml deionized water to adjust the solids content to 67%. Sodium carbonate was added to the reaction mixture to adjust the pH to about 8 or citric acid was added to the reaction mixture to adjust the pH to about 3 or no pH regulator was added so that the pH was about 5. The solution was then heated at about 100 degrees centigrade for a period of time as noted in the table. When the reaction was completed, the slurry was dried by spray dryer to provide an off white powdered MRP.

Experiments

The parameters and the taste profile of the products are as follow. Each sample was evaluated by a panel of 4 people and the resultant data was the average of the panel.

TABLE 31.1

| | | | | | | | | Taste profile* | | | | |
|---|---|---|---|---|---|---|---|---|---|---|---|---|
| Sample # | Weight of *Stevia* extract | Weight of glucose | Weight of phenylalanine | Ratio of glucose to phenylalanine in G&P mixture w/w | Ratio of *Stevia* to G&P mixture w/w | pH | Duration at 100° C./hour | Intensity of flower smell | Intensity of floral taste | Full body | Sweet lingering | bitter |
| 31-1-1 | 9.9 g | 0.067 g | 0.033 g | 2:1 | 99:1 | 3 | 2 | 1 | 0.5 | 1 | 4 | 1 |
| 31-1-2 | 9 g | 0.67 g | 0.33 g | 2:1 | 90:10 | 3 | 2 | 1 | 1 | 1 | 3 | 1 |
| 31-1-3 | 8 g | 1.33 g | 0.67 g | 2:1 | 80:20 | 3 | 2 | 1 | 2 | 3 | 2 | 1 |
| 31-1-4 | 7 g | 2 g | 1 g | 2:1 | 70:30 | 3 | 2 | 3 | 3 | 3 | 2 | 1 |
| 31-1-5 | 6 g | 2.67 g | 1.33 g | 2:1 | 60:40 | 3 | 2 | 3 | 3 | 3 | 2 | 1 |
| 31-1-6 | 5 g | 3.33 g | 1.67 g | 2:1 | 50:50 | 3 | 2 | 2 | 2 | 3 | 2 | 1 |
| 31-1-7 | 4 g | 4 g | 2 g | 2:1 | 40:60 | 3 | 2 | 2 | 2 | 3 | 2 | 1 |
| 31-1-8 | 3 g | 4.67 g | 2.33 g | 2:1 | 30:70 | 3 | 2 | 1 | 1 | 2 | 1 | 1 |
| 31-1-9 | 2 g | 5.33 g | 2.67 g | 2:1 | 20:80 | 3 | 2 | 1 | 1 | 1 | 1 | 1 |
| 31-1-10 | 1 g | 6 g | 3 g | 2:1 | 10:90 | 3 | 2 | 1 | 0.5 | 1 | 1 | 2 |
| 31-1-11 | 0.1 g | 6.6 g | 3.3 g | 2:1 | 1:99 | 3 | 2 | 1 | 0.5 | 0.5 | 0 | 2 |
| 31-2-1 | 9.9 g | 0.067 g | 0.033 g | 2:1 | 99:1 | 5 | 2 | 1 | 0.5 | 1 | 4 | 2 |
| 31-2-2 | 9 g | 0.67 g | 0.33 g | 2:1 | 90:10 | 5 | 2 | 2 | 2 | 2 | 3 | 1 |
| 31-2-3 | 8 g | 1.33 g | 0.67 g | 2:1 | 80:20 | 5 | 2 | 3 | 3 | 3 | 2 | 1 |
| 31-2-4 | 7 g | 2 g | 1 g | 2:1 | 70:30 | 5 | 2 | 4 | 4 | 3 | 2 | 0.5 |
| 31-2-5 | 6 g | 2.67 g | 1.33 g | 2:1 | 60:40 | 5 | 2 | 4 | 4 | 3 | 2 | 0.5 |
| 31-2-6 | 5 g | 3.33 g | 1.67 g | 2:1 | 50:50 | 5 | 2 | 4 | 4 | 2.5 | 1.5 | 0.5 |
| 31-2-7 | 4 g | 4 g | 2 g | 2:1 | 40:60 | 5 | 2 | 2.5 | 3 | 2 | 1.5 | 0.5 |

TABLE 31.1-continued

| | | | | | | | | Taste profile* | | | | |
|---|---|---|---|---|---|---|---|---|---|---|---|---|
| Sample # | Weight of *Stevia* extract | Weight of glucose | Weight of phenylalanine | Ratio of glucose to phenylalanine in G&P mixture w/w | Ratio of *Stevia* to G&P mixture w/w | pH | Duration at 100° C./hour | Intensity of flower smell | Intensity of floral taste | Full body | Sweet lingering | bitter |
| 31-2-8 | 3 g | 4.67 g | 2.33 g | 2:1 | 30:70 | 5 | 2 | 1.5 | 1 | 2 | 1 | 0.5 |
| 31-2-9 | 2 g | 5.33 g | 2.67 g | 2:1 | 20:80 | 5 | 2 | 1.5 | 1 | 2 | 1 | 1 |
| 31-2-10 | 1 g | 6 g | 3 g | 2:1 | 10:90 | 5 | 2 | 1 | 0.5 | 1 | 1 | 1.5 |
| 31-2-11 | 0.1 g | 6.6 g | 3.3 g | 2:1 | 1:99 | 5 | 2 | 1 | 0.5 | 1 | 1 | 2 |
| 31-3-1 | 9.9 g | 0.067 g | 0.033 g | 2:1 | 99:1 | 8 | 2 | 1 | 0.5 | 1 | 4 | 2 |
| 31-3-2 | 9 g | 0.67 g | 0.33 g | 2:1 | 90:10 | 8 | 2 | 1 | 1 | 1.5 | 2 | 1 |
| 31-3-3 | 8 g | 1.33 g | 0.67 g | 2:1 | 80:20 | 8 | 2 | 1.5 | 1 | 1.5 | 2 | 1 |
| 31-3-4 | 7 g | 2 g | 1 g | 2:1 | 70:30 | 8 | 2 | 1.5 | 1.5 | 2.5 | 2 | 1 |
| 31-3-5 | 6 g | 2.67 g | 1.33 g | 2:1 | 60:40 | 8 | 2 | 3 | 2 | 2.5 | 2 | 1 |
| 31-3-6 | 5 g | 3.33 g | 1.67 g | 2:1 | 50:50 | 8 | 2 | 3 | 2.5 | 2.5 | 2 | 1 |
| 31-3-7 | 4 g | 4 g | 2 g | 2:1 | 40:60 | 8 | 2 | 2 | 2 | 2 | 2 | 0.5 |
| 31-3-8 | 3 g | 4.67 g | 2.33 g | 2:1 | 30:70 | 8 | 2 | 1 | 1 | 1.5 | 2 | 0.5 |
| 31-3-9 | 2 g | 5.33 g | 2.67 g | 2:1 | 20:80 | 8 | 2 | 1 | 1 | 1 | 1 | 1 |
| 31-3-10 | 1 g | 6 g | 3 g | 2:1 | 10:90 | 8 | 2 | 0.5 | 0.5 | 1 | 1 | 1.5 |
| 31-3-11 | 0.1 g | 6.6 g | 3.3 g | 2:1 | 1:99 | 8 | 2 | 0.5 | 0.5 | 0.5 | 0 | 1.5 |
| 31-4-1 | 9.9 g | 0.067 g | 0.033 g | 2:1 | 99:1 | 5 | 4 | 1 | 0.5 | 1 | 3.5 | 1 |
| 31-4-2 | 9 g | 0.67 g | 0.33 g | 2:1 | 90:10 | 5 | 4 | 2 | 2 | 2 | 2 | 0.5 |
| 31-4-3 | 8 g | 1.33 g | 0.67 g | 2:1 | 80:20 | 5 | 4 | 4 | 3.5 | 3 | 1.5 | 0 |
| 31-4-4 | 7 g | 2 g | 1 g | 2:1 | 70:30 | 5 | 4 | 5 | 5 | 3 | 1.5 | 0 |
| 31-4-5 | 6 g | 2.67 g | 1.33 g | 2:1 | 60:40 | 5 | 4 | 5 | 5 | 3 | 1 | 0 |
| 31-4-6 | 5 g | 3.33 g | 1.67 g | 2:1 | 50:50 | 5 | 4 | 3.5 | 3.5 | 3 | 1 | 0.5 |
| 31-4-7 | 4 g | 4 g | 2 g | 2:1 | 40:60 | 5 | 4 | 1 | 1.5 | 2 | 1 | 1 |
| 31-4-8 | 3 g | 4.67 g | 2.33 g | 2:1 | 30:70 | 5 | 4 | 0.5 | 0.5 | 1 | 1 | 1 |
| 31-4-9 | 2 g | 5.33 g | 2.67 g | 2:1 | 20:80 | 5 | 4 | 0.5 | 0.5 | 1 | 0.5 | 1.5 |
| 31-4-10 | 1 g | 6 g | 3 g | 2:1 | 10:90 | 5 | 4 | 0.5 | 0.5 | 1 | 0.5 | 1.5 |
| 31-4-11 | 0.1 g | 6.6 g | 3.3 g | 2:1 | 1:99 | 5 | 4 | 0.5 | 0.5 | 1 | 0 | 2 |
| 31-5-1 | 9.9 g | 0.05 g | 0.05 g | 1:1 | 99:1 | 5 | 2 | 0.5 | 0.5 | 0.5 | 4 | 0 |
| 31-5-2 | 9 g | 0.5 g | 0.5 g | 1:1 | 90:10 | 5 | 2 | 1 | 1.5 | 1 | 2 | 0 |
| 31-5-3 | 8 g | 1 g | 1 g | 1:1 | 80:20 | 5 | 2 | 2 | 2 | 2.5 | 2 | 0 |
| 31-5-4 | 7 g | 1.5 g | 1.5 g | 1:1 | 70:30 | 5 | 2 | 2 | 2.5 | 2 | 2 | 0 |
| 31-5-5 | 6 g | 2 g | 2 g | 1:1 | 60:40 | 5 | 2 | 3 | 3 | 3 | 2 | 0 |
| 31-5-6 | 5 g | 2.5 g | 2.5 g | 1:1 | 50:50 | 5 | 2 | 2 | 2 | 3 | 2 | 0.5 |
| 31-5-7 | 4 g | 3 g | 3 g | 1:1 | 40:60 | 5 | 2 | 1 | 1 | 2 | 1.5 | 0.5 |
| 31-5-8 | 3 g | 3.5 g | 3.5 g | 1:1 | 30:70 | 5 | 2 | 0.5 | 0.5 | 1 | 1 | 0.5 |
| 31-5-9 | 2 g | 4 g | 4 g | 1:1 | 20:80 | 5 | 2 | 0.5 | 0.5 | 1 | 1 | 1 |
| 31-5-10 | 1 g | 4.5 g | 4.5 g | 1:1 | 10:90 | 5 | 2 | 0.5 | 0.5 | 1 | 0.5 | 1.5 |
| 31-5-11 | 0.1 g | 4.95 g | 4.95 g | 1:1 | 1:99 | 5 | 2 | 0.5 | 0.5 | 0.5 | 0.5 | 1.5 |
| 31-6-1 | 9 g | 0.67 g | 0.33 g | 2:1 | 90:10 | 5 | 8 | 5 | 4 | 3 | 1.5 | 0.5 |
| 31-6-2 | 9 g | 0.67 g | 0.33 g | 2:1 | 90:10 | 5 | 12 | 3 | 2.5 | 3 | 1.5 | 0.5 |
| 31-6-3 | 9 g | 0.67 g | 0.33 g | 2:1 | 90:10 | 5 | 24 | 1 | 0.5 | 2 | 2 | 1 |

*the solid content of the taste solution is 500 ppm for each sample.

Method: For evaluation of the taste profile, the samples were tested by a panel of four people. The panel was asked to describe the taste profile and score values between 0-5 according to the increasing intensity of flower smell, intensity of floral taste, kill body, sweet lingering and bitterness. One trained taster tasted independently the samples first. The tester was allowed to re-taste, and then make notes for the sensory attributes perceived. Afterwards, another three tasters tasted the sample and the attributes were noted and discussed openly to find a suitable description. In case that more than one taster disagreed with the result, the tasting was repeated. For example, a "5" for intensity of flower smell is the best score for having a strong pleasant smell and conversely a value of 0 or near 0 means the smell is very slight. Similarly, a "5" for bitterness, and sweet lingering is not desired. A value of zero or near zero means that the bitterness, and/or sweet lingering is reduced or is removed.

Data Analysis

Figure 1:
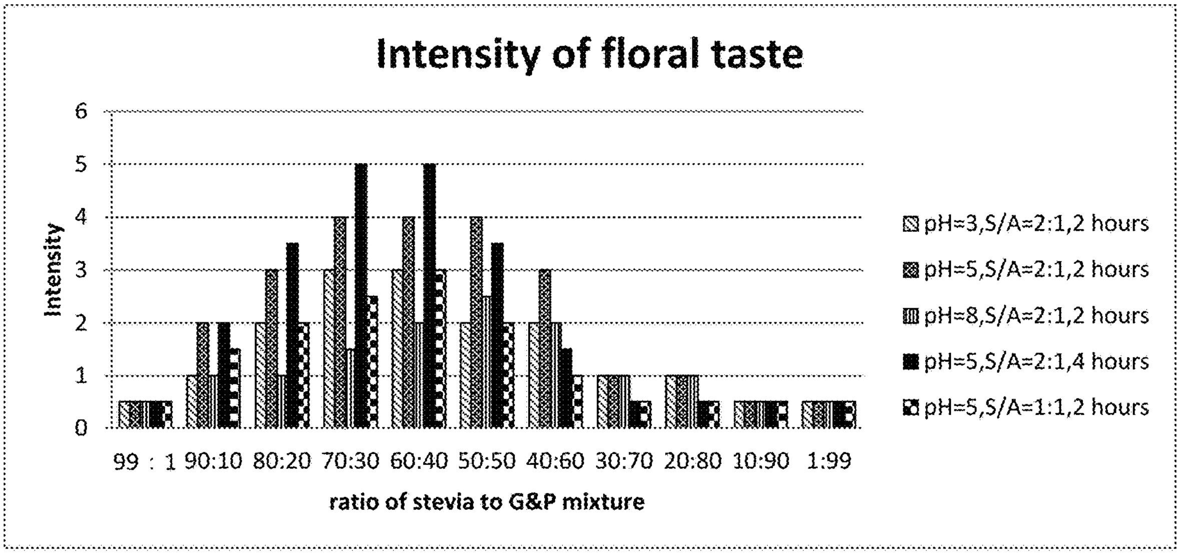
FIG. 1 depicts a relationship between the intensity of floral taste to the ratio of *Stevia* to glucose and phenylalanine mixtures.

The relationship between the intensity of floral taste to the ratio of *Stevia* to G&P mixture is depicted in FIG. 1.

Observations:

(1) For pH, the MRPs prepared with an acidic regulator, an alkaline regulator or at their naturally occurring pH all provided a pleasant floral taste and fragrance as well as improving the mouth feel of the *Stevia* extract. The effect was more intense at the unbuffered pH value (pH 5) in comparison to adjusted pH values (pH 3 or 8).

(2) For the ratio of *Stevia* to the G&P mixtures, it can be seen that over the ratio range of 99:1 to 1:99, the MRPs provided fragrance, taste, and mouth feel improvement. Among those, there is a range in which the taste and mouth feel of the MRPs is enhanced. The ratio range is about 90:10 to 40:60.

(3) For the ratio of glucose to phenylalanine, the improvement of fragrance, taste, and mouth feel was more intense by increasing the ratio of glucose to phenylalanine. The more glucose, the better the taste profile and the more extensive the range of the ratio of *Stevia* to the G&P mixture.

(4) For the reaction duration, the MRPs can improve the fragrance, taste, and mouth feel of *Stevia* extract even after reaction of the components at 24 hours. However, short reaction times, for example 8 hours, appear to improve the products. That is, because it is believed, that the flavorful substances are generated early on in the reaction and may change to less flavorful components after additional reaction time.

Example 32

Evaluation of the Taste Profiles of MRPs from *Stevia* Extract, Galactose and Glutamic Acid

*Stevia* Extract Material:

*Stevia* extract: the product of Example 37.

General process for Samples 32-1-1 through 32-6-3:

Galactose and glutamic acid were blended in particular ratios and noted as a G&P mixture in the table below. The *Stevia* extract material was dissolved together with the G&P mixture in 5 ml deionized water to adjust the solids content to 67%. Sodium carbonate was added to the reaction mixture to adjust the pH to about 8 or add citric acid was added to the reaction mixture to adjust the pH to about 3 or no pH regulator was added so that the pH was about 5. The solution was then heated at about 100 degrees centigrade for a period of time (see table). When the reaction was completed, the slurry was dried by spray dryer to provide an off white powdered MRP.

Experiments

The parameters and the taste profiles of the products were as follow. Each sample was evaluated by a panel of 4 people and the resultant data was the average of the panel.

TABLE 32.1

| Sample # | Weight of *Stevia* extract | Weight of galactose | Weight of glutamic acid | Ratio of galactose to glutamic acid in G&P mixture w/w | Ratio of *Stevia to* G&P mixture w/w | pH | Duration at 100° C./hour | Taste profile* Intensity of tangerine smell | Intensity of tangerine taste | Full body | Sweet lingering | bitter |
|---|---|---|---|---|---|---|---|---|---|---|---|---|
| 32-1-1 | 9.9 g | 0.067 g | 0.033 g | 2:1 | 99:1 | 3 | 2 | 1 | 0.5 | 1 | 4 | 0 |
| 32-1-2 | 9 g | 0.67 g | 0.33 g | 2:1 | 90:10 | 3 | 2 | 1 | 1 | 2 | 2 | 0 |
| 32-1-3 | 8 g | 1.33 g | 0.67 g | 2:1 | 80:20 | 3 | 2 | 2 | 3 | 3 | 1 | 0 |
| 32-1-4 | 7 g | 2 g | 1 g | 2:1 | 70:30 | 3 | 2 | 4 | 4 | 4 | 1 | 0 |
| 32-1-5 | 6 g | 2.67 g | 1.33 g | 2:1 | 60:40 | 3 | 2 | 3 | 3 | 3.5 | 1 | 0 |
| 32-1-6 | 5 g | 3.33 g | 1.67 g | 2:1 | 50:50 | 3 | 2 | 1 | 2.5 | 3 | 1 | 0 |
| 32-1-7 | 4 g | 4 g | 2 g | 2:1 | 40:60 | 3 | 2 | 1 | 2 | 3 | 1 | 0 |
| 32-1-8 | 3 g | 4.67 g | 2.33 g | 2:1 | 30:70 | 3 | 2 | 1 | 1 | 2 | 1 | 0 |
| 32-1-9 | 2 g | 5.33 g | 2.67 g | 2:1 | 20:80 | 3 | 2 | 1 | 1 | 1 | 0.5 | 0 |
| 32-1-10 | 1 g | 6 g | 3 g | 2:1 | 10:90 | 3 | 2 | 1 | 1 | 1 | 0.5 | 0 |
| 32-1-11 | 0.1 g | 6.6 g | 3.3 g | 2:1 | 1:99 | 3 | 2 | 0.5 | 0.5 | 1 | 0 | 0 |
| 32-2-1 | 9.9 g | 0.067 g | 0.033 g | 2:1 | 99:1 | 5 | 2 | 1 | 0.5 | 1 | 3 | 0 |
| 32-2-2 | 9 g | 0.67 g | 0.33 g | 2:1 | 90:10 | 5 | 2 | 2 | 2 | 3 | 1 | 0 |
| 32-2-3 | 8 g | 1.33 g | 0.67 g | 2:1 | 80:20 | 5 | 2 | 4 | 4 | 4 | 1 | 0.5 |
| 32-2-4 | 7 g | 2 g | 1 g | 2:1 | 70:30 | 5 | 2 | 4 | 4 | 4 | 1 | 0.5 |
| 32-2-5 | 6 g | 2.67 g | 1.33 g | 2:1 | 60:40 | 5 | 2 | 3 | 4 | 4 | 1 | 0.5 |
| 32-2-6 | 5 g | 3.33 g | 1.67 g | 2:1 | 50:50 | 5 | 2 | 2.5 | 3 | 3 | 1 | 0.5 |
| 32-2-7 | 4 g | 4 g | 2 g | 2:1 | 40:60 | 5 | 2 | 2 | 2 | 2 | 1 | 1 |
| 32-2-8 | 3 g | 4.67 g | 2.33 g | 2:1 | 30:70 | 5 | 2 | 2 | 1 | 2 | 1 | 0.5 |
| 32-2-9 | 2 g | 5.33 g | 2.67 g | 2:1 | 20:80 | 5 | 2 | 1 | 1 | 1 | 1 | 0.5 |
| 32-2-10 | 1 g | 6 g | 3 g | 2:1 | 10:90 | 5 | 2 | 1 | 1 | 1 | 0.5 | 0.5 |
| 32-2-11 | 0.1 g | 6.6 g | 3.3 g | 2:1 | 1:99 | 5 | 2 | 1 | 0.5 | 0.5 | 0.5 | 0.5 |
| 32-3-1 | 9.9 g | 0.067 g | 0.033 g | 2:1 | 99:1 | 8 | 2 | 1 | 0.5 | 0.5 | 3 | 0.5 |
| 32-3-2 | 9 g | 0.67 g | 0.33 g | 2:1 | 90:10 | 8 | 2 | 1 | 1 | 2 | 2 | 1 |
| 32-3-3 | 8 g | 1.33 g | 0.67 g | 2:1 | 80:20 | 8 | 2 | 1 | 1 | 2 | 2 | 1 |
| 32-3-4 | 7 g | 2 g | 1 g | 2:1 | 70:30 | 8 | 2 | 2 | 2 | 3 | 2 | 1 |
| 32-3-5 | 6 g | 2.67 g | 1.33 g | 2:1 | 60:40 | 8 | 2 | 3 | 4 | 3.5 | 1 | 1 |
| 32-3-6 | 5 g | 3.33 g | 1.67 g | 2:1 | 50:50 | 8 | 2 | 3 | 4 | 3 | 1 | 1 |
| 32-3-7 | 4 g | 4 g | 2 g | 2:1 | 40:60 | 8 | 2 | 2 | 2 | 3 | 1 | 1 |
| 32-3-8 | 3 g | 4.67 g | 2.33 g | 2:1 | 30:70 | 8 | 2 | 1 | 1 | 2 | 1 | 0.5 |
| 32-3-9 | 2 g | 5.33 g | 2.67 g | 2:1 | 20:80 | 8 | 2 | 1 | 1 | 1 | 0.5 | 0.5 |
| 32-3-10 | 1 g | 6 g | 3 g | 2:1 | 10:90 | 8 | 2 | 1 | 1 | 1 | 0.5 | 0.5 |
| 32-3-11 | 0.1 g | 6.6 g | 3.3 g | 2:1 | 1:99 | 8 | 2 | 1 | 0.5 | 0.5 | 0 | 0 |
| 32-4-1 | 9.9 g | 0.067 g | 0.033 g | 2:1 | 99:1 | 5 | 4 | 1 | 0.5 | 1 | 3 | 0.5 |
| 32-4-2 | 9 g | 0.67 g | 0.33 g | 2:1 | 90:10 | 5 | 4 | 2 | 1 | 2 | 1 | 0 |
| 32-4-3 | 8 g | 1.33 g | 0.67 g | 2:1 | 80:20 | 5 | 4 | 3 | 3 | 4 | 0.5 | 0 |

TABLE 32.1-continued

| Sample # | Weight of *Stevia* extract | Weight of galactose | Weight of glutamic acid | Ratio of galactose to glutamic acid in G&P mixture w/w | Ratio of *Stevia to* G&P mixture w/w | pH | Duration at 100° C./hour | Taste profile* Intensity of tangerine smell | Intensity of tangerine taste | Full body | Sweet lingering | bitter |
|---|---|---|---|---|---|---|---|---|---|---|---|---|
| 32-4-4 | 7 g | 2 g | 1 g | 2:1 | 70:30 | 5 | 4 | 4 | 5 | 4.5 | 0.5 | 0 |
| 32-4-5 | 6 g | 2.67 g | 1.33 g | 2:1 | 60:40 | 5 | 4 | 4 | 5 | 4.5 | 0.5 | 0 |
| 32-4-6 | 5 g | 3.33 g | 1.67 g | 2:1 | 50:50 | 5 | 4 | 2 | 2 | 3 | 0.5 | 0 |
| 32-4-7 | 4 g | 4 g | 2 g | 2:1 | 40:60 | 5 | 4 | 2 | 2 | 2.5 | 0.5 | 0 |
| 32-4-8 | 3 g | 4.67 g | 2.33 g | 2:1 | 30:70 | 5 | 4 | 2 | 1.5 | 2.5 | 0.5 | 0 |
| 32-4-9 | 2 g | 5.33 g | 2.67 g | 2:1 | 20:80 | 5 | 4 | 1 | 1 | 2 | 0.5 | 0 |
| 32-4-10 | 1 g | 6 g | 3 g | 2:1 | 10:90 | 5 | 4 | 1 | 1 | 1 | 0 | 0 |
| 32-4-11 | 0.1 g | 6.6 g | 3.3 g | 2:1 | 1:99 | 5 | 4 | 1 | 0.5 | 1 | 0 | 0 |
| 32-5-1 | 9.9 g | 0.05 g | 0.05 g | 1:1 | 99:1 | 5 | 2 | 1 | 0.5 | 1 | 4 | 1 |
| 32-5-2 | 9 g | 0.5 g | 0.5 g | 1:1 | 90:10 | 5 | 2 | 1 | 2 | 2 | 2 | 1 |
| 32-5-3 | 8 g | 1 g | 1 g | 1:1 | 80:20 | 5 | 2 | 3 | 3 | 3.5 | 1.5 | 1 |
| 32-5-4 | 7 g | 1.5 g | 1.5 g | 1:1 | 70:30 | 5 | 2 | 3 | 3.5 | 3.5 | 1.5 | 1 |
| 32-5-5 | 6 g | 2 g | 2 g | 1:1 | 60:40 | 5 | 2 | 2 | 2 | 2 | 1.5 | 1 |
| 32-5-6 | 5 g | 2.5 g | 2.5 g | 1:1 | 50:50 | 5 | 2 | 2 | 1.5 | 2 | 1 | 0.5 |
| 32-5-7 | 4 g | 3 g | 3 g | 1:1 | 40:60 | 5 | 2 | 1 | 1 | 2 | 1 | 1 |
| 32-5-8 | 3 g | 3.5 g | 3.5 g | 1:1 | 30:70 | 5 | 2 | 0.5 | 0.5 | 1 | 0 | 0.5 |
| 32-5-9 | 2 g | 4 g | 4 g | 1:1 | 20:80 | 5 | 2 | 0.5 | 0.5 | 1 | 0 | 0 |
| 32-5-10 | 1 g | 4.5 g | 4.5 g | 1:1 | 10:90 | 5 | 2 | 0.5 | 0.5 | 0.5 | 0 | 0 |
| 32-5-11 | 0.1 g | 4.95 g | 4.95 g | 1:1 | 1:99 | 5 | 2 | 0.5 | 0.5 | 0.5 | 0 | 0 |
| 32-6-1 | 9 g | 0.67 g | 0.33 g | 2:1 | 90:10 | 5 | 8 | 2 | 2 | 2 | 1 | 0.5 |
| 32-6-2 | 9 g | 0.67 g | 0.33 g | 2:1 | 90:10 | 5 | 12 | 1 | 1 | 1 | 1 | 1 |
| 32-6-3 | 9 g | 0.67 g | 0.33 g | 2:1 | 90:10 | 5 | 24 | 0.5 | 0.5 | 1 | 0.5 | 1 |

*the solid content of the taste solution is 500 ppm for each sample.

Method: For evaluation of the taste profile, the samples were tested by a panel of four people. The panel was asked to describe the taste profile and score values between 0-5 according to the increasing intensity of flower smell, intensity of floral taste, kill body, sweet lingering and bitterness. I trained taster tasted independently the samples first. The tester was allowed to re-taste, and then make notes for the sensory attributes perceived. Afterwards, another 3 tasters tasted the sample and the attributes were noted and discussed openly to find a suitable description. in case that more than 1 taster disagreed with the result, the tasting was repeated. For example, a "5" for intensity of flower smell is the best score for having a strong pleasant smell and conversely a value of 0 or near zero means the smell is very slight. Similarly, a "5" for bitterness, and sweet lingering is not desired. A value of zero or near zero means that the bitterness, and/or sweet lingering is reduced or is removed.

Data Analysis

Figure 2:
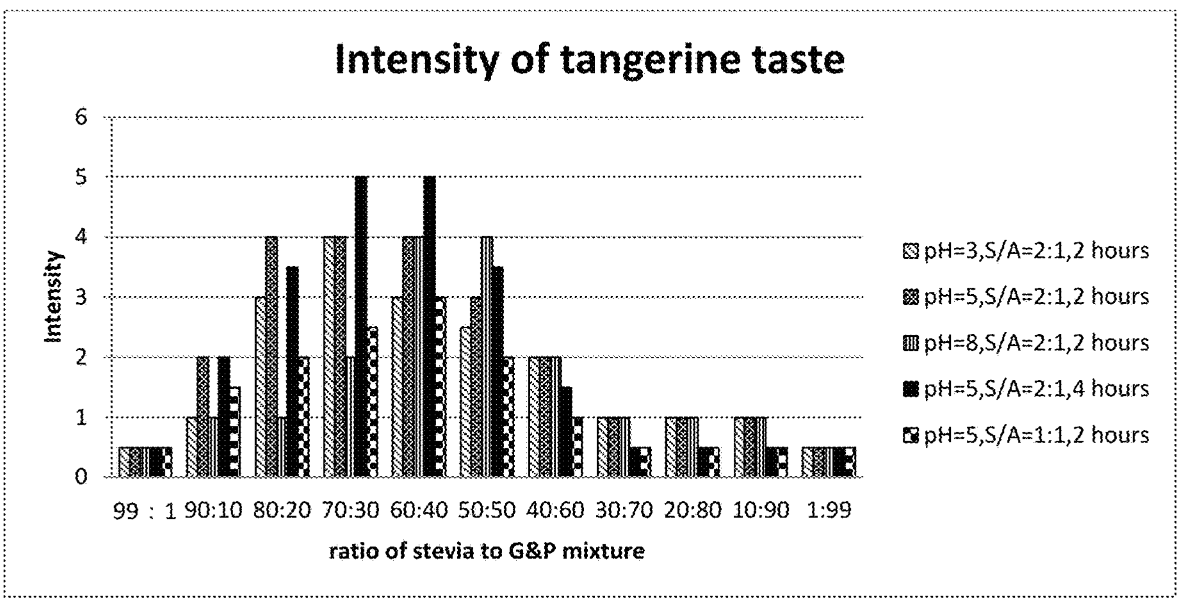
FIG. 2 depicts a relationship between the intensity of tangerine taste to the ratio of *Stevia* to galactose and glutamic acid mixtures.

The relationship between the intensity of tangerine taste to the ratio of *Stevia* to G&P mixture in the examples is depicted in FIG. 2.

Observations:

(1) For pH, the MRPs prepared with an acidic regulator, an alkaline regulator or at their naturally occurring pH provided a pleasant tangerine taste and fragrance, as well as improving the mouth feel of *Stevia* extract.

(2) For the ratio of *Stevia* to the G&P mixtures, it can be seen that over the ratio range of 99:1 to 1:99, the MRPs provided fragrance, taste, and mouth feel improvements. There is a range in which the taste and mouth feel of the MRPs was better and the range was related to pH conditions. When the components were reacted or 2 hours, the ratio range is about 80:20 to 40:60 at pH 3; 90:10 to 40:60 at pH 5; and 70:30 to 40:60 at pH 8.

(3) For the ratio of galactose to glutamic acid, the improvement of fragrance, taste, and mouth feel was more intense by increasing the ratio of galactose to glutamic acid. The more galactose, the better the taste profile and the more extensive range of the ratio of Stavin to the G&P mixture.

(4) For the reaction duration, the MRPs can improve the fragrance, taste, and mouth feel of *Stevia* extract even after reaction of the components at 24 hours. However, shorter reaction times, for example 2 to 8 hours, appeared to improve the products. That is, because it is believed, that the flavorful substances are generated early in the reaction and can change to less flavorful components after additional reaction time.

Example 33

Evaluation of the Taste Profiles of MRPs from *Stevia* Extract, Mannose and Lysine

*Stevia* Extract Material:

*Stevia* extract: the product of Example 37.

General process for Samples 33-1-1 through 33-6-3:

Mannose and lysine were blended in particular ratios and noted as a G&P mixture in the table below. The *Stevia* extract material was dissolved together with the G&P mixture in 5 ml deionized water. Sodium carbonate was added to the reaction mixture to adjust the to about 8 or add citric acid was added to the reaction mixture to adjust the pH to about 3 or no pH regulator was added and the pH of the solution was about 5. The solution was at about 100 degrees centigrade for a period of time noted in the table below. When the reaction was completed, the slurry was dried by spray dryer to provide an off white powdered MRP, Experiments Each sample was evaluated by a panel of 4 people and the resultant data was the average of the panel.

TABLE 33.1

| Sample # | Weight of *Stevia* extract | Weight of mannose | Weight of lysine | Ratio of mannose to lysine in G&P mixture w/w | Ratio of *Stevia* to G&P mixture w/w | pH | Duration at 100° C./hour | Water in reaction mixture | Taste profile* Intensity of peach smell | Intensity of peach taste | Full body | Sweet lingering | bitter |
|---|---|---|---|---|---|---|---|---|---|---|---|---|---|
| 33-1-1 | 9.9 g | 0.067 g | 0.033 g | 2:1 | 99:1 | 3 | 2 | 33% | 0.5 | 0.5 | 1 | 3 | 0 |
| 33-1-2 | 9 g | 0.67 g | 0.33 g | 2:1 | 90:10 | 3 | 2 | 33% | 1 | 0.5 | 2 | 2 | 0.5 |
| 33-1-3 | 8 g | 1.33 g | 0.67 g | 2:1 | 80:20 | 3 | 2 | 33% | 1 | 0.5 | 2 | 2 | 0.5 |
| 33-1-4 | 7 g | 2 g | 1 g | 2:1 | 70:30 | 3 | 2 | 33% | 2.5 | 2 | 3.5 | 1.5 | 0.5 |
| 33-1-5 | 6 g | 2.67 g | 1.33 g | 2:1 | 60:40 | 3 | 2 | 33% | 3.5 | 3 | 3.5 | 1.5 | 0.5 |
| 33-1-6 | 5 g | 3.33 g | 1.67 g | 2:1 | 50:50 | 3 | 2 | 33% | 3 | 3 | 3 | 1.5 | 0.5 |
| 33-1-7 | 4 g | 4 g | 2 g | 2:1 | 40:60 | 3 | 2 | 33% | 3 | 3 | 3 | 1 | 0.5 |
| 33-1-8 | 3 g | 4.67 g | 2.33 g | 2:1 | 30:70 | 3 | 2 | 33% | 2.5 | 2.5 | 3 | 1 | 0.5 |
| 33-1-9 | 2 g | 5.33 g | 2.67 g | 2:1 | 20:80 | 3 | 2 | 33% | 1.5 | 1.5 | 2.5 | 0.5 | 0 |
| 33-1-10 | 1 g | 6 g | 3 g | 2:1 | 10:90 | 3 | 2 | 33% | 1 | 1 | 2 | 0 | 0 |
| 33-1-11 | 0.1 g | 6.6 g | 3.3 g | 2:1 | 1:99 | 3 | 2 | 33% | 1 | 0.5 | 2 | 0 | 0 |
| 33-2-1 | 9.9 g | 0.067 g | 0.033 g | 2:1 | 99:1 | 5 | 2 | 33% | 1 | 0.5 | 2 | 3 | 0 |
| 33-2-2 | 9 g | 0.67 g | 0.33 g | 2:1 | 90:10 | 5 | 2 | 33% | 1 | 1 | 2 | 2.5 | 0.5 |
| 33-2-3 | 8 g | 1.33 g | 0.67 g | 2:1 | 80:20 | 5 | 2 | 33% | 1.5 | 1 | 2.5 | 2 | 0.5 |
| 33-2-4 | 7 g | 2 g | 1 g | 2:1 | 70:30 | 5 | 2 | 33% | 3 | 3 | 3 | 1 | 0.5 |
| 33-2-5 | 6 g | 2.67 g | 1.33 g | 2:1 | 60:40 | 5 | 2 | 33% | 4 | 3.5 | 3.5 | 1 | 0.5 |
| 33-2-6 | 5 g | 3.33 g | 1.67 g | 2:1 | 50:50 | 5 | 2 | 33% | 3.5 | 3 | 3.5 | 1 | 0.5 |
| 33-2-7 | 4 g | 4 g | 2 g | 2:1 | 40:60 | 5 | 2 | 33% | 3 | 2 | 3 | 1 | 0.5 |
| 33-2-8 | 3 g | 4.67 g | 2.33 g | 2:1 | 30:70 | 5 | 2 | 33% | 1.5 | 1 | 2 | 0.5 | 0.5 |
| 33-2-9 | 2 g | 5.33 g | 2.67 g | 2:1 | 20:80 | 5 | 2 | 33% | 1 | 1 | 2 | 0 | 0 |
| 33-2-10 | 1 g | 6 g | 3 g | 2:1 | 10:90 | 5 | 2 | 33% | 1 | 0.5 | 1 | 0 | 0 |
| 33-2-11 | 0.1 g | 6.6 g | 3.3 g | 2:1 | 1:99 | 5 | 2 | 33% | 0.5 | 0.5 | 1 | 0 | 0 |
| 33-3-1 | 9.9 g | 0.067 g | 0.033 g | 2:1 | 99:1 | 8 | 2 | 33% | 1 | 0.5 | 2 | 3 | 0.5 |
| 33-3-2 | 9 g | 0.67 g | 0.33 g | 2:1 | 90:10 | 8 | 2 | 33% | 1 | 1 | 2 | 2 | 0.5 |
| 33-3-3 | 8 g | 1.33 g | 0.67 g | 2:1 | 80:20 | 8 | 2 | 33% | 1.5 | 2 | 2.5 | 1.5 | 1 |
| 33-3-4 | 7 g | 2 g | 1 g | 2:1 | 70:30 | 8 | 2 | 33% | 2 | 2 | 3 | 1.5 | 1 |
| 33-3-5 | 6 g | 2.67 g | 1.33 g | 2:1 | 60:40 | 8 | 2 | 33% | 3 | 3 | 3 | 1.5 | 1 |
| 33-3-6 | 5 g | 3.33 g | 1.67 g | 2:1 | 50:50 | 8 | 2 | 33% | 3 | 3.5 | 3 | 1 | 0.5 |
| 33-3-7 | 4 g | 4 g | 2 g | 2:1 | 40:60 | 8 | 2 | 33% | 2.5 | 2.5 | 3 | 1 | 0.5 |
| 33-3-8 | 3 g | 4.67 g | 2.33 g | 2:1 | 30:70 | 8 | 2 | 33% | 1.5 | 1.5 | 2 | 1 | 0.5 |
| 33-3-9 | 2 g | 5.33 g | 2.67 g | 2:1 | 20:80 | 8 | 2 | 33% | 1 | 1 | 2 | 0.5 | 0.5 |
| 33-3-10 | 1 g | 6 g | 3 g | 2:1 | 10:90 | 8 | 2 | 33% | 1 | 1 | 2 | 0 | 0 |
| 33-3-11 | 0.1 g | 6.6 g | 3.3 g | 2:1 | 1:99 | 8 | 2 | 33% | 1 | 0.5 | 1 | 0 | 0 |
| 33-4-1 | 9.9 g | 0.067 g | 0.033 g | 2:1 | 99:1 | 5 | 4 | 33% | 1 | 0.5 | 2 | 3 | 0.5 |
| 33-4-2 | 9 g | 0.67 g | 0.33 g | 2:1 | 90:10 | 5 | 4 | 33% | 1 | 1 | 3 | 2 | 0.5 |
| 33-4-3 | 8 g | 1.33 g | 0.67 g | 2:1 | 80:20 | 5 | 4 | 33% | 2.5 | 2 | 3 | 1.5 | 1 |
| 33-4-4 | 7 g | 2 g | 1 g | 2:1 | 70:30 | 5 | 4 | 33% | 3 | 3 | 4 | 1.5 | 1 |
| 33-4-5 | 6 g | 2.67 g | 1.33 g | 2:1 | 60:40 | 5 | 4 | 33% | 4 | 4 | 4 | 1.5 | 1 |
| 33-4-6 | 5 g | 3.33 g | 1.67 g | 2:1 | 50:50 | 5 | 4 | 33% | 2.5 | 1.5 | 3 | 1.5 | 1 |
| 33-4-7 | 4 g | 4 g | 2 g | 2:1 | 40:60 | 5 | 4 | 33% | 2 | 1 | 3 | 1 | 0.5 |
| 33-4-8 | 3 g | 4.67 g | 2.33 g | 2:1 | 30:70 | 5 | 4 | 33% | 1 | 1 | 3 | 1 | 0.5 |
| 33-4-9 | 2 g | 5.33 g | 2.67 g | 2:1 | 20:80 | 5 | 4 | 33% | 1 | 1 | 2 | 0.5 | 0.5 |
| 33-4-10 | 1 g | 6 g | 3 g | 2:1 | 10:90 | 5 | 4 | 33% | 1 | 0.5 | 2 | 0.5 | 0.5 |
| 33-4-11 | 0.1 g | 6.6 g | 3.3 g | 2:1 | 1:99 | 5 | 4 | 33% | 0.5 | 0.5 | 1 | 0 | 0.5 |
| 33-5-1 | 9.9 g | 0.05 g | 0.05 g | 1:1 | 99:1 | 5 | 2 | 33% | 1 | 0.5 | 1 | 3 | 0.5 |
| 33-5-2 | 9 g | 0.5 g | 0.5 g | 1:1 | 90:10 | 5 | 2 | 33% | 1 | 2 | 3 | 2 | 0.5 |
| 33-5-3 | 8 g | 1 g | 1 g | 1:1 | 80:20 | 5 | 2 | 33% | 1.5 | 2 | 3 | 1.5 | 0.5 |
| 33-5-4 | 7 g | 1.5 g | 1.5 g | 1:1 | 70:30 | 5 | 2 | 33% | 2 | 2 | 3 | 1.5 | 0.5 |
| 33-5-5 | 6 g | 2 g | 2 g | 1:1 | 60:40 | 5 | 2 | 33% | 3 | 3 | 3.5 | 1.5 | 0.5 |
| 33-5-6 | 5 g | 2.5 g | 2.5 g | 1:1 | 50:50 | 5 | 2 | 33% | 1.5 | 1.5 | 3 | 1 | 0.5 |
| 33-5-7 | 4 g | 3 g | 3 g | 1:1 | 40:60 | 5 | 2 | 33% | 1.5 | 1 | 2 | 1 | 0.5 |
| 33-5-8 | 3 g | 3.5 g | 3.5 g | 1:1 | 30:70 | 5 | 2 | 33% | 1 | 1 | 2 | 0.5 | 0.5 |
| 33-5-9 | 2 g | 4 g | 4 g | 1:1 | 20:80 | 5 | 2 | 33% | 1 | 1 | 2 | 0.5 | 1 |
| 33-5-10 | 1 g | 4.5 g | 4.5 g | 1:1 | 10:90 | 5 | 2 | 33% | 1 | 0.5 | 1 | 0 | 1 |
| 33-5-11 | 0.1 g | 4.95 g | 4.95 g | 1:1 | 1:99 | 5 | 2 | 33% | 0.5 | 0.5 | 1 | 0 | 1 |
| 33-6-1 | 9 g | 0.67 g | 0.33 g | 2:1 | 90:10 | 5 | 8 | 33% | 1.5 | 1.5 | 2 | 1 | 0.5 |
| 33-6-2 | 9 g | 0.67 g | 0.33 g | 2:1 | 90:10 | 5 | 12 | 33% | 0.5 | 0.5 | 2 | 1 | 0.5 |
| 33-6-3 | 9 g | 0.67 g | 0.33 g | 2:1 | 90:10 | 5 | 24 | 33% | 0.5 | 0.5 | 1 | 1.5 | 0.5 |

*the solid content of the taste solution is 500 ppm for each sample.

Method: For evaluation of the taste profile, the samples were tested by a panel of four people. The panel was asked to describe the taste profile and score values between 0-5 according to the increasing intensity of peach smell, intensity of peach taste, full body, sweet lingering and bitterness. I trained taster tasted independently the samples first. The taster was allowed to re-taste, and then made notes for the sensory attributes perceived. Afterwards, another 3 tasters tasted and the attributes were noted and discussed openly to find a suitable description. in case that more than 1 taster disagreed with the result, the tasting was repeated. For example, a “5” for intensity of peach smell is the best score for having a strong pleasant smell and conversely a value of 0 or near zero means the smell is very slight. Similarly, a “5” for bitterness, and sweet lingering is not desired. A value of zero or near zero means that the bitterness, and/or sweet lingering is reduced or is removed.

Data Analysis

Figure 3:
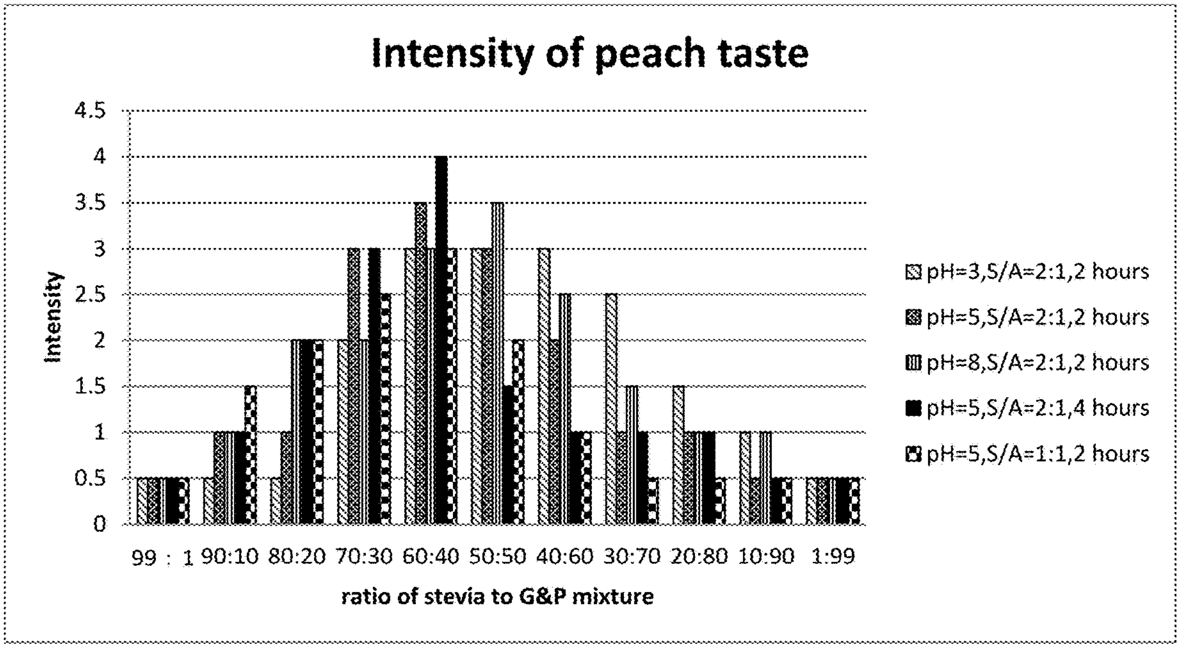
FIG. 3 depicts a relationship between the intensity of peach taste to the ratio of *Stevia* to mannose and lysine mixtures.

The relationship between the intensity of peach taste to the ratio of *Stevia* to G&P mixture in this example is depicted in FIG. 3.

Observations:

(1) For pH, the MRPs prepared with an acidic regulator, an alkaline regulator or at their naturally occurring pH provided a pleasant tangerine taste and fragrance, as well as improving the mouth feel of *Stevia* extract.

(2) For the ratio of *Stevia* to the G&P mixtures, it can be seen that over the ratio range of 99:1 to 1:99, the MRPs provided fragrance, taste, and mouth feel improvements. There is a range in which the taste and mouth feel of the MRPs was better and the range was related to pH conditions. When components were reacted for 2 hours, the ratio range is about 70:30 to 30:70 at pH 3; 70:30 to 40:60 at pH 5; and 80:20 to 40:60 at pH 8.

(3) For the ratio of mannose to lysine, the improvement of fragrance, taste, and mouth feel was more intense by increasing the ratio of mannose to lysine. The more mannose, the better the taste profile and the more extensive the range of the ratio of *Stevia* to the G&P mixture.

(4) For the reaction period, the MRPs improve the fragrance, taste, and mouth feel of *Stevia* extract even after reaction of the components at 24 hours. However, shorter reaction times, for example 4 hours and 8 hours, appear to improve the products. That is, because it is believed, that the flavorful substances are generated early in the reaction may change to less flavorful components after additional reaction time.

Example 34

Evaluation of the Taste Profiles of MRPs from *Stevia* Extract, Mannose and Valine

*Stevia* Extract Material:

*Stevia* extract: the product of Example 37.

General process for Samples 34-1-1 through 34-6-3:

Mannose and valine were blended in particular ratios and noted as a G&P mixture in the table below. The *Stevia* extract material was dissolved together with the G&P mixture in 5 ml deionized water. Sodium carbonate was to the reaction mixture to adjust the pH to about 8 or add citric acid was added to the reaction mixture to adjust the pH to about 3 or no pH regulator was added and the pH was about 5, Then solution was heated at about 100 degrees centigrade for a given period of time. When the reaction was completed, the slurry was dried by a spray dryer to provide an off white powdered MRP.

Experiments

The parameters and the taste profile of the products are as follow. Each sample was evaluated by a panel of 4 people and the results are an average of the panel.

TABLE 34.1

| Sample # | Weight of *Stevia* extract | Weight of mannose | Weight of valine | Ratio of mannose to valine in G&P mixture w/w | Ratio of *Stevia* to G&P mixture w/w | pH | Duration at 100° C./hour | Water in reaction mixture | Taste profile* Intensity of chocolate smell | Intensity of chocolate taste | Full body | Sweet lingering | bitter |
|---|---|---|---|---|---|---|---|---|---|---|---|---|---|
| 34-1-1 | 9.9 g | 0.067 g | 0.033 g | 2:1 | 99:1 | 3 | 2 | 33% | 1 | 0.5 | 1 | 3 | 0.5 |
| 34-1-2 | 9 g | 0.67 g | 0.33 g | 2:1 | 90:10 | 3 | 2 | 33% | 1 | 1 | 2 | 2 | 0.5 |
| 34-1-3 | 8 g | 1.33 g | 0.67 g | 2:1 | 80:20 | 3 | 2 | 33% | 2 | 2 | 3.5 | 1 | 1 |
| 34-1-4 | 7 g | 2 g | 1 g | 2:1 | 70:30 | 3 | 2 | 33% | 2 | 2 | 4 | 1 | 1 |
| 34-1-5 | 6 g | 2.67 g | 1.33 g | 2:1 | 60:40 | 3 | 2 | 33% | 2 | 2.5 | 4 | 1 | 1 |
| 34-1-6 | 5 g | 3.33 g | 1.67 g | 2:1 | 50:50 | 3 | 2 | 33% | 2 | 2.5 | 4 | 0.5 | 1 |
| 34-1-7 | 4 g | 4 g | 2 g | 2:1 | 40:60 | 3 | 2 | 33% | 1 | 1.5 | 3 | 0.5 | 1 |
| 34-1-8 | 3 g | 4.67 g | 2.33 g | 2:1 | 30:70 | 3 | 2 | 33% | 1 | 1.5 | 3 | 0.5 | 0.5 |
| 34-1-9 | 2 g | 5.33 g | 2.67 g | 2:1 | 20:80 | 3 | 2 | 33% | 1 | 1 | 2 | 0.5 | 0.5 |
| 34-1-10 | 1 g | 6 g | 3 g | 2:1 | 10:90 | 3 | 2 | 33% | 1 | 0.5 | 1 | 0 | 0 |
| 34-1-11 | 0.1 g | 6.6 g | 3.3 g | 2:1 | 1:99 | 3 | 2 | 33% | 1 | 0.5 | 1 | 0 | 0 |
| 34-2-1 | 9.9 g | 0.067 g | 0.033 g | 2:1 | 99:1 | 5 | 2 | 33% | 0.5 | 0.5 | 1 | 3 | 0.5 |
| 34-2-2 | 9 g | 0.67 g | 0.33 g | 2:1 | 90:10 | 5 | 2 | 33% | 2 | 2 | 3 | 2 | 1 |
| 34-2-3 | 8 g | 1.33 g | 0.67 g | 2:1 | 80:20 | 5 | 2 | 33% | 2 | 3 | 4 | 1 | 1 |
| 34-2-4 | 7 g | 2 g | 1 g | 2:1 | 70:30 | 5 | 2 | 33% | 2 | 2 | 4 | 1 | 1 |
| 34-2-5 | 6 g | 2.67 g | 1.33 g | 2:1 | 60:40 | 5 | 2 | 33% | 2 | 2 | 3.5 | 1 | 1.5 |
| 34-2-6 | 5 g | 3.33 g | 1.67 g | 2:1 | 50:50 | 5 | 2 | 33% | 2 | 2 | 3 | 0.5 | 1.5 |
| 34-2-7 | 4 g | 4 g | 2 g | 2:1 | 40:60 | 5 | 2 | 33% | 2 | 2 | 3 | 1 | 1 |
| 34-2-8 | 3 g | 4.67 g | 2.33 g | 2:1 | 30:70 | 5 | 2 | 33% | 1.5 | 1.5 | 3 | 1 | 0.5 |
| 34-2-9 | 2 g | 5.33 g | 2.67 g | 2:1 | 20:80 | 5 | 2 | 33% | 1 | 1 | 2 | 0.5 | 0.5 |
| 34-2-10 | 1 g | 6 g | 3 g | 2:1 | 10:90 | 5 | 2 | 33% | 1 | 0.5 | 2 | 0.5 | 0.5 |
| 34-2-11 | 0.1 g | 6.6 g | 3.3 g | 2:1 | 1:99 | 5 | 2 | 33% | 0.5 | 0.5 | 1 | 0 | 1 |

TABLE 34.1-continued

| Sample # | Weight of *Stevia* extract | Weight of mannose | Weight of valine | Ratio of mannose to valine in G&P mixture w/w | Ratio of *Stevia* to G&P mixture w/w | pH | Duration at 100° C./hour | Water in reaction mixture | Taste profile* Intensity of chocolate smell | Intensity of chocolate taste | Full body | Sweet lingering | bitter |
|---|---|---|---|---|---|---|---|---|---|---|---|---|---|
| 34-3-1 | 9.9 g | 0.067 g | 0.033 g | 2:1 | 99:1 | 8 | 2 | 33% | 1 | 0.5 | 2 | 3 | 0.5 |
| 34-3-2 | 9 g | 0.67 g | 0.33 g | 2:1 | 90:10 | 8 | 2 | 33% | 1 | 1 | 2 | 2 | 1 |
| 34-3-3 | 8 g | 1.33 g | 0.67 g | 2:1 | 80:20 | 8 | 2 | 33% | 2 | 2 | 3 | 1.5 | 1 |
| 34-3-4 | 7 g | 2 g | 1 g | 2:1 | 70:30 | 8 | 2 | 33% | 2.5 | 2.5 | 4 | 1 | 1.5 |
| 34-3-5 | 6 g | 2.67 g | 1.33 g | 2:1 | 60:40 | 8 | 2 | 33% | 3 | 3.5 | 4 | 1 | 1.5 |
| 34-3-6 | 5 g | 3.33 g | 1.67 g | 2:1 | 50:50 | 8 | 2 | 33% | 3 | 4 | 3.5 | 1 | 1.5 |
| 34-3-7 | 4 g | 4 g | 2 g | 2:1 | 40:60 | 8 | 2 | 33% | 2 | 2.5 | 3 | 1 | 1 |
| 34-3-8 | 3 g | 4.67 g | 2.33 g | 2:1 | 30:70 | 8 | 2 | 33% | 1 | 1.5 | 2 | 0.5 | 1 |
| 34-3-9 | 2 g | 5.33 g | 2.67 g | 2:1 | 20:80 | 8 | 2 | 33% | 1 | 1 | 2 | 0.5 | 0.5 |
| 34-3-10 | 1 g | 6 g | 3 g | 2:1 | 10:90 | 8 | 2 | 33% | 1 | 1 | 2 | 0 | 0.5 |
| 34-3-11 | 0.1 g | 6.6 g | 3.3 g | 2:1 | 1:99 | 8 | 2 | 33% | 0.5 | 0.5 | 2 | 0 | 1 |
| 34-4-1 | 9.9 g | 0.067 g | 0.033 g | 2:1 | 99:1 | 5 | 4 | 33% | 1 | 1 | 2 | 3 | 0.5 |
| 34-4-2 | 9 g | 0.67 g | 0.33 g | 2:1 | 90:10 | 5 | 4 | 33% | 2 | 2 | 2 | 1.5 | 1 |
| 34-4-3 | 8 g | 1.33 g | 0.67 g | 2:1 | 80:20 | 5 | 4 | 33% | 2 | 2.5 | 3 | 1.5 | 1.5 |
| 34-4-4 | 7 g | 2 g | 1 g | 2:1 | 70:30 | 5 | 4 | 33% | 2 | 2.5 | 3 | 1 | 1.5 |
| 34-4-5 | 6 g | 2.67 g | 1.33 g | 2:1 | 60:40 | 5 | 4 | 33% | 2.5 | 2.5 | 4 | 1 | 1.5 |
| 34-4-6 | 5 g | 3.33 g | 1.67 g | 2:1 | 50:50 | 5 | 4 | 33% | 3 | 4.5 | 4 | 1 | 2 |
| 34-4-7 | 4 g | 4 g | 2 g | 2:1 | 40:60 | 5 | 4 | 33% | 2 | 2.5 | 3 | 1 | 2 |
| 34-4-8 | 3 g | 4.67 g | 2.33 g | 2:1 | 30:70 | 5 | 4 | 33% | 2 | 1.5 | 3 | 1 | 1.5 |
| 34-4-9 | 2 g | 5.33 g | 2.67 g | 2:1 | 20:80 | 5 | 4 | 33% | 1.5 | 1 | 2 | 0.5 | 1.5 |
| 34-4-10 | 1 g | 6 g | 3 g | 2:1 | 10:90 | 5 | 4 | 33% | 1 | 1 | 2 | 0.5 | 1 |
| 34-4-11 | 0.1 g | 6.6 g | 3.3 g | 2:1 | 1:99 | 5 | 4 | 33% | 1 | 0.5 | 2 | 0 | 1 |
| 34-5-1 | 9.9 g | 0.05 g | 0.05 g | 1:1 | 99:1 | 5 | 2 | 33% | 0.5 | 0.5 | 1 | 3 | 1 |
| 34-5-2 | 9 g | 0.5 g | 0.5 g | 1:1 | 90:10 | 5 | 2 | 33% | 1 | 1 | 2 | 2 | 1.5 |
| 34-5-3 | 8 g | 1 g | 1 g | 1:1 | 80:20 | 5 | 2 | 33% | 1 | 1 | 2 | 1 | 1 |
| 34-5-4 | 7 g | 1.5 g | 1.5 g | 1:1 | 70:30 | 5 | 2 | 33% | 1 | 1.5 | 2 | 1 | 1 |
| 34-5-5 | 6 g | 2 g | 2 g | 1:1 | 60:40 | 5 | 2 | 33% | 2 | 3 | 3 | 1 | 1.5 |
| 34-5-6 | 5 g | 2.5 g | 2.5 g | 1:1 | 50:50 | 5 | 2 | 33% | 2 | 3.5 | 3.5 | 1 | 1.5 |
| 34-5-7 | 4 g | 3 g | 3 g | 1:1 | 40:60 | 5 | 2 | 33% | 2 | 2 | 3 | 1 | 1.5 |
| 34-5-8 | 3 g | 3.5 g | 3.5 g | 1:1 | 30:70 | 5 | 2 | 33% | 2 | 1.5 | 3 | 0.5 | 1.5 |
| 34-5-9 | 2 g | 4 g | 4 g | 1:1 | 20:80 | 5 | 2 | 33% | 2 | 1 | 2 | 0.5 | 0.5 |
| 34-5-10 | 1 g | 4.5 g | 4.5 g | 1:1 | 10:90 | 5 | 2 | 33% | 2 | 1 | 2 | 0.5 | 0.5 |
| 34-5-11 | 0.1 g | 4.95 g | 4.95 g | 1:1 | 1:99 | 5 | 2 | 33% | 1 | 1 | 2 | 0 | 0 |
| 34-6-1 | 9 g | 0.67 g | 0.33 g | 2:1 | 90:10 | 5 | 8 | 33% | 2 | 2.5 | 3 | 1 | 1 |
| 34-6-2 | 9 g | 0.67 g | 0.33 g | 2:1 | 90:10 | 5 | 12 | 33% | 2 | 1.5 | 2 | 0.5 | 1 |
| 34-6-3 | 9 g | 0.67 g | 0.33 g | 2:1 | 90:10 | 5 | 24 | 33% | 2 | 1.5 | 2 | 0 | 0 |

*the solid content of the taste solution is 500 ppm for each sample.

Method: For evaluation of the taste profile, the samples were tested by a panel of four people. The panel was asked to describe the taste profile and score values between 0-5 according to the increasing intensity of chocolate smell, intensity of chocolate taste, full body, sweet lingering and bitterness. 1 trained taster tasted independently the samples first. The taster was allowed to re-taste, and then made notes for the sensory attributes perceived. Afterwards, another 3 tasters tasted and the attributes noted were discussed openly to find a suitable description. in case that more than 1 taster disagreed with the result, the tasting was repeated. For example, a "5" for intensity of chocolate smell is the best score for having a strong pleasant smell and conversely a value of 0 or near zero means the smell is very slight. Similarly, a "5" for bitterness, and sweet lingering is not desired. A value of zero or near zero means that the bitterness, and/or sweet lingering is reduced or is removed.

Data Analysis

Figure 4:
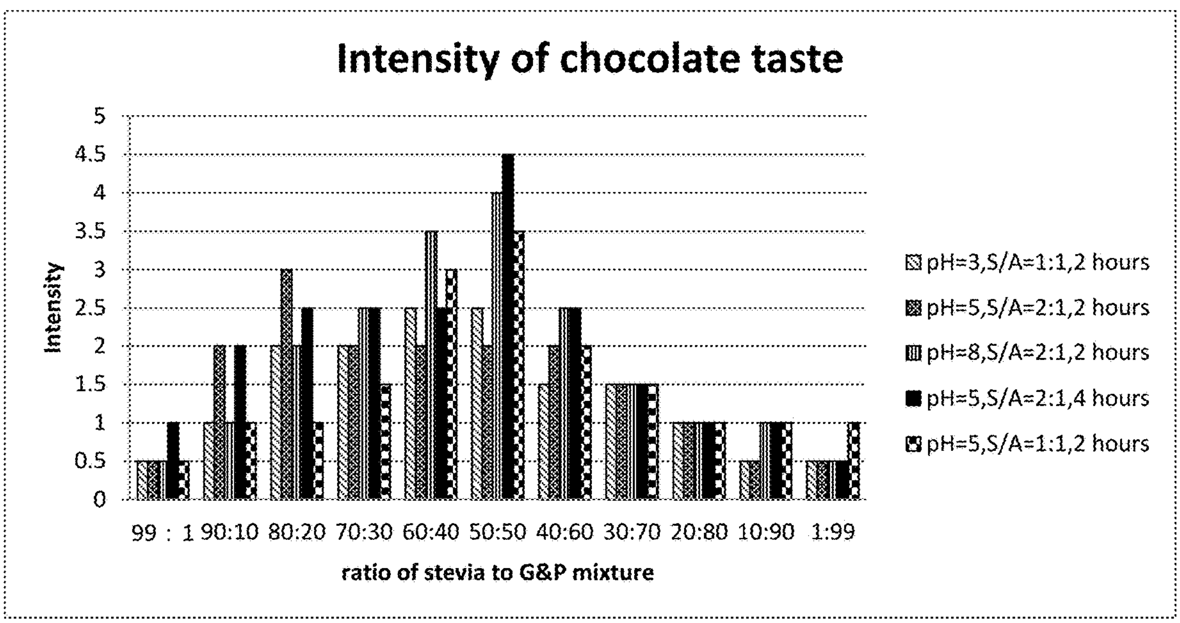
FIG. 4 depicts a relationship between the intensity of chocolate taste to the ratio of *Stevia* to mannose and valine mixtures.

The relationship between the intensity of chocolate taste to the ratio of *Stevia* to the G&P mixture in this example is depicted in FIG. 4, Observations:

(1) For pH, the MRPs prepared with an acidic regulator, an alkaline regulator or at their naturally occurring pH gave a pleasant chocolate taste and fragrance, as well as improving the mouth feel of *Stevia* extract.

(2) For the ratio of *Stevia* to the G&P mixtures, it can be seen that over the ratio range of 99:1 to 1:99, the MRPs provided fragrance, taste, and mouth feel improvements. There is a range in which the taste and mouth feel of the MRPs was better and the range was related to pH conditions. When components were reacted for 2 hours, the ratio range is about 80:20 to 50:50 at pH 3; 90:10 to 40:60 at pH 5; and 80:20 to 40:60 at pH 8.

(3) For the ratio of mannose to valine, the improvement of fragrance, taste, and mouth feel was more intense by increasing the ratio of mannose to valine. The more mannose, the better taste profile and the more extensive the range of the ratio of *Stevia* to the G&P mixture.

(4) For the reaction duration, the MRPs can improve the fragrance, taste, and mouth feel of *Stevia* extract even after reaction of the components at 24 hours. However, shorter reaction times, for example 4 hours and 8 hours, appear to improve the products. That is, because it is believed that, the flavorful substances generated early on in the reaction may change to less flavorful MRPs after additional reaction time.

Example 35

Evaluation of the Taste Profiles of MRPs from *Stevia* Extract, Mannose and Proline

*Stevia* Extract Material:

*Stevia* extract: the product of Example 37.

General process for Samples 35-1-1 through 35-5-6:

Mannose and proline were blended in particular ratios and noted as a G&P mixture in the table below. The *Stevia* extract material was dissolved together with the G&P mixture in 5 ml deionized water. Sodium carbonate was added to the reaction mixture to adjust the pH to about 8 or add citric acid was added to the reaction mixture to adjust the pH to about 3 or no pH regulator was added and the naturally occurring pH was about 5. The solution was heated at about 100 degrees centigrade for a given period of time. When the reaction was completed, the slurry was dried by spray dryer to provide an off white powder MRP.

Experiments

The parameters and the taste profile of the products are as follow. Each sample was evaluated by a panel of 4 people and the results were average of the panel.

TABLE 33.1

| | | | | | | | | | Taste profile* | | | | |
|---|---|---|---|---|---|---|---|---|---|---|---|---|---|
| Sample # | Weight of *Stevia* extract | Weight of mannose | Weight of proline | Ratio of mannose to proline in G&P mixture w/w | Ratio of *Stevia* to G&P mixture w/w | pH | Duration at 100° C./hour | Water in reaction mixture | Intensity of popcorn smell | Intensity of popcorn taste | Full body | Sweet lingering | bitter |
| 35-1-1 | 9.9 g | 0.067 g | 0.033 g | 2:1 | 99:1 | 3 | 4 | 33% | 1 | 1 | 2 | 3 | 0.5 |
| 35-1-2 | 9 g | 0.67 g | 0.33 g | 2:1 | 90:10 | 3 | 4 | 33% | 3 | 3 | 4 | 1 | 0.5 |
| 35-1-3 | 8 g | 1.33 g | 0.67 g | 2:1 | 80:20 | 3 | 4 | 33% | 4 | 3 | 4 | 1 | 0.5 |
| 35-1-4 | 7 g | 2 g | 1 g | 2:1 | 70:30 | 3 | 4 | 33% | 2 | 2.5 | 3 | 1 | 0.5 |
| 35-1-5 | 6 g | 2.67 g | 1.33 g | 2:1 | 60:40 | 3 | 4 | 33% | 2 | 2 | 3 | 1 | 0.5 |
| 35-1-6 | 5 g | 3.33 g | 1.67 g | 2:1 | 50:50 | 3 | 4 | 33% | 2 | 2 | 3 | 1 | 0.5 |
| 35-2-1 | 9.9 g | 0.067 g | 0.033 g | 2:1 | 99:1 | 5 | 4 | 33% | 1 | 2 | 3 | 1.5 | 1 |
| 35-2-2 | 9 g | 0.67 g | 0.33 g | 2:1 | 90:10 | 5 | 4 | 33% | 2 | 3.5 | 4 | 1.5 | 1 |
| 35-2-3 | 8 g | 1.33 g | 0.67 g | 2:1 | 80:20 | 5 | 4 | 33% | 3.5 | 4 | 4 | 1.5 | 1 |
| 35-2-4 | 7 g | 2 g | 1 g | 2:1 | 70:30 | 5 | 4 | 33% | 2.5 | 2.5 | 3.5 | 1.5 | 1 |
| 35-2-5 | 6 g | 2.67 g | 1.33 g | 2:1 | 60:40 | 5 | 4 | 33% | 2 | 2 | 3 | 1.5 | 1 |
| 35-2-6 | 5 g | 3.33 g | 1.67 g | 2:1 | 50:50 | 5 | 4 | 33% | 2 | 2 | 3 | 1 | 0.5 |
| 35-2-7 | 4 g | 4 g | 2 g | 2:1 | 40:60 | 5 | 4 | 33% | 1.5 | 1 | 3 | 1 | 0.5 |
| 35-2-8 | 3 g | 4.67 g | 2.33 g | 2:1 | 30:70 | 5 | 4 | 33% | 1 | 1 | 2 | 0.5 | 0.5 |
| 35-2-9 | 2 g | 5.33 g | 2.67 g | 2:1 | 20:80 | 5 | 4 | 33% | 1 | 1 | 2 | 0.5 | 0.5 |
| 35-2-10 | 1 g | 6 g | 3 g | 2:1 | 10:90 | 5 | 4 | 33% | 1 | 0.5 | 1 | 0 | 0.5 |
| 35-2-11 | 0.1 g | 6.6 g | 3.3 g | 2:1 | 1:99 | 5 | 4 | 33% | 0.5 | 0.5 | 1 | 0 | 0.5 |
| 35-3-1 | 9.9 g | 0.067 g | 0.033 g | 2:1 | 99:1 | 8 | 4 | 33% | 1 | 1 | 2 | 3 | 1 |
| 35-3-2 | 9 g | 0.67 g | 0.33 g | 2:1 | 90:10 | 8 | 4 | 33% | 4.5 | 4 | 4 | 1 | 1.5 |
| 35-3-3 | 8 g | 1.33 g | 0.67 g | 2:1 | 80:20 | 8 | 4 | 33% | 3.5 | 3 | 3.5 | 1 | 1.5 |
| 35-3-4 | 7 g | 2 g | 1 g | 2:1 | 70:30 | 8 | 4 | 33% | 2 | 1.5 | 3 | 1 | 1 |
| 35-3-5 | 6 g | 2.67 g | 1.33 g | 2:1 | 60:40 | 8 | 4 | 33% | 1 | 1 | 2 | 1 | 0.5 |
| 35-3-6 | 5 g | 3.33 g | 1.67 g | 2:1 | 50:50 | 8 | 4 | 33% | 1 | 1 | 2 | 1 | 0.5 |
| 35-4-1 | 9.9 g | 0.067 g | 0.033 g | 2:1 | 99:1 | 5 | 2 | 33% | 1 | 1 | 2 | 2 | 0.5 |
| 35-4-2 | 9 g | 0.67 g | 0.33 g | 2:1 | 90:10 | 5 | 2 | 33% | 2.5 | 2 | 3 | 1.5 | 0.5 |
| 35-4-3 | 8 g | 1.33 g | 0.67 g | 2:1 | 80:20 | 5 | 2 | 33% | 3.5 | 3 | 3 | 1.5 | 1 |
| 35-4-4 | 7 g | 2 g | 1 g | 2:1 | 70:30 | 5 | 2 | 33% | 3.5 | 3.5 | 3 | 1.5 | 1 |
| 35-4-5 | 6 g | 2.67 g | 1.33 g | 2:1 | 60:40 | 5 | 2 | 33% | 2.5 | 1.5 | 2 | 1 | 1 |
| 35-4-6 | 5 g | 3.33 g | 1.67 g | 2:1 | 50:50 | 5 | 2 | 33% | 1.5 | 1.5 | 2 | 1 | 0.5 |
| 35-4-7 | 4 g | 4 g | 2 g | 2:1 | 40:60 | 5 | 2 | 33% | 1.5 | 1 | 2 | 1 | 0.5 |
| 35-4-8 | 3 g | 4.67 g | 2.33 g | 2:1 | 30:70 | 5 | 2 | 33% | 1 | 1 | 2 | 1 | 0.5 |
| 35-4-9 | 2 g | 5.33 g | 2.67 g | 2:1 | 20:80 | 5 | 2 | 33% | 1 | 1 | 1.5 | 1 | 0.5 |
| 35-4-10 | 1 g | 6 g | 3 g | 2:1 | 10:90 | 5 | 2 | 33% | 1 | 1 | 1 | 0.5 | 0.5 |
| 35-4-11 | 0.1 g | 6.6 g | 3.3 g | 2:1 | 1:99 | 5 | 2 | 33% | 1 | 0.5 | 1 | 0 | 0 |
| 35-5-1 | 9.9 g | 0.05 g | 0.05 g | 1:1 | 99:1 | 5 | 4 | 33% | 1 | 2 | 3 | 1.5 | 1 |
| 35-5-2 | 9 g | 0.5 g | 0.5 g | 1:1 | 90:10 | 5 | 4 | 33% | 3 | 3 | 4 | 1 | 1.5 |
| 35-5-3 | 8 g | 1 g | 1 g | 1:1 | 80:20 | 5 | 4 | 33% | 2.5 | 2 | 3 | 1 | 1.5 |
| 35-5-4 | 7 g | 1.5 g | 1.5 g | 1:1 | 70:30 | 5 | 4 | 33% | 1.5 | 1 | 2 | 1 | 1 |
| 35-5-5 | 6 g | 2 g | 2 g | 1:1 | 60:40 | 5 | 4 | 33% | 1 | 1 | 2 | 1 | 0.5 |
| 35-5-6 | 5 g | 2.5 g | 2.5 g | 1:1 | 50:50 | 5 | 4 | 33% | 1 | 1 | 2 | 1 | 0.5 |

*the solid content of the taste solution is 500 ppm for each sample.

Method: For evaluation of the taste profile, the samples were tested by a panel of four people. The panel was asked to describe the taste profile and score values between 0-5 according to the increasing intensity of popcorn smell, intensity of popcorn taste, full body, sweet lingering and bitterness. 1 trained taster tasted independently the samples first. The tester was allowed to re-taste, and then made notes for the sensory attributes perceived. Afterwards, another 3 tasters tasted and the attributes noted were discussed openly to find a suitable description. in case that more than 1 taster disagreed with the result, the tasting was repeated. For example, a "5" for intensity of popcorn smell is the best score for having a strong pleasant smell and conversely a value of 0 or near zero means the smell is very slight. Similarly, a "5" for bitterness, and sweet lingering is not desired. A value of zero or near zero means that the bitterness, and/or sweet lingering is reduced or is removed.

Data Analysis

Figure 5:
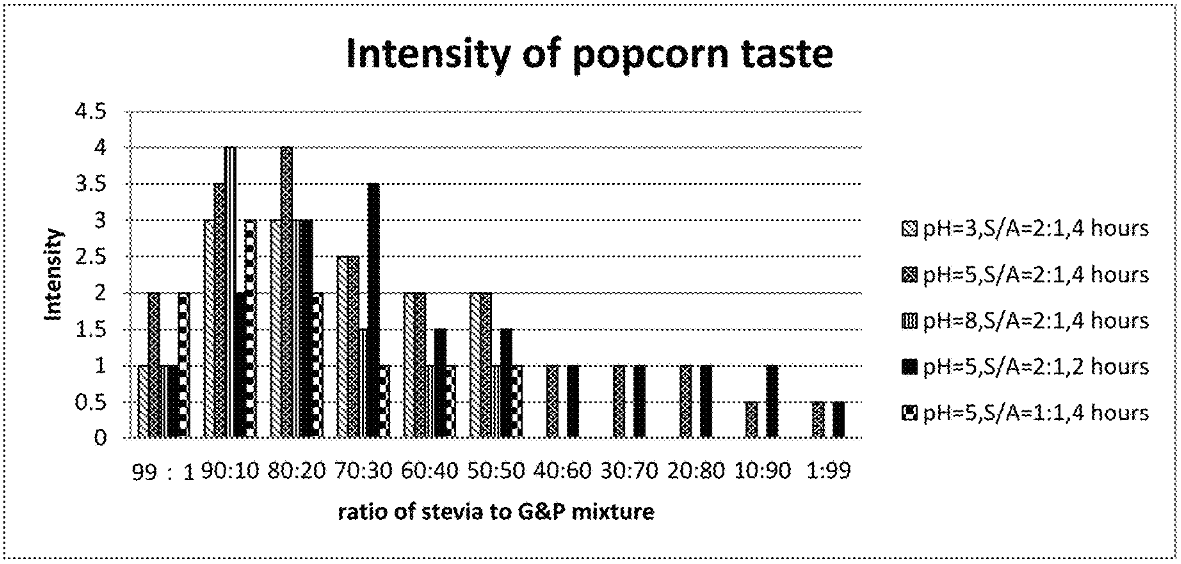
FIG. 5 depicts a relationship between the intensity of popcorn taste to the ratio of *Stevia* to mannose and proline mixtures.

The relationship between the intensity of popcorn taste to the ratio of *Stevia* to G&P mixture in this example is depicted in FIG. 5.

Observations:

(1) For pH, the MRPs prepared with an acidic regulator, an alkaline regulator or at their naturally occurring pH provided a pleasant popcorn taste and fragrance, as well as improving the mouth feel of *Stevia* extract. The effect was more intense at the naturally occurring pH value (pH5) than at adjusted pH values (pH3 or 8).

(2) For the ratio of *Stevia* to the G&P mixtures, it can be seen that over the ratio range of 99:1 to 1:99, the MRPs can all give fragrance, taste, and mouth feel improvements. There is a range in which the taste and mouth feel of the MRPs was better and the range was related to pH conditions. When components were reacted for 4 hours, the ratio ranges were about 90:10 to 50:50 at pH 3; 99:1 to 50:50 at pH 5; and 90:10 to 80:20 at pH 8.

(3) For the ratio of mannose to proline, the improvement of fragrance, taste, and mouth feel was more intense by increasing the ratio of mannose to proline. The more mannose, the better the taste profile and the more extensive the range of the ratio of *Stevia* to the G&P mixture.

Example 36

Comparison of the Taste Profiles of MRPs Prepared by Different Reactants

Evaluate the improvement of MRP relative to sucralose

Materials:

*Stevia* extract: the product of Example 37.

Sucralose: available from ANHUI JINHE INDUSTRIAL CO., LTD, China

General processes for Samples 36-1 through 36-12:

Method #1 (Samples 36-1 to 36-4):

The product of Example 37 was dissolved with an amino acid and a reducing sugar in deionized water as noted in the table below. The solution was then heated at about 100 degrees centigrade for about 2 hours. When the reaction was completed, the reaction mixture was cooled to room temperature. Sucralose was then added to the mixture. The resultant slurry was freeze dried to provide an off white powdered MRP.

Method #2 (Samples 36-5 to 36-8):

An amino acid and a reducing sugar were dissolved in deionized water as noted in the table below. The solution was heated at about 100 degrees centigrade for about 2 hours. When the reaction was completed, the reaction mixture was cooed to room temperature. Sucralose was then added to the mixture. The resultant slurry was freeze dried to provide an off white powdered MRP.

Method #3 (Samples 36-9 to 36-12):

Sucralose, an amino acid and a reducing sugar were dissolved in deionized water as noted in the table below. Then heat the solution at about 100 degrees centigrade for about 2. hours. When the reaction completes, cool the reaction mixture to room temperature. The resulted slurry is dried by freeze dryer. Thus obtain the off white powder MRP.

Experiments

The parameters and the taste profile of the products are as follow. The evaluation was a comparison to sucralose.

TABLE 36.1

| Sample # | *Stevia* extract/g | Amino acid/g | Reducing sugar/g | Water in reaction mixture/g | Sucralose/g |
|---|---|---|---|---|---|
| 36-1 | 4 | phenylalanine/0.333 | glucose/0.667 | 2.5 | 1 |
| 36-2 | 3.5 | phenylalanine/0.5 | mannose/ 1.0 | 2.5 | 1 |
| 36-3 | 3 | lysine/0.667 | mannose/ 1.333 | 2.5 | 1 |
| 36-4 | 4 | glutamic acid/0.333 | galactose/ 0.667 | 2.5 | 1 |
| 36-5 | 0 | phenylalanine/0.333 | glucose/ 0.667 | 2.5 | 1 |
| 36-6 | 0 | phenylalanine/0.5 | mannose/ 1.0 | 2.5 | 1 |
| 36-7 | 0 | lysine/0.667 | mannose/ 1.333 | 2.5 | 1 |
| 36-8 | 0 | glutamic acid/0.333 | galactose/ 0.667 | 2.5 | 1 |
| 36-9 | 0 | phenylalanine/0.333 | glucose/ 0.667 | 2.5 | 4 |
| 36-10 | 0 | phenylalanine/0.5 | mannose/ 1.0 | 2.5 | 3.5 |
| 36-11 | 0 | lysine/0.667 | mannose/ 1.333 | 2.5 | 3 |
| 36-12 | 0 | glutamic acid/0.333 | galactose/ 0.667 | 2.5 | 4 |

Evaluation

The appropriate product or control (sucralose) was dissolved in deionized water to make the concentration of sucralose in each solution equal to 200 ppm (the content of sucralose in the mixture is based on its proportion in the materials). A panel of 4 people evaluated the solutions by tasting the solutions and describing the taste profile. The results are as follow:

TABLE 36.2

| | | Taste profile* | | | | | | |
|---|---|---|---|---|---|---|---|---|
| Preparation method | Sample # | Type of flavor | Intensity of flavor | sweetness | Full body | Sweet lingering | bitter | Metallic aftertaste |
| Method #1 | 36-1 | floral | 3 | 5 | 4 | 3 | 1 | 2 |
| | 36-2 | nectar | 4 | 5 | 4.5 | 3 | 0.5 | 2 |
| | 36-3 | peach | 2.5 | 5 | 4 | 4 | 1 | 2.5 |
| | 36-4 | tangerine | 3.5 | 4.5 | 4 | 3 | 0.5 | 1.5 |
| Method #2 | 36-5 | floral | 1.5 | 4 | 3 | 4.5 | 0.5 | 3 |
| | 36-6 | nectar | 1 | 4.5 | 3.5 | 4 | 0.5 | 2.5 |
| | 36-7 | peach | 1 | 4 | 3 | 4.5 | 1 | 3 |
| | 36-8 | tangerine | 1 | 4 | 3 | 4.5 | 1 | 3 |
| Method #3 | 36-9 | floral | 2.5 | 3.5 | 4 | 3 | 0.5 | 2 |
| | 36-10 | nectar | 3 | 3.5 | 4 | 3 | 0.5 | 2 |
| | 36-11 | peach | 2.5 | 3 | 4 | 4 | 0.5 | 1.5 |
| | 36-12 | tangerine | 3 | 3.5 | 4 | 3 | 0.5 | 2 |
| — | control | None | 0 | 4 | 3 | 5 | 1 | 4 |

Method: For evaluation of the taste profile, the samples were tested by a panel of four people. The panel was asked to describe the taste profile and score values between 0-5 according to the increasing intensity of smell, intensity of taste, full body, sweet lingering and bitterness. 1 trained taster tasted independently the samples first. The tester was allowed to re-taste, and then made notes for the sensory attributes perceived. Afterwards, another 3 tasters tasted and the attributes noted were discussed openly to find a suitable description. In case that more than 1 taster disagreed with the result, the tasting was repeated. For example, a "5" for intensity of smell is the best score for having a strong pleasant smell and conversely a value of 0 or near zero means the smell is very slight. Similarly, a "5" for bitterness, and sweet lingering is not desired. A value of zero or near zero means that the bitterness, and/or sweet lingering is reduced or is removed.

Observations:

In addition to providing special flavors, MRPs can improve the taste profile of sucralose by cutting the sweet lingering taste, reducing bad aftertaste and providing a full mouth feel. However, the effect of the MRPs derived from amino acid and reduced sugar (method #1) was not as significant. Samples from methods 42 or 43 had better taste profiles than that of sucralose as the control.

Example 37

Preparation of *Stevia* Extract Used as the Material of MRPs

Air-dried leaves of *Stevia* rebaudiana (lkg) were extracted with distilled water at 45-55° C. for 2 hours. The extracting step was repeated three times. The volume of water in each extracting stage was 5 L, 5 L and 3 L, respectively. The liquid extract was separated from the solids by centrifugation. The filtered supernatant liquid extract was flocculated and the supernatant was separated by centritligation. The supernatant was passed through a macroporous resin (1 L, resin model: T28, available from Sunresin new materials Co. Ltd., China) and then desorbed with 3 L of 65% ethanol/water. The desorption solution was treated by 1 L of cationic exchange resin and 1 L of anion exchange resin for desalination and decoloration. The desorption solution was spray-dried to a powder and designated as the crude extract. The crude extract was dissolved in 3 times its weight of 80% ethanol aqueous solution. The solution was then heated to 75-80° C. and stirred for 1 hour. The solution was then cooled and allowed to stand for an hour at 20-25° C. The supernatant and precipitate were separated through centrifugation. The resultant precipitate was used to produce *Stevia* extract product, RA97. The supernatant was distilled to recover ethanol and subsequently spray-dried to a powder. The powder was dissolved in 10 times its weight of water and treated with a macroporous resin (IL, resin model: T28, available from Sunresin new materials Co. Ltd., China). Materials were desorbed with a mixture of ethanol and water with different blend ratios. The desorption solution with low blend ratio of ethanol/water mixture such as 3 L of 30% ethanol was concentrated and subsequently spray-dried to provide a powder. This powder was designated as the "final powder" which contained about 20-35% 3-10% RD and 70-95% total steviol glycosides (TSG based on 13 glycosides, include RA, RB, RC RD, RE, RF, RN, RM, RO, DulcA, RU, STV and STB). The powder was used as material of MRP in the Examples 31-36 above and examples which indicate that the raw materials used were "the product of Example 37." Example 13 gives a typical product of this process and its composition.

In another embodiment, the "final powder" also contained about 15-45% STV, about 0.1-2% RB, about 5-15% RC, about 0-1% RE, about 2-5% RF, about 0-1% RM, about 0-1% RN, about 0.5-2% RO, about 1-3% DulcA, about 1-3% RU, about 0-2% STB.

Materials and Methods

Materials

Chemicals used for Maillard reactions were supplied by Sigma-Aldrich (Food Grade). Solvents and chemicals for analysis (GC/MS and LC/DAD/MS were supplied by Sigma-Aldrich (HPLC-grade and USP certified material). Reb-B (Lot RB 100722) and Reb-A (Lot Reb A 100 EPC 043-17-02) were supplied by EPC Natural Products.

Samples SG 1-1, SG 1-2, . . . etc. are samples taken of Example 37 (above). The components are provided as follow.

TABLE 37.1

| Steviol glycosides in SG Sample No. 1-1 (182.3 mg/10 ml) | | | |
|---|---|---|---|
| Name | m/z [M − H]⁻ | mg/10 ml | % m/m |
| Related steviol glycoside #1 | 517 or 427 | <0.01 | <0.01 |
| Related steviol glycoside #2 | 981 | <0.01 | <0.01 |
| Related steviol glycoside #3 | 427 or 735 | <0.01 | <0.01 |
| Related steviol glycoside #4 | 675 or 1127 | <0.01 | <0.01 |
| Related steviol glycoside #5 | 981 | <0.01 | <0.01 |
| Reb-V | 1259 | 0.88 | 0.49 |
| Reb-T | 1127 | 0.80 | 0.44 |
| Reb-E | 965 | 0.34 | 0.19 |
| Reb-O | 1435 | 2.02 | 1.11 |
| Reb-D | 1127 | 14.16 | 7.77 |
| Reb-K | 1111 | 7.62 | 4.18 |
| Reb-N | 1273 | 0.54 | 0.30 |
| Reb-M | 1289 | 0.51 | 0.28 |
| Reb-S | 949 | 2.19 | 1.20 |
| Reb-J | 1111 | 0.73 | 0.40 |
| Reb-W | 1097 | 0.91 | 0.50 |
| Reb-U2 | 1097 | 0.29 | 0.16 |
| Reb-W2/3 | 1097 | <0.01 | <0.01 |
| Reb-O2 | 965 | 0.32 | 0.18 |
| Reb-Y | 1259 | 0.18 | 0.10 |
| Reb-I | 1127 | 0.30 | 0.16 |
| Reb-V2 | 1259 | 0.27 | 0.15 |
| Reb-K2 | 1111 | 0.39 | 0.22 |
| Reb-H | 1111 | <0.01 | <0.01 |
| Reb-A | 965 | 45.26 | 24.83 |
| Stevioside | 803 | 39.05 | 21.42 |
| Reb-F | 935 | 4.70 | 2.58 |
| Reb-C | 949 | 20.69 | 11.35 |
| Dulcoside-A | 787 | 2.53 | 1.39 |
| Rubusoside | 641 | 3.82 | 2.10 |
| Reb-B | 803 | 2.39 | 1.31 |
| Dulcoside B | 787 | 1.97 | 1.08 |
| Steviolbioside | 641 | <0.01 | <0.01 |
| Reb-R | 935 | <0.01 | <0.01 |
| Reb-G | 803 | <0.01 | <0.01 |
| Stevioside-B | 787 | <0.01 | <0.01 |
| Reb-G1 | 641 | <0.01 | <0.01 |
| Reb-R1 | 773 | <0.01 | <0.01 |
| Reb-F1 | 773 | <0.01 | <0.01 |
| Iso-Steviolbioside | 641 | <0.01 | <0.01 |
| | Sum | 152.85 | 83.84 |

TABLE 37.2

| Steviol glycosides in SG Sample No. 1-2 (154.4 mg/10 ml) | | | |
|---|---|---|---|
| Name | m/z [M − H]⁻ | mg/10 ml | % m/m |
| Related steviol glycoside #1 | 517 or 427 | <0.01 | <0.01 |
| Related steviol glycoside #2 | 981.00 | <0.01 | <0.01 |
| Related steviol glycoside #3 | 427 or 735 | <0.01 | <0.01 |
| Related steviol glycoside #4 | 675 or 1127 | 0.49 | 0.32 |
| Related steviol glycoside #5 | 981 | 0.36 | 0.23 |
| Reb-V | 1259 | 0.83 | 0.54 |
| Reb-T | 1127 | 1.32 | 0.86 |
| Reb-E | 965 | 0.48 | 0.31 |
| Reb-O | 1435 | 1.95 | 1.27 |
| Reb-D | 1127 | 13.45 | 8.71 |
| Reb-K | 1111 | 6.90 | 4.47 |
| Reb-N | 1273 | 0.32 | 0.20 |
| Reb-M | 1289 | 0.39 | 0.25 |
| Reb-S | 949 | 2.36 | 1.53 |
| Reb-J | 1111 | 0.34 | 0.22 |
| Reb-W | 1097 | 0.57 | 0.37 |
| Reb-U2 | 1097 | 0.73 | 0.47 |
| Reb-W2/3 | 1097 | 0.31 | 0.20 |
| Reb-O2 | 965 | 0.23 | 0.15 |
| Reb-Y | 1259 | 0.22 | 0.15 |
| Reb-I | 1127 | 0.23 | 0.15 |
| Reb-V2 | 1259 | 0.48 | 0.31 |
| Reb-K2 | 1111 | 0.49 | 0.31 |
| Reb-H | 1111 | 0.28 | 0.18 |

TABLE 37.2-continued

| Steviol glycosides in SG Sample No. 1-2 (154.4 mg/10 ml) | | | |
|---|---|---|---|
| Name | m/z [M − H]⁻ | mg/10 ml | % m/m |
| Reb-A | 965 | 44.56 | 28.86 |
| Stevioside | 803 | 38.40 | 24.87 |
| Reb-F | 935 | 4.75 | 3.07 |
| Reb-C | 949 | 16.32 | 10.57 |
| Dulcoside-A | 787 | 1.79 | 1.16 |
| Rubusoside | 641 | 2.77 | 1.80 |
| Reb-B | 803 | 1.83 | 1.19 |
| Dulcoside B | 787 | 0.48 | 0.31 |
| Steviolbioside | 641 | 1.91 | 1.24 |
| Reb-R | 935 | 0.95 | 0.62 |
| Reb-G | 803 | 0.64 | 0.41 |
| Stevioside-B | 787 | <0.01 | <0.01 |
| Reb-G1 | 641 | <0.01 | <0.01 |
| Reb-R1 | 773 | <0.01 | <0.01 |
| Reb-F1 | 773 | 0.39 | 0.25 |
| Iso-Steviolbioside | 641 | <0.01 | <0.01 |
| | Sum | 147.52 | 95.54 |

TABLE 37.3

| Steviol glycosides in SG Sample No. 1-3 (149.5 mg/10 ml) | | | |
|---|---|---|---|
| Name | m/z [M − H]⁻ | mg/10 ml | % m/m |
| Related steviol glycoside #1 | 517 or 427 | <0.01 | <0.01 |
| Related steviol glycoside #2 | 981.00 | <0.01 | <0.01 |
| Related steviol glycoside #3 | 427 or 735 | <0.01 | <0.01 |
| Related steviol glycoside #4 | 675 or 1127 | 0.15 | 0.10 |
| Related steviol glycoside #5 | 981 | <0.01 | <0.01 |
| Reb-V | 1259 | 0.88 | 0.59 |
| Reb-T | 1127 | 1.46 | 0.98 |
| Reb-E | 965 | <0.01 | <0.01 |
| Reb-O | 1435 | 1.62 | 1.08 |
| Reb-D | 1127 | 11.70 | 7.83 |
| Reb-K | 1111 | 5.95 | 3.98 |
| Reb-N | 1273 | <0.01 | <0.01 |
| Reb-M | 1289 | 0.40 | 0.27 |
| Reb-S | 949 | 2.21 | 1.48 |
| Reb-J | 1111 | 0.26 | 0.17 |
| Reb-W | 1097 | 0.53 | 0.36 |
| Reb-U2 | 1097 | 0.75 | 0.50 |
| Reb-W2/3 | 1097 | 0.30 | 0.20 |
| Reb-O2 | 965 | 0.23 | 0.15 |
| Reb-Y | 1259 | 0.20 | 0.13 |
| Reb-I | 1127 | 0.36 | 0.24 |
| Reb-V2 | 1259 | 0.40 | 0.27 |
| Reb-K2 | 1111 | <0.01 | <0.01 |
| Reb-H | 1111 | <0.01 | <0.01 |
| Reb-A | 965 | 42.36 | 28.34 |
| Stevioside | 803 | 40.28 | 26.94 |
| Reb-F | 935 | 4.76 | 3.18 |
| Reb-C | 949 | 18.44 | 12.34 |
| Dulcoside-A | 787 | 1.96 | 1.31 |
| Rubusoside | 641 | 2.96 | 1.98 |
| Reb-B | 803 | 2.39 | 1.60 |
| Dulcoside B | 787 | 0.45 | 0.30 |
| Steviolbioside | 641 | 2.40 | 1.60 |
| Reb-R | 935 | <0.01 | <0.01 |
| Reb-G | 803 | <0.01 | <0.01 |
| Stevioside-B | 787 | <0.01 | <0.01 |
| Reb-G1 | 641 | <0.01 | <0.01 |
| Reb-R1 | 773 | <0.01 | <0.01 |
| Reb-F1 | 773 | <0.01 | <0.01 |
| Iso-Steviolbioside | 641 | <0.01 | <0.01 |
| | Sum | 143.42 | 95.93 |

TABLE 37.4

| Steviol glycosides in SG Sample No. 1-4 (151.4 mg/10 ml) | | | |
|---|---|---|---|
| Name | m/z [M − H]⁻ | mg/10 ml | % m/m |
| Related steviol glycoside #1 | 517 or 427 | <0.01 | <0.01 |
| Related steviol glycoside #2 | 981.00 | <0.01 | <0.01 |
| Related steviol glycoside #3 | 427 or 735 | <0.01 | <0.01 |
| Related steviol glycoside #4 | 675 or 1127 | <0.01 | <0.01 |
| Related steviol glycoside #5 | 981 | 0.15 | 0.10 |
| Reb-V | 1259 | 0.71 | 0.47 |
| Reb-T | 1127 | 0.94 | 0.62 |
| Reb-E | 965 | 0.30 | 0.20 |
| Reb-O | 1435 | 1.39 | 0.92 |
| Reb-D | 1127 | 9.34 | 6.17 |
| Reb-K | 1111 | 4.98 | 3.29 |
| Reb-N | 1273 | <0.01 | <0.01 |
| Reb-M | 1289 | 0.28 | 0.19 |
| Reb-S | 949 | 1.85 | 1.22 |
| Reb-J | 1111 | 0.27 | 0.18 |
| Reb-W | 1097 | 0.40 | 0.27 |
| Reb-U2 | 1097 | 0.59 | 0.39 |
| Reb-W2/3 | 1097 | 0.27 | 0.18 |
| Reb-O2 | 965 | 0.21 | 0.14 |
| Reb-Y | 1259 | 0.46 | 0.31 |
| Reb-I | 1127 | 0.85 | 0.56 |
| Reb-V2 | 1259 | 0.67 | 0.44 |
| Reb-K2 | 1111 | 0.20 | 0.13 |
| Reb-H | 1111 | <0.01 | <0.01 |
| Reb-A | 965 | 43.90 | 29.00 |
| Stevioside | 803 | 44.06 | 29.10 |
| Reb-F | 935 | 4.65 | 3.07 |
| Reb-C | 949 | 16.80 | 11.09 |
| Dulcoside-A | 787 | 2.40 | 1.59 |
| Rubusoside | 641 | 3.15 | 2.08 |
| Reb-B | 803 | 1.91 | 1.26 |
| Dulcoside B | 787 | 0.62 | 0.41 |
| Steviolbioside | 641 | 2.32 | 1.54 |
| Reb-R | 935 | 0.27 | 0.18 |
| Reb-G | 803 | <0.01 | <0.01 |
| Stevioside-B | 787 | <0.01 | <0.01 |
| Reb-G1 | 641 | <0.01 | <0.01 |
| Reb-R1 | 773 | <0.01 | <0.01 |
| Reb-F1 | 773 | <0.01 | <0.01 |
| Iso-Steviolbioside | 641 | <0.01 | <0.01 |
| | Sum | 143.96 | 95.09 |

TABLE 37.5

| Steviol glycosides in SG Sample No. 1-5 (157.3 mg/10 ml) | | | |
|---|---|---|---|
| Name | m/z [M − H]⁻ | mg/10 ml | % m/m |
| Related steviol glycoside #1 | 517 or 427 | <0.01 | <0.01 |
| Related steviol glycoside #2 | 981.00 | <0.01 | <0.01 |
| Related steviol glycoside #3 | 427 or 735 | 0.29 | 0.18 |
| Related steviol glycoside #4 | 675 or 1127 | 0.36 | 0.23 |
| Related steviol glycoside #5 | 981 | 0.48 | 0.31 |
| Reb-V | 1259 | 0.55 | 0.35 |
| Reb-T | 1127 | 0.81 | 0.52 |
| Reb-E | 965 | <0.01 | <0.01 |
| Reb-O | 1435 | 1.51 | 0.96 |
| Reb-D | 1127 | 10.82 | 6.88 |
| Reb-K | 1111 | 4.81 | 3.06 |
| Reb-N | 1273 | 0.41 | 0.26 |
| Reb-M | 1289 | 0.30 | 0.19 |
| Reb-S | 949 | 1.99 | 1.27 |
| Reb-J | 1111 | 0.40 | 0.25 |
| Reb-W | 1097 | 0.20 | 0.13 |
| Reb-U2 | 1097 | 0.53 | 0.34 |
| Reb-W2/3 | 1097 | 0.28 | 0.18 |
| Reb-O2 | 965 | <0.01 | <0.01 |
| Reb-Y | 1259 | 0.23 | 0.15 |
| Reb-I | 1127 | 0.20 | 0.13 |
| Reb-V2 | 1259 | 0.23 | 0.14 |
| Reb-K2 | 1111 | 0.34 | 0.21 |
| Reb-H | 1111 | <0.01 | <0.01 |

TABLE 37.5-continued

| Steviol glycosides in SG Sample No. 1-5 (157.3 mg/10 ml) | | | |
|---|---|---|---|
| Name | m/z [M − H]⁻ | mg/10 ml | % m/m |
| Reb-A | 965 | 40.82 | 25.95 |
| Stevioside | 803 | 46.30 | 29.43 |
| Reb-F | 935 | 6.98 | 4.43 |
| Reb-C | 949 | 19.76 | 12.56 |
| Dulcoside-A | 787 | 3.06 | 1.95 |
| Rubusoside | 641 | 3.57 | 2.27 |
| Reb-B | 803 | 0.87 | 0.56 |
| Dulcoside B | 787 | 0.83 | 0.53 |
| Steviolbioside | 641 | 2.35 | 1.50 |
| Reb-R | 935 | 0.63 | 0.40 |
| Reb-G | 803 | 0.38 | 0.24 |
| Stevioside-B | 787 | <0.01 | <0.01 |
| Reb-G1 | 641 | <0.01 | <0.01 |
| Reb-R1 | 773 | <0.01 | <0.01 |
| Reb-F1 | 773 | 0.37 | 0.24 |
| Iso-Steviolbioside | 641 | <0.01 | <0.01 |
| | Sum | 150.67 | 95.78 |

TABLE 37.6

| Steviol glycosides in SG Sample No. 1-6 (164.6 mg/10 ml) | | | |
|---|---|---|---|
| Name | m/z [M − H]⁻ | mg/10 ml | % m/m |
| Related steviol glycoside #1 | 517 or 427 | <0.01 | <0.01 |
| Related steviol glycoside #2 | 981.00 | <0.01 | <0.01 |
| Related steviol glycoside #3 | 427 or 735 | <0.01 | <0.01 |
| Related steviol glycoside #4 | 675 or 1127 | 0.52 | 0.32 |
| Related steviol glycoside #5 | 981 | 0.41 | 0.25 |
| Reb-V | 1259 | 0.80 | 0.48 |
| Reb-T | 1127 | 1.10 | 0.67 |
| Reb-E | 965 | <0.01 | <0.01 |
| Reb-O | 1435 | 1.60 | 0.97 |
| Reb-D | 1127 | 10.65 | 6.47 |
| Reb-K | 1111 | 7.01 | 4.26 |
| Reb-N | 1273 | 0.40 | 0.24 |
| Reb-M | 1289 | 0.31 | 0.19 |
| Reb-S | 949 | 2.27 | 1.38 |
| Reb-J | 1111 | 0.57 | 0.34 |
| Reb-W | 1097 | 0.33 | 0.20 |
| Reb-U2 | 1097 | 0.54 | 0.33 |
| Reb-W2/3 | 1097 | 0.31 | 0.19 |
| Reb-O2 | 965 | 0.21 | 0.13 |
| Reb-Y | 1259 | 0.22 | 0.13 |
| Reb-I | 1127 | 0.59 | 0.36 |
| Reb-V2 | 1259 | 0.50 | 0.30 |
| Reb-K2 | 1111 | 0.26 | 0.16 |
| Reb-H | 1111 | 0.23 | 0.14 |
| Reb-A | 965 | 47.27 | 28.72 |
| Stevioside | 803 | 49.46 | 30.05 |
| Reb-F | 935 | 6.08 | 3.70 |
| Reb-C | 949 | 16.21 | 9.85 |
| Dulcoside-A | 787 | 2.87 | 1.75 |
| Rubusoside | 641 | 3.12 | 1.89 |
| Reb-B | 803 | 0.88 | 0.53 |
| Dulcoside B | 787 | 1.03 | 0.63 |
| Steviolbioside | 641 | 2.49 | 1.51 |
| Reb-R | 935 | 0.54 | 0.33 |
| Reb-G | 803 | 0.67 | 0.41 |
| Stevioside-B | 787 | <0.01 | <0.01 |
| Reb-G1 | 641 | <0.01 | <0.01 |
| Reb-R1 | 773 | <0.01 | <0.01 |
| Reb-F1 | 773 | 0.55 | 0.33 |
| Iso-Steviolbioside | 641 | <0.01 | <0.01 |
| | Sum | 159.99 | 97.20 |

TABLE 37.7

| Steviol glycosides in SG Sample No. 1-7 (156.8 mg/10 ml) | | | |
|---|---|---|---|
| Name | m/z [M − H]⁻ | mg/10 ml | % m/m |
| Related steviol glycoside #1 | 517 or 427 | <0.01 | <0.01 |
| Related steviol glycoside #2 | 981.00 | <0.01 | <0.01 |
| Related steviol glycoside #3 | 427 or 735 | <0.01 | <0.01 |
| Related steviol glycoside #4 | 675 or 1127 | <0.01 | <0.01 |
| Related steviol glycoside #5 | 981 | <0.01 | <0.01 |
| Reb-V | 1259 | 0.75 | 0.48 |
| Reb-T | 1127 | 0.95 | 0.61 |
| Reb-E | 965 | <0.01 | <0.01 |
| Reb-O | 1435 | 1.74 | 1.11 |
| Reb-D | 1127 | 9.29 | 5.93 |
| Reb-K | 1111 | 7.57 | 4.83 |
| Reb-N | 1273 | 0.48 | 0.30 |
| Reb-M | 1289 | <0.01 | <0.01 |
| Reb-S | 949 | <0.01 | <0.01 |
| Reb-J | 1111 | <0.01 | <0.01 |
| Reb-W | 1097 | <0.01 | <0.01 |
| Reb-U2 | 1097 | <0.01 | <0.01 |
| Reb-W2/3 | 1097 | <0.01 | <0.01 |
| Reb-O2 | 965 | <0.01 | <0.01 |
| Reb-Y | 1259 | <0.01 | <0.01 |
| Reb-I | 1127 | <0.01 | <0.01 |
| Reb-V2 | 1259 | 0.41 | 0.26 |
| Reb-K2 | 1111 | 0.30 | 0.19 |
| Reb-H | 1111 | <0.01 | <0.01 |
| Reb-A | 965 | 50.34 | 32.10 |
| Stevioside | 803 | 51.85 | 33.07 |
| Reb-F | 935 | 4.22 | 2.69 |
| Reb-C | 949 | 14.39 | 9.18 |
| Dulcoside-A | 787 | 2.21 | 1.41 |
| Rubusoside | 641 | 2.17 | 1.38 |
| Reb-B | 803 | 0.81 | 0.52 |
| Dulcoside B | 787 | 0.51 | 0.33 |
| Steviolbioside | 641 | 2.00 | 1.27 |
| Reb-R | 935 | 0.89 | 0.57 |
| Reb-G | 803 | 0.41 | 0.26 |
| Stevioside-B | 787 | <0.01 | <0.01 |
| Reb-G1 | 641 | <0.01 | <0.01 |
| Reb-R1 | 773 | <0.01 | <0.01 |
| Reb-F1 | 773 | <0.01 | <0.01 |
| Iso-Steviolbioside | 641 | <0.01 | <0.01 |
| | Sum | 151.28 | 96.48 |

TABLE 37.8

| Steviol glycosides in SG Sample No. 1-8 (156.8 mg/10 ml) | | | |
|---|---|---|---|
| Name | m/z [M − H]⁻ | mg/10 ml | % m/m |
| Related steviol glycoside #1 | 517 or 427 | <0.01 | <0.01 |
| Related steviol glycoside #2 | 981.00 | <0.01 | <0.01 |
| Related steviol glycoside #3 | 427 or 735 | <0.01 | <0.01 |
| Related steviol glycoside #4 | 675 or 1127 | <0.01 | <0.01 |
| Related steviol glycoside #5 | 981 | 0.17 | 0.11 |
| Reb-V | 1259 | 0.62 | 0.40 |
| Reb-T | 1127 | 0.93 | 0.59 |
| Reb-E | 965 | <0.01 | <0.01 |
| Reb-O | 1435 | 1.71 | 1.09 |
| Reb-D | 1127 | 7.81 | 4.98 |
| Reb-K | 1111 | 3.54 | 2.25 |
| Reb-N | 1273 | 0.34 | 0.22 |
| Reb-M | 1289 | 0.25 | 0.16 |
| Reb-S | 949 | 2.00 | 1.28 |
| Reb-J | 1111 | 0.27 | 0.18 |
| Reb-W | 1097 | <0.01 | <0.01 |
| Reb-U2 | 1097 | 0.37 | 0.24 |
| Reb-W2/3 | 1097 | 0.19 | 0.12 |
| Reb-O2 | 965 | <0.01 | <0.01 |
| Reb-Y | 1259 | 0.18 | 0.12 |
| Reb-I | 1127 | 0.18 | 0.12 |
| Reb-V2 | 1259 | 0.30 | 0.19 |
| Reb-K2 | 1111 | 0.53 | 0.33 |
| Reb-H | 1111 | 0.40 | 0.25 |

TABLE 37.8-continued

| Steviol glycosides in SG Sample No. 1-8 (156.8 mg/10 ml) | | | |
|---|---|---|---|
| Name | m/z [M − H]⁻ | mg/10 ml | % m/m |
| Reb-A | 965 | 51.43 | 32.80 |
| Stevioside | 803 | 52.14 | 33.25 |
| Reb-F | 935 | 4.88 | 3.11 |
| Reb-C | 949 | 13.25 | 8.45 |
| Dulcoside-A | 787 | 2.94 | 1.88 |
| Rubusoside | 641 | 2.91 | 1.86 |
| Reb-B | 803 | 1.22 | 0.78 |
| Dulcoside B | 787 | 0.80 | 0.51 |
| Steviolbioside | 641 | 2.07 | 1.32 |
| Reb-R | 935 | 0.67 | 0.43 |
| Reb-G | 803 | 0.19 | 0.12 |
| Stevioside-B | 787 | <0.01 | <0.01 |
| Reb-G1 | 641 | <0.01 | <0.01 |
| Reb-R1 | 773 | <0.01 | <0.01 |
| Reb-F1 | 773 | 0.14 | 0.09 |
| Iso-Steviolbioside | 641 | <0.01 | <0.01 |
| | Sum | 152.44 | 97.22 |

TABLE 37.9

| Steviol glycosides in SG Sample No. 1-9 (150.7 mg/10 ml) | | | |
|---|---|---|---|
| Name | m/z [M − H]⁻ | mg/10 ml | % m/m |
| Related steviol glycoside #1 | 517 or 427 | <0.01 | <0.01 |
| Related steviol glycoside #2 | 981.00 | <0.01 | <0.01 |
| Related steviol glycoside #3 | 427 or 735 | <0.01 | <0.01 |
| Related steviol glycoside #4 | 675 or 1127 | <0.01 | <0.01 |
| Related steviol glycoside #5 | 981 | <0.01 | <0.01 |
| Reb-V | 1259 | 0.60 | 0.40 |
| Reb-T | 1127 | 0.93 | 0.62 |
| Reb-E | 965 | <0.01 | <0.01 |
| Reb-O | 1435 | 1.14 | 0.76 |
| Reb-D | 1127 | 4.73 | 3.14 |
| Reb-K | 1111 | 2.66 | 1.77 |
| Reb-N | 1273 | <0.01 | <0.01 |
| Reb-M | 1289 | 0.54 | 0.36 |
| Reb-S | 949 | 1.35 | 0.90 |
| Reb-J | 1111 | 0.22 | 0.15 |
| Reb-W | 1097 | <0.01 | <0.01 |
| Reb-U2 | 1097 | <0.01 | <0.01 |
| Reb-W2/3 | 1097 | <0.01 | <0.01 |
| Reb-O2 | 965 | <0.01 | <0.01 |
| Reb-Y | 1259 | 0.23 | 0.15 |
| Reb-I | 1127 | <0.01 | <0.01 |
| Reb-V2 | 1259 | 0.37 | 0.24 |
| Reb-K2 | 1111 | 0.66 | 0.44 |
| Reb-H | 1111 | 0.30 | 0.20 |
| Reb-A | 965 | 45.81 | 30.40 |
| Stevioside | 803 | 55.99 | 37.15 |
| Reb-F | 935 | 5.76 | 3.82 |
| Reb-C | 949 | 12.90 | 8.56 |
| Dulcoside-A | 787 | 3.62 | 2.40 |
| Rubusoside | 641 | 3.41 | 2.26 |
| Reb-B | 803 | 1.36 | 0.90 |
| Dulcoside B | 787 | 0.91 | 0.60 |
| Steviolbioside | 641 | 2.83 | 1.88 |
| Reb-R | 935 | <0.01 | <0.01 |
| Reb-G | 803 | <0.01 | <0.01 |
| Stevioside-B | 787 | <0.01 | <0.01 |
| Reb-G1 | 641 | <0.01 | <0.01 |
| Reb-R1 | 773 | <0.01 | <0.01 |
| Reb-F1 | 773 | <0.01 | <0.01 |
| Iso-Steviolbioside | 641 | <0.01 | <0.01 |
| | Sum | 146.33 | 97.10 |

TABLE 37.10

Summary of the products

| Sample # | RA | STV | RB | RC | RD | RE | RF | RM | RN | RO | Dulc A | RU | STB | TSG (13) | TSG (all) |
|---|---|---|---|---|---|---|---|---|---|---|---|---|---|---|---|
| Example 13 | 29 | 29.1 | 1.26 | 11.09 | 6.17 | 0.2 | 3.07 | 0.19 | / | 0.92 | 1.59 | 2.08 | 1.54 | 86.21 | 95.09 |
| Example 37 SG No. 1-1 | 24.83 | 21.42 | 1.31 | 11.35 | 7.77 | 0.19 | 2.58 | 0.28 | 0.3 | 1.11 | 1.39 | 2.1 | / | 74.63 | 83.84 |
| Example 37 SG No. 1-2 | 28.86 | 24.87 | 1.19 | 10.57 | 8.71 | 0.31 | 3.07 | 0.25 | 0.2 | 1.27 | 1.16 | 1.8 | 1.24 | 83.5 | 95.54 |
| Example 37 SG No. 1-3 | 28.34 | 26.94 | 1.6 | 12.34 | 7.83 | / | 3.18 | 0.27 | / | 1.08 | 1.31 | 1.98 | 1.6 | 86.47 | 95.93 |
| Example 37 SG No. 1-4 | 29 | 29.1 | 1.26 | 11.09 | 6.17 | 0.2 | 3.07 | 0.19 | / | 0.92 | 1.59 | 2.08 | 1.54 | 86.21 | 95.09 |
| Example 37 SG No. 1-5 | 25.95 | 29.43 | 0.56 | 12.56 | 6.88 | / | 4.43 | 0.19 | 0.26 | 0.96 | 1.95 | 2.27 | 1.5 | 86.94 | 95.78 |
| Example 37 SG No. 1-6 | 28.72 | 30.05 | 0.53 | 9.85 | 6.47 | / | 3.7 | 0.19 | 0.24 | 0.97 | 1.75 | 1.89 | 1.51 | 85.87 | 97.2 |
| Example 37 SG No. 1-7 | 32.1 | 33.07 | 0.52 | 9.18 | 5.93 | / | 2.69 | / | 0.3 | 1.11 | 1.41 | 1.38 | 1.27 | 88.96 | 96.48 |
| Example 37 SG No. 1-8 | 32.8 | 33.25 | 0.78 | 8.45 | 4.98 | / | 3.11 | 0.16 | 0.22 | 1.09 | 1.88 | 1.86 | 1.32 | 89.9 | 97.22 |
| Example 37 SG No. 1-9 | 30.4 | 37.15 | 0.9 | 8.56 | 3.14 | / | 3.82 | 0.36 | / | 0.76 | 2.4 | 2.26 | 1.88 | 91.63 | 97.1 |

Materials:

Reference standards for steviol glycosides (Reb A, Reb B, Reb C, Reb D, Reb E, Reb F, Reb G, Reb M, Reb N) were obtained from Chromadex (LGC Germany). Solvents and reagents (HPLC grade) were obtained from VWR (Vienna) or Sigma-Aldrich (Vienna).

Davisil Grade 633 (high-purity grade silica gel, pore size 60 Å, 200-425 mesh particle size was obtained from Sigma-Aldrich (Vienna).

Sample Preparation:

300 mg sample was dissolved in 20 ml Acetonitrile/$H_2O$=9/1 (v/v)

HPLC-Method:

The HPLC system consisted of an Agilent 1100 system (autosampler, ternary gradient pump, column thermostat, VWD-UV/VIS detector, DAD-UV/VIS detector) connected in-line to an Agilent mass spectrometer (ESI-MS quadrupole G1956A VL). For HPLC analysis 150 mg of the corresponding sample was dissolved in Acetonitrile (1 ml) and filled up to 10 ml with $H_2O$.

The samples were separated at 0.8 ml/min on a Phenomenex Synergi Hydro-RP (150×3 mm) followed by a Macherey-Nagel Nucleosil 100-7 C18 (250×4.6 mm) at 45° C. by gradient elution, Mobile Phase A consisted of a 0.01 molar $NH_4$-Acetate buffer (native pH) with 0.1% acetic acid, 0.05% trimethylamine and 0.001% dichloromethane. Mobile Phase B consisted of 0.01 molar $NH_4$-Acetate buffer (native pH) and Acetonitrile (1/9 v/v) with 0.1% acetic acid, 0.05% trimethylamine and 0.001% dichloromethane. The gradient started with 22% B, was increased linearly in 20 minutes to 45% B and kept at this condition for another 15 minutes. Injection volume was set to 10 µl.

The detectors were set to 210 nm (VWD), to 205 and 254 nm (DAD with spectra collection between 200-600 nm) and to ESI negative mode TIC m/z 300-1500, Fragmentor 200, Gain 2 (MS, 300° C., nitrogen 12 l/min, nebulizer setting 50 psig. Capillary voltage 4500 V).

Detection at 210 nm was used to quantify the chromatograms, the MS-spectra were used to determine the molar mass and structural information of individual peaks. Detection at 254 nm was used to identify non-steviol glycoside peaks.

Identification and Quantification:

Steviol-glycosides were identified by comparison of retention times to authentic reference standards and/or by evaluation of the mass spectra obtained (including interpretation of the fragmentation pattern and double charged ions triggered by the presence of dichloromethane).

Steviol-glycosides were quantified against external standards. In case that no reference standard was available quantification was performed against Reb-A.

The maximum calibration range of reference standards was in a range 0.1-50 mg/10 ml (dissolved in Acetonitrile/$H_2O$=9/1 (v/v)).

Example 38

Screening the Scent of *Stevia* MRP

In this example, the amino acid and reducing sugar was reacted. The reaction conditions were as follow.

Reducing sugar: 3.35 g

Amino acid: 1.65 g;

Amino acid: reducing sugar=1:2

Water: 2.5 g;

Temperature: 100° C.;

Duration: 2 hours;

pH regulation: no pH regulator added.

In addition, the reaction of amino acid, reducing sugar and *Stevia* extract was added in the process. The reaction conditions were as follow.

*Stevia* Extract: Product of Example 37; Final Powder.

Weight ratio of reducing sugar to amino acid: 2:1;

Weight ratio of *Stevia* extract to the blend of reducing sugar and amino acid: 90:10, 60:40, and 30:70, respectively;

The total weight of *Stevia* extract, reducing sugar and amino acid: 5 g; noted as following table.

TABLE 38.1

| Weight ratio of *Stevia* extract to the blend of reducing sugar and amino acid | *Stevia* extract | reducing sugar | amino acid |
|---|---|---|---|
| 90:10 | 4.5 g | 0.33 g | 0.17 g |
| 60:40 | 3 g | 1.33 g | 0.67 g |
| 30:70 | 1.5 g | 2 g | 1 g |

Water: 2.5 g

Temperature: 100° C.;

Duration: 2 hours;

pH regulation: no pH regulator added.

The odor of all the resultant mixtures after reaction completion were evaluated by a panel of 4 trained persons.

Results:

TABLE 38.2

The products of the amino acid and reducing sugar
amino acid:reducing sugar = 1:2 Duration: 2 hours Temperature: 100° C.

| | Phenylalanine | Alanine | Leucine | Isoleucine | Arginine | Glutamic Acid | Valine | Serine | Proline | Lysine | Tryptophan |
|---|---|---|---|---|---|---|---|---|---|---|---|
| Mannose | Flora | Burnt | burnt | burnt | Odorless | Odorless | burnt | Odorless | popcorn | Odorless | Odorless |
| Glucose | Flora | Burnt | burnt | burnt | Caramel | Odorless | Odorless | Odorless | popcorn | Odorless | Odorless |
| Rhamnose | Almond | Caramel | Odorless | Odorless | Odorless | Odorless | Sweet almond | Almond | popcorn | Almond | Odorless |
| Fructose | Flora | Burnt | burnt | burnt | Odorless | Odorless | burnt | Odorless | popcorn | Odorless | Odorless |
| Arabinose | Flora | Caramel | burnt | burnt | Odorless | Almond | burnt | Burnt and acid | Caramel | burnt | Odorless |
| Lactose | Flora | Burnt | Odorless | Odorless | Odorless | Odorless | Odorless | Odorless | popcorn | Odorless | Odorless |
| Galactose | Flora | Caramel | burnt | burnt | Odorless | Odorless | Odorless | Odorless | popcorn | Odorless | Odorless |
| Xylose | Flora | Caramel | Burnt and bitter | Almond | Odorless | Almond | burnt | Caramel | popcorn | burnt | burnt |
| Raffinose | Odorless | Odorless | Odorless | Odorless | Ammonia | Odorless | Odorless | Odorless | Caramel | Odorless | Odorless |

TABLE 38.3

The products of *Stevia* extract, amino acid and reducing sugar
*Stevia* extract:amino acid:reducing sugar = 90:3.3:6.7 Duration: 2 hours Temperature: 100° C.

| | Phenylalanine | Alanine | Leucine | Isoleucine | Arginine | Glutamic Acid | Valine | Serine | Proline | Lysine | Tryptophan |
|---|---|---|---|---|---|---|---|---|---|---|---|
| Mannose | Flora | Burnt | Odorless | Odorless | Sunflower seed | *Citrus* | Odorless | Odorless | popcorn | Peach | Odorless |
| Glucose | Odorless | Odorless | Odorless | Burnt | Sunflower seed | *Citrus* | Burnt | *Citrus* | popcorn | Peach | Odorless |
| Rhamnose | Caramel | Sunflower seed | Burnt | Burnt | Sunflower seed | *Citrus* | Caramel | Odorless | popcorn | Flora | Burnt and bitter |
| Fructose | Odorless | Odorless | Burnt | Burnt | Sunflower seed | *Citrus* | Odorless | Odorless | Odorless | Odorless | Odorless |
| Arabinose | Odorless | Odorless | Burnt | Burnt | Odorless | *Citrus* | Burnt | Odorless | popcorn | Peach | Odorless |
| Lactose | Odorless | Caramel | Odorless | Odorless | Burnt | *Citrus* | Odorless | Odorless | Odorless | Odorless | Odorless |
| Galactose | Odorless | Caramel | Burnt | Caramel | Burnt | *Citrus* | Caramel | Caramel | popcorn | Peach | Odorless |
| Xylose | Flora | Caramel | Burnt | Burnt | Odorless | *Citrus* | Burnt | Flora | Odorless | Peach | *Citrus* |
| Raffinose | Odorless | Odorless | Burnt | Odorless | Odorless | *Citrus* | Odorless | Odorless | Odorless | Odorless | Odorless |

TABLE 38.4

The products of *Stevia* extract, amino acid and reducing sugar
*Stevia* extract:amino acid:reducing sugar = 60:13.3:26.7 Duration: 2 hours Temperature: 100° C.

| | Phenylalanine | Alanine | Leucine | Isoleucine | Arginine | Glutamic Acid | Valine | Serine | Proline | Lysine | Tryptophan |
|---|---|---|---|---|---|---|---|---|---|---|---|
| Mannose | Flora | Burnt | Burnt | Burnt | Odorless | *Citrus* | Odorless | Odorless | Burnt | Peach | Odorless |
| Glucose | Flora | Burnt | Burnt | Odorless | Burnt | *Citrus* | Odorless | Caramel | Burnt | Odorless | Odorless |
| Rhamnose | Flora | Burnt | Burnt | Odorless | Burnt | *Citrus* | Caramel | Burnt | popcorn | Almond | Odorless |
| Fructose | Flora | Sunflower seed | Burnt | Burnt | Burnt | *Citrus* | Burnt | Odorless | Odorless | Odorless | Burnt |
| Arabinose | Flora | Succade | Burnt | Burnt | Odorless | *Citrus* | Burnt | Odorless | Burnt | Odorless | Odorless |
| Lactose | Odorless | Odorless | Odorless | Odorless | Odorless | *Citrus* | Odorless | Odorless | Burnt | Odorless | Odorless |
| Galactose | Flora | Jujube | Burnt | Burnt | Odorless | *Citrus* | Caramel | Odorless | Odorless | Odorless | Odorless |
| Xylose | Flora | Caramel | Burnt | Burnt | Odorless | Burnt | Caramel | Odorless | Odorless | Odorless | Odorless |
| Raffinose | Odorless | Sunflower seed | Burnt | Burnt | Ammonia | *Citrus* | Odorless | Burnt | Burnt | Odorless | Burnt |

TABLE 38.5

The products of Stevia extract, amino acid and reducing sugar
Stevia extract: amino acid: reducing sugar = 30: 23.3: 46.7 Duration: 2 hours Temperature: 100° C.

| | Phenyl-alanine | Alanine | Leucine | Isoleucine | Arginine | Glutamic Acid | Valine | Serine | Proline | Lysine | Trypto-phan |
|---|---|---|---|---|---|---|---|---|---|---|---|
| Mannose | Flora | Caramel | Odorless | Chemical | Odorless | Citrus | Burnt | Caramel | popcorn | Odorless | Odorless |
| Glucose | Flora | Chinese date | Chemical | Chemical | Odorless | Citrus | Caramel | Odorless | popcorn | Peach | Odorless |
| Rhamnose | Flora | Caramel | Chemical | Chemical | Caramel | Almond | Caramel | Burnt | popcorn | Almond | Odorless |
| Fructose | Flora | Burnt | Chemical | Odorless | Odorless | Citrus | Burnt | Odorless | Burnt | Peach | Odorless |
| Arabinose | Flora | Caramel | Bitter | Chemical | Odorless | Almond | Burnt | Caramel | Odorless | Burnt | Odorless |
| Lactose | Flora | Odorless | Odorless | Odorless | Burnt | Citrus | Odorless | Odorless | popcorn | Odorless | Odorless |
| Galactose | Flora | Caramel | Sour oil | Almond | Burnt | Citrus | Burnt | Caramel | popcorn | Odorless | Odorless |
| Xylose | Flora | Caramel | Chemical | Sour oil | Burnt | Almond | Burnt | Caramel | Caramel | Chemical | Odorless |
| Raffinose | Flora | Odorless | Acid | Odorless | Ammonia | Citrus | Odorless | popcorn | popcorn | Odorless | Odorless |

Conclusions:

Comparing the odor evaluation results of above reaction solutions, it was found that when amino acid and reducing sugar react, by selecting the specific reducing sugar and amino acid, a specific odor could be obtained, such as phenylalanine and xylose (flora odor) or proline and glucose (popcorn). By selecting the specific reducing sugar and amino acid, odorless MRPs could be obtained, too, such as glutamic acid and lactose, or arginine and rhamnose. It was be also found that when the *Stevia* extract is added in the reaction for those amino acid and reducing sugar which could produce odor after reaction, the resulted products can still give the similar odor. Surprisingly, when *Stevia* extract is introduced in those reactions in which an amino acid and a reducing sugar that doesn't provide an odor after reaction, in some cases, new pleasant odors were produced. For example, the reaction product of glutamic acid and lactose do not produce odor producing MRPs, but when *Stevia* extract participated in the reaction, a citrus odor was be obtained. Similarly, examples include peach odor (lysine+glucose+*Stevia* extract), sunflower seed odor (arginine+rhamnose+*Stevia* extract), Chinese date odor (alanine+glucose+*Stevia* extract), or succade odor (alanine+arabinose+*Stevia* extract). Therefore, it has been surprisingly discovered that *Stevia* extract plays a key role in producing these specific odors which standard amino acids and sugar donors cannot produce.

Example 39

The Products in Examples 40-49, 66, 74, 108-131, 147-165 were Evaluated by the Following Method For evaluation of the taste profile, the samples were tested by a panel of four people. The panel was asked to describe the taste profile and score values between 1-5 according to the standard procedure as follows. 1 trained taster tasted independently the samples first. The tester was allowed to re-taste, and then made notes for the sensory attributes perceived. Afterwards, another 3 tasters tasted and the attributes noted were discussed openly to find a suitable description. in case that more than 1 taster disagreed with the result, the tasting was repeated.

Sensory Evaluation Method:

Products were evaluated in terms of flavor intensity, sweetness profile and mouthfeel.

The score was used to evaluate the overall taste of the products. The overall-likeability score is the average of the score of flavor intensity, sweet profile and mouth feel.

For flavor intensity. 2 factors such as odor intensity and flavor taste intensity were evaluated. The score of flavor intensity is the average of the 2 factors.

For sweetness profile, 3 factors such as bitterness, metallic aftertaste and sweet lingering were evaluated. Because the stronger the degree of these three parameters, the higher the score, thus the worse the sweetness profile. So the score of sweetness profile is the result of 5 minus the average of the 3 factors.

For mouth feel, 1 factor, kokumi, was evaluated.

A panel of 6 trained testers evaluated the samples and gave scores of 1-5 according to the following standards. For the flavor intensity and mouth feel, the higher the score, the better. For the bitterness, metallic aftertaste and sweet lingering, the lower the score the better.

1) Odor Intensity

The odor intensity is defined by the level of threshold of product concentration at which odor is perceived.

The sample was dissolved in a neutral aqueous solution to prepare a 500 ppm solution. The solution was diluted stepwise, and 25 ml of the dilute was placed in a 50 ml round bottom flask. The tester placed their nose 1 cm above the mouth of the flask and smelled it to determine if the solution had a characteristic odor. The concentration at which ≥50% of the testers considered the solution to be odorless is the odor concentration threshold of the sample. The odor intensity score of the sample is given according to the level of concentration threshold corresponding to the score of the table below.

TABLE 39.1

| | Range of the odor concentration threshold | | | | |
|---|---|---|---|---|---|
| | ≤100 ppm | 101-150 ppm | 151-200 ppm | 201-250 ppm | >250 ppm |
| odor intensity score | 5 | 4 | 3 | 2 | 1 |

2) Flavor Taste Intensity

The flavor taste intensity is defined by the level of threshold product concentration at which flavor taste is perceptible with 5 being the best.

The sample was dissolved in a neutral aqueous solution to prepare a 500 ppm solution. This solution was diluted stepwise. The tester placed 20-30 ml of the solution in his/her mouth for 5 seconds to judge whether the solution had a characteristic flavor taste. The concentration at which ≥50% of the testers considered the solution to be non-flavored (note that it is not sweet) is the flavor concentration threshold of the sample. The flavor taste intensity score of the sample is given according to the level of concentration threshold corresponding to the score of the table below.

TABLE 38.2

| | Range of the flavor taste concentration threshold | | | | |
|---|---|---|---|---|---|
| | ≤100 ppm | 101-150 ppm | 151-200 ppm | 201-250 ppm | >250 ppm |
| flavor taste intensity score | 5 | 4 | 3 | 2 | 1 |

3) Kokumi Level

Evaluation Standard:

Prepare a 5% sucrose solution with neutral water. This solution was used as a standard solution which kokumi degree is set to 5.

A 250 ppm RA solution was prepared with neutral water. This solution was used as a standard solution to which the kokumi degree was set as 1 with 5 being the best.

An appropriate amount of yeast extract (available from Leiber, 44400P-145) was dissolved in a 250 ppm aqueous solution of RA97 such that the degree of kokumi of the resulting solution was consistent with the standard solution of kokumi degree of 5 (5% sucrose), After evaluation by a panel of 6 testers, it was determined that a solution of 100 ppm the yeast extract dissolved in 250 ppm RA97 was substantially identical to the degree of kokumi of the 5% sucrose solution. Thus, the criteria for determining the degree of kokumi are as follows.

TABLE 39.3

| | RA97 250 ppm Range of yeast extract concentration | | | | |
|---|---|---|---|---|---|
| | <25 ppm | 25-50 ppm | 50-75 ppm | 75-100 ppm | >100 ppm |
| Score of kokumi level | 1 | 2 | 3 | 4 | 5 |

Evaluation Method:

The sample to be evaluated was dissolved in neutral deionized water to make the concentration of steviol glycosides equal to 250 ppm. The tester placed 20-30 mL of the evaluation solution in their mouth. After 5 seconds the solution was spit out. After a mouthwash step with water, the standard solution was taken. if the degree of Kokumi was similar, the Kokumi degree of the sample solution can be determined as the Kokurni degree value of the standard solution. Otherwise it was necessary to take additional standard solutions and try again until the Kokumi degree value was determined.

4) Bitterness

Quinine (99% purity) concentration of $10^{-8}$-$10^{-4}$ mon was the bitterness standard, and the specific bitterness scoring standards are shown in the following table.

TABLE 39.4

| | Range of quinine concentration mol/L | | | | |
|---|---|---|---|---|---|
| | <8 × $10^{-7}$ | 8 × $10^{-7}$~ 3 × $10^{-6}$ | 7 × $10^{-6}$~ 2 × $10^{-5}$ | 2 × $10^{-5}$~ 1 × $10^{-4}$ | >1 × $10^{-4}$ |
| Score of bitterness | 1 | 2 | 3 | 4 | 5 |

The sample to be evaluated was dissolved in neutral deionized water to make the concentration of steviol glycosides equal to 250 ppm. The tester placed 20-30 mL of the evaluation solution in their mouth. After 5 seconds the sample was spit out. After a rinse step with water, the standard solution was tasted. If the bitter taste was simi lar, the bitterness of the sample can be determined as the bitterness value of the standard solution. Otherwise it was necessary to take additional standard solution(s) and try again until the bitterness value was determined with 1 being the best.

5) Metallic Aftertaste

Sucralose (available from Anhui Jinhe Industrial Co., Ltd) was used as a standard reference. The specific metallic aftertaste scoring standards are shown in the table below.

TABLE 39.5

| | Range of sucralose concentration | | | | |
|---|---|---|---|---|---|
| | <50 ppm | 50-100 ppm | 100-150 ppm | 150-200 ppm | >200 ppm |
| Score of metallic aftertaste | 1 | 2 | 3 | 4 | 5 |

The sample to be evaluated was dissolved in neutral deionized water to make the concentration of steviol glycosides equal to 250 ppm. The tester places 20-30 mL of the evaluation solution in their mouth. After 5 seconds, the solution is spit out. After a rinse step with water the standard solution was tasted. If the metallic aftertaste was similar, the metallic aftertaste of the sample was determined as the metallic aftertaste score of the standard liquid, otherwise it was necessary to take additional standard liquid samples and taste it again until the metallic aftertaste score was determined with 1 being the best.

6) Sweet Lingering

The sample to be evaluated was dissolved in neutral deionized water to make the concentration of steviol glycosides equal to 250 ppm. The tester placed 20-30 mL of the evaluation solution in their mouth, and timing was started to record the sweetness start time and peak time. The test solution was then spit out. Recording of time continued for the time when the sweetness disappeared completely. The time at which the sweetness completely disappeared was compared to the time in the table below to determine the value of sweet lingering.

TABLE 39.6

| | time at which the sweetness completely disappears | | | | |
|---|---|---|---|---|---|
| | <20 s | 20-30 s | 30-40 s | 40-50 s | >50 s |
| Score of sweet lingering | 1 | 2 | 3 | 4 | 5 |

Example 40

The Relationship Between the Taste Profile of Flora Taste MRP and the Ratio of the Mixture of Xylose and Phenylalanine to *Stevia* Extract

*Stevia* Extract Material:

*Stevia* extract: the product of Example 37, final powder.

Common Process:

Xylose and phenylalanine were blended in the ratio of 2:1 and named as X&P mixture. The *Stevia* extract material was dissolved together with the X&P mixture in deionized water to make the solids content to 67%. There was no need to add any pH regulator and the pH was about 5. The solution was heated at about 100 degrees centigrade for 2 hours. When the reaction was complete, the slurry was dried by spray dryer to provide an off white powder MRP.

Experiments

Several MRPs in this Example were prepared. Each sample was evaluated according to above sensory evaluation method and the resultant data was the average of the panel. The reaction parameters and the taste profile of the products are as follow. Note that according to the sensory evaluation method, mouth feel and sweetness profile were evaluated based on the same sweetness. The concentrations of *Stevia* extract in all sample solutions are the same, 250 ppm.

TABLE 40.1

| Sample # | Ratio of X&P mixture to *Stevia* extract w/w | Weight of *Stevia* extract | Weight of xylose | Weight of phenylalanine |
|---|---|---|---|---|
| 40-01 | 10/90 | 4.5 g | 0.33 g | 0.17 g |
| 40-02 | 20/80 | 4 g | 0.67 g | 0.33 g |
| 40-03 | 30/70 | 3.5 g | 1 g | 0.5 g |
| 40-04 | 40/60 | 3 g | 1.33 g | 0.67 g |
| 40-05 | 50/50 | 2.5 g | 1.67 g | 0.83 g |
| 40-06 | 60/40 | 2 g | 2 g | 1 g |
| 40-07 | 70/30 | 1.5 g | 2.33 g | 1.17 g |
| 40-08 | 80/20 | 1 g | 2.67 g | 1.33 g |

TABLE 40.2

| | | Sensory evaluation | | | | | | | | |
|---|---|---|---|---|---|---|---|---|---|---|
| | | flavor intensity | | | | sweet profile | | | | |
| Sample # | flavor | Odor intensity | Flavor taste intensity | Score of flavor intensity | mouth feel kokumi | Sweet lingering | bitterness | Metallic aftertaste | Score of sweet profile | Overall likeability |
| 40-01 | flora | 3 | 4 | 3.5 | 4 | 2 | 1 | 1 | 3.67 | 3.72 |
| 40-02 | | 5 | 5 | 5 | 4 | 3 | 1 | 1 | 3.33 | 4.11 |
| 40-03 | | 5 | 5 | 5 | 5 | 3 | 1 | 1 | 3.33 | 4.44 |
| 40-04 | | 4 | 5 | 4.5 | 5 | 2 | 1 | 1 | 3.67 | 4.39 |
| 40-05 | | 3 | 4 | 3.5 | 5 | 2 | 1 | 1 | 3.67 | 4.06 |
| 40-06 | | 3 | 4 | 3.5 | 5 | 2 | 1 | 1 | 3.67 | 4.06 |
| 40-07 | | 3 | 3 | 3 | 5 | 2 | 1 | 1 | 3.67 | 3.89 |
| 40-08 | | 3 | 3 | 3 | 5 | 2 | 2 | 1 | 3.33 | 3.78 |

Data Analysis

Figure 6:
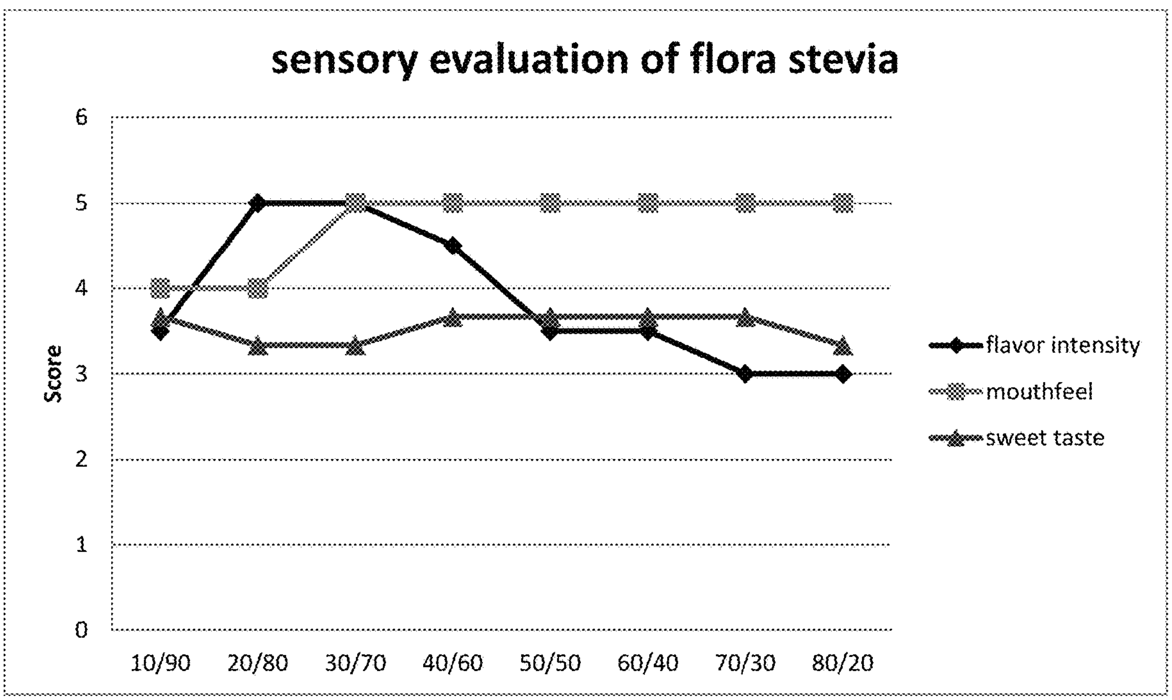
FIG. 6 depicts the relationship between the sensory evaluation results to the ratio of X&P mixture to *Stevia* extract.

The relationship between the sensory evaluation results to the ratio of X&P mixture to *Stevia* extract in this example is presented in FIG. 6.

Figure 7:
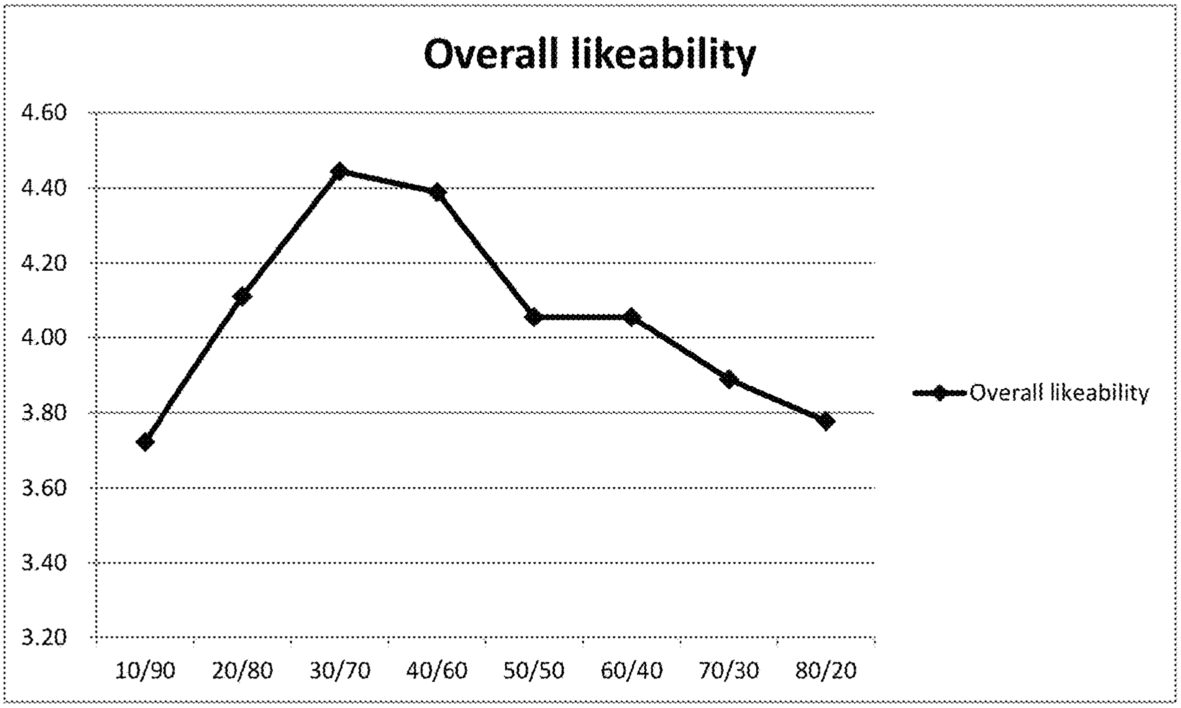
FIG. 7 depicts relationship between the Overall-likeability score to the ratio of X&P mixture to *Stevia* extract.

The relationship between the Overall-likeability score to the ratio of X&P mixture to *Stevia* extract in this example is presented in FIG. 7.

Conclusion:

As can be seen from the overall-likeability data, with the ratio of X&P mixture to *Stevia* extract ranged from 10/90 to 80/20, the products provided a very good taste score >3.5), particularly when the ratio of X&P mixture to *Stevia* extract ranged from 20/80 to 60/40, the products gave a superior taste (score >4).

Example 41

Taste Comparison Between *Stevia*-Reacted MRP and the Blend of *Stevia* Extract with Non-*Stevia*-Reacted MRP (Flora Taste)

*Stevia* Extract Materials:

*Stevia* extract: the product of Example 37, final powder; RA75/RB15, and RA80/RB 10/RD.

Preparation of the Non-*Stevia*-Reacted MRP:

3.3 g Xylose and 11.7 g phenylalanine were blended and dissolved in 2.5 g deionized water. No pH regulator was added; resultant pH about 5. The solution was then heated at about 100 degrees centigrade for 2 hours. When the reaction was completed, the slurry was dried by spray dryer to provide an off white powder non-*Stevia*-reacted MRP.

Preparation of the *Stevia*-Reacted MRP:

0.67 g Xylose, 0.33 g phenylalanine and 4 g *Stevia* extract material were dissolved in 2.5 g deionized water. No pH regulator was added; resultant pH was about 5. The solution was then heated at about 100 degrees centigrade for 2 hours. When the reaction was completed, the slurry was dried by spray dryer to provide an off white powder MRP.

Experiments

Several *Stevia*-reacted MRPs in this Example were prepared. In addition, the *Stevia* extract was blended with non-*Stevia*-reacted MRP to make several mixtures for comparison. Each sample was evaluated according to above sensory evaluation method and the resultant data was the average of the panel. The parameters and the taste profile of the products are as follow. For evaluation of the taste profile, the samples were tested by a panel of four people. The panel was asked to describe the taste profile and score values between 1-5 according to the standard procedure that follows. 1 trained taster tasted independently the samples first. The taster was allowed to re-taste, and then makes notes for the sensory attributes perceived. Afterwards, another 3 tasters tasted the samples and the attributes were noted and discussed openly to find a suitable description. In case that more than 1 taster disagreed with the result, the tasting was repeated.

TABLE 41.1

| | | | Sensory evaluation | | | | | | | | |
|---|---|---|---|---|---|---|---|---|---|---|---|
| | | | flavor intensity | | | | sweet profile | | | | |
| # | Stevia extract | Type of MRP* | Odor intensity | Flavor taste intensity | Score of flavor intensity | mouth feel kokumi | Sweet lingering | bitter-ness | Metallic aftertaste | Score of sweet profile | Overall likeability |
| 41-1 | the product of Example 37 | a | 5 | 5 | 5 | 4 | 3 | 1 | 1 | 3.33 | 4.11 |
| 41-2 | the product of Example 37 | b | 2 | 2 | 2 | 3 | 3 | 1 | 1 | 3.33 | 2.78 |
| 41-3 | RA80/RB10/RD6 | a | 3 | 3 | 3 | 3 | 2 | 1 | 1 | 3.67 | 3.22 |
| 41-4 | RA80/RB10/RD6 | b | 2 | 2 | 2 | 2 | 3 | 1 | 1 | 3.33 | 2.44 |
| 41-5 | RA75/RB15 | a | 3 | 2 | 2.5 | 3 | 3 | 1 | 1 | 3.33 | 2.94 |
| 41-6 | RA75/RB15 | b | 2 | 1 | 1.5 | 2 | 3 | 1 | 1 | 3.33 | 2.28 |

*a Stevia-reacted MRP b blend the Stevia extract with non-Stevia-reacted MRP

Data Analysis

Figure 8:
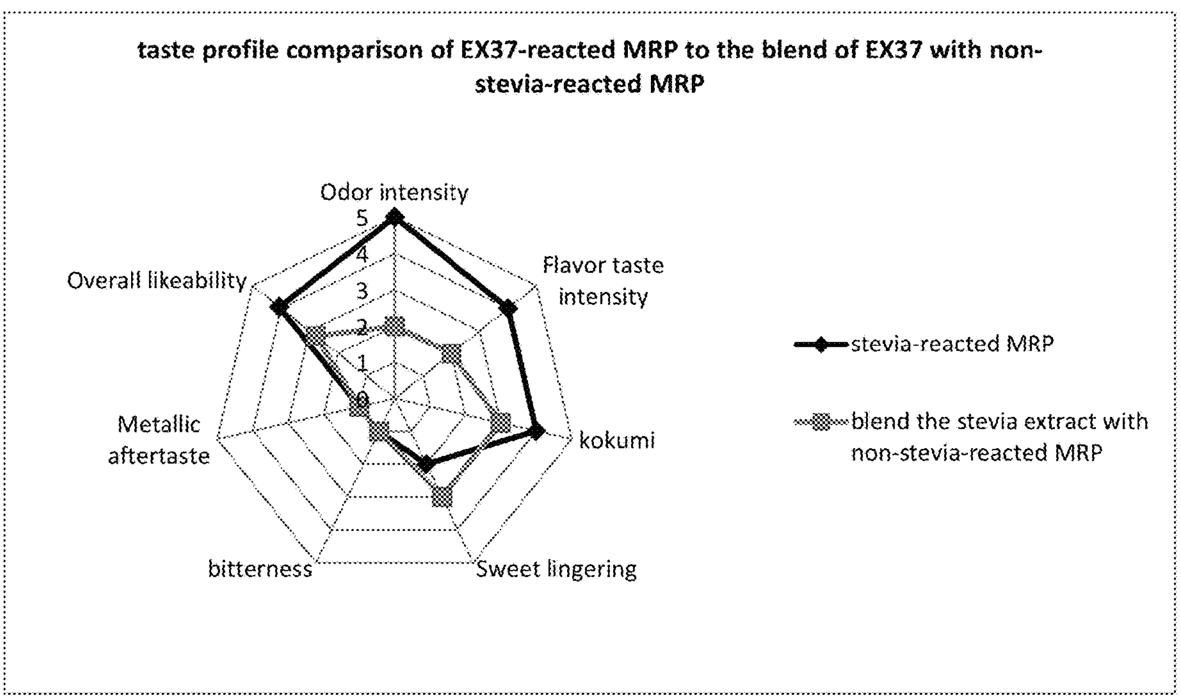
FIG. 8 depicts the comparison between the products of EX41-1 and EX41-2.

The comparison between the products of EX41-1 and EX41-2 is presented in FIG. 8. The comparisons between the products of EX41-3 and EX41-4, EX41-5 and EX41-6 presented similar results.

Conclusion:

When blended with an MRP, the taste of *Stevia* extract was improved in particular with mouth feel improvement. Surprisingly, when the *Stevia* extract was introduced into the Maillard reaction, the taste of resultant *Stevia*-reacted MRP was significantly improved compared to the blend.

Example 42

The Relationship Between the Taste Profile of Sunflower Seed Taste *Stevia* and the Ratio of the Mixture of Rhamnose and Arginine to *Stevia* Extract

*Stevia* Extract Material:

*Stevia* extract: the product of Example 37, final powder.

Common process:

Blend rhamnose and arginine in a ratio of 2:1 referred to as R&A mixture. The *Stevia* extract material was dissolved together with the R&A mixture in deionized water to make the solids content to 67%. A pH regulator was not added and the pH was about 5. The solution was heated at about 100 degrees centigrade for 2 hours. When the reaction was completed, the slurry was dried by spray dryer to provide an off white powder MRP.

Experiments

Several MRPs in this Example were prepared. Each sample was evaluated according to above sensory evaluation method and the resultant data was the average of the panel.

The parameters and the taste profile of the products are as follow. Note that according to the sensory evaluation method, the mouth feel and sweet profile were evaluated based on the same sweetness. The concentrations of *Stevia* extract in all sample solutions are the same, 250 ppm. For evaluation of the taste profile, the samples were tested by a panel of four people. The panel was asked to describe the taste profile and score values between 1-5 according to the standard procedure that follows. 1 trained taster tasted independently the samples first. The taster was allowed to re-taste, and then makes notes for the sensory attributes perceived. Afterwards, another 3 tasters tasted the samples and the attributes were noted and discussed openly to find a suitable description. In case that more than 1 taster disagreed with the result, the tasting was repeated.

TABLE 42.1

| Sample # | Ratio of R&A mixture to Stevia extract w/w | Weight of Stevia extract | Weight of rhamnose | Weight of arginine |
|---|---|---|---|---|
| 42-01 | 10/90 | 4.5 g | 0.33 g | 0.17 g |
| 42-02 | 20/80 | 4 g | 0.67 g | 0.33 g |
| 42-03 | 30/70 | 3.5 g | 1 g | 0.5 g |
| 42-04 | 40/60 | 3 g | 1.33 g | 0.67 g |
| 42-05 | 50/50 | 2.5 g | 1.67 g | 0.83 g |
| 42-06 | 60/40 | 2 g | 2 g | 1 g |
| 42-07 | 70/30 | 1.5 g | 2.33 g | 1.17 g |
| 42-08 | 80/20 | 1 g | 2.67 g | 1.33 g |
| 42-09 | 90/10 | 0.5 g | 3 g | 1.5 g |

TABLE 42.2

| | | Sensory evaluation | | | | | | | | |
|---|---|---|---|---|---|---|---|---|---|---|
| | | flavor intensity | | | | sweet profile | | | | |
| Sample # | flavor | Odor intensity | Flavor taste intensity | Score of flavor intensity | mouth feel kokumi | Sweet lingering | bitter-ness | Metallic aftertaste | Score of sweet profile | Overall likeability |
| 42-01 | Sunflower seed | 2 | 1 | 1.5 | 2 | 3 | 1 | 1 | 3.33 | 2.28 |
| 42-02 | | 2 | 2 | 2 | 2 | 2 | 1 | 1 | 3.67 | 2.56 |
| 42-03 | | 4 | 3 | 3.5 | 3 | 2 | 1 | 1 | 3.67 | 3.39 |
| 42-04 | | 3 | 2 | 2.5 | 4 | 2 | 1 | 1 | 3.67 | 3.39 |
| 42-05 | | 2 | 2 | 2 | 4 | 2 | 1 | 1 | 3.67 | 3.22 |
| 42-06 | | 2 | 2 | 2 | 4 | 2 | 1 | 1 | 3.67 | 3.22 |
| 42-07 | | 1 | 1 | 1 | 4 | 2 | 1 | 1 | 3.67 | 2.89 |
| 42-08 | | 1 | 1 | 1 | 4 | 2 | 1 | 1 | 3.67 | 2.89 |
| 42-09 | | 1 | 1 | 1 | 5 | 1 | 1 | 1 | 4.00 | 3.33 |

Data Analysis

Figure 9:
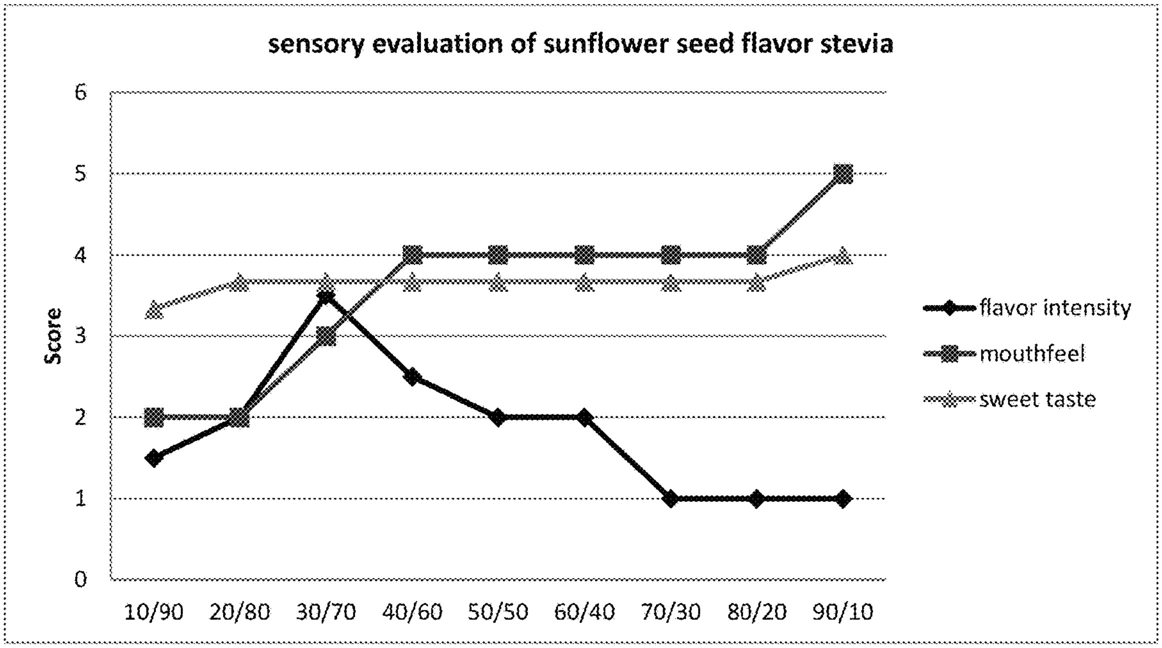
FIG. 9 depicts the relationship between the sensory evaluation results to the ratio of R&A mixture to *Stevia* extract.

The relationship between the sensory evaluation results to the ratio of R&A mixture to *Stevia* extract in this example is depicted in FIG. 9.

Figure 10:
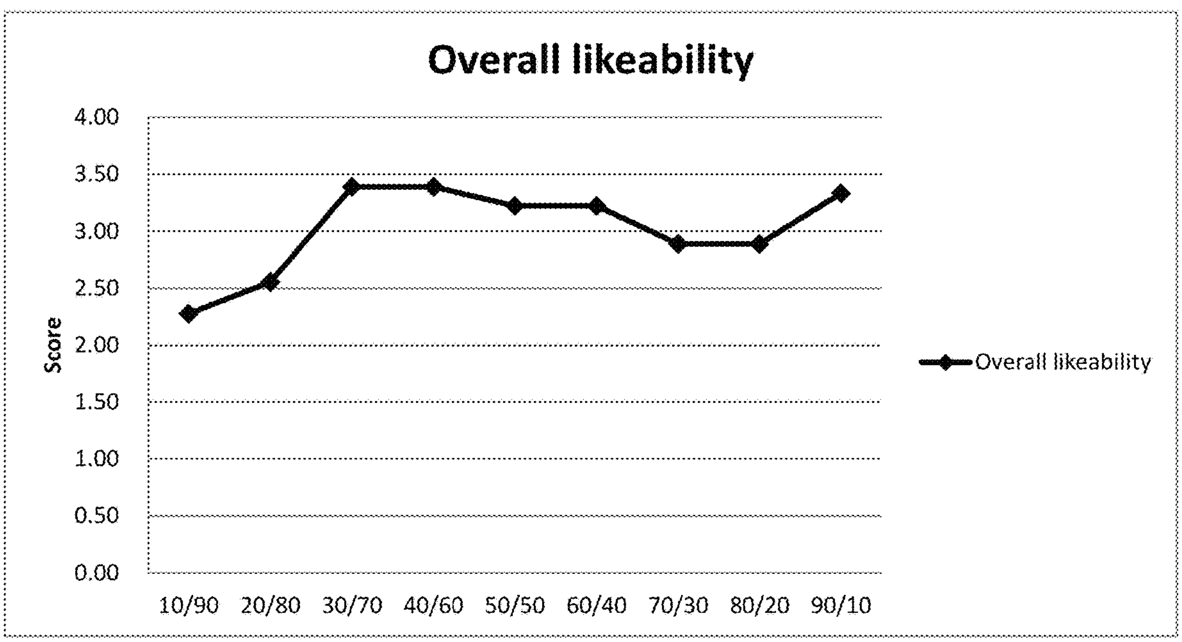
FIG. 10 depicts the relationship between the Overall likeability score to the ratio of R&A mixture to *Stevia* extract.

The relationship between the Overall likeability score to the ratio of R&A mixture to *Stevia* extract in this example is depicted in FIG. 10.

Conclusion:

As can be seen from the overall likeability data, with the ratio of R&A mixture to *Stevia* extract ranged from 20/80 to 90/10, the products provided good taste (score >2.5), particularly when the ratio of R&A mixture to *Stevia* extract ranges from 30/70 to 60/40, the products provided a very good taste((score >3). Note that when the ratio of R&A mixture to *Stevia* extract ranged from 70/30 to 90/10, in which the content of *Stevia* extract in the reactant is lower, there was not significant flavor taste and smell shown in the product. This is believed to be because the sunflower seed flavor was obtained when introducing the *Stevia* extract into the reaction of rhamnose and arginine. Accordingly, in the ratio range from 70/30 to 90/10, the level of *Stevia* extract in the reactant was very low, so the flavor intensity is not significant. However, even though there was no strong flavor, the product provided significant mouth feel improvement and so made the score of overall-likeability still high.

Example 43

Taste Comparison Between *Stevia*-Reacted MRP and the Blend of *Stevia* Extract with Non-*Stevia*-Reacted MRP (Sunflower Seed Taste)

*Stevia* Extract Material:

*Stevia* extract: the product of Example 37, final powder; RA75/RB 5; and RA80/RB10/RD6

Preparation of the Non-*Stevia*-reacted MRP:

3.3 g rhamnose and 1.7 g arginine were blended and dissolved in 2.5 g deionized water. No pH regulator was added and the pH of the solution was about 5. The solution was heated at about 100 degrees centigrade for 2 hours. When the reaction was completed, the slurry was dried by spray dryer to provide an off white powder non-*Stevia*-reacted MRP.

Preparation of the *Stevia*-Reacted MRP:

1 g rhamnose, 0.5 g arginine and 3.5 g *Stevia* extract material were dissolved in 2.5 g deionized water. No pH regulator was added and the pH of the solution was about 5. The solution was heated at about 100 degrees centigrade for 2 hours. When the reaction was completed, the slurry was dried by spray dryer to provide an off white powder MRP.

Experiments

Several *Stevia*-reacted MRPs in this Example were prepared. In addition, a blend of the *Stevia* extract with non-*Stevia*-reacted MRP was prepared to make several mixtures for comparison. Each sample was evaluated according to above sensory evaluation method and the resultant data was averaged of the panel. The parameters and the taste profile of the products are as follow. For evaluation of the taste profile, the samples were tested by a panel of four people. The panel was asked to describe the taste profile and score values between 1-5 according to the standard procedure that follows. 1 trained taster tasted independently the samples first. The taster was allowed to re-taste, and then makes notes for the sensory attributes perceived. Afterwards, another 3 tasters tasted the samples and the attributes were noted and discussed openly to find a suitable description. In case that more than 1 taster disagreed with the result, the tasting was repeated.

TABLE 43.1

| Sample # | Stevia extract | Type of MRP* | Sensory evaluation: flavor intensity: Odor intensity | Flavor taste intensity | Score of flavor intensity | mouth feel kokumi | sweet profile: Sweet lingering | bitter-ness | Metallic aftertaste | Score of sweet profile | Overall likeability |
|---|---|---|---|---|---|---|---|---|---|---|---|
| 43-1 | the product of Example 37 | a | 4 | 3 | 3.5 | 3 | 2 | 1 | 1 | 3.67 | 3.39 |
| 43-2 | the product of Example 37 | b | | No flavor | | 2 | 2 | 1 | 1 | 3.67 | 1.89 |
| 43-3 | the product of Example 37 | c | | No flavor | | 1 | 3 | 1 | 1 | 3.33 | 1.44 |
| 43-4 | RA80/RB10/RD6 | a | 4 | 2 | 3 | 3 | 2 | 1 | 1 | 3.67 | 3.22 |
| 43-5 | RA80/RB10/RD6 | b | | No flavor | | 2 | 2 | 1 | 1 | 3.67 | 1.89 |
| 43-6 | RA80/RB10/RD6 | c | | No flavor | | 1 | 3 | 1 | 1 | 3.33 | 1.44 |
| 43-7 | RA75/RB15 | a | 5 | 4 | 4.5 | 3 | 2 | 1 | 1 | 3.67 | 3.72 |
| 43-8 | RA75/RB15 | b | | No flavor | | 2 | 2 | 1 | 1 | 3.67 | 1.89 |
| 43-9 | RA75/RB15 | c | | No flavor | | 1 | 3 | 1 | 1 | 3.33 | 1.44 |

*a Stevia-reacted MRP;
b blend the Stevia extract with non-Stevia-reacted MRP;
c the Stevia extract as control Conclusion:

No matter if the *Stevia* extract was blended with the MRP or was introduced into the Maillard reaction, the taste of *Stevia* extract was improved, especially with regard to mouth feel improvement. Surprisingly and particularly, when the *Stevia* extract was introduced in the Maillard reaction, the taste of the resultant *Stevia*-reacted MRP was significantly improved compared to the simple blend.

Example 44

The Relationship Between the Taste Profile of Popcorn Taste *Stevia* and the Ratio of the Mixture of Galactose and Proline to *Stevia* Extract

*Stevia* Extract Material:

*Stevia* extract: the product of Example 37; final powder.

Common Process:

Galactose and proline were blended in the ratio of 2:1 and named as G&P mixture. The *Stevia* extract material was dissolved together with the G&P mixture in deionized water to make the solids content to 67%. No pH regulator was added and the pH of the solution was about 5. The solution was heated at about 100 degrees centigrade for 2 hours. When the reaction was completed, the slurry was dried by spray dryer to provide an off white powder MRP.

Experiments

Several MRPs in this Example were prepared. Each sample was evaluated according to above sensory evaluation method and the resultant data was the average of the panel. The parameters and the taste profile of the products are as follow. Note that according to the sensory evaluation method, the mouth feel and sweet profile were evaluated based on the same sweetness. The concentrations of *Stevia* extract in all sample solutions are the same, 250 ppm.

TABLE 44.1

| Sample # | Ratio of G&P mixture to *Stevia* extract w/w | Weight of *Stevia* extract | Weight of galactose | Weight of proline |
|---|---|---|---|---|
| 44-01 | 1/99 | 4.95 g | 0.033 g | 0.017 g |
| 44-02 | 10/90 | 4.5 g | 0.33 g | 0.17 g |
| 44-03 | 20/80 | 4 g | 0.67 g | 0.33 g |
| 44-04 | 30/70 | 3.5 g | 1 g | 0.5 g |
| 44-05 | 40/60 | 3 g | 1.33 g | 0.67 g |
| 44-06 | 50/50 | 2.5 g | 1.67 g | 0.83 g |
| 44-07 | 60/40 | 2 g | 2 g | 1 g |
| 44-08 | 70/30 | 1.5 g | 2.33 g | 1.17 g |
| 44-09 | 80/20 | 1 g | 2.67 g | 1.33 g |
| 44-10 | 90/10 | 0.5 g | 3 g | 1.5 g |
| 44-11 | 99/1 | 0.05 | 3.3 | 1.65 |

TABLE 44.2

| Sample # | Flavor | Sensory evaluation: flavor intensity: Odor intensity | Flavor taste intensity | Score of flavor intensity | mouth feel kokumi | sweet profile: Sweet lingering | bitter-ness | Metallic aftertaste | Score of sweet profile | Overall likeability |
|---|---|---|---|---|---|---|---|---|---|---|
| 44-01 | Popcorn | 1 | 1 | 1 | 2 | 2 | 2 | 1 | 3.33 | 2.11 |
| 44-02 | | 2 | 3 | 2.5 | 2 | 2 | 1 | 1 | 3.67 | 2.72 |
| 44-03 | | 3 | 3 | 3 | 3 | 2 | 1 | 1 | 3.67 | 3.22 |
| 44-04 | | 4 | 4 | 4 | 3 | 2 | 1 | 1 | 3.67 | 3.56 |
| 44-05 | | 4 | 4 | 4 | 3 | 2 | 1 | 1 | 3.67 | 3.56 |
| 44-06 | | 4 | 4 | 4 | 3 | 1 | 1 | 1 | 4.00 | 3.67 |

TABLE 44.2-continued

| | | Sensory evaluation | | | | | | | | |
|---|---|---|---|---|---|---|---|---|---|---|
| | | flavor intensity | | | | sweet profile | | | | |
| Sample # | Flavor | Odor intensity | Flavor taste intensity | Score of flavor intensity | mouth feel kokumi | Sweet lingering | bitter-ness | Metallic aftertaste | Score of sweet profile | Overall likeability |
| 44-07 | Popcorn and Caramel | 3 | 3 | 3 | 3 | 1 | 2 | 1 | 3.67 | 3.22 |
| 44-08 | Caramel | 2 | 2 | 2 | 4 | 1 | 2 | 1 | 3.67 | 3.22 |
| 44-09 | | 2 | 2 | 2 | 4 | 1 | 3 | 1 | 3.33 | 3.11 |
| 44-10 | | 2 | 2 | 2 | 4 | 1 | 3 | 1 | 3.33 | 3.11 |
| 44-11 | | 1 | 1 | 1 | 4 | 1 | 3 | 1 | 3.33 | 2.78 |

Data Analysis

Figure 11:
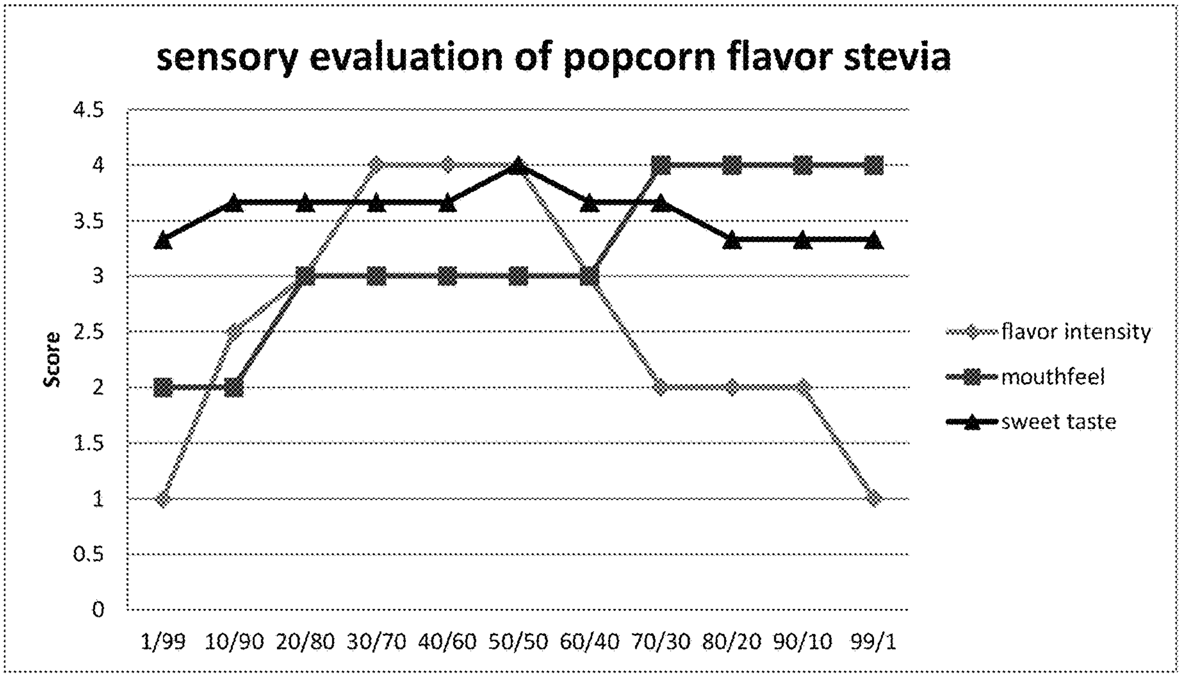
FIG. 11 depicts the relationship between the sensory evaluation results to the ratio of G&P mixture to *Stevia* extract.

The relationship between the sensory evaluation results to the ratio of G&P mixture to *Stevia* extract in this example is shown in FIG. 11.

Figure 12:
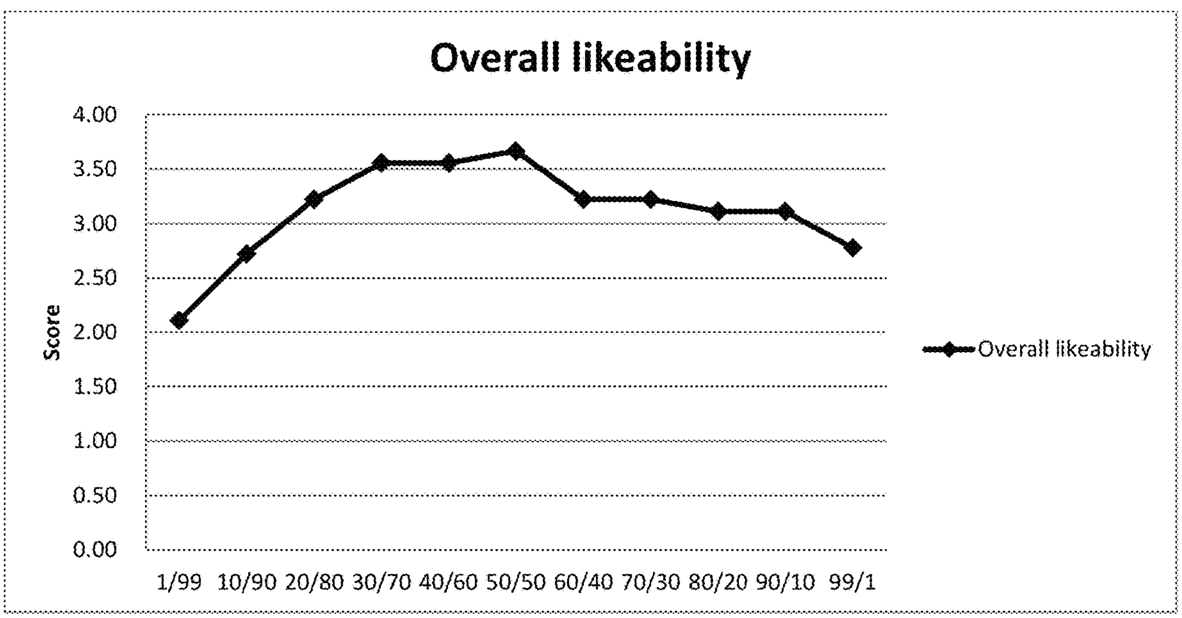
FIG. 12 depicts the relationship between the Overall likeability score to the ratio of G&P mixture to *Stevia* extract.

The relationship between the Overall likeability score to the ratio of G&P mixture to *Stevia* extract in this example is shown in FIG. 12. For evaluation of the taste profile, the samples were tested by a panel of four people. The panel was asked to describe the taste profile and score values between 1-5 according to the standard procedure that follows. 1 trained taster tasted independently the samples first. The taster was allowed to re-taste, and then makes notes for the sensory attributes perceived. Afterwards, another 3 tasters tasted the samples and the attributes were noted and discussed openly to find a suitable description. In case that more than 1 taster disagreed with the result, the tasting was repeated.

Conclusion:

As can be seen from the overall likeability data, when the ratio of G&P mixture to *Stevia* extract ranged from 20/80 to 90/10, the products provided good taste (score >3), particularly when the ratio of G&P mixture to *Stevia* extract ranged from 30/70 to 50/50, the products provided a very good taste (score >3.5).

Example 45

Taste Comparison Between *Stevia*-Reacted MRP and the Blend of *Stevia* Extract with Non-*Stevia*-Reacted MRP (Popcorn Taste)

*Stevia* Extract Material:

*Stevia* extract: the product of Example 37, final powder; STV60/TSG(13)95 (66.19% stevioside, available from sweet Green Fields); RA75/RB15; and RA80/R1310/RD6

Preparation of the Non-*Stevia*-Reacted MRP:

3.3 g galactose and 6.7 g proline were blended and dissolved in 2.5 g deionized water. No pH regulator was added and the pH of the solution was about 5. The solution was heated at about 100 degrees centigrade for 2 hours. When the reaction was completed, the slurry was dried by spray dryer to provide an off white powder non-*Stevia*-reacted MRP.

Preparation of the *Stevia*-reacted MRP:

1 g galactose, 0.5 g proline and 3.5 g *Stevia* extract material were dissolved in 2.5 g deionized water. No pH regulator was added and the pH of the solution was about 5. The solution was heated at about 100 degrees centigrade for 2 hours. When the reaction was completed, the slurry was dried by spray dryer to provide an off white powder MRP.

Experiments

Several *Stevia*-reacted MRPs in this Example were prepared. In addition, the *Stevia* extract was blended with non-*Stevia*-reacted MRP to make several mixtures for comparison. Each sample was evaluated according to above sensory evaluation method and the resultant data was the average of the panel. The parameters and the taste profile of the products are as follow. For evaluation of the taste profile, the samples were tested by a panel of four people. The panel was asked to describe the taste profile and score values between 1-5 according to the standard procedure that follows. 1 trained taster tasted independently the samples first. The taster was allowed to re-taste, and then makes notes for the sensory attributes perceived. Afterwards, another 3 tasters tasted the samples and the attributes were noted and discussed openly to find a suitable description. In case that more than 1 taster disagreed with the result, the tasting was repeated.

TABLE 45.1

| | | | Sensory evaluation | | | | | | | | |
|---|---|---|---|---|---|---|---|---|---|---|---|
| | | | flavor intensity | | | | sweet profile | | | | |
| # | Stevia extract | Type of MRP* | Odor intensity | Flavor taste intensity | Score of flavor intensity | mouth feel kokumi | Sweet lingering | bitter-ness | Metallic aftertaste | Score of sweet profile | Overall likeability |
| 45-1 | the product of Example 37 | a | 4 | 4 | 4 | 3 | 2 | 1 | 1 | 3.67 | 3.56 |
| 45-2 | the product of Example 37 | b | 4 | 3 | 3.5 | 2 | 2 | 2 | 1 | 3.33 | 2.94 |
| 45-3 | STV60/TSG(13)95 | a | 3 | 3 | 3 | 3 | 2 | 2 | 1 | 3.33 | 3.11 |
| 45-4 | STV60/TSG(13)95 | b | 3 | 2 | 2.5 | 2 | 2 | 3 | 2 | 2.67 | 2.39 |
| 45-5 | RA80/RB10/RD6 | a | 2 | 2 | 2 | 4 | 1 | 1 | 1 | 4.00 | 3.33 |
| 45-6 | RA80/RB10/RD6 | b | 2 | 2 | 2 | 3 | 2 | 1 | 1 | 3.67 | 2.89 |

TABLE 45.1-continued

| # | Stevia extract | Type of MRP* | Sensory evaluation: flavor intensity: Odor intensity | Flavor taste intensity | Score of flavor intensity | mouth feel kokumi | sweet profile: Sweet lingering | bitter-ness | Metallic aftertaste | Score of sweet profile | Overall likeability |
|---|---|---|---|---|---|---|---|---|---|---|---|
| 45-7 | RA75/RB15 | a | 2 | 2 | 2 | 3 | 2 | 1 | 1 | 3.67 | 2.89 |
| 45-8 | RA75/RB15 | b | 2 | 2 | 2 | 2 | 2 | 1 | 1 | 3.67 | 2.56 |

*a Stevia-reacted MRP;
b blend the Stevia extract with non-Stevia-reacted MRP

Data Analysis

Figure 13:
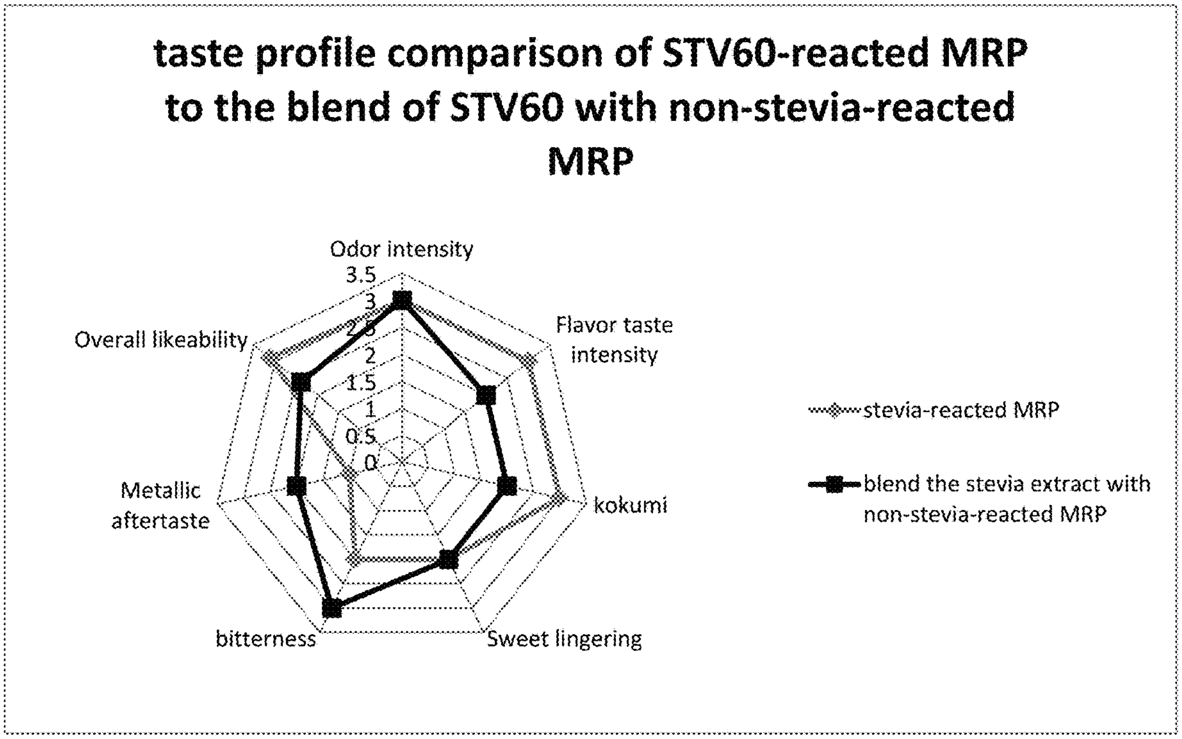
FIG. 13 depicts the comparison between the products of EX45-3 and EX45-4.

The comparison between the products of EX45-3 and EX45-4 is shown in FIG. 13.

The comparisons between the products of EX45-1 and EX45-2, EX45-5 and EX45-6, EX45-7 and EX45-8 present similar results.

Conclusion:

No matter if the *Stevia* extract was blended with MRP or was introduced in the Maillard reaction, the taste of *Stevia* extract was improved especially with mouth feel improvement. Surprisingly, when the *Stevia* extract was introduced in the Maillard reaction, the taste of the resultant *Stevia*-reacted MRP was significantly improved compared to the blend, Example 46

The Effect of the Species of Reducing Sugar on the Flavor of Chocolate

*Stevia* Extract Material:

*Stevia* extract: RA80/TSG(13SG)95 (84.10% rehaudioside A, available from Sweet Green Fields)

Common Process:

The reducing sugar and valine were blended in a certain ratio and named as the R&V mixture. The *Stevia* extract material was dissolved together with the MN mixture in deionized water to make the solids content to 67%. The ratio of R&V mixture to *Stevia* extract was 30/70. Propylene glycol was added to the reaction mixture to make the ratio of propylene glycol to water equal to 1:5. No pH regulator was added and the pH was about 5. The solution was then heated at about 120 degrees centigrade for 45 min. When the reaction was completed, the slurry was dried by spray dryer to provide an off white powder MRP.

Experiments

Several MRPs in this Example were prepared. Each sample was evaluated according to above sensory evaluation method and the resultant data was the average of the panel. The parameters and the taste profile of the products are as follow.

TABLE 46.1

| Sample # | Reducing sugar | Ratio of reducing sugar to valine | Weight of Stevia extract | Weight of reducing sugar | Weight of amino acid | Weight of water | Weight of propylene glycol |
|---|---|---|---|---|---|---|---|
| 46-01 | Glucose | 1:1 | 3.5 g | 0.75 g | 0.75 g | 2.5 g | 0.5 g |
| 46-02 | Galactose | | 3.5 g | 0.75 g | 0.75 g | 2.5 g | 0.5 g |
| 46-03 | Rhamnose | | 3.5 g | 0.75 g | 0.75 g | 2.5 g | 0.5 g |
| 46-04 | Arabinose | | 3.5 g | 0.75 g | 0.75 g | 2.5 g | 0.5 g |
| 46-05 | Xylose | | 3.5 g | 0.75 g | 0.75 g | 2.5 g | 0.5 g |
| 46-06 | Glucose | 2:1 | 3.5 g | 1 g | 0.5 g | 2.5 g | 0.5 g |
| 46-07 | Galactose | | 3.5 g | 1 g | 0.5 g | 2.5 g | 0.5 g |
| 46-08 | Rhamnose | | 3.5 g | 1 g | 0.5 g | 2.5 g | 0.5 g |
| 46-09 | Arabinose | | 3.5 g | 1 g | 0.5 g | 2.5 g | 0.5 g |
| 46-10 | Xylose | | 3.5 g | 1 g | 0.5 g | 2.5 g | 0.5 g |

TABLE 46.2

| Sample # | Sensory evaluation: flavor intensity: Odor intensity | Flavor taste intensity | Score of flavor intensity | Mouth feel kokumi | sweet profile: Sweet lingering | bitter-ness | Metallic aftertaste | Score of sweet profile | Overall likeability |
|---|---|---|---|---|---|---|---|---|---|
| 46-01 | 1 | 1 | 1 | 3 | 3 | 2 | 1 | 3.00 | 2.33 |
| 46-02 | 2 | 2 | 2 | 3 | 2 | 3 | 1 | 3.00 | 2.67 |
| 46-03 | 3 | 4 | 3.5 | 4 | 2 | 3 | 1 | 3.00 | 3.50 |

TABLE 46.2-continued

| | Sensory evaluation | | | | | | | | |
|---|---|---|---|---|---|---|---|---|---|
| | flavor intensity | | | | sweet profile | | | | |
| Sample # | Odor intensity | Flavor taste intensity | Score of flavor intensity | Mouth feel kokumi | Sweet lingering | bitter-ness | Metallic aftertaste | Score of sweet profile | Overall likeability |
| 46-04 | 2 | 4 | 3 | 4 | 2 | 2 | 1 | 3.33 | 3.44 |
| 46-05 | 3 | 4 | 3.5 | 4 | 3 | 2 | 1 | 3.00 | 3.50 |
| 46-06 | 2 | 2 | 2 | 3 | 3 | 3 | 1 | 2.67 | 2.56 |
| 46-07 | 3 | 4 | 3.5 | 3 | 2 | 4 | 1 | 2.67 | 3.06 |
| 46-08 | 2 | 4 | 3 | 3 | 2 | 4 | 1 | 2.67 | 2.89 |
| 46-09 | 2 | 4 | 3 | 4 | 2 | 2 | 1 | 3.33 | 3.44 |
| 44-10 | 3 | 4 | 3.5 | 4 | 3 | 2 | 1 | 3.00 | 3.50 |

Conclusion:

The products of valine reacting with all the reducing sugars gave a good chocolate flavor. Among them, rhamose and xylose were the better reactants to prepare a chocolate flavored MRP. When using rhamnose and valine as the reactants, the preferred ratio was 1:1.

Example 47

The Relationship Between the Taste Profile of Chocolate Taste *Stevia* and the Ratio of the Mixture of Rhamnose and Valine to *Stevia* Extract

*Stevia* Extract Material:

*Stevia* extract: RA80/TSG(13SG)95 (84.10% rebaudioside A, available from Sweet Green Fields).

TABLE 47.1

| Sample # | Ratio of R&V mixture to *Stevia* extract w/w | Weight of *Stevia* extract | Weight of rhamnose | Weight of valine |
|---|---|---|---|---|
| 47-01 | 20/80 | 4 g | 0.5 g | 0.5 g |
| 47-02 | 30/70 | 3.5 g | 0.75 g | 0.75 g |
| 47-03 | 40/60 | 3 g | 1 g | 1 g |
| 47-04 | 50/50 | 2.5 g | 1.25 g | 1.25 g |
| 47-05 | 60/40 | 2 g | 1.5 g | 1.5 g |

TABLE 47.2

| | | Sensory evaluation | | | | | | | | |
|---|---|---|---|---|---|---|---|---|---|---|
| | | flavor intensity | | | | sweet profile | | | | |
| Sample # | flavor | Odor intensity | Flavor taste intensity | Score of flavor intensity | mouth feel kokumi | Sweet lingering | bitter-ness | Metallic aftertaste | Score of sweet profile | Overall likeability |
| 47-01 | chocolate | 2 | 3 | 2.5 | 4 | 2 | 3 | 1 | 3.00 | 3.17 |
| 47-02 | | 3 | 4 | 3.5 | 4 | 2 | 3 | 1 | 3.00 | 3.50 |
| 47-03 | | 3 | 4 | 3.5 | 4 | 2 | 3 | 1 | 3.00 | 3.50 |
| 47-04 | | 4 | 3 | 3.5 | 4 | 1 | 4 | 1 | 3.00 | 3.50 |
| 47-05 | | 4 | 4 | 4 | 4 | 1 | 4 | 1 | 3.00 | 3.67 |

Common Process:

Rhamnose and valine were blended in a ratio of 1:1 and named as R&V mixture. The *Stevia* extract material was dissolved together with the R&V mixture in deionized water to make the solids content to 67%. Propylene glycol was added to the reaction mixture to make the ratio of propylene glycol to water equal to 1:2.5. No pH regulator was added and the pH was about 5. The solution was then heated at about 12.0 degrees centigrade for 45 min. When the reaction was completed, the slurry was dried by spray dryer to provide an off white powder MRP.

Experiments

Several MRPs in this Example were prepared. Each sample was evaluated according to above sensory evaluation method and the resultant data were the average of the panel. The parameters and the taste profile of the products are as follow. Note that according to the sensory evaluation method, the mouth feel and sweet profile were evaluated based on the same sweetness. The concentrations of *Stevia* extract in all sample solutions are the same, 250 ppm.

Data Analysis

Figure 14:
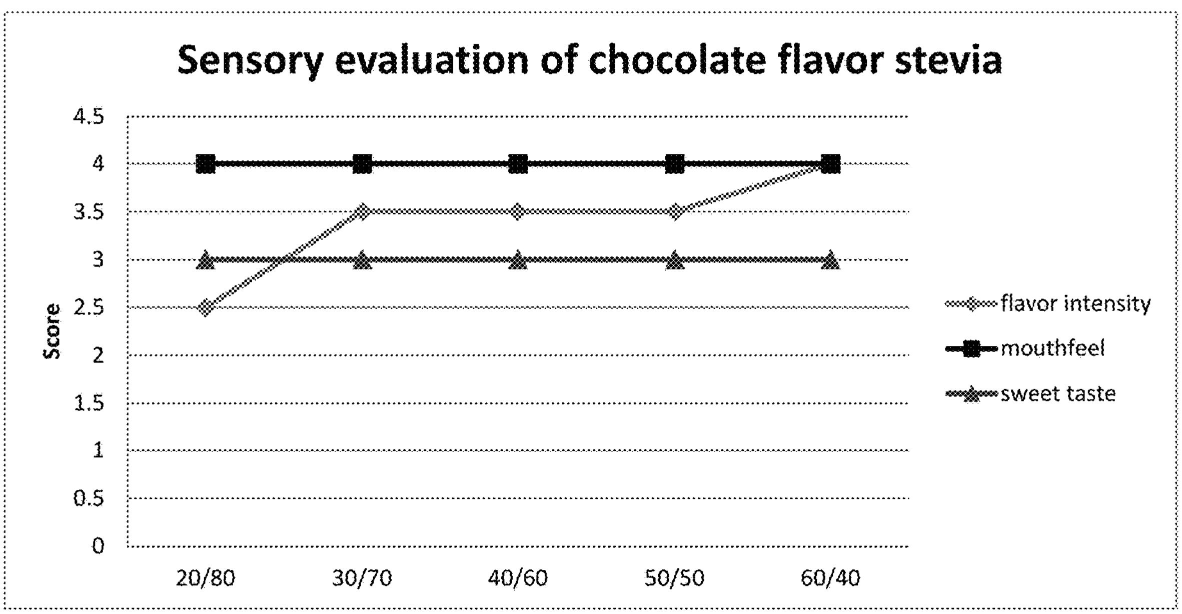
FIG. 14 depicts the relationship between the sensory evaluation results to the ratio of R&V/mixture to *Stevia* extract.

The relationship between the sensory evaluation results to the ratio of R&V mixture to *Stevia* extract in this example is shown in FIG. 14.

Figure 15:
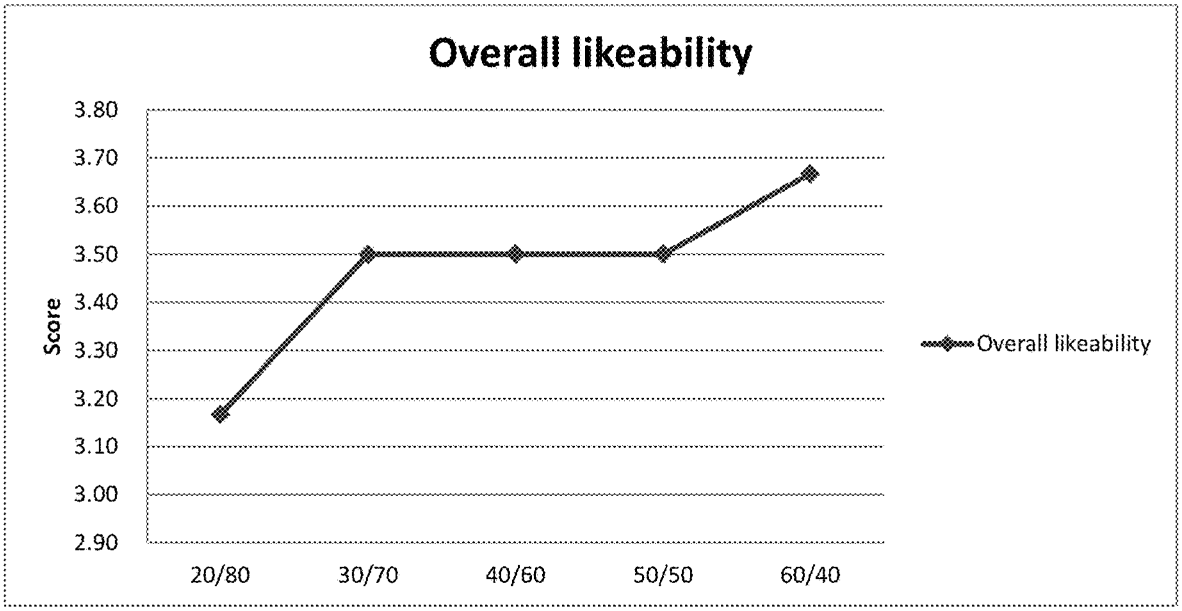
FIG. 15 depicts the relationship between the Overall likeability score to the ratio of R&V mixture to *Stevia* extract.

The relationship between the Overall likeability score to the ratio of R&V mixture to *Stevia* extract in this example is shown in FIG. 15.

Conclusion:

As can be seen from the overall likeability data, when the ratio of R&V mixture to *Stevia* extract ranged from 20/80 to 60/40, the products provided good taste (score >3), especially when the ratio of R&V mixture to *Stevia* extract ranged from 30/70 to 60/40, the products provided a very good taste (score >3.5), For evaluation of the taste profile, the samples were tested by a panel of four people. The panel was asked to describe the taste profile and score values between 1-5 according to the standard procedure that follows. 1 trained taster tasted independently the samples first. The taster was allowed to re-taste, and then makes notes for the sensory attributes perceived. Afterwards, another 3 tasters tasted the samples and the attributes were noted and discussed openly to find a suitable description. In case that more than 1 taster disagreed with the result, the tasting was repeated.

Example 48

Taste Comparison Between *Stevia*-Reacted MRP and the Blend of *Stevia* Extract with Non-*Stevia*-Reacted MRP (Chocolate Taste)

*Stevia* Extract Material:

*Stevia* extract: RA80/TSG(13SG)95 (84.10% rebaudioside A, available from Sweet Green Fields); STV60/TSG (13SG)95 (66.19% stevioside, available from Sweet Green Fields).

Preparation of the Non-*Stevia*-Reacted MRP:

Blend 2.5 g rhamnose and 2.5 g valine were blended and dissolved in 2.5 g deionized water. 0.5 g propylene glycol was added to the reaction mixture. No pH regulator was added and the pH was about 5. The solution was heated at about 120 degrees centigrade for 45 min. When the reaction was completed, the slurry was dried by spray dryer to provide an off white powder MRP.

Preparation of the *Stevia*-Reacted MRP:

0.75 g rhamnose, 0.75 g valine and 3.5 g *Stevia* extract material were dissolved in 2.5 g deionized water. 0.5 g propylene glycol was added to the reaction mixture. No pH regulator was added and the pH was about 5. The solution was then heated at about 120 degrees centigrade for 45 min. When the reaction was completed, the slurry was dried by spray dryer to provide an off white powder MRP.

Experiments

Several *Stevia*-reacted MRPs in this Example were prepared. In addition, the *Stevia* extract was blended with non-*Stevia*-reacted MRP to make several mixtures for comparison. Each sample was evaluated according to above sensory evaluation method and the result data were average of the panel. The parameters and the taste profile of the products are as follow.

For evaluation of the taste profile, the samples were tested by a panel of four people. The panel was asked to describe the taste profile and score values between 1-5 according to the standard procedure that follows. 1 trained taster tasted independently the samples first. The taster was allowed to re-taste, and then makes notes for the sensory attributes perceived. Afterwards, another 3 tasters tasted the samples and the attributes were noted and discussed openly to find a suitable description. In case that more than 1 taster disagreed with the result, the tasting was repeated.

Example 49

Taste Comparison Between *Stevia*-Reacted MRP and the Blend of *Stevia* Extract with Non-*Stevia*-Reacted MRP (Citrus Taste)

*Stevia* Extract Material:

*Stevia* extract: the product of Example 37, final powder; STV60/TSG(13SG)95 (66.19% stevioside, available from Sweet Green Fields).

Preparation of the Non-*Stevia*-Reacted MRP:

3.3 g lactose and 1.7 g glutamic acid were blended and dissolved in 2.5 g deionized water. No pH regulator was added and the pH was about 5. The solution was heated at about 100 degrees centigrade for 3 hours. When the reaction was completed, the slurry was dried by spray dryer to provide an off white powder MRP.

Preparation of the *Stevia*-Reacted MRP:

0.33 g lactose, 0.17 g glutamic acid and 4.5 g *Stevia* extract material was dissolved in 2.5 g deionized water to make the solids content to 67%. No pH regulator was added and the pH was about 5. The solution was heated at about 100 degrees centigrade for 3 hours. When the reaction was completed, the slurry was dried by spray dryer to provide an off white powder MRP.

Experiments

Several *Stevia*-reacted MRPs in this Example were prepared. In addition, the *Stevia* extract was blended with non-*Stevia*-reacted MRP to make several mixtures for comparison. Each sample was evaluated according to above sensory evaluation method and the result data were average of the panel. The parameters and the taste profile of the products are as follow. For evaluation of the taste profile, the samples were tested by a panel of four people. The panel was asked to describe the taste profile and score values between 1-5 according to the standard procedure that follows. 1 trained taster tasted independently the samples first. The taster was allowed to re-taste, and then makes notes for the sensory attributes perceived. Afterwards, another 3 tasters tasted the samples and the attributes were noted and discussed openly to find a suitable description. In case that

TABLE 48.1

| | | | Sensory evaluation | | | | | | | | | |
|---|---|---|---|---|---|---|---|---|---|---|---|---|
| | | | flavor intensity | | | | sweet profile | | | | | |
| # | Stevia extract | Type of MRP* | Odor intensity | Flavor taste intensity | Score of flavor intensity | mouth feel kokumi | Sweet lingering | bitter-ness | Metallic aftertaste | Score of sweet profile | Overall likeability |
| 48-1 | RA80/TSG(13)95 | a | 2 | 4 | 3 | 4 | 2 | 2 | 1 | 3.33 | 3.44 |
| 48-2 | RA80/TSG(13)95 | b | 1 | 2 | 1.5 | 3 | 3 | 2 | 1 | 3.00 | 2.50 |
| 48-3 | STV60/TSG(13)95 | a | 3 | 4 | 3.5 | 4 | 2 | 2 | 1 | 3.33 | 3.61 |
| 48-4 | STV60/TSG(13)95 | b | 1 | 2 | 1.5 | 3 | 3 | 2 | 1 | 3.00 | 2.50 |

*a Stevia-reacted MRP;
b blend the Stevia extract with non-Stevia-reacted MRP

Data Analysis

Figure 16:
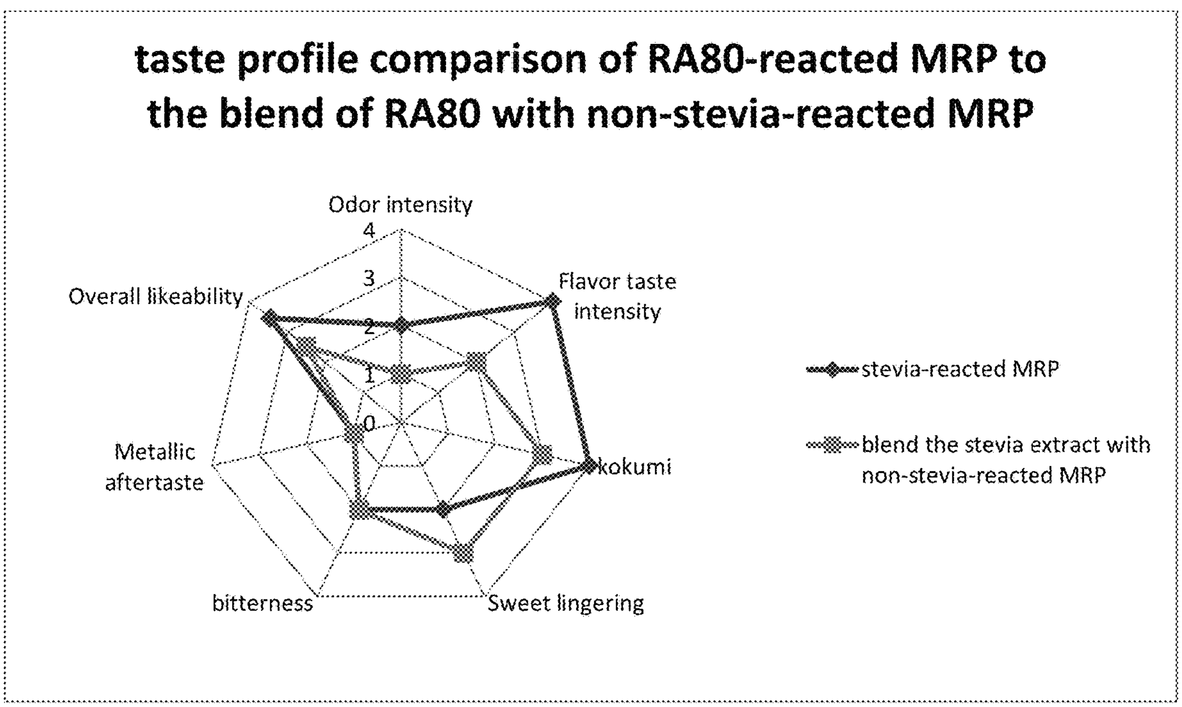
FIG. 16 depicts the comparison between the products of EX48-1 and EX48-2.

The comparison between the products of EX48-1 and EX48-2 is shown in FIG. 16.

The comparison between the products of EX48-3 and EX48-4 presented similar results.

Conclusion:

No matter if the *Stevia* extract was blended with MRP or was introduced in the Maillard reaction, the taste of *Stevia* extract was improved especially with mouth feel improvement. Surprisingly, when the *Stevia* extract was introduced in Maillard reaction, the taste of the resultant *Stevia*-reacted MRP was significantly improved in comparison to the blend.

more than 1 taster disagreed with the result, the tasting was repeated.

TABLE 49.1

| # | Stevia extract | Type of MRP* | Sensory evaluation | | | | | | | | |
|---|---|---|---|---|---|---|---|---|---|---|---|
| | | | flavor intensity | | | | sweet profile | | | | |
| | | | Odor intensity | Flavor taste intensity | Score of flavor intensity | mouth feel kokumi | Sweet lingering | bitter-ness | Metallic aftertaste | Score of sweet profile | Overall likeability |
| 49-1 | the product of Example 37 | a | 3 | 3 | 3 | 3 | 1 | 2 | 1 | 3.67 | 3.22 |
| 49-2 | the product of Example 37 | b | | No flavor | | 2 | 2 | 2 | 1 | 3.33 | 1.78 |
| 49-3 | STV60/TSG(13)95 | a | 2 | 2 | 2 | 3 | 2 | 1 | 1 | 3.67 | 2.89 |
| 49-4 | STV60/TSG(13)95 | b | | No flavor | | 2 | 2 | 2 | 1 | 3.33 | 1.78 |

*a Stevia-reacted MRP;
b blend the Stevia extract with non-Stevia-reacted MRP

Data Analysis

Figure 17:
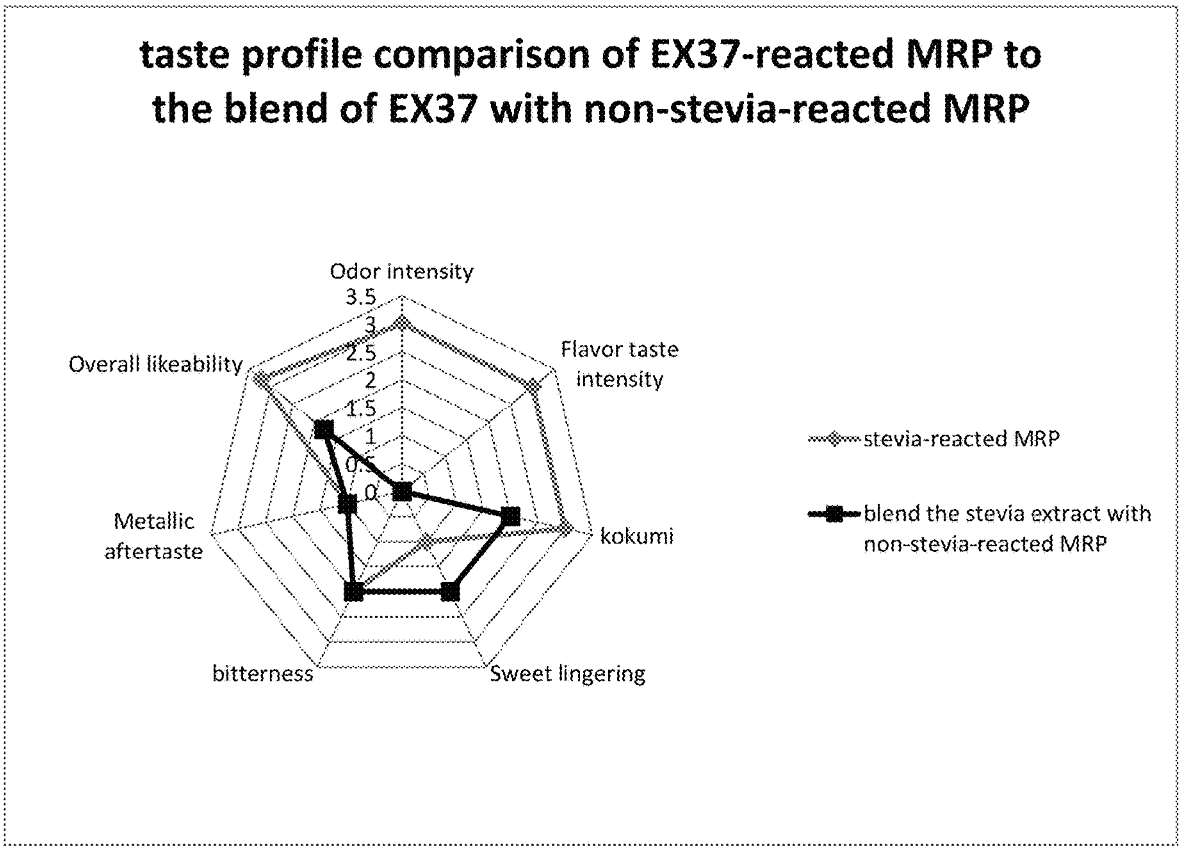
FIG. 17 depicts the comparison between the products of EX49-1 and EX49-2.

The comparison between the products of EX49-1 and EX49-2 is shown in FIG. 17.

The comparison between the products of EX49-3 and EX49-4 presents similar result.

Conclusion:

It did not matter if the *Stevia* extract was blended with MRP or it was added during the Maillard reaction, the taste of *Stevia* extract was improved especially with mouth feel improvement. Surprisingly, when the *Stevia* extract participates in Maillard reaction, the resultant *Stevia*-reacted MRP has significant citrus flavor which was not shown in non-*Stevia*-involved MRPs and the blend of the *Stevia* extract with non-*Stevia*-involved. MRPs. Meanwhile, the *Stevia*-reacted MRP also gives significant taste improvement compared to the blend.

Example 50

Experimental Reaction Conditions for MRPs—Different Reaction Partners and Conditions Materials Chemicals used for Maillard reactions were supplied by Sigma-Aldrich (Food Grade), Solvents and chemicals for analysis (GC/MS and LC/DAD/MS were supplied by Sigma-Aldrich (HPLC-grade and USP certified material). Rebaudioside B (Lot RB 100722) and Rebaudioside A (Lot Reb A 100 EPC 043-17-02) was supplied by EPC.

Test series using glycerol or glycerol/water as reaction solvent

As seen in FIG. 18, one series of experiments was performed in sealed 20 ml Pyrex-Vials filled with 10 ml of reaction solvent. The reaction partner (amino acid, carbohydrate source) were dissolved/suspended in the reaction solvent and transferred into a glass beaker filled with sand pre-heated for at least 30 minutes at the reaction temperature in a drying oven. After the planned reaction time, the vials were transferred into ice water. After cooling to room temperature, sensory analysis and analytical characterization was performed.

All tests were performed with negative controls (only reaction solvent, reaction solvent and amino acid, reaction solvent and carbohydrate).

Concentrations of the reaction partners, the incubation tune and temperature are given in Tables 50.1 to 50.7.

TABLE 50.1

| Reaction partners | Solvent | Time, h | Temp, ° C. |
|---|---|---|---|
| — (solvent only) | 1 ml water + 9 ml Glycerin | 1 | 100 |
| 167 mMol Glu | | | |
| 167 mMol Xyl | | | |
| Phe 60 mMol | | | |
| Phe 60 mMol + 167 mMol Glu | | | |
| Phe 60 mMol + 167 mMol Xyl | | | |

TABLE 50.2

| Reaction partners | Solvent | Time, h | Temp, ° C. |
|---|---|---|---|
| — (solvent only) | 1 ml water + 9 ml Glycerin | 0.67 | 100 |
| 0.05 mMol Reb-A | | | |
| 0.05 mMol Reb-B + 0.05 mMol Glu | | | |
| 0.05 mMol Reb-B + 0.05 mMol Gluc acid | | | |
| 0.05 mMol Reb-B + 0.05 mMol GlucLac | | | |
| 0.1 mMol Phe | | | |
| 0.1 mMol Phe + 0.1 mMol Glu | | | |
| 0.1 mMol Phe + 0.1 mMol Reb-A | | | |
| 0.05 mMol Phe + 0.05 mMol Reb-B + 0.05 mMol Glu | | | |
| 0.1 mMol Phe + 0.1 mMol GlucLac | | | |
| 0.05 mMol + 0.05 mMol Reb-B + 0.05 mMol GlucLac | | | |
| 0.1 mMol Phe + 0.1 mMol Gluc Acid | | | |
| 0.05 mMol Phe + 0.05 mMol Reb-B + 0.05 mMol Gluc Acid | | | |
| 0.1 mMol Ala | | | |
| 0.1 mMol Alanin + 0.1 mMol Glu | | | |
| 0.1 mMol Alanin + 0.1 mMol Reb-A | | | |
| 0.05 mMol Ala + 0.05 mMol Reb-B + 0.05 mMol Glu | | | |

TABLE 50.3

| Reaction partners | Solvent | Time, h | Temp, ° C. |
|---|---|---|---|
| — (solvent only) | 1 ml water + 9 ml Glycerin | 0.67 | 100 |
| 0.1 mMol Lys | | | |
| 0.1 mMol Glu | | | |
| 0.1 mMol Lys + 0.1 mMol Glu | | | |
| 0.1 mMol Lys + 0.1 mMol Reb-A | | | |

TABLE 50.3-continued

| Reaction partners | Solvent | Time, h | Temp, ° C. |
|---|---|---|---|
| 0.05 mMol Lys + 0.05 mMol Reb-B + 0.05 mMol Glu | | | |

TABLE 50.4

| Reaction partners | Solvent | Time, h | Temp, ° C. |
|---|---|---|---|
| 0.1 mMol Phe + 0.1 mMol GlucLac | 1 ml water + | 1.0 | 120 |
| 0.1 mMol Phe + 0.1 mMol Gluc Acid | 9 ml Glycerin | | |
| 0.1 mMol Phe + 0.1 mMol Glu | | | |

TABLE 50.5

| Reaction partners | Solvent | Time, h | Temp, ° C. |
|---|---|---|---|
| — (solvent only) | 1 ml water + | 2.0 | 120 |
| 0.1 mMol Phe | 9 ml Glycerin | | |
| 0.1 mMol Glu | | | |
| 0.1 mMol GluLac | | | |
| 0.1 mMol Gluc Acid | | | |
| 0.1 mMol Phe + 0.1 mMol GlucLac | | | |
| 0.1 mMol Phe + 0.1 mMol Gluc Acid | | | |
| 0.1 mMol Phe + 0.1 mMol Glu | | | |

TABLE 50.6

| Reaction partners | Solvent | Time, min | Temp, ° C. |
|---|---|---|---|
| — (solvent only) | Glycerin, 10 ml | 40 | 100 |
| 10 mMol Glu | | 40 | |
| 10 mmol Xyl | | 40 | |
| 3.3 mMol Phe | | 5 | |
| | | 10 | |
| | | 20 | |
| | | 40 | |
| 3.3 mMol Phe + 10 mMol Glu | | 5 | |
| | | 10 | |
| | | 20 | |
| | | 40 | |
| 3.3 mMol Phe + 10 mmol Xyl | | 5 | |
| | | 10 | |
| | | 20 | |
| | | 40 | |

TABLE 50.7

| Reaction partners | Solvent | Time, h | Temp, ° C. |
|---|---|---|---|
| — (solvent only) | Glycerin, 10 ml | 1 | 120 |
| 10 mMol Glu | | | |
| 10 mMol Xyl | | | |
| 3.3 mMol Phe | | | |
| 3.3 mMol Phe + 10 mMol Glu | | | |
| 3.3 mMol Phe + 10 mMol Xyl | | | |

Abbreviations: Glu . . . Glucose, Suc . . . Sucrose, Glue Acid . . . Glucuronic Acid, GluLac . . . Glucuronolactone, Phe . . . Phenylalanine, Ala . . . Alanine, Lys . . . Lysine, Cys . . . Cysteine, Met . . . Methionine, Asp . . . Asparaginic Acid, Tyr . . . Tyrosine, Pro . . . Proline, Ser . . . Serine, Try . . . Tryptophan, Glt . . . Glutaminic acid, Thr . . . Threonine, Ile . . . Isoleucine, Xyl . . . Xylose, Ile . . . Isoleucine, Asp . . . Asparaginic acid, SG . . . Steviol glycosides.

Test Series Using Buffer as Reaction Solvent

Another series of experiments was performed in 50 round flasks filled with 10 ml of reaction solvent. The reaction partner (amino acid, carbohydrate source) were dissolved/suspended in the reaction solvent and reflux heated for the time given on heating plates. After the planned reaction time, the flasks were transferred into ice water. After cooling to room temperature, sensory analysis and analytical characterization was performed.

Concentrations of the reaction partners, the incubation time and temperature are given in Tables 50.8 to 50.9.

TABLE 50.8

| Reaction partners | Solvent | Time, h | Temp, ° C. |
|---|---|---|---|
| 10 mMol Phe + 3.3 mMol Glu | Water | 3 | 120 |
| 10 mMol Phe + 3.3 mMol Glu | Water, pH 5.2 (HCl) | | |
| 10 mMol Phe + 3.3 mMol Glu | 6 molar HCl | | |
| 10 mMol Phe + 3.3 mMol Glu | 0.1 molar $KH_2PO_4$, pH 7.8 | | |

TABLE 50.9

| Reaction partners | Solvent | Time, h | Temp, ° C. |
|---|---|---|---|
| 0.1 Mol Phe + 0.1 Mol Glu | 0.1 molar $KH_2PO_4$, pH 7.8 | 3 | 120 |
| | | 4 | |
| | | 5 | |
| | | 6 | |
| 0.1 Mol Phe + 0.1 Mol Glu | 0.1 molar $NH_3$/Water, pH 7.8 | 3 | 120 |
| | | 4 | |
| | | 5 | |
| 0.1 Mol Ala + 0.1 Mol Glu | 0.1 molar $KH_2PO_4$, pH 7.8 | 3 | 120 |
| | | 4 | |
| | | 5 | |
| 0.1 Mol Phe + 0.1 Mol Xyl | 0.1 molar $KH_2PO_4$, pH 7.8 | 3 | 120 |
| | | 4 | |
| | | 5 | |
| 0.1 Mol Phe + 0.1 Mol Xyl | 0.1 molar $NH_3$/Water, pH 7.8 | 3 | 120 |
| | | 4 | |
| | | 5 | |

Test Series with Dry Reaction Conditions

Another series of experiments was performed in 20 ml sealed Pyrex vials. The reaction partner (amino acid, carbohydrate source) were finely grinded and mixed, then transferred in the Pyrex vial. A small volume of water was added and the reaction initiated in a drying oven. After the planned reaction time, the vials were transferred into ice water. After cooling to room temperature, sensory analysis and analytical characterization was performed.

Concentrations of the reaction partners, the incubation time and temperature are given in Tables 50.10 to 50.11.

TABLE 50.10

| Reaction partners | Solvent | Time, h | Temp, ° C. |
|---|---|---|---|
| 0.1 mMol Phe + 0.1 mMol Glu | +0.3 ml water | 0.5 | 120 |
| 0.1 mMol Phe + 0.1 mMol Xyl | | 0.25 | |
| | | 0.3 | |

After the reactions, 10 ml 0.1 molar $KH_2PO_4$, pH 7.8 were added

TABLE 50.11

| Reaction partners | Solvent | Time, h | Temp, ° C. |
|---|---|---|---|
| 0.1 mMol Phe + 0.1 mMol Glu | +0.3 ml water | 0.5 | 120 |
| 0.1 mMol Phe + 0.1 mMol Xyl | | 0.3 | |
| 0.1 mMol Ala + 0.1 mMol Glu | | 0.3 | |
| 0.1 mMol Ala + 0.1 mMol Xyl | | 0.3 | |
| 0.1 mMol Ile + 0.1 mMol Glu | | 0.3 | |
| 0.1 mMol Ile + 0.1 mMol Xyl | | 0.3 | |
| 0.1 mMol Asp + 0.1 mMol Glu | | 0.3 | |
| 0.1 mMol Asp + 0.1 mMol Xyl | | 0.3 | |

After the reactions, 5 ml ethanol was added.

Example 51

Analytical Methods

The HPLC system consisted of an Agilent 1100 system (autosampler, ternary gradient pump, column thermostat, VWD-UV/VIS detector, DAD-UV/VIS detector) connected in-line to an Agilent mass spectrometer (EShMS quadrupole G1956A VL). For HPLC analysis the reacted samples were injected after filtration (2 μm syringe filters).

The samples were separated at 0.9 ml/min on a Phenomenex Synergi Hydro-RP (150×3 mm) at 35° C. by gradient elution. Mobile Phase A consisted of a 0.1% formic acid in water. Mobile Phase B consisted of 0.1 formic acid in acetonitrile. The gradient started with 2% B, was increased linearly in 5 minutes to 15% B and kept at this condition for another 15 minutes. Injection volume was set to 20 μl.

The detectors were set to 205 nm (VWD), to 254 and 380 nm (DAD with spectra collection between 200-600 nm) and to ESI positive mode TIC m/z 120-800, Fragmentor 1000, Gain 2 (MS, 300° C., nitrogen 12 l/min, nebulizer setting 50 psig. Capillary voltage 4500 V).

GC/MS Conditions

TABLE 51.1

| Analytical conditions 1 | |
|---|---|
| **Shimadzu GC-2010 Plus Gas Chromatograph** | |
| Column | Aglient Technologies DB-1701<br>30.0 m × 0.25 mm I.D., 0.25 μm |
| Column Oven Temperature | 45° C. (3 min) → 15° C./min → 250° C. (23.67 min) |
| GC Program Time | 23.67 min |
| Mobile Phase | He |
| Constant Pressure | 250.0 kPa |
| Transfer Line Temperature | 280° C. |
| **GCMS-QP2020 Mass Spectrometer** | |
| Measurement Mode | Full Scan (50-400 m/z) |
| Injection Head Space | 500 μL |
| Ion Source Temperature | 200° C. |
| **TriPlus RSH Autosampler** | |
| Injection Temperature | 250° C. |
| Injection Mode | Splitless |
| Sample Injection Volume | 1.0 μL |

TABLE 51.2

| Analytical Conditions 2 | |
|---|---|
| **Thermo Scientific Trace 1300 Gaschromatograph** | |
| Column | SGE Analytical Science DB-5 MS<br>30.0 m × 0.25 mm I.D., 0.25 μm |
| Column Temperature | 50° C. (3 min) → 15° C./min → 300° C. |
| Injection | Splitmode |
| Injection Temperature | 280° C. |
| Carrier Flow | 1.500 mL/min |
| Split Flow | 45.0 mL/min |
| Split ratio | 30 |
| Transfer Line Temperature | 280° C. |
| **Thermo Scientific DSQ-II GC/MS** | |
| Scan Mode | Full Scan (50-500 m/z) |
| Ion Source Temperature | 210° C. |
| **AS 3000 Autosampler** | |
| Sample Injection Volume | 1.0 μL |

Example 52

Sensory Evaluation of the Samples Prepared in Example 50

TABLE 52.1

| | Smell | Color | Taste |
|---|---|---|---|
| — (solvent only) | neutral | No color | No taste |
| 167 mMol Glu | caramel | Slightly Yellow | Sweet |
| 167 mMol Xyl | neutral/meat | No color | Sweet |
| Phe 60 mMol | flowery/bloomy-caramel | Slightly Yellow | Sweet |
| Phe 60 mMol + 167 mMol Glu | flowery/bloomy-caramel | Slightly Yellow | Sweet |
| Phe 60 mMol + 167 mMol Xyl | flowery/bloomy | Slightly Yellow | Sweet |

TABLE 52.2

| Reaction partners | Smell | Color | Taste |
|---|---|---|---|
| — (solvent only) | neutral | no color | sweet |
| 0.05 mMol Reb-A | neutral/unpleasant | Slightly Yellow | sweet |
| 0.05 mMol Reb-B + 0.05 mMol Glu | non-pleasant (Plastics) | Slightly Yellow | sweet |
| 0.05 mMol Reb-B + 0.05 mMol Gluc acid | neutral | Slightly Yellow | sweet |
| 0.05 mMol Reb-B + 0.05 mMol GlucLac | neutral | Slightly Yellow | sweet |
| 0.1 mMol Phe | flowery/bloomy, caramel | Slightly Yellow | sweet |
| 0.1 mMol Phe + 0.1 mMol Glu | flowery/bloomy | Slightly Yellow | sweet |
| 0.1 mMol Phe + 0.1 mMol Reb-A | honey | Slightly Yellow | sweet |
| 0.05 mMol Phe + 0.05 mMol Reb-B + 0.05 mMol Glu | non-pleasant (plastics) | Slightly Yellow | sweet |
| 0.1 mMol Phe + 0.1 mMol GlucLac | flowery/bloomy | Slightly Yellow | sweet |

TABLE 52.2-continued

| Reaction partners | Smell | Color | Taste |
|---|---|---|---|
| 0.05 mMol + 0.05 mMol Reb-B + 0.05 mMol GlucLac | flowery/bloomy | Slightly Yellow | sweet |
| 0.1 mMol Phe + 0.1 mMol Gluc Acid | honey | Yellow | sweet |
| 0.05 mMol Phe + 0.05 mMol Reb-B + 0.05 mMol Gluc Acid | caramel | Yellow | sweet |
| 0.1 mMol Ala | Agar | No Color | sweet |
| 0.1 mMol Alanin + 0.1 mMol Glu | Coffee | No Color | sweet |
| 0.1 mMol Alanin + 0.1 mMol Reb-A | Agar | No Color | sweet |
| 0.05 mMol Ala + 0.05 mMol Reb-B + 0.05 mMol Glu | non-pleasant (plastics) | Slightly Yellow | sweet |

TABLE 52.3

| Reaction partners | Smell | Color | Taste |
|---|---|---|---|
| — (solvent only) | neutral | no color | sweet |
| 0.1 mMol Lys | Popcorn | Brown | Sweet |
| 0.1 mMol Glu | caramel | Slightly Yellow | Sweet |
| 0.1 mMol Lys + 0.1 mMol Glu | Caramel | Brown | Sweet |
| 0.1 mMol Lys + 0.1 mMol Reb-A | Popcorn/Chips | Brown | Sweet |
| 0.05 mMol Lys + 0.05 mMol Reb-B + 0.05 mMol Glu | Popcorn | Brown | Sweet |

TABLE 52.4

| Reaction partners | Smell | Color | Taste |
|---|---|---|---|
| 0.1 mMol Phe + 0.1 mMol GlucLac | burnt bread (+++) | Almost black | Bitter |
| 0.1 mMol Phe + 0.1 mMol Gluc Acid | burnt bread (+++) | Almost black | Bitter |
| 0.1 mMol Phe + 0.1 mMol Glu | Popcorn/burnt bread (++) | Brown | Sweet |

(+), (++), (+++) . . . Intensity of Smell

TABLE 52.5

| Reaction partners | Smell | Color | Taste |
|---|---|---|---|
| — (solvent only) | neutral | Slightly yellow | sweet |
| 0.1 mMol Phe | Caramel, burnt (+) | Slightly Yellow | sweet |
| 0.1 mMol Glu | Burnt sugar (+) | Brown | Sweet/ bitter |
| 0.1 mMol GlucLac | Burnt sugar (+++) | Almost black | Bitter |
| 0.1 mMol Gluc Acid | burnt bread (+++) | Almost black | Bitter |
| 0.1 mMol Phe + 0.1 mMol GlucLac | burnt bread (+++) | Almost black | Bitter |
| 0.1 mMol Phe + 0.1 mMol Gluc Acid | burnt bread (+++) | Almost black | Bitter |
| 0.1 mMol Phe + 0.1 mMol Glu | Popcorn/burnt bread (++) | Brown | Sweet |

(+), (++), (+++) . . . Intensity of Smell

TABLE 52.6

| Reaction partners | Smell | Color | Taste |
|---|---|---|---|
| — (solvent only) | Neutral | Slightly Yellow | |
| 10 mMol Glu | Slightly Caramel | Slightly Yellow | |
| 10 mmol Xyl | Slightly Popcorn | Slightly Yellow | |
| 3.3 mMol Phe | Slightly bloomy | No color | — |
| | flowery/bloomy | No color | — |
| | flowery/bloomy | Slightly Yellow | — |
| | flowery/bloomy | Yellow-slightly brown | — |
| 3.3 mMol Phe + | neutral | No color | — |
| 10 mMol Glu | flowery/bloomy | No color | — |
| | flowery/bloomy | Yellow | — |

TABLE 52.6-continued

| Reaction partners | Smell | Color | Taste |
|---|---|---|---|
| | flowery/bloomy | Yellow-slightly brown | — |
| 3.3 mMol Phe + | neutral | No color | — |
| 10 mmol Xyl | Present, uninterpretable | Slightly yellow | — |
| | Present, uninterpretable | Slightly Yellow | — |
| | flowery/bloomy | Yellow-slightly brown | — |

TABLE 52.7

| Reaction partners | Smell | Color | Taste |
|---|---|---|---|
| — (solvent only) | | | |
| 10 mMol Glu | Slightly Caramel | No color | — |
| 10 mMol Xyl | neutral | No color | — |
| 3.3 mMol Phe | flowery/bloomy | Brown | — |
| 3.3 mMol Phe + 10 mMol Glu | flowery/bloomy | Brown | — |
| 3.3 mMol Phe + 10 mMol Xyl | Nutmeg | Brown | — |

TABLE 52.8

| Reaction partners | Solvent | Time, h | Temp, ° C. |
|---|---|---|---|
| 0.1 Mol Phe + 0.1 Mol Glu | 0.1 molar $KH_2PO_4$, pH 7.8 | 3 | 120 |
| | | 4 | |
| | | 5 | |
| | | 6 | |
| 0.1 Mol Phe + 0.1 Mol Glu | 0.1 molar $NH_3$/ Water, pH 7.8 | 3 | |
| | | 4 | |
| | | 5 | |
| 0.1 Mol Ala + 0.1 Mol Glu | 0.1 molar $KH_2PO_4$, pH 7.8 | 3 | |
| | | 4 | |
| | | 5 | |
| 0.1 Mol Phe + 0.1 Mol Xyl | 0.1 molar $KH_2PO_4$, pH 7.8 | 3 | |
| | | 4 | |
| | | 5 | |
| 0.1 Mol Phe + 0.1 Mol Xyl | 0.1 molar $NH_3$/ Water, pH 7.8 | 3 | |
| | | 4 | |
| | | 5 | |

TABLE 52.9

| Reaction partners | Smell | Color | Taste |
|---|---|---|---|
| 0.1 Mol Phe + 0.1 Mol Glu | caramel | Yellowish-brown | Slightly bitter |
| | caramel | Dark brown | Slightly bitter |
| | caramel | Dark brown | Slightly bitter |
| | caramel | Dark brown | Slightly bitter |

TABLE 52.9-continued

| Reaction partners | Smell | Color | Taste |
|---|---|---|---|
| 0.1 Mol Phe + 0.1 Mol Glu | caramel | Slightly yellow | Slightly bitter |
| | caramel | Slightly yellow | Slightly bitter |
| | caramel | Yellow-slightly brown | Slightly bitter |
| 0.1 Mol Ala + 0.1 Mol Glu | caramel, Cotton candy | Brown | Slightly bitter |
| | caramel | Brown | Slightly bitter |
| | caramel | Dark brown | Slightly bitter |
| 0.1 Mol Phe + 0.1 Mol Xyl | caramel, Cotton candy | Dark brown | Strong bitterness |
| | caramel, Cotton candy | Dark brown | Strong bitterness |
| | caramel, burnt | Dark brown | Bitter |
| 0.1 Mol Phe + 0.1 Mol Xyl | caramel | yellow | Bitter |
| | caramel | slightly brown | Bitter |
| | caramel | Brown | Bitter |

TABLE 52.10

| Reaction partners | Solvent | Time, h | Temp, ° C. |
|---|---|---|---|
| 10 mMol Phe + 3.3 mMol Glu | Water | 3 | 120 |
| 10 mMol Phe + 3.3 mMol Glu | Water, pH 5.2 (HCl) | | |
| 10 mMol Phe + 3.3 mMol Glu | 6 molar HCl | | |
| 10 mMol Phe + 3.3 mMol Glu | 0.1 molar $KH_2PO_4$, pH 7.8 | | |

TABLE 52.11

| Reaction partners | Smell | Color | Taste |
|---|---|---|---|
| 10 mMol Phe + 3.3 mMol Glu | Nutty oil, flowery/bloomy | Slightly yellow | Slightly bitter |
| 10 mMol Phe + 3.3 mMol Glu | Nutty oil, flowery/bloomy | Slightly yellow | Slightly bitter |
| 10 mMol Phe + 3.3 mMol Glu | flowery/bloomy | Brown | — |
| 10 mMol Phe + 3.3 mMol Glu | flowery/bloomy | Yellow | Bitter |

TABLE 52.12

| Reaction partners | Solvent | Time, h | Temp, ° C. |
|---|---|---|---|
| 0.1 mMol Phe + 0.1 mMol Glu | +0.3 ml water | 0.5 | 120 |
| 0.1 mMol Phe + 0.1 mMol Xyl | | 0.25 | |
| | | 0.3 | |

TABLE 52.13

| Reaction partners | Smell | Color | Taste |
|---|---|---|---|
| 0.1 mMol Phe + 0.1 mMol Glu | flowery/bloomy | Yellow | Slightly bitter |
| 0.1 mMol Phe + 0.1 mMol Xyl | flowery/bloomy (rose) | Yellow | Slightly Sweet |
| | flowery/bloomy (rose) | Yellow | Almost Neutral |

TABLE 52.14

| Reaction partners | Solvent | Time, h | Temp, ° C. |
|---|---|---|---|
| 0.1 mMol Phe + 0.1 mMol Glu | +0.3 ml water | 0.5 | 120 |
| 0.1 mMol Phe + 0.1 mMol Xyl | | 0.3 | |
| 0.1 mMol Ala + 0.1 mMol Glu | | 0.3 | |
| 0.1 mMol Ala + 0.1 mMol Xyl | | 0.3 | |
| 0.1 mMol Ile + 0.1 mMol Glu | | 0.3 | |
| 0.1 mMol Ile + 0.1 mMol Xyl | | 0.3 | |
| 0.1 mMol Asp + 0.1 mMol Glu | | 0.3 | |
| 0.1 mMol Asp + 0.1 mMol Xyl | | 0.3 | |

TABLE 52.15

| Reaction partners | Smell | Color | Taste |
|---|---|---|---|
| 0.1 mMol Phe + 0.1 mMol Glu | flowery/bloomy | Yellow | — |
| 0.1 mMol Phe + 0.1 mMol Xyl | flowery/bloomy (rose) | brown | — |
| 0.1 mMol Ala + 0.1 mMol Glu | caramel | No color | — |
| 0.1 mMol Ala + 0.1 mMol Xyl | flowery/bloomy | Yellowish-brown | — |
| 0.1 mMol Ile + 0.1 mMol Glu | neutral | No color | — |
| 0.1 mMol Ile + 0.1 mMol Xyl | neutral | Yellow | — |
| 0.1 mMol Asp + 0.1 mMol Glu | flowery/bloomy | Yellow | — |
| 0.1 mMol Asp + 0.1 mMol Xyl | flowery/bloomy | Yellowish-brown | — |

For evaluation of the taste profile, the samples were tested by a panel of four people. 1 trained taster tasted independently the samples first. The taster was asked to describe the taste profile and score 0-5 according to the increasing sugar likeness, bitterness, aftertaste and lingering taste profiles. The first taster was allowed to re-taste, and then make notes for the sensory attributes perceived. Afterwards, another 3 tasters tasted and the attributes were noted and discussed openly to find a suitable description. In case that more than 1 taster disagreed with the results, the tasting was repeated. In some sensory test results (above), the taste rating was expressed by "+", which means the intensity of the factors is shown by three levels. "+" for slight, "++" for moderate and "+++" for very strong.

Example 53

Analytical Investigations

Chemical Considerations

As seen in following reaction scheme, the first reaction step between the reducing sugar and the amino group is a condensation reaction yielding a product which is usually denoted as MRI (Maillard Reaction Intermediate) or after further reaction steps) Amadori Product, both, MRI and Amadori Products share the same molar mass.

Reaction Scheme 1, Example of early Maillard reaction between xylose and phenylalanine

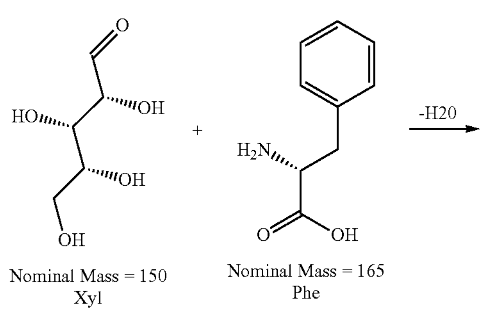

-continued

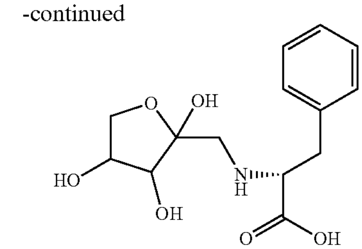

Nominal Mass = 297
early MRI
(various tautomeric forms)

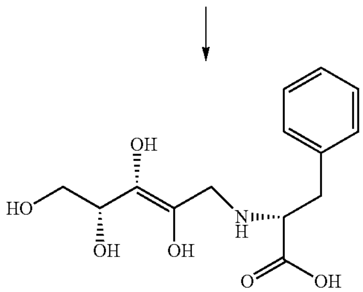

Nominal Mass = 297
late MRI

The molar mass of any MRI can be calculated as molar mass of the sugar plus the molar mass of the amino acid minus 18. The following table provides the molar ions (m/z=[M+H]+) of different MRIs which are of relevance for the Maillard reactions performed.

Basic calculation: MRI [M+H]+=mr amino acid+mr carbohydrate−mr H2O+H+

TABLE 53.1

MRI (Amadori) products formed during the first stage of Maillard reactions

| Amino Acid | Carbohydrate | MRI (Amadori) m/z $[M + H]^+$ |
|---|---|---|
| Phe | Glu | 328 |
| Phe | Xyl | 298 |
| Lys | Glu | 309 |
| Lys | Xyl | 279 |
| Ala | Glu | 252 |
| Ala | Xyl | 222 |
| Ile | Glu | 294 |
| Ile | Xyl | 264 |
| Asp | Glu | 296 |
| Asp | Xyl | 266 |

HPLC/DAD/MS

The following example chromatograms show the formation of Maillard Reaction Products (MRI) for different combinations of amino acids and carbohydrates. Formation of MRIs is considered as a proof for the initiation of the Maillard Reaction. FIGS. 7 through 12 demonstrate the formation of MRIs.

Figure 19:
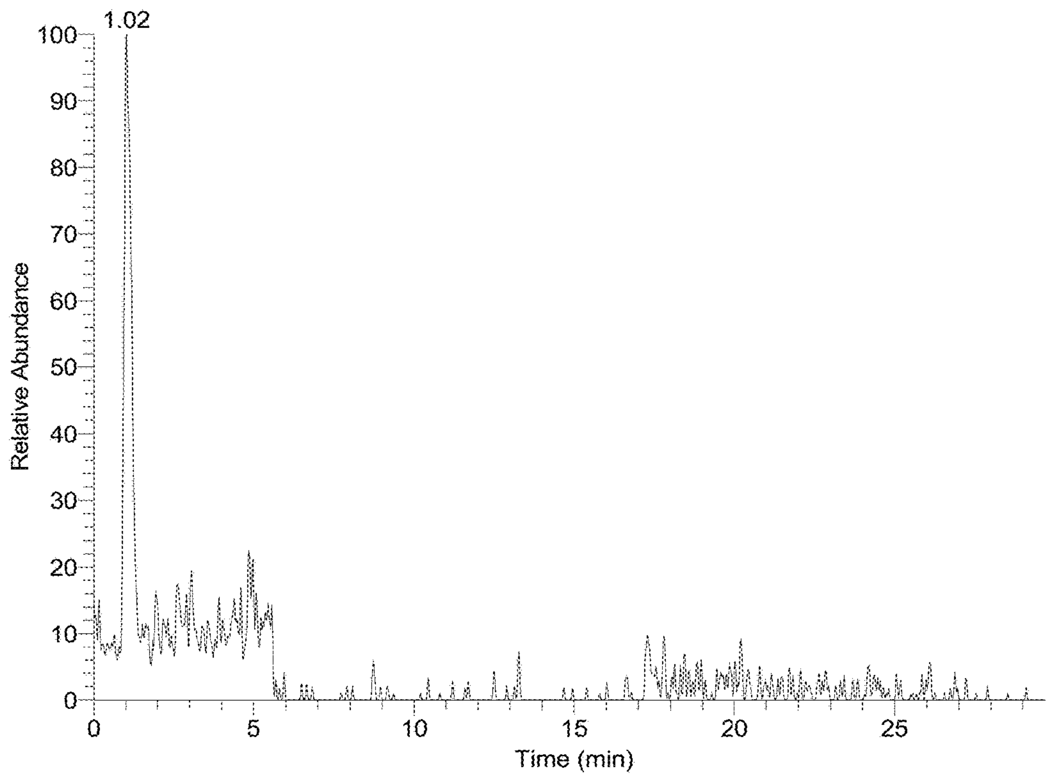
FIG. 19 depicts an MS-Chromatogram 1, MRP (SIM m/z=309) observed after reaction of 0.1 mMol Lys+0.1 mMol Gluc in 10 ml glycerin/water=9/1 at 100° C. for 40 minutes.

FIG. 19 is an MS-Chromatogram 1, MRP (SIM m/z=309) observed after reaction of 0.1 mMol Lys+0.1 mMol Gluc in 10 ml glycerin/water=9/1 at 100° C. for 40 minutes.

Figure 20:
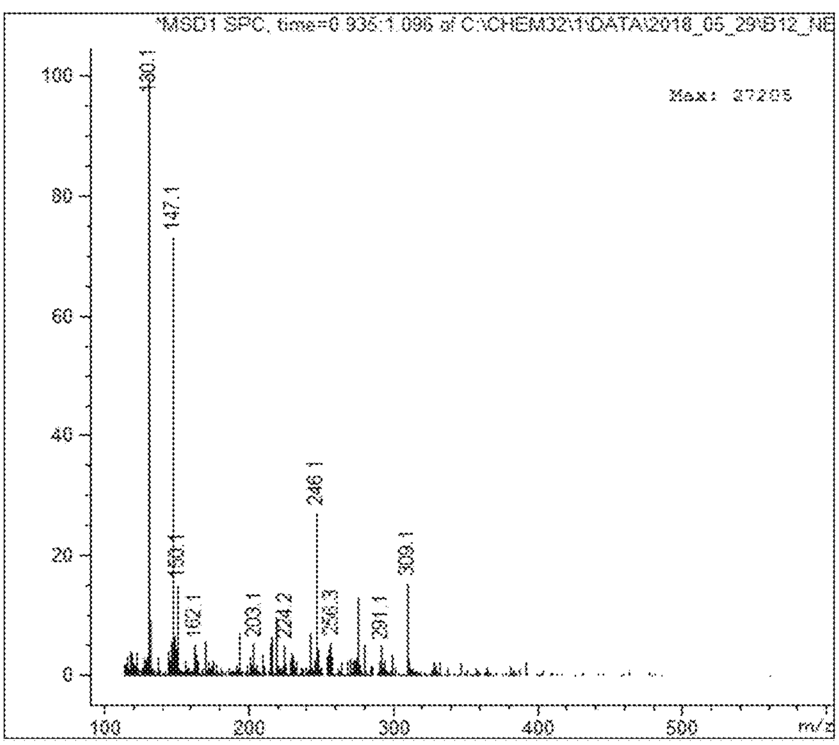
FIG. 20 depicts an MS-spectrum related to FIG. 19.

FIG. 20 is an MS-spectrum related to FIG. 7.

Figure 21:
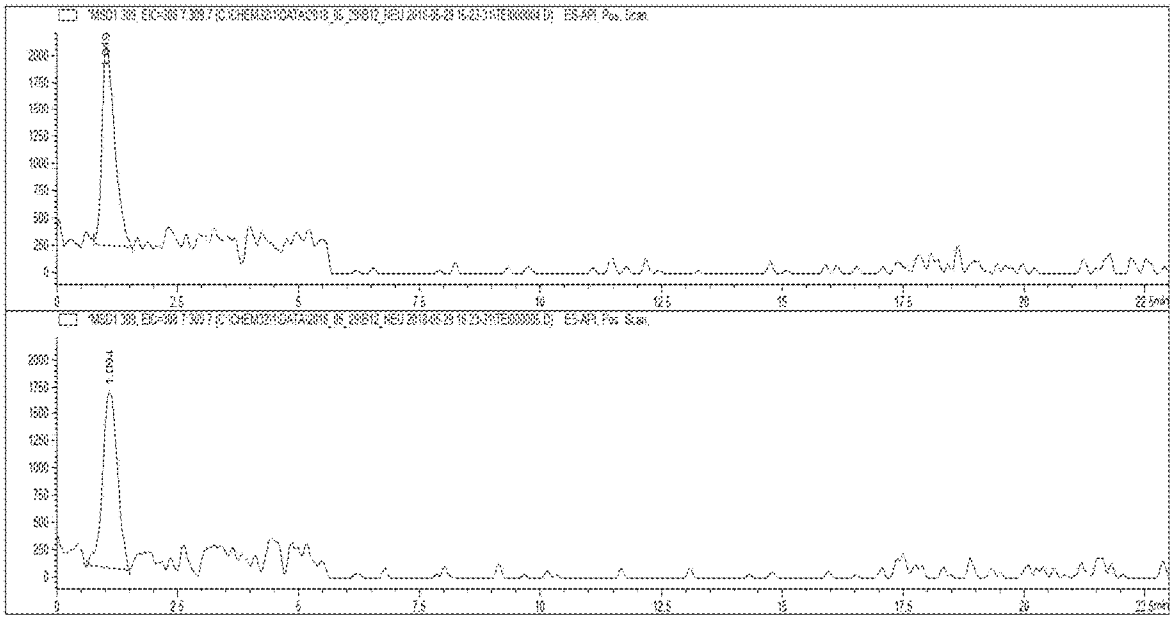
FIG. 21 depicts an MS-Chromatogram 2, MRI (SIM m/z=309) observed after reaction of 0.1 mMol Lys+0.1 mMol Reb-A (upper lane) or 0.05 mMol Reb-B/Glu (lower lane) in 10 ml glycerin/water=9/1 at 100° C. for 40 minutes.

FIG. 21 is an MS-Chromatogram 2, MRI (SIM m/z=309) observed after reaction of 0.1 mMol Lys+0.1 mMol Reb-A (upper lane) or 0.05 mMol Reb-B/Glu (lower lane) in 10 ml glycerin/water=9/1 at 100° C. for 40 minutes.

Figure 22:
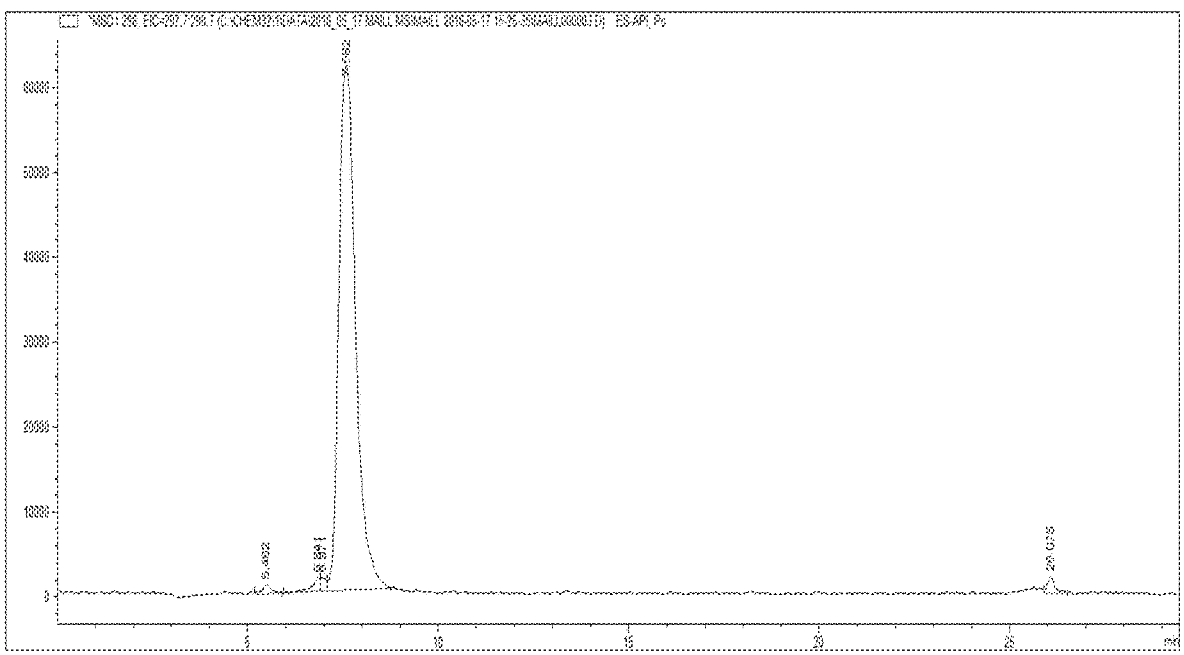
FIG. 22 depicts an MS-Chromatogram 3, MRI (SIM m/z=298 observed after reaction of 3.3 mMol Phe+10 mMol Xyl in 10 ml glycerin/water=9/1 at 100° C. for 20 minutes.

FIG. 22 is an MS-Chromatogram 3, MRI (SIM m/z=298 observed after reaction of 3.3 mMol Phe+10 mMol Xyl in 10 ml glycerin/water=9/1 at 100° C. for 20 minutes.

Figure 23:
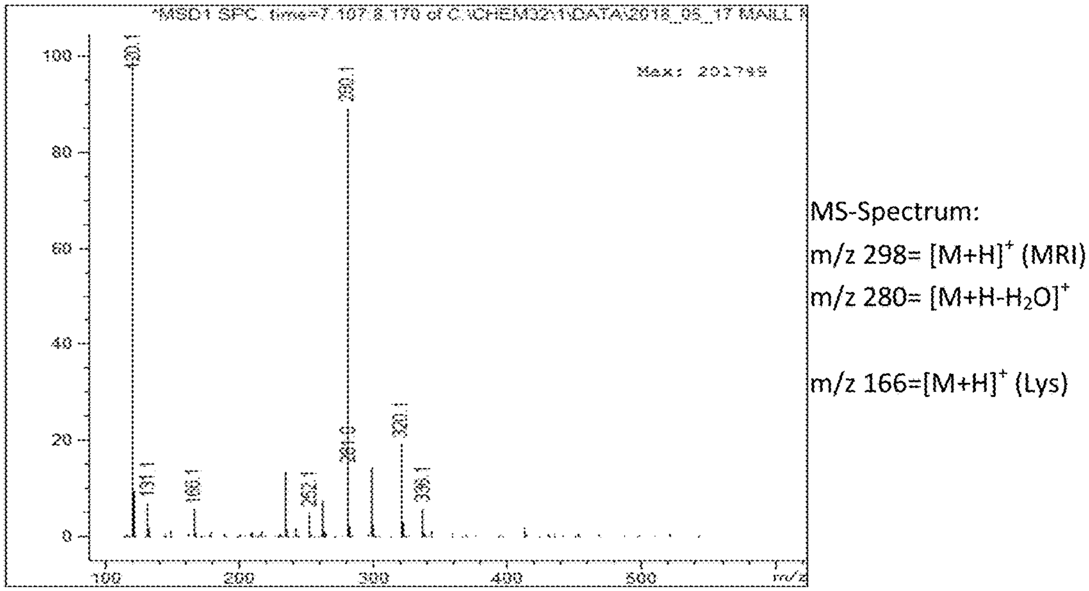
FIG. 23 depicts an MS-Spectrum related to FIG. 22.

FIG. 23 is an MS-Spectrum related to FIG. 10.

Figure 24:
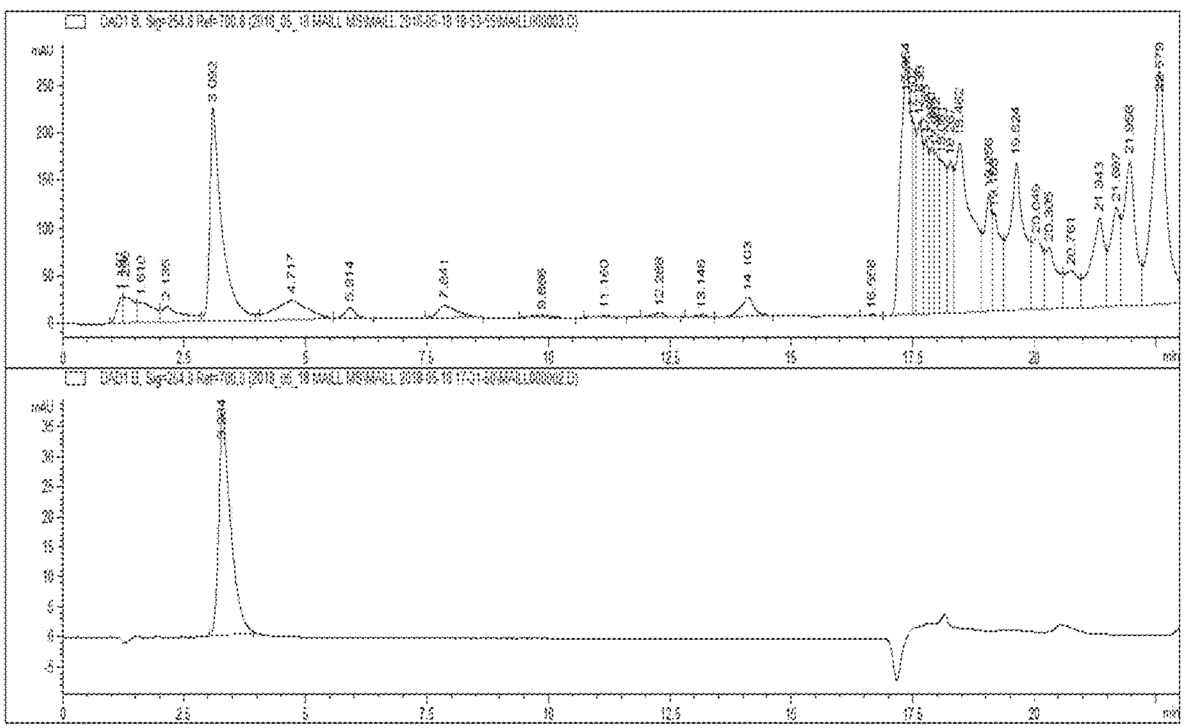
FIG. 24 depicts a UV-Chromatogram, 254 nm observed after reaction of 3.3 mMol Phe+10 mMol Xyl in 10 ml glycerin/water=9/1 at 100° C. for 20 minutes.

FIG. 24 is a UV-Chromatogram, 254 nm observed after reaction of 3.3 mMol Phe+10 mMol Xyl in 10 ml glycerin/water=9/1. at 100° C. for 20 minutes (upper lane), lower lane Phe Standard.

Upper Lane, Peak at 4.77 min refers to MRI formed, at 14.5 min. the peak is related to Phe and has a corresponding UV/VIS spectrum and a m/z=244, explained as MRI-3 $H_2O$ (sugar dehydration)

Main findings: In all combinations tested, the early MRI (Amadori) products were identified by LC/MS (Table 5). Based on LTV-detection the degradation of the free amino acid and appearance of the MRIs can be followed and quantified.

TABLE 53.2

MRI (Amadori) products detected during the experiments

| Amino Acid | Carbohydrate | Detected in Experiments |
|---|---|---|
| Phe | Glu | Yes |
| Phe | Xyl | Yes |
| Lys | Glu | Yes |
| Lys | Xyl | Yes |
| Ala | Glu | Yes |
| Ala | Xyl | Yes |
| Ile | Glu | Yes |
| Ile | Xyl | Yes |
| Asp | Glu | Yes |
| Asp | Xyl | Yes |

Example 54

Analysis of Reaction Products

GC/MS

Figure 25:
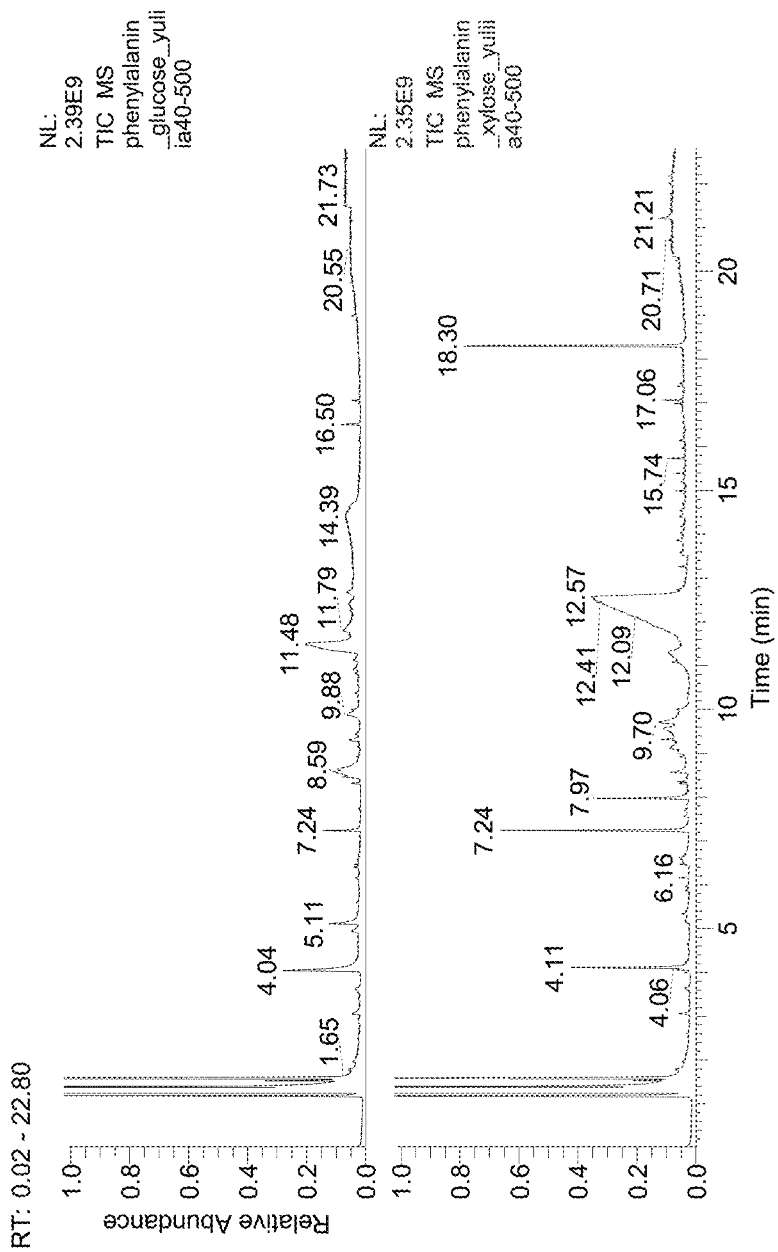
FIG. 25 depicts a MS-Chromatogram (direct injection) obtained for reaction of 3.3 mMol Phe+10 mMol Glu (upper lane) or Xyl (lower lane) in 10 ml glycerin/water=9/1 at 100° C. for 20 minutes.

FIG. 25 is a MS-Chromatogram (direct injection) obtained for reaction of 3.3 mMol Phe+10 mMol Eau (upper lane) or Xyl (lower lane) in 10 ml glycerin/water=9/1 at 100° C. for 20 minutes.

Identified flavor compounds (lower lane) of FIG. 9 show Rt 4.11 min: Furfural, Rt 7.24 min: Benzeneacetaldehyde, Rt 7.97 min: Furan, Rt 12.57 min: Xylose, Rt 18.30 min: unknown The region from about 8.59 minutes to 14.39 minutes is a region where sugar degradation products occur (acetol, glyoxal, glyceraldehyde, etc.)

Main findings: Flavor compounds are formed during the reaction, the conditions applied are yielding $2^{nd}$ stage Maillard reaction products (sugar degradation).

Figure 26:
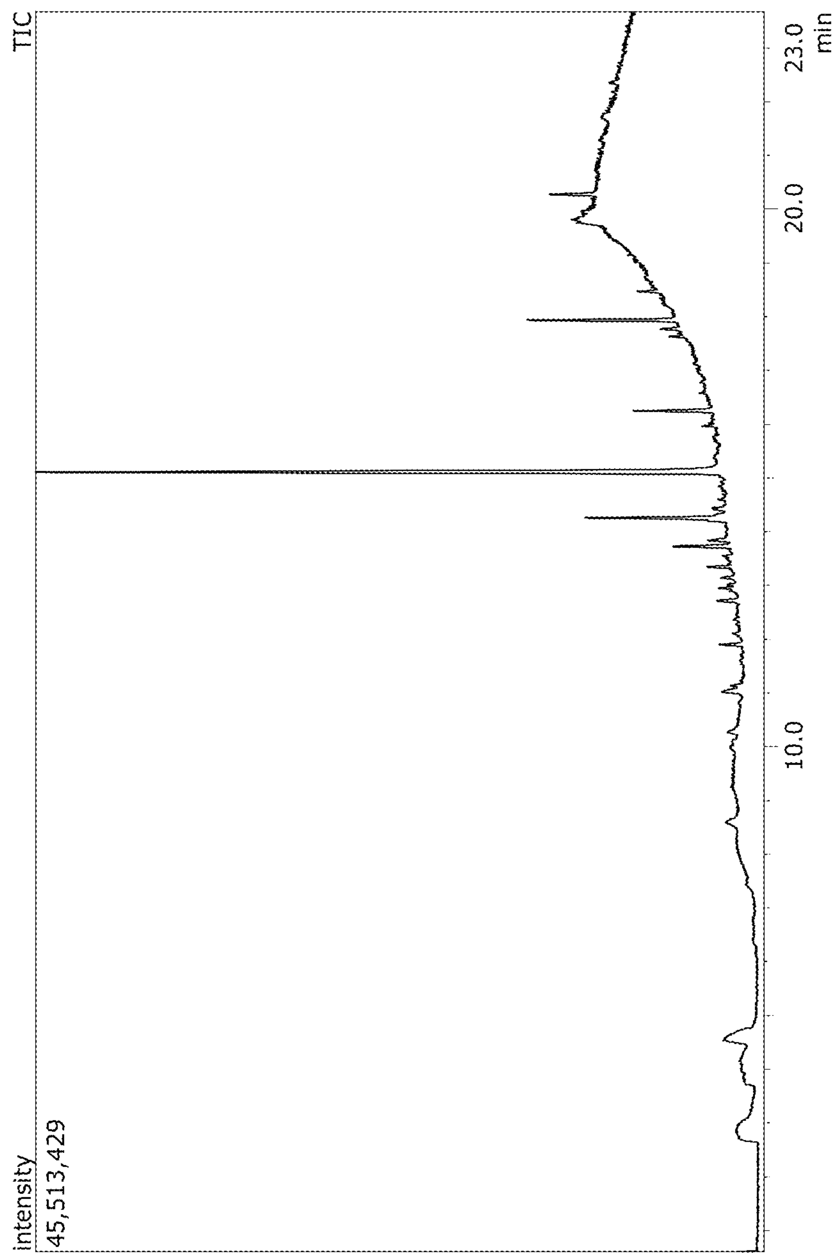
FIG. 26 depicts an MS-Chromatogram (head-space injection) obtained for reaction 0.1 mMol Phe+0.1 mMol Reb-A in 10 ml glycerin/water=9/1 at 100° C. for 40 minutes.

FIG. 26 depicts an MS-Chromatogram (head-space injection) obtained for reaction 0.1 mMol Phe+0.1 mMol Reb-A in 10 ml glycerin/water=9/1 at 100° C. for 40 minutes.

10 peaks found, structure proposal from 1 to 10 (major peaks) include N-Nitrosodimethylamine, none, 3-Hexen-1-ol acetate, none, Benzaldehyde, Benzoic acid methyl ester. Benzeneacetaldehyde, Cinnamaldehyde, 1,4-Butylene glycol dimethacrylate, none.

Figure 27:
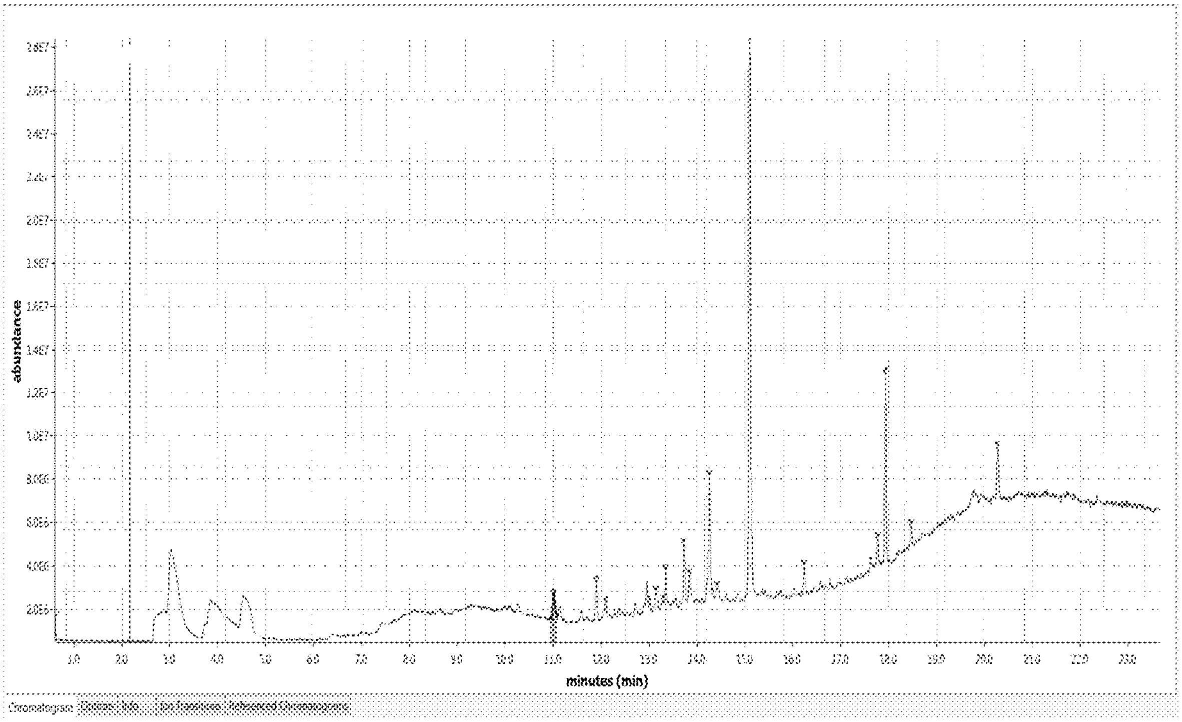
FIG. 27 depicts an MS-Chromatogram (head-space injection) obtained for reaction 0.1 mMol Phe+0.05 mMol Reb-B/0.05 mMol Glu in 10 ml glycerin/water=9/1 at 100° C. for 40 minutes.

FIG. 27 is an MS-Chromatogram (head-space injection) obtained for reaction 0.1 mMol Phe+0.05 mMol Reb-B/0.05 mMol Glu in 10 ml glycerin/water=9/1 at 100° C. for 40 minutes.

10 peaks found, structure proposal from 1 to 10 (bold the major peaks)

N-Nitrosodimethylamine, none, 3-Hexen-1-ol acetate, none, Benzaldehyde, Benzoic acid methyl ester, Benzeneacetaldehyde, Cinnamaldehyde, 1, 4-Butylene glycol dimethacrylate, none.

Main findings: Reb-A and Reb-B/Glu (equimolar ratio) yield under the same conditions the same reaction products.

Example 55

Combined Sensory and Analytical Investigations (Steviol-Glycosides)

Example Phe-Reb A (Glue, Xyl, Sue)

TABLE 55.1

| Test Conditions | | | |
|---|---|---|---|
| Reaction partners | Solvent | Time, h | Temp, ° C. |
| 16.5 mg Phe + 18 mg Glu | 10 ml $KH_2PO_4$ Buffer, | 1.0 | 120 |
| 16.5 mg Phe + 96.5 Reb-A | pH 5.5 | | |
| 16.5 mg Phe + 15 mg Xyl | | | |
| 16.5 mg Phe + 34.2 mg Sacch | | | |
| 16.5 mg Phe + 18 mg Glu | 10 ml $KH_2PO_4$ Buffer, | | |
| 16.5 mg Phe + 96.5 Reb-A | pH 7.0 | | |
| 16.5 mg Phe + 15 mg Xyl | | | |
| 16.5 mg Phe + 34.2 mg Sacch | | | |
| 16.5 mg Phe + 18 mg Glu | 10 ml $KH_2PO_4$ Buffer, | | |
| 16.5 mg Phe + 96.5 Reb-A | pH 8.5 | | |
| 16.5 mg Phe + 15 mg Xyl | | | |
| 16.5 mg Phe + 34.2 mg Sacch | | | |

TABLE 55.2

| Sensory evaluation | | | |
|---|---|---|---|
| Reaction partners | Smell | Color | Taste |
| 16.5 mg Phe + 18 mg Glu | Cotton Candy | Slightly Yellow | Neutral-salty[1)] |
| 16.5 mg Phe + 96.5 Reb-A | Unpleasant (Agar) | Slightly Yellow | Sweet, slightly bitter |
| 16.5 mg Phe + 15 mg Xyl | Unpleasant (Agar) | Slightly Yellow | Neutral-salty[1)] |
| 16.5 mg Phe + 34.2 mg Suc | Cotton Candy | Very Slightly Yellow | Neutral-salty[1)] |
| 16.5 mg Phe + 18 mg Glu | Honey, bloomy | Slightly Yellow | Slightly bloomy sweet |
| 16.5 mg Phe + 96.5 Reb-A | Honey | Slightly Yellow | Sweet, slightly bitter- |
| 16.5 mg Phe + 15 mg Xyl | bloomy, pleasant | Yellow | Neutral-salty[1)] |
| 16.5 mg Phe + 34.2 mg Suc | Unpleasant (Agar) | Very Slightly Yellow | Neutral-salty[1)] |
| 16.5 mg Phe + 18 mg Glu | Honey, bloomy | Slightly Yellow | Slightly bloomy sweet |
| 16.5 mg Phe + 96.5 Reb-A | Bloomy | Slightly Yellow | Sweet, slightly bitter |
| 16.5 mg Phe + 15 mg Xyl | Honey | Yellow | Slightly bloomy sweet |
| 16.5 mg Phe + 34.2 mg Suc | Unpleasant (Agar) | Very Slightly Yellow | Neutral-salty[1)] |

[1)]salty due to buffer 1st four results for PH = 5.5; 2ND four results for PH = 7.0; last four results for PH = 8.5
The taste test was performed as in Example 36.

Analytical Investigations

All samples were analyzed by HPLC/MS using following conditions.

The samples were separated at 0.9 ml/min on a Phenomenex Synergi Hydro-RP (150×3 mm) at 35° C. The mobile phase consisted of (A) 0.1% HCOOH (v/v) and (B) AcCN. A gradient of 5% (B) to 15% (B) was applied between 0 min to 15 min. Between 15 and 20 min (B) was increased to 45% which was kept for 5 min. Detection consisted of UV/VIS-DAD (205 nm, 254 nm, 450 nm) coupled to ESI-MS (pos mode, 300° C., TIC from m/z 120-1200, fragmentor 100).

Quantitative evaluation was performed using external standardization.

General Chemistry

As seen in following reaction scheme, the first reaction step between the reducing sugar and the amino group is a condensation reaction yielding a product which is usually denoted as MRI (Maillard Reaction Intermediate) or (after further reaction steps) Amadori Product. Both, MRI and Amadori Products share the same molar mass.

Reaction Scheme 1, Example of early Maillard reaction between xylose and phenylalanine

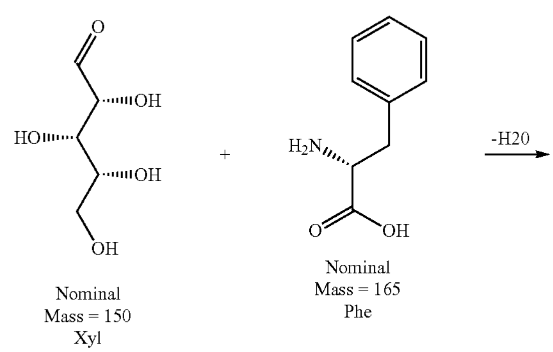

-continued

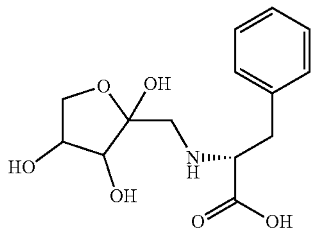

Nominal
Mass = 297
early MRI
(Various tautomeric
forms)

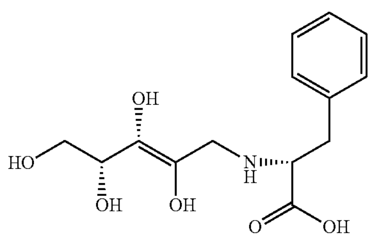

Nominal
Mass = 297
late MRI

Reaction Scheme 2, General formation of Amadori products

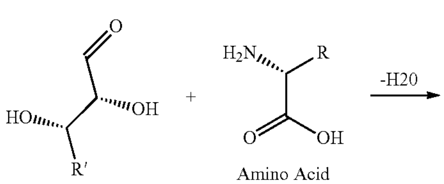

Sugar

Amino Acid

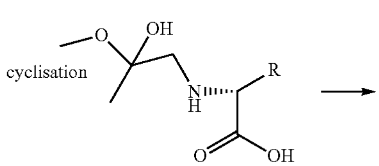

"early MRI"
(various tautomeric forms)

-continued

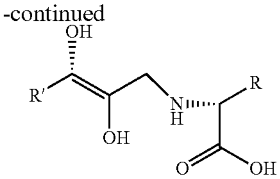

"Amadori (Rearrangement Product)"
Nominal Mass = mr sugar + mr amino acid - H2O

The molar mass of any MRI can be calculated as molar mass of the sugar plus the molar mass of the amino acid minus 18. The following table provides the molar ions (m/z=$[M+H]^+$) of different MRIs which are of relevance for the Maillard reactions performed, Basic calculation: MRI [M+H]+=mr amino acid+mr carbohydrate−mr $H_2O+H^-$.

TABLE 55.3

MRI (Amadori) products formed during the first stage of Maillard reactions

| Amino Acid | Carbohydrate | MRI (Amadori) m/z $[M + H]^+$ |
|---|---|---|
| Phe | Glu | 328 |
| Phe | Xyl | 298 |
| Phe | Suc | 528[1)] |
| Phe | Reb-A | 1146 |

[1)] Not existent in theory

The MRI of Phe/Glu and Phe/Xyl have already been detected and are shown before.

Kinetics of Reaction in dependence of pH-conditions

The following Tables show the reaction kinetics under the conditions chosen.

TABLE 55.4

Degradation of Phe and Reb-A at various pH-conditions

| | % degradation | | % formation | | |
|---|---|---|---|---|---|
| | Phe | Reb-A | Reb-B[1)] | MRI (Phe-Gluc)[2)] | MRI (Phe-Reb-A)[3)] |
| pH = 5.5 | 1.97 | 8.25 | 23.1 | 34.1 | 10.4 |
| pH = 7.0 | 9.07 | 10.1 | 22.7 | 25.9 | 11.3 |
| pH = 8.5 | 12.8 | 12.6 | 19.1 | 16.8 | 14.7 |

[1)] % formation from degraded Reb-A
[2)] % formation from degraded Phe
[3)] % formation from degraded Phe, all possible isomers included

TABLE 55.5

Degradation of Phe and Gluc at various pH-conditions

| | % degradation | | % formation |
|---|---|---|---|
| | Phe | Glu | MRI (Phe-Gluc)[1)] |
| pH = 5.5 | 2.26 | 3.65 | 31.8 |
| pH = 7.0 | 2.18 | 4.6 | 29.1 |
| pH = 8.5 | 4.24 | 7.62 | 22.6 |

[1)] % formation from degraded Phe

TABLE 55.6

| Degradation of Phe and Xyl at various pH-conditions | | | |
|---|---|---|---|
| | % degradation | | % formation |
| | Phe | Xyl | MRI (Phe-Xyl)[1)] |
| pH = 5.5 | 4.24 | 4.59 | 42.0 |
| pH = 7.0 | 4.80 | 6.3 | 37.9 |
| pH = 8.5 | 9.89 | 9.47 | 29.4 |

[1)]% formation from degraded Phe

TABLE 55.7

| Degradation of Phe and Suc at various pH-conditions | | | | | |
|---|---|---|---|---|---|
| | | | % formation | | |
| | % degradation | | MRI | MRI | MRI |
| | Phe | Suc | (Phe-Suc)[1)] | (Phe-Glu)[1)] | (Phe-Fru)[1)] |
| pH = 5.5 | 5.50 | 3.67 | n.d. | <0.10 | <0.10 |
| pH = 7.0 | 5.19 | 5.69 | n.d. | 0.54 | 0.99 |
| pH = 8.5 | 5.36 | 9.81 | n.d. | 0.84 | 1.76 |

[1)]% formation from degraded Phe n.d. . . . not detected

Confirmation of Phe/Reb-A Maillard Reaction Product

Figure 28:
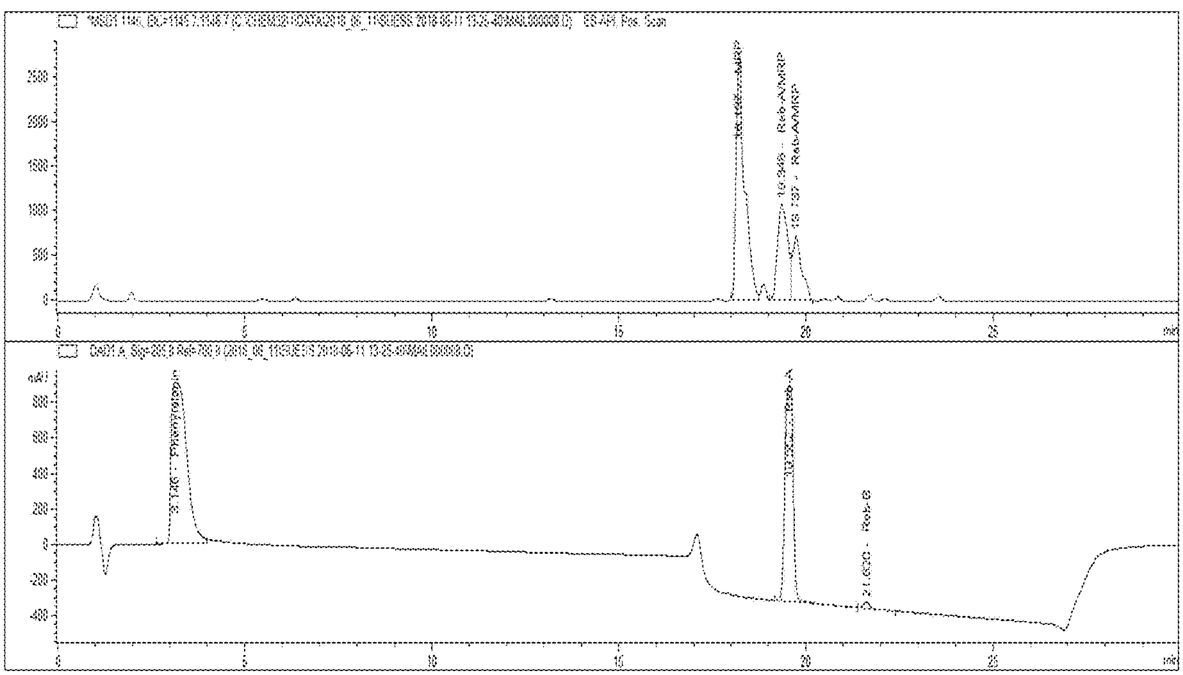
FIG. 28 depicts a chromatogram for reacted Phenylalanine and Reb-A, Upper Lane MS (SIM 1146), lower lane UV=205.

FIG. 28 is a chromatogram for reacted Phenylalanine and Reb-A, Upper Lane MS (SIM 1146), lower lane UV=205.

Figure 29:
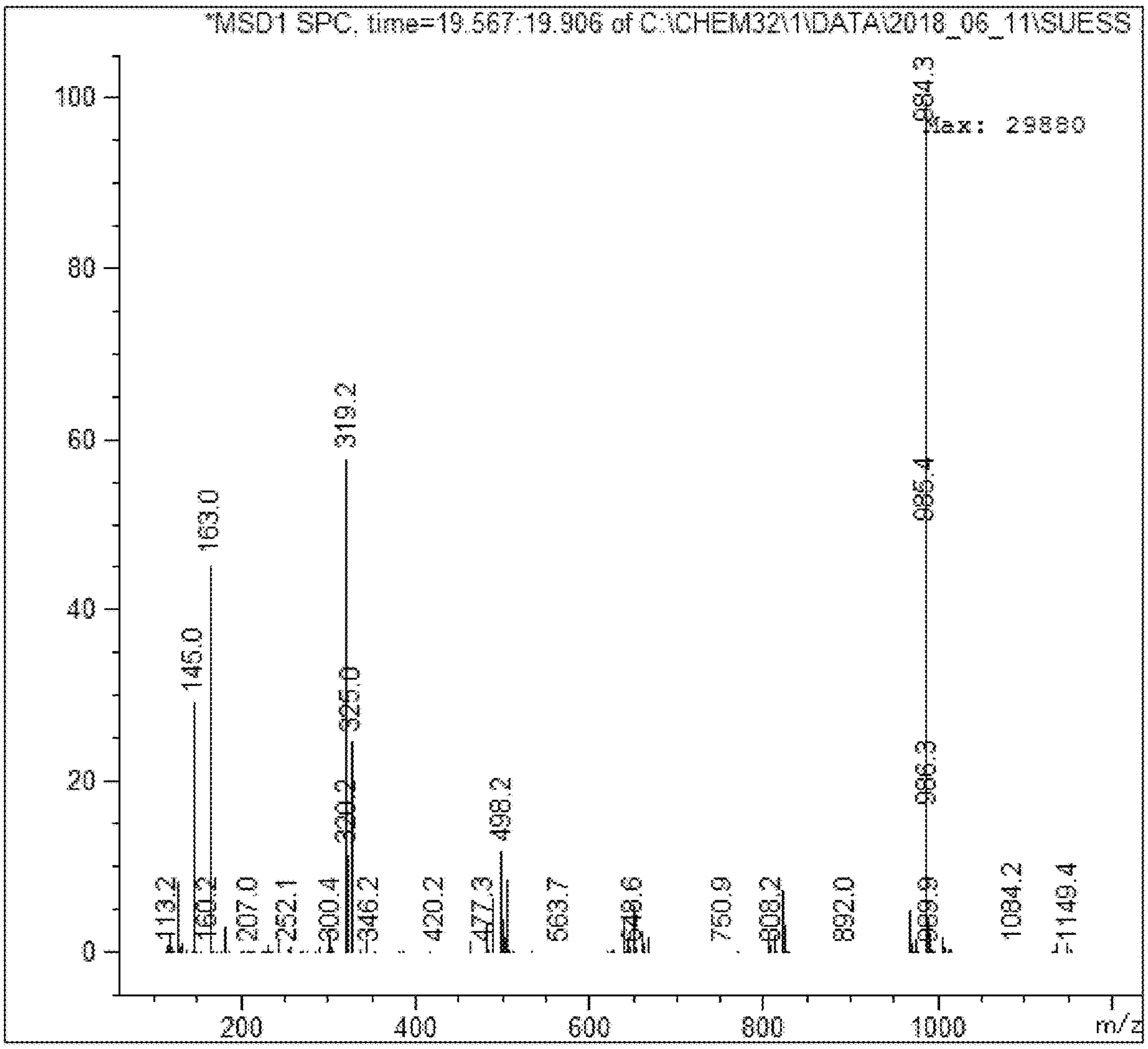
FIG. 29 depicts a mass spectrum of Reb-A. (m/z 985=M+$H_2O$+$H_2O$+H]$^{30}$).

FIG. 29 is a mass spectrum of Reb-A (m/z 985=M+$H_2O$+H]$^+$).

Figure 30:
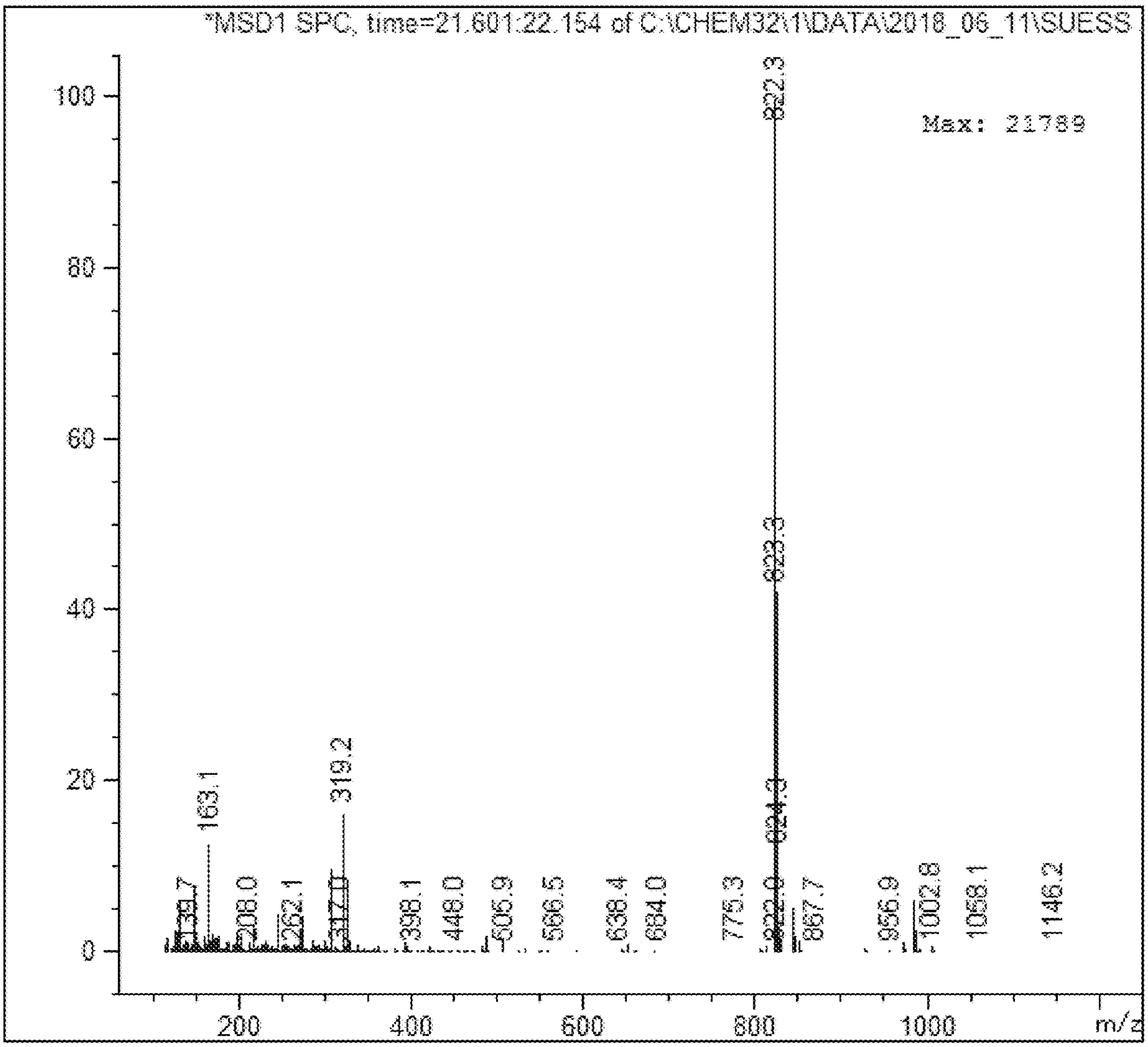
FIG. 30 depicts a mass spectrum of Reb-B (m/z 823=[M-162+$H_2O$+H]$^+$).

FIG. 30 is a mass spectrum of Reb-B (m/z 823=[M−162+$H_2O$+H]$^+$).

Figure 31:
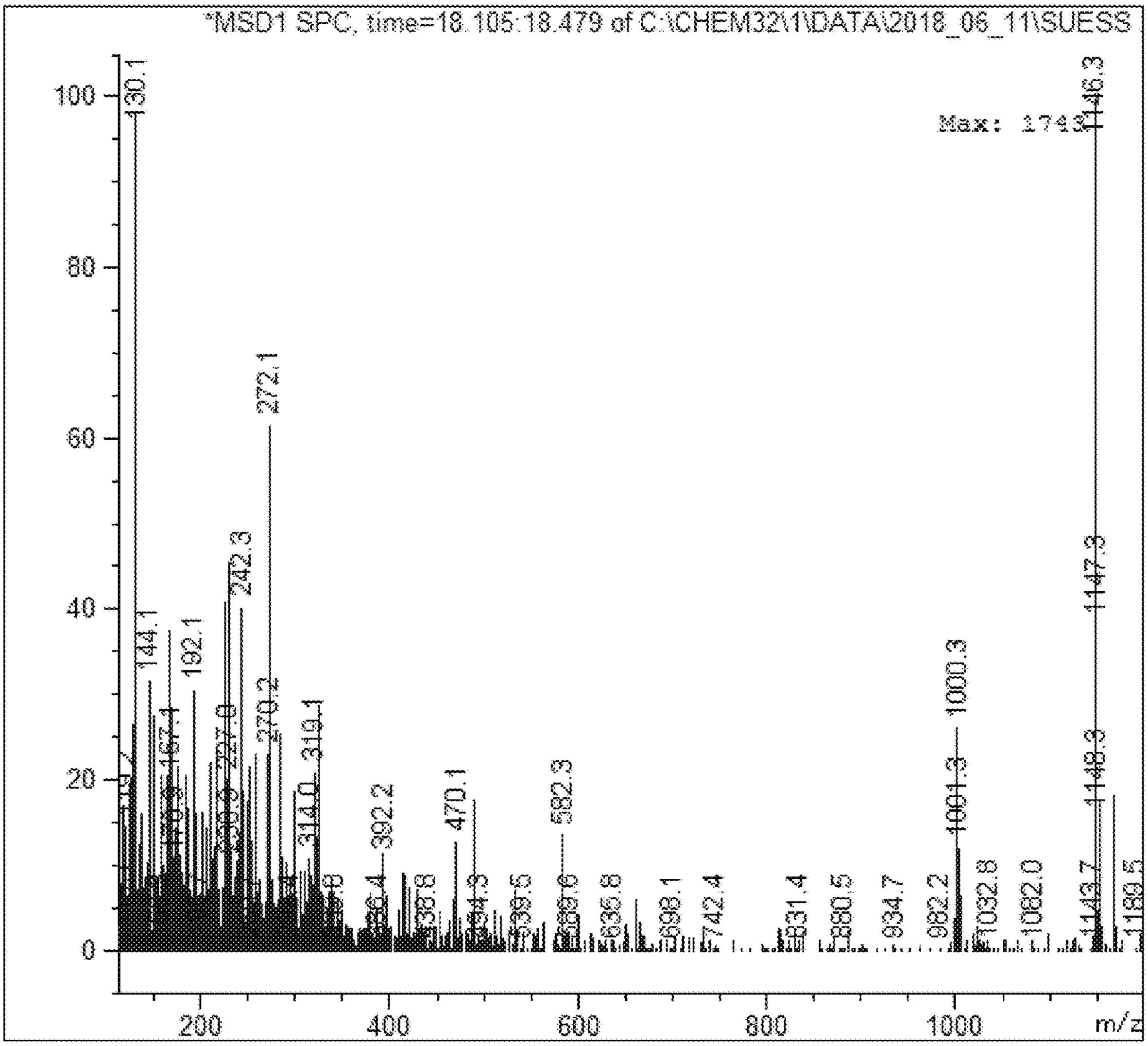
FIG. 31 depicts a mass spectrum of Reb-A MRP (m/z 1146=Reb-A+Phenylalanin (Schiff's Base)+H+$H_2O$]$^+$) with proposed m/z 1146=[M+$H_2O$+H]$^+$, m/z 1000=[M+$H_2O$+H-164+$H_2O$]$^+$ indicating loss of Phe and addition of one molecule $H_2O$, m/z 582=[2M−$H_2O$]$^+$.

FIG. 31 is a mass spectrum of Reb-A MRP (m/z 1146=Reb-A+Phenylalanin (Schiff's Base)+H+$H_2O$]$^+$) with proposed m/z 1146[M+$H_2O$+H]$^+$, m/z 1000[M+$H_2O$+H−164$H_2O$]$^+$ indicating loss of Phe and addition of one molecule H2O, m/z 582=[2M−$H_2O$]$^+$.

Structural proposal (several isomers are formed) of MRP Phe-Reb-A

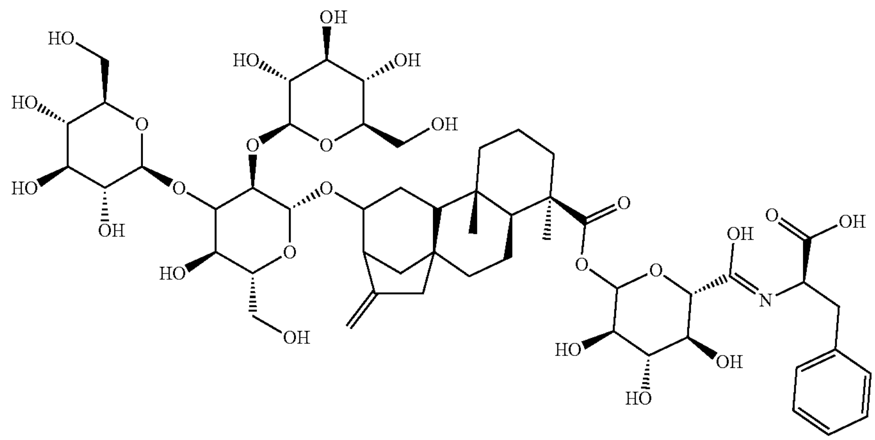

Nominal Mass = 1127 m/z 1146=[M+$H_2O$+H]$^-$

Example 56

Sensory Evaluation for 13 Amino Acids Tested Alone and with Glu, Reb-A and Reb-B/Glu (Equimolar Ratio)

All reactions were performed in 10 ml glycerin/water=9:1. The reaction partners were dissolved in water and then warmed glycerin (60° C.) was added. The reactions were performed at 100° C. for 40 minutes in a drying oven (sealed vials were positioned in pre-heated sand to increase heat transfer).

TABLE 56.1

| Sensory Evaluation for "negative controls" (i.e. no carbohydrate source) | | | |
|---|---|---|---|
| Reaction partners | Smell | Color | Taste |
| 8.91 mg Ala | Neutral, slightly Agar | No color | Slightly sweet |
| 13.3 mg Asp | Unpleasant (plastic) | No color | Slightly sweet |
| 12.1 mg Cys | Unpleasant (sulfur) | Slightly Yellow | Slightly sweet |
| 14.62 mg Gln | Unpleasant (Agar) | Very Slightly Yellow | Slightly sweet |
| 13.11 mg Ile | Coffee | No color | Slightly sweet |
| 14.7 mg Lys | Popcorn | brown | Slightly sweet |
| 14.9 mg Met | Sulfuric | Very Slightly Yellow | Slightly sweet |
| 16.5 mg Phe | Bloomy, caramel | Very Slightly Yellow | Slightly sweet |
| 11.5 mg Pro | Neutral, slightly chloric | Slightly Yellow | Slightly sweet |

TABLE 56.1-continued

| Sensory Evaluation for "negative controls" (i.e. no carbohydrate source) | | | |
|---|---|---|---|
| Reaction partners | Smell | Color | Taste |
| 10.5 mg Ser | Lotus flower | Slightly Yellow | Slightly sweet |
| 11.91 mg Thr | Vanilla, butter | Very Slightly Yellow | Slightly sweet |
| 18.1 mg Tyr | neutral | No color | Slightly sweet |
| 20.42 mg Try | Unpleasant (fecal) | Slightly Yellow | Slightly sweet |

The taste test was perfonned as in Example 38.

TABLE 56.2

| Sensory Evaluation of reactions between selected amino acids and GLu, Reb-A, Re-B/Glu (equimolar ratio) | | | |
|---|---|---|---|
| Reaction partners | Smell | Color | Taste |
| 8.91 mg Ala + 18 mg Glucose | Chicory root, Coffee | No color | Sweet |
| 8.91 mg Ala + 96.5 mg Reb-A | Unpleasant (Agar) | No color | Very Sweet |
| 4.45 mg Ala + 40.2 mg Reb-B + 9 mg Glu | Unpleasant (plastic) | Slightly Yellow | Sweet, metallic |
| 13.3 Asp + 18 mg Glu | Bread, Yeast | No color | Sweet |
| 13.3 mg Asp + 96.5 mg Reb-A | Neutral | No color | Very Sweet |
| 6.7 mg Asp + 9 mg Glu + 40.2 mg Reb-B | Unpleasant (plastic) | No color | Sweet |
| 12.1 mg Cys + 18 mg Glu | Unpleasant (sulfuric) | Slightly Yellow | Sweet |
| 12.1 mg Cys + 96.5 mg Reb-A | Pop corn | Slightly Yellow | Very Sweet |
| 6.06 mg Cys + 9 mg Glu + 40.2 mg Reb-B | Pop corn | Slightly Yellow | Sweet |
| 14.62 mg Gln + 18 mg Glu | Slightly charcoal | Slightly Yellow | Sweet |
| 14.62 mg Gln + 96.5 mg Reb A | Fresh, bloomy | Slightly Yellow | Very Sweet |
| 7.31 mg Gln + 9 mg Glu + 40.2 mg Reb-B | Fresh, bloomy (Lotus) | Slightly Yellow | Sweet |
| 13.11 mg Ile + 18 mg Glu | Coffee | No color | Sweet |
| 13.11 mg Ile + 96.5 mg Reb A | Coffee | No color | Very Sweet |
| 5.65 mg Ile + 9 mg Glu + 40.2 mg Reb-B | Coffee | No color | Sweet |
| 14.7 mg Lys + 18 mg Glucose | caramel | brown | Sweet |
| 14.7 mg Lys + 96.5 Reb-A | Popcorn | brown | Very Sweet |
| 7.3 mg Lys + 40.2 mg Reb-B + 9 mg Glu | Popcorn | brown | Sweet |
| 14.9 mg Met + 18 mg Glu | Fried Potatoes | Very slightly Yellow | Sweet |
| 14.9 mg Met + 96.5 mg Reb-A | Herbal | Very slightly Yellow | Very Sweet |
| 7.5 mg Met + 40.2 mg Reb-B + 9 mg Glu | Sulfuric | Very slightly Yellow | Sweet |
| 16.5 mg Phe + 18 mg Glu | bloomy | Very slightly Yellow | Sweet |
| 16.5 mg Phe + 96.5 mg Reb-A | Unpleasant (herbal) | Very slightly Yellow | Very Sweet |
| 8.3 mg Phe + 40.2 mg Reb-B + 9 mg Glu | Unpleasant (plastics) | Very slightly Yellow | Sweet |
| 11.5 mg Pro + 18 mg Glu | Unpleasant (fecal) | Slightly Yellow | Sweet |
| 11.5 mg Pro + 96.5 mg Reb A | Chlorine | Slightly Yellow | Very Sweet |
| 5.75 mg Pro + 9 mg Glu + 40.2 mg Reb-B | Chlorine | Slightly Yellow | Sweet |
| 10.5 mg Ser + 18 mg Glu | Charcoal | Slightly Yellow | Sweet |
| 10.5 mg Ser + 96.5 mg Reb A | Charcoal | Slightly Yellow | Very Sweet |
| 5.25 mg Ser + 9 mg Glu + 40.2 mg Reb-B | Unpleasant (fecal) | Slightly Yellow | Sweet |
| 11.91 mg Thr + 18 mg Glu | Charcoal | Very slightly Yellow | Sweet |
| 11.91 mg Thr + 96.5 mg Reb A | Unpleasant | Very slightly Yellow | Very Sweet |
| 5.95 mg Thr + 9 mg Glu + 40.2 mg Reb-B | Unpleasant | Very slightly Yellow | Sweet |
| 18.1 mg Tyr + 18 mg Glu | neutral | farblos | Sweet |
| 18.1 mg Tyr + 96.5 mg Reb-A | Neutral, slightly honey | farblos | Very Sweet |
| 9.1 mg Tyr + 9 mg Glu + 40.2 mg Reb-B | Neutral, slightly plastics | farblos | Sweet |

TABLE 56.2-continued

| Sensory Evaluation of reactions between selected amino acids and GLu, Reb-A, Re-B/Glu (equimolar ratio) | | | |
|---|---|---|---|
| Reaction partners | Smell | Color | Taste |
| 20.42 mg Trp + 18 mg Glu | Unpleasant (fecal) | Slightly Yellow | Sweet |
| 20.42 mg Trp + 96.5 mg Reb A | Unpleasant (fecal) | Slightly Yellow | Very Sweet |
| 10.21 mg Trp + 9 mg Glu + 40.2 mg Reb-B | neutral | Slightly Yellow | Sweet |

The taste test was performed as in Example 38.

Example 57

Combined Sensory and Analytical Investigations (Glucuronic Acid-Glucuronolactone)

TABLE 57.1

| Test Conditions | | | |
|---|---|---|---|
| Reaction partners | Solvent | Time, h | Temp, ° C. |
| 16.5 mg Phe | 10 ml $KH_2PO_4$, pH 7.8 | 2.5 | 120 |
| 9.0 mg Glucose | | | |
| 18 mg Glucuronic Acid | | | |
| 18 mg Glucurolactone | | | |
| 16.5 mg Phe + 18 mg Glucuronic Acid | | | |
| 16.5 mg Phe + 18 mg Glucurolactone | | | |
| 16.5 mg Phe + 9 mg Glucuronic Acid + 9.0 mg Glucose | | | |
| 16.5 mg Phe + 9.0 mg Glucurolactone + 9.0 mg Glucose | | | |

Under the reaction conditions phenylalanine and glucose form the MRI (Phe+Glu).

If GlucuronoIntone and Glucuronic Acid react with phenylalanine in the same way as glucose the predicted MRI would have a molar mass of 323 or 341. If both compounds are reacting with Phenylalanine after reduction to glucose, the MRI would have a molar mass of 327. Although theoretically the MRI of glucuronolactone may be formed it is reasonable to assume that glucuronolactone will hydrolyze to glucuronic acid under the reaction conditions; hence, the MRI with a molar mass of 342 is considered to represent a unique MRI for this reaction.

To clarify whether glucuronic acid and glucuronolactone react uniquely with phenylalanine, the reaction was performed with glucuronic acid or glucuronolactone in absences/presence of glucose.

Reaction scheme, MRI of glucuronolactone/glucuronic acid and phenylalanine

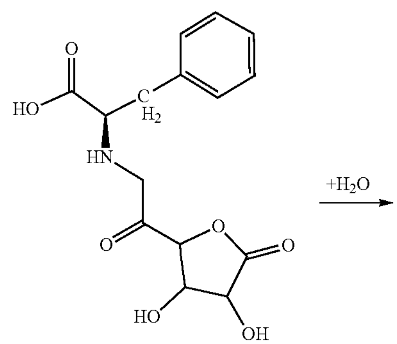

Nominal Mass = 323

MRII Glucuronolactone

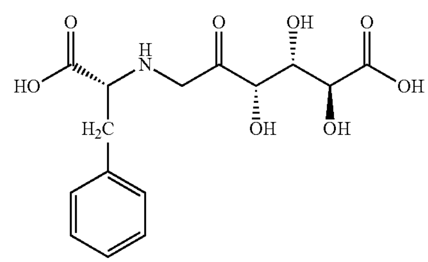

Nominal Mass = 341

MRI Glucuronic Acid

Results

TABLE 57.2

| Sensory evaluation, before reaction | | | |
|---|---|---|---|
| Reaction partners | Smell | Color | Taste |
| 16.5 mg Phe | neutral | No color | No taste |
| 9 mg Glucose | neutral | No color | Sweet |
| 18 mg Glucuronic Acid | neutral | No color | No taste |
| 18 mg Glucurolactone | neutral | No color | No taste |
| Phe + Glucuronic Acid | neutral | No color | No taste |
| Phe + Glucuronolactone | neutral | No color | No taste |
| Phe + Glucuronic Acid + Glucose | neutral | No color | Sweet |
| Phe + Glucuronolactone + Glucose | neutral | No color | Sweet |

The taste test was performed as in Example 38.

TABLE 57.3

| Sensory evaluation, after reaction | | | |
|---|---|---|---|
| Reaction partners | Smell | Color | Taste |
| Phe | Caramel, burnt | Slightly Yellow | sweet |
| Glu | Burnt sugar | Deep Yellow | Sweet/bitter |
| Glucuronolactone | Burnt sugar | Deep Yellow | Bitter |
| Glucuronic Acid | burnt bread | Deep Yellow | Bitter |
| Phe + Glucuronic Acid | Caramel, bloomy | Deep Yellow | Neutral-slightly sweet |
| Phe + Glucuronolactone | Honey | Deep Yellow | Neutral-slightly sweet |
| Phe + Glucuronic Acid + Glucose | Caramel | Deep Yellow | Neutral-slightly sweet |
| Phe + Glucuronolactone + Glucose | Honey | Deep Yellow | Neutral-slightly sweet |

The taste test was performed as in Example 38.

TABLE 57.4

| Semi-quantitative evaluation of the MRIs formed by different reaction conditions | | |
|---|---|---|
| Reaction partner | MRI (Phe + Glucuronic Acid/ Glucuronolactone) | MRI (Phe + Glucose) |
| Phe + Glucuronic Acid | +++ | − |
| Phe + Glucuronolactone | +++ | + |
| Phe + Glucuronic Acid + Glucose | +++ | − |
| Phe + Glucuronolactone + Glucose | +++ | ++ |

As seen, any reaction with glucuronic acid yields an MRI (Phe+Glucuronic Acid), but even in presence of glucose only this MRI detected. That points to a highly efficient and more preferred reaction when compared to glucose. On the other hand, glucurolactone forms the same MRI (Phe+ glucuronolacte, hydrolyzed) but also the MRI (Phe+Glu) is formed even if no glucose is present. In case of presence of glucose, the amount of the MRI (Phe+Glu) is substantially higher than in absence of glucose.

TABLE 57.5

| Detection of unreacted partners | | | | |
|---|---|---|---|---|
| Reaction partners | Phe | Glu | Glucuronic Acid | Glucuronolactone |
| Phe | + | − | − | − |
| Glu | − | + | − | − |
| Glucuronic Acid | − | − | + | − |
| Glucuronolactone | − | − | − | + |
| Phe + Glu | + | + | − | − |
| Phe + Glucuronic Acid | + | − | − | − |
| Phe + Glucuronolactone | + | − | − | − |
| Phe + Glucose + Glucuronic Acid | + | + | − | − |
| Phe + Glucose + Glucuronolactone | + | + | − | −− |

From the Table above it becomes obvious that glucuronic acid and glucuronolactone are completely consumed in the reaction irrespectively of whether glucose is present or not. Glucose on the other hand is present in reacted samples whether glucuronic acid or glucuronolactone is present or not. That is a clear indication of the higher reactivity of glucuronic acid/glucuronolactone when compared to glucose.

The analytical proof of above findings is shown in FIG. 32 through FIG. 37.

Figure 32:
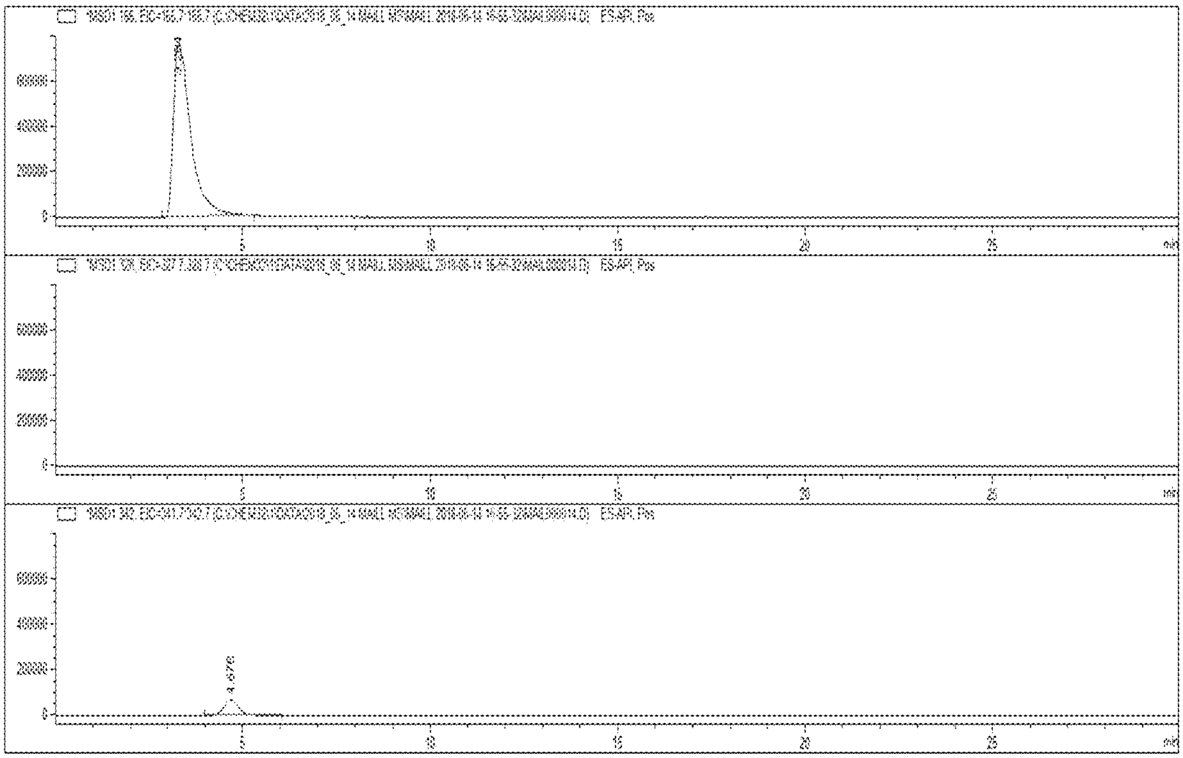
FIG. 32 depicts a chromatogram of the reaction Phe+Glucuronic Acid (SIM mode). Upper Lane: m/z=166 (Phe), m/z=328 (MRI Phe+Glucose), m/z=343.2 (Phe+Glucuronic Acid).

FIG. 32 is a chromatogram of the reaction of Phe+ Glucuronic Acid (SIM mode) Upper Lane: m/z=166 (Phe), m/z=328 (MRI Phe+Glucose), m/z=343.2 (Phe+Glucuronic Acid).

Figure 33:
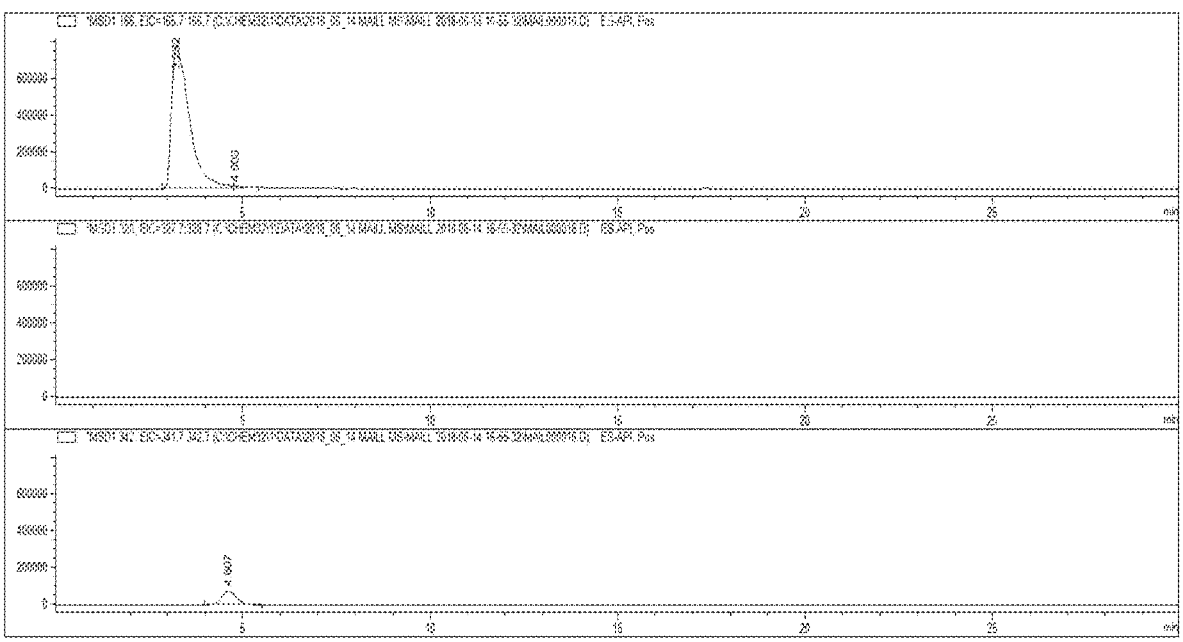
FIG. 33 depicts a chromatogram of the reaction of Phe+Glucose+Glucuronic Acid (SIM mode). Upper Lane: m/z=166 (Phe), m/z=328 (MRI Phe+Glucose), m/z=343.2 (Phe+Glucuronic Acid).

FIG. 33 is a chromatogram of the reaction of Phe+ Glucose-FGlucuronic Acid (SIM mode). Upper Lane: m/z=166 (Phe), m/z=328 (MRI Phe+Glucose), m/z=343.2 (Phe+Glucuronic Acid).

Figure 34:
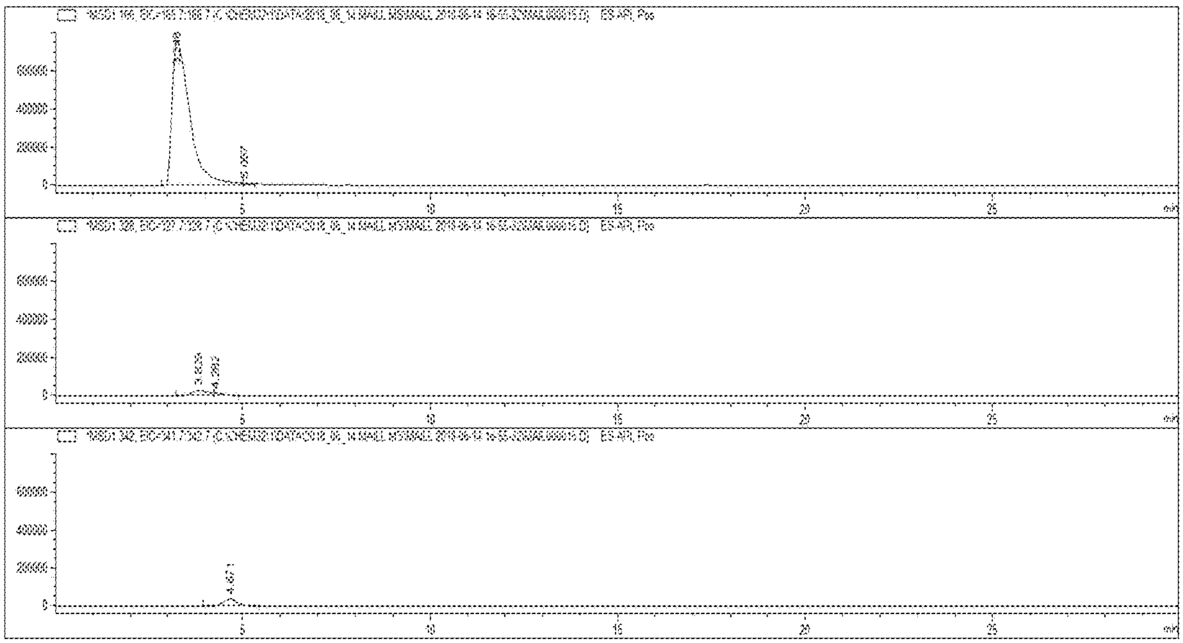
FIG. 34 depicts a chromatogram of the reaction Phe+Glucuronolactone (SIM mode). Upper Lane: m/z=166 (Phe), m/z=328 (MRI Phe+Glucose), m/z=343.2 (Phe+Glucuronolactone).

FIG. 34 is a chromatogram of the reaction of Phe+ Glucuronolactone (SIM mode). Upper Lane: m/z=166 (Phe), m/z=328 (MRI Phe+Glucose), m/z=343.2 (Phe+Glucuronolactone).

Figure 35:
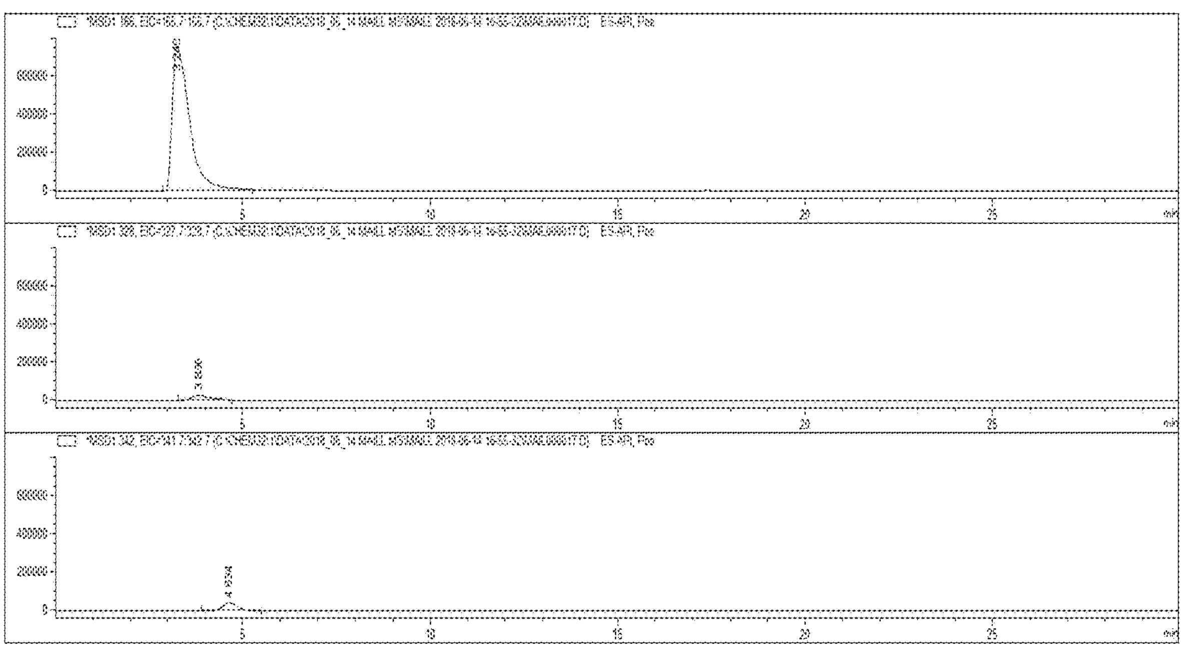
FIG. 35 depicts a chromatogram of the reaction of Phe+Glucose+Glucuronolactone (SIM mode). Upper Lane: m/z=166 (Phe), m/z=328 (MRI Phe+Glucose), m/z=343.2 (Phe+Glucuronolactone).

FIG. 35 is a chromatogram of the reaction of Phe+ Glucose+Glucuronolactone (SIM mode), Upper Lane: m/z=166 (Phe), m/z=328 (MRI Phe+Glucose), m/z=343.2 (Phe+Glucuronolactone).

Figure 36:
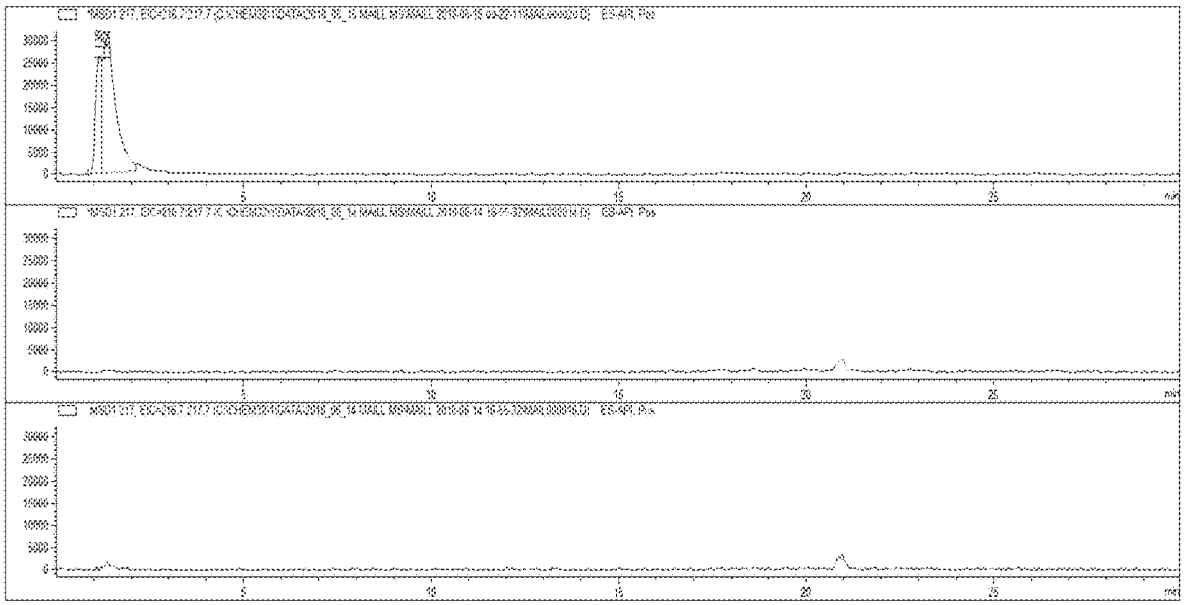
FIG. 36 depicts a chromatogram of unreacted reactants, Glucuronic Acid (SIM mode). Upper Lane Glucuronic Acid, medium lane lower Phe+Glucuronic Acid, lower lane Phe+Glu+Glucuronic Acid.

FIG. 36 is a chromatogram of unreacted reactants Glucuronic Acid (SIM mode). Upper Lane Glucuronic Acid, medium lane lower Phe+Glucuronic Acid, lower lane Phe+ Glu+Glucuronic Acid.

Figure 37:
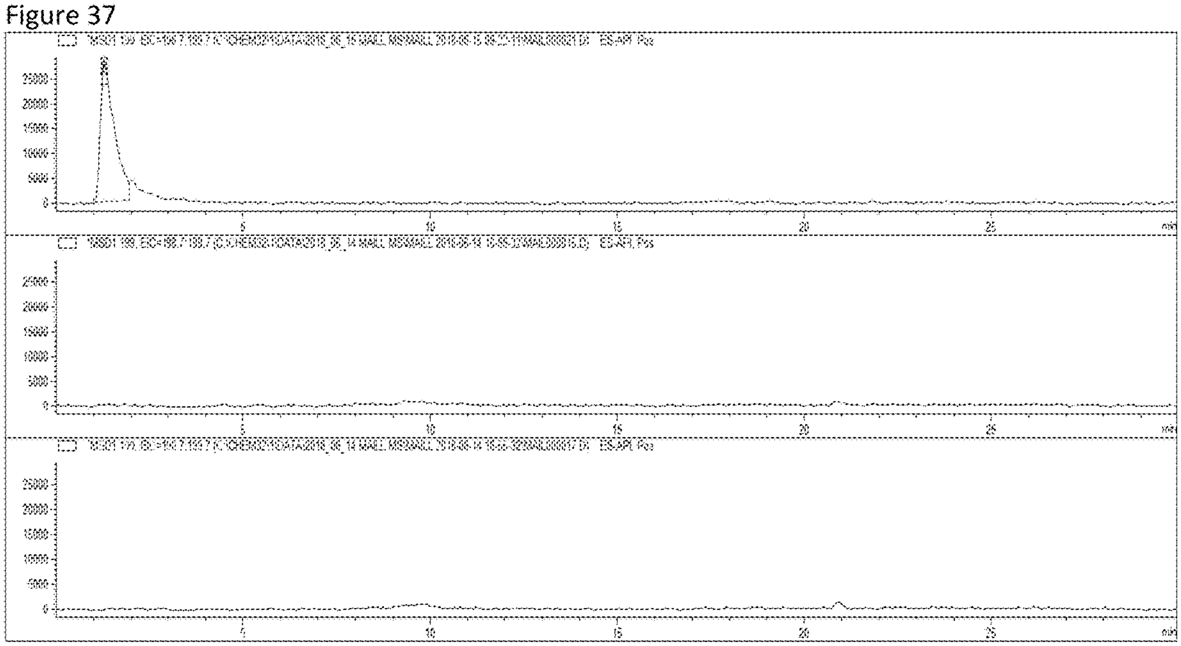
FIG. 37 depicts a chromatogram of unreacted reactants Glucuronolactone (SIM mode). Upper Lane Glucuronolactone, medium lane lower Phe+Glucuronolactone, lower lane Phe+Glu+Glucuronolactone.

FIG. 37 is a chromatogram of unreacted reactants Glucuronolactone (SIM mode). Upper Lane Glucuronolactone, medium lane lower Phe+Glucuronolactone, lower lane Phe+ Glu+Glucuronol actone.

Example 58

Combined Sensory and Analytical Investigations (*Stevia* Extract of Example 37)

TABLE 58.1

| Test Conditions | | | |
|---|---|---|---|
| Reaction partners | Solvent | Time, h | Temp, ° C. |
| 16.5 mg Phe<br>9.0 mg Glu<br>96.5 mg SG Sample NO. 1-1<br>16.5 mg Phe + 96.5 mg SG Sample NO. 1-1<br>16.5 mg Phe + 96.5 mg SG Sample NO. 1-3<br>16.5 mg Phe + 96.5 mg SG Sample NO. 1-8<br>16.5 mg Phe + 96.5 mg SG Sample NO. 2-2<br>8.91 mg Ala + 96.5 mg SG Sample NO. 1-1<br>8.91 mg Ala + 96.5 mg SG Sample NO. 1-3 | 10 ml $KH_2PO_4$, pH 7.8 | 2.5 | 120 |

TABLE 58.1-continued

| Test Conditions | | | |
|---|---|---|---|
| Reaction partners | Solvent | Time, h | Temp, ° C. |
| 8.91 mg Ala + 96.5 mg SG Sample NO. 1-8 | | | |
| 8.91 mg Ala + 96.5 mg SG Sample NO. 2-2 | | | |
| 14.7 mg Lys + 96.5 mg SG Sample NO. 1-1 | | | |
| 14.7 mg Lys + 96.5 mg SG Sample NO. 1-3 | | | |
| 14.7 mg Lys + 96.5 mg SG Sample NO. 1-8 | | | |
| 14.7 mg Lys + 96.5 mg SG Sample NO. 2-2 | | | |

Under the reaction conditions amino acids and reducing sugar undergo Mallard reaction.

Results

TABLE 58.2

| Sensory evaluation, before reaction | | | |
|---|---|---|---|
| Reaction partners | Smell | Color | Taste[1)] |
| 16.5 mg Phe | Neutral | No color | No taste |
| 9.0 mg Glu | Neutral | No color | Sweet |
| 96.5 mg SG Sample NO. 1-1 | Neutral-Slightly Sweet | No color | Sweet |
| 16.5 mg Phe + 96.5 mg SG Sample NO. 1-1 | Pleasant, slightly sweet | No color | Sweet |
| 16.5 mg Phe + 96.5 mg SG Sample NO. 1-3 | Pleasant, slightly sweet | No color | Sweet |
| 16.5 mg Phe + 96.5 mg SG Sample NO. 1-8 | Pleasant, slightly sweet | No color | Sweet |
| 16.5 mg Phe + 96.5 mg SG Sample NO. 2-2 | Pleasant, slightly sweet | No color | Sweet |
| 8.91 mg Ala + 96.5 mg SG Sample NO. 1-1 | Pleasant, slightly sweet | No color | Sweet |
| 8.91 mg Ala + 96.5 mg SG Sample NO. 1-3 | Pleasant, slightly sweet | No color | Sweet |
| 8.91 mg Ala + 96.5 mg SG Sample NO. 1-8 | Pleasant, slightly sweet | No color | Sweet |
| 8.91 mg Ala + 96.5 mg SG Sample NO. 2-2 | Pleasant, slightly sweet | No color | Sweet |
| 14.7 mg Lys + 96.5 mg SG Sample NO. 1-1 | Typical Lysine smell | Slightly Yellow | Sweet |
| 14.7 mg Lys + 96.5 mg SG Sample NO. 1-3 | Typical Lysine smell | Slightly Yellow | Sweet |
| 14.7 mg Lys + 96.5 mg SG Sample NO. 1-8 | Typical Lysine smell | Slightly Yellow | Sweet |
| 14.7 mg Lys + 96.5 mg SG Sample NO. 2-2 | Typical Lysine smell | Slightly Yellow | Sweet |

[1)]after dilution 1:20 The taste test was performed as in Example 38.

TABLE 58.3

| Sensory evaluation, after reaction | | | |
|---|---|---|---|
| Reaction partners | Smell | Color | Taste[1)] |
| 16.5 mg Phe | Caramel, burnt | Slightly Yellow | Sweet |
| 9.0 mg Glu | Burnt sugar | Deep Yellow | Sweet/bitter |
| 96.5 mg SG Sample NO. 1-1 | Burnt sugar, herbal | Deep Yellow | Sweet/bitter |
| 16.5 mg Phe + 96.5 mg SG Sample NO. 1-1 | Honey | Yellow | Sweet, honey/caramel |
| 16.5 mg Phe + 96.5 mg SG Sample NO. 1-3 | Honey (intensive) | Yellow | Sweet, honey/caramel |
| 16.5 mg Phe + 96.5 mg SG Sample NO. 1-8 | Honey (intensive) | Yellow | Sweet, honey/caramel |
| 16.5 mg Phe + 96.5 mg SG Sample NO. 2-2 | Honey | Yellow | Sweet, honey/caramel |
| 8.91 mg Ala + 96.5 mg SG Sample NO. 1-1 | Pleasant, bloomy (Lotus) | Yellow | Sweet |
| 8.91 mg Ala + 96.5 mg SG Sample NO. 1-3 | Pleasant, bloomy | Yellow | Sweet |
| 8.91 mg Ala + 96.5 mg SG Sample NO. 1-8 | Pleasant, bloomy (Lotus) | Yellow | Sweet |
| 8.91 mg Ala + 96.5 mg SG Sample NO. 2-2 | Pleasant, bloomy | Yellow | Sweet |

TABLE 58.3-continued

| Sensory evaluation, after reaction | | | |
|---|---|---|---|
| Reaction partners | Smell | Color | Taste[1)] |
| 14.7 mg Lys + 96.5 mg SG Sample NO. 1-1 | Herbal (Chamomile) | Yellow | Sweet, herbal, slightly bitter |
| 14.7 mg Lys + 96.5 mg SG Sample NO. 1-3 | Herbal (Chamomile) | Yellow | Sweet, herbal, slightly bitter |
| 14.7 mg Lys + 96.5 mg SG Sample NO. 1-8 | Herbal (Chamomile) | Yellow | Sweet, herbal, slightly bitter |
| 14.7 mg Lys + 96.5 mg SG Sample NO. 2-2 | Herbal (Chamomile) | Yellow | Sweet, herbal, slightly bitter |

[1)]after dilution 1:20 The taste test was performed as in Example 38.

TABLE 58.4

| Steviol glycosides in SG Sample No. 2-1 (160.6 mg/10 ml) | | | |
|---|---|---|---|
| Name | m/z [M − H]⁻ | mg/10 ml | % m/m |
| Related steviol glycoside #1 | 517 or 427 | <0.01 | <0.01 |
| Related steviol glycoside #2 | 981.00 | <0.01 | <0.01 |
| Related steviol glycoside #3 | 427 or 735 | <0.01 | <0.01 |
| Related steviol glycoside #4 | 675 or 1127 | 0.34 | 0.21 |
| Related steviol glycoside #5 | 981 | 0.23 | 0.14 |
| Reb-V | 1259 | 0.48 | 0.30 |
| Reb-T | 1127 | 0.79 | 0.49 |
| Reb-E | 965 | <0.01 | <0.01 |
| Reb-O | 1435 | 1.00 | 0.62 |
| Reb-D | 1127 | 4.41 | 2.75 |
| Reb-K | 1111 | 2.51 | 1.56 |
| Reb-N | 1273 | <0.01 | <0.01 |
| Reb-M | 1289 | <0.01 | <0.01 |
| Reb-S | 949 | 1.09 | 0.68 |
| Reb-J | 1111 | <0.01 | <0.01 |
| Reb-W | 1097 | <0.01 | <0.01 |
| Reb-U2 | 1097 | 0.39 | 0.25 |
| Reb-W2/3 | 1097 | 0.31 | 0.19 |
| Reb-O2 | 965 | 0.32 | 0.20 |
| Reb-Y | 1259 | 0.20 | 0.12 |
| Reb-I | 1127 | 0.39 | 0.24 |
| Reb-V2 | 1259 | 0.64 | 0.40 |
| Reb-K2 | 1111 | 0.26 | 0.16 |
| Reb-H | 1111 | <0.01 | <0.01 |
| Reb-A | 965 | 47.52 | 29.59 |
| Stevioside | 803 | 59.35 | 36.95 |
| Reb-F | 935 | 6.56 | 4.08 |
| Reb-C | 949 | 9.75 | 6.07 |
| Dulcoside-A | 787 | 4.54 | 2.83 |
| Rubusoside | 641 | 5.10 | 3.17 |
| Reb-B | 803 | 2.32 | 1.44 |
| Dulcoside B | 787 | 1.01 | 0.63 |
| Steviolbioside | 641 | 3.77 | 2.35 |
| Reb-R | 935 | 0.48 | 0.30 |
| Reb-G | 803 | 0.37 | 0.23 |
| Stevioside-B | 787 | <0.01 | <0.01 |
| Reb-G1 | 641 | <0.01 | <0.01 |
| Reb-R1 | 773 | <0.01 | <0.01 |
| Reb-F1 | 773 | <0.01 | <0.01 |
| Iso-Steviolbioside | 641 | <0.01 | <0.01 |
| | Sum | 154.12 | 95.97 |

TABLE 58.5

| Steviol glycosides in SG Sample No. 2-2 (166.6 mg/10 ml) | | | |
|---|---|---|---|
| Name | m/z [M − H]⁻ | mg/10 ml | % m/m |
| Related steviol glycoside #1 | 517 or 427 | <0.01 | <0.01 |
| Related steviol glycoside #2 | 981.00 | <0.01 | <0.01 |
| Related steviol glycoside #3 | 427 or 735 | <0.01 | <0.01 |
| Related steviol glycoside #4 | 675 or 1127 | <0.01 | <0.01 |
| Related steviol glycoside #5 | 981 | <0.01 | <0.01 |
| Reb-V | 1259 | <0.01 | <0.01 |

TABLE 58.5-continued

| Steviol glycosides in SG Sample No. 2-2 (166.6 mg/10 ml) | | | |
|---|---|---|---|
| Name | m/z [M − H]⁻ | mg/10 ml | % m/m |
| Reb-T | 1127 | <0.01 | <0.01 |
| Reb-E | 965 | <0.01 | <0.01 |
| Reb-O | 1435 | 0.87 | 0.52 |
| Reb-D | 1127 | 3.85 | 2.31 |
| Reb-K | 1111 | 2.30 | 1.38 |
| Reb-N | 1273 | <0.01 | <0.01 |
| Reb-M | 1289 | 0.24 | 0.14 |
| Reb-S | 949 | 0.72 | 0.43 |
| Reb-J | 1111 | <0.01 | <0.01 |
| Reb-W | 1097 | <0.01 | <0.01 |
| Reb-U2 | 1097 | 0.45 | 0.27 |
| Reb-W2/3 | 1097 | 0.25 | 0.15 |
| Reb-O2 | 965 | 0.20 | 0.12 |
| Reb-Y | 1259 | 0.21 | 0.13 |
| Reb-I | 1127 | 0.39 | 0.24 |
| Reb-V2 | 1259 | 0.80 | 0.48 |
| Reb-K2 | 1111 | 0.33 | 0.20 |
| Reb-H | 1111 | 0.42 | 0.25 |
| Reb-A | 965 | 48.56 | 29.15 |
| Stevioside | 803 | 55.86 | 33.53 |
| Reb-F | 935 | 7.34 | 4.40 |
| Reb-C | 949 | 14.97 | 8.99 |
| Dulcoside-A | 787 | 4.34 | 2.61 |
| Rubusoside | 641 | 6.24 | 3.75 |
| Reb-B | 803 | 3.42 | 2.05 |
| Dulcoside B | 787 | 1.05 | 0.63 |
| Steviolbioside | 641 | 4.43 | 2.66 |
| Reb-R | 935 | 0.73 | 0.44 |
| Reb-G | 803 | 0.61 | 0.37 |
| Stevioside-B | 787 | <0.01 | <0.01 |
| Reb-G1 | 641 | <0.01 | <0.01 |
| Reb-R1 | 773 | <0.01 | <0.01 |
| Reb-F1 | 773 | <0.01 | <0.01 |
| Iso-Steviolbioside | 641 | <0.01 | <0.01 |
| | Sum | 158.58 | 95.19 |

TABLE 58.6

| Steviol glycosides in SG Sample No. 2-3 (165.1 mg/10 ml) | | | |
|---|---|---|---|
| Name | m/z [M − H]⁻ | mg/10 ml | % m/m |
| Related steviol glycoside #1 | 517 or 427 | <0.01 | <0.01 |
| Related steviol glycoside #2 | 981.00 | <0.01 | <0.01 |
| Related steviol glycoside #3 | 427 or 735 | <0.01 | <0.01 |
| Related steviol glycoside #4 | 675 or 1127 | <0.01 | <0.01 |
| Related steviol glycoside #5 | 981 | <0.01 | <0.01 |
| Reb-V | 1259 | 0.43 | 0.26 |
| Reb-T | 1127 | <0.01 | <0.01 |
| Reb-E | 965 | 0.25 | 0.15 |
| Reb-O | 1435 | 0.63 | 0.38 |
| Reb-D | 1127 | 3.70 | 2.24 |
| Reb-K | 1111 | 2.11 | 1.28 |
| Reb-N | 1273 | <0.01 | <0.01 |

TABLE 58.6-continued

| Steviol glycosides in SG Sample No. 2-3 (165.1 mg/10 ml) | | | |
|---|---|---|---|
| Name | m/z [M − H]⁻ | mg/10 ml | % m/m |
| Reb-M | 1289 | <0.01 | <0.01 |
| Reb-S | 949 | 1.22 | 0.74 |
| Reb-J | 1111 | <0.01 | <0.01 |
| Reb-W | 1097 | 0.31 | 0.19 |
| Reb-U2 | 1097 | 0.57 | 0.34 |
| Reb-W2/3 | 1097 | 0.24 | 0.14 |
| Reb-O2 | 965 | 0.33 | 0.20 |
| Reb-Y | 1259 | 0.21 | 0.13 |
| Reb-I | 1127 | 0.36 | 0.22 |
| Reb-V2 | 1259 | 0.75 | 0.46 |
| Reb-K2 | 1111 | 0.28 | 0.17 |
| Reb-H | 1111 | <0.01 | <0.01 |
| Reb-A | 965 | 49.10 | 29.74 |
| Stevioside | 803 | 55.69 | 33.73 |
| Reb-F | 935 | 7.73 | 4.68 |
| Reb-C | 949 | 14.51 | 8.79 |
| Dulcoside-A | 787 | 4.65 | 2.82 |
| Rubusoside | 641 | 6.82 | 4.13 |
| Reb-B | 803 | 4.05 | 2.45 |
| Dulcoside B | 787 | 1.43 | 0.86 |
| Steviolbioside | 641 | 4.69 | 2.84 |
| Reb-R | 935 | 0.21 | 0.13 |
| Reb-G | 803 | <0.01 | <0.01 |
| Stevioside-B | 787 | <0.01 | <0.01 |
| Reb-G1 | 641 | <0.01 | <0.01 |
| Reb-R1 | 773 | <0.01 | <0.01 |
| Reb-F1 | 773 | <0.01 | <0.01 |
| Iso-Steviolbioside | 641 | <0.01 | <0.01 |
| | Sum | 160.26 | 97.07 |

Analytical Results

Figure 38:
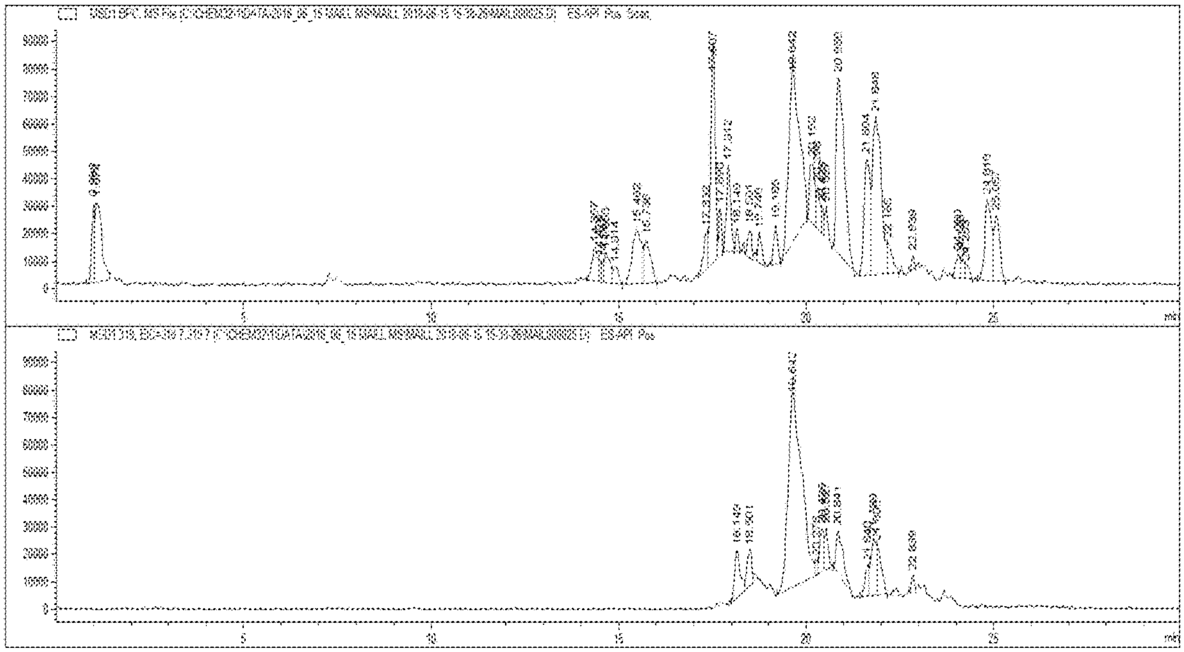
FIG. 38 depicts a chromatogram of Ala+SG Sample No. 1-1, upper lane MS-TIC, lower lane m/z=319 (selective for SGs).

FIG. 38 is a chromatogram of Ala+SG Sample No. 1-1, upper lane MS-TIC, lower lane m/z=319 (selective for SGs). Interpretation: 7.7 min: MRI (Ala+Glu); 15-17 min: Products related to heated sugar; 17-25 min: SGs of SG Sample No. 1-1 and MRIs (Ala+SG).

Figure 39:
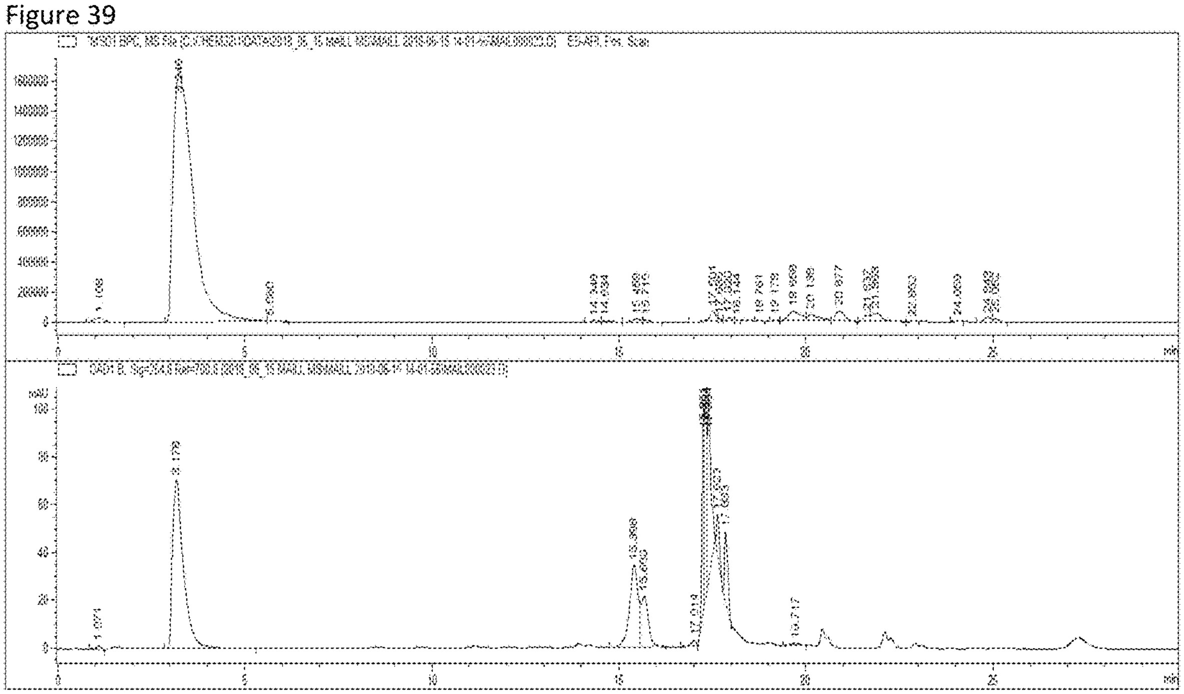
FIG. 39 depicts a chromatogram of Phe+SG Sample No. 1-1, upper lane MS-trace, lower lane UV=254 nm).
Figure 40:
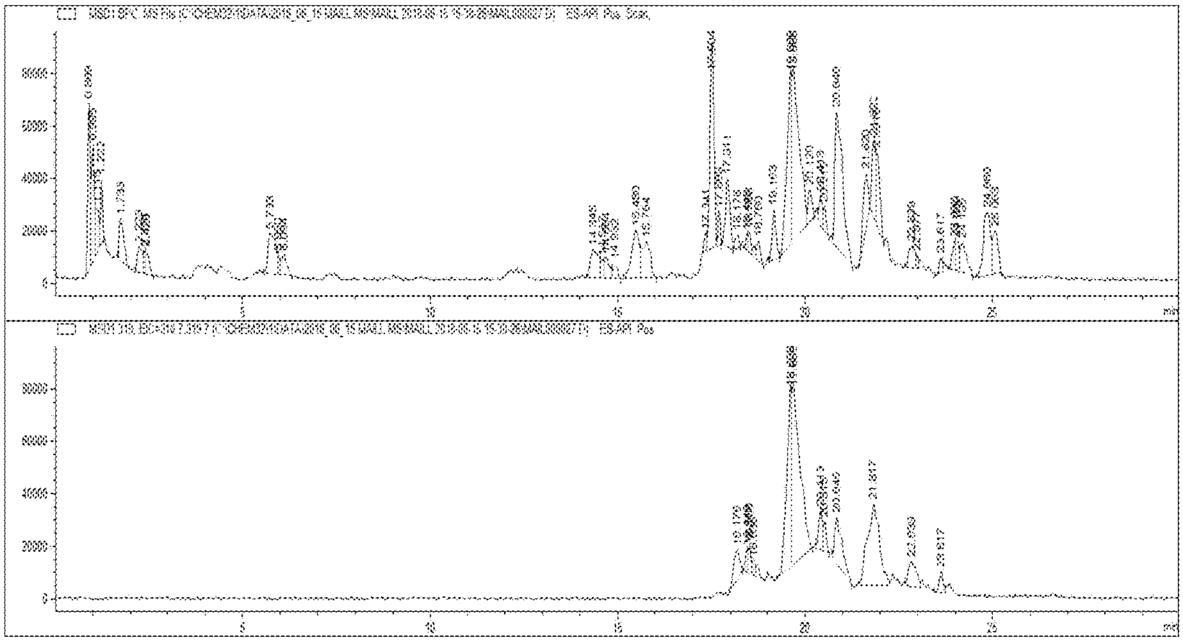
FIG. 40 depicts a chromatogram of Lys+SG Sample No. 1-1, upper lane MS-trace, lower lane UV=254 nm).

FIG. 39 is a chromatogram of Phe+SG Sample No. 1-1, upper lane MS-trace, lower lane UV=254 nm. interpretation: 3-5 min: Phe and MRI (Phe+Glu); 15-17 min: Products related to heated sugar; 17-25 min: SGs of SG Sample No. 1-1 and MRIs (Phe+SG):

FIG. 40 is a chromatogram of Lys+SG Sample No. 1-1, upper lane MS-trace, lower lane UV=254 nm. Interpretation: 7 min: MRI (Lys+Glu); 15-17 min: Products related to heated sugar; 17-25 min: SGs of SG Sample No. 1-1 and MR:1s (Lys-SG).

Figure 41:
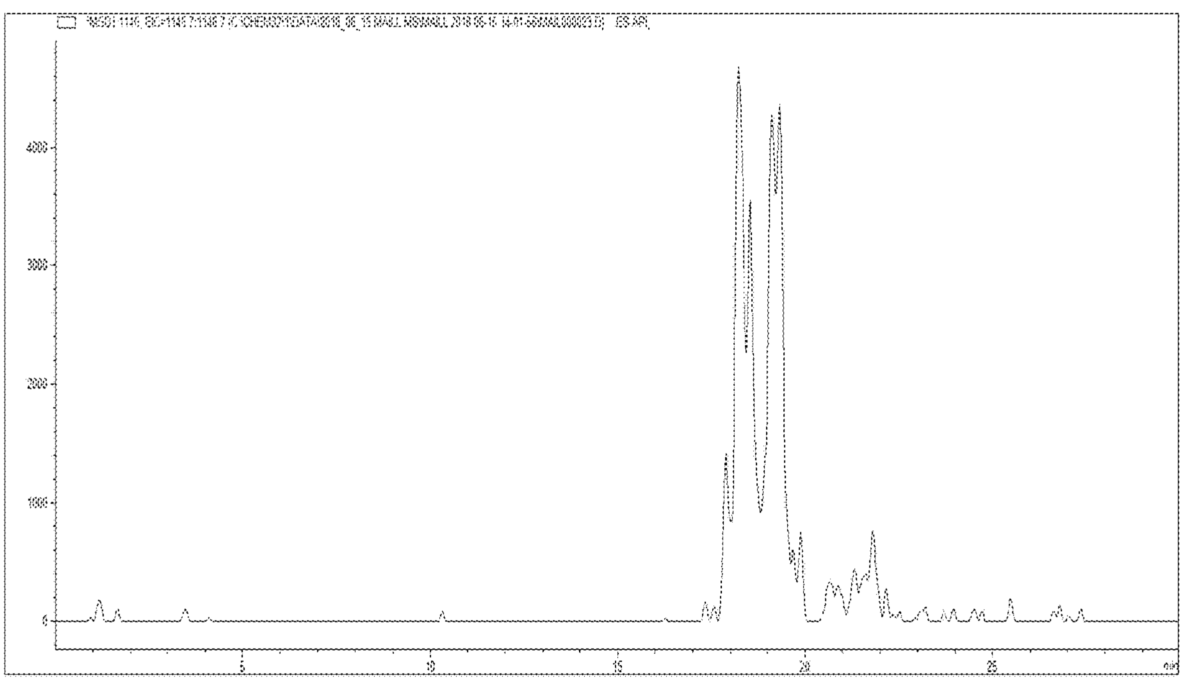
FIG. 41 depicts a chromatogram of Phe+SG Sample No. 1-1, m/z=1146 (SIM) indicative for MRI Phe+SG (SG $m_r$=966).

FIG. 41 is a chromatogram of Phe+SG Sample No. 1-1, m/z=1146 (SIM) indicative for MRI Phe+SG (SG mr=966).

Figure 42:
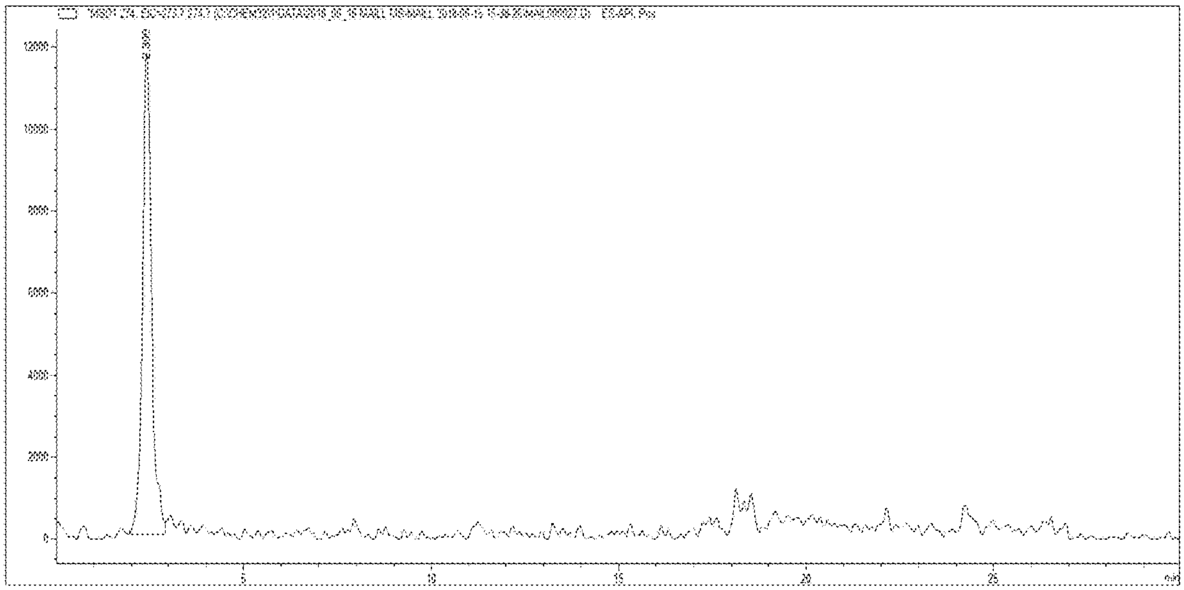
FIG. 42 depicts chromatogram of Ala+SG Sample No. 1-1, m/z=274 (SIM) indicative for MRI Ala+Glu (M+$Na^+$).

FIG. 42 is chromatogram of Ala+SG Sample No. 1-1, m/z=274 (SIM) indicative for MRI Ala+Glu ($M+Na^+$).

Figure 43:
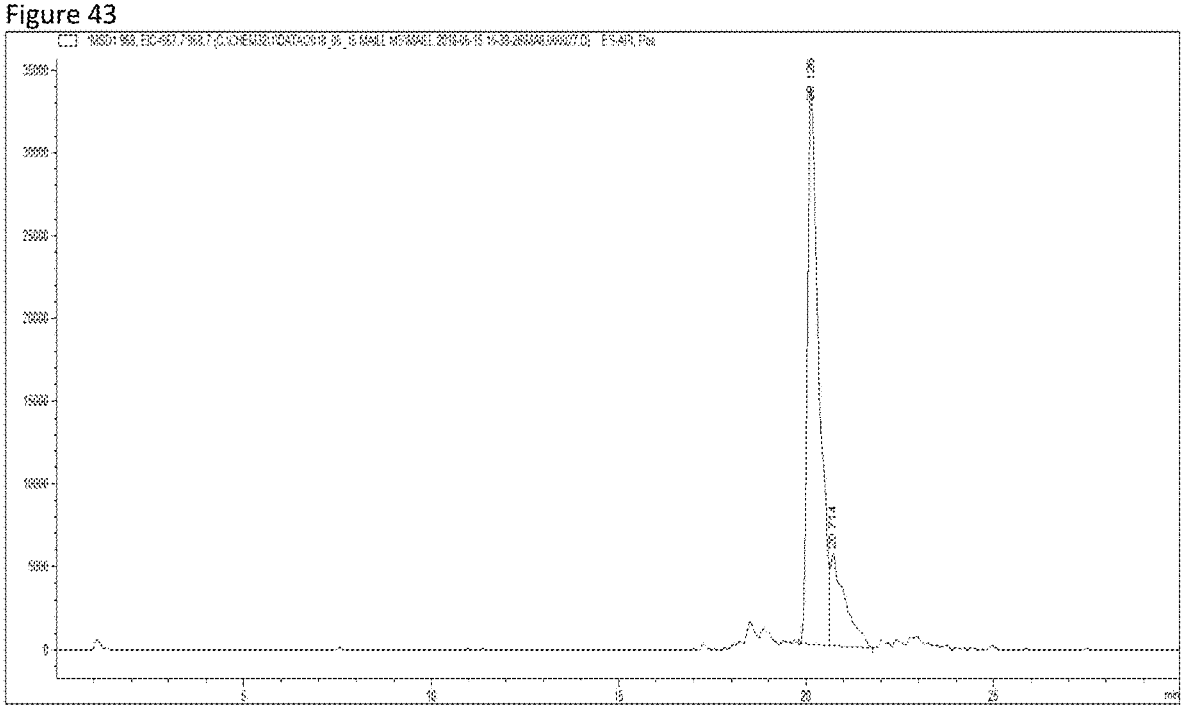
FIG. 43 depicts a chromatogram of Lys+SG Sample No. 1-1, m/z=969 (SIM) indicative for MRI Lys+SG (SG $m_r$=804, [M+$H_2O$+H]).

FIG. 43 is a chromatogram of Lys+SG Sample No. 1-1, m/z=969 (SIM) indicative for MRI Lys+SG (SG $m_r$=804, $[M+H_2O+H]$).

Figure 44:
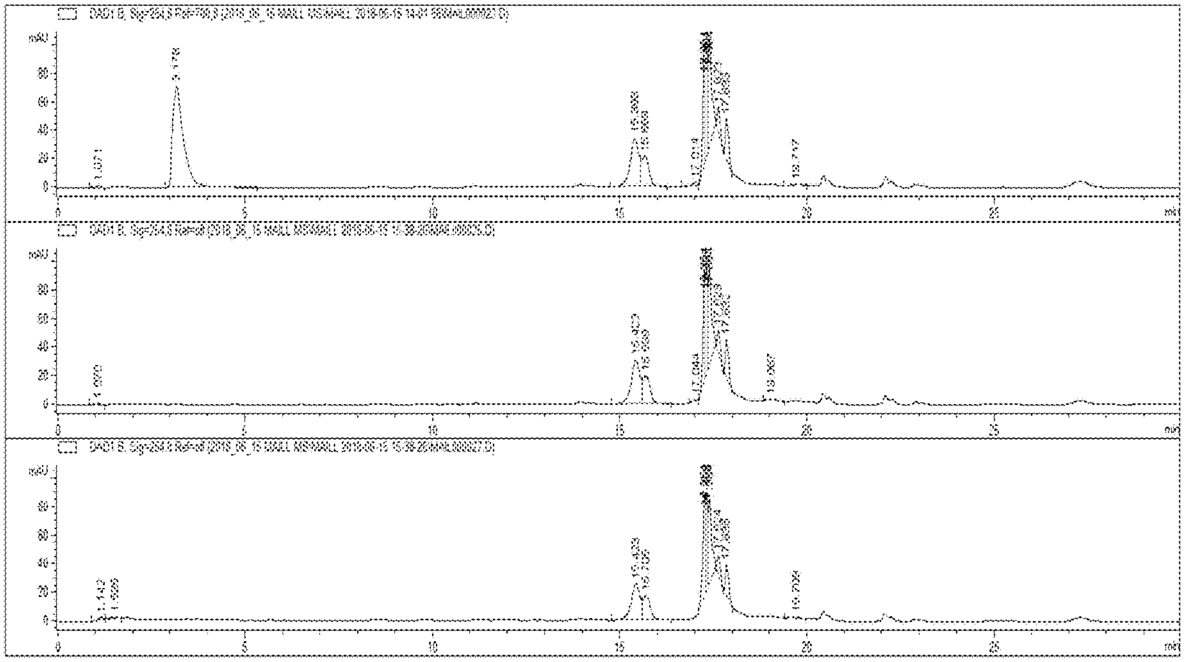
FIG. 44 depicts a chromatogram of a sugar degradation product and MS spectrum with corresponding m/z values. Upper lane Phe+SG Sample No. 1-1, medium lane Ala+SG Sample No. 1-1, lower lane Lys+SG Sample No. 1-1.

FIG. 44 is a chromatogram of a sugar degradation product and MS spectrum with corresponding m/z values. Upper lane Phe+SG Sample No. 1-1, medium lane Ala+SG Sample NO. 1-1, lower lane Lys+SG Sample No. 1-1.

Example 59

Sensory Evaluation of Amino Acids and Glc

TABLE 59.1

| Reaction partners and conditions | | | |
|---|---|---|---|
| Reaction partners | Solvent | Time, h | Temp, ° C. |
| 16.5 mg Phe + 18 mg Glc | 0.3 ml $KH_2PO_4$ buffer, pH = 7.8 | 0.3<br>0.5<br>0.6 | 170 |
| 8.91 mg Ala + 18 mg Glc | | 0.3<br>0.5<br>0.6 | 170 |
| 14.7 mg Lys + 18 mg Glc | | 0.17<br>0.5<br>0.6 | 170 |
| 12.1 mg Cys + 18 mg Glc | | 0.3<br>0.5<br>0.6 | 170 |
| 14.62 mg Glu + 18 mg Glc | | 0.17<br>0.5<br>0.6 | 170 |

TABLE 59.2

| Sensory Evaluation before reaction | | | |
|---|---|---|---|
| Reaction Partners | Smell | Color | Taste |
| 16.5 mg Phe + 18 mg Glc | Neutral | Colorless | Slightly sweet |
| 8.91 mg Ala + 18 mg Glc | Unpleasant | Colorless | Slightly sweet |
| 14.7 mg Lys + 18 mg Glc | Yeast | Slightly yellow | Slightly sweet, slightly unpleasant |
| 12.1 mg Cys + 18 mg Glc | Neutral-slightly rubber | Colorless | Slightly sweet, slightly unpleasant |
| 14.62 mg Glu + 18 mg Glc | Neutral-slightly yeasty | Colorless | Slightly sweet |

The taste test was performed as in Example 38.

TABLE 59.3

| Sensory Evaluation after reaction | | | | |
|---|---|---|---|---|
| Reaction Partners | Time, h | Smell | Color | Taste |
| 16.5 mg Phe + 18 mg Glc | 0.3 | Flowery | Brown | Neutral, salty[1)] |
| | 0.5 | Intensive flowery | Dark brown | Neutral, salty |
| | 0.6 | Intensive flowery, roasted herbs | Dark brown | Neutral, salty |
| 8.91 mg Ala + 18 mg Glc | 0.3 | Fruity | Dark brown | Neutral, salty |
| | 0.5 | Fruity, marmalade | Dark brown | Neutral, salty |
| | 0.6 | Overcooked, burnt | Dark brown | Neutral, salty |
| 14.7 mg Lys + 18 mg Glc | 0.17 | Butter cookies | Light brown | Neutral, salty |
| | 0.5 | Butter cookies | Dark brown | Neutral, salty |
| | 0.6 | Butter cookies, burnt | Dark brown | Neutral, salty |
| 12.1 mg Cys + 18 mg Glc | 0.3 | Unpleasant, sulfuric | Yellow | Neutral, salty |
| | 0.5 | Popcorn | Yellow | Neutral, salty |
| | 0.6 | Burnt starch, coal | Dark yellow | Neutral, salty |

TABLE 59.3-continued

| Sensory Evaluation after reaction | | | | |
|---|---|---|---|---|
| Reaction Partners | Time, h | Smell | Color | Taste |
| 14.62 mg Glu + 18 mg Glc | 0.17 | Meat | Light brown | Neutral, salty |
| | 0.5 | Grilled meat | Dark brown | Neutral, salty |
| | 0.6 | Intensive grilled meat | Dark brown | Neutral, salty |

[1)]slight salty taste from phosphate buffer

The taste test was performed as in Example 38.

Example 60

Sensory Evaluation of Amino Acids and xyl

TABLE 60.1

| Reaction partners and conditions | | | |
|---|---|---|---|
| Reaction partners | Solvent | Time, h | Temp, ° C. |
| 16.5 mg Phe + 15.13 mg Xyl | 0.3 ml $KH_2PO_4$ buffer, pH = 7.8 | 0.25 | 170 |
| 8.91 mg Ala + 15.13 mg Xyl | 0.3 ml $KH_2PO_4$ buffer, pH = 7.8 | | |
| 14.7 mg Lys + 15.13 mg Xyl | 0.3 ml $KH_2PO_4$ buffer, pH = 7.8 | | |
| 12.1 mg Cys + 15.13 mg Xyl | 0.3 ml $KH_2PO_4$ buffer, pH = 7.8 | | |
| 14.62 mg Glu + 15.13 mg Xyl | 0.3 ml $KH_2PO_4$ buffer, pH = 7.8 | | |

TABLE 60.2

| Sensory Evaluation after reaction | | | |
|---|---|---|---|
| Reaction Partners | Smell | Color | Taste |
| 16.5 mg Phe + 15.13 mg Xyl | Flowery | Brown | Neutral, salty[1)] |
| 8.91 mg Ala + 15.13 mg Xyl | Roasted Coffee bean, cocoa | Brown | Neutral, salty[1)] |
| 14.7 mg Lys + 15.13 mg Xyl | Butter cookie, honey | Brown | Neutral, salty[1)] |
| 12.1 mg Cys + 15.13 mg Xyl | Unpleasant, sulfuric | Brown | Neutral, salty[1)] |
| 14.62 mg Glu + 15.13 mg Xyl | Meat (Umami) | Brown | Neutral, salty[1)] |

[1)]slight salty taste from phosphate buffer

The taste test was performed as in Example 38.

Example 61

Sensory Evaluation

TABLE 61.1

| Reaction partners and conditions | | | |
|---|---|---|---|
| Reaction partners | Solvent | Time, h | Temp, ° C. |
| 16.5 mg Phe + 8.91 mg Ala + 14.7 mg Lys + 14.62 mg Glu + 18 mg Glc | 0.3 ml $KH_2PO_4$ buffer, pH = 7.8 | 0.25 | 170 |
| 16.5 mg Phe + 8.91 mg Ala + 14.7 mg Lys + 14.62 mg Glu + 15.13 mg Xyl | | | |

TABLE 61.2

| Sensory Evaluation after reaction | | | |
|---|---|---|---|
| Reaction Partners | Smell | Color | Taste |
| 16.5 mg Phe + 8.91 mg Ala + 14.7 mg Lys + 14.62 mg Glu + 18 mg Glc | Pleasant, flowery, caramel, slight "Barbecue" | Brown | Neutral, salty[1)] |
| 16.5 mg Phe + 8.91 mg Ala + 14.7 mg Lys + 14.62 mg Glu + 15.13 mg Xyl | Pleasant, honey, cacao, nuts | Brown | Neutral, salty[1)] |

[1)]slight salty taste from phosphate buffer

The taste test was performed as in Example 38.

Example 62

Sensory Evaluation of MRPs from *Stevia* Extract Samples and Amino Acids

TABLE 62.1

| Reaction partners and conditions | | | |
|---|---|---|---|
| Reaction partners | Solvent | Time, h | Temp, ° C. |
| 16.5 mg Phe + 96.5 mg SG Sample NO.-1 | 0.3 ml $KH_2PO_4$ buffer, pH = 7.8 | 0.50 | 170 |
| 16.5 mg Phe + 96.5 mg SG Sample NO.-2 | | | |
| 8.91 mg Ala + 96.5 mg SG Sample NO.-1 | | 0.67 | |
| 8.91 mg Ala + 96.5 mg SG Sample NO.-2 | | | |
| 14.7 mg Lys + 96.5 mg SG Sample NO.-1 | | 0.50 | |
| 14.7 mg Lys + 96.5 mg SG Sample NO.-2 | | | |
| 12.1 mg Cys + 96.5 mg SG Sample NO.-1 | | 1.00 | |
| 12.1 mg Cys + 96.5 mg SG Sample NO.-2 | | | |
| 14.62 mg Glu + 96.5 mg SG Sample NO.-1 | | 0.50 | |
| 14.62 mg Glu + 96.5 mg SG Sample NO.-2 | | | |

SG Sample NO.-1: Pool SG Sample NO. 1-2 to 1-9 from Example 37;
SG Sample NO.-2: Pool SG Sample NO. 2-1 to 2-3 from Example 58.
Varying times of incubation were chosen on basis of development of brown color Varying times of incubation were chosen on basis of development of brown color

TABLE 62.2

| Sensory Evaluation after reaction | | | |
|---|---|---|---|
| Reaction Partners | Smell | Color | Taste |
| 16.5 mg Phe + 96.5 mg SG Sample NO.-1 | Flowery, fruity | Brown | Slight bitter, sweet, salty[1)] |

TABLE 62.2-continued

| Sensory Evaluation after reaction | | | |
|---|---|---|---|
| Reaction Partners | Smell | Color | Taste |
| 16.5 mg Phe + 96.5 mg SG Sample NO.-2 | Flowery, fruity | Brown | Slight bitter, sweet, salty[1)] |
| 8.91 mg Ala + 96.5 mg SG Sample NO.-1 | Fruity (grape) | Brown | Slight bitter, sweet, salty[1)] |
| 8.91 mg Ala + 96.5 mg SG Sample NO.-2 | Fruity (grape) | Brown | Slight bitter, sweet, salty[1)] |
| 14.7 mg Lys + 96.5 mg SG Sample NO.-1 | Caramel | Brown | Slight bitter, sweet, salty[1)] |
| 14.7 mg Lys + 96.5 mg SG Sample NO.-2 | Cookies, Honey | Brown | Slight bitter, sweet, salty[1)] |
| 12.1 mg Cys + 96.5 mg SG Sample NO.-1 | Unpleasant, sulfuric | Brown | Slight bitter, sweet, salty[1)] |
| 12.1 mg Cys + 96.5 mg SG Sample NO.-2 | Unpleasant, sulfuric | Brown | Slight bitter, sweet, salty[1)] |
| 14.62 mg Glu + 96.5 mg SG Sample NO.-1 | Unpleasant, algae | Brown | Slight bitter, sweet, salty[1)] |
| 14.62 mg Glu + 96.5 mg SG Sample NO.-2 | Artificial (lemonade) | Brown | Slight bitter, sweet, salty[1)] |

[1)]slight salty taste from phosphate buffer

The taste test was performed as in Example 38.

Sensory Analysis

All samples were assessed at 22° C. after the Maillard reaction was stopped by placing the sealed vials in an ice bath. After 20 minutes in the ice bath the sealed vials were put in a water bath set to 22° C.

The odor/smell was assessed independently by 3 persons; the final description was agreed after discussion. The color was assessed by 1 person using sugar color reference solution to compare for no color, slightly yellow, yellow, deep yellow and brown. The taste was assessed independently by 3 persons either in the original samples or after appropriate dilution to achieve relevant concentrations of sugars and steviol-glycosides (i.e. 5-9% SE); the final description was agreed after discussion.

Example 63

Exhausting Maillard Reaction for Amino Donor

Reaction Conditions:

1 mM phenylalanine and 10 mM glucose were dissolved in 0.1 $KH_2PO_4$-buffer (pH=7.2) and heated to 120° C. for up to 5 hours.

Figure 45:
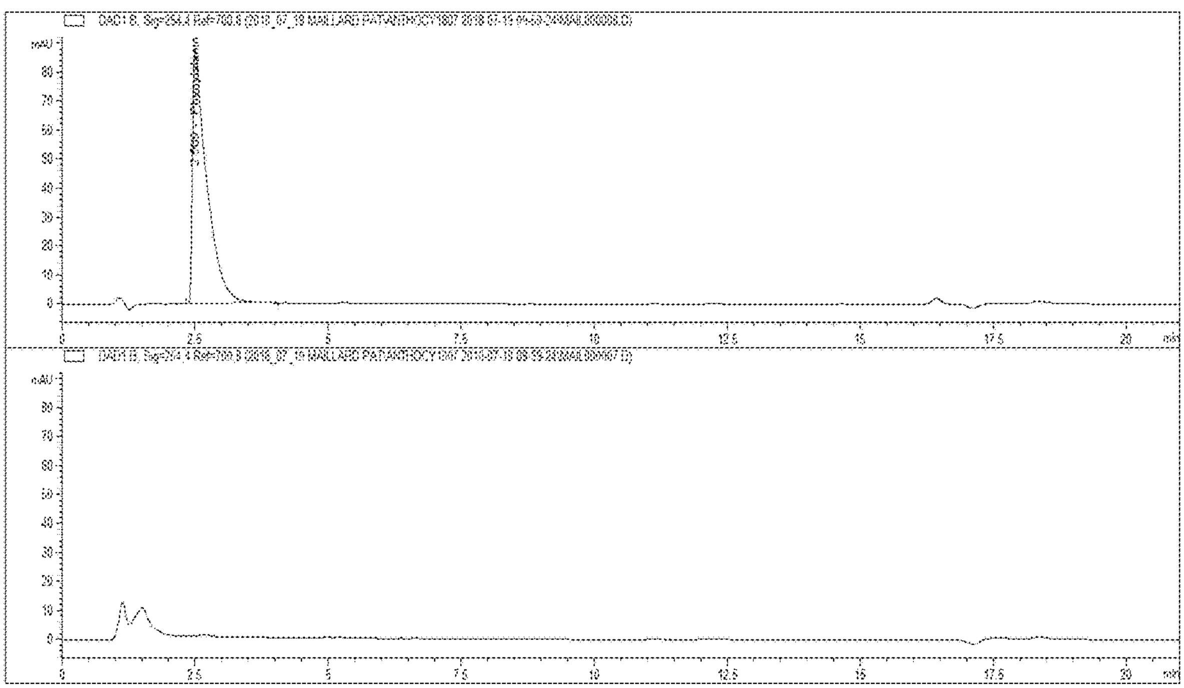
FIG. 45 depicts a chromatogram (UV/VIS=254 nm), upper lane starting concentration of phenyl alanine, lower lane end concentration of phenylalanine.
Figure 46:
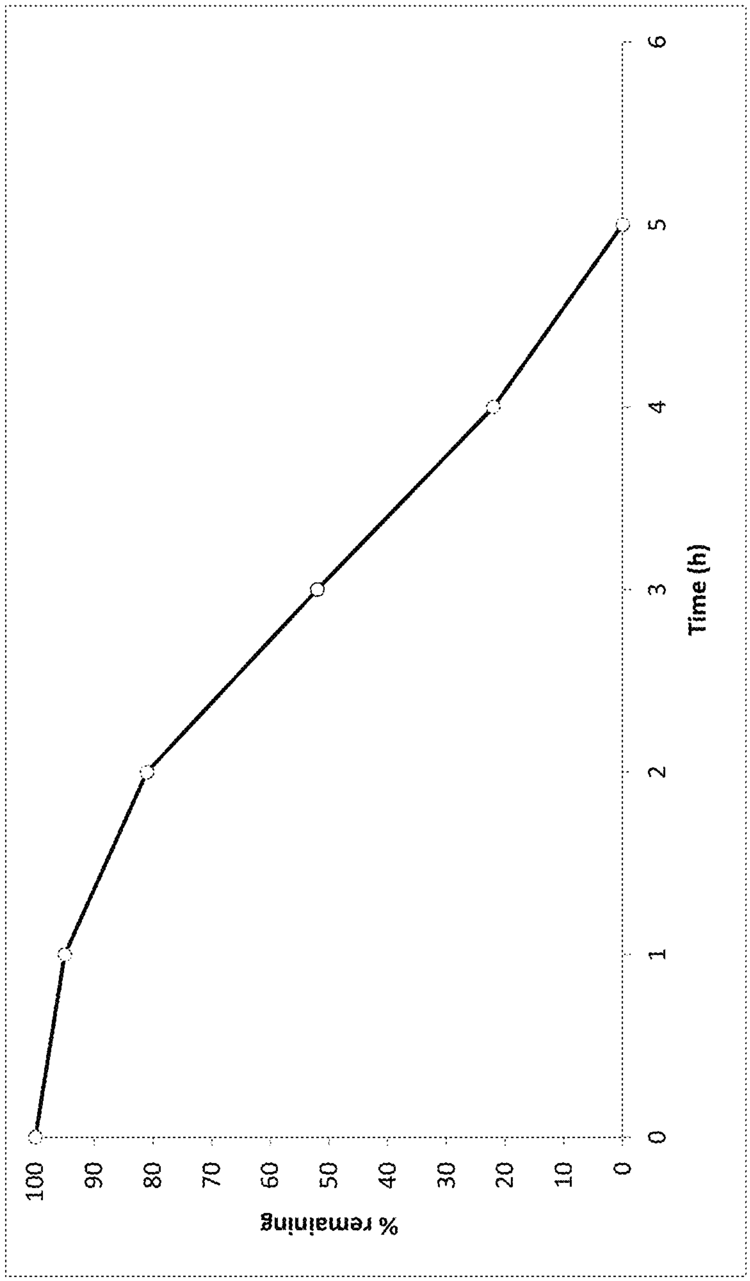
FIG. 46 depicts the decay of phenylalanine at 120° C. over time.

Analytical Evaluation:

As seen in FIG. 45, the amino acid was totally consumed under the reaction conditions described after 5 hours. The kinetics of the decay is shown in FIG. 46.

Sensory Evaluation:

The reaction mixture was almost odorless with a faint of burnt sugar, color is described as slightly yellow, taste was neutral.

Exhausting Maillard Reaction for Sugar Donor

Reaction Conditions:

10 mM phenylalanine and 1 mM glucose were dissolved in 0.1 M $KH_2PO_4$-buffer (pH=7.2) and heated to 120° C. for up to 5 hours.

Figure 47:
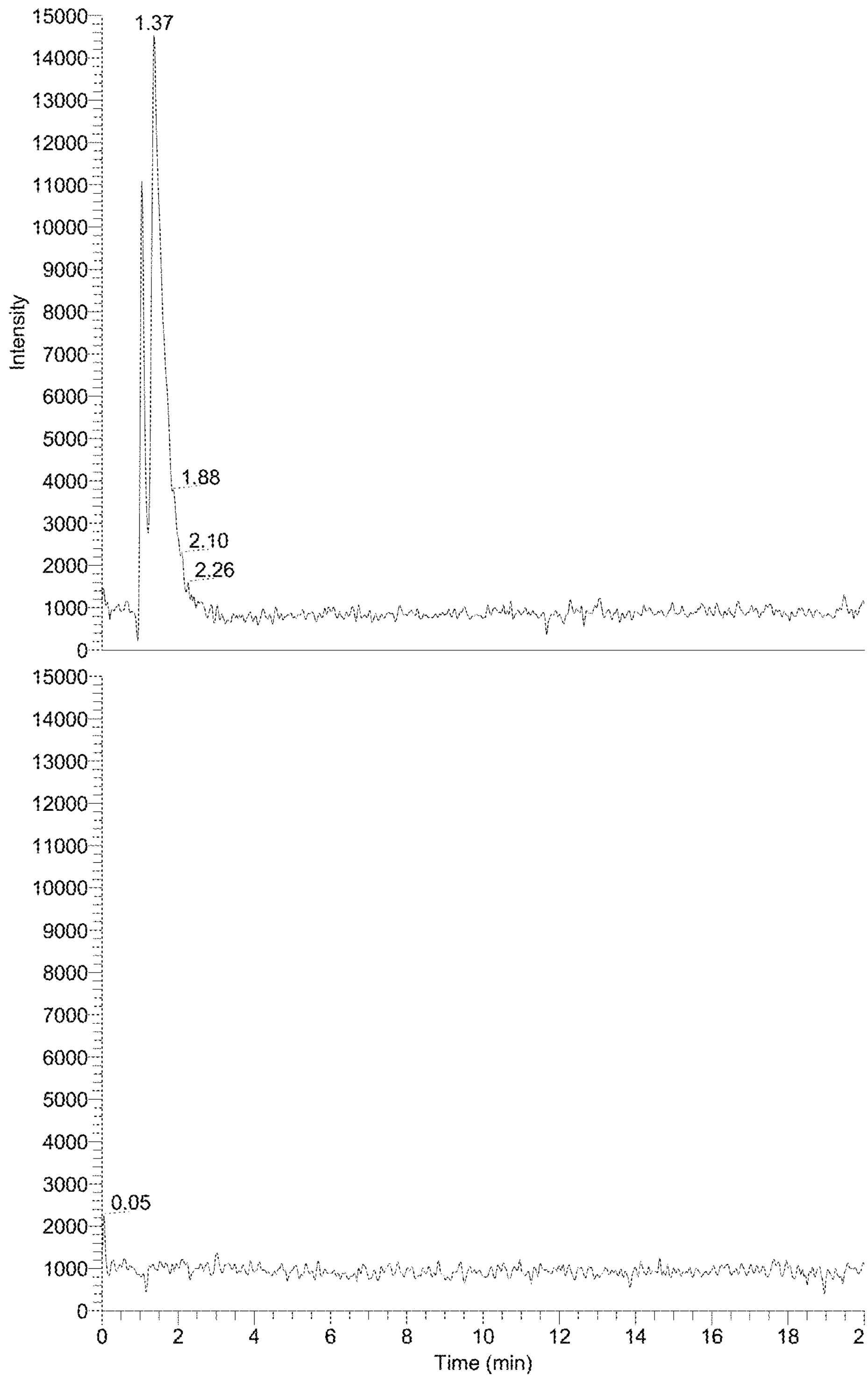
FIG. 47 depicts a chromatogram (MS/SIM m/z=175 [M+Na]$^+$), upper lane starting concentration of glucose, lower lane end concentration of glucose.
Figure 48:
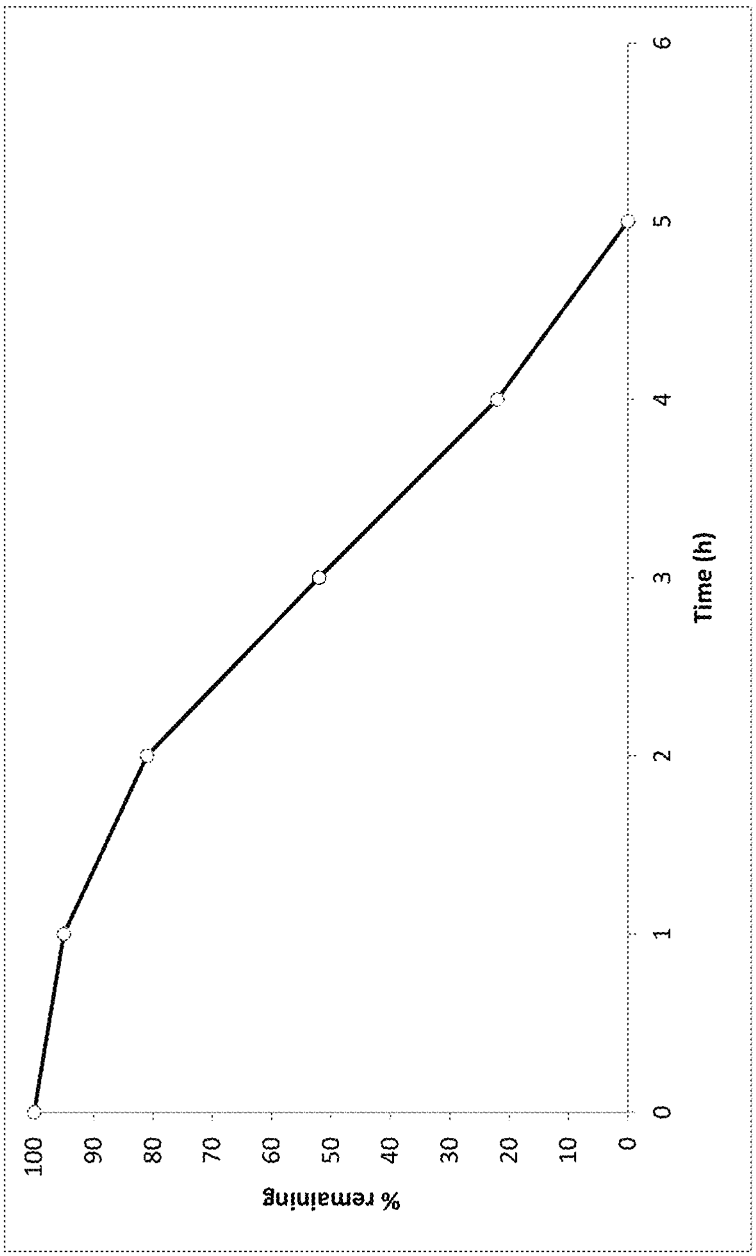
FIG. 48 depicts the decay of glucose at 120° C. over time.

Analytical Evaluation:

As seen in FIG. 47, the carbohydrate was totally consumed under the reaction conditions described after 5 hours. The kinetics of the decay is shown in FIG. 48.

Sensory Evaluation:

The reaction mixture has a strong honey-like odor note of caramel, color is described as yellow, taste was neutral.

Sensory Evaluation of MRPs prepared under exhausting conditions

Reaction Conditions 1 mM amino acid and 10 mM sugar or 1 mkt amino acid and 1 mM sugar were dissolved in 0.1 M $KH_2PO_4$-buffer (pH=7.2) and heated to 120° C. for 5 hours. These conditions were shown to yield exhausting conditions for either the amino- or the sugar-donor in case of phenylalanine and glucose.

As an amino donor, phenylalanine, alanine and lysine (the 2 latter amino acids are well known to react quicker than phenylalanine) and as a sugar donor glucose and xylose (again the latter is well known to react quicker than glucose).

Sensory Evaluation

Sensory evaluation was performed by a group of five experienced tasters. The test result represents the joint decision of the tasters and is reported if at least four tasters confirmed the result.

In a prior training session, mouth feel was trained with water against 0.05% xanthan solution in water, an acesulfame/water solution against an equi-sweet sugar solution and a mixed berry juice against an exotic fruit juice (main component mango).

The rating was fixed to: 1-void taste (water), 2-weak mouthfeel, 3-mediummouth feel, 4-strong mouthfeel (0.05% xanthan solution).

TABLE 63.1

| Exhausted component | Excessive component | Sensory evaluation (mouth feel) |
|---|---|---|
| Glucose | Phenylalanine | 1 |
| | Alanine | 1-2 |
| | Lysine | 1 |
| Xylose | Phenylalanine | 1-2 |
| | Alanine | 2 |
| | Lysine | 1-2 |
| Phenylalanine | Glucose | 2 |
| | Xylose | 2-3 |
| Alanine | Glucose | 3 |
| | Xylose | 3 |
| Lysine | Glucose | 2-3 |
| | Xylose | 2-3 |

The taste test was performed as in Example 38.

In summary, it is considered that mouth feel is more pronounced if the amino-donor is consumed during the reaction when compared to the carbohydrate-source.

Example 64

Assay to Test Reducing Power

Reagents:

0.2 M Sodium phosphate buffer, pH=6.6; 500 mg Potassium ferric(III)cyanide/50 mL water. 10% Trichloroacetic acid; 20 mg Iron-III-Chloride/20 mL water; Calibration samples were prepared with Ascorbic acid in a concentration of 0-100 μg/mL 0.2 M Sodium phosphate buffer, pH=6.6 (freshly prepared); as negative control sample water was used.

Samples in aqueous solution were used as such or diluted in 0.2 M Sodium phosphate buffer, pH=6.6.

Test Assay:

A 1 mL sample (or calibration standard) was mixed with 1 mL 0.2 M Sodium phosphate buffer, pH=6.6 and 1 mL Potassium ferricyanide solution. The sample was incubated and protected from light at 50° C. for 20 min.

To the solution was added 1 mL Trichloroacetic acid with thorough mixing.

A 1 mL of the mixture was diluted with 1 mL $H_2O$ and 0.2 mL Iron-III-chloride and reacted for 10 minutes; The absorbance was then determined at 700 nm against $H_2O$.

Example 65

Assay to Test DPPH Radical-Scavenging Activity

Reagents:

1 mg 1,1-Diphenyl-2-picrylhydrazyl radical (DPPH)/ml ethanol, dilution to assay concentration were prepared in ethanol (40 μg/mL); Calibration samples were prepared with Ascorbic acid in a concentration of 0-10 μg/mL; as a negative control sample, water was used.

Samples in aqueous solution were used as such or diluted with water.

Test Assay:

A 0.1 ml sample (or calibration standard) was mixed with 3.9 ml solution of DPPH (100 μMolar) and reacted while protected from light at room temperature for 30 min. Absorbance was determined at 517 nm against ethanol.

Test Samples 10 ml of amino acid and/or 10 mM sugar were dissolved in 10 ml 0.1 mM $KH_2PO_4$-buffer, pH=7.8.

The samples were kept at 100° C. in sealed glass vials (Pyrex 15 ml with screw caps) for 0 (before reaction), 2.5 or 5.0 hours. Thereafter the samples were transferred to an ice water bath and cooled down to room temperature. These samples were diluted 1:10 and used for the test assay for anti-oxidant potential.

TABLE 65.1

| sample combinations prepared | | |
|---|---|---|
| Amino Acid | Sugar | Sample Annotations |
| — | Reb-A | Reb 0 h, Reb-A 2.5 h, Reb-A 5.0 h |
| Arginine | Reb-A | ArgReb 0 h, ArgReb 2.5 h, ArgReb 5.0 h |
| Phenylalanine | Reb-A | PheReb 0 h, PheReb 2.5 h, PheReb 5.0 h |
| Alanine | Reb-A | AlaReb 0 h, AlaReb 2.5 h, AlaReb 5.0 h |
| Glutaminic Acid | Reb-A | GltReb 0 h, GltReb 2.5 h, GltReb 5.0 h |

Figure 49:
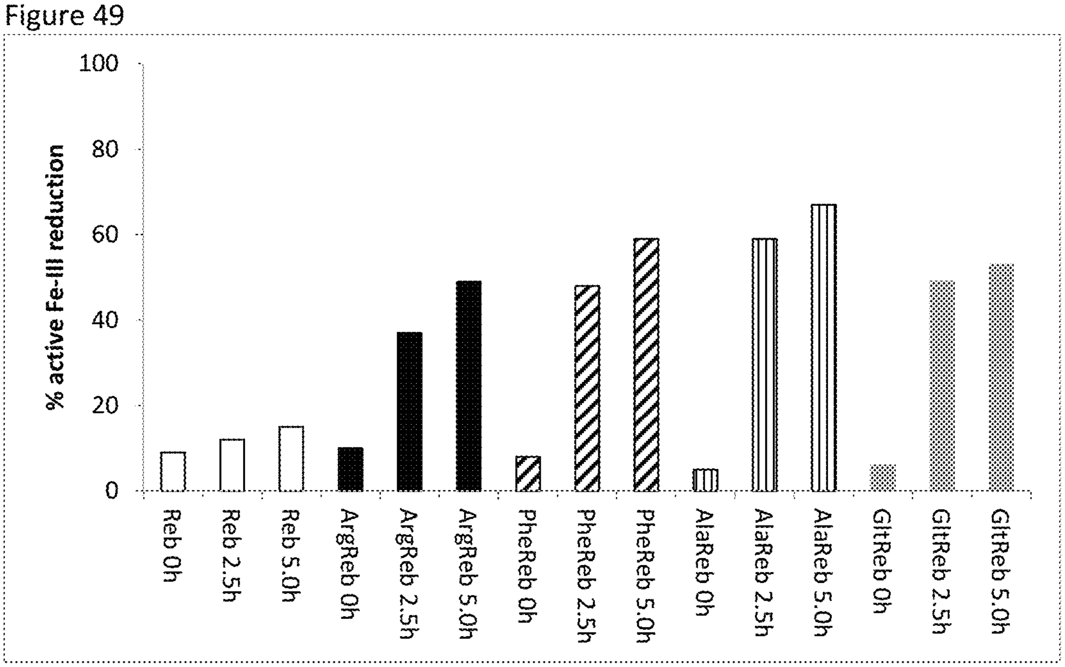
FIG. 49 shows active iron-III reduction of combinations of amino acids and Reb-A.

FIG. 49 shows active iron-III reduction of combinations of amino acids and Reb-A.

Figure 50:
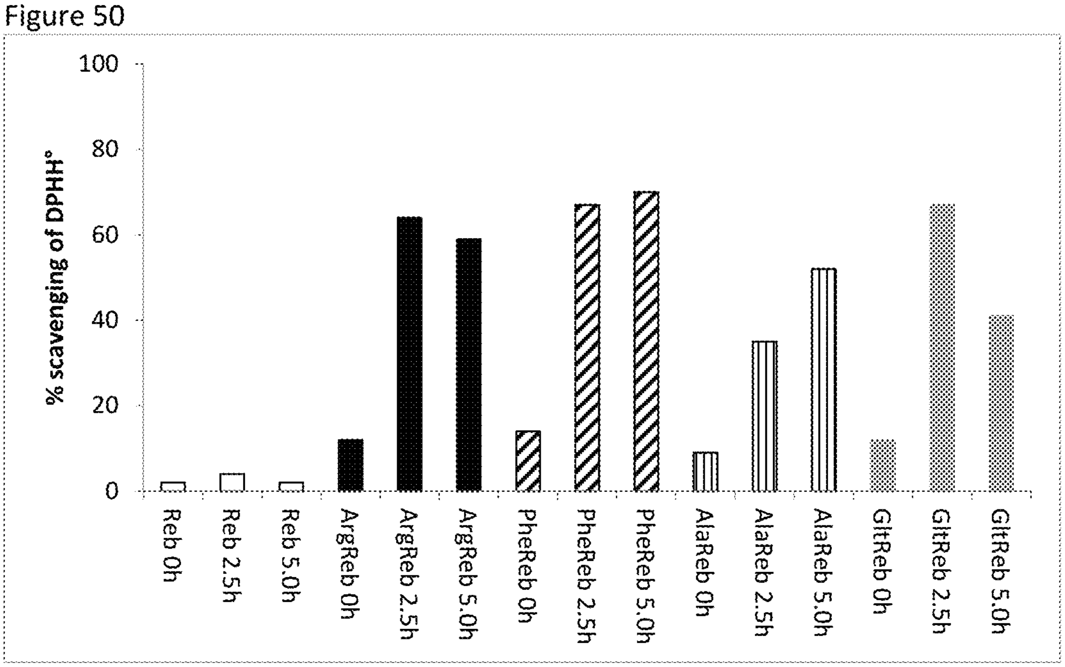
FIG. 50 shows radical scavenging properties of combinations of amino acids and Reb-A.

FIG. 50 shows radical scavenging properties of combinations of amino acids and Reb-A showed substantial anti-oxidant properties, although the effect was less pronounced than observed for glucose or xylose under the same conditions.

Example 66

The Relationship Between the Taste Profile of Flora Taste *Stevia* and the Ratio of Xylose to Phenylalanine

*Stevia* Extract Material:

*Stevia* extract: the product of Example 37, final powder.

Common Process:

Blend xylose and phenylalanine designated as X&P mixture. The *Stevia* extract material was dissolved together with the X&P mixture in deionized water to make the solids content to 67%. A pH regulator was not added and the pH was about 5. The solution was heated at about 100 degrees centigrade for 2 hours. When the reaction was complete, the slurry was dried by spray dryer to provide an off white powder MRP.

Experiments

Several MRPs in this Example were prepared. Each sample was evaluated according to above sensory evaluation method and the resulting data were the average of the panel. The reaction parameters and the taste profile of the products are as follow. Note that according to the sensory evaluation method, the mouth feel and sweet profile were evaluated based on the same sweetness. That is to say in those evaluations the concentrations of *Stevia* extract in all sample solutions are the same, 250 ppm.

TABLE 66.1

| Sample # | Ratio of xylose to phenylalanine w/w | Weight of *Stevia* extract | Weight of xylose | Weight of phenylalanine |
|---|---|---|---|---|
| 66-01 | 5/1 | 4 g | 0.83 g | 0.17 g |
| 66-02 | 3/1 | 4 g | 0.75 g | 0.25 g |
| 66-03 | 1/1 | 4 g | 0.5 g | 0.5 g |
| 66-04 | 1/3 | 4 g | 0.25 g | 0.75 g |
| 66-05 | 1/5 | 4 g | 0.17 g | 0.83 g |

TABLE 66.2

| | | Sensory evaluation | | | | | | | | |
|---|---|---|---|---|---|---|---|---|---|---|
| | | flavor intensity | | | | sweet profile | | | | |
| Sample # | flavor | Odor intensity | Flavor taste intensity | Score of flavor intensity | mouth feel kokumi | Sweet lingering | bitterness | Metallic after taste | Score of sweet profile | Overall likeability |
| 66-01 | flora | 2 | 1 | 1.5 | 2 | 2 | 1 | 1 | 3.67 | 2.39 |
| 66-02 | | 3 | 3 | 3 | 3 | 2 | 1 | 1 | 3.67 | 3.22 |
| 66-03 | | 3 | 2 | 2.5 | 3 | 2 | 1 | 1 | 3.67 | 3.06 |
| 66-04 | | 3 | 3 | 3 | 2 | 2 | 1 | 1 | 3.67 | 2.89 |
| 66-05 | | 1 | 1 | 1 | 4 | 2 | 1 | 1 | 3.67 | 2.89 |

The taste test was performed as in Example 39.

Figure 51:
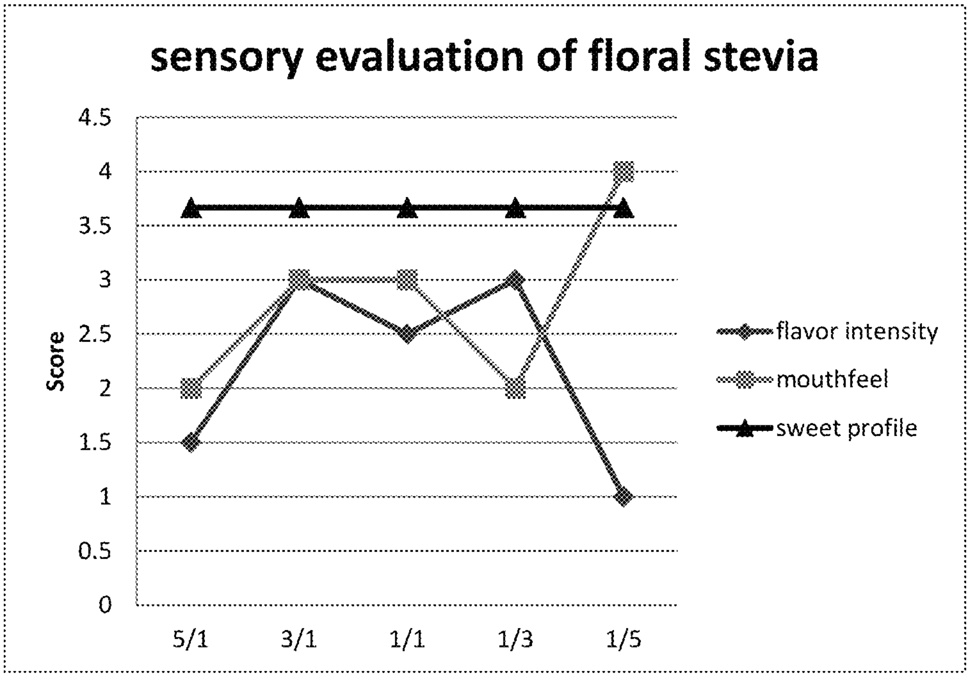
FIG. 51 shows the relationship between the sensory evaluation results to the ratio of xylose to phenylalanine.

FIG. 51 shows the relationship between the sensory evaluation results to the ratio of xylose to phenylalanine in the above example.

Figure 52:
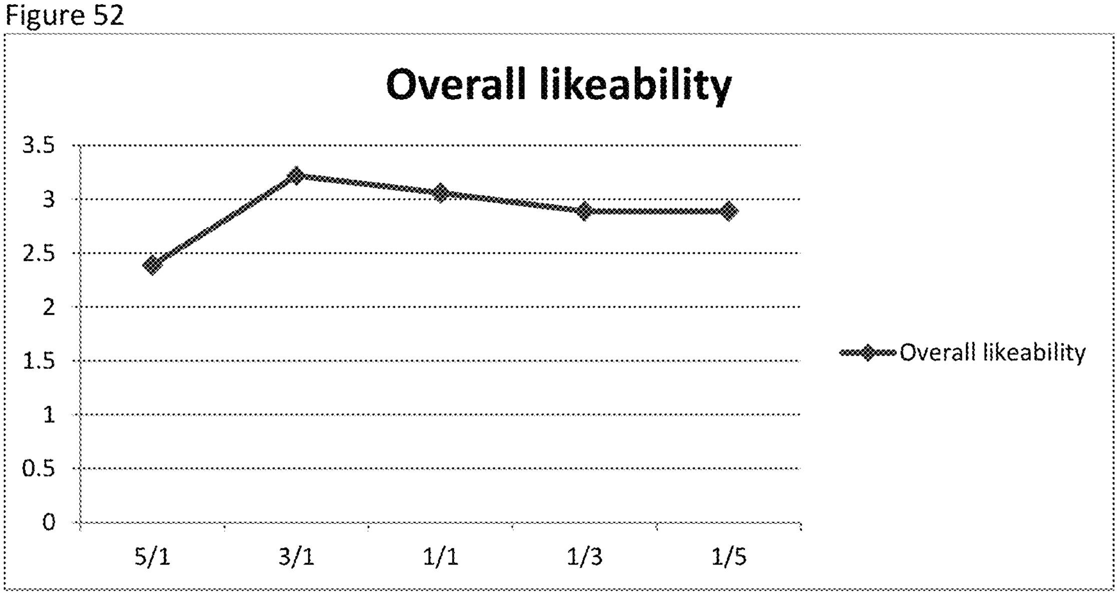
FIG. 52 shows the relationship between the Overall likeability score to the ratio of xylose to phenylalanine.

FIG. 52 shows the relationship between the Overall likeability score to the ratio of xylose to phenylalanine in example above.

As can be seen from the overall likeability data, with the ratio of xylose to phenylalanine ranging from 5/1 to 1/5, the products provided good taste (score >2.5), especially when the ratio of xylose to phenylalanine ranges from 3/1 to 1/1, the products provided excellent taste (score >3).

Example 67

Preparation of Flora MRP 80 g RA20/TSG(9)95 (available from Sweet Green Fields) was dissolved together with 6.7 g phenylalanine and 13.3 g xylose in 50 ml deionized water. The mixture was stirred and heated at about 95-100 degrees centigrade for about 2 hours. When the reaction was complete, the solution was spray dried to provide about 95 g of an off white powder, named Flora MRP.

Example 68

Preparation of Caramel MRP 60 g RA20/TSG(9)95 (available from Sweet Green Fields) was dissolved together with 10 g alanine and 30 g xylose in 50 ml deionized water. The mixture was stirred and heated to about 95-100 degrees centigrade for about 2 hours. When the reaction was complete, the solution was spray dried to provide about 95 g of an off white powder, named Caramel MRP.

Example 69

Effect of Flora MRP on Taste Modification of Black Coffee

Materials:

Sugar

Flora MRP, the Product of Example 67

RA60/TSG(9)95, available from Sweet Green Fields

Coffee beans: Brazilian flavor coffee beans (Mings coffee selection series, available from SHANGHAI Mings Foods Group CO, LTD)

Coffee Maker:

Delonghi Magnifica S ECAM 21.117. SB

Sample Preparation

Coffee beans and coffee maker were used to make three cups of black coffee, 180 ml for each.

To the coffee was added 9 g sugar, 60 mg Flora MRP or 45 mg RA60/TSG(9)95, respectively.

Sensory Evaluation

Figure 53:
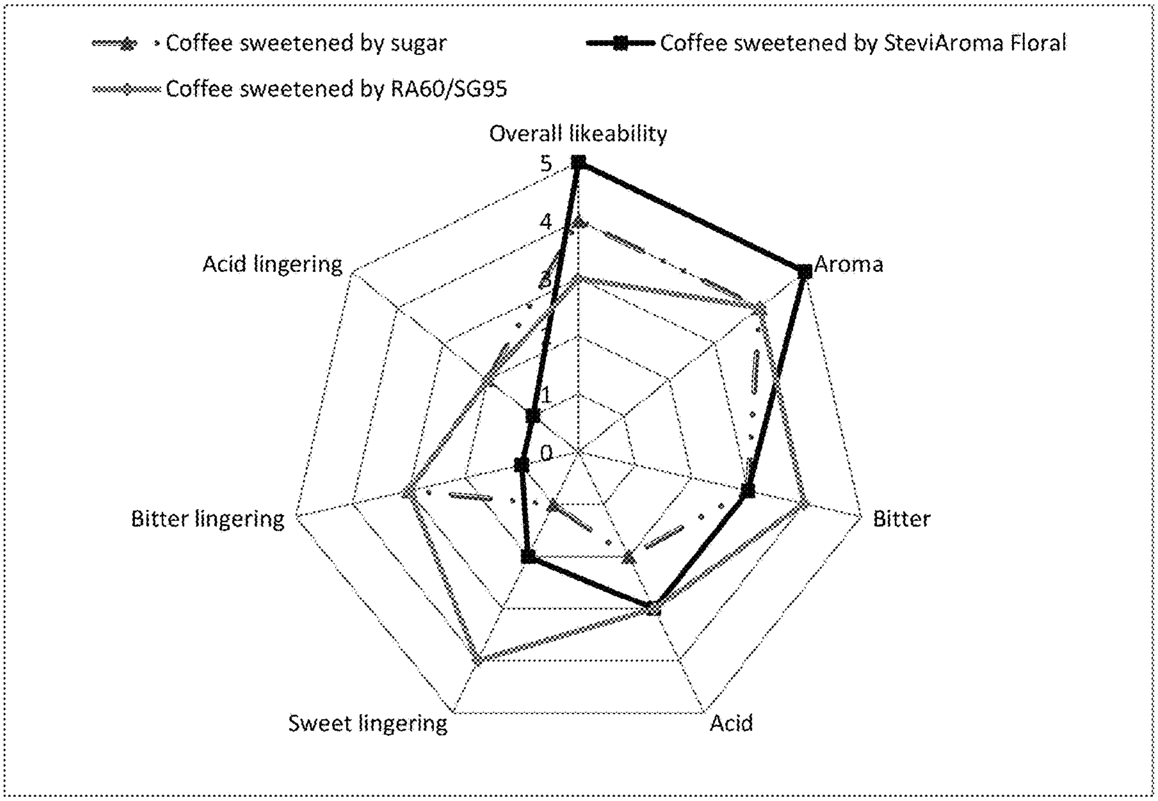
FIG. 53 shows the sensory evaluation with respect to coffee sweetened with sugar, RA60/SG95 or with Flora MRP.

A panel of six persons tasted the coffee samples and gave scores to the following aspects. The average score of each aspect was shown in the table below and FIG. 53. Method: For evaluation of the taste profile, the samples were tested by a panel of six people. The panel was asked to describe the taste profile and score values between 0-5 according to the increasing intensity of aroma, bitter, acid, sweet lingering, bitter lingering and acid lingering. I trained taster tasted independently the samples first. The tester was allowed to re-taste, and then made notes for the sensory attributes perceived. Afterwards, another 5 tasters tasted the samples and the attributes were noted and discussed openly to find a suitable description. In case that more than 1 taster disagreed with the result, the tasting was repeated. For example, a "5" for intensity of aroma is the best score for having a strong pleasant smell and conversely a value of 0 or near zero means the smell is very slight. Similarly, a "5" for bitter, acid, sweet lingering, bitter lingering or acid lingering is not desired. A value of zero or near zero means that the bitter, acid, sweet lingering, bitter lingering or acid lingering is reduced or is removed.

TABLE 69.1

| sample | Overall like-ability | Aroma | Bitter | Acid | Sweet linger-ing | Bitter linger-ing | Acid linger-ing |
|---|---|---|---|---|---|---|---|
| Coffee sweetened by sugar | 4 | 4 | 3 | 2 | 1 | 3 | 2 |
| Coffee sweetened by Flora MRP | 5 | 5 | 3 | 3 | 2 | 1 | 1 |
| Coffee sweetened by RA60/ TSG(9)95 | 3 | 4 | 4 | 3 | 4 | 3 | 2 |

As can be seen, the taste profile of coffee sweetened by a MRP is much better than that of coffee sweetened by traditional *Stevia* extract product (such as RA60/TSG95) by significantly cutting lingering and decreasing the bitter. Also, coffee sweetened by Flora MRP shows a more obvious effect of masking the bitter and acid aftertaste than sugar.

Example 70

Effect of Flora MRP and/or Thaumatin on the Taste Modification of Energy Drink

Materials:

Flora MRP, the product of Example 67

Thaumatin, 1000 ppm concentrate, available from EPC Natural products CO., Ltd.

Energy drink:

Red Bull sugar free, sweetened with sucralose and ACE-K, produced by Red Bull Gmbh Monster energy, sweetened by sugar, glucose and sucralose, produced by Monster Energy Company.

Sample Preparation

Add a defined amount of Flora MRP powder or thaumatin concentrate to the energy drink. The sample details are as follow.

TABLE 70.1

| Sample # | Sample base | Concentration of Flora MRP in the base | Concentration of thaumatin in the base |
|---|---|---|---|
| 70-1 | Red Bull sugar free | — | — |
| 70-2 | Red Bull sugar free | — | 2 ppm |
| 70-3 | Red Bull sugar free | 100 ppm | 1 ppm |
| 70-4 | Monster energy | — | — |
| 70-5 | Monster energy | — | 2 ppm |
| 70-6 | Monster energy | 100 ppm | 1 ppm |

Sensory Evaluation

Figure 54:
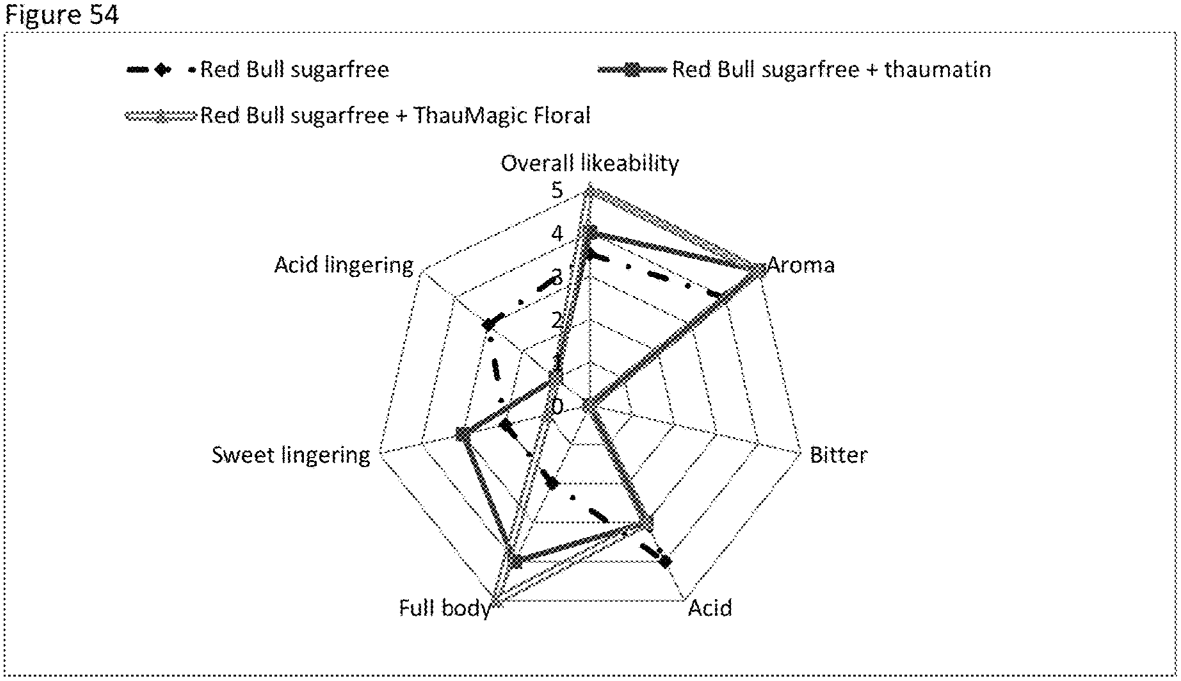
FIG. 54 shows the sensory evaluation with respect to Red Bull sugar free with thaumatin or thaumatin and Flora MRP.
Figure 55:
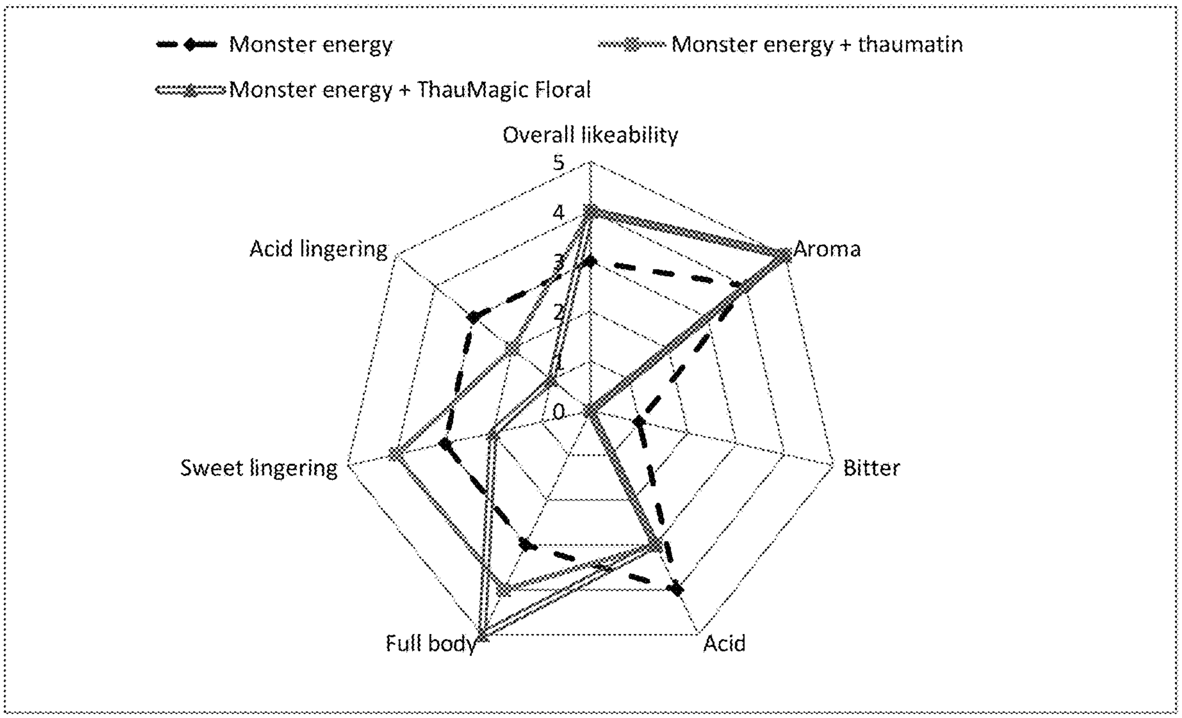
FIG. 55 shows the sensory evaluation with respect to Monster Energy drink with thaumatin or thaumatin and Flora MRP.

A panel of six persons tasted the samples and gave scores to the following aspects. The average score of each aspect was shown in the table below and FIGS. 54 and 55.

TABLE 70.2

| sample | Overall likeability | Aroma | Bitter | Acid | Full body | Sweet lingering | Acid lingering |
|---|---|---|---|---|---|---|---|
| 70-1 | 3.5 | 4 | 0 | 4 | 2 | 2 | 3 |
| 70-2 | 4 | 5 | 0 | 3 | 4 | 3 | 1 |
| 70-3 | 5 | 5 | 0 | 3 | 5 | 1 | 1 |
| 70-4 | 3 | 4 | 1 | 4 | 3 | 3 | 3 |
| 70-5 | 4 | 5 | 0 | 3 | 4 | 4 | 2 |
| 70-6 | 4 | 5 | 0 | 3 | 5 | 2 | 1 |

As can be seen, the taste profile of the energy drink can be improved by thaumatin or Flora MRP. The mouth feel of the bases is flat, especially for the Red Bull. Sugar free which is sweetened only by artificial sweeteners. When adding thaumatin, the mouth feel becomes very full. When Flora MRP and thaumatin are used together, the full body mouth feel continues to increase as well as the sweet lingering and acid lingering can be masked. The acid and sweet taste in the drinks are more harmonious. Method: For evaluation of the taste profile, the samples were tested by a panel of six people. The panel was asked to describe the taste profile and score values between 0-5 according to the increasing intensity of aroma, bitter, acid, sweet lingering, bitter lingering and acid lingering. 1 trained taster tasted independently the samples first. The tester was allowed to re-taste, and then made notes for the sensory attributes perceived. Afterwards, another 5 tasters tasted the samples and the attributes were noted and discussed openly to find a suitable description. In case that more than 1 taster disagreed with the result, the tasting was repeated. For example, a "5" for intensity of aroma is the best score for having a strong pleasant smell and conversely a value of 0 or near zero means the smell is very slight. Similarly, a "5" for bitter, acid, sweet lingering, bitter lingering or acid lingering is not desired. A value of zero or near zero means that the bitter, acid, sweet lingering, bitter lingering or acid lingering is reduced or is removed.

Example 71

Effect of Flora MRP, Caramel MRP and/or Thaumatin on the Taste Modification of Coffee Drink Materials:

Flora MRP, the product of Example 67

Caramel MRP, the product of Example 68

Thaumatin, 1000 ppm concentrate, available from EPC Natural products CO., Ltd.

Coffee drink:

Starbucks Frappuccino, Vanilla, available from Starbucks.

Starbucks Frappuccino, Caramel, available from Starbucks.

Sample Preparation

Add a designated amount of Flora MRP powder, Caramel MRP powder or thaumatin concentrate to the coffee drink. The sample details are as follow.

TABLE 71.1

| Sample # | Sample base | Concentration of Flora MRP in the base | Concentration of Caramel MRP in the base | Concentration of thaumatin in the base |
|---|---|---|---|---|
| 71-1 | Starbucks Frappuccino, Vanilla | — | — | — |
| 71-2 | Starbucks Frappuccino, Vanilla | — | — | 2 ppm |
| 71-3 | Starbucks Frappuccino, Vanilla | 100 ppm | — | 1 ppm |
| 71-4 | Starbucks Frappuccino, Caramel | — | — | — |
| 71-5 | Starbucks Frappuccino, Caramel | — | — | 2 ppm |
| 71-6 | Starbucks Frappuccino, Caramel | — | 100 ppm | 1 ppm |

Sensory Evaluation

Figure 56:
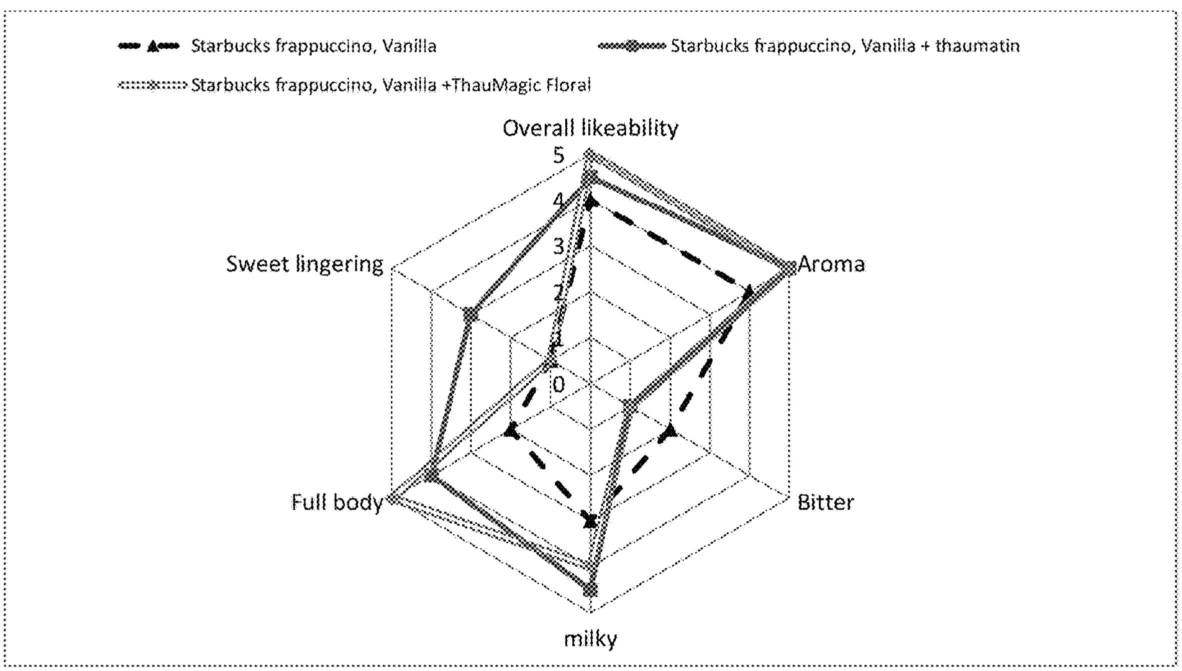
FIG. 56 shows the sensory evaluation with respect to Starbucks vanilla Frappuccino with thaumatin or thaumatin and Flora MRP.
Figure 57:
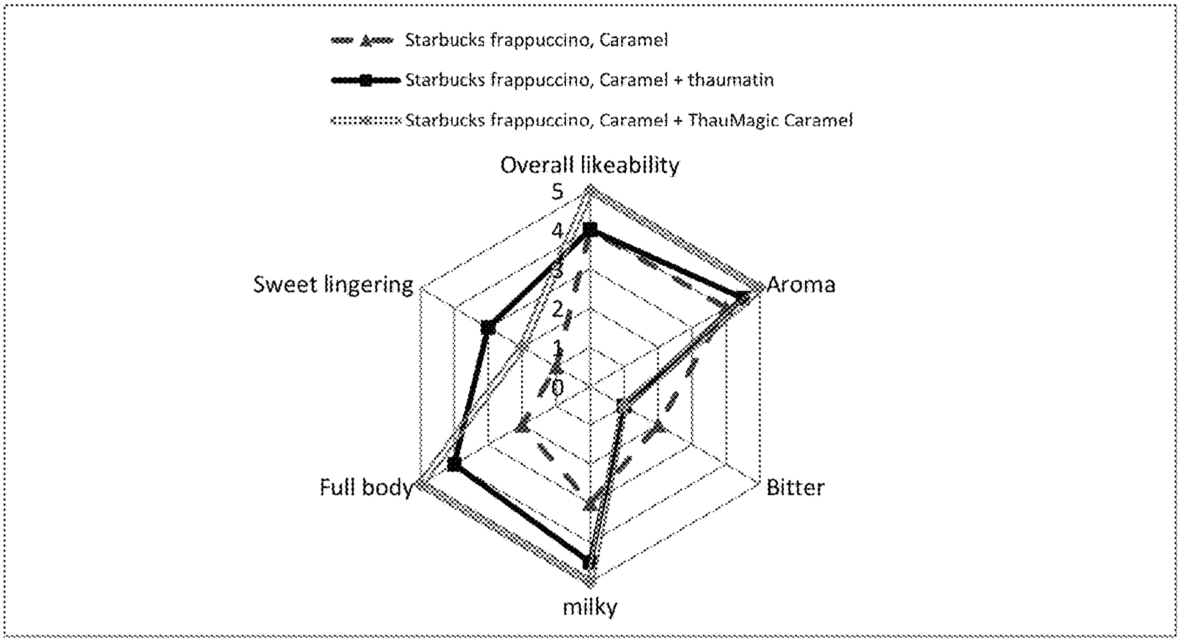
FIG. 57 shows the sensory evaluation with respect to Starbuck caramel Frappuccino with thaumatin or thaumatin and caramel MRP.

A panel of six persons tasted the samples and gave scores to the following aspects. The average score of each aspect was shown in the table below and FIGS. 56-57. For evaluation of the taste profile, the samples were tested by a panel of six people. The panel was asked to describe the taste profile and score values between 0-5 according to the increasing intensity of aroma, bitter, milky, full body, and sweet lingering. I trained taster tasted independently the samples first. The tester was allowed to re-taste, and then made notes for the sensory attributes perceived. Afterwards, another 5 tasters tasted the samples and the attributes were noted and discussed openly to find a suitable description. In case that more than 1 taster disagreed with the result, the tasting was repeated. For example, a "5" for intensity of aroma, milky or full body is the best score for having a strong pleasant smell, strong milky or rich mouth feel and conversely a value of 0 or near zero means the smell is very slight, less milky or the mouth feel is watery. Similarly, a "5" for bitter, or sweet lingering is not desired. A value of zero or near zero means that the bitter, or sweet lingering is reduced or is removed.

TABLE 71.2

| sample | Overall likeability | Aroma | Bitter | milky | Full body | Sweet lingering |
|---|---|---|---|---|---|---|
| 71-1 | 4 | 4 | 2 | 3 | 2 | 1 |
| 71-2 | 4.5 | 5 | 1 | 4.5 | 4 | 3 |
| 71-3 | 5 | 5 | 1 | 4 | 5 | 1 |
| 71-4 | 4 | 4 | 2 | 3 | 2 | 1 |
| 71-5 | 4 | 4.5 | 1 | 4.5 | 4 | 3 |
| 71-6 | 5 | 5 | 1 | 5 | 5 | 2 |

As can be seen, the taste profile of Starbucks coffee drinks can be improved by thaumatin or MRP. When adding thaumatin, the mouth feel becomes very full and the milky taste and coffee aroma can be increased. When MRP and thaumatin are used together, the full body mouth feel continues to increase as well as the bitter taste and sweet lingering can be mask.

Example 72

Effect of Caramel MRP and/or Thaumatin on the Taste Modification of Sugar Free Carbonated Drink Materials:

Caramel MRP, the product of Example: 68

Thaumatin, 1000 ppm concentrate, available EPC Natural products CO., Ltd.

Carbonated drink:

Coke Zero, sweetened by sucralose, aspartame and ACE-K, available from Coca-Cola.

Coke, sweetened by sugar and high fructose syrup, available from Coca-Cola.

Sample Preparation

Add a designated amount of Caramel MRP powder or thaumatin concentrate to energy drink. The sample details are as follow.

TABLE 72.1

| Sample # | Sample base | Concentration of Caramel MRP in the base | Concentration of thaumatin in the base |
|---|---|---|---|
| 72-1 | Coke Zero | — | — |
| 72-2 | Coke | — | 2 ppm |
| 72-3 | Coke Zero | 100 ppm | 1 ppm |

Sensory Evaluation

A panel of 12. persons tasted the samples, ranked them by preference and gave reasons. The sample ranked "1" indicated that it was the most preferred. The statistical analysis results are shown in the table below:

TABLE 62.2

| | Ranking of samples according to preference (highest 1, least 3) Ranking by percentage (%) of panel members | | | |
|---|---|---|---|---|
| sample | 1 | 2 | 3 | description |
| 72-1 | 0 | 50 | 50 | Less sweet<br>Flat<br>Bitter<br>Metallic aftertaste<br>Sweet lingering |
| 72-2 | 50 | 33 | 17 | Sweet<br>Full body<br>Clean taste |
| 72-3 | 50 | 17 | 33 | More sweet<br>Full body<br>No bitter<br>Sweet lingering (less than 72-1)<br>No metallic aftertaste |

Based on the panel's preferences, it can be concluded that the taste of Coke Zero is not as good and has a very different to that of the taste of common Coke. When adding certain amounts of thaumatin and Caramel MRP to the Coke Zero, its taste was improved and was very similar to that of common Coke.

Example 73

MRPs Derived from Two Kinds of Amino Acid and Glucose and the Evaluation of Their Scent Several MRPs are produced by the reaction of two kinds of amino acid and glucose in this example. The reaction conditions are as follow.

Glucose: 3.33 g

Amino acid #1 (listed in the vertical column of table): 0.83 g;

Amino acid #2 (listed in the horizontal row of table): 0.83 g.

Amino acid #1 (listed in the vertical column of table): amino acid #2 (listed in the vertical column of table): glucose=1:1:4

Pure water: 2.5 g;

Temperature: 100° C.;

Reaction time: 2 hours;

pH regulation: no pH regulator added.

In addition, several products are produced by the reaction of *Stevia* extract, two kinds of amino acid and glucose in this example, named S-MRP. The reaction conditions are as follow.

*Stevia* extract 2.5 g, available from Sweet Green Fields, Lot #20180409, prepared according to the method the same as Example 37. RA 24.33%, RD 4.41%, TSG (according to JECFA 2010) 62.29%;

Glucose: 1 g

Amino acid #1 (listed in the vertical column of table): 0.25 g;

Amino acid #2 (listed in the horizontal row of table): 0.25 g

*Stevia* extract amino acid #1 (listed in the vertical column of table): amino acid #2 (listed in the horizontal row of table) glucose=70:5:5:20

Pure water: 2.5 g;

Temperature: 100° C.;

Reaction time: 2 hours;

pH regulation: no pH regulator added.

TABLE 73.1

Scent evaluation of the reaction mixture of glucose and two kinds of amino acid

| | | | | | | | | | | |
|---|---|---|---|---|---|---|---|---|---|---|
| | Phenylalanine | | | | | | | | | |
| Alanine | burnt | Alanine | | | | | | | | |
| Leucine | floral | burnt | Leucine | | | | | | | |
| Isoleucine | Odorless | burnt | burnt | Isoleucine | | | | | | |
| Arginine | Odorless | burnt | creamy | burnt | Arginine | | | | | |
| Glutamic Acid | Odorless | acid | burnt | burnt | burnt | Glutamic Acid | | | | |
| Valine | light floral | burnt | burnt | burnt | burnt | burnt | Valine | | | |
| Serine | floral | burnt | burnt | burnt | Odorless | burnt | Odorless | Serine | | |
| Proline | Caramel | burnt | burnt | burnt | Odorless | Odorless | toast | Odorless | Proline | |
| Lysine | Light floral | acid | burnt | burnt | acid | Odorless | Odorless | Odorless | Odorless | Lysine |

TABLE 73.1-continued

Scent evaluation of the reaction mixture of glucose and two kinds of amino acid

| | | | | | | | | | | | | | | | |
|---|---|---|---|---|---|---|---|---|---|---|---|---|---|---|---|
| Tryptophan | Light floral | Odorless | meat | Odorless | Odorless | Odorless | Odorless | Odorless | Odorless | Odorless | Tryptophan | | | | |
| Threonine | floral + Caramel | burnt | Odorless | burnt | Odorless | Odorless | Caramel | burnt | Odorless | Odorless | Odorless | Threonine | | | |
| Histidine | floral | Odorless | Odorless | burnt | burnt + milky | Odorless | Odorless | Odorless | Odorless | Odorless | Odorless | Odorless | Histidine | | |
| Glycine | burnt | Odorless | Odorless | burnt | Odorless | Odorless | Odorless | Odorless | Odorless | Odorless | Odorless | burnt | Odorless | Glycine | |
| Glutamine | floral | Odorless | Odorless | Odorless | Odorless | Odorless | Odorless | Odorless | Odorless | Odorless | Odorless | Odorless | Odorless | Odorless | Glutamine |
| Glutathione | floral | Odorless | Odorless | burnt | burnt | Odorless | Odorless | Odorless | Odorless | Odorless | Odorless | Odorless | Odorless | Odorless | Odorless |

TABLE 73.2

Scent evaluation of the reaction mixture of Stevia extract glucose and two kinds of amino acid

| | | | | | | | | | | | | | | | |
|---|---|---|---|---|---|---|---|---|---|---|---|---|---|---|---|
| | Phenylalanine | | | | | | | | | | | | | | |
| Alanine | burnt | Alanine | | | | | | | | | | | | | |
| Leucine | floral | burnt | Leucine | | | | | | | | | | | | |
| Isoleucine | Odorless | burnt | burnt | Isoleucine | | | | | | | | | | | |
| Arginine | Odorless | burnt | creamy | burnt | Arginine | | | | | | | | | | |
| Glutamic Acid | Odorless | acid | burnt | burnt | burnt | Glutamic Acid | | | | | | | | | |
| Valine | light floral | burnt | burnt | burnt | burnt | burnt | Valine | | | | | | | | |
| Serine | floral | burnt | burnt | burnt | Odorless | burnt | Odorless | Serine | | | | | | | |
| Proline | Caramel | burnt | burnt | burnt | Odorless | Odorless | toast | Odorless | Proline | | | | | | |
| Lysine | Light floral | acid | burnt | burnt | acid | Odorless | Odorless | Odorless | Odorless | Lysine | | | | | |
| Tryptophan | Light floral | Odorless | meat | Odorless | Odorless | Odorless | Odorless | Odorless | Odorless | Odorless | Tryptophan | | | | |
| Threonine | floral | Odorless | Odorless | Odorless | Odorless | citrus | Odorless | Odorless | Odorless | Odorless | Odorless | Threonine | | | |
| Histidine | floral + citrus | Odorless | cheesy | Odorless | Odorless | citrus | Odorless | Odorless | Odorless | citrus | light citrus | Odorless | His tidine | | |
| Glycine | Odorless | Odorless | Odorless | Odorless | Odorless | Odorless | Odorless | Odorless | Odorless | Odorless | Odorless | Odorless | Odorless | Glycine | |
| Glutamine | floral | Odorless | burnt | burnt | sunflower seed | Odorless | Odorless | Odorless | Odorless | Odorless | Odorless | Odorless | Odorless | Odorless | Glutamine |
| Glutathione | floral | Odorless | burnt | Odorless | Odorless | citrus | Odorless | Odorless | Odorless | Odorless | Odorless | Odorless | citrus | Odorless | Odorless |

Conclusion:

All MRPs produced by the reaction including glucose and two kinds of amino acid can act as flavor enhancers, mouth feel modifiers or sweeteners. Some of them have some aroma, some can be used as a flavor, and some of them are odorless and can be used as a flavor enhancer etc. as noted above. When a *Stevia* extract containing non-steviol glycosides reacts with glutamic acid and/or histidine and glucose, some *Stevia*-MRPs have a citrus aroma. After the reaction was complete, the scent of the reaction mixture was evaluated by a panel of 6 people. Each panel member smelled the reaction mixture solution, discussed amongst themselves and then agreed how to best describe a suitable description for the smell. This test procedure was used for Examples 64 through 79 which follow.

Example 74

MRPs Derived from Two Kinds of Amino Acid and Lactose and the Evaluation of Their Scent Several MRPs are produced by the reaction of two kinds of amino acid and lactose in this example. The reaction conditions are as follow.

Lactose: 3.33 g

Amino acid 41 (listed in the vertical column of table): 0.83 g;

Amino acid 42 (listed in the horizontal row of table): 0.83 g

Amino acid 11: amino acid lactose=1:1:4

Pure water: 2.5 g;

Temperature: 100° C.;

Reaction time: 2 hours;

pH regulation: no pH regulator added.

In addition, several products are produced by the reaction of *Stevia* extract, two kinds of amino acid and lactose in this example, named S-MRP. The reaction conditions are as follow.

*Stevia* extract: 3.5 g, available from Sweet Green Fields, Lot #20180409, prepared according to the method of Example 37 final powder. RA 24.33%, RD 4.41%, TSG (according to JECFA 2010) 62.29%;

Lactose: 1 g

Amino acid #1 (listed in the vertical column of table): 0.25 g;

Amino acid #2 (listed in the horizontal row of table): 0.25 g

*Stevia* extract: amino acid #1: amino acid lactose=70:5:5:20

Pure water: 2.5 g;

Temperature: 100° C.;

Reaction time: 2 hours;

pH regulation: no pH regulator added.

After the reaction was complete, the scent of the reaction mixture was evaluated by a panel of six persons. The results are as follow.

TABLE 74.1

Scent evaluation of the reaction mixture of lactose and two kinds of amino acid

| | Phenylalanine | | | | | | | | | | | | | |
|---|---|---|---|---|---|---|---|---|---|---|---|---|---|---|
| Alanine | floral | Alanine | | | | | | | | | | | | |
| Leucine | floral + burnt | Burnt | Leucine | | | | | | | | | | | |
| Isoleucine | floral + Caramel | Odorless | burnt | Isoleucine | | | | | | | | | | |
| Arginine | floral + Caramel | sunflower seed | Coconut milk | burnt | Arginine | | | | | | | | | |
| Glutamic Acid | floral | Green | meat | burnt | Odorless | Glutamic Acid | | | | | | | | |
| Valine | Odorless | Green | burnt | cheesy | Odorless | Odorless | Valine | | | | | | | |
| Serine | floral | Odorless | Odorless | burnt | Caramel | Odorless | Odorless | Serine | | | | | | |
| Proline | floral | Odorless | burnt | Caramel | burnt | Odorless | burnt | burnt | Proline | | | | | |
| Lysine | floral | Green | Odorless | Odorless | Odorless | Odorless | Odorless | Odorless | burnt | Lysine | | | | |
| Tryptophan | floral | Odorless | Odorless | Odorless | minty | Odorless | Odorless | Odorless | burnt | Odorless | Tryptophan | | | |
| Threonine | floral | Green | cheesy | Odorless | sunflower seed | Odorless | burnt less | Odor- | burnt | Caramel | Odorless | Threonine | | |
| Histidine | floral | Green | Odorless | Odorless | sunflower seed | Odorless | Odorless | Odorless | Odorless | Odorless | Odorless | Odorless | Histidine | |
| Glycine | Odorless | Milky, light | burnt | Odorless | Odorless | Odorless | burnt | Odorless | burnt | Odorless | Odorless | milky | milky | Glycine |
| Glutamine | floral | Green | cheesy | burnt | Odorless | Odorless | Odorless | milky | burnt | Odorless | Odorless | Odorless | Odorless | Odorless |

TABLE 74.2

Scent evaluation of the reaction mixture of Stevia extract, lactose and two kinds of amino acid

| | Phenylalanine | | | | | | | | | | | |
|---|---|---|---|---|---|---|---|---|---|---|---|---|
| Alanine | Odorless | Alanine | | | | | | | | | | |
| Leucine | Odorless | Caramel | Leucine | | | | | | | | | |
| Isoleucine | Odorless | Caramel | Odorless | Isoleucine | | | | | | | | |
| Arginine | creamy | Milky and burnt | Caramel | Burnt and acid | Arginine | | | | | | | |
| Glutamic Acid | floral citrus | citrus | Burnt citrus | light citrus | Odorless | Glutamic Acid | | | | | | |
| Valine | Odorless | Odorless | burnt and acid | Odorless | creamy | citrus | Valine | | | | | |
| Serine | Odorless | Odorless | burnt and acid | Light Caramel | creamy | citrus | Odorless | Serine | | | | |
| Proline | Floral and popcorn | Odorless | burnt and acid and popcorn | burnt | sunflower seed | citrus | Caramel | Odorless | Proline | | | |
| Lysine | floral | Odorless | Odorless | light burnt | sunflower seed | citrus | Odorless | Odorless | Odorless | Lysine | | |
| Tryptophan | Odorless | Odorless | burnt | Odorless | burnt | citrus | Odorless | Odorless | Odorless | malty | Tryptophan | |
| Threonine | Odorless | malty | burnt and acid | Odorless | Creamy and | citrus | Odorless | Odorless | malty | Odorless | Odorless | Threonine |

TABLE 74.2-continued

Scent evaluation of the reaction mixture of Stevia extract, lactose and two kinds of amino acid

| | | | | | | | | | | | | | | |
|---|---|---|---|---|---|---|---|---|---|---|---|---|---|---|
| Histidine | fruity | fruity | fruity | fruity | sunflower seed malty | citrus | citrus | citrus | citrus | citrus | citrus | citrus | Histidine | |
| Glycine | Odorless | Odorless | light burnt | Odorless | sunflower seed | citrus | Odorless | Odorless | malty | malty | Odorless | Odorless | citrus | Glycine |
| Glutamine | Odorless | Caramel | Odorless | Odorless | sunflower seed | citrus | Odorless | Odorless | malty | Odorless | Odorless | Odorless | citrus | Odorless |

Conclusion:

All MRPs produced by the reaction of lactose (disaccharide) and two amino acids can act as flavor enhancers, mouth feel modifiers or as sweeteners. Some of them have aroma, some can be used as a flavor, some of them are odorless and can be used as a flavor enhancer etc., as noted above. When a *Stevia* extract containing non-steviol glycosides reacts with glutamic acid, and or histidine and lactose, some *Stevia*-MRPs have a citrus or a fruity aroma. When the amino acid is arginine, some *Stevia*-MRPs have a creamy aroma.

Example 75

MRPs Derived from Two Kinds of Amino Acid and Mannose and the Evaluation of Their Scent Several MRPs are produced by the reaction of two kinds of amino acid and mannose in this example. The reaction conditions are as follow.

Mannose: 3.33 g

Amino acid #1 (listed in the vertical column of table): 0.83 g;

Amino acid #2 (listed in the horizontal row of table): 0.83 g

Amino acid #1: amino acid #2: mannose=1:1:4

Pure water: 2.5 g;

Temperature: 100° C.;

Reaction time: 2 hours;

pH regulation: no pH regulator added.

In addition, several products are produced by the reaction of *Stevia* extract, two kinds of amino acid and mannose in this example, named S-MRP. The reaction conditions are as follow.

*Stevia* extract: 3.5 g, available from Sweet Green Fields, Lot #20180409, prepared according to the method the same as Example 37, final powder. RA 24.33%, RD 3.49%, TSG (according to JECTA 2010) 62.29%;

Mannose:

Amino acid #1 (listed in the vertical column of table): 0.25 g;

Amino acid #2 (listed in the horizontal row of table): 0.25 g

*Stevia* extract: amino acid #1: amino acid #2: mannose=70:5:5:20

Pure water: 2.5 g;

Temperature: 100° C.;

Reaction time: 2 hours;

pH regulation: no pH regulator added.

After the reaction was complete, the scent of the reaction mixture was evaluated by a panel of six persons. The results are as follow.

TABLE 75.1

Scent evaluation of the reaction mixture of mannose and two kinds of amino acid

| | | | | | | | | | | | | | | |
|---|---|---|---|---|---|---|---|---|---|---|---|---|---|---|
| | Phenylalanine | | | | | | | | | | | | | |
| Alanine | Odorless | Alanine | | | | | | | | | | | | |
| Leucine | burnt | cheesy | Leucine | | | | | | | | | | | |
| Isoleucine | Odorless | sweet and acid | burnt | Isoleucine | | | | | | | | | | |
| Arginine | Caramel | Creamy and sunflower seed | creamy | burnt | Arginine | | | | | | | | | |
| Glutamic Acid | floral | Odorless | burnt | burnt | Odorless | Glutamic Acid | | | | | | | | |
| Valine | floral | Chinese date | Odorless | Odorless | sunflower seed | Odorless | Valine | | | | | | | |
| Serine | floral | Caramel | burnt | Odorless | sunflower seed | Odorless | Odorless | Serine | | | | | | |
| Proline | Chinese date | milky | milky | milky | creamy | Odorless | Odorless | Odorless | Proline | | | | | |
| Lysine | burnt | Odorless | Odorless | Odorless | Cookie | Odorless | Odorless | Odorless | Odorless | Lysine | | | | |
| Tryptophan | Odorless | Odorless | Odorless | Odorless | acid | Odorless | Odorless | Odorless | Odorless | Odorless | Tryptophan | | | |
| Threonine | floral | Odorless | burnt | Chinese date | sunflower seed | Odorless | Odorless | Odorless | Odorless | Odorless | Odorless | Threonine | | |
| Histidine | floral | Odorless | burnt | Odorless | Odorless | Odorless | Odorless | Odorless | Odorless | sunflower seed | Odorless | Odorless | Histidine | |
| Glycine | Odorless | Odorless | Odorless | Odorless | Odorless | Odorless | Odorless | Odorless | Odorless | Odorless | Odorless | Odorless | Odorless | Glycine |

TABLE 75.1-continued

Scent evaluation of the reaction mixture of mannose and two kinds of amino acid

| | | | | | | | | | | | | | | |
|---|---|---|---|---|---|---|---|---|---|---|---|---|---|---|
| Glutamine | floral | Odorless | burnt | burnt | creamy Cookie | Odorless | Odorless | Odorless | Odorless | Odorless | Odorless | Caramel | Odorless | Caramel |

TABLE 75.2

Scent evaluation of the reaction mixture of Stevia extract, mannose and two kinds of amino acid

| | Phenylalanine | | | | | | | | | | | | | |
|---|---|---|---|---|---|---|---|---|---|---|---|---|---|---|
| Alanine | Chinese date | Alanine | | | | | | | | | | | | |
| Leucine | burnt + acid | Odorless | Leucine | | | | | | | | | | | |
| Isoleucine | burnt | Odorless | Odorless | Isoleucine | | | | | | | | | | |
| Arginine | burnt | sunflower seed | Odorless | sunflower seed | Arginine | | | | | | | | | |
| Glutamic Acid | floral + citrus | citrus | citrus | nectar and citrus | citrus | Glutamic Acid | | | | | | | | |
| Valine | floral | Odorless | burnt | Caramel | Odorless | citrus | Valine | | | | | | | |
| Serine | floral | burnt | burnt | Odorless | sun flower seed | citrus | Odorless | Serine | | | | | | |
| Proline | popcorn | sunflower seed | Creamy and sunflower seed | sunflower seed | Creamy and sunflower seed | citrus | popcorn | sunflower seed | Proline | | | | | |
| Lysine | citrus | sunflower seed | burnt | Caramel | sunflower seed | citrus | citrus | citrus | sunflower seed | Lysine | | | | |
| Tryptophan | floral | Odorless | Odorless | Caramel | sunflower seed | citrus | burnt | Odorless | popcorn | Odorless | Tryptophan | | | |
| Threonine | citrus + floral | Odorless | burnt | Odorless | sunflower seed | citrus | Caramel | Odorless | popcorn | fruity | sunflower seed | Threonine | | |
| Histidine | citrus + floral | fruity | citrus | citrus | sunflower seed | citrus | citrus | citrus | fruity | citrus | fruity | citrus | Histidine | |
| Glycine | floral | malty | burnt | Odorless | sunflower seed | citrus | Odorless | Odorless | sunflower seed | fruity | Odorless | Odorless | citrus | Glycine |
| Glutamine | floral + citrus | malty | burnt | Caramel | sunflower seed | citrus | Odorless | Odorless | sunflower seed | Odorless | Odorless | Caramel | citrus | Odorless |

Conclusion:

All MRPs produced by the reaction including mannose and two amino acids can act as flavor enhancers, mouth feel modifiers or as sweeteners, Some of them have aroma, can be further used as a flavor, and some of them are odorless and can be used as a flavor enhancer etc., as noted above. When a *Stevia* extract containing non-steviol glycosides reacts with glutamic acid, and or histidine and mannose, most of the *Stevia*-MRPs have a citrus or fruity aroma. When the amino acid is proline, some of *Stevia*-MRPs have a popcorn aroma.

Example 76

MRPs Derived from Two Kinds of Amino Acid and Two Kinds of Reducing Sugar and the Evaluation of Their Scent Material:

Reducing sugar:

Monosaccharide: mannose, rhamnose;

Disaccharide: Lactose;

Trisaccharide: raffinose;

Amino acid: alanine (aliphatic), phenylalanine (aromatic), glutamic acid (acidic), proline (imine), lysine (alkaline), cysteine (sulfur-containing)

Several MRPs are produced by the reaction of two kinds of amino acid and two kinds of reducing sugar in this example. The reaction conditions are as follows.

The weight of amino acid and reducing sugar in every experiment is shown in Table 76.1.

Pure water: 2.5 g;

Temperature: 100° C.;

Reaction time: 2 hours;

pH regulation: no pH regulator added.

In addition, several products are produced by the reaction of *Stevia* extract, two kinds of amino acid and two kinds of reducing sugar in this example, named S-MRP. The reaction conditions are as follow.

*Stevia* extract: 2.5 g, available from Sweet Green Fields, Lot™20180409, prepared according to the method of Example 37, final powder. RA 24.33%, RD 3.49%, TSG (according to JECFA 2010) 62.29%;

The weight of amino acid and reducing sugar in every experiment is shown in Table 76.2.

Pure water: 2.5 g;

Temperature: 100° C.;

Reaction time: 2 hours;

pH regulation: no pH regulator added.

After the reaction was complete, the scent of the reaction mixture was evaluated by a panel of six persons. The results are as follow.

TABLE 76.1

Scent evaluation of the reaction mixture of two kinds of amino acid and two kinds of reducing sugar

| | Reducing sugar | | | | Amino acid | | | | | | |
|---|---|---|---|---|---|---|---|---|---|---|---|
| | Mannose | Rhamnose | Lactose | Raffinose | Alanine | Phenylalanine | Glutamic acid | Proline | Lysine | Cysteine | Aroma |
| weight/g | — | 0.625 | 0.625 | — | 0.625 | 0.625 | — | — | — | — | Burnt |
| | — | 0.625 | 0.625 | — | 0.625 | — | 0.625 | — | — | — | Odorless |
| | — | 0.625 | 0.625 | — | 0.625 | — | — | 0.625 | — | — | Burnt |
| | — | 0.625 | 0.625 | — | 0.625 | — | — | — | 0.625 | — | Caramel |
| | — | 0.625 | 0.625 | — | 0.625 | — | — | — | — | 0.0063 | Meat |
| | — | 0.625 | 0.625 | — | — | 0.625 | 0.625 | — | — | — | Floral |
| | — | 0.625 | 0.625 | — | — | 0.625 | — | 0.625 | — | — | Burnt |
| | — | 0.625 | 0.625 | — | — | 0.625 | — | — | 0.625 | — | Floral |
| | — | 0.625 | 0.625 | — | — | 0.625 | — | — | — | 0.0063 | Meat |
| | — | 0.625 | 0.625 | — | — | — | 0.625 | 0.625 | — | — | Odorless |
| | — | 0.625 | 0.625 | — | — | — | 0.625 | — | 0.625 | — | Caramel |
| | — | 0.625 | 0.625 | — | — | — | 0.625 | — | — | 0.0063 | Meat |
| | — | 0.625 | 0.625 | — | — | — | — | 0.625 | 0.625 | — | Caramel |
| | — | 0.625 | 0.625 | — | — | — | — | 0.625 | — | 0.0063 | Meat |
| | — | 0.625 | 0.625 | — | — | — | — | — | 0.625 | 0.0063 | Meat |
| | — | 0.625 | — | 0.625 | 0.625 | 0.625 | — | — | — | — | Floral |
| | — | 0.625 | — | 0.625 | 0.625 | — | 0.625 | — | — | — | Odorless |
| | — | 0.625 | — | 0.625 | 0.625 | — | — | 0.625 | — | — | Odorless |
| | — | 0.625 | — | 0.625 | 0.625 | — | — | — | 0.625 | — | Burnt |
| | — | 0.625 | — | 0.625 | 0.625 | — | — | — | — | 0.0063 | Meat |
| | — | 0.625 | — | 0.625 | — | 0.625 | 0.625 | — | — | — | Floral |
| | — | 0.625 | — | 0.625 | — | 0.625 | — | 0.625 | — | — | Burnt |
| | — | 0.625 | — | 0.625 | — | 0.625 | — | — | 0.625 | — | Floral |
| | — | 0.625 | — | 0.625 | — | 0.625 | — | — | — | 0.0063 | Meat |
| | — | 0.625 | — | 0.625 | — | — | 0.625 | 0.625 | — | — | Odorless |
| | — | 0.625 | — | 0.625 | — | — | 0.625 | — | 0.625 | — | Odorless |
| | — | 0.625 | — | 0.625 | — | — | 0.625 | — | — | 0.0063 | Meat |
| | — | 0.625 | — | 0.625 | — | — | — | 0.625 | 0.625 | — | Caramel |
| | — | 0.625 | — | 0.625 | — | — | — | 0.625 | — | 0.0063 | Meat |
| | — | 0.625 | — | 0.625 | — | — | — | — | 0.625 | 0.0063 | Meat |
| | 0.625 | — | 0.625 | — | 0.625 | 0.625 | — | — | — | — | Caramel |
| | 0.625 | — | 0.625 | — | 0.625 | — | 0.625 | — | — | — | Odorless |
| | 0.625 | — | 0.625 | — | 0.625 | — | — | 0.625 | — | — | Burnt |
| | 0.625 | — | 0.625 | — | 0.625 | — | — | — | 0.625 | — | Caramel |
| | 0.625 | — | 0.625 | — | 0.625 | — | — | — | — | 0.0063 | Meat |
| | 0.625 | — | 0.625 | — | — | 0.625 | 0.625 | — | — | — | Floral |
| | 0.625 | — | 0.625 | — | — | 0.625 | — | 0.625 | — | — | Floral |
| | 0.625 | — | 0.625 | — | — | 0.625 | — | — | 0.625 | — | Odorless |
| | 0.625 | — | 0.625 | — | — | 0.625 | — | — | — | 0.0063 | Meat |
| | 0.625 | — | 0.625 | — | — | — | 0.625 | 0.625 | — | — | Odorless |
| | 0.625 | — | 0.625 | — | — | — | 0.625 | — | 0.625 | — | Caramel |
| | 0.625 | — | 0.625 | — | — | — | 0.625 | — | — | 0.0063 | Meat |
| | 0.625 | — | 0.625 | — | — | — | — | 0.625 | 0.625 | — | Odorless |
| | 0.625 | — | 0.625 | — | — | — | — | 0.625 | — | 0.0063 | Meat |
| | 0.625 | — | 0.625 | — | — | — | — | — | 0.625 | 0.0063 | Meat |
| | 0.625 | 0.625 | — | — | 0.625 | 0.625 | — | — | — | — | Caramel + floral |
| | 0.625 | 0.625 | — | — | 0.625 | — | 0.625 | — | — | — | Caramel |
| | 0.625 | 0.625 | — | — | 0.625 | — | — | 0.625 | — | — | Caramel |
| | 0.625 | 0.625 | — | — | 0.625 | — | — | — | 0.625 | — | Caramel |
| | 0.625 | 0.625 | — | — | 0.625 | — | — | — | — | 0.0063 | Meat |
| | 0.625 | 0.625 | — | — | — | 0.625 | 0.625 | — | — | — | Floral |

TABLE 76.1-continued

Scent evaluation of the reaction mixture of two kinds of amino acid and two kinds of reducing sugar

| Reducing sugar | | | | Amino acid | | | | | | |
|---|---|---|---|---|---|---|---|---|---|---|
| Mannose | Rhamnose | Lactose | Raffinose | Alanine | Phenylalanine | Glutamic acid | Proline | Lysine | Cysteine | Aroma |
| 0.625 | 0.625 | — | — | — | 0.625 | — | 0.625 | — | — | Burnt |
| 0.625 | 0.625 | — | — | — | 0.625 | — | — | 0.625 | — | Floral |
| 0.625 | 0.625 | — | — | — | 0.625 | — | — | — | 0.0063 | Meat |
| 0.625 | 0.625 | — | — | — | — | 0.625 | 0.625 | — | — | Odorless |
| 0.625 | 0.625 | — | — | — | — | 0.625 | — | 0.625 | — | Caramel |
| 0.625 | 0.625 | — | — | — | — | 0.625 | — | — | 0.0063 | Meat |
| 0.625 | 0.625 | — | — | — | — | — | 0.625 | 0.625 | — | Caramel |
| 0.625 | 0.625 | — | — | — | — | — | 0.625 | — | 0.0063 | Meat |
| 0.625 | 0.625 | — | — | — | — | — | — | 0.625 | 0.0063 | Caramel |
| 0.625 | — | — | 0.625 | 0.625 | 0.625 | — | — | — | — | Floral |
| 0.625 | — | — | 0.625 | 0.625 | — | 0.625 | — | — | — | Odorless |
| 0.625 | — | — | 0.625 | 0.625 | — | — | 0.625 | — | — | Odorless |
| 0.625 | — | — | 0.625 | 0.625 | — | — | — | 0.625 | — | Odorless |
| 0.625 | — | — | 0.625 | 0.625 | — | — | — | — | 0.0063 | Odorless |
| 0.625 | — | — | 0.625 | — | 0.625 | 0.625 | — | — | — | Floral |
| 0.625 | — | — | 0.625 | — | 0.625 | — | 0.625 | — | — | Floral |
| 0.625 | — | — | 0.625 | — | 0.625 | — | — | 0.625 | — | Burnt |
| 0.625 | — | — | 0.625 | — | 0.625 | — | — | — | 0.0063 | Meat |
| 0.625 | — | — | 0.625 | — | — | 0.625 | 0.625 | — | — | Odorless |
| 0.625 | — | — | 0.625 | — | — | 0.625 | — | 0.625 | — | Burnt |
| 0.625 | — | — | 0.625 | — | — | 0.625 | — | — | 0.0063 | Meat |
| 0.625 | — | — | 0.625 | — | — | — | 0.625 | 0.625 | — | Burnt |
| 0.625 | — | — | 0.625 | — | — | — | 0.625 | — | 0.0063 | Burnt |
| 0.625 | — | — | 0.625 | — | — | — | — | 0.625 | 0.0063 | Burnt |
| — | — | 0.625 | 0.625 | 0.625 | 0.625 | — | — | — | — | Odorless |
| — | — | 0.625 | 0.625 | 0.625 | — | 0.625 | — | — | — | Odorless |
| — | — | 0.625 | 0.625 | 0.625 | — | — | 0.625 | — | — | Malty |
| — | — | 0.625 | 0.625 | 0.625 | — | — | — | 0.625 | — | Burnt |
| — | — | 0.625 | 0.625 | 0.625 | — | — | — | — | 0.0063 | Meat |
| — | — | 0.625 | 0.625 | — | 0.625 | 0.625 | — | — | — | Floral |
| — | — | 0.625 | 0.625 | — | 0.625 | — | 0.625 | — | — | Odorless |
| — | — | 0.625 | 0.625 | — | 0.625 | — | — | 0.625 | — | Odorless |
| — | — | 0.625 | 0.625 | — | 0.625 | — | — | — | 0.0063 | Meat |
| — | — | 0.625 | 0.625 | — | — | 0.625 | 0.625 | — | — | Odorless |
| — | — | 0.625 | 0.625 | — | — | 0.625 | — | 0.625 | — | Burnt |
| — | — | 0.625 | 0.625 | — | — | 0.625 | — | — | 0.0063 | Meat |
| — | — | 0.625 | 0.625 | — | — | — | 0.625 | 0.625 | — | Odorless |
| — | — | 0.625 | 0.625 | — | — | — | 0.625 | — | 0.0063 | Meat |
| — | — | 0.625 | 0.625 | — | — | — | — | 0.625 | 0.0063 | Burnt |

TABLE 76.2

Scent evaluation of the reaction mixture of Stevia extract, two kinds of amino acid and two kinds of reducing sugar

| | Stevia | Reducing sugar | | | | Amino acid | | | | | | |
|---|---|---|---|---|---|---|---|---|---|---|---|---|
| | extract | Mannose | Rhamnose | Lactose | Raffinose | Alanine | Phenylalanine | Glutamic Acid | Proline | Lysine | Cysteine | Aroma |
| weight/g | 2.5 | — | 0.625 | 0.625 | — | 0.625 | 0.625 | — | — | — | — | Floral |
| | 2.5 | — | 0.625 | 0.625 | — | 0.625 | — | 0.625 | — | — | — | Citrus |
| | 2.5 | — | 0.625 | 0.625 | — | 0.625 | — | — | 0.625 | — | — | Burnt |
| | 2.5 | — | 0.625 | 0.625 | — | 0.625 | — | — | — | 0.625 | — | Malty |
| | 2.5 | — | 0.625 | 0.625 | — | 0.625 | — | — | — | — | 0.0063 | Meat |
| | 2.5 | — | 0.625 | 0.625 | — | — | 0.625 | 0.625 | — | — | — | Floral |
| | 2.5 | — | 0.625 | 0.625 | — | — | 0.625 | — | 0.625 | — | — | Floral |
| | 2.5 | — | 0.625 | 0.625 | — | — | 0.625 | — | — | 0.625 | — | Floral |
| | 2.5 | — | 0.625 | 0.625 | — | — | 0.625 | — | — | — | 0.0063 | Meat |
| | 2.5 | — | 0.625 | 0.625 | — | — | — | 0.625 | 0.625 | — | — | Citrus |
| | 2.5 | — | 0.625 | 0.625 | — | — | — | 0.625 | — | 0.625 | — | Citrus |
| | 2.5 | — | 0.625 | 0.625 | — | — | — | 0.625 | — | — | 0.0063 | Citrus |
| | 2.5 | — | 0.625 | 0.625 | — | — | — | — | 0.625 | 0.625 | — | Burnt |
| | 2.5 | — | 0.625 | 0.625 | — | — | — | — | 0.625 | — | 0.0063 | Meat |
| | 2.5 | — | 0.625 | 0.625 | — | — | — | — | — | 0.625 | 0.0063 | Meat |
| | 2.5 | — | 0.625 | — | 0.625 | 0.625 | 0.625 | — | — | — | — | Floral |
| | 2.5 | — | 0.625 | — | 0.625 | 0.625 | — | 0.625 | — | — | — | Citrus |
| | 2.5 | — | 0.625 | — | 0.625 | 0.625 | — | — | 0.625 | — | — | Burnt |
| | 2.5 | — | 0.625 | — | 0.625 | 0.625 | — | — | — | 0.625 | — | Caramel |

TABLE 76.2-continued

Scent evaluation of the reaction mixture of Stevia extract, two kinds of amino acid and two kinds of reducing sugar

| Stevia | Reducing sugar | | | | Amino acid | | | | | | |
|---|---|---|---|---|---|---|---|---|---|---|---|
| extract | Mannose | Rhamnose | Lactose | Raffinose | Alanine | Phenylalanine | Glutamic Acid | Proline | Lysine | Cysteine | Aroma |
| 2.5 | — | 0.625 | — | 0.625 | 0.625 | — | — | — | — | 0.0063 | Meat |
| 2.5 | — | 0.625 | — | 0.625 | — | 0.625 | 0.625 | — | — | — | Floral + citrus |
| 2.5 | — | 0.625 | — | 0.625 | — | 0.625 | — | 0.625 | — | — | Floral |
| 2.5 | — | 0.625 | — | 0.625 | — | 0.625 | — | — | 0.625 | — | Floral |
| 2.5 | — | 0.625 | — | 0.625 | — | 0.625 | — | — | — | 0.0063 | Floral + meat |
| 2.5 | — | 0.625 | — | 0.625 | — | — | 0.625 | 0.625 | — | — | Citrus |
| 2.5 | — | 0.625 | — | 0.625 | — | — | 0.625 | — | 0.625 | — | Odorless |
| 2.5 | — | 0.625 | — | 0.625 | — | — | 0.625 | — | — | 0.0063 | Citrus |
| 2.5 | — | 0.625 | — | 0.625 | — | — | — | 0.625 | 0.625 | — | Odorless |
| 2.5 | — | 0.625 | — | 0.625 | — | — | — | 0.625 | — | 0.0063 | Meat |
| 2.5 | — | 0.625 | — | 0.625 | — | — | — | — | 0.625 | 0.0063 | Meat |
| 2.5 | 0.625 | — | 0.625 | — | 0.625 | 0.625 | — | — | — | — | Floral |
| 2.5 | 0.625 | — | 0.625 | — | 0.625 | — | 0.625 | — | — | — | Citrus |
| 2.5 | 0.625 | — | 0.625 | — | 0.625 | — | — | 0.625 | — | — | Odorless |
| 2.5 | 0.625 | — | 0.625 | — | 0.625 | — | — | — | 0.625 | — | Caramel |
| 2.5 | 0.625 | — | 0.625 | — | 0.625 | — | — | — | — | 0.0063 | Meat |
| 2.5 | 0.625 | — | 0.625 | — | — | 0.625 | 0.625 | — | — | — | Floral + citrus |
| 2.5 | 0.625 | — | 0.625 | — | — | 0.625 | — | 0.625 | — | — | Floral |
| 2.5 | 0.625 | — | 0.625 | — | — | 0.625 | — | — | 0.625 | — | Floral |
| 2.5 | 0.625 | — | 0.625 | — | — | 0.625 | — | — | — | 0.0063 | Floral |
| 2.5 | 0.625 | — | 0.625 | — | — | — | 0.625 | 0.625 | — | — | Citrus |
| 2.5 | 0.625 | — | 0.625 | — | — | — | 0.625 | — | 0.625 | — | Odorless |
| 2.5 | 0.625 | — | 0.625 | — | — | — | 0.625 | — | — | 0.0063 | Citrus |
| 2.5 | 0.625 | — | 0.625 | — | — | — | — | 0.625 | 0.625 | — | Caramel |
| 2.5 | 0.625 | — | 0.625 | — | — | — | — | 0.625 | — | 0.0063 | Grilled |
| 2.5 | 0.625 | — | 0.625 | — | — | — | — | — | 0.625 | 0.0063 | Caramel |
| 2.5 | 0.625 | 0.625 | — | — | 0.625 | 0.625 | — | — | — | — | Floral |
| 2.5 | 0.625 | 0.625 | — | — | 0.625 | — | 0.625 | — | — | — | Citrus |
| 2.5 | 0.625 | 0.625 | — | — | 0.625 | — | — | 0.625 | — | — | Burnt |
| 2.5 | 0.625 | 0.625 | — | — | 0.625 | — | — | — | 0.625 | — | Burnt + acid |
| 2.5 | 0.625 | 0.625 | — | — | 0.625 | — | — | — | — | 0.0063 | Meat |
| 2.5 | 0.625 | 0.625 | — | — | — | 0.625 | 0.625 | — | — | — | Floral + citrus |
| 2.5 | 0.625 | 0.625 | — | — | — | 0.625 | — | 0.625 | — | — | Caramel |
| 2.5 | 0.625 | 0.625 | — | — | — | 0.625 | — | — | 0.625 | — | Floral |
| 2.5 | 0.625 | 0.625 | — | — | — | 0.625 | — | — | — | 0.0063 | Meat |
| 2.5 | 0.625 | 0.625 | — | — | — | — | 0.625 | 0.625 | — | — | Citrus |
| 2.5 | 0.625 | 0.625 | — | — | — | — | 0.625 | — | 0.625 | — | Citrus |
| 2.5 | 0.625 | 0.625 | — | — | — | — | 0.625 | — | — | 0.0063 | Meat + acid |
| 2.5 | 0.625 | 0.625 | — | — | — | — | — | 0.625 | 0.625 | — | Burnt |
| 2.5 | 0.625 | 0.625 | — | — | — | — | — | 0.625 | — | 0.0063 | Grilled |
| 2.5 | 0.625 | 0.625 | — | — | — | — | — | — | 0.625 | 0.0063 | Acid |
| 2.5 | 0.625 | — | — | 0.625 | 0.625 | 0.625 | — | — | — | — | Floral |
| 2.5 | 0.625 | — | — | 0.625 | 0.625 | — | 0.625 | — | — | — | Citrus |
| 2.5 | 0.625 | — | — | 0.625 | 0.625 | — | — | 0.625 | — | — | Burnt |
| 2.5 | 0.625 | — | — | 0.625 | 0.625 | — | — | — | 0.625 | — | Burnt |
| 2.5 | 0.625 | — | — | 0.625 | 0.625 | — | — | — | — | 0.0063 | Meat |
| 2.5 | 0.625 | — | — | 0.625 | — | 0.625 | 0.625 | — | — | — | Floral + citrus |
| 2.5 | 0.625 | — | — | 0.625 | — | 0.625 | — | 0.625 | — | — | Light floral |
| 2.5 | 0.625 | — | — | 0.625 | — | 0.625 | — | — | 0.625 | — | Odorless |
| 2.5 | 0.625 | — | — | 0.625 | — | 0.625 | — | — | — | 0.0063 | Floral + meat |
| 2.5 | 0.625 | — | — | 0.625 | — | — | 0.625 | 0.625 | — | — | Citrus |
| 2.5 | 0.625 | — | — | 0.625 | — | — | 0.625 | — | 0.625 | — | Burnt |
| 2.5 | 0.625 | — | — | 0.625 | — | — | 0.625 | — | — | 0.0063 | Meat + citrus |
| 2.5 | 0.625 | — | — | 0.625 | — | — | — | 0.625 | 0.625 | — | Burnt |
| 2.5 | 0.625 | — | — | 0.625 | — | — | — | 0.625 | — | 0.0063 | Grilled |
| 2.5 | 0.625 | — | — | 0.625 | — | — | — | — | 0.625 | 0.0063 | Meat |
| 2.5 | — | — | 0.625 | 0.625 | 0.625 | 0.625 | — | — | — | — | Floral |
| 2.5 | — | — | 0.625 | 0.625 | 0.625 | — | 0.625 | — | — | — | Citrus |
| 2.5 | — | — | 0.625 | 0.625 | 0.625 | — | — | 0.625 | — | — | Malty |
| 2.5 | — | — | 0.625 | 0.625 | 0.625 | — | — | — | 0.625 | — | Burnt |
| 2.5 | — | — | 0.625 | 0.625 | 0.625 | — | — | — | — | 0.0063 | Meat |
| 2.5 | — | — | 0.625 | 0.625 | — | 0.625 | 0.625 | — | — | — | Floral |

TABLE 76.2-continued

Scent evaluation of the reaction mixture of Stevia extract, two kinds of amino acid and two kinds of reducing sugar

| Stevia | Reducing sugar | | | | Amino acid | | | | | | |
|---|---|---|---|---|---|---|---|---|---|---|---|
| extract | Mannose | Rhamnose | Lactose | Raffinose | Alanine | Phenylalanine | Glutamic Acid | Proline | Lysine | Cysteine | Aroma |
| 2.5 | — | — | 0.625 | 0.625 | — | 0.625 | — | 0.625 | — | — | Floral |
| 2.5 | — | — | 0.625 | 0.625 | — | 0.625 | — | — | 0.625 | — | Burnt |
| 2.5 | — | — | 0.625 | 0.625 | — | 0.625 | — | — | — | 0.0063 | Meat |
| 2.5 | — | — | 0.625 | 0.625 | — | — | 0.625 | 0.625 | — | — | Citrus |
| 2.5 | — | — | 0.625 | 0.625 | — | — | 0.625 | — | 0.625 | — | Burnt |
| 2.5 | — | — | 0.625 | 0.625 | — | — | 0.625 | — | — | 0.0063 | Meat + citrus |
| 2.5 | — | — | 0.625 | 0.625 | — | — | — | 0.625 | 0.625 | — | Burnt |
| 2.5 | — | — | 0.625 | 0.625 | — | — | — | 0.625 | — | 0.0063 | Meat |
| 2.5 | — | — | 0.625 | 0.625 | — | — | — | — | 0.625 | 0.0063 | Meat |

Conclusion:

All MRPs produced by the reaction including two reducing sugars and two amino acids can act as flavor enhancers, mouth feel modifiers or as sweeteners. Some of them have aroma, some can be used as flavor, and some of them are odorless and can be used a as flavor enhancer etc., as noted above. When a *Stevia* extract containing non-steviol glycosides reacts with two reducing sugars, and amino acids containing glutamic acid, some of *Stevia*-MRPs have a citrus aroma. When the amino acid is arginine, some of *Stevia*-MRPs have a creamy aroma. When *Stevia* is involved in the reaction, all aroma strengths of *Stevia*-MRPs are much stronger when compared to corresponding MRPs without *Stevia*.

Examples 77-80

MRPs Derived From Three Kinds of Amino Acid and One Kind of Reducing Sugar and the Evaluation of Their Scent Material:

Reducing sugar:

Monosaccharide: mannose, rhamnose;

Disaccharide: Lactose;

trisaccharide: raffinose;

Amino acid: alanine (aliphatic), phenylalanine (aromatic), glutamic acid (acidic), proline (imine), lysine (alkaline), cysteine (sulfur-containing).

Example 77

MRPs Derived from Three Kinds of Amino Acid and Rhamnose and the Evaluation of Their Scent Several MRPs are produced by the reaction of three kinds of amino acid and rhamnose in this example. The reaction conditions are as follow.

The weight of amino acid and rhamnose in every experiment is shown in Table 77.1.

Pure water: 2.5 g;

Temperature: 100° C.;

Reaction time: 2 hours;

pH regulation: no pH regulator added.

In addition, several products are produced by the reaction of *Stevia* extract, three kinds of amino acid and rhamnose in this example, named S-MRP. The reaction conditions were as follow.

*Stevia* extract: 2.5 g, available from Sweet Green Fields, Lot #20180409, prepared according to the method of Example 37, final powder. RA 24.33%, RD 3.49%, TSG (according to JECFA 2010) 62.29%;

The weight of amino acid and rhamnose in every experiment is shown in Table 77.2.

Pure water: 2.5 g;

Temperature: 100° C.;

Reaction time: 2 hours;

pH regulation: no pH regulator added.

After the reaction was complete, the scent of the reaction mixture was evaluated by a panel of six persons. The results are as follow.

TABLE 77.1

Scent evaluation of the reaction mixture of rhamnose and three kinds of amino acid

| | Reducing sugar Rhamnose | Amino acid Alanine | Phenylalanine | Glutamic Acid | Proline | Lysine | Cysteine | Aroma |
|---|---|---|---|---|---|---|---|---|
| weight/g | 0.625 | 0.625 | 0.625 | 0.625 | — | — | — | Nectar |
| | 0.625 | 0.625 | 0.625 | — | 0.625 | — | — | Caramel |
| | 0.625 | 0.625 | 0.625 | — | — | 0.625 | — | Caramel |
| | 0.625 | 0.625 | 0.625 | — | — | — | 0.0063 | Meat |
| | 0.625 | 0.625 | — | 0.625 | 0.625 | — | — | Caramel |
| | 0.625 | 0.625 | — | 0.625 | 0.625 | 0.625 | — | Caramel |
| | 0.625 | 0.625 | — | 0.625 | | | 0.0063 | Meat |
| | 0.625 | 0.625 | — | | 0.625 | 0.625 | — | Meat |
| | 0.625 | 0.625 | — | — | 0.625 | — | 0.0063 | Caramel |
| | 0.625 | 0.625 | — | — | — | 0.625 | 0.0063 | Caramel |
| | 0.625 | — | 0.625 | 0.625 | 0.625 | — | — | Floral |

TABLE 77.1-continued

Scent evaluation of the reaction mixture of rhamnose and three kinds of amino acid

| Reducing sugar Rhamnose | Amino acid Alanine | Phenylalanine | Glutamic Acid | Proline | Lysine | Cysteine | Aroma |
|---|---|---|---|---|---|---|---|
| 0.625 | — | 0.625 | 0.625 | — | 0.625 | — | Floral |
| 0.625 | — | 0.625 | 0.625 | — | — | 0.0063 | Meat |
| 0.625 | — | 0.625 | — | 0.625 | 0.625 | — | Fruity |
| 0.625 | — | 0.625 | — | 0.625 | — | 0.0063 | Meat |
| 0.625 | — | 0.625 | — | — | 0.625 | 0.0063 | Meat |
| 0.625 | — | — | 0.625 | 0.625 | 0.625 | — | Odorless |
| 0.625 | — | — | 0.625 | 0.625 | — | 0.0063 | Meat |
| 0.625 | — | — | 0.625 | — | 0.625 | 0.0063 | Meat |
| 0.625 | — | — | — | 0.625 | 0.625 | 0.0063 | Odorless |

TABLE 77.2

Scent evaluation of the reaction mixture of Stevia extract, rhamnose and three kinds of amino acid

| | Stevia extract | Reducing sugar Rhamnose | Amino acid Alanine | Phenylalanine | Glutamic Acid | Proline | Lysine | Cysteine | Aroma |
|---|---|---|---|---|---|---|---|---|---|
| weight/g | 2.5 | 0.625 | 0.625 | 0.625 | 0.625 | — | — | — | Nectar and citrus |
| | 2.5 | 0.625 | 0.625 | 0.625 | — | 0.625 | — | — | Popcorn |
| | 2.5 | 0.625 | 0.625 | 0.625 | — | — | 0.625 | — | Sunflower seed |
| | 2.5 | 0.625 | 0.625 | 0.625 | — | — | — | 0.0063 | Meat |
| | 2.5 | 0.625 | 0.625 | — | 0.625 | 0.625 | — | — | Citrus |
| | 2.5 | 0.625 | 0.625 | — | 0.625 | 0.625 | 0.625 | — | Popcorn |
| | 2.5 | 0.625 | 0.625 | — | 0.625 | | | 0.0063 | Meat |
| | 2.5 | 0.625 | 0.625 | — | | 0.625 | 0.625 | — | Sunflower seed |
| | 2.5 | 0.625 | 0.625 | — | — | 0.625 | — | 0.0063 | Meat |
| | 2.5 | 0.625 | 0.625 | — | — | — | 0.625 | 0.0063 | Sunflower seed |
| | 2.5 | 0.625 | — | 0.625 | 0.625 | 0.625 | — | — | Nectar and citrus |
| | 2.5 | 0.625 | — | 0.625 | 0.625 | — | 0.625 | — | Milky and sunflower seed |
| | 2.5 | 0.625 | — | 0.625 | 0.625 | — | — | 0.0063 | Citrus |
| | 2.5 | 0.625 | — | 0.625 | — | 0.625 | 0.625 | — | Sunflower seed |
| | 2.5 | 0.625 | — | 0.625 | — | 0.625 | — | 0.0063 | Meat |
| | 2.5 | 0.625 | — | 0.625 | — | — | 0.625 | 0.0063 | Sunflower seed |
| | 2.5 | 0.625 | — | — | 0.625 | 0.625 | 0.625 | — | Sunflower seed |
| | 2.5 | 0.625 | — | — | 0.625 | 0.625 | — | 0.0063 | Meat |
| | 2.5 | 0.625 | — | — | 0.625 | — | 0.625 | 0.0063 | Toast |
| | 2.5 | 0.625 | — | — | — | 0.625 | 0.625 | 0.0063 | Odorless |

Conclusion:

All MRPs produced by the reaction of three kinds of amino acids with rhamnose can act as flavor enhancers, mouth feel and modifiers or as sweeteners. Some of them have aroma, some can be used as a flavor, and some of them are odorless and can be used as a flavor enhancer etc., as mentioned above. When a *Stevia* extract containing non-steviol glycosides reacts with rhamnose and three amino acids containing glutamic acid, some of *Stevia*-MRPs have a citrus aroma. When the amino acid is proline, some of *Stevia*-MRPs have a popcorn aroma. When *Stevia* is involved in the reaction, all aroma strengths of *Stevia*-MRPs are much stronger as compared to corresponding MRPs without *Stevia*.

Example 78

MRPs Derived from Three Kinds of Amino Acid and Mannose and the Evaluation of their Scent Several MRPs are produced by the reaction of three kinds of amino acid and mannose in this example. The reaction conditions are as follow.

The weight of amino acid and mannose in every experiment is as shown in Table 78.1.

Pure water: 2.5 g;

Temperature: 100° C.;

Reaction time: 2 hours;

pH regulation: no pH regulator added.

In addition, several products are produced by the reaction of *Stevia* extract, three kinds of amino acid and mannose in this example, named S-MRP. The reaction conditions are as follow.

*Stevia* extract: 2.5 g, available from Sweet Green Fields, Lot #20180409, prepared according to the method of Example 37, final powder. RA 24.33%, RD 3.49%, TSG (according to JECFA 2010) 62.29%;

The weight of amino acid and mannose in every experiment is shown in Table 78.2.

Pure water: 2.5 g;

Temperature: 100° C.;

Reaction time: 2 hours;

pH regulation: no pH regulator added.

After the reaction was complete, the scent of the reaction mixture was evaluated by a panel of six persons. The results are as follow.

TABLE 78.1

Scent evaluation of the reaction mixture of mannose and three kinds of amino acid

| | Reducing sugar | Amino acid | | | | | | |
|---|---|---|---|---|---|---|---|---|
| | Mannose | Alanine | Phenylalanine | Glutamic acid | Proline | Lysine | Cysteine | Aroma |
| weight/g | 0.625 | 0.625 | 0.625 | 0.625 | — | — | — | Floral |
| | 0.625 | 0.625 | 0.625 | — | 0.625 | — | — | Caramel |
| | 0.625 | 0.625 | 0.625 | — | — | 0.625 | — | Caramel |
| | 0.625 | 0.625 | 0.625 | — | — | — | 0.0063 | Odorless |
| | 0.625 | 0.625 | — | 0.625 | 0.625 | — | — | Odorless |
| | 0.625 | 0.625 | — | 0.625 | 0.625 | 0.625 | — | Odorless |
| | 0.625 | 0.625 | — | 0.625 | | | 0.0063 | Meat |
| | 0.625 | 0.625 | — | | 0.625 | 0.625 | — | Caramel |
| | 0.625 | 0.625 | — | — | 0.625 | — | 0.0063 | Meat |
| | 0.625 | 0.625 | — | — | — | 0.625 | 0.0063 | Caramel |
| | 0.625 | — | 0.625 | 0.625 | 0.625 | — | — | Floral |
| | 0.625 | — | 0.625 | 0.625 | — | 0.625 | — | Floral |
| | 0.625 | — | 0.625 | 0.625 | — | — | 0.0063 | Meat |
| | 0.625 | — | 0.625 | — | 0.625 | 0.625 | — | Caramel |
| | 0.625 | — | 0.625 | — | 0.625 | — | 0.0063 | Meat |
| | 0.625 | — | 0.625 | — | — | 0.625 | 0.0063 | Floral |
| | 0.625 | — | — | 0.625 | 0.625 | 0.625 | — | Caramel |
| | 0.625 | — | — | 0.625 | 0.625 | — | 0.0063 | Meat |
| | 0.625 | — | — | 0.625 | — | 0.625 | 0.0063 | Meat + spicy |
| | 0.625 | — | — | — | 0.625 | 0.625 | 0.0063 | Caramel |

TABLE 78.2

Scent evaluation of the reaction mixture of Stevia extract, mannose and three kinds of amino acid

| | Stevia extract | Reducing sugar | Amino acid | | | | | | |
|---|---|---|---|---|---|---|---|---|---|
| | | Mannose | Alanine | Phenylalanine | Glutamic Acid | Proline | Lysine | Cysteine | Aroma |
| weight/g | 2.5 | 0.625 | 0.625 | 0.625 | 0.625 | — | — | — | Nectar and citrus |
| | 2.5 | 0.625 | 0.625 | 0.625 | — | 0.625 | — | — | Popcorn |
| | 2.5 | 0.625 | 0.625 | 0.625 | — | — | 0.625 | — | Sunflower seed |
| | 2.5 | 0.625 | 0.625 | 0.625 | — | — | — | 0.0063 | Meat |
| | 2.5 | 0.625 | 0.625 | — | 0.625 | 0.625 | — | — | Citrus |
| | 2.5 | 0.625 | 0.625 | — | 0.625 | 0.625 | 0.625 | — | Popcorn |
| | 2.5 | 0.625 | 0.625 | — | 0.625 | | | 0.0063 | Meat |
| | 2.5 | 0.625 | 0.625 | — | | 0.625 | 0.625 | — | Sunflower seed |
| | 2.5 | 0.625 | 0.625 | — | — | 0.625 | — | 0.0063 | Meat |
| | 2.5 | 0.625 | 0.625 | — | — | — | 0.625 | 0.0063 | Sunflower seed |
| | 2.5 | 0.625 | — | 0.625 | 0.625 | 0.625 | — | — | Nectar and citrus |
| | 2.5 | 0.625 | — | 0.625 | 0.625 | — | 0.625 | — | Milky and sunflower seed |
| | 2.5 | 0.625 | — | 0.625 | 0.625 | — | — | 0.0063 | Citrus |
| | 2.5 | 0.625 | — | 0.625 | — | 0.625 | 0.625 | — | Sunflower seed |
| | 2.5 | 0.625 | — | 0.625 | — | 0.625 | — | 0.0063 | Meat |
| | 2.5 | 0.625 | — | 0.625 | — | — | 0.625 | 0.0063 | Sunflower seed |
| | 2.5 | 0.625 | — | — | 0.625 | 0.625 | 0.625 | — | Sunflower seed |
| | 2.5 | 0.625 | — | — | 0.625 | 0.625 | — | 0.0063 | Meat |
| | 2.5 | 0.625 | — | — | 0.625 | — | 0.625 | 0.0063 | Toast |
| | 2.5 | 0.625 | — | — | — | 0.625 | 0.625 | 0.0063 | Odorless |

Conclusion:

All MRPs produced by the reaction of three kinds of amino acid with mannose can act as flavor enhancers, mouth feel modifiers or as sweeteners. Some of them have aroma, some can be used as a flavor, and some of them are odorless and can be used as a flavor enhancer etc., as noted above. When a *Stevia* extract containing non-steviol glycosides reacts with mannose and three kinds of amino acid containing glutamic acid, some of *Stevia*-MRPs have a citrus aroma. When the amino acids contain L-Lysine, some of *Stevia*-MRPs have a nutty aroma such as a sunflower seed. When *Stevia* is involved in the reaction, all aroma strengths of *Stevia*-MRPs are much stronger as compared to corresponding MRPs without *Stevia*.

Example 79

MRPs Derived from Three Kinds of Amino Acid and Lactose and the Evaluation of Their Scent Several MRPs are produced by the reaction of three kinds of amino acid and lactose in this example. The reaction conditions are as follow.

The weight of amino acid and lactose in every experiment is shown in Table 79.1.

Pure water: 2.5 g;

Temperature: 100° C.;

Reaction time: 2 hours;

pH regulation: no pH regulator added.

In addition, several products are produced by the reaction of *Stevia* extract, three kinds of amino acid and lactose in this example, named S-MRP. The reaction conditions are as follow.

*Stevia* extract: 2.5 g, available from Sweet Green Fields, Lot #20180409, prepared according to the method of Example 37, final powder. RA 24.33%, RD 3.49%, TSG (according to JECFA 2010) 62.29%;

The weight of amino acid and lactose in every experiment is shown in Table 79.2.

Pure water: 2.5 g;

Temperature: 100° C.;

Reaction time: 2 hours;

pH regulation: no pH regulator added.

After the reaction was complete, the scent of the reaction mixture was evaluated by a panel of six persons. The results are as follow.

TABLE 79.1

Scent evaluation of the reaction mixture of lactose and three kinds of amino acids

| | Reducing sugar Lactose | Amino acid Alanine | Phenylalanine | Glutamic Acid | Proline | Lysine | Cysteine | Aroma |
|---|---|---|---|---|---|---|---|---|
| weight/g | 0.625 | 0.625 | 0.625 | 0.625 | — | — | — | Nectar |
| | 0.625 | 0.625 | 0.625 | — | 0.625 | — | — | Floral + Caramel |
| | 0.625 | 0.625 | 0.625 | — | — | 0.625 | — | Caramel |
| | 0.625 | 0.625 | 0.625 | — | — | — | 0.0063 | Meat |
| | 0.625 | 0.625 | — | 0.625 | 0.625 | — | — | Caramel |
| | 0.625 | 0.625 | — | 0.625 | 0.625 | 0.625 | — | Odorless |
| | 0.625 | 0.625 | — | 0.625 | | | 0.0063 | Meat |
| | 0.625 | 0.625 | — | | 0.625 | 0.625 | — | Caramel |
| | 0.625 | 0.625 | — | — | 0.625 | — | 0.0063 | Meat |
| | 0.625 | 0.625 | — | — | — | 0.625 | 0.0063 | Caramel |
| | 0.625 | — | 0.625 | 0.625 | 0.625 | — | — | Floral |
| | 0.625 | — | 0.625 | 0.625 | — | 0.625 | — | Floral |
| | 0.625 | — | 0.625 | 0.625 | — | — | 0.0063 | Meat |
| | 0.625 | — | 0.625 | — | 0.625 | 0.625 | — | Burnt |
| | 0.625 | — | 0.625 | — | 0.625 | — | 0.0063 | Meat |
| | 0.625 | — | 0.625 | — | — | 0.625 | 0.0063 | Burnt |
| | 0.625 | — | — | 0.625 | 0.625 | 0.625 | — | Odorless |
| | 0.625 | — | — | 0.625 | 0.625 | — | 0.0063 | Odorless |
| | 0.625 | — | — | 0.625 | — | 0.625 | 0.0063 | Odorless |
| | 0.625 | — | — | — | 0.625 | 0.625 | 0.0063 | Odorless |

TABLE 79.2

Scent evaluation of the reaction mixture of Stevia extract, lactose and three kinds of amino acid

| | Stevia extract | Reducing sugar Lactose | Amino acid Alanine | Phenyl-alanine | Glutamic Acid | Proline | Lysine | Cysteine | Aroma |
|---|---|---|---|---|---|---|---|---|---|
| weight/g | 2.5 | 0.625 | 0.625 | 0.625 | 0.625 | — | — | — | Citrus |
| | 2.5 | 0.625 | 0.625 | 0.625 | — | 0.625 | — | — | Popcorn |
| | 2.5 | 0.625 | 0.625 | 0.625 | — | — | 0.625 | — | Milky and sunflower seed |
| | 2.5 | 0.625 | 0.625 | 0.625 | — | — | — | 0.0063 | Meat |
| | 2.5 | 0.625 | 0.625 | — | 0.625 | 0.625 | — | — | Citrus |
| | 2.5 | 0.625 | 0.625 | — | 0.625 | 0.625 | 0.625 | — | Sunflower seed |
| | 2.5 | 0.625 | 0.625 | — | 0.625 | | | 0.0063 | Meat |

TABLE 79.2-continued

| Scent evaluation of the reaction mixture of Stevia extract, lactose and three kinds of amino acid | | | | | | | | |
|---|---|---|---|---|---|---|---|---|
| | Reducing | Amino acid | | | | | | |
| Stevia extract | sugar Lactose | Alanine | Phenyl-alanine | Glutamic Acid | Proline | Lysine | Cysteine | Aroma |
| 2.5 | 0.625 | 0.625 | — | | 0.625 | 0.625 | — | Milky and sunflower seed |
| 2.5 | 0.625 | 0.625 | — | — | 0.625 | — | 0.0063 | Meat |
| 2.5 | 0.625 | 0.625 | — | — | — | 0.625 | 0.0063 | Sunflower seed |
| 2.5 | 0.625 | — | 0.625 | 0.625 | 0.625 | — | — | Citrus |
| 2.5 | 0.625 | — | 0.625 | 0.625 | — | 0.625 | — | Nectar |
| 2.5 | 0.625 | — | 0.625 | 0.625 | — | — | 0.0063 | Citrus |
| 2.5 | 0.625 | — | 0.625 | — | 0.625 | 0.625 | — | Sunflower seed |
| 2.5 | 0.625 | — | 0.625 | — | 0.625 | — | 0.0063 | Popcorn |
| 2.5 | 0.625 | — | 0.625 | — | — | 0.625 | 0.0063 | Sunflower seed |
| 2.5 | 0.625 | — | — | 0.625 | 0.625 | 0.625 | — | Sunflower seed |
| 2.5 | 0.625 | — | — | 0.625 | 0.625 | — | 0.0063 | Meat |
| 2.5 | 0.625 | — | — | 0.625 | — | 0.625 | 0.0063 | Sunflower seed |
| 2.5 | 0.625 | — | — | — | 0.625 | 0.625 | 0.0063 | Sunflower seed |

Conclusion:

All MRPs produced by the reaction with three kinds of amino acid with lactose (disaccharide) can act as flavor enhancers, mouth feel modifiers or as sweeteners. Some of them have aroma, some can be used as a flavor, and some of them are odorless and be used as a flavor enhancer etc. as noted above. When a *Stevia* extract containing non-steviol glycosides compound reacts with lactose and three kinds of amino acids containing glutamic acid, some of *Stevia*-MRPs have a citrus aroma. When the amino acids contain L-Lysine, some of *Stevia*-MRPs have a nutty aroma such as a sunflower seed. When *Stevia* is involved in the reaction, all aroma strengths of *Stevia*-MRPs are much stronger when compared to corresponding MRPs without *Stevia*.

Example 80

MRPs Derived from Three Kinds of Amino Acid and Raffinose and the Evaluation of Their Scent Several MRPs are produced by the reaction of three kinds of amino acid and raffinose in this example. The reaction conditions are as follow.

The weight of amino acid and raffinose in every experiments shown in Table 80.1.

Pure water: 2.5 g;

Temperature: 100° C.;

Reaction time: 2 hours;

pH regulation: no pH regulator added.

In addition, several products are produced by the reaction of *Stevia* extract, three kinds of amino acid and raffinose in this example, named S-MRP. The reaction conditions are as follow.

*Stevia* extract: 2.5 g, available from Sweet Green Fields, Lot #20180409, prepared according to the method of Example 37, final powder. RA 24,33%, RD 3.49%, TSG (according to JECFA 2010) 62.29%;

The weight of amino acid and raffinose in every experiment is shown in Table 80.2.

Pure water: 2.5 g;

Temperature: 100° C.;

Reaction time: 2 hours;

pH regulation: no pH regulator added.

After the reaction was complete, the scent of the reaction mixture was evaluated by a panel of six persons. The results are as follow.

TABLE 80.1

| Scent evaluation of the reaction mixture of raffinose and three kinds of amino acid | | | | | | | | |
|---|---|---|---|---|---|---|---|---|
| | Reducing | Amino acid | | | | | | |
| | sugar Raffinose | Alanine | Phenyl-alanine | Glutamic acid | Proline | Lysine | Cysteine | Aroma |
| weight/g | 0.625 | 0.625 | 0.625 | 0.625 | — | — | — | Floral |
| | 0.625 | 0.625 | 0.625 | — | 0.625 | — | — | Popcorn |
| | 0.625 | 0.625 | 0.625 | — | — | 0.625 | — | Fruity |
| | 0.625 | 0.625 | 0.625 | — | — | — | 0.0063 | Meat |
| | 0.625 | 0.625 | — | 0.625 | 0.625 | — | — | Odorless |
| | 0.625 | 0.625 | — | 0.625 | 0.625 | 0.625 | — | Odorless |
| | 0.625 | 0.625 | — | 0.625 | | | 0.0063 | Meat |
| | 0.625 | 0.625 | — | | 0.625 | 0.625 | — | Fruity |
| | 0.625 | 0.625 | — | — | 0.625 | — | 0.0063 | Meat |
| | 0.625 | 0.625 | — | — | — | 0.625 | 0.0063 | Meat |
| | 0.625 | — | 0.625 | 0.625 | 0.625 | — | — | Odorless |
| | 0.625 | — | 0.625 | 0.625 | — | 0.625 | — | Floral |
| | 0.625 | — | 0.625 | 0.625 | — | — | 0.0063 | Meat |
| | 0.625 | — | 0.625 | — | 0.625 | 0.625 | — | Odorless |
| | 0.625 | — | 0.625 | — | 0.625 | — | 0.0063 | Meat |
| | 0.625 | — | 0.625 | — | — | 0.625 | 0.0063 | Meat |
| | 0.625 | — | — | 0.625 | 0.625 | 0.625 | — | Odorless |

TABLE 80.1-continued

Scent evaluation of the reaction mixture of raffinose and three kinds of amino acid

| Reducing sugar Raffinose | Amino acid Alanine | Phenyl-alanine | Glutamic acid | Proline | Lysine | Cysteine | Aroma |
|---|---|---|---|---|---|---|---|
| 0.625 | — | — | 0.625 | 0.625 | — | 0.0063 | Meat |
| 0.625 | — | — | 0.625 | — | 0.625 | 0.0063 | Meat |
| 0.625 | — | — | — | 0.625 | 0.625 | 0.0063 | Meat |

TABLE 80.2

Scent evaluation of the reaction mixture of Stevia extract, raffinose and three kinds of amino acid

| | Stevia extract | Reducing sugar Raffinose | Amino acid Alanine | Phenyl-alanine | Glutamic Acid | Proline | Lysine | Cysteine | Aroma |
|---|---|---|---|---|---|---|---|---|---|
| weight/g | 2.5 | 0.625 | 0.625 | 0.625 | 0.625 | — | — | — | Citrus |
| | 2.5 | 0.625 | 0.625 | 0.625 | — | 0.625 | — | — | Sunflower seed |
| | 2.5 | 0.625 | 0.625 | 0.625 | — | — | 0.625 | — | Sunflower seed |
| | 2.5 | 0.625 | 0.625 | 0.625 | — | — | — | 0.0063 | Meat |
| | 2.5 | 0.625 | 0.625 | — | 0.625 | 0.625 | — | — | Citrus |
| | 2.5 | 0.625 | 0.625 | — | 0.625 | 0.625 | 0.625 | — | Citrus |
| | 2.5 | 0.625 | 0.625 | — | 0.625 | | | 0.0063 | Meat |
| | 2.5 | 0.625 | 0.625 | — | | 0.625 | 0.625 | — | Sunflower seed |
| | 2.5 | 0.625 | 0.625 | — | — | 0.625 | — | 0.0063 | Meat |
| | 2.5 | 0.625 | 0.625 | — | — | — | 0.625 | 0.0063 | Meat |
| | 2.5 | 0.625 | — | 0.625 | 0.625 | 0.625 | — | — | Citrus |
| | 2.5 | 0.625 | — | 0.625 | 0.625 | — | 0.625 | — | Popcorn |
| | 2.5 | 0.625 | — | 0.625 | 0.625 | — | — | 0.0063 | Meat |
| | 2.5 | 0.625 | — | 0.625 | — | 0.625 | 0.625 | — | Sunflower seed |
| | 2.5 | 0.625 | — | 0.625 | — | 0.625 | — | 0.0063 | Meat |
| | 2.5 | 0.625 | — | 0.625 | — | — | 0.625 | 0.0063 | Meat |
| | 2.5 | 0.625 | — | — | 0.625 | 0.625 | 0.625 | — | Sunflower seed |
| | 2.5 | 0.625 | — | — | 0.625 | 0.625 | — | 0.0063 | Meat |
| | 2.5 | 0.625 | — | — | 0.625 | — | 0.625 | 0.0063 | Meat |
| | 2.5 | 0.625 | — | — | — | 0.625 | 0.625 | 0.0063 | Sunflower seed |

Conclusion:

All MRPs produced by the reaction of three kinds of amino acids and raffinose (trisaccharide) can act as flavor enhancers, mouth feel modifiers or as sweeteners; some of them have aroma, some could be used as a flavor, and some of them are odorless and can be used as a flavor enhancer etc., as noted above. When a *Stevia* extract containing non-steviol glycosides reacts with raffinose and three kinds of amino acids containing glutamic acid, some of *Stevia*-MRPs have a citrus aroma. When the amino acids contain L-lysine, some of *Stevia*-MRPs have a nutty aroma such as a sunflower seed. When *Stevia* is involved in the reaction, all aroma strengths of *Stevia*-MRPs are much stronger as compared to corresponding MRPs without *Stevia*.

Example 81-84

MRPs Derived from Four Kinds of Amino Acid and One Kind of Reducing Sugar and the Evaluation of Their Scent Material:

Reducing sugar:

Monosaccharide: mannose, rhamnose;

Disaccharide: Lactose;

Trisaccharide: raffinose;

Amino acid: alanine (aliphatic), phenylalanine (aromatic), glutamic acid (acidic), proline (imine), lysine (alkaline), cysteine (sulfur-containing).

Example 81

MRPs Derived from Four Kinds of Amino Acid and Rhamnose and the Evaluation of Their Scent Several MRPs are produced by the reaction of four kinds of amino acid and rhamnose in this example. The reaction conditions are as follow.

The weight of amino acid and rhamnose in every experiment is as shown in Table 81.1.

Pure water: 2.5 g;

Temperature: 100° C.;

Reaction time: 2. hours;

pH regulation: no pH regulator added.

In addition, several products are produced by the reaction of *Stevia* extract, four kinds of amino acid and rhamnose in this example, named S-MRP. The reaction conditions are as follow.

*Stevia* extract: 2.5 g, available from Sweet Green Fields, Lot #20180409, prepared according to the method of Example 37, final powder. RA 24.33%, RD 3.49%, TSG (according to JECFA 2010) 62.29%;

The weight of amino acid and rhamnose in every experiment is shown in Table 81.2.

Pure water: 2.5 g;

Temperature: 100° C.;

Reaction time: 2 hours;

pH regulation: no pH regulator added.

After the reaction was complete, the scent of the reaction mixture was evaluated by a panel of six persons. The results are as follow.

TABLE 81.1

Scent evaluation of the reaction mixture of rhamnose and four kinds of amino acid

| | Reducing sugar Rhamnose | Amino acid Alanine | Phenyl-alanine | Glutamic Acid | Proline | Lysine | Cysteine | Aroma |
|---|---|---|---|---|---|---|---|---|
| weight/g | 0.5 | 0.5 | 0.5 | 0.5 | 0.5 | — | — | Floral |
| | 0.5 | 0.5 | 0.5 | 0.5 | — | 0.5 | — | Odorless |
| | 0.5 | 0.5 | 0.5 | 0.5 | — | — | 0.005 | Odorless |
| | 0.5 | 0.5 | 0.5 | — | 0.5 | 0.5 | — | Sunflower seed |
| | 0.5 | 0.5 | 0.5 | — | 0.5 | — | 0.005 | Floral |
| | 0.5 | 0.5 | 0.5 | — | — | 0.5 | 0.005 | Sunflower seed |
| | 0.5 | 0.5 | — | 0.5 | 0.5 | 0.5 | — | Caramel |
| | 0.5 | 0.5 | — | 0.5 | 0.5 | — | 0.005 | Meat |
| | 0.5 | 0.5 | — | 0.5 | — | 0.5 | 0.005 | Burnt and acid |
| | 0.5 | 0.5 | — | — | 0.5 | 0.5 | 0.005 | Popcorn |
| | 0.5 | — | 0.5 | 0.5 | 0.5 | 0.5 | — | Caramel |
| | 0.5 | — | 0.5 | 0.5 | 0.5 | — | 0.005 | Meat |
| | 0.5 | — | 0.5 | 0.5 | — | 0.5 | 0.005 | Caramel |
| | 0.5 | — | 0.5 | — | 0.5 | 0.5 | 0.005 | Caramel |
| | 0.5 | — | — | 0.5 | 0.5 | 0.5 | 0.005 | Burnt |

TABLE 81.2

Scent evaluation of the reaction mixture of Stevia extract, rhamnose and four kinds of amino acid

| | Stevia extract | Reducing sugar Rhamnose | Amino acid Alanine | Phenyl-alanine | Glutamic Acid | Proline | Lysine | Cysteine | Aroma |
|---|---|---|---|---|---|---|---|---|---|
| weight/g | 2.5 | 0.5 | 0.5 | 0.5 | 0.5 | 0.5 | — | — | Citrus |
| | 2.5 | 0.5 | 0.5 | 0.5 | 0.5 | — | 0.5 | — | Caramel |
| | 2.5 | 0.5 | 0.5 | 0.5 | 0.5 | — | — | 0.005 | Citrus |
| | 2.5 | 0.5 | 0.5 | 0.5 | — | 0.5 | 0.5 | — | Caramel |
| | 2.5 | 0.5 | 0.5 | 0.5 | — | 0.5 | — | 0.005 | Odorless |
| | 2.5 | 0.5 | 0.5 | 0.5 | — | — | 0.5 | 0.005 | Caramel |
| | 2.5 | 0.5 | 0.5 | — | 0.5 | 0.5 | 0.5 | — | Caramel |
| | 2.5 | 0.5 | 0.5 | — | 0.5 | 0.5 | — | 0.005 | Citrus |
| | 2.5 | 0.5 | 0.5 | — | 0.5 | — | 0.5 | 0.005 | Odorless |
| | 2.5 | 0.5 | 0.5 | — | — | 0.5 | 0.5 | 0.005 | Popcorn |
| | 2.5 | 0.5 | — | 0.5 | 0.5 | 0.5 | 0.5 | — | Popcorn |
| | 2.5 | 0.5 | — | 0.5 | 0.5 | 0.5 | — | 0.005 | Popcorn |
| | 2.5 | 0.5 | — | 0.5 | 0.5 | — | 0.5 | 0.005 | Floral |
| | 2.5 | 0.5 | — | 0.5 | — | 0.5 | 0.5 | 0.005 | Caramel |
| | 2.5 | 0.5 | — | — | 0.5 | 0.5 | 0.5 | 0.005 | Popcorn |

Conclusion:

All MRPs produced by the reaction of four kinds of amino acid and rhamnose can act as flavor enhancers, mouth feel modifiers or as sweeteners. Some of them have aroma, some can be used as a flavor, and some of them are odorless and can be used as a flavor enhancer etc. as noted above. When a *Stevia* extract containing non-steviol glycosides reacts with rhamnose and four kinds of amino acids comprising glutamic acid, some of *Stevia*-MRPs have a citrus aroma. When the amino acids comprise proline, some of *Stevia*-MRPs have a Popcorn aroma. When *Stevia* is involved in the reaction, all aroma strengths of *Stevia*-MRPs are much stronger as compared to corresponding MRPs without *Stevia*, Example 82

MRPs Derived From Four Kinds of Amino Acid and Mannose and the Evaluation of Their Scent Several MRPs are produced by the reaction of four kinds of amino acid and mannose in this example. The reaction conditions are as follow.

The weight of amino acid and mannose in every experiment is as shown in Table 82.1.

Pure water: 2.5 g;

Temperature: 100° C.;

Reaction time: 2 hours;

pH regulation: no pH regulator added.

In addition, several products are produced by the reaction of *Stevia* extract, four kinds of amino acid and mannose in this example, named S-MRP. The reaction condition is as follow.

*Stevia* extract: 2.5 g, available from Sweet Green Fields, Lot #20180409, prepared according to the method the same as Example 37, final powder. RA 24.33%, RD 3.49%, TSG (according to JECFA 2010) 62.29%;

The weight of amino acid and mannose in every experimentis is shown Table 82.2.

Pure water: 2.5 g;

Temperature: 100° C.;

Reaction time: 2 hours;

pH regulation: no pH regulator added.

After the reaction was complete, the scent of the reaction mixture was evaluated by a panel of six persons. The results are as follow.

TABLE 82.1

Scent evaluation of the reaction mixture of mannose and four kinds of amino acid

| | Reducing sugar Mannose | Amino acid Alanine | Phenyl-alanine | Glutamic acid | Proline | Lysine | Cysteine | Aroma |
|---|---|---|---|---|---|---|---|---|
| weight/g | 0.5 | 0.5 | 0.5 | 0.5 | 0.5 | — | — | Caramel |
| | 0.5 | 0.5 | 0.5 | 0.5 | — | 0.5 | — | Caramel |
| | 0.5 | 0.5 | 0.5 | 0.5 | — | — | 0.005 | Burnt and acid |
| | 0.5 | 0.5 | 0.5 | — | 0.5 | 0.5 | — | Sunflower seed |
| | 0.5 | 0.5 | 0.5 | — | 0.5 | — | 0.005 | Odorless |
| | 0.5 | 0.5 | 0.5 | — | — | 0.5 | 0.005 | Odorless |
| | 0.5 | 0.5 | — | 0.5 | 0.5 | 0.5 | — | Sunflower seed |
| | 0.5 | 0.5 | — | 0.5 | 0.5 | — | 0.005 | Meat |
| | 0.5 | 0.5 | — | 0.5 | — | 0.5 | 0.005 | Acidic |
| | 0.5 | 0.5 | — | — | 0.5 | 0.5 | 0.005 | Sunflower seed |
| | 0.5 | — | 0.5 | 0.5 | 0.5 | 0.5 | — | Burnt |
| | 0.5 | — | 0.5 | 0.5 | 0.5 | — | 0.005 | Acidic meat |
| | 0.5 | — | 0.5 | 0.5 | — | 0.5 | 0.005 | Sunflower seed |
| | 0.5 | — | 0.5 | — | 0.5 | 0.5 | 0.005 | Odorless |
| | 0.5 | — | — | 0.5 | 0.5 | 0.5 | 0.005 | Caramel |

TABLE 82.2

Scent evaluation of the reaction mixture of Stevia extract, mannose and four kinds of amino acid

| | Stevia extract | Reducing sugar Mannose | Amino acid Alanine | Phenyl-alanine | Glutamic Acid | Proline | Lysine | Cysteine | Aroma |
|---|---|---|---|---|---|---|---|---|---|
| weight/g | 2.5 | 0.5 | 0.5 | 0.5 | 0.5 | 0.5 | — | — | Floral |
| | 2.5 | 0.5 | 0.5 | 0.5 | 0.5 | — | 0.5 | — | Caramel |
| | 2.5 | 0.5 | 0.5 | 0.5 | 0.5 | — | — | 0.005 | Floral |
| | 2.5 | 0.5 | 0.5 | 0.5 | — | 0.5 | 0.5 | — | Sunflower seed |
| | 2.5 | 0.5 | 0.5 | 0.5 | — | 0.5 | — | 0.005 | Popcorn |
| | 2.5 | 0.5 | 0.5 | 0.5 | — | — | 0.5 | 0.005 | Sunflower seed |
| | 2.5 | 0.5 | 0.5 | — | 0.5 | 0.5 | 0.5 | — | Caramel |
| | 2.5 | 0.5 | 0.5 | — | 0.5 | 0.5 | — | 0.005 | Citrus |
| | 2.5 | 0.5 | 0.5 | — | 0.5 | — | 0.5 | 0.005 | Odorless |
| | 2.5 | 0.5 | 0.5 | — | — | 0.5 | 0.5 | 0.005 | Sunflower seed |
| | 2.5 | 0.5 | — | 0.5 | 0.5 | 0.5 | 0.5 | — | Sunflower seed |
| | 2.5 | 0.5 | — | 0.5 | 0.5 | 0.5 | — | 0.005 | Citrus |
| | 2.5 | 0.5 | — | 0.5 | 0.5 | — | 0.5 | 0.005 | Citrus |
| | 2.5 | 0.5 | — | 0.5 | — | 0.5 | 0.5 | 0.005 | Sunflower seed |
| | 2.5 | 0.5 | — | — | 0.5 | 0.5 | 0.5 | 0.005 | Caramel |

Conclusion:

All MRPs produced by the reaction of four kinds of amino acid and mannose can act as flavor enhancers, mouth feel modifiers or as sweeteners; some of them have aroma, some can be used as a flavor, and some of them are odorless and can be used as a flavor enhancer etc., as noted above. When a *Stevia* extract containing non-steviol glycosides reacts with mannose and four kinds of amino acids comprising glutamic acid, some of *Stevia*-MRPs have a citrus aroma. When the amino acids comprise proline, some of *Stevia*-MRPs have a Popcorn aroma. When the amino acids comprise L-Lysine, some of MRPs have a strong nutty aroma such as a sunflower seed. When *Stevia* is involved in the reaction, all aroma strengths of *Stevia*-MRPs are much stronger as compared to corresponding MRP's without *Stevia.*

Example 83

MRPs Derived from Four Kinds of Amino Acid and Lactose and the Evaluation of Their Scent Several MRPs are produced by the reaction of four kinds of amino acid and lactose in this example. The reaction conditions are as follow.

The weight of amino acid and lactose in every experiment is shown in Table 83.1.

Pure water: 2.5 g;

Temperature: 100° C.;

Reaction time: 2 hours;

pH regulation: no pH regulator added.

In addition, several products are produced by the reaction of *Stevia* extract, four kinds of amino acid and lactose in this example, named S-MRP. The reaction conditions are as follow.

*Stevia* extract: 2.5 g, available from Sweet Green Fields, Lot #20180409, prepared according to the method of Example 37, final powder. RA 24.33%, RD 3.49%, TSG (according to JECFA 2010) 62.29%;

The weight of amino acid and lactose in every experiment is shown in Table 83.2.

Pure water: 2.5 g;

Temperature: 100° C.;

Reaction time: 2. hours;

pH regulation: no pH regulator added.

After the reaction was complete, the scent of the reaction mixture was evaluated by a panel of six persons. The results are as follow.

TABLE 83.1

Scent evaluation of the reaction mixture of lactose and four kinds of amino acid

| | Reducing sugar Lactose | Amino acid Alanine | Phenyl-alanine | Glutamic Acid | Proline | Lysine | Cysteine | Aroma |
|---|---|---|---|---|---|---|---|---|
| weight/g | 0.5 | 0.5 | 0.5 | 0.5 | 0.5 | — | — | Odorless |
| | 0.5 | 0.5 | 0.5 | 0.5 | — | 0.5 | — | Odorless |
| | 0.5 | 0.5 | 0.5 | 0.5 | — | — | 0.005 | Burnt |
| | 0.5 | 0.5 | 0.5 | — | 0.5 | 0.5 | — | Caramel |
| | 0.5 | 0.5 | 0.5 | — | 0.5 | — | 0.005 | Odorless |
| | 0.5 | 0.5 | 0.5 | — | — | 0.5 | 0.005 | Caramel |
| | 0.5 | 0.5 | — | 0.5 | 0.5 | 0.5 | — | Popcorn |
| | 0.5 | 0.5 | — | 0.5 | 0.5 | — | 0.005 | Odorless |
| | 0.5 | 0.5 | — | 0.5 | — | 0.5 | 0.005 | Burnt |
| | 0.5 | 0.5 | — | — | 0.5 | 0.5 | 0.005 | Popcorn |
| | 0.5 | — | 0.5 | 0.5 | 0.5 | 0.5 | — | Caramel |
| | 0.5 | — | 0.5 | 0.5 | 0.5 | — | 0.005 | Caramel |
| | 0.5 | — | 0.5 | 0.5 | — | 0.5 | 0.005 | Caramel |
| | 0.5 | — | 0.5 | — | 0.5 | 0.5 | 0.005 | Caramel |
| | 0.5 | — | — | 0.5 | 0.5 | 0.5 | 0.005 | Caramel |

TABLE 83.2

Scent evaluation of the reaction mixture of Stevia extract, lactose and four kinds of amino acid

| | Stevia extract | Reducing sugar Lactose | Amino acid Alanine | Phenyl-alanine | Glutamic Acid | Proline | Lysine | Cysteine | Aroma |
|---|---|---|---|---|---|---|---|---|---|
| weight/g | 2.5 | 0.5 | 0.5 | 0.5 | 0.5 | 0.5 | — | — | Floral |
| | 2.5 | 0.5 | 0.5 | 0.5 | 0.5 | — | 0.5 | — | Citrus |
| | 2.5 | 0.5 | 0.5 | 0.5 | 0.5 | — | — | 0.005 | Floral |
| | 2.5 | 0.5 | 0.5 | 0.5 | — | 0.5 | 0.5 | — | Citrus |
| | 2.5 | 0.5 | 0.5 | 0.5 | — | 0.5 | — | 0.005 | Acidic |
| | 2.5 | 0.5 | 0.5 | 0.5 | — | — | 0.5 | 0.005 | Sunflower seed |
| | 2.5 | 0.5 | 0.5 | — | 0.5 | 0.5 | 0.5 | — | Caramel |
| | 2.5 | 0.5 | 0.5 | — | 0.5 | 0.5 | — | 0.005 | Citrus |
| | 2.5 | 0.5 | 0.5 | — | 0.5 | — | 0.5 | 0.005 | Caramel |
| | 2.5 | 0.5 | 0.5 | — | — | 0.5 | 0.5 | 0.005 | Sunflower seed |
| | 2.5 | 0.5 | — | 0.5 | 0.5 | 0.5 | 0.5 | — | Sunflower seed |
| | 2.5 | 0.5 | — | 0.5 | 0.5 | 0.5 | — | 0.005 | Citrus |
| | 2.5 | 0.5 | — | 0.5 | 0.5 | — | 0.5 | 0.005 | Caramel |
| | 2.5 | 0.5 | — | 0.5 | — | 0.5 | 0.5 | 0.005 | Sunflower seed |
| | 2.5 | 0.5 | — | — | 0.5 | 0.5 | 0.5 | 0.005 | Caramel |

Conclusion:

All MRPs produced by the reaction of four kinds of amino acid and lactose can act as flavor enhancers, mouth feel modifiers or as sweeteners. Some of them have aroma, some can be used as a flavor, and some of them are odorless and can be used as flavor enhancer etc., as noted above. When a *Stevia* extract containing non-steviol glycosides reacts with lactose and four kinds of amino acids comprising glutamic acid, some of the *Stevia*-MRPs have a citrus aroma. When the amino acid is proline, some of the *Stevia*-MRPs have a Popcorn aroma. When *Stevia* is involved in the reaction, all aroma strengths of *Stevia*-MRPs are much stronger as compared to corresponding MRPs without *Stevia*.

Example 84

MRPs Derived From Four Kinds of Amino Acid and Raffinose and the Evaluation of Their Scent Several MRPs are produced by the reaction of four kinds of amino acid and raffinose in this example. The reaction conditions are as follow, The weight of amino acid and raffinose in every experiment is as shown in Table 84.1.

Pure water: 2.5 g;

Temperature: 100° C.;

Reaction time: 2 hours;

pH regulation: no pH regulator added.

In addition, several products are produced by the reaction of *Stevia* extract, four kinds of amino acid and raffinose in this example, named S-MRP. The reaction conditions are as follow.

*Stevia* extract: 2.5 g, available from Sweet Green Fields, Lot #20180409, prepared according to the method of Example 37, final powder. RA 24.33%, RD 3.49%, TSG (according to TECFA 2010) 62.29%;

The weight of amino acid and raffinose in every experiment is shown in Table 84.2.

Pure water: 2.5 g;

Temperature: 100° C.;

Reaction time: 2 hours;

pH regulation: no pH regulator added.

After the reaction was complete, the scent of the reaction mixture was evaluated by a panel of six persons. The results are as follow.

TABLE 84.1

Scent evaluation of the reaction mixture of raffinose and four kinds of amino acid

| | Reducing sugar Raffinose | Amino acid Alanine | Phenyl-alanine | Glutamic acid | Proline | Lysine | Cysteine | Aroma |
|---|---|---|---|---|---|---|---|---|
| weight/g | 0.5 | 0.5 | 0.5 | 0.5 | 0.5 | — | — | Floral |
| | 0.5 | 0.5 | 0.5 | 0.5 | — | 0.5 | — | Odorless |
| | 0.5 | 0.5 | 0.5 | 0.5 | — | — | 0.005 | Odorless |
| | 0.5 | 0.5 | 0.5 | — | 0.5 | 0.5 | — | Sunflower seed |
| | 0.5 | 0.5 | 0.5 | — | 0.5 | — | 0.005 | Meat |
| | 0.5 | 0.5 | 0.5 | — | — | 0.5 | 0.005 | Chemical |
| | 0.5 | 0.5 | — | 0.5 | 0.5 | 0.5 | — | Odorless |
| | 0.5 | 0.5 | — | 0.5 | 0.5 | — | 0.005 | Odorless |
| | 0.5 | 0.5 | — | 0.5 | — | 0.5 | 0.005 | Meat |
| | 0.5 | 0.5 | — | — | 0.5 | 0.5 | 0.005 | Sunflower seed |
| | 0.5 | — | 0.5 | 0.5 | 0.5 | 0.5 | — | Burnt |
| | 0.5 | — | 0.5 | 0.5 | 0.5 | — | 0.005 | Burnt |
| | 0.5 | — | 0.5 | 0.5 | — | 0.5 | 0.005 | Meat |
| | 0.5 | — | 0.5 | — | 0.5 | 0.5 | 0.005 | Burnt |
| | 0.5 | — | — | 0.5 | 0.5 | 0.5 | 0.005 | Meat |

TABLE 84.2

Scent evaluation of the reaction mixture of Stevia extract, raffinose and four kinds of amino acid

| | Stevia extract | Reducing sugar Raffinose | Amino acid Alanine | Phenyl-alanine | Glutamic Acid | Proline | Lysine | Cysteine | Aroma |
|---|---|---|---|---|---|---|---|---|---|
| weight/g | 2.5 | 0.5 | 0.5 | 0.5 | 0.5 | 0.5 | — | — | Citrus |
| | 2.5 | 0.5 | 0.5 | 0.5 | 0.5 | — | 0.5 | — | Odorless |
| | 2.5 | 0.5 | 0.5 | 0.5 | 0.5 | — | — | 0.005 | Citrus |
| | 2.5 | 0.5 | 0.5 | 0.5 | — | 0.5 | 0.5 | — | Odorless |
| | 2.5 | 0.5 | 0.5 | 0.5 | — | 0.5 | — | 0.005 | Meat |
| | 2.5 | 0.5 | 0.5 | 0.5 | — | — | 0.5 | 0.005 | Odorless |
| | 2.5 | 0.5 | 0.5 | — | 0.5 | 0.5 | 0.5 | — | Sunflower seed |
| | 2.5 | 0.5 | 0.5 | — | 0.5 | 0.5 | — | 0.005 | Citrus |
| | 2.5 | 0.5 | 0.5 | — | 0.5 | — | 0.5 | 0.005 | Sunflower seed |
| | 2.5 | 0.5 | 0.5 | — | — | 0.5 | 0.5 | 0.005 | Meat |
| | 2.5 | 0.5 | — | 0.5 | 0.5 | 0.5 | 0.5 | — | Sunflower seed |
| | 2.5 | 0.5 | — | 0.5 | 0.5 | 0.5 | — | 0.005 | Citrus |
| | 2.5 | 0.5 | — | 0.5 | 0.5 | — | 0.5 | 0.005 | Sunflower seed |

TABLE 84.2-continued

Scent evaluation of the reaction mixture of Stevia extract, raffinose and four kinds of amino acid

| Stevia extract | Reducing sugar Raffinose | Amino acid Alanine | Phenyl-alanine | Glutamic Acid | Proline | Lysine | Cysteine | Aroma |
|---|---|---|---|---|---|---|---|---|
| 2.5 | 0.5 | — | 0.5 | — | 0.5 | 0.5 | 0.005 | Sunflower seed |
| 2.5 | 0.5 | — | — | 0.5 | 0.5 | 0.5 | 0.005 | Sunflower seed |

Conclusion:

All MRPs produced by the reaction including four kinds of amino acid and raffinose can act as flavor enhancers, mouth feel modifiers or as sweeteners. Some of them have aroma, some can be used as a flavor, and some of them are odorless and can be used as a flavor enhancer etc., as noted above. When a *Stevia* extract containing non-steviol glycosides reacts with raffinose and four kinds of amino acids comprising glutamic acid, some of *Stevia*-MRPs can have a citrus aroma. When the amino acids comprise L-Lysine, some of MRPs have a strong nutty aroma such as a sunflower seed. When *Stevia* is involved in the reaction, all aroma strengths of *Stevia*-MRPs are much stronger compared to corresponding MRPs without *Stevia*.

Examples 85-86

MRPs Derived from Four Kinds of Reducing Sugar and One Kind of Amino Acid and the Evaluation of Their Scent Material:

Reducing sugar:

Monosaccharide: glucose, mannose, rhamnose, and xylose;

Disaccharide: Lactose;

Trisaccharide: raffinose;

Amino acid: glutamic acid (acidic), lysine (alkaline)

Example 85

MRPs Derived from Four Kinds of Reducing Sugar and Glutamic Acid and the Evaluation of Their Scent Several MRPs are produced by the reaction of four kinds of reducing sugar and glutamic acid in this example. The reaction conditions are as follow.

The weight of reducing sugar and glutamic acid in every experiment is shown in Table 85.1.

Pure water: 2.5 g;

Temperature: 100° C.;

Reaction time: 2 hours;

pH regulation: no pH regulator added.

In addition, several products are produced by the reaction of *Stevia* extract, four kinds of reducing sugar and glutamic acid in this example, named S-MRP. The reaction conditions are as follow.

*Stevia* extract: 2.5 g, available from Sweet Green Fields, Lot #20180409, prepared according to the method of Example 37, final powder. RA 24.33%, RD 3.49%, TSG (according to JECFA 2010) 62.29%;

The weight of reducing sugar and glutamic acid in every experiment is shown in Table 85.2.

Pure water: 2.5 g;

Temperature: 100° C.;

Reaction time: 2 hours;

pH regulation: no pH regulator added.

After the reaction was complete, the scent of the reaction mixture was evaluated by a panel of six persons. The results are as follow.

TABLE 85.1

Scent evaluation of the reaction mixture of glutamic acid and four kinds of reducing sugar

| | Amino acid Glutamic acid | Reducing sugar Glucose | Rhamnose | Mannose | Xylose | Lactose | Raffinose | Aroma |
|---|---|---|---|---|---|---|---|---|
| weight/g | 0.5 | 0.5 | 0.5 | 0.5 | 0.5 | — | — | Almond |
| | 0.5 | 0.5 | 0.5 | 0.5 | — | 0.5 | — | Odorless |
| | 0.5 | 0.5 | 0.5 | 0.5 | — | — | 0.5 | Odorless |
| | 0.5 | 0.5 | 0.5 | — | 0.5 | 0.5 | — | Almond |
| | 0.5 | 0.5 | 0.5 | — | 0.5 | — | 0.5 | Almond |
| | 0.5 | 0.5 | 0.5 | — | — | 0.5 | 0.5 | Odorless |
| | 0.5 | 0.5 | — | 0.5 | 0.5 | 0.5 | — | Almond |
| | 0.5 | 0.5 | — | 0.5 | 0.5 | — | 0.5 | Almond |
| | 0.5 | 0.5 | — | 0.5 | — | 0.5 | 0.5 | Odorless |
| | 0.5 | 0.5 | — | — | 0.5 | 0.5 | 0.5 | Odorless |
| | 0.5 | — | 0.5 | 0.5 | 0.5 | 0.5 | — | Almond |
| | 0.5 | — | 0.5 | 0.5 | 0.5 | — | 0.5 | Almond |
| | 0.5 | — | 0.5 | 0.5 | — | 0.5 | 0.5 | Odorless |
| | 0.5 | — | 0.5 | — | 0.5 | 0.5 | 0.5 | Almond |
| | 0.5 | — | — | 0.5 | 0.5 | 0.5 | 0.5 | Almond |

TABLE 85.2

Scent evaluation of the reaction mixture of Stevia extract, glutamic acid and four kinds of reducing sugar

| | Stevia extract | Amino acid Glutamic Acid | Reducing sugar Glucose | Rhamnose | Mannose | Xylose | Lactose | Raffinose | Aroma |
|---|---|---|---|---|---|---|---|---|---|
| weight/g | 2.5 | 0.5 | 0.5 | 0.5 | 0.5 | 0.5 | — | — | Citrus |
| | 2.5 | 0.5 | 0.5 | 0.5 | 0.5 | — | 0.5 | — | Citrus |
| | 2.5 | 0.5 | 0.5 | 0.5 | 0.5 | — | — | 0.5 | Citrus |
| | 2.5 | 0.5 | 0.5 | 0.5 | — | 0.5 | 0.5 | — | Citrus |
| | 2.5 | 0.5 | 0.5 | 0.5 | — | 0.5 | — | 0.5 | Citrus |
| | 2.5 | 0.5 | 0.5 | 0.5 | — | — | 0.5 | 0.5 | Citrus |
| | 2.5 | 0.5 | 0.5 | — | 0.5 | 0.5 | 0.5 | — | Odorless |
| | 2.5 | 0.5 | 0.5 | — | 0.5 | 0.5 | — | 0.5 | Citrus |
| | 2.5 | 0.5 | 0.5 | — | 0.5 | — | 0.5 | 0.5 | Citrus |
| | 2.5 | 0.5 | 0.5 | — | — | 0.5 | 0.5 | 0.5 | Citrus |
| | 2.5 | 0.5 | — | 0.5 | 0.5 | 0.5 | 0.5 | — | Citrus |
| | 2.5 | 0.5 | — | 0.5 | 0.5 | 0.5 | — | 0.5 | Odorless |
| | 2.5 | 0.5 | — | 0.5 | 0.5 | — | 0.5 | 0.5 | Citrus |
| | 2.5 | 0.5 | — | 0.5 | — | 0.5 | 0.5 | 0.5 | Citrus |
| | 2.5 | 0.5 | — | — | 0.5 | 0.5 | 0.5 | 0.5 | Citrus |

Conclusion:

All MRPs produced by the reaction including four reducing sugars and glutamic acid can act as flavor enhancers, mouth feel modifiers or sweeteners. Some of them have aroma, can be used as a flavor, some of them are odorless and can be used as a flavor enhancer etc., as noted above. Interestingly, most of the MRPs with four kinds of reducing sugars and glutamic acid have an almond aroma. When a *Stevia* extract containing non-steviol glycosides reacts with four reducing sugars and glutamic acid, most of the *Stevia*-MRPs have a citrus aroma. When *Stevia* is involved in the reaction, all aroma strengths of *Stevia*-MRPs are much stronger compared to corresponding MRPs without *Stevia*.

Example 86

MRPs Derived from Four Kinds of Reducing Sugar and Lysine and the Evaluation of Their Scent Several MRPs are produced by the reaction of four kinds of reducing sugar and lysine in this example. The reaction conditions are as follow.

The weight of reducing sugar and lysine in every experiment is shown in Table 86.1.

Pure water: 2.5 g;

Temperature: 100° C.;

Reaction time: 2 hours;

pH regulation: no pH regulator added.

In addition, several products are produced by the reaction of *Stevia* extract, four kinds of reducing sugar and lysine in this example, named S-MRP. The reaction conditions are as follow.

*Stevia* extract: 2.5 g, available from Sweet Green Fields, Lot ∩20180409, prepared according to the method of Example 37, final powder. RA 24.33%, RD 3.49%, TSG (according to JECFA 2010) 62.29%;

The weight of reducing sugar and lysine in every experiment is shown in Table 86.2.

Pure water: 2.5 g;

Temperature: 100° C.;

Reaction time: 2. hours;

pH regulation: no pH regulator added.

After the reaction was complete, the scent of the reaction mixture was evaluated by a panel of six persons. The results are as follow.

TABLE 86.1

Scent evaluation of the reaction mixture of lysine and four kinds of reducing sugar

| | Amino acid Lysine | Reducing sugar Glucose | Rhamnose | Mannose | Xylose | Lactose | Raffinose | Aroma |
|---|---|---|---|---|---|---|---|---|
| weight/g | 0.5 | 0.5 | 0.5 | 0.5 | 0.5 | — | — | Sunflower seed |
| | 0.5 | 0.5 | 0.5 | 0.5 | — | 0.5 | — | Sunflower seed |
| | 0.5 | 0.5 | 0.5 | 0.5 | — | — | 0.5 | Sunflower seed |
| | 0.5 | 0.5 | 0.5 | — | 0.5 | 0.5 | — | Sunflower seed |
| | 0.5 | 0.5 | 0.5 | — | 0.5 | — | 0.5 | Sunflower seed |
| | 0.5 | 0.5 | 0.5 | — | — | 0.5 | 0.5 | Sunflower seed |
| | 0.5 | 0.5 | — | 0.5 | 0.5 | 0.5 | — | Sunflower seed |
| | 0.5 | 0.5 | — | 0.5 | 0.5 | — | 0.5 | Sunflower seed |
| | 0.5 | 0.5 | — | 0.5 | — | 0.5 | 0.5 | Sunflower seed |
| | 0.5 | 0.5 | — | — | 0.5 | 0.5 | 0.5 | Sunflower seed |
| | 0.5 | — | 0.5 | 0.5 | 0.5 | 0.5 | — | Nut |
| | 0.5 | — | 0.5 | 0.5 | 0.5 | — | 0.5 | Sunflower seed |
| | 0.5 | — | 0.5 | 0.5 | — | 0.5 | 0.5 | Sunflower seed |
| | 0.5 | — | 0.5 | — | 0.5 | 0.5 | 0.5 | Nut |
| | 0.5 | — | — | 0.5 | 0.5 | 0.5 | 0.5 | Sunflower seed |

TABLE 86.2

| Scent evaluation of the reaction mixture of Stevia extract, lysine and four kinds of reducing sugar | | | | | | | | | | |
|---|---|---|---|---|---|---|---|---|---|---|
| | Stevia | Amino acid | Reducing sugar | | | | | | | |
| | extract | Lysine | Glucose | Rhamnose | Mannose | Xylose | Lactose | Raffinose | Aroma |
| weight/g | 2.5 | 0.5 | 0.5 | 0.5 | 0.5 | 0.5 | — | — | Fruity |
| | 2.5 | 0.5 | 0.5 | 0.5 | 0.5 | — | 0.5 | — | Fruity |
| | 2.5 | 0.5 | 0.5 | 0.5 | 0.5 | — | — | 0.5 | Sunflower seed |
| | 2.5 | 0.5 | 0.5 | 0.5 | — | 0.5 | 0.5 | — | Fruity |
| | 2.5 | 0.5 | 0.5 | 0.5 | — | 0.5 | — | 0.5 | Fruity |
| | 2.5 | 0.5 | 0.5 | 0.5 | — | — | 0.5 | 0.5 | Fruity |
| | 2.5 | 0.5 | 0.5 | — | 0.5 | 0.5 | 0.5 | — | Fruity |
| | 2.5 | 0.5 | 0.5 | — | 0.5 | 0.5 | — | 0.5 | Fruity |
| | 2.5 | 0.5 | 0.5 | — | 0.5 | — | 0.5 | 0.5 | Sunflower seed |
| | 2.5 | 0.5 | 0.5 | — | — | 0.5 | 0.5 | 0.5 | Sunflower seed |
| | 2.5 | 0.5 | — | 0.5 | 0.5 | 0.5 | 0.5 | — | Fruity |
| | 2.5 | 0.5 | — | 0.5 | 0.5 | 0.5 | — | 0.5 | Fruity |
| | 2.5 | 0.5 | — | 0.5 | 0.5 | — | 0.5 | 0.5 | Sunflower seed |
| | 2.5 | 0.5 | — | 0.5 | — | 0.5 | 0.5 | 0.5 | Sunflower seed |
| | 2.5 | 0.5 | — | — | 0.5 | 0.5 | 0.5 | 0.5 | Sunflower seed |

Conclusion:

All MRPs produced by the reaction including four reducing sugars and Lysine have a nice aroma, and can act as a flavor, a flavor enhancer, a mouth feel modifier or a sweeteners. MRPs without *Stevia* can have a nice sunflower seed or nutty aroma. *Stevia*-MRPs can have either a fruity or a sunflower seed aroma. When a *Stevia* extract containing non-steviol glycosides reacts with rhamnose and four reducing sugars and L-Lysine, some of *Stevia*-MRPs have a nice fruity aroma. When the reducing sugars are mannose and or xylose, the aroma strength of the MRPs are stronger compared to MRPs without these reducing sugars. When *Stevia* is involved in the reaction, all aroma strengths of *Stevia*-MRPs are much stronger compared to corresponding MRPs without *Stevia*.

Example 87

MRPs Derived from Amino Acid and Fatty Acid or Its Derivatives and the Evaluation of Their Scent Fatty acid or its derivatives in this invention refer to aliphatic acid or aliphatic esters of aliphatic acid which can be used as sugar donor in Maillard reaction. The materials used in the following examples comprise cinnamic acid, glyceryl stearate and lactic acid.

Several MRPs are produced by the reaction of amino acid and fatty acid or its derivatives in this example. The reaction conditions are as follow.

The type and weight of amino acid and fatty acid or its derivatives in every experiment is shown in Table 87.1.

Pure water: 2.5 g,

Temperature: 100° C.;

Reaction time: 2 hours;

pH regulation: no pH regulator added.

In addition, several products are produced by the reaction of *Stevia* extract, amino acid and fatty acid or its derivatives in this example, named S-MRP. The reaction conditions are as follow.

*Stevia* extract: 2.5 g, available from Sweet Green Fields, Lot #20180409, prepared according to the method of Example 37, final powder. RA 24.33%, RD 3.49%, TSG (according to JECFA 2010) 62.29%;

The weight of amino acid and fatty acid or its derivatives in every experiment is shown in Table 87.2.

Pure water: 2.5 g;

Temperature: 100° C.;

Reaction time: 2 hours;

pH regulation: no pH regulator added.

After the reaction was complete, the scent of the reaction mixture was evaluated by a panel of six persons. The results are as follow.

TABLE 87.1

| Scent evaluation of the reaction mixture of amino acid and fatty acid or its derivatives | | | | | | |
|---|---|---|---|---|---|---|
| Type (weight) | Alanine (1.25 g) | Phenylalanine (1.25 g) | Glutamic acid (1.25 g) | Proline (1.25 g) | Lysine (1.25 g) | Cysteine (0.0125 g) |
| Cinnamic acid (1.25 g) | Floral | Floral | Ammonia | Floral | Odorless | Ammonia |
| Glyceryl stearate (1.25 g) | Sunflower seed | Oily | Odorless | Oily | Sunflower seed | Meat |
| Lactic acid (1.25 g) | Chinese date | Floral | Chinese date | Chinese date | Odorless | Ammonia |

TABLE 87.2

| Scent evaluation of the reaction product of Stevia extract, amino acid and fatty acid or its derivatives | | | | | | |
|---|---|---|---|---|---|---|
| Type (weight) | Alanine (1.25 g) | Phenylalanine (1.25 g) | Glutamic acid (1.25 g) | Proline (1.25 g) | Lysine (1.25 g) | Cysteine (0.0125 g) |
| Cinnamic acid (1.25 g) | Floral | Floral | Floral | Floral | Ammonia | Floral |
| Glyceryl stearate (1.25 g) | Sunflower seed | Oily | Odorless | Burnt | Ammonia | Meat |
| Lactic acid (1.25 g) | Fruity | Floral | Citrus | Citrus | Sunflower seed | Sharp and pungent |

Conclusion:

All MRPs produced by the reaction including an amino acid and a fatty acid or its derivatives can act as flavor enhancers, mouth feel modifiers or sweeteners. Some of them have aroma, can be used as a flavor, some of them are odorless and can be used as a flavor enhancer etc., as noted above. Interestingly, when a *Stevia* extract containing non-steviol glycosides reacts with an amino acid and cinnanmic acid, most of *Stevia*-MRPs have a nice floral aroma. When *Stevia* is involved in the reaction, all aroma strengths of the *Stevia*-MRPs are much stronger compared to corresponding MRPs without *Stevia.*

Examples 88-89

MRPs Derived from Amino Acid, Reducing Sugar and Fatty Acid or Its Derivatives and the Evaluation of Their Scent Material:

Reducing sugar: glucose and rhamnose;

Amino acid: alanine (aliphatic), phenylalanine (aromatic), glutamic acid (acidic), proline (imine), lysine (alkaline), cysteine (sulfur-containing);

Fatty acid or its derivatives: aliphatic acid or aliphatic esters of aliphatic acid which can be used as sugar donor in Maillard reaction. The materials used in the following example comprise cinnamic acid, glyceryl stearate and lactic acid.

Example 88

MRPs Derived from Amino Acid, Glucose and Fatty Acid or Its Derivatives and the Evaluation of Their Scent Several MRPs are produced by the reaction of amino acid, glucose and fatty acid or its derivatives in this example. The reaction conditions are as follow, The type and weight of amino acid and fatty acid or its derivatives in every experiment is shown in Table 88.1.

Glucose: 1 g

Pure water: 2.5 g;

Temperature: 100° C.;

Reaction time: 2 hours;

pH regulation: no pH regulator added.

In addition, several products are produced by the reaction of *Stevia* extract, amino acid, glucose and fatty acid or its derivatives in this example, named S-MRP. The reaction conditions are as follow.

*Stevia* extract: 2.5 g, available from Sweet Green Fields, Lot #20180409, prepared according to the method the same as Example 37. RA 24.33%, RD 3.49%, TSG (according to JECFA 2010) 62.29%;

The weight of amino acid and fatty acid or its derivatives in every experiment can be as shown in Table 88.2.

Glucose: 1 g

Pure water: 2.5 g;

Temperature: 100° C.;

Reaction time: 2 hours;

pH regulation: no pH regulator added.

After the reaction was complete, the scent of the reaction mixture was evaluated by a panel of six persons. The results are as follow.

TABLE 88.1

| Scent evaluation of the reaction mixture of amino acid, glucose and fatty acid or its derivatives | | | | | | |
|---|---|---|---|---|---|---|
| Type (weight) | Alanine (1 g) | Phenylalanine (1 g) | Glutamic acid (1 g) | Proline (1 g) | Lysine (1 g) | Cysteine (0.01 g) |
| Cinnamic acid (1 g) | Aniseed | Floral | Burnt | Floral | Burnt | Ammonia |
| Glyceryl stearate (1 g) | Burnt | Floral | Oily | Burnt | Creamy cookie | Ammonia |
| Lactic acid (1 g) | Caramel | Caramel | Acid | Odorless | Odorless | Ammonia |

TABLE 88.2

| Scent evaluation of the reaction product of Stevia extract, amino acid, glucose and fatty acid or its derivatives | | | | | | |
|---|---|---|---|---|---|---|
| Type (weight) | Alanine (1 g) | Phenylalanine (1 g) | Glutamic acid (1 g) | Proline (1 g) | Lysine (1 g) | Cysteine (0.01 g) |
| Cinnamic acid (1 g) | Fruity | Floral | Odorless | Fruity | Burnt | Ammonia |
| Glyceryl stearate (1 g) | Odorless | Floral | Odorless | Burnt | Sesame oil | Ammonia |
| Lactic acid (1 g) | Odorless | Fruity | Citrus | Minty | Fruity | Ammonia |

Conclusion:

All MRPs produced by the reaction of amino acid, glucose and fatty acid or its derivatives can act as flavor enhancers, mouth feel modifiers or as sweeteners. Some of them have aroma, some could be used as a flavor, and some of them are odorless and can be used as a flavor enhancer etc., as noted above. Interestingly, when a *Stevia* extract containing non-steviol ycosides reacts with an amino acid and a fat-like substance, most of *Stevia*-MRPs have a nice fruity or floral aroma. When *Stevia* is involved in the reaction, all aroma strengths of *Stevia*-MRPs are much stronger as compared to corresponding MRPs without Stevia.

Example 89

MRPs Derived from Amino Acid, Rhamnose and Fatty Acid or Its Derivatives and the Evaluation of Their Scent Several MRPs are produced by the reaction of amino acid, rhamnose and fatty acid or its derivatives in this example. The reaction conditions are as follow, The type and weight of amino acid and fatty acid or its derivatives in every experiment is shown in Table 89.1.

Rhamnose:

Pure water: 2.5 g;

Temperature: 100° C.;

Reaction time: 2. hours;

pH regulation: no pH regulator added.

In addition, several products are produced by the reaction of *Stevia* extract, amino acid, rhamnose and fatty acid or its derivatives in this example, named S-MRP. The reaction conditions are as follow.

*Stevia* extract: 2.5 g, available from Sweet Green Fields, Lot #20180409, prepared according to the method of Example 37, final powder. RA 24.33%, RD 3.49%, TSG (according to JECFA 2010) 62.29%;

The weight of amino acid and fatty acid or its derivatives in every experiment is shown in Table 89.2.

Rhamnose: 1 g

Pure water: 2.5 g;

Temperature: 100° C.;

Reaction time: 2 hours;

pH regulation: no pH regulator added.

After the reaction was complete, the scent of the reaction mixture was evaluated by a panel of six persons. The results are as follow.

TABLE 89.1

| Scent evaluation of the reaction mixture of amino acid, rhamnose and fatty acid or its derivatives | | | | | | |
|---|---|---|---|---|---|---|
| Type (weight) | Alanine (1 g) | Phenylalanine (1 g) | Glutamic acid (1 g) | Proline (1 g) | Lysine (1 g) | Cysteine (0.01 g) |
| Cinnamic acid (1 g) | Fruity | Floral | Fruity | Burnt | Burnt | Ammonia |
| Glyceryl stearate (1 g) | Odorless | Floral | Oily | Burnt | Burnt | Ammonia |
| Lactic acid (1 g) | Fruity | Burnt | Yogurt | Yogurt | Odorless | Ammonia |

TABLE 89.2

| Scent evaluation of the reaction mixture of Stevia extract, amino acid, rhamnose and fatty acid or its derivatives | | | | | | |
|---|---|---|---|---|---|---|
| Type (weight) | Alanine (1 g) | Phenylalanine (1 g) | Glutamic acid (1 g) | Proline (1 g) | Lysine (1 g) | Cysteine (0.01 g) |
| Cinnamic acid (1 g) | Fruity | Floral | Odorless | Burnt | Fruity | Ammonia |
| Glyceryl stearate (1 g) | Fruity | Floral | Odorless | Burnt | Burnt | Ammonia |
| Lactic acid (1 g) | Fruity | Floral | Fruity | Fruity | Fruity | Ammonia |

Conclusion:

All MRPs produced by the reaction of an amino acid and a fatty acid or its derivatives can act as flavor enhancers, mouth feel modifiers or as sweeteners. Some of them have aroma, some can be used as a flavor, and some of them are odorless and can be used as a flavor enhancer etc., as noted above, Interestingly, when a *Stevia* extract containing non-steviol glycosides reacts with an amino acid and fat-like substances, most of *Stevia*-MRPs have nice a fruity or floral aroma. When *Stevia* is involved in the reaction, all aroma strengths of *Stevia*-MRPs are much stronger as compared to corresponding MRPs without *Stevia*.

Example 90

The Relationship Between the Taste Profile of Flora Taste Sucralose and the Ratio of Xylose to Phenylalanine in the Reaction Mixture Common Process:

Sucralose, xylose and phenylalanine were blended according to the weight shown in Table 90.1. The mixture was dissolved into 2.5 g pure water. No pH regulator was added and the pH was about 5). The solution was heated at about 100 degrees centigrade for 2 hours. When the reaction was complete, the slurry was dried, to obtain an off white powder MRP.

TABLE 90.1 the weight of sucralose, xylose and phenylalanine

| # | the ratio of phenylalanine to xylose w/w | Weight of sucralose | Weight of xylose | Weight of phenylalanine |
|---|---|---|---|---|
| 90-01 | 10/90 | 4 g | 0.9 g | 0.1 g |
| 90-02 | 20/80 | 4 g | 0.8 g | 0.2 g |
| 90-03 | 30/70 | 4 g | 0.7 g | 0.3 g |
| 90-04 | 40/60 | 4 g | 0.6 g | 0.4 g |
| 90-05 | 50/50 | 4 g | 0.5 g | 0.5 g |
| 90-06 | 60/40 | 4 g | 0.4 g | 0.6 g |
| 90-07 | 70/30 | 4 g | 0.3 g | 0.7 g |
| 90-08 | 80/20 | 4 g | 0.2 g | 0.8 g |
| 90-09 | 90/10 | 4 g | 0.1 g | 0.9 g |

Experiments

Several sucralose-MRPs in this Example were prepared, Each sample was evaluated according to above sensory evaluation method and the resulting data was the average of the panel. The reaction parameters and the taste profile of the products are as follow. Note that according to the sensory evaluation method, the mouth feel and sweet profile were evaluated based on the same sweetness. That's to say, in those evaluations the concentrations of sucralose in all sample solutions were the same, 100 ppm. The results are shown in Table 90.2.

TABLE 90.2 the score in sensory evaluation

| | | Sensory evaluation | | | | | | | | |
|---|---|---|---|---|---|---|---|---|---|---|
| | | flavor intensity | | | mouth | sweet profile | | | | |
| Sample # | flavor | Odor intensity | Flavor taste intensity | Score of flavor intensity | feel kokumi | Sweet lingering | bitterness | Metallic aftertaste | Score of sweet profile | Overall likeability |
| 90-01 | floral | 2 | 4 | 3 | 2 | 2 | 1 | 1 | 4.67 | 3.22 |
| 90-02 | | 2 | 4 | 3 | 2 | 2 | 1 | 1 | 4.67 | 3.22 |
| 90-03 | | 2 | 4 | 3 | 2 | 1 | 1 | 1 | 5.00 | 3.33 |
| 90-04 | | 3 | 5 | 4 | 2 | 1 | 1 | 1 | 5.00 | 3.67 |
| 90-05 | | 2 | 5 | 3.5 | 3 | 1 | 1 | 1 | 5.00 | 3.83 |
| 90-06 | | 2 | 4 | 3 | 2 | 1 | 1 | 1 | 5.00 | 3.33 |
| 90-07 | | 2 | 4 | 3 | 2 | 1 | 1 | 1 | 5.00 | 3.33 |
| 90-08 | | 2 | 4 | 3 | 2 | 1 | 1 | 1 | 5.00 | 3.33 |
| 90-09 | | 2 | 3 | 2.5 | 2 | 1 | 1 | 1 | 5.00 | 3.17 |

Data Analysis

Figure 58:
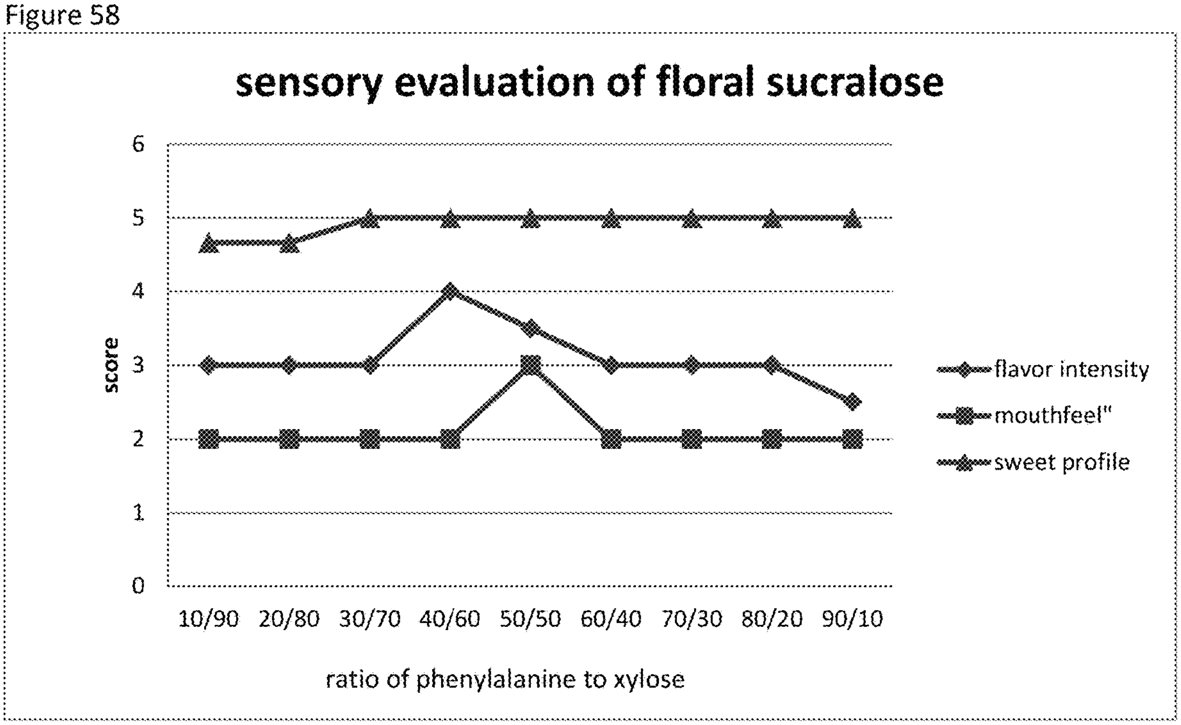
FIG. 58 shows the relationship between the sensory evaluation results to the ratio of phenylalanine to xylose of example 90.

The relationship between the sensory evaluation results to the ratio of phenylalanine to xylose in this example is as shown in FIG. 58.

Figure 59:
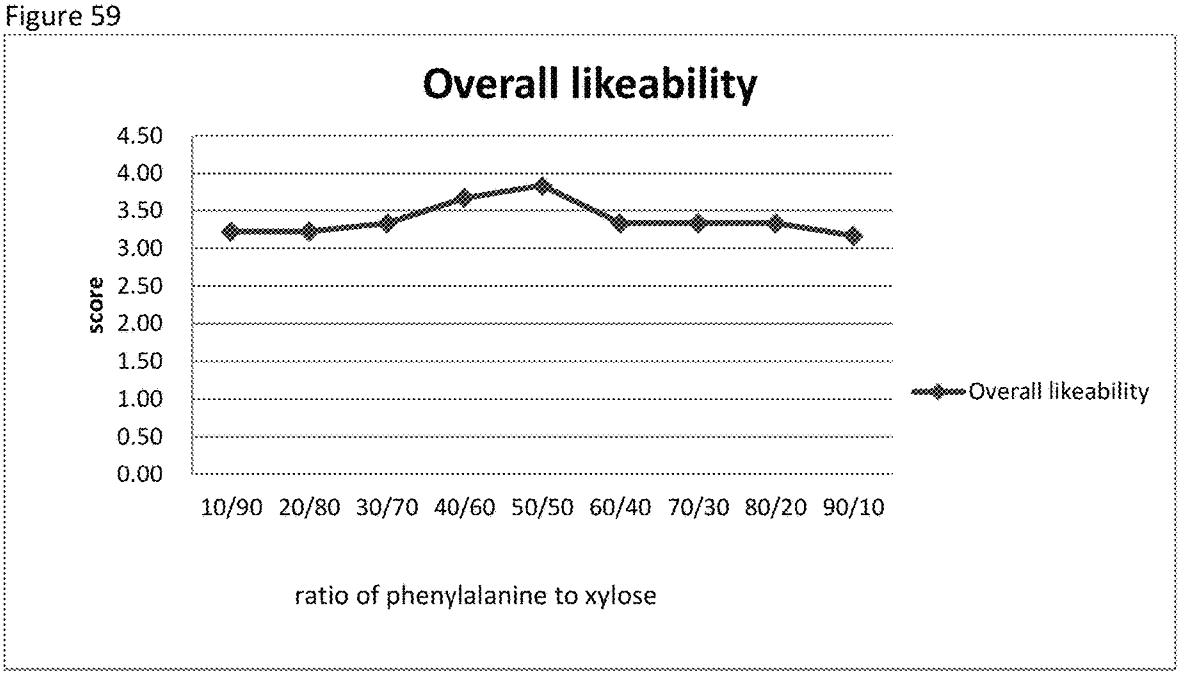
FIG. 59 shows the relationship between the overall likeability results to the ratio of phenylalanine to xylose of example 90.

The relationship between the overall likeability results to the ratio of phenylalanine to xylose in this example is as shown in FIG. 59.

Conclusion:

The result showed that MRPs (sucralose-MRPs) can significantly improve taste profile, flavor intensity and mouth feel of sucralose. All ranges in tested ratios of phenylalanine to xylose from 10/90 to 90/10 has good taste (overall likeability score >3), preferably when the ratio ranges from 30/70 to 80/20, the products provide superior taste (overall likeability score >3.5). The conclusion can be extended to 1:99 and 99:1. The tasting procedure is the same as Example 39.

Example 91

The Relationship Between the Taste Profile of Flora Taste Sucralose and the Ratio of Sucralose to the Mixture of Xylose and Phenylalanine (2:1) in the Reaction Mixture Common Process:

Sucralose, xylose and phenylalanine are blended according to the weight shown in Table 91.1. The mixture was dissolved into 2.5 g pure water. No pH regulator was added and the pH was about 5. The solution was heated at about 100 degrees centigrade for 2 hours. When the reaction was complete, the slurry was dried to obtain an off white powder MRP.

TABLE 91.1

| the weight of sucralose, xylose and phenylalanine | | | | | |
|---|---|---|---|---|---|
| # | Ratio of phenylalanine to xylose | ratio of sucralose to the mixture of xylose and phenylalanine | weight of sucralose (g) | weight of xylose (g) | Weight of phenylalanine (g) |
| 91-01 | 1/2 | 10/90 | 0.50 | 3.00 | 1.50 |
| 91-02 | | 20/80 | 1.00 | 2.67 | 1.33 |
| 91-03 | | 30/70 | 1.50 | 2.33 | 1.17 |
| 91-04 | | 40/60 | 2.00 | 2.00 | 1.00 |
| 91-05 | | 50/50 | 2.50 | 1.67 | 0.83 |
| 91-06 | | 60/40 | 3.00 | 1.33 | 0.67 |
| 91-07 | | 70/30 | 3.50 | 1.00 | 0.50 |
| 91-08 | | 80/20 | 4.00 | 0.67 | 0.33 |

Experiments

Several sucralose-MRPs in this Example were prepared. Each sample was evaluated according to above sensory evaluation method and the resulting data was the average of the panel. The reaction parameters and the taste profile of the products are as follow. Note that according to the sensory evaluation method, the mouth feel and sweet profile were evaluated based on the same sweetness. That's to say in those evaluations the concentrations of sucralose in all sample solutions were the same, 100 ppm. The results are shown in Table 91.2.

TABLE 91.2

| the score in sensory evaluation | | | | | | | | | | |
|---|---|---|---|---|---|---|---|---|---|---|
| | | Sensory evaluation | | | | | | | | |
| | | flavor intensity | | | | sweet profile | | | | |
| Sample # | flavor | Odor intensity | Flavor taste intensity | Score of flavor intensity | mouth feel kokumi | Sweet lingering | bitter-ness | Metallic aftertaste | Score of sweet profile | Overall like-ability |
| 91-01 | floral | 2 | 4 | 3 | 2 | 1 | 2 | 1 | 4.67 | 3.22 |
| 91-02 | | 2 | 4 | 3 | 3 | 1 | 1 | 1 | 5.00 | 3.67 |
| 91-03 | | 2 | 4 | 3 | 4 | 2 | 1 | 1 | 4.67 | 3.89 |
| 91-04 | | 2 | 4 | 3 | 3 | 2 | 1 | 1 | 4.67 | 3.56 |
| 91-05 | | 2 | 5 | 3.5 | 3 | 2 | 1 | 1 | 4.67 | 3.72 |
| 91-06 | | 2 | 5 | 3.5 | 3 | 2 | 1 | 1 | 4.67 | 3.72 |
| 91-07 | | 2 | 4 | 3 | 3 | 2 | 1 | 1 | 4.67 | 3.56 |
| 91-08 | | 1 | 4 | 2.5 | 2 | 2 | 1 | 1 | 4.67 | 3.06 |

Data Analysis

Figure 60:
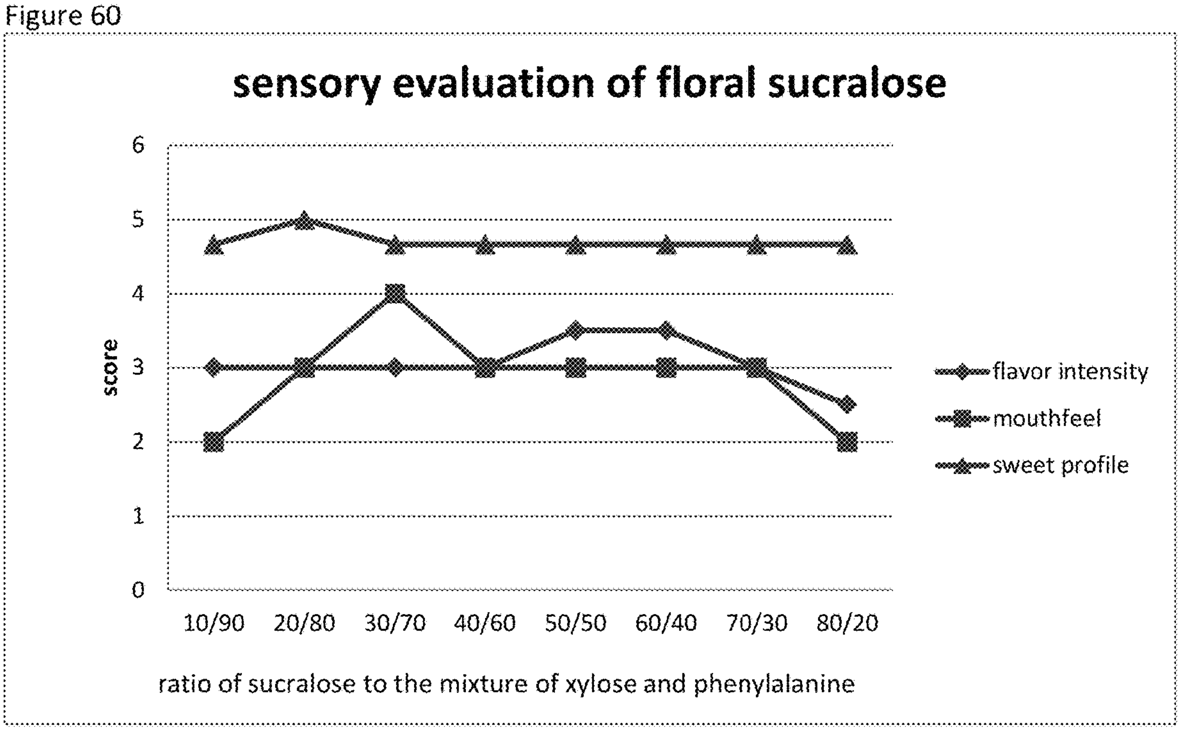
FIG. 60 shows the relationship between the sensory evaluation results to the ratio of sucralose to the mixture of xylose and phenylalanine of example 91.

The relationship between the sensory evaluation results to the ratio of sucralose to the mixture of xylose and phenylalanine in this example is as shown in FIG. 60.

Figure 61:
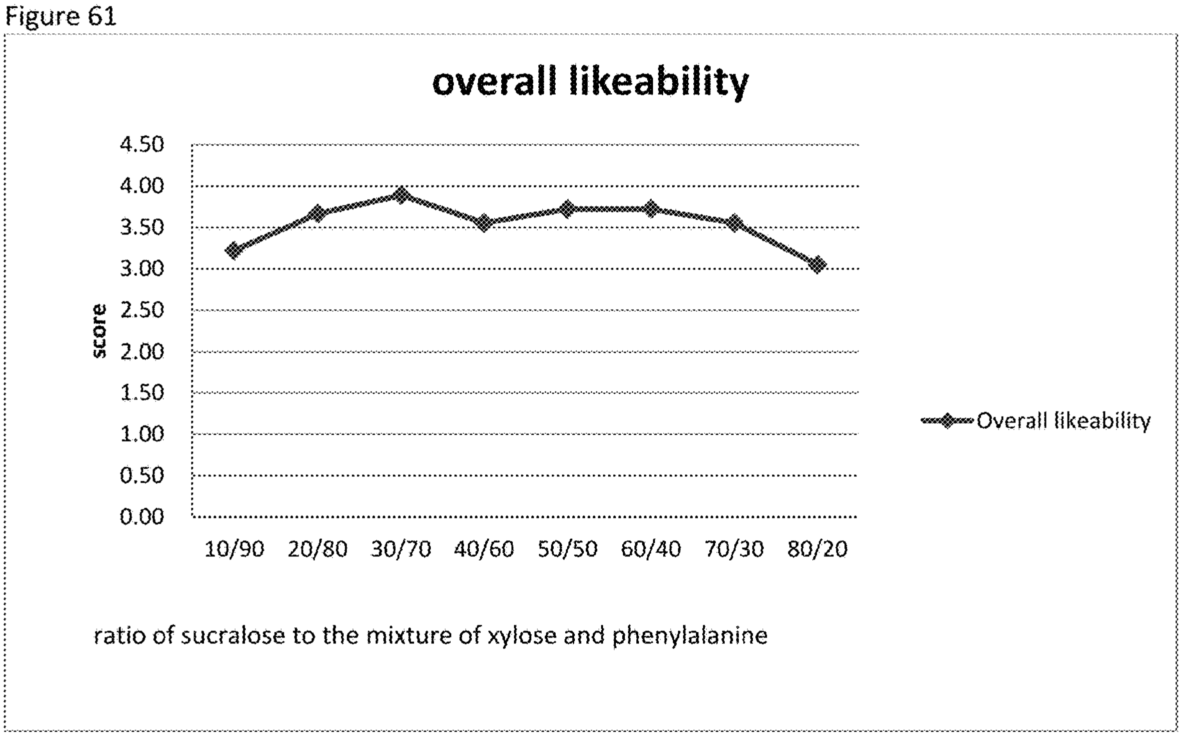
FIG. 61 shows the relationship between the overall likeability results to the ratio of sucralose to the mixture of xylose and phenylalanine of example 91.

The relationship between the overall likeability results to the ratio of sucralose to the mixture of xylose and phenylalanine in this example is as shown in FIG. 61.

Conclusion:

The results showed that MRPs (sucralose-MRPs) can significantly improve taste profile, flavor intensity and mouth feel of sucralose. All ranges in tested ratios of sucralose to the mixture of xylose and phenylalanine from 10/90 to 80/20 had good taste (overall likeability score >3), preferably when the ratio ranges were from 20/80 to 70/30, the products provided superior taste (overall likeability score >3.5). This conclusion can be extended to 1:99 and 99:1. The tasting procedure is the same as Example 39.

Example 92

The Relationship Between the Taste Profile of Popcorn Taste Sucralose and the Ratio of Rhamnose to Proline in the Reaction Mixture Common Process:

Sucralose, rhamnose and proline were blended according to the weight shown in Table 92.1. The mixture was dissolved into 2.5 g pure water. No need to add any pH regulator was added and the pH was about 5. The solution was heated at about 100 degrees centigrade for 2 hours. When the reaction was complete, the slurry was dried to obtain an off white powder MRP.

TABLE 92.1

| the weight of sucralose, rhamnose and proline | | | | |
|---|---|---|---|---|
| # | Ratio of proline to rhamnose w/w | weight of sucralose | Weight of rhamnose | Weight of proline |
| 92-01 | 10/90 | 4 g | 0.9 g | 0.1 g |
| 92-02 | 20/80 | 4 g | 0.8 g | 0.2 g |
| 92-03 | 30/70 | 4 g | 0.7 g | 0.3 g |
| 92-04 | 40/60 | 4 g | 0.6 g | 0.4 g |
| 92-05 | 50/50 | 4 g | 0.5 g | 0.5 g |
| 92-06 | 60/40 | 4 g | 0.4 g | 0.6 g |
| 92-07 | 70/30 | 4 g | 0.3 g | 0.7 g |
| 92-08 | 80/20 | 4 g | 0.2 g | 0.8 g |
| 92-09 | 90/10 | 4 g | 0.1 g | 0.9 g |

Experiments

Several sucralose-MRPs in this Example were prepared. Each sample was evaluated according to above sensory evaluation method and the resulting data was the average of the panel. The reaction parameters and the taste profile of the products are as follow. Note that according to the sensory evaluation method, the mouth feel and sweet profile were evaluated based on the same sweetness. That's to say in those evaluations the concentrations of sucralose in all sample solutions were the same, 100 ppm. The results are shown in Table 92.2.

TABLE 92.2

| the score in sensory evaluation | | | | | | | | | | |
|---|---|---|---|---|---|---|---|---|---|---|
| | | sensory evaluation | | | | | | | | |
| | | flavor intensity | | | | sweet profile | | | | |
| # | flavor | Odor intensity | Flavor taste intensity | Score of flavor intensity | mouth feel kokumi | sweet lingering | bitter-ness | metallic aftertaste | score of sweet profile | overall like-ability |
| 92-01 | popcorn | 2 | 2 | 2 | 3 | 2 | 1 | 1 | 4.67 | 3.22 |
| 92-02 | | 1 | 4 | 2.5 | 3 | 1 | 1 | 1 | 5.00 | 3.50 |
| 92-03 | | 2 | 3 | 2.5 | 3 | 1 | 1 | 1 | 5.00 | 3.50 |
| 92-04 | | 2 | 5 | 3.5 | 4 | 1 | 1 | 1 | 5.00 | 4.17 |
| 92-05 | | 1 | 4 | 2.5 | 4 | 1 | 1 | 1 | 5.00 | 3.83 |
| 92-06 | | 1 | 3 | 2 | 4 | 1 | 1 | 1 | 5.00 | 3.67 |
| 92-07 | | 1 | 3 | 2 | 3 | 1 | 1 | 1 | 5.00 | 3.33 |
| 92-08 | | 1 | 2 | 2 | 3 | 1 | 1 | 1 | 5.00 | 3.33 |
| 92-09 | | 1 | 2 | 1.5 | 2 | 1 | 1 | 1 | 5.00 | 2.83 |

Data Analysis

Figure 62:
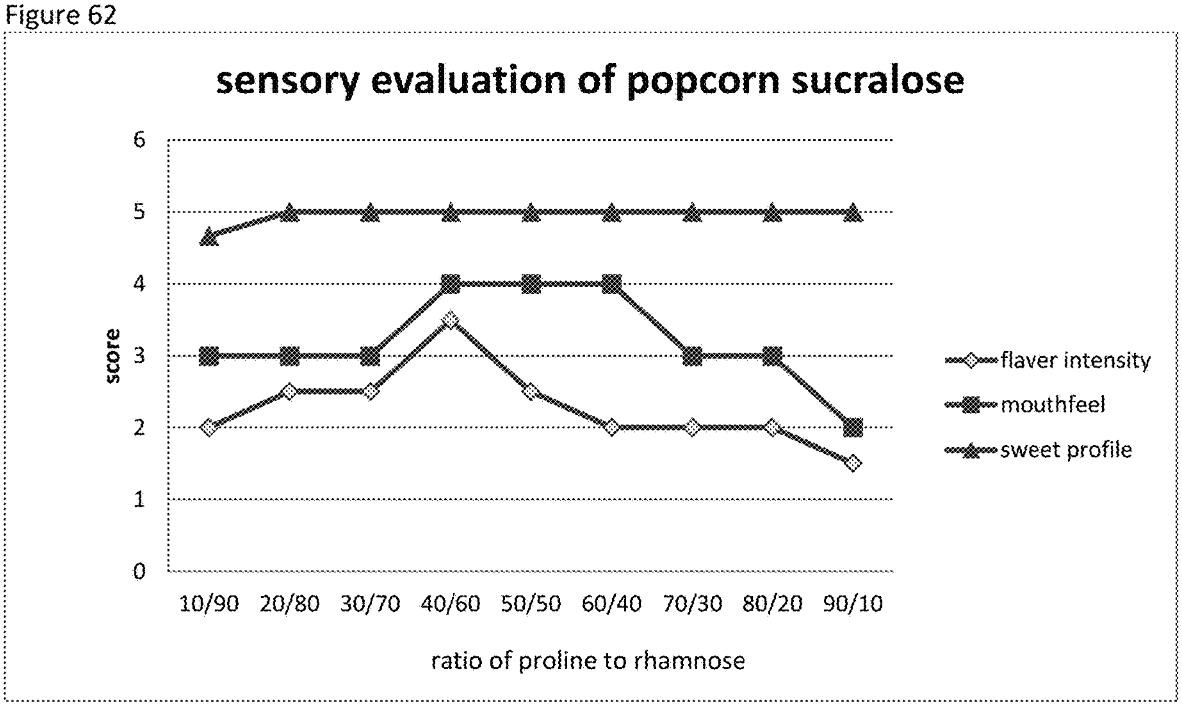
FIG. 62 shows the relationship between the sensory evaluation results to the ratio of proline to rhamnose of example 92.

The relationship between the sensory evaluation results to the ratio of proline to rhamnose in this example is as shown in FIG. 62.

Figure 63:
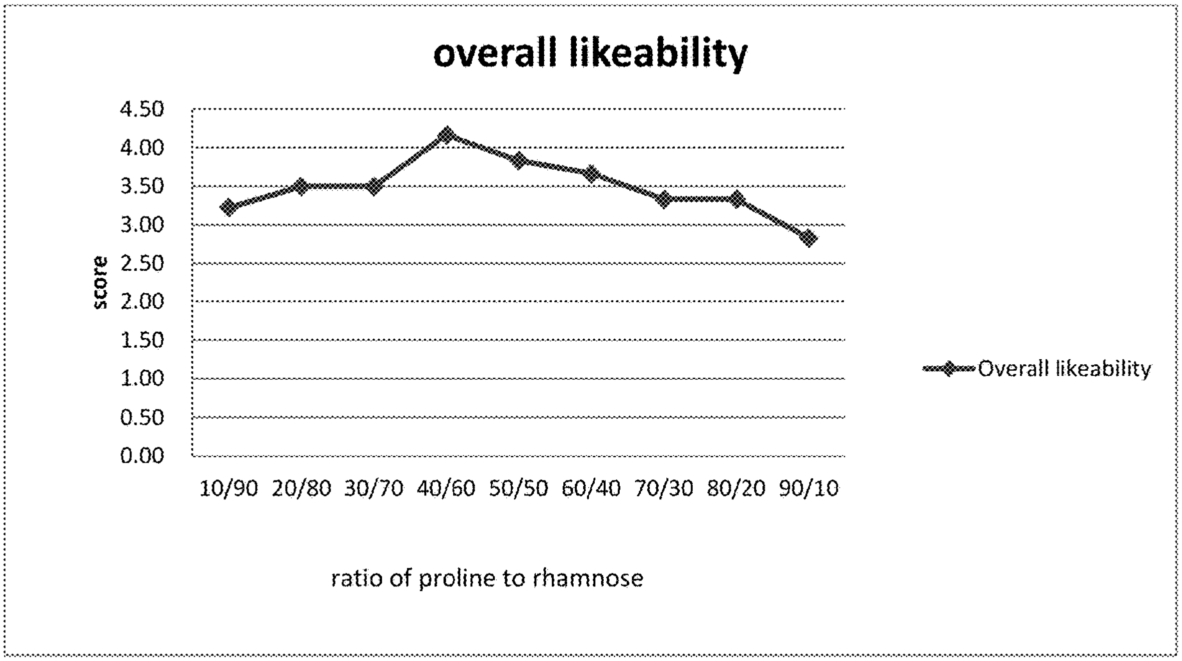
FIG. 63 shows the relationship between the overall likeability results to the ratio of proline to rhamnose of example 92.

The relationship between the overall likeability results to the ratio of proline to rhamnose in this example is as shown in FIG. 63.

Conclusion:

The result showed that MRPs (sucralose-MRPs) can significantly improve taste profile, flavor intensity and mouth feel of sucralose. All ranges in tested ratios of proline to rhamnose from 10/90 to 90/10 had good taste (overall likeability score >3), preferably when the ratio ranges were from 20/80 to 60/40, the products provided superior taste (overall likeability score >3.5). The conclusion can be extended to 1:99 and 99:1. The tasting procedure is the same as Example 39.

Example 93

The Relationship Between the Taste Profile of Popcorn Taste Sucralose and the Ratio of Sucralose to the Mixture Of Proline and Rhamnose (1:2) in the Reaction Mixture Common Process:

Sucralose, proline and rhammose were blended according to the weight shown in Table 93.1. The mixture was dissolved into 2.5 g pure water. No pH regulator was added and the pH was about 5. The solution was heated at about 100 degrees centigrade for 2 hours. When the reaction was complete, the slurry was dried to obtain an off white powder MRP.

TABLE 93.1

| the weight of sucralose, proline and rhamnose | | | | | |
|---|---|---|---|---|---|
| # | The ratio of proline to rhamnose | The ration of sucralose to the mixture of proline and rhamnose | weight of sucralose (g) | Weight of rhamnose (g) | Weight of proline (g) |
| 93-01 | 1/2 | 10/90 | 0.50 | 3.00 | 1.50 |
| 93-02 | | 20/80 | 1.00 | 2.67 | 1.33 |
| 93-03 | | 30/70 | 1.50 | 2.33 | 1.17 |
| 93-04 | | 40/60 | 2.00 | 2.00 | 1.00 |
| 93-05 | | 50/50 | 2.50 | 1.67 | 0.83 |
| 93-06 | | 60/40 | 3.00 | 1.33 | 0.67 |
| 93-07 | | 70/30 | 3.50 | 1.00 | 0.50 |
| 93-08 | | 80/20 | 4.00 | 0.67 | 0.33 |
| 93-09 | | 90/10 | 4.50 | 0.33 | 0.17 |

Experiments

Several sucralose-MRPs in this Example were prepared. Each sample was evaluated according to above sensory evaluation method and the resulting data was an average of the panel. The reaction parameters and the taste profile of the products were as follow. Note that according to the sensory evaluation method, the mouth feel and sweet profile were evaluated based on the same sweetness. That's to say in those evaluations the concentrations of sucralose in all sample solutions were the same, 100 ppm. The results are shown in Table 93.2.

TABLE 93.2 the score in sensory evaluation

| # | flavor | Odor intensity | Flavor taste intensity | Score of flavor intensity | mouth feel kokumi | sweet lingering | bitter-ness | metallic aftertaste | score of sweet profile | overall like-ability |
|---|---|---|---|---|---|---|---|---|---|---|
| | | sensory evaluation | | | | | | | | |
| | | flavor intensity | | | | sweet profile | | | | |
| 93-01 | popcorn | 2 | 3 | 2.5 | 3 | 1 | 2 | 1 | 4.67 | 3.39 |
| 93-02 | | 2 | 3 | 2.5 | 3 | 1 | 1 | 1 | 5.00 | 3.50 |
| 93-03 | | 2 | 3 | 2.5 | 3 | 1 | 1 | 1 | 5.00 | 3.50 |
| 93-04 | | 2 | 3 | 2.5 | 3 | 1 | 1 | 1 | 5.00 | 3.50 |
| 93-05 | | 3 | 4 | 3.5 | 3 | 2 | 1 | 1 | 4.67 | 3.72 |
| 93-06 | | 2 | 3 | 2.5 | 2 | 2 | 1 | 1 | 4.67 | 3.06 |
| 93-07 | | 1 | 3 | 2 | 2 | 2 | 1 | 1 | 4.67 | 2.89 |
| 93-08 | | 1 | 2 | 1.5 | 2 | 2 | 1 | 1 | 4.67 | 2.72 |
| 93-09 | | 1 | 2 | 1.5 | 2 | 2 | 1 | 2 | 4.33 | 2.61 |

Data Analysis

Figure 64:
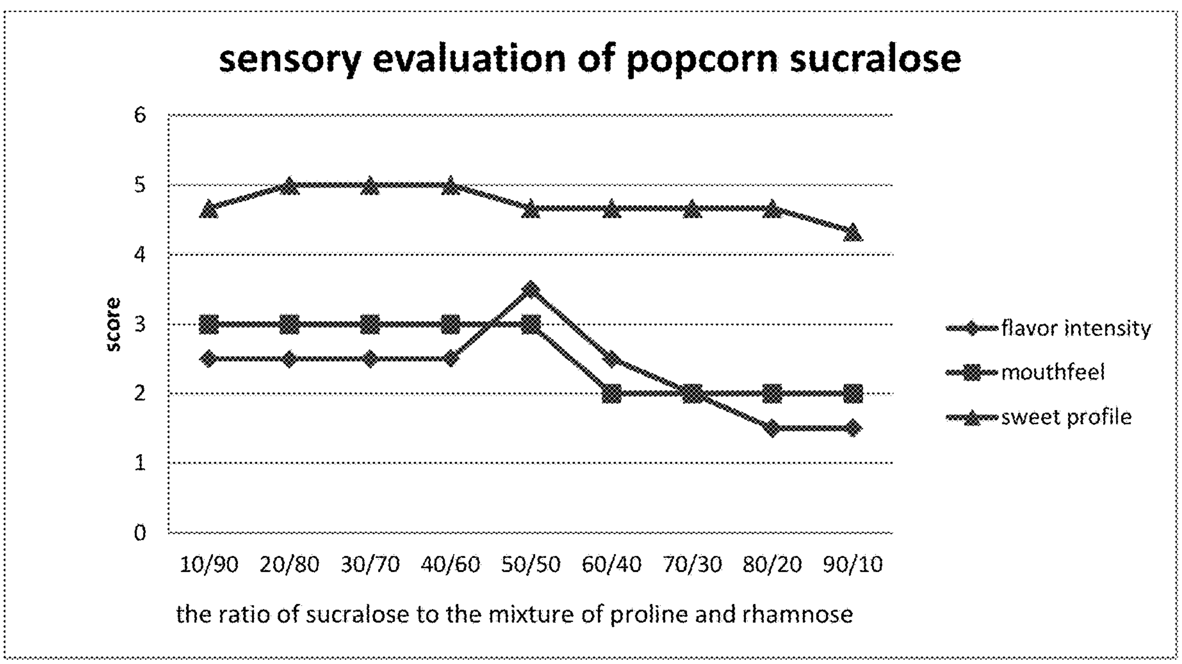
FIG. 64 shows the relationship between the sensory evaluation results to the ratio of sucralose to the mixture of proline and rhamnose of example 93.

The relationship between the sensory evaluation results to the ratio of sucralose to the mixture of proline and rhamnose in this example is as shown in FIG. 64.

Figure 65:
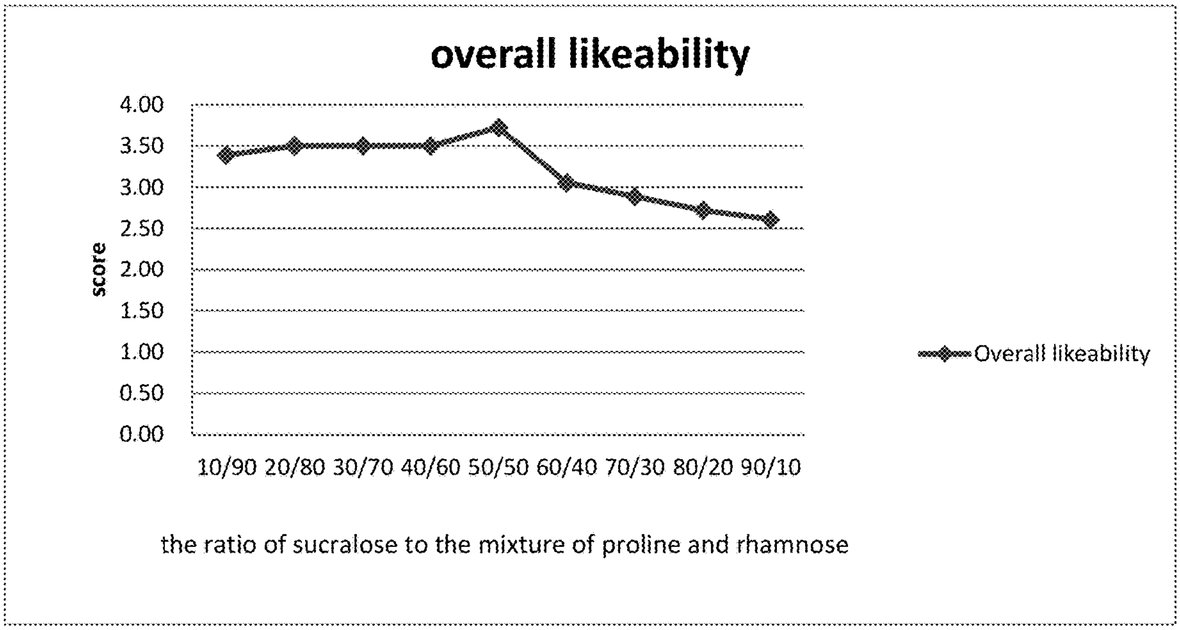
FIG. 65 shows the relationship between the overall likeability results to the ratio of sucralose to the mixture of proline and rhamnose of example 93.

The relationship between the overall likeability results to the ratio of sucralose to the mixture of proline and rhamnose in this example is as shown in FIG. 65, Conclusion:

The results showed that MRPs (sucralose-MRPs) can significantly improve taste profile, flavor intensity and mouth feel of sucralose. All ranges in tested ratios of sucralose to the mixture of proline and rhamnose from 10/90 to 60/40 had good taste (overall likeability score >3), preferably when the ratio ranges were from 20/80 to 50/50, the products provided superior taste (overall likeability score >3.5). This conclusion can be extended to 1:99 and 99:1. The tasting procedure is the same as Example 39.

Example 94

The Relationship Between the Taste Profile of Caramel Taste Sucralose and the Ratio of Xylose to Alanine in the Reaction Mixture Common Process:

Sucralose, xylose and alanine were blended according to the weight shown in Table 94.1. The mixture was dissolved into 2.5 g pure water. No pH regulator was added and the pH was about 5. The solution was heated at about 100 degrees centigrade for 2 hours. When the reaction was complete, the slurry was dried to obtain an off white powder MRP.

TABLE 94.1 the weight of sucralose, xylose and alanine

| # | The ratio of alanine to xylose w/w | weight of sucralose | Weight of xylose | Weight of alanine |
|---|---|---|---|---|
| 94-01 | 10/90 | 4 g | 0.9 g | 0.1 g |
| 94-02 | 20/80 | 4 g | 0.8 g | 0.2 g |
| 94-03 | 30/70 | 4 g | 0.7 g | 0.3 g |
| 94-04 | 40/60 | 4 g | 0.6 g | 0.4 g |
| 94-05 | 50/50 | 4 g | 0.5 g | 0.5 g |
| 94-06 | 60/40 | 4 g | 0.4 g | 0.6 g |
| 94-07 | 70/30 | 4 g | 0.3 g | 0.7 g |
| 94-08 | 80/20 | 4 g | 0.2 g | 0.8 g |
| 94-09 | 90/10 | 4 g | 0.1 g | 0.9 g |

Experiments

Several sucralose-MRPs in this Example were prepared. Each sample was evaluated according to above sensory evaluation method and the resulting data was an average of the panel. The reaction parameters and the taste profile of the products are as follow. Note that according to the sensory evaluation method, the mouth feel and sweet profile were evaluated based on the same sweetness. That's to say in those evaluations the concentrations of sucralose in all sample solutions were the same, 100 ppm. The results are shown in Table 94.2.

TABLE 94.2 the score in sensory evaluation

| # | flavor | Odor intensity | Flavor taste intensity | Score of flavor intensity | mouth feel kokumi | sweet lingering | bitter-ness | metallic aftertaste | score of sweet profile | overall like-ability |
|---|---|---|---|---|---|---|---|---|---|---|
| | | sensory evaluation | | | | | | | | |
| | | flavor intensity | | | | sweet profile | | | | |
| 94-01 | Caramel | 2 | 3 | 2.5 | 2 | 2 | 2.5 | 1 | 4.17 | 2.89 |
| 94-02 | | 2 | 3 | 2.5 | 3 | 2 | 2 | 1 | 4.33 | 3.28 |
| 94-03 | | 3 | 4 | 3.5 | 3 | 2 | 1 | 1 | 4.67 | 3.72 |
| 94-04 | | 3 | 4 | 3.5 | 3 | 1 | 1 | 1 | 5.00 | 3.83 |
| 94-05 | | 2 | 2 | 2 | 2 | 1 | 1 | 1 | 5.00 | 3.00 |
| 94-06 | | 1 | 2 | 1.5 | 2 | 1 | 1 | 1 | 5.00 | 2.83 |
| 94-07 | | 1 | 1 | 1 | 2 | 1 | 1 | 1 | 5.00 | 2.67 |

TABLE 94.2-continued

| the score in sensory evaluation | | | | | | | | | | |
|---|---|---|---|---|---|---|---|---|---|---|
| | | sensory evaluation | | | | | | | | |
| | | flavor intensity | | | | sweet profile | | | | |
| # | flavor | Odor intensity | Flavor taste intensity | Score of flavor intensity | mouth feel kokumi | sweet lingering | bitter-ness | metallic aftertaste | score of sweet profile | overall like-ability |
| 94-08 | | 1 | 1 | 1 | 2 | 1 | 1 | 1.5 | 4.83 | 2.61 |
| 94-09 | | 1 | 1 | 1 | 2 | 2 | 1 | 2 | 4.33 | 2.44 |

Data Analysis

Figure 66:
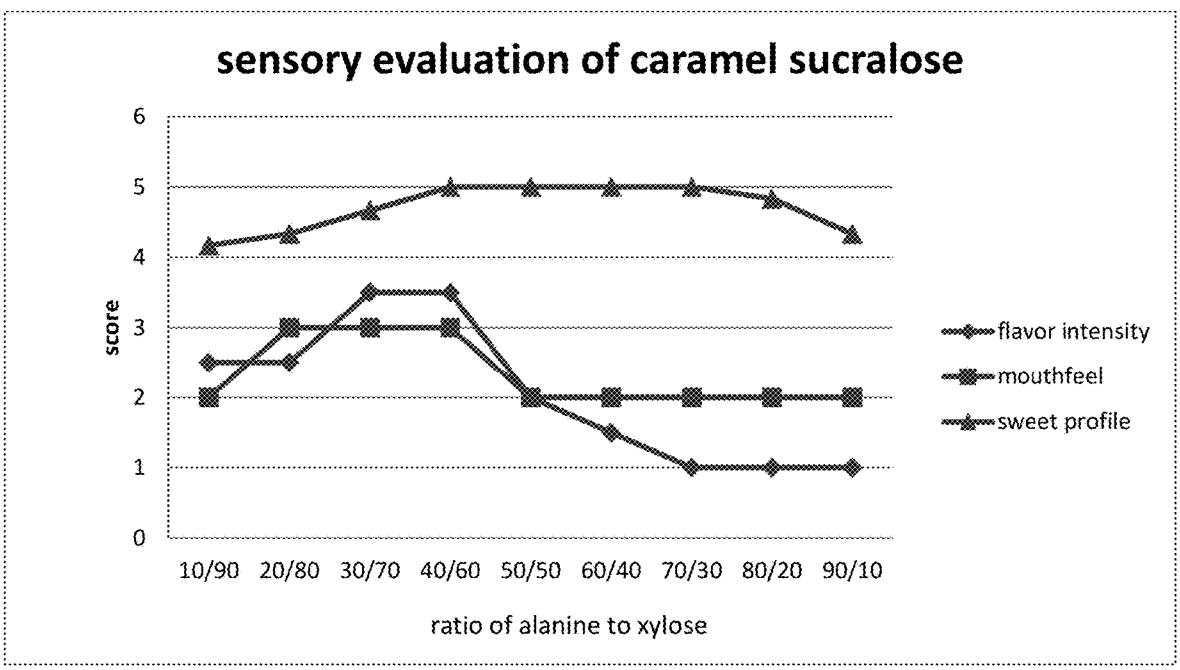
FIG. 66 shows the relationship between the sensory evaluation results to the ratio of alanine to xylose of example 94.

The relationship between the sensory evaluation results to the ratio of alanine to xylose in this example is as shown in FIG. 66.

Figure 67:
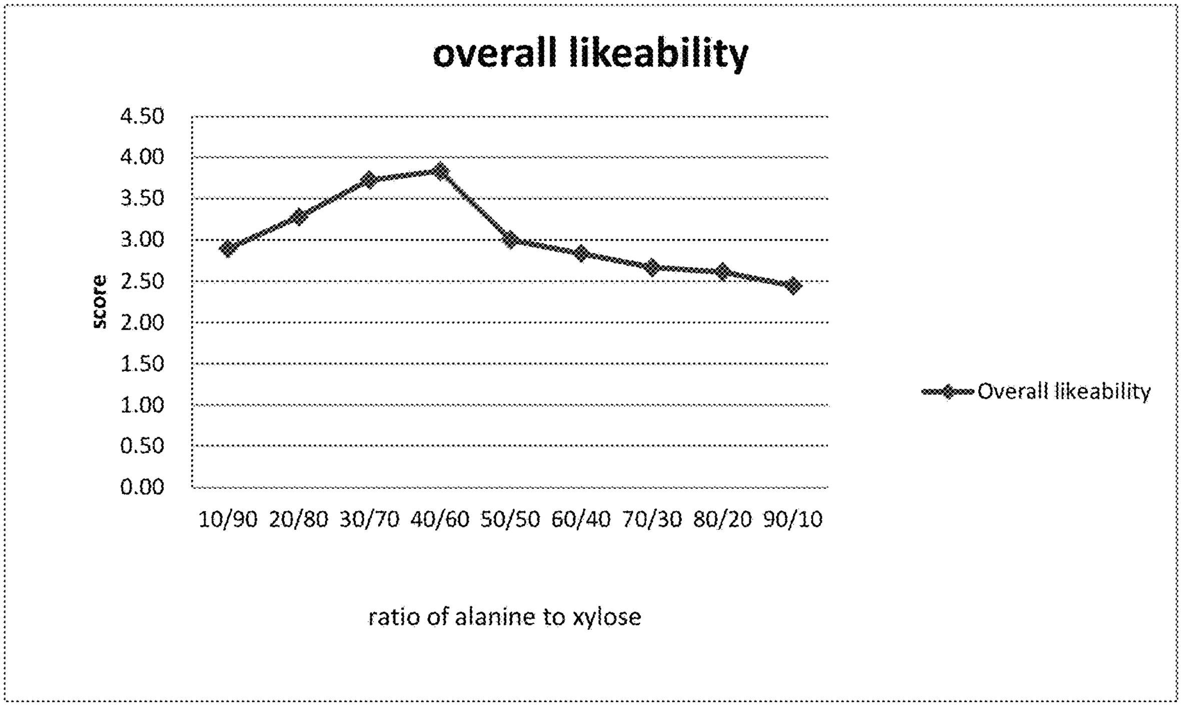
FIG. 67 shows the relationship between the overall likeability results to the ratio of alanine to xylose of example 94.

The relationship between the overall likeability results to the ratio of alanine to xylose in this example is as shown in FIG. 67.

Conclusion:

The results show that MRPs (sucralose-MRPs) can significantly improve taste profile, flavor intensity and mouth feel of sucralose. All ranges in tested ratios of alanine to xylose from 20/80 to 50/50 had good taste (overall likeability score >3), preferably when the ratio ranges from 30/70 to 40/60, the products provided superior taste (overall likeability score >3.5). The conclusion can be extended to 1:99 and 99:1. The tasting procedure is the same as Example 39.

Example 95

The Relationship Between the Taste Profile of Caramel Taste Sucralose and the Ratio of Sucralose to the Mixture of Xylose and Alanine (2:1) in the Reaction Mixture Common Process:

Sucralose, alanine and xylose were blended according to the weight shown in Table 95.1. The mixture was dissolved into 2.5 g pure water. No pH regulator was added and the pH was about 5. The solution was at about 100 degrees centigrade for 2 hours. When the reaction was complete, the slurry was dried to obtain an off white powder MRP.

TABLE 95.1

| the weight of sucralose, alanine and xylose | | | | | |
|---|---|---|---|---|---|
| # | Ratio of alanine to xylose | Ratio of sucralose to the mixture of alanine and xylose | weight of sucralose (g) | weight of xylose (g) | Weight of alanine (g) |
| 95-01 | 1/2 | 10/90 | 0.50 | 3.00 | 1.50 |
| 95-02 | | 20/80 | 1.00 | 2.67 | 1.33 |
| 95-03 | | 30/70 | 1.50 | 2.33 | 1.17 |
| 95-04 | | 40/60 | 2.00 | 2.00 | 1.00 |
| 95-05 | | 50/50 | 2.50 | 1.67 | 0.83 |
| 95-06 | | 60/40 | 3.00 | 1.33 | 0.67 |
| 95-07 | | 70/30 | 3.50 | 1.00 | 0.50 |
| 95-08 | | 80/20 | 4.00 | 0.67 | 0.33 |
| 95-09 | | 90/10 | 4.50 | 0.33 | 0.17 |

Experiments

Several sucralose-MRPs in this Example were prepared. Each sample was evaluated according to above sensory evaluation method and the resulting data was an average of the panel. The reaction parameters and the taste profile of the products are as follow. Note that according to the sensory evaluation method, the mouth feel and sweet profile were evaluated based on the same sweetness. That's to say in those evaluations the concentrations of sucralose in all sample solutions were the same, 100 ppm. The results are shown in Table 95.2.

TABLE 95.2

| the score in sensory evaluation | | | | | | | | | | |
|---|---|---|---|---|---|---|---|---|---|---|
| | | sensory evaluation | | | | | | | | |
| | | flavor intensity | | | | sweet profile | | | | |
| # | flavor | Odor intensity | Flavor taste intensity | Score of flavor intensity | mouth feel kokumi | sweet lingering | bitter-ness | metallic aftertaste | score of sweet profile | overall like-ability |
| 95-01 | floral | 2 | 3 | 2.5 | 3 | 1 | 2.5 | 1 | 4.50 | 3.33 |
| 95-02 | | 2 | 3 | 2.5 | 2 | 1 | 1.5 | 1 | 4.83 | 3.11 |
| 95-03 | | 3 | 3 | 3 | 2 | 1 | 1 | 1 | 5.00 | 3.33 |
| 95-04 | | 3 | 3 | 3 | 2 | 1 | 1 | 1 | 5.00 | 3.33 |
| 95-05 | | 4 | 3 | 3.5 | 2 | 1 | 1 | 1 | 5.00 | 3.50 |
| 95-06 | | 4 | 4 | 4 | 2 | 1 | 1 | 1 | 5.00 | 3.67 |
| 95-07 | | 3 | 3 | 3 | 2 | 1 | 1 | 1.5 | 4.83 | 3.28 |
| 95-08 | | 2 | 3 | 2.5 | 2 | 1 | 1 | 2 | 4.67 | 3.06 |
| 95-09 | | 2 | 3 | 2.5 | 2 | 1 | 1 | 2 | 4.67 | 3.06 |

Data Analysis

Figure 68:
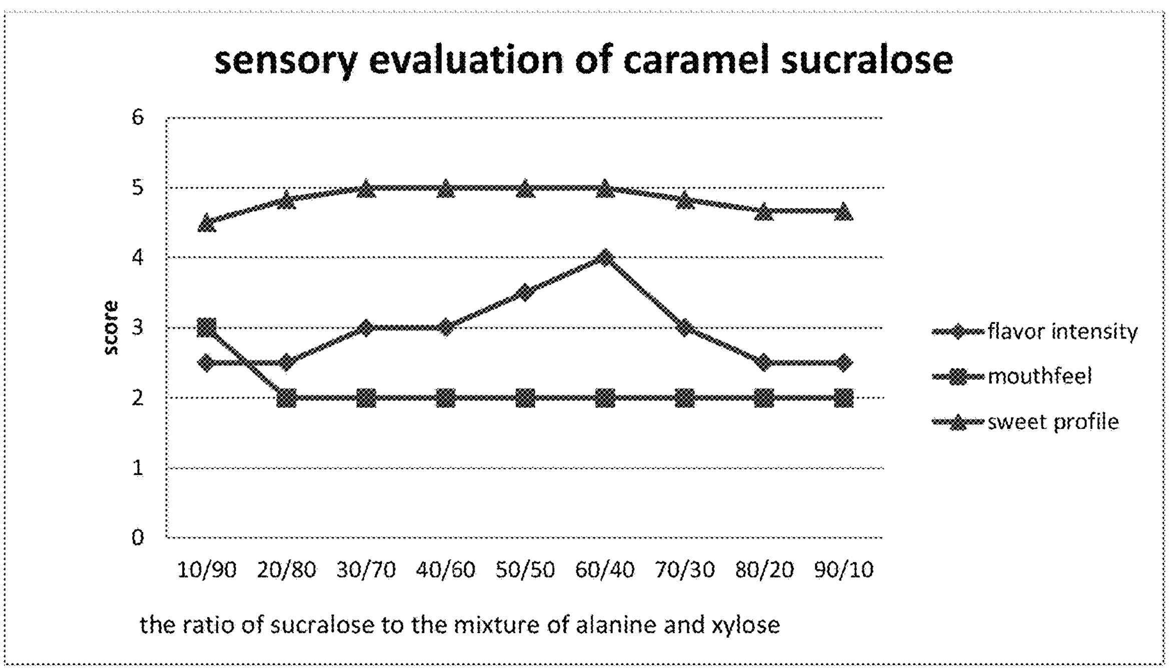
FIG. 68 shows the relationship between the sensory evaluation results to the ratio of sucralose to the mixture of alanine and xylose of example 95.

The relationship between the sensory evaluation results to the ratio of sucralose to the mixture of alanine and xylose in this example is as shown in FIG. 68.

Figure 69:
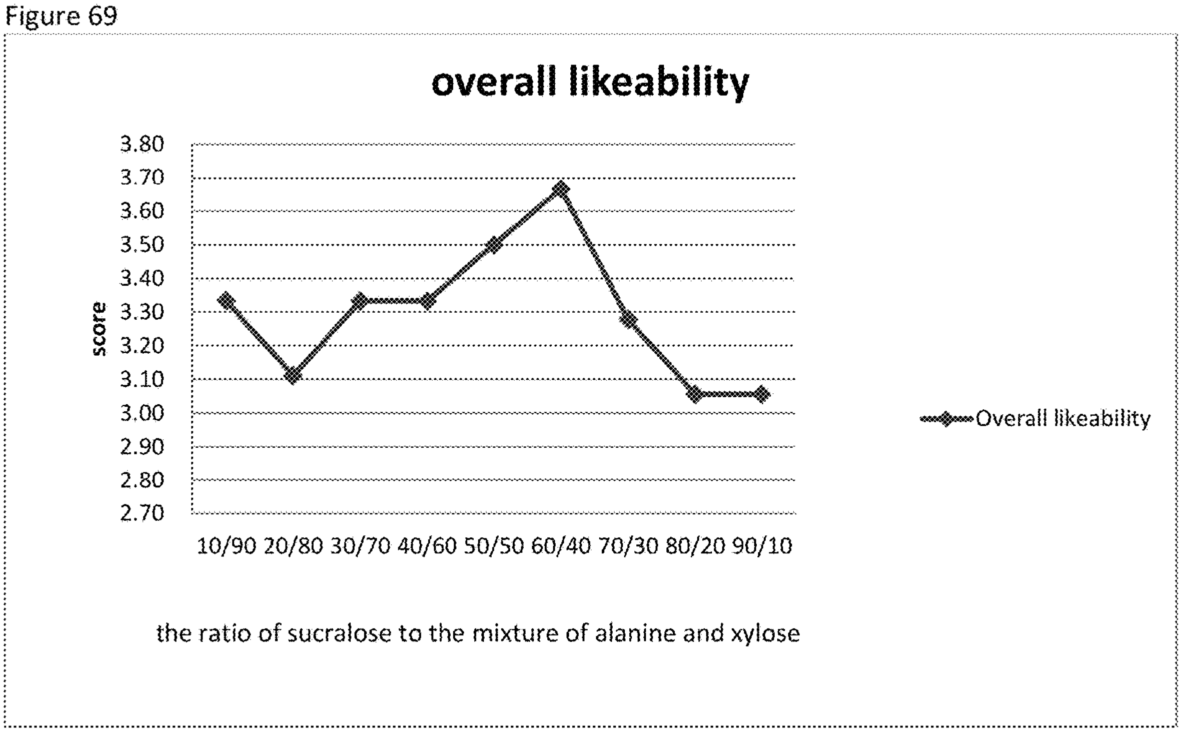
FIG. 69 shows the relationship between the overall likeability results to the ratio of sucralose to the mixture of alanine and xylose of example 95.

The relationship between the overall likeability results to the ratio of sucralose to the mixture of alanine and xylose in this example is as shown in FIG. 69.

Conclusion:

The results showed that MRPs (sucralose-MRPs) can significantly improve taste profile, flavor intensity and mouth feel of sucralose. All ranges in tested ratios of sucralose to the mixture of alanine and xylose from 10/90 to 90/10 had good taste (overall likeability score >3), preferably when the ratio ranges were from 50/50 to 60/40, the products gave superior taste (overall likeability score >3.5). The conclusion can be extended to 1:99 and 99:1. The tasting procedure is the same as Example 38.

Example 96

Preparation of MRP-FL from Phenylalanine and Xylose 33.35 g xylose and 16.65 g phenylalanine were mixed. The ratio of xylose to phenylalanine was 2:1. The mixture was dissolved into 125 g pure water. No pH regulator was added and the pH was about 5. The solution was heated at about 100 degrees centigrade for 2 hours. When the reaction was complete, the reaction mixture was filtered by filter paper and the filtrate was dried by spray dryer to provide about 42 g of a light brown powder MRP-FL.

Example 97

Preparation of MRP-CA from Alanine and Xylose 30 g xylose and 10 g alanine were mixed. The ratio of xylose to alanine was 3:1. The mixture was dissolved into 50 g pure water. No pH regulator was added and let the pH was about 5. The solution was heated at about 100 degrees centigrade for 2 hours. When the reaction was complete, the reaction mixture was filtered with filter paper and the filtrate was dried by spray dryer to provide about 33 g of a light brown powder MRP-CA.

Example 98

Preparation of MRP-CI from Glutamic Acid and Galactose 37.5 g galactose and 11.2.5 g glutamic acid were mixed. The ratio of galactose to glutamic acid was 3:1. The mixture was dissolved into 250 g pure water. No pH regulator was added and the pH was about 5. The solution was heated at about 100 degrees centigrade for 2. hours. When the reaction was complete, the reaction mixture was filtered with filter paper and the filtrate was dried by spray dryer to provide about 39 g of an off white powder MRP-CI.

Example 99

Preparation of MRP-CH from Valine and Rhamnose 7.5 g rhamnose and 7.5 g valine were mixed. The ratio of rhamnose to valine was 1:1. The mixture was dissolved into a mixture of 1.875 g pure water and 7.5 g propylene glycol. The solution was heated at about 120 degrees centigrade for 2 hours. When the reaction was complete, the temperature of the reaction mixture was cooled to 30 degrees centigrade. A premix of 37.5 g maltodextrin and 37.5 g pure water was added to the reaction mixture and stirred for about 4 hour. The mixture was filtered by filter paper and the filtrate was dried by spray dryer to provide about 50 g of a light brown powder MRP-CH.

Example 100

Preparation of S-MRP-CI from *Stevia* Extract, Glutamic Acid and Galactose

*Stevia* extract: available from Sweet Green Fields, Lot #20180409, prepared according to the method of Example 37, final powder. RA 24.33%, RD 3.49%, TSG (according to JECFA 2010) 62.29%

45 g *Stevia* extract, 1.25 g galactose and 3.75 g glutamic acid were mixed. The ratio of galactose to glutamic acid was 3:1 and the ratio of *Stevia* extract to the mixture of galactose and glutamic acid is 9:1. The mixture was dissolved into 25 g pure water. No pH regulator was added and the pH was about 5. The solution was heated at about 100 degrees centigrade for 2 hours. When the reaction was complete, the reaction mixture was filtered by filter paper and the filtrate was dried by spray dryer to provide about 39 g of an off white powder S-MRP-CI.

Example 101

Preparation of S-MRP-CH from *Stevia* Extract, Valine and Rhamnose

*Stevia* extract: RA20/TSG(9)95 (available from Sweet Green Fields, lot #YCJ201.80403; RA 27.89%, TSG (JECFA2010) 99.03%)

52.5 g *Stevia* extract, 11.25 g rhamnose and 11.25 g valine were mixed. The ratio of rhamnose to valine was 1:1. The mixture was dissolved into a mixture of 9.375 g pure water and 37.5 g propylene glycol. The solution was heated at about 120 degrees centigrade for 2 hours. When the reaction was complete, the temperature of reaction mixture was cooled to 30 degrees centigrade. A premix of 165 g maltodextrin and 165 g pure water was added to the reaction mixture and stirred for about 4 hour. The mixture was filtered by filter paper and the filtrate was dried by spray dryer to provide about 250 g of a light brown powder S-MRP-CH.

Examples 102-104

Salt Reduction Synergic Effect of MRP, S-MRP and TS-MRP to Edible Salt

Materials:

MRP-CI the product of Example 98

S-MRP-CI the product of Example 100 thaumatin available from EPC Natural Products Co., Ltd, China, lot #20180801, the content of thaumatin is 10.74%.

TS-MRP-CI the mixture of above S-MRP-C1 and thaumatin with the weight ratio of 10:1

Edible salt iodine and low sodium salt, available from Guangdong Salt Industry Group Co., Ltd, China, lot #2018/05/31C2GZ Example 102

Salt Reduction Synergic Effect of MRP to Edible Salt

Method

Several of 0.05% edible salt solutions were prepared, and an appropriate amount of MRP-CI was added to prepare salt solutions containing different concentrations of MRP-CI. The data of each test sample is shown in Table 102.1.

TABLE 102.1 the weight and concentration of MRP-CI in 0.05% edible salt solutions

| # | 0.05% edible salt solution (ml) | Weight of MRP-CI (mg) | Concentration of MRP-CI (ppm) |
|---|---|---|---|
| 102-01 | 50 | 1.5 | 30 |
| 102-02 | 50 | 2.5 | 50 |
| 102-03 | 50 | 4 | 80 |
| 102-04 | 50 | 5 | 100 |
| 102-05 | 50 | 6 | 120 |
| 102-06 | 50 | 7.5 | 150 |
| 102-07 | 50 | 9 | 180 |
| 102-08 | 50 | 10 | 200 |

Results

The members of panel tasted each test solution and compared it with different concentrations of standard saline solution to determine the sensory saltiness of each test sample. Results are shown in Table 102.2. Method: For evaluation for the sensory of saltiness, the samples were tested by a panel of four people. The panel was asked to determine the saltiness of samples in comparison to a standard saline solution. 1 trained taster tasted independently the samples first. The tester was allowed to re-taste, and then determine the saltiness. Afterwards, another 3 tasters tasted and the saltiness of the samples was discussed openly to find a suitable result. In case that more than 1 taster disagreed with the result, the tasting was repeated.

TABLE 102.2 salt reduction synergic effect of MRP-CI to edible salt

| # | Concentration of MRP-Cl(ppm) | Concentration of edible salt | Sensory saltiness | Saltiness increasing* |
|---|---|---|---|---|
| 102-01 | 30 | 0.05% | 0.05% | 0 |
| 102-02 | 50 | 0.05% | 0.05% | 0 |
| 102-03 | 80 | 0.05% | 0.05% | 0 |
| 102-04 | 100 | 0.05% | 0.085% | 70% |
| 102-05 | 120 | 0.05% | 0.09% | 80% |
| 102-06 | 150 | 0.05% | 0.11% | 120% |
| 102-07 | 180 | 0.05% | 0.11% | 120% |
| 102-08 | 200 | 0.05% | 0.12% | 140% |

*Saltiness increasing = (Sensory saltiness − Concentration of edible salt)/Concentration of edible salt × 100%

Conclusion:

The results showed that MRPs can significantly produce salt reduction synergistic effects with edible salt. For 0.05% solution of edible salt, adding 100 ppm to 200 ppm of MRP-CI increased the saltiness by 70% to 140%.

Example 103

Salt Reduction Synergic Effect of S-MRP to Edible Salt

Method

Several of 0.05% edible salt solutions were prepared, and an appropriate amount of 5-MRP-CI was added to prepare salt solutions containing different concentrations of S-MRP-CI The data of each test sample is shown in Table 103.1.

TABLE 103.1 the weight and concentration of S-MRP-CI in 0.05% edible salt solutions

| # | 0.05% edible salt solution (ml) | Weight of S-MRP-CI (mg) | Concentration of S-MRP-CI (ppm) |
|---|---|---|---|
| 103-01 | 50 | 1.5 | 30 |
| 103-02 | 50 | 2.5 | 50 |
| 103-03 | 50 | 4 | 80 |
| 103-04 | 50 | 5 | 100 |
| 103-05 | 50 | 6 | 120 |
| 103-06 | 50 | 7.5 | 150 |
| 103-07 | 50 | 9 | 180 |
| 103-08 | 50 | 10 | 200 |

Results

The members of panel tasted each test solution and compared it with different concentrations of standard saline solution to determine the sensory saltiness of each test sample. Results are shown in Table 103.2. The samples were evaluated as in Example 102.

TABLE 103.2 salt reduction synergic effect of S-MRP-CI to edible salt

| # | Concentration of S-MRP-CI (ppm) | Concentration of edible salt | Sensory saltiness | Saltiness increasing* |
|---|---|---|---|---|
| 103-01 | 30 | 0.05% | 0.085% | 70% |
| 103-02 | 50 | 0.05% | 0.085% | 70% |
| 103-03 | 80 | 0.05% | 0.085% | 70% |
| 103-04 | 100 | 0.05% | 0.085% | 70% |
| 103-05 | 120 | 0.05% | 0.085% | 70% |
| 103-06 | 150 | 0.05% | 0.095% | 90% |
| 103-07 | 180 | 0.05% | 0.095% | 90% |
| 103-08 | 200 | 0.05% | 0.095% | 90% |

*Saltiness increasing = (Sensory saltiness − Concentration of edible salt)/Concentration of edible salt × 100%

Conclusion:

The results showed that S-MRPs can significantly produce salt reduction synergistic effects with edible salt. For 0.05% solution of edible salt, adding 30 ppm to 200 ppm of S-MRP-CI increased the saltiness by 70% to 90%.

Example 104

Salt Reduction Synergic Effect of TS-MRP to Edible Salt

Method

Several of 0.05% edible salt solutions were prepared, and an appropriate amount of TS-MRP-CI was added to prepare salt solutions containing different concentrations of TS-MRP-CI. The data of each test sample is shown in Table 104.1.

TABLE 104.1

| the weight and concentration of TS-MRP-CI in 0.05% edible salt solutions | | | |
|---|---|---|---|
| # | 0.05% edible salt solution (ml) | Weight of TS-MRP-CI (mg) | Concentration of TS-MRP-CI (ppm) |
| 104-01 | 50 | 1.5 | 30 |
| 104-02 | 50 | 2.5 | 50 |
| 104-03 | 50 | 4 | 80 |
| 104-04 | 50 | 5 | 100 |
| 104-05 | 50 | 6 | 120 |
| 104-06 | 50 | 7.5 | 150 |
| 104-07 | 50 | 9 | 180 |
| 104-08 | 50 | 10 | 200 |

Results

The members of panel tasted each test solution and compared it with different concentrations of standard saline solution to determine the sensory saltiness of each test sample. Results are shown in Table 104.2. The tasting procedure is the same as Example 102.

TABLE 104.2

| salt reduction synergic effect of TS-MRP-CI to edible salt | | | | |
|---|---|---|---|---|
| # | Concentration of TS-MRP-CI (ppm) | Concentration of edible salt | Sensory saltiness | Saltiness increasing* |
| 104-01 | 30 | 0.05% | 0.05% | 0 |
| 104-02 | 50 | 0.05% | 0.085% | 70% |
| 104-03 | 80 | 0.05% | 0.085% | 70% |
| 104-04 | 100 | 0.05% | 0.085% | 70% |
| 104-05 | 120 | 0.05% | 0.085% | 70% |
| 104-06 | 150 | 0.05% | 0.09% | 80% |
| 104-07 | 180 | 0.05% | 0.09% | 80% |
| 104-08 | 200 | 0.05% | 0.09% | 80% |

*Saltiness increasing = (Sensory saltiness − Concentration of edible salt)/Concentration of edible salt × 100%

Conclusion:

The results showed that TS-MLPs can significantly produce salt reduction synergistic effects with edible salt. For 0.05% solution of edible salt, adding 30 ppm to 200 ppm of TS-MRP-CI increased the saltiness by 70% to 80%.

Example 105

The Evaluation of Synergistic Effect of MRP, S-MRP and TS-MRP to Fat Mouth Feel Materials:

MRP-FL the product of Example 96

S-MRP-CA the product of Example 68

S-MRP-CH the product of Example 101

Thaumatin available from EPC Natural Products Co., Ltd, China, lot #20180801, the content of thaumatin is 10.74%.

TS-MRP-CH the mixture of above S-MRP-CH and thaumatin with the weight ratio of 10:1

Milk WEIDENDORF® skim milk, fat amount 0 g/100 ml, origin: Germany, purchased from Jingdong Supermarket, lot #2018/03/21

WEIDENDORF® whole milk, fat amount 3.5 g/100 ml, origin: Germany, purchased from Jingdong Supermarket, lot #2018/04/11

Method

Skim milk and whole milk are mixed in predetermined amounts to make milk with different fat content. The specific mixing ratio and fat content are shown in Table 105.1.

TABLE 105.1

| specific mixing ratio and fat content | |
|---|---|
| Specific mixing ratio of skim milk and whole milk | Fat content of the mixed milk (g/100 ml) |
| 8:2 | 0.7 |
| 7:3 | 1.05 |
| 6:4 | 1.4 |
| 5:5 | 1.75 |
| 4:6 | 2.1 |
| 3:7 | 2.45 |
| 2:8 | 2.8 |
| 1:9 | 3.05 |

To three kinds of mixed milk with fat content of 0.7 g/100 ml, 1.75 g/100 ml and 2.8 g/100 ml were added different concentrations of MRP, S-MRP or TS-MRP to judge the synergistic effect of fat mouth feel. The mouth feel of the milk with added MRP, S-MRP or TS-MRP was compared to the milk with standard fat mouth feel in Table 105.1. Method: For evaluation of the fat mouth feel, the samples were tested by a panel of four people. The panel was asked to determine the degree of fat mouth feel of each sample solution in comparison to standard milk with specific mixing ratio. 1 trained taster tasted independently the samples first. The tester was allowed to re-taste, and then determine the degree of fat mouth feel. Afterwards, another 3 tasters tasted the samples and the fat mouth feel was discussed openly to find a suitable result. In case that more than 1 taster disagreed with the result, the tasting was repeated.

Results

The original fat content of each test sample, the concentration of MRP, S-MRP or TS-MRP added, and the synergistic fat mouth feel corresponding to the fat content in Table 89.1 are shown in Table 105.2.

TABLE 105.2

| synergistic effect of MRP, S-MRP or TS-MRP to fat mouth feel | | | | | | | | |
|---|---|---|---|---|---|---|---|---|
| | Original fat | Sample added and its concentration | | | | fat mouth feel of test sample corresponding | synergic effect | Fat |
| # | content of milk (g/100 ml) | MRP-FL | S-MRP-CA | TS-MRP-CH | TS-MRP-CH | to the fat content (g/100 ml) | of fat mouth feel* | replacement effect** |
| 105-01 | 1.05 | 500 ppm | — | — | — | 1.75 | 67% | 40% |
| 105-02 | 1.75 | 500 ppm | — | — | — | 2.45 | 40% | 28.6% |
| 105-03 | 2.8 | 500 ppm | — | — | — | 2.8~3.05 | <9% | 0-8.2% |
| 105-04 | 1.05 | — | 500 ppm | — | — | 1.4 | 33% | 25% |
| 105-05 | 1.75 | — | 500 ppm | — | — | 1.75~2.1 | <20% | 0-16.7% |

TABLE 105.2-continued synergistic effect of MRP, S-MRP or TS-MRP to fat mouth feel

| # | Original fat content of milk (g/100 ml) | Sample added and its concentration MRP-FL | S-MRP-CA | TS-MRP-CH | TS-MRP-CH | fat mouth feel of test sample corresponding to the fat content (g/100 ml) | synergic effect of fat mouth feel* | Fat replacement effect** |
|---|---|---|---|---|---|---|---|---|
| 105-06 | 2.8 | — | 500 ppm | — | — | 2.8~3.05 | <9% | 0-8.2% |
| 105-07 | 1.05 | — | — | 500 ppm | — | 2.1 | 100% | 50% |
| 105-08 | 1.75 | — | — | 500 ppm | — | 2.8~3.05 | 60%~74% | 37.5%-42.6% |
| 105-09 | 2.8 | — | — | 500 ppm | — | 3.05 | 9% | 8.2% |
| 105-10 | 1.05 | — | — | — | 100 ppm | 1.75 | 67% | 40% |
| 105-11 | 1.75 | — | — | — | 100 ppm | 2.45 | 40% | 28.6% |
| 105-12 | 2.8 | — | — | — | 100 ppm | 3.05 | 9% | 8.2% |

*synergic effect of fat mouth feel = (fat mouth feel of test sample corresponding to the fat content-Original fat content)/Original fat content × 100%

**Fat replacement = (fat mouth feel of test sample corresponding to the fat content-Original fat content)/fat mouth feel of test sample corresponding to the fat content × 100%

Conclusion:

The results showed that the synergistic effect of MRP, S-MRP or TS-MRP on the fat mouth feel of partially skimmed milk is significant, particularly in lower fat milk. TS-MRP's synergistic effect of fat mouth feel is most significant. Under certain conditions, such as, addition of 500 ppm of TS-MRP to the milk with a fat content of 1.05 g/100 ml, 50% fat replacement effect was achieved.

Examples 106-126

The Improvement of MRP, S-MRP and TS-MRP to the Taste and Mouth Feel of *Stevia* Extract The sources of the *Stevia* extract and MRP samples used in the following Examples are as follows.

TABLE 106-126

| sample | source | Lot # | specification |
|---|---|---|---|
| RA, rebaudioside A | EPC Natural Products Co., Ltd, China | 140-24-1 | RA 99.94% |
| STV, stevioside | EPC Natural Products Co., Ltd, China | 130-32-01 | STV 96.69% |
| RD, rebaudioside D | Sichuan Ingia Biosynthetic Co,.ltd, China | 20180914 | RD 94.39% |
| RM, rebaudioside M | Sichuan Ingia Biosynthetic Co,.ltd, China | 20180915 | RM 93.03%, RD3.67% |
| MRP-FL | The product of Example 96 | | |
| MRP-CA | The product of Example 97 | | |
| MRP-CI | The product of Example 98 | | |
| MRP-CH | The product of Example 99 | | |
| S-MRP-FL | The product of Example 67 | | |
| S-MRP-CA | The product of Example 68 | | |
| S-MRP-CI | The product of Example 100 | | |
| S-MRP-CH | The product of Example 101 | | |
| thaumatin | The product of EPC Natural Products Co., Ltd, China | 20180801 | thaumatin 10.74% |
| TS-MRP-FL | the mixture of above S-MRP-FL and thaumatin with the weight ratio of 10:1 | | |
| TS-MRP-CA | the mixture of above S-MRP-CA and thaumatin with the weight ratio of 10:1 | | |
| TS-MRP-CI | the mixture of above S-MRP-CI and thaumatin with the weight ratio of 10:1 | | |
| TS-MRP-CH | the mixture of above S-MRP-CH and thaumatin with the weight ratio of 10:1 | | |

Example 106

The Improvement of MRP-CH to the Taste and Mouth Feel of RA

Common Process:

MRP-CH and RA were weighed and uniformly mixed according to the weight shown in Table 88-1. The mixed powder was weighed in the amount shown in Table 106.1, dissolved in 100 ml of pure water, and subjected to a mouth feel evaluation test. The tasting procedure is the same as Example 39.

TABLE 106.1 the weight of MRP-CH and RA

| # | The ratio of MRP-CH to RA | Weight of MRP-CH (g) | Weight of RA (g) | Weight of the mixed powder (mg) |
|---|---|---|---|---|
| 106-01 | 0.01/1 | 0.005 | 0.5 | 50.5 |
| 106-02 | 0.1/1 | 0.05 | | 55 |

TABLE 106.1-continued the weight of MRP-CH and RA

| # | The ratio of MRP-CH to RA | Weight of MRP-CH (g) | Weight of RA (g) | Weight of the mixed powder (mg) |
|---|---|---|---|---|
| 106-03 | 0.3/1 | 0.15 | | 65 |
| 106-04 | 0.5/1 | 0.25 | | 75 |
| 106-05 | 0.7/1 | 0.35 | | 85 |
| 106-06 | 0.9/1 | 0.45 | | 95 |
| 106-07 | 1/1 | 0.5 | | 100 |
| 106-08 | 2/1 | 1.0 | | 150 |

Experiments

Several mixtures of MRP-CH and RA were mixed in this example. Each sample was evaluated according to the aforementioned sensory evaluation method, and the average score of the panel was taken as the evaluation result. The taste profile of the mixture is as follows. It should be noted that according to the sensory evaluation method, the evaluation of the mouth feel and the sweet profile is based on the iso-sweetness. That is to say, in these evaluations, the concentration of RA in the sample solution was the same, 500 ppm. The results are shown in Table 106.2.

TABLE 106.2 the score in sensory evaluation

| | | sensory evaluation | | | | | |
|---|---|---|---|---|---|---|---|
| | | | sweet profile | | | | |
| # | flavor | mouth feel kokumi | sweet lingering | bitterness | metallic aftertaste | score of sweet profile | overall likeability |
| 106-01 | Chocolate | 1 | 2 | 1 | 2 | 4.33 | 2.67 |
| 106-02 | | 1 | 2 | 1 | 2 | 4.33 | 2.67 |
| 106-03 | | 1 | 3 | 2 | 2 | 3.67 | 2.33 |
| 106-04 | | 1 | 3 | 2 | 2 | 3.67 | 2.33 |
| 106-05 | | 2 | 3 | 1 | 1 | 4.33 | 3.17 |
| 106-06 | | 2 | 2 | 1 | 2 | 4.33 | 3.17 |
| 106-07 | | 2 | 3 | 1 | 2 | 4.00 | 3.00 |
| 106-08 | | 2 | 4 | 2 | 3 | 3.00 | 2.50 |

Data Analysis

Figure 70:
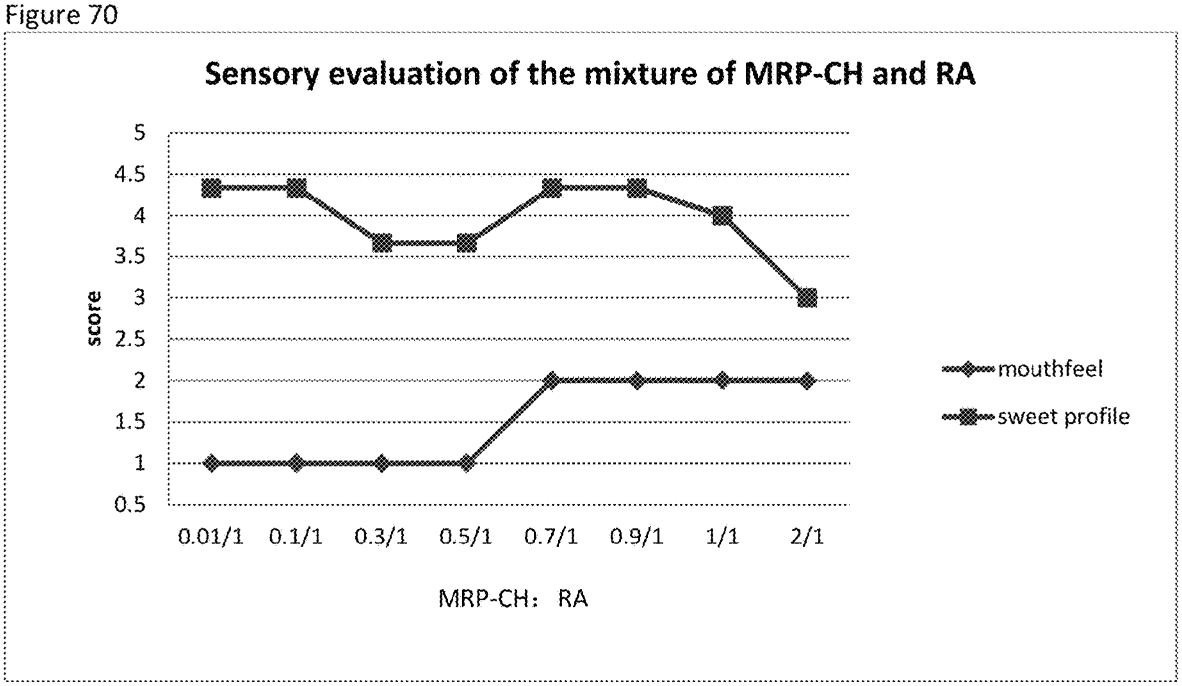
FIG. 70 shows the relationship between the sensory evaluation results to the ratio of MRP-CH to RA of example 106.

The relationship between the sensory evaluation results to the ratio of MRP-CH to RA in this example is as shown in FIG. 70.

Figure 71:
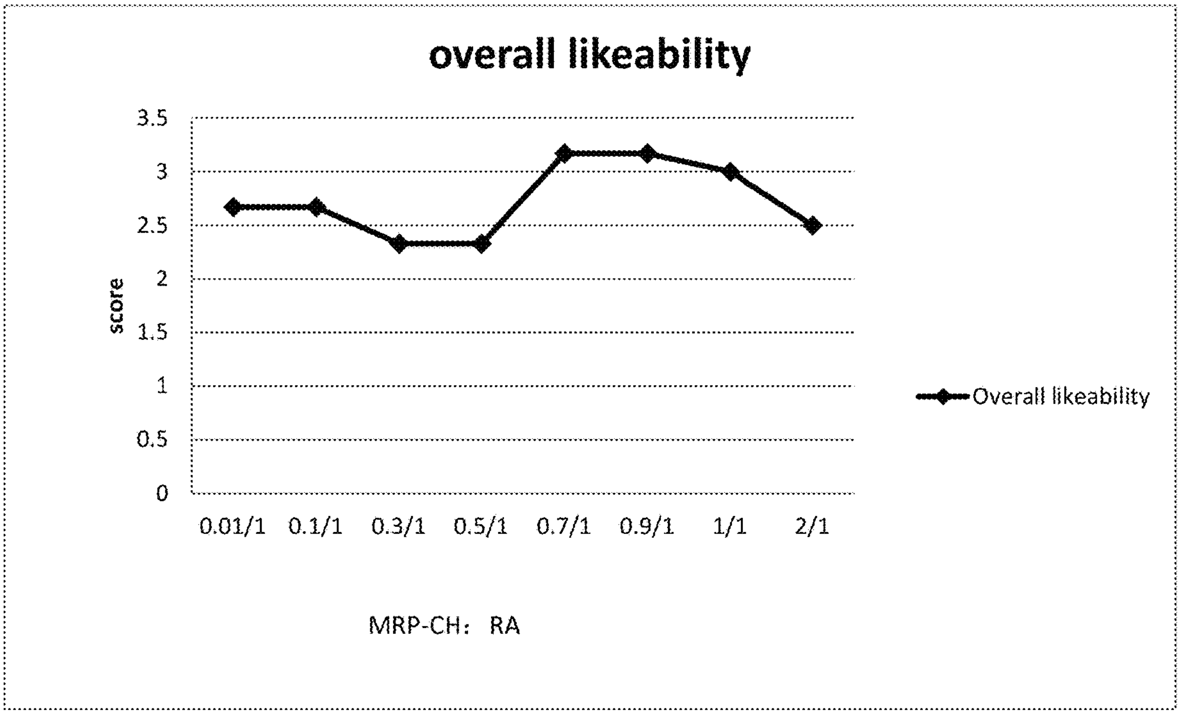
FIG. 71 shows the relationships between the overall likeability results to the ratio of MRP-CH to RA of example 106.

The relationship between the overall likeability results to the ratio of MRP-CH to RA in this example is as shown in FIG. 71.

Conclusion:

The results showed that standard MRPs can significantly improve taste profile, flavor intensity and mouth feel of high intensity natural sweeteners or sweetening agents such as *Stevia* extract. For example, steviol glycosides comprise rebaudioside A. All ranges in tested ratios of MRP-CH to RA from 0.01/1 to 2/1 had good taste (overall likeability score >2), preferably when the ratio ranges were from 0.01/1 to 0.1/1 and from 0.7/1 to 2/1, the products gave very good taste (score >2.5); further, preferred ratio ranges were from 0.7/1 to 1/1, products gave superior taste (score >3). The conclusion can be extended to 1:99 and 99:1. This example demonstrates that MRPs can improve taste profile, flavor intensity and mouth feel of steviol glycosides.

Example 107

The Improvement of S-MRP-CH to the Taste and Mouth Feel of RA

Common Process:

S-MRP-CH and RA were weighed and uniformly mixed according to the weight shown in Table 107.1, The mixed powder was weighed in the amount shown in Table 107.1, dissolved in 100 ml of pure water, and subjected to a mouth feel evaluation test. The tasting procedure is the same as Example 39.

TABLE 107.1 the weight of S-MRP-CH and RA

| # | The ratio of S-MRP-CH to RA | Weight of S-MRP-CH (g) | Weight of RA (g) | Weight of the mixed powder (mg) |
|---|---|---|---|---|
| 107-01 | 0.01/1 | 0.005 | 0.5 | 50.5 |
| 107-02 | 0.1/1 | 0.05 | | 55 |
| 107-03 | 0.3/1 | 0.15 | | 65 |
| 107-04 | 0.5/1 | 0.25 | | 75 |
| 107-05 | 0.7/1 | 0.35 | | 85 |
| 107-06 | 0.9/1 | 0.45 | | 95 |
| 107-07 | 1/1 | 0.5 | | 100 |
| 107-08 | 2/1 | 1.0 | | 150 |
| 107-09 | 3/1 | 1.5 | | 200 |

Experiments

Several mixtures of S-MRP-CH and RA were mixed in this example. Each sample was evaluated according to the aforementioned sensory evaluation method, and the average score of the panel was taken as the evaluation result. The taste profile of the mixture is as follows. It should be noted that according to the sensory evaluation method, the evaluation of the mouth feel and the sweet profile is based on the iso-sweetness. That is to say, in these evaluations, the concentration of RA in the sample solution was the same, 500 ppm. The results are shown in Table 107.2. The tasting procedure is the same as Example 39.

TABLE 107.2

| the score in sensory evaluation | | | | | | | |
|---|---|---|---|---|---|---|---|
| | | sensory evaluation | | | | | |
| | | | sweet profile | | | | |
| # | flavor | mouth feel kokumi | sweet lingering | bitterness | metallic aftertaste | score of sweet profile | overall likeability |
| 107-01 | Chocolate | 1 | 3 | 1 | 2 | 4.00 | 2.50 |
| 107-02 | | 1 | 3 | 1 | 2 | 4.00 | 2.50 |
| 107-03 | | 1 | 3 | 1 | 2 | 4.00 | 2.50 |
| 107-04 | | 2 | 3 | 1 | 2 | 4.00 | 3.00 |
| 107-05 | | 2 | 4 | 2 | 1 | 3.67 | 2.83 |
| 107-06 | | 2 | 4 | 2 | 1 | 3.67 | 2.83 |
| 107-07 | | 2 | 3 | 1 | 1 | 4.33 | 3.17 |
| 107-08 | | 2 | 3 | 2 | 2 | 3.67 | 2.83 |
| 107-09 | | 2 | 4 | 3 | 2 | 3.00 | 2.50 |

Data Analysis

Figure 72:
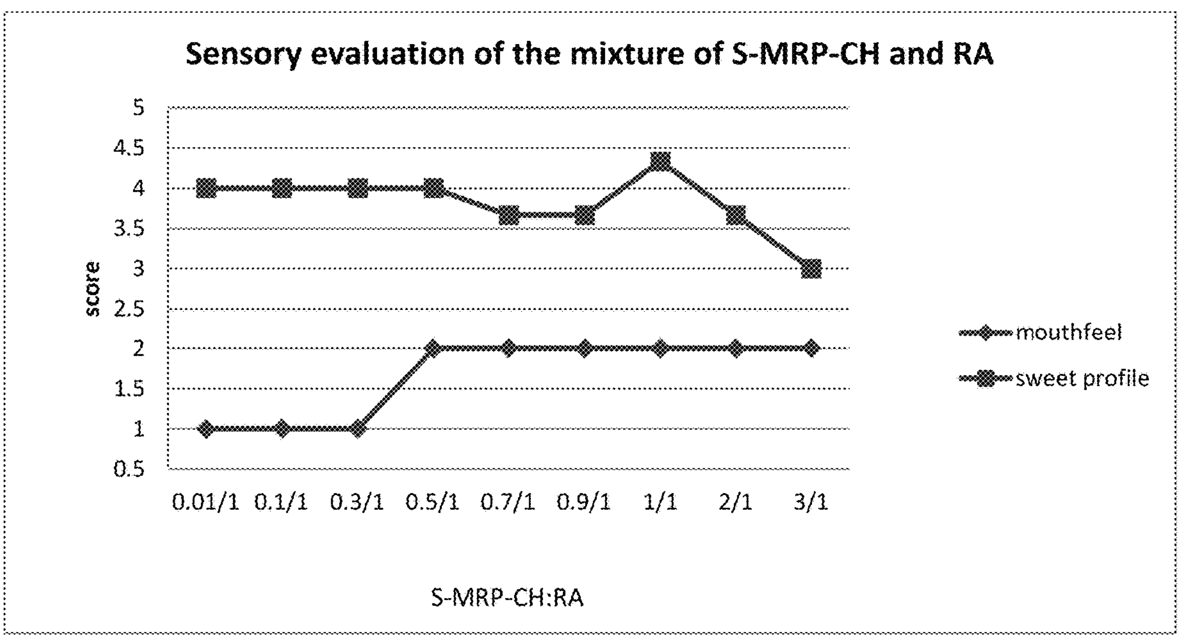
FIG. 72 shows the relationship between the sensory evaluation results to the ratio of S-MRP-CH to RA of example 107.

The relationship between the sensory evaluation results to the ratio of S-MRP-CH to RA in this example is as shown in FIG. 72.

Figure 73:
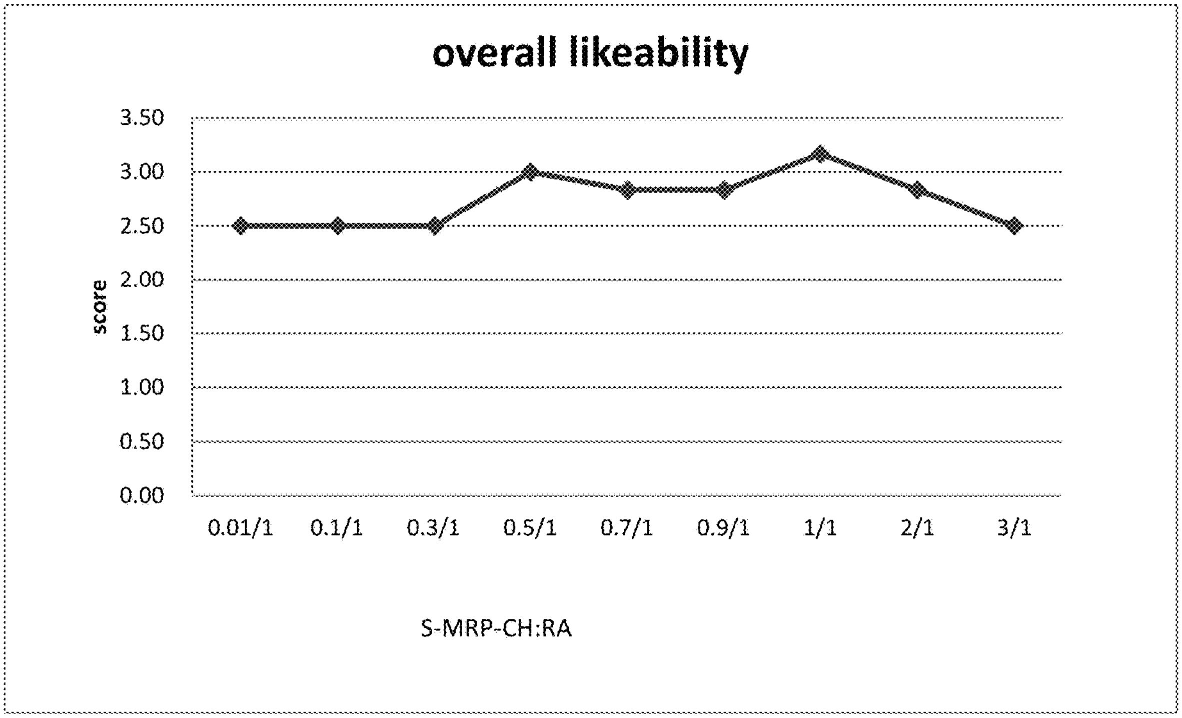
FIG. 73 shows the relationship between the overall likeability results to the ratio of S-MRP-CH to RA of example 107.

The relationship between the overall likeability results to the ratio of S-MRP-CH to RA in this example is as shown in FIG. 73.

Conclusion:

The results showed that S-MRPs (MRPs, *Stevia* extract) can significantly improve taste profile, flavor intensity and mouth feel of high intensity natural sweeteners or sweetening agents such as *Stevia* extract. For example, steviol glycosides comprise rebaudioside A. All range in tested ratios of S-MRP-CH to RA from 0.01/1 to 3/1 had good taste (overall likeability score >2.5), preferably when the ratio ranges were from 0.5/1 to 1/1, the products gave a very good taste (score >3). The conclusion can be extended to 1:99 and 99:1. This example demonstrates that S-MRPs can improve taste profile, flavor intensity and mouth feel of steviol glycosides. The tasting procedure is the same as Example 39.

Example 108

The Improvement of TS-MRP-CH to the Taste and Mouth Feel of RA

Common Process:

TS-MRP-CH and RA were weighed and uniformly mixed according to the weight shown in Table 91.1. The mixed powder was weighed in the amount shown in Table 108.1, dissolved in 100 ml of pure water, and subjected to a mouth feel evaluation test.

TABLE 108.1

| the weight of TS-MRP-CH and RA | | | | |
|---|---|---|---|---|
| # | The ratio of TS-MRP-CH to RA | Weight of TS-MRP-CH (g) | Weight of RA (g) | Weight of the mixed powder (mg) |
| 108-01 | 0.01/1 | 0.005 | 0.5 | 50.5 |
| 108-02 | 0.1/1 | 0.05 | | 55 |
| 108-03 | 0.3/1 | 0.15 | | 65 |
| 108-04 | 0.5/1 | 0.25 | | 75 |
| 108-05 | 0.7/1 | 0.35 | | 85 |
| 108-06 | 0.9/1 | 0.45 | | 95 |
| 108-07 | 1/1 | 0.5 | | 100 |
| 108-08 | 2/1 | 1.0 | | 150 |
| 108-09 | 3/1 | 1.5 | | 200 |
| 108-10 | 4/1 | 2.0 | | 250 |

Experiments

Several mixtures of TS-MRP-CH and RA were mixed in this example. Each sample was evaluated according to the aforementioned sensory evaluation method, and the average score of the panel was taken as the evaluation result. The taste profile of the mixture is as follows. It should be noted that according to the sensory evaluation method, the evaluation of the mouth feel and the sweet profile is based on the iso-sweetness. That is to say, in these evaluations, the concentration of RA in the sample solution was the same, 500 ppm. The results are shown in Table 108.2.

TABLE 108.2

| the score in sensory evaluation | | | | | | | |
|---|---|---|---|---|---|---|---|
| | | sensory evaluation | | | | | |
| | | | sweet profile | | | | |
| # | flavor | mouth feel kokumi | sweet lingering | bitterness | metallic aftertaste | score of sweet profile | overall likeability |
| 108-01 | Chocolate | 1 | 2 | 1 | 1 | 4.67 | 2.83 |
| 108-02 | | 1 | 2 | 1 | 1 | 4.67 | 2.83 |
| 108-03 | | 1 | 3 | 1 | 2 | 4.00 | 2.50 |
| 108-04 | | 1 | 3 | 1 | 2 | 4.00 | 2.50 |
| 108-05 | | 2 | 3 | 2 | 2 | 3.67 | 2.83 |
| 108-06 | | 2 | 3 | 2 | 2 | 3.67 | 2.83 |
| 108-07 | | 2 | 2 | 1 | 1 | 4.67 | 3.33 |
| 108-08 | | 2 | 2 | 1 | 1 | 4.67 | 3.33 |
| 108-09 | | 2 | 3 | 2 | 2 | 3.67 | 2.83 |
| 108-10 | | 2 | 3 | 2 | 3 | 3.33 | 2.67 |

Data Analysis

Figure 74:
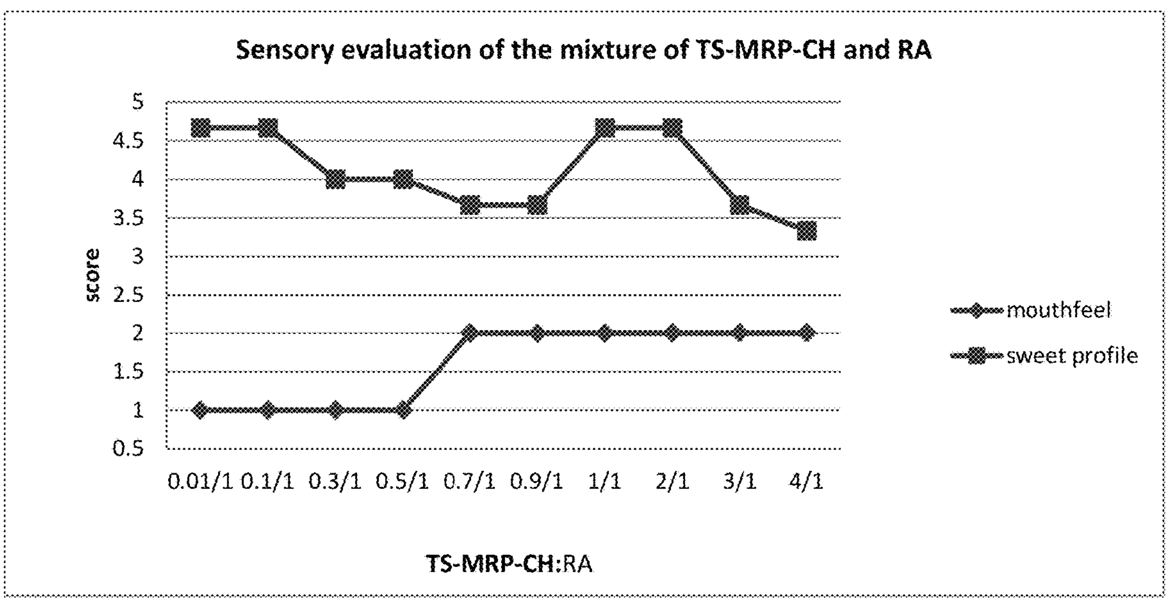
FIG. 74 shows the relationship between the sensory evaluation results to the ratio of TS-MRP-CH to RA of example 108.

The relationship between the sensory evaluation results to the ratio of TS-MRP-CH to RA in this example is as shown in FIG. 74.

Figure 75:
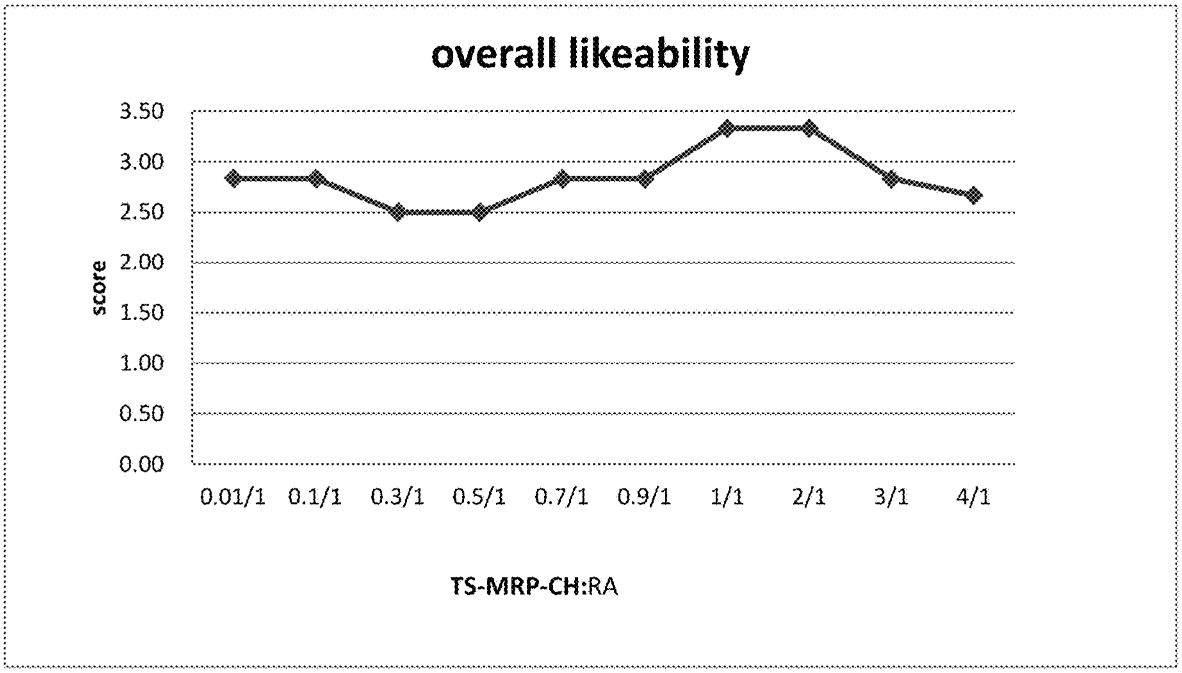
FIG. 75 shows the relationship between the overall likeability results to the ratio of TS-MRP-CH to RA of example 108.

The relationship between the overall results to the ratio of TS-MRP-CH to RA in this example is as shown in FIG. 75.

Conclusion:

The results showed that TS-MRPs (MRPs, *Stevia* extract, thaumatin) can significantly improve taste profile, flavor intensity and mouth feel of high intensity natural sweeteners or sweetening agents such as *Stevia* extract. For example, steviol glycosides comprise rebaudioside A. All ranges in tested ratios of TS-MRP-CH to RA from 0.01/1 to 4/1 had good taste (overall likeability score >2.5), preferably when the ratios ranged from 0.1/1 to 2/1, the products gave very good taste (score >3). The conclusion can be extended to 1:99 and 99:1. This example demonstrates that TS-MRPs can improve taste profile, flavor intensity and mouth feel of steviol glycosides. The tasting procedure is the same as Example 39.

Example 109

The Improvement of MRP-FL to the Taste and Mouth Feel of STV

Common Process:

MRP-FL and STV were weighed and uniformly mixed according to the weight shown in Table 109.1, dissolved in 100 ml of pure water, and subjected to a mouth feel evaluation test.

TABLE 109.1 the weight of MRP-FL and STV

| # | The ratio of STV to MRP-FL | Weight of MRP-FL (g) | Weight of STV (g) | Volume of pure water (mL) |
|---|---|---|---|---|
| 109-01 | 10/1 | 50 | 5 | 100 |
| 109-02 | 10/3 | 50 | 15 | 100 |
| 109-03 | 10/5 | 50 | 25 | 100 |
| 109-04 | 10/7 | 50 | 35 | 100 |
| 109-05 | 10/9 | 50 | 45 | 100 |
| 109-06 | 10/10 | 50 | 50 | 100 |
| 109-07 | 10/40 | 50 | 200 | 100 |
| 109-08 | 10/70 | 50 | 350 | 100 |
| 109-09 | 10/100 | 50 | 500 | 100 |

Experiments

Several mixtures of MRP-FL and STV were mixed in this example. Each sample was evaluated according to the aforementioned sensory evaluation method, and the average score of the panel was taken as the evaluation result. The taste profile of the mixture is as follows. It should be noted that according to the sensory evaluation method, the evaluation of the mouth feel and the sweet profile is based on the iso-sweetness. That is to say, in these evaluations, the concentration of STV in the sample solution was the same, 500 ppm. The results are shown in Table 109.2. The tasting procedure is the same as Example 39.

TABLE 109.2 the score in sensory evaluation

| | | sensory evaluation | | | | | |
|---|---|---|---|---|---|---|---|
| | | | sweet profile | | | | |
| # | flavor | mouth feel kokumi | sweet lingering | bitterness | metallic aftertaste | score of sweet profile | overall likeability |
| 109-01 | floral | 1 | 1 | 1 | 1 | 5.00 | 3.00 |
| 109-02 | | 2 | 1 | 1 | 1 | 5.00 | 3.50 |
| 109-03 | | 3 | 1 | 1 | 1 | 5.00 | 4.00 |
| 109-04 | | 3 | 1 | 1 | 1 | 5.00 | 4.00 |
| 109-05 | | 3 | 1 | 1 | 1 | 5.00 | 4.00 |
| 109-06 | | 3 | 1 | 1 | 1 | 5.00 | 4.00 |
| 109-07 | | 3 | 1 | 1.5 | 1 | 4.83 | 3.92 |
| 109-08 | | 3 | 1 | 2 | 1 | 4.67 | 3.83 |
| 109-09 | | 3 | 1 | 2.3 | 1 | 4.57 | 3.78 |

Data Analysis

Figure 76:
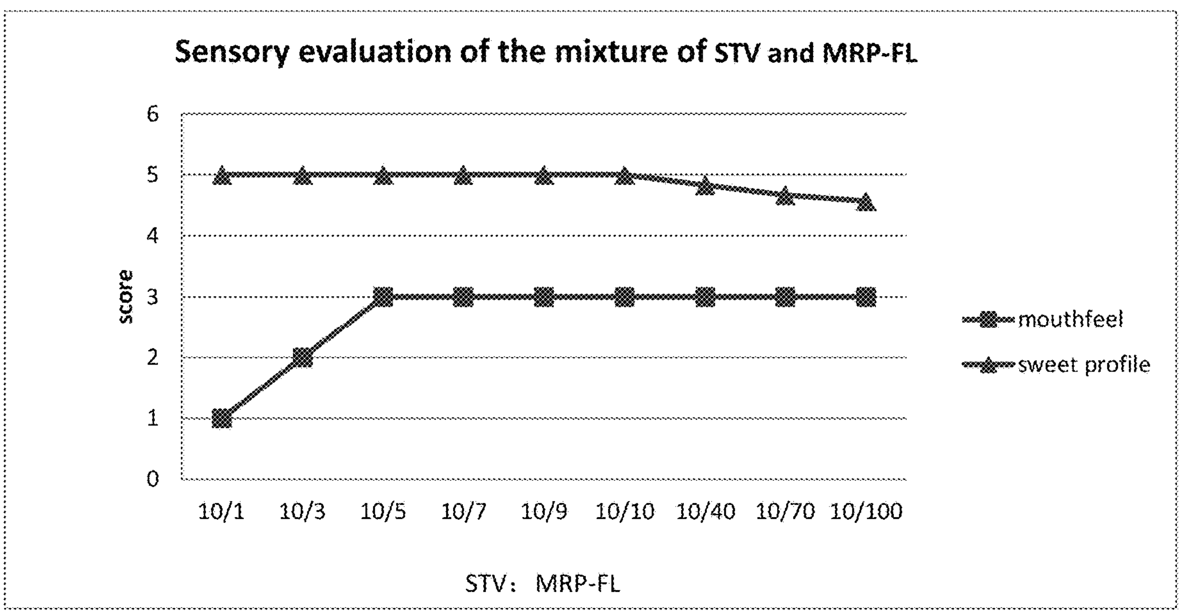
FIG. 76 shows the relationship between the sensory evaluation results to the ratio of STV to MRP-FL of example 109.

The relationship between the sensory evaluation results to the ratio of STV to MRP-FL in this example is as shown in FIG. 76.

Figure 77:
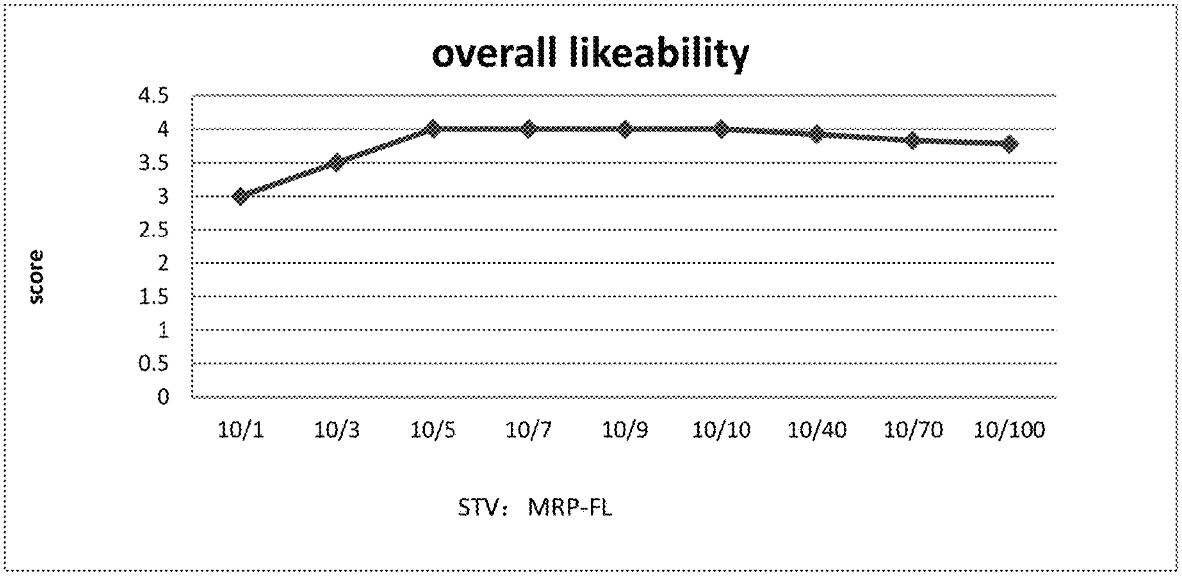
FIG. 77 shows the relationship between the overall likeability results to the ratio of STV to MRP-FL of example 109.

The relationship between the overall likeability results to the ratio of STV to MRP-FL in this example is as shown in FIG. 77.

Conclusion:

The results showed that standard MRI's can significantly improve taste profile, flavor intensity and mouth feel of high intensity natural sweeteners such as *Stevia* extract. For example, steviol glycosides comprise stevioside. All ranges in tested ratios of MRP-FL to STV from 10:1 to 10:100 had good taste (overall likeability score >3), preferably when the ratio ranges were from 10:5 to 10:100, the products gave very good taste (score >3.5). The conclusion can be extended to 1:99 and 99:1. This example can further demonstrate that MRPs can improve taste profile, flavor intensity and mouth feel of steviol glycosides.

Example 110

The Improvement of S-MRP-FL to the Taste and Mouth Feel of STV

Common Process:

S-MRP-FL and STV were weighed and uniformly mixed according to the weight shown in Table 110.1, dissolved in 100 ml of pure water, and subjected to a mouth feel evaluation test. The tasting procedure is the same as Example 39.

TABLE 110.1 the weight of S-MRP-FL and STV

| # | The ratio of STV to S-MRP-FL | Weight of S-MRP-FL (g) | Weight of STV (g) | Volume of pure water (mL) |
|---|---|---|---|---|
| 110-01 | 10/1 | 50 | 5 | 100 |
| 110-02 | 10/3 | 50 | 15 | 100 |
| 110-03 | 10/5 | 50 | 25 | 100 |
| 110-04 | 10/7 | 50 | 35 | 100 |
| 110-05 | 10/9 | 50 | 45 | 100 |
| 110-06 | 10/10 | 50 | 50 | 100 |
| 110-07 | 10/40 | 50 | 200 | 100 |

Experiments

Several mixtures of S-MRP-FL and STV were mixed in this example. Each sample was evaluated according to the aforementioned sensory evaluation method, and the average score of the panel was taken as the evaluation result. The taste profile of the mixture is as follows. It should be noted that according to the sensory evaluation method, the evaluation of the mouth feel and the sweet profile is based on the iso-sweetness. That is to say, in these evaluations, the concentration of STV in the sample solution was the same, 500 ppm. The results are shown in Table 110.2.

TABLE 110.2 the score in sensory evaluation

| # | flavor | sensory evaluation: mouth feel kokumi | sweet profile: sweet lingering | sweet profile: bitterness | sweet profile: metallic aftertaste | sweet profile: score of sweet profile | overall likeability |
|---|---|---|---|---|---|---|---|
| 110-01 | floral | 2 | 1 | 1 | 1 | 5.00 | 3.50 |
| 110-02 | | 2 | 2 | 1 | 1 | 4.67 | 3.33 |
| 110-03 | | 2 | 2 | 1 | 1 | 4.67 | 3.33 |
| 110-04 | | 3 | 2 | 1 | 1 | 4.67 | 3.83 |
| 110-05 | | 4 | 2 | 1.6 | 1 | 4.47 | 4.23 |
| 110-06 | | 4 | 2 | 1.8 | 1 | 4.40 | 4.20 |
| 110-07 | | 4 | 3 | 2.5 | 1 | 3.83 | 3.92 |

Data Analysis

Figure 78:
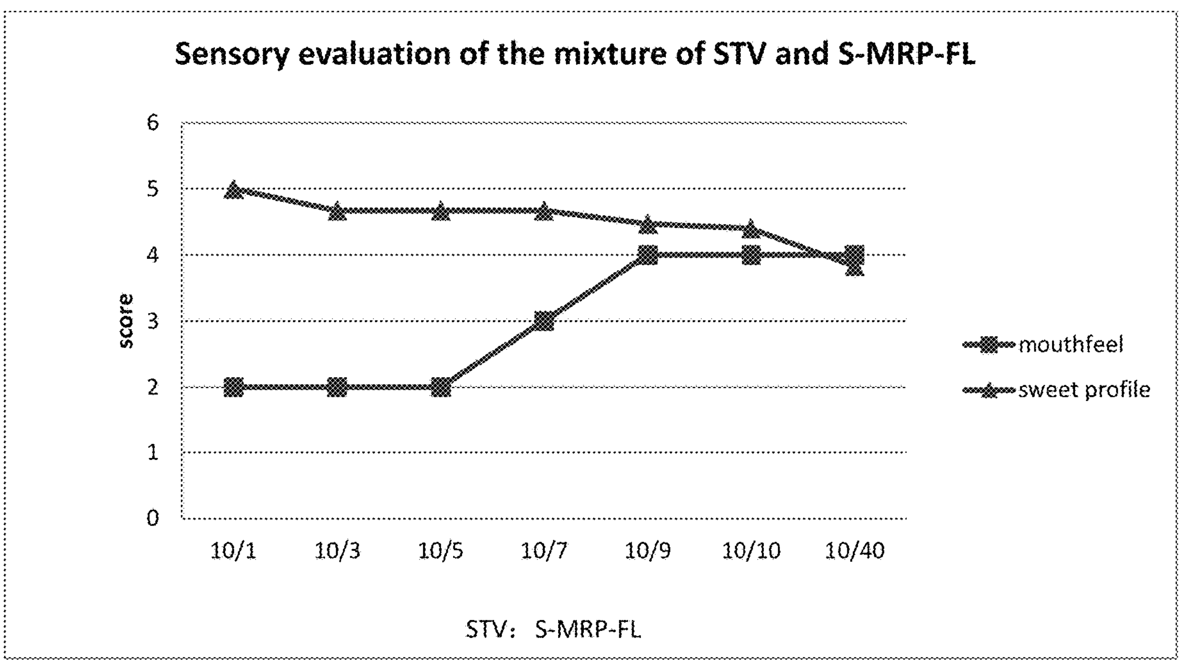
FIG. 78 shows the relationship between the sensory evaluation results to the ratio of STV to S-MRP-FL of example 110.

The relationship between the sensory evaluation results to the ratio of STV to S-MRP-FL in this example is as shown in FIG. 78.

Figure 79:
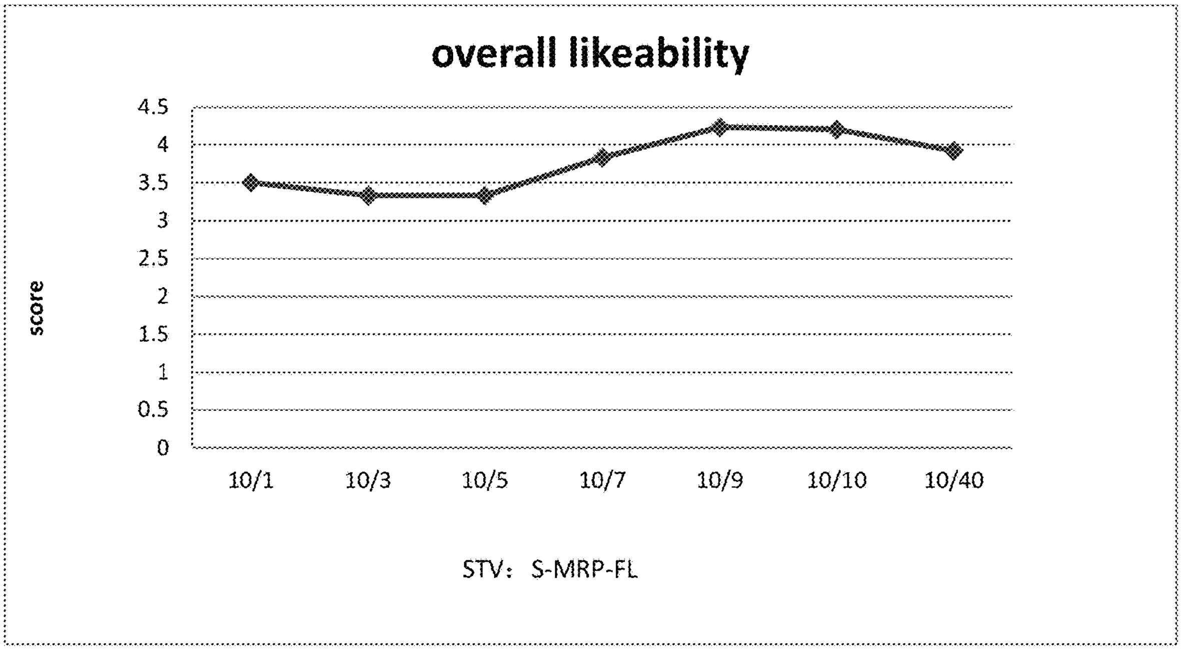
FIG. 79 shows the relationship between the overall likeability results to the ratio of STV to S-MRP-FL of example 110.

The relationship between the overall likeability results to the ratio of STV to S-MRP-FL in this example is as shown in FIG. 79.

Conclusion:

The results showed that S-MRPs (MRPs, *Stevia* extract) can significantly improve taste profile, flavor intensity and mouth feel of high intensity natural sweeteners or sweetening agents such as *Stevia* extract. For example, steviol glycosides comprise stevioside. All ranges in tested ratios of STV to S-MRP-FL from 10:1 to 10:40 had good taste (overall likeability score >3), preferably when the ratio ranges were from 10:7 to 10:40, the products gave very good taste (score >3.5). The conclusion can be extended to 1:99 and 99:1. This example can further demonstrate that S-MRI's can improve taste profile, flavor intensity and mouth feel of steviol glycosides. The tasting procedure is the same as Example 39.

Example 111

The Improvement of TS-MRP-FL to the Taste and Mouth Feel of STV

Common Process:

TS-MRP-FL and STV were weighed and uniformly mixed according to the weight shown in Table 111.1, dissolved in 100 ml of pure water, and subjected to a mouth feel evaluation test. The tasting procedure is the same as Example 39.

TABLE 111.1 the weight of S-MRP-FL and STV

| # | The ratio of STV to TS-MRP-FL | Weight of TS-MRP-FL (g) | Weight of STV (g) | Volume of pure water (mL) |
|---|---|---|---|---|
| 111-01 | 10/1 | 50 | 5 | 100 |
| 111-02 | 10/3 | 50 | 15 | 100 |
| 111-03 | 10/5 | 50 | 25 | 100 |
| 111-04 | 10/7 | 50 | 35 | 100 |
| 111-05 | 10/9 | 50 | 45 | 100 |
| 111-06 | 10/10 | 50 | 50 | 100 |
| 111-07 | 10/40 | 50 | 200 | 100 |

Experiments

Several mixtures of TS-MRP-FL and STV were mixed in this example. Each sample was evaluated according to the aforementioned sensory evaluation method, and the average score of the panel was taken as the evaluation result. The taste profile of the mixture is as follows. It should be noted that according to the sensory evaluation method, the evaluation of the mouth feel and the sweet profile is based on the iso-sweetness. That is to say, in these evaluations, the concentration of STV in the sample solution was the same, 500 ppm. The results are shown in Table 111.2.

TABLE 111.2 the score in sensory evaluation

| # | flavor | sensory evaluation: mouth feel kokumi | sweet profile: sweet lingering | sweet profile: bitterness | sweet profile: metallic aftertaste | sweet profile: score of sweet profile | overall likeability |
|---|---|---|---|---|---|---|---|
| 111-01 | floral | 1 | 1 | 1 | 1 | 5.00 | 3.00 |
| 111-02 | | 1 | 2 | 1 | 1 | 4.67 | 2.83 |
| 111-03 | | 1 | 2 | 1.4 | 1 | 4.53 | 2.77 |
| 111-04 | | 2 | 2 | 2 | 1 | 4.33 | 3.17 |
| 111-05 | | 2 | 2 | 2 | 1 | 4.33 | 3.17 |
| 111-06 | | 2 | 2 | 2 | 1 | 4.33 | 3.17 |
| 111-07 | | 2 | 3 | 2 | 1 | 4.00 | 3.00 |

Data Analysis

Figure 80:
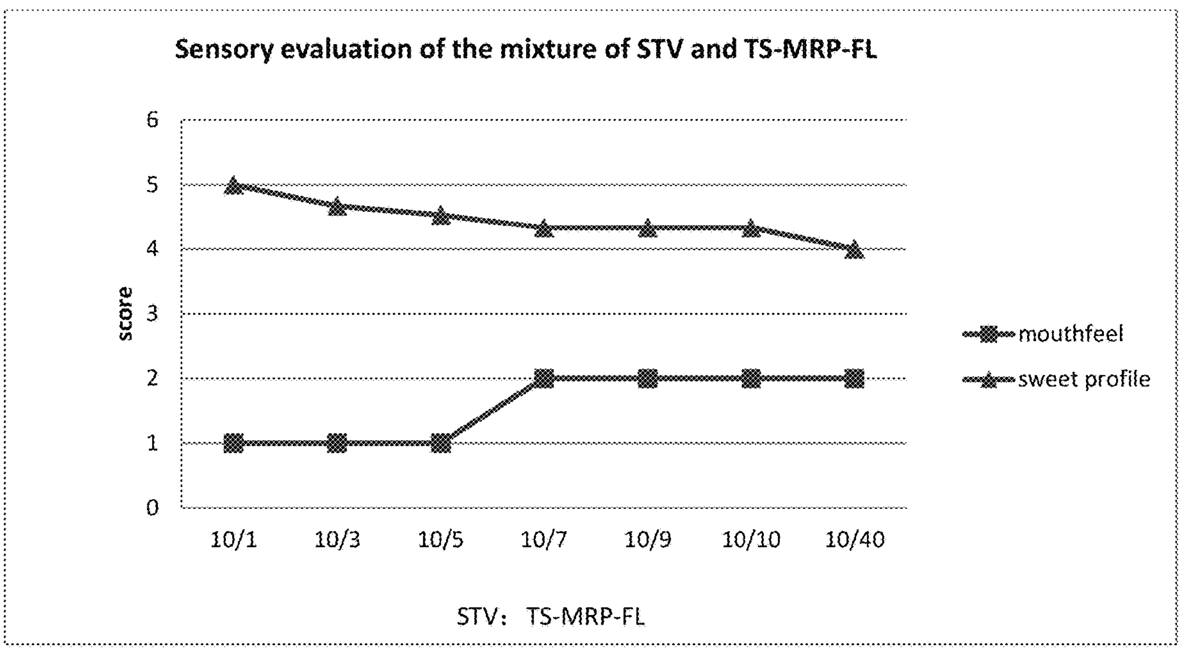
FIG. 80 shows the relationship between the sensory evaluation results to the ratio of STV to TS-MRP-FL of example 111.

The relationship between the sensory evaluation results to the ratio of STV to TS-MRP-FL in this example as shown in FIG. 80.

Figure 81:
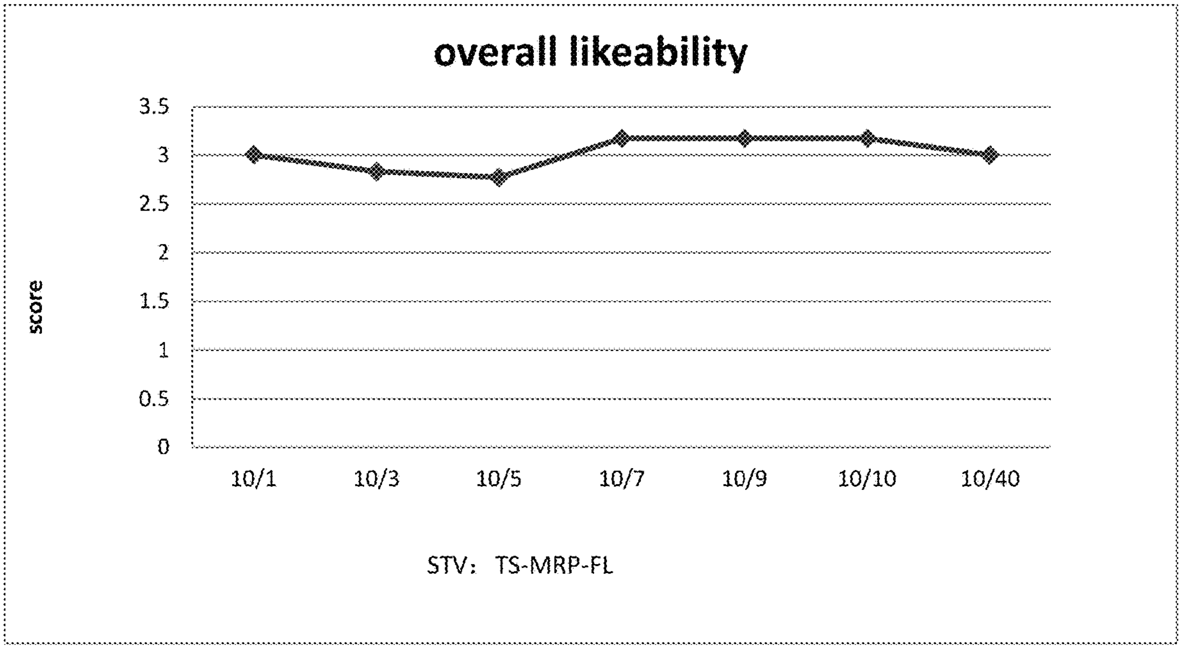
FIG. 81 shows the relationship between the overall likeability results to the ratio of STV to TS-MRP-FL of example 111.

The relationship between the overall likeability results to the ratio of STV to TS-MRP-FL in this example is as shown in FIG. 81.

Conclusion:

The results showed that TS-MRPs (MRPs, *Stevia* extract, thaumatin) can significantly improve taste profile, flavor intensity and mouth feel of high intensity natural sweeteners or sweetening agents such as *Stevia* extract. For example, steviol glycosides comprise stevioside. All ranges in tested ratios of STV to TS-MRP-FL from 10:1 to 10:40 had good taste (overall likeability score >2.5), preferably when the ratio ranges were from 10:7 to 10:10, the products gave very good taste (score >3) The conclusion can be extended to 1:99 and 99:1. This example can further demonstrate that TS-MRPs can improve taste profile, flavor intensity and mouth feel of steviol glycosides. The tasting procedure is the same as Example 39.

Example 112

The Improvement of MRP-FL to the Taste and Mouth Feel of RD

Common Process:

MRP-FL and RD were weighed and uniformly mixed according to the weight shown in Table 112.1, dissolved in 200 ml of pure water, and subjected to a mouth feel evaluation test.

TABLE 112.1

| the weight of MRP-FL and RD | | | |
|---|---|---|---|
| # | Ratio of RD to MRP-FL | Weight of RD (g) | Weight of MRP-FL (g) |
| 112-01 | 20:1 | 0.1 | 0.005 |
| 112-02 | 10:1 | 0.1 | 0.01 |
| 112-03 | 10:3 | 0.1 | 0.03 |
| 112-04 | 10:5 | 0.1 | 0.05 |
| 112-05 | 10:7 | 0.1 | 0.07 |
| 112-06 | 10:9 | 0.1 | 0.09 |
| 112-07 | 10:10 | 0.1 | 0.1 |
| 112-08 | 10:15 | 0.1 | 0.15 |
| 112-09 | 10:20 | 0.1 | 0.2 |

Experiments

Several mixtures of MRP-FL and RD were mixed in this example. Each sample was evaluated according to the aforementioned sensory evaluation method, and the average score of the panel was taken as the evaluation result. The taste profile of the mixture is as follows. It should be noted that according to the sensory evaluation method, the evaluation of the mouth feel and the sweet profile is based on the iso-sweetness. That is to say, in these evaluations, the concentration of RD in the sample solution was the same, 500 ppm. The results are shown in Table 112.2.

TABLE 112.2

| the score in sensory evaluation | | | | | | | |
|---|---|---|---|---|---|---|---|
| | | sensory evaluation | | | | | |
| | | | sweet profile | | | | |
| # | flavor | mouth feel kokumi | sweet linger-ing | bitter-ness | metallic after-taste | score of sweet profile | overall like-ability |
| 112-01 | floral | 1 | 2 | 1 | 1 | 4.67 | 2.83 |
| 112-02 | | 1 | 2 | 1 | 1 | 4.67 | 2.83 |
| 112-03 | | 2 | 1 | 1 | 1 | 5.00 | 3.50 |
| 112-04 | | 2 | 1 | 1 | 1 | 5.00 | 3.50 |
| 112-05 | | 2 | 1 | 1 | 1 | 5.00 | 3.50 |
| 112-06 | | 3 | 1 | 1 | 1 | 5.00 | 4.00 |
| 112-07 | | 3 | 1 | 1 | 1 | 5.00 | 4.00 |
| 112-08 | | 4 | 1 | 1 | 1 | 5.00 | 4.50 |
| 112-09 | | 4 | 1 | 1 | 1 | 5.00 | 4.50 |

Data analysis: The tasting procedure is the same as Example 39.

Figure 82:
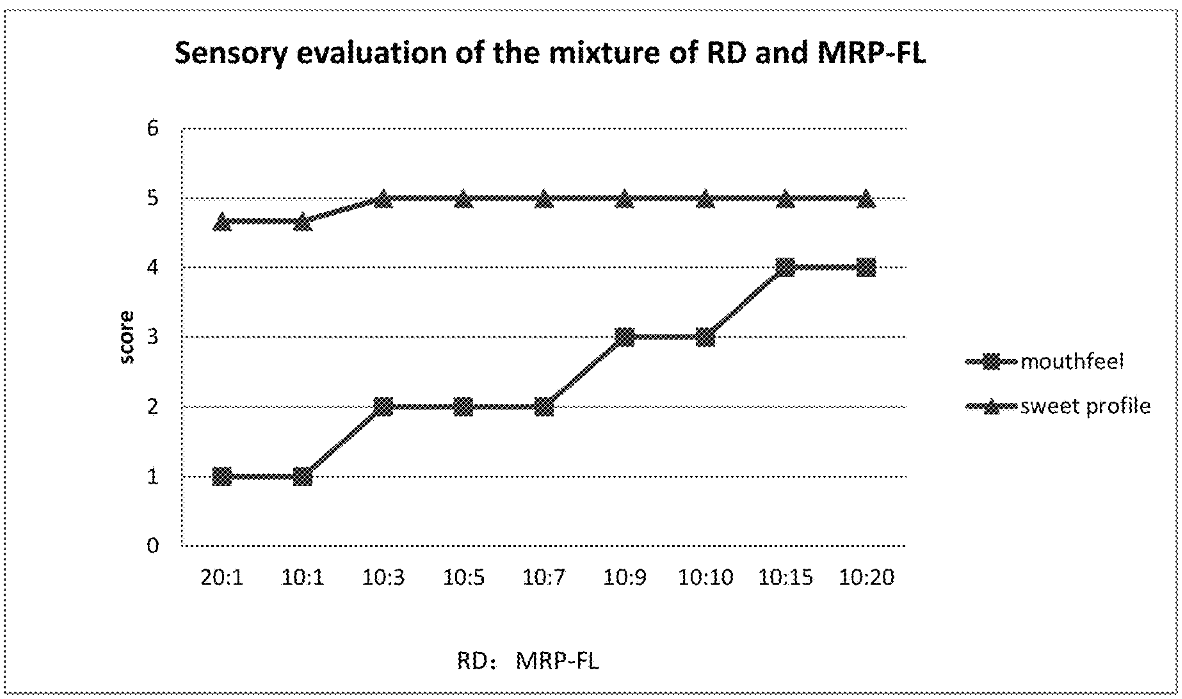
FIG. 82 shows the relationship between the sensory evaluation results to the ratio of RD to MRP-FL of example 112.

The relationship between the sensory evaluation results to the ratio of RD to MRP-FL in this example is as shown in FIG. 82.

Figure 83:
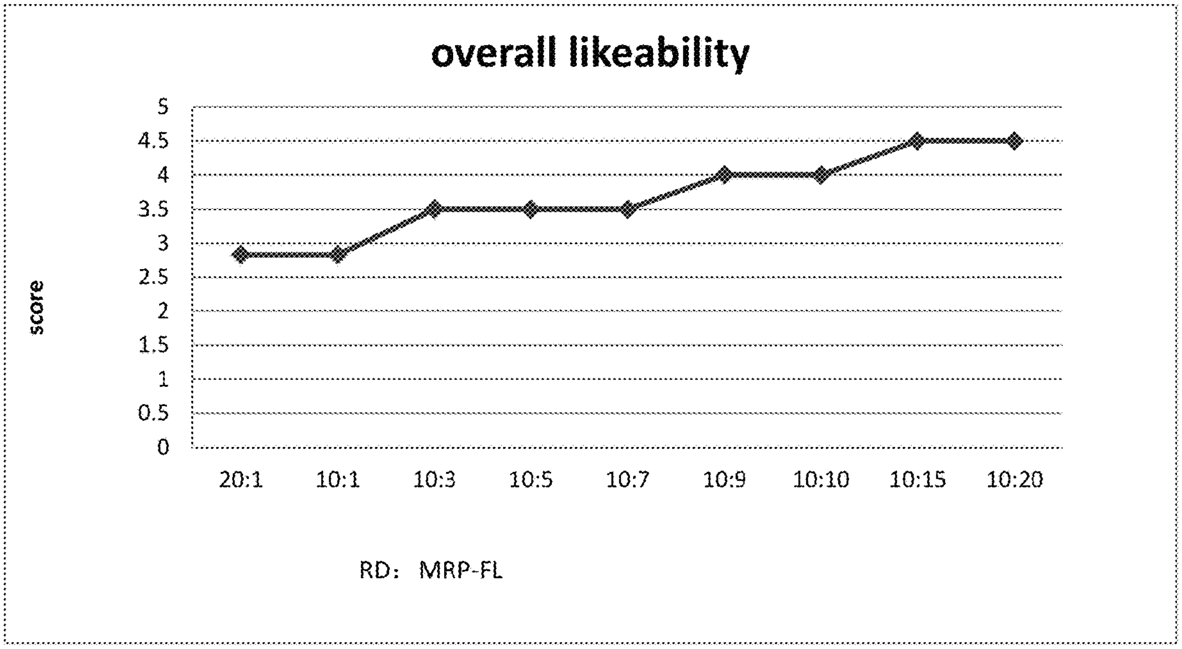
FIG. 83 shows the relationship between the overall likeability results to the ratio of RD to MRP-FL of example 112.

The relationship between the overall like results to the ratio of RD to MRP-FL in this example is shown in FIG. 83.

Conclusion:

The results showed that standard MRPs can significantly improve taste profile, flavor intensity and mouth feel of high intensity natural sweeteners or sweetening agents such as *Stevia* extract. For example, steviol glycosides comprise rebaudioside D. All ranges in tested ratios of RD to MRP-FL from 20:1 to 10:20 had good taste (overall likeability score >2.5), preferably when the ratio ranges were from 10:3 to 10:20, the products gave very good taste (score >3), The conclusion can be extended to 1:99 and 99:1. This example can further demonstrate that MRPs can improve taste profile, flavor intensity and mouth feel of steviol glycosides.

Example 113

The Improvement of S-MRP-FL to the Taste and Mouth Feel of RD

Common Process:

S-MRP-FL and RD were weighed and uniformly mixed according to the weight shown in Table 113.1, dissolved in 200 ml of pure water, and subjected to a mouth feel evaluation test.

TABLE 113.1

| the weight of S-MRP-FL and RD | | | |
|---|---|---|---|
| # | Ratio of RD to S-MRP-FL | Weight of RD (g) | Weight of S-MRP-FL (g) |
| 113-01 | 20:1 | 0.1 | 0.005 |
| 113-02 | 10:1 | 0.1 | 0.01 |
| 113-03 | 10:3 | 0.1 | 0.03 |
| 113-04 | 10:5 | 0.1 | 0.05 |
| 113-05 | 10:7 | 0.1 | 0.07 |
| 113-06 | 10:9 | 0.1 | 0.09 |
| 113-07 | 10:10 | 0.1 | 0.1 |
| 113-08 | 10:15 | 0.1 | 0.15 |
| 113-09 | 10:20 | 0.1 | 0.2 |

Experiments

Several mixtures of S-MRP-FL and RD were mixed in this example. Each sample was evaluated according to the aforementioned sensory evaluation method, and the average score of the panel was taken as the evaluation result. The taste profile of the mixture is as follows. It should be noted that according to the sensory evaluation method, the evaluation of the mouth feel and the sweet profile is based on the iso-sweetness. That is to say, in these evaluations, the concentration of RD in the sample solution was the same, 500 ppm. The results are shown in Table 113.2.

TABLE 113.2

| the score in sensory evaluation | | | | | | | |
|---|---|---|---|---|---|---|---|
| | | sensory evaluation | | | | | |
| | | | sweet profile | | | | |
| # | flavor | mouth feel kokumi | sweet linger-ing | bitter-ness | metallic after-taste | score of sweet profile | overall like-ability |
| 113-01 | floral | 2 | 1 | 1 | 1 | 5.00 | 3.50 |
| 113-02 | flavor | 2 | 1 | 1 | 1 | 5.00 | 3.50 |
| 113-03 | | 2 | 1 | 1 | 1 | 5.00 | 3.50 |
| 113-04 | | 2 | 1 | 1 | 1 | 5.00 | 3.50 |
| 113-05 | | 2 | 1 | 1 | 1 | 5.00 | 3.50 |
| 113-06 | | 3 | 2 | 1 | 1 | 4.67 | 3.83 |
| 113-07 | | 3 | 2 | 1 | 1 | 4.67 | 3.83 |
| 113-08 | | 3 | 2 | 1 | 1 | 4.67 | 3.83 |
| 113-09 | | 3 | 2 | 1 | 1 | 4.67 | 3.83 |

Data Analysis

Figure 84:
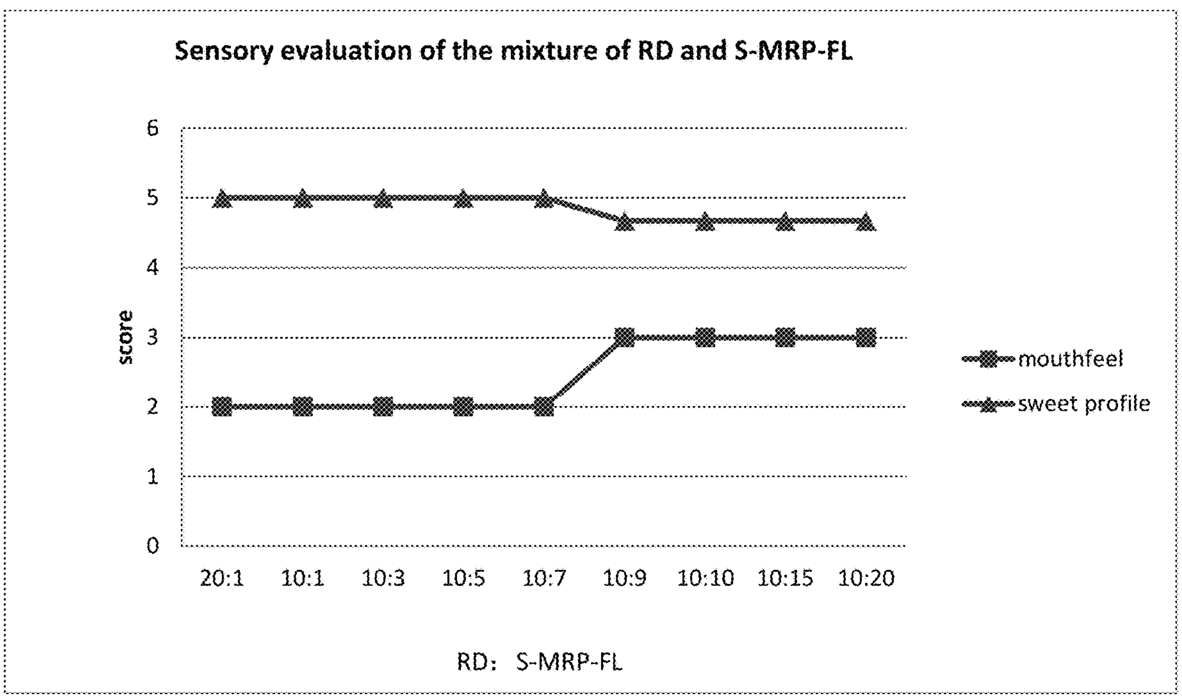
FIG. 84 shows the relationship between the sensory evaluation results to the ratio of RD to S-MRP-FL of example 113.

The relationship between the sensory evaluation results to the ratio of RD to S-MRP-FL in this example is as shown in FIG. 84. The tasting procedure is the same as Example 39.

Figure 85:
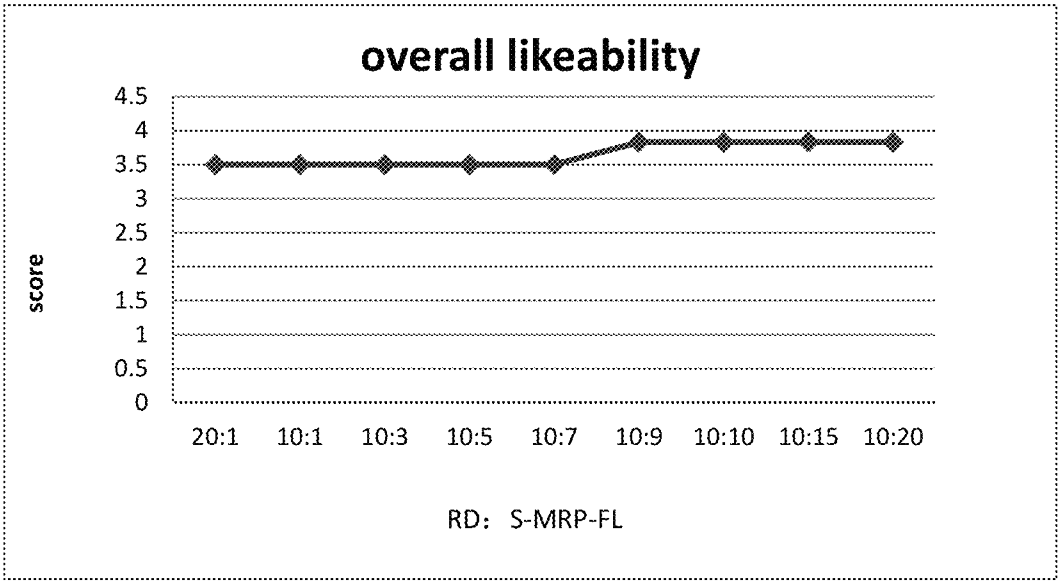
FIG. 85 shows the relationship between the overall likeability results to the ratio of RD to S-MRP-FL of example 113.

The relationship between the overall likeability results to the ratio of RD to S-MRP-FL in this example is as shown in FIG. 85.

Conclusion:

The results showed that S-MRPs (MRPs, *Stevia* extract) can significantly improve taste profile, flavor intensity and mouth feel of high intensity natural sweeteners or sweetening agents such as *Stevia* extract. For example, steviol glycosides comprise rebaudioside D. All ranges in tested ratios of RD to S-MRP-FL from 20:1 to 10:20 had good taste overall likeability score >3), preferably when the ratio ranges were from 10:9 to 10:20, the products gave very good taste (score >3.5). The conclusion can be extended to 1:99 and 99:1. This example can further demonstrate that S-MRPs can improve taste profile, flavor intensity and mouth feel of steviol glycosides.

Example 114

The Improvement of TS-MRP-FL to the Taste and Mouth Feel of RD

Common Process:

TS-MRP-FL and RD were weighed and uniformly mixed according to the weight shown in Table 114.1, dissolved in 200 ml of pure water, and subjected to a mouth feel evaluation test. The tasting procedure is the same as Example 39.

TABLE 114.1 the weight of TS-MRP-FL and RD

| # | Ratio of RD to TS-MRP-FL | Weight of RD (g) | Weight of TS-MRP-FL (g) |
|---|---|---|---|
| 114-01 | 20:1 | 0.1 | 0.005 |
| 114-02 | 10:1 | 0.1 | 0.01 |
| 114-03 | 10:3 | 0.1 | 0.03 |
| 114-04 | 10:5 | 0.1 | 0.05 |
| 114-05 | 10:7 | 0.1 | 0.07 |
| 114-06 | 10:9 | 0.1 | 0.09 |
| 114-07 | 10:10 | 0.1 | 0.1 |
| 114-08 | 10:15 | 0.1 | 0.15 |
| 114-09 | 10:20 | 0.1 | 0.2 |

Experiments

Several mixtures of TS-MRP-FL and RD were mixed in this example. Each sample was evaluated according to the aforementioned sensory evaluation method, and the average score of the panel was taken as the evaluation result. The taste profile of the mixture is as follows. It should be noted that according to the sensory evaluation method, the evaluation of the mouth feel and the sweet profile is based on the iso-sweetness. That is to say, in these evaluations, the concentration of RD in the sample solution was the same, 500 ppm. The results are shown in Table 114.2.

TABLE 114.2 the score in sensory evaluation

| | | sensory evaluation | | | | | |
|---|---|---|---|---|---|---|---|
| | | | sweet profile | | | | |
| # | flavor | mouth feel kokumi | sweet lingering | bitterness | metallic aftertaste | score of sweet profile | overall likeability |
| 114-01 | floral | 2 | 1 | 1 | 1 | 4.67 | 3.50 |
| 114-02 | | 2 | 1 | 1 | 1 | 4.67 | 3.50 |
| 114-03 | | 3 | 1 | 1 | 1 | 5.00 | 4.00 |
| 114-04 | | 3 | 1 | 1 | 1 | 5.00 | 4.00 |
| 114-05 | | 3 | 1 | 1 | 1 | 5.00 | 4.00 |
| 114-06 | | 3 | 1 | 1 | 1 | 5.00 | 4.00 |
| 114-07 | | 3 | 1 | 1 | 1 | 5.00 | 4.00 |
| 114-08 | | 4 | 2 | 1 | 1 | 4.67 | 4.33 |
| 114-09 | | 4 | 2 | 1 | 1 | 4.67 | 4.33 |

Data Analysis

Figure 86:
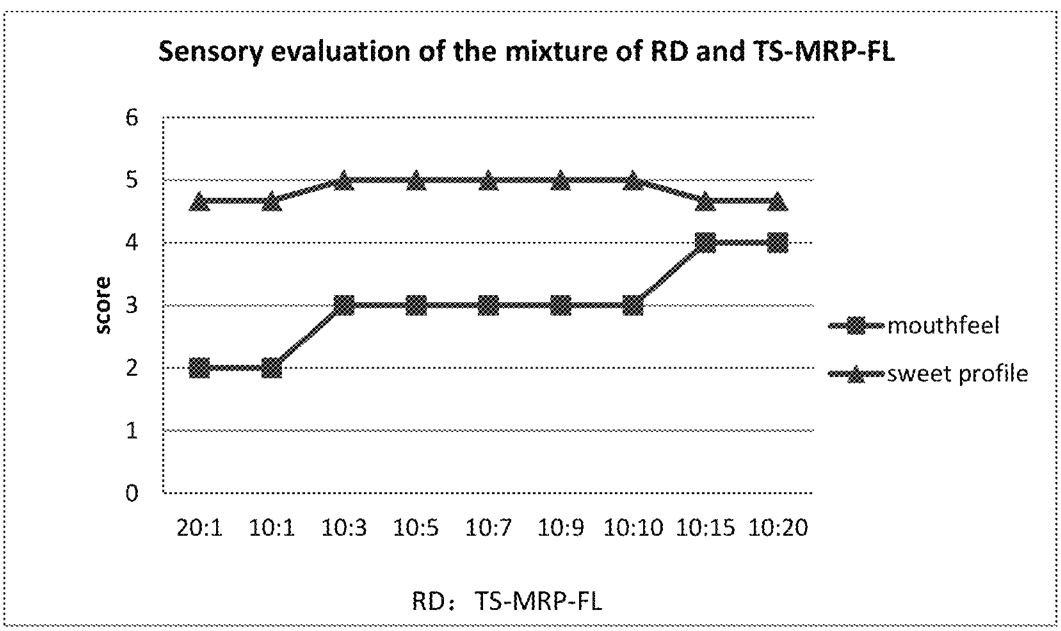
FIG. 86 shows the relationship between the sensory evaluation results to the ratio of RD to TS-MRP-FL of example 114.

The relationship between the sensory evaluation results to the ratio of to TS-MRP-FL in this example is as shown in FIG. 86.

Figure 87:
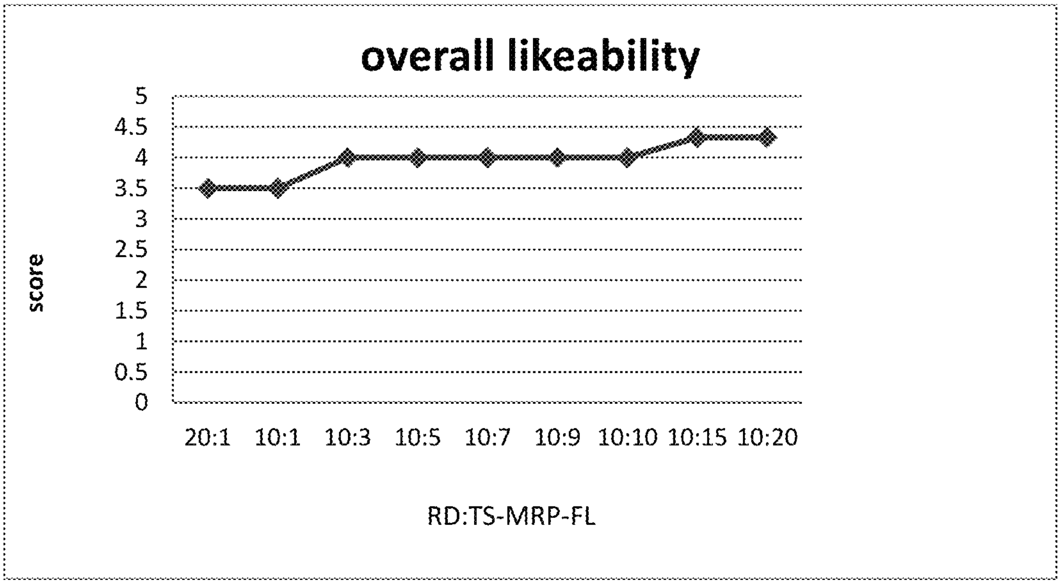
FIG. 87 shows the relationship between the overall likeability results to the ratio of RD to TS-MRP-FL of example 114.

The relationship between the overall results to the ratio of RD to TS-MRP-FL in this example is as shown in FIG. 87.

Conclusion:

The results showed that TS-MRPs (MRPs, *Stevia* extract, thaumatin) can significantly improve taste profile, flavor intensity and mouth feel of high intensity natural sweeteners such as *Stevia* extract. For example, steviol glycosides which comprise rebaudioside D. All ranges in tested ratios of RD to TS-MRP-FL from 20:1 to 10:20 had good taste (overall likeability score >3.5), preferably when the ratio ranges were from 10:3 to 10:20, the products gave very good taste (score >4). The conclusion can be extended to 1:99 and 99:1. This example can further demonstrate that TS-MRPs can improve taste profile, flavor intensity and mouth feel of steviol glycosides.

Example 115

The Improvement of MRP-CA to the Taste and Mouth Feel of RM

Common Process:

MRP-CA and RM were weighed and uniformly mixed according to the weight shown in Table 115.1, dissolved in 100 ml of pure water, and subjected to a mouth feel evaluation test. The tasting procedure is the same as Example 39.

TABLE 115.1 the weight of MRP-CA and RM

| # | RM/MRP-CA | Weight of RM (g) | Weight of MRP-CA (g) |
|---|---|---|---|
| 115-01 | 1/0.01 | 0.05 | 0.0005 |
| 115-02 | 1/0.1 | | 0.005 |
| 115-03 | 1/0.3 | | 0.015 |
| 115-04 | 1/0.5 | | 0.025 |
| 115-05 | 1/0.7 | | 0.035 |
| 115-06 | 1/0.9 | | 0.045 |

Experiments

Several mixtures of MRP-CA and RM were mixed in this example. Each sample was evaluated according to the aforementioned sensory evaluation method, and the average score of the panel was taken as the evaluation result data. The taste profile of the mixture is as follows. It should be noted that according to the sensory evaluation method, the evaluation of the mouth feel and the sweet profile is based on the iso-sweetness. That is to say, in these evaluations, the concentration of RM in the sample solution was the same, 500 ppm. The results are shown in Table 115.2.

TABLE 115.2

| the score in sensory evaluation | | | | | | |
|---|---|---|---|---|---|---|
| | sensory evaluation | | | | | |
| | | sweet profile | | | | |
| # | mouth feel kokumi | sweet lingering | bitterness | metallic aftertaste | score of sweet profile | overall likeability |
| 115-01 | 1 | 3 | 1 | 1 | 4.33 | 2.67 |
| 115-02 | 2 | 2 | 1 | 1 | 4.67 | 3.33 |
| 115-03 | 2.5 | 2 | 1 | 1 | 4.67 | 3.58 |
| 115-04 | 3 | 2 | 1 | 1 | 4.67 | 3.83 |
| 115-05 | 3 | 2 | 1 | 1 | 4.67 | 3.83 |
| 115-06 | 3 | 2 | 1 | 1 | 4.67 | 3.83 |

Data Analysis

Figure 88:
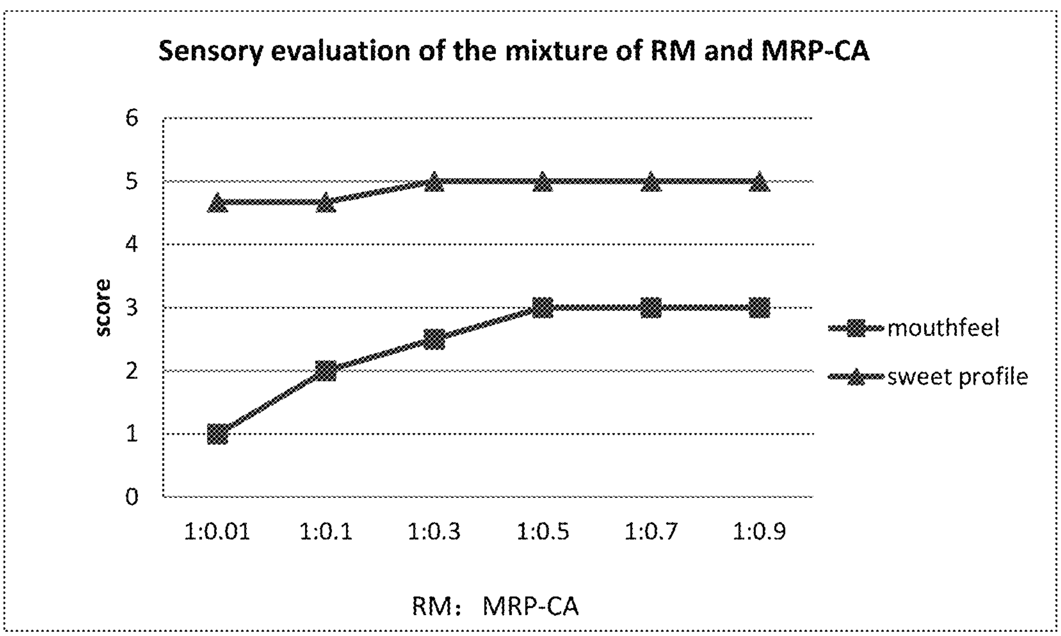
FIG. 88 shows the relationship between the sensory evaluation results to the ratio of RM to MRP-CA of example 115.

The relationship between the sensory evaluation results to the ratio of RM to MRP-CA in this example is as shown in FIG. 88.

Figure 89:
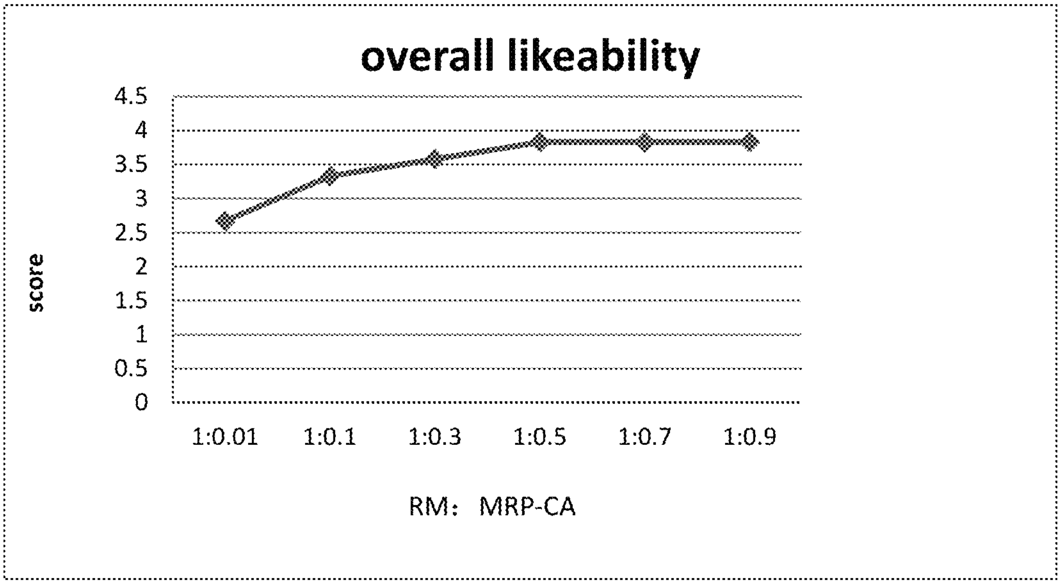
FIG. 89 shows the relationship between the overall likeability results to the ratio of RM to MRP-CA of example 115.

The relationship between the overall likeability results to the ratio of RM to MRP-CA in this example is as shown in FIG. 89.

Conclusion:

The results showed that MRPs can improve taste profile, flavor intensity and mouth feel of high intensity natural sweeteners such as *Stevia* extract. For example, steviol glycosides comprise rebaudioside M. All ranges in tested ratios of RM to MRP-CA from 1/0.01 to 1/0.9 had good taste (overall likeability score >2.5), preferably when the ratio ranges were from 1/0.1 to 1/0.9, the products will give very good taste (score >3). The conclusion can be extended to 1:99 and 99:1. This example can further demonstrate that MRPs can improve taste profile, flavor intensity and mouth feel of steviol glycosides.

Example 116

The Improvement of S-MRP-CA to the Taste and Mouth Feel of RM

Common Process:

S-MRP-CA and RM were weighed and uniformly mixed according to the weight shown in Table 116.1, dissolved in 100 ml of pure water, and subjected to a mouth feel evaluation test. The tasting procedure is the same as Example 39.

TABLE 116.1

| the weight of S-MRP-CA and RM | | | |
|---|---|---|---|
| # | RM/ S-MRP-CA | Weight of RM (g) | Weight of S-MRP-CA (g) |
| 116-01 | 1/0.01 | 0.05 | 0.0005 |
| 116-02 | 1/0.1 | | 0.005 |
| 116-03 | 1/0.3 | | 0.015 |
| 116-04 | 1/0.5 | | 0.025 |
| 116-05 | 1/0.7 | | 0.035 |
| 116-06 | 1/0.9 | | 0.045 |

Experiments

Several mixtures of S-MRP-CA and RM were mixed in this example. Each sample was evaluated according to the aforementioned sensory evaluation method, and the average score of the panel was taken as the evaluation result. The taste profile of the mixture is as follows. It should be noted that according to the sensory evaluation method, the evaluation of the mouth feel and the sweet profile is based on the iso-sweetness. That is to say, in these evaluations, the concentration of RM in the sample solution was the same, 500 ppm. The results are shown in Table 116.2.

TABLE 116.2

| the score in sensory evaluation | | | | | | |
|---|---|---|---|---|---|---|
| | sensory evaluation | | | | | |
| | | sweet profile | | | | |
| # | mouth feel kokumi | sweet lingering | bitterness | metallic aftertaste | score of sweet profile | overall likeability |
| 116-01 | 1 | 4 | 1 | 1 | 4 | 2.57 |
| 116-02 | 1 | 3 | 1 | 1 | 4.33 | 2.67 |
| 116-03 | 2 | 3 | 1 | 1 | 4.33 | 3.17 |
| 116-04 | 3 | 2 | 1 | 1 | 4.67 | 3.83 |
| 116-05 | 3 | 2 | 1 | 1 | 4.67 | 3.83 |
| 116-06 | 4 | 2 | 1 | 1 | 4.67 | 4.33 |

Data Analysis

Figure 90:
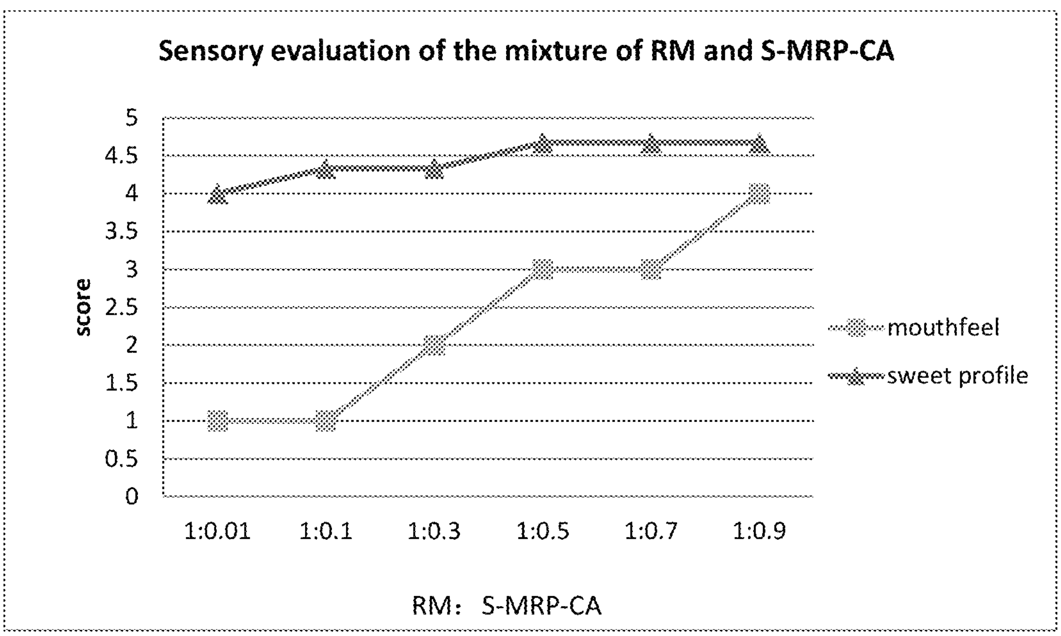
FIG. 90 shows the relationship between the sensory evaluation results to the ratio of RM to S-MRP-CA of example 116.

The relationship between the sensory evaluation results to the ratio of RM to S-MRP-CA in this example is as shown in FIG. 90.

Figure 91:
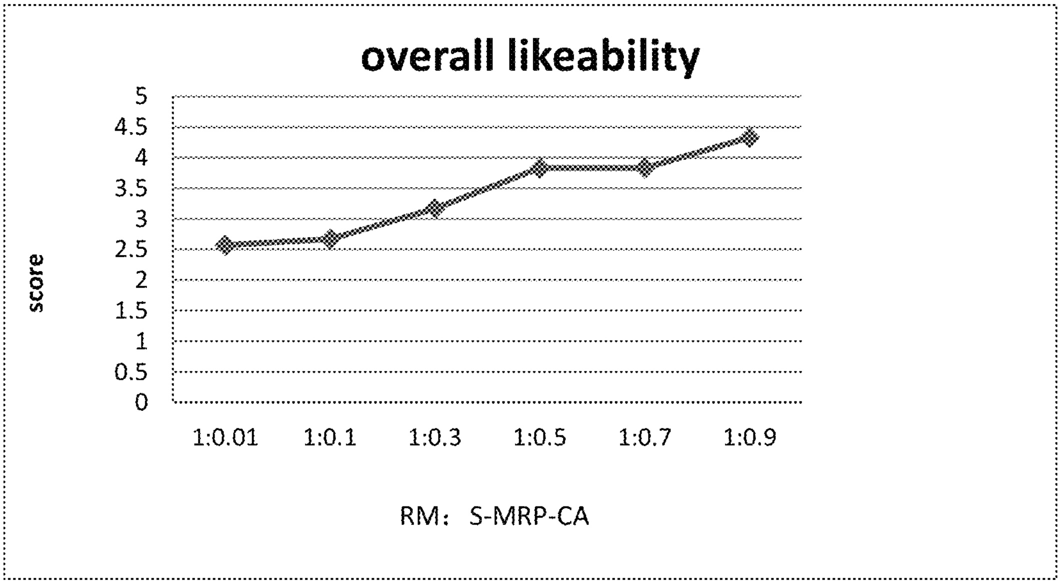
FIG. 91 shows the relationship between the overall likeability results to the ratio of RM to S-MRP-CA of example 116.

The relationship between the overall likeability results to the ratio of RM to S-MRP-CA in this example is as shown in FIG. 91.

Conclusion:

The results showed that S-MRPs (MRPs, *Stevia* extract) can significantly improve taste profile, flavor intensity and mouth feel of high intensity natural sweeteners such as *Stevia* extract. For example, steviol glycosides comprise rebaudioside M. All ranges in tested ratios of RM to S-MRP-CA from 1/0.01 to 1/0.9 had good taste (overall likeabillity score >2.5), preferably when the ratio ranges were from 1/0.3 to 1/0.9, the products gave very good taste (score >3), The conclusion can be extended to 1:99 and 99:1.

Example 117

The Improvement of TS-MRP-CA to the Taste and Mouth Feel of RM

Common Process:

TS-MRP-CA and RM were weighed and uniformly mixed according to the weight shown in Table 117.1, dissolved in 100 ml of pure water, and subjected to a mouth feel evaluation test. The tasting procedure is the same as Example 39.

TABLE 117.1 the weight of TS-MRP-CA and RM

| # | RM/TS-MRP-CA | Weight of RM (g) | Weight of TS-MRP-CA (g) |
|---|---|---|---|
| 117-01 | 1/0.01 | 0.05 | 0.0005 |
| 117-02 | 1/0.1 | | 0.005 |
| 117-03 | 1/0.3 | | 0.015 |
| 117-04 | 1/0.5 | | 0.025 |
| 117-05 | 1/0.7 | | 0.035 |
| 117-06 | 1/0.9 | | 0.045 |
| 117-07 | 1/1 | | 0.05 |

Experiments

Several mixtures of TS-MRP-CA and RM were mixed in this example. Each sample was evaluated according to the aforementioned sensory evaluation method, and the average score of the panel was taken as the evaluation result. The taste profile of the mixture is as follows. It should be noted that according to the sensory evaluation method, the evaluation of the mouth feel and the sweet profile is based on the iso-sweetness. That is to say, in these evaluations, the concentration of RA4 in the sample solution was the same, 500 ppm. The results are shown in Table 117.2.

TABLE 117.2 the score in sensory evaluation

| # | sensory evaluation | | | | | |
|---|---|---|---|---|---|---|
| | | sweet profile | | | | |
| | mouth feel kokumi | sweet lingering | bitterness | metallic after-taste | score of sweet profile | overall likeability |
| 117-01 | 1 | 3 | 1 | 1 | 4.33 | 2.67 |
| 117-02 | 1.5 | 3 | 1 | 1 | 4.33 | 2.92 |
| 117-03 | 2 | 2 | 1 | 1 | 4.67 | 3.33 |
| 117-04 | 2.5 | 2 | 1 | 1 | 4.67 | 3.58 |
| 117-05 | 3 | 2 | 1 | 1 | 4.67 | 3.83 |
| 117-06 | 3 | 2 | 1 | 1 | 4.67 | 3.83 |
| 117-07 | 3 | 1 | 1 | 1 | 5 | 4 |

Data Analysis

Figure 92:
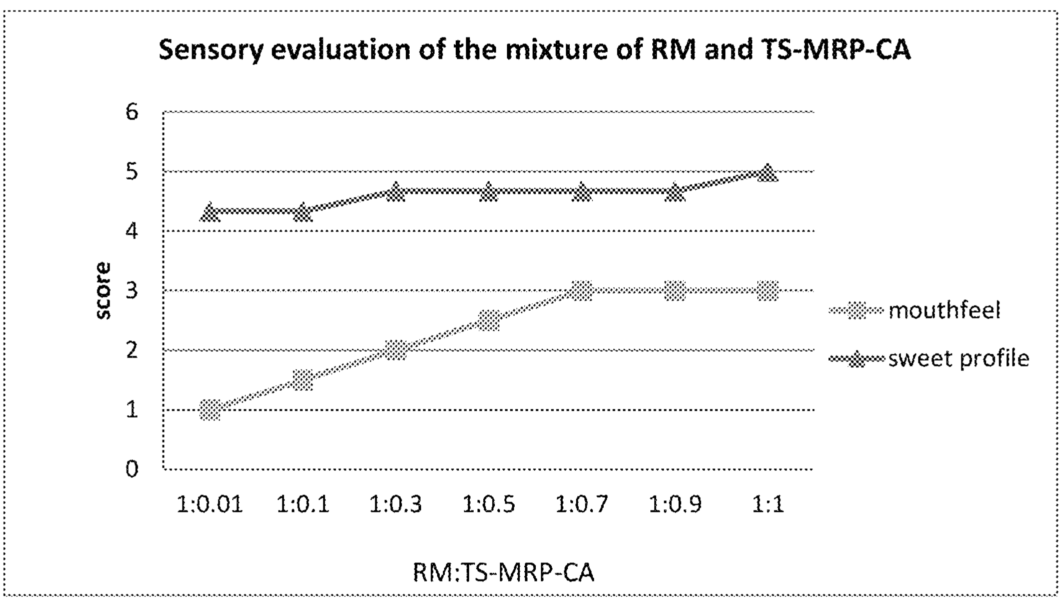
FIG. 92 shows the relationship between the sensory evaluation results to the ratio of RM to TS-MRP-CA of example 117.

The relationship between the sensory evaluation results to the ratio of RM to TS-MRP-CA in this example is as shown in FIG. 92.

Figure 93:
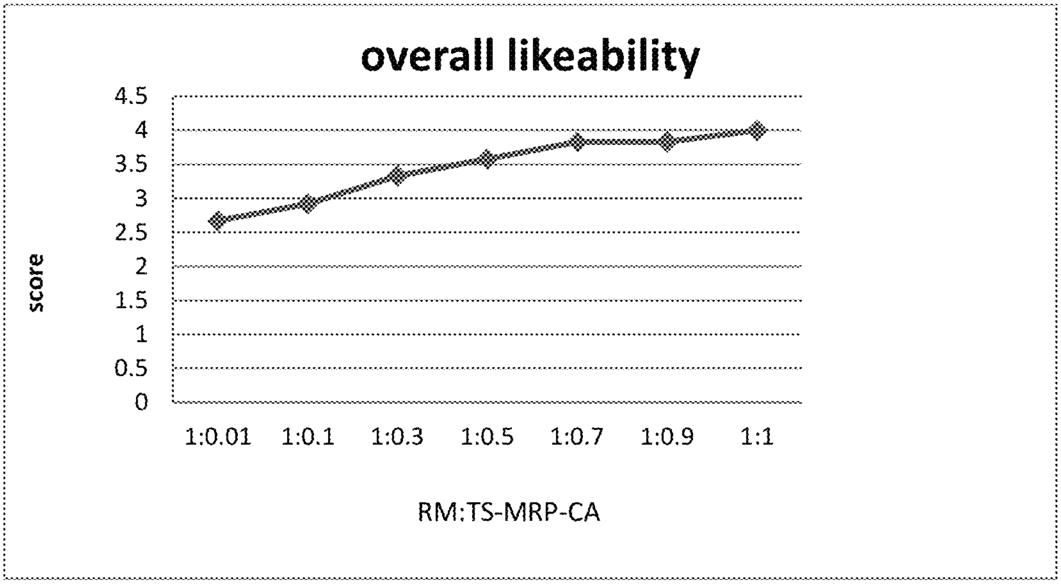
FIG. 93 shows the relationship between the overall likeability results to the ratio of RM to TS-MRP-CA of example 117.

The relationship between the overall likeability results to the ratio of RM to TS-MRP-CA in this example is as shown in FIG. 93.

Conclusion:

The results showed that TS-MRPs (MRPs, *Stevia* extract, thaumatin) can significantly improve taste profile, flavor intensity and mouth feel of high intensity natural sweeteners such as *Stevia* extract. For example, steviol glycosides comprise rebaudioside M. All ranges in tested ratios of RM to TS-MRP-CA from 1/0.01 to 1/1 had good taste (overall likeability score >2.5), preferably when the ratio ranges were from 1/0.3 to 1/1, the products gave very good taste (score >3). The conclusion can be extended to 1:99 and 99:1.

Example 118

The Improvement of MRP-CH to the Taste and Mouth Feel of RD+RM (9:1)

Common Process:

MRP-CH, RD, and RM were weighed and uniformly mixed according to the weight shown in Table 118.1. The mixed powder was weighed in the amount shown in Table 118.1, dissolved in 100 ml of pure water, and subjected to a mouth feel evaluation test. The tasting procedure is the same as Example 39.

TABLE 118.1 the weight of MRP-CH, RD, and RM

| # | The ratio of RD to RM | The ratio of MRP-CH to RD + RM (9:1) | Weight of MRP-CH (g) | Weight of RD (g) | Weight of RM (g) | Weight of the mixed powder (mg) |
|---|---|---|---|---|---|---|
| 118-01 | 9/1 | 0.01/1 | 0.005 | 0.45 | 0.05 | 50.5 |
| 118-02 | | 0.1/1 | 0.05 | | | 55 |
| 118-03 | | 0.3/1 | 0.15 | | | 65 |
| 118-04 | | 0.5/1 | 0.25 | | | 75 |
| 118-05 | | 0.7/1 | 0.35 | | | 85 |
| 118-06 | | 0.9/1 | 0.45 | | | 95 |
| 118-07 | | 1/1 | 0.5 | | | 100 |
| 118-08 | | 2/1 | 1.0 | | | 150 |

Experiments

Several mixtures of MRP-CH and RD+RM (9:1) were mixed in this example. Each sample was evaluated according to the aforementioned sensory evaluation method, and the average score of the panel was taken as the evaluation result. The taste profile of the mixture is as follows. It should be noted that according to the sensory evaluation method, the evaluation of the mouth feel and the sweet profile is based on the iso-sweetness. That is to say, in these evaluations, the concentration of RD+RM (9:1) in the sample solution was the same, 500 ppm. The results are shown in Table 118.2.

TABLE 118.2 the score in sensory evaluation

| # | flavor | sensory evaluation | | | | | |
|---|---|---|---|---|---|---|---|
| | | | sweet profile | | | | |
| | | mouth feel kokumi | sweet lingering | bitterness | metallic after-taste | score of sweet profile | overall likeability |
| 118-01 | Chocolate | 1 | 3 | 1 | 1 | 4.33 | 2.67 |
| 118-02 | | 1 | 3 | 1 | 1 | 4.33 | 2.67 |
| 118-03 | | 1 | 3 | 1 | 1 | 4.33 | 2.67 |
| 118-04 | | 2 | 3 | 1 | 1 | 4.33 | 3.17 |
| 118-05 | | 2 | 3 | 2 | 1 | 4.00 | 3.00 |
| 118-06 | | 2 | 2 | 2 | 1 | 4.33 | 3.17 |
| 118-07 | | 2 | 2 | 1 | 1 | 4.67 | 3.33 |
| 118-08 | | 2 | 2 | 2 | 1 | 4.33 | 3.17 |

Data Analysis

Figure 94:
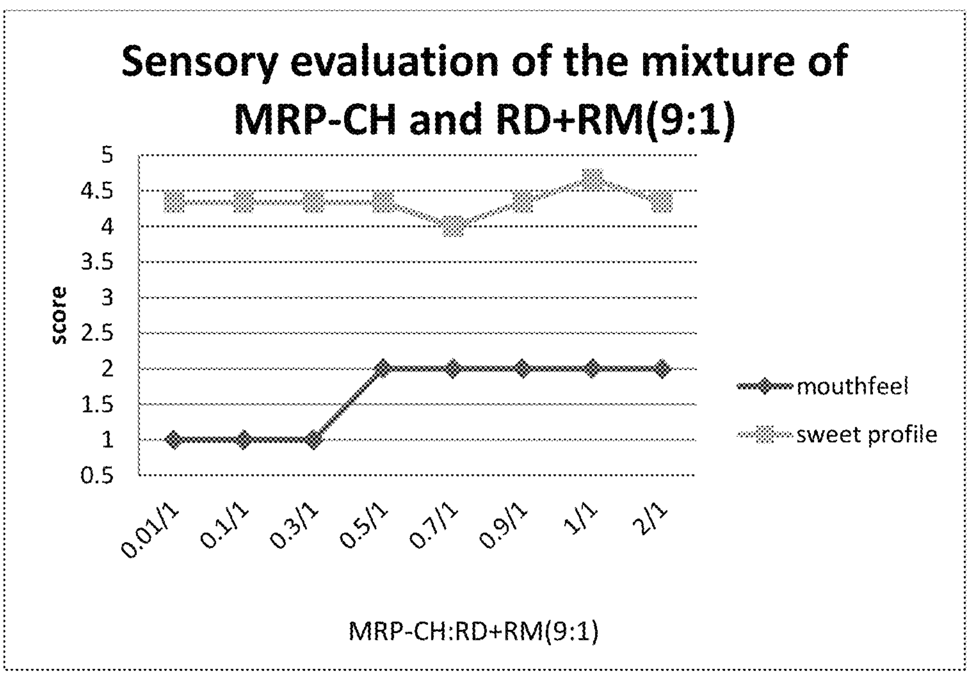
FIG. 94 shows the relationship between the sensory evaluation results to the ratio of MRP-CH to RD+RM (9:1) of example 118.

The relationship between the sensory evaluation results to the ratio of MRP-CH to RD+RM (9:1) in this example is as shown in FIG. 94.

Figure 95:
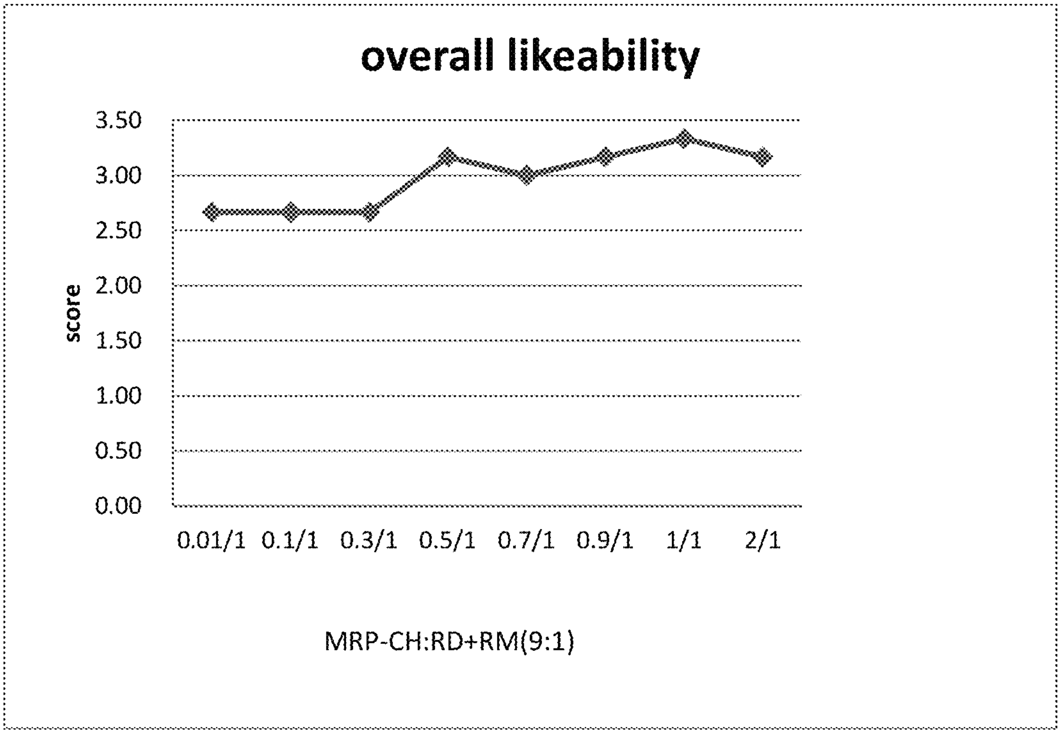
FIG. 95 shows the relationship between the overall likeability results to the ratio of MRP-CH to RD+RM (9:1) of example 118.

The relationship between the overall likeability results to the atio of MRP-CH to RD+RM (9:1) in this example is as shown in FIG. 95.

Conclusion:

The results showed that standard MRPs can significantly improve taste profile, flavor intensity and mouth feel of high intensity natural sweeteners such as *Stevia* extract. For example, steviol glycosides comprise the composition of rebaudioside D and rebaudioside M (9:1). All ranges in tested ratios of MRP-CH to RD+RM (9:1) from 0.01/1 to 2/1 had good taste (overall likeability score >2.5), preferably when the ratio ranges were from 0.5/1 to 2/1, the products gave very good taste (score >3). The conclusion can be extended to 1:99 and 99:1.

Example 119

The Improvement of S-MRP-CH to the Taste and Mouth Feel of RD+RM (9:1)

Common Process:

S-MRP-CH, RD, and RM were weighed and uniformly mixed according to the weight shown in Table 119.1. The mixed powder was weighed in the amount shown in Table 119.1, dissolved in 100 ml of pure water, and subjected to a mouth feel evaluation test.

TABLE 119.1 the weight of MRP-CH, RD, and RM

| # | The ratio of RD to RM | The ratio of S-MRP-CH to RD + RM (9:10) | Weight of S-MRP-CH (g) | Weight of RD (g) | Weight of RM (g) | Weight of the mixed powder (mg) |
|---|---|---|---|---|---|---|
| 119-01 | 9/1 | 0.01/1 | 0.005 | 0.45 | 0.05 | 50.5 |
| 119-02 | | 0.1/1 | 0.05 | | | 55 |
| 119-03 | | 0.3/1 | 0.15 | | | 65 |
| 119-04 | | 0.5/1 | 0.25 | | | 75 |
| 119-05 | | 0.7/1 | 0.35 | | | 85 |
| 119-06 | | 0.9/1 | 0.45 | | | 95 |
| 119-07 | | 1/1 | 0.5 | | | 100 |
| 119-08 | | 2/1 | 1.0 | | | 150 |
| 119-09 | | 3/1 | 1.5 | | | 200 |

Experiments

Several mixtures of S-MRP-CH and RD+RM (9:1) were mixed in this example. Each sample was evaluated according to the aforementioned sensory evaluation method, and the average score of the panel was taken as the evaluation result. The taste profile of the mixture is as follows. It should be noted that according to the sensory evaluation method, the evaluation of the mouth feel and the sweet profile is based on the iso-sweetness. That is to say, in these evaluations, the concentration of RD+RM (9:1) in the sample solution was the same, 500 ppm. The results are shown in Table 119.2. The tasting procedure is the same as Example 39.

TABLE 119.2 the score in sensory evaluation

| | | sensory evaluation | | | | | |
|---|---|---|---|---|---|---|---|
| | | | sweet profile | | | | |
| # | flavor | mouth feel kokumi | sweet lingering | bitterness | metallic after-taste | score of sweet profile | overall likeability |
| 119-01 | Chocolate | 1 | 4 | 1 | 1 | 4.00 | 2.50 |
| 119-02 | | 1 | 3 | 1 | 1 | 4.33 | 2.67 |
| 119-03 | | 1 | 3 | 1 | 1 | 4.33 | 2.67 |
| 119-04 | | 2 | 2 | 1 | 1 | 4.67 | 2.83 |
| 119-05 | | 2 | 2 | 1 | 1 | 4.67 | 2.83 |
| 119-06 | | 2 | 2 | 1 | 1 | 4.67 | 2.83 |
| 119-07 | | 2 | 2 | 2 | 2 | 4.00 | 3.00 |
| 119-08 | | 2 | 2 | 2 | 2 | 4.00 | 3.00 |
| 119-09 | | 2 | 2 | 2 | 3 | 3.67 | 2.83 |

Data Analysis

Figure 96:
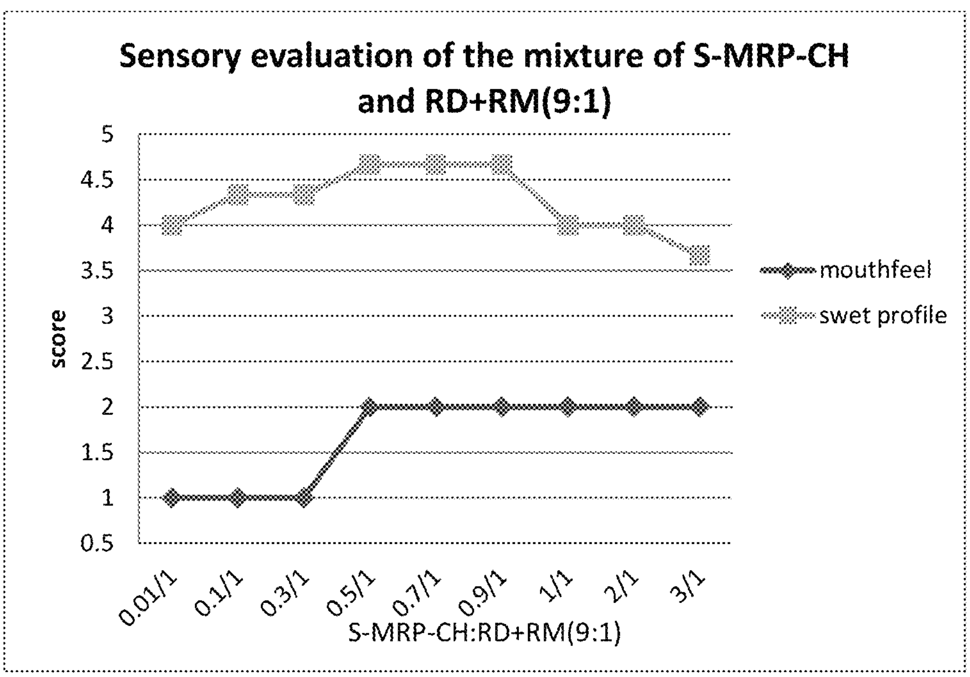
FIG. 96 shows the relationship between the sensory evaluation results to the ratio of S-MRP-CH to RD+RM (9:1) of example 119.

The relationship between the sensory evaluation results to the ratio of S-MRP-CH to RD+RM (9:1) in this example is as shown in FIG. 96.

Figure 97:
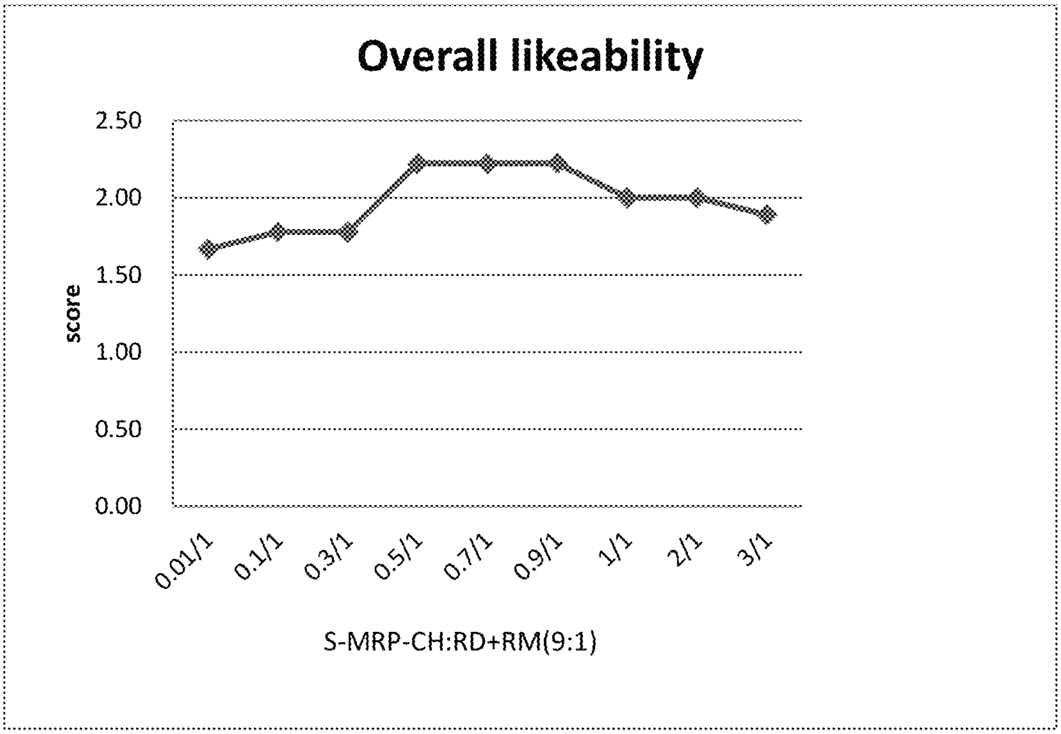
FIG. 97 shows the relationship between the overall likeability results to the ratio of S-MRP-CH to RD+RM (9:1) of example 119.

The relationship between the overall likeability results to the ratio of S-MRP-CH to RD+RM (9:1) in this example is as shown in FIG. 97.

Conclusi on:

The results showed that S-MRPs (MRPs, *Stevia* extract) can significantly improve taste profile, flavor intensity and mouth feel of high intensity natural sweeteners such as *Stevia* extract. For example, steviol glycosides comprise the composition of rebaudioside D and rebaudioside M (9:1). All ranges in tested ratios of S-MRP-CH to RD+RM (9:1) from 0.01/1 to 3/1 had good taste (overall likeability score >2.5), preferably when the ratio ranges were from 0.5/1 to 1/1, the products gave very good taste (score >3), The conclusion can be extended to 1:99 and 99:1.

Example 120

The Improvement of TS-MRP-CH to the Taste and Mouth Feel of RD+RM (9:1)

Common Process:

TS-MRP-CH, RD, and RM were weighed and uniformly mixed according to the weight shown in Table 120.1. The mixed powder was weighed in the amount shown in Table 120.1, dissolved in 100 ml of pure water, and subjected to a mouth feel evaluation test. The tasting procedure is the same as Example 39.

TABLE 120.1 the weight of TS-MRP-CH, RD, and RM

| # | The ratio of RD to RM | The ratio of TS-MRP-CH to RD + RM (9:1) | Weight of TS-MRP-CH (g) | Weight of RD (g) | Weight of RM (g) | Weight of the mixed powder (mg) |
|---|---|---|---|---|---|---|
| 120-01 | 9/1 | 0.01/1 | 0.005 | 0.45 | 0.05 | 50.5 |
| 120-02 | | 0.1/1 | 0.05 | | | 55 |
| 120-03 | | 0.3/1 | 0.15 | | | 65 |
| 120-04 | | 0.5/1 | 0.25 | | | 75 |
| 120-05 | | 0.7/1 | 0.35 | | | 85 |
| 120-06 | | 0.9/1 | 0.45 | | | 95 |
| 120-07 | | 1/1 | 0.5 | | | 100 |
| 120-08 | | 2/1 | 1.0 | | | 150 |

TABLE 120.1-continued

| the weight of TS-MRP-CH, RD, and RM | | | | | | |
|---|---|---|---|---|---|---|
| # | The ratio of RD to RM | The ratio of TS-MRP-CH to RD + RM (9:1) | Weight of TS-MRP-CH (g) | Weight of RD (g) | Weight of RM (g) | Weight of the mixed powder (mg) |
| 120-09 | | 3/1 | 1.5 | | | 200 |
| 120-10 | | 4/1 | 2.0 | | | 250 |

Experiments

Several mixtures of TS-MRP-CH and RD+RM (9:1) were mixed in this example. Each sample was evaluated according to the aforementioned sensory evaluation method, and the average score of the panel was taken as the evaluation result. The taste profile of the mixture is as follows. It should be noted that according to the sensory evaluation method, the evaluation of the mouth feel and the sweet profile is based on the iso-sweetness. That is to say, in these evaluations, the concentration of RD+RM (9:1) in the sample solution was the same, 500 ppm. The results are shown in Table 120.2.

TABLE 120.2

| the score in sensory evaluation | | | | | | | |
|---|---|---|---|---|---|---|---|
| | | sensory evaluation | | | | | |
| | | | sweet profile | | | | |
| # | flavor | mouth feel kokumi | sweet lingering | bitterness | metallic aftertaste | score of sweet profile | overall likeability |
| 120-01 | Chocolate | 1 | 3 | 1 | 1 | 4.33 | 2.67 |
| 120-02 | | 1 | 3 | 1 | 1 | 4.33 | 2.67 |
| 120-03 | | 1 | 3 | 1 | 2 | 4.00 | 2.50 |
| 120-04 | | 1 | 2 | 1 | 2 | 4.33 | 2.67 |
| 120-05 | | 2 | 2 | 1 | 2 | 4.33 | 3.17 |
| 120-06 | | 2 | 2 | 2 | 2 | 4.00 | 3.00 |
| 120-07 | | 2 | 1 | 2 | 2 | 4.33 | 3.17 |
| 120-08 | | 2 | 1 | 2 | 2 | 4.33 | 3.17 |
| 120-09 | | 2 | 2 | 2 | 3 | 3.67 | 2.83 |
| 120-10 | | 2 | 2 | 3 | 3 | 3.33 | 2.67 |

Data Analysis

Figure 98:
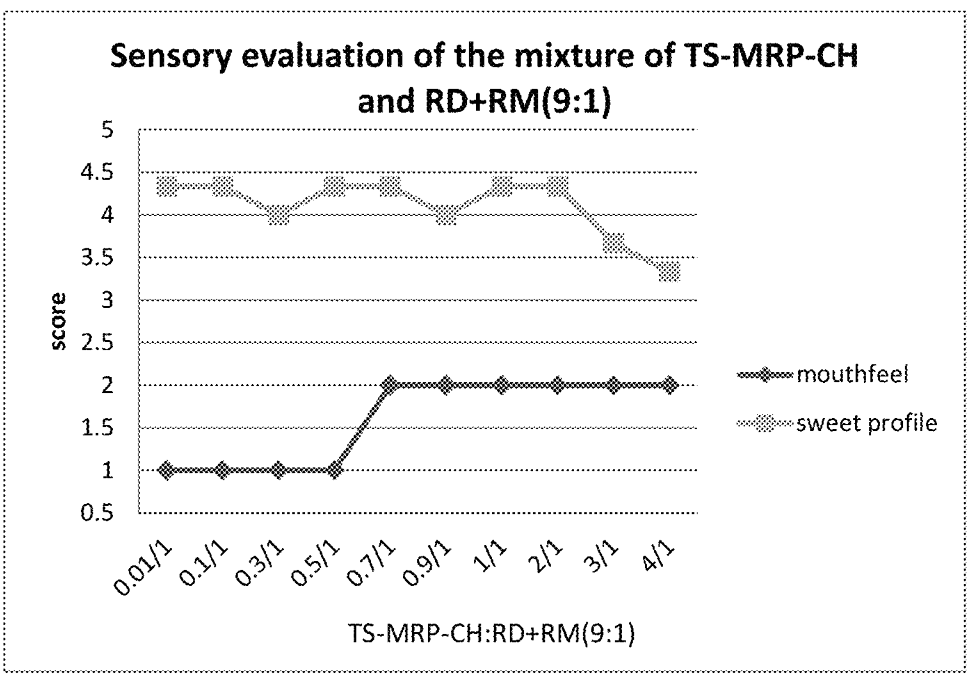
FIG. 98 shows the relationship between the sensory evaluation results to the ratio of TS-MRP-CH to RD+RM (9:1) of example 120.

The relationship between the sensory evaluation results to the ratio of TS-MRP-CH to RD+RM (9:1) in this example is as shown in FIG. 98.

Figure 99:
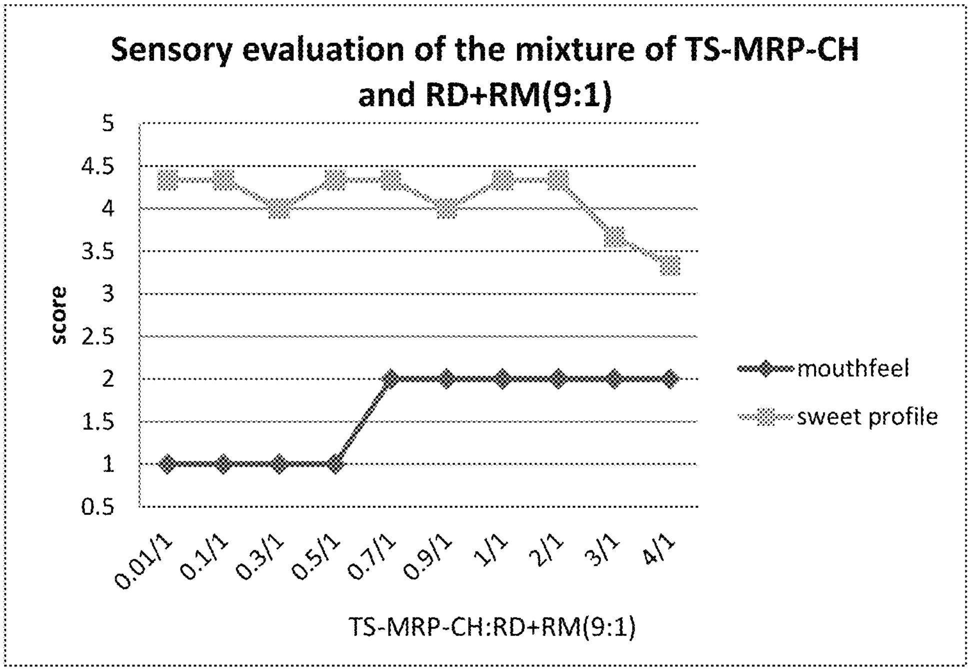
FIG. 99 shows the relationship between the overall likeability results to the ratio of TS-MRP-CH to RD±RM (9:1) of example 120.

The relationship between the overall likeability results to the ratio of TS-MRP-CH to RD+RM (9:1) in this example is as shown in FIG. 99.

Conclusion:

The results showed that TS-MRPs (MRPs, *Stevia* extract, thaumatin) can significantly improve taste profile, flavor intensity and mouth feel of high intensity natural sweeteners such as *Stevia* extract. For example, steviol glycosides comprise the composition of rebaudioside D and rebaudioside M (9:1). All ranges in tested ratios of TS-MRP-CH to RD+RM (9:1) from 0.01/1 to 4/1 had good taste (overall likeability score >2.5), preferably when the ratio ranges were from 0.7/1 to 2/1, the products gave very good taste (score >3). The conclusion can be extended to 1:99 and 99:1.

Example 121

The Improvement of MRP-CH to the Taste and Mouth Feel of RD+RM (5:5)

Common Process:

MRP-CH and RD+RM (5:5) were weighed and uniformly mixed according to the weight shown in Table 121.1, dissolved in 100 ml of pure water, and subjected to a mouth feel evaluation test. The tasting procedure is the same as Example 39.

TABLE 121.1

| the weight of MRP-CH and RD + RM (5:5) | | | |
|---|---|---|---|
| # | Ratio of MRP-CH to RD + RM(5:5) | Weight of MRP-CH (g) | weight of RD + RM (5:5) (g) |
| 121-01 | 0.01/1 | 0.0005 | 0.05 |
| 121-02 | 0.1/1 | 0.005 | 0.05 |
| 121-03 | 0.3/1 | 0.015 | 0.05 |
| 121-04 | 0.5/1 | 0.025 | 0.05 |
| 121-05 | 0.7/1 | 0.035 | 0.05 |
| 121-06 | 0.9/1 | 0.045 | 0.05 |
| 121-07 | 1/1 | 0.05 | 0.05 |
| 121-08 | 2/1 | 0.1 | 0.05 |

Experiments

Several mixtures of MRP-CH and RD+RM (5:5) were mixed in this example. Each sample was evaluated according to the aforementioned sensory evaluation method, and the average score of the panel was taken as the evaluation result. The taste profile of the mixture is as follows. It should be noted that according to the sensory evaluation method, the evaluation of the mouth feel and the sweet profile is based on the iso-sweetness. That is to say, in these evaluations, the concentration of RD+RM (5:5) in the sample solution was the same, 500 ppm. The results are shown in Table 121.2

TABLE 121.2

| the score in sensory evaluation | | | | | | | |
|---|---|---|---|---|---|---|---|
| | | sensory evaluation | | | | | |
| | | | sweet profile | | | | |
| # | flavor | mouth feel kokumi | sweet lingering | bitterness | metallic aftertaste | score of sweet profile | overall likeability |
| 121-01 | chocolate | 1 | 2 | 1 | 1 | 4.67 | 2.83 |
| 121-02 | | 1 | 2 | 1 | 1 | 4.67 | 2.83 |
| 121-03 | | 1 | 2 | 1 | 1 | 4.67 | 2.83 |
| 121-04 | | 2 | 1 | 1 | 1 | 5.00 | 3.50 |
| 121-05 | | 2 | 1 | 1 | 1 | 5.00 | 3.50 |
| 121-06 | | 2 | 1 | 2 | 1 | 4.67 | 3.33 |
| 121-07 | | 2 | 2 | 2 | 1 | 4.33 | 3.17 |
| 121-08 | | 3 | 1 | 3 | 1 | 4.33 | 3.67 |

Data Analysis

Figure 100:
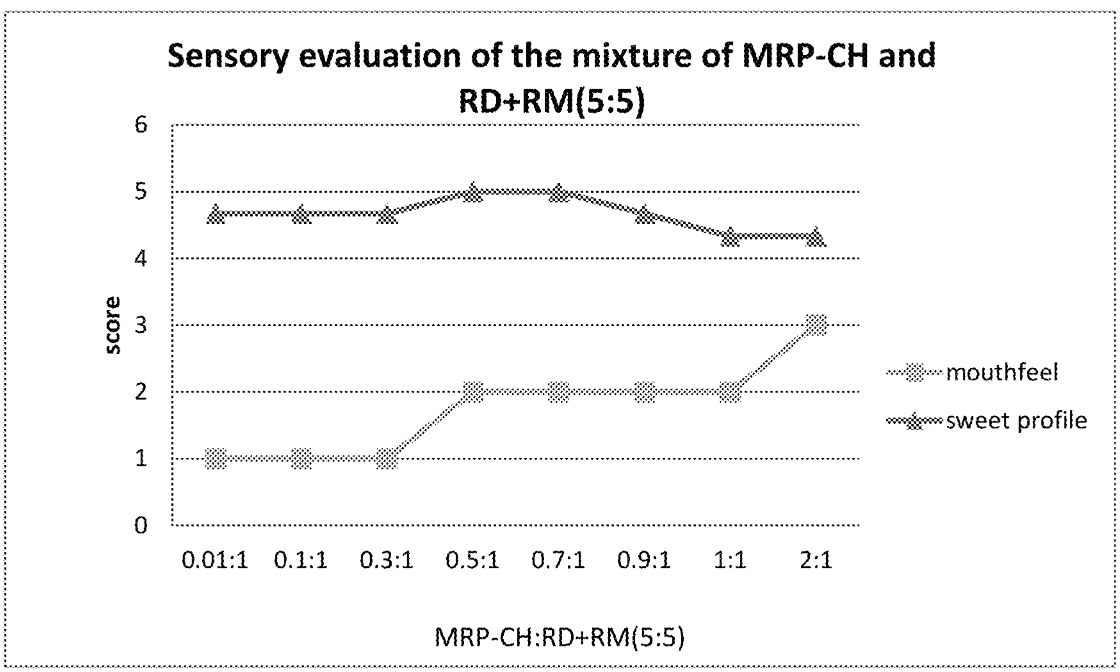
FIG. 100 shows the relationship between the sensory evaluation results to the ratio of MRP-CH to RD+RM (5:5) of example 121.

The relationship between the sensory evaluation results to the ratio of MRP-CH to RD+RM (5:5) in this example is as shown in FIG. 100.

Figure 101:
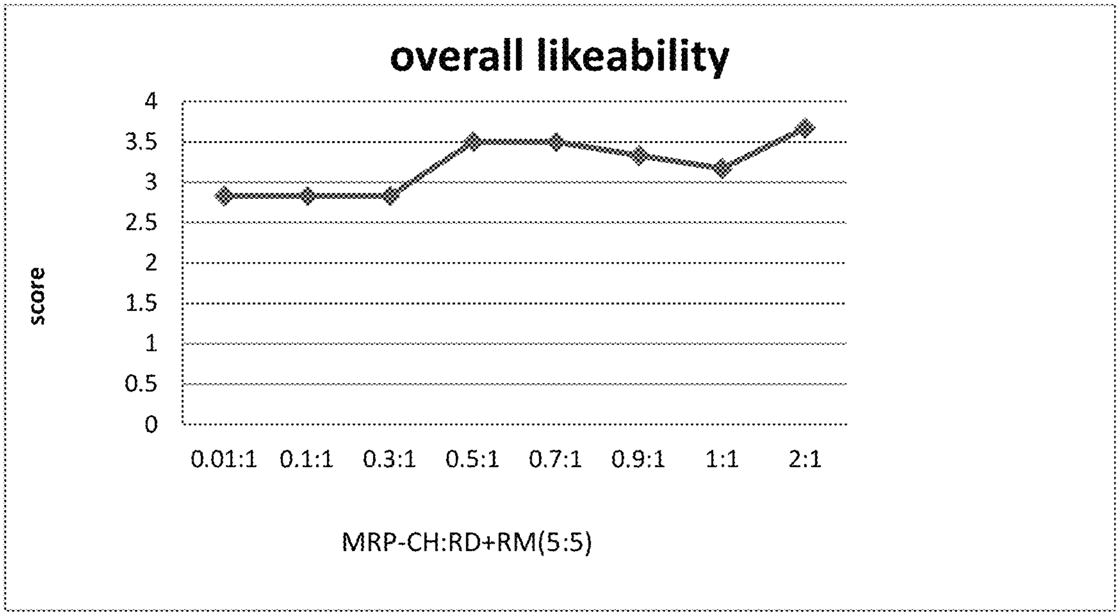
FIG. 101 shows the relationship between the overall likeability results to the ratio of MRP-CH to RD+RM (5:5) of example 121.

The relationship between the overall likeability results to the ratio of MRP-CH to RD+RM (5:5) in this example is as shown in FIG. 101.

Conclusion:

The results showed that standard MRPs can significantly improve taste profile, flavor intensity and mouth feel of high intensity natural sweeteners such as *Stevia* extract. For example, steviol glycosides comprise the composition of rebaudioside D and rebaudioside M (5:5). All ranges in tested ratios of MRP-CH to RD+RM(5:5) from 0.01/1 to 2/1 had good taste (overall likeability score >2.5), preferably when the ratio ranges were from 0.5/1 to 2/1, the products gave very good taste (score >3). The conclusion can be extended to 1:99 and 99:1.

Example 122

The Improvement of S-MRP-CH to the Taste and Mouth Feel of RD+RM (5:5)

Common Process:

S-MRP-CH and RD+RM (5:5) were weighed and uniformly mixed according to the weight shown in Table 122.1, dissolved in 100 ml of pure water, and subjected to a mouth feel evaluation test. The tasting procedure is the same as Example 39.

TABLE 122.1

| the weight of S-MRP-CH and RD + RM (5:5) | | | |
|---|---|---|---|
| # | Ratio of S-MRP-CH to RD + RM (5:5) | Weight of S-MRP-CH (g) | weight of RD + RM (5:5) (g) |
| 122-01 | 0.01/1 | 0.0005 | 0.05 |
| 122-02 | 0.1/1 | 0.005 | 0.05 |
| 122-03 | 0.3/1 | 0.015 | 0.05 |
| 122-04 | 0.5/1 | 0.025 | 0.05 |
| 122-05 | 0.7/1 | 0.035 | 0.05 |
| 122-06 | 0.9/1 | 0.045 | 0.05 |
| 122-07 | 1/1 | 0.05 | 0.05 |
| 122-08 | 2/1 | 0.1 | 0.05 |
| 122-09 | 3/1 | 0.15 | 0.05 |

Experiments

Several mixtures of S-MRP-CH and RD+RM (5:5) were mixed in this example. Each sample was evaluated according to the aforementioned sensory evaluation method, and the average score of the panel was taken as the evaluation result. The taste profile of the mixture is as follows. It should be noted that according to the sensory evaluation method, the evaluation of the mouth feel and the sweet profile is based on the iso-sweetness. That is to say, in these evaluations, the concentration of RD+RM (5:5) in the sample solution was the same, 500 ppm. The results are shown in Table 122.2.

TABLE 122.2

| the score in sensory evaluation | | | | | | | |
|---|---|---|---|---|---|---|---|
| | | sensory evaluation | | | | | |
| | | | sweet profile | | | | |
| # | flavor | mouth feel kokumi | sweet linger-ing | bitter-ness | metallic after-taste | score of sweet profile | overall like-ability |
| 122-01 | chocolate | 1 | 2 | 1 | 1 | 4.67 | 2.83 |
| 122-02 | | 1 | 2 | 1 | 1 | 4.67 | 2.83 |
| 122-03 | | 2 | 2 | 1 | 1 | 4.67 | 3.33 |
| 122-04 | | 2 | 2 | 2 | 1 | 4.33 | 3.17 |
| 122-05 | | 2 | 1 | 2 | 1 | 4.67 | 3.33 |
| 122-06 | | 3 | 1 | 2 | 1 | 4.67 | 3.83 |
| 122-07 | | 3 | 1 | 2 | 1 | 4.67 | 3.83 |

TABLE 122.2-continued

| the score in sensory evaluation | | | | | | | |
|---|---|---|---|---|---|---|---|
| | | sensory evaluation | | | | | |
| | | | sweet profile | | | | |
| # | flavor | mouth feel kokumi | sweet linger-ing | bitter-ness | metallic after-taste | score of sweet profile | overall like-ability |
| 122-08 | | 3 | 1 | 3 | 1 | 4.33 | 3.67 |
| 122-09 | | 3 | 1 | 4 | 1 | 4.00 | 3.50 |

Data Analysis

Figure 102:
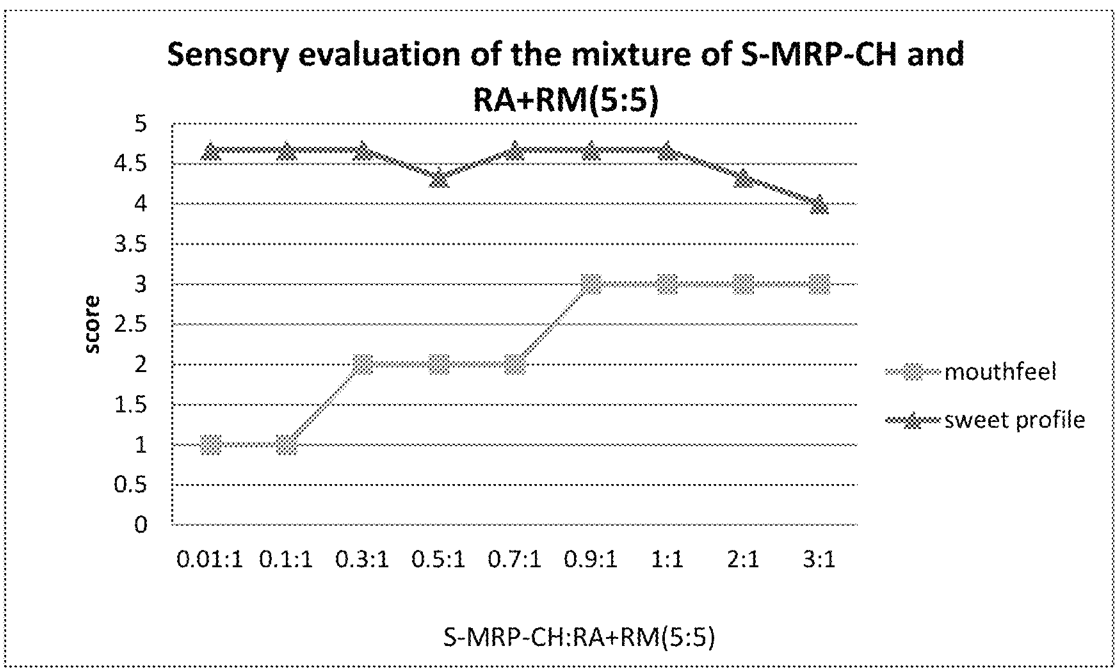
FIG. 102 shows the relationship between the sensory evaluation results to the ratio of S-MRP-CH to RD+RM (5:5) of example 122.

The relationship between the sensory evaluation results to the ratio of S-MRP-CH to RD+RM (5:5) in this example is as shown in FIG. 102.

Figure 103:
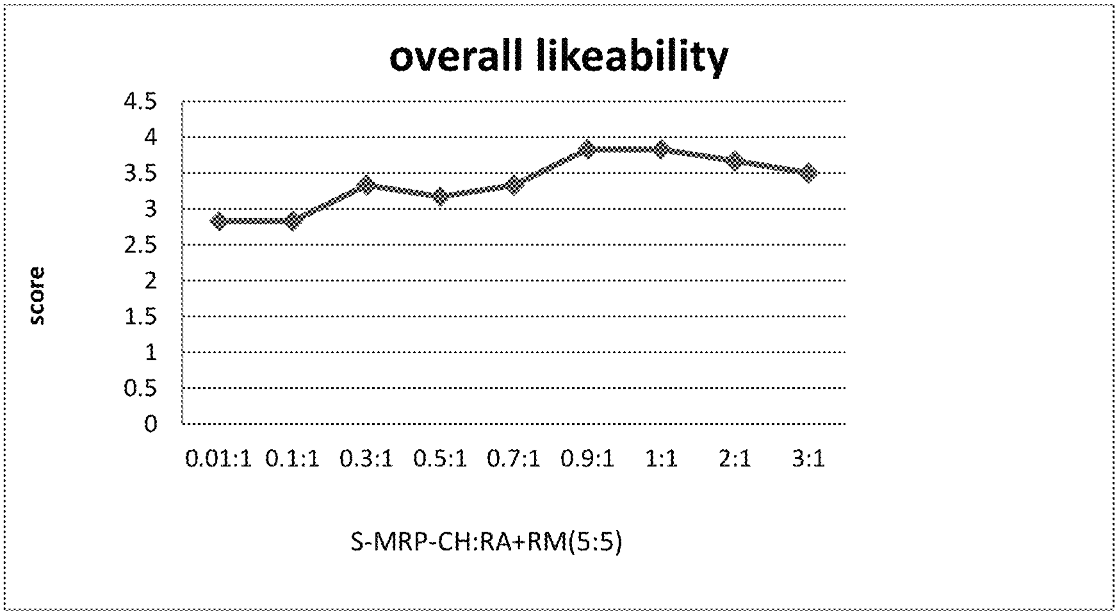
FIG. 103 shows the relationship between the overall likeability results to the ratio of S-MRP-CH to RD+RM (5:5) of example 122.

The relationship between the overall likeability results to the ratio of S-MRP-CH to RD+RM (5:5) in this example is as shown in FIG. 103.

Conclusion:

The results showed that S-MRPs (MRPs, *Stevia* extract) can significantly improve taste profile, flavor intensity and mouth feel of high intensity natural sweeteners such as *Stevia* extract. For example, steviol glycosides comprise the composition of rebaudioside D and rebaudioside M (5:5). All ranges in tested ratios of S-MRP-CH to RD+RM (5:5) from 0.01/1 to 3/1 had good taste (overall likeability score >2.5), preferably when the ratio ranges were from 0.3/1 to 3/1, the products gave very good taste (score >3). The conclusion can be extended to 1:99 and 99:1. This example can further demonstrate that S-MRPs can improve taste profile, flavor intensity and mouth feel of steviol glycosides.

Example 123

The Improvement of TS-MRP-CH to the Taste and Mouth Feel of RD+RM (5:5)

Common Process:

TS-MRP-CH and RD+RM (5:5) were weighed and uniformly mixed according to the weight shown in Table 123.1, dissolved in 100 ml of pure water, and subjected to a mouth feel evaluation test. The tasting procedure is the same as Example 39.

TABLE 123.1

| the weight of S-MRP-CH and RD + RM (5:5) | | | |
|---|---|---|---|
| # | Ratio of TS-MRP-CH to RD + RM (5:5) | Weight of TS-MRP-CH (g) | weight of RD + RM (5:5) (g) |
| 123-01 | 0.01/1 | 0.0005 | 0.05 |
| 123-02 | 0.1/1 | 0.005 | 0.05 |
| 123-03 | 0.3/1 | 0.015 | 0.05 |
| 123-04 | 0.5/1 | 0.025 | 0.05 |
| 123-05 | 0.7/1 | 0.035 | 0.05 |
| 123-06 | 0.9/1 | 0.045 | 0.05 |
| 123-07 | 1/1 | 0.05 | 0.05 |
| 123-08 | 2/1 | 0.1 | 0.05 |
| 123-09 | 3/1 | 0.15 | 0.05 |
| 123-10 | 4/1 | 0.2 | 0.05 |

Experiments

Several mixtures of TS-MRP-CH and RD+RM (5:5) were mixed in this example. Each sample was evaluated according to the aforementioned sensory evaluation method, and the average score of the panel was taken as the evaluation result. The taste profile of the mixture is as follows. It should be noted that according to the sensory evaluation method, the evaluation of the mouth feel and the sweet profile is based on the iso-sweetness. That is to say, in these evaluations, the concentration of RD+RM (5:5) in the sample solution was the same, 500 ppm. The results are shown in Table 123.2.

TABLE 123.2 the score in sensory evaluation

| | | sensory evaluation | | | | | |
|---|---|---|---|---|---|---|---|
| | | | sweet profile | | | | |
| # | flavor | mouth feel kokumi | sweet lingering | bitterness | metallic after-taste | score of sweet profile | overall likeability |
| 123-01 | chocolate | 1 | 2 | 1 | 1 | 4.67 | 2.83 |
| 123-02 | | 1 | 2 | 1 | 1 | 4.67 | 2.83 |
| 123-03 | | 1 | 2 | 1 | 1 | 4.67 | 2.83 |
| 123-04 | | 2 | 2 | 1 | 1 | 4.67 | 3.33 |
| 123-05 | | 2 | 3 | 1 | 2 | 4.00 | 3.00 |
| 123-06 | | 3 | 3 | 2 | 2 | 3.67 | 3.33 |
| 123-07 | | 3 | 3 | 2 | 2 | 3.67 | 3.33 |
| 123-08 | | 3 | 3 | 2 | 2 | 3.67 | 3.33 |
| 123-09 | | 3 | 3 | 3 | 2 | 3.33 | 3.17 |
| 123-10 | | 4 | 4 | 3 | 2 | 3.00 | 3.50 |

Data Analysis

Figure 104:
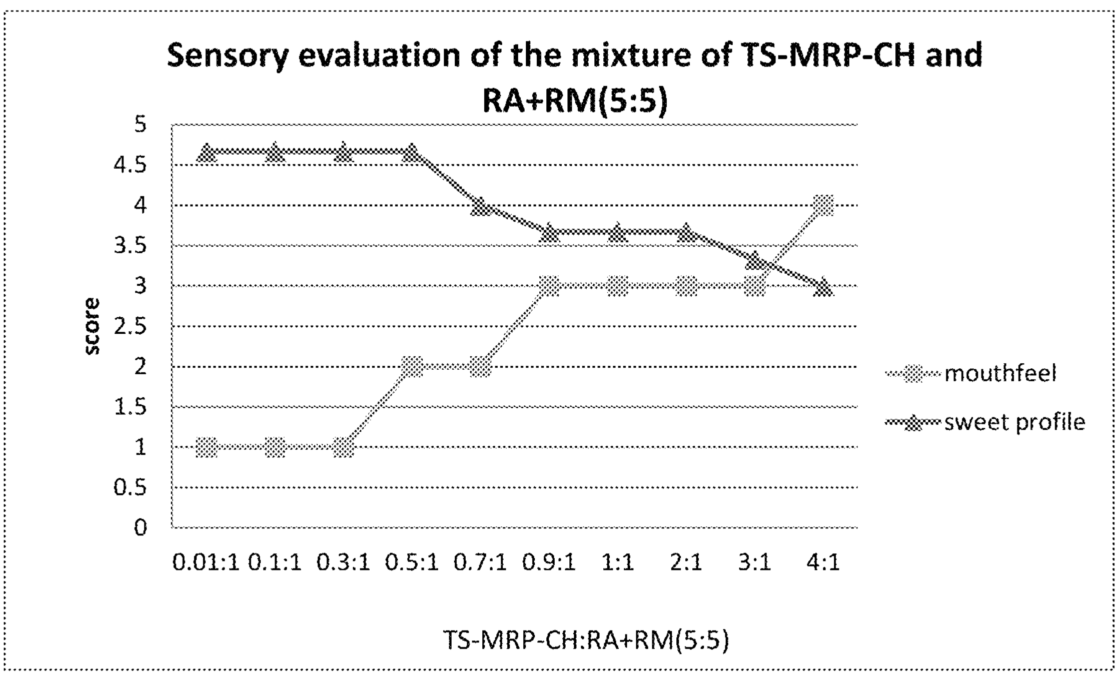
FIG. 104 shows the relationship between the sensory evaluation results to the ratio of TS-MRP-CH to RD+RM (5:5) of example 123.

The relationship between the sensory evaluation results to the ratio of TS-MRP-CH to RD+RM (5:5) in this example is as shown in FIG. 104.

Figure 105:
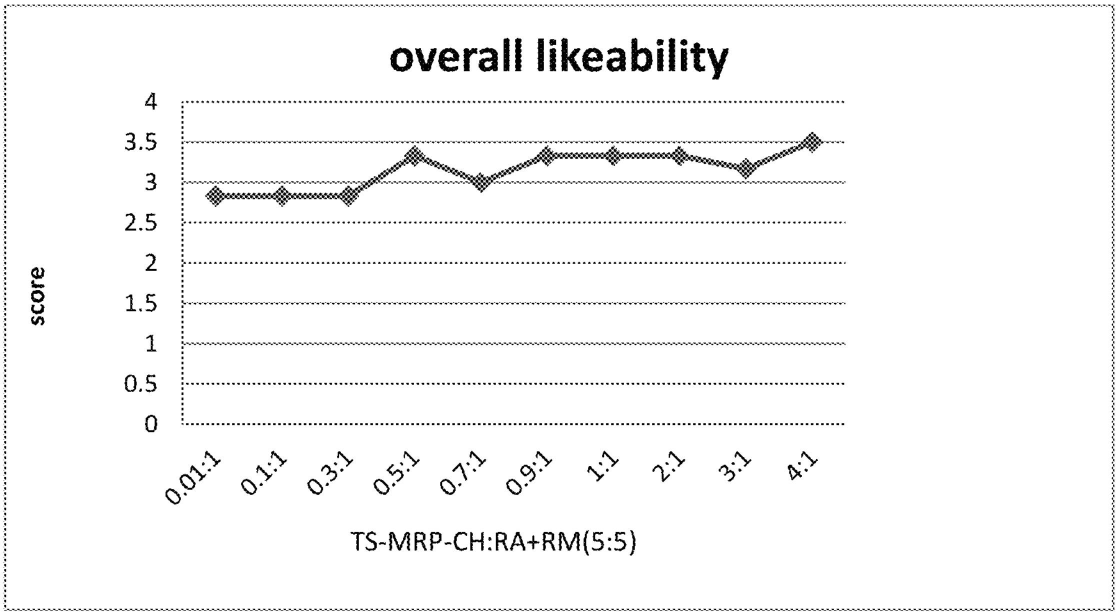
FIG. 105 shows the relationship between the overall likeability results to the ratio of TS-MRP-CH to RD+RM (5:5) of example 123.

The relationship between the overall likeability results to the ratio of TS-MRP-CH to RD+RM (5:5) in this example is as shown in FIG. 105.

Conclusion:

The results showed that TS-MRPs (MRPs, *Stevia* extract, thaumatin) can significantly improve taste profile, flavor intensity and mouth feel of high intensity natural sweetener such as *Stevia* extract. For example, steviol glycosides comprise the composition of rebaudioside D and rebaudioside M (5:5). All ranges in tested ratios of TS-MRP-CH to RD+RM (5:5) from 0.01/1 to 4/1 had good taste (overall likeability score >2.5), preferably when the ratio ranges were from 1/1 to 4/1, the products gave very good taste (score >3). The conclusion can be extended to 1:99 and 99:1. This example can further demonstrate that TS-MRPs can improve taste profile, flavor intensity and mouth feel of steviol glycosides.

Example 124

The Improvement of MRP-CH to the Taste and Mouth Feel of RD+RM (1:9)

Common Process:

MRP-CH, RD, and RM were weighed and uniformly mixed according to the weight shown in Table 124.1. The mixed powder was weighed in the amount shown in Table 124.1, dissolved in 100 ml of pure water, and subjected to a mouth feel evaluation test. The tasting procedure is the same as Example 39.

TABLE 124.1 the weight of MRP-CH, RD, and RM

| # | The ratio of RD to RM | The ratio of MRP-CH to RD + RM (1:9) | Weight of MRP-CH (g) | Weight of RD (g) | Weight of RM (g) | Weight of the mixed powder (mg) |
|---|---|---|---|---|---|---|
| 124-01 | 1/9 | 0.01/1 | 0.005 | 0.05 | 0.45 | 50.5 |
| 124-02 | | 0.1/1 | 0.05 | | | 55 |
| 124-03 | | 0.3/1 | 0.15 | | | 65 |
| 124-04 | | 0.5/1 | 0.25 | | | 75 |
| 124-05 | | 0.7/1 | 0.35 | | | 85 |
| 124-06 | | 0.9/1 | 0.45 | | | 95 |
| 124-07 | | 1/1 | 0.5 | | | 100 |
| 124-08 | | 2/1 | 1.0 | | | 150 |

Experiments

Several mixtures of MRP-CH and RD+RM (1:9) were mixed in this example. Each sample was evaluated according to the aforementioned sensory evaluation method, and the average score of the panel was taken as the evaluation result. The taste profile of the mixture is as follows. It should be noted that according to the sensory evaluation method, the evaluation of the mouth feel and the sweet profile is based on the iso-sweetness. That is to say, in these evaluations, the concentration of RD+RM (1:9) in the sample solution was the same, 500 ppm. The results are shown in Table 124.2.

TABLE 124.2 the score in sensory evaluation

| | | sensory evaluation | | | | | |
|---|---|---|---|---|---|---|---|
| | | | sweet profile | | | | |
| # | flavor | mouth feel kokumi | sweet lingering | bitterness | metallic after-taste | score of sweet profile | overall likeability |
| 124-01 | Chocolate | 1 | 3 | 1 | 1 | 4.33 | 2.67 |
| 124-02 | | 1 | 3 | 1 | 2 | 4.00 | 2.50 |
| 124-03 | | 1 | 3 | 1 | 2 | 4.00 | 2.50 |
| 124-04 | | 2 | 3 | 2 | 2 | 3.67 | 2.83 |
| 124-05 | | 2 | 2 | 2 | 1 | 4.33 | 3.17 |
| 124-06 | | 2 | 2 | 2 | 1 | 4.33 | 3.17 |
| 124-07 | | 2 | 2 | 2 | 1 | 4.33 | 3.17 |
| 124-08 | | 2 | 3 | 3 | 2 | 3.33 | 2.67 |

Data Analysis

Figure 106:
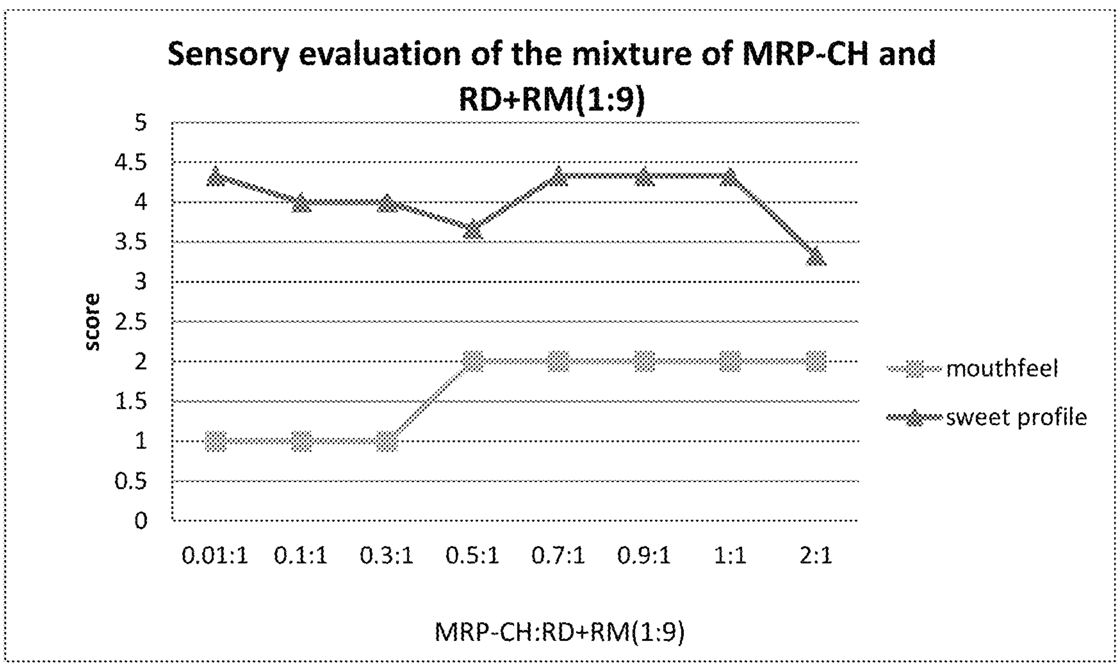
FIG. 106 shows the relationship between the sensory evaluation results to the ratio of MRP-CH to RD+RM (1:9) of example 124.

The relationship between the sensory evaluation results to the ratio of MRP-CH to RD+RM (1:9) in this example is as shown in FIG. 106.

Figure 107:
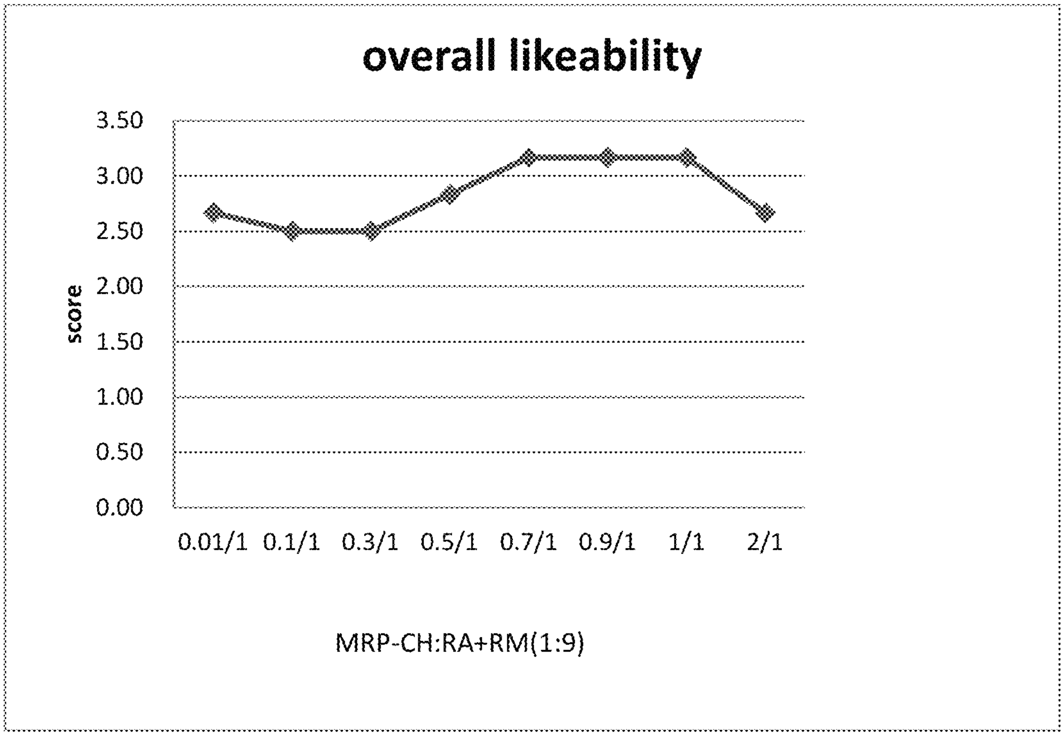
FIG. 107 shows the relationship between the overall likeability results to the ratio of MRP-CH to RD+RM (1:9) of example 124.

The relationship between the overall likeability results to the ratio of MRP-CH to RD+RM (1:9) in this example is as shown in FIG. 107.

Conclusion:

The results showed that standard MRPs can significantly improve taste profile, flavor intensity and mouth feel of high intensity natural sweeteners such as *Stevia* extract, for instance the *Stevia* extract comprises rebaudioside I) and or rehaudioside M. All ranges in tested ratios of MRP-CH to RD+RM (1:9) from 0.01/1 to 2/1 had good taste (overall likeability score >2.5), preferably when the ratio ranges were from 0.7/1 to 1/1, the products gave very good taste (score >3). The conclusion can be extended to 1:99 and 99:1.

Example 125

The Improvement of S-MRP-CH to the Taste and Mouth Feel of RD+RM (1:9)

Common Process:

S-MRP-CH, RD, and RM were weighed and uniformly mixed according to the weight shown in Table 125.1. The mixed powder was weighed in the amount shown in Table 125.1, dissolved in 100 ml of pure water, and subjected to a mouth feel evaluation test. The tasting procedure is the same as Example 39.

TABLE 125.1 the weight of S-MRP-CH, RD, and RM

| # | The ratio of RD to RM | The ratio of S-MRP-CH to RD + RM (1:9) | Weight of S-MRP-CH (g) | Weight of RD (g) | Weight of RM (g) | Weight of the mixed powder (mg) |
|---|---|---|---|---|---|---|
| 125-01 | 1/9 | 0.01/1 | 0.005 | 0.05 | 0.45 | 50.5 |
| 125-02 | | 0.1/1 | 0.05 | | | 55 |
| 125-03 | | 0.3/1 | 0.15 | | | 65 |
| 125-04 | | 0.5/1 | 0.25 | | | 75 |
| 125-05 | | 0.7/1 | 0.35 | | | 85 |
| 125-06 | | 0.9/1 | 0.45 | | | 95 |
| 125-07 | | 1/1 | 0.5 | | | 100 |
| 125-08 | | 2/1 | 1.0 | | | 150 |
| 125-09 | | 3/1 | 1.5 | | | 200 |

Experiments:

Several mixtures of S-MRP-CH and RD+RM (1:9) were mixed in this example. Each sample was evaluated according to the aforementioned sensory evaluation method, and the average score of the panel was taken as the evaluation result. The taste profile of the mixture is as follows. It should be noted that according to the sensory evaluation method, the evaluation of the mouth feel and the sweet profile is based on the iso-sweetness. That is to say, in these evaluations, the concentration of RD+RM (1:9) in the sample solution was the same, 500 ppm. The results are shown in Table 125.2.

TABLE 125.2 the score in sensory evaluation

| | | sensory evaluation | | | | | |
|---|---|---|---|---|---|---|---|
| | | | sweet profile | | | | |
| # | flavor | mouth feel kokumi | sweet lingering | bitterness | metallic aftertaste | score of sweet profile | overall likeability |
| 125-01 | chocolate | 1 | 2 | 1 | 1 | 4.67 | 2.83 |
| 125-02 | | 1 | 2 | 1 | 1 | 4.67 | 2.83 |
| 125-03 | | 1 | 3 | 1 | 2 | 4.00 | 2.50 |
| 125-04 | | 2 | 2 | 1 | 2 | 4.33 | 3.17 |
| 125-05 | | 2 | 2 | 2 | 2 | 4.00 | 3.00 |
| 125-06 | | 2 | 2 | 2 | 1 | 4.33 | 3.17 |
| 125-07 | | 2 | 2 | 2 | 1 | 4.33 | 3.17 |
| 125-08 | | 2 | 3 | 2 | 2 | 3.67 | 2.83 |
| 125-09 | | 2 | 4 | 2 | 2 | 3.33 | 2.67 |

Data Analysis

Figure 108:
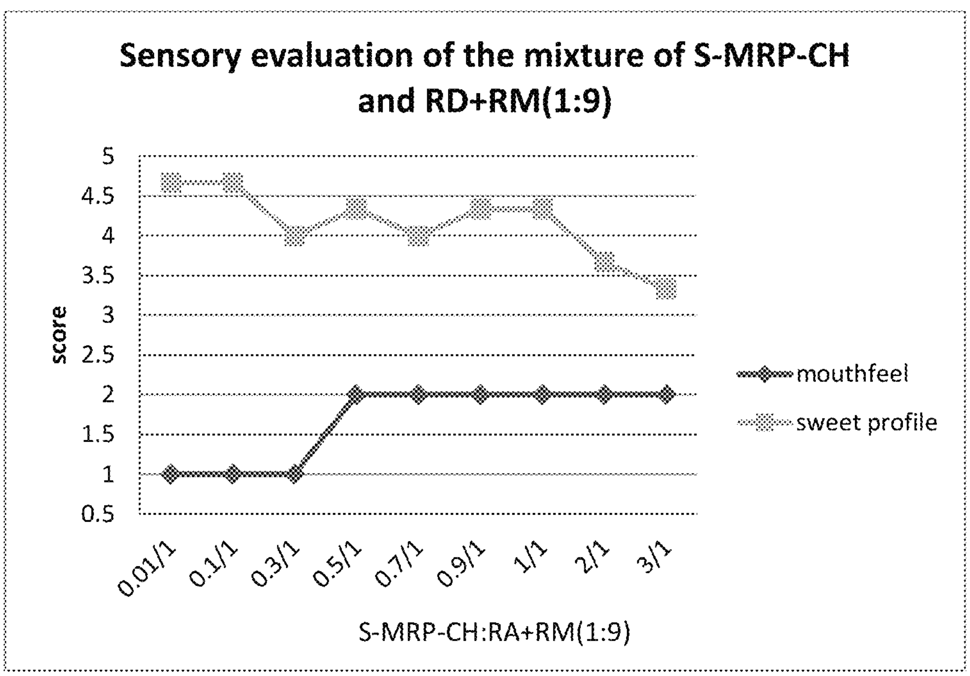
FIG. 108 shows the relationship between the sensory evaluation results to the ratio of S-MRP-CH to RD+RM (1:9) of example 125.

The relationship between the sensory evaluation results to the ratio of S-MRP-CH to RD+RM (1:9) in this example is as shown in FIG. 108.

Figure 109:
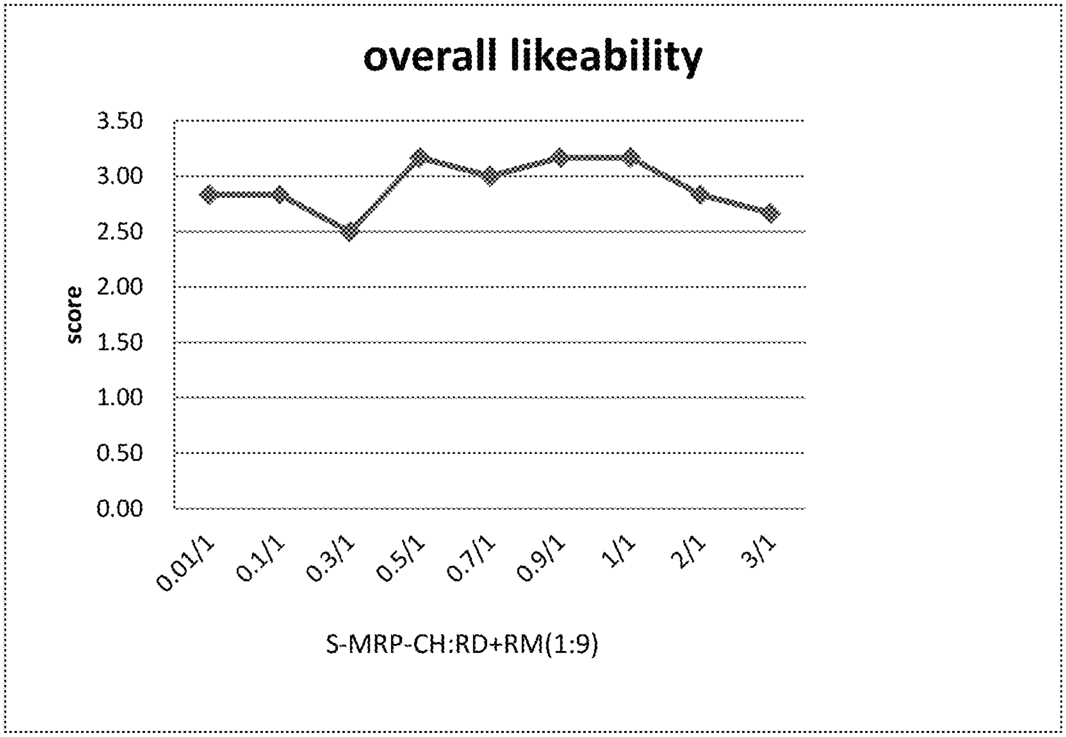
FIG. 109 shows the relationship between the overall likeability results to the ratio of S-MRP-CH to RD+RM (1:9) of example 125.

The relationship between the overall likeability results to the ratio of S-MRP-CH to RD+RM (1:9) in this example is as shown in FIG. 109.

Conclusion:

The results showed that S-MRPs (MRPs, *Stevia* extract) can significantly improve taste profile, flavor intensity and mouth feel of high intensity natural sweeteners such as *Stevia* extract, for instance the *Stevia* extract comprises rebaudioside D and or rebaudioside M. All ranges in tested ratios of S-MRP-CH to RD+RM (1:9) from 0.01/1 to 3/1 had good taste (overall likeability score >2.5), preferably when the ratio ranges were from 0.5/1 to 1/1, the products gave very good taste (score >3). The conclusion can be extended to 1:99 and 99:1.

Example 126

The Improvement of TS-MRP-CH to the Taste and Mouth Feel of RD+RM (1:9)

Common Process:

TS-MRP-CH, RD, and RM were weighed and uniformly mixed according to the weight shown in Table 126.1. The mixed powder was weighed in the amount shown in Table 126.1, dissolved in 100 ml of pure water, and subjected to a mouth feel evaluation test. The tasting procedure is the same as Example 39.

TABLE 126.1 the weight of TS-MRP-CH, RD, and RM

| # | The ratio of RD to RM | The ratio of TS-MRP-CH to RD + RM (1:9) | Weight of TS-MRP-CH (g) | Weight of RD (g) | Weight of RM (g) | Weight of the mixed powder (mg) |
|---|---|---|---|---|---|---|
| 126-01 | 1/9 | 0.01/1 | 0.005 | 0.05 | 0.45 | 50.5 |
| 126-02 | | 0.1/1 | 0.05 | | | 55 |
| 126-03 | | 0.3/1 | 0.15 | | | 65 |
| 126-04 | | 0.5/1 | 0.25 | | | 75 |
| 126-05 | | 0.7/1 | 0.35 | | | 85 |
| 126-06 | | 0.9/1 | 0.45 | | | 95 |
| 126-07 | | 1/1 | 0.5 | | | 100 |
| 126-08 | | 2/1 | 1.0 | | | 150 |
| 126-09 | | 3/1 | 1.5 | | | 200 |
| 126-10 | | 4/1 | 2.0 | | | 250 |

Experiments

Several mixtures of TS-MRP-CH and RD+RM (1:9) were mixed in this example. Each sample was evaluated according to the aforementioned sensory evaluation method, and the average score of the panel was taken as the evaluation result. The taste profile of the mixture is as follows. It should be noted that according to the sensory evaluation method, the evaluation of the mouth feel and the sweet profile is based on the iso-sweetness. That is to say, in these evaluations, the concentration of RD+RM (1:9) in the sample solution was the same, 500 ppm. The results are shown in Table 126.2.

TABLE 126.2

| the score in sensory evaluation | | | | | | | |
|---|---|---|---|---|---|---|---|
| | | sensory evaluation | | | | | |
| | | | sweet profile | | | | |
| # | flavor | mouth feel kokumi | sweet linger-ing | bitter-ness | metallic after-taste | score of sweet profile | overall like-ability |
| 126-01 | Chocolate | 1 | 3 | 1 | 1 | 4.33 | 2.67 |
| 126-02 | | 1 | 3 | 1 | 1 | 4.33 | 2.67 |
| 126-03 | | 1 | 3 | 1 | 2 | 4.00 | 2.50 |
| 126-04 | | 1 | 3 | 1 | 2 | 4.00 | 2.50 |
| 126-05 | | 1 | 3 | 2 | 2 | 3.67 | 2.33 |
| 126-06 | | 2 | 3 | 2 | 2 | 3.67 | 2.83 |
| 126-07 | | 2 | 2 | 2 | 2 | 4.00 | 3.00 |
| 126-08 | | 2 | 3 | 2 | 3 | 3.33 | 2.67 |
| 126-09 | | 2 | 3 | 2 | 3 | 3.33 | 2.67 |
| 126-10 | | 2 | 3 | 2 | 3 | 3.33 | 2.67 |

Data Analysis

Figure 110:
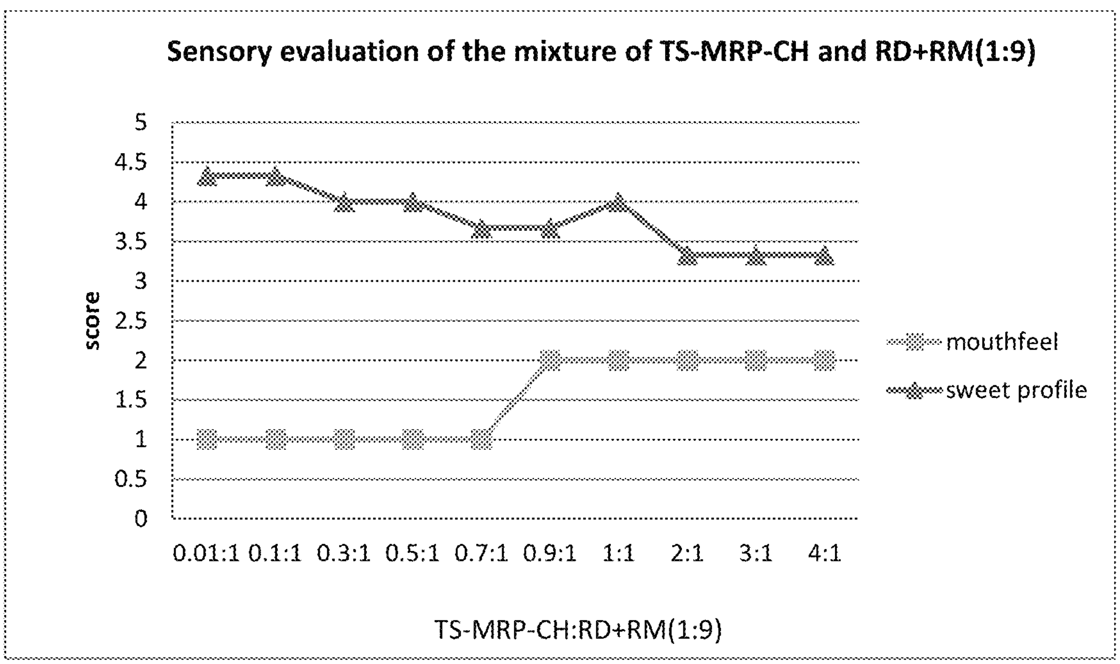
FIG. 110 shows the relationship between the sensory evaluation results to the ratio of TS-MRP-CH to RD+RM (1:9) of example 126.

The relationship between the sensory evaluation results to the ratio of TS-MRP-CH to RD+RM (1:9) in this example is as shown in FIG. 110.

Figure 111:
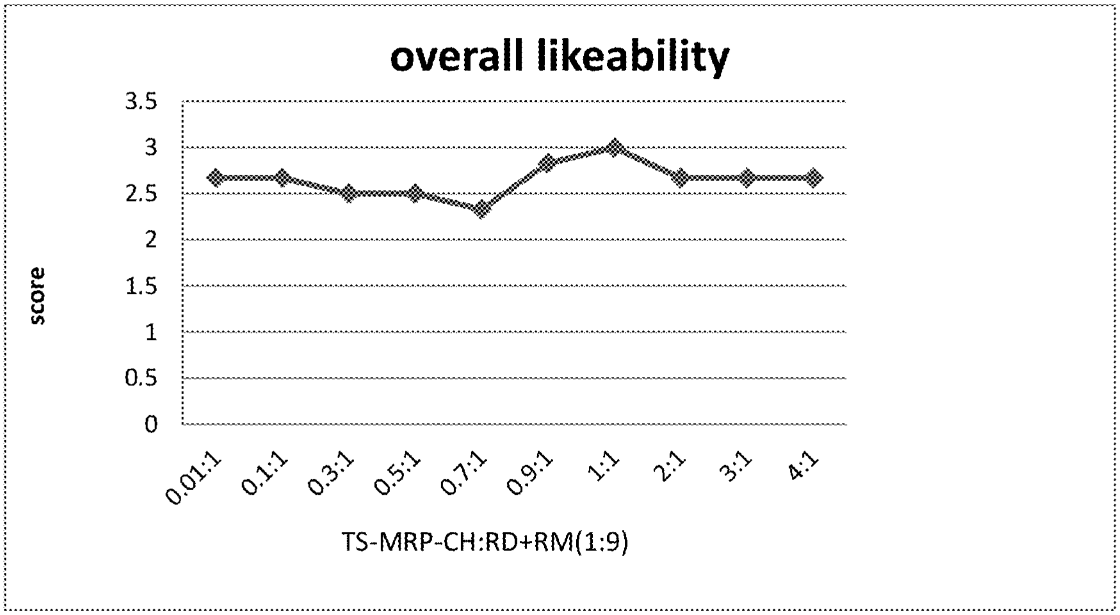
FIG. 111 shows the relationship between the overall likeability results to the ratio of TS-MRP-CH to RD+RM (1:9) of example 126.

The relationship between the overall likeability results to the ratio of TS-MRP-CH to RD+RM (1:9) in this example is as shown in FIG. 111.

Conclusion:

The results showed that TS-MRPs (MRPs, *Stevia* extract, thaumatin) can significantly improve taste profile, flavor intensity and mouth feel of high intensity natural sweeteners such as *Stevia* extract. For instance, the *Stevia* extract comprises Reb D and or Reb M. All ranges in tested ratios of TS-MRP-CH to RD+RM (1:9) from 0.01/1 to 4/1 had good taste (overall likeability score >2.5), preferably when the ratio is 1/1, the products gave very good taste (score >3). The conclusion can be extended to 1:99 and 99:1.

Examples 127-129

The Improvement of MRP, S-MRP and TS-MRP to the Taste and Mouth Feel of Sweet Tea Extract The sources of the sweet tea extract and MRP samples used in the following Examples are as follows.

TABLE 127-129

| Sample | source | Lot # | specification |
|---|---|---|---|
| Sweet tea extract, RU, rubusoside | EPC Natural Products Co., Ltd, China | 140-32-02 | RU 97.22% |
| MRP-CA | The product of Example 97 | | |
| S-MRP-CA | The product of Example 68 | | |
| thaumatin | The product of EPC Natural Products Co., Ltd, China | 20180801 | thaumatin 10.74% |
| TS-MRP-CA | the mixture of above S-MRP-CA and thaumatin with the weight ratio of 10:1 | | |

Example 127

The Improvement of MRP-CA to the Taste and Mouth Feel of RU

Common Process:

MRP-CA and RU were weighed and uniformly mixed according to the weight shown in Table 127.1. The mixed powder was weighed in the amount shown in Table 127.1, dissolved in 100 ml of pure water, and subjected to a mouth feel evaluation test. The tasting procedure is the same as Example 39.

TABLE 127.1

| the weight of MRP-CA and RU | | | | |
|---|---|---|---|---|
| # | Ratio of MRP-CA to RU | Weight of MRP-CA (g) | Weight of RU (g) | Weight of the mixed powder (mg) |
| 127-01 | 0.01/1 | 0.005 | 0.5 | 50.5 |
| 127-02 | 0.1/1 | 0.05 | | 55 |
| 127-03 | 0.3/1 | 0.15 | | 65 |
| 127-04 | 0.5/1 | 0.25 | | 75 |
| 127-05 | 0.7/1 | 0.35 | | 85 |
| 127-06 | 0.9/1 | 0.45 | | 95 |
| 127-07 | 1/1 | 0.5 | | 100 |

Experiments

Several mixtures of MRP-CA and RU were mixed in this example. Each sample was evaluated according to the aforementioned sensory evaluation method, and the average score of the panel was taken as the evaluation result. The taste profile of the mixture is as follows. It should be noted that according to the sensory evaluation method, the evaluation of the mouth feel and the sweet profile is based on the iso-sweetness. That is to say, in these evaluations, the concentration of RU in the sample solution was the same, 500 ppm. The results are shown in Table 127.2.

TABLE 127.2

| the score in sensory evaluation | | | | | | | |
|---|---|---|---|---|---|---|---|
| | | sensory evaluation | | | | | |
| | | | sweet profile | | | | |
| # | flavor | mouth feel kokumi | sweet linger-ing | bitter-ness | metallic after-taste | score of sweet profile | overall like-ability |
| 127-01 | Caramel | 1 | 3 | 2 | 2 | 3.67 | 2.33 |
| 127-02 | | 1 | 3 | 2 | 2 | 3.67 | 2.33 |
| 127-03 | | 1 | 2 | 2 | 1 | 4.33 | 2.67 |
| 127-04 | | 2 | 2 | 1 | 1 | 4.67 | 3.33 |

TABLE 127.2-continued

| the score in sensory evaluation | | | | | | | |
|---|---|---|---|---|---|---|---|
| | | sensory evaluation | | | | | |
| | | | sweet profile | | | | |
| # | flavor | mouth feel kokumi | sweet lingering | bitterness | metallic aftertaste | score of sweet profile | overall likeability |
| 127-05 | | 2 | 2 | 1 | 1 | 4.67 | 3.33 |
| 127-06 | | 2 | 2 | 1 | 1 | 4.67 | 3.33 |
| 127-07 | | 2 | 2 | 1 | 1 | 4.67 | 3.33 |

Data Analysis

Figure 112:
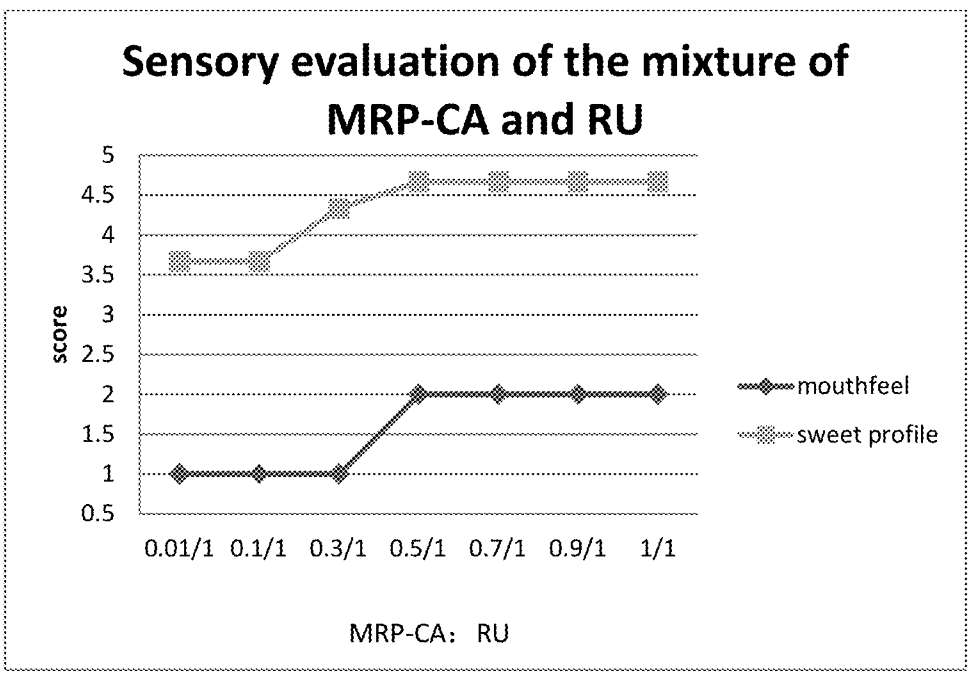
FIG. 112 shows the relationship between the sensory evaluation results to the ratio of MRP-CA to RU of example 127.

The relationship between the sensory evaluation results to the ratio of MRP-CA to RU in this example is as shown in FIG. 112.

Figure 113:
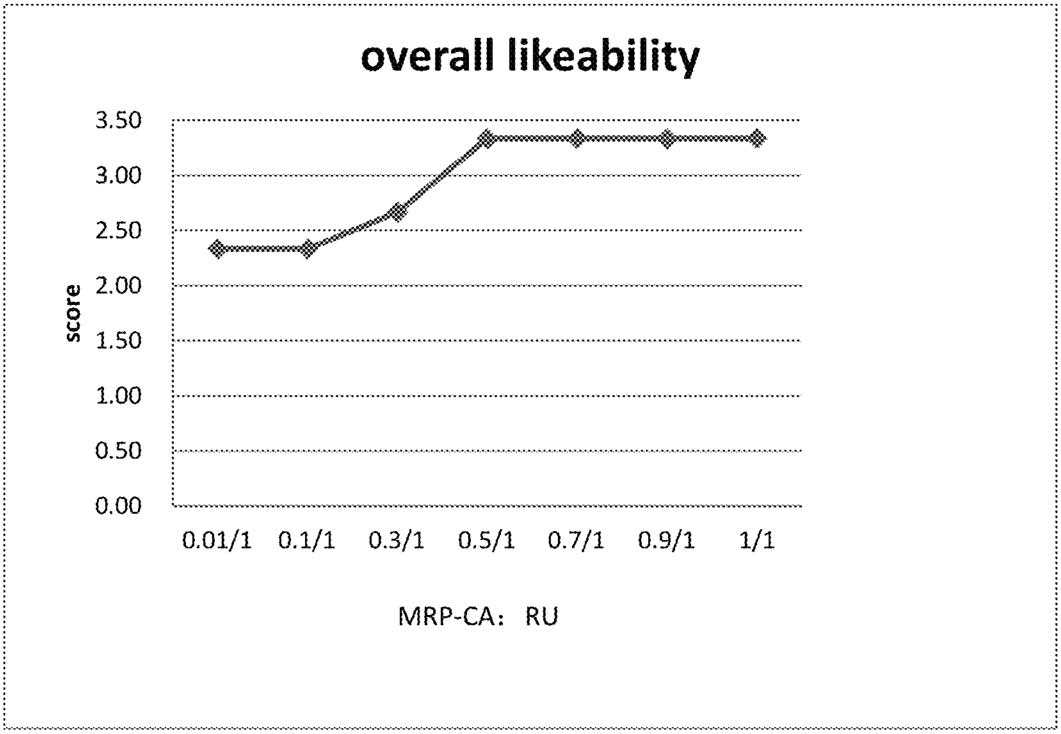
FIG. 113 shows the relationship between the overall likeability results to the ratio of MRP-CA to RU of example 127.

The relationship between the overall likeability results to the ratio of MRP-CA to RU in this example is as shown in FIG. 113.

Conclusion:

The results showed that standard MRPs can significantly improve taste profile, flavor intensity and mouth feel of high intensity natural sweeteners such as sweet tea extract which comprises rubusoside. All ranges in tested ratios of MRP-CA to RU from 0.3/1 to 1/1 had good taste (overall likeability score >2.5), preferably when the ratio ranges were from 0.5/1 to 1/1, the products gave very good taste (score >3). The conclusion can be extended to 1:99 and 99:1.

Example 128

The Improvement of S-MRP-CA to the Taste and Mouth Feel of RU

Common Process:

S-MRP-CA, and RU were weighed and uniformly mixed according to the weight shown in Table 128.1, The mixed powder was weighed in the amount shown in Table 128.1, dissolved in 100 ml of pure water, and subjected to a mouth feel evaluation test. The tasting procedure is the same as Example 39.

TABLE 128.1

| the weight of S-MRP-CA, and RU | | | | |
|---|---|---|---|---|
| # | Ratio of S-MRP-CA to RU | Weight of S-MRP-CA (g) | Weight of RU (g) | Weight of the mixed powder (mg) |
| 128-01 | 0.01/1 | 0.005 | 0.5 | 50.5 |
| 128-02 | 0.1/1 | 0.05 | | 55 |
| 128-03 | 0.3/1 | 0.15 | | 65 |
| 128-04 | 0.5/1 | 0.25 | | 75 |
| 128-05 | 0.7/1 | 0.35 | | 85 |
| 128-06 | 0.9/1 | 0.45 | | 95 |
| 128-07 | 1/1 | 0.5 | | 100 |
| 128-08 | 2/1 | 1.0 | | 150 |

Experiments

Several mixtures of S-MRP-CA and RU were mixed in this example. Each sample was evaluated according to the aforementioned sensory evaluation method, and the average score of the panel was taken as the evaluation result. The taste profile of the mixture is as follows. It should be noted that according to the sensory evaluation method, the evaluation of the mouth feel and the sweet profile is based on the iso-sweetness. That is to say, in these evaluations, the concentration of RU in the sample solution was the same, 500 ppm. The results are shown in Table 128.2.

TABLE 128.2

| the score in sensory evaluation | | | | | | | |
|---|---|---|---|---|---|---|---|
| | | sensory evaluation | | | | | |
| | | | sweet profile | | | | |
| # | flavor | mouth feel kokumi | sweet lingering | bitterness | metallic aftertaste | score of sweet profile | overall likeability |
| 128-01 | Caramel | 1 | 3 | 2 | 2 | 3.67 | 2.33 |
| 128-02 | | 1 | 3 | 2 | 2 | 3.67 | 2.33 |
| 128-03 | | 1 | 3 | 2 | 2 | 3.67 | 2.33 |
| 128-04 | | 2 | 3 | 1 | 2 | 4.00 | 3.00 |
| 128-05 | | 2 | 2 | 1 | 1 | 4.67 | 3.33 |
| 128-06 | | 2 | 2 | 1 | 1 | 4.67 | 3.33 |
| 128-07 | | 2 | 3 | 2 | 2 | 3.67 | 2.83 |
| 128-08 | | 2 | 4 | 2 | 2 | 3.33 | 2.67 |

Data Analysis

Figure 114:
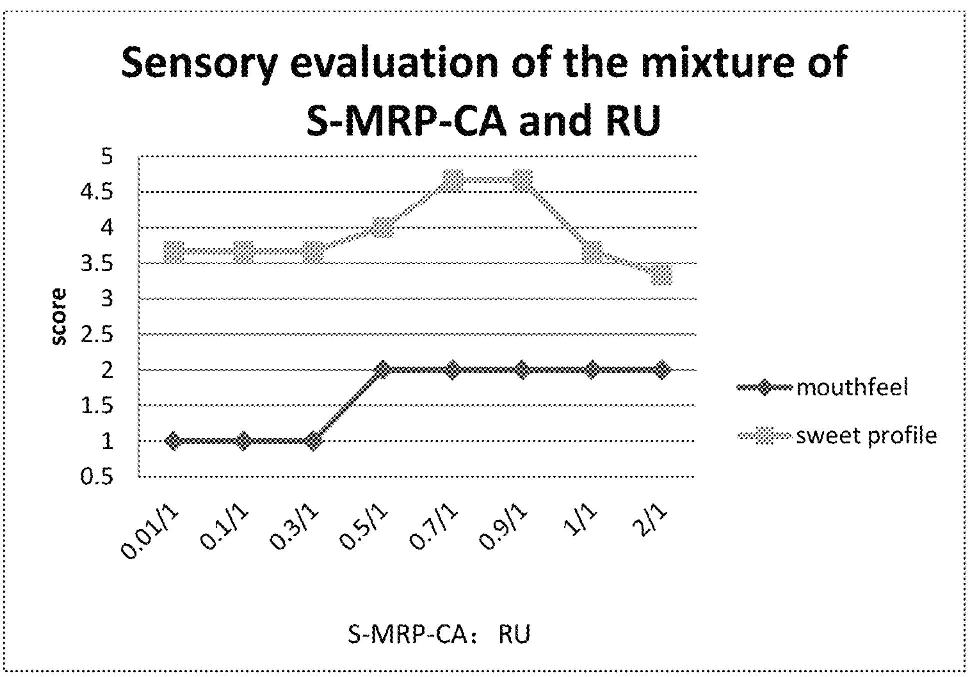
FIG. 114 shows the relationship between the sensory evaluation results to the ratio of S-MRP-CA to RU of example 128.

The relationship between the sensory evaluation results to the ratio of S-MRP-CA to RU in this example is as shown in FIG. 114.

Figure 115:
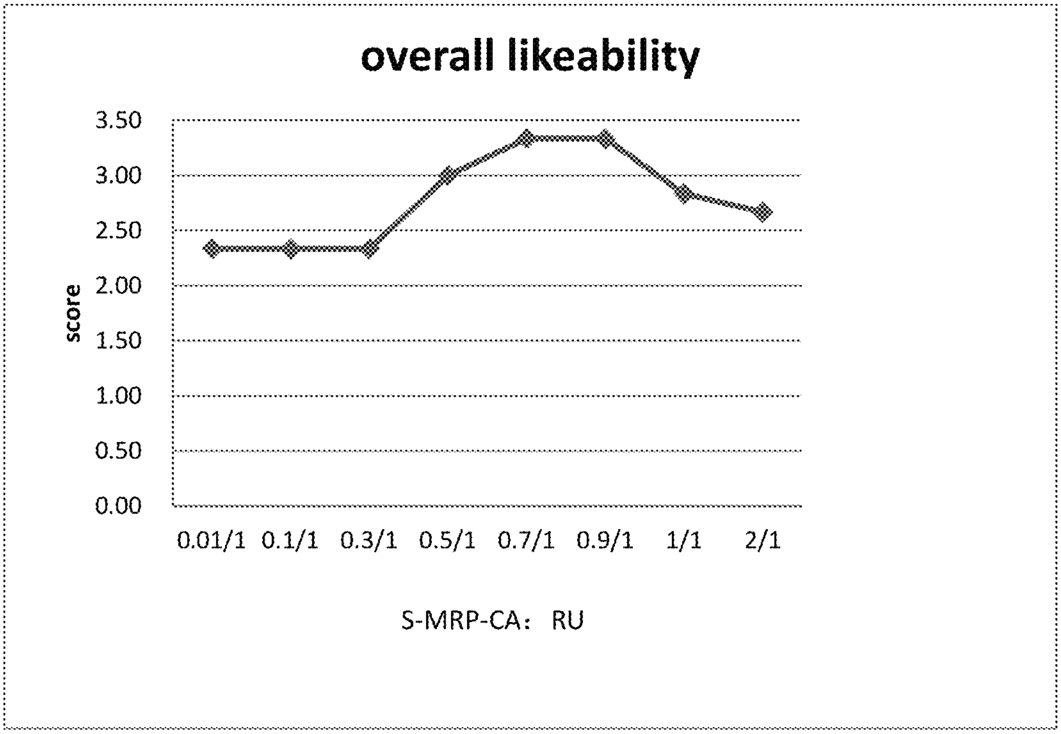
FIG. 115 shows the relationship between likeability results to the ratio of S-MRP-CA to RU of example 128.

The relationship between the overall likeability results to the ratio of S-MRP-CA to RU in this example is as shown in FIG. 115.

Conclusion:

The results showed that S-MRPs (MRPs, *Stevia* extract) can significantly improve taste profile, flavor intensity and mouth feel of high intensity natural sweeteners such as sweet tea extract which comprises rubusoside. All ranges in tested ratios of S-MRP-CA to RU from 0.5/1 to 2/1 had good taste (overall likeability score >2.5), preferably when the ratio ranges were from 0.5/1 to 0.9/1, the products gave very good taste (score >3), The conclusion can be extended to 1:99 and 99:1.

Example 129

The Improvement of TS-MRP-CA to the Taste and Mouth Feel of RU

Common Process:

TS-MRP-CA, and RU were weighed and uniformly mixed according to the weight shown in Table 129.1. The mixed powder was weighed in the amount shown in Table 129.1, dissolved in 100 ml of pure water, and subjected to a mouth feel evaluation test. The tasting procedure is the same as Example 39.

TABLE 129.1

| the weight of TS-MRP-CA and RU | | | | |
|---|---|---|---|---|
| # | Ratio of TS-MRP-CA to RU | Weight of TS-MRP-CA (g) | Weight of RU (g) | Weight of the mixed powder (mg) |
| 129-01 | 0.01/1 | 0.005 | 0.5 | 50.5 |
| 129-02 | 0.1/1 | 0.05 | | 55 |
| 129-03 | 0.3/1 | 0.15 | | 65 |
| 129-04 | 0.5/1 | 0.25 | | 75 |
| 129-05 | 0.7/1 | 0.35 | | 85 |
| 129-06 | 0.9/1 | 0.45 | | 95 |

TABLE 129.1-continued the weight of TS-MRP-CA and RU

| # | Ratio of TS-MRP-CA to RU | Weight of TS-MRP-CA (g) | Weight of RU (g) | Weight of the mixed powder (mg) |
|---|---|---|---|---|
| 129-07 | 1/1 | 0.5 | | 100 |
| 129-08 | 2/1 | 1.0 | | 150 |

Experiments

Several mixtures of TS-MRP-CA and RU were mixed in this example. Each sample was evaluated according to the aforementioned sensory evaluation method, and the average score of the panel was taken as the evaluation result. The taste profile of the mixture is as follows. it should be noted that according to the sensory evaluation method, the evaluation of the mouth feel and the sweet profile is based on the iso-sweetness. That is to say, in these evaluations, the concentration of RU in the sample solution was the same, 500 ppm. The results are shown in Table 129.2.

TABLE 129.2 the score in sensory evaluation

| # | flavor | sensory evaluation: mouth feel kokumi | sweet profile: sweet lingering | sweet profile: bitterness | sweet profile: metallic aftertaste | score of sweet profile | overall likeability |
|---|---|---|---|---|---|---|---|
| 129-01 | Caramel | 1 | 2 | 1 | 1 | 4.67 | 2.83 |
| 129-02 | | 1 | 2 | 1 | 1 | 4.67 | 2.83 |
| 129-03 | | 1 | 2 | 2 | 1 | 4.33 | 2.67 |
| 129-04 | | 1 | 2 | 2 | 1 | 4.33 | 2.67 |
| 129-05 | | 2 | 2 | 2 | 2 | 4.00 | 3.00 |
| 129-06 | | 2 | 1 | 2 | 2 | 4.33 | 3.17 |
| 129-07 | | 2 | 1 | 2 | 1 | 4.67 | 3.33 |
| 129-08 | | 2 | 1 | 3 | 1 | 4.33 | 3.17 |

Data Analysis

Figure 116:
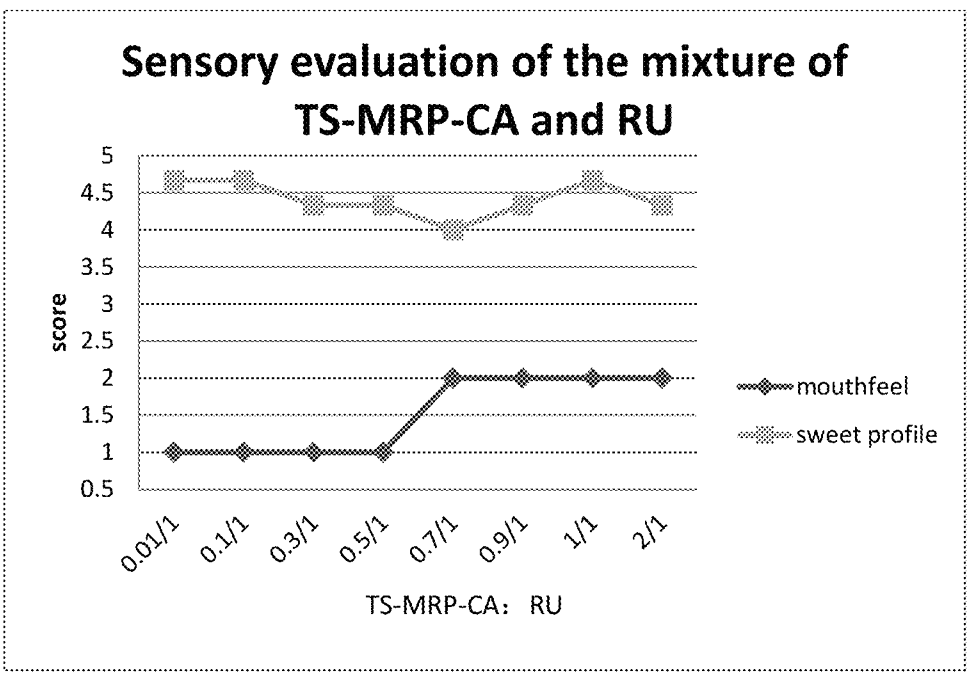
FIG. 116 shows the relationship between the sensory evaluation results to the ratio of TS-MRP-CA to RU of example 129.

The relationship between the sensory evaluation results to the ratio of TS-MRP-CA to RU in this example is as shown in FIG. 116.

Figure 117:
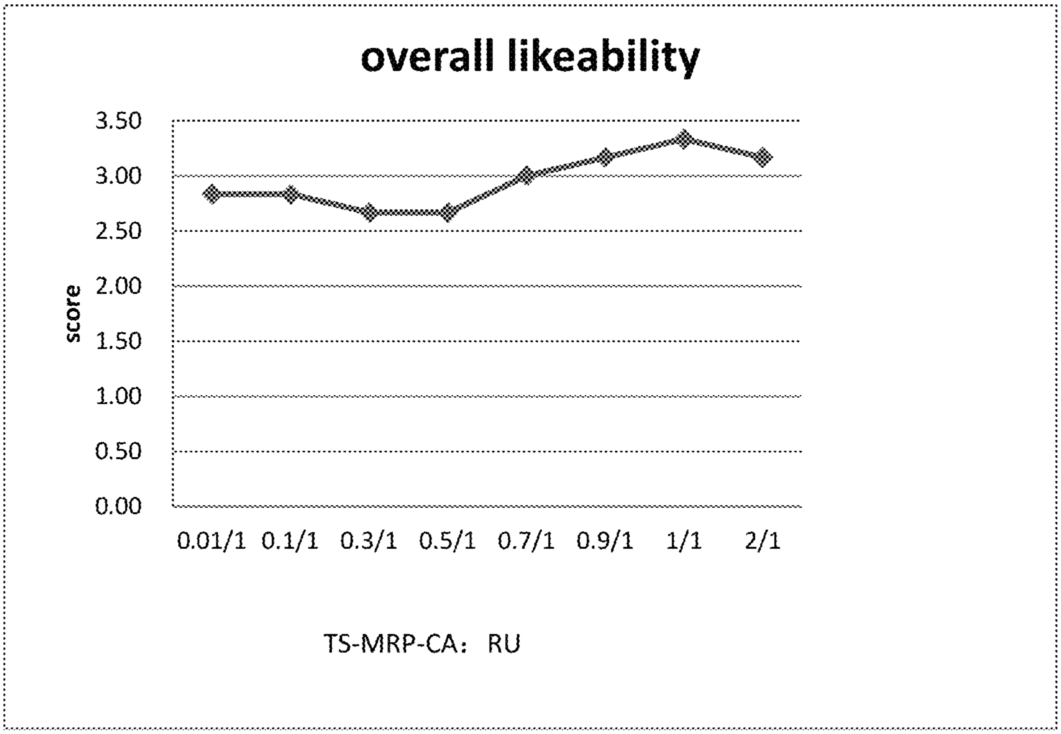
FIG. 117 shows the relationship between the overall likeability results to the ratio of TS-MRP-CA to RU of example 129.

The relationship between the overall likeability results to the ratio of TS-MRP-CA to RU in this example is as shown in FIG. 117.

Conclusion:

The results showed that TS-MRPs (MIRPs, *Stevia* extract, thaumatin) can significantly improve taste profile, flavor intensity and mouth feel of high intensity natural sweeteners such as sweet tea extract which comprises rubusoside. All ranges in tested ratios of TS-MRP-CA to RU from 0.01/1 to 2/1 has good taste (overall likeability score >2.5), preferably when the ratio ranges were from 0.7/1 to 2/1, the products gave very good taste (score >3). The conclusion can be extended to 1:99 and 99:1.

Examples 130-132

The Improvement of MRP, S-MRP and TS-MRP to the Taste and Mouth Feel of Monk Fruit Extract The sources of the monk fruit extract and MRP samples used in the following Examples are as follows.

TABLE 130-132

| sample | source | Lot # | specification |
|---|---|---|---|
| Monk fruit extract, mogroside V20 | Hunan Huacheng Biotech, Inc., China | LHGE-180408 | Mogroside V 20.07% |
| Monk fruit extract, mogroside V50 | Hunan Huacheng Biotech, Inc., China | LHGE-180722 | Mogroside V 50.65% |
| MRP-FL | The product of Example 96 | | |
| MRP-CA | The product of The product of Example 97 | | |
| S-MRP-FL | Example 67 | | |
| S-MRP-CA | The product of Example 68 | | |
| thaumatin | The product of EPC Natural Products Co., Ltd, China | 20180801 | thaumatin 10.74% |
| TS-MRP-FL | the mixture of above S-MRP-FL and thaumatin with the weight ratio of 10:1 | | |
| TS-MRP-CA | the mixture of above S-MRP-CA and thaumatin with the weight ratio of 10:1 | | |

Example 130

The Improvement of MRP-FL to the Taste and Mouth Feel of Mogroside V20

Common Process:

MRP-EL and mogroside V20 were weighed and uniformly mixed according to the weight shown in Table 130.1, dissolved in 100 ml of pure water, and subjected to a mouth feel evaluation test. The tasting procedure is the same as Example 39.

TABLE 130.1 the weight of MRP-FL and mogroside V20

| # | Mogroside V20/MRP-FL | Weight of mogroside V20 (g) | Weight of MRP-FL (g) |
|---|---|---|---|
| 130-01 | 1/0.01 | 0.05 | 0.0005 |
| 130-02 | 1/0.1 | | 0.005 |
| 130-03 | 1/0.3 | | 0.015 |
| 130-04 | 1/0.5 | | 0.025 |
| 130-05 | 1/0.7 | | 0.035 |

Experiments

Several mixtures of MRP-FL and mogroside V20 were mixed in this example. Each sample was evaluated according to the aforementioned sensory evaluation method, and the average score of the panel was taken as the evaluation result data. The taste profile of the mixture is as follows. It should be noted that according to the sensory evaluation method, the evaluation of the mouth feel and the sweet profile is based on the iso-sweetness. That is to say, in these evaluations, the concentration of mogroside V20 in the sample solution was the same, 500 ppm. The results are shown in Table 130.2.

TABLE 130.2

| the score in sensory evaluation | | | | | | | |
|---|---|---|---|---|---|---|---|
| | sensory evaluation | | | | | | |
| | | sweet profile | | | | | |
| # | mouth feel kokumi | sweet lingering | bitterness | metallic aftertaste | score of sweet profile | overall like-ability |
| 130-01 | 1 | 3 | 1 | 1 | 4.33 | 2.67 |
| 130-02 | 1 | 3 | 1 | 1 | 4.33 | 2.67 |
| 130-03 | 3 | 3 | 1 | 1 | 4.33 | 3.67 |
| 130-04 | 3 | 2 | 1 | 1 | 4.66 | 3.83 |
| 130-05 | 4 | 2 | 1 | 1 | 4.66 | 4.33 |

Data Analysis

Figure 118:
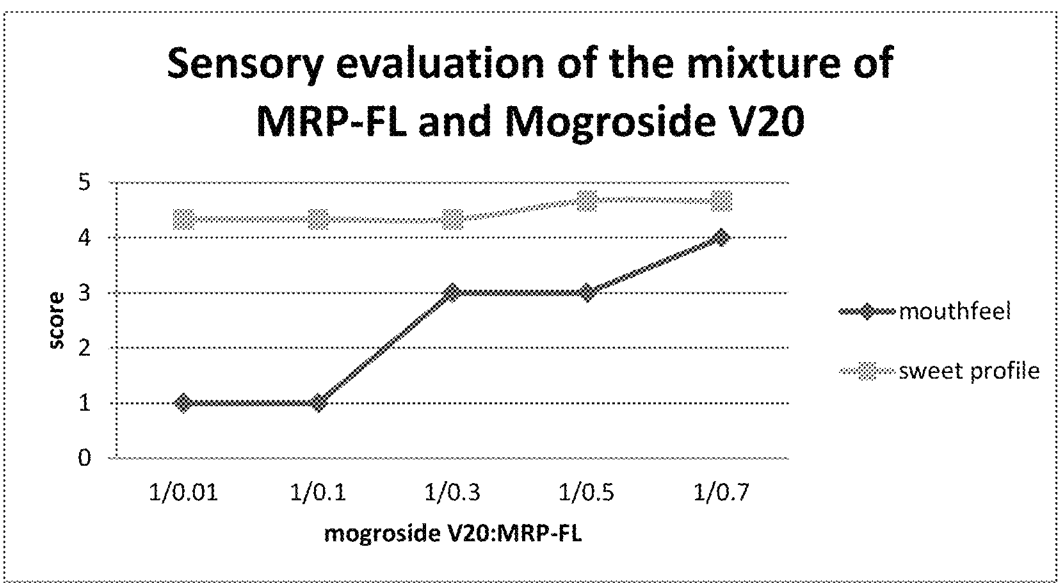
FIG. 118 shows the relationship between the sensory evaluation results to the ratio of mogroside V20 to MRP-FL of example 130.

The relationship between the sensory evaluation results to the ratio of mogroside V20 to MRP-FL in this example is as shown in FIG. 118.

Figure 119:
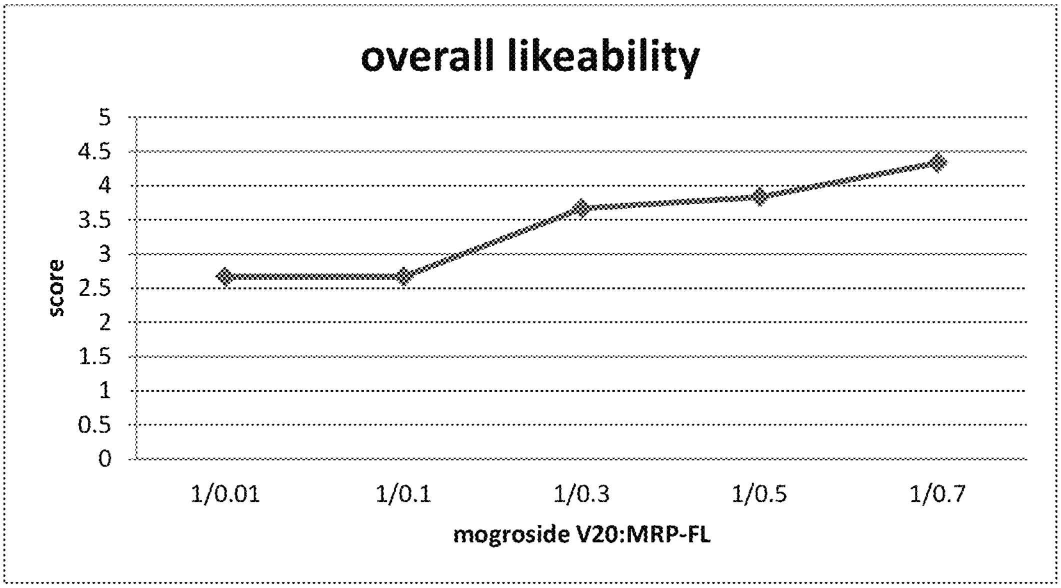
FIG. 119 shows the relationship between the overall likeability results to the ratio of mogroside V20 to MRP-FL of example 130.

The relationship between the overall likeability results to the ratio of mogroside V20 to MRP-FL in this example is as shown in FIG. 119.

Conclusion:

The results showed that standard MRPs can significantly improve taste profile, flavor intensity and mouth feel of high intensity natural sweeteners such as monk fruit concentrate or extract. All ranges in tested ratios of mogroside V20 to MRP-FL from 1/0.01 to 1/0.7 had good taste (overall likeability score >2.5), preferably when the ratio ranges were from 1/0.3 to 1/0.7, the products gave very good taste (score >3). The conclusion can be extended to 1:99 and 99:1.

Example 131

The Improvement of S-MRP-FL to the taste and mouth feel of Mogroside V20

Common Process:

S-MRP-FL and mogroside V20 were weighed and uniformly mixed according to the weight shown in Table 131.1, dissolved in 100 ml of pure water, and subjected to a mouth feel evaluation test. The tasting procedure is the same as Example 37.

TABLE 131.1

| the weight of S-MRP-FL and mogroside V20 | | | |
|---|---|---|---|
| # | Mogroside V20/S-MRP-FL | Weight of mogroside V20 (g) | Weight of S-MRP-FL (g) |
| 131-01 | 1/0.01 | 0.05 | 0.0005 |
| 131-02 | 1/0.1 | | 0.005 |
| 131-03 | 1/0.3 | | 0.015 |
| 131-04 | 1/0.5 | | 0.025 |
| 131-05 | 1/0.7 | | 0.035 |
| 131-06 | 1/0.9 | | 0.045 |
| 131-07 | 1/1 | | 0.05 |
| 131-08 | 1/1.5 | | 0.075 |

Experiments

Several mixtures of S-MRP-FL and mogroside V20 were mixed in this example. Each sample was evaluated according to the aforementioned sensory evaluation method, and the average score of the panel was taken as the evaluation result. The taste profile of the mixture is as follows. It should be noted that according to the sensory evaluation method, the evaluation of the mouth feel and the sweet profile is based on the iso-sweetness. That is to say, in these evaluations, the concentration of mogroside V20 in the sample solution was the same, 500 ppm. The results are shown in Table 131.2.

TABLE 131.2

| the score in sensory evaluation | | | | | | |
|---|---|---|---|---|---|---|
| | sensory evaluation | | | | | |
| | | sweet profile | | | | |
| # | mouth feel kokumi | sweet lingering | bitterness | metallic aftertaste | score of sweet profile | overall like-ability |
| 131-01 | 1 | 3 | 1 | 1 | 4.33 | 2.67 |
| 131-02 | 2 | 3 | 1 | 1 | 4.33 | 3.17 |
| 131-03 | 2.5 | 3 | 1 | 1 | 4.33 | 3.42 |
| 131-04 | 3 | 2 | 1 | 1 | 4.66 | 3.83 |
| 131-05 | 3 | 2 | 1 | 1 | 4.66 | 3.83 |
| 131-06 | 3 | 2 | 1 | 1 | 4.66 | 3.83 |
| 131-07 | 3 | 2 | 1 | 1 | 4.66 | 3.83 |
| 131-08 | 4 | 2 | 1 | 1 | 4.66 | 4.33 |

Data Analysis

Figure 120:
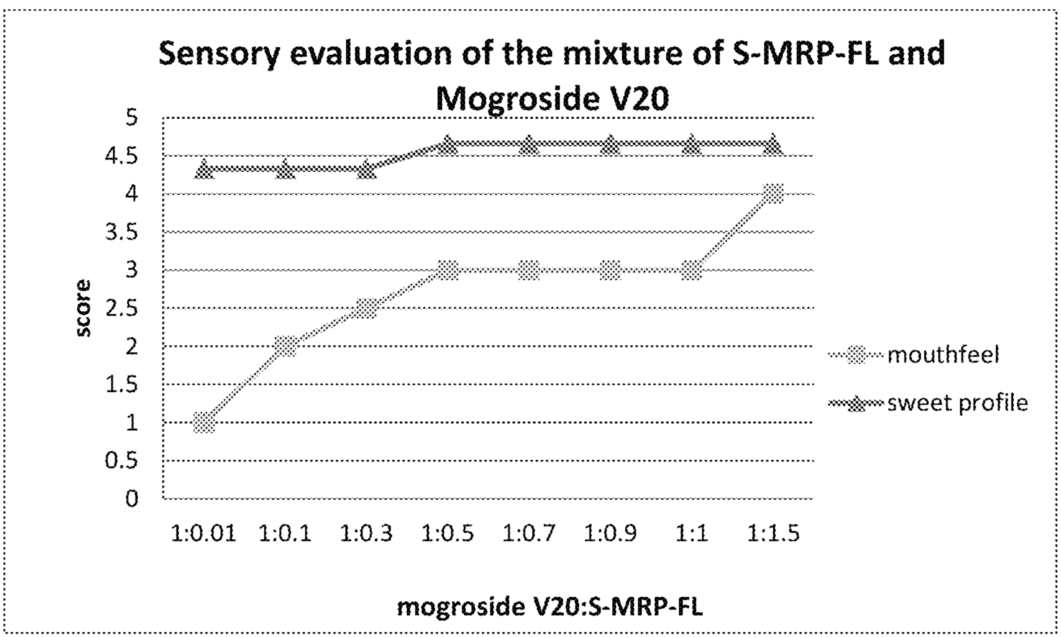
FIG. 120 shows the relationship between the sensory evaluation results to the ratio of mogroside V20 to S-MRP-FL of example 131.

The relationship between the sensory evaluation results to the ratio of mogroside V20 to S-MRP-FL in this example is as shown in FIG. 120.

Figure 121:
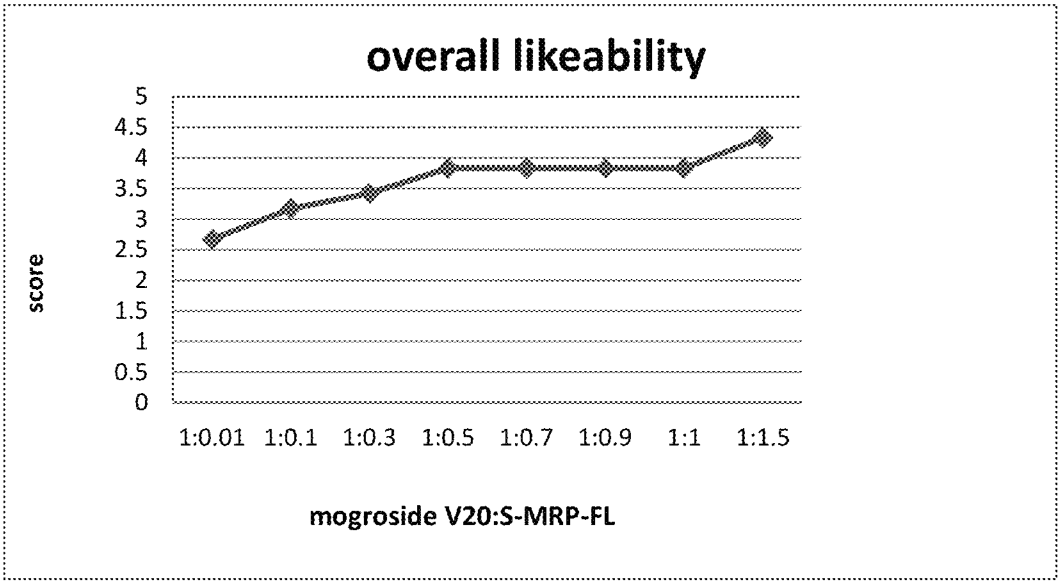
FIG. 121 shows the relationship between the overall likeability results to the ratio of mogroside V20 to S-MRP-FL of example 131.

The relationship between the overall likeability results to the ratio of mogroside V20 to S-MRP-FL in this example is as shown in FIG. 121.

Conclusion:

The results showed that S-MRPs (MRPs, *Stevia* Extract) can significantly improve taste profile, flavor intensity and mouth feel of high intensity natural sweeteners such as monk fruit concentrate or extract. All ranges in tested ratios of mogroside V20 to S-MRP-FL from 1/0.01 to 1/1.5 had good taste (overall likeability score >2.5), preferably when the ratio ranges were from 1/0.1 to 1/1.5, the products gave very good taste (score >3). The conclusion can be extended to 1:99 and 99:1.

Example 132

The Improvement of TS-MRP-FL to the Taste and Mouth Feel of Mogroside V20

Common Process:

TS-MRP-FL and mogroside V20 were weighed and uniformly mixed according to the weight shown in Table 132.1, dissolved in 100 ml of pure water, and subjected to a mouth feel evaluation test. The tasting procedure is the same as Example 39.

TABLE 132.1

| the weight of TS-MRP-FL and mogroside V20 | | | |
|---|---|---|---|
| # | Mogroside V20/TS-MRP-FL | Weight of mogroside V20 (g) | Weight of TS-MRP-FL (g) |
| 132-01 | 1/0.01 | 0.05 | 0.0005 |
| 132-02 | 1/0.1 | | 0.005 |

TABLE 132.1-continued

| the weight of TS-MRP-FL and mogroside V20 | | | |
|---|---|---|---|
| # | Mogroside V20/TS-MRP-FL | Weight of mogroside V20 (g) | Weight of TS-MRP-FL (g) |
| 132-03 | 1/0.3 | | 0.015 |
| 132-04 | 1/0.5 | | 0.025 |
| 132-05 | 1/0.7 | | 0.035 |
| 132-06 | 1/0.9 | | 0.045 |
| 132-07 | 1/1 | | 0.05 |
| 132-08 | 1/1.5 | | 0.075 |
| 132-09 | 1/2 | | 0.1 |

Experiments

Several mixtures of TS-MRP-FL and mogroside V20 were mixed in this example. Each sample was evaluated according to the aforementioned sensory evaluation method, and the average score of the panel was taken as the evaluation result. The taste profile of the mixture is as follows. It should be noted that according to the sensory evaluation method, the evaluation of the mouth feel and the sweet profile is based on the iso-sweetness. That is to say, in these evaluations, the concentration of mogroside V20 in the sample solution was the same, 500 ppm. The results are shown in Table 132.2.

TABLE 132.2

| the score in sensory evaluation | | | | | | |
|---|---|---|---|---|---|---|
| | sensory evaluation | | | | | |
| | | sweet profile | | | | |
| # | mouth feel kokumi | sweet lingering | bitterness | metallic aftertaste | score of sweet profile | overall like-ability |
| 132-01 | 1 | 3 | 1 | 1 | 4.33 | 2.67 |
| 132-02 | 1 | 3 | 1 | 1 | 4.33 | 2.67 |
| 132-03 | 2.5 | 2 | 1 | 1 | 4.66 | 3.58 |
| 132-04 | 3 | 2 | 1 | 1 | 4.66 | 3.83 |
| 132-05 | 3 | 2 | 1 | 1 | 4.66 | 3.83 |
| 132-06 | 3 | 1 | 1 | 1 | 5 | 4 |
| 132-07 | 4 | 1 | 1 | 1 | 5 | 4.5 |
| 132-08 | 4 | 1 | 1 | 1 | 5 | 4.5 |
| 132-09 | 4 | 1 | 1 | 1 | 5 | 4.5 |

Data Analysis

Figure 122:
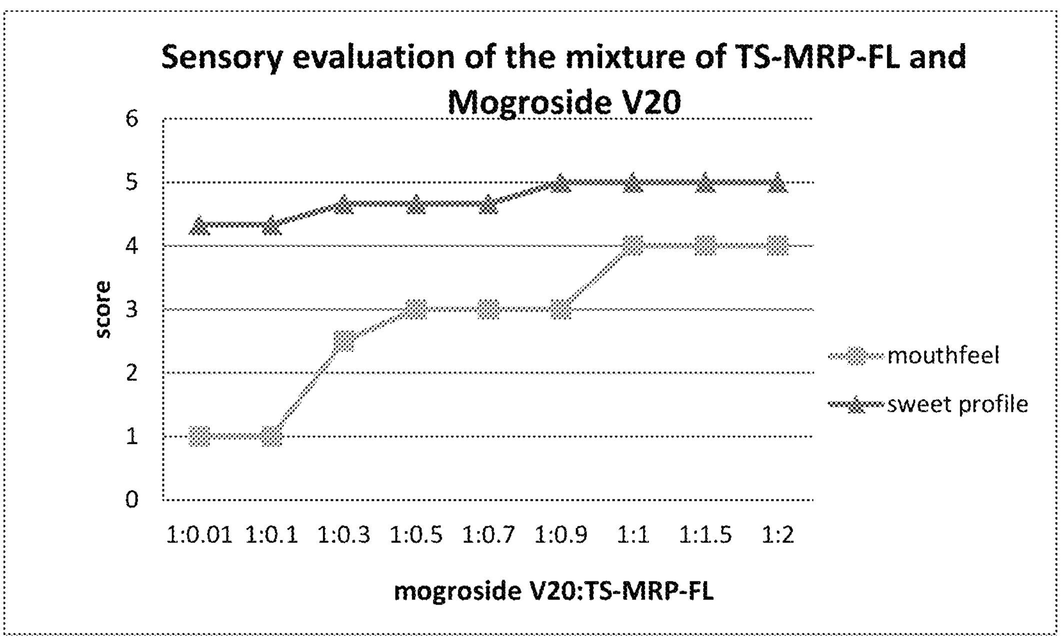
FIG. 122 shows the relationship between the sensory evaluation results to the ratio of mogroside V20 to TS-MRP-FL of example 132.

The relationship between the sensory evaluation results to the ratio of mogroside V20 to TS-MRP-FL in this example is as shown in FIG. 122.

Figure 123:
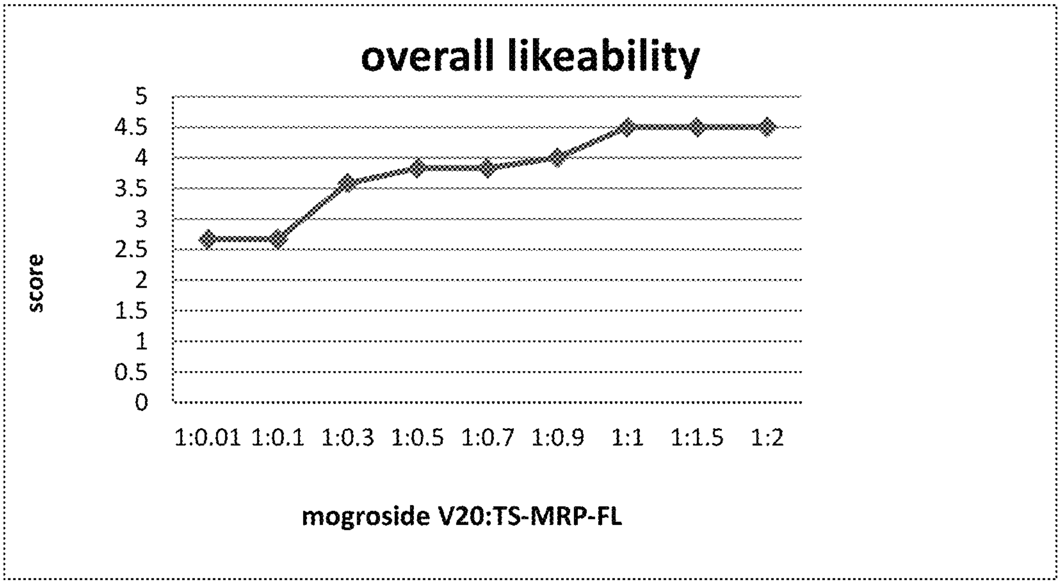
FIG. 123 shows the relationship between the overall likeability results to the ratio of mogroside V20 to TS-MRP-FL of example 132.

The relationship between the overall likeability results to the ratio of mogroside V20 to TS-MRP-FL in this example is as shown in FIG. 123.

Conclusion:

The results showed that TS-MRPs (MRPs, *Stevia* extract, thaumatin) can significantly improve taste profile, flavor intensity and mouth feel of high intensity natural sweeteners such as monk fruit extract concentrate or extract. All ranges in tested ratios of mogroside V20 to TS-MRP-FL from 1/0.01 to 1/2 had good taste (overall likeability score >2.5), preferably when the ratio ranges were from 1/0.3 to 1/2, the products gave very good taste (score >3). The conclusion can be extended to 1:99 and 99:1.

Example 133

The Improvement of MRP-CA to the Taste and Mouth Feel of Mogroside V50

Common Process:

MRP-CA and mogroside V50 were weighed and uniformly mixed according to the weight shown in Table 133.1, dissolved in 100 ml of pure water, and subjected to a mouth feel evaluation test. The tasting procedure is the same as Example 39.

TABLE 133.1

| the weight of MRP-CA and mogroside V50 | | | |
|---|---|---|---|
| # | Mogroside V50/MRP-CA | Weight of mogroside V50 (g) | Weight of MRP-CA (g) |
| 133-01 | 20:1 | 0.1 | 0.005 |
| 133-02 | 10:1 | 0.1 | 0.01 |
| 133-03 | 10:3 | 0.1 | 0.03 |
| 133-04 | 10:5 | 0.1 | 0.05 |
| 133-05 | 10:7 | 0.1 | 0.07 |
| 133-06 | 10:9 | 0.1 | 0.09 |
| 133-07 | 10:10 | 0.1 | 0.1 |
| 133-08 | 10:15 | 0.1 | 0.15 |
| 133-09 | 10:20 | 0.1 | 0.2 |

Experiments

Several mixtures of MRP-CA and mogroside V50 were mixed in this example. Each sample was evaluated according to the aforementioned sensory evaluation method, and the average score of the panel was taken as the evaluation result. The taste profile of the mixture is as follows. It should be noted that according to the sensory evaluation method, the evaluation of the mouth feel and the sweet profile is based on the iso-sweetness. That is to say, in these evaluations, the concentration of mogroside V50 in the sample solution was the same, 500 ppm. The results are shown in Table 133.2.

TABLE 133.2

| the score in sensory evaluation | | | | | | | |
|---|---|---|---|---|---|---|---|
| | | sensory evaluation | | | | | |
| | | | sweet profile | | | | |
| # | flavor | mouth feel kokumi | sweet linger-ing | bitter-ness | metallic after-taste | score of sweet profile | overall like-ability |
| 133-01 | caramel | 2 | 1 | 1 | 1 | 5.00 | 3.50 |
| 133-02 | | 2 | 1 | 1 | 1 | 5.00 | 3.50 |
| 133-03 | | 2 | 1 | 1 | 1 | 5.00 | 3.50 |
| 133-04 | | 3 | 1 | 1 | 1 | 5.00 | 4.00 |
| 133-05 | | 3 | 1 | 1 | 1 | 5.00 | 4.00 |
| 133-06 | | 3 | 1 | 1 | 1 | 5.00 | 4.00 |
| 133-07 | | 4 | 1 | 1 | 1 | 5.00 | 4.50 |
| 133-08 | | 5 | 2 | 1 | 1 | 4.67 | 4.83 |
| 133-09 | | 5 | 2 | 1 | 1 | 4.67 | 4.83 |

Data Analysis

Figure 124:
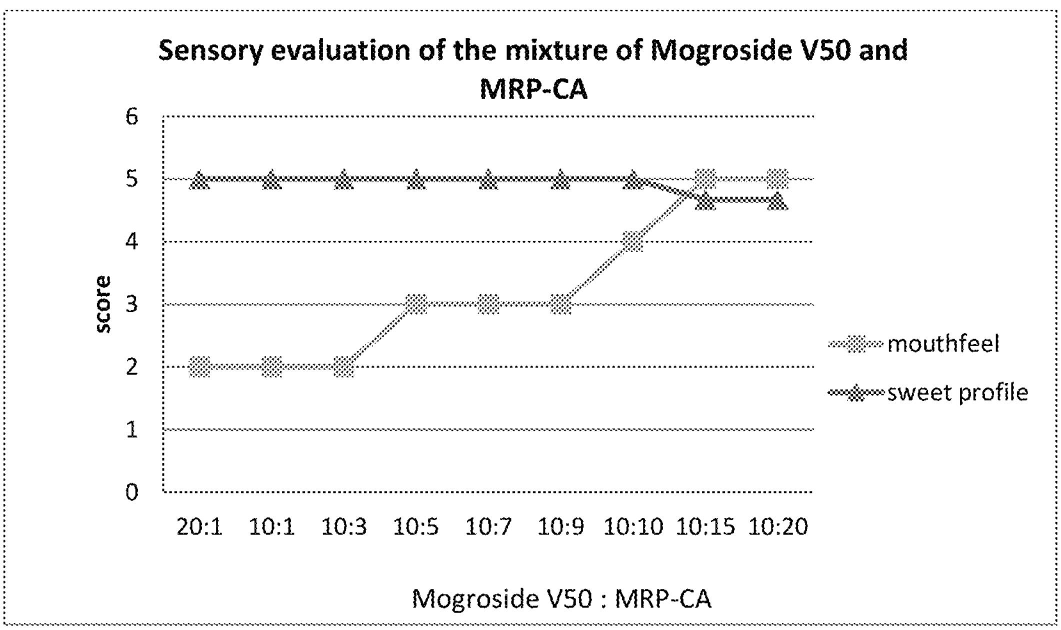
FIG. 124 shows the relationship between the sensory evaluation results to the ratio of mogroside V50 to MRP-CA of example 133.

The relationship between the sensory evaluation results to the ratio of mogroside V50 to MRP-CA in this example is as shown in FIG. 124.

Figure 125:
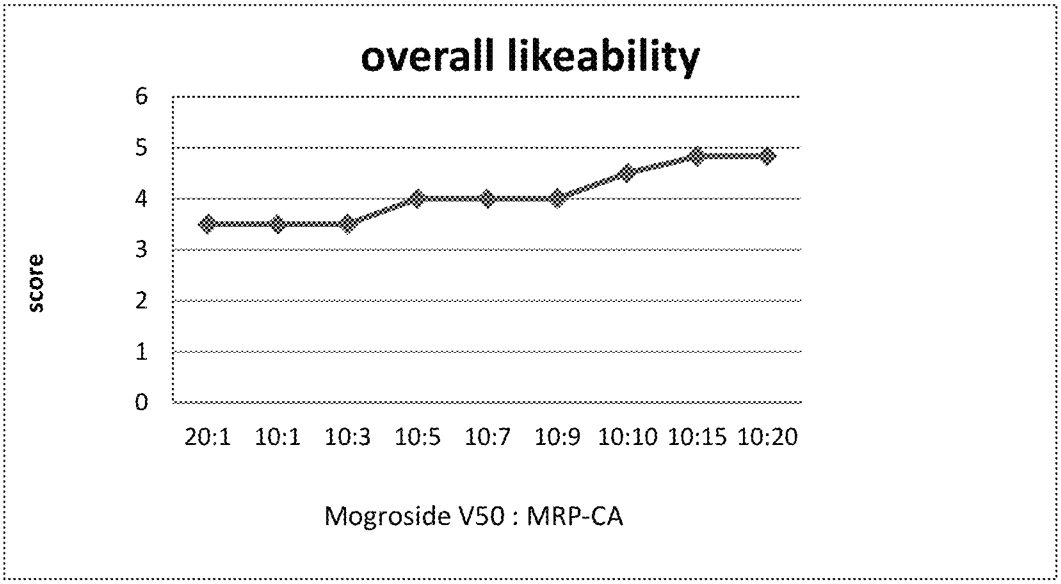

The relationship between the overall likeability results to the ratio of mogroside V50 to MRP-CA in this example is as shown in FIG. 125.

Conclusion:

The results showed that standard MRPs can improve taste profile, flavor intensity and mouth feel of high intensity natural sweeteners such as monk fruit concentrate or extract. All ranges in tested ratios of mogroside V50 to MRP-CA from 20/1 to 10/20 had good taste (overall likeability score >3), preferably when the ratio ranges were from 10/5 to 10/20, the products gave very good taste (score >4). The conclusion can be extended to 1:99 and 99:1.

Example 134

The Improvement of S-MRP-CA to the Taste and Mouth Feel of Mogroside V50

Common Process:

S-MRP-CA and mogroside V50 were weighed and uniformly mixed according to the weight shown in Table 134.1, dissolved in 100 ml of pure water, and subjected to a mouth feel evaluation test. The tasting procedure is the same as Example 39.

TABLE 134.1

| the weight of S-MRP-CA and mogroside V50 | | | |
|---|---|---|---|
| # | Mogroside V50/S-MRP-CA | Weight of mogroside V50 (g) | Weight of S-MRP-CA (g) |
| 134-01 | 20:1 | 0.1 | 0.005 |
| 134-02 | 10:1 | 0.1 | 0.01 |
| 134-03 | 10:3 | 0.1 | 0.03 |
| 134-04 | 10:5 | 0.1 | 0.05 |
| 134-05 | 10:7 | 0.1 | 0.07 |
| 134-06 | 10:9 | 0.1 | 0.09 |
| 134-07 | 10:10 | 0.1 | 0.1 |
| 134-08 | 10:15 | 0.1 | 0.15 |
| 134-09 | 10:20 | 0.1 | 0.2 |

Experiments

Several mixtures of S-MRP-CA and mogroside V50 were mixed in this example. Each sample was evaluated according to the aforementioned sensory evaluation method, and the average score of the panel was taken as the evaluation result. The taste profile of the mixture is as follows. It should be noted that according to the sensory evaluation method, the evaluation of the mouth feel and the sweet profile is based on the iso-sweetness. That is to say, in these evaluations, the concentration of mogroside V50 in the sample solution was the same, 500 ppm. The results are shown in Table 134.2.

TABLE 134.2

| the score in sensory evaluation | | | | | | | |
|---|---|---|---|---|---|---|---|
| | | sensory evaluation | | | | | |
| | | | sweet profile | | | | |
| # | flavor | mouth feel kokumi | sweet lingering | bitterness | metallic aftertaste | score of sweet profile | overall likeability |
| 134-01 | Caramel | 2 | 2 | 1 | 1 | 4.67 | 3.33 |
| 134-02 | | 2 | 2 | 1 | 1 | 4.67 | 3.33 |
| 134-03 | | 2 | 2 | 1 | 1 | 4.67 | 3.33 |
| 134-04 | | 3 | 2 | 1 | 1 | 4.67 | 3.83 |
| 134-05 | | 3 | 2 | 1 | 1 | 4.67 | 3.83 |
| 134-06 | | 3 | 2 | 1 | 1 | 4.67 | 3.83 |
| 134-07 | | 3 | 2 | 1 | 1 | 4.67 | 3.83 |
| 134-08 | | 3 | 1 | 1 | 1 | 5.00 | 4.00 |
| 134-09 | | 3 | 1 | 1 | 1 | 5.00 | 4.00 |

Data Analysis

Figure 126:
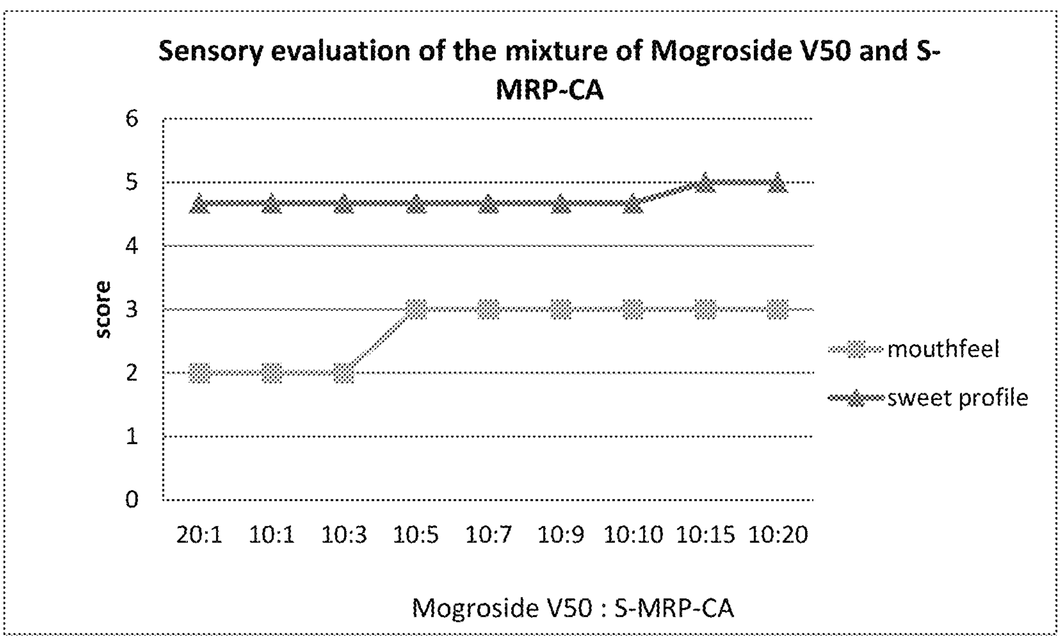

The relationship between the sensory evaluation results to the ratio of mogroside V50 to S-MRP-CA in this example is as shown in FIG. 126.

Figure 127:
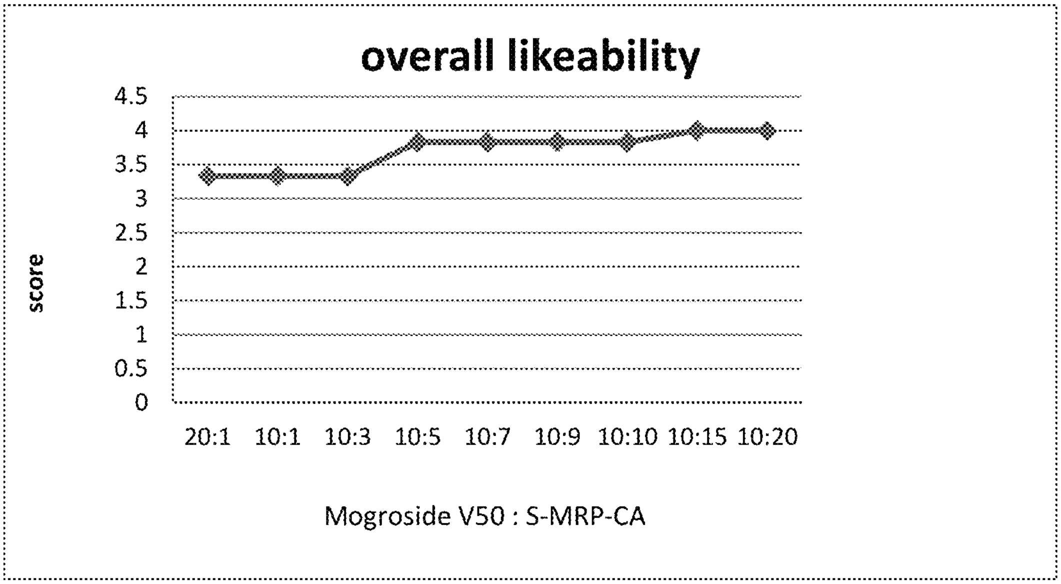

The relationship between the overall likeability results to the ratio of mogroside V50 to S-MRP-CA in this example is as shown in FIG. 127.

Conclusion:

The results showed that S-MRPs (MRPs, *Stevia* extract) can significantly improve taste profile, flavor intensity and mouth feel of high intensity natural sweeteners such as monk fruit concentrate or extract. All ranges in tested ratios of mogroside V50 to S-MRP-CA from 20/1 to 10/20 had good taste (overall likeability score >3), preferably when the ratio ranges were from 10/15 to 10/20, the products gave very good taste (score >4). The conclusion can be extended to 1:99 and 99:1.

Example 135

The Improvement of TS-MRP-CA to the Taste and Mouth Feel of Mogroside V50

Common Process:

TS-MRP-CA and mogroside V50 were weighed and uniformly mixed according to the weight shown in Table 135.1, dissolved in 100 ml of pure water, and subjected to a mouth feel evaluation test. The tasting procedure is the same as Example 39.

TABLE 135.1

| the weight of TS-MRP-CA and mogroside V50 | | | |
|---|---|---|---|
| # | Mogroside V50/TS-MRP-CA | Weight of mogroside V50 (g) | Weight of TS-MRP-CA (g) |
| 135-01 | 20:1 | 0.1 | 0.005 |
| 135-02 | 10:1 | 0.1 | 0.01 |
| 135-03 | 10:3 | 0.1 | 0.03 |
| 135-04 | 10:5 | 0.1 | 0.05 |
| 135-05 | 10:7 | 0.1 | 0.07 |

TABLE 135.1-continued

| the weight of TS-MRP-CA and mogroside V50 | | | |
|---|---|---|---|
| # | Mogroside V50/ TS-MRP-CA | Weight of mogroside V50 (g) | Weight of TS-MRP-CA (g) |
| 135-06 | 10:9 | 0.1 | 0.09 |
| 135-07 | 10:10 | 0.1 | 0.1 |
| 135-08 | 10:15 | 0.1 | 0.15 |
| 135-09 | 10:20 | 0.1 | 0.2 |

Experiments

Several mixtures of TS-MRP-CA and mogroside V50 were mixed in this example. Each sample was evaluated according to the aforementioned sensory evaluation method, and the average score of the panel was taken as the evaluation result. The taste profile of the mixture is as follows. It should be noted that according to the sensory evaluation method, the evaluation of the mouth feel and the sweet profile is based on the iso-sweetness. That is to say, in these evaluations, the concentration of mogroside V50 in the sample solution was the same, 500 ppm. The results are shown in Table 135.2.

TABLE 135.2

| the score of sensory evaluation | | | | | | | |
|---|---|---|---|---|---|---|---|
| | | sensory evaluation | | | | | |
| | | | sweet profile | | | | |
| # | flavor | mouth feel kokumi | sweet lingering | bitterness | metallic aftertaste | score of sweet profile | overall likeability |
| 135-01 | Caramel | 1 | 1 | 1 | 1 | 5.00 | 3.00 |
| 135-02 | | 2 | 1 | 1 | 1 | 5.00 | 3.50 |
| 135-03 | | 2 | 1 | 1 | 1 | 5.00 | 3.50 |
| 135-04 | | 2 | 2 | 1 | 1 | 4.67 | 3.33 |
| 135-05 | | 2 | 2 | 1 | 1 | 4.67 | 3.33 |
| 135-06 | | 3 | 2 | 1 | 1 | 4.67 | 3.83 |
| 135-07 | | 3 | 2 | 1 | 1 | 4.67 | 3.83 |
| 135-08 | | 4 | 2 | 1 | 1 | 4.67 | 4.33 |
| 135-09 | | 4 | 2 | 1 | 1 | 4.67 | 4.33 |

Data Analysis

Figure 128:
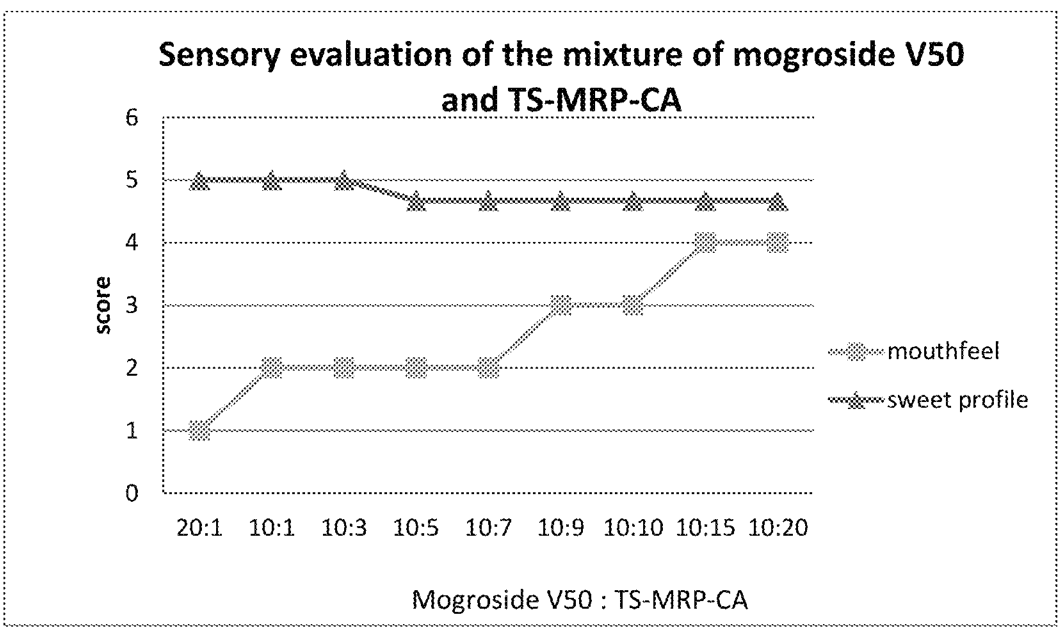

The relationship between the sensory evaluation results to the ratio of mogroside V50 to TS-MRP-CA in this example is as shown in FIG. 128.

Figure 129:
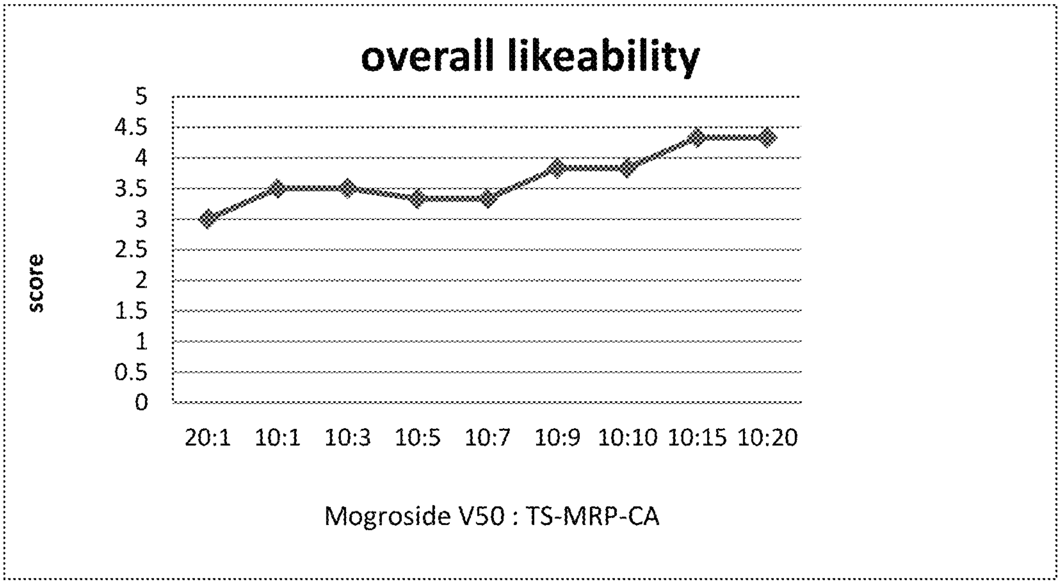

The relationship between the overall likeability results to the ratio of mogroside V50 to TS-MRP-CA in this example is as shown in FIG. 129.

Conclusion:

The results showed that TS-MRPs (MRPs, *Stevia* extract, thaumatin) can significantly improve taste profile, flavor intensity and mouth feel of high intensity natural sweeteners such as monk fruit concentrate or extract. All ranges in tested ratios of mogroside V50 to TS-MRP-CA from 20/1 to 10/20 had good taste (overall likeability score >3), preferably when the ratio ranges were from 10/15 to 10/20, the products gave very good taste score >4). The conclusion can be extended to 1:99 and 99:1.

Examples 136-141

The Improvement of MRP, S-MRP and TS-MRP to the Taste and Mouth Feel of Artificial Sweetener Such as Sucralose and Aspartame The sources of artificial sweetener and MRP samples used in the following Examples are as follows.

TABLE 136-141

| sample | source | Lot # | specification |
|---|---|---|---|
| sucralose | Anhui JinHe Industrial CO., Ltd, China | 201804023 | 99.72% |
| aspartame | | | |
| MRP-CH | The product of Example 99 | | |
| MRP-CA | The product of Example 97 | | |
| S-MRP-CH | The product of Example 101 | | |
| S-MRP-CA | The product of Example 68 | | |
| thaumatin | The product of EPC Natural Products Co., Ltd, China | 20180801 | thaumatin 10.74% |
| TS-MRP-CH | the mixture of above S-MRP-CH and thaumatin with the weight ratio of 10:1 | | |
| TS-MRP-CA | the mixture of above S-MRP-CA and thaumatin with the weight ratio of 10:1 | | |

Example 136

The Improvement of MRP-CH to the Taste and Mouth Feel of Aspartame

Common Process:

MRP-CH and aspartame were weighed and uniformly mixed according to the weight shown in Table 136.1, dissolved in pure water, and subjected to a mouth feel evaluation test. The tasting procedure is the same as Example 39.

TABLE 136.1

| the weight of MRP-CH and aspartame | | | | |
|---|---|---|---|---|
| # | The ratio of aspartame to MRP-CH | Weight of aspartame (mg) | Weight of MRP-CH (mg) | Volume of pure water (mL) |
| 136-01 | 100/1 | 500 | 5 | 1000 |
| 136-02 | 10/1 | 50 | 5 | 100 |
| 136-03 | 10/3 | 50 | 15 | 100 |
| 136-04 | 10/5 | 50 | 25 | 100 |
| 136-05 | 10/7 | 50 | 35 | 100 |
| 136-06 | 10/9 | 50 | 45 | 100 |
| 136-07 | 10/10 | 50 | 50 | 100 |
| 136-08 | 10/40 | 50 | 200 | 100 |
| 136-09 | 10/70 | 50 | 350 | 100 |

Experiments

Several mixtures of MRP-CH and aspartame were mixed in this example. Each sample was evaluated according to the aforementioned sensory evaluation method, and the average score of the panel was taken as the evaluation result. The taste profile of the mixture is as follows. It should be noted that according to the sensory evaluation method, the evaluation of the mouth feel and the sweet profile is based on the iso-sweetness. That is to say, in these evaluations, the concentration of aspartame in the sample solution was the same, 500 ppm. The results are shown in Table 136.2.

TABLE 136.2

| the score in sensory evaluation | | | | | | | |
|---|---|---|---|---|---|---|---|
| | | sensory evaluation | | | | | |
| | | | sweet profile | | | | |
| # | flavor | mouth feel kokumi | sweet lingering | bitterness | metallic aftertaste | score of sweet profile | overall likeability |
| 136-01 | Chocolate | 1 | 3 | 1 | 1 | 4.33 | 2.67 |
| 136-02 | | 2 | 2 | 1 | 1 | 4.67 | 3.33 |
| 136-03 | | 2 | 2 | 1 | 1 | 4.67 | 3.33 |
| 136-04 | | 3 | 2 | 1 | 1 | 4.67 | 3.83 |
| 136-05 | | 3 | 2 | 1 | 1 | 4.67 | 3.83 |
| 136-06 | | 4 | 2 | 1 | 1 | 4.67 | 4.33 |
| 136-07 | | 5 | 2 | 1 | 1 | 4.67 | 4.83 |
| 136-08 | | 5 | 2 | 1 | 1 | 4.67 | 4.83 |
| 136-09 | | 5 | 2 | 2.3 | 1 | 4.33 | 4.62 |

Data Analysis

Figure 130:
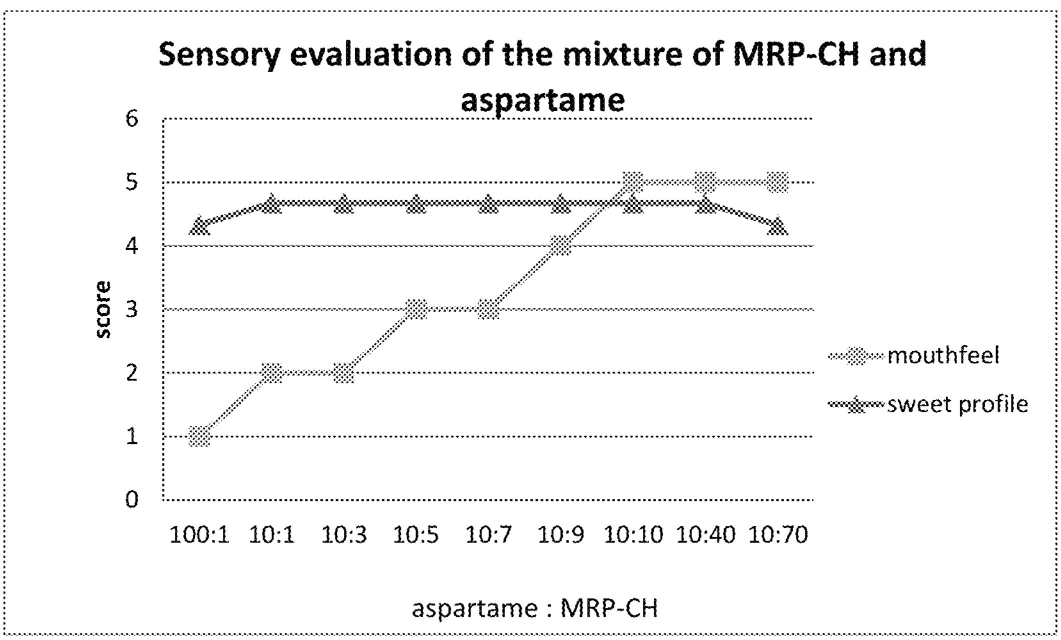

The relationship between the sensory evaluation results to the ratio of aspartame to MRP-CH in this example is as shown in FIG. 130.

Figure 131:
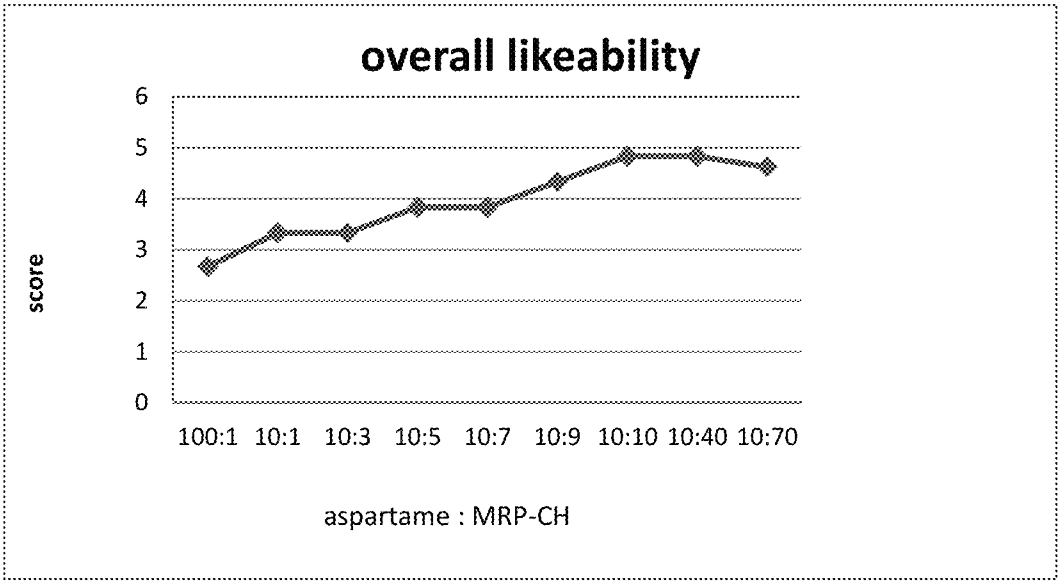

The relationship between the overall likeability results to the ratio of aspartame to MRP-CH in this example is as shown in FIG. 131.

Conclusion:

The results showed that standard MRPs can significantly improve taste profile, flavor intensity and mouth feel of high intensity synthetic or artificial sweeteners such as aspartame. All ranges in tested ratios of aspartame to MRP-CH from 100/1 to 10/70 had good taste (overall likeability score >2.5), preferably when the ratio ranges were from 10/5 to 10/70, the products will give very good taste (score >3.5). The conclusion can be extended to 1:99 and 99:1.

Example 137

The Improvement of S-MRP-CH to the Taste and Mouth Feel of Aspartame

Common Process:

S-MRP-CH and aspartame were weighed and uniformly mixed according to the weight shown in Table 137.1, dissolved in pure water, and subjected to a mouth feel evaluation test. The tasting procedure is the same as Example 39.

TABLE 137.1

| the weight of S-MRP-CH and aspartame | | | | |
|---|---|---|---|---|
| # | The ratio of aspartame to S-MRP-CH | Weight of aspartame (mg) | Weight of S-MRP-CH (mg) | Volume of pure water (mL) |
| 137-01 | 100/1 | 500 | 5 | 1000 |
| 137-02 | 10/1 | 50 | 5 | 100 |
| 137-03 | 10/5 | 50 | 25 | 100 |
| 137-04 | 10/9 | 50 | 45 | 100 |
| 137-05 | 10/10 | 50 | 50 | 100 |
| 137-06 | 10/20 | 50 | 100 | 100 |
| 137-07 | 10/30 | 50 | 150 | 100 |
| 137-08 | 10/40 | 50 | 200 | 100 |
| 137-09 | 10/50 | 50 | 250 | 100 |

Experiments

Several mixtures of S-MRP-CH and aspartame were mixed in this example. Each sample was evaluated according to the aforementioned sensory evaluation method, and the average score of the panel was taken as the evaluation result. The taste profile of the mixture is as follows. It should be noted that according to the sensory evaluation method, the evaluation of the mouth feel and the sweet profile is based on the iso-sweetness. That is to say, in these evaluations, the concentration of aspartame in the sample solution was the same, 500 ppm. The results are shown in Table 137.2.

TABLE 137.2

| the score in sensory evaluation | | | | | | | |
|---|---|---|---|---|---|---|---|
| | | sensory evaluation | | | | | |
| | | | sweet profile | | | | |
| # | flavor | mouth feel kokumi | sweet lingering | bitterness | metallic aftertaste | score of sweet profile | overall likeability |
| 137-01 | Chocolate | 1 | 3 | 1 | 1 | 4.33 | 2.67 |
| 137-02 | | 3 | 2 | 1 | 1 | 4.67 | 3.83 |
| 137-03 | | 5 | 1 | 1 | 1 | 5.00 | 5.00 |
| 137-04 | | 5 | 1 | 1 | 1 | 5.00 | 5.00 |
| 137-05 | | 5 | 2 | 1 | 1 | 4.67 | 4.83 |
| 137-06 | | 5 | 2 | 1 | 1 | 4.67 | 4.83 |
| 137-07 | | 5 | 2 | 1 | 1 | 4.67 | 4.83 |
| 137-08 | | 5 | 2 | 1.7 | 1 | 4.43 | 4.72 |
| 137-09 | | 5 | 2 | 2.2 | 1 | 4.27 | 4.63 |

Data Analysis

Figure 132:
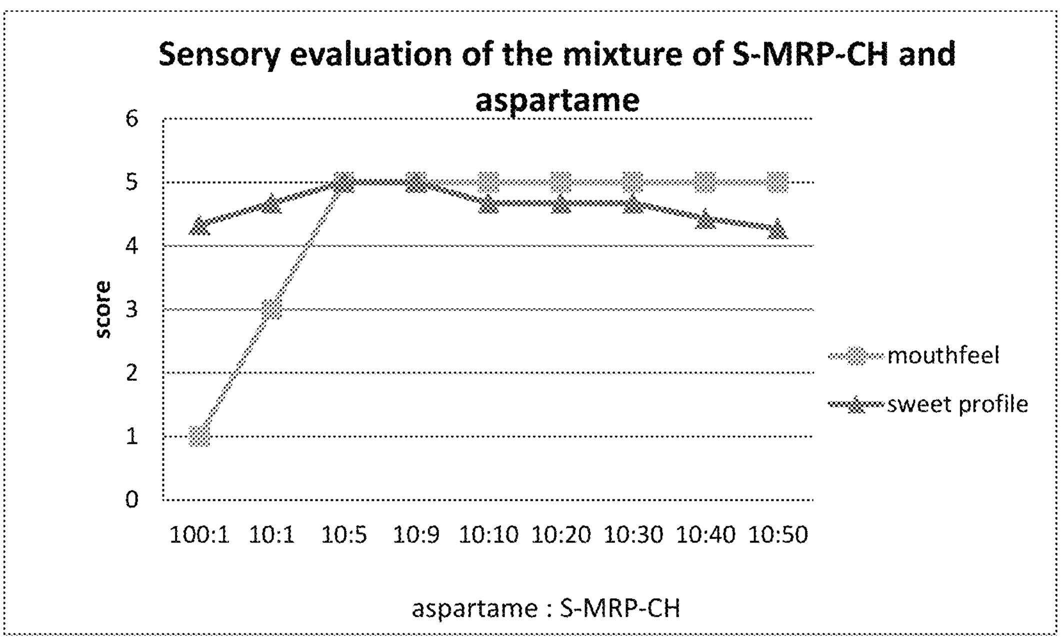

The relationship between the sensory evaluation results to the ratio of aspartame to S-MRP-CH in this example is as shown in FIG. 132.

Figure 133:
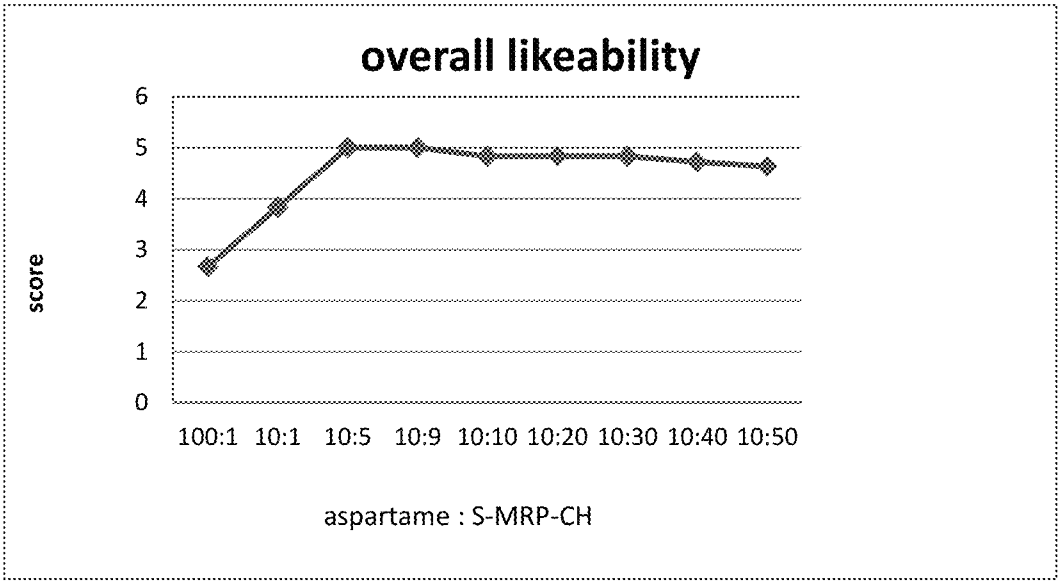

The relationship between the overall likeability results to the ratio of aspartame to S-MRP-CH in this example is as shown in FIG. 133.

Conclusion:

The results showed that S-MRPs RPs, *Stevia* extract) can significantly improve taste profile, flavor intensity and mouth feel of high intensity synthetic sweetener such as aspartame. All ranges in tested ratios of aspartame to S-MRP-CH from 100/1 to 10/50 had good taste (overall likeability score >2.5), preferably when the ratio ranges were from 10/1 to 10/50, the products gave very good taste (score >3.5). The conclusion can be extended to 1:99 and 99:1.

Example 138

The Improvement of TS-MRP-CH to the Taste and Mouth Feel of Aspartame

Common Process:

TS-MRP-CH and aspartame were weighed and uniformly mixed according to the weight shown in Table 138.1, dissolved in pure water, and subjected to a mouth feel evaluation test. The tasting procedure is the same as Example 39.

TABLE 138.1

| the weight of TS-MRP-CH and aspartame | | | | |
|---|---|---|---|---|
| # | The ratio of aspartame to TS-MRP-CH | Weight of aspartame (mg) | Weight of TS-MRP-CH (mg) | Volume of pure water (mL) |
| 138-01 | 100/1 | 500 | 5 | 1000 |
| 138-02 | 10/1 | 50 | 5 | 100 |
| 138-03 | 10/5 | 50 | 25 | 100 |
| 138-04 | 10/9 | 50 | 45 | 100 |
| 138-05 | 10/10 | 50 | 50 | 100 |
| 138-06 | 10/40 | 50 | 200 | 100 |
| 138-07 | 10/50 | 50 | 250 | 100 |
| 138-08 | 10/70 | 50 | 350 | 100 |
| 138-09 | 10/100 | 50 | 500 | 100 |

Experiments

Several mixtures of TS-MRP-CH and aspartame were mixed in this example. Each sample was evaluated according to the aforementioned sensory evaluation method, and the average score of the panel was taken as the evaluation result. The taste profile of the mixture is as follows. It should be noted that according to the sensory evaluation method, the evaluation of the mouth feel and the sweet profile is based on the iso-sweetness. That is to say, in these evaluations, the concentration of aspartame in the sample solution was the same, 500 ppm. The results are shown in Table 138.2.

TABLE 138.2

| the score in sensory evaluation | | | | | | | |
|---|---|---|---|---|---|---|---|
| | | sensory evaluation | | | | | |
| | | | sweet profile | | | | |
| # | flavor | mouth feel kokumi | sweet lingering | bitterness | metallic aftertaste | score of sweet profile | overall likeability |
| 138-01 | Chocolate | 2 | 2 | 1 | 1 | 4.67 | 3.33 |
| 138-02 | | 3 | 2 | 1 | 1 | 4.67 | 3.83 |
| 138-03 | | 4 | 2 | 1 | 1 | 4.67 | 4.33 |
| 138-04 | | 4 | 2 | 1 | 1 | 4.67 | 4.33 |
| 138-05 | | 4 | 4 | 1 | 1 | 4.00 | 4.00 |
| 138-06 | | 4 | 4 | 1 | 1 | 4.00 | 4.00 |
| 138-07 | | 4 | 4 | 1 | 1 | 4.00 | 4.00 |

TABLE 138.2-continued the score in sensory evaluation

| # | flavor | sensory evaluation: mouth feel kokumi | sweet profile: sweet lingering | sweet profile: bitterness | sweet profile: metallic aftertaste | score of sweet profile | overall likeability |
|---|---|---|---|---|---|---|---|
| 138-08 | | 5 | 5 | 1.7 | 1 | 3.43 | 4.22 |
| 138-09 | | 5 | 5 | 2.2 | 1 | 3.27 | 4.13 |

Data Analysis

Figure 134:
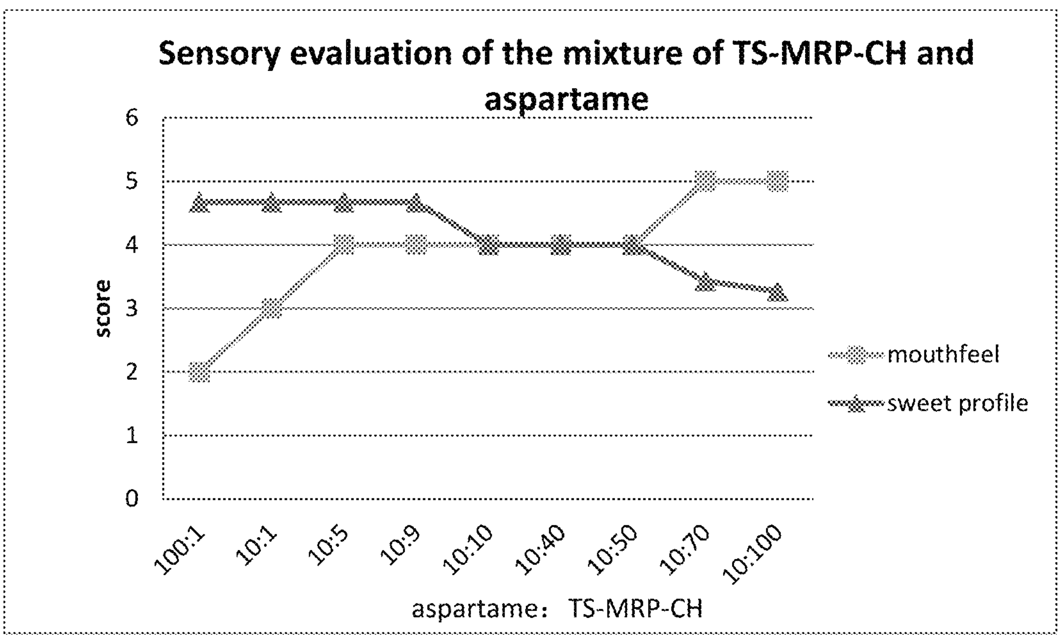

The relationship between the sensory evaluation results to the ratio of aspartame to TS-MRP-CH in this example is as shown in FIG. 134.

Figure 135:
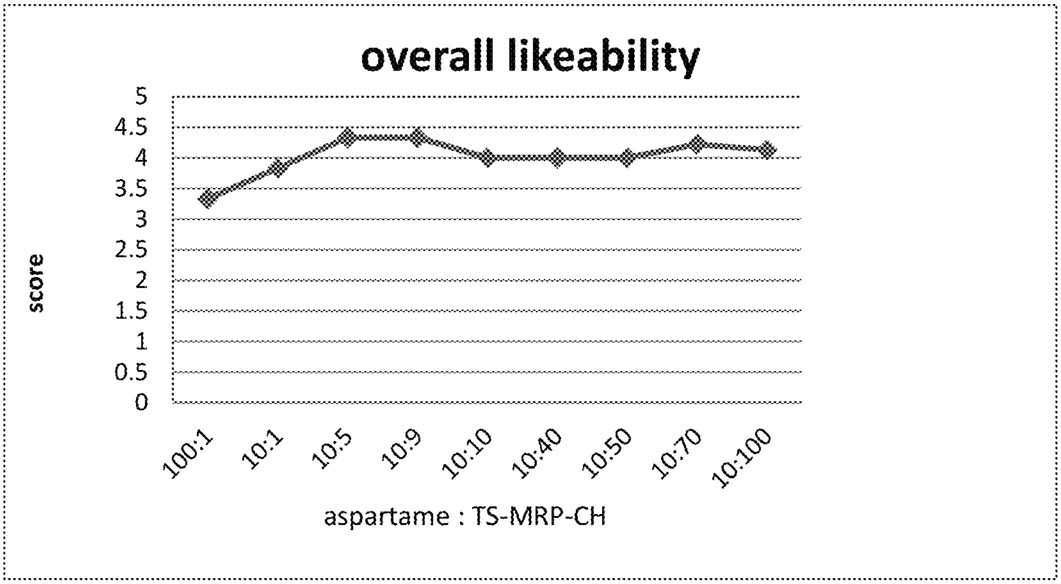

The relationship between the overall likeability results to the ratio of aspartame to TS-MRP-CH in this example is as shown in FIG. 135.

Conclusion:

The results showed that TS-MRPs (MIRPs, *Stevia* extract, thaumatin) can significantly improve taste profile, flavor intensity and mouth feel of high intensity synthetic sweetener such as aspartame. All ranges in tested ratios of aspartame to TS-MRP-CH from 100/1 to 10/100 had good taste (overall likeability score >3), preferably when the ratio ranges were from 10/5 to 10/100, the products gave very good taste (score >4). The conclusion can be extended to 1:99 and 99:1.

Example 139

The Improvement of MRP-CA to the Taste and Mouth Feel of Sucralose

Common Process:

MRP-CA and sucralose were weighed and uniformly mixed according to the weight shown in Table 139.1, dissolved in 100 ml pure water, and subjected to a mouth feel evaluation test. The tasting procedure is the same as Example 39.

TABLE 139.1 the weight of MRP-CA and sucralose

| # | The ratio of sucralose to MRP-CA | Weight of sucralose (mg) | Weight of MRP-CA (mg) | Volume of pure water (mL) |
|---|---|---|---|---|
| 139-01 | 10/1 | 15 | 1.5 | 100 |
| 139-02 | 10/3 | 15 | 4.5 | 100 |
| 139-03 | 10/5 | 15 | 7.5 | 100 |
| 139-04 | 10/7 | 15 | 10.5 | 100 |
| 139-05 | 10/9 | 15 | 13.5 | 100 |
| 139-06 | 10/10 | 15 | 15 | 100 |
| 139-07 | 10/40 | 15 | 60 | 100 |
| 139-08 | 10/70 | 15 | 105 | 100 |
| 139-09 | 10/100 | 15 | 150 | 100 |

Experiments

Several mixtures of MRP-CA and sucralose were mixed in this example. Each sample was evaluated according to the aforementioned sensory evaluation method, and the average score of the panel was taken as the evaluation result. The taste profile of the mixture is as follows. It should be noted that according to the sensory evaluation method, the evaluation of the mouth feel and the sweet profile is based on the iso-sweetness. That is to say, in these evaluations, the concentration of sucralose in the sample solution was the same, 150 ppm. The results are shown in Table 139.2.

TABLE 139.2 the score in sensory evaluation

| # | flavor | sensory evaluation: mouth feel kokumi | sweet profile: sweet lingering | sweet profile: bitterness | sweet profile: metallic aftertaste | score of sweet profile | overall likeability |
|---|---|---|---|---|---|---|---|
| 139-01 | Caramel | 1 | 3 | 1 | 2 | 4.00 | 2.50 |
| 139-02 | | 1 | 3 | 1 | 1 | 4.33 | 2.67 |
| 139-03 | | 1 | 3 | 1 | 1 | 4.33 | 2.67 |
| 139-04 | | 1 | 2 | 1 | 1 | 4.67 | 2.83 |
| 139-05 | | 2 | 2 | 1 | 1 | 4.67 | 3.33 |
| 139-06 | | 2 | 2 | 1 | 1 | 4.67 | 3.33 |
| 139-07 | | 2 | 2 | 1 | 1 | 4.67 | 3.33 |
| 139-08 | | 2 | 2 | 1.2 | 1 | 4.60 | 3.30 |
| 139-09 | | 2 | 2 | 2 | 1 | 4.33 | 3.17 |

Data Analysis

Figure 136:
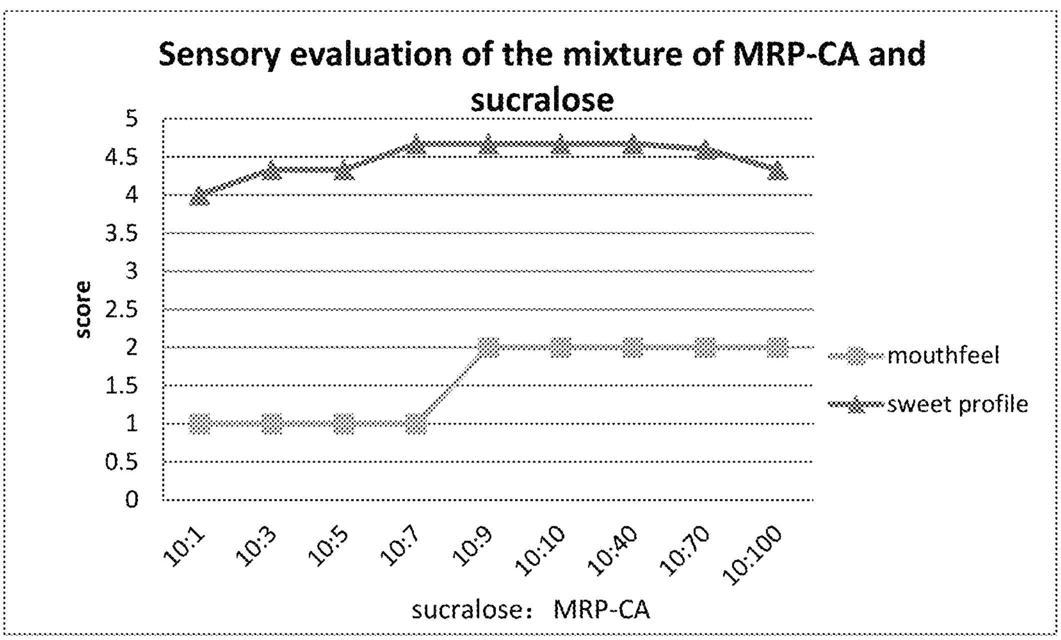

The relationship between the sensory evaluation results to the ratio of sucralose to MRP-CA in this example is as shown in FIG. 136.

The relationship between the overall likeability results to the ratio of sucralose to MRP-CA in this example is as shown in FIG. 137.

Conclusion:

The results showed that standard MRPs can significantly improve taste profile, flavor intensity and mouth feel of high intensity synthetic sweetener such as sucralose. All ranges in tested ratios of sucralose to MRP-CA from 10:1 to 10:100 had good taste (overall likeability score >2.5), preferably when the ratio ranges were from 10:10 to 10:100, the products gave very good taste score >3). The conclusion can be extended to 1:99 and 99:1.

Example 140

The Improvement of S-MRP-CA to the Taste and Mouth Feel of Sucralose

Common Process:

S-MRP-CA and sucralose were weighed and uniformly mixed according to the weight shown in Table 140.1, dissolved in 100m1 pure water, and subjected to a mouth feel evaluation test. The tasting procedure is the same as Example 39.

TABLE 140.1

| the weight of S-MRP-CA and sucralose | | | | |
|---|---|---|---|---|
| # | The ratio of sucralose to S-MRP-CA | Weight of sucralose (mg) | Weight of S-MRP-CA (mg) | Volume of pure water (mL) |
| 140-01 | 10/1 | 15 | 1.5 | 100 |
| 140-02 | 10/3 | 15 | 4.5 | 100 |
| 140-03 | 10/5 | 15 | 7.5 | 100 |
| 140-04 | 10/7 | 15 | 10.5 | 100 |
| 140-05 | 10/9 | 15 | 13.5 | 100 |
| 140-06 | 10/10 | 15 | 15 | 100 |
| 140-07 | 10/40 | 15 | 60 | 100 |
| 140-08 | 10/70 | 15 | 105 | 100 |
| 140-09 | 10/100 | 15 | 150 | 100 |

Experiments

Several mixtures of S-MRP-CA and sucralose were mixed in this example. Each sample was evaluated according to the aforementioned sensory evaluation method, and the average score of the panel was taken as the evaluation result. The taste profile of the mixture is as follows. It should be noted that according to the sensory evaluation method, the evaluation of the mouth feel and the sweet profile is based on the iso-sweetness. That is to say, in these evaluations, the concentration of sucralose in the sample solution was the same, 150 ppm. The results are shown in Table 140.2.

TABLE 140.2

| the score in sensory evaluation | | | | | | | |
|---|---|---|---|---|---|---|---|
| | | sensory evaluation | | | | | |
| | | | sweet profile | | | | |
| # | flavor | mouth feel kokumi | sweet lingering | bitterness | metallic aftertaste | score of sweet profile | overall likeability |
| 140-01 | Caramel | 1 | 3 | 1 | 2 | 4.00 | 2.50 |
| 140-02 | | 1 | 3 | 1 | 1 | 4.33 | 2.67 |
| 140-03 | | 1 | 3 | 1 | 1 | 4.33 | 2.67 |
| 140-04 | | 1 | 2 | 1 | 1 | 4.67 | 2.83 |
| 140-05 | | 2 | 2 | 1 | 1 | 4.67 | 3.33 |
| 140-06 | | 2 | 2 | 1 | 1 | 4.67 | 3.33 |
| 140-07 | | 3 | 2 | 1 | 1 | 4.67 | 3.83 |
| 140-08 | | 3 | 2 | 1.2 | 1 | 4.60 | 3.80 |
| 140-09 | | 3 | 2 | 2.2 | 1 | 4.27 | 3.63 |

Data Analysis

The relationship between the sensory evaluation results to the ratio of sucralose to S-MRP-CA in this example is as shown in FIG. 138.

The relationship between the overall likeability results to the ratio of sucralose to S-MRP-CA in this example is as shown in FIG. 139.

Conclusion:

The results showed that composition comprises S-MRPs (*Stevia* extract and MRPs) can significantly improve taste profile, flavor intensity and mouth feel of high intensity synthetic sweetener such as sucralose. All ranges in tested ratios of sucralose to S-MRP-CA from 10:1 to 10:100 had good taste (overall likeability score >2.5), preferably when the ratio ranges were from 10:9 to 10:100, the products gave very good taste (score >3). The conclusion can be extended to 1:99 and 99:1.

Example 141

The Improvement of TS-MRP-CA to the Taste and Mouth Feel of Sucralose

Common Process:

TS-MRP-CA and sucralose were weighed and uniformly mixed according to the weight shown in Table 141.1, dissolved in 100 ml pure water, and subjected to a mouth feel evaluation test. The tasting procedure is the same as Example 39.

TABLE 141.1

| the weight of TS-MRP-CA and sucralose | | | | |
|---|---|---|---|---|
| # | The ratio of sucralose to TS-MRP-CA | Weight of sucralose (mg) | Weight of TS-MRP-CA (mg) | Volume of pure water (mL) |
| 141-01 | 10/1 | 15 | 1.5 | 100 |
| 141-02 | 10/3 | 15 | 4.5 | 100 |

TABLE 141.1-continued

| the weight of TS-MRP-CA and sucralose | | | | |
|---|---|---|---|---|
| # | The ratio of sucralose to TS-MRP-CA | Weight of sucralose (mg) | Weight of TS-MRP-CA (mg) | Volume of pure water (mL) |
| 141-03 | 10/5 | 15 | 7.5 | 100 |
| 141-04 | 10/7 | 15 | 10.5 | 100 |
| 141-05 | 10/9 | 15 | 13.5 | 100 |
| 141-06 | 10/10 | 15 | 15 | 100 |
| 141-07 | 10/40 | 15 | 60 | 100 |
| 141-08 | 10/70 | 15 | 105 | 100 |
| 141-09 | 10/100 | 15 | 150 | 100 |

Experiments

Several mixtures of TS-MRP-CA and sucralose were mixed in this example. Each sample was evaluated according to the aforementioned sensory evaluation method, and the average score of the panel was taken as the evaluation result. The taste profile of the mixture is as follows. It should be noted that according to the sensory evaluation method, the evaluation of the mouth feel and the sweet profile is based on the iso-sweetness. That is to say, in these evaluations, the concentration of sucralose in the sample solution was the same, 150 ppm. The results are shown in Table 141.2.

TABLE 141.2

| the score in sensory evaluation | | | | | | | |
|---|---|---|---|---|---|---|---|
| | | sensory evaluation | | | | | |
| | | | sweet profile | | | | |
| # | flavor | mouth feel kokumi | sweet lingering | bitterness | metallic aftertaste | score of sweet profile | overall likeability |
| 141-01 | Caramel | 1 | 2 | 1 | 1 | 4.67 | 2.83 |
| 141-02 | | 1 | 2 | 1 | 1 | 4.67 | 2.83 |
| 141-03 | | 1 | 2 | 1 | 1 | 4.67 | 2.83 |
| 141-04 | | 2 | 2 | 1 | 1 | 4.67 | 3.33 |
| 141-05 | | 2 | 3 | 1 | 1 | 4.33 | 3.17 |
| 141-06 | | 2 | 3 | 1 | 1 | 4.33 | 3.17 |
| 141-07 | | 3 | 3 | 1 | 1 | 4.33 | 3.67 |
| 141-08 | | 3 | 4 | 1 | 1 | 4.00 | 3.50 |
| 141-09 | | 2 | 4 | 1 | 1 | 4.00 | 3.00 |

Data Analysis

The relationship between the sensory evaluation results to the ratio of sucralose to TS-MRP-CA in this example is as shown in FIG. 140.

The relationship between the overall likeability results to the ratio of sucralose to TS-MRP-CA in this example is as shown in FIG. 141.

Conclusion:

The results showed that compositions comprising TS-MRPs (MRPs, *Stevia* extract and thaumatin) can significantly improve taste profile, flavor intensity and mouth feel of high intensity synthetic sweetener such as sucralose. All ranges in tested ratios of sucralose to TS-MRP-CA from 10:1 to 10:100 had good taste (overall likeability score >2.5), preferably when the ratio ranges were from 10:7 to 10:70, the products gave very good taste (score >3). The conclusion can be extended to 1:99 and 99:1.

Example 142

Evaluation of the Effect of S-MRP on Sugar-Free Chocolate Formula

Production Method 1) cocoa liquid blocks, whole milk, *Stevia* extract (Convenent®, available from Sweet Green Fields, United States, Lot number 20170802) and S-MRP-CH (product of Example 85) were heated in a water bath at 60° C. to melt the cocoa liquid block and stirred to make the mixture uniform;

2) mix the completely dissolved mixture in step 1 with lecithin;

3) continue to stir the mixture and cool down to 40° C.;

4) pour the mixture into a mold, freeze in the refrigerator to solidify Formula.

TABLE 142.1

| | Weight | | |
|---|---|---|---|
| Components | No. 1 (Low sweetness, sugar-free) | No. 2 (high sweetness, sugar-free) | No. 3 (No S-MRP-CH added, Control) |
| cocoa liquid blocks | 70 g | 60 g | 70 g |
| *Stevia* extract | 30 g | 40 g | 30 g |
| S-MRP-CH | 60 mg | 120 mg | \ |
| whole milk | 20 g | 20 g | 20 g |
| lecithin | 0.9 g | 0.9 g | 0.9 g |

Evaluation

All the samples were evaluated by a panel of 10 persons. The evaluation results are as follow. Method: All the samples were evaluated by a panel of 10 persons. The panel was asked to describe the taste profile according to the factors of sweetness, sweet lingering, mouth feel and overall likeability and gave the positive or negative judgment to each factor by their acceptability.

TABLE 142.2

| | No. 1 | | No. 2 | | No. 3 | |
|---|---|---|---|---|---|---|
| | Positive | Negative | Positive | Negative | Positive | Negative |
| Sweetness | 8 persons | 2 persons | 10 persons | None | 9 persons | 1 person |
| Sweet lingering | 9 persons | 1 person | 7 persons | 3 persons | 5 persons | 5 persons |
| Mouth feel | 9 persons | 1 person | 10 persons | None | 6 persons | 4 persons |
| Overall likeability | 9 persons | 1 person | 10 persons | None | 5 persons | 5 persons |
| Evaluation | Moderate sweetness; Sweet lingering is improved compare to No. 3 (control); Full body and silky | | Higher sweetness than No. 2; The intensity of chocolate flavor is stronger; More full body and silky than No. 2 | | Moderat sweetness; Sweet lingering is very serious; Lack of full body and silky mouth feel comparing to No. 1 and No. 2 | |

Conclusion:

For the chocolate formula with sweetening agent, high intensity sweetener either synthetic or natural as sweetener, the finished product lacked full body and a silky mouth feel. And at higher doses of sweetening agents and or synthetic sweetener, the sweet lingering of high intensity sweeteners became apparent, and the sweetness profile was difficult to be compatible with the flavor profile of chocolate itself. Using S-MRP-CH as a flavor enhancer and mouth feel modifier in low sugar or sugar free chocolate formula significantly improved the above defects, and the mouth feel acceptability of the formula was significantly increased. Thus, an embodiment comprising sweetening agents, MRPs, fibers (such as inulin and polydextrose), sweeteners, such as maltol, can be used for food including low sugar or sugar free chocolate.

Example 143

Evaluation of the Effect of MRP, S-MRP and TS-MRP on Sugar-Free Cookie Formula

Production Methods

1. Stir butter at room temperature to soften it.

2. Mix monk fruit extract V20 with MRP-CA, S-MRP-CA or TS-MRP-CA, respectively and dissolve the mixture in milk.

3. Pour cake powder into the butter, mix with rubber board, and pour the milk into the butter at the same time to make dough.

4. Put the dough in the refrigerator for 30 min.

5. Put the dough in the oven, bake at 150° C. for 30 min.

TABLE 143.1

| | Formula | | | |
|---|---|---|---|---|
| | Weight (g) | | | |
| Components | No. 1 (No MRP added, control) | No. 2 (MRP) | No. 3 (S-MRP) | No. 4 (TS-MRP) |
| cake powder | 40 | 40 | 40 | 40 |
| butter | 15 | 15 | 15 | 15 |
| Whole milk | 15 | 15 | 15 | 15 |
| monk fruit extract V20 | 0.262 | 0.262 | 0.131 | 0.131 |
| MRP-CA | | 0.184 | | |
| S-MRP-CA | | | 0.131 | |
| TS-MRP-CA | | | | 0.095 |

Evaluation

All the samples are evaluated by a panel of 10 persons. The evaluation results are as follow. Method: All the samples were evaluated by a panel of 10 persons. The panel was asked to describe the taste profile according to the factors of sweetness, sweet lingering, mouth feel and overall likeability and gave the positive or negative judgment to each factor by their acceptability.

TABLE 143.2

| | No. 1 | | No. 2 | | No. 3 | | No. 4 | |
|---|---|---|---|---|---|---|---|---|
| | Positive | Negative | Positive | Negative | Positive | Negative | Positive | Negative |
| sweetness | 10 | 0 | 10 | 0 | 10 | 0 | 10 | 0 |
| sweet lingering | 1 | 9 | 4 | 6 | 7 | 3 | 8 | 2 |
| mouth feel | 4 | 6 | 7 | 3 | 7 | 3 | 8 | 2 |
| Overall likeability | 2 | 8 | 6 | 4 | 7 | 3 | 9 | 1 |
| evaluation | Moderate sweetness; Sweet lingering is very serious; Lack of full body; Astringent aftertaste | | Moderate sweetness; Some improvement in sweet lingering; Significant incr easing in full body mouth feel; Astringent aftertaste | | Moderate sweetness; Significant improvement in sweet lingering; Significant incr easing in full body mouth feel; Astringent aftertaste | | Moderate sweetness; No sweet lingering and astringent aftertaste; More full body than No. 2 and No. 3. | |

Conclusion

The cookie formula with sweetening agent, and or high intensity sweetener such as synthetic sweeteners such as aspartame, AC-K, sucralose as sweeteners lacked full body mouth feel. Because the food product normally requires higher sweetness, it was necessary to add a sweetening agent and or high intensity sweeteners at high doses. However, under such conditions, the very serious defects of high intensity sweeteners such as sweet lingering, bitterness and astringency became apparent and made the food products difficult to be accepted by most consumers. When using MRP, S-MRP, or TS-MRP as flavor, flavor enhancers, mouth feel modifiers and/or sweeteners in such a sugar-free cookie, the resulting formula significantly overcame the original defects and the mouth feel acceptability of the product was improved significantly. In particular, the application of TS-MRP in cookies gave the best improvement for mouth feel.

Example 144

Evaluation of the Effect of S-MRP on Sugar-Free Juice

Materials

Sugar-free pineapple juice, available from Dell Monte Philippines, Inc., Philippine, sweetened by sucralose (300 ppm) and neotame (7 ppm), sweetness potency: 15% SE;

Original pineapple juice, available from Del Monte Philippines, Inc., Philippine, without any sweetener;

S-MRP-FL: the product of Example 67

S-MRP-CA: the product of Example 68

Sucralose: available from Anhui JinHe Industrial Co., Ltd, China, lot #201804023

Glycosylated steviol glycosides, Zolesse, available from Sweet Green Fields, United States, conforming to FEMA GRAS 4845, Lot #20180730

Glycyrrhizin, Ammoniated, available from Ningbo Green-Health Pharmaceutical Co., Ltd, China, lot #20171201, conforming to FEMA GRAS 258

TABLE 144.1

| Formula | | | |
|---|---|---|---|
| | Weight (mg) | | |
| components | No. 1 | No. 2 | No. 3 |
| RA20/TSG95 | 50 | 50 | 50 |
| Glycosylated steviol glycosides | 10 | 10 | 10 |
| Thaumatin | 0.5 | 0.5 | 0.1 |
| S-MRP-CA | 5 | 5 | 7.5 |
| S-MRP-FL | 5 | 5 | 2.5 |
| Sucralose | \ | 10 | 10 |
| Original pineapple juice | 100 mL | 100 mL | 100 mL |

Evaluation

All the samples were evaluated by a panel of 10 persons. The taste and mouth feel of the formula was compared to Sugar-free pineapple juice. The evaluation results are as follow. Method: All the samples were evaluated by a panel of 10 persons. The panel was asked to describe the taste profile according to the factors of metallic aftertaste, sweet lingering, and full body mouth feel. The intensity of the factors is shown by six levels, "–" for none, "+" for very slight, "++" for slight, "+++" for moderate, "++++" for strong, and "+++++" for very strong.

TABLE 144.2

| | No. 1 | No. 2 | No. 3 | Sugar-free pineapple juice (control) |
|---|---|---|---|---|
| Sweetness potency (SE) | 9% | 15% | 15% | 15% |
| Metallic aftertaste | – | + | + | +++ |
| sweet lingering | + | + | + | +++ |
| Full body | +++++ | +++++ | ++++ | ++++ |
| Overall likeability evaluation | Full body; Less sweet; Almost no bad taste such as metallic aftertaste and sweet lingering | Sweetness as same as control; Improvement in metallic aftertaste and sweet lingering; flavor of floral present | Sweetness as same as control; Improvement in metallic aftertaste and sweet lingering; Keep the original flavor of pineapple juice, no other flavor present | High sweetness; Lack of full body mouth feel; Serious metallic aftertaste and astringency; Significant sweet lingering |

Thaumatin: available from EPC Natural Products Co., Ltd. China, lot #20180801, the content of thaumatin is 10.74%.

Monk fruit extract, mogroside V50, available from Hunan Huacheng Biotech, Inc., China, lot #LHGE-180722, the content of mogroside V is 50.65%

RA20/TSG95, *Stevia* extract, available from Sweet Green Fields, lot #YCJ20180403; RA 27.89%, TSG (JECFA2010) 99.03%;

Conclusion:

For fruit juice formulations using sweetening agent and or high intensity sweeteners as sweeteners, the products lacked full body mouth feel, as well as having a very serious sweet lingering, bitter, astringent and metallic taste. When S-MRP or TS-MRP was used as a sweetener and a mouth feel modifier in the sugar free juice formula, it significantly overcome the original defects of the sweetening agent and or high intensity sweeteners, and the mouth feel acceptability of the product was significantly increased.

Examples 145-148

Determine the Sweetness Equivalency and Sensory Aspects of S-MRP-FL vs RA50 in Water with Sucrose and in an Application with Sucrose The materials and formula used in the following Examples are as follows.

Materials

SGF RA50 lot 3070055, available from Sweet Green Fields

RA20/TSG95 lot 20180413, available from Sweet Green Fields

S-MRP-FL lot 240-33-01, available from EPC Natural Products Co., Ltd, China, prepared according to the method of Example 67.

Sucrose

Lemon Lime Flavor

Citric Acid

Distilled Water

Mineral Water

Lemon & Lime CSD: 50% Reduced Sugar Formula

Carbonated water 92.74%

Sucrose 5.00%

Citric acid 0.12%

Sodium benzoate 0.0211%

Lemon Lime Extract NAT WONF 863.0053U 0.10%

Example 145

Comparison of Sensory Profile of S-MRP-FL vs RA50

The following samples were compared against one another in mineral water.

5% Sucrose+200 ppm RA50

5% Sucrose+200 ppm S-MRP-FL

Result: RA50 sample was ~20% sweeter than the S-MRP-FL sample. It indicated that S-MRP-FL could enhance the sweetness. In addition, the S-MRP at 200 ppm provided a much better mouth feel with a floral flavor note, and no identifiable off taste/bitterness when used in 5% sucrose.

Example 146

Comparison of Sensory Profile of S-MRP-FL vs RA50

The following samples were compared against one another in mineral water 300 ppm RA50

300 ppm S-MRP-FL 350 ppm S-MRP-FL 400 ppm S-MRP-FL 450 ppm S-MRP-FL 500 ppm S-MRP-FL Result: 300 ppm RA50 and 450 ppm S-MRP-FL were approximately as sweet as one another in mineral water, so as a standalone product S-MRP-FL is ~33% less sweet than RA50 alone. However when used in addition to sugar, the gap in sweetness appeared to be lower, indicating that the S-MRP had good sweetness enhancing effects without being overly sweet itself.

Example 147

Comparison of Sensory Profile in Lemon & Lime CSD vs RA50

The following samples were compared to one another in a Lemon & Lime base. Samples were double blinded and tasted n=1

5% Sucrose+200 ppm RA50

5% Sucrose+200 ppm S-MRP-FL

5% Sucrose+100 ppm RA50+100 ppm S-MRP-FL

5% Sucrose+100 ppm RA20+100 ppm S-MRP-FL

Result: When using 100 ppm S-MRP-FL in a L&L beverage, as the lime portion of the flavor diminishes, it was demonstrated that S-MRP could modify the lemon and lime flavor profile. In addition, the mouth feel of all the samples with S-MRP-FL was much improved over the basic RA50 sample.

Example 148

Comparison of Sensory Profile in Lemon & Lime CSD vs RA50

The following samples were compared to one another in a Lemon & Lime base. Samples were double blinded and tasted n=1.

5% Sucrose+200 ppm RA50

5% Sucrose+150 ppm RA50+50 ppm S-MRP-FL

5% Sucrose+150 ppm RA20+50 ppm S-MRP-FL

5% Sucrose+155 ppm RA50+45 ppm S-MRP-FL

5% Sucrose+155 ppm RA20+45 ppm SMRP-FL

5% Sucrose+160 ppm RA50+40 ppm S-MRP-FL

5% Sucrose+160 ppm RA20+40 ppm S-MRP-FL

Result: it was found that 160 ppm RA20+40 ppm S-MRP-FL was the best tasting sample, with low mouth-drying and good mouth feel. 200 ppm RA50 was very dry and had a low mouth feel in comparison. It was also found that the 160 ppm RA50+40 ppm S-MRP had a slightly dryer sweetness than the equivalent sample made with RA20. At 40 ppm the S-MRP added improved mouth feel and sugar-likeness, and slightly improved the Lemon aspect of the Lemon & Lime flavor. Using a higher amount than 40 ppm in this application altered the flavor of the beverage and muted the Lime aspect with a floral note. Overall, adding S-MRP modified the taste profile of both the *Stevia* extract and flavor. The combination of S-MRP with *Stevia* or other sweetening agents, high intensity synthetic sweeteners, sweeteners, and sweet enhancers can provide a satisfactory profile for taste, aroma and texture. Such combinations can be done before, during or after the Maillard reaction.

Example 149

The Improvement of S-MRP to Ketchup

Materials:

Sample Heinz Ketchup Classic as seen on the label) is original sample.

The label of Heinz Ketchup Classic is as shown in FIG. 142.

4 samples are prepared from Heinz Ketchup 50% reduced sugar & salt.

The label of Heinz Ketchup 50% reduced sugar & salt is as shown in FIG. 143.

S-MRP-FL: lot 240-89-01, available from EPC Natural Products Co., Ltd, China, prepared according to the method the same as Example 67, Experiments:

Recipe I:

Ketchup Heinz 50% Weiniger Zucker & Salz (50% less salt and sugar) with 4.5 ppm thaumatin and 25 ppm S-MRP-FL Recipe II:

Ketchup Heinz 50% Weiniger Zucker & Salz (50% less salt and sugar) 7.5 ppm thaumatin and 10 ppm S-MRP-FL Recipe III:

Ketchup Heinz 50% Weiniger Zucker & Saiz (50% less salt and sugar) with 6.75 ppm thaumatin and 12.5 ppm S-MRP-FL Reference Sample I:

Ketchup Heinz 50% Weiniger Zucker & Salz (50% less salt and sugar)

Reference Sample II:

Ketchup Heinz Classic

TABLE 149.1

| Batch/Lot No. | Sample |
|---|---|
| 03281103TK1 | Recipe I |
| 20181021TK1 | Recipe II |
| 34371027TK1 | Recipe III |
| 22281826TK1 | Reference I (Sugar & Salt Reduced) |
| 11581554TK1 | Reference II (Classic) |

Results

TABLE 149.2

| Reference I | | | |
|---|---|---|---|
| Appearance | Smell | Taste | Texture |
| Red Color, Viscous, Paste liquid | Typical concentrated tomato, Fresh, Acidic | Typical concentrated tomato, Limited mouth feel, Acidic peak, Slightly scratching | Viscous, Paste liquid |

TABLE 149.3

| Reference II | | | |
|---|---|---|---|
| Appearance | Smell | Taste | Texture |
| Red Color, Viscous, Paste liquid | Typical concentrated tomato, Fresh, Acidic | Typical concentrated Tomato, Very aromatic sweet/sour balance, Harmonic/mild acidity | Viscous, Paste liquid |

Sensory Properties

TABLE 149.4

| Recipe I (compared to Reference I) | | | |
|---|---|---|---|
| Appearance | Smell | Taste | Texture |
| No change | No change | More intense and pleasant, Harmonic, Sweeter, Slight sweetener taste, Less acidic | No change |

TABLE 149.5

| Recipe I (compared to Reference II) | | | |
|---|---|---|---|
| Appearance | Smell | Taste | Texture |
| No change | No change | Less mouth feel, Less sweet | No change |

TABLE 149.6

| Recipe II (compared to Reference I) | | | |
|---|---|---|---|
| Appearance | Smell | Taste | Texture |
| No change | No change | More pleasant and balanced, Sweeter, No acidic peak | No change |

TABLE 149.7

| Recipe II (compared to Reference II) | | | |
|---|---|---|---|
| Appearance | Smell | Taste | Texture |
| No change | No change | Mouth feel and sweetness near to reference | No change |

TABLE 149.8

| Recipe III (compared to Reference I) | | | |
|---|---|---|---|
| Appearance | Smell | Taste | Texture |
| No change | No change | More pleasant and balanced, Slightly sweeter, no acidic, but mild taste | No change |

TABLE 149.9

| Recipe III (compared to Reference II) | | | |
|---|---|---|---|
| Appearance | Smell | Taste | Texture |
| No change | No change | Mouth feel and sweetness almost comparable to reference | No change |

Conclusion: Adding different combination of *Stevia* MRPs and thaumatin can significantly improve the taste, aroma and texture for sugar and salt reduced tomato ketchup. The result indicated that all compositions in this innovation can be used for sauces, vegetable concentrate, juice concentrate etc. to improve their profile of taste, aroma and texture. Method: For evaluation, the samples were tested by a panel of four people. The panel was asked to determine the taste of each sample in comparison to a control sample without addition of the components described above. 1 trained taster tasted independently the samples first. The tester was allowed to re-taste, and then determine a description of the taste. Afterwards, another 3 tasters tasted the samples and the taste(s) was discussed amongst the testers to arrive at a suitable description. In case that more than 1 taster disagreed with the result, the tasting was repeated.

Example 150

Preparation of S-MRP-PC from *Stevia* Extract, Glutamic Acid and Galactose

*Stevia* extract: available from Sweet Green Fields, Lot #20180409, prepared according to the method the same as Example 37, final powder, RA 24.33%, RD 3.49%, TSG (according to JECFA 2010) 62.29%

35 g *Stevia* extract, 1.0 g mannose and 5 g proline were mixed. The ratio of mannose to proline was 2:1 and the ratio of *Stevia* extract to the mixture of mannose and proline is 7:3. Thus obtained mixture was dissolved into 25 g pure water. No pH regulator was added and the pH was about 5. The solution was heated at about 100 degrees centigrade for 3 hours. When the reaction complete, the reaction mixture was filtered by filter paper and the filtrate was dried by spray dryer to obtain about 41 g of an off white powder S-MRP-PC,

Example 151

Comparison of Maillard Reaction Products with or without *Stevia*

1. Materials and Equipment 1.1 Experiment Material

*Stevia* (RA 24.33%, RD 3.49%, Total Glycosides 62.29%, lot number: 20180409) was purchased from Sweet Green Fields Co., Ltd (Zhejiang, China);

Galactose (99.2%, lot number: DG170710) was purchased from Zhejiang Yixin Pharmaceutical Co., Ltd (Zhejiang, China);

L-Glutamic acid (99.2%, lot number: 20180903) was purchased from Anhui Huaheng Biotechnology Co., Ltd (Anhui, China).

1.2 Experiment Equipment

Standard Rail TriPlus RSH Base Configuration for Liquid and Headspace Injections (Thermo Fisher Scientific Co., China);

50/30 μm CAR/PDMS/DVB Extraction fiber (SUPELCO, USA);

TRACE1310 Gas Chromatography (Thermo Fisher Scientific Co., China);

ISQ7000 Mass Spectrometer (Thermo Fisher Scientific Co., China).

2. Preparation and Pretreatment of the Samples 2.1 Preparation of the Standard Maillard Reaction Products (MRPs)

Prepared from galactose and glutamic acid, lot number: 241-66-03, Example 98.

2.2 Preparation of the Citrus MRPs

Prepared from galactose, glutamic acid and *Stevia*, lot number: 241-66-02, Example 98.

2.3 Pretreatment of Samples

*Stevia*, Standard MRPs and Citrus MRPs were accurately weighed at 0.5 g and placed in 20 mL empty bottles. The three samples were dissolved in 10 ml water.

3. GC-MS Analysis of Samples

Parameters of the inlet: carrier gas was He, flow rate was 1 mL/min, the split ratio was 5:1 and injection temperature was 250° C.

Temperature program: the program was started at an initial temperature of 40° C. with a 5 min hold at 40° C., then increased 8° C./min up to 240° C. with a 5 min hold at 240° C.

Parameter of the detectors: the ion source temperature was 300° C.; the transmission line temperature was 240° C.; full scan: 33-500 amu.

Parameter of solid phase micro extraction (SPME): Samples were heated at 60° C. for 5 min, then extracted with SPME needle for 40 min, desorbed at 250° C. for 5 min.

50-100 components with the maximum response value were searched in NIST and Wiley, and the components which with matching degree more than 60% were selected for analysis.

4. Results

Total Ion Chromatography (TIC) of three samples and component analysis are shown in attached FIGS. 144*a* to 144*c* and Table 151.1 to 151.3.

The response of the two MRPs was higher than that of *Stevia*, Alkanes were the main components of *Stevia*, unsaturated hydrocarbons were the main components of the Standard MRPs while monoterpenes and sesquiterpenes were the main components of the Citrus MRPs. In addition, some characteristic components of Citrus just like limonene, bergamotol, aromadendrene oxide were found in the Citrus MRPs. The molecular structures are shown in FIGS. 145*a* to 145*f*.

TABLE 151.1

Component analysis of the *Stevia*

| RT | Component | Type | Mw. | CAS |
|---|---|---|---|---|
| 11.27 | 2,2,7,7-Tetramethyloctane | alkane | 170.335 | 1071-31-4 |
| 12.99 | 4-Isopropylidene-cyclohexanol | alcohol | | 175020-74-3 |
| 13.78 | Undecane | alkane | 156.308 | 1120-21-4 |
| 13.85 | Nonanal | aldehyde and ketone | 142.239 | 124-19-6 |
| 14.51 | Cyclopentasiloxane, decamethyl- | alkane | 370.77 | 541-02-6 |
| 15.21 | Undecane, 3-methyl- | alkane | 170.335 | 1002-43-3 |
| 15.78 | Dodecane | alkane | 170.335 | 112-40-3 |
| 15.87 | Decanal | aldehyde and ketone | 156.265 | 112-31-2 |
| 17.35 | 1-Octanol, 2-butyl- | alcohol | 186.334 | 3913-02-8 |
| 17.62 | Cyclohexasiloxane, dodecamethyl- | alkane | 444.924 | 540-97-6 |
| 17.89 | Naphthalene, 2-methyl- | arene | 142.197 | 91-57-6 |
| 18.19 | Heptadecane, 7-methyl- | alkane | 254.494 | 20959-33-5 |
| 18.41 | 2-Bromo dodecane | halohydro-carbon | 249.231 | 13187-99-0 |
| 18.61 | 1,1,5-Trimethyl-1,2-dihydronaphthalene | arene | | |
| 18.71 | 1-iodo-2-methylundecane | halohydro-carbon | 296.231 | 73105-67-6 |
| 18.81 | Tridecane, 3-methyl- | alkane | 198.388 | 6418-41-3 |
| 18.9 | 1,3-Dioxane, 4-(hexadecyloxy)-2-pentadecyl- | alkane | | 56599-40-7 |
| 19.05 | Tridecane, 3-methylene- | alkane | 196.372 | 19780-34-8 |
| 19.31 | Pentadecane | alkane | 212.415 | 629-62-9 |
| 19.48 | Naphthalene, 1,4-dimethyl- | arene | 156.224 | 571-58-4 |
| 19.71 | Naphthalene, 1,7-dimethyl- | arene | 157.224 | 575-37-1 |
| 20.14 | 1-Hexadecanol | alcohol | 242.441 | 36653-82-4 |

TABLE 151.1-continued

| Component analysis of the *Stevia* | | | | |
|---|---|---|---|---|
| RT | Component | Type | Mw. | CAS |
| 20.27 | Naphthalene, 1-ethyl- | arene | 156.224 | 1127-76-0 |
| 20.38 | Cycloheptasiloxane, tetradecamethyl- | alkane | 519.078 | 107-50-6 |
| 20.56 | 4-(2,6,6-Trimethylcyclohexa-1,3-dienyl)but-3-en-2-one | aldehyde and ketone | 190.281 | 1203-08-3 |
| 20.77 | 2-Ethyl-1-dodecanol | alcohol | 214.387 | 19780-33-7 |
| 20.9 | Pentadecane | alkane | 212.415 | 629-62-9 |
| 20.97 | Butylated Hydroxytoluene | phenol | 220.35 | 128-37-0 |
| 21.3 | Octadecane, 6-methyl- | alkane | 268.521 | 10544-96-4 |
| 21.35 | Hexadecane, 4-methyl- | alkane | 240.468 | 25117-26-4 |
| 21.42 | Tetradecane, 4-ethyl- | alkane | 226.441 | 55045-14-2 |
| 21.67 | Tetradecane, 5-methyl- | alkane | 212.415 | 25117-32-2 |
| 21.97 | Pentadecane, 3-methyl- | alkane | 226.441 | 2882-96-4 |
| 22.23 | Pentanoic acid,2,2,4-trimethyl-3-carboxyisopropyl, isobutyl ester | ester | | |
| 22.28 | 10-heneicosene | olefin | 294.558 | 95008-11-0 |
| 22.4 | Hexadecane | alkane | 226.441 | 544-76-3 |
| 22.82 | Cyclooctasiloxane, hexadecamethyl- | alkane | 593.232 | 556-68-3 |
| 23.24 | 1-Decanol, 2-hexyl- | alcohol | 242.441 | 2425-77-6 |
| 23.87 | Pentadecane, 2,6,10,14-tetramethyl- | alkane | 268.521 | 1921-70-6 |
| 24.79 | Heptadecane, 3-methyl- | alkane | 254.494 | 6418-44-6 |
| 25.18 | Eicosane | alkane | 282.547 | 112-95-8 |
| 29.98 | Eicosane, 2-methyl- | alkane | 296.574 | 1560-84-5 |

TABLE 151.2

| Component analysis of the Standard MRPs | | | | |
|---|---|---|---|---|
| RT | Component | Type | Mw. | CAS |
| 6.81 | Furfural | aromatic heterocycle | 96.084 | 98-01-1 |
| 10.51 | 2-Furancarboxaldehyde, 5-methyl- | aromatic heterocycte | 110.111 | 620-02-0 |
| 11.17 | trisiloxane,1,1,1,5,5,5-hexamethyl-3-[(trimethylsilyl)oxy]- | alkane | | |
| 12.11 | 4-phenyl-5-p-tolyl-2,5-dihydro-oxazole | aromatic heterocycte | 237.296 | 36879-73-9 |
| 12.19 | 11-Tridecenyl propionate | acid | | |
| 13.86 | Nonanal | aldehyde and ketone | 142.239 | 124-19-6 |
| 14.4 | 2,6-Dimethyl-1,3,5,7-octatetraene, E,E- | diterpenoid | 134.218 | 460-01-5 |
| 14.51 | Cyclopentasiloxane, decamethyl- | alkane | 370.77 | 541-02-6 |
| 16.14 | 5-Hydroxymethylfurfural | aromatic heterocycte | 126.11 | 67-47-0 |
| 16.23 | Furan, 3-phenyl- | aromatic heterocycte | 144.17 | 13679-41-9 |
| 17.33 | Ionone | aldehyde and ketone | 192.297 | 8013-90-9 |
| 17.63 | Cyclohexasiloxane, dodecamethyl- | alkane | 444.924 | 540-97-6 |
| 17.9 | Bicyclo[4.4.1]undeca-1,3,5,7,9-pentaene | olefin | 142.197 | 2443-46-1 |
| 18.48 | 1H-Indene, 2,3-dihydro-1,1,5,6-tetramethyl- | arene | 174.282 | 942-43-8 |
| 18.62 | 1,1,5-Trimethyl-1,2-dihydronaphthalene | arene | | |
| 19.31 | Tetradecane | alkane | 198.388 | 629-59-4 |
| 19.51 | Naphthalene, 1,7-dimethyl- | arene | 156.224 | 575-37-1 |
| 19.72 | Naphthalene, 2,6-dimethyl- | arene | 156.224 | 581-42-0 |
| 20.07 | 2,6,10,10-Tetramethyl-1-oxaspiro[4.5]decan-6-ol | alcohol | 212.3285 | 77981-89-6 |
| 20.26 | 5,8,11-Eicosatriynoic acid, methyl ester | ester | | |
| 20.38 | Cycloheptasiloxane, tetradecamethyl- | alkane | 519.078 | 107-50-6 |
| 20.57 | Methyl 6,8-octadecadiynoate | acid | | |
| 20.84 | Bicyclo[3.1.1]heptan-3-ol,3-allyl-6,6-dimethyl-2-methylene- | alcohol | | |
| 21 | Cyclohexanone, 2,6-bis(2-methylpropylidene)- | aldehyde and ketone | | 92368-82-6 |
| 21.36 | Doconexent | acid | 328.488 | 6217-54-5 |
| 21.43 | 2-Myristynoyl pantetheine | amine | | |
| 21.64 | à-Calacorene | sesquiterpene | 200.319 | 21391-99-1 |
| 21.75 | Benzene, (1,3-dimethyl-2-butenyl)- | arene | 160.255 | 50704-01-3 |
| 21.87 | Silane, trichlorodocosyl- | alkane | 444.037 | 7325-84-0 |
| 21.97 | Pentadecane, 3-methyl- | alkane | 226.441 | 2882-96-4 |

TABLE 151.2-continued

| Component analysis of the Standard MRPs | | | | |
|---|---|---|---|---|
| RT | Component | Type | Mw. | CAS |
| 22.23 | 2,2,4-Trimethyl-1,3-pentanediol diisobutyrate | ester | 286.407 | 6846-50-0 |
| 22.4 | Hexadecane | alkane | 226.441 | 544-76-3 |
| 22.57 | (1R,7S,E)-7-Isopropyl-4,10-dimethylenecyclodec-5-enol | sesquiterpene | 220.35 | 81968-62-9 |
| 22.74 | à-Corocalene | sesquiterpene | 200.319 | 20129-39-9 |
| 22.82 | Cyclooctasiloxane, hexadecamethyl- | alkane | 593.232 | 556-68-3 |
| 23.02 | 10-Heptadecen-8-ynoic acid, methyl ester, (E)- | ester | 278.43 | 16714-85-5 |
| 23.24 | 1-Hexadecanol | alcohol | 242.441 | 36653-82-4 |
| 23.3 | Cholestan-3-ol, 2-methylene-, (3á,5à)- | alcohol | | 22599-96-8 |
| 23.55 | Naphthalene, 1,6-dimethyl-4-(1-methylethyl)- | sesquiterpene | 198.303 | 483-78-3 |
| 23.88 | Heptadecane, 2,6-dimethyl- | alkane | 268.521 | 54105-67-8 |
| 24.13 | Heptadecane, 2,3-dimethyl- | alkane | 268.521 | 61868-03-9 |
| 24.42 | Octadecane, 2-methyl- | alkane | 268.521 | 1560-88-9 |
| 24.71 | Trihexadecyl borate | ester | 735.109 | 2665-11-4 |
| 24.79 | Heptadecane, 3-methyl- | alkane | 254.494 | 6418-44-6 |
| 25.18 | Eicosane | alkane | 282.547 | 112-95-8 |
| 25.27 | Hexadecane, 2,6,10,14-tetramethyl- | alkane | 282.547 | 638-36-8 |
| 27.13 | Dibutyl phthalate | ester | 278.344 | 84-74-2 |

TABLE 151.3

| Component analysis of the Citrus MRPs | | | | |
|---|---|---|---|---|
| RT | Component | Type | Mw. | CAS |
| 11.28 | 1-Bromo-3,7-dimethyl-2,6-octadiene | diterpenoid | 217.146 | 35719-26-7 |
| 11.64 | Carveol | diterpenoid | 152.233 | 99-48-9 |
| 12.21 | D-Limonene | diterpenoid | 136.234 | 5989-27-5 |
| 12.51 | Benzeneacetaldehyde | diterpenoid | 120.148 | 122-78-1 |
| 12.6 | á-Ocimene | diterpenoid | 136.234 | 13877-91-3 |
| 13.48 | Cyclohexene, 3-methyl-6-(1-methylethylidene)- | diterpenoid | 136.234 | 586-63-0 |
| 13.77 | Linalool | diterpenoid | 154.249 | 78-70-6 |
| 14.4 | 2,6-Dimethyl-1,3,5,7-octatetraene,E,E- | diterpenoid | 134.218 | 460-01-5 |
| 14.51 | Cyclopentasiloxane, decamethyl- | alkane | 370.77 | 541-02-6 |
| 15.22 | Falcarinol | sesquiterpene | 244.372 | 21852-80-2 |
| 15.71 | à-Terpineol | diterpenoid | 154.249 | 98-55-5 |
| 15.78 | Dodecane | alkane | 170.335 | 112-40-3 |
| 16.05 | Naphthalene, 1,2,3,4-tetrahydro-1,1,6-trimethyl- | arene | 174.282 | 475-03-6 |
| 16.14 | 3-Cyclohexene-1-acetaldehyde, à,4-dimethyl- | aldehyde and ketone | 152.233 | 29548-14-9 |
| 16.23 | Furan, 3-phenyl- | aromatic heterocycte | 144.17 | 13679-41-9 |
| 16.37 | Bicyclo[2.2.1]hept-2-ene, 1,7,7-trimethyl- | olefin | 136.234 | 464-17-5 |
| 16.69 | 2,6-Octadien-1-ol, 3,7-dimethyl-, (Z)- | diterpenoid | 154.249 | 106-25-2 |
| 16.85 | Naphthalene, 1,2,3,4-tetrahydro-1,1,6-trimethyl- | arene | 174.282 | 475-03-6 |
| 16.93 | 1H-Indene, 2,3-dihydro-1,1,5,6-tetramethyl- | arene | 174.282 | 942-43-8 |
| 17.33 | Ionone | aldehyde and ketone | 192.297 | 8013-90-9 |
| 17.63 | Cyclohexasiloxane, dodecamethyl- | alkane | 444.924 | 540-97-6 |
| 17.99 | 1H-Indene, 2,3-dihydro-1,1,5,6-tetramethyl- | arene | 174.282 | 942-43-8 |
| 18.62 | 1,1,5-Trimethyl-1,2-dihydronaphthalene | arene | | |
| 18.71 | 4-(2,6,6-Trimethylcyclohexa-1,3-dienyl)but-3-en-2-one | aldehyde and ketone | 190.281 | 1203-08-3 |
| 18.82 | Tridecane, 3-methyl- | alkane | 198.388 | 6418-41-3 |
| 19.05 | Tridecane, 3-methylene- | alkane | 196.372 | 19780-34-8 |
| 19.22 | (E)-1-(2,3,6-trimethylphenyl)buta-1,3-diene | arene | | |
| 19.31 | Tetradecane | alkane | 198.388 | 629-59-4 |

TABLE 151.3-continued

| Component analysis of the Citrus MRPs | | | | |
|---|---|---|---|---|
| RT | Component | Type | Mw. | CAS |
| 20.07 | 2,6,10,10-Tetramethyl-1-oxaspiro[4.5]decan-6-ol | alcohol | 212.3285 | 77981-89-6 |
| 20.27 | Hexadecanethiol | alcohol | 258.506 | 25360-09-2 |
| 20.38 | Cycloheptasiloxane, tetradecamethyl- | alkane | 519.078 | 107-50-6 |
| 20.57 | Bergamotol, Z-à-trans- | sesquiterpene | 220.35 | 88034-74-6 |
| 20.84 | Bicyclo[4.4.0]dec-2-ene-4-ol,2-methyl-9-(prop-1-en-3-ol-2-yl)- | alcohol | | |
| 21.01 | methyl 4-heptylbenzoate | acid | 234.334 | 6892-80-4 |
| 21.1 | α-agarofuran | aromatic heterocycte | 220.35 | 5956-12-7 |
| 21.36 | Octadecane, 6-methyl- | alkane | 268.521 | 10544-96-4 |
| 21.43 | Tetradecane, 4-ethyl- | alkane | 226.441 | 55045-14-2 |
| 21.63 | β-calacorene | sesquiterpene | 200.319 | 50277-34-4 |
| 21.87 | Sulfurous acid, pentyl tetradecyl ester | ester | | |
| 21.97 | Pentadecane, 3-methyl- | alkane | 226.441 | 2882-96-4 |
| 22.18 | Isolongifolene, 4,5,9,10-dehydro- | sesquiterpene | | 156747-45-4 |
| 22.4 | Hexadecane | alkane | 226.441 | 544-76-3 |
| 22.56 | Aromadendrene oxide | sesquiterpene | | 22489-11-8 |
| 22.74 | Isolongifolene, 4,5,9,10-dehydro- | sesquiterpene | | 156747-45-4 |
| 22.82 | Cyclooctasiloxane, hexadecamethyl- | alkane | 593.232 | 556-68-3 |
| 23.24 | Hexadecanol | alcohol | 242.441 | 36653-82-4 |
| 23.88 | Tetradecane, 2,6,10-trimethyl- | alkane | 240.468 | 14905-56-7 |
| 24.79 | Heptadecane, 3-methyl- | alkane | 254.494 | 6418-44-6 |

Conclusion:

Compared with the Standard MRPs, the Citrus MRPs contained large amounts of monoterpenes and sesquiterpenes. These components are new products of the Maillard reaction which *Stevia* was involved in. They were not found in neither the Standard MRPs nor the *Stevia*. Furthermore, there were some characteristic components of Citrus in the new products, such as limonene, bergamotol, aromadendrene oxide. It was consistent with the sensory evaluation of the researchers, that there was no Citrus flavor in the standard MRPs, while a new and stronger Citrus flavor appeared after *Stevia* was added.

Example 152

*Stevia*-Derived MRP Improves Taste of Beverages

TABLE 152.1

| | | Test Ice Tea, Joint opinion 8 tasters *Stevia*-derived MRP (ppm) Lot no. 24051-01 | |
|---|---|---|---|
| Product | Tangerine | Sweetness (potency, profile) | Flavor (increase, modified) |
| Ice Tea basis Peach (concentrate diluted to drinking strength, no sugar) | — | No sweetness, void | Bitter, adstringent, artificial peach |
| | 5 | No difference to zero sample | Slightly less bitter |
| | 10 | Still no sweet taste, improved mouth feel | Less bitter and astringent |
| | 50 | Slightly sweet taste, improved mouth feel | Less bitter and astringent, flavor more harmonic, smoother |
| | 100 | Sweet taste, acceptable mouth feel, slight lingering | Harmonic bitter/flavor balance, peach flavor improved, smoother |
| | 200 | Sweet taste (but not sweet enough), perfect mouth feel, lingering | Harmonic bitter/flavor balance, peach flavor improved, smoother |

TABLE 152.1-continued

| | | Test Ice Tea, Joint opinion 8 tasters *Stevia*-derived MRP (ppm) Lot no. 24051-01 | |
|---|---|---|---|
| Product | Tangerine | Sweetness (potency, profile) | Flavor (increase, modified) |
| | 500 | Sweet, strong lingering, bitter/metallic off-taste | Unpleasant bitter off notes, reduced flavor perception due to *Stevia*-off notes |

Conclusion: sweetening agent derived MRPs can improve the mouth feel, enhance the flavor, and harmonize the overall taste and aroma of no sugar flavored beverages such as a tea beverage.

TABLE 152.2

| | | Test Ice Tea, Joint opinion 8 tasters Stevia-derived MRP (ppm)-Lot number: 24051-01 | |
|---|---|---|---|
| Product | Tangerine | Sweetness (potency, profile) | Flavor (increase, modified) |
| Ice Tea basis Peach (concentrate diluted to drinking strength, 5% sugar) | — | Sweet sugar taste, slightly void | Bitter, adstringent, artificial peach |
| | 10 | Sweetness unchanged, less void | Slight flavor improvement (stronger, more natural) |
| | 50 | More sweet than zero sample, improved mouth feel | Less bitter, more harmonic flavor, flavor more intense |
| | 100 | Sweetness enjoyable, mouth feel good | Harmonic bitter/flavor balance, flavor more intense, fruity and smoother |
| | 200 | Sweetness enjoyable/almost too sweet, mouth-feel perfect, slight off-notes | Harmonic bitter/flavor balance, flavor more intense and smoother, more natural taste |

TABLE 152.2-continued

| Product | Tangerine | Test Ice Tea, Joint opinion 8 tasters Stevia-derived MRP (ppm)-Lot number: 24051-01 Sweetness (potency, profile) | Flavor (increase, modified) |
|---|---|---|---|
| | 500 | Sweetness too high, mouth feel too viscous, Off-notes | Unpleasant bitter offnotes, reduced flavor perception due to Stevia-off notes |

Conclusion: Sweetening agent derived MRPs can improve the mouth feel, enhance the intensity of flavor, and harmonize the overall taste and aroma of low sugar flavored beverages such as a tea beverage.

TABLE 152.3

| Product | Flora | Test Ice Tea, Joint opinion 8 tasters Stevia-derived MRPs (ppm) Lot number 240-71-01 Sweetness (potency, profile) | Flavor (increase, modified) |
|---|---|---|---|
| Ice Tea basis Peach (concentrate diluted to drinking strength, no sugar) | — | No sweetness, void | Bitter, astringent, artificial peach |
| | 5 | No difference to zero sample | Slightly less bitter, flowery notes |
| | 10 | No difference to zero sample, less void | Less bitter, less astringent, fresh peach flavor |
| | 50 | Slightly sweet taste, improved mouth feel | Less bitter, less astringent, flavor more smooth and natural |
| | 100 | Sweet taste (not sweet enough), improved mouth feel, slight lingering | Harmonic bitter and aromatic, peach flavor improved, smoother |
| | 200 | Sweet taste, mouth feel acceptable, slightly, lingering | Harmonic bitter/flavor balance, peach flavor improved, more natural |
| | 500 | Sweet, strong lingering, bitter (Stevia) off-taste | Unpleasant bitter offnotes, reduced flavor perception due to Stevia-off notes but still fresh peach taste |

Conclusion: Sweetening derived MRPs can improve the mouth feel, enhance the freshness of flavor, and harmonize the overall taste and aroma of sugar free flavored tea beverages.

TABLE 152.4

| Product | Flora | Test Ice Tea, Joint opinion 8 tasters *Stevia*-derived MRPs (ppm) Lot number 240-71-01 Sweetness (potency, profile) | Flavor (increase, modified) |
|---|---|---|---|
| Ice Tea basis Peach (concentrate diluted to drinking strength, 5% sugar) | — | Sweet sugar taste, slightly void | Bitter, astringent, artificial peach |
| | 10 | Sweetness unchanged, less void | Flavor more intense, less artificial |
| | 50 | More sweet than zero sample, improved mouth feel | Less bitter, Flavor more intense, less artificial, flowery notes |
| | 100 | Sweetness enjoyable, mouth feel perfect | Harmonic bitter/flavor balance, flavor more intense, improved smell and taste (more fruity) |
| | 200 | Too sweet, mouth feel perfect, slight bitter/metallic off-taste | Harmonic bitter/flavor balance, flavor more intense, improved smell and taste (fresh, fruity peach) |
| | 500 | Too sweet, mouth feel still perfect, clear bitter/metallic off-taste | Unpleasant bitter/metallic off-notes, flavor perception due to *Stevia*-off notes |

Conclusion: Sweetening agent derived MRPs can improve the mouth feel, enhance the intensity of flavor and harmonize the overall taste and aroma of low sugar flavored tea beverages

TABLE 152.5

| Product | Flora | Test Vegetable Juice, Joint opinion 8 tasters *Stevia*-derived MRP (ppm) lot number 240-71-01 Sweetness (potency, profile) | Flavor (increase, modified) |
|---|---|---|---|
| Carrot Juice (freshly squeezed, no added sugar) | — | Sweet, slightly watery/void | fresh, typical carrot, pleasant taste |
| | 10 | Sweetness unchanged, less watery/void | Flavor more fresh, more intense carrot |
| | 50 | More Sweet, mouth feel slightly improved | Flavor more fresh, more intense carrot and flower |
| | 100 | Sweetness perfect, mouth feel perfect, more harmonic | Flavor more intense, fresh carrot and pleasant flowery/grassy notes |
| | 200 | Sweetness too high, mouth feel overdone (viscous), slight lingering | Flavor more intense, fresh carrot, too much flowery/grassy notes |
| | 500 | Sweetness too high, mouth feel overdone (viscous), lingering, off-taste | Flavor more intense, fresh carrot, substantially too much flowery/grassy notes, *Stevia* off-taste |

Conclusion: Sweetening agent derived MRP, can improve the mouth feel, enhance the freshness of flavor, harmonize the overall taste and aroma of without added sugar in a vegetable juice such as carrot juice.

TABLE 152.6

| Product | Flora | Test Vegetable Juice, Joint opinion 8 tasters *Stevia*-derived MRPs (ppm) Lot Number 240-71-01 Sweetness (potency, profile) | Flavor (increase, modified) |
|---|---|---|---|
| Tomato Juice (commercial product Rauch Happy Day, 3% sugar) | — | slightly sweet, mouth feel acceptable | fresh, typical tomato, pleasant taste |
| | 10 | No difference to zero sample | Flavor more intense, tomato and herbal notes |
| | 50 | More sweet, mouth feel unchanged | Flavor more intense, tomato/herbal notes, less acidic, harmonic |
| | 100 | More sweet, mouth feel increased | Flavor more intense, tomato/strong herbal notes, less acidic, harmonic, pleasant |
| | 200 | Too sweet, mouth feel sticky, slight lingering | Flavor more intense, tomato/strong herbal notes, less acidic, not pleasant |

TABLE 152.6-continued

| Product | Test Vegetable Juice, Joint opinion 8 tasters *Stevia*-derived MRPs (ppm) Lot Number 240-71-01 Flora | Sweetness (potency, profile) | Flavor (increase, modified) |
|---|---|---|---|
| | 500 | Sweetness too high, mouth feel overdone (sticky lingering, off-taste | Flavor more intense, unbalanced tomato/herbal notes, unpleasant pleasant |

Conclusion: Sweetening agent derived MRPs can improve the mouth feel, enhance the flavor and harmonize the overall taste and aroma of low sugar vegetable juice such as Tomato Juice.

TABLE 152.7

| Product | Test Yogurt, Joint opinion 8 tasters *Stevia*-derived MRPs (ppm) Lot number 240-71-01 Flora | Sweetness (potency, profile) | Flavor (increase, modified) |
|---|---|---|---|
| Fruit Cocktail Yogurt (Commercial product, NOM, 14% sugar) | — | Sweet taste, sugarlike, mouth feel acceptable | Typical for the product, fruity (orange, cherry, strawberry) and milky/acidic |
| | 10 | Slight change in sweetness perception | Flavor more intense, fresh notes, more balanced sweet/sour taste |
| | 50 | More (too) sweet, mouth feel optimized | Flavor more intense, fresh notes, more balanced sweet/sour taste, harmonic |
| | 100 | Too sweet, mouth feel increased (more creamy) | Flavor more intense, herbal notes, optimum balance sweet/sour taste, harmonic |
| | 200 | Too sweet, lingering | Flavor more intense, too much herbal/grassy notes, balanced sweet/sour taste, harmonic |
| | 500 | Too sweet, lingering, off-notes (*Stevia*) | Unpleasant, off-notes, sticky, over-flavored |

Conclusion: Sweetening agent derived MRPs can improve the mouth feels rear intensify the flavor, harmonize the overall taste and flavor of full sugar fruited food such as yogurt.

TABLE 152.8

| Product | Test Yogurt, Joint opinion 8 tasters *Stevia*-derived MRPs (ppm) Lot number 240-51-01 Tangerine | Sweetness (potency, profile) | Flavor (increase, modified) |
|---|---|---|---|
| Mango Yogurt (Commercial product, NÖM no, fat, 5% sugar) | — | Sweet taste, sugarlike, mouth feel ok, but "artificial" | Typical for the product, fruity (mango) and milky/acidic |
| | 10 | Slight increase in sweetness perception, improved mouth feel | More intense mango flavor |
| | 50 | More sweet, mouth feel improved | More intense mango flavor, improved sweet/sour balance |
| | 100 | Sweetness optimal, mouth feel enjoyable | More intense mango flavor, optimized sweet/sour balance |
| | 200 | Too sweet, mouth feel acceptable, lingering | More intense mango flavor, sweet/sour balance overlaid by *Stevia* off-taste |
| | 500 | Too sweet, lingering, off-notes (*Stevia*) | Unpleasant, off-notes, sticky, over-flavored |

Conclusion: Sweetening agent derived MRI's can improve the mouth feel, enhance the fruit flavor and harmonize the overall taste and aroma of no fat, less sugar flavored foods such as yogurt.

TABLE 152.9

| Product | Test Sugar Free Orange Beverage, Joint opinion 8 test persons *Stevia*-derived MRPs (ppm) Lot number 240-51-01 Tangerine | Sweetness (potency, profile) | Flavor (increase, modified) |
|---|---|---|---|
| Sugar free, Orange Taste Brand Name Grobi (Sweetener: Na-cyclamate, Acesulfam K, Na-saccharine and Aspartame) | — | Artificial sweet, void (lack of mouth feel) | Typical for the product range, slightly artificial, bitter/metallic, orange smell |
| | 50 | Still artificial sweet, less void | Flavor more intense, more fresh orange, less bitter/metallic, harmonic |
| | 100 | Traces of artificial sweetness, improved mouth feel | Flavor more intense, more fresh orange, harmonic sweet/sour balance, no bitterness |
| | 200 | Pleasant sugar-similar sweetness, mouth feel substantially improved | Flavor more intense, more fresh orange, harmonic sweet/sour balance, no bitterness |

Conclusion: Sweetening agent-derived MRPs can improve the mouth feel, intensity of flavor and harmonize overall taste and aroma of added synthetic high intensity sweeteners in sugar free fruit-flavored beverage.

TABLE 152.10

| Product | Test Cocoa low fat milk, Joint opinion 8 test persons *Stevia*-derived MRPs (ppm) Lot number 240-51-01 Chocolate | Sweetness (potency, profile) | Flavor (increase, modified) |
|---|---|---|---|
| Cocoa prepared with cocoa powder (Brand Sacher) in low fat milk 0.9% | — | Slight Sweetness, void (watery) taste | Typical for the product, bitter, astringent |
| | 50 | Slightly sweeter, still void (watery) taste | Less bitter, less astringent, slight chocolate notes |

TABLE 152.10-continued

| Product | Test Cocoa low fat milk, Joint opinion 8 test persons *Stevia*-derived MRPs (ppm) Lot number 240-51-01 Chocolate | Sweetness (potency, profile) | Flavor (increase, modified) |
|---|---|---|---|
| (Nöm Fastenmilch) with 3% | 100 | Sweeter, less void (watery) taste | Cacao/chocolate smell and taste, bitter/sweet balance |
| Sugar added | 200 | Sweetness adequate, mouth feel substantially improved | Harmonic cacao/ chocolate smell and taste, harmonic bitter/sweet balance |

Conclusion: Sweetening agent—derived MRPs can improve the mouth feel and harmonize the taste and aroma of low fat, low sugar Cocoa Milk.

Example 153

Test with Standard MRPs as Flavors

TABLE 153.1

Preparation of standard MRPs used as is after reaction

| Reactants | Solvent | Time, min | T, ° C. | Smell | Color | Taste |
|---|---|---|---|---|---|---|
| 3.3 mM Phe | 1 ml $H_2O$ + | 40 | 100 | Flower, Bloomy | brown | sweet |
| 3.3 mM Phe + 10 mM Glc | 9 ml Glycerol | | | Flower, Bloomy | brown | sweet |
| 3.3 mM Phe + 10 mM Xyl | | | | Nutmeg | brown | sweet |
| 10 mM Thr | | | | Vanilla, Popcorn | yellow | sweet |
| 10 mM Thr + 10 mM Glc | | | | Cotton Candy | yellow | Sweet |
| 10 mM Thr + 10 mM Xyl | | | | Burnt sugar | yellow | Sweet |

Phe . . . phenylalanine,
Thr . . . threonine,
Glc . . . glucose,
Xyl . . . xylose
Above flavors were added directly to the applications after the reaction and cooling rapidly (on ice).

Phe . . . phenylalanine, Thr . . . threonine, Glc . . . glucose, Xyl . . . xylose Above flavors were added directly to the applications after the reaction and cooling rapidly (on ice).

Test 1

1000 ppm (=1 g/l) were added to plain yogurt (low fat 1%, NÖM Fasten), test sults given are the joint opinion of 8 tasters. Method: For evaluation, the samples were tested by a panel of eight people. The panel was asked to determine the taste of each sample in comparison to a control sample without addition of the components described above. 1 trained taster tasted independently the samples first. The tester was allowed to re-taste, and then determine a description of the taste. Afterwards, another 7 tasters tasted the samples and the taste(s) was discussed among the testers to arrive at a suitable description. In case that more than 1 taster disagreed with the result, the tasting was repeated. This test was used in the examples that follow.

TABLE 153.2

| Reactants | Smell | Color | Taste |
|---|---|---|---|
| — | Milky, acidic | White | Typical for low fat yogurt, harsh acidity, slightly watery, refreshing |
| 3.3 mM Phe | Milky, Acidic, Bloomy notes | Slightly yellow | Bloomy notes, type of savory (salad dressing), harmonic acidity |
| 3.3 mM Phe + 10 mM Glc | Milky, Acidic, Bloomy notes | Slightly yellow | Bloomy notes, sweet, light dessert course cream taste, harmonic acidity, increased mouth feel |
| 3.3 mM Phe + 10 mM Xyl | Milky, Acidic, Nutmeg | Slightly yellow | Nutmeg notes, sweet, type of savory (grill sauce), harmonic acidity |
| 10 mM Thr | Vanilla, Popcorn | white | Vanilla notes, sweet, light dessert course cream taste, harmonic acidity |
| 10 mM Thr + 10 mM Glc | Cotton Candy | white | Cotton Candy, sweet, ice cream basis/sauce, harmonic acidity, increased mouth feel |
| 10 mM Thr + 10 mM Xyl | Burnt sugar | white | Burnt sugar taste, slightly bitter, |

The standard MRPs tested exerted a clear flavoring effect and a moderate flavor modifying effect.

Test 2

1000 ppm (=g/l) were added to sparkling water (Römerquelle), test results given are the joint opinion of 8 tasters.

Method: The same as test 1 above.

TABLE 153.3

| Reactants | Smell | Color | Taste |
|---|---|---|---|
| — | None | None | Typical for sparkling water, slightly salty and metallic |
| 3.3 mM Phe | Bloomy notes | Slightly yellow | Bloomy notes, less salty |
| 3.3 mM Phe + 10 mM Glc | Bloomy notes | Slightly yellow | Bloomy notes, sweet, less salty, increased mouth feel |
| 3.3 mM Phe + 10 mM Xyl | Nutmeg, herbal notes | Slightly yellow | Nutmeg notes, sweet, less salty, harmonic overall taste, smoother |
| 10 mM Thr | Vanilla, Popcorn | white | Vanilla and caramel notes, sweet |
| 10 mM Thr + 10 mM Glc | Cotton Candy | white | Cotton Candy, sweet, less salty, slightly astringent, harmonic overall taste, smooth |
| 10 mM Thr + 10 mM Glc | Burnt sugar | white | Burnt sugar taste, sweet and bitter, astringent |

The standard MRPs tested exerted a clear flavoring effect.

Test 3

1000 ppm (=1 g/l) were added to green tea (tea bags, Teekanne, prepared according to instructions), test results given are the joint opinion of 8 tasters.

Method: The same as that of Test 1 above.

TABLE 153.4

| Reactants | Smell | Color | Taste |
|---|---|---|---|
| — | Herbal, Tea | Greenish/Yellow | Typical for green tea, aromatic, bitter, astringent |
| 3.3 mM Phe | Herbal notes more intense | Greenish/Yellow | Aromatic, more intense, bitter astringent |
| 3.3 mM Phe + 10 mM Glc | Herbal notes more intense, more fresh | Greenish/Yellow | Slightly sweet, aromatic, more intense, fresher, less bitter and astringent, less watery. |
| 3.3 mM Phe + 10 mM Xyl | Herbal and Nutmeg notes | Greenish/Yellow | Slightly sweet, aromatic, herbal and nutmeg taste, less bitter and astringent |
| 10 mM Thr | Herbal and vanilla notes | Greenish/Yellow | Slightly sweet, aromatic, herbal and vanilla taste, less astringent. |
| 10 mM Thr + 10 mM Glc | Herbal and sweet notes | Greenish/Yellow | Slightly sweet, aromatic, herbal taste, less astringent, less watery |
| 10 mM Thr + 10 mM Glc | Herbal and burnt sugar notes | Greenish/Yellow | Slightly sweet, aromatic, herbal taste, bitter, astringent, pleasant |

The standard MRPs tested exerted a clear flavoring effect and a moderate flavor modifying effect.

Example 154

Test with Standard MRPs as Flavors

TABLE 154.1

Preparation of standard MRPs used in a 1:10 dilution in glycerol after preparation.

| Reactants | Solvent | Time, min | T, ° C. | Smell[1)] | Color[1)] | Taste[1)] |
|---|---|---|---|---|---|---|
| 10 mM Phe + 10 mM Xyl | 300 μl 0.1M $KH_2PO_4$-Puffer, pH 7.8 | 10 | 170 | Bloomy, Flowery | light brown | Slightly sweet and salty, aromatic, bloomy notes |
| 10 mM Ala + 10 mM Xyl | | | | Coffee | light brown | Slightly sweet and salty, aromatic bitter |
| 10 mM Lys + 10 mM Xyl | | | | Sweet, Honey, Popcorn | light brown | Slightly sweet and salty, honey notes |
| 10 mM Gln + 10 mM Xyl | | | | Umami | light brown | Slightly sweet and salty, aromatic, savory taste |
| 10 mM Phe + 10 mM Ala + 10 mM Lys + 10 mM Gln + 40 mM Xyl | 1200 μl 0.1M $KH_2PO_4$-Puffer, pH 7.8 | | | Pleasant, honey, caramel, bloomy, meat, Barbecue | light brown | Slightly sweet and salty, aromatic, honey, caramel and umami notes, savory taste |

Ala . . . alanine,
Lys . . . lysine,
Gln . . . glutamic acid
[1)]. . . after dilution with glycerol Test 1

TABLE 154.2

Comparison of a mixture of single amino acid/xylose MRPs versus a combined reaction MRP

| Reactants | Smell | Color | Taste |
|---|---|---|---|
| Mixture (1:1:1:1): 10 mM Phe + 10 mM Xyl 10 mM Ala + 10 mM Xyl | Umami, honey and bloomy notes | light brown | Slightly sweet and salty, aromatic bitterness, honey and umami notes |

TABLE 154.2-continued

| Comparison of a mixture of single amino acid/xylose MRPs versus a combined reaction MRP | | | |
|---|---|---|---|
| Reactants | Smell | Color | Taste |
| 10 mM Lys + 10 mM Xyl<br>10 mM Gln + 10 mM Xyl | | | (sweetened soup), slightly astringent |
| Combined reaction of 10 mM Phe + 10 mM Ala + 10 mM Lys + 10 mM Gln + 40 mM Xyl | Pleasant, honey, caramel, bloomy, meat, barbecue | light brown | Slightly sweet and salty, aromatic, honey, caramel and umami notes, savory taste, slightly astringent |

A mixture of single amino acid and single sugar MRPs (Phe+Xyl, Ala+Xyl, Lys+Xy, Gly+Xyl), yields a flavor and taste profile which is similar but distinguishable from a combined reaction of all amino acids with a single sugar (Phe+Ala+Lys+Gly+Xyl).

Test 2

TABLE 154.3

| Comparison of a mixture of single amino acid/xylose MRPs with a combined reaction MRP (1000 ppm after dilution added to sour cream with parsley, chive and garlic [sauce for oven baked potatoes]) | | | |
|---|---|---|---|
| Reactants | Smell | Color | Taste |
| — | Sour cream, garlic, parsley, chive | White with green particles | Sour cream, acidic, garlic, parsley, chive |
| Mixture (1:1:1:1):<br>10 mM Phe + 10 mM Xyl<br>10 mM Ala + 10 mM Xyl<br>10 mM Lys + 10 mM Xyl<br>10 mM Gln + 10 mM Xyl | Sour cream, garlic, parsley, chive, umami, honey and bloomy notes | White with green particles | Sour cream, garlic, parsley, chive Harmonic sweet/sour balance, honey and umami notes, more full-bodied |
| Combined reaction of 10 mM Phe + 10 mM Ala + 10 mM Lys + 10 mM Gln + 40 mM Xyl | Sour cream, garlic, parsley, chive, honey, caramel meat notes | White with green particles | Sour cream, garlic, parsley, chive Harmonic sweet/sour balance, pleasant honey, caramel and savory notes, smoother |

A mixture of single amino acid and single sugar MRPs (Phe+Xyl, Ala+Xyl, Lys+Xy, Gln+Xyl), yields a flavor and taste profile which is similar but distinguishable from a combined reaction of all amino acids with a single sugar (Phe+Ala+Lys+Gly+Xyl).

Example 155

Investigations for MRPs Samples with/without *Stevia* Extract

A series of samples were prepared and tested for antioxidant potential, sensory properties and the effect in various applications.

*Stevia* Extract Materials:

1) RA20/TSG(9)95;

2) RA80/TSG(9)95;

3) Sample A: the compositions was as follows:

TABLE 155.1

| Lot # | RD | RA | STV | RF | RC | Dulc A | RUB | RB | STB | RM | TSG(9) |
|---|---|---|---|---|---|---|---|---|---|---|---|
| 20180402 | 3.61 | 22.39 | 21.16 | 1.51 | 9.35 | 0.8 | 0.41 | 0.03 | 0.29 | 1.81 | 61.36 |
| 20180501-1 | 3.07 | 26.47 | 22.97 | 1.9 | 10.24 | 0.97 | 0.44 | 1 | 0.57 | 2.54 | 70.17 |
| 20180503-1 | 5.35 | 25.74 | 18.87 | 2.11 | 11.41 | 0.56 | 0.34 | 2.01 | 0.86 | 3.22 | 70.47 |
| 20180505-1 | 6.33 | 21.68 | 14.96 | 1.7 | 9.09 | 0.41 | 0.2 | 3.84 | 1.68 | 3.84 | 63.73 |
| 20180507-1 | 5.59 | 25.06 | 21.2 | 1.7 | 8.89 | 0.42 | 0.18 | 1.91 | 0.85 | 2.98 | 68.78 |
| 20180509-1 | 8.06 | 31.11 | 9.48 | 1.69 | 8.67 | 0.29 | 0.16 | 2.82 | 0.96 | 3.41 | 66.65 |

4) Sample B: the composition was as follows:

TABLE 155.2

| Lot # | RD | RA | STV | RF | RC | Dulc A | RUB | RB | STB | RM | TSG(9) |
|---|---|---|---|---|---|---|---|---|---|---|---|
| 20180408 | 1.52 | 25.04 | 30.63 | 1.99 | 11.43 | 1.26 | 0.77 | 0.11 | 0.82 | 0.69 | 74.26 |
| 20180501-2 | 0.32 | 22.31 | 33.34 | 2.63 | 14.65 | 2.35 | 2.11 | 1.88 | 1.06 | 0.2 | 80.85 |
| 20180503-2 | 0.34 | 20.96 | 28.32 | 2.76 | 16.47 | 1.8 | 1.61 | 2.68 | 2.3 | 0.37 | 77.61 |
| 20180505-2 | 1.15 | 26.07 | 29.31 | 2.96 | 17.16 | 1.57 | 1.32 | 1.89 | 0.67 | 0.64 | 82.74 |
| 20180507-2 | 0.44 | 24.73 | 34.07 | 2.56 | 14.86 | 1.69 | 1.47 | 2.34 | 0.43 | 0.52 | 83.11 |

Sample Preparation:

Type "Floral": 0.67 g Xylose and 0.33 g phenylalanine were dissolved with or without 4 g RA20/TSG(9)95 in 2.50 g deionized water. The solution was heated to 100° C. for 2. hours in a drying oven. After cooling to room temperature, the samples were diluted to 25 ml with water.

Type "Tangerine": 0.80 g galactose and 1.00 g glutamic acid were dissolved with or without 10.0 g Sample A in 4.00 g deionized water. The solution was heated to 100° C. for 2 hours in a drying oven. After cooling to room temperature, the samples were diluted to 25 ml with water.

Type "Popcorn": 1.00 g galactose and 0.50 g proline were dissolved with or without 3.5 g Sample A in 2.50 g deionized water. The solution was heated to 100° C. for 3 hours in a drying oven. After cooling to room temperature, the samples were diluted to 25 ml with water.

Type "Chocolate": 1.00 g xylose and 0.50 g valine were dissolved with or without 3.50 g RA80/TSG(9)95 in 2.5 g deionized water. 0.50 g propylene glycol was added to the reaction mixture. The solution was heated to 120° C. for 0.75 hours in a drying oven. After cooling to room temperature, the samples were diluted to 25 ml with water.

From the samples prepared with steviol-glycosides, powdered samples were obtained from EPC. (SG-MRP Flora Lot #240-71-01, SG-MRP Tangerine Lot #240-51-01, SG-MRP Popcorn Lot #211-31-24, SG-MRP Chocolate Lot #211-23-46). 500 mg of each sample was dissolved in 25 ml water and subjected to the tests.

DPPH Test for Anti-Oxidant Potential

A 0.1 mM solution of 1,1-Diphenyl-2-picrylhydrazyl radical (DPPH) was prepared in ethanol, calibration samples were prepared with Ascorbic acid in a concentration of 0-1 mg/mL in water; as a negative control sample water was used. The reacted samples were assayed after dilution with water. Powdered samples were weighed in and dissolved in water (500 mg/25 ml) and if applicable further diluted.

0.2 ml sample (or calibration standard) solution was mixed with 0.2 ml solution of DPPH° (0.1 mM) and 3.6 ml methanol. The mixture was reacted-protected from light- at room temperature for 30 min. After 3 minutes the absorbance at 517 nm was obtained against ethanol. Quantification was performed by linear regression of calibration test results for ascorbic acid. The test results are given as ascorbic acid equivalents.

The following tables shows the test results for the DPPH test of the samples tested.

As seen in the first table below, the samples prepared with the steviol-glycosides Sample A and RA80/TSG(9)95 yielded a massive increase in the anti-oxidant radical scavenging potential. The effect of RA20/TSG(9)95 could not be evaluated as Type Flora was also highly active without added steviol-glycosides.

As seen in the second table below, SG-MRP Flora and Chocolate show substantial anti-oxidant radical scavenging potential after being spray-dried. SG-MRP Tangerine and Popcorn loses its anti-oxidant radical scavenging potential during the drying procedure.

TABLE 155.3

Anti-oxidant potential of samples prepared without/with steviol-glycosides

| Sample | Ascorbic acid equivalents (mg/ml) No Added Steviol-glycosides | Added Steviol-glycosides |
|---|---|---|
| Flora | 0.157 | 0.155 |
| Tangerine | <0.01 | 0.101 |
| Popcorn | <0.01 | 0.160 |
| Chocolate | <0.01 | 0.114 |

TABLE 155.4

Anti-oxidant potential of powdered samples (500 mg/25 ml)

| Sample | Ascorbic acid equivalents (mg/ml) |
|---|---|
| SG Flora | 0.136 |
| SG Tangerine | 0.012 |
| SG Popcorn | <0.01 |
| SG Chocolate | 0.137 |

Iron reduction test for Anti-Oxidant Potential 1 ml sample (or calibration standard) solution) was mixed with 0.2 M Sodium phosphate buffer (pH=6.6) and 1 ml Potassium ferric(III)cyanide solution in water (1% w/v) and incubated at 50° C. for 20 minutes. 10% (v/v) Trichloroacetic acid was then added and 2 ml of the resulting solution was transferred to a 5 ml vial and 0.4 ml Iron-III-Chloride solution in water (0.1% w/v) was added. The sample was incubated for 10 minutes and absorbance read at 700 nm against a water control. Calibration samples were prepared with Ascorbic acid in concentrations of 0-2 mg/mL in 0.2 M Sodium phosphate buffer (pH=6.6), as a negative control sample water was used.

Powdered samples were weighed and diluted in 0.2 M Sodium phosphate buffer (pH=6.6). The final concentrations of the test samples were adjusted to fall within the calibration range.

Quantification was performed by linear regression of calibration test results for ascorbic acid. The test results are given as ascorbic acid equivalents.

The following shows the test results for the Iron reduction test of the samples tested.

TABLE 155.5

| Iron Reduction potential of powdered samples (500 mg/25 ml) | |
|---|---|
| Sample | Ascorbic acid equivalents (mg/ml) |
| SG Flora | 0.335 |
| SG Tangerine | <0.01 |
| SG Popcorn | <0.01 |
| SG Chocolate | 0.874 |

As can be noted, SG Flora and Chocolate show substantial active iron reduction potential while SG Tangerine and Popcorn did not possess a noticeable active iron reduction potential.

Sensory Analysis

The samples prepared in-house were subjected to descriptive, sensory analysis for color, odor and taste. The results presented are the joint opinion of five test persons. Samples were tested immediately after reaction and cooling and after dilution with water. FIG. 146 contains sensory analysis results for tests in final applications.

Method: For evaluation, the samples were tested by a panel of five people. The panel was asked to determine the taste of each sample in comparison to a control sample without addition of the components described above. 1 trained taster tasted independently the samples first. The tester was allowed to re-taste, and then determine a description of the taste. Afterwards, another 4 tasters tasted the samples and the taste(s) was discussed amongst the testers to arrive at a suitable description. In case that more than 1 taster disagreed with the result, the tasting was repeated.

Analytical Analysis

TABLE 155.6

| | |
|---|---|
| | Shimadzu GC-2010 Plus Gas Chromatograph |
| Column | Agilent DB-1701 60.0 m × 0.25 mm I.D., 0.25 μm |
| Column Oven Temperature | 45° C. (3 min) → 15° C./min→ 250° C. (23.67 min) |
| GC Program Time | 23.67 min |
| Mobile Phase | He |
| Constant Pressure | 250.0 kPa |
| Transfer Line Temperature | 280° C. |
| | GCMS-QP2020 Mass Spectrometer |
| Measurement Mode | Full Scan (50-400 m/z) |
| Injection Head Space | 500 μL |
| Ion Source Temperature | 200° C. |
| | TriPlus RSH Autosampler (Head Space and SPME) |
| Head Space Condition | Equilibrate/shake 90° C. for 40 minutes |
| SPME | On-Board Head Space extraction columns, collect for 10 minutes, transfer to injector (PTV) |
| Injection Temperature | 250° C. |

The following tables provide the results of the sensory analysis for all samples tested. FIG. 147 shows the results of SG-MRPs flavor threshold determination.

Sensory Analysis of samples prepared without/with steviol-glycosides immediately after reaction

TABLE 155.7

| Sample | Steviol-Glycosides | Color | Odor | Taste |
|---|---|---|---|---|
| Flora | – | Amber | Marzipan | Bitter, herbal/flowery |
| | + | Dark Amber | Dried flowers, caramel | Transient bitter, intensive sweet, flowery |
| Tangerine | – | Colorless | Neutral, slightly artificial, plastic | Artificial, unpleasant |
| | + | Yellow/ Orange | Sweet (honey), fruity (orange/ tangerine) | Transient bitter, intensive sweet, fruity (orange/ tangerine skin) |
| Popcorn | – | Amber | Intense caramel, glucose syrup | Bitter, unpleasant |
| | + | Amber | Sweet (caramel), Popcorn | Transient bitter, intensive sweet |
| CHocolate | – | Brown | Chocolate, smell after solvents | Cacao/chocolate, not sweet, slightly sour |
| | + | Brown | Chocolate, slight smell after solvents | Transient bitter, sweet, chocolate |

Sensory Analysis of samplesprepared without/with steviol-glycosides after dilution in water

TABLE 155.8

| Sample | Steviol-Glycosides | Color | Odor | Taste |
|---|---|---|---|---|
| Flora | – | Amber | Dried Flowers, Grass | Bitter, |
| | + | Amber | Dried flowers, honey | Transient bitter, sweet, flowery |
| Tangerine | – | Colorless (slight precipitate) | artificial, plastic | Artificial, unpleasant |
| | + | Yellow (slight precipitate) | Sweet (honey), fruity (orange/ tangerine) | Transient bitter, sweet, fruity (orange/ tangerine skin) |
| Popcorn | – | Amber | Caramel, glucose syrup | Bitter, unpleasant |
| | + | Amber | Popcorn, caramel | Transient bitter, intensive sweet |
| CHocolate | – | Brown | Chocolate | bitter |
| | + | Brown | Chocolate, slightly fruity | Transient bitter, sweet, chocolate |

Sensory Analysis of powdered MRP samples (500 mg/25 ml)

TABLE 155.9

| MRPs | Color | Odor | Taste |
|---|---|---|---|
| Flora | Amber | Dried Flowers, Grass | Transient bitter, sweet, flowery |
| Tangerine | Yellow | Fruity Orange | Transient bitter, sweet, citrus fruits |

TABLE 155.9-continued

| MRPs | Color | Odor | Taste |
|---|---|---|---|
| Popcorn | Yellowish | Popcorn, caramel | Transient bitter, sweet, herbal, Popcorn |
| Chocolate | Brown | Chocolate, cacao | Transient bitter, sweet, chocolate/cacao |

In general it was concluded that the powdered samples are similar in color, odor and taste to the freshly prepared samples.

Analytical Analysis

The following table shows the flavor active components found by GC/MS in *Stevia* extracts and in the SG-MRP samples, Flavor active components detected in *Stevia* Extracts and MRPs samples (qualitative)

TABLE 155.10

| *Stevia*-Extracts[1] | Tangerine | Popcorn | Chocolate | Flora |
|---|---|---|---|---|
| 1-Octen-3-ol | | | | 1-Octen-3-ol |
| 1-Hexen-3-ol | | | | |
| 2-hexyldecanol | | | | |
| 3-Heptanone, 5-methyl- | | | | |
| 2,4-Di-tert-butylphenol | | | 2,4-Di-tert-butylphenol | 2,4-Di-tert-butylphenol |
| 2-Ethyl-1-dodecanol | | | | 2-Ethyl-1-dodecanol |
| 4-Isopropylcyclohexanone | | | 4-Isopropylcyclohexanone | |
| | (+)-4-Carene | | | |
| | 3,6-Nonadien-1-ol, (E,Z)- | | | |
| | | 1-Octadecanol | | |
| | | | 3-Hexanone, 2-methyl- | |
| | | | 3-Hexen-2-one, 5-methyl- | |
| | | | 4-Isopropylcyclohexanone | |
| | | | | 2-Phenyl-3-(2-furyl)-propenal |
| 2-Phenylpropenal | | | | 2-Phenylpropenal |
| | | | 1-Propanol, 2,2-dimethyl-, benzoate | |
| | alpha.-Calacorene | | | |
| | alpha-Terpineol | | | |
| | | Acetophenone | | |
| | | | Acetyl valeryl | |
| Azulene | | | | |
| Benzaldehyde | | | Benzaldehyde | Benzaldehyde |
| | Benzene, 1-methyl-4-(1-methylethenyl)- | | | |
| Benzeneacetaldehyde | | | Benzeneacetaldehyde | |
| Benzoic Acid methyl ester | | | | |
| beta-Myrcene | beta-Myrcene | | | |
| D-Limonene | D-Limonene | D-Limonene | | D-Limonene |
| E-15-Heptadecenal | | | | |
| | Farnesene epoxide, E- | | | |
| | | | Furan, 2-[(methyldithio)methyl]- | |
| | | | Furan, 2-methyl- | |
| Furan, 3-phenyl- | | | | Furan, 3-phenyl- |
| Furfural | | | Furfural | Furfural |
| | | | Hexanal, 2-ethyl- | |
| | | | iso-Butyl aldehyde propylene glycol acetal | |

TABLE 155.10-continued

| *Stevia*-Extracts[1] | Tangerine | Popcorn | Chocolate | Flora |
|---|---|---|---|---|
| L-alpha-Terpineol | | | | L-alpha-Terpineol |
| | Limonene oxide, trans- | | | |
| Linalool | Linalool | Linalool | | Linalool |
| Nonanal | | Nonanal | | |
| Nonanoic acid, 9-oxo-, 1-methylethyl ester | | Nonanoic acid, 9-oxo-, 1-methylethyl ester | | Nonanoic acid, 9-oxo-, 1-methylethyl ester |
| Pentadecane, 2,6,10,14-tetramethyl- | | | | |
| | | Phenol, 3,5-bis(1,1-dimethylethyl)- | | |
| trans-Linalool oxide (furanoid) | trans-Linalool oxide (furanoid) | | | |

[1]Sum of compounds detected in *Stevia* extract, RA20/TSG(9)95, RA80/TSG(9)95.

Example 156

Correlation Between Steviol Glycosides and MRPs Prepared Thereof

Materials: refer to Examples 37 and 155 for all samples used in this example.

Method: the correlation between steviol glycosides and MRPs prepared was established by using HPLC/MS investigations.

Figure 148A:
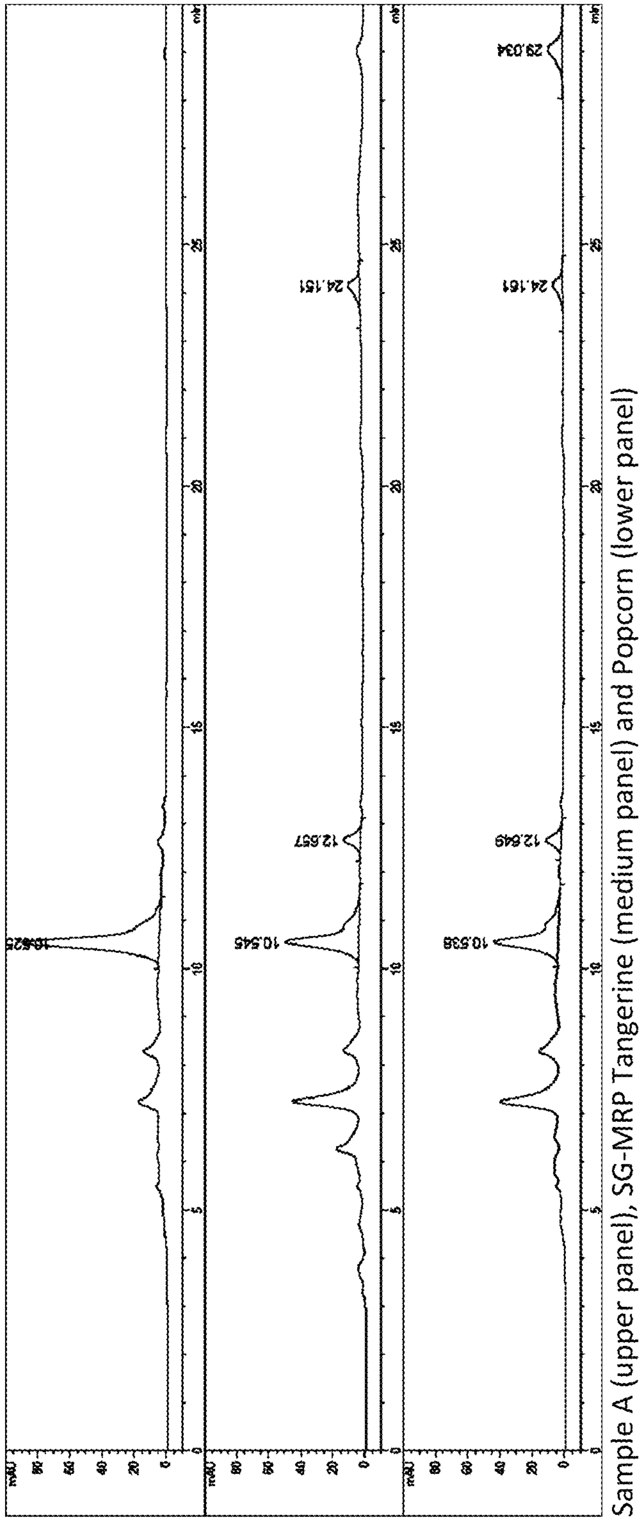

FIG. 148*a* is a first HPLC chromatogram, UV/VIS detection 254 nm (indicative for non-steviol compounds) for the samples as tested.

Figure 148B:
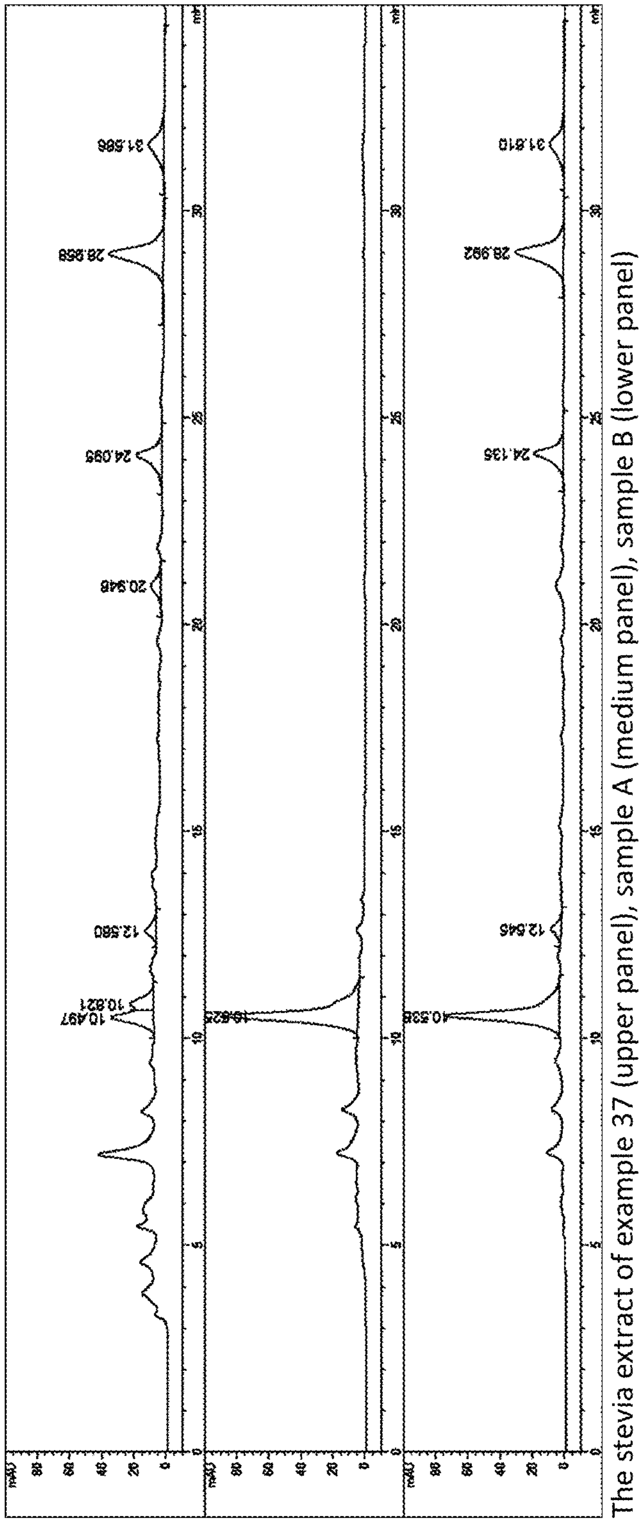

FIG. 148*b* is a second HPLC chromatogram, UV/VIS detection 254 nm (indicative for non-steviol compounds) for the samples as tested.

Figure 148C:
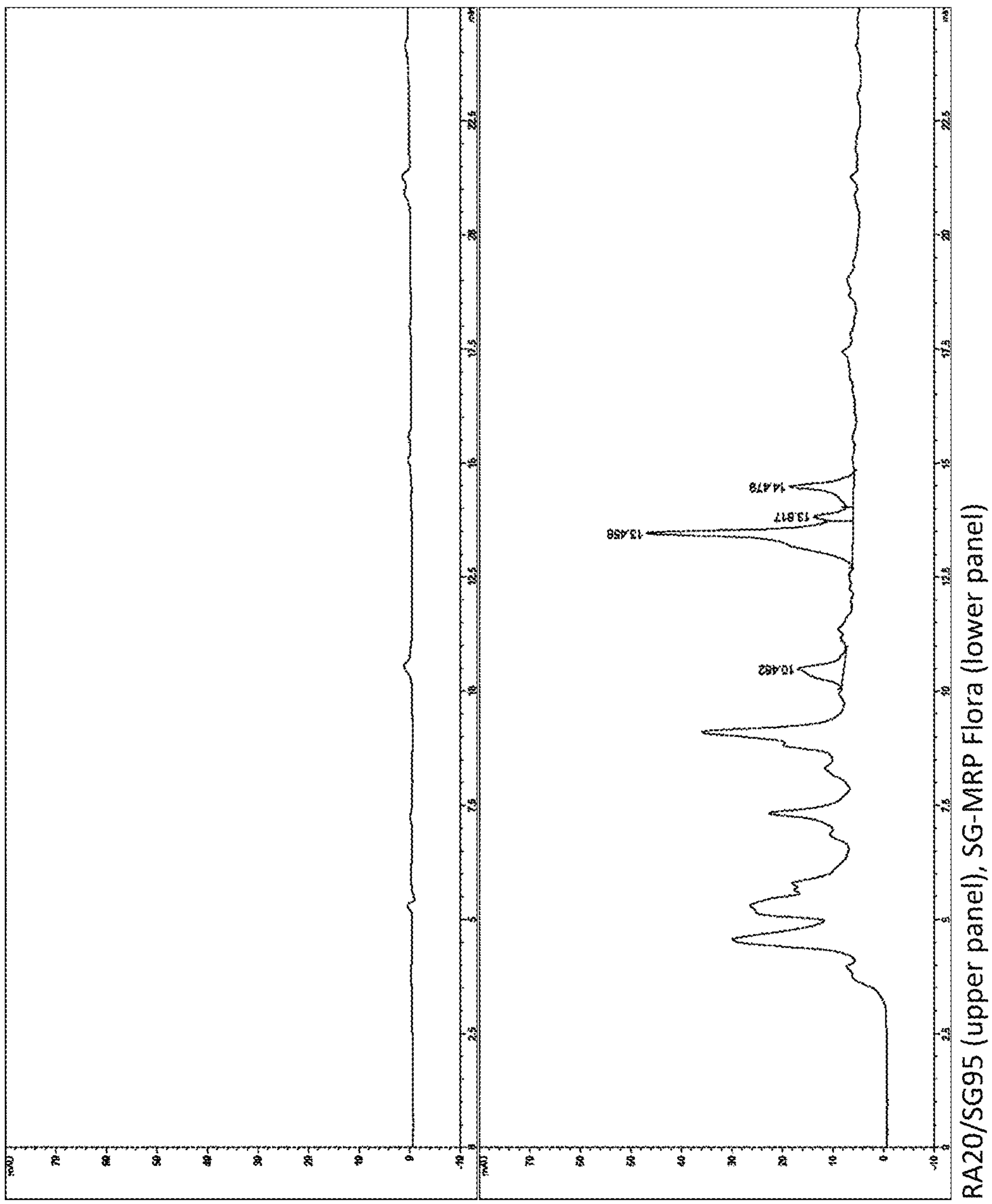

FIG. 148*c* is a third HPLC chromatogram, UV/VIS detection 254 nm (indicative for non-steviol compounds) for the samples as tested.

Figure 148D:
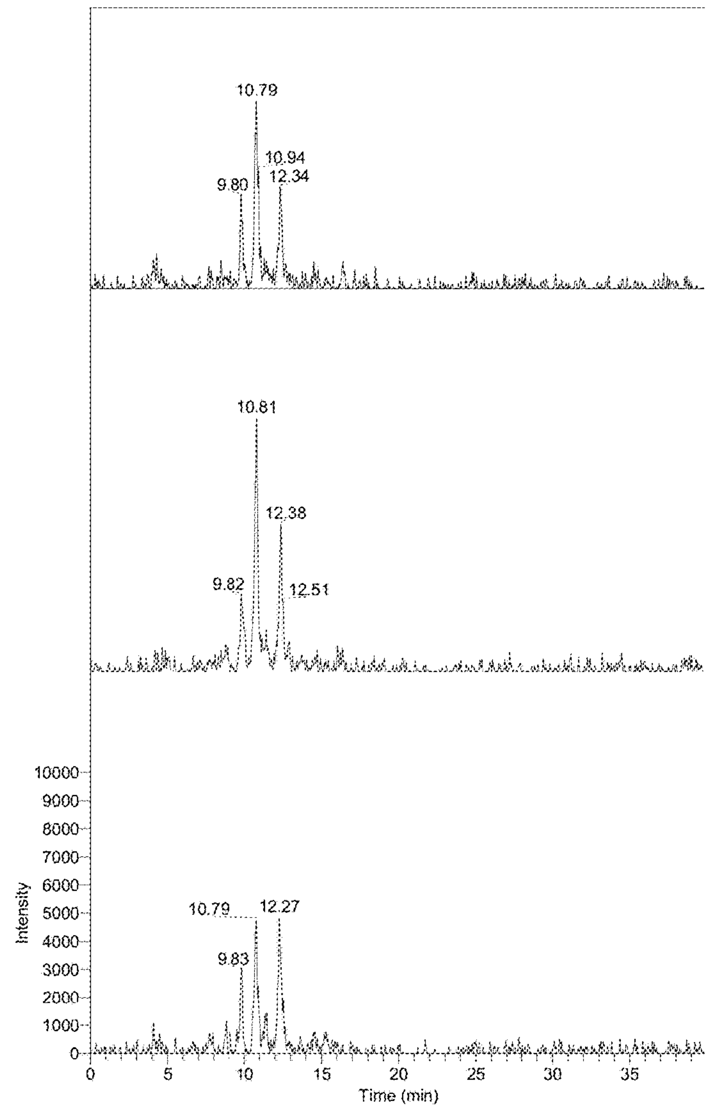

FIG. 148*d* is a chromatogram, ESI-MS detection neg. mode (m/z=349) for the samples as tested.

FIG. 149*a* through *c* shows ESI-MS spectra of 3 peaks related to the *Stevia* extract of Example 37, sample A and sample B (9.8, 10.8 and 12.3 minutes)

FIG. 150*a* through *c* shows UV-VIS spectra of 2 peaks related to the *Stevia* extract of Example 37, sample A and sample B (9.8, 10.8 and 12.3 minutes).

From FIGS. 148-150, it can be seen that three peaks were detected in *Stevia* extract of Example 37, sample A and sample B as well as in the SG-MRP samples prepared thereof.

They do not appear in samples prepared without sample A and sample B (i.e. not even a small peak in SG-MRP Chocolate or Flora).

All 3 peaks are also observed in samples followed by 254 nm (indicative for a benzol ring as part of the molecule).

The ESI-MS spectra and UV spectra are identical in all the samples presented in Chromatogram 4 and 1, respectively.

Example 157

Combination of SG-MRP Floral with Sugar

Experimental:

Following test solutions were prepared with SG-MRP Floral:

TABLE 157.1

| Sample Number | $CaCl_2$ (g/l) | $MgCl_2$ (g/l | Sugar (g/l) | SG-MRP (g/l) |
|---|---|---|---|---|
| #1 | 1 | — | — | — |
| #2 | 1 | — | 50 | — |
| #3 | 1 | — | — | 0.1 |
| #4 | 1 | — | 50 | 0.1 |
| #5 | — | 1 | — | — |
| #6 | — | 1 | 50 | — |
| #7 | — | 1 | — | 0.1 |
| #8 | — | 1 | 50 | 0.1 |

Then the samples were tasted in 2 series. Series 1 was tasted by five test persons using a random order of the samples under usual conditions. Series 2 was tasted by the same five persons using a random order of the samples using a nose clamp to suppress nasal breathing while tasting. Method: For evaluation, the samples were tested by a panel of five people. The panel was asked to determine the taste of each sample in comparison to a control sample without addition of the components described above. 1 trained taster tasted independently the samples first. The tester was allowed to re-taste, and then determine a description of the taste. Afterwards, another 4 tasters tasted the samples and the taste(s) was discussed amongst the testers to arrive at a suitable description. In case that more than 1 taster disagreed with the result, the tasting was repeated.

Each sample was evaluated by the following six properties using a 3-point scale (Weak/None if applicable)/Medium/Intense or Slow/Medium/Quick for onset of sweetness): Metallic, Salty, Bitter, Astringent, Sweet, Lingering and Onset of sweetness.

Test results are as follows, and reported as median values:

TABLE 157.2

| Test series 1 under usual conditions: | | | | | | | | |
|---|---|---|---|---|---|---|---|---|
| Sensory property | # 1 | # 2 | # 3 | # 4 | # 5 | # 6 | # 7 | # 8 |
| Metallic | 3 | 2 | 2 | 1 | 3 | 2 | 2 | 1 |
| Salty | 2 | 2 | 1 | 1 | 3 | 2 | 1 | 1 |
| Bitter | 2 | 2 | 1 | 1 | 2 | 1 | 1 | 1 |
| Astringent | 2 | 1 | 1 | 1 | 2 | 1 | 1 | 1 |
| Sweet | 1* | 2 | 2 | 3 | 1* | 2 | 2 | 3 |
| Lingering | 1* | 1 | 2 | 2 | 1* | 1 | 2 | 2 |
| Onset | 1* | 3 | 2 | 1 | 1* | 3 | 2 | 2 |

*. . . None

TABLE 157.3

| Test series 2 with nose clip to suppress nasal breathing: | | | | | | | | |
|---|---|---|---|---|---|---|---|---|
| Sensory property | #1 | #2 | #3 | #4 | #5 | #6 | #7 | #8 |
| Metallic | 3 | 2 | 2 | 1 | 3 | 2 | 2 | 1 |
| Salty | 2 | 1.5 | 1 | 1 | 3 | 2 | 1.5 | 1 |
| Bitter | 2 | 2 | 1 | 1 | 2 | 1 | 1 | 1 |
| Astringent | 2 | 1 | 1 | 1 | 2 | 1.5 | 1.5 | 1 |
| Sweet | 1* | 2 | 2 | 3 | 1* | 2 | 2 | 3 |
| Lingering | 1* | 1 | 1.5 | 2 | 1* | 1 | 2 | 2 |
| Onset | 1* | 3 | 2 | 1 | 1* | 3 | 2.5 | 2 |

*. . . None

As seen in the above Tables, SG-MRP and its combination with sugar reduced the metallic, salty and bitter taste perception when compared to an aqueous solution of the salts tested.

Example 158

Improvement of Probiotic Drink with TS-MRP

Materials:

S-MRP-FL: lot #240-71-01, available from EPC Natural Products Co., Ltd, China, prepared according to the method the same as Example 67.

Thaumatin: available from EPC Natural Products Co., Ltd, China, lot #20180801, the content of thaumatin is 10.74%.

TS-MRP-FL: the mixture of above S-MRP-FL and thaumatin with the weight ratio of 10:1 (S-MRP-FL/thaumatin).

Probiotic drink:

TABLE 158.1

| Sample | Batch/Lot No. | Sweetener adding | Source |
|---|---|---|---|
| Yakult light | 20181203 Lot. SDGC13 | Sugar, glucose and sucralose | Yakult (China) Group |
| Yakult | 20181204 Lot. IBJB2 | Sugar and glucose | |

Experiments:

Recipe:

Yakult light with 75 ppm S-MRP-FL

Reference Sample I:

Yakult light (70% less sugar added)

Reference Sample II:

Yakult (full sugar added)

Results

Sensory properties

TABLE 158.2

| Reference I | | | |
|---|---|---|---|
| Appearance | Smell | Taste | Mouth feel |
| Flesh color Viscous | Typical flavor of probiotic drink | Typical taste of probiotic drink, Acidic, less sweet | Flat, Astringent |

TABLE 158.3

| Reference II | | | |
|---|---|---|---|
| Appearance | Smell | Taste | Mouth feel |
| Flesh color but deeper than reference I Viscous | Typical flavor of probiotic drink | Typical taste of probiotic drink, Very aromatic sweet/sour balance, Harmonic/mild acidity | Full body, Round |

TABLE 158.4

| Recipe (compared to Reference I) | | | |
|---|---|---|---|
| Appearance | Smell | Taste | Mouth feel |
| No change | Almost no change | More intense and pleasant, Harmonic, Sweeter, Less acidic | Full body, Round |

TABLE 158.5

| Recipe (compared to Reference II) | | | |
|---|---|---|---|
| Appearance | Smell | Taste | Mouth feel |
| Flesh Color but lighter than reference II, Viscous | Almost no change | Sweet and acidic taste near to reference | near to reference |

Conclusion:

When compared to the full sugar probiotic drink, the sugar reduced example has less mouth feel, was less sweet, more acidic and astrigent. It was surprising that when adding TS-MRP to sugar reduced probiotic drink, the mouth feel became full bodied and the acidic and sweet taste became harmonic. The taste profile had almost no difference in comparison to the full sugar example.

Examples 159-176

Improvement b MRP, S-MRP and TS-MRP to the Taste and Mouth Feel of Monk Fruit Extract The sources of the monk fruit extract and MRP samples used in the following Examples are as follows.

TABLE 159-176

| sample | source | Lot # | specification |
|---|---|---|---|
| Monk fruit extract, | Hunan Huacheng Biotech, Inc., China | LHGE-180722 | Mogroside V 50.65% |

TABLE 159-176-continued

| sample | source | Lot # | specification |
|---|---|---|---|
| mogroside V50 | | | |
| MRP-FL | The product of Example 96 | | |
| MRP-CH | The product of Example 99 | | |
| MRP-CI | The product of Example 98 | | |
| MRP-CA | The product of Example 97 | | |
| S-MRP-FL | The product of Example 67 | | |
| S-MRP-CH | The product of Example 101 | | |
| S-MRP-CI | The product of Example 100 | | |
| S-MRP-CA | The product of Example 68 | | |
| thaumatin | The product of EPC Natural Products Co., Ltd, China | 20180801 | thaumatin 10.74% |
| TS-MRP-FL | the mixture of above S-MRP-FL and thaumatin with the weight ratio of 10:1 | | |
| TS-MRP-CH | the mixture of above S-MRP-CH and thaumatin with the weight ratio of 10:1 | | |
| TS-MRP-CI | the mixture of above S-MRP-CI and thaumatin with the weight ratio of 10:1 | | |
| TS-MRP-CA | the mixture of above S-MRP-CA and thaumatin with the weight ratio of 10:1 | | |

Example 159

The Improvement of MRP-FL to the Taste and Mouth Feel of Mogroside V50

Common Process:

MRP-FL and mogroside V50 were weighed and uniformly mixed according to the weights shown in Table 159.1, dissolved in 100 ml of pure water, and subjected to a mouth feel evaluation test. The tasting procedure is the same as Example 39.

TABLE 159.1

| the weight of MRP-FL and mogroside V50 | | | |
|---|---|---|---|
| # | Mogroside V50/MRP-FL | Weight of mogroside V50 (g) | Weight of MRP-FL (g) |
| 159-01 | 1/0.01 | 0.05 | 0.0005 |
| 159-02 | 1/0.1 | | 0.005 |
| 159-03 | 1/0.3 | | 0.015 |
| 159-04 | 1/0.5 | | 0.025 |
| 159-05 | 1/0.7 | | 0.035 |
| 159-06 | 1/0.9 | | 0.045 |
| 159-07 | 1/1 | | 0.05 |
| 159-08 | 1/1.5 | | 0.075 |
| 159-09 | 1/2 | | 0.1 |

Experiments

Several mixtures of MRP-FL and mogroside V50 were prepared in this example. Each sample was evaluated according to the aforementioned sensory evaluation method, and the average score of the panel was taken as the evaluation result data. The taste profile of the mixture was as follows. It should be noted that according to the sensory evaluation method, the evaluation of the mouth feel and the sweet profile is based on the iso-sweetness. That is to say, in these evaluations, the concentration of mogroside V50 in the sample solution was the same, 500 ppm. The results are shown in Table 159.2.

TABLE 159.2

| the score in sensory evaluation | | | | | | |
|---|---|---|---|---|---|---|
| | sensory evaluation | | | | | |
| | | sweet profile | | | | |
| # | mouth feel kokumi | sweet lingering | bitterness | metallic aftertaste | score of sweet profile | overall like |
| 159-01 | 1 | 4 | 1 | 1 | 4 | 2.5 |
| 159-02 | 1 | 3 | 1 | 1 | 4.33 | 2.67 |
| 159-03 | 2 | 3 | 1 | 1 | 4.33 | 3.17 |
| 159-04 | 3 | 3 | 1 | 1 | 4.33 | 3.67 |
| 159-05 | 3 | 2 | 2 | 1 | 4.33 | 3.67 |
| 159-06 | 3 | 2 | 2 | 1 | 4.33 | 3.67 |
| 159-07 | 3 | 2 | 2 | 1 | 4.33 | 3.67 |
| 159-08 | 4 | 1 | 2 | 1 | 4.66 | 4.33 |
| 159-09 | 4 | 1 | 3 | 1 | 4.33 | 4.16 |

Data Analysis

The relationship between the sensory evaluation results to the ratio of mogroside V50 to MRP-FL in this example is shown in FIG. 156.

The relationship between the overall likeability results to the ratio of mogroside V50 to MRP-FL in this example is shown in FIG. 157.

Conclusion:

The results showed that MRPs could significantly improve taste profile, flavor intensity and mouth feel of a monk fruit extract composition which comprises no less than 50% of mogroside. All ranges in tested ratios of mogroside V50 to MRP-FL from 1/0.01 to 1/2 had good taste (overall like score >2.5), preferably when the ratio ranges were from 1/0.3 to 1/2, the products provided very good taste (score >3). The conclusion can be extended to 1:99 and 99:1. This example demonstrates that MRPs can improve taste profile, flavor intensity and mouth feel of monk fruit extract.

Example 160

Improvement by MRP-CH to the Taste and Mouth Feel of Mogroside V50

Common Process:

MRP-CH and mogroside V50 were weighed and uniformly prepared according to the weights shown in Table 160.1, dissolved in 100 ml of pure water, and subjected to a mouth feel evaluation test. The tasting procedure is the same as Example 39.

TABLE 160.1

| the weight of MRP-CH and mogroside V50 | | | |
|---|---|---|---|
| # | Mogroside V50/MRP-CH | Weight of mogroside V50 (g) | Weight of MRP-CH (g) |
| 160-01 | 1/0.01 | 0.05 | 0.0005 |
| 160-02 | 1/0.1 | | 0.005 |
| 160-03 | 1/0.3 | | 0.015 |
| 160-04 | 1/0.5 | | 0.025 |
| 160-05 | 1/0.7 | | 0.035 |
| 160-06 | 1/0.9 | | 0.045 |
| 160-07 | 1/1 | | 0.05 |
| 160-08 | 1/1.5 | | 0.075 |
| 160-09 | 1/2 | | 0.1 |

Experiments

Several mixtures of MRP-CH and mogroside V50 were prepared in this example. Each sample was evaluated according to the aforementioned sensory evaluation method, and the average score of the panel was taken as the evaluation result data. The taste profile of the mixture was as follows. It should be noted that according to the sensory evaluation method, the evaluation of the mouth feel and the sweet profile is based on the iso-sweetness. That is to say, in these evaluations, the concentration of mogroside V50 in the sample solution was the same, 500 ppm. The results are shown in Table 160.2.

TABLE 160.2 the score in sensory evaluation

| # | sensory evaluation: mouth feel kokumi | sweet profile: sweet lingering | sweet profile: bitterness | sweet profile: metallic aftertaste | score of sweet profile | overall like |
|---|---|---|---|---|---|---|
| 160-01 | 1 | 4 | 1 | 1 | 4.00 | 2.50 |
| 160-02 | 1 | 3 | 1 | 1 | 4.33 | 2.67 |
| 160-03 | 2 | 3 | 1 | 1 | 4.33 | 3.17 |
| 160-04 | 3 | 3 | 2 | 1 | 4.00 | 3.50 |
| 160-05 | 3 | 2 | 2 | 1 | 4.33 | 3.67 |
| 160-06 | 4 | 2 | 2 | 1 | 4.33 | 4.17 |
| 160-07 | 4 | 2 | 2 | 1 | 4.33 | 4.17 |
| 160-08 | 4 | 2 | 3 | 1 | 4.00 | 4.00 |
| 160-09 | 4 | 1 | 3 | 1 | 4.33 | 4.17 |

Data Analysis

The relationship between the sensory evaluation results to the ratio of mogroside V50 to MRP-CH in this example is shown in FIG. 158.

The relationship between the overall like results to the ratio of mogroside V50 to MRP-CH in this example is shown in FIG. 159.

Conclusion:

The results showed that MRPs could significantly improve the taste profile, flavor intensity and mouth feel of a monk fruit extract composition which comprises no less than 50% of mogroside. All ranges in tested ratios of mogroside V50 to MRP-CH from 1/0.01 to 1/2 had good taste (overall like score >2.5), preferably when the ratio ranges from 1/0.3 to 1/2, the products provided a very good taste (score >3). The conclusion can be extended to 1:99 and 99:1. This example demonstrates that MRPs can improve taste profile, flavor intensity and mouth feel of monk fruit extract.

Example 161

Improvement by MRP-CI to the Taste and Mouth Feel of Mogroside V50

Common Process:

MRP-CI and mogroside V50 were weighed and uniformly prepared according to the weights shown in Table 161.1, dissolved in 100 ml of pure water, and subjected to a mouth feel evaluation test. The tasting procedure is the same as Example 39.

TABLE 161.1 the weight of MRP-CI and mogroside V50

| # | Mogroside V50/MRP-CI | Weight of mogroside V50 (g) | Weight of MRP-CI (g) |
|---|---|---|---|
| 161-01 | 1/0.01 | 0.05 | 0.0005 |
| 161-02 | 1/0.1 | | 0.005 |
| 161-03 | 1/0.3 | | 0.015 |
| 161-04 | 1/0.5 | | 0.025 |
| 161-05 | 1/0.7 | | 0.035 |
| 161-06 | 1/0.9 | | 0.045 |
| 161-07 | 1/1 | | 0.05 |
| 161-08 | 1/1.5 | | 0.075 |
| 161-09 | 1/2 | | 0.1 |

Experiments

Several mixtures of MRP-CI and mogroside V50 were prepared in this example. Each sample was evaluated according to the aforementioned sensory evaluation method, and the average score of the panel was taken as the evaluation result data. The taste profile of the mixture was as follows. It should be noted that according to the sensory evaluation method, the evaluation of the mouth feel and the sweet profile is based on the iso-sweetness. That is to say, in these evaluations, the concentration of mogroside V50 in the sample solution was the same, 500 ppm. The results are shown in Table 161.2.

TABLE 161.2 the score in sensory evaluation

| # | sensory evaluation: mouth feel kokumi | sweet profile: sweet lingering | sweet profile: bitterness | sweet profile: metallic aftertaste | score of sweet profile | overall like |
|---|---|---|---|---|---|---|
| 161-01 | 1 | 4 | 1 | 1 | 4.00 | 2.50 |
| 161-02 | 1 | 4 | 1 | 1 | 4.00 | 2.50 |
| 161-03 | 2 | 3 | 1 | 1 | 4.33 | 3.17 |
| 161-04 | 2 | 3 | 1 | 1 | 4.33 | 3.17 |
| 161-05 | 3 | 3 | 1 | 1 | 4.33 | 3.67 |
| 161-06 | 3 | 2 | 1 | 1 | 4.67 | 3.83 |
| 161-07 | 3 | 2 | 1 | 1 | 4.67 | 3.83 |
| 161-08 | 4 | 2 | 1 | 1 | 4.67 | 4.33 |
| 161-09 | 4 | 2 | 1 | 1 | 4.67 | 4.33 |

Data Analysis

The relationship between the sensory evaluation results to the ratio of mogroside V50 to MRP-CI in this example is shown in FIG. 160.

The relationship between the overall like results to the ratio of mogroside V50 to MRP-CI in this example is shown in FIG. 161.

Conclusion:

The results showed that MRPs could significantly improve the taste profile, flavor intensity and mouth feel of a monk fruit extract composition which comprises no less than 50% of mogroside. All ranges in tested ratios of mogroside V50 to MRP-CI from 1/0.01 to 1/2 had good taste (overall like score >2.5), preferably when the ratio ranges from 1/0.3 to 1/2, the products provided very good taste (score >3). The conclusion could be extended to 1:99 and 99:1. This example demonstrates that MRPs can improve taste profile, flavor intensity and mouth feel of monk fruit extract.

Example 162

Improvement by S-MRP-FL to the Taste and Mouth Feel of Mogroside V50

Common Process:

S-MRP-FL and mogroside V50 were weighed and uniformly prepared according to the weights shown in Table 162.1, dissolved in 100 ml of pure water, and subjected to a mouth feel evaluation test. The tasting procedure is the same as Example 39.

TABLE 162.1 the weight of S-MRP-FL and mogroside V50

| # | Mogroside V50/S-MRP-FL | Weight of mogroside V50 (g) | Weight of S-MRP-FL (g) |
|---|---|---|---|
| 162-01 | 1/0.01 | 0.05 | 0.0005 |
| 162-02 | 1/0.1 | | 0.005 |
| 162-03 | 1/0.3 | | 0.015 |
| 162-04 | 1/0.5 | | 0.025 |
| 162-05 | 1/0.7 | | 0.035 |
| 162-06 | 1/0.9 | | 0.045 |
| 162-07 | 1/1 | | 0.05 |
| 162-08 | 1/1.5 | | 0.075 |
| 162-09 | 1/2 | | 0.1 |

Experiments

Several mixtures of S-MRP-FL and mogroside V50 were prepared in this example. Each sample was evaluated according to the aforementioned sensory evaluation method, and the average score of the panel was taken as the evaluation result data. The taste profile of the mixture was as follows. It should be noted that according to the sensory evaluation method, the evaluation of the mouth feel and the sweet profile is based on the iso-sweetness. That is to say, in these evaluations, the concentration of mogroside V50 in the sample solution was the same, 500 ppm. The results are shown in Table 162.2.

TABLE 162.2 the score in sensory evaluation

| # | sensory evaluation | | | | | |
|---|---|---|---|---|---|---|
| | | sweet profile | | | | |
| | mouth feel kokumi | sweet lingering | bitterness | metallic aftertaste | score of sweet profile | overall like |
| 162-01 | 1 | 4 | 1 | 1 | 4 | 2.5 |
| 162-02 | 1 | 3 | 1 | 1 | 4.33 | 2.67 |
| 162-03 | 2 | 3 | 1 | 1 | 4.33 | 3.17 |
| 162-04 | 3 | 3 | 1 | 1 | 4.33 | 3.67 |
| 162-05 | 3 | 3 | 2 | 1 | 4 | 3.5 |
| 162-06 | 3 | 2 | 2 | 1 | 4 | 3.5 |
| 162-07 | 3 | 2 | 2 | 1 | 4.33 | 3.67 |
| 162-08 | 3 | 1 | 3 | 1 | 4.33 | 3.67 |
| 162-09 | 4 | 1 | 3 | 1 | 4.33 | 4.17 |

Data Analysis

The relationship between the sensory evaluation results to the ratio of mogroside V50 to S-MRP-FL in this example is shown in FIG. 162.

The relationship between the overall like results to the ratio of mogroside V50 to S-MRP-FL in this example is shown in FIG. 163.

Conclusion:

The results showed that S-MRPs could significantly improve the taste profile, flavor intensity and mouth feel of a monk fruit extract composition which comprises no less than 50% of mogroside. All ranges in tested ratios of mogroside V50 to S-MRP-FL from 1/0.01 to 1/2 had good taste (overall like score >2.5), preferably when the ratio ranges from 1/0.3 to 1/2, the products provided very good taste (score >3). The conclusion can be extended to 1:99 and 99:1. This example demonstrates that S-MRPs can improve taste profile, flavor intensity and mouth feel of monk fruit extract.

Example 163

Improvement by S-MRP-CH to the Taste and Mouth Feel of Mogroside V50

Common Process:

S-MRP-CH and mogroside V50 were weighed and uniformly prepared according to the weights shown in Table 163.1, dissolved in 100 ml of pure water, and subjected to a mouth feel evaluation test. The tasting procedure is the same as Example 39.

TABLE 163.1 the weight of S-MRP-CH and mogroside V50

| # | Mogroside V50/S-MRP-CH | Weight of mogroside V50 (g) | Weight of S-MRP-CH (g) |
|---|---|---|---|
| 163-01 | 1/0.01 | 0.05 | 0.0005 |
| 163-02 | 1/0.1 | | 0.005 |
| 163-03 | 1/0.3 | | 0.015 |
| 163-04 | 1/0.5 | | 0.025 |
| 163-05 | 1/0.7 | | 0.035 |
| 163-06 | 1/0.9 | | 0.045 |
| 163-07 | 1/1 | | 0.05 |
| 163-08 | 1/1.5 | | 0.075 |
| 163-09 | 1/2 | | 0.1 |

Experiments

Several mixtures of S-MRP-CH and mogroside V50 were prepared in this example. Each sample was evaluated according to the aforementioned sensory evaluation method, and the average score of the panel was taken as the evaluation result data. The taste profile of the mixture was as follows. It should be noted that according to the sensory evaluation method, the evaluation of the mouth feel and the sweet profile is based on the iso-sweetness. That is to say, in these evaluations, the concentration of mogroside V50 in the sample solution was the same, 500 ppm. The results are shown in Table 163.2.

TABLE 163.2 the score in sensory evaluation

| # | sensory evaluation | | | | | |
|---|---|---|---|---|---|---|
| | | sweet profile | | | | |
| | mouth feel kokumi | sweet lingering | bitterness | metallic aftertaste | score of sweet profile | overall like |
| 163-01 | 1 | 5 | 1 | 1 | 3.67 | 2.33 |
| 163-02 | 1 | 4 | 1 | 1 | 4.00 | 2.50 |
| 163-03 | 2 | 3 | 1 | 1 | 4.33 | 3.17 |
| 163-04 | 3 | 3 | 1 | 1 | 4.33 | 3.67 |
| 163-05 | 3 | 3 | 2 | 1 | 4.00 | 3.50 |
| 163-06 | 4 | 2 | 2 | 1 | 4.33 | 4.17 |

TABLE 163.2-continued

| the score in sensory evaluation | | | | | | |
|---|---|---|---|---|---|---|
| | sensory evaluation | | | | | |
| | | sweet profile | | | | |
| # | mouth feel kokumi | sweet lingering | bitterness | metallic aftertaste | score of sweet profile | overall like |
| 163-07 | 4 | 2 | 2 | 1 | 4.33 | 4.17 |
| 163-08 | 4 | 1 | 2 | 1 | 4.67 | 4.33 |
| 163-09 | 4 | 1 | 3 | 1 | 4.33 | 4.17 |

Data Analysis

The relationship between the sensory evaluation results to the ratio of mogroside V50 to S-MRP-CH in this example is shown in FIG. 164.

The relationship between the overall like results to the ratio of mogroside V50 to S-MRP-CH in this example is shown in FIG. 165.

Conclusion:

The results showed that S-MRPs could significantly improve the taste profile, flavor intensity and mouth feel of a monk fruit extract composition which comprises no less than 50% of mogroside. All ranges in tested ratios of mogroside V50 to S-MRP-CH from 1/0.01 to 1/2 had good taste (overall like score >2), preferably when the ratio ranges from 1/0.3 to 1/2, the products provided very good taste (score >3). The conclusion can be extended to 1:99 and 99:1. This example demonstrates that S-MRPs can improve taste profile, flavor intensity and mouth feel of monk fruit extract.

Example 164

Improvement by S-MRP-CI to the Taste and Mouth Feel of Mogroside V50

Common Process:

S-MRP-CI and mogroside V50 were weighed and uniformly prepared according to the weights shown in Table 164.1, dissolved in 100 ml of pure water, and subjected to a mouth feel evaluation test. The tasting procedure is the same as Example 39.

TABLE 164.1

| the weight of S-MRP-CI and mogroside V50 | | | |
|---|---|---|---|
| # | Mogroside V50/S-MRP-CI | Weight of mogroside V50 (g) | Weight of S-MRP-CI (g) |
| 164-01 | 1/0.01 | 0.05 | 0.0005 |
| 164-02 | 1/0.1 | | 0.005 |
| 164-03 | 1/0.3 | | 0.015 |
| 164-04 | 1/0.5 | | 0.025 |
| 164-05 | 1/0.7 | | 0.035 |
| 164-06 | 1/0.9 | | 0.045 |
| 164-07 | 1/1 | | 0.05 |
| 164-08 | 1/1.5 | | 0.075 |
| 164-09 | 1/2 | | 0.1 |

Experiments

Several mixtures of S-MRP-CI and mogroside V50 were prepared in this example. Each sample was evaluated according to the aforementioned sensory evaluation method, and the average score of the panel was taken as the evaluation result data. The taste profile of the mixture was as follows. It should be noted that according to the sensory evaluation method, the evaluation of the mouth feel and the sweet profile is based on the iso-sweetness. That is to say, in these evaluations, the concentration of mogroside V50 in the sample solution was the same, 500 ppm. The results are shown in Table 164.2.

TABLE 164.2

| the score in sensory evaluation | | | | | | |
|---|---|---|---|---|---|---|
| | sensory evaluation | | | | | |
| | | sweet profile | | | | |
| # | mouth feel kokumi | sweet lingering | bitterness | metallic aftertaste | score of sweet profile | overall like |
| 164-01 | 1 | 3 | 1 | 1 | 4.33 | 2.67 |
| 164-02 | 1 | 3 | 1 | 1 | 4.33 | 2.67 |
| 164-03 | 1 | 2 | 1 | 1 | 4.67 | 2.83 |
| 164-04 | 2 | 2 | 1 | 1 | 4.67 | 3.33 |
| 164-05 | 2 | 2 | 1 | 1 | 4.67 | 3.33 |
| 164-06 | 3 | 2 | 1 | 1 | 4.67 | 3.83 |
| 164-07 | 3 | 2 | 1 | 1 | 4.67 | 3.83 |
| 164-08 | 4 | 1 | 1 | 1 | 5.00 | 4.50 |
| 164-09 | 4 | 1 | 2 | 1 | 4.67 | 4.33 |

Data Analysis

The relationship between the sensory evaluation results to the ratio of mogroside V50 to S-MRP-CI in this example is shown in FIG. 166.

The relationship between the overall like results to the ratio of mogroside V50 to 5-MRP-CI in this example is shown in FIG. 167.

Conclusion:

The results showed that S-MRPs could significantly improve the taste profile, flavor intensity and mouth feel of a monk fruit extract composition which comprises no less than 50% of mogroside. All ranges in tested ratios of mogroside V50 to S-MRP-CI from 1/0.01 to 1/2 had good taste (overall like score >2.5), preferably when the ratio ranges from 1/0.5 to 1/2, the products provided very good taste (score >3). The conclusion can be extended to 1:99 and 99:1. This example demonstrates that S-MRPs can improve taste profile, flavor intensity and mouth feel of monk fruit extract.

Example 165

Improvement by TS-MRP-FL to the Taste and Mouth Feel of Mogroside V50

Common Process:

TS-MRP-FL and mogroside V50 were weighed and uniformly prepared according to the weights shown in Table 165.1, dissolved in 100 nil of pure water, and subjected to a mouth feel evaluation test. The tasting procedure is the same as Example 39.

TABLE 165.1

| the weight of TS-MRP-FL and mogroside V50 | | | |
|---|---|---|---|
| # | Mogroside V50/TS-MRP-FL | Weight of mogroside V50 (g) | Weight of TS-MRP-FL (g) |
| 165-01 | 1/0.01 | 0.05 | 0.0005 |
| 165-02 | 1/0.1 | | 0.005 |
| 165-03 | 1/0.3 | | 0.015 |
| 165-04 | 1/0.5 | | 0.025 |
| 165-05 | 1/0.7 | | 0.035 |
| 165-06 | 1/0.9 | | 0.045 |

TABLE 165.1-continued

| the weight of TS-MRP-FL and mogroside V50 | | | |
|---|---|---|---|
| # | Mogroside V50/TS-MRP-FL | Weight of mogroside V50 (g) | Weight of TS-MRP-FL (g) |
| 165-07 | 1/1 | | 0.05 |
| 165-08 | 1/1.5 | | 0.075 |
| 165-09 | 1/2 | | 0.1 |

Experiments

Several mixtures of TS-MRP-FL and mogroside V50 were prepared in this example. Each sample was evaluated according to the aforementioned sensory evaluation method, and the average score of the panel was taken as the evaluation result data. The taste profile of the mixture was as follows. It should be noted that according to the sensory evaluation method, the evaluation of the mouth feel and the sweet profile is based on the iso-sweetness. That is to say, in these evaluations, the concentration of mogroside V50 in the sample solution was the same, 500 ppm. The results are shown in Table 165.2.

TABLE 165.2

| the score in sensory evaluation | | | | | | |
|---|---|---|---|---|---|---|
| | sensory evaluation | | | | | |
| | | sweet profile | | | | |
| # | mouth feel kokumi | sweet lingering | bitterness | metallic aftertaste | score of sweet profile | overall like |
| 165-01 | 1 | 4 | 1 | 1 | 4 | 2.5 |
| 165-02 | 1 | 3 | 1 | 1 | 4.33 | 2.67 |
| 165-03 | 2 | 3 | 1 | 1 | 433 | 3.17 |
| 165-04 | 3 | 2 | 1 | 1 | 4.66 | 3.83 |
| 165-05 | 3 | 2 | 1 | 1 | 4.66 | 3.83 |
| 165-06 | 3 | 3 | 2 | 1 | 4 | 3.5 |
| 165-07 | 3 | 3 | 2 | 1 | 4 | 3.5 |
| 165-08 | 4 | 4 | 2 | 1 | 3.66 | 3.83 |
| 165-09 | 4 | 4 | 3 | 1 | 3.33 | 3.67 |

Data Analysis

The relationship between the sensory evaluation results to the ratio of mogroside V50 to TS-MRP-FL in this example is shown in FIG. 168.

The relationship between the overall like results to be ratio of mogroside V50 to TS-MRP-FL in this example is shown in FIG. 169.

Conclusion:

The results showed that TS-MRPs could significantly improve the taste profile, flavor intensity and mouth feel of a monk fruit extract composition which comprises no less than 50% of mogroside. All ranges in tested ratios of mogroside V50 to TS-MRP-FL from 1/0.01 to 1/2 had good taste (overall like score >2.5), preferably when the ratio ranges from 1/0.3 to 1/2, the products provided very good taste (score >3). The conclusion can be extended to 1:99 and 99:1. This example demonstrates that TS-MRPs can improve taste profile, flavor intensity and mouth feel of monk fruit extract.

Example 166

Improvement by TS-MRP-CH to the Taste and Mouth Feel of Mogroside V50

Common Process:

TS-MRP-CH and mogroside V50 were weighed and uniformly prepared according to the weights shown in Table 166.1, dissolved in 100 ml of pure water, and subjected to a mouth feel evaluation test. The tasting procedure is the same as Example 39.

TABLE 166.1

| the weight of TS-MRP-CH and mogroside V50 | | | |
|---|---|---|---|
| # | Mogroside V50/TS-MRP-CH | Weight of mogroside V50 (g) | Weight of TS-MRP-CH (g) |
| 166-01 | 1/0.01 | 0.05 | 0.0005 |
| 166-02 | 1/0.1 | | 0.005 |
| 166-03 | 1/0.3 | | 0.015 |
| 166-04 | 1/0.5 | | 0.025 |
| 166-05 | 1/0.7 | | 0.035 |
| 166-06 | 1/0.9 | | 0.045 |
| 166-07 | 1/1 | | 0.05 |
| 166-08 | 1/1.5 | | 0.075 |
| 166-09 | 1/2 | | 0.1 |

Experiments

Several mixtures of TS-MRP-CH and mogroside V50 were prepared in this example. Each sample was evaluated according to the aforementioned sensory evaluation method, and the average score of the panel was taken as the evaluation result data. The taste profile of the mixture was as follows. It should be noted that according to the sensory evaluation method, the evaluation of the mouth feel and the sweet profile is based on the iso-sweetness. That is to say, in these evaluations, the concentration of mogroside V50 in the sample solution was the same, 500 ppm. The results are shown in Table 166.2.

TABLE 166.2

| the score in sensory evaluation | | | | | | |
|---|---|---|---|---|---|---|
| | sensory evaluation | | | | | |
| | | sweet profile | | | | |
| # | mouth feel kokumi | sweet lingering | bitterness | metallic aftertaste | score of sweet profile | overall like |
| 166-01 | 1 | 4 | 1 | 1 | 4.00 | 2.50 |
| 166-02 | 1 | 3 | 1 | 1 | 4.33 | 2.67 |
| 166-03 | 1 | 3 | 1 | 1 | 4.33 | 2.67 |
| 166-04 | 2 | 3 | 1 | 1 | 4.33 | 3.17 |
| 166-05 | 2 | 4 | 1 | 1 | 4.00 | 3.00 |
| 166-06 | 3 | 4 | 1 | 1 | 4.00 | 3.50 |
| 166-07 | 3 | 4 | 2 | 1 | 3.67 | 3.33 |

TABLE 166.2-continued

| the score in sensory evaluation | | | | | | |
|---|---|---|---|---|---|---|
| | sensory evaluation | | | | | |
| | | sweet profile | | | | |
| # | mouth feel kokumi | sweet lingering | bitterness | metallic aftertaste | score of sweet profile | overall like |
| 166-08 | 4 | 4 | 2 | 1 | 3.67 | 3.83 |
| 166-09 | 4 | 4 | 3 | 1 | 3.33 | 3.67 |

Data Analysis

The relationship between the sensory evaluation results to the ratio of mogroside V50 to TS-MRP-CH in this example is shown in FIG. 170.

The relationship between the overall like results to the ratio of mogroside V50 to TS-MRP-CH in this example is shown in FIG. 171.

Conclusion:

The results showed that TS-MRPs could significantly improve the taste profile, flavor intensity and mouth feel of a monk fruit extract composition which comprises no less than 50% of mogroside. All ranges in tested ratios of mogroside V50 to TS-MRP-CH from 1/0.01 to 1/2 had good taste (overall like score >2.5), preferably when the ratio ranges from 1/0.5 to 1/2, the products provided very good taste (score >3). The conclusion can be extended to 1:99 and 99:1. This example demonstrates that TS-MRPs can improve taste profile, flavor intensity and mouth feel of monk fruit extract.

Example 167

Improvement by TS-MRP-CI to the Taste and Mouth Feel of Mogroside V50

Common Process:

TS-MRP-CI and mogroside V50 were weighed and uniformly prepared according to the weights shown in Table 167.1, dissolved in 100 ml of pure water, and subjected to a mouth feel evaluation test. The tasting procedure is the same as Example 39.

TABLE 167.1

| the weight of TS-MRP-CI and mogroside V50 | | | |
|---|---|---|---|
| # | Mogroside V50/TS-MRP-CI | Weight of mogroside V50 (g) | Weight of TS-MRP-CI (g) |
| 167-01 | 1/0.01 | 0.05 | 0.0005 |
| 167-02 | 1/0.1 | | 0.005 |
| 167-03 | 1/0.3 | | 0.015 |
| 167-04 | 1/0.5 | | 0.025 |
| 167-05 | 1/0.7 | | 0.035 |
| 167-06 | 1/0.9 | | 0.045 |
| 167-07 | 1/1 | | 0.05 |
| 167-08 | 1/1.5 | | 0.075 |
| 167-09 | 1/2 | | 0.1 |

Experiments

Several mixtures of TS-MRP-CI and mogroside V50 were prepared in this example. Each sample was evaluated according to the aforementioned sensory evaluation method, and the average score of the panel was taken as the evaluation result data. The taste profile of the mixture was as follows. It should be noted that according to the sensory evaluation method, the evaluation of the mouth feel and the sweet profile is based on the iso-sweetness. That is to say, in these evaluations, the concentration of mogroside V50 in the sample solution was the same, 500 ppm. The results are shown in Table 167.2.

TABLE 167.2

| the score in sensory evaluation | | | | | | |
|---|---|---|---|---|---|---|
| | sensory evaluation | | | | | |
| | | sweet profile | | | | |
| # | mouth feel kokumi | sweet lingering | bitterness | metallic aftertaste | score of sweet profile | overall like |
| 167-01 | 1 | 4 | 1 | 1 | 4.00 | 2.50 |
| 167-02 | 1 | 3 | 1 | 1 | 4.33 | 2.67 |
| 167-03 | 1 | 3 | 1 | 1 | 4.33 | 2.67 |
| 167-04 | 2 | 4 | 1 | 1 | 4.00 | 3.00 |
| 167-05 | 3 | 4 | 1 | 1 | 4.00 | 3.50 |
| 167-06 | 3 | 4 | 1 | 1 | 4.00 | 3.50 |
| 167-07 | 3 | 4 | 1 | 1 | 4.00 | 3.50 |
| 167-08 | 4 | 5 | 1 | 1 | 3.67 | 3.83 |
| 167-09 | 4 | 5 | 2 | 1 | 3.33 | 3.67 |

Data Analysis

The relationship between the sensory evaluation results to the ratio of mogroside V50 to TS-MRP-CI in this example is shown in FIG. 172.

The relationship between the overall like results to the ratio of mogroside V50 to TS-MRP-CI in this example is shown in FIG. 173.

Conclusion:

The results showed that TS-MRPs could significantly improve the taste profile, flavor intensity and mouth feel of a monk fruit extract composition which comprises no less than 50% of mogroside. All ranges in tested ratios of mogroside V50 to TS-MRP-CI from 1/0.01 to 1/2 had good taste (overall like score >2.5), preferably when the ratio ranges from 1/0.5 to 1/2, the products provided very good taste (score >3). The conclusion can be extended to 1:99 and 99:1. This example demonstrates that TS-MRIs can improve taste profile, flavor intensity and mouth feel of monk fruit extract.

Example 168

Improvement by MRP-CH to the Taste and Mouth Feel of Mogroside V20

Common Process:

MRP-CH and mogroside V20 were weighed and uniformly prepared according to the weights shown in Table 168.1, dissolved in 100 ml of pure water, and subjected to a mouth feel evaluation test. The tasting procedure is the same as Example 39.

TABLE 168.1

| the weight of MRP-CH and mogroside V20 | | | |
|---|---|---|---|
| # | Mogroside V20/MRP-CH | Weight of mogroside V20 (g) | Weight of MRP-CH (g) |
| 168-01 | 1/0.01 | 0.05 | 0.0005 |
| 168-02 | 1/0.1 | | 0.005 |
| 168-03 | 1/0.3 | | 0.015 |
| 168-04 | 1/0.5 | | 0.025 |
| 168-05 | 1/0.7 | | 0.035 |
| 168-06 | 1/0.9 | | 0.045 |
| 168-07 | 1/1 | | 0.05 |
| 168-08 | 1/2 | | 0.1 |

Experiments

Several mixtures of MRP-CH and mogroside V20 were prepared in this example. Each sample was evaluated according to the aforementioned sensory evaluation method, and the average score of the panel was taken as the evaluation result data. The taste profile of the mixture was as follows. It should be noted that according to the sensory evaluation method, the evaluation of the mouth feel and the sweet profile is based on the iso-sweetness. That is to say, in these evaluations, the concentration of mogroside V20 in the sample solution was the same, 500 ppm. The results are shown in Table 168.2.

TABLE 168.2

| the score in sensory evaluation | | | | | | |
|---|---|---|---|---|---|---|
| | sensory evaluation | | | | | |
| | | sweet profile | | | | |
| # | mouth feel kokumi | sweet lingering | bitterness | metallic aftertaste | score of sweet profile | overall like |
| 168-01 | 1 | 3 | 1 | 3 | 3.67 | 2.33 |
| 168-02 | 1 | 3 | 1 | 3 | 3.67 | 2.33 |
| 168-03 | 2 | 2 | 1 | 3 | 4.00 | 3.00 |
| 168-04 | 2 | 2 | 1 | 2 | 4.33 | 3.17 |
| 168-05 | 2 | 2 | 1 | 2 | 4.33 | 3.17 |
| 168-06 | 3 | 2 | 2 | 2 | 4.00 | 3.50 |
| 168-07 | 3 | 2 | 2 | 2 | 4.00 | 3.50 |
| 168-08 | 2 | 3 | 3 | 2 | 3.33 | 2.67 |

Data Analysis

The relationship between the sensory evaluation results to the ratio of mogroside V20 to MRP-CH in this example is shown in FIG. 174.

The relationship between the overall like results to the ratio of mogroside V20 to MRP-CH in this example is shown in FIG. 175.

Conclusion:

The results showed that MRPs could significantly improve the taste profile, flavor intensity and mouth feel of a monk fruit extract composition which comprises no less than 20% of mogroside. All ranges in tested ratios of mogroside V20 to MRP-CH from 1/0.01 to 1/2 had good taste (overall like score >2), preferably when the ratio ranges from 1/0.3 to 1/1, the products provided very good taste (score >3). The conclusion can be extended to 1:99 and 99:1. This example demonstrates that MRPs can improve taste profile, flavor intensity and mouth feel of monk fruit extract.

Example 169

Improvement by MRP-CA to the Taste and Mouth Feel of Mogroside V20

Common Process:

MRP-CA and mogroside V20 were weighed and uniformly prepared according to the weights shown in Table 169.1, dissolved in 100 ml of pure water, and subjected to a mouth feel evaluation test. The tasting procedure is the same as Example 39.

TABLE 169.1

| the weight of MRP-CA and mogroside V20 | | | |
|---|---|---|---|
| # | Mogroside V20/MRP-CA | Weight of mogroside V20 (g) | Weight of MRP-CA (g) |
| 169-01 | 1/0.01 | 0.05 | 0.0005 |
| 169-02 | 1/0.1 | | 0.005 |
| 169-03 | 1/0.3 | | 0.015 |
| 169-04 | 1/0.5 | | 0.025 |
| 169-05 | 1/0.7 | | 0.035 |
| 169-06 | 1/0.9 | | 0.045 |
| 169-07 | 1/1 | | 0.05 |

Experiments

Several mixtures of MRP-CA and mogroside V20 were prepared in this example. Each sample was evaluated according to the aforementioned sensory evaluation method, and the average score of the panel was taken as the evaluation result data. The taste profile of the mixture was as follows. It should be noted that according to the sensory evaluation method, the evaluation of the mouth feel and the sweet profile is based on the iso-sweetness. That is to say, in these evaluations, the concentration of mogroside V20 in the sample solution was the same, 500 ppm. The results are shown in Table 169.2.

TABLE 169.2

| the score in sensory evaluation | | | | | | |
|---|---|---|---|---|---|---|
| | sensory evaluation | | | | | |
| | | sweet profile | | | | |
| # | mouth feel kokumi | sweet lingering | bitterness | metallic aftertaste | score of sweet profile | overall like |
| 169-01 | 1 | 3 | 1 | 3 | 3.67 | 2.33 |
| 169-02 | 1 | 3 | 1 | 3 | 3.67 | 2.33 |
| 169-03 | 1 | 3 | 1 | 3 | 3.67 | 2.33 |
| 169-04 | 2 | 2 | 1 | 2 | 4.33 | 3.17 |
| 169-05 | 2 | 2 | 1 | 2 | 4.33 | 3.17 |
| 169-06 | 2 | 2 | 2 | 2 | 4.00 | 3.00 |
| 169-07 | 2 | 2 | 2 | 2 | 4.00 | 3.00 |

Data Analysis

The relationship between the sensory evaluation results to the ratio of mogroside V20 to MRP-CA in this example is shown in FIG. 176.

The relationship between the overall like results to the ratio of mogroside V20 to MRP-CA in this example is shown in FIG. 177.

Conclusion:

The results showed that MRPs could significantly improve the taste profile, flavor intensity and mouth feel of a monk fruit extract composition which comprises no less than 20% of mogroside. All ranges in tested ratios of mogroside 420 to MRP-CA from 1/0.01 to 1/1 had good taste (overall like score >2), preferably when the ratio ranges from 1/0.5 to 1/1, the products provided very good taste score >3). The conclusion can be extended to 1:99 and 99:1. This example demonstrates that MRPs can improve taste profile, flavor intensity and mouth feel of monk fruit extract.

Example 170

Improvement by MRP-CI to the Taste and Mouth Feel of Mogroside V20

Common Process:

MRP-CI and mogroside V20 were weighed and uniformly prepared s according to the weights shown in Table 170.1, dissolved in 100 ml of pure water, and subjected to a mouth feel evaluation test. The tasting procedure is the same as Example 39.

TABLE 170.1 the weight of MRP-CI and mogroside V20

| # | Mogroside V20/MRP-CI | Weight of mogroside V20 (g) | Weight of MRP-CI (g) |
|---|---|---|---|
| 170-01 | 1/0.01 | 0.05 | 0.0005 |
| 170-02 | 1/0.1 | | 0.005 |
| 170-03 | 1/0.3 | | 0.015 |
| 170-04 | 1/0.5 | | 0.025 |
| 170-05 | 1/0.7 | | 0.035 |
| 170-06 | 1/0.9 | | 0.045 |
| 170-07 | 1/1 | | 0.05 |
| 170-08 | 1/2 | | 0.1 |

Experiments

Several mixtures of MRP-(1 and mogroside V20 were prepared in this example. Each sample was evaluated according to the aforementioned sensory evaluation method, and the average score of the panel was taken as the evaluation result data. The taste profile of the mixture was as follows. It should be noted that according to the sensory evaluation method, the evaluation of the mouth feel and the sweet profile is based on the iso-sweetness. That is to say, in these evaluations, the concentration of mogroside V20 in the sample solution was the same, 500 ppm. The results are shown in Table 170.2.

TABLE 170.2 the score in sensory evaluation

| | sensory evaluation | | | | | |
|---|---|---|---|---|---|---|
| | | sweet profile | | | | |
| # | mouth feel kokumi | sweet lingering | bitterness | metallic aftertaste | score of sweet profile | overall like |
| 170-01 | 1 | 3 | 1 | 2 | 4.00 | 2.50 |
| 170-02 | 1 | 3 | 1 | 2 | 4.00 | 2.50 |
| 170-03 | 1 | 3 | 1 | 2 | 4.00 | 2.50 |
| 170-04 | 2 | 2 | 1 | 1 | 4.67 | 3.33 |
| 170-05 | 2 | 2 | 1 | 1 | 4.67 | 3.33 |
| 170-06 | 2 | 2 | 2 | 1 | 4.33 | 3.17 |
| 170-07 | 2 | 2 | 2 | 1 | 4.33 | 3.17 |
| 170-08 | 3 | 3 | 3 | 2 | 3.33 | 3.17 |

Data Analysis

The relationship between the sensory evaluation results e ratio of mogroside V20 to MRP-CI in this example is shown in FIG. 178.

The relationship between the overall like results to the ratio of mogroside V20 to MRP-CI in this example is shown in FIG. 179.

Conclusion:

The results showed that MRPs could significantly improve the taste profile, flavor intensity and mouth feel of a monk fruit extract composition which comptises no less than 20% of mogroside. All ranges in tested ratios of mogroside V20 to MRP-CI from 1/0.01 to 1/2 had good taste (overall like score >2.5), preferably when the ratio ranges from 1/0.5 to 1/2, the products provided very good taste (score >3). The conclusion can be extended to 1:99 and 99:1. This example demonstrates that MRPs can improve taste profile, flavor intensity and mouth feel of monk fruit extract.

Example 171

Improvement by S-MRP-CH to the Taste and Mouth Feel of Mogroside V20

Common Process:

S-MRP-CH and mogroside V20 were weighed and uniformly prepared according to the weights shown in Table 171.1, dissolved in 100 ml of pure water, and subjected to a mouth feel evaluation test. The tasting procedure is the same as Example 39.

TABLE 171.1 the weight of S-MRP-CH and mogroside V20

| # | Mogroside V20/S-MRP-CH | Weight of mogroside V20 (g) | Weight of S-MRP-CH (g) |
|---|---|---|---|
| 171-01 | 1/0.01 | 0.05 | 0.0005 |
| 171-02 | 1/0.1 | | 0.005 |
| 171-03 | 1/0.3 | | 0.015 |
| 171-04 | 1/0.5 | | 0.025 |
| 171-05 | 1/0.7 | | 0.035 |
| 171-06 | 1/0.9 | | 0.045 |
| 171-07 | 1/1 | | 0.05 |
| 171-08 | 1/2 | | 0.1 |
| 171-09 | 1/3 | | 0.15 |

Experiments

Several mixtures of S-MRP-CH and mogroside V20 were prepared in this example. Each sample was evaluated according to the aforementioned sensory evaluation method, and the average score of the panel was taken as the evaluation result data. The taste profile of the mixture was as follows. It should be noted that according to the sensory evaluation method, the evaluation of the mouth feel and the sweet profile is based on the iso-sweetness. That is to say, in these evaluations, the concentration of mogroside V20 in the sample solution was the same, 500 ppm. The results are shown in Table 171.2.

TABLE 171.2

| the score in sensory evaluation | | | | | | |
|---|---|---|---|---|---|---|
| | sensory evaluation | | | | | |
| | | sweet profile | | | | |
| # | mouth feel kokumi | sweet lingering | bitterness | metallic aftertaste | score of sweet profile | overall like |
| 171-01 | 1 | 3 | 1 | 2 | 4.00 | 2.50 |
| 171-02 | 1 | 3 | 1 | 2 | 4.00 | 2.50 |
| 171-03 | 1 | 3 | 1 | 2 | 4.00 | 2.50 |
| 171-04 | 2 | 2 | 1 | 2 | 4.33 | 3.17 |
| 171-05 | 2 | 2 | 2 | 3 | 3.67 | 2.83 |
| 171-06 | 2 | 2 | 2 | 3 | 3.67 | 2.83 |
| 171-07 | 2 | 2 | 2 | 2 | 4.00 | 3.00 |
| 171-08 | 2 | 2 | 2 | 2 | 4.00 | 3.00 |
| 171-09 | 2 | 2 | 3 | 2 | 3.67 | 2.83 |

Data Analysis

The relationship between the sensory evaluation results to the ratio of mogroside V20 to S-MRP-CH in this example is shown in FIG. 180, The relationship between the overall like results to the ratio of mogroside V20 to S-MRP-CH in this example is shown in FIG. 181.

Conclusion:

The results showed that S-MRPs could significantly improve the taste profile, flavor intensity and mouth feel of a monk fruit extract composition which comprises no less than 20% of mogroside. All ranges in tested ratios of mogroside V20 to S-MRP-CH from 1/0.01 to 1/3 had good taste (overall like score >2.5), preferably when the ratio ranges from 1/0.5 to 1/3, the products provided very good taste (score near or beyond 3). The conclusion can be extended to 1:99 and 99:1. This example demonstrates that S-MRPs can improve taste profile, flavor intensity and mouth feel of monk fruit extract.

Example 172

Improvement by S-MRP-CA to the Taste and Mouth Feel of Mogroside V20

Common Process:

S-MRP-CA and mogroside V20 were weighed and uniformly prepared according to the weights shown in Table 172.1, dissolved in 100 ml of pure water, and subjected to a mouth feel evaluation test. The tasting procedure is the same as Example 39.

TABLE 172.1

| the weight of S-MRP-CA and mogroside V20 | | | |
|---|---|---|---|
| # | Mogroside V20/S-MRP-CA | Weight of mogroside V20 (g) | Weight of S-MRP-CA (g) |
| 172-01 | 1/0.01 | 0.05 | 0.0005 |
| 172-02 | 1/0.1 | | 0.005 |
| 172-03 | 1/0.3 | | 0.015 |
| 172-04 | 1/0.5 | | 0.025 |
| 172-05 | 1/0.7 | | 0.035 |
| 172-06 | 1/0.9 | | 0.045 |
| 172-07 | 1/1 | | 0.05 |
| 172-08 | 1/2 | | 0.1 |

Experiments

Several mixtures of S-MRP-CA and mogroside V20 were prepared in this example. Each sample was evaluated according to the aforementioned sensory evaluation method, and the average score of the panel was taken as the evaluation result data. The taste profile of the mixture was as follows. It should be noted that according to the sensory evaluation method, the evaluation of the mouth feel and the sweet profile is based on the iso-sweetness. That is to say, in these evaluations, the concentration of mogroside V20 in the sample solution was the same, 500 ppm. The results are shown in Table 172.2.

TABLE 172.2

| the score in sensory evaluation | | | | | | |
|---|---|---|---|---|---|---|
| | sensory evaluation | | | | | |
| | | sweet profile | | | | |
| # | mouth feel kokumi | sweet lingering | bitterness | metallic aftertaste | score of sweet profile | overall like |
| 172-01 | 1 | 3 | 1 | 3 | 3.67 | 2.33 |
| 172-02 | 1 | 3 | 1 | 3 | 3.67 | 2.33 |
| 172-03 | 2 | 3 | 1 | 3 | 3.67 | 2.83 |
| 172-04 | 2 | 3 | 1 | 3 | 3.67 | 2.83 |
| 172-05 | 2 | 3 | 2 | 1 | 4.00 | 3.00 |
| 172-06 | 2 | 2 | 2 | 1 | 4.33 | 3.17 |
| 172-07 | 2 | 2 | 2 | 1 | 4.33 | 3.17 |
| 172-08 | 2 | 3 | 2 | 2 | 3.67 | 2.83 |

Data Analysis

The relationship between the sensory evaluation results to the ratio of mogroside V20 to S-MRP-CA in this example is shown in FIG. 182.

The relationship between the overall like results to the ratio of mogroside V20 to S-MRP-CA in this example is shown in FIG. 183.

Conclusion:

The results showed that S-MRPs could significantly improve the taste profile, flavor intensity and mouth feel of a monk fruit extract composition which comprises no less than 20% of mogroside. All ranges in tested ratios of mogroside V20 to S-MRP-CA from 1/0.01 to 1/2 had good taste (overall like score >2), preferably when the ratio ranges from 1/0.7 to 1/1, the products provided very good taste (score >3). The conclusion can be extended to 1:99 and 99:1.

This example demonstrates that S-MRPs can improve taste profile, flavor intensity and mouth feel of monk fruit extract.

Example 173

Improvement by S-MRP-CI to the Taste and Mouth Feel of Mogroside V20

Common Process:

S-MRP-CI and mogroside V20 were weighed and uniformly prepared according to the weights shown in Table 173.1, dissolved in 100 ml of pure water, and subjected to a mouth feel evaluation test. The tasting procedure is the same as Example 39.

TABLE 173.1 the weight of S-MRP-CI and mogroside V20

| # | Mogroside V20/S-MRP-CI | Weight of mogroside V20 (g) | Weight of S-MRP-CI (g) |
|---|---|---|---|
| 173-01 | 1/0.01 | 0.05 | 0.0005 |
| 173-02 | 1/0.1 | | 0.005 |
| 173-03 | 1/0.3 | | 0.015 |
| 173-04 | 1/0.5 | | 0.025 |
| 173-05 | 1/0.7 | | 0.035 |
| 173-06 | 1/0.9 | | 0.045 |
| 173-07 | 1/1 | | 0.05 |
| 173-08 | 1/2 | | 0.1 |

Experiments

Several mixtures of S-MRP-CI and mogroside V20 were prepared in this example. Each sample was evaluated according to the aforementioned sensory evaluation method, and the average score of the panel was taken as the evaluation result data. The taste profile of the mixture was as follows. It should be noted that according to the sensory evaluation method, the evaluation of the mouth feel and the sweet profile is based on the iso-sweetness. That is to say, in these evaluations, the concentration of mogroside V20 in the sample solution was the same, 500 ppm. The results are shown in Table 173.2.

TABLE 173.2 the score in sensory evaluation

| # | sensory evaluation | | | | | |
|---|---|---|---|---|---|---|
| | | sweet profile | | | | |
| | mouth feel kokumi | sweet lingering | bitterness | metallic aftertaste | score of sweet profile | overall like |
| 173-01 | 1 | 3 | 1 | 3 | 3.67 | 2.33 |
| 173-02 | 1 | 3 | 1 | 3 | 3.67 | 2.33 |
| 173-03 | 1 | 3 | 1 | 3 | 3.67 | 2.33 |
| 173-04 | 2 | 3 | 1 | 3 | 3.67 | 2.83 |
| 173-05 | 2 | 2 | 2 | 2 | 4.00 | 3.00 |
| 173-06 | 2 | 2 | 2 | 2 | 4.00 | 3.00 |
| 173-07 | 2 | 2 | 2 | 2 | 4.00 | 3.00 |
| 173-08 | 2 | 3 | 2 | 3 | 3.33 | 2.67 |

Data Analysis

The relationship between the sensory evaluation results to the ratio of mogroside V20 to S-MRP-CI in this example is shown in FIG. 184.

The relationship between the overall like results to the ratio of mogroside V20 to S-MRP-CI in this example is shown in FIG. 185.

Conclusion:

The results showed that S-MRPs could significantly improve the taste profile, flavor intensity and mouth feel of a monk fruit extract composition which comprises no less than 20% of mogroside. All ranges in tested ratios of mogroside V20 to S-MRP-CI from 1/0.01 to 1/2 had good taste (overall like score >2), preferably when the ratio ranges from 1/0.7 to 1/1, the products provided very good taste (score >3). The conclusion can be extended to 1:99 and 99:1. This example demonstrates that S-MRPs can improve taste profile, flavor intensity and mouth feel of monk fruit extract.

Example 174

Improvement by TS-MRP-CH to the Taste and Mouth Feel of Mogroside V20

Common Process:

TS-MRP-CH and mogroside V20 were weighed and uniformly prepared according to the weights shown in Table 1174.1, dissolved in 100 ml of pure water, and subjected to a mouth feel evaluation test. The tasting procedure is the same as Example 39.

TABLE 174.1 the weight of TS-MRP-CH and mogroside V20

| # | Mogroside V20/TS-MRP-CH | Weight of mogroside V20 (g) | Weight of TS-MRP-CH (g) |
|---|---|---|---|
| 174-01 | 1/0.01 | 0.05 | 0.0005 |
| 174-02 | 1/0.1 | | 0.005 |
| 174-03 | 1/0.3 | | 0.015 |
| 174-04 | 1/0.5 | | 0.025 |
| 174-05 | 1/0.7 | | 0.035 |
| 174-06 | 1/0.9 | | 0.045 |
| 174-07 | 1/1 | | 0.05 |
| 174-08 | 1/2 | | 0.1 |
| 174-09 | 1/3 | | 0.15 |
| 174-10 | 1/4 | | 0.2 |

Experiments

Several mixtures of TS-MRP-CH and mogroside V20 were prepared in this example, Each sample was evaluated according to the aforementioned sensory evaluation method, and the average score of the panel was taken as the evaluation result data. The taste profile of the mixture was as follows. It should be noted that according to the sensory evaluation method, the evaluation of the mouth feel and the sweet profile is based on the iso-sweetness. That is to say, in these evaluations, the concentration of mogroside V20 in the sample solution was the same, 500 ppm. The results are shown in Table 174.2.

TABLE 174.2 the score in sensory evaluation

| # | sensory evaluation | | | | | |
|---|---|---|---|---|---|---|
| | | sweet profile | | | | |
| | mouth feel kokumi | sweet lingering | bitterness | metallic aftertaste | score of sweet profile | overall like |
| 174-01 | 1 | 3 | 1 | 2 | 4.00 | 2.50 |
| 174-02 | 1 | 3 | 1 | 3 | 3.67 | 2.33 |
| 174-03 | 1 | 3 | 1 | 3 | 3.67 | 2.33 |
| 174-04 | 2 | 3 | 2 | 3 | 3.33 | 2.67 |
| 174-05 | 2 | 3 | 2 | 3 | 3.33 | 2.67 |
| 174-06 | 2 | 3 | 2 | 2 | 3.67 | 2.83 |
| 174-07 | 2 | 2 | 2 | 2 | 4.00 | 3.00 |
| 174-08 | 2 | 2 | 2 | 2 | 4.00 | 3.00 |
| 174-09 | 2 | 3 | 3 | 2 | 3.33 | 2.67 |
| 174-10 | 2 | 3 | 3 | 2 | 3.33 | 2.67 |

Data Analysis

The relationship between the sensory evaluation results to the ratio of mogroside V20 to TS-MRP-CH in this example is shown in FIG. 186.

The relationship between the overall like results to the ratio of mogroside V20 to TS-MRP-CH in this example is shown in FIG. 187.

Conclusion:

The results showed that TS-MRPs could significantly improve the taste profile, flavor intensity and mouth feel of a monk fruit extract composition which comprises no less than 20% of mogroside. All ranges in tested ratios of mogroside V20 to TS-MRP-CH from 1/0.01 to 1/4 had good taste (overall like score >2), preferably when the ratio ranges from 1/1 to 1/2, the products provided very good taste (score >3). The conclusion can be extended to 1:99 and 99:1. This example demonstrates that TS-MRPs can improve taste profile, flavor intensity and mouth feel of monk fruit extract.

Example 175

Improvement by TS-MRP-CA to the Taste and Mouth Feel of Mogroside V20

Common Process:

TS-MRP-CA and mogroside V20 were weighed and uniformly prepared according to the weights shown in Table 175.1, dissolved in 100 ml of pure water, and subjected to a mouth feel evaluation test. The tasting procedure is the same as Example 39.

TABLE 175.1 the weight of TS-MRP-CA and mogroside V20

| # | Mogroside V20/TS-MRP-CA | Weight of mogroside V20 (g) | Weight of TS-MRP-CA (g) |
|---|---|---|---|
| 175-01 | 1/0.01 | 0.05 | 0.0005 |
| 175-02 | 1/0.1 | | 0.005 |
| 175-03 | 1/0.3 | | 0.015 |
| 175-04 | 1/0.5 | | 0.025 |
| 175-05 | 1/0.7 | | 0.035 |
| 175-06 | 1/0.9 | | 0.045 |
| 175-07 | 1/1 | | 0.05 |
| 175-08 | 1/2 | | 0.1 |

Experiments

Several mixtures of TS-MRP-CA and mogroside V20 were prepared in this example, Each sample was evaluated according to the aforementioned sensory evaluation method, and the average score of the panel was taken as the evaluation result data. The taste profile of the mixture was as follows. It should be noted that according to the sensory evaluation method, the evaluation of the mouth feel and the sweet profile is based on the iso-sweetness. That is to say, in these evaluations, the concentration of mogroside V20 in the sample solution was the same, 500 ppm. The results are shown in Table 175.2.

TABLE 175.2 the score in sensory evaluation

| # | sensory evaluation | | | | | overall like |
|---|---|---|---|---|---|---|
| | | sweet profile | | | | |
| | mouth feel kokumi | sweet lingering | bitterness | metallic aftertaste | score of sweet profile | |
| 175-01 | 1 | 3 | 1 | 2 | 4.00 | 2.50 |
| 175-02 | 1 | 3 | 1 | 3 | 3.67 | 2.33 |
| 175-03 | 1 | 3 | 1 | 3 | 3.67 | 2.33 |
| 175-04 | 2 | 3 | 2 | 2 | 3.67 | 2.83 |
| 175-05 | 2 | 2 | 2 | 2 | 4.00 | 3.00 |
| 175-06 | 2 | 2 | 2 | 2 | 4.00 | 3.00 |
| 175-07 | 2 | 2 | 2 | 2 | 4.00 | 3.00 |
| 175-08 | 2 | 3 | 2 | 3 | 3.33 | 2.67 |

Data Analysis

The relationship between the sensory evaluation results to the ratio of mogroside V20 to TS-MRP-CA in this example is shown in FIG. 188.

The relationship between the overall like results to the ratio of mogroside V20 to TS-MRP-CA in this example is shown in FIG. 189.

Conclusion:

The results showed that TS-MRPs could significantly improve the taste profile, flavor intensity and mouth feel of a monk fruit extract composition which comprises no less than 20% of mogroside. All ranges in tested ratios of mogroside V20 to TS-MRP-CA from 1/0.01 to 1/2 had good taste (overall like score >2), preferably when the ratio ranges from 1/0.7 to 1/1, the products provided very good taste (score >3). The conclusion can be extended to 1:99 and 99:1. This example demonstrates that TS-MRPs can improve taste profile, flavor intensity and mouth feel of monk fruit extract.

Example 176

Improvement by TS-MRP-CI to the Taste and Mouth Feel of Mogroside V20

Common Process:

TS-MRP-CI and mogroside V20 were weighed and uniformly prepared according to the weights shown in Table 176.1, dissolved in 100 ml of pure water, and subjected to a mouth feel evaluation test. The tasting procedure is the same as Example 39.

TABLE 176.1 the weight of TS-MRP-CI and mogroside V20

| # | Mogroside V20/TS-MRP-CI | Weight of mogroside V20 (g) | Weight of TS-MRP-CI (g) |
|---|---|---|---|
| 176-01 | 1/0.01 | 0.05 | 0.0005 |
| 176-02 | 1/0.1 | | 0.005 |
| 176-03 | 1/0.3 | | 0.015 |
| 176-04 | 1/0.5 | | 0.025 |
| 176-05 | 1/0.7 | | 0.035 |
| 176-06 | 1/0.9 | | 0.045 |

TABLE 176.1-continued

| the weight of TS-MRP-CI and mogroside V20 | | | |
|---|---|---|---|
| # | Mogroside V20/TS-MRP-CI | Weight of mogroside V20 (g) | Weight of TS-MRP-CI (g) |
| 176-07 | 1/1 | | 0.05 |
| 176-08 | 1/2 | | 0.1 |

Experiments

Several mixtures of TS-MRP-CI and mogroside V20 were prepared in this example. Each sample was evaluated according to the aforementioned sensory evaluation method, and the average score of the panel was taken as the evaluation result data. The taste profile of the mixture was as follows. It should be noted that according to the sensory evaluation method, the evaluation of the mouth feel and the sweet profile is based on the iso-sweetness. That is to say, in these evaluations, the concentration of mogroside V20 in the sample solution was the same, 500 ppm. The results are shown in Table 176.7.

TABLE 176.2

| the score in sensory evaluation | | | | | | |
|---|---|---|---|---|---|---|
| | sensory evaluation | | | | | |
| | | sweet profile | | | | |
| # | mouth feel kokumi | sweet lingering | bitterness | metallic aftertaste | score of sweet profile | overall like |
| 176-01 | 1 | 2 | 1 | 2 | 4.33 | 2.67 |
| 176-02 | 1 | 2 | 1 | 2 | 4.33 | 2.67 |
| 176-03 | 1 | 2 | 1 | 2 | 4.33 | 2.67 |
| 176-04 | 2 | 3 | 2 | 3 | 3.33 | 2.67 |
| 176-05 | 2 | 3 | 2 | 2 | 3.67 | 2.83 |
| 176-06 | 2 | 2 | 2 | 2 | 4.00 | 3.00 |
| 176-07 | 2 | 2 | 3 | 2 | 3.67 | 2.83 |
| 176-08 | 2 | 3 | 3 | 3 | 3.00 | 2.50 |

Data Analysis

The relationship between the sensory evaluation results to the ratio of mogroside V20 to TS-MRP-CI in this example is shown in FIG. 190.

The relationship between the overall like results to the ratio of mogroside V20 to TS-MRP-CI in this example is shown in FIG. 191.

Conclusion:

The results showed that TS-MRPs could significantly improve the taste profile, flavor intensity and mouth feel of a monk fruit extract composition which comprises no less than 20% of mogroside. All ranges in tested ratios of mogroside V20 to TS-MRP-CI from 1/0.01 to 1/2 had good taste (overall like score >2.5), preferably when the ratio is 1/0.9, the products provided very good taste (score >3). The conclusion can be extended to 1:99 and 99:1. This example demonstrates that TS-MRPs can improve taste profile, flavor intensity and mouth feel of monk fruit extract.

Examples 177-185

The improvement by MRP, S-MRP and TS-MRP to the Taste and Mouth Feel of Sweet Tea Extract The sources of the sweet tea extract and MRP samples used in the following Examples are as follows.

TABLE 177-185

| sample | source | Lot # | specification |
|---|---|---|---|
| Sweet tea extract, RU, rubusoside | EPC Natural Products Co., Ltd, China | 140-32-02 | RU 97.22% |
| MRP-CH | The product of Example 99 | | |
| MRP-FL | The product of Example 96 | | |
| MRP-CI | The product of Example 98 | | |
| S-MRP-CH | The product of Example 101 | | |
| S-MRP-FL | The product of Example 67 | | |

TABLE 177-185-continued

| sample | source | Lot # | specification |
|---|---|---|---|
| S-MRP-CI | The product of Example 100 | | |
| thaumatin | The product of EPC Natural Products Co., Ltd, China | 20180801 | thaumatin 10.74% |
| TS-MRP-CH | the mixture of above S-MRP-CH and thaumatin with the weight ratio of 10:1 | | |
| TS-MRP-FL | the mixture of above S-MRP-FL and thaumatin with the weight ratio of 10:1 | | |
| TS-MRP-CI | the mixture of above S-MRP-CI and thaumatin with the weight ratio of 10:1 | | |

Example 177

Improvement by MRP-CH to the Taste and Mouth Feel of RU

Common Process:

MRP-CH, and RU were weighed and uniformly prepared according to the weights shown in Table 177.1. The mixed powder was weighed in the amount shown in Table 177.1, dissolved in 100 ml of pure water, and subjected to a mouth feel evaluation test. The tasting procedure is the same as Example 39.

TABLE 177.1

| the weight of MRP-CH, and RU | | | | |
|---|---|---|---|---|
| # | Ratio of MRP-CH to RU | Weight of MRP-CH (g) | Weight of RU (g) | Weight of the mixed powder (mg) |
| 177-01 | 0.01/1 | 0.005 | 0.5 | 50.5 |
| 177-02 | 0.1/1 | 0.05 | | 55 |
| 177-03 | 0.3/1 | 0.15 | | 65 |
| 177-04 | 0.5/1 | 0.25 | | 75 |
| 177-05 | 0.7/1 | 0.35 | | 85 |
| 177-06 | 0.9/1 | 0.45 | | 95 |
| 177-07 | 1/1 | 0.5 | | 100 |
| 177-08 | 2/1 | 1 | | 150 |

Experiments

Several mixtures of MRP-CH and RU were prepared in this example. Each sample was evaluated according to the aforementioned sensory evaluation method, and the average score of the panel was taken as the evaluation result data. The taste profile of the mixture was as follows. It should be noted that according to the sensory evaluation method, the evaluation of the mouth feel and the sweet profile is based on the iso-sweetness. That is to say, in these evaluations, the concentration of RU in the sample solution was the same, 500 ppm. The results are shown in Table 177.2.

TABLE 177.2

| the score in sensory evaluation | | | | | | | |
|---|---|---|---|---|---|---|---|
| | | sensory evaluation | | | | | |
| | | | sweet profile | | | | |
| # | flavor | mouth feel kokumi | sweet lingering | aftertaste | metallic bitterness | score of sweet profile | overall like |
| 177-01 | chocolate | 1 | 3 | 3 | 1 | 3.67 | 2.33 |
| 177-02 | | 2 | 3 | 2 | 1 | 4.00 | 3.00 |
| 177-03 | | 2 | 2 | 2 | 1 | 4.33 | 3.17 |
| 177-04 | | 3 | 2 | 1 | 1 | 4.67 | 3.83 |
| 177-05 | | 3 | 2 | 1 | 1 | 4.67 | 3.83 |
| 177-06 | | 3 | 2 | 1 | 1 | 4.67 | 3.83 |
| 177-07 | | 4 | 2 | 1 | 1 | 4.67 | 4.33 |
| 177-08 | | 4 | 1 | 1 | 1 | 5.00 | 4.50 |

Data Analysis

The relationship between the sensory evaluation results to the ratio of MRP-CH to RU in this example is shown in FIG. 192.

The relationship between the overall like results to the ratio of MRP-CH to RU in this example is shown in FIG. 193.

Conclusion:

The results showed that MRPs could significantly improve the taste profile, flavor intensity and mouth feel of sweet tea extract composition which comprises rubusoside. All ranges in tested ratios of MRP-CH to RU from 0.01/1 to 2/1 had good taste (overall like score >2), preferably when the ratio ranges from 0.3/1 to 2/1, the products provided very good taste (score >3). The conclusion can be extended to 1:99 and 99:1. This example demonstrates that MRPs can improve taste profile, flavor intensity and mouth feel of sweet tea extract.

Example 178

Improvement of MRP-FL to the Taste and Mouth Feel of RU

Common Process:

MRP-FL, and RU were weighed and uniformly prepared according to the weight shown in Table 178.1. The mixed powder was weighed in the amounts shown in Table 178.1, dissolved in 100 ml of pure water, and subjected to a mouth feel evaluation test. The tasting procedure is the same as Example 39.

TABLE 178.1 the weight of MRP-FL, and RU

| # | Ratio of MRP-FL to RU | Weight of MRP-FL (g) | Weight of RU (g) | Weight of the mixed powder (mg) |
|---|---|---|---|---|
| 178-01 | 0.01/1 | 0.005 | 0.5 | 50.5 |
| 178-02 | 0.1/1 | 0.05 | | 55 |
| 178-03 | 0.3/1 | 0.15 | | 65 |
| 178-04 | 0.5/1 | 0.25 | | 75 |
| 178-05 | 0.7/1 | 0.35 | | 85 |
| 178-06 | 0.9/1 | 0.45 | | 95 |
| 178-07 | 1/1 | 0.5 | | 100 |
| 178-08 | 2/1 | 1 | | 150 |

Experiments

Several mixtures of MRP-FL and RU were prepared in this example. Each sample was evaluated according to the aforementioned sensory evaluation method, and the average score of the panel was taken as the evaluation result data. The taste profile of the mixture was as follows. It should be noted that according to the sensory evaluation method, the evaluation of the mouth feel and the sweet profile is based on the iso-sweetness. That is to say, in these evaluations, the concentration of RU in the sample solution was the same, 500 ppm. The results are shown in Table 178.2.

TABLE 178.2 the score in sensory evaluation

| | | sensory evaluation | | | | | |
|---|---|---|---|---|---|---|---|
| | | | sweet profile | | | | |
| # | flavor | mouth feel kokumi | sweet lingering | bitterness | metallic aftertaste | score of sweet profile | overall like |
| 178-01 | Floral | 1 | 3 | 2 | 1 | 4.00 | 2.50 |
| 178-02 | | 2 | 3 | 2 | 1 | 4.00 | 3.00 |
| 178-03 | | 2 | 2 | 2 | 1 | 4.33 | 3.17 |
| 178-04 | | 3 | 2 | 2 | 1 | 4.33 | 3.67 |
| 178-05 | | 3 | 2 | 3 | 1 | 4.00 | 3.50 |
| 178-06 | | 3 | 2 | 3 | 1 | 4.00 | 3.50 |
| 178-07 | | 3 | 1 | 3 | 1 | 4.33 | 3.67 |
| 178-08 | | 4 | 1 | 3 | 1 | 4.33 | 4.17 |

Data Analysis

The relationship between the sensory evaluation results to the ratio of MRP-FL to RU in this example is shown in FIG. 194.

The relationship between the overall like results to the ratio of MRP-FL to RU in this example is shown in FIG. 195.

Conclusion:

The results showed that MRPs could significantly improve the taste profile, flavor intensity and mouth feel of a sweet tea extract composition which comprises rubusoside. All ranges in tested ratios of MRP-FL to RC, from 0.01/1 to 2/1 had good taste (overall like score >2.5), preferably when the ratio ranges from 0.1/1 to 2/1, the products provided very good taste (score >3). The conclusion can be extended to 1:99 and 99:1. This example demonstrates that MRPs can improve taste profile, flavor intensity and mouth feel of sweet tea extract.

Example 179

Improvement by MRP-CI to the Taste and Mouth Feel of RU

Common Process:

MRP-CI, and R11 were weighed and uniformly prepared according to the weights shown in Table 179.1. The mixed powder was weighed in the amount shown in Table 179.1, dissolved in 100 ml of pure water, and subjected to a mouth feel evaluation test. The tasting procedure is the same as Example 39.

TABLE 179.1 the weight of MRP-CI, and RU

| # | Ratio of MRP-CI to RU | Weight of MRP-CI (g) | Weight of RU (g) | Weight of the mixed powder (mg) |
|---|---|---|---|---|
| 179-01 | 0.01/1 | 0.005 | 0.5 | 50.5 |
| 179-02 | 0.1/1 | 0.05 | | 55 |
| 179-03 | 0.3/1 | 0.15 | | 65 |
| 179-04 | 0.5/1 | 0.25 | | 75 |
| 179-05 | 0.7/1 | 0.35 | | 85 |
| 179-06 | 0.9/1 | 0.45 | | 95 |
| 179-07 | 1/1 | 0.5 | | 100 |
| 179-08 | 2/1 | 1 | | 150 |

Experiments

Several mixtures of MRP-CI and RU were prepared in this example. Each sample was evaluated according to the aforementioned sensory evaluation method, and the average score of the panel was taken as the evaluation result data. The taste profile of the mixture was as follows. It should be noted that according to the sensory evaluation method, the evaluation of the mouth feel and the sweet profile is based on the iso-sweetness. That is to say, in these evaluations, the concentration of RU in the sample solution was the same, 500 ppm. The results are shown in Table 179.2.

TABLE 179.2

| the score in sensory evaluation | | | | | | | |
|---|---|---|---|---|---|---|---|
| | | sensory evaluation | | | | | |
| | | | sweet profile | | | | |
| # | flavor | mouth feel kokumi | sweet lingering | bitterness | metallic aftertaste | score of sweet profile | overall like |
| 179-01 | Citrus | 1 | 3 | 3 | 1 | 3.67 | 2.33 |
| 179-02 | | 1 | 3 | 3 | 1 | 3.67 | 2.33 |
| 179-03 | | 2 | 2 | 2 | 1 | 4.33 | 3.17 |
| 179-04 | | 3 | 2 | 1 | 1 | 4.67 | 3.83 |
| 179-05 | | 3 | 1 | 1 | 1 | 5.00 | 4.00 |
| 179-06 | | 3 | 1 | 1 | 1 | 5.00 | 4.00 |
| 179-07 | | 4 | 1 | 1 | 1 | 5.00 | 4.50 |
| 179-08 | | 4 | 1 | 1 | 1 | 5.00 | 4.50 |

Data Analysis

The relationship between the sensory evaluation results to the ratio of MRP-CI to RU in this example is shown in FIG. 196.

The relationship between the overall like results to the ratio of MRP-CI to RU in this example is shown in FIG. 197.

Conclusion:

The results showed that MRPs could significantly improve the taste profile, flavor intensity and mouth feel of a sweet tea extract composition which comprises rubusoside. All ranges in tested ratios of MRP-CI to RU from 0.01/1 to 2/1 had good taste (overall like score >2), preferably when the ratio ranges from 0.3/1 to 2/1, the products provided very good taste (score >3). The conclusion can be extended to 1:99 and 99:1. This example demonstrates that MRPs can improve taste profile, flavor intensity and mouth feel of sweet tea extract.

Example 180

Improvement by S-MRP-CH to the Taste and Mouth Feel of RU

Common Process:

S-MRP-CH, and RU were weighed and uniformly prepared according to the weights shown in Table 180.1. The mixed powder was weighed in the amount shown in Table 180.1, dissolved in 100 ml of pure water, and subjected to a mouth feel evaluation test. The tasting procedure is the same as Example 39.

TABLE 180.1

| the weight of S-MRP-CH, and RU | | | | |
|---|---|---|---|---|
| # | Ratio of S-MRP-CH to RU | Weight of S-MRP-CH (g) | Weight of RU (g) | Weight of the mixed powder (mg) |
| 180-01 | 0.01/1 | 0.005 | 0.5 | 50.5 |
| 180-02 | 0.1/1 | 0.05 | | 55 |
| 180-03 | 0.3/1 | 0.15 | | 65 |
| 180-04 | 0.5/1 | 0.25 | | 75 |
| 180-05 | 0.7/1 | 0.35 | | 85 |
| 180-06 | 0.9/1 | 0.45 | | 95 |
| 180-07 | 1/1 | 0.5 | | 100 |
| 180-08 | 2/1 | 1 | | 150 |

Experiments

Several mixtures of S-MRP-CH and RU were prepared in this example. Each sample was evaluated according to the aforementioned sensory evaluation method, and the average score of the panel was taken as the evaluation result data. The taste profile of the mixture was as follows. It should be noted that according to the sensory evaluation method, the evaluation of the mouth feel and the sweet profile is based on the iso-sweetness. That is to say, in these evaluations, the concentration of RU in the sample solution was the same, 500 ppm. The results are shown in Table 180.2.

TABLE 180.2

| the score in sensory evaluation | | | | | | | |
|---|---|---|---|---|---|---|---|
| | | sensory evaluation | | | | | |
| | | | sweet profile | | | | |
| # | flavor | mouth feel kokumi | sweet lingering | bitterness | metallic aftertaste | score of sweet profile | overall like |
| 180-01 | chocolate | 1 | 3 | 3 | 1 | 3.67 | 2.33 |
| 180-02 | | 1 | 3 | 2 | 1 | 4.00 | 2.50 |
| 180-03 | | 2 | 2 | 2 | 1 | 4.33 | 3.17 |
| 180-04 | | 2 | 2 | 1 | 1 | 4.67 | 3.33 |
| 180-05 | | 2 | 2 | 1 | 1 | 4.67 | 3.33 |
| 180-06 | | 3 | 2 | 1 | 1 | 4.67 | 3.83 |
| 180-07 | | 3 | 2 | 1 | 1 | 4.67 | 3.83 |
| 180-08 | | 3 | 1 | 1 | 1 | 5.00 | 4.00 |

Data Analysis

The relationship between the sensory evaluation results to the ratio of S-MRP-CH to RU in this example is shown in FIG. 198.

The relationship between the overall like results to the ratio of S-MRP-CH to RU in this example is shown in FIG. 199.

Conclusion:

The results showed that S-MRPs could significantly improve the taste profile, flavor intensity and mouth feel of a sweet tea extract composition which comprises rubusoside. All ranges in tested ratios of S-MRP-CH to RU from 0.01/1 to 2/1 had good taste (overall like score) >2), preferably when the ratio ranges from 0.3/1 to 2/1, the products provided very good taste (score >3). The conclusion can be extended to 1:99 and 99:1. This example demonstrates that MRPs can improve taste profile, flavor intensity and mouth feel of sweet tea extract.

Example 181

Improvement of S-MRP-FL by the Taste and Mouth Feel of RU

Common Process:

S-MRP-FL, and RU were weighed and uniformly prepared according to the weights shown in Table 181.1. The mixed powder was weighed in the amount shown in Table 181.1, dissolved in 100 ml of pure water, and subjected to a mouth feel evaluation test. The tasting procedure is the same as Example 39.

TABLE 181.1 the weight of S-MRP-FL, and RU

| # | Ratio of S-MRP-FL to RU | Weight of S-MRP-FL (g) | Weight of RU (g) | Weight of the mixed powder (mg) |
|---|---|---|---|---|
| 181-01 | 0.01/1 | 0.005 | 0.5 | 50.5 |
| 181-02 | 0.1/1 | 0.05 | | 55 |
| 181-03 | 0.3/1 | 0.15 | | 65 |
| 181-04 | 0.5/1 | 0.25 | | 75 |
| 181-05 | 0.7/1 | 0.35 | | 85 |
| 181-06 | 0.9/1 | 0.45 | | 95 |
| 181-07 | 1/1 | 0.5 | | 100 |
| 181-08 | 2/1 | 1 | | 150 |

Experiments

Several mixtures of S-MRP-FL and RU were prepared in this example. Each sample was evaluated according to the aforementioned sensory evaluation method, and the average score of the panel was taken as the evaluation result data. The taste profile of the mixture was as follows. It should be noted that according to the sensory evaluation method, the evaluation of the mouth feel and the sweet profile is based on the iso-sweetness. That is to say, in these evaluations, the concentration of RU in the sample solution was the same, 500 ppm. The results are shown in Table 181.2.

TABLE 181.2 the score in sensory evaluation

| | | sensory evaluation | | | | | |
|---|---|---|---|---|---|---|---|
| | | | sweet profile | | | | |
| # | flavor | mouth feel kokumi | sweet lingering | bitterness | metallic aftertaste | score of sweet profile | overall like |
| 181-01 | Floral | 1 | 3 | 3 | 1 | 3.67 | 2.33 |
| 181-02 | | 1 | 3 | 2 | 1 | 4.00 | 2.50 |
| 181-03 | | 2 | 2 | 2 | 1 | 4.33 | 3.17 |
| 181-04 | | 2 | 2 | 1 | 1 | 4.67 | 3.33 |
| 181-05 | | 2 | 2 | 1 | 1 | 4.67 | 3.33 |
| 181-06 | | 3 | 2 | 1 | 1 | 4.67 | 3.83 |
| 181-07 | | 3 | 2 | 1 | 1 | 4.67 | 3.83 |
| 181-08 | | 3 | 1 | 1 | 1 | 5.00 | 4.00 |

Data Analysis

The relationship between the sensory evaluation results to the ratio of S-MRP-FL to RU in this example is shown in FIG. 200.

The relationship between the overall like results to the ratio of S-MRP-FL to RU in this example is shown in FIG. 201.

Conclusion:

The results showed that S-MRPs could significantly improve the taste profile, flavor intensity and mouth feel of a sweet tea extract composition which comprises rubusoside. All ranges in tested ratios of S-MRP-FL to RU from 0.01/1 to 2/1 had good taste (overall like score >2.5), preferably when the ratio ranges from 0.3/1 to 2/1, the products provided very good taste (score >3). The conclusion can be extended to 1:99 and 99:1. This example demonstrates that MRPs can improve taste profile, flavor intensity and mouth feel of sweet tea extract, Example 182

Improvement by S-MRP-CI to the Taste and Mouth Feel of RU

Common Process:

S-MRP-CI, and RU were weighed and uniformly prepared according to the weights shown in Table 182.1. The mixed powder was weighed in the amount shown in Table 182.1, dissolved in 100 ml of pure water, and subjected to a mouth feel evaluation test. The tasting procedure is the same as Example 39.

TABLE 182.1 the weight of S-MRP-CI, and RU

| # | Ratio of S-MRP-CI to RU | Weight of S-MRP-CI (g) | Weight of RU (g) | Weight of the mixed powder (mg) |
|---|---|---|---|---|
| 182-01 | 0.01/1 | 0.005 | 0.5 | 50.5 |
| 182-02 | 0.1/1 | 0.05 | | 55 |

TABLE 182.1-continued

| the weight of S-MRP-CI, and RU | | | | |
|---|---|---|---|---|
| # | Ratio of S-MRP-CI to RU | Weight of S-MRP-CI (g) | Weight of RU (g) | Weight of the mixed powder (mg) |
| 182-03 | 0.3/1 | 0.15 | | 65 |
| 182-04 | 0.5/1 | 0.25 | | 75 |
| 182-05 | 0.7/1 | 0.35 | | 85 |
| 182-06 | 0.9/1 | 0.45 | | 95 |
| 182-07 | 1/1 | 0.5 | | 100 |
| 182-08 | 2/1 | 1 | | 150 |

Experiments

Several mixtures of S-MRP-CI and RU were prepared in this example. Each sample was evaluated according to the aforementioned sensory evaluation method, and the average score of the panel was taken as the evaluation result data. The taste profile of the mixture was as follows. It should be noted that according to the sensory evaluation method, the evaluation of the mouth feel and the sweet profile is based on the iso-sweetness. That is to say, in these evaluations, the concentration of RU in the sample solution was the same, 500 ppm. The results are shown in Table 182.2.

TABLE 182.2

| the score in sensory evaluation | | | | | | | |
|---|---|---|---|---|---|---|---|
| | | sensory evaluation | | | | | |
| | | | sweet profile | | | | |
| # | flavor | mouth feel kokumi | sweet lingering | bitterness | metallic aftertaste | score of sweet profile | overall like |
| 182-01 | Citrus | 1 | 3 | 3 | 1 | 3.67 | 2.33 |
| 182-02 | | 1 | 2 | 2 | 1 | 4.33 | 2.67 |
| 182-03 | | 2 | 2 | 2 | 1 | 4.33 | 3.17 |
| 182-04 | | 2 | 2 | 1 | 1 | 4.67 | 3.33 |
| 182-05 | | 3 | 2 | 1 | 1 | 4.67 | 3.83 |
| 182-06 | | 3 | 2 | 1 | 1 | 4.67 | 3.83 |
| 182-07 | | 3 | 1 | 1 | 1 | 5.00 | 4.00 |
| 182-08 | | 3 | 1 | 1 | 1 | 5.00 | 4.00 |

Data Analysis

The relationship between the sensory evaluation results to the ratio of S-MRP-CI to RU in this example is shown in FIG. 202.

The relationship between the overall like results to the atio of S-MRP-CI to RU in this example is shown in FIG. 203.

Conclusion:

The results showed that S-MRPs could significantly improve the taste profile, flavor intensity and mouth feel of a sweet tea extract composition which comprises rubusoside. All ranges in tested ratios of S-MRP-CI to RU from 0.01/1 to 2/1 had good taste (overall like score 2), preferably when the ratio ranges from 0.3/1 to 2/1, the products provide very good taste (score >3). The conclusion can be extended to 1:99 and 99:1, This example demonstrates that MRPs can improve taste profile, flavor intensity and mouth feel of sweet tea extract.

Example 183

Improvement by TS-MRP-CH to the Taste and Mouth Feel of RU

Common Process:

TS-MRP-CH, and RU were weighed and uniformly prepared according to the weights shown in Table 183.1. The mixed powder was weighed in the amount shown in Table 183.1, dissolved in 100 ml of pure water, and subjected to a mouth feel evaluation test. The tasting procedure is the same as Example 39.

TABLE 183.1

| the weight of TS-MRP-CH, and RU | | | | |
|---|---|---|---|---|
| # | Ratio of TS-MRP-CH to RU | Weight of TS-MRP-CH (g) | Weight of RU (g) | Weight of the mixed powder (mg) |
| 183-01 | 0.01/1 | 0.005 | 0.5 | 50.5 |
| 183-02 | 0.1/1 | 0.05 | | 55 |
| 183-03 | 0.3/1 | 0.15 | | 65 |
| 183-04 | 0.5/1 | 0.25 | | 75 |
| 183-05 | 0.7/1 | 0.35 | | 85 |
| 183-06 | 0.9/1 | 0.45 | | 95 |

TABLE 183.1-continued

| the weight of TS-MRP-CH, and RU | | | | |
|---|---|---|---|---|
| # | Ratio of TS-MRP-CH to RU | Weight of TS-MRP-CH (g) | Weight of RU (g) | Weight of the mixed powder (mg) |
| 183-07 | 1/1 | 0.5 | | 100 |
| 183-08 | 2/1 | 1 | | 150 |

Experiments

Several mixtures of TS-MRP-CH and RU were prepared in this example. Each sample was evaluated according to the aforementioned sensory evaluation method, and the average score of the panel was taken as the evaluation result data. The taste profile of the mixture was as follows. It should be noted that according to the sensory evaluation method, the evaluation of the mouth feel and the sweet profile is based on the iso-sweetness. That is to say, in these evaluations, the concentration of RU in the sample solution was the same, 500 ppm. The results are shown in Table 183.2.

TABLE 183.2

| the score in sensory evaluation | | | | | | | |
|---|---|---|---|---|---|---|---|
| | | sensory evaluation | | | | | |
| | | | sweet profile | | | | |
| # | flavor | mouth feel kokumi | sweet lingering | bitterness | metallic aftertaste | score of sweet profile | overall like |
| 183-01 | chocolate | 1 | 2 | 3 | 1 | 4.00 | 2.50 |
| 183-02 | | 1 | 2 | 3 | 1 | 4.00 | 2.50 |
| 183-03 | | 2 | 2 | 2 | 1 | 4.33 | 3.17 |
| 183-04 | | 2 | 3 | 2 | 1 | 4.00 | 3.00 |
| 183-05 | | 3 | 3 | 2 | 1 | 4.00 | 3.50 |
| 183-06 | | 3 | 3 | 1 | 1 | 4.33 | 3.67 |
| 183-07 | | 3 | 4 | 1 | 1 | 4.00 | 3.50 |
| 183-08 | | 3 | 4 | 1 | 1 | 4.00 | 3.50 |

Data Analysis

The relationship between the sensory evaluation results to the ratio of TS-MRP-CH to RU in this example is shown in FIG. 204.

The relationship between the overall like results to the ratio of TS-MRP-CH to RU in this example is shown in FIG. 205.

Conclusion:

The results showed that TS-MRPs could significantly improve the taste profile, flavor intensity and mouth feel of a sweet tea extract composition which comprises rubusoside. All ranges in tested ratios of TS-MRP-CH to RU from 0.01/1 to 2/1 had good taste (overall like score >2.5), preferably when the ratio ranges from 0.3/1 to 2/1, the products provided very good taste (score >3). The conclusion can be extended to 1:99 and 99:1. This example demonstrates that MRPs can improve taste profile, flavor intensity and mouth feel of sweet tea extract.

Example 184

Improvement by TS-MRP-FL to the Taste and Mouth Feel of RU

Common Process:

TS-MRP-FL, and RU were weighed and uniformly prepared according to the weights shown in Table 184.1, The mixed powder was weighed in the amount shown in Table 184.1, dissolved in 100 ml of pure water, and subjected to a mouth feel evaluation test. The tasting procedure is the same as Example 39.

TABLE 184.1

| the weight of TS-MRP-FL, and RU | | | | |
|---|---|---|---|---|
| # | Ratio of TS-MRP-FL to RU | Weight of TS-MRP-FL (g) | Weight of RU (g) | Weight of the mixed powder (mg) |
| 184-01 | 0.01/1 | 0.005 | 0.5 | 50.5 |
| 184-02 | 0.1/1 | 0.05 | | 55 |
| 184-03 | 0.3/1 | 0.15 | | 65 |
| 184-04 | 0.5/1 | 0.25 | | 75 |
| 184-05 | 0.7/1 | 0.35 | | 85 |
| 184-06 | 0.9/1 | 0.45 | | 95 |
| 184-07 | 1/1 | 0.5 | | 100 |
| 184-08 | 2/1 | 1 | | 150 |

Experiments

Several mixtures of TS-MRP-FL and RU were prepared in this example. Each sample was evaluated according to the aforementioned sensory evaluation method, and the average score of the panel was taken as the evaluation result data. The taste profile of the mixture was as follows. It should be noted that according to the sensory evaluation method, the evaluation of the mouth feel and the sweet profile is based on the iso-sweetness. That is to say, in these evaluations, the concentration of RU in the sample solution was the same, 500 ppm. The results are shown in Table 184.2.

TABLE 184.2

| the score in sensory evaluation | | | | | | | |
|---|---|---|---|---|---|---|---|
| | | sensory evaluation | | | | | |
| | | | sweet profile | | | | |
| # | flavor | mouth feel kokumi | sweet lingering | bitterness | metallic aftertaste | score of sweet profile | overall like |
| 184-01 | Floral | 1 | 3 | 2 | 1 | 4.00 | 2.50 |
| 184-02 | | 1 | 2 | 2 | 1 | 4.33 | 2.67 |
| 184-03 | | 2 | 2 | 3 | 1 | 4.00 | 3.00 |
| 184-04 | | 2 | 2 | 3 | 1 | 4.00 | 3.00 |
| 184-05 | | 3 | 3 | 2 | 1 | 4.00 | 3.50 |
| 184-06 | | 3 | 3 | 4 | 1 | 3.33 | 3.17 |
| 184-07 | | 3 | 3 | 4 | 1 | 3.33 | 3.17 |
| 184-08 | | 3 | 3 | 4 | 1 | 3.33 | 3.17 |

Data Analysis

The relationship between the sensory evaluation results to the ratio of TS-MRP-FL to RU in this example is shown in FIG. 206.

The relationship between the overall like results to the ratio of TS-MRP-FL to RU in this example is shown in FIG. 207.

Conclusion:

The results showed that TS-MRPs could significantly improve the taste profile, flavor intensity and mouth feel of a sweet tea extract composition which comprises rubuso-side. All ranges in tested ratios of TS-MRP-FL to RU from 0.01/1 to 2/1 had good taste (overall like score >2.5), preferably when the ratio ranges from 0.3/1 to 2/1, the products provided very good taste (score >3). The conclusion can be extended to 1:99 and 99:1. This example demonstrates that MRPs can improve taste profile, flavor intensity and mouth feel of sweet tea extract.

Example 185

Improvement by TS-MRP-CI to the Taste and Mouth Feel of RU

Common Process:

TS-MRP-CI, and RU were weighed and uniformly prepared according to the weights shown in Table 185.1. The mixed powder was weighed in the amount shown in Table 185.1, dissolved in 100 ml of pure water, and subjected to a mouth feel evaluation test. The tasting procedure is the same as Example 39.

TABLE 185.1 the weight of TS-MRP-CI, and RU

| # | Ratio of TS-MRP-CI to RU | Weight of TS-MRP-CI (g) | Weight of RU (g) | Weight of the mixed powder (mg) |
|---|---|---|---|---|
| 185-01 | 0.01/1 | 0.005 | 0.5 | 50.5 |
| 185-02 | 0.1/1 | 0.05 | | 55 |
| 185-03 | 0.3/1 | 0.15 | | 65 |
| 185-04 | 0.5/1 | 0.25 | | 75 |
| 185-05 | 0.7/1 | 0.35 | | 85 |
| 185-06 | 0.9/1 | 0.45 | | 95 |
| 185-07 | 1/1 | 0.5 | | 100 |
| 185-08 | 2/1 | 1 | | 150 |

Experiments

Several mixtures of TS-MRP-CI and RU were prepared in this example. Each sample was evaluated according to the aforementioned sensory evaluation method, and the average score of the panel was taken as the evaluation result data. The taste profile of the mixture was as follows. It should be noted that according to the sensory evaluation method, the evaluation of the mouth feel and the sweet profile is based on the iso-sweetness. That is to say, in these evaluations, the concentration of RU in the sample solution was the same, 500 ppm. The results are shown in Table 185.2.

TABLE 185.2 the score in sensory evaluation

| | | sensory evaluation | | | | | |
|---|---|---|---|---|---|---|---|
| | | | sweet profile | | | | |
| # | flavor | mouth feel kokumi | sweet lingering | bitterness | metallic aftertaste | score of sweet profile | overall like |
| 185-01 | Citrus | 1 | 2 | 3 | 1 | 4.00 | 2.50 |
| 185-02 | | 1 | 2 | 3 | 1 | 4.00 | 2.50 |
| 185-03 | | 2 | 2 | 2 | 1 | 4.33 | 3.17 |
| 185-04 | | 3 | 2 | 1 | 1 | 4.67 | 3.83 |
| 185-05 | | 3 | 2 | 1 | 1 | 4.67 | 3.83 |
| 185-06 | | 3 | 2 | 1 | 1 | 4.67 | 3.83 |
| 185-07 | | 3 | 2 | 1 | 1 | 4.67 | 3.83 |
| 185-08 | | 3 | 2 | 1 | 1 | 4.67 | 3.83 |

Data Analysis

The relationship between the sensory evaluation results to the ratio of TS-MRP-CI to RU in this example is shown in FIG. 208.

The relationship between the overall like results to the ratio of TS-MRP-CI to RU in this example is shown in FIG. 209.

Conclusion:

The results showed that TS-MRPs could significantly improve the taste profile, flavor intensity and mouth feel of a sweet tea extract composition which comprises rubuso-side. All ranges in tested ratios of TS-MRP-CI to RU from 0.01/1 to 2/1 had good taste (overall like score >2.5), preferably when the ratio ranges from 0.3/1 to 2/1, the products provided very good taste (score >3). The conclusion could be extended to 1:99 and 99:1. This example demonstrates that MRPs can improve taste profile, flavor intensity and mouth feel of sweet tea extract.

Example 186

The Synergic Effect of MRP, S-MRP or TS-MRP to Flavor

TABLE 186.1 materials

| Sample | Source | Lot # | Specification |
|---|---|---|---|
| Citrus flavor | FONA | 828.078 | |
| Vanilla flavor | FONA | 143.33081 | |
| Lemon flavor | FONA | 49.1715D | |
| Cherry flavor | FONA | 33.13555 | |
| Peach flavor | FONA | 105.12533 | |
| Apple flavor | FONA | 03.1255D | |
| Mocha flavor | FONA | 43.31168 | |
| MRP-CH | The product of Example 99 | | |
| MRP-CI | The product of Example 98 | | |
| MRP-FL | The product of Example 96 | | |
| MRP-CA | The product of Example 97 | | |
| S-MRP-FL | The product of Example 67 | | |

TABLE 186.1-continued

| materials | | | |
|---|---|---|---|
| Sample | Source | Lot # | Specification |
| S-MRP-CA | The product of Example 68 | | |
| S-MRP-CH | The product of Example 101 | | |
| S-MRP-CI | The product of Example 100 | | |
| Thaumatin | EPC Natural Products Co., Ltd, China | 20180801 | thaumatin 10.74% |
| TS-MRP-CH | the mixture of above S-MRP-CH and thaumatin with the weight ratio of 10:1 | | |
| TS-MRP-CI | the mixture of above S-MRP-CI and thaumatin with the weight ratio of 10:1 | | |
| TS-MRP-FL | the mixture of above S-MRP-FL and thaumatin with the weight ratio of 10:1 | | |
| TS-MRP-CA | the mixture of above S-MRP-CA and thaumatin with the weight ratio of 10:1 | | |

Method

The flavor, MRP, S-MRP or TS-MRP was dissolved into pure water, respectively. The solution was diluted with pure water to make several diluents with different concentrations. The threshold perception levels of the flavor, MRP, S-MRP or TS-MRP, were determined by sensory evaluation.

Flavored solutions with the concentration of threshold perception level were prepared. MRP, S-MRP or TS-MRP was added to the solution so that its concentration was kept below its threshold concentration perception level.

It was determined whether the solution presented flavor by sensory evaluation to determine whether MRP, S-MRP or TS-MRP had a synergic effect with the flavor.

Results

The threshold perception levels of flavor, MRP, S-MRP or TS-MRP are listed in the table below.

TABLE 186.2

| Sample | | Concentration of threshold |
|---|---|---|
| Category | Product | perception level (ppm) |
| Flavor | Citrus flavor | 4 |
| | Vanilla flavor | 13 |
| | Lemon flavor | 5 |
| | Cherry flavor | 20 |
| | Peach flavor | 50 |
| | Apple flavor | 7 |
| | Citrus flavor | 86 |
| MRP | MRP-CI | 150 |
| | MRP-CA | 60 |
| | MRP-CH | 258 |
| | MRP-FL | 220 |
| S-MRP | S-MRP-FL | 45 |
| | S-MRP-CA | 75 |
| | S-MRP-CH | 86 |
| | S-MRP-CI | 80 |
| TS-MRP | TS-MRP-CH | 86 |
| | TS-MRP-CI | 110 |
| | TS-MRP-FL | 28 |
| | TS-MRP-CA | 30 |

The results of sensory evaluation of the flavors after adding MRP, S-MRP or TS-MRP are as follow.

Note that "√" means the flavor can be perceived while "×" means the flavor cannot be perceived. "–" means the evaluation was not conducted.

TABLE 186.3

| | Flavor (Concentration, ppm) | | | | | | |
|---|---|---|---|---|---|---|---|
| MRP (concentration, ppm) | Citrus flavor (4) | Vanilla flavor (13) | Lemon flavor (5) | Cherry flavor (20) | Peach flavor (50) | Apple flavor (7) | Mocha flavor (86) |
| MRP-CI (150) | ✓ | ✓ | ✓ | ✓ | ✓ | ✓ | — |
| MRP-CA (60) | x | x | ✓ | x | x | ✓ | — |
| MRP-CH (258) | — | — | — | — | — | — | ✓ |
| MRP-FL (220) | ✓ | x | x | x | x | x | — |
| S-MRP-FL (45) | ✓ | ✓ | ✓ | ✓ | ✓ | ✓ | — |
| S-MRP-CA (75) | ✓ | ✓ | ✓ | ✓ | ✓ | ✓ | — |
| S-MRP-CH (86) | ✓ | ✓ | ✓ | ✓ | ✓ | ✓ | ✓ |
| S-MRP-CI (80) | ✓ | ✓ | ✓ | ✓ | ✓ | ✓ | — |
| TS-MRP-CH (50) | — | — | ✓ | ✓ | — | ✓ | ✓ |
| TS-MRP-CI (50) | — | — | ✓ | ✓ | — | ✓ | — |
| TS-MRP-FL (28) | — | — | ✓ | x | — | ✓ | — |
| TS-MRP-CA (30) | — | — | x | ✓ | — | ✓ | — |

Conclusion:

From the above sensory evaluation results, it was surprisingly found that when MRP, S-MRP, or TS-MRP was used under its threshold perception level, some or all of the thresholds of the flavors can be reduced. There is a clear synergistic effect of MRP, S-MRP, or TS-MRP to flavors. The synergistic effect of S-MRP to flavor is particularly significant.

Examples 187-189

The Synergistic Effect and Taste Improvement of MRP, S-MRP and TS-MRP to Thickeners The materials used in the follow examples are listed in the table below.

TABLE 187-189

| Sample | Source | Lot # | Specification |
|---|---|---|---|
| Carrageenan | | | |
| Gellan gum | | | |
| Tamarind gum | | | |
| MRP-CH | The product of Example 99 | | |
| MRP-FL | The product of Example 96 | | |
| MRP-CA | The product of Example 97 | | |
| S-MRP-FL | The product of Example 67 | | |
| S-MRP-CA | The product of Example 68 | | |
| S-MRP-CH | The product of Example 101 | | |
| Thaumatin | EPC Natural Products Co., Ltd, China | 20180801 | thaumatin 10.74% |
| TS-MRP-CH | the mixture of above S-MRP-CH and thaumatin with the weight ratio of 10:1 | | |
| TS-MRP-FL | the mixture of above S-MRP-FL and thaumatin with the weight ratio of 10:1 | | |
| TS-MRP-CA | the mixture of above S-MRP-CA and thaumatin with the weight ratio of 10:1 | | |

Example 187

The Synergistic Effect and Taste Improvement of MRP, S-MRP or TS-MRP to Carrageenan Method Carrageenan was added to pure water to prepare several carrageenan solutions with a concentration gradient as standard solutions for judging the degree of kokumi of the carrageenan solutions.

A carrageenan solution was prepared at a concentration of 400 ppm. Different amounts of MRP, S-MRP or TS-MRP were added to the solution such that the concentration of MRP, S-MRP or TS-MRP in the solution was 50 ppm, 75 ppm, 100 ppm, 125 ppm or 150 ppm.

The degree of kokumi of the mixture solution was judged along with the odor masking effect, etc. by sensory evaluation to determine whether MRP, S-MRP or TS-MRP had a synergistic effect and/or a taste improvement effect on carrageenan. Method: For evaluation of the degree of kokumi, the sample solutions (described above) were tested by a panel of four people. The panel was asked to taste the sample solutions and compare them to standard solutions (described above) to judge which standard solution the degree of kokumi of sample solution is similar to. 1 trained taster tasted independently the samples first. The tester was allowed to re-taste, and then made judgment. Afterwards, another 3 tasters tasted and the judgments were discussed openly to find a suitable description. In the case that more than 1 taster disagreed with the result, the tasting was repeated.

Results

The evaluation results in the table below are for the concentrations of carrageenan corresponding to the degree of kokumi solution after adding MRP, S-MRP or TS-MRP to a 400 ppm carrageenan solution.

TABLE 187.1

| | | The concentration of MRP, S-MRP or TS-MRP(ppm) | | | | |
|---|---|---|---|---|---|---|
| | | 50 | 75 | 100 | 125 | 150 |
| The concentrations of carrageenan corresponding to the degree of kokumi solution (ppm) | MRP-CA | 500 | 600 | 650 | 800 | 1000 |
| | MRP-FL | 550 | 650 | 800 | 1000 | 1100 |
| | MRP-CH | 700 | 800 | 1000 | 1300 | 1500 |
| | S-MRP-CA | 800 | 1000 | 1100 | 1200 | 1300 |
| | S-MRP-FL | 650 | 750 | 1100 | 1200 | 1300 |
| | S-MRP-CH | 800 | 1000 | 1200 | 1500 | 1600 |
| | TS-MRP-CA | 700 | 900 | 1000 | 1400 | 1600 |
| | TS-MRP-FL | 800 | 950 | 1100 | 1400 | 1500 |
| | TS-MRP-CH | 700 | 900 | 1500 | 1600 | 1700 |

Conclusion:

When a thickener such as carrageenan is used, it is generally found that in various food and beverage applications, full mouth feel (kokumi) can be obtained by using a certain concentration of thickener. However, the viscosity of the material will also increase significantly. At the same time, the thickener is usually used at a higher concentration in order to obtain full mouth feel. But at such high concentrations (for example, when the concentration of carrageenan exceeds 1000 ppm), the appearance of taste like starch paste can be clearly felt.

From the sensory evaluation results of this Example, it was surprisingly found that MRP, S-MRP or TS-MRP had a significant synergistic effect on the kokumi of a thickener such as carrageenan. While significantly increasing the full mouth feel, the use of MRP, S-MRP or TS-MRP did not significantly increase the viscosity of the solution. At the same time, using MRP, S-MRP or TS-MRP, the amount of carrageenan was significantly reduced while an equivalent kokumi feeling was achieved, so that the taste of the starch paste was not felt in the final application, thereby significantly improving the overall taste of the materials.

Example 188

The Synergistic Effect and Taste Improvement of MRP, S-MRP or TS-MRP to Gellan Gum Method Gellan gum was added to pure water to prepare several gellan gum solutions with a concentration gradient as standard solutions for judging the degree of kokumi of the gellan gum solutions.

A gellan gum solution was prepared at a concentration of 400 ppm. Different amounts of MRP, S-MRP or TS-MRP were added to the solution such that the concentration of MRP, S-MRP or TS-MRP in the solution was 50 ppm, 75 ppm, 100 ppm, 125 ppm or 150 ppm.

The degree of kokumi of the mixture solution was judged along with the odor masking effect, etc. by sensory evaluation to determine whether MRP, S-MRP or TS-MRP had a synergistic effect and/or a taste improvement effect on gellan gum. Method: For evaluation of the degree of kokumi, the sample solutions (described above) were tested by a panel of four people. The panel was asked to taste the sample solutions and compare them to standard solutions (described above) to judge to which standard solution the degree of kokumi of sample solution is similar. 1 trained taster tasted independently the samples first. The tester was allowed to re-taste, and then made judgment. Afterwards, another 3 tasters tasted and the judgments were discussed openly to find a suitable description. In the case that more than 1 taster disagreed with the result, the tasting was repeated.

Results

The evaluation results in the table below are the concentrations of gellan gum corresponding to the degree of kokumi solution after adding MRP, S-MRP or TS-MRP to a 400 ppm gellan gum solution.

TABLE 188.1

| | | The concentration of MRP, S-MRP or TS-MRP(ppm) | | | | |
|---|---|---|---|---|---|---|
| | | 50 | 75 | 100 | 125 | 150 |
| The concentrations of gellan gum corresponding to the degree of kokumi solution (ppm) | MRP-CA | 1800 | 1900 | 2050 | 2150 | 2300 |
| | MRP-FL | 1700 | 1800 | 2000 | 2100 | 2300 |
| | MRP-CH | 1900 | 2000 | 2100 | 2400 | 2600 |
| | S-MRP-CA | 1900 | 2000 | 2100 | 2200 | 2400 |
| | S-MRP-FL | 2000 | 2100 | 2200 | 2400 | 2600 |
| | S-MRP-CH | 1600 | 1700 | 1800 | 1950 | 2600 |
| | TS-MRP-CA | 1800 | 1900 | 2100 | 2200 | 2400 |
| | TS-MRP-FL | 1600 | 1700 | 1800 | 1900 | 2200 |
| | TS-MRP-CH | 1900 | 2100 | 2200 | 2300 | 2400 |

Conclusion:

When a thickener such as gellan gum is used, it is generally found that in various food and beverage applications, full mouth feel (kokumi) can be obtained by using a certain concentration of thickener. However, the viscosity of the material will also increase significantly. At the same time, the thickener is usually used at a higher concentration in order to obtain full mouth feel. But at such high concentrations (for example, when the concentration of gellan gum exceeds 1400 ppm), the appearance of a taste like starch paste can be clearly felt.

From the sensory evaluation results of this Example, it was surprisingly found that MRP, S-MRP or TS-MRP had a significant synergistic effect on the kokumi of a thickener such as gellan gum. While significantly increasing the fill mouth feel, the use of MRP, S-MRP or TS-MRP did not significantly increase the viscosity of the solution. At the same time, using MRP, S-MRP or TS-MRP, the amount of gellan gum was significantly reduced while an equivalent kokumi feeling was achieved, so that the taste of the starch paste was not felt in the final application, thereby significantly improving the overall taste of the materials.

Example 189

The Synergistic Effect and Taste Improvement of MRP, S-MRP or TS-MRP to Tamarind Gum Method Tamarind gum was added to pure water to prepare several Tamarind gum solutions with a concentration gradient as standard solutions for judging the degree of kokumi of the Tamarind gum solutions.

A Tamarind gum solution was prepared at a concentration of 400 ppm. Different amounts of MRP, S-MRP or TS-MRP were added to the solution such that the concentration of MRP, S-MRP or TS-MRP in the solution was 50 ppm, 75 ppm, 100 ppm, 125 ppm or 150 ppm.

The degree of kokumi of the mixture solution was judged along with the odor masking effect, etc. by sensory evaluation to determine whether MRP, S-MRP or TS-MRP had a synergistic effect and/or a taste improvement effect on Tamarind gum.

Method: For evaluation of the degree of kokumi, the sample solutions (described above) were tested by a panel of four people. The panel was asked to taste the sample solutions and compare them to standard solutions (described above) to judge to which standard solution the degree of kokumi of sample solution is similar. 1 trained taster tasted independently the samples first. The tester was allowed to re-taste, and then made judgment. Afterwards, another 3 tasters tasted and the judgments were discussed openly to find a suitable description. In the case that more than 1 taster disagreed with the result, the tasting was repeated.

Results

The evaluation results in the table below are the concentrations of Tamarind gum corresponding to the degree of kokumi solution after adding MRP, S-MRP or TS-MRP to a 400 ppm Tamarind gum solution.

TABLE 189.1

| | | The concentration of MRP, S-MRP or TS-MRP (ppm) | | | | |
|---|---|---|---|---|---|---|
| | | 50 | 75 | 100 | 125 | 150 |
| The concentrations of Tamarind gum corresponding to the degree of kokumi solution (ppm) | MRP-CA | 900 | 1200 | 1300 | 1400 | 1500 |
| | MRP-FL | 600 | 850 | 1000 | 1100 | 1200 |
| | MRP-CH | 700 | 800 | 900 | 1200 | 1300 |
| | S-MRP-CA | 900 | 1200 | 1400 | 1500 | 1600 |
| | S-MRP-FL | 1200 | 1300 | 1400 | 1600 | 1800 |
| | S-MRP-CH | 1400 | 1450 | 1500 | 1600 | 1800 |
| | TS-MRP-CA | 1400 | 1500 | 1600 | 1800 | 2000 |
| | TS-MRP-FL | 1300 | 1400 | 1500 | 1700 | 2000 |
| | TS-MRP-CH | 1500 | 1800 | 2000 | 2100 | 2200 |

Conclusion

When a thickener such as Tamarind gum is used, it is generally found that in various food and beverage applications, full mouth feel (kokumi) can be obtained by using a certain concentration of thickener. However, the viscosity of the material will also increase significantly. At the same time, the thickener is usually used at a higher concentration in order to obtain full mouth feel. But at such high concentrations (for example, when the concentration of Tamarind gum exceeds 1400 ppm), the appearance of a taste like starch paste can be clearly felt.

From the sensory evaluation results of this Example, it was surprisingly found that MRP, S-MRP or TS-MRP had a significant synergistic effect on the kokumi of a thickener such as Tamarind gum. While significantly increasing the full mouth feel, the use of MRP, S-MRP or TS-MRP did not significantly increase the viscosity of the solution. At the same time, using MRP, S-MRP or TS-MRP, the amount of Tamarind gum was significantly reduced when the same kokumi feeling was achieved, so that the taste of the starch paste was not felt in the final application, thereby significantly improving the overall taste of the materials.

Example 190

The Taste Improvement by MRP, S-MRP or TS-MRP with 100% Juice

TABLE 190.1

| Materials | | | |
|---|---|---|---|
| Sample | Source | Lot # | Specification |
| 100% orange juice | Agarose ®, Greece | 20180423 | |
| MRP-CI | The product of Example 98 | | |
| MRP-FL | The product of Example 06 | | |
| S-MRP-FL | The product of Example 67 | | |
| S-MRP-CI | The product of Example 100 | | |
| Thaumatin | EPC Natural Products Co., Ltd, China | 20180801 | thaumatin 10.74% |
| TS-MRP-CI | the mixture of above S-MRP-CI and thaumatin with the weight ratio of 10:1 | | |
| TS-MRP-FL | the mixture of above S-MRP-FL and thaumatin with the weight ratio of 10:1 | | |

Method

MRP, S-MRP or TS-MRP was added to the commercial product Agrose® 100% orange juice. The taste difference between the original juice and the juice with MRP, S-MRP or TS-MRP was compared by sensory evaluation to judge whether MRP, S-MRP or TS-MRP improved the taste of 100% juice drinks. Method: the samples were evaluated by a panel of 4 persons. The panel was asked to describe the taste profile according to the factors of acidic, bitter, and astringent taste. The intensity of the factors is shown by six levels, "–" for none, "+" for very slight, "++" for slight, "+++" for moderate, "++++" for strong, and "+++++" for very strong.

Results

MRP, S-MRP or TS-MRP was added to the commercial product Agrose® 100% orange juice to prepare concentrations of MRP, S-MRP or TS-MRP to 300 pp (MRP), 200 ppm (S-MRP) or 100 ppm (TS-MRP). The results of sensory evaluation are as follow.

TABLE 190.2

| | acidic | bitter | astringent |
|---|---|---|---|
| original juice | + | ++ | + |
| MRP-FL | + | – | – |
| MRP-CI | + | + | – |
| S-MRP-FL | – | + | – |
| S-MRP-CI | + | + | – |
| TS-MRP-FL | – | – | – |
| TS-MRP-CI | – | – | – |

Conclusion:

From the results of the sensory evaluation described above, it was surprisingly found that the effect of MRP, S-MRP or TS-MRP on the taste improvement of 100% juice was very significant. After adding MRP, S-MRP or TS-MRP, the caloric content of the juice hardly changed; however, the taste was significantly improved, especially the inhibition effect of the bitterness of the orange juice was very significant. Addition of MRP, S-MIRP or TS-MRP to other juice drinks, such as apple juice, grape juice, tomato juice, grapefruit juice, cranberry juice, peach juice, pomegranate juice or coconut juice, can also achieve the similar improvement in taste.

Example 191

Taste Improvement by MRP, S-MRP or TS-MRP with Sugar Free Yogurt

TABLE 191.1

| Materials | | | |
|---|---|---|---|
| Sample | Source | Lot # | Specification |
| Sugar free yogurt | Jian Ai ® no sugar added yogurt, Guangzhou Pucheng Dairy Co., Ltd., China | G20181116F | |
| RD, rebaudioside D | Sichuan Ingia Biosynthetic Co,. ltd, China | 20180914 | RD 94.39% |
| Vanilla flavor | FONA | 143.33081 | |
| MRP-FL | The product of Example 96 | | |
| S-MRP-FL | The product of Example 67 | | |
| Thaumatin | EPC Natural Products Co., Ltd, China | 20180801 | thaumatin 10.74% |
| TS-MRP-FL | the mixture of above S-MRP-FL and thaumatin with the weight ratio of 10:1 | | |

Method

Into the commercial product Jian no sugar added yogurt, RD was added as a sweetener to obtain a control sample of sugar-free yoghurt, MRP, S-MRP or TS-MRP was added to the above control sugar-free yoghurt to obtain a test sample. The taste of the control and test samples were evaluated as to whether MRP, S-MRP or TS-MRP improved the taste of the yogurt drinks. The formulations of the samples are shown in Table 191.2.

TABLE 191.2

| formulations of yogurt | | | | | | |
|---|---|---|---|---|---|---|
| | Formulation | | | | | |
| sample | No sugar added yogurt | RD | Vanilla flavor | MRP-FL | S-MRP-FL | TS-MRP-FL |
| 191-0 (control) | 200 ml | 700 mg | 6 mg | | | |
| 191-1 | 200 ml | 700 mg | 6 mg | 105 mg | | |
| 191-2 | 200 ml | 700 mg | 6 mg | | 21 mg | |
| 191-3 | 200 ml | 700 mg | 6 mg | | | 35 mg |

Results

Each sample was evaluated and the taste profiles of samples are shown in table 19.3.

TABLE 191.3

| sensory evaluation of yogurt | | | | | | |
|---|---|---|---|---|---|---|
| | Sensory evaluation | | | | | |
| sample | flavor | kokumi | Sweet lingering | bitter | Metallic aftertaste | acidic |
| 191-0 (control) | none | 1 | 3 | 1 | 2 | ++ |
| 191-1 | vanilla | 2 | 2 | 1 | 1 | + |
| 191-2 | vanilla | 2 | 2 | 1 | 1 | + |
| 191-3 | vanilla | 3 | 3 | 1 | 1 | + |

Conclusion

From the above sensory evaluation results, it was surprisingly found that the effect of MRP, S-MRP or TS-MRP on the taste improvement of the sugar-free yogurt was very remarkable. After adding MRP, S-MRP or TS-MRP to the yogurt, the taste of the sugar-free yogurt using Rebaudioside D as a sweetener was significantly improved, especially with regard to improvement of mouth feel, the suppression of the sweet lingering and the metallic aftertaste. The addition of MRP, S-MRP or TS-MRP to sugar-free yogurt with other natural or artificial high-intensity sweeteners can also improve the taste of the yogurt.

Examples 192-196

The Taste Improvement of TS-MRP with Commercial Sugar Free Drinks

MRPs used in the following examples are listed in the table below.

TABLE 192-196

| Sample | Source | Lot # | Specification |
|---|---|---|---|
| MRP-FL | The product of Example 96 | | |
| MRP-CA | The product of Example 97 | | |
| S-MRP-FL | The product of Example 67 | | |
| S-MRP-CA | The product of Example 68 | | |
| Thaumatin | EPC Natural Products Co., Ltd, China | 20180801 | thaumatin 10.74% |
| TS-MRP-FL | the mixture of above S-MRP-FL and thaumatin with the weight ratio of 10:1 | | |
| TS-MRP-CA | the mixture of above S-MRP-CA and thaumatin with the weight ratio of 10:1 | | |

Example 192

Taste Improvement of TS-MRP on a Fat-Blocking Carbonated Drink

Fat-Blocking Carbonated Drink:

KIRIN Mets COLA, available from Kirin Holdings Company, Japan.

Ingredients: Sparingly digestible dextrin, carbonate, caramel color, flavor, acidulent, sweetener (aspartame•L-phenylalanine compound, acesulfame, sucralose), calcium gluconate, caffeine Samples A specific amount of TS-MRP powder was dissolved in a fat-blocking carbonated drink. The details are as follow.

TABLE 192.1

| | Weight (mg) | |
|---|---|---|
| Components | No. 1 (control) | No. 2 |
| TS-MRP-CA | | 7.5 |
| TS-MRP-FL | | 5 |
| KIRIN Mets COLA | 100 mL | 100 mL |

Evaluation

All the samples were evaluated by a panel of 9 persons. The evaluation sults were as follow.

TABLE 192.2

| | No. 1 | No. 2 |
|---|---|---|
| Overall like | 1 person | 8 persons |
| Metallic aftertaste | ++ | − |
| Sweet lingering | ++ | + |
| mouth feel | +++ | +++++ |
| Evaluation | Low sweet potency; Metallic aftertaste; Sweet lingering is serious; Lack of full body; | Sweeter than control; Significant improvement in metallic aftertaste and sweet lingering; Significant increasing in full body mouth feel; Floral flavor is slightly presented |

Conclusion:

For a fat-blocking carbonated drink that includes high-intensity sweeteners as sweeteners, there was a general lack of full body mouth feel, as well as very serious sweet lingering and bitterness, metallic or other bad tastes present. TS-MRP was used as a sweetness enhancer and a mouth feel improver in such a fat-blocking carbonated drink, and the formulation significantly improved the original defects, and the acceptability of the improved product was remarkably increased.

Example 193

Taste Improvement of TS-MRP on Ready to Drink Coffee Drink

Ready to Drink Coffee Drink

Mt. RAINIER (Caffe Latte Non-sugar), available from Morinaga Milk Industry Co., Ltd.

Ingredients: coffee, malto-oligosaccharides, dairy products, milk proteins, salt, flavor, emulsifier, sweeteners (Acesulfame, sucralose)

Samples

A specific amount of TS-MRP powder was dissolved in a ready to drink coffee drink. The details were as follow.

TABLE 193.1

| | Weight (mg) | |
|---|---|---|
| Components | No. 1 (control) | No. 2 |
| TS-MRP-FL | | 10 |
| Mt. RAINIER | 100 mL | 100 mL |

Evaluation

All the samples were evaluated by a panel of 9 persons. The evaluation results were as follow.

TABLE 193.2

| | No. 1 (control) | No. 2 |
|---|---|---|
| Overall like | 0 | 9 |
| Bitterness | ++ | + |
| Metallic aftertaste | ++ | − |
| Sweet lingering | ++ | + |
| Mouth feel | +++ | +++++ |
| Milky | +++ | +++++ |
| evaluation | Low sweet potency; Bitterness; Metallic aftertaste; Sweet lingering is serious; Lack of full body; | Sweeter than control; Less bitter Significant improvement in metallic aftertasteand sweet lingering; Significant increasing in full body mouth feel; Very rich milky taste |

Conclusion

For a ready to drink coffee drink using high-intensity sweeteners as a sweetener, there was a general lack of full body mouth feel and milky flavor, as well as very serious sweet lingering and bitterness, metallic or other bad tastes. TS-MRP was used as a sweetness enhancer and a mouth feel improver in such a ready to drink coffee drink, and the formulation significantly improved the original defects, and the acceptability of the improved product was remarkably increased.

Example 194

Taste Improvement of TS-MRP on Non-Alcoholic Beer

Non-Alcohol Beer

ASAHI Healthy Style Non-alcohol beer, available from AHAHI, Japan.

Ingredients: Sparingly digestible dextrin, soybean peptide, carbonate, flavors, stabilizer (soybean polysaccharides), acidulent, caramel color, vitamin C, sweetener (Acesulfame)

Samples

A specific amount of TS-MRP powder was dissolved in a non-alcoholic beer. The details were as follow.

TABLE 194.1

| | Weight (mg) | |
|---|---|---|
| Components | No. 1 (control) | No. 2 |
| TS-MRP-FL | | 5 |
| ASAHI Healthy Style Non-alcohol beer | 100 mL | 100 mL |

Evaluation

All the samples were evaluated by a panel of 9 persons. The evaluation results were as follow.

TABLE 194.2

| | No. 1 (control) | No. 2 |
|---|---|---|
| Overall like | 0 | 9 |
| Bitterness | +++ | + |
| acid | ++ | − |
| Mouth feel | ++ | ++++ |
| evaluation | Bitterness; Acid; Lack of full body | Less bitter; Less acidic; Significant increasing in full body mouth feel; |

Conclusion

For non-alcoholic beer using high-intensity sweeteners as a sweetener, there was a general lack of full body mouth feel and flavor, as well as very serious bitterness, acid or other bad tastes. TS-MRP was used as a mouth feel improver in such a non-alcoholic beer, and the formulation significantly improved the original defects, and the acceptability of the improved product was remarkably increased.

Example 195

Taste Improvement of TS-MRP on a Japanese Cocktail Drink

Japanese cocktail drink:

KININ HYOKETSU STRONG (Grapefruit), available from Kirin Holdings Company, Japan.

Ingredients: Grapefruit, Vodka, Acidic ingredients, flavor, sweeteners (acesulfame, sucralose)

Samples

A specific amount of TS-MRP powder was dissolved in a ready to drink Japanese cocktail drink. The details were as follow.

TABLE 195.1

| | Weight (mg) | |
|---|---|---|
| Components | No. 1 (control) | No. 2 |
| TS-MRP-FL | | 7.5 |
| KIRIN HYOKETSU STRONG | 100 mL | 100 mL |

Evaluation

All the samples were evaluated by a panel of 9 persons. The evaluation results were as follow.

TABLE 195.2

| | No. 1 (control) | No. 2 |
|---|---|---|
| Overall like | 2 persons | 7 persons |
| Alcohol flavor intensity | ++ | +++ |
| acid | ++ | + |
| Mouth feel | ++ | ++++ |
| evaluation | Alcohol flavor and fruit flavor are not coordinated Acidic Lack of full body | Alcohol flavor intensity increased; Alcohol flavor and fruit flavor are harmonized; Less acid; Full body and smooth |

Conclusion

For a cocktail drink using high-intensity sweeteners as sweetener, there is a general lack of full body mouth feel, poor flavor coordination, as well as very serious acidic or other bad tastes. TS-MRP was used as a mouth feel improver in such a cocktail drink, and the formulation significantly improved the original defects, the intensity of the alcohol flavor was also enhanced, the coordination of flavors in the cocktail drink was better and the acceptability of the improved product was remarkably increased.

Example 196

Taste Improvement of TS-MRP on Protein Shake

Protein shake:

MEM SAVAS Whey Protein 100 (Cocoa), available Meiji Holdings Co., Ltd., Japan.

Ingredients: whey protein, cocoa powder, dextiin, vegetable oil, salt, emulsifier, vitamin C, flavors, thickeners (Pullulan), sweeteners (Acesulfame, sucralose), etc.

Samples

A specific amount of TS-MRP powder was dissolved in a protein shake. The details were as follow.

TABLE 196.1

| Components | Weight | |
|---|---|---|
| | No. 1 (control) | No. 2 |
| TS-MRP-FL | | 2.5 mg |
| TS-MRP-CA | | 5 mg |
| MEIJI SAVAS Whey Protein 100 | 10.5 g | 10.5 g |
| Pure water | 100 mL | 100 mL |

Evaluation

All the samples were evaluated by a panel of 9 persons. The evaluation results were as follow.

TABLE 196.2

| | No. 1 (control) | No. 2 |
|---|---|---|
| Overall like | 3 persons | 6 persons |
| sweetness | ++ | +++ |
| Milky | ++ | ++++ |
| Mouth feel | ++ | +++ |
| Sweet lingering | +++ | + |
| evaluation | Sweet lingering is serious; Moderate flavor intensity; | flavor intensity increased, especially for milky; Significant improvement in sweet lingering; Sweeter than control; more palatable than control |

Conclusion

For a protein shake using high-intensity sweeteners as a sweetener, there are general bad tastes such as sweet lingering, the flavor is not strong and the palatability is poor. TS-MRP was used as a mouth feel improver in such a sugar-free protein shake, and the formulation significantly improved the original defects, and the acceptability of the improved product was remarkably increased.

Example 197

Investigations with a Model System of Rebaudioside A and Amino Acids

Model System

Chemicals used for Maillard reactions were supplied by Sigma-Aldrich (Food Grade). Solvents and chemicals for analysis (LC/DAD/MS) were supplied by Sigma-Aldrich (HPLC-grade and USP certified material). Reb-A (Lot Reb A 100 EPC 043-17-02) was supplied by EPC Natural Products Co, Ltd. All reactions were performed in sealed 10 mL Pyrex vials. The general procedure was to weigh in the reaction partner (0.1 molar concentration of Reaudioside A and amino acids) and to fill with the solvent (0.1 $MKH_2PO_4$-buffer, pH=7.2) at a temperature of 60-70° C. The vials were then immediately sealed and put into glass beakers filled with sand positioned in a drying oven heated to 120° C. This procedure secures adequate heat transfer to the vials. The reaction was stopped after 2 hours by placing the sealed vials into an ice bath. The reacted sample was then filtered (0.2 μm syringe filter) and injected into the HPLC/DAD/MS.

The HPLC system consisted of an Agilent 1100 system (autosampler, ternary gradient pump, column thermostat, DAD-UV/VIS detector) connected in-line to an Agilent mass spectrometer (ESI-MS quadrupole G1956A VL). The samples were separated at 0.9 ml/min on a Phenomenex Synergi Hydro-RP (150×3 mm) at 35° C. The mobile phase consisted of (A) 0.1% HCOOH (v/v) and (B) AcCN. A gradient of 2-6% (B) to 15-20% (B) was applied between 0 min to 15 min depending on the reaction partners. Between 15 and 20 min (B) was increased to 45-50% % which was kept for 15 min. Detection consisted of UV/VIS-DAD (205 nm) coupled to ESI-MS (neg mode, 300° C., TIC from m/z 120-1200, fragmentor 100).

Mass Spectrometry

The following Tables show the molar mass of all amino acids and their corresponding MRPs with Reb-A (assuming that the reaction runs similar to amino acid with a reducing sugar). Table 197.1 indicates that the MRP was found using HPLC/MS. Table 197.2 indicated that the MRP was not found, unmarked columns were not tested.

Test Results

For amino acids in Table 197.1 the expected MRP of Reb-A could be confirmed analytically by the expected mass/charge ratio and the chromatographic separation (See FIG. 151 through FIG. 155), In Table 197.2 amino acids are listed for which under the conditions tested no MRP were observed. The results showed that by controlling reaction conditions, reaction products of steviol glycoside(s) and amino acid(s) could surprisingly be formed. For products listed in Table 197.2, even though the compound of steviol glycoside and amino acid is not formed at the given conditions, such resulting products still act as excellent products for flavor modifiers and sweeteners. Secondly, by adjusting the reaction conditions, it is believed that reaction products of steviol glycosides and amino acid(s) could be formed.

TABLE 197.1

Expected MRPs for Reb A (analytically confirmed)

| Amino Acid | | | mass | MRP Reb-A* | MRP Reb-A-$H_2O$* |
|---|---|---|---|---|---|
| Asparagine | Asn | N | 132.1 | 1080.1 | 1062.1 |
| Aspartate | Asp | D | 133.1 | 1081.1 | 1063.1 |
| Isoleucine | Ile | I | 131.2 | 1079.2 | 1061.2 |
| Leucine | Leu | L | 131.2 | 1079.2 | 1061.2 |
| Lysine | Lys | K | 146.2 | 1094.2 | 1076.2 |
| Phenylalanine | Phe | F | 165.2 | 1113.2 | 1095.2 |
| Tryptophan | Trp | W | 204.2 | 1152.2 | 1134.2 |

*negative mode $m/z = [M - H]^-$ or $m/z = [M - H_2O - H]^-$

TABLE 197.2

Expected MRPs for Reb A (analytically not observed)

| Amino Acid | | | mass | MRP Reb-A* | MRP Reb-A-$H_2O$* |
|---|---|---|---|---|---|
| Arginine | Arg | R | 174.2 | 1122.2 | 1104.2 |
| Cysteine | Cys | C | 121.2 | 1069.2 | 1051.2 |
| Methionine | Met | M | 149.2 | 1097.2 | 1079.2 |
| Valine | Val | V | 117.1 | 1065.1 | 1047.1 |

*negative mode $m/z = [M - H]^-$ or $m/z = [M - H_2O - H]^-$

Example 198

Use of Materials in Food Products

TABLE 198.1

Pizza dough, joint opinion 4 tasters

| Sample | Thaumatin | Tangerine | Caramel *Stevia*-derived MRP (ppm) | Flora | Sweetness (potency, profile) | Flavor (increase, modified) |
|---|---|---|---|---|---|---|
| Pizza dough (wheat flour, | — | — | — | — | Not sweet | Typical for baked pizza, tasty |
| olive oil, water, 2% salt) | 1.0 | — | 50 | — | Not sweet | Typical for baked pizza, tasty, no change to reference |
| 5 minutes in wood oven | 2.5 | — | 50 | — | Not sweet | Typical for baked pizza, more tasty and spicy. |
| 300° C. | 4.0 | — | 50 | — | Slightly sweet | Typical for baked pizza, tasty, unpleasant sweetness, less tasty |
| Pizza dough (wheat flour, | — | — | — | — | Not sweet, slightly void | Typical for baked pizza, slightly to little salty |
| olive oil, water, 1% salt) | 1.0 | — | 50 | — | Not sweet, slightly void | Typical for baked pizza, slightly to little salty |
| 5 minutes in wood oven 300° C. | 2.5 | — | 50 | — | Not sweet, more full-bodied | Typical for baked pizza, comparable to high salt recipe |
| | 4.0 | — | 50 | — | Slightly sweet | Typical for baked pizza, tasty, unpleasant sweetness, lingering |

*Stevia*-derived MRP (tangerine) is prepared according to the method described in Example 100; the *Stevia*-derived MRP (Caramel) is prepared according to the method described in Example 68; and the *Stevia*-derived MRP (Floral) is prepared according to the method described in Example 67.

*Stevia*-derived MRP (tangerine) is prepared according to the method described in Example 100; the *Stevia*-derived MRP (Caramel) is prepared according to the method described in Example 68; and the *Stevia*-derived MRP (Moral) is prepared according to the method described in Example 67.

TABLE 198.2

Grounded meat patties (Burger), joint opinion 4 tasters

| Sample | Thaumatin | Tangerine | Popcorn *Stevia*-derived MRP (ppm) | Flora | Sweetness (potency, profile) | Flavor (increase, modified) |
|---|---|---|---|---|---|---|
| Beef/Pig meat 30% fat, salt, | — | — | — | — | Not sweet | Typical for grilled, grounded meat, tasty |
| pepper, charcoal grilled | 1.0 | — | 50 | — | Not sweet | Typical for grilled, grounded meat, tasty, no change |
| | 2.5 | — | 50 | — | Not sweet | Typical for grilled, grounded meat, tasty, no change, slightly more tasty |
| | 4.0 | — | 50 | — | Slightly sweet | Typical for roasted onions and eggs, too sweet |
| Beef/Pig meat 10% fat, salt, pepper, | — | — | — | — | Not sweet | Typical for grilled, grounded meat, less tasty compared to high fat meat |
| charcoal grilled | 1.0 | — | 50 | — | Not sweet | Typical for grilled, grounded meat, almost same tastiness compared to high fat meat |
| | 2.5 | — | 50 | — | Not sweet | Typical for grilled, grounded meat, same tastiness compared to high fat meat |
| | 4.0 | — | 50 | — | Slightly sweet, more chewiness | Typical for grilled, grounded meat, sweet/bitter notes |

*Stevia*-derived MRP (tangerine) is prepared according to the method described in Example 100; the *Stevia*-derived MRP (popcorn) is prepared according to the method described in Example 150; and the *Stevia*-derived MRP (Floral) is prepared according to the method described in Example 67.

*Stevia*-derived MRP (tangerine) is prepared according to the method described in Example 100; the *Stevia*-derived MRP (popcorn) is prepared according to the method described in Example 150; and the *Stevia*-derived MRP (Floral) is prepared according to the method described in Example 67.

*Stevia*-derived MRP (tangerine) is prepared according to the method described in Example 100; the *Stevia*-derived MRP (popcorn) is prepared according to the method described in Example 150; and the *Stevia*-derived MRP (Floral) is prepared according to the method described in Example 67.

TABLE 198.3

Scrambled eggs, joint opinion 4 tasters

| Sample | Thaumatin | Tangerine | Popcorn *Stevia*-derived MRP (ppm) | Flora | Sweetness (potency, profile) | Flavor (increase, modified) |
|---|---|---|---|---|---|---|
| Scrambled eggs (eggs, rape seed oil, onions 0.3% salt) | — | — | — | — | Slightly sweet | Typical for roasted onions and eggs |
| | 1.0 | — | 50 | — | Same sweetness | Typical for roasted onions and eggs, more spicier (salty) |
| | 2.5 | — | 50 | — | Slightly Sweeter, more full-bodied | Typical for roasted onions and eggs, more tasty, more salty |
| | 4.0 | — | 50 | — | Substantial more sweet too full-bodied (i.e. added starch) | Typical for roasted onions and eggs, too sweet |
| | 1.0 | — | 25 | — | Same sweetness | Typical for roasted onions and eggs, no change |
| | 2.5 | — | 25 | — | Slightly Sweeter, more full-bodied | Typical for roasted onions and eggs, slightly more harmonic/balanced taste |
| | 4.0 | — | 25 | — | Substantial more sweet, too full-bodied (i.e. added starch) | Typical for roasted onions and eggs, more harmonic/ balanced taste, slightly too sweet |

TABLE 198.4

Ketchup, joint opinion 8 tasters

| Sample | Thaumatin | Tangerine | Popcorn *Stevia*-derived MRP (ppm) | Flora | Sweetness (potency, profile) | Flavor (increase, modified) |
|---|---|---|---|---|---|---|
| Heinz Ketchup (50% sugar and salt reduced) 22281826TK1 | — | — | — | — | Less sweet than Classical, void, sweetener | Typical concentrated tomato, Fresh, Acidic, slightly scratching |
| | 4.5 | — | 5 | — | Sweeter, slightly improved mouth feel, | Typical concentrated tomato, Fresh, Acidic, slightly scratching |
| | 4.5 | — | 10 | — | Sweeter, slightly improved mouth feel | Typical concentrated tomato, harmonic Acidity |
| | 4.5 | — | 15 | — | Sweeter, improved mouth feel | Typical concentrated tomato, less acidic, sweet/sour balance, more salty |
| | 4.5 | — | 20 | — | Sweeter, improved mouth feel, slightly lingering | Typical concentrated tomato, less acidic, sweet/sour balance, more salty |
| | 4.5 | — | 25 | — | Sweeter, improved mouth feel, slightly lingering | Typical concentrated tomato, more intense and pleasant, harmonic, smoother, less acidic, more salty |
| | 4.5 | — | 30 | — | Sweeter, improved mouth feel, lingering | Typical concentrated tomato, Bitter off-notes, astringent |

*Stevia*-derived MRP (tangerine) is prepared according to the method described in Example 100; the *Stevia*-derived MRP (popcorn) is prepared according to the method described in Example 150; and the *Stevia*-derived MRP (Floral) is prepared according to the method described in Example 67.

TABLE 198.5

| Ketchup, joint opinion 8 tasters | | | | | | |
|---|---|---|---|---|---|---|
| Sample | Thaumatin | Tangerine | Popcorn *Stevia*-derived MRP (ppm) | Flora | Sweetness (potency, profile) | Flavor (increase, modified) |
| Heinz Ketchup (50% sugar and salt reduced) 22281826TK1 | — | — | — | — | Less sweet than Classical, void, sweetener | Typical concentrated tomato, Fresh, Acidic, slightly scratching |
| | 7.5 | — | 5 | — | Sweeter, improved mouth feel, slightly lingering, | Typical concentrated tomato, Fresh, less Acidic |
| | 7.5 | — | 10 | — | Sweeter, improved mouth feel, slightly lingering | Typical concentrated tomato, more intense and pleasant, harmonic, sweet/sour balance, smoother |
| | 7.5 | — | 15 | — | Sweeter, improved mouth feel, slightly lingering | Typical concentrated tomato, slight off-taste, and more sweet than sour. |
| | 7.5 | — | 20 | — | Sweeter, improved mouth feel, slightly lingering | Off-notes, over-flavored, |
| | 7.5 | — | 25 | — | Sweeter, improved mouth feel, slightly lingering | Off-notes, over-flavored, |
| | 7.5 | — | 30 | — | Sweeter, improved mouth feel, lingering | Off-notes, over-flavored |

Conclusion: The combination of *Stevia*-derived MRPs and thaumatin improve the general taste profile of baked foods including flavor, spiciness, mouth feel etc. They can also increase the salty taste for low salt food products. Additionally, the *Stevia*-derived MRPs can increase the strength of spiciness and saltiness of onion. They can significantly improve the taste profile of sugar and salt reduced sauces such as tomato ketchup. They can increase the saltiness level, and harmonize acidity with sweetness of the sauce. In particular, they can balance the acidity of acetic acid. Further, combinations of *Stevia*-derived MRPs and thaumatin can improve the taste profile of meat products, especially for reduced fat products by altering reduced fat foods to taste like that of regular high fat foods.

Example 199

Sensory Analysis of *Stevia*-Derived MRP Flora vs RA50 and RA20/TSG95

*Stevia*-derived MRP Flora sensory analysis vs RA50

Aim: Determine the sweetness equivalency and positive/negative sensory aspects of *Stevia*-derived MRP Flora vs RA50 in water with sucrose and in an application with sucrose Materials SGF RA50 lot 3070055

RA20/TSG95 lot 20180413

*Stevia*-derived MRP Flora lot EPC240-33-01, prepared as in Example 67.

Sucrose—Lemon Lime Flavor

Citric Acid

Distilled Water

Mineral Water

Lemon & Lime CSD: 50% Reduced Sugar Formula (CSD=carbonated soft drink)

Carbonated water 92.74%

Sucrose 5.00%

Citric acid 0.12%

Sodium benzoate 0.0211%

Lemon Lime Extract NAT WONF 863.0053U 0.10%

Experiment Round 1: Initial Tasting

The following samples were compared against one another in mineral water.

5% Sucrose+200 ppm RA50

5% Sucrose+200 ppm *Stevia*-derived MRP Flora

Result: RA50 sample was ~20% sweeter than the *Stevia*-derived MRP Flora sample. However, the *Stevia*-derived MRP at 200 ppm provided much better mouth feel with a floral flavor note, and no identifiable off taste/bitterness when used in 5% sucrose. One person tested with a sip of water between testing two different solutions.

Round 2: Sweetness Equivalency

The following samples were compared against one another in mineral water 300 ppm RA50

300 ppm *Stevia*-derived MRP Flora, as prepared in Example 67.

350 ppm *Stevia*-derived MRP Flora 400 ppm *Stevia*-derived MRP Flora 450 ppm, *Stevia*-derived MRP Flora 500 ppm *Stevia*-derived MRP Flora Result: 300 ppm RA50 and 450 ppm *Stevia*-derived MRP Flora were approximately as sweet as one another in mineral water, so as a standalone product *Stevia*-derived MRP Flora is 33% less sweet than RA50 alone. However when used in addition to sugar, the gap in sweetness appears to be lower, indicating that the *Stevia*-derived MRP has some sweetness enhancing effects without being overly sweet itself. One person tested with a sip of water between testing two different solutions.

Round 3: Comparison of sensory profile in Lemon & Lime CSD vs RA50

The following samples were compared to one another in a Lemon & Lime base Samples were double blinded and tasted n=1

5% Sucrose+200 ppm RA50

5% Sucrose+200 ppm *Stevia*-derived MRP Flora, as prepared in Example 67.

5% Sucrose+100 ppm RA50+100 ppm *Stevia*-derived MRP Flora

5% Sucrose+100 ppm RA20+100 ppm *Stevia*-derived MRP Flora

Result: 100 ppm *Stevia*-derived MRP Flora is too much to use in a L&L beverage, as the lime end of the flavor gets drowned out. However, the mouth feel of all the samples with *Stevia*-derived MRP Flora was much improved over the basic RA50 sample. One person tested. with a sip of water between testing two different solutions.

Round 4: Comparison of sensory profile in Lemon & Lime CSD vs RA50

The following samples were compared to one another in a Lemon & Lime base. Samples were double blinded and tasted n=1.

5% Sucrose+200 ppm RA50

5% Sucrose+150 ppm RA50+50 ppm *Stevia*-derived MRP Flora, as prepared in Example 57.

5% Sucrose+150 ppm RA20+50 ppm *Stevia*-derived MRP Flora

5% Sucrose+155 ppm RA50+45 ppm *Stevia*-derived MRP Flora

5% Sucrose+155 ppm RA20+45 ppm *Stevia*-derived MRP Flora

5% Sucrose+160 ppm RA50+40 ppm *Stevia*-derived MRP Flora

5% Sucrose+160 ppm RA20+40 ppm *Stevia*-derived MRP Flora

Result: It was found 160 ppm RA20+40 ppm *Stevia*-derived MRP Flora to be the best tasting sample, with low mouth-drying and good mouth feel. 200 ppm RA50 was very dry and low mouth feel in comparison. It is found the 160 ppm+40 ppm *Stevia*-derived MRP to have a slightly dryer sweetness than the equivalent sample made with RA20. At 40 ppm the *Stevia*-derived MRP added improved mouth feel and sugar-likeness, and slightly improved the Lemon aspect of the Lemon & Lime flavor. Using a higher amount than 40 ppm in this application altered the flavor of the beverage and muted the Lime aspect with a floral note. One person tested with a sip of water between testing two different solutions.

Example 200

Triangle Test: Adding *Stevia*-Derived MRP Floral and Thaumatin

Test Samples

A combination of *Stevia*-derived MRP Floral, as prepared in Example 67, and thaumatin (10%) in a ratio of 10:1 was prepared by dissolving 1.83 g blend in 100 ml water. From this concentrate, 0.1 g was added to Red Bull Sugar free (Acesulfatn K, Aspartame). A combination of *Stevia*-derived MRP Floral and thaumatin (10%) in a ratio of 10:1, a combination of *Stevia*-derived MRP Caramel, as prepared in Example 68, and thautnatin (10%) in a ratio of 10:1 was prepared individually by dissolving 1.83 g blend in 100 ml water. Then take 1:1 ratio from each and blend them, concentrate 0.1 g of new blend were added to Pepsi Max Sugar free (Aspartame and Acesulfam-K).

TABLE 200.1

| Target | Triangle Test | A | B |
|---|---|---|---|
| Recognition of difference | #1 | Red Bull Sugarfree | Red Bull Sugarfree/Combination of *Stevia*-derived MRP and Thaumatin |
| Recognition of difference | #2 | Pepsi Max Sugarfree | Pepsi Max Sugarfree/Combination of *Stevia*-derived MRP and Thaumatin |

Triangle Test 48 panelists were chosen according to Table 200.2 to establish with a 99.9% probability (100-β) a scenario where 50% of the panelists (pd) can recognize the difference at a significance level α=0.001. The panelists were randomly allocated to 6 following sequences of the two samples A and B: ABB, BAA, AAB, ABA and BAB. Panelists drank water between samples to rinse their palates.

The samples were marked with random 3 digit numbers.

After conducting the test, the correct answers (i.e. different t sample was correctly recognized) were compared to Table 200.3 (minimum required, correct answers for establishment of a difference at the given significance level).

TABLE 200.2

Minimum number of panelists for a triangle test

| | | β | | | | |
|---|---|---|---|---|---|---|
| α | $p_d$ | 0.20 | 0.10 | 0.05 | 0.01 | 0.001 |
| 0.20 | 50% | 7 | 12 | 16 | 25 | 36 |
| 0.10 | | 12 | 15 | 20 | 30 | 43 |
| 0.05 | | 16 | 20 | 23 | 35 | 48 |
| 0.01 | | 25 | 30 | 35 | 47 | 62 |
| 0.001 | | 36 | 43 | 48 | 62 | 81 |
| 0.20 | 40% | 12 | 17 | 25 | 36 | 55 |
| 0.10 | | 17 | 25 | 30 | 46 | 67 |
| 0.05 | | 23 | 30 | 40 | 57 | 79 |
| 0.01 | | 35 | 47 | 50 | 76 | 102 |
| 0.001 | | 55 | 68 | 76 | 102 | 130 |
| 0.20 | 30% | 20 | 28 | 39 | 64 | 97 |
| 0.10 | | 30 | 43 | 54 | 81 | 119 |
| 0.05 | | 40 | 53 | 66 | 98 | 136 |
| 0.01 | | 62 | 82 | 97 | 131 | 181 |
| 0.001 | | 93 | 120 | 138 | 181 | 233 |

TABLE 200.3

Minimum number of correct answers for a triangle test to establish a difference

| | α | | | | |
|---|---|---|---|---|---|
| n | 0.20 | 0.10 | 0.05 | 0.01 | 0.001 |
| 6 | 4 | 5 | 5 | 6 | — |
| 7 | 4 | 5 | 5 | 6 | 7 |
| 8 | 5 | 5 | 6 | 7 | 8 |
| 9 | 5 | 6 | 6 | 7 | 8 |
| 10 | 6 | 6 | 7 | 8 | 9 |
| 11 | 6 | 7 | 7 | 8 | 10 |
| 12 | 6 | 7 | 8 | 9 | 10 |
| 13 | 7 | 8 | 8 | 9 | 11 |
| 14 | 7 | 8 | 9 | 10 | 11 |
| 15 | 8 | 8 | 9 | 10 | 12 |
| 16 | 8 | 9 | 9 | 11 | 12 |
| 17 | 8 | 9 | 10 | 11 | 13 |
| 18 | 9 | 10 | 10 | 12 | 13 |
| 19 | 9 | 10 | 11 | 12 | 14 |
| 20 | 9 | 10 | 11 | 13 | 14 |

TABLE 200.3-continued

| Minimum number of correct answers for a triangle test to establish a difference | | | | | |
|---|---|---|---|---|---|
| | α | | | | |
| n | 0.20 | 0.10 | 0.05 | 0.01 | 0.001 |
| 21 | 10 | 11 | 12 | 13 | 15 |
| 22 | 10 | 11 | 12 | 14 | 15 |
| 23 | 11 | 12 | 12 | 14 | 16 |
| 24 | 11 | 12 | 13 | 15 | 16 |
| 25 | 11 | 12 | 13 | 15 | 17 |
| 26 | 12 | 13 | 14 | 15 | 17 |
| 27 | 12 | 13 | 14 | 16 | 18 |
| 28 | 12 | 14 | 15 | 16 | 18 |
| 29 | 13 | 14 | 15 | 17 | 19 |
| 30 | 13 | 14 | 15 | 17 | 19 |
| 31 | 14 | 15 | 16 | 18 | 20 |
| 32 | 14 | 15 | 16 | 18 | 20 |
| 33 | 14 | 16 | 17 | 18 | 21 |
| 34 | 15 | 16 | 17 | 19 | 21 |
| 35 | 15 | 16 | 17 | 19 | 21 |
| 36 | 15 | 17 | 18 | 20 | 22 |
| 42 | 18 | 19 | 20 | 22 | 25 |
| 48 | 20 | 21 | 22 | 25 | 27 |
| 54 | 22 | 23 | 25 | 27 | 30 |
| 60 | 24 | 26 | 27 | 30 | 33 |
| 66 | 26 | 28 | 29 | 32 | 35 |
| 72 | 28 | 30 | 32 | 34 | 38 |
| 78 | 30 | 32 | 34 | 37 | 40 |
| 84 | 33 | 35 | 36 | 39 | 43 |
| 90 | 35 | 37 | 38 | 42 | 45 |
| 96 | 37 | 39 | 41 | 44 | 48 |
| 102 | 39 | 41 | 43 | 46 | 50 |

Test Results

Find below the test results for the triangle tests performed.

TABLE 200.4

| Target | Triangle Test | Correct answers | Interpretation |
|---|---|---|---|
| Recognition of difference | #1 | 29/48 | Highly significant ($p < 0.001$) |
| Recognition of difference | #2 | 23/48 | Highly significant ($p < 0.05$) |

The description of the difference revealed for test #1 (Red Bull Sugar free) following main statements (multiple answers):

| | |
|---|---|
| better overall likeability | (21/48 participants) |
| sweeter, more pleasant | (18/48 participants) |
| smell different | (17/48 participants) |
| More full-bodied, better mouth feel | (16/48 participants) |

The description of the difference revealed for test #2 (Pepsi Max Sugar free) following main statements (multiple answers):

| | |
|---|---|
| better overall likeability | (29/48 participants) |
| More full-bodied, better mouth feel | (27/48 participants) |
| smell different | (25/48 participants) |
| sweeter, more pleasant | (15/48 participants) |

The results showed that by adding small amounts of combinations of *Stevia*-derived MRPs and thaumatin in sugar reduced beverages, the result could significantly improve the taste and aroma.

Example 201

Citrus Beverage FMP and Stability of *Stevia*-Derived MRP (Conditions 100 ppm and 200 ppm)

Commercial carbonized, sugar free flavored citrus beverage (0.5 liter bottles, Brand: Gröbi Zitrone, Sweetener: Sodium-cyclamate, Aspartame, Acesulfam K and Sodium-saccharin) was cooled to 2° C., opened and directly spiked with 50 or 100 mg *Stevia*-derived MRP (Tangerine for citrus beverages or popcorn for Cola type). Bottles were recapped and tightly closed.

Closed bottles were brought to room temperature to dissolve the *Stevia*-derived MRP completely. Thereafter bottles were stored at 4-6° C. and 20-22° C. Every 2 weeks samples are taken (room temperature samples are then cooled to 4-6° C. and sensory evaluated.

Equally treated, but unspiked bottles were stored as control bottles for direct comparison.

Stability tests were performed for *Stevia*-derived MRP for (mouth feel, improvement of sweetener profile), with 5 Tasters, with blinded taste tests with discussion of test results to reach a Joint Opinion.

Test Results

The sensory test results for the stability study in sugar free citrus beverage are presented below. Results are also noted in FIG. 210 through FIG. 217.

TABLE 201.1

| Storage (w) | Temp | Sample Type | *Stevia*-derived MRP (ppm) | Sensory evaluation |
|---|---|---|---|---|
| 0 | 2-4° C. | Citrus | — | Artificial Sweetness, void |
| 0 | 2-4° C. | Citrus | 100 | Less artificial, more mouth feel |
| 0 | 2-4° C. | Citrus | 200 | Almost sugar like, slightly artificial, full-bodied |
| 2 | 2-4° C. | Citrus | — | Artificial Sweetness, void |
| 2 | 2-4° C. | Citrus | 100 | Less artificial, more mouth feel, no change during 2 weeks of storage |
| 2 | 2-4° C. | Citrus | 200 | Almost sugar like, slightly artificial, full-bodied, no change during 2 weeks of storage |
| 2 | 20-22° C. | Citrus | — | Artificial Sweetness, void |
| 2 | 20-22° C. | Citrus | 100 | Less artificial, more mouth feel, no difference to samples stored at 2-4° C. |

TABLE 201.1-continued

| Storage (w) | Temp | Sample Type | *Stevia*-derived MRP (ppm) | Sensory evaluation |
|---|---|---|---|---|
| 2 | 20-22° C. | Citrus | 200 | Almost sugar like, slightly artificial, full-bodied, less sweeter than samples stored at 2-4° C. |
| 4 | 2-4° C. | Citrus | — | Artificial Sweetness, void |
| 4 | 2-4° C. | Citrus | 100 | Less artificial, more mouth feel, no change during 4 weeks of storage |
| 4 | 2-4° C. | Citrus | 200 | Almost sugar like, slightly artificial, full-bodied, no change during 4 weeks of storage |
| 4 | 20-22° C. | Citrus | — | Artificial Sweetness, void |
| 4 | 20-22° C. | Citrus | 100 | Less artificial, more mouth feel, no difference to samples stored 4 weeks at 2-4° C. |
| 4 | 20-22° C. | Citrus | 200 | Almost sugar like, slightly artificial, full-bodied, no difference to samples stored 4 weeks at 2-4° C. |
| 6 | 2-4° C. | Citrus | — | Artificial Sweetness, void |
| 6 | 2-4° C. | Citrus | 100 | Less artificial, more mouth feel, no change during 6 weeks of storage |
| 6 | 2-4° C. | Citrus | 200 | Almost sugar like, slightly artificial, full-bodied, no change during 6 weeks of storage |
| 6 | 20-22° C. | Citrus | — | Artificial Sweetness, void, reduced flavor perception |
| 6 | 20-22° C. | Citrus | 100 | Less artificial, more mouth feel, reduced flavor perception compared to sample stored at 2-4° C., more harmonic than reference |
| 6 | 20-22° C. | Citrus | 200 | Almost sugar like, slightly artificial, full-bodied, slightly reduced flavor perception compared to sample stored at 2-4° C., more harmonic than reference |
| 8 | 2-4° C. | Citrus | — | Artificial Sweetness, void |
| 8 | 2-4° C. | Citrus | 100 | Less artificial, more mouth feel, no change during 8 weeks of storage |
| 8 | 2-4° C. | Citrus | 200 | Almost sugar like, slightly artificial, full-bodied, no change during 8 weeks of storage |
| 8 | 20-22° C. | Citrus | — | Artificial Sweetness, void, substantial reduced flavor perception |
| 8 | 20-22° C. | Citrus | 100 | Less artificial, more mouth feel, reduced flavor perception compared to sample stored at 2-4° C., more harmonic than reference |
| 8 | 20-22° C. | Citrus | 200 | Almost sugar like, slightly artificial, full-bodied, slightly reduced flavor perception compared to sample stored at 2-4° C., more harmonic than reference |
| 10 | 2-4° C. | Citrus | — | Artificial Sweetness, void |
| 10 | 2-4° C. | Citrus | 100 | Less artificial, more mouth feel, no change during 10 weeks of storage |
| 10 | 2-4° C. | Citrus | 200 | Almost sugar like, slightly artificial, full-bodied, no change during 10 weeks of storage |
| 10 | 20-22° C. | Citrus | — | Artificial Sweetness, void, continuous reduced flavor perception (even compared to 8 weeks of storage) |
| 10 | 20-22° C. | Citrus | 100 | Less artificial, more mouth feel, reduced flavor perception compared to sample stored at 2-4° C., substantial more harmonic than reference |

TABLE 201.1-continued

| Storage (w) | Temp | Sample Type | *Stevia*-derived MRP (ppm) | Sensory evaluation |
|---|---|---|---|---|
| 10 | 20-22° C. | Citrus | 200 | Almost sugar like, slightly artificial, full-bodied, slightly reduced flavor perception compared to sample stored at 2-4° C., substantial more harmonic than reference |

Conclusion: The results showed that *Stevia*-derived MRP could significantly improve the taste profile and enhance the mouth feel of sugar free flavored citrus beverages stored at both 2-4° C. and 20-22° C. The improved effects were stable for at least 10 weeks.

Example 202

Cola Beverage FMP and Stability of *Stevia*-Derived MRP (Conditions 100 ppm and 200 ppm)

Commercial carbonized, sugar free flavored cola beverage (0.5 liter bottles, Brand: Sodastream syrup prepared according to instructions, Sweetener: Sodium-cyclamate, Aspartame, Acesulfatn K and Sucralose) was cooled to 2° C., opened and directly spiked with 50 or 100 mg *Stevia*-derived MRP (Tangerine for citrus beverages or popcorn for Cola type). Bottles were recapped and tightly closed.

Closed bottles were brought to room temperature to dissolve *Stevia*-derived MRP completely. Thereafter bottles were stored at 2-4° C. and 20-22° C. Every 2 weeks samples were taken (room temperature samples were then cooled to 4-6° C. and sensory evaluated.

Equally treated, but unspiked bottles were stored as control bottles for direct comparison.

Stability tests were performed for *Stevia*-derived MRP (mouth feel, improvement of sweetener profile), with 5 Tasters, with blinded taste tests with discussion of test results to reach Joint Opinion.

Test Results

The sensory test results for the stability study in sugar free cola beverage are presented below. Results are also noted in FIG. 218 through FIG. 225. The results showed that improvement of overall taste and aroma of the beverage by *Stevia*-derived FMPs is very stable, and *Stevia*-derived FMPs could act as antioxidants for foods and beverages.

TABLE 202.1

| Storage (w) | Temp | Sample Type | *Stevia*-derived MRP (ppm) | Sensory evaluation |
|---|---|---|---|---|
| 0 | 2-4° C. | Cola | — | Artificial Sweetness, void |
| 0 | 2-4° C. | Cola | 100 | Less artificial, better mouth feel |
| 0 | 2-4° C. | Cola | 200 | Substantial less artificial and substantial increased mouth feel |
| 2 | 2-4° C. | Cola | — | Artificial Sweetness, void |
| 2 | 2-4° C. | Cola | 100 | Less artificial, slightly more mouth feel, no change during 2 weeks of storage |
| 2 | 2-4° C. | Cola | 200 | Substantial less artificial and substantial increased mouth feel, no change during 2 weeks of storage |
| 2 | 20-22° C. | Cola | — | Artificial Sweetness, void, no change |
| 2 | 20-22° C. | Cola | 100 | Less artificial, better mouth feel, no difference to samples stored at 2-4° C. |
| 2 | 20-22° C. | Cola | 200 | Substantial less artificial and substantial increased mouth feel, no difference to samples stored at 2-4° C. |
| 4 | 2-4° C. | Cola | — | Artificial Sweetness, void, no change |
| 4 | 2-4° C. | Cola | 100 | Less artificial, better more mouth feel, no change during 4 weeks of storage |
| 4 | 2-4° C. | Cola | 200 | Substantial less artificial and substantial increased mouth feel, no change during 4 weeks of storage |
| 4 | 20-22° C. | Cola | — | Artificial Sweetness, void, no change |
| 4 | 20-22° C. | Cola | 100 | Less artificial, better mouth feel, no difference to samples stored at 2-4° C. |
| 4 | 20-22° C. | Cola | 200 | Substantial less artificial and substantial increased mouth feel, no difference to samples stored at 2-4° C. |

TABLE 202.1-continued

| Storage (w) | Temp | Sample Type | *Stevia*-derived MRP (ppm) | Sensory evaluation |
|---|---|---|---|---|
| 6 | 2-4° C. | Cola | — | Artificial Sweetness, void, no change |
| 6 | 2-4° C. | Cola | 100 | Less artificial, slightly more mouth feel, no change during 4 weeks of storage |
| 6 | 2-4° C. | Cola | 200 | Substantial less artificial and substantial increased mouth feel, no change during 4 weeks of storage |
| 6 | 20-22° C. | Cola | — | Artificial Sweetness, void, no change |
| 6 | 20-22° C. | Cola | 100 | Less artificial, better mouth feel, no difference to samples stored at 2-4° C. |
| 6 | 20-22° C. | Cola | 200 | Substantial less artificial and substantial increased mouth feel, no difference to samples stored at 2-4° C. |
| 8 | 2-4° C. | Cola | — | Artificial Sweetness, void, no change |
| 8 | 2-4° C. | Cola | 100 | Less artificial, slightly more mouth feel, no change during 8 weeks of storage |
| 8 | 2-4° C. | Cola | 200 | Substantial less artificial and substantial increased mouth feel, no change during 8 weeks of storage |
| 8 | 20-22° C. | Cola | — | Artificial Sweetness, void, no change |
| 8 | 20-22° C. | Cola | 100 | Less artificial, better mouth feel, no difference to samples stored at 2-4° C. |
| 8 | 20-22° C. | Cola | 200 | Substantial less artificial and substantial increased mouth feel, no difference to samples stored at 2-4° C. |
| 10 | 2-4° C. | Cola | — | Artificial Sweetness, void, no change |
| 10 | 2-4° C. | Cola | 100 | Less artificial, slightly more mouth feel, no mentionable change during 10 weeks of storage |
| 10 | 2-4° C. | Cola | 200 | Substantial less artificial and substantial increased mouth feel, no mentionable change during 10 weeks of storage |
| 10 | 20-22° C. | Cola | — | Artificial Sweetness, void, no change |
| 10 | 20-22° C. | Cola | 100 | Less artificial, better mouth feel, no difference to samples stored at 2-4° C. |
| 10 | 20-22° C. | Cola | 200 | Substantial less artificial and substantial increased mouth feel, no difference to samples stored at 2-4° C. |

Conclusion: The results showed that *Stevia*-derived MRPs could significantly improve the taste profile and enhance mouth feel of sugar free flavored cola beverages stored at both 2-4° C. and 20-22° C. The improved effects were stable for at least 10 weeks.

Example 203

Aroma Stability in Powder Form and Liquid Form

*Stevia*-derived MRP (Tangerine, Popcorn, Floral, Chocolate) were stored at the following conditions:

Solid (as delivered) in sealed plastic bags, protected from light at 20-22° C.

Liquid as a solution in water (200 ppm) in a sealed bottle, protected from light at 2-4° C. and at 22-24° C.

Liquid as a solution (200 ppm) stored in water/0.1% citric acid in a sealed bottle, protected from light at 2-4° C. and at 22-24° C.

As reference solutions. 200 ppm samples stored in water and water/0.1% citric acid were prepared and frozen to −30° C. in 100 ml portions. Under those conditions changes in the flavor profile were unlikely.

Every 2 weeks a sensory test was performed to evaluate the flavor stability.

Flavor Stability Evaluation—Difference to Reference detected (5 Tasters, Triangle Test Design)

The stability test was based on the evaluation of the sample solution. Therefore, the sample stored in the solid form was evaluated by dissolving into a solution before evaluation.

In each table, one control and three samples were compared. Among them, "Freshly prepared" is a sample stored in solid form, which is the sample solution prepared before evaluation.

TABLE 203.1

| | |
|---|---|
| Reference | 200 ppm samples stored in water and water/0.1% citric acid were prepared and frozen to −30° C. in 100 ml portions. |
| Freshly prepared | Solid samples which were stored in sealed plastic bags were dissolved in water to make the concentration up to 200 ppm. |
| Stored as liquid 2° C. | Liquid as a solution in water (200 ppm) in a sealed bottle. |
| Stored as liquid 22° C. | Liquid as a solution (200 ppm) stored in water/0.1% citric acid in a sealed bottle. |

Test Results

TABLE 203.2

| Storage Time: 0 weeks | | | | |
|---|---|---|---|---|
| Sample | Tangerine | Popcorn | Floral | Chocolate |
| Water | | | | |
| Reference | — | — | — | — |
| Freshly prepared | No | No | No | No |
| Stored as liquid 2° C. | No | No | No | No |
| Stored as liquid 22° C. | No | No | No | No |
| Water/Citric Acid | | | | |
| Reference | — | — | — | — |
| Freshly prepared | No | No | No | No |
| Stored as liquid 2° C. | No | No | No | No |
| Stored as liquid 22° C. | No | No | No | No |

TABLE 203.3

| Storage Time: 2 weeks | | | | |
|---|---|---|---|---|
| Sample | Tangerine | Popcorn | Floral | Chocolate |
| Water | | | | |
| Reference | — | — | — | — |
| Freshly prepared | No | No | No | No |
| Stored as liquid 2° C. | No | No | No | No |
| Stored as liquid 22° C. | No | No | ? | No |
| Water/Citric Acid | | | | |
| Reference | — | — | — | — |
| Freshly prepared | No | No | No | No |
| Stored as liquid 2° C. | No | No | No | No |
| Stored as liquid 22° C. | No | No | Yes[1] | No |

[1]loss of flavor

TABLE 203.4

| Storage Time: 4 weeks | | | | |
|---|---|---|---|---|
| Sample | Tangerine | Popcorn | Floral | Chocolate |
| Water | | | | |
| Reference | — | — | — | — |
| Freshly prepared | No | No | No | No |
| Stored as liquid 2° C. | No | No | No | No |
| Stored as liquid 22° C. | No | No | Yes[1] | No |
| Water/Citric Acid | | | | |
| Reference | — | — | — | — |
| Freshly prepared | No | No | No | No |

TABLE 203.4-continued

| Storage Time: 4 weeks | | | | |
|---|---|---|---|---|
| Sample | Tangerine | Popcorn | Floral | Chocolate |
| Stored as liquid 2° C. | No | No | No | No |
| Stored as liquid 22° C. | No | No | Yes[1] | No |

[1]loss of flavor

TABLE 203.5

| Storage Time: 6 weeks | | | | |
|---|---|---|---|---|
| Sample | Tangerine | Popcorn | Floral | Chocolate |
| Water | | | | |
| Reference | — | — | — | — |
| Freshly prepared | No | No | No | No |
| Stored as liquid 2° C. | No | No | No | No |
| Stored as liquid 22° C. | No | No | Yes[1] | Yes[2] |
| Water/Citric Acid | | | | |
| Reference | — | — | — | — |
| Freshly prepared | No | No | No | No |
| Stored as liquid 2° C. | No | No | No | No |
| Stored as liquid 22° C. | No | Yes[2] | Yes[1] | No |

[1]substantial loss of flavor
[2]slightly bitter

TABLE 203.6

| Storage Time: 8 weeks | | | | |
|---|---|---|---|---|
| Sample | Tangerine | Popcorn | Floral | Chocolate |
| Water | | | | |
| Reference | — | — | — | — |
| Freshly prepared | No | No | No | No |
| Stored as liquid 2° C. | No | No | No | No |
| Stored as liquid 22° C. | Yes[3] | No | Yes[1] | Yes[2] |
| Water/Citric Acid | | | | |
| Reference | — | — | — | — |
| Freshly prepared | No | No | No | No |
| Stored as liquid 2° C. | No | No | No | No |
| Stored as liquid 22° C. | Yes[3] | Yes[2] | Yes[1] | No |

[1]substantial loss of flavor
[2]slightly bitter
[3]Lost Freshness and reduced citrus smell

TABLE 203.7

| Storage Time: 10 weeks | | | | |
|---|---|---|---|---|
| Sample | Tangerine | Popcorn | Floral | Chocolate |
| Water | | | | |
| Reference | — | — | — | — |
| Freshly prepared | No | No | No | No |
| Stored as liquid 2° C. | No | No | No | No |
| Stored as liquid 22° C. | Yes[3] | No | Yes[1] | Yes[2] |
| Water/Citric Acid | | | | |
| Reference | — | — | — | — |
| Freshly prepared | No | No | No | No |
| Stored as liquid 2° C. | No | No | No | No |
| Stored as liquid 22° C. | Yes[3] | Yes[2] | Yes[1] | No |

[1]substantial loss of flavor
[2]bitter
[3]Lost Freshness and substantially reduced citrus smell The results showed that *Stevia*-derived FMPs have antioxidant properties which could keep the taste and aroma stable in both liquid and solid form.

Example 204

Combination of *Stevia*-Derived MRP and Thaumatin in Tea, Coffee and Chocolate Beverages Combinations of *Stevia*-derived MRP and thaumatin Caramel (blend of *Stevia*-derived MRP Caramel and thaumatin (10%)) in a ratio of 10:1 was added at different amounts to the samples below. Sensory evaluations were perfonned and represent the joint opinion of 5 tasters.

TABLE 204.1

| Sample | Combination of *Stevia*-derived MRP and Thaumatin (ppm) | Sweetness | Flavor |
|---|---|---|---|
| hot black Russian tea (no sugar) | 100 | No change | No substantial change |
| | 200 | Sweet, slightly lingering | Harmonic/balanced smell |
| | 300 | Lingering sweet | Slight caramel, Less bitter |
| hot black espresso coffee (no sugar) | 100 | No change | No substantial change |
| | 200 | Sweet, slightly lingering | Balanced smell, Less bitter |
| | 300 | Lingering sweet | Less bitter. More harmonic sweet/acid balance |
| hot cocoa in milk (no sugar) | 100 | No change | Less astringent |
| | 200 | Sweet, slightly lingering | Less astringent, Less bitter, more milky |
| | 300 | Sweet, pleasant Lingering | Less astringent, Less bitter, more milky, harmonic |

Conclusion: The results demonstrated that the combination of *Stevia*-derived MRPs and Thaumatin could be used in tea, coffee and chocolate milk. The combination improved or changed the taste and flavor profile of sugar free products. The added amount depends on desired final products and sweetness and aroma of initial *Stevia*-derived MRPs.

Combinations of *Stevia*-derived MRP and thaumatin Flora (blend of *Stevia*-derived MRP Flora and thaumatin (10%)) in a ratio of 10:1 was added at different amounts to the samples below. Sensory evaluations were performed and represent the joint opinion of 5 tasters. The results showed that combinations of *Stevia*-derived MRPs and thaumatin could improve the overall taste and aroma of tea, coffee, and chocolate beverages.

TABLE 204.2

| Sample | Combination of *Stevia*-derived MRP and Thaumatin (ppm) | Sweetness | Flavor |
|---|---|---|---|
| Ice Tea Peach (7% sugar) | 100 | Slightly more sweet | More intense smell, taste unchanged |
| | 200 | More sweet, full-bodied | More intense smell, floral, more harmonic sour/sweet balance |
| | 300 | More sweet, full-bodied | More intense smell, floral, harmonic sour/sweet balance, not bitterness |
| Ice Tea Lemon (7% sugar) | 100 | Slightly more sweet | No substantial change |
| | 200 | More sweet, full-bodied | Increased citrus smell, no bitter aftertaste |
| | 300 | More sweet, full-bodied | No bitterness. More harmonic sweet/acid balance |
| Ice Tea Cherry (7% sugar) | 100 | Slightly more sweet | Increased fruity smell |
| | 200 | More sweet, full-bodied | Increased fruity smell, More natural cherry taste |
| | 300 | More sweet, full-bodied | Increased fruity smell, More natural cherry taste, more harmonic taste |

Conclusion: The result demonstrated that the combination of *Stevia*-derived MRPs and Thaumatin could be used in a sugar reduced tea beverage. The combination improved the taste, mouthful and aroma of the final products. The added amount depended on desired final product for sweetness or aroma of *Stevia*-derived MRPs. The combination was in range of 0.5 ppm to 2,000 ppm.

Example 205

Combination of *Stevia*-Derived MRP and Thaumatin Ready to Use Concentrate in Beverages

TABLE 205.1

| Sample | Combination of *Stevia*-derived MRP and Thaumatin* Caramel (ml/L) | Sweetness | Flavor |
|---|---|---|---|
| Flavored Water Ginger-Lemongrass (Brand: Vöslauer) | 0 | Faint of sweetness, slightly rasping, sour | Intensive, Ginger |
| | 2.0 | Sweeter, still sour | Intensive, Ginger |
| | 3.0 | Sweeter, still sour | Intensive, Ginger |
| | 3.4 | Pleasant sweetness, harmonic taste | Ginger more harmonic than reference |
| | 3.8 | Pleasant sweetness, harmonic taste, slightly sticky | Ginger more harmonic than reference |
| | 4.0 | Very sweet | Ginger more harmonic than reference |
| | 6.0 | Very sweet, slightly sticky | Ginger more harmonic than reference |
| Flavored Water Apple-Cranberry (Brand: Vöslauer) | 0 | Faint of sweetness, slightly sour | Intensive, Cranberry |
| | 2.0 | Sweeter, slightly sour | Intensive, Cranberry |
| | 3.0 | Sweeter, slightly sour | Intensive, Cranberry, more intense than reference |
| | 3.4 | Pleasant sweetness, harmonic taste | Intensive, Cranberry, more intense and harmonic than reference |
| | 3.8 | Pleasant sweetness, harmonic taste, slightly sticky | Intensive, Cranberry, more intense and harmonic than reference |

TABLE 205.1-continued

| Sample | Combination of Stevia-derived MRP and Thaumatin* Caramel (ml/L) | Sweetness | Flavor |
|---|---|---|---|
| | 4.0 | Very sweet, sticky | Ginger more harmonic than reference |
| | 6.0 | Unpleasant sweet, sticky, slightly rasping | Ginger more harmonic than reference |

*prepared according to recipe:

(a) Blend Stevia-derived MRP Caramel and thaumatin (10%) with the ratio of 10:1

(b) Combination of *Stevia*-derived MRP and thaumatin Caramel: 1.83% (1.83 g blend in 100 g pure water)

Conclusion: The results demonstrated that the combination of *Stevica*-derived MRPs and Thaumatin could be used in flavored water. The combination improved the taste, mouthfeel and aroma of final product significantly. The amount added could vary from 0.5 ppm to 2,000 ppm depending upon the desired taste profile of the final product and the initial composition of *Stevia*-derived MRPs. Thaumatin concentration in the final product can be in range of 0.1 ppm to 20 ppm.

TABLE 205.2

| Sample | Combination of Stevia-derived MRP and Thaumatin* Caramel (mL/L) | Sweetness | Flavor |
|---|---|---|---|
| Sugar free Energy Drink (Brand: Red Bull) | 0 | Sweet, sour | typical energy drink |
| | 1.0 | Pleasant sweet, slightly sour | No change to reference |
| | 2.0 | Pleasant sweetness, harmonic taste | More harmonic than reference, less intense |
| | 3.0 | Pleasant sweetness, harmonic taste, slightly sticky | More harmonic than reference |
| | 4.0 | very sweet, sticky | More harmonic than reference |

*prepared according to recipe:

(a) Blend Stevia-derived MRP Caramel and thaumatin (10%) with the ratio of 10:1

(b) Combination of Stevia-derived MRP and thaumatin Caramel: 1.83% (1.83 g blend in 100 g pure water)

(b) Combination of *Stevia*-derived MRP and thaumatin Caramel: 1.83% (1.83 g blend in 100 g pure water)

Conclusion: The results demonstrated that the combination of *Stevia*-derived MRPs and Thaumatin could be used for sugar free energy drinks. The combination improved the taste, mouthfeel and aroma of the energy drink by using high intensity synthetic sweeteners. Adding different amounts of the combination of *Stevia*-derived MRPs and Thaumatin created different taste and aroma profiles. The combination of *Stevia*-derived MRPs and Thaumatin can be used as a flavoring to improve the taste profile of high intensity synthetic sweeteners.

Example 206

Comparison of *Stevia*-Derived MRPs with Corresponding Combinations of *Stevia*-Derived MRPs and Thaumatin in Beverages

TABLE 206.1

| Sample | Flavor* | Amount (mL/L) | Sensory evaluation |
|---|---|---|---|
| Sugarfree beverage (Orange Brand: Gröbi) | Combination of Stevia-derived MRP and Thaumatin C | 2.0 | Sweeter than reference, mild harmonic, balanced |
| | Stevia-derived MRP C | | Sweeter than reference, mild and harmonic |
| | Combination of Stevia-derived MRP and Thaumatin F | 2.0 | Sweeter than reference, bloomy, almost fully harmonic taste |
| | Stevia-derived MRP F | | Sweeter than reference, bloomy, almost fully harmonic taste, slight off-taste |
| | Combination of Stevia-derived MRP and Thaumatin P | 2.0 | Sweeter than reference, harmonic, balanced taste |
| | Stevia-derived MRP P | | Sweeter than reference, harmonic and balanced taste |
| | Combination of Stevia-derived MRP and Thaumatin Ch | 2.0 | Sweeter than reference, slight bitter chocolate, almost harmonic taste |
| | Stevia-derived MRP Ch | | Sweeter than reference, slight bitter chocolate, almost harmonic taste |
| | Combination of Stevia-derived MRP and Thaumatin T | 2.0 | Much Sweeter than reference, very aromatic, pleasant taste |
| | Stevia-derived MRP T | | Sweeter than reference, pleasantly sour, pleasant taste |

C . . . Caramel,
F . . . Flora,
P . . . Popcorn,
Ch . . . Chocolate,
T . . . Tangerine

*prepared according to recipe:

(a) Stevia-derived MRP prepared according to recipe (b) Blend Stevia-derived MRP and thaumatin (10%) with the ratio of 10:1

(c) Combination of Stevia-derived MRP and thaumatin Caramel: 1.83% (1.83 g blend in 100 g pure water)

Conclusion: The results demonstrated both *Stevia*-derived MRI's and its combination with Thaumatin could be used for sugar free beverage as a flavor or a flavor modifier. The combination improved the taste, mouthfeel and aroma of the sugar free beverage using high intensity synthetic sweeteners. The added combination can be in the range of 0.5 ppm to 2,000 ppm. Thaumatin in the final product can be in the range of 0.1 ppm to 20 ppm.

TABLE 206.2

| Sample | Flavor* | Amount (mL/L) | Sensory evaluation |
|---|---|---|---|
| Sugar free beverage (Cola Brand: Coca Cola) | Combination of Stevia-derived MRP and Thaumatin C | 1.6 | Sweeter than reference, harmonic, balanced taste |
| | Stevia-derived MRP C | | Sweeter than reference, harmonic taste |

TABLE 206.2-continued

| Sample | Flavor* | Amount (mL/L) | Sensory evaluation |
|---|---|---|---|
| | Combination of Stevia-derived MRP and Thaumatin F | 1.6 | Sweeter than reference, almost harmonic taste, slight lingering |
| | Stevia-derived MRP F | | Sweeter than reference, bloomy, almost harmonic taste, slight lingering |
| | Combination of Stevia-derived MRP and Thaumatin P | 1.6 | Sweeter than reference, harmonic, optimum balanced taste |
| | Stevia-derived MRP P | | Sweeter than reference, harmonic and balanced taste |
| | Combination of Stevia-derived MRP and Thaumatin Ch | 1.6 | Sweeter than reference, bitter chocolate, almost harmonic taste |
| | Stevia-derived MRP Ch | | Sweeter than reference, slightly bitter chocolate, almost harmonic taste |
| | Combination of Stevia-derived MRP and Thaumatin T | 1.6 | Sweeter than reference, aromatic, pleasant taste |
| | Stevia-derived MRP T | | Sweeter than reference, aromatic, balanced, pleasant taste |

C . . . Caramel,
F . . . Flora,
P . . . Popcorn,
Ch . . . Chocolate,
T . . . Tangerine
*prepared according to recipe:
(a) Stevia-derived MRP prepared according to recipe
(b) Blend Stevia-derived MRP and thaumatin (10%) with the ratio of 10:1
(c) Combination of Stevia-derived MRP and thaumatin Caramel: 1.83% (1.83 g blend in 100 g pure water)

Conclusion: The results demonstrated both *Stevia*-derived MRPs and its combination with Thaumatin could be used for sugar free cola and other carbonated energy drinks and act as a flavor or a flavor modifier. The combination improved the taste, mouthfeel and aroma of sugar free cola using high intensity synthetic sweeteners. The added amount of the combination can be in the range of 0.5 ppm to 2,000 ppm. Thaumatin in the final product can be in the range of 0.1 ppm to 20 ppm.

TABLE 206.3

| Sample | Flavor* | Amount (mL/L) | Sensory evaluation |
|---|---|---|---|
| Sugar free beverage (Grapefruit Brand: Gröbi) | Combination of Stevia-derived MRP and Thaumatin C | 2.0 | Sweeter and more balanced than reference, very sweet |
| | Stevia-derived MRP C | | Sweeter and more balanced than reference, very sweet, slightly sour |
| | Combination of Stevia-derived MRP and Thaumatin F | 2.0 | Sweeter than reference, almost balanced, harmonic taste |
| | Stevia-derived MRP F | | Sweeter than reference, almost harmonic taste, slightly lingering |
| | Combination of Stevia-derived MRP and Thaumatin P | 2.0 | Sweeter than reference, harmonic, optimum balanced taste |
| | Stevia-derived MRP P | | Sweeter than reference, harmonic and balanced taste |
| | Combination of Stevia-derived MRP and Thaumatin Ch | 2.0 | Sweeter than reference, bitter chocolate, almost pleasant taste |
| | Stevia-derived MRP Ch | | Sweeter than reference, slightly bitter chocolate, almost pleasant taste |
| | Combination of Stevia-derived MRP and Thaumatin T | 2.0 | Sweeter than reference, fresh, no bitterness, aromatic, pleasant taste |
| | Stevia-derived MRP T | | Sweeter than reference, slightly bitter chocolate, aromatic pleasant taste |

C . . . Caramel,
F . . . Flora,
P . . . Popcorn,
Ch . . . Chocolate,
T . . . Tangerine
*prepared according to recipe:
(a) *Stevia*-derived MRP prepared according to recipe
(b) Blend *Stevia*-derived MRP and thaumatin (10%) with the ratio of 10:1
(c) Combination of *Stevia*-derived MRP and thaumatin Caramel: 1.83% (1.83 g blend in 100 g pure water)

Conclusion: The results demonstrated both *Stevia*-derived MRPs and its combination with Thaumatin could be used for sugar free flavored beverages and act as a flavor or a flavor modifier. The combination improved the taste, mouthfeel and aroma of sugar free beverage using high intensity synthetic sweeteners. The added amount of the combination can be in the range of 0.5 ppm to 2,000 ppm. Thaumatin in the final product can be in the range of 0.1 ppm to 20 ppm.

TABLE 206.4

| Sample | Flavor* | Amount (mL/L) | Sensory evaluation |
|---|---|---|---|
| Sugar free beverage (Energy Brand: Red Bull) | Combination of Stevia-derived MRP and Thaumatin C | 2.0 | Sweeter than reference, slightly sour, slightly more harmonic |
| | Stevia-derived MRP C | | Sweeter than reference, slightly sour |
| | Combination of Stevia-derived MRP and Thaumatin F | 2.0 | Sweeter than reference, harmonic, optimum balanced taste |
| | Stevia-derived MRP F | | Sweeter than reference, harmonic and balanced taste |
| | Combination of Stevia-derived MRP and Thaumatin P | 2.0 | Sweeter than reference, harmonic, more balanced taste than reference |
| | Stevia-derived MRP P | | Sweeter than reference, harmonic and balanced taste |
| | Combination of Stevia-derived MRP and Thaumatin Ch | 2.0 | Sweeter than reference, slightly bitter chocolate, almost pleasant taste |
| | Stevia-derived MRP Ch | | Sweeter than reference, slightly bitter chocolate, almost pleasant taste |
| | Combination of Stevia-derived MRP and Thaumatin T | 2.0 | Sweeter than reference, fresh, slightly bitter chocolate |

TABLE 206.4-continued

| Sample | Flavor* | Amount (mL/L) | Sensory evaluation |
|---|---|---|---|
| | Stevia-derived MRP T | | Sweeter than reference, fresh, slightly bitter chocolate |

C . . . Caramel,
F . . . Flora,
P . . . Popcorn,
Ch . . . Chocolate,
T . . . Tangerine
*prepared according to recipe:
(a) Stevia-derived MRP prepared according to recipe
(b) Blend Stevia-derived MRP and thaumatin (10%) with the ratio of 10:1
(c) Combination of Stevia-derived MRP and thaumatin Caramel: 1.83% (1.83 g blend in 100 g pure water)

Conclusion: The results demonstrated both *Stevia*-derived MRPs and its combination with Thaumatin could be used for a sugar free energy drink and act as a flavor or a flavor modifier. The combination improved the taste, mouthfeel and aroma of the sugar free energy drink using high intensity synthetic sweeteners. The added amount of the combination can be in the range of 0.5 ppm to 2,000 ppm. Thaumatin in the final product can be in the range of 0.1 ppm to 20 ppm.

Example 207

Concentration/Sensory Evaluation of Combination of *Stevia*-Derived MRP and Thaumatin in Beverages

TABLE 207.1

| Sample | Flavor (mL/L)* | Amount (mL/L) | Sensory evaluation |
|---|---|---|---|
| Homemade lemon lemonade (squeezed lemon juice 1:5 diluted with water, 4% sugar, 1.5% citric acid (measured)) | Combination of Stevia-derived MRP and Thaumatin C | 0 | Sour, typical lemon flavor |
| | | 2.0 | Sour, typical lemon flavor, slightly rasping, sweeter than reference |
| | | 3.0 | Sour, typical lemon flavor, slightly rasping, sweeter than 2.0 mL |
| | | 4.0 | Sweet/sour, typical lemon flavor, sweeter than 3.0 mL |
| | | 5.0 | Sweet/sour, typical lemon flavor, sweeter than 4.0 mL |
| | | 6.0 | Sweet/sour, typical lemon flavor, sweeter than 5.0 mL |
| | | 8.0 | Harmonic sweet/sour balance, typical lemon flavor, sweeter than 6.0 mL |
| | | 10.0 | Harmonic sweet/sour balance, typical lemon flavor, sweeter than 8.0 mL |
| | | 12.0 | Harmonic sweet/sour balance, typical lemon flavor, sweeter than 10.0 mL, slightly too sweet |
| | | 20.0 | Harmonic sweet/sour balance, typical lemon flavor, sweeter than 12.0 mL, very sweet, slightly sticky |

*C = Caramel

TABLE 207.2

| Sample | Flavor (mL/L)* | Amount (mL/L) | Sensory evaluation |
|---|---|---|---|
| Homemade lemon lemonade (squeezed lemon juice 1:5 diluted with water, 6% sugar, 1.5% citric acid (measured)) | Combination of Stevia-derived MRP and Thaumatin C | 0 | Sweet/Sour, rasping, typical lemon flavor |
| | | 1.0 | Sweet/Sour, rasping, typical lemon flavor, sweeter than reference |
| | | 2.0 | Sweet/Sour, typical lemon flavor, sweeter than 1.0 mL |
| | | 3.0 | Sweet/Sour, typical lemon flavor, sweeter than 2.0 mL |
| | | 4.0 | Sweet/Sour, typical lemon flavor, sweeter than 3.0 mL |
| | | 6.0 | Sweet/Sour balance, typical lemon flavor, sweeter than 4.0 mL |
| | | 7.0 | Harmonic sweet/sour balance, typical lemon flavor, sweeter than 6.0 mL |
| | | 8.0 | Harmonic sweet/sour balance, typical lemon flavor, sweeter than 7.0 mL, slightly sticky |
| | | 10.0 | Harmonic sweet/sour balance, typical lemon flavor, sweeter than 8.0 mL, very sweet, slightly sticky |

*C = Caramel

TABLE 207.3

| Sample | Flavor (mL/L)* | Amount (mL/L) | Sensory evaluation |
|---|---|---|---|
| Homemade lemon lemonade (squeezed lemon juice 1:10 diluted with water, 4% sugar, 1.5% citric acid (measured)) | Combination of Stevia-derived MRP and Thaumatin C | 0 | Sweet/Sour, typical lemon flavor |
| | | 1.0 | Sweet/Sour, typical lemon flavor, sweeter than reference |
| | Combination of Stevia-derived MRP and Thaumatin T | 2.0 | Optimum sweet/sour balance, typical lemon flavor |
| | | 1.0 | Sweet/Sour, typical lemon flavor, sweeter than reference, more aromatic |
| | | 2.0 | Optimum sweet/sour balance, typical lemon flavor, more aromatic |
| | | 0 | Sweet/Sour, typical lemon flavor |
| Homemade lemon lemonade (squeezed lemon juice 1:10 diluted with water, 6% sugar, 1.5% citric acid (measured)) | Combination of Stevia-derived MRP and Thaumatin C | 1.0 | Optimum sweet/sour balance, typical lemon flavor, balanced |
| | | 2.0 | Optimum sweet/sour balance, typical lemon flavor, sweet, balanced |
| | Combination of Stevia-derived MRP and Thaumatin T | 1.0 | Optimum sweet/sour balance, typical lemon flavor, balanced, fruity |
| | | 2.0 | Good Sweet/Sour balance, very sweet, typical lemon flavor |

*C = Caramel, T = Tangerine

TABLE 207.4

| | Lot # |
|---|---|
| Stevia-derived MRP Flora | 240-71-01 |
| Stevia-derived MRP Tangerine | 240-51-01 |
| Stevia-derived MRP Popcorn | 211-31-24 |
| Stevia-derived MRP Chocolate | 211-23-46 |
| Stevia-derived MRP Caramel | EPC-240-117-02 |
| Combination of Stevia-derived MRP and Thaumatin Caramel | EPC-214-10-14 |

TABLE 207.4-continued

| | Lot # |
|---|---|
| EPCalin (Thaumatin), 45% | 20180201 |
| Gröbi Grapefruit | 181108GG 1.5 G; 08.08.19 (08:44) |
| Gröbi Orange | 181219GO 1.5G; 19.09.19 (10:53) |
| CocaCola sugarfree | L22L06:11WN; 24.05.2019 |
| RedBull sugarfree | M22A41; 08.09.2019/0#6; 1668916/14:03 |
| Vöslauer Ingwer-Lemongrass | L32550524; 03.19 |
| Vöslauer Apfel-Cranberry | L22552116; 03.19 |

Conclusion: The results demonstrated both *Stevia*-derived MRPs and its combination with Thaumatin could be used for a sugar reduced lemonade beverage and act as a flavor or a flavor modifier. The combination improved the taste, mouthfeel and aroma of the sugar reduced lemonade. The added amount of the combination can be in the range of 0.5 ppm to 2,000 ppm. Thaumatin in the final product could be in the range of 0.1 ppm to 20 ppm.

Example 208

Behavior of *Stevia*-Derived MRP and Thaumatin Chocolate Erythritol in Chocolate Baked Goods (Example Chocolate Muffins)

Materials:

Baking Powder "Dr. Oetker", Z21403 Mat.-Nr. 2-01-420999/001, 05.20 L149/M.02

Eggs "Hausruck Ei", Pn AT 40387

Cocoa powder "Pit&Pit", D31A00, 8301 PI103211; OUT-0095546 DPD

Wheat flour "Haberfellner", L805011, 12/2019, 09/08:00

Milk "Schärdinger", 3.5% fat, 04.02.19 L7.2/015/00:10 A/S

Sunflower oil "Osolio", 09.12.2019 18:46, L831600916

Sugar "Wiener Zucker", L42170620.3

Thaumatin (45%, Lot #20180201)

*Stevia*-derived MRP Chocolate (Lot #211-23-46)

Erythritol

TABLE 208.1

| Recipe | | | | |
|---|---|---|---|---|
| | | Sugar | | |
| Ingredients | Amount | 100% | 70% | 50% |
| Baking powder | 6.4 g | 120 g | 84 g | 60 g |
| Egg | 1 | | | |
| Cocoa powder | 20 g | | | |
| Flour | 100 g | | | |
| Milk | 120 ml | | | |
| Sunflower Oil | 50 ml | | | |
| Stevia-derived MRP and Thaumatin Chocolate | | — | 0 or 250 µl | 0 or 250 µl |
| Erythritol | | — | 0 or 24 g | 0 or 50 g |

Preparation:

1. Pour flour and all the dry ingredients in one bowl (flour, sugar, cocoa powder, baking powder)

2. Whip all wet ingredients together and pour over the dry ingredients, mix with a hand mixer.

3. Pour mixture into baking pans and bake in a preheated oven of 170° C. for 20 min.

Preparation of *Stevia*-derived MRP and Thaumatin Chocolate solution: Add 180 mg *Stevia*-derived MRP Chocolate to 5 mg thaumatin (45%) and dissolve in 10 ml water.

TABLE 208.2

| Sensory evaluation | | | | |
|---|---|---|---|---|
| Sample | Sugar [%] | Erythritol [%] | Stevia-derived MRP and Thaumatin Chocolate [µl] | Sensory evaluation |
| Reference | 30 | — | — | Typical chocolate cake (Muffin), Soft texture, Sweet and harmonic bitter |
| 30% SR plus Stevia-derived MRP and Thaumatin | 21 | — | 250 | Soft texture, comparable mouth feel to Reference; less sweet and more aromatic (cocoa) than Reference |
| 30% SR plus 5% Erythritol | 21 | 5 | — | Soft texture, comparable mouth feel to Reference; less sweet than Reference |
| 30% SR plus Stevia-derived MRP and Thaumatin and 5% Erythritol | 21 | 5 | 250 | Soft texture, comparable mouth feel to Reference; equally sweet and more aromatic (cocoa) than Reference |

SR: sugar reduction

TABLE 208.3

| Sample | Sugar [%] | Erythritol [%] | Stevia-derived MRP and Thaumatin Chocolate [µl] | Sensory evaluation |
|---|---|---|---|---|
| Reference | 30 | — | — | Typical chocolate cake (Muffin), Soft texture, Sweet and harmonic bitter |
| 50% SR plus Stevia-derived MRP and Thaumatin | 15 | — | 250 | Slightly harder texture, reduced mouth feel compared to Reference; less sweet and more aromatic (cocoa) than Reference |
| 50% SR plus 10% Erythritol | 15 | 10 | — | Soft texture, reduced mouth feel compared to Reference; less sweet than Reference |
| 50% SR plus Stevia-derived MRP and Thaumatin and 10% Erythritol | 15 | 10 | 250 | Soft texture, comparable mouth feel to Reference; equally sweet and more aromatic (cocoa) than Reference |

SR: sugar reduction

Conclusion: The combination of *Stevia*-derived MRPs and Thaumatin significantly improved the taste, mouthfeel, texture and aroma of food products such as baked goods when used in sugar reduced products. The further combination with Erythoritol made the products more palatable that without. The added amount of components depended on the sweetness, strength of flavor of initial *Stevia*-derived MRPs and the desired final product. The added amount can be in the range of 0.5 ppm to 5,000 ppm. The amount of thaumatin in the final product can be in the range of 0.1 ppm to 20 ppm, Example 209

Sensory Evaluation of Thaumatin and *Stevia*-derived MRPs Popcorn in Low Carb/Fat Vanilla Yogurt Test Design:

Low Carb/Fat Vanilla Yogurt (LFVY) as Reference Sample.

Test Samples were composed of 80% Low Carb/Fat Vanilla Yogurt (LFVY) and 20% Low Carb/Fat Plain Yogurt (LFY) with 0 ppm thaumatin (T)-0 ppm *Stevia*-derived MRPs Popcorn (SAP) 0.5 ppm thaumatin (T)-18 ppm *Stevia*-derived MRPs Popcorn (SAP), 1.0 ppm thaumatin (T)-36 ppm *Stevia*-derived MRPs Popcorn (SAP), 1.5 ppm thaumatin (T)-54 ppm *Stevica*-derived MRPs Popcorn (SAP) or 2.00 ppm thaumatin (T)-72 ppm *Stevia*-derived MRPs Popcorn (SAP)

Sensory evaluations consisted of comparisons of sweetness, flavor intensity and mouth feel (each Sample was compared to a reference and was a Joint Opinion of 5 tasters). FIG. 227 depicts the sweetness, flavor and mouth feel profiles of each sample of the LFVY.

Conclusion: The results demonstrated that both *Stevica*-derived MRPs and its combination with Thaumatin could improve taste, mouthfeel and aroma of low-carb/fat dairy products significantly. The amount added depended on the sweetness and the type of aroma of the *Stevia*-derived MRPs. The added amount of *Stevia*-derived MRPs in the final product can be in the range of about 0.5 to about 2,000 ppm, Thalmann in the final dairy products could be in the range of 0.1 ppm to 20 ppm.

Example 210

Sensory Evaluations of *Stevia*-Derived MRPs and Thaumatin in Protein Shake from Pea Protein Powder Materials:

Bio Pea Protein (SRORGWDD181101F, MHD 16.11.2020, Nurafit Superfoods GmbH)

Milk "Schardinger", 26.02.19 L7. 4/036/22:05 A/S; TA 2355R1034.02.90

Thaumatin, 45%, Lot #20180201

Erythritol (Food Grade, Sigma Aldrich)

Neohesperidin dihydrohalcone (NHDC) (≥96%, Lot #MKBT9446V, Sigma Aldrich)

*Stevia*-derived MRPs Caramel, Lot EPC-240-117-02

*Stevia*-derived MRPs Popcorn, Lot #211-31-24

*Stevia*-derived MRPs Tangerine, Lot #240-51-01

Apple Flavor SD, 01600822, Akras Flavors GmbH

Banana Flavor, 60265, Select Alimenta

Hazelnut Flavor, 60406, Select Alimenta

Caramel Flavor, 60532, Select Alimenta

Coconut Flavor, 60560, Select Alimenta

Mango Flavor SD, 730/12B, Akras Aroma GmbH

Vanilla Flavor SD, 01600332, Akras Flavours GmbH

Vanilla Flavor, 60297, Select Alimenta

Wild Berry Flavor SD, 510/11A, Akras Flavours GmbH

Preparation of Combination of *Stevia*-derived MRPs and thaumatin solutions: 180 mg *Stevia*-derived MRPs (Caramel, Tangerine, Popcorn) were added to 5 mg Thaumatin (45%) and dissolved in 10 ml water.

The sample compositions below are based on a volume of 100 mL milk. Normally, bean protein powder has unpleasant off-note taste. The results demonstrate that the innovative compositions used herein make the bean protein powder taste good without off-note taste.

TABLE 210.1

| Materials | Samples [composition per 100 ml in milk] | | | | | | |
|---|---|---|---|---|---|---|---|
| | 1 BANANA | 2 CARAMEL | 3 Coconut | 4 Apple | 5 Apple-Mango | 6 Wild Berry | 7 Hazelnut |
| Pea Protein Powder [mg] | 6000 | 6000 | 6000 | 6000 | 6000 | 6000 | 6000 |
| Erythritol [mg] | 500 | 500 | 500 | 500 | 500 | 500 | 500 |
| NHDC [mg] | 3 | 3 | 3 | 3 | 3 | 3 | 3 |
| Combination of Stevia-derived MRPs and thaumatin Caramel [µl] | 160 | 160 | 160 | — | — | — | — |
| Combination of Stevia-derived MRPs and thaumatin Tangerine [µl] | — | — | — | 200 | 200 | 200 | — |
| Combination of Stevia-derived MRPs and thaumatin Popcorn [µl] | — | — | — | — | — | — | 160 |
| Vanilla SELECT [mg] | 200 | 200 | 200 | 200 | 200 | 200 | 200 |
| Vanilla SD AKRAS [mg] | 200 | 200 | 200 | 200 | 200 | 200 | 200 |
| Banane AKRAS [mg] | 300 | — | — | — | — | — | — |
| Karamel SELECT [mg] | — | 750 | — | — | — | — | — |
| Kokos SELECT [mg] | — | — | 500 | — | — | — | — |
| Apfel SD AKRAS [mg] | — | — | — | 400 | 300 | — | — |
| Mango SD AKRAS [mg] | — | — | — | — | 24 | — | — |
| Waldbeer SD AKRAS [mg] | — | — | — | — | — | 340 | — |
| Haselnuss SELECT [mg] | — | — | — | — | — | — | 150 |
| Taste impression | Excellent | Good | Very good | Excellent | Good | Good | Excellent |
| Evaluation | 10 | 8 | 9 | 10 | 7 | 7-8 | 10 |

(1—very bad/10—excellent)

Conclusion: The results demonstrated that the combination of *Stevia*-derived MRPs and Thaumatin improved the taste, mouthfeel and aroma of a protein product significantly. The further combination with one or more components selected from erythritol, NHDC. Vanilla and other flavors made the product palatable. The added amounts depended on the sweetness, intensity of flavor of initial *Stevia*-derived MRPs and thaumatin and the desired final product. The added amount can be in the range of about 0.5 ppm to about 2,000 ppm. Thaumatin in the final product could be in the range of about 0.1 ppm to about 20 ppm.

Example 211

Sensory Evaluation of *Stevia*-Derived MRPs and Thaumatin in Raspberry Jam

Materials:

Raspberry jam, calorie-reduced "D'arbo", MHD: 09.09.2020 L 253 8 20120, 884312A

Raspberry jam extra, "D'arbo", MHD:23.10.2020 1297 8 21:02, HIM 810084A

Thaumatin, 45%, Lot #20180201

*Stevia*-derived MRPs-Tangerine, Lot #240-51-01

*Stevia*-derived MRPs-Popcorn, Lot #211-31-24

*Stevia*-derived MRPs-Caramel, Lot #EPC-240-117-02

Preparation of Combination of *Stevia*-derived MRPs and thaumatin solutions: 180 mg *Stevia*-derived MRPs (Tangerine, Popcorn, Caramel) were added to 5 mg thaumatin (45%) and dissolved in 10 ml water.

As a reference 1, Raspberry jam extra was used. As a reference 2, Raspberry jam calorie-reduced was used.

Sensory Evaluation:

The sensory evaluation was performed by 5 tasters oint opinion).

Sweetness and sourness were rated on a scale from 0 (not sweet or sour) to 5 (very sweet or sour).

Before tasting, the tasters discussed the series of enhanced samples and tasted control samples (without added flavor) to find a commonality for descriptions. Thereafter the flavored samples were tasted at various levels to find commonality on how to describe the flavors (taste, smell, intensity).

Then the "trained" tasters (4-5) blind taste tested independently all samples of in the series. They were allowed to re-taste and prepared notes for the sensory attributes perceived.

In the last step the attributes noted were discussed openly to find a mutually agreeable description. In case more than 1 taster disagreed with the mutually agreeable description, the tasting was repeated.

The composition of the samples refers to added amount of a combination of *Stevia*-derived MRPs and thaumatin given to 25 g of jam.

TABLE 211.1

| Sample, 25 g | Combination of Stevia-derived MRPs and Thaumatin solution | Amount, μl | Sensory evaluation |
|---|---|---|---|
| Raspberry jam, regular (Ref 1) | — | — | Sweetness (5), Sourness (4), |
| Raspberry jam, calorie-reduced (Ref 2) | — | — | Sweetness (3), Sourness (3), softer texture |
| Raspberry jam, calorie-reduced | Popcorn | 400 | Sweetness (4), Sourness (3), softer texture, more aromatic than Ref 2 |
| | | 500 | Pleasant Sweetness (4)/Sourness (4) balance, optimum harmonic & aromatic. |
| | | 600 | Sweetness (5), Sourness (4), overall taste close to Ref 1, slight lingering Sweetness |
| | Caramel | 400 | Sweetness (4), Sourness (3), caramel note, more aromatic than Ref 2 |
| | | 500 | Pleasant Sweetness (4)/Sourness (4) balance, optimum harmonic & aromatic |
| | | 600 | Sweetness (5), Sourness (4), overall taste close to Ref 1, slight lingering, strong caramel taste |
| | Tangerine | 400 | Sweetness (4), Sourness (3), caramel note, more aromatic than Ref 2, slight lingering sweetness |
| | | 500 | Pleasant Sweetness (4)/Sourness (4) balance, optimum harmonic & aromatic |
| | | 600 | Sweetness (5), Sourness (4), overall taste close to Ref 1, slight lingering |

Conclusion: The results demonstrated that the combination of *Stevia*-derived MRPs and thautnatin could be used for sugar reduced or non-sugar added jams. The combinations improved the taste, mouthfeel and aroma of sugar reduced jams substantially. The amount of the combination added depended on the sweetness and flavor of the initial *Stevia*-derived MRPs and Thaumatin, and also the desired final product. In general, the added amount can be from about 0.5 ppm to about 5,000 ppm.

Example 212

Sensory analysis of thaumatin, Combination of *Stevia*-derived MRPs and thaumatin Popcorn and *Stevia*-derived MRPs Popcorn in yogurt dressings Materials:

Simply good yogurt dressing, 01.03.19 031, 12:18, 33276

Natural yogurt "Ja!Natürlich", 1%, mild, 04.03.19, 06:37 2, 9005182006827

Simply good yogurt dressing light, 15.02.19 017, 09:22

Thaumatin, 45%, Lot #20180201

*Stevia*-derived MRPs Popcorn, Lot #211-31-24

Preparation of Combination of *Stevia*-derived MRPs and Thaumatin Popcorn: 180 mg *Stevia*-derived MRPs Popcorn were added to 5 mg thaumatin (45%) and dissolved in 10 ml water.

Sensory Evaluation:

The sensory evaluation was performed by 5 tasters (joint opinion). Before tasting, the tasters discussed the series of samples and tasted control samples (without added flavor) to find a commonality for descriptions. Thereafter the flavored samples were tasted at various levels to find commonality on how to describe the flavors (taste, smell, intensity).

Then the "trained" tasters (4-5) blind taste tested independently all samples in the series. They were allowed to re-taste and prepared notes for the sensory attributes perceived.

In the last step the attributes noted were discussed openly to find a mutually agreeable description. In case more than 1 taster disagreed with the mutually agreeable description, the tasting was repeated.

Behavior of Combination of *Stevia*-derived MRPs and thaumatin Popcorn in Light Yogurt Dressing

TABLE 212.1

| Basis | Combination of Stevia-derived MRPs and Thaumatin Popcorn (μl) | Sensory Evaluation |
|---|---|---|
| Light Yogurt Dressing (50 g) | — | Mild sour and aromatic (herbal, savory), slightly sweet, watery |
| | 100 | Mild sour and more aromatic (herbal, savory), slightly sweet, less watery |
| | 125 | Mild sour and more aromatic (herbal, savory), slightly sweeter, medium mouth feel |
| | 150 | Less sour and more aromatic (herbal, savory), sweeter, good mouth feel |
| | 175 | Balanced sweet/sour balance, more aromatic (herbal, savory), very good mouth feel |
| | 200 | Mild sweet/sour balance, sweet, more aromatic (herbal, savory), very good mouth feel |

The sample with 175 μl represented the best taste profile.

Conclusion: The results demonstrated that the combination of *Stevia*-derived MRPs and thaumatin could be used in sugar reduced yogurt and other dairy products. The combinations improved taste, mouthfeel and aroma profile of the final product significantly. The amount added in the final product depended on the initial sweetness and flavor of initial product and desired target. In general, the combination of *Stevia*-derived MRPs and thaumatin can be added from about 0.5 ppm to about 2,000 ppm. Thaumatin in the final product can be from about 0.1 ppm to about 20 ppm.

Example 213

Comparison of *Stevia*-derived MRPs Popcorn and Combination of *Stevia*-Derived MRPs and Thaumatin Popcorn Solutions to 6.5% Sugar Solution

TABLE 213.1.1

| Sample | Preparation | Sensory evaluation |
|---|---|---|
| Stevia-derived MRPs Popcorn | 400 μl Stevia-derived MRPs Popcorn solution + 100 ml 5% sugar solution | The sweetness potency is the same as a 6.5% sugar solution. No aftertaste, sugar-like taste. |
| Combination of Stevia-derived MRPs and thaumatin Popcorn | 300 μl Combination of Stevia-derived MRPs and thaumatin Popcorn solution + 100 ml 5% sugar solution | The sweetness potency is the same as a 6.5% sugar solution. No aftertaste. |

Materials:

Thaumatin, 45%, Lot #20180201

*Stevia*-derived MRPs Popcorn, Lot #211-31-24

Preparation of *Stevia*-derived MRPs Popcorn solution: 180 mg *Stevia*-derived MRPs Popcorn were directly weighed into a volumetric flask and dissolved in 10 ml water.

Preparation of Combination of *Stevia*-derived MRPs and thaumatin Popcorn solution: 180 mg *Stevia*-derived MRPs Popcorn were added to 5 mg thaumatin (45%) and dissolved in 10 ml water.

Conclusion: The results demonstrated that *Stevia*-derived MRPs and its combination with Thaumatin can be used as a flavor and a sweetness enhancer. The result can be extended to all type of *Stevia*-derived MRPs and its combination of Thaumatin. The threshold of sweetness or upper limit of non-sweetness below 1.5% SE depends on the specific formulation of products. In case, the sweetness is above 1.5%, it can show sweetness synergy with sugar and other sweeteners.

Example 214

The residue of steviol glycosides, amino acid and reducing sugar in S-MRP

Sample Preparation

Two S-MRP-CA samples were prepared according to the method described in Example 58. The lot 4 of the samples were 240-117-01 and 240-117-03, Two S-MRP-FL samples were prepared according to the method described in Example 57. The lot 4 of the samples were 240-98-01 and 240-98-03.

Analysis of Residue of Steviol Glycosides

The content of steviol glycosides in the S-MRP was analyzed by HPLC according to the method of JECFA 2010.

Reagents

Acetonitrile: more than 95% transmittance at 210 nm.

Standards

Stevioside: more than 99.0% purity on the dried basis.

Rebaudioside A: more than 99.0% purity on the dried basis.

Mixture of nine steviol glycosides standard solution: Containing stevioside, rebaudioside A, rebaudioside B, rebaudioside C, rebaudioside D, rebaudioside F, dulcoside A, rubusoside and steviolbioside. This solution is diluted with water-acetonitrile (7:3) accordingly and is used for the confirmation of retention times.

Standards are available from ChromaDex, USA,

Standard Solution

Accurately weigh 50 mg of stevioside and rebaudioside A standard into each of two 50-ml volumetric flasks. Dissolve and make up to volume with water-acetonitrile (7:3).

Sample Solution

Accurately weigh 50-100 mg of sample into a 50-ml volumetric flask. Dissolve and make up to volume with water-acetonitrile (7:3).

Procedure

Inject 5 μL of sample solution under the following conditions.

Column: C18 column (length: 250 mm; inner diameter: 4.6 mm, particle size: 5 μm)

Mobile phase: 32:68 mixture of acetonitrile and 10 mmol/L sodium phosphate buffer (pH 2.6)

Flow rate: 1.0 ml/min

Detector: UV at 210 nm

Column temperature: 40° C.

Record the chromatogram for about 30 min.

Identification of the Peaks and Calculation

Identify the peaks from the sample solution by comparing the retention time with the peaks from the mixture of nine steviol glycosides standard solution. Measure the peak areas for the nine steviol glycosides from the sample solution. Measure the peak area for stevioside and rebaudioside A from their standard solutions.

Calculate the percentage of each of the eight steviol glycosides except rebaudioside A in the sample from the formula: % $X=[W_S/W]\times[f_X A_X/A_S]\times 100$ Calculate the percentage of rebaudioside A in the sample from the formula: % Rebaudioside $A=[W_R/W]\times[A_X/A_R]\times 100$ where X is each steviol glycoside;

$W_S$ is the amount (mg) calculated on the dried basis of stevioside in the standard solution;

$W_R$ is the amount (mg) calculated on the dried basis of rebaudioside A in the standard solution;

W is the amount (mg) calculated on the dried basis of sample in the sample solution;

$A_S$ is the peak area for stevioside from the standard solution;

$A_R$ is the peak area for rebaudioside from the standard solution;

$A_X$ is the peak area of X for the sample solution; and $f_X$ is the ratio of the formula weight of X to the formula weight of stevioside: 1.00 (stevioside), 1.20 (rebaudioside A), 1.00 (rebaudioside B), 1.18 (rebaudioside C), 1.40 (rebaudioside D), 1.16 (rebaudioside F), 0.98 (dulcoside A), 0.80 (rubusoside) and 0.80 (steviolbioside).

Calculate the percentage of total steviol glycosides (sum the nine steviol glycosides, stevioside, rebaudioside A, rebaudioside B, rebaudioside C, rebaudioside D, rebaudioside F, dulcoside A, rubusoside and steviolbioside).

Analysis of Residue of Amino Acid

The content of amino acid in the S-MRP was analyzed by HPLC-ELSD according to the method of Chinese Journal of chromatography, Vol 29, No. 9, 908-911.

Instrument

Agilent 1100 HPLC

Dikma SEVEX75 ELSD

Reagents

Alanine and phenylalanine: BR grade.

Trifluoroacetic acid (TFA), heptafluorobutyric acid, hydrochloric acid, methanol.

Procedure

Moble phase (A): 2 ml heptafluorobutyric acid and 1 ml trifluoroacetic acid were dissolve in 1000 ml water. Filter through 0.22 μm membrane.

Moble phase (B): methanol

Moble Phase Gradient

TABLE 214.1

| Time (min) | A (%) | B (%) |
|---|---|---|
| 0 | 100 | 0 |
| 8 | 100 | 0 |
| 11 | 78 | 22 |
| 21 | 73 | 27 |
| 30 | 45 | 55 |
| 40 | 45 | 55 |

Column: SHISEIDO Capcell Pak C18 MG II S5(5 μm, 4.6 mm×250 mm)

Standard Curve

Weigh 50 mg of the amino acid in a 50 ml volumetric flask, add 0.01 mol/L hydrochloric acid solution to dissolve by ultrasonic and make up the volume. Thus obtain the stock solution. Draw 1.0 mL, 2.0 mL, 3.0 mL, 4.0 mL, 5.0 mL stock solution into 10 mL volumetric flask and make up the volume by 0.01 mol/L hydrochloric acid solution. Filter by 0.22 membrane.

Sample Solution

Weigh 50 mg of the amino acid in a 10 ml volumetric flask, add 0.01 mol/L hydrochloric acid solution to dissolve by ultrasonic and make up the volume. Filter by 0.22 μm membrane.

Analysis of Residue of Reducing Sugar

The content of reducing sugar in S-MRP was entrusted to Eurofins for analysis.

Result

The residues of steviol glycosides in S-MRP are listed in the table below.

TABLE 214.2

| | Content (%) | | | | | | | | | |
|---|---|---|---|---|---|---|---|---|---|---|
| sample | RD | RA | SS | RF | RC | DA | RU | RB | SB | TSG* |
| 240-117-01 | \ | 17.78 | 42.45 | 0.34 | 1.75 | \ | 0.07 | 0.60 | 1.04 | 64.03 |
| 240-117-03 | \ | 17.92 | 42.39 | 0.30 | 1.72 | \ | 0.06 | 0.56 | 1.00 | 63.96 |
| 240-98-01 | 0.79 | 26.37 | 45.95 | 0.50 | 3.50 | 0.38 | 0.13 | 0.76 | 1.15 | 79.53 |
| 240-98-03 | 0.64 | 25.97 | 45.24 | 0.48 | 2.79 | 0.17 | 0.10 | 0.84 | 1.29 | 77.54 |

*the TSG means the total steviol glycosides, which is the sum of the nine steviol glycosides, stevioside, rebaudioside A, rebaudioside B, rebaudioside C, rebaudioside D, rebaudioside F, dulcoside A, rubusoside and steviolbioside.

The residues of amino acid in S-MRP are listed in the table below.

TABLE 214.3

| sample | Type of amino acid | Residue (%) |
|---|---|---|
| 240-117-01 | Alanine | 2.314 |
| 240-117-03 | Alanine | 2.240 |
| 240-98-01 | Phenylalanine | 1.932 |
| 240-98-03 | Phenylalanine | 1.673 |

The residues of reducing sugar in S-MRP are listed in the table below.

TABLE 214.4

| sample | Type of reducing sugar | Residue (%) |
|---|---|---|
| 240-117-01 | Xylose | 5.3 |
| 240-117-03 | Xylose | 5.3 |

TABLE 214.4-continued

| sample | Type of reducing sugar | Residue (%) |
|---|---|---|
| 240-98-01 | Xylose | 5.9 |
| 240-98-03 | Xylose | 5.4 |

Conclusion: The results demonstrated that *Stevia*-derived MRPs can contain remaining unreacted sugar donor, amine donor and sweetening agent under reaction conditions. This example can be extended to any other type of sweetening agent-derived MRP. The remaining amount of unreacted substances depend on the amount of added starting material and reaction conditions. Any or all reactants could be consumed completely under certain reaction condition depending upon targeted final products.

Example 215

Effect of Thaumatin *Stevia*-Derived MRPs Flora and Combination of *Stevia*-Derived MRPs and Thaumatin Floral on the Taste Modification (Mouth Feel) of Energy Drink Materials:

Red. Bull sugar free (06-17-19/A4 1, 164700167/11:20)

Thaumatin, 45%, Lot #20180201

*Stevia*-Derived MRPs Floral, Lot #240-71-01

Preparation of thautnatin solution: 5 mg thaumatin (45%) were weighed and dissolved in 10 ml water.

Preparation of *Stevia*-derived MRPs Floral solution: 180 mg *Stevia*-derived MRPs Floral were weighed and dissolved in 10 ml water.

Preparation of Combination of *Stevia*-derived MRPs and thaumatin Floral solution: 180 mg *Stevia*-derived MRPs (Floral) were added to 5 mg thaumatin (45%) and dissolved in 10 ml water.

Sensory Evaluation

Before tasting, the tasters discussed the series of samples and tasted control samples (without added flavor) to find a commonality for descriptions. Thereafter the flavored samples were tasted at various levels to find a commonality on how to describe the flavors (taste, smell, intensity).

Four trained tasters blind taste tested independently all samples in the series. They were allowed to re-taste and prepared notes for the sensory attributes perceived.

In the last step the attributes noted were discussed openly to find a mutually agreeable description. In case more than 1 taster disagrees with the mutually agreeable description, the tasting was repeated.

TABLE 215.1

| Test Results | | | |
|---|---|---|---|
| Sample | Added Flavor | Amount, μl | Sensory evaluation |
| Red Bull sugar free, 100 ml | — | — | Sour, artificial sweet, artificial flavor, void |
| | *Stevia*-derived MRPs Floral | 200 μl | Less Sour, more natural sweet, sweeter, stronger flavor, better mouth feel |
| | Combination of *Stevia*-derived MRPs and thaumatin Floral | 200 μl | Optimum Sweet/Sour Balance, natural sweet, balanced flavor, very good mouth feel |

Conclusion: The results demonstrated that the *Stevia*-derived. MRPs and its combination with Thaumatin could improve the overall taste and aroma profile of a sugar free energy drink. The amount added can be extended to about 1 to about 2000 ppm. All types of *Stevia*-derived MRPs and its combination with Thaumatin can be used.

Example 216

Effect of *Stevia*-Derived MRPs and Thaumatin in Fanta Zero Strawberry Sweet, Fanta Lemon Zero, Schartner Bombe, Peach-Maracuja Sugar-Free, Grobi Orange Maracuja, Sugarfree Materials:

Fanta Zero Strawberry Twist, 22.06.2019, L21M08: 21WP

Fanta Zero Lemon, 14.03.2019, L12J11:24WP

Schartner Bombe, sugarfree, 25.09.2019 07:11, L/250919

Gröbi Orange Maracuja, 181219 GM 1.5 G, 19.09.19 (08:45) thaumatin, 45%, Lot #20180201

*Stevia*-derived MRPs Floral, Lot #240-71-01

*Stevia*-derived MRPs Tangerine, Lot #240-51-01

*Stevia*-derived MRPs Popcorn, Lot #211-31-24

*Stevia*-derived MRPs Chocolate, Lot #211-23-46

*Stevia*-derived MRPs Caramel, Lot 4 EPC-240-117-02

Preparation of *Stevia*-derived MRPs solutions: 180 mg *Stevia*-derived MRPs (Floral, Tangerine, Popcorn, Chocolate, and Caramel) were weighed and dissolved in 10 ml water.

Preparation of Combination of *Stevia*-derived MRPs and Than atin solutions: 180 mg *Stevia*-derived MRPs (Floral, Tangerine, Popcorn, Chocolate, Caramel) were added to 5 mg thaumatin (45%) and dissolved in 10 ml water.

Sensory Evaluation

Before tasting, the tasters discussed the series of samples and tasted control samples (without added flavor) to find a commonality for descriptions. Thereafter the flavored samples were tasted at various levels to find commonality on how to describe the flavors (taste, smell, intensity).

Five trained tasters blind taste tested independently all samples in the series. They were allowed to re-taste and prepared notes for the sensory attributes perceived.

In the last step the attributes noted were discussed openly to find a mutually agreeable description. In case more than 1 taster disagreed with the result, the tasting was repeated.

TABLE 216.1

| Sample | Sweetener | Amount, μl | Taste impression |
|---|---|---|---|
| Fanta Zero Strawberry Sweet, 50 ml | — | — | Sour, Sweet, fruity strawberry flavor, quickly disappearing, low mouth feel |
| | Combination of Steviaroma-derived MRPs and Thaumatin Caramel | 100 | Less Sour, sweeter, increased flavor perception, more long-lasting, medium mouth feel |
| | *Stevia*-derived MRPs Caramel | 100 | Less Sour, sweeter, slightly increased flavor perception, medium mouth feel |
| | Combination of *Stevia*-derived MRPs and Thaumatin Floral | 100 | Very good Sour/Sweet Balance, increased flavor perception (floral notes), more long-lasting, good mouth feel |
| | *Stevia*-derived MRPs Floral | 100 | Good Sour/Sweet Balance, increased flavor perception (floral notes), more long-lasting, medium mouth feel |

TABLE 216.1-continued

| Sample | Sweetener | Amount, µl | Taste impression |
| --- | --- | --- | --- |
| | Combination of Steviaroma-derived MRPs and Thaumatin Popcorn | 100 | Less sour, sweeter, increased flavor perception, more long-lasting, medium mouth feel |
| | *Stevia*-derived MRPs Popcorn | 100 | Less sour, sweeter, slightly increased flavor perception, more long-lasting, medium mouth feel |
| | Combination of Steviaroma-derived MRPs and Thaumatin Chocolate | 100 | Less sour, sweeter, increased flavor perception (chocolate notes), more long-lasting, medium mouth feel |
| | *Stevia*-derived MRPs Chocolate | 100 | Less sour, sweeter, slightly increased flavor perception (chocolate notes), more long-lasting, medium mouth feel |
| | Combination of Steviaroma-derived MRPs and Thaumatin Tangerine | 100 | Very good Sour/Sweet Balance, increased flavor perception (citrus notes), more long-lasting, very good mouth feel |
| | *Stevia*-derived MRPs Tangerine | 100 | Good Sour/Sweet Balance, increased flavor perception (citrus notes), more long-lasting, good mouth feel |

TABLE 216.2

| Sample | Sweetener | Amount, µl | Sensory evaluation |
| --- | --- | --- | --- |
| Fanta Lemon Zero, 50 ml | — | — | Sour, Sweet, fruity lemon flavor, quickly disappearing, low mouth feel |
| | Combination of Steviaroma-derived MRPs and Thaumatin Caramel | 100 | Very good Sour/Sweet Balance, increased flavor perception, more long-lasting, good mouth feel |
| | *Stevia*-derived MRPs Caramel | 100 | Less Sour, sweeter, slightly increased flavor perception, medium mouth feel |
| | Combination of Steviaroma-derived MRPs and Thaumatin Floral | 100 | Very good Sour/Sweet Balance, increased flavor perception (floral notes), more long-lasting, very good mouth feel |
| | *Stevia*-derived MRPs Floral | 100 | Good Sour/Sweet Balance, slightly increased flavor perception (floral notes), more long-lasting, good mouth feel |
| | Combination of Steviaroma-derived MRPs and Thaumatin Popcorn | 100 | Good Sour/Sweet Balance, increased flavor perception (burnt sugar notes), more long-lasting, good mouth feel |
| | *Stevia*-derived MRPs Popcorn | 100 | Less Sour, sweeter, slightly increased flavor perception, (burnt sugar notes), medium mouth feel |
| | Combination of Steviaroma-derived MRPs and Thaumatin Chocolate | 100 | Less sour, sweeter, increased flavor perception (chocolate notes), more long-lasting, good mouth feel |
| | *Stevia*-derived MRPs Chocolate | 100 | Less sour, sweeter, slightly increased flavor perception (chocolate notes), more long-lasting, medium mouth feel |
| | Combination of Steviaroma-derived MRPs and Thaumatin Tangerine | 100 | Very good Sour/Sweet Balance, increased flavor perception (citrus notes), more long-lasting, very good mouth feel |
| | *Stevia*-derived MRPs Tangerine | 100 | Good Sour/Sweet Balance, slightly increased flavor perception (citrus notes), more long-lasting, good mouth feel |

TABLE 216.3

| Sample | Sweetener | Amount, µl | Sensory evaluation |
| --- | --- | --- | --- |
| Schartner Bombe, Peach-Maracuja sugarfree, 50 ml | — | — | Sour, Sweet, fruity peach/maracuja (orange) flavor, artificial, quickly disappearing, low mouth feel |
| | Combination of Steviaroma-derived MRPs and Thaumatin Caramel | 100 | Very good Sour/Sweet Balance, increased flavor perception, more natural, more long-lasting, good mouth feel |
| | *Stevia*-derived MRPs Caramel | 100 | Good Sour/Sweet Balance, slightly increased flavor perception, more long-lasting, good mouth feel |
| | Combination of Steviaroma-derived MRPs and Thaumatin Floral | 100 | Very good Sour/Sweet Balance, increased flavor perception (floral notes), more natural, more long-lasting, very good mouth feel |
| | *Stevia*-derived MRPs Floral | 100 | Good Sour/Sweet Balance, slightly increased flavor perception (floral notes), more long-lasting, good mouth feel |
| | Combination of Steviaroma-derived MRPs and Thaumatin Popcorn | 100 | Very good Sour/Sweet Balance, increased flavor perception, more natural, more long-lasting, very good mouth feel |
| | *Stevia*-derived MRPs Popcorn | 100 | Good Sour/Sweet Balance, slightly increased flavor perception, more long-lasting, good mouth feel |
| | Combination of Steviaroma-derived MRPs and Thaumatin Chocolate | 100 | Less sour, sweeter, increased flavor perception (chocolate notes), more long-lasting, good mouth feel |
| | *Stevia*-derived MRPs Chocolate | 100 | Less sour, sweeter, slightly increased flavor perception (chocolate notes), more long-lasting, medium mouth feel |

TABLE 216.3-continued

| Sample | Sweetener | Amount, μl | Sensory evaluation |
|---|---|---|---|
| | Combination of Steviaroma-derived MRPs and Thaumatin Tangerine | 100 | Good Sour/Sweet Balance, increased flavor perception (citrus notes), less artificial. more long-lasting, good mouth feel |
| | *Stevia*-derived MRPs Tangerine | 100 | Good Sour/Sweet Balance, slightly increased flavor perception (citrus notes), more long-lasting, good mouth feel |

TABLE 216.4

| Sample | Sweetener | Amount, μl | Sensory evaluation |
|---|---|---|---|
| Grobi Orange Maracuja, sugarfree, 50 ml | — | — | Sour, Sweet, fruity orange/maracuja flavor, artificial, quickly disappearing, low mouth feel |
| | Combination of *Stevia*-derived MRPs and Thaumatin Caramel | 100 | Very good Sour/Sweet Balance, sweeter, increased flavor perception, more natural, more long-lasting, good mouth feel |
| | *Stevia*-derived MRPs Caramel | 100 | Good Sour/Sweet Balance, sweeter, slightly increased flavor perception, more long-lasting, good mouth feel |
| | Combination of Steviaroma-derived MRPs and Thaumatin Floral | 100 | Good Sour/Sweet Balance, increased flavor perception (floral notes), more long-lasting, good mouth feel |
| | *Stevia*-derived MRPs Floral | 100 | Good Sour/Sweet Balance, slightly increased flavor perception (floral notes), more long-lasting, medium mouth feel |
| | Combination of Steviaroma-derived MRPs and Thaumatin Popcorn | 100 | Very good Sour/Sweet Balance, increased flavor perception, more natural, more long-lasting, very good mouth feel |

TABLE 216.4-continued

| Sample | Sweetener | Amount, μl | Sensory evaluation |
|---|---|---|---|
| | *Stevia*-derived MRPs Popcorn | 100 | Good Sour/Sweet Balance, slightly increased flavor perception, less artificial, more long-lasting, good mouth feel |
| | Combination of Steviaroma-derived MRPs and Thaumatin Chocolate | 100 | Less sour, sweeter, increased flavor perception (chocolate notes), more long-lasting, good mouth feel |
| | *Stevia*-derived MRPs Chocolate | 100 | Less sour, sweeter, slightly increased flavor perception (chocolate notes), more long-lasting, medium mouth feel |
| | Combination of Steviaroma-derived MRPs and Thaumatin Tangerine | 100 | Very good Sour/Sweet Balance, increased flavor perception (citrus notes), more natural, more long-lasting, very good mouth feel |
| | *Stevia*-derived MRPs Tangerine | 100 | Good Sour/Sweet Balance, slightly increased flavor perception (citrus notes), more natural, more long-lasting, good mouth feel |

Conclusion: all these examples showed that both *Stevia*-derived MRPs and combinations of *Stevia*-derived MPRs and thaumatin could significantly improve the overall taste and flavour profile of sugar free carbonated soft drinks. The added amount of the composition can be in the range of about 1 ppm to about 2,000 ppm, and all type of *Stevia*-derived MRPs and their combination with thaumatin can be used for sugar free or sugar reduced carbonated beverage and flavoured waters

Examples 217-222

The Improvement of S-MRP and TS-MRP to the Taste and Mouthfeel of *Stevia* Extract The sources of the *Stevia* extract and MRP samples used in the following Examples are as follows.

TABLE 217-222

| sample | source | Lot # | specification |
|---|---|---|---|
| RA90/RD7, the *Stevia* composition of RA90% and RD7% | Sweet Green Fields | 20151009 | RA 90.8%, RD 6.43% |
| RA80/RB10/RD6 | Sweet Green Fields | 20151207 | RA 77.02%, RB 10.66%, RD 6.84% |
| RM, rebaudioside M | Sichuan Ingia Biosynthetic Co,.ltd, China | 20180915 | RM 93.03%, RD 3.67% |
| MRP-FL | The product of Example 96 | | |
| MRP-CA | The product of Example 97 | | |
| S-MRP-CA | The product of Example 68 | | |
| S-MRP-PC | The product of Example 150 | | |
| thaumatin | The product of EPC Natural Products Co., Ltd, China | 20180801 | thaumatin 10.74% |
| TS-MRP-FL | the mixture of above S-MRP-FL and thaumatin with the weight ratio of 10:1 | | |

TABLE 217-222-continued

| sample | source | Lot # | specification |
|---|---|---|---|
| TS-MRP-PC | the mixture of above S-MRP-PC and thaumatin with the weight ratio of 10:1 | | |

Example 217

The Improvement of MRP-FL to the Taste and Mouthfeel of RA90/RD7+RM (1:9)

Common Process:

Dissolve 1 g MRP-FL into 99 g pure water to prepare a 1% MRP-FL solution. Prepare 1% RA90/RD7 solution and 1% RM solution by the similar method. The solution of MRP-FL, RA90/RD7 and RM were weighed and uniformly mixed according to the weight shown in Table 217.1, add pure water to make the total volume to 100 ml, and subjected to a mouthfeel evaluation test. The tasting procedure is the same as Example 39.

TABLE 217.1

| the weight of MRP-FL, RA90/RD7 and RM | | | | |
|---|---|---|---|---|
| # | The ratio of MRP-FL to RA90/RD7 + RM(1:9) | Weight of MRP-FL solution (g) | Weight of RA90/RD7 solution (g) | Weight of RM solution (g) |
| 217-01 | 1/99 | 0.05 | 0.5 | 4.5 |
| 217-02 | 10/90 | 0.56 | 0.5 | 4.5 |
| 217-03 | 20/80 | 1.25 | 0.5 | 4.5 |
| 217-04 | 30/70 | 2.1 | 0.5 | 4.5 |
| 217-05 | 40/60 | 3.3 | 0.5 | 4.5 |
| 217-06 | 50/50 | 3.3 | 0.33 | 3 |
| 217-07 | 60/40 | 3.3 | 0.22 | 2 |
| 217-08 | 70/30 | 3.3 | 0.14 | 1.27 |
| 217-09 | 80/20 | 3.3 | 0.083 | 0.74 |
| 217-10 | 90/10 | 3.3 | 0.03 | 0.3 |
| 217-11 | 99/1 | 3.3 | 0.003 | 0.03 |

Experiments

Several mixtures of MRP-FL, RA90/RD7 and RM were mixed in this example. Each sample was evaluated according to the aforementioned sensory evaluation method, and the average score of the panel was taken as the evaluation result data. The taste profile of the mixture is as follows. The results are shown in Table 217.2.

TABLE 217.2

| the score in sensory evaluation | | | | | | |
|---|---|---|---|---|---|---|
| | sensory evaluation | | | | | |
| | | sweet profile | | | | |
| # | mouth-feel kokumi | sweet lingering | bitterness | metallic aftertaste | score of sweet profile | overall like-ability |
| 217-01 | 1 | 3 | 1 | 1 | 4.33 | 2.67 |
| 217-02 | 2 | 2 | 1 | 1 | 4.67 | 3.33 |
| 217-03 | 2 | 2 | 1 | 1 | 4.67 | 3.33 |
| 217-04 | 3 | 2 | 1 | 1 | 4.67 | 3.83 |
| 217-05 | 3 | 1 | 2 | 1 | 4.67 | 3.83 |
| 217-06 | 3 | 2 | 2 | 1 | 4.33 | 3.67 |
| 217-07 | 4 | 1 | 2 | 1 | 4.67 | 4.33 |
| 217-08 | 4 | 2 | 2 | 1 | 4.33 | 4.17 |
| 217-09 | 4 | 1 | 1 | 1 | 5.00 | 4.50 |

TABLE 217.2-continued

| the score in sensory evaluation | | | | | | |
|---|---|---|---|---|---|---|
| | sensory evaluation | | | | | |
| | | sweet profile | | | | |
| # | mouth-feel kokumi | sweet lingering | bitterness | metallic aftertaste | score of sweet profile | overall like-ability |
| 217-10 | 3 | 1 | 3 | 1 | 4.33 | 3.67 |
| 217-11 | 2 | 1 | 3 | 1 | 4.33 | 3.17 |

Data Analysis

The relationship between the sensory evaluation results to the of MRP-FL, to RA90/RD7+RM (1:9) in this example is as shown in FIG. 228.

The relationship between the overall likeability results to the ratio of MRP-FL to RA90/RD7+RM (1:9) in this example is as shown in FIG. 229.

Conclusion:

The results showed that MRPs can improve taste profile, flavor intensity and mouthfeel of high intensity natural sweeteners such as *Stevia* extract. For example, steviol glycosides comprise rebaudioside rebaudioside D and rebaudioside M. All ranges in tested ratios of MRP-FL to RA90/RD7+RM(1:9) from 1/99 to 99/1 had good taste (overall likeability score >2.5), preferably when the ratio ranges were from 10/90 to 90/10, the products will give very good taste (score >3). This example can further demonstrate that MRPs can improve taste profile, flavor intensity and mouthfeel of steviol glycosides.

Example 218

The Improvement of S-MRP-PC to the Taste and Mouthfeel of RA90/RD7+RM (5:5)

Common Process:

Dissolve 1 g S-MRP-PC into 99 g pure water to prepare a 1% S-MRP-PC solution. Prepare 1% RA90/RD7 solution and 1% RM solution by the similar method. The solution of S-MRP-PC, RA90/RD7 and RM were weighed and uniformly mixed according to the weight shown in Table 218.1, add pure water to make the total volume to 100 ml, and subjected to a mouthfeel evaluation test. The tasting procedure is the same as Example 39.

TABLE 218.1

| the weight of S-MRP-PC, RA90/RD7 and RM | | | | |
|---|---|---|---|---|
| # | The ratio of S-MRP-PC to RA90/RD7 + RM (1:9) | Weight of S-MRP-PC solution (g) | Weight of RA90/RD7 solution (g) | Weight of RM solution (g) |
| 218-01 | 1/99 | 0.05 | 2.5 | 2.5 |
| 218-02 | 10/90 | 0.56 | 2.5 | 2.5 |
| 218-03 | 20/80 | 1.25 | 2.5 | 2.5 |

TABLE 218.1-continued

| the weight of S-MRP-PC, RA90/RD7 and RM | | | | |
|---|---|---|---|---|
| # | The ratio of S-MRP-PC to RA90/RD7 + RM (1:9) | Weight of S-MRP-PC solution (g) | Weight of RA90/RD7 solution (g) | Weight of RM solution (g) |
| 218-04 | 30/70 | 2.1 | 2.5 | 2.5 |
| 218-05 | 40/60 | 3.3 | 2.5 | 2.5 |
| 218-06 | 50/50 | 3.3 | 1.67 | 1.67 |
| 218-07 | 60/40 | 3.3 | 1.11 | 1.11 |
| 218-08 | 70/30 | 3.3 | 0.72 | 0.72 |
| 218-09 | 80/20 | 3.3 | 0.41 | 0.41 |
| 218-10 | 90/10 | 3.3 | 0.18 | 0.18 |
| 218-11 | 99/1 | 3.3 | 0.017 | 0.017 |

Experiments

Several mixtures of S-MRP-PC, RA90/RD7 and RM were mixed in this example. Each sample was evaluated according to the aforementioned sensory evaluation method, and the average score of the panel was taken as the evaluation result data. The taste profile of the mixture is as follows. The results are shown in Table 218.2.

TABLE 218.2

| the score in sensory evaluation | | | | | | |
|---|---|---|---|---|---|---|
| | sensory evaluation | | | | | |
| | | sweet profile | | | | |
| # | mouth-feel kokumi | sweet lingering | bitterness | metallic after-taste | score of sweet profile | overall likeability |
| 218-01 | 1 | 3 | 2 | 1 | 4.00 | 2.50 |
| 218-02 | 2 | 3 | 1 | 1 | 4.33 | 3.17 |
| 218-03 | 2 | 2 | 1 | 1 | 4.67 | 3.33 |
| 218-04 | 3 | 2 | 1 | 1 | 4.67 | 3.83 |
| 218-05 | 3 | 1 | 1 | 1 | 5.00 | 4.00 |
| 218-06 | 2 | 2 | 2 | 1 | 4.33 | 3.17 |
| 218-07 | 2 | 2 | 2 | 1 | 4.33 | 3.17 |
| 218-08 | 3 | 2 | 1 | 1 | 4.67 | 3.83 |
| 218-09 | 3 | 1 | 1 | 1 | 5.00 | 4.00 |
| 218-10 | 3 | 1 | 3 | 1 | 4.33 | 3.67 |
| 218-11 | 3 | 1 | 1 | 1 | 5.00 | 4.00 |

Data Analysis

The relationship between the sensory evaluation results to the ratio of S-MRP-PC to RA90/RD7+RM (5:5) in this example is as shown in FIG. 230.

The relationship between the overall likeability results to the ratio of S-MRP-PC to RA90/RD7+RM (5:5) in this example is as shown in FIG. 231.

Conclusion:

The results showed that S-MRPs can improve taste profile, flavor intensity and mouthfeel of high intensity natural sweeteners such as *Stevia* extract. For example, steviol glycosides comprise rebaudioside A, rebaudioside D and rebaudioside M. All ranges in tested ratios of S-MRP-PC to RA90/RD7+RM(1:9) from 1/99 to 99/1 had good taste (overall likeability score >2.5), preferably when the ratio ranges were from 10/90 to 99/1, the products will give very good taste (score >3). This example can further demonstrate that S-MRPs can improve taste profile, flavor intensity and mouthfeel of steviol glycosides.

Example 219

The Improvement of TS-MRP-CA to the Taste and Mouthfeel of RA90/RD7+RM (9:1)

Common Process:

Dissolve 1 g TS-MRP-CA into 99 g pure water to prepare a 1% TS-MRP-CA solution. Prepare 1% RA90/RD7 solution and 1% RM solution by the similar method. The solution of TS-MRP-CA, RA90/RD7 and RM were weighed and uniformly mixed according to the weight shown in Table 179.1, add pure water to make the total volume to 100 ml, and subjected to a mouthfeel evaluation test. The tasting procedure is the same as Example 39.

TABLE 219.1

| the weight of TS-MRP-CA, RA90/RD7 and RM | | | | |
|---|---|---|---|---|
| # | The ratio of TS-MRP-CA to RA90/RD7 + RM (9:1) | Weight of TS-MRP-CA solution (g) | Weight of RA90/RD7 solution (g) | Weight of RM solution (g) |
| 219-01 | 1/99 | 0.05 | 4.5 | 0.5 |
| 219-02 | 10/90 | 0.56 | 4.5 | 0.5 |
| 219-03 | 20/80 | 1.25 | 4.5 | 0.5 |
| 219-04 | 30/70 | 2.1 | 4.5 | 0.5 |
| 219-05 | 40/60 | 3.3 | 4.5 | 0.5 |
| 219-06 | 50/50 | 3.3 | 3 | 0.33 |
| 219-07 | 60/40 | 3.3 | 2 | 0.22 |
| 219-08 | 70/30 | 3.3 | 1.27 | 0.14 |
| 219-09 | 80/20 | 3.3 | 0.74 | 0.083 |
| 219-10 | 90/10 | 3.3 | 0.3 | 0.03 |
| 219-11 | 99/1 | 3.3 | 0.03 | 0.003 |

Experiments

Several mixtures of TS-MRP-CA, RA90/RD7 and RM were mixed in this example. Each sample was evaluated according to the aforementioned sensory evaluation method, and the average score of the panel was taken as the evaluation result data. The taste profile of the mixture is as follows. The results are shown in Table 219.2.

TABLE 219.2

| the score in sensory evaluation | | | | | | |
|---|---|---|---|---|---|---|
| | sensory evaluation | | | | | |
| | | sweet profile | | | | |
| # | mouth-feel kokumi | sweet lingering | bitterness | metallic after-taste | score of sweet profile | overall likeability |
| 219-01 | 1 | 3 | 2 | 1 | 4.00 | 2.50 |
| 219-02 | 2 | 3 | 1 | 1 | 4.33 | 3.17 |
| 219-03 | 2 | 2 | 1 | 1 | 4.67 | 3.33 |
| 219-04 | 2 | 2 | 1 | 1 | 4.67 | 3.33 |
| 219-05 | 2 | 2 | 1 | 1 | 4.67 | 3.33 |
| 219-06 | 2 | 2 | 1 | 1 | 4.67 | 3.33 |
| 219-07 | 3 | 2 | 1 | 1 | 4.67 | 3.83 |
| 219-08 | 3 | 2 | 1 | 1 | 4.67 | 3.83 |
| 219-09 | 3 | 1 | 1 | 1 | 5.00 | 4.00 |
| 219-10 | 3 | 1 | 1 | 1 | 5.00 | 4.00 |
| 219-11 | 3 | 1 | 1 | 1 | 5.00 | 4.00 |

Data Analysis

The relationship between the sensory evaluation results to the ratio of TS-MRP-CA to RA90/RD7+RM (9:1) in this example is as shown in FIG. 232.

The relationship between the overall likeability results to the ratio of TS-MRP-CA to RA90/RD7+RM (9:1) in this example is as shown in FIG. 233.

Conclusion:

The results showed that TS-MRPs can improve taste profile, flavor intensity and mouthfeel of high intensity natural sweeteners such as *Stevia* extract. For example, steviol glycosides comprise rebaudioside A, rebaudioside D and rebaudioside M. All ranges in tested ratios of TS-MRP-CA to RA90/RD7+RM(9:1) from 1/99 to 99/1 had good taste (overall likeability score >2.5), preferably when the ratio ranges were from 10/90 to 99/1, the products will give very good taste (score >3). This example can further demonstrate that TS-MRPs can improve taste profile, flavor intensity and mouthfeel of steviol glycosides.

Example 220

The Improvement of MRP-CA to the Taste and Mouthfeel of RA80/RB 10/RD6+RM (1:9)

Common Process:

Dissolve 1 g MRP-CA into 99 g pure water to prepare a 1% MRP-CA solution. Prepare 1% RA80/RB10/RD6 solution and 1% RM solution by the similar method. The solution of MRP-CA, RA80/RB10/RD6 and RM were weighed and uniformly mixed according to the weight shown in Table 220.1, add pure water to make the total volume to 100 ml, and subjected to a mouthfeel evaluation test. The tasting procedure is the same as Example 39.

TABLE 220.1

| the weight of MRP-CA, RA80/RB10/RD6 and RM | | | | |
|---|---|---|---|---|
| # | The ratio of MRP-CA to RA80/RB10/RD6 + RM (1:9) | Weight of MRP-CA solution (g) | Weight of RA80/RB10/RD6 solution (g) | Weight of RM solution (g) |
| 220-01 | 1/99 | 0.05 | 0.5 | 4.5 |
| 220-02 | 10/90 | 0.56 | 0.5 | 4.5 |
| 220-03 | 20/80 | 1.25 | 0.5 | 4.5 |
| 220-04 | 30/70 | 2.1 | 0.5 | 4.5 |
| 220-05 | 40/60 | 3.3 | 0.5 | 4.5 |
| 220-06 | 50/50 | 3.3 | 0.33 | 3 |
| 220-07 | 60/40 | 3.3 | 0.22 | 2 |
| 220-08 | 70/30 | 3.3 | 0.14 | 1.27 |
| 220-09 | 80/20 | 3.3 | 0.083 | 0.74 |
| 220-10 | 90/10 | 3.3 | 0.03 | 0.3 |
| 220-11 | 99/1 | 3.3 | 0.003 | 0.03 |

Experiments

Several mixtures of MRP-CA, RA80/RB10/RD6 and RM were mixed in this example. Each sample was evaluated according to the aforementioned sensory evaluation method, and the average score of the panel was taken as the evaluation result data. The taste profile of the mixture is as follows. The results are shown in Table 220.2.

TABLE 220.2

| the score in sensory evaluation | | | | | | |
|---|---|---|---|---|---|---|
| | sensory evaluation | | | | | |
| | | sweet profile | | | | |
| # | mouth-feel kokumi | sweet lingering | bitterness | metallic aftertaste | score of sweet profile | overall like-ability |
| 220-01 | 1 | 3 | 1 | 1 | 4.33 | 2.67 |
| 220-02 | 2 | 3 | 1 | 1 | 4.33 | 3.17 |
| 220-03 | 2 | 3 | 1 | 1 | 4.33 | 3.17 |
| 220-04 | 3 | 3 | 1 | 1 | 4.33 | 3.67 |
| 220-05 | 3 | 2 | 1 | 1 | 4.67 | 3.83 |
| 220-06 | 3 | 3 | 1 | 1 | 4.33 | 3.67 |
| 220-07 | 3 | 3 | 1 | 1 | 4.33 | 3.67 |
| 220-08 | 3 | 2 | 1 | 1 | 4.67 | 3.83 |
| 220-09 | 3 | 2 | 1 | 1 | 4.67 | 3.83 |
| 220-10 | 3 | 1 | 1 | 1 | 5.00 | 4.00 |
| 220-11 | 3 | 1 | 1 | 1 | 5.00 | 4.00 |

Data Analysis

The relationship between the sensory evaluation results to the ratio of MRP-CA to RA80/RB10/RD6+RM (1:9) in this example is as shown in FIG. 234.

The relationship between the overall likeability results to the ratio of MRP-CA to RA80/RB10/RD6+RM (1:9) in this example is as shown in FIG. 235.

Conclusion:

The results showed that MRPs can improve taste profile, flavor intensity and mouthfeel of high intensity natural sweeteners such as *Stevia* extract. For example, steviol glycosides comprise rebaudioside A, rehaudioside B, rebaudioside D and rehaudioside M. All ranges in tested ratios of MRP-CA to RA80/RB10/RD6+RM(1:9) from 1/99 to 99/1 had good taste (overall likeability score >2.5), preferably when the ratio ranges were from 10/90 to 99/1, the products will give very good taste (score >3). This example can further demonstrate that MRPs can improve taste profile, flavor intensity and mouthfeel of steviol glycosides.

Example 221

The Improvement of S-MRP-PC to the Taste and Mouthfeel of RA80/RB10/RD6 RM (5:5)

Common Process:

Dissolve 1 g S-MRP-PC into 99 g pure water to prepare a 1% S-MRP-PC solution. Prepare 1% RA80/RB10/RD6 solution and 1% RM solution by the similar method. The solution of S-MRP-PC, RA80/RB10/RD6 and RM were weighed and uniformly mixed according to the weight shown in Table 221.1, add pure water to make the total volume to 100 ml, and subjected to a mouthfeel evaluation test. The tasting procedure is the same as Example 39.

TABLE 221.1

| the weight of S-MRP-PC, RA80/RB10/RD6 and RM | | | | |
|---|---|---|---|---|
| # | The ratio of S-MRP-PC to RA80/RB10/RD6 + RM (5:5) | Weight of S-MRP-PC solution (g) | Weight of RA80/RB10/RD6 solution (g) | Weight of RM solution (g) |
| 221-01 | 1/99 | 0.05 | 2.5 | 2.5 |
| 221-02 | 10/90 | 0.56 | 2.5 | 2.5 |
| 221-03 | 20/80 | 1.25 | 2.5 | 2.5 |
| 221-04 | 30/70 | 2.1 | 2.5 | 2.5 |
| 221-05 | 40/60 | 3.3 | 2.5 | 2.5 |

TABLE 221.1-continued

| the weight of S-MRP-PC, RA80/RB10/RD6 and RM | | | | |
|---|---|---|---|---|
| # | The ratio of S-MRP-PC to RA80/RB10/RD6 + RM (5:5) | Weight of S-MRP-PC solution (g) | Weight of RA80/RB10/RD6 solution (g) | Weight of RM solution (g) |
| 221-06 | 50/50 | 3.3 | 1.67 | 1.67 |
| 221-07 | 60/40 | 3.3 | 1.11 | 1.11 |
| 221-08 | 70/30 | 3.3 | 0.72 | 0.72 |
| 221-09 | 80/20 | 3.3 | 0.41 | 0.41 |
| 221-10 | 90/10 | 3.3 | 0.18 | 0.18 |
| 221-11 | 99/1 | 3.3 | 0.017 | 0.017 |

Experiments

Several mixtures of S-MRP-PC, RA80/RB10/RD6 and RM were mixed in this example. Each sample was evaluated according to the aforementioned sensory evaluation method, and the average score of the panel was taken as the evaluation result data. The taste profile of the mixture is as follows. The results are shown in Table 221.2.

TABLE 221.2

| the score in sensory evaulation | | | | | | |
|---|---|---|---|---|---|---|
| | sensory evaluation | | | | | |
| | | sweet profile | | | | |
| # | mouth-feel kokumi | sweet lingering | bitterness | metallic aftertaste | score of sweet profile | overall like-ability |
| 221-01 | 1 | 3 | 1 | 1 | 4.33 | 2.67 |
| 221-02 | 1 | 3 | 1 | 1 | 4.33 | 2.67 |
| 221-03 | 2 | 3 | 1 | 1 | 4.33 | 3.17 |
| 221-04 | 3 | 2 | 1 | 1 | 4.67 | 3.83 |
| 221-05 | 3 | 3 | 1 | 1 | 4.33 | 3.67 |
| 221-06 | 2 | 3 | 1 | 1 | 4.33 | 3.17 |
| 221-07 | 2 | 2 | 1 | 1 | 4.67 | 3.33 |
| 221-08 | 3 | 2 | 1 | 1 | 4.67 | 3.83 |
| 221-09 | 3 | 1 | 1 | 1 | 5.00 | 4.00 |
| 221-10 | 3 | 1 | 1 | 1 | 5.00 | 4.00 |
| 221-11 | 3 | 1 | 1 | 1 | 5.00 | 4.00 |

Data Analysis

The relationship between the sensory evaluation results to the ratio of S-MRP-PC to RA80/RB10/RD6+RM (5:5) in this example is as shown in FIG. 236.

The relationship between the overall likeability results to the ratio of S-MRP-PC to RA80/RB10/RD6+RM (5:5) in this example is as shown in FIG. 237.

Conclusion:

The results showed that S-MRPs can improve taste profile, flavor intensity and mouthfeel of high intensity natural sweeteners such as *Stevia* extract. For example, steviol glycosides comprise rebaudioside A, rebaudioside B, rebaudioside D and rebaudioside M. All ranges in tested ratios of S-MRP-PC to RA80/RB10/RD6+RM(5:5) from 1/99 to 99/1 had good taste (overall likeability score >2.5), preferably when the ratio ranges were from 20/80 to 99/1, the products will give very good taste (score >3). This example can further demonstrate that S-MRPs can improve taste profile, flavor intensity and mouthfeel of steviol glycosides.

Example 222

The Improvement of TS-MRP-FL to the Taste and Mouthfeel of RA80/RB10/RD6+RM (9:1)

Common Process:

Dissolve 1 g TS-MRP-FL into 99 g pure water to prepare a 1% TS-MRP-FL solution. Prepare 1% RA80/RB10/RD6 solution and 1% RM solution by the similar method. The solution of TS-MRP-FL, RA80/RB10/RD6 and RM were weighed and uniformly mixed according to the weight shown in Table 222.1, add pure water to make the total volume to 100 ml, and subjected to a mouthfeel evaluation test. The tasting procedure is the same as Example 39.

TABLE 222.1

| the weight of TS-MRP-FL, RA80/RB10/RD6 and RM | | | | |
|---|---|---|---|---|
| # | The ratio of TS-MRP-FL to RA80/RB10/RD6 + RM (9:1) | Weight of TS-MRP-FL solution (g) | Weight of RA80/RB10/RD6 solution (g) | Weight of RM solution (g) |
| 222-01 | 1/99 | 0.05 | 4.5 | 0.5 |
| 222-02 | 10/90 | 0.56 | 4.5 | 0.5 |
| 222-03 | 20/80 | 1.25 | 4.5 | 0.5 |
| 222-04 | 30/70 | 2.1 | 4.5 | 0.5 |
| 222-05 | 40/60 | 3.3 | 4.5 | 0.5 |
| 222-06 | 50/50 | 3.3 | 3 | 0.33 |
| 222-07 | 60/40 | 3.3 | 2 | 0.22 |
| 222-08 | 70/30 | 3.3 | 1.27 | 0.14 |
| 222-09 | 80/20 | 3.3 | 0.74 | 0.083 |
| 222-10 | 90/10 | 3.3 | 0.3 | 0.03 |
| 222-11 | 99/1 | 3.3 | 0.03 | 0.003 |

Experiments

Several mixtures of TS-MRP-FL, RA80/RB10/RD6 and RM were mixed in this example. Each sample was evaluated according to the aforementioned sensory evaluation method, and the average score of the panel was taken as the evaluation result data. The taste profile of the mixture is as follows. The results are shown in Table 222.2.

TABLE 222.2

| the score in sensory evaluation | | | | | | |
|---|---|---|---|---|---|---|
| | sensory evaluation | | | | | |
| | | sweet profile | | | | |
| # | mouth-feel kokumi | sweet lingering | bitterness | metallic aftertaste | score of sweet profile | overall like-ability |
| 222-01 | 1 | 3 | 2 | 1 | 4.00 | 2.50 |
| 222-02 | 2 | 3 | 2 | 1 | 4.00 | 3.00 |
| 222-03 | 2 | 2 | 2 | 1 | 4.33 | 3.17 |
| 222-04 | 2 | 2 | 2 | 1 | 4.33 | 3.17 |
| 222-05 | 2 | 3 | 2 | 1 | 4.00 | 3.00 |
| 222-06 | 2 | 3 | 2 | 1 | 4.00 | 3.00 |
| 222-07 | 2 | 3 | 2 | 1 | 4.00 | 3.00 |
| 222-08 | 3 | 2 | 2 | 1 | 4.33 | 3.67 |
| 222-09 | 3 | 2 | 2 | 1 | 4.33 | 3.67 |
| 222-10 | 3 | 1 | 1 | 1 | 5.00 | 4.00 |
| 222-11 | 3 | 1 | 1 | 1 | 5.00 | 4.00 |

Data Analysis

The relationship between the sensory evaluation results to the ratio of TS-MRP-FL to RA80/RB10/RD6+RM (9:1) in this example is as shown in FIG. 238.

The relationship between the overall likeability results to the ratio of TS-MRP-FL to RA80/RB10/RD6+RM (9:1) in this example is as shown in FIG. 239.

Conclusion:

The results showed that TS-MM's can improve taste profile, flavor intensity and mouthfeel of high intensity natural sweeteners such as *Stevia* extract. For example, steviol glycosides comprise rebaudioside A, rehaudioside B, rebaudioside D and rehaudioside M. All ranges in tested ratios of TS-MRP-FL to RA80/RB10/RD6+RM(9:1) from 1/99 to 99/1 had good taste (overall likeability score >2.5), preferably when the ratio ranges were from 10/90 to 99/1, the products will give very good taste (score >3). This example can further demonstrate that TS-MRPs can improve taste profile, flavor intensity and mouthfeel of steviol glycosides.

Example 223

Preparation of Glycosylated Steviol Glycosides (GSG)

Common Process:

40 g Tapioca dextrin was dissolved in 400 ml water;

40 g *Stevia* extract was added to liquefied dextrin to obtain a mixture;

2 ml CGTase enzyme (available from Amano Enzyme, Inc.) was added to the mixture and incubated at 75° C. for 24 hours to glycosylate steviol glycosides with glucose molecules derived from Tapioca dextrin.

After desired ratio of GSG and residual steviol glycoside contents achieved, the reaction mixture was heated to 95° C. for 30 min to inactivate the CGTase, which is then removed by filter.

The resulting solution of GSG, residual steviol glycosides and dextrin is decolored by activate carbon and spray dried. Thus yield white powder GSG.

The details about the GSG products and their materials are as followed.

TABLE 223.1

| | Material | | | |
|---|---|---|---|---|
| Product | Material | Source of material | Lot # | Specification |
| GSG-RA50 | RA50 | Sweet Green Fields | 20150705 | RA 53.95% |
| GSG-RA80 | RA80 | Sweet Green Fields | 3060365 | RA 84.10% |

TABLE 223.1-continued

| | Material | | | |
|---|---|---|---|---|
| Product | Material | Source of material | Lot # | Specification |
| GSG-RA95 | RA95 | Sweet Green Fields | 3040018 | RA 95.1% |

Example 224

Preparation of S-MRP-Ft from GSG-RA50

80 g GSG-RA50 (the product of EX. 223) is dissolved together with 6.7 g phenylalanine and 13.3 g xylose in 50 ml deionized water. Then stir the mixture and heat it at about 95-100 degrees centigrade for about 2 hours. When the reaction completes, the solution is dried by spray dryer. Thus obtain about 93 g of the light brown powder S-MRP-GRA50-FL.

Example 225

Preparation of S-MRP-CA from GSG-RA80

60 g GSG-RA80 (the product of EX. 223) is dissolved together with 10 g alanine and 30 g xylose in 50 ml deionized water. Then stir the mixture and heat it at about 95-100 degrees centigrade for about 2 hours. When the reaction completes, the solution is dried by spray dryer. Thus obtain about 95.5 g of the brown powder S-MRP-GRA80-CA.

Example 226

Preparation of S-MRP-PC from GSG-RA95

35 g GSG-RA95 (the product of EX. 223), 10 g mannose and 5 g proline were mixed. The ratio of mannose to proline was 2:1 and the ratio of *Stevia* extract to the mixture of mannose and proline is 7:3. Thus obtained mixture was dissolved into 25 g pure water. No need to add any pH regulator and let the pH like what it really is. Then heat the solution at about 100 degrees centigrade for 3 hours. When the reaction completes, filter the reaction mixture by filter paper and the filtrate was dried by spray dryer. Thus obtain about 42 g of off white powder S-MRP-GRA95-PC.

Examples 227-232

The Improvement of S-MRP and TS-MRP Derived from GSG to the Taste and Mouthfeel of Sweetener The sources of the sweeteners, S-MRP and TS-MRP samples used in the following Examples are as follows.

TABLE 227-232

| sample | source | Lot # | specification |
|---|---|---|---|
| RA99 | Sweet Green Fields | 140-24-01 | RA 99.94% |
| RD, rebaudioside D | Sichuan Ingia Biosynthetic Co,. ltd, China | 20180914 | RD 94.39% |
| RM, rebaudioside M | Sichuan Ingia Biosynthetic Co,. ltd, China | 20180915 | RM 93.03%, RD 3.67% |
| Monk fruit extract, mogroside V50 | Hunan Huacheng Biotech, Inc., China | LHGE-180722 | Mogroside V 50.65% |
| Sucralose | Anhui JinHe IndustrialCO., Ltd, China | 201804023 | 99.72% |
| Aspartame | | | |
| Acesulfame Potassium | Anhui JinHe IndustrialCO., Ltd, China | | |

TABLE 227-232-continued

| sample | source | Lot # | specification |
|---|---|---|---|
| S-MRP-GRA50-FL | The product of Example 224 | | |
| S-MRP-GRA80-CA | The product of Example 225 | | |
| S-MRP-GRA95-PC | The product of Example 226 | | |
| thaumatin | The product of EPC Natural Products Co., Ltd, China | 20180801 | thaumatin 10.74% |
| TS-MRP-GRA50-FL | the mixture of above S-MRP-GRA50-FL and thaumatin with the weight ratio of 10:1 | | |
| TS-MRP-GRA80-CA | the mixture of above S-MRP-GRA80-CA and thaumatin with the weight ratio of 10:1 | | |
| TS-MRP-GRA95-PC | the mixture of above S-MRP-GRA95-PC and thaumatin with the weight ratio of 10:1 | | |

Example 227

The Improvement of S-MRP-GRA50-FL to the Taste and Mouthfeel of RA99

Common Process:

Dissolve 1 g S-MRP-GRA50-FL into 99 g pure water to prepare a 1% S-MRP-GRA50-FL solution. Prepare 1% RA99 solution by the similar method. The solution of S-MRP-GRA50-FL and RA99 were weighed and uniformly mixed according to the weight shown in Table 227.1, add pure water to make the total volume to 100 ml, and subjected to a mouthfeel evaluation test. The tasting procedure is the same as Example 39.

TABLE 227.1

| the weight of S-MRP-GRA50-FL and RA99 | | | |
|---|---|---|---|
| # | The ratio of S-MRP-GRA50-FL to RA99 | Weight of S-MRP-GRA50-FL solution (g) | Weight of RA99 solution (g) |
| 227-01 | 1/99 | 0.05 | 5 |
| 227-02 | 5/95 | 0.26 | 5 |
| 227-03 | 10/90 | 0.56 | 5 |
| 227-04 | 30/70 | 2.1 | 5 |
| 227-05 | 50/50 | 5 | 5 |
| 227-06 | 80/20 | 5 | 1.25 |
| 227-07 | 90/10 | 5 | 0.56 |
| 227-08 | 99/1 | 5 | 0.05 |

Experiments

Several mixtures of S-MRP-GRA50-FL and RA99 were mixed in this example. Each sample was evaluated according to the aforementioned sensory evaluation method, and the average score of the panel was taken as the evaluation result data. The taste profile of the mixture is as follows. The results are shown in Table 227.2.

TABLE 227.2

| the score in sensory evaluation | | | | | | |
|---|---|---|---|---|---|---|
| | sensory evaluation | | | | | |
| | | sweet profile | | | | |
| # | mouth-feel kokumi | sweet lingering | bitterness | metallic aftertaste | score of sweet profile | overall like-ability |
| 227-01 | 1.5 | 3 | 2.5 | 3.5 | 3.00 | 2.25 |
| 227-02 | 1.5 | 3 | 2.5 | 3 | 3.17 | 2.33 |
| 227-03 | 2 | 3 | 2 | 3 | 3.33 | 2.67 |
| 227-04 | 2 | 3 | 1.5 | 2.5 | 3.67 | 2.83 |
| 227-05 | 2.5 | 3.5 | 1.5 | 2.5 | 3.50 | 3.00 |
| 227-06 | 2.5 | 3 | 1 | 2 | 4.00 | 3.25 |
| 227-07 | 2.5 | 2.5 | 1 | 1.5 | 4.33 | 3.42 |
| 227-08 | 2.5 | 2 | 1 | 1.5 | 4.50 | 3.50 |

Data Analysis

The relationship between the sensory evaluation results to the ratio of S-MRP-GRA50-FL to RA99 in this example is as shown in FIG. 240.

The relationship between the overall likeability results to the ratio of S-MRP-GRA50-FL to RA99 in this example is as shown in FIG. 241.

Conclusion:

The results showed that S-MRPs derived from GSG can improve taste profile, flavor intensity and mouthfeel of high intensity natural sweeteners such as *Stevia* extract. For example, steviol glycosides comprise rebaudioside A. All ranges in tested ratios of S-MRP-GRA50-FL to RA99 from 1/99 to 99/1 had good taste (overall likeability score >2), preferably when the ratio ranges were from 10/90 to 99/1, the products will give very good taste (score >2.5), more preferably when the ratio ranges were from 50/50 to 99/1, the products will give excellent taste (score >3.0). This example can further demonstrate that S-MRPs derived from GSG can improve taste profile, flavor intensity and mouthfeel of steviol glycosides.

Example 228

The Improvement of S-MRP-GRA80-CA to the Taste and Mouthfeel of RD+RM (1:3)

Common Process:

Dissolve 1 g S-MRP-GRA80-CA into 99 g pure water to prepare a 1% S-MRP-GRA80-CA solution. Prepare 1% RD solution and 1% RM solution by the similar method. The solution of S-MRP-GRA80-CA, RD and RM were weighed and uniformly mixed according to the weight shown in Table 228.1, add. pure water to make the total volume to 100 ml, and subjected to a mouthfeel evaluation test. The tasting procedure is the same as Example 39.

TABLE 228.1

| the weight of S-MRP-GRA80-CA RD and RM | | | | |
|---|---|---|---|---|
| # | The ratio of S-MRP-GRA80-CA to RD + RM (1:3) | Weight of S-MRP-GRA80-CA solution (g) | Weight of RD solution (g) | Weight of RM solution (g) |
| 228-01 | 1/99 | 0.05 | 1.25 | 3.75 |
| 228-02 | 5/95 | 0.26 | 1.25 | 3.75 |
| 228-03 | 10/90 | 0.56 | 1.25 | 3.75 |
| 228-04 | 30/70 | 2.1 | 1.25 | 3.75 |
| 228-05 | 50/50 | 5 | 1.25 | 3.75 |
| 228-06 | 80/20 | 5 | 0.31 | 0.94 |
| 228-07 | 90/10 | 5 | 0.14 | 0.42 |
| 228-08 | 99/1 | 5 | 0.013 | 0.038 |

Experiments

Several mixtures of S-MRP-GRA80-CA and RD+RM (1:3) were mixed in this example. Each sample was evaluated according to the aforementioned sensory evaluation method, and the average score of the panel was taken as the evaluation result data. The taste profile of the mixture is as follows. The results are shown in Table 228.2.

TABLE 228.2

| the score in sensory evaluation | | | | | | |
|---|---|---|---|---|---|---|
| | sensory evaluation | | | | | |
| | | sweet profile | | | | |
| # | mouth-feel kokumi | sweet lingering | bitterness | metallic aftertaste | score of sweet profile | overall like-ability |
| 228-01 | 2 | 3.5 | 1.5 | 1.5 | 3.83 | 2.92 |
| 228-02 | 2 | 3 | 1.5 | 1.5 | 4.00 | 3.00 |
| 228-03 | 2 | 2.5 | 1.5 | 1.5 | 4.17 | 3.08 |
| 228-04 | 2 | 2 | 1 | 1 | 4.67 | 3.33 |
| 228-05 | 2 | 2 | 1 | 1 | 4.67 | 3.33 |
| 228-06 | 2 | 2.5 | 1 | 1 | 4.50 | 3.25 |
| 228-07 | 2.5 | 2.5 | 1 | 1 | 4.50 | 3.50 |
| 228-08 | 2.5 | 3 | 1 | 1 | 4.33 | 3.42 |

Data Analysis

The relationship between the sensory evaluation results to the ratio of S-MRP-GRA80-CA to RD+RM (1:3) in this example is as shown in FIG. 242.

The relationship between the overall likeability results to the ratio of S-MRP-GRA80-CA to RD+RM (1:3) in this example is as shown in FIG. 243, Conclusion:

The results showed that S-MRPs derived from GSG can improve taste profile, flavor intensity and mouthfeel of high intensity natural sweeteners such as *Stevia* extract. For example, steviol glycosides comprise rehaudioside and rebaudioside M. All ranges in tested ratios of S-MRP-GRA80-CA to RD+RM (1:3) from 1/99 to 99/1 had good taste (overall likeability score >2.5), preferably when the ratio ranges were from 5/95 to 99/1, the products will give very good taste (score >3). This example can further demonstrate that S-MRPs derived from GSG can improve taste profile, flavor intensity and mouthfeel of steviol glycosides, Example 229

The Improvement of S-MRP-GRA95-PC to the Taste and Mouthfeel of Mogroside V50

Common Process:

Dissolve 1 g S-MRP-GRA95-PC into 99 g pure water to prepare a 1% S-MRP-GRA95-PC solution. Prepare 1% mogroside V50 solution by the similar method. The solution of S-MRP-GRA95-PC and mogroside V50 were weighed and uniformly mixed according to the weight shown in Table 229.1, add pure water to make the total volume to 1.00 ml, and subjected to a mouthfeel evaluation test. The tasting procedure is the same as Example 39.

TABLE 229.1

| the weight of S-MRP-GRA95-PC and mogroside V50 | | | |
|---|---|---|---|
| # | The ratio of S-MRP-GRA95-PC to MOGROSIDE V50 | Weight of S-MRP-GRA95-PC solution (g) | Weight of MOGROSIDE V50 solution (g) |
| 229-01 | 1/99 | 0.05 | 5 |
| 229-02 | 5/95 | 0.26 | 5 |
| 229-03 | 10/90 | 0.56 | 5 |
| 229-04 | 30/70 | 2.1 | 5 |
| 229-05 | 50/50 | 5 | 5 |
| 229-06 | 80/20 | 5 | 1.25 |
| 229-07 | 90/10 | 5 | 0.56 |
| 229-08 | 99/1 | 5 | 0.05 |

Experiments

Several mixtures of S-MRP-GRA95-PC and mogroside V50 were mixed in this example. Each sample was evaluated according to the aforementioned sensory evaluation method, and the average score of the panel was taken as the evaluation result data. The taste profile of the mixture is as follows. The results are shown in Table 229.2.

TABLE 229.2

| the score in sensory evaluation | | | | | | |
|---|---|---|---|---|---|---|
| | sensory evaluation | | | | | |
| | | sweet profile | | | | |
| # | mouth-feel kokumi | sweet lingering | bitterness | metallic aftertaste | score of sweet profile | overall like-ability |
| 229-01 | 1 | 3.5 | 1.5 | 3.5 | 3.17 | 2.08 |
| 229-02 | 1 | 3.5 | 1.5 | 3.5 | 3.17 | 2.08 |
| 229-03 | 1 | 3 | 1.5 | 3 | 3.50 | 2.25 |
| 229-04 | 1.5 | 3 | 1 | 2.5 | 3.83 | 2.67 |
| 229-05 | 2 | 2.5 | 1 | 2.5 | 4.00 | 3.00 |
| 229-06 | 2.5 | 2.5 | 1 | 2 | 4.17 | 3.33 |
| 229-07 | 2.5 | 2.5 | 1.5 | 1.5 | 4.17 | 3.33 |
| 229-08 | 2.5 | 2 | 1.5 | 1.5 | 4.33 | 3.42 |

Data Analysis

The relationship between the sensory evaluation results to the ratio of S-MRP-GRA95-PC to mogroside V50 in this example is as shown in FIG. 244.

The relationship between the overall likeability results to the ratio of S-MRP-GRA95-PC to mogroside V50 in this example is as shown in FIG. 245.

Conclusion:

The results showed that S-MRPs derived from GSG can improve taste profile, flavor intensity and mouthfeel of high intensity natural sweeteners such as monk fruit concentrate or extract. All ranges in tested ratios of S-MRP-GRA95-PC to mogroside V50 from 1/99 to 99/1 had good taste (overall likeability score >2), preferably when the ratio ranges were from 30/70 to 99/1, the products will give very good taste (score >3), This example can further demonstrate that S-MRPs derived from GSG can improve taste profile, flavor intensity and mouthfeel of monk fruit concentrate or extract.

Example 230

The Improvement of TS-MRP-GRA50-FL to the Taste and Mouthfeel of Aspartame

Common Process:

Dissolve 1 g TS-MRP-GRA50-FL into 99 g pure water to prepare a 1% TS-MRP-GRA50-FL solution. Prepare 1% aspartame solution by the similar method. The solution of TS-MRP-GRA50-FL and aspartame were weighed and uniformly mixed according to the weight shown in Table 230.1, add pure water to make the total volume to 100 ml, and subjected to a mouthfeel evaluation test. The tasting procedure is the same as Example 39.

TABLE 230.1 the weight of TS-MRP-GRA50-FL and aspartame

| # | The ratio of TS-MRP-GRA50-FL to ASPARTAME | Weight of TS-MRP-GRA50-FL solution (g) | Weight of ASPARTAME solution (g) |
|---|---|---|---|
| 230-01 | 1/99 | 0.05 | 5 |
| 230-02 | 5/95 | 0.26 | 5 |
| 230-03 | 10/90 | 0.56 | 5 |
| 230-04 | 30/70 | 2.1 | 5 |
| 230-05 | 50/50 | 5 | 5 |
| 230-06 | 80/20 | 5 | 1.25 |
| 230-07 | 90/10 | 5 | 0.56 |
| 230-08 | 99/1 | 5 | 0.05 |

Experiments

Several mixtures of TS-MRP-GRA50-FL and aspartame were mixed in this example. Each sample was evaluated according to the aforementioned sensory evaluation method, and the average score of the panel was taken as the evaluation result data. The taste profile of the mixture is as follows. The results are shown in Table 230.2.

TABLE 230.2 the score in sensory evaluation

| # | sensory evaluation | | | | | |
|---|---|---|---|---|---|---|
| | | sweet profile | | | | |
| | mouth-feel kokumi | sweet lingering | bitterness | metallic aftertaste | score of sweet profile | overall like-ability |
| 230-01 | 1 | 2.5 | 0.5 | 2 | 4.33 | 2.67 |
| 230-02 | 1 | 2 | 0.5 | 2 | 4.50 | 2.75 |
| 230-03 | 1.5 | 2 | 0.5 | 2 | 4.50 | 3.00 |
| 230-04 | 1.5 | 2 | 0.5 | 2 | 4.50 | 3.00 |
| 230-05 | 1.5 | 2.5 | 0.5 | 1.5 | 4.50 | 3.00 |
| 230-06 | 1.5 | 2.5 | 1 | 1 | 4.50 | 3.00 |
| 230-07 | 2 | 3 | 1 | 1 | 4.33 | 3.17 |
| 230-08 | 2 | 3 | 1 | 1 | 4.33 | 3.17 |

Data Analysis

The relationship between the sensory evaluation results to the ratio of TS-MRP-GRA50-FL to aspartame in this example is as shown in FIG. 246.

The relationship between the overall likeability results to the ratio of TS-MRP-GRA50-FL to aspartame in this example is as shown in FIG. 247.

Conclusion:

The results showed that TS-MRPs derived from GSG can improve taste profile, flavor intensity and mouthfeel of high intensity synthetic or artificial sweeteners such as aspartame. All ranges in tested ratios of TS-MRP-GRA50-FL to aspartame from 1/99 to 99/1 had good taste (overall likeability score >2.5), preferably when the ratio ranges were from 10/90 to 99/1, the products will give very good taste (score >3).

Example 231

The Improvement of TS-MRP-GRA80-CA to the Taste and Mouthfeel of Sucralose

Common Process:

Dissolve 1 g TS-MRP-GRA80-CA into 99 g pure water to prepare a 1% TS-MRP-GRA80-CA solution. Prepare 1% sucralose solution by the similar method. The solution of TS-MRP-GRA80-CA and sucralose were weighed and uniformly mixed according to the weight shown in Table 231.1, add pure water to make the total volume to 100 ml, and subjected to a mouthfeel evaluation test. The tasting procedure is the same as Example 39.

TABLE 231.1 the weight of TS-MRP-GRA80-CA and sucralose

| # | The ratio of TS-MRP-GRA80-CA to SUCRALOSE | Weight of TS-MRP-GRA80-CA solution (g) | Weight of SUCRALOSE solution (g) |
|---|---|---|---|
| 231-01 | 1/99 | 0.05 | 5 |
| 231-02 | 5/95 | 0.26 | 5 |
| 231-03 | 10/90 | 0.56 | 5 |
| 231-04 | 30/70 | 2.1 | 5 |
| 231-05 | 50/50 | 5 | 5 |
| 231-06 | 80/20 | 5 | 1.25 |
| 231-07 | 90/10 | 5 | 0.56 |
| 231-08 | 99/1 | 5 | 0.05 |

Experiments

Several mixtures of TS-MRP-GRA80-CA and sucralose were mixed in this example. Each sample was evaluated according to the aforementioned sensory evaluation method, and the average score of the panel was taken as the evaluation result data. The taste profile of the mixture is as follows. The results are shown in Table 231.2.

TABLE 231.2 the score in sensory evaluation

| # | sensory evaluation | | | | | |
|---|---|---|---|---|---|---|
| | | sweet profile | | | | |
| | mouth-feel kokumi | sweet lingering | bitterness | metallic aftertaste | score of sweet profile | overall like-ability |
| 231-01 | 1 | 3 | 1 | 2.5 | 3.83 | 2.42 |
| 231-02 | 1 | 3 | 1 | 2.5 | 3.83 | 2.42 |
| 231-03 | 1 | 2.5 | 1 | 2 | 4.17 | 2.58 |
| 231-04 | 1 | 2.5 | 1 | 2 | 4.17 | 2.58 |
| 231-05 | 1.5 | 2.5 | 1 | 2 | 4.17 | 2.83 |

TABLE 231.2-continued

| the score in sensory evaluation | | | | | | |
|---|---|---|---|---|---|---|
| | sensory evaluation | | | | | |
| | | sweet profile | | | | |
| # | mouth-feel kokumi | sweet lingering | bitterness | metallic aftertaste | score of sweet profile | overall like-ability |
| 231-06 | 1.5 | 2 | 0.5 | 1.5 | 4.67 | 3.08 |
| 231-07 | 1.5 | 1.5 | 0.5 | 1 | 5.00 | 3.25 |
| 231-08 | 1.5 | 1.5 | 0.5 | 1 | 5.00 | 3.25 |

Data Analysis

The relationship between the sensory evaluation results to the ratio of TS-MRP-GRA80-CA to sucralose in this example is as shown in FIG. 248.

The relationship between the overall likeability results to the ratio of TS-MRP-GRA80-CA to sucralose in this example is as shown in FIG. 249.

Conclusion:

The results showed that TS-MRPs derived from GSG can improve taste profile, flavor intensity and mouthfeel of high intensity synthetic or artificial sweeteners such as sucralose. All ranges in tested ratios of TS-MRP-GRA80-CA to sucralose from 1/99 to 99/1 had good taste (overall likeability score >2), preferably when the ratio ranges were from 10/90 to 99/1, the products will give very good taste (score >2.5).

Example 232

The Improvement of TS-MRP-GRA95-PC to the Taste and Mouthfeel of Acesulfame Potassium Common Process:

Dissolve 1 g TS-MRP-GRA95-PC into 99 g pure water to prepare a 1% TS-MRP-GRA95-PC solution. Prepare 1% acesulfame potassium solution by the similar method. The solution of TS-MRP-GRA95-PC and Acesulfame potassium were weighed and uniformly mixed according to the weight shown in Table 232.1, add pure water to make the total volume to 100 ml, and subjected to a mouthfeel evaluation test. The tasting procedure is the same as Example 39.

TABLE 232.1

| the weight of TS-MRP-GRA95-PC and Acesulfame potassium | | | |
|---|---|---|---|
| # | The ratio of TS-MRP-GRA95-PC to ACESULFAME POTASSIUM | Weight of TS-MRP-GRA95-PC solution (g) | Weight of ACESULFAME POTASSIUM solution (g) |
| 232-01 | 1/99 | 0.05 | 5 |
| 232-02 | 5/95 | 0.26 | 5 |
| 232-03 | 10/90 | 0.56 | 5 |
| 232-04 | 30/70 | 2.1 | 5 |
| 232-05 | 50/50 | 5 | 5 |
| 232-06 | 80/20 | 5 | 1.25 |
| 232-07 | 90/10 | 5 | 0.56 |
| 232-08 | 99/1 | 5 | 0.05 |

Experiments

Several mixtures of TS-MRP-GRA95-PC and Acesulfame potassium were mixed in this example. Each sample was evaluated according to the aforementioned sensory evaluation method, and the average score of the panel was taken as the evaluation result data. The taste profile of the mixture is as follows. The results are shown in Table 232.2.

TABLE 232.2

| the score in sensory evaluation | | | | | | |
|---|---|---|---|---|---|---|
| | sensory evaluation | | | | | |
| | | sweet profile | | | | |
| # | mouthfeel kokumi | sweet lingering | bitterness | metallic aftertaste | score of sweet profile | overall likeability |
| 232-01 | 1 | 3 | 1 | 2.5 | 3.83 | 2.42 |
| 232-02 | 1 | 3 | 1 | 2.5 | 3.83 | 2.42 |
| 232-03 | 1 | 2.5 | 1 | 2 | 4.17 | 2.58 |
| 232-04 | 1 | 2.5 | 1 | 2 | 4.17 | 2.58 |
| 232-05 | 1.5 | 2.5 | 1 | 2 | 4.17 | 2.83 |
| 232-06 | 1.5 | 2 | 0.5 | 1.5 | 4.67 | 3.08 |
| 232-07 | 1.5 | 1.5 | 0.5 | 1 | 5.00 | 3.25 |
| 232-08 | 1.5 | 1.5 | 0.5 | 1 | 5.00 | 3.25 |

Data Analysis

The relationship between the sensory evaluation results to the ratio of TS-MRP-GRA95-PC to Acesulfame potassium in this example is as shown in FIG. 250.

The relationship between the overall likeability results to the ratio of TS-MRP-GRA95-PC to Acesulfame potassium in this example is as shown in FIG. 251.

Conclusion:

The results showed that TS-MRPs derived from GSG can improve taste profile, flavor intensity and mouthfeel of high intensity synthetic or artificial sweeteners such as Acesulfame potassium. All ranges in tested ratios of TS-MRP-GRA95-PC to Acesulfame potassium from 1/99 to 99/1 had good taste (overall likeability score >2), preferably when the ratio ranges were from 10/90 to 99/1, the products will give very good taste (score >2.5).

Example 233

Separate the Volatile and Non-Volatile Substances of MRP

TABLE 233.1

| Materials | | | |
|---|---|---|---|
| sample | source | Lot # | specification |
| MRP-FL | The product of Example 96 | | |
| MRP-CA | The product of Example 97 | | |

Common Process 1) 1 g MRP was dissolved in 3 L pure water.

2) The solution was evaporated at 60° C. and a vacuum of 0.02 MPa.

3) After evaporating about 1.5 L water, add 1.5 L pure water to the solution and continue evaporation.

4) Repeat the stage 3) till the smell of the solution is no longer noticeable.

5) Evaporate the solution till the volume was less than 200 ml.

6) The concentrated solution was freeze-dried to obtain powder sample.

7) According to the common process, 1 g MRP-FL and 1 g MRP-CA were treated, respectively. Thus obtain the non-volatile substances of MRP-FL and MRP-CA, which can be named NVS-MRP-FL and NVS-MRP-CA, respectively.

Example 234

The Mouthfeel Improve Effect of NVS-MRP to *Stevia* Extract

Common Process:

NVS-MRP-FL and RM were weighed and uniformly mixed according to the weight shown in Table 234.1. The mixed powder was weighed in the amount shown in Table 234.1, dissolved in 100 ml of pure water, and subjected to a mouthfeel evaluation test. The tasting procedure is the same as Example 39.

TABLE 234.1

| the weight of NVS-MRP-FL and RM | | | |
|---|---|---|---|
| # | The ratio of NVS-MRP-FL to RM | Weight of NVS-MRP-FL (mg) | Weight of RM (mg) |
| 234-01 | 1/100 | 0.5 | 50 |
| 234-02 | 1/10 | 5 | 50 |
| 234-03 | 3/10 | 15 | 50 |
| 234-04 | 5/10 | 25 | 50 |
| 234-05 | 7/10 | 35 | 50 |
| 234-06 | 9/10 | 45 | 50 |
| 234-07 | 10/10 | 50 | 50 |
| 234-08 | 10/9 | 50 | 45 |
| 234-09 | 10/7 | 50 | 35 |
| 234-10 | 10/5 | 50 | 25 |
| 234-11 | 10/3 | 50 | 15 |
| 234-12 | 10/1 | 50 | 5 |
| 234-13 | 100/1 | 50 | 0.5 |

Experiments

Several mixtures of NVS-MRP-FL and RM were mixed in this example. Each sample was evaluated according to the aforementioned sensory evaluation method, and the average score of the panel was taken as the evaluation result. The taste profile of the mixture is as follows. The results are shown in Table 234.2.

TABLE 234.2

| the score in sensory evaluation | | | | | | |
|---|---|---|---|---|---|---|
| | sensory evaluation | | | | | |
| | | sweet profile | | | | |
| # | mouthfeel kokumi | sweet lingering | bitterness | metallic aftertaste | score of sweet profile | overall likeability |
| 234-01 | 2 | 3 | 1 | 1 | 4.33 | 3.17 |
| 234-02 | 3 | 2 | 1 | 1 | 4.00 | 3.50 |
| 234-03 | 4 | 2 | 1 | 1 | 4.00 | 4.00 |
| 234-04 | 4 | 2 | 1 | 1 | 4.00 | 4.00 |
| 234-05 | 5 | 1 | 1 | 1 | 3.67 | 4.33 |
| 234-06 | 5 | 1 | 1 | 1 | 3.67 | 4.33 |
| 234-07 | 5 | 1 | 1 | 1 | 3.67 | 4.33 |
| 234-08 | 5 | 1 | 1 | 1 | 3.67 | 4.33 |
| 234-09 | 5 | 1 | 1 | 1 | 3.67 | 4.33 |
| 234-10 | 5 | 1 | 1 | 1 | 3.67 | 4.33 |
| 234-11 | 5 | 1 | 1 | 1 | 3.67 | 4.33 |
| 234-12 | 5 | 1 | 1.5 | 1 | 3.50 | 4.25 |
| 234-13 | 5 | 1 | 2 | 1 | 3.33 | 4.17 |

Data Analysis

The relationship between the sensory evaluation results to the ratio of NVS-MRP-FL to RM in this example is as shown in FIG. 252.

The relationship between the overall iikeability results to the ratio of NVS-MRP-FL to RM in this example is as shown in FIG. 253.

Conclusion:

The results showed that NVS-MRPs can significantly improve taste profile and mouthfeel of high intensity natural sweeteners or sweetening agents such as *Stevia* extract although there is little volatile substance or odorous substance in it. For example, steviol glycosides comprise rebaudioside M. All ranges in tested ratios of NVS-MRP-FL to RM from 1/100 to 100/1 had good taste (overall likeability score >3), preferably when the ratio ranges were from 3/10 to 100/1, the products gave very good taste (score >4). This example demonstrates that NVS-MRPs can improve taste profile and mouthfeel of steviol glycosides.

Example 235

The Mouthfeel Improve Effect of NVS-MRP to Sucralose

Common Process:

NVS-MRP-CA and Sucralose were weighed and uniformly mixed according to the weight shown in Table 235.1, The mixed powder was weighed in the amount shown in Table 235.1, dissolved in 100 ml of pure water, and subjected to a mouthfeel evaluation test. The tasting procedure is the same as Example 39.

TABLE 235.1

| the weight of NVS-MRP-CA and sucralose | | | |
|---|---|---|---|
| # | The ratio of NVS-MRP-CA to sucralose | Weight of NVS-MRP-CA (mg) | Weight of sucralose (mg) |
| 235-01 | 1/100 | 0.5 | 50 |
| 235-02 | 1/10 | 5 | 50 |
| 235-03 | 3/10 | 15 | 50 |
| 235-04 | 5/10 | 25 | 50 |
| 235-05 | 7/10 | 35 | 50 |
| 235-06 | 9/10 | 45 | 50 |
| 235-07 | 10/10 | 50 | 50 |
| 235-08 | 10/9 | 50 | 45 |
| 235-09 | 10/7 | 50 | 35 |
| 235-10 | 10/5 | 50 | 25 |
| 235-11 | 10/3 | 50 | 15 |
| 235-12 | 10/1 | 50 | 5 |
| 235-13 | 100/1 | 50 | 0.5 |

Experiments

Several mixtures of NVS-MRP-CA and sucralose were mixed in this example. Each sample was evaluated according to the aforementioned sensory evaluation method, and the average score of the panel was taken as the evaluation result. The taste profile of the mixture is as follows. The results are shown in Table 235.2.

TABLE 235.2

| the score in sensory evaluation | | | | | | |
|---|---|---|---|---|---|---|
| | sensory evaluation | | | | | |
| | | sweet profile | | | | |
| # | mouthfeel kokumi | sweet lingering | bitterness | metallic aftertaste | score of sweet profile | overall likeability |
| 235-01 | 1 | 3 | 1 | 2 | 4.00 | 2.50 |
| 235-02 | 3 | 2 | 1 | 1 | 4.00 | 3.50 |
| 235-03 | 4 | 2 | 1 | 1 | 4.00 | 4.00 |
| 235-04 | 4 | 2 | 1 | 1 | 4.00 | 4.00 |
| 235-05 | 4 | 2 | 1 | 1 | 4.00 | 4.00 |
| 235-06 | 5 | 2 | 1 | 1 | 4.00 | 4.50 |
| 235-07 | 5 | 2 | 1 | 1 | 4.00 | 4.50 |
| 235-08 | 5 | 2 | 1 | 1 | 4.00 | 4.50 |
| 235-09 | 5 | 1 | 1 | 1 | 3.67 | 4.33 |
| 235-10 | 5 | 1 | 1 | 1 | 3.67 | 4.33 |
| 235-11 | 5 | 1 | 1 | 1 | 3.67 | 4.33 |
| 235-12 | 5 | 1 | 1 | 1 | 3.67 | 4.33 |
| 235-13 | 5 | 1 | 1 | 1 | 3.67 | 4.33 |

Data Analysis

The relationship between the sensory evaluation results to the ratio of WS-MRP-CA to sucralose in this example is as shown in FIG. 254.

The relationship between the overall likeability results to the ratio of WS-MRP-CA to sucralose in this example is as shown in FIG. 255.

Conclusion:

The results showed that NVS-MRPs can significantly improve taste profile and mouthfeel of high intensity artificial sweeteners or sweetening agents such as sucralose although there is little volatile substance or odorous substance in it. All ranges in tested ratios of MIS-MRP-CA to sucralose from 1/100 to 100/1 had good taste (overall likeability score >2.5), preferably when the ratio ranges were from 3/10 to 100/1, the products gave very good taste (score >4). This example demonstrates that NVS-MRPs can improve taste profile and mouthfeel of sucralose.

Example 236

The Effect of Reaction Temperature to the Scent of S-MRP-FL

In this example, the reaction of phenylalanine, xylose and *Stevia* extract was added in the process. The reaction conditions were as follow.

*Stevia* extract: GSG-RA20, available from Sweet Green Fields.

Weight ratio of xylose to phenylalanine: 2:1;

Weight ratio of *Stevia* extract to the blend of xylose and phenylalanine: 80:20;

The total weight of *Stevia* extract, xylose and phenylalanine: 5 g; noted as following table.

TABLE 236.1

| Weight ratio of *Stevia* extract to the blend of reducing sugar and amino acid | GSG-RA20 | xylose | phenylalanine |
|---|---|---|---|
| 80:20 | 4 g | 0.67 g | 0.33 g |

Propylene glycol: 2.5 g

Temperature: 100° C., 120° C., 140° C., 160° C., 180° C.;

Duration: 1 hours;

pH regulation: no pH regulator added.

The odor of all the resultant mixtures after reaction completion were evaluated by a panel of 4 trained persons. For evaluation of the odor, the samples were tested by a panel of four people. The panel smelled the reaction mixture, discussed and then gave a description that all testers could accept.

TABLE 236.2

| Scent evaluation of the reaction mixture | | |
|---|---|---|
| # | Reaction temperature | Description of the odor |
| 236-1 | 100° C. | Floral |
| 236-2 | 120° C. | Floral |
| 236-3 | 140° C. | Floral |
| 236-4 | 160° C. | Floral |
| 236-5 | 180° C. | Burnt and slight floral |

Conclusion:

All S-MRPs produced by the reaction in different temperature can act as flavor, flavor enhancers, mouthfeel modifiers or as sweeteners with floral flavor. Preferably when the reaction temperature is ranged from 100° C. to 160° C., the floral flavor is more intensive, Example 237

The Effect of Reaction Temperature to the Scent of S-MRP-CA

In this example, the reaction of alanine, xylose and *Stevia* extract was added in the process. The reaction conditions were as follow.

*Stevia* extract: GSG-RA20, available from Sweet Green Fields.

Weight ratio of xylose to alanine: 3:1;

Weight ratio of *Stevia* extract to the blend of xylose and alanine: 60:40;

The total weight of *Stevia* extract, xylose and alanine: 5 g; noted as following table.

TABLE 237.1

| Weight ratio of *Stevia* extract to the blend of reducing sugar and amino acid | GSG-RA20 | xylose | alanine |
|---|---|---|---|
| 60:40 | 3 g | 1.5 g | 0.5 g |

Propylene Glycol: 2.5 g

Temperature: 100° C., 120° C., 140° C., 160° C., 180° C.;

Duration: 1 hours;

pH regulation: no pH regulator added.

The odor of all the resultant mixtures after reaction completion were evaluated by a panel of 4 trained persons. For evaluation of the odor, the samples were tested by a panel of four people. The panel smelled the reaction mixture, discussed and then gave a description that all testers could accept.

TABLE 237.2

| Scent evaluation of the reaction mixture | | |
|---|---|---|
| # | Reaction temperature | Description of the odor |
| 237-1 | 100° C. | Caramel |
| 237-2 | 120° C. | Caramel |
| 237-3 | 140° C. | Burnt and slight Caramel |
| 237-4 | 160° C. | Burnt and slight Caramel |
| 237-5 | 180° C. | Burnt and slight Caramel |

Conclusion

All S-MRPs produced by the reaction in different temperature can act as flavor, flavor enhancers, mouthfeel modifiers or as sweeteners with caramel flavor. Preferably when the reaction temperature is ranged from 100° C. to 120° C., the caramel flavor is more intensive.

Example 238

The Effect of Reaction Temperature to the Scent of S-MRP-PC

In this example, the reaction of proline, rhamnose and *Stevia* extract was added in the process. The reaction conditions were as follow.

*Stevia* extract: GSG-RA20, available from Sweet Green Fields.

Weight ratio of rhamnose to proline: 2:1;

Weight ratio of *Stevia* extract to the blend of rhamnose and proline: 70:30;

The total weight of *Stevia* extract, rhamnose and proline: 5 g; noted as following table.

TABLE 238.1

| Weight ratio of *Stevia* extract to the blend of reducing sugar and amino acid | GSG-RA20 | rhamnose | proline |
|---|---|---|---|
| 70:30 | 3.5 g | 1.0 g | 0.5 g |

Propylene glycol: 2.5 g

Temperature: 100° C., 120° C., 40° C., 160° C., 180° C.;

Duration: 1 hours;

pH regulation: no pH regulator added.

The odor of all the resultant mixtures after reaction completion were evaluated by a panel of 4 trained persons. For evaluation of the odor, the samples were tested by a panel of four people. The panel smelled the reaction mixture, discussed and then gave a description that all testers could accept.

TABLE 238.1

| Scent evaluation of the reaction mixture | | |
|---|---|---|
| # | Reaction temperature | Description of the odor |
| 238-1 | 100° C. | Popcorn |
| 238-2 | 120° C. | Popcorn |
| 238-3 | 140° C. | Popcorn |
| 238-4 | 160° C. | Burnt and slight Popcorn |
| 238-5 | 180° C. | Burnt |

Conclusion

All S-MRPs produced by the reaction in different temperature can act as flavor, flavor enhancers, mouthfeel modifiers or as sweeteners with special flavor. Preferably when the reaction temperature is ranged from 100° C. to 140° C., the more intensive popcorn flavor can be obtained.

Example 239

The Effect of Reaction Pressure to the Scent of S-MRP

In this example, the effect of reaction pressure to the characteristic of S-MRP was evaluated.

Three couple of experiments had been done. In one couple of experiments, one was carried under normal pressure (0.1 MPa) and the other was carried under high pressure (0.17 MPa). The reaction conditions other than pressure were as follow.

*Stevia* extract: GSG-RA20, available from Sweet Green Fields.

The materials and their weights were as following table.

TABLE 239.1

| # | Reaction pressure | GSG-RA20 | Reducing sugar/weight | Amino acid/weight |
|---|---|---|---|---|
| 239-1-1 | 0.1 MPa | 4 g | Xylose/0.67 g | Phenylalanine/0.5 g |
| 239-1-2 | 0.17 MPa | 4 g | Xylose/0.67 g | Phenylalanine/0.5 g |
| 239-2-1 | 0.1 MPa | 3 g | Xylose/1.5 g | Alanine/0.5 g |
| 239-2-2 | 0.17 MPa | 3 g | Xylose/1.5 g | Alanine/0.5 g |
| 239-3-1 | 0.1 MPa | 3.5 g | Rhamnose/1 g | Proline/0.5 g |
| 239-3-2 | 0.17 MPa | 3.5 g | Rhamnose/1 g | Proline/0.5 g |

Propylene glycol: 2.5 g

Temperature: 120° C.;

Duration: 1 hours;

pH regulation: no pH regulator added.

The odor of all the resultant mixtures after reaction completion were evaluated by a panel of 4 trained persons. For evaluation of the odor, the samples were tested by a panel of four people. The panel smelled the reaction mixture, discussed and then gave a description that all testers could accept.

TABLE 239.2

Scent evaluation of the reaction mixture

| # | Reaction pressure | Description of the odor |
|---|---|---|
| 239-1-1 | 0.1 MPa | Floral |
| 239-1-2 | 0.17 MPa | Smoked |
| 239-2-1 | 0.1 MPa | Caramel |
| 239-2-2 | 0.17 MPa | Burnt and slight caramel |
| 239-3-1 | 0.1 MPa | Popcorn |
| 239-3-2 | 0.17 MPa | Burnt and slight Popcorn |

Conclusion:

All S-MRPs produced by the reaction in different pressure can act as flavor, flavor enhancers, mouthfeel modifiers or as sweeteners with special flavor. When the reaction conditions other than pressure are same, the products produced under high pressure tend to produce stronger odors, such as smoked or burnt smell.

Example 240

The Effect of Reaction pH Value to the Scent of S-MRP

In this example, the effect of reaction pH value to the characteristic of S-MRP was evaluated.

Three groups of experiments had been done. In each group of experiments, the materials and reaction conditions are same except pH value. The reaction conditions other than pH value were as follow.

*Stevia* extract: GSG-RA20, available from Sweet Green Fields.

The materials and their weights were as following table.

TABLE 240.1

| # | Reaction pressure | GSG-RA20 | Reducing sugar/weight | Amino acid/weight |
|---|---|---|---|---|
| Group I | 0.1 MPa | 4 g | Xylose/0.67 g | Phenylalanine/0.5 g |
| Group II | 0.1 MPa | 3 g | Xylose/1.5 g | Alanine/0.5 g |
| Group III | 0.1 MPa | 3.5 g | Rhamnose/1 g | Proline/0.5 g |

water: 2.5 g, use HCl or NaOH to adjust the pH to predetermined value;

Temperature: 100° C.;

Duration: 1 hour.

The odor of all the resultant mixtures after reaction completion were evaluated by a panel of 4 trained persons. For evaluation of the odor, the samples were tested by a panel of four people. The panel smelled the reaction mixture, discussed and then gave a description that all testers could accept.

TABLE 240.2

Scent evaluation of the reaction mixture

| | Description of the odor | | | | | | | |
|---|---|---|---|---|---|---|---|---|
| Group | pH 1 | pH 3 | pH 5 | pH 7 | pH 8 | pH 10 | pH 12 | pH 14 |
| Group I | Slight floral | Floral | Floral | Floral | Floral | Floral | Floral | smoked |
| Group II | burnt | Caramel | Caramel | Caramel | Caramel | Caramel | Caramel | burnt |
| Group II | Slight popcorn | Slight popcorn | popcorn | popcorn | popcorn | popcorn | popcorn | popcorn |

Conclusion:

All S-MRPs produced by the reaction in different pH value can act as flavor, flavor enhancers, mouthfeel modifiers or as sweeteners with special flavor. When the reaction conditions other than pH value are same, the products produced at pH 3 to pH 12 can give the same flavor. In more acidic or alkaline conditions, such as pH 1 or pH 14, the smell of the products tend to produce stronger odors, such as smoked or burnt smell.

Example 241

Preparation of S-MRP with Molasses Flavor

*Stevia* extract: GSG-RA20, available from Sweet Green Fields.

40 g *Stevia* extract, 20 g xylose and 6.65 g alanine were mixed. The mixture was dissolved into 33 g pure water. No pH regulator was added and the pH was about 5. The solution was heated at about 100 degrees centigrade for 1.5 hours. Add 20 g molasses (Red Seal® Blackstrap molasses, available from Red Seal Natural Health Ltd., New Zealand). The solution was continued heating for 30 minutes. When the reaction was complete, the reaction mixture was filtered by filter paper and the filtrate was dried by spray dryer to provide about 78 g of brown powder with molasses flavor. The product was named S-MRP-MO.

Example 242

Preparation of S-MRP with Dried Tangerine Peel Flavor

*Stevia* extract: GSG-RA20, available from Sweet Green Fields.

40 g *Stevia* extract, 3.75 g galactose and 1.25 g glutamic acid were mixed. The mixture was dissolved into 25 g pure water. No pH regulator was added and the pH was about 5. The solution was heated at about 100 degrees centigrade for 1 hour. Add 20 g grinded dried tangerine peel to the reaction mixture. The solution was continued heating for 90 minutes. When the reaction was complete, the reaction mixture was centrifuged and the supernatant was dried by spray dryer to provide about 45 g of brown powder with dried tangerine peel flavor. The product was named S-MRP-TP.

Example 243

Evaluate the Taste Profile of S-MRPs Compare to Their Materials

The products of Example 241 and Example 242 and their materials were evaluated for their sensory characteristics. The test method and the evaluation results are as followed.

Test method:

The samples were dissolved in deionized water with ultrasound at room temperature and left to equilibrate for 30 min. The concentrations of the solutions were all 400 ppm.

Panel: 4 Persons

For evaluation of the taste profile, the samples were tested by a panel of four people. 1 trained taster tasted independently the samples first. The taster was asked to describe the taste profile and score 0-5 according to the increasing sugar like, bitterness, aftertaste and lingering taste profiles. The first taster was allowed to re-taste, and then make notes for the sensory attributes perceived. Afterwards, another 3 tasters tasted and the attributes were noted and discussed openly to find a suitable description. In case that more than 1 taster disagreed with the results, the tasting was repeated. For example, a "5" for sugar like is the best score for having a taste that is sugar like and conversely a value of 0 or near zero is not sugar like. Similarly, a "5" for bitterness, aftertaste and lingering is not desired. A value of zero or near zero means that the bitterness, aftertaste and/or lingering is reduced or is removed.

Result:

TABLE 243.1

| S-MRP products of Example 202 and Example 203 comparing to GSG-RA20 | | | | | |
|---|---|---|---|---|---|
| sample | Taste profile description | mouthfeel | Bitterness | aftertaste | Lingering |
| GSG-RA20 | More sweet;<br>Flat;<br>A little bitter;<br>Some herbal aftertaste;<br>Sweet lingering | 3 | 1 | 1 | 1 |
| S-MRP-MO (Ex. 241) | Less sweet;<br>Almost no bitterness;<br>Full mouthfeel;<br>No other aftertaste;<br>Molasses aroma and taste. | 5 | 0 | 0 | 0 |
| S-MRP-TP (Ex. 242) | Less sweet;<br>Almost no bitterness;<br>Full mouthfeel;<br>No other aftertaste;<br>Tangerine aroma and taste. | 4 | 0 | 0 | 0 |

Conclusion:

The taste profile of *Stevia* extract components can be improved by Maillard reaction. It provides the *Stevia* component with full mouth feel, decreased or eliminated bitterness and a shortened sweet lingering. Also it can provide special flavor.

Example 244-246

The Improvement of MRP, S-MRP and TS-MRP to the Taste and Mouthfeel of Advantame The sources of advantame and MRP samples used in the following Examples are as follows.

TABLE 244-246

| sample | source | Lot # | Specification |
|---|---|---|---|
| Advantame | AJI SWEER VM95 available from AJINOMOTO CO., INC. | TM14117-3 | Maltodextrin 95%, Advantame 5% |
| MRP-CH | The product of Example 99 | | |
| S-MRP-CH | The product of Example 101 | | |
| thaumatin | The product of EPC Natural Products Co., Ltd, China | 20180801 | thaumatin 10.74% |
| TS-MRP-CH | the mixture of above S-MRP-CH and thaumatin with the weight ratio of 10:1 | | |

Example 244

The Improvement of MRP-CH to the Taste and Mouthfeel of Advantame

Common Process:

MRP-CH and Advatame were weighed and unifonnly mixed according to the weight shown in Table 244.1. The mixed powder was weighed in the amount shown in Table 244.1, dissolved in 100 ml of pure water, and subjected to a mouthfeel evaluation test. The tasting procedure is the same as Example 39.

TABLE 244.1

| the weight of MRP-CH and Advantame | | | |
|---|---|---|---|
| # | The ratio of MRP-CH to Advantame | Weight of MRP-CH (mg) | Weight of Advantame (mg) |
| 244-01 | 0:1 | 0 | 12 |
| 244-02 | 0.1:1 | 1.2 | 12 |
| 244-03 | 0.2:1 | 2.4 | 12 |
| 244-04 | 0.3:1 | 3.6 | 12 |
| 244-05 | 0.4:1 | 4.8 | 12 |
| 244-06 | 0.5:1 | 6 | 12 |
| 244-07 | 0.6:1 | 7.2 | 12 |
| 244-08 | 0.7:1 | 8.4 | 12 |
| 244-09 | 0.8:1 | 9.6 | 12 |
| 244-10 | 0.9:1 | 10.8 | 12 |
| 244-11 | 1:1 | 12 | 12 |
| 244-12 | 3:1 | 36 | 12 |

Experiments

Several mixtures of MRP-CH and Advantame were mixed in this example. Each sample was evaluated according to the aforementioned sensory evaluation method, and the average score of the panel was taken as the evaluation result data. The taste profile of the mixture is as follows. The results are shown in Table 244.2.

TABLE 244.2

| the score in sensory evaluation | | | | | | |
|---|---|---|---|---|---|---|
| | sensory evaluation | | | | | |
| | | sweet profile | | | | |
| # | mouthfeel kokumi | sweet lingering | bitterness | metallic aftertaste | score of sweet profile | overall likeability |
| 244-01 | 1 | 2 | 1 | 2 | 4.33 | 2.67 |
| 244-02 | 2 | 2 | 1 | 2 | 4.33 | 3.17 |
| 244-03 | 3 | 2 | 1 | 2 | 4.33 | 3.67 |
| 244-04 | 4 | 2 | 1 | 2 | 4.33 | 4.17 |
| 244-05 | 4 | 2 | 1 | 2 | 4.33 | 4.17 |
| 244-06 | 4 | 1 | 1 | 1.5 | 4.83 | 4.42 |
| 244-07 | 4 | 1 | 1 | 1.5 | 4.83 | 4.42 |
| 244-08 | 4 | 1 | 1 | 1.5 | 4.83 | 4.42 |
| 244-09 | 4 | 1 | 1.5 | 1 | 4.83 | 4.42 |
| 244-10 | 5 | 1 | 1.5 | 1 | 4.83 | 4.92 |
| 244-11 | 5 | 1 | 1.5 | 1 | 4.83 | 4.92 |
| 244-12 | 5 | 1 | 1.5 | 1 | 4.83 | 4.92 |

Data Analysis

The relationship between the sensory evaluation results to the ratio of MRP-CH to Advantame in this example is as shown in FIG. 256.

The relationship between the overall likeability results to the ratio of MRP-CH to Advantame in this example is as shown in FIG. 257.

Conclusion:

The results showed that standard MRPs can significantly improve taste profile, flavor intensity and mouthfeel of high intensity artificial sweeteners such as Advantame. Because of the less mouthfeel, the taste of Advantame is common. However, all ranges in tested ratios of MRP-CH to Advantame from 0.1/1 to 3/1 had good taste (overall likeability score >3), preferably when the ratio ranges were from 0.3/1 to 3/1, the products gave superior taste (score >4). The conclusion can be extended to 1:99 and 99:1. This example demonstrates that MRPs can improve taste profile, flavor intensity and mouthfeel of Advantame.

Example 245

The Improvement of S-MRP-CH to the Taste and Mouthfeel of Advantame

Common Process:

S-MRP-CH and Advatame were weighed and uniformly mixed according to the weight shown in Table 245.1. The mixed powder was weighed in the amount shown in Table 245.1, dissolved in 100 ml of pure water, and subjected to a mouthfeel evaluation test. The tasting procedure is the same as Example 39.

TABLE 245.1

| the weight of S-MRP-CH and Advantame | | | |
|---|---|---|---|
| # | The ratio of S-MRP-CH to Advantame | Weight of S-MRP-CH (mg) | Weight of Advantame (mg) |
| 245-01 | 0:1 | 0 | 12 |
| 245-02 | 0.1:1 | 1.2 | 12 |
| 245-03 | 0.2:1 | 2.4 | 12 |
| 245-04 | 0.3:1 | 3.6 | 12 |
| 245-05 | 0.4:1 | 4.8 | 12 |
| 245-06 | 0.5:1 | 6 | 12 |
| 245-07 | 0.6:1 | 7.2 | 12 |
| 245-08 | 0.7:1 | 8.4 | 12 |
| 245-09 | 0.8:1 | 9.6 | 12 |
| 245-10 | 0.9:1 | 10.8 | 12 |
| 245-11 | 1:1 | 12 | 12 |
| 245-12 | 3:1 | 36 | 12 |

Experiments

Several mixtures of S-MRP-CH and Advantame were mixed in this example. Each sample was evaluated according to the aforementioned sensory evaluation method, and the average score of the panel was taken as the evaluation result data. The taste profile of the mixture is as follows. The results are shown in Table 245.2.

TABLE 245.2

| the score in sensory evaluation | | | | | | |
|---|---|---|---|---|---|---|
| | sensory evaluation | | | | | |
| | | sweet profile | | | | |
| # | mouthfeel kokumi | sweet lingering | bitterness | metallic aftertaste | score of sweet profile | overall likeability |
| 245-01 | 1 | 2 | 1 | 2 | 4.33 | 2.67 |
| 245-02 | 3 | 2 | 1 | 2 | 4.33 | 3.67 |
| 245-03 | 3 | 2 | 1 | 2 | 4.33 | 3.67 |
| 245-04 | 3 | 2 | 1 | 2 | 4.33 | 3.67 |
| 245-05 | 3 | 2 | 1 | 1.5 | 4.50 | 3.75 |
| 245-06 | 3 | 2 | 1 | 1.5 | 4.50 | 3.75 |
| 245-07 | 4 | 2 | 1 | 1.5 | 4.50 | 4.25 |
| 245-08 | 5 | 2 | 1 | 1 | 4.67 | 4.83 |
| 245-09 | 5 | 2 | 1.5 | 1 | 4.50 | 4.75 |
| 245-10 | 5 | 3 | 1.5 | 1 | 4.17 | 4.58 |
| 245-11 | 5 | 3 | 1.5 | 1 | 4.17 | 4.58 |
| 245-12 | 5 | 3 | 1.5 | 1 | 4.17 | 4.58 |

Data Analysis

The relationship between the sensory evaluation results to the ratio of S-MRP-CH to Advantame in this example is as shown in FIG. 258.

The relationship between the overall likeability results to the ratio of S-MRP-CH to Advantame in this example is as shown in FIG. 259.

Conclusion:

The results showed that S-MRPs can significantly improve taste profile, flavor intensity and mouthfeel of high intensity artificial sweeteners such as Advantame. Because of the less mouthfeel, the taste of Advantame is common. However, all ranges in tested ratios of 5-MRP-CH to Advantame from 0.1/1 to 3/1 had good taste (overall likeability score >3), preferably when the ratio ranges were from 0.6/1 to 3/1, the products gave superior taste (score >4). The conclusion can be extended to 1:99 and 99:1. This example demonstrates that S-MRPs can improve taste profile, flavor intensity and mouthfeel of Advantame.

Example 246

The improvement of TS-MRP-CH to the Taste and Mouthfeel of Advantame

Common Process:

TS-MRP-CH and Advatame were weighed and unifonnly mixed according to the weight shown in Table 246.1. The mixed powder was weighed in the amount shown in Table 246.1, dissolved in 100 ml of pure water, and subjected to a mouthfeel evaluation test. The tasting procedure is the same as Example 39.

TABLE 246.1

| the weight of TS-MRP-CH and Advantame | | | |
|---|---|---|---|
| # | The ratio of TS-MRP-CH to Advantame | Weight of TS-MRP-CH solution (mg) | Weight of Advantame solution (mg) |
| 246-01 | 0:1 | 0 | 12 |
| 246-02 | 0.1:1 | 1.2 | 12 |
| 246-03 | 0.2:1 | 2.4 | 12 |
| 246-04 | 0.3:1 | 3.6 | 12 |
| 246-05 | 0.4:1 | 4.8 | 12 |
| 246-06 | 0.5:1 | 6 | 12 |

TABLE 246.1-continued

| the weight of TS-MRP-CH and Advantame | | | |
|---|---|---|---|
| # | The ratio of TS-MRP-CH to Advantame | Weight of TS-MRP-CH solution (mg) | Weight of Advantame solution (mg) |
| 246-07 | 0.6:1 | 7.2 | 12 |
| 246-08 | 0.7:1 | 8.4 | 12 |
| 246-09 | 0.8:1 | 9.6 | 12 |
| 246-10 | 0.9:1 | 10.8 | 12 |
| 246-11 | 1:1 | 12 | 12 |
| 246-12 | 3:1 | 36 | 12 |

Experiments

Several mixtures of TS-MRP-CH and Advantame were mixed in this example. Each sample was evaluated according to the aforementioned sensory evaluation method, and the average score of the panel was taken as the evaluation result data. The taste profile of the mixture is as follows. The results are shown in Table 246.2.

TABLE 246.2

| the score in sensory evaluation | | | | | | |
|---|---|---|---|---|---|---|
| | sensory evaluation | | | | | |
| | | sweet profile | | | | |
| # | mouthfeel kokumi | sweet lingering | bitterness | metallic aftertaste | score of sweet profile | overall likeability |
| 246-01 | 1 | 2 | 1 | 2 | 4.33 | 2.67 |
| 246-02 | 4 | 2 | 1 | 2 | 4.33 | 4.17 |
| 246-03 | 4 | 2 | 1 | 2 | 4.33 | 4.17 |
| 246-04 | 5 | 2 | 1 | 1.5 | 4.50 | 4.75 |
| 246-05 | 5 | 2 | 1 | 1.5 | 4.50 | 4.75 |
| 246-06 | 5 | 2 | 1 | 1 | 4.67 | 4.83 |
| 246-07 | 5 | 2 | 1 | 1 | 4.67 | 4.83 |
| 246-08 | 5 | 2 | 1 | 1 | 4.67 | 4.83 |
| 246-09 | 5 | 2 | 1 | 1 | 4.67 | 4.83 |
| 246-10 | 5 | 2 | 1.5 | 1 | 4.50 | 4.75 |
| 246-11 | 5 | 3 | 1.5 | 1 | 4.17 | 4.58 |
| 246-12 | 5 | 3 | 1.5 | 1 | 4.17 | 4.58 |

Data Analysis

The relationship between the sensory evaluation results to the ratio of TS-MRP-CH to Advantame in this example is as shown in FIG. 260.

The relationship between the overall likeability results to the ratio of TS-MRP-CH to Advantame in this example is as shown in FIG. 261.

Conclusion:

The results showed that TS-MRPs can significantly improve taste profile, flavor intensity and mouthfeel of high intensity artificial sweeteners such as Advantame. Because of the less mouthfeel, the taste of Advantame is common. However, all ranges in tested ratios of TS-MRP-CH to Advantame from 0.1/1 to 3/1 had superior taste (score >4). The conclusion can be extended to 1:99 and 99:1. This example demonstrates that TS-MRPs can improve taste profile, flavor intensity and mouthfeel of Advantame.

Example 247

Preparation of Citrus Flavor MRP from Crude *Stevia* Extract

Air-dried leaves of *Stevia* rebaudiana (1 kg) were extracted with distilled water at 45-55° C. for 2 hours. The extracting step was repeated three times. The volume of water in each extracting stage was 5 L, 5 L and 3 L, respectively. The liquid extract was separated from the solids by centrifugation. The filtered supernatant liquid extract was flocculated and the supernatantwas separated by centrifugation. The supernatant was passed through a macroporous resin (1 L, resin model: T28, available from Sunresin new materials Co. Ltd., China) and then desorbed with 3 L of 65% ethanol/water. The desorption solution was treated by 1 L of cationic exchange resin and 1 L of anion exchange resin for desalination and decoloration. The desorption solution was spray-dried to a powder and designated as the crude *Stevia* extract (abbreviated as CSE).

The crude *Stevia* extract was dissolved in 10 times its weight of pure water. The solution was treated by 1 L of cationic exchange resin and 1 L of anion exchange resin. The desorption solution was spray-dried to a powder and designated as the re-treated crude *Stevia* extract (abbreviated as RCSE).

3) 45 g re-treated crude *Stevia* extract, 1.25 g galactose and 3.75 g glutamic acid were mixed. The mixture was dissolved into 25 g pure water. No pH regulator was added and the pH was about 5. The solution was heated at about 100 degrees centigrade for 2 hours. When the reaction was complete, the reaction mixture was filtered by filter paper and the filtrate was dried by spray dryer to provide about 45 g of an off white powder with citrus flavor and designated as RCSE-MRP-CI.

Example 248

Analytical Analysis

The CSE, RCSE and RCSE-MRP-CI prepared according to Example 247 and standard MRP-CI prepared according to Example 100 were analyzed in this example.

The products were dissolved in pure water, respectively. The concentration of each solution is 1% w/v.

The odor of all the resultant solutions were evaluated by a panel of 4 trained persons.

TABLE 248.1

| Results: | |
|---|---|
| Product | odor |
| CSE | Strong herbal |
| RCSE | Herbal |
| RCSE-MRP-CI | Strong citrus |
| MRP-CI | odorless |

The volatile substances contained in the products were analyzed by GC/MS to determine the source of citrus flavor.

Analytical Methods

TABLE 248.2

| Thermo Scientific GC/MS | | | |
|---|---|---|---|
| Column | Thermo TG30.0 m × 0.25 mm I.D., 0.25 μm | | |
| | Rate (° C.) | Temperature | hold time (min) |
| Column Oven | | 50 | 3 |
| Temperature | 14 | 300 | 5 |
| GC Program Time | 26.8 min | | |
| Mobile Phase | He | | |
| Transfer Line Temperature | 250° C. | | |

TABLE 248.2-continued

| Thermo Scientific GC/MS | |
|---|---|
| GC/MS Mass Spectrometer | |
| Measurement Mode | Full Scan (45-250 m/z) |
| Ion Source Temperature | 280° C. |
| RSH Autosampler (Head Space) | |
| SPME | On-Board Head Space extraction columns, Extract 15 min, incubation 15 min (Material: PDMS 100 um), Agitator Temperature: 75° C. |
| Injection Temperature | 200° C. |

Results

FIG. 262 shows GC/MS spectra of standard MRP-CI.

FIG. 263 shows CBC/MS spectra of CSE.

FIG. 264 shows GC/MS spectra of RCSE.

FIG. 265 shows GC/MS spectra of RCSE-MRP-CI.

Analysis

It can be found from the comparison between CSE and RCSE that after treating with ionic exchange resin, some volatile substances have been decreased significantly or eliminated. The details show in table below.

TABLE 248.3

| Retention time (min) | Structural Proposal | CAS No. | Molecule weight | Main Flavor | Changes |
|---|---|---|---|---|---|
| 9.67 | Benzyl alcohol | 100-51-6 | 108.13 | — | Decrease |
| 10.74 | Phenylethyl Alcohol | 60-12-8 | 122 | Flower | Decrease |
| 10.41 | Linalool | 78-70-6 | 154 | Flower and spicy | Eliminate |
| 13.38 | Eugenol | 97-53-0 | 164 | spicy, clove-like scent | Decrease significantly |

When comparing the spectra of RCSE, standard MRP-CI and RCSE-MRP-CI, it can be found that some volatile substances appear or increase in RCSE-MRP-CI. The details show in table below.

TABLE 248.4

| Retention time (min) | Structural Proposal | CAS No. | Molecule weight | Main Flavor | Changes |
|---|---|---|---|---|---|
| 8.52 | 2-Furancarboxaldehyde | 620-02-0 | 110 | | appear |
| 9.37 | Limonene | 5989-54-8 | 136 | citrus | appear |
| 10.07 10.28 | trans-Linalool oxide | 34995-77-2 | 170 | Wood | appear |
| 10.40 | (−)-cis-Myrtanol | 51152-12-6 | 154 | Flower | appear |
| | Isopulegol | 89-79-2 | 154 | | |
| 11.59 | à-Terpineol | 98-55-5 | 154 | Flower | increase |
| 11.73 | 1,3-Cyclohexadiene-1-carboxaldehyde, 2,6,6-trimethyl | 116-26-7 | 150 | | appear |
| 11.87 | 3-Cyclohexene-1-acetaldehyde, à,4-dimethyl | 29548-14-9 | 152 | | appear |
| 12.44 | 4-Isopropyl-1,3-cyclohexanedione | 62831-62-3 | 154 | | appear |
| | 2-Propyl-5-oxohexanoic acid | 10297-76-4 | 172 | | appear |
| 12.57 | Ionone | 8013-90-9 | 192 | Flower, wood and fruit | appear |

TABLE 248.4-continued

| Retention time (min) | Structural Proposal | CAS No. | Molecule weight | Main Flavor | Changes |
|---|---|---|---|---|---|
| 12.69 | 2(1H)-Naphthalenone, octahydro-8a-hydroxy-4a-methyl- | 4707-07-7 | 182 | | appear |
| | 2-ethyl-2-hexenal | 645-62-5 | 126.2 | | appear |
| 13.33 | Naphthalene, 1,2-dihydro-1,1,6-trimethyl | 30364-38-6 | 172 | | appear |
| 13.76 | 3-(2,6,6-Trimethyl-1-cyclohexen-1-yl)-2-propenal | 4951-40-0 | 178 | | appear |
| | 2,5-Octadecadiynoic acid | 57156-91-9 | 290 | | |
| 14.05 | 3-Buten-2-one,4-(2,6,6-trimethyl-1,3-cyclohexadien-1-yl) | 1203-08-3 | 190.3 | | appear |
| | Benzenepropanal | 103-95-7 | 190.3 | | appear |

Conclusion

Citrus flavor can be perceived in RCSE-MRP-CI but cannot be perceived in standard MRP-CI. However, use CSE as materials to produce CSE-MRP-CI according to the process of RCSE-MRP-CI (step 3 of Example 184), the citrus flavor still cannot be perceived. So after treating with ionic exchange resins, there must be some key flavor substances decreased or eliminated which influent the presentation of citrus flavor. In addition, when RCSE participate in the process of Maillard reaction, there must be some key flavor substances appear or increase which can present citrus flavor. These substances cannot be produced without RCSE, so they do not exist in standard MRP-CI.

Example 249

Preparation of S-MRP-PC

In this example several S-MRP-PC were prepared according to similar method except that the *Stevia* extract participated in the reaction at different stages.

Common Process:

0.6 g rhamnose and 0.4 g proline were mixed. Thus obtained mixture was dissolved into 2.5 g pure water. No pH regulator was added and the pH was about 5. The solution was heated at about 100 degrees centigrade for 3 hours. 4 g *Stevia* extract (GSG-RA20, available from Sweet Green Fields) was added to the reaction mixture at different stages, respectively. When the reaction complete, the reaction mixture was filtered by filter paper and the filtrate was dilute by pure water to make the solid content to 625 ppm.

The details of the production are as followed.

TABLE 249.1

| # | The stage of adding *Stevia* extract |
|---|---|
| 249-1 | At the beginning of reaction |
| 249-2 | 1 hour after the beginning of reaction |
| 249-3 | 2 hours after the beginning of reaction |

Example 250

The Sensory Evaluation of the S-MRP-PC

The products of Example 249 and their material, GSG-RA20, (available from Sweet Green Fields) were evaluated. The concentration of GSG-RA20 was set to 500 ppm in order to make the concentration of *Stevia* extract in the sample solutions of material and products identical. The sensory evaluation method is the same as Example 39.

TABLE 250.1

| Result | | | | | | |
|---|---|---|---|---|---|---|
| Sample | Sweetness | Flavor (intensity) | kokumi | sweet lingering | bitterness | metallic aftertaste |
| GSG-RA20 | 5 | Herbal (moderate) | 0 | 2 | 1 | 1 |
| 249-1 | 4 | Popcorn (strong) | 2 | 1 | 0 | 0 |
| 249-2 | 4 | Popcorn (very strong) | 3 | 1 | 0 | 0 |
| 249-3 | 4 | Popcorn (strong) | 2 | 1 | 0 | 0 |

Conclusion

When preparing S-MRPs, whenever the *Stevia* extract was added, the product with good flavor and taste can be produced. The taste profile of *Stevia* extract such as GSG-RA20 can be improved no matter when it participates in the Maillard reaction.

Example 251

Preparation of S-MRP-FL

In this example several S-MRP-FL were prepared according to similar method except that the *Stevia* extract participated in the reaction at different stages.

Common Process:

0.67 g xylose and 0.33 g phenylalanine were mixed. Thus obtained mixture was dissolved into 2.5 g pure water. No pH regulator was added and the pH was about 5. The solution was heated at about 100 degrees centigrade for 3 hours. 4 g *Stevia* extract (GSG-RA20, available from Sweet Green Fields) was added to the reaction mixture at different stages, respectively. When the reaction complete, the reaction mixture was filtered by filter paper and the filtrate was dilute by pure water to make the solid content to 625 ppm.

The details of the production are as followed

TABLE 251.1

| # | The stage of adding *Stevia* extract |
|---|---|
| 251-1 | At the beginning of reaction |
| 251-2 | 1 hour after the beginning of reaction |
| 251-3 | 2 hours after the beginning of reaction |

Example 252

The Sensory Evaluation of the S-MRP-FL

The products of Example 251 and their material, GSG-RA20, (available from Sweet Green Fields) were evaluated. The concentration of GSG-RA20 was set to 500 ppm in order to make the concentration of *Stevia* extract in the sample solutions of material and products identical. The sensory evaluation method is the same as Example 39.

TABLE 252.1

| Results | | | | | | |
|---|---|---|---|---|---|---|
| Sample | Sweetness | Flavor (intensity) | kokumi | sweet lingering | bitterness | metallic aftertaste |
| GSG-RA20 | 4 | Herbal (4) | 0 | 2 | 1 | 1 |
| 251-1 | 4 | Floral (3.5) | 2.5 | 0.5 | 0 | 0 |
| 251-2 | 4 | Floral (2.5) | 2 | 1 | 1 | 0 |
| 251-3 | 4 | Floral (2) | 2 | 1 | 1 | 0 |

Conclusion

When preparing S-MRPs, whenever the *Stevia* extract was added, the product with good flavor and taste can be produced. The taste profile of *Stevia* extract such as GSG-RA20 can be improved no matter when it participates in the Maillard reaction.

Example 253

Preparation of S-MRP-CA

In this example several S-MRP-CA were prepared according to similar method except that the *Stevia* extract participated in the reaction at different stages.

Common Process:

1.5 g xylose and 0.5 g alanine were mixed. Thus obtained mixture was dissolved into 2.5 g pure water. No pH regulator was added and the pH was about 5. The solution was heated at about 100 degrees centigrade for 3 hours. 3 g *Stevia* extract (GSG-RA20, available from Sweet Green Fields) was added to the reaction mixture at different stages, respectively. When the reaction complete, the reaction mixture was filtered by filter paper and the filtrate was dilute by pure water to make the solid content to 2%.

The details of the production are as followed.

TABLE 253.1

| # | The stage of adding *Stevia* extract |
|---|---|
| 253-1 | At the beginning of reaction |
| 253-2 | 1 hour after the beginning of reaction |
| 253-3 | 2 hours after the beginning of reaction |

Example 254

The Sensory Evaluation of the S-MRP-CA

The products of Example 253 and their material, GSG-RA20, (available from Sweet Green Fields) were evaluated.

Add 5 mg GSG-RA20 or 0.4 ml product solution of Example 213 to 50 ml Coke Zero (sweetened by sucralose, aspartame and ACE-K, available from Coca-Cola), respectively. Thus make the concentration of *Stevia* extract in the Coke Zero solutions of material and products identical. The sensory evaluation method is the same as Example 39.

TABLE 254.1

| Result | | | | |
|---|---|---|---|---|
| Sample | kokumi | sweet lingering | bitterness | metallic aftertaste |
| GSG-RA20 | 1 | 2 | 1 | 1 |
| 253-1 | 4 | 1 | 1 | 0 |
| 253-2 | 3 | 1 | 1 | 0 |
| 253-3 | 3 | 1 | 1 | 0 |

Conclusion

When preparing S-MRPs, whenever the *Stevia* extract was added, the product with good flavor and taste can be produced. The taste profile of *Stevia* extract such as GSG-RA20 can be improved no matter when it participates in the Maillard reaction.

Example 255

Sensory Evaluation of GSGs and SGs, Thaumatin, NHDC and Combinations Thereof Materials and Methods Materials EPCalin (Thaumatin 45%), Lot #20180201, Neohesperidine dihydrohalcone (NHDC) (≥96%, Lot 4 MKBT9446V, Sigma Aldrich), *Stevia* composition: Combination of GSGs and SGs (referred as "GSGs and SGs"), Lot #3070301

Sample Preparation 4.5 ppm Thaumatin (equivalent to 10 ppm EPCalin) was dissolved in water. Increasing amounts of NHDC (1-5 ppm) were added to the solution and the sensory properties were evaluated.

50 ppm (GSGs and SGs) were dissolved in water. Increasing amounts of NHDC (1-5 ppm) were added to the solution and the sensory properties were evaluated.

50 ppm (GSGs and SGs) and 4.5 ppm Thaumatin (equivalent to 10 ppm EPCalin) were dissolved in water. Increasing amounts of NHDC (1-5 ppm) were added to the solution and the sensory properties were evaluated.

Results

TABLE 255.1

| Sensory evaluation of combinations of EPCalin and NHDC | |
|---|---|
| Sample | Sensory evaluation |
| 10 ppm NHDC | Sweet, steep onset of sweetness, no lingering |
| 10 ppm EPCalin | Sweet, lingering |
| 10 ppm EPCalin + 1 ppm NHDC | Slightly sweeter than pure EPCalin, lingering, quicker onset |
| 10 ppm EPCalin + 2 ppm NHDC | Sweeter than pure EPCalin, lingering, quicker onset |

TABLE 255.1-continued

| Sensory evaluation of combinations of EPCalin and NHDC | |
|---|---|
| Sample | Sensory evaluation |
| 10 ppm EPCalin + 3 ppm NHDC | Considerably sweeter than pure EPCalin, lingering, quicker onset |

When NHDC was added in higher amounts (4 and 5 ppm), it yielded long lasting lingering. That is most likely due to the FMP of NHDC boosting of the sensory properties of thaumatin. See for example, FIG. 266, for a graphical representation of the time/intensity profile of NHDC and thaumatin and combinations thereof.

TABLE 255.2

| Sensory evaluation of combinations of Combination of GSGs and SGs and NHDC | |
|---|---|
| Sample | Sensory evaluation |
| 50 ppm Combination of GSGs and SGs | Sweet (2), no lingering |
| 50 ppm Combination of GSGs and SGs + 1 ppm NHDC | Sweet (3), no lingering |
| 50 ppm Combination of GSGs and SGs + 2 ppm NHDC | Sweet (3), no lingering |
| 50 ppm Combination of GSGs and SGs + 3 ppm NHDC | Sweet (4), no lingering |
| 50 ppm Combination of GSGs and SGs + 4 ppm NHDC | Sweet (5), no lingering |
| 50 ppm Combination of GSGs and SGs + 5 ppm NHDC | Sweet (5), no lingering |

Sweetness intensity was rated on 5-point scale

FIG. 267 is a graphical representation of sweetness intensity and mouth-feel of combinations with NHDC and Combination of GSGs and SGs.

FIG. 268 and FIG. 269 are graphical representations of time/intensity profile of combinations with NHDC and Combination of GSGs and SGs.

TABLE 255.3

| Sensory evaluation of combinations of Combination of GSGs and SGs/EPCalin and NHDC | |
|---|---|
| Sample | Sensory evaluation |
| 50 ppm Combination of GSGs and SGs/10 ppm EPCalin | Sweet (3), lingering (4), mouth-feeling (2) |
| 50 ppm Combination of GSGs and SGs/10 ppm EPCalin + 1 ppm NHDC | Sweet (4), lingering (3), mouth-feeling (3) |
| 50 ppm Combination of GSGs and SGs/10 ppm EPCalin + 2 ppm NHDC | Sweet (5), lingering (3), mouth-feeling (4) |
| 50 ppm Combination of GSGs and SGs/10 ppm EPCalin + 3 ppm NHDC | Sweet (5), lingering (3), mouth-feeling (5) |

Sweetness intensity was rated on a 5-point scale

Addition of 4, 5 ppm NHDC boosts the lingering.

FIG. 270 is a graphical representation of the sweetness intensity, lingering and mouth-feel of combinations with NHDC and Combination of GSGs and SGs/EPCalin.

FIG. 271 is a graphical representation of the time/intensity profile of combinations with NHDC and Combination of GSGs and SGs/EPCalin.

Conclusions:

Combinations of EPCalin (Thaumatin) with 1-3 ppm NHDC provided increased sweetness and quicker onset of sweetness.

Compositions of sweetening agents, for instance, GSGs and SGs with 1-5 ppm NHDC yielded increased sweetness and mouth-feel together with a quicker onset of sweetness.

Compositions of sweetening agents and sweetener enhancers, such as combinations of GSGs and SGs/EPCalin with 1-3 ppm NHDC provided increased sweetness and mouth-feel together with a quicker onset of sweetness and a slight increase in lingering. However, the overall lingering contributed by thaumatin for the combination of Thaumatin with steviol glycosides (GSGs and SGs) was considerably lower when compared to thaumatin alone.

The results showed that compositions of Thaumatin with dihydrochalcone glycosides like NHDC, compositions of sweetening agents with dihydrochalcone glycosides like NHDC, composition of sweetening agents, Thaumatin and dihydrochalcone glycosides like NFIDC have a synergistic effect, and can be used as a flavor or a sweetener.

The ratio in the compositions can be varied as per the desired purpose. For instance, every ingredient in the composition can be in the range of from about 0.1 ppm to about 99.5%.

Example 256

Combination of *Stevia*-Derived MRPs and Thaumatin

Material and Methods

Materials

D-Xylose, ≥99%, STBG7912, Sigma Aldrich, EPCalin (Thaumatin 45%), Lot #20180201, DL-Phenylalanine, 98%, Lot #51K1696, Sigma Aldrich, Steviol glycosides TSG95, Lot™20180413

Sample Preparation

Combination of *Stevia*-derived MRPs and Thaumann 1: 0.67 g xylose, 0.33 g phenylalanine and 4 g Steviol glycosides TSG95 were dissolved in 2.5 g deionized water. The solution was heated to about 100° C. for 1 h. After the reaction, 0.278 g EPCalin (45%) was added to the sample and then water was added to a final mass of 25 g.

Combination of *Stevia*-derived MRPs and Thalmann 2: 0.67 g xylose, 0.33 g phenylalanine, 4 g steviol glycosides TSG95 and 0.278 g EPCalin (45%) were dissolved in 2.5 g 5 mM sodium acetate buffer (pH 4). The solution was heated to about 100° C. for 1 h. After the reaction, water was added to a final mass of 25 g.

Combination of *Stevia*-derived MRPs and Thaumatin 3: 0.67 g xylose, 0.33 g phenylalanine, 4 g steviol glycosides TSG95 and 0.278 g EPCalin (45%) were dissolved in 2.5 g water. The solution was heated to about 100° C. for 1. h. After the reaction, water was added to a final mass of 25 g.

Each sample was added at a concentration of 1500 ppm to freshly prepared lemon juice (squeezed lemons diluted 1:5 with tap water) containing 4% sugar.

Each sample was added at a concentration of 1500 ppm to Red Bull Sugarfree (13.03.2020/D #3, 1716331/15:59).

Each sample was added at a concentration of 1000 ppm to Felix Ketchup no added sugar (31.12.2019 L8352, 11:48).

Sensory Evaluation

For all samples the color and flavor were documented by the analyst and a second independent trained taster.

Before tasting the tasters discussed the upcoming series of samples and tasted samples with the predetermined attributes (sweetness) with varying intensities to find a common description. Four trained tasters blind taste tested independently all samples of a series. They were allowed to re-taste and prepared notes for sensory attributes perceived including the relative intensity.

In the last step the attributes noted were discussed openly to find an acceptable description. In case that more than 1 taster disagreed with the description, the tasting was repeated.

Results

TABLE 256.1

Color and smell of a differently prepared combination of *Stevia*-derived MRPs and Thaumatin.

| Sample | Color | Smell |
|---|---|---|
| Combination of *Stevia*-derived MRPs and Thaumatin 1 | Brown | Flowery |
| Combination of *Stevia*-derived MRPs and Thaumatin 2 | Brown | Flowery |
| Combination of *Stevia*-derived MRPs and Thaumatin 3 | Brown | Flowery |

TABLE 256.2

Taste of a differently prepared combination of *Stevia*-derived MRPs and Thaumatin in lemon juice.

| Sample | Taste |
|---|---|
| Reference (Lemon Juice with 4% sugar) | Lemon, Sweet, slightly to sour |
| Combination of *Stevia*-derived MRPs and Thaumatin 1 | More intense lemon and sweeter than reference, sweet/sour balance palatable, more balanced flavor |
| Combination of *Stevia*-derived MRPs and Thaumatin 2 | More intense lemon and sweeter than reference, sweet/sour balance prefect, perfectly balanced flavor |
| Combination of *Stevia*-derived MRPs and Thaumatin 3 | More intense lemon and sweeter than reference, sweet/sour balance palatable, more balanced flavor |

Overall Ranking; Best 2, followed by 1 equal to 3

TABLE 256.3

Taste of a differently prepared combination of *Stevia*-derived MRPs and Thaumatin in Red Bull Sugarfree.

| Sample | Taste |
|---|---|
| Reference (Red Bull Sugarfree) | Typical Taste of Red Bull Sugarfree |
| Combination of *Stevia*-derived MRPs and Thaumatin 1 | Sweeter than reference, more balanced sweetness, more harmonic flavor |
| Combination of *Stevia*-derived MRPs and Thaumatin 2 | Sweeter than reference, optimum balanced sweetness, balanced flavor |
| Combination of *Stevia*-derived MRPs and Thaumatin 3 | Sweeter than reference, more balanced sweetness, more harmonic flavor |

Overall Ranking; Best 2, followed by 1 equal to 3

TABLE 256.4

Taste of a differently prepared combination of *Stevia*-derived MRPs and Thaumatin in Felix Ketchup no added sugar.

| Sample | Taste |
|---|---|
| Reference (Felix Ketchup no added sugar) | Spicy, sweet-sour taste, slightly empty |
| Combination of *Stevia*-derived MRPs and Thaumatin 1 | Sweeter than reference, more balanced mouth-feeling, more harmonic flavor |
| Combination of *Stevia*-derived MRPs and Thaumatin 2 | Sweeter than reference, optimum mouth-feeling, balanced flavor |

TABLE 256.4-continued

Taste of a differently prepared combination of *Stevia*-derived MRPs and Thaumatin in Felix Ketchup no added sugar.

| Sample | Taste |
|---|---|
| Combination of *Stevia*-derived MRPs and Thaumatin 3 | Sweeter than reference, more balanced mouth-feeling, more harmonic flavor |

Overall Ranking; Best 2, followed by 1 equal to 3

Conclusions

Combinations of *Stevia*-derived MRPs and thaumatin prepared by reaction of an amino acid, the sugar and SGs with thaumatin added afterwards without involving Thaumatin in the reaction could be used, but is rated less palatable than the same combination prepared in a “one-pot” in a sodium acetate buffer (pH=4) when added to lemon juice (4% sugar), Red Bull Sugarfree and Ketchup with no added sugar. A combination of *Stevia*-derived MRPs and thaumatin prepared in “one-pot” in water was rated equal to a combination of *Stevia*-derived MRPs and Thaumatin prepared by reaction of the amino acid, the sugar and SGs with thaumatin added afterwards without involving Thaumatin in the reaction when added to lemon juice (4% sugar), Red Bull Sugarfree and Ketchup with no added sugar.

The examples show that any ingredient in the composition of this invention could be either added before Maillard reaction, or afterwards without involving it in the reaction. Both type of products can be used as a flavor or a sweetener to improve the taste, mouthfeel and aroma of final products.

The ratio of every ingredient in the composition, sweetening agent, sugar donor, amine donor, sweet enhancer can be varied as per the desired target. Every ingredient in the composition can be in the range of from about 0.1 ppm to about 99.5%.

Example 257

Preparation and Sensory Analysis of *Stevia*-Derived MRPs with Thaumatin instead of Amino Acid Materials:

D-Galactose, >99%, Lot #039K00592V, Sigma-Aldrich

*Stevia* composition A (SGA): Combination of GSGs and SGs, Lot #3070301

“SGA” or “ZO” as used throughout the specification and figures refers to a composition that is GSG-RA20.

EPCalin (Thaumatin 45%, Lot #20180201)

Sample Preparation:

0.8 g galactose, 2 g EPCalin (45%) and 10 g SGA (Combination of GSGs and SGs) were dissolved in 30 g deionized water. The solution was heated at about 100° C. for 10, 20, 30, 45, 60, 90 and 120 min. After the reaction time, the samples were transferred to ice-cold water. After cooling to the room temperature, a sensory analysis (color, odor, taste) was performed. For the taste evaluation the samples were diluted with water 1:1000.

Sensory Analysis:

Before tasting the tasters discussed the upcoming series of samples to find commonality of the factors to be described and the rating on the intensity scale (5-point scale: 0 (none)—5 (very strong). Thereafter the samples were tasted at the use level to find commonality on how to describe the flavors (color, odor, taste, intensity).

Five trained tasters were blind taste tested independently all samples of a series. They were allowed to re-taste and made notes for the sensory attributes perceived. In the last step the attributes noted were discussed openly to find an agreeable description. In case that more than 1 taster disagreed with the description, the tasting was repeated.

Time/Intensity rating was performed by 5 tasters who, while tasting, could press a button which records the exact timing on a computer (i.e. first press=start, second press=onset of sweetness). The test results given are the median values for the 5 tasters.

TABLE 257.1

| Sample | Reaction time (min) | Color | Odor | Taste |
|---|---|---|---|---|
| 1 | 0 | Clear | Neutral | Sweet (5), very long lingering (5), bitter (2) |
| 2 | 10 | Milk-brown | *Citrus* (3), Sweet (4), Sour (3) | Sweet (5), long lingering (4), bitter (1) |
| 3 | 20 | Milk-brown | *Citrus* (3), Sweet (4), Sour (3) | Sweet (5), lingering (3), bitter (1) |
| 4 | 30 | Milk-brown | *Citrus* (4), Sweet (4), Sour (4) | Sweet (5), lingering (2), bitter (0) |
| 5 | 45 | Milk-brown | *Citrus* (4), Sweet (4), Sour (4) | Sweet (4), lingering (2), bitter (0) |
| 6 | 60 | Dark milk-brown | *Citrus* (4), Sweet (4), Sour (4) | Sweet (4), lingering (2), bitter (0) |
| 7 | 90 | Dark milk-brown | *Citrus* (4), Sweet (4), Sour (4) | Sweet (4), lingering (2), bitter (0) |
| 8 | 120 | Dark milk-brown | *Citrus* (4), Sweet (4), Sour (4) | Sweet (4), lingering (2), bitter (0) |

TABLE 257.2

Sweetness Time/Intensity profile of a *Stevia*-derived MRPs sample with Thaumatin instead of Amino Acid

| REACTION TIME [min] | ONSET [sec] | MAX [sec] | LINGERING ON [sec] | LINGERING OFF [sec] | NO TASTE [sec] |
|---|---|---|---|---|---|
| 0 | 1.5 | 4.0 | 10.5 | 29.5 | 50.0 |
| 10 | 1.5 | 4.0 | 8.0 | 27.0 | 41.0 |
| 20 | 1.5 | 4.0 | 9.0 | 25.5 | 36.0 |
| 30 | 1.5 | 3.0 | 8.0 | 21.5 | 30.0 |
| 45 | 1.5 | 4.0 | 7.5 | 20.0 | 29.0 |
| 60 | 1.0 | 3.0 | 5.5 | 21.0 | 30.0 |
| 90 | 1.5 | 3.5 | 8.5 | 21.5 | 28.0 |
| 120 | 1.5 | 3.0 | 8.0 | 22.0 | 27.0 |

FIG. 272. is a graphical description of a Summary View of the sweetness time/intensity profile of the *Stevia*-derived MRP samples with thaumatin in place of an amino acid.

FIG. 273 and FIG. 274 are graphical descriptions of the sweetness time/intensity profile of the *Stevia*-derived MRP samples with thaumatin in place of an amino acid for selected heating times.

Conclusions

Replacement of amino acid by thaumatin and use of a sweetening agent, such as combination of GSGs and SGs as a steviol-glycoside extract, yielded a fruity citrus flavor with a sweet taste and no discernable after taste.

When comparing different reaction times, the lingering sweetness (most likely caused by thaumatin) is substantially shortened (from 50 to 30 seconds) without a loss of sweetness or taste modifications.

The results showed that the *Stevia*-derived MRPs could be prepared by thaumatin without amine donor. The resultant products could be used as a flavor or as a sweetener. Surprisingly, the lingering of thaumatin could be reduced substantially by this method. This example can be extended to different types of sugar donor or different types of sweetening agent. Every ingredient in the composition can be in the range of from about 0.1 to about 99.5%. The reaction conditions such as temperature, PH value, reaction time etc can be varied as per the desired products.

Example 258

Use of protein(s) or Peptides or Combinations of Proteins and Peptides as Additional Amino Source The addition of proteins to the preparation of *Stevia*-derived MRPs can have an influence on the sensory properties.

Materials

D-Xylose, ≥99%, STBG7912, Sigma Aldrich; DL-Phenylalanine, 98%, Lot #51K1696, Sigma Aldrich; *Stevia* extract TSG95, Lot #20180413; Spirulina extract (acid stable blue, mainly peptides), Lot #EPC-245-50; milk protein 08654 Sigma-Aldrich, Casein sodium salt from bovine milk Sample Preparation

*Stevia* derived MRP with Spirulina I: 0.67 g xylose, 0.33 g phenylalanine, 4 g *Stevia* extract TSG95 and 0.2 g spirulina extract were dissolved in 2.5 g deionized water. The solution was heated at about 100° C. for 2 h. After the reaction, the slurry was diluted with 25 g water.

*Stevia* derived MRP with Spirulina II: 0.67 g xylose, 0.33 g phenylalanine, 4 g *Stevia* extract TSG95 and 0.1 g spirulina extract were dissolved in 2.5 g deionized water. The solution was heated at about 100° C. for 2 h. After the reaction, the slurry was diluted with 25 g water.

*Stevia* derived MRP with dried milk protein: 0.67 g xylose, 0.33 g phenylalanine, 4 g *Stevia* extract TSG95 and 0.1 g milk protein were dissolved in 2.5 g deionized water. The solution was heated at about 100° C. for 2 h. After the reaction, the slurry was diluted with 25 g water.

100 μl of the *Stevia* derived MRP were added to 100 ml Reb Bull Sugarfree.

Sensory Evaluation

For all samples the color and flavor were documented by the analyst and a second independent trained taster.

Before tasting the tasters discussed the upcoming series of samples and tasted samples with the predetermined attributes with varying intensities to find commonality for the description. Four trained tasters blind taste tested independently all samples of a series. They were allowed to re-taste and made notes for the sensory attributes perceived including the relative intensity.

In the last step the attributes noted were discussed openly to find an agreeable description. In case that more than 1 taster disagreed with the description, the tasting was repeated.

Results

TABLE 258.1

Sensory evaluation of Stevia derived MRP with Spirulina I

| Color | Odor | Taste* | Taste Profile in RB sugarfree** |
|---|---|---|---|
| Dark brown | Marzipan | Intensive sweet, protein aftertaste protein aftertaste | Increased mouth-feeling, marzipan notes, |

*after dilution 1:100
**compared to control sample without added Stevia derived MRP

TABLE 258.2

Sensory evaluation of *Stevia* derived MRP with Spirulina II

| Color | Odor | Taste* | Taste Profile in RB sugarfree** |
|---|---|---|---|
| Dark brown | Marzipan | Intensive sweet, Slight protein aftertaste | Increased mouth-feeling, marzipan notes, Slight protein aftertaste |

*after dilution 1:100
**compared to control sample without added *Stevia* derived MRP In both experiments with spirulina, the blue color changed irreversibly to brown.

TABLE 258.3

Sensory evaluation of *Stevia* derived MRP with Milk protein

| Color | Odor | Taste* | Taste Profile in RB sugarfree** |
|---|---|---|---|
| Light brown | Grass, heated milk | Sweet, heated milk | Increased mouth-feeling, slight milk note notes, harmonic |

*after dilution 1:100
**compared to control sample without added Stevia derived MRP Conclusions:

Compositions comprising MRPs prepared by use of proteins from various sources have a substantial effect on the sensory properties of *Stevia* derived MRPs. The product can be used in food or beverage as a flavor or a sweetener to enhance the taste, mouthfeel and/or aroma of the final product. The ratio of protein, peptide, or combination of protein and peptide added can be in the range of from about 0.1% to about 99.5% on weight to weight basis based on the total amount of starting material. The examples can be extended to other types of sugar donors, sweetening agent, and protein/peptides.

Example 259

MRP with Varying Ratios of *Stevia* Composition

Materials:

D-(−)-Fructose, Lot #BCBC1225, Sigma Aldrich

L(+)-Lysine, Lot #0001442572, Sigma Aldrich

Steviol glycosides (referred to as SGA): combination of GSGs and SGs, Lot #3070301

Conditions:

Solution: Phosphate buffer, 0.2 M, pH 8.0

Heating Type: Drying oven, 100° C.

Heating Time: 2 h

Sensory Evaluation

Before tasting the tasters discussed the upcoming series of samples and tasted regular samples (without added flavor) to find a commonality for description. Thereafter the flavored samples were tasted at the use level to find a common description for how to describe the flavors (taste, smell, intensity).

Four trained tasters blind taste tested independently all samples of a series. They were allowed to re-taste and made notes for the sensory attributes perceived.

In the last step the attributes noted were discussed openly to find an agreeable description. In case that more than 1 taster disagreed with the description, the tasting was repeated.

TABLE 259.1

| Sample | Color | Flavor |
|---|---|---|
| 1% 10 mM Lys + 100% 10 mM Fru | Yellow | Sweet, caramel-like |
| 10% 10 mM Lys + 100% 10 mM Fru | Yellow | Sweet, caramel-like |
| 50% 10 mM Lys + 100% 10 mM Fru | Yellow | Popcorn, sweet |
| 100% 10 mM Lys + 100% 10 mM Fru | Yellow | Popcorn, sweet |
| 100% 10 mM Lys + 1% 10 mM Fru | Light yellow | Yeast, Umami |
| 100% 10 mM Lys + 10% 10 mM Fru | Light yellow | Sweet, Yeast, Umami |
| 100% 10 mM Lys + 50% 10 mM Fru | Light yellow | Popcorn, caramel-like |

TABLE 259.1-continued

| Sample | Color | Flavor |
|---|---|---|
| 100% 10 mM Lys + 100% 10 mM Fru + 1% SGA | Yellow | Sweet, caramel-like, harmonic |
| 100% 10 mM Lys + 100% 10 mM Fru + 10% SGA | Yellow | Sweet, honey, harmonic |
| 100% 10 mM Lys + 100% 10 mM Fru + 50% SGA | Yellow | Sweet, honey, flowery, harmonic |
| 100% 10 mM Lys + 100% 10 mM Fru + 100% SGA | Dark yellow | Honey, Flowery |
| 100% 10 mM Lys + 100% 10 mM Fru + 200% SGA | Dark yellow | Honey, Flowery, |
| 100% 10 mM Lys + 100% 10 mM Fru + 400% SGA | Dark yellow | Honey, herbal |
| 100% 10 mM Lys + 100% 10 mM Fru + 600% SGA | Light brown | Honey, herbal |
| 100% 10 mM Lys + 100% 10 mM Fru + 1000% SGA | Light brown | Herbal (dried green spices) |

Conclusions: By changing the ratio of sweetening agent, such as steviol glycosides in the composition, *Stevia*-derived MRPs could create different types of sweetness and aroma profile of products. All these types of products can be used as a flavor or as a sweetener for food, beverage, feed, cosmetic or a pharmaceutical. The type and amount of sugar donor, amine donor, sweetening agent, the reaction condition such as reaction time, temperature, PH value etc. can be varied as per the desired requirement of the final product.

Example 260

Effects of Different Reaction Time

Introduction

The following examples were prepared to investigate the influence of the reaction time on the sensory properties of *Stevia* derived MRPs (using combinations of GSGs and SGs).

Material and Methods

Materials:

D-(−)-Fructose, Lot #BCBC1225, Sigma Aldrich, D-Xylose, ≥99%, Sigma-Aldrich, STBG7912, L(+)-Lysine, Lot #0001442572, Sigma Aldrich, *Stevia* composition (referred as ZO): combination of GSGs and SGs, Lot #3070301

Gröbi Orange (18122.8 GO 1.5 G; 28.09.19 (11:55), Drink Star GmbH)

Methods:

Sample Preparation

Samples were dissolved as provided in Table 260.1 in 10 mL phosphate buffer (0.2 M, pH 7.0), heated to 120° C. for 10-120 minutes, cooled down to room temperature and sensory analysis was conducted.

TABLE 260.1

Sample No, Composition and heating time at 120° C.

| Sample No. | Sample | Heating Time |
|---|---|---|
| 1 | 10 mM Lys + 10 mM Fru + 1 g ZO | 10 min |
| 2 | 10 mM Lys + 10 mM Fru + 1 g ZO | 20 min |
| 3 | 10 mM Lys + 10 mM Fru + 1 g ZO | 30 min |
| 4 | 10 mM Lys + 10 mM Fru + 1 g ZO | 45 min |
| 5 | 10 mM Lys + 10 mM Fru + 1 g ZO | 60 min |
| 6 | 10 mM Lys + 10 mM Fru + 1 g ZO | 90 min |
| 7 | 10 mM Lys + 10 mM Fru + 1 g ZO | 120 min |
| 8 | 10 mM Lys + 10 mM Xyl + 1 g ZO | 10 min |
| 9 | 10 mM Lys + 10 mM Xyl + 1 g ZO | 20 min |
| 10 | 10 mM Lys + 10 mM Xyl + 1 g ZO | 30 min |

TABLE 260.1-continued

Sample No, Composition and heating time at 120° C.

| Sample No. | Sample | Heating Time |
|---|---|---|
| 11 | 10 mM Lys + 10 mM Xyl + 1 g ZO | 45 min |
| 12 | 10 mM Lys + 10 mM Xyl + 1 g ZO | 60 min |
| 13 | 10 mM Lys + 10 mM Xyl + 1 g ZO | 90 min |
| 14 | 10 mM Lys + 10 mM Xyl + 1 g ZO | 120 min |

The *Stevia*-derived MRPs were then added at the concentrations given in FIGS. 275 through 284 to sugar-free beverages to investigate the increase of sweetness when compared to the beverage without added *Stevia*-derived MRPs.

Sensory Evaluation

For all samples the color and flavor were documented by the analyst and a second independent trained taster.

Before tasting the tasters discussed the upcoming series of samples and tasted samples with the predetermined attributes (sweetness) with varying intensities to find commonality in description. The intensity was rated on 0 (no increase)-5 (intensive) scale. Four trained tasters blind taste tested independently all samples of a series. They were allowed to re-taste and made notes for the sensory attributes perceived including the intensity.

In the last step the attributes noted were discussed openly to find and acceptable description. In case that more than 1 taster disagreed with the description, the tasting was repeated.

Results

TABLE 260.2

Sensory test results for the color and flavor (odor) of *Stevia*-derived MRPs (Lys/Fru/Zo) with increasing heating times

| Sample No. | Color* | Sweet | Honey | Herbal | Flowery |
|---|---|---|---|---|---|
| 1 | Yellow 1 | 4 | 0 | 0 | 0 |
| 2 | Yellow 1 | 3 | 0 | 0 | 0 |
| 3 | Yellow 2 | 2 | 1 | 0 | 0 |
| 4 | Yellow 2 | 1 | 2 | 2 | 0 |
| 5 | Yellow 3 | 0 | 3 | 2 | 0 |
| 6 | Yellow 3 | 0 | 4 | 0 | 2 |
| 7 | Yellow 3 | 0 | 4 | 0 | 2 |

*Numbers indicate intensity of color

FIG. 275 is a graphical description of the sensory test results for the flavor (odor) of *Stevia*-derived MRPs (Lys/Fru/Zo) with increased heating time.

TABLE 260.3

Sensory test results for the color and flavor (odor) of *Stevia*-derived MRPs (Lys/Xyl/Zo) with increasing heating times

| Sample No. | Color* | Sweet | Honey | Flowery |
|---|---|---|---|---|
| 8 | Yellow 1 | 2 | 0 | 3 |
| 9 | Yellow 1 | 3 | 0 | 3 |
| 10 | Yellow 2 | 4 | 0 | 2 |
| 11 | Yellow 2 | 4 | 0 | 1 |
| 12 | Yellow 3 | 5 | 1 | 0 |
| 13 | Yellow 4 | 5 | 2 | 0 |
| 14 | Yellow 5 | 5 | 3 | 0 |

*Numbers indicate intensity of color

FIG. 276 is a graphical description of the sensory test results for the flavor (odor) of *Stevia*-derived MRPs (Lys/Xyl/Zo) with increased heating times.

TABLE 260.4

Sensory test results for the taste of *Stevia*-derived MRPs (Lys/Fru/Zo) with increasing heating times

| Sample No. | Sweet | Herbal | Flowery | Bitterness |
|---|---|---|---|---|
| 1 | 4 | 0 | 0 | 1 |
| 2 | 4 | 0 | 0 | 1 |
| 3 | 4 | 0 | 0 | 1 |
| 4 | 4 | 2 | 1 | 2 |
| 5 | 3 | 3 | 1 | 2 |
| 6 | 3 | 1 | 3 | 2 |
| 7 | 3 | 0 | 3 | 2 |

FIG. 277 is a graphical description of sensory test results for the taste of *Stevia*-derived MRPs (Lys/Fru/Zo) with increased heating time.

TABLE 260.5

Sensory test results for the taste of *Stevia*-derived MRPs (Lys/Xyl/Zo) with increasing heating times

| Sample No. | Sweet | Honey | Bitterness |
|---|---|---|---|
| 8 | 4 | 0 | 0 |
| 9 | 4 | 1 | 1 |
| 10 | 4 | 2 | 1 |
| 11 | 4 | 3 | 0 |
| 12 | 4 | 3 | 0 |
| 13 | 3 | 4 | 1 |
| 14 | 3 | 4 | 2 |

FIG. 278 is a graphical description of sensory test results for the taste of *Stevia*-derived MRPs (Lys/Xyl/Zo) with increased heating times.

FIG. 279 and FIG. 280 provide comparison of added amounts of *Stevia*-derived MRPs (Lys/Fru/ZO) with different heating times and the perceived added sweetness.

FIG. 281 and FIG. 282 provide comparison of added amounts of *Stevia*-derived. MRPs (Lys/Xyl/ZO) with different heating times and the perceived added sweetness.

FIG. 283 provides comparison of added amounts of *Stevia*-derived (Lys/Fru/ZO) with different heating times and the perceived added sweetness.

FIG. 284 provides comparison of added amounts of *Stevia*-derived MRPs (Lys/Xyl/ZO) with different heating times and the perceived added sweetness.

Conclusions

When heating a *Stevia*-derived. MRP comprised of Lysine/Fructose/*Stevia* composition for different time periods (10-120 min at 120° C.) the color increases and the odor changes substantially from sweet to honey, then herbal and finally flowery notes. The taste changes from solely sweet to herbal/flowery sweet with a slight, palatable bitterness.

When heating a *Stevia*-derived MRP comprised of Lysine/Xylose/*Stevia* composition for different time periods (10-120 min at 120° C.) the color increases and the odor changes substantially from sweet/flowery to sweet/honey. The taste changes from solely sweet to honey/sweet with a slight, palatable bitterness.

When adding *Stevia*-derived MRPs comprised of Lysine/Fructose/*Stevia* composition with different heating times (10-120 min at 120° C.) to a sugar-free beverage at different concentrations the perceived sweetness changes depending from the concentration added and the heating time. In all cases investigated the perceived sweetness is significantly higher when compared to the reference (no *Stevia*-derived MRP added).

When adding *Stevia*-derived MRPs comprised of Lysine/Xylose/*Stevia* composition with different heating times (10-120 min at 120° C.) to a sugar-free beverage at different concentrations the perceived sweetness changes depending from the concentration added and the heating time. In all cases investigated the perceived sweetness is significantly higher when compared to the reference (no *Stevia*-derived MRP added).

This example showed different flavor profiles could be obtained from change of reaction temperature for compositions of sugar donor, amine donor and sweetening agent. The example can be extended to different composition of sugar donor, amine donor and sweetening agent. Any composition selected from sugar donor, amine donor, sweetening agent can be in the range of from about 0.1% to about 99.9% in the initial preparation materials for the Maillard reaction. The reaction conditions can be adjusted to achieve a desired flavor profile. For instance, the PH value can vary from 1 to 14, the temperature range can be from 0 to 200 degrees centigrade or higher, preferably from about 10 to about 180 centigrade, more preferably for about 40 to about 120 centigrade. Reaction time can be from a few seconds to few days, more preferably a few hours.

Example 261

Investigations with *Stevia*-Derived MRPs, NHDC and Thaumatin

Introduction

This example demonstrated addition of NHDC, NHDC and thaumatin in the product, especially in the reaction, enhanced the taste profile of products.

Material and Methods

Materials

D-Xylose, >99%, STBG7912, Sigma Aldrich; DL-Phenylalanine, 98%, Lot #51K1696, Sigma Aldrich; *Stevia* composition (referred as SGA): Combination of GSGs and SGs, Lot #3070301; *Stevia* extract TSG95, Lot #20180413; EPCalin, 45%, Lot #20180201; Neohesperidine dihydrochalcone (NHDC) (>96%, Lot #MKBT9446V, Sigma Aldrich)

Redbull sugarfree, SEGLS 04AT, 8L91B19C; PR: 06.03.19/18:07N 3, EX: 06.03.20/173113

Sample Preparation

*Stevia*-derived MRPs (Reference): 0.67 g xylose, 0.33 g phenylalanine and 4 g *Stevia* extract TSG95 were dissolved in 2.5 g deionized water. The solution was heated at about 100° C. for 2 h, After the reaction was complete, the slurry was diluted with 25 g water.

*Stevia*-derived MRPs by Combination of GSGs and SGs: 0.67 g xylose, 0.33 phenylalanine, 4 g SGA(Combination of GSGs and SGs) were dissolved in 2.5 g deionized water. The solution was heated at about 100° C. for 2 h. After the reaction was complete, the slurry was diluted with 25 g water.

*Stevia*-derived MRPs by Combination of GSGs and SGs and NHDC: 0.67 g xylose, 0.33 g phenylalanine, 4 g SGA (Combination of GSGs and SGs) and 3 ppm (=82.5 μg) NHDC were dissolved in water. The solution was heated at about 100° C. for 2 h. After the reaction was complete, the slurry was diluted with 25 g water.

*Stevia*-derived MRPs by SGA (Combination of GSGs and SGs), NHDC and Thaumatin: 0.67 g xylose, 0.33 g phenylalanine, 4 g SGA (Combination of GSGs and SGs), 3 ppm (=82.5 μg) NHDC and 5 ppm (=302.5 μg EPCalin 45%), Thalmann were dissolved in 2.5 g deionized water. The solution was heated at about 100° C. for 2 h. After the reaction was complete, the slurry was diluted with 25 g water.

150 μl of the each sample was added to 100 ml Redbull sugar free and mixed. The taste profiles of the samples were compared. As a control, a RedBull sugar free sample without the addition of Steviaroma was used.

Sensory Evaluation

For all samples the color and flavor were documented by the analyst and a second independent trained taster.

Before tasting the tasters discussed the upcoming series of samples and tasted samples with predetermined attributes with varying intensities to find a commonality in description. Four trained tasters blind taste tested independently all samples of a series. They were allowed to re-taste and made notes for the sensory attributes perceived including the relative intensity.

In the last step the attributes noted were discussed openly to find an acceptable description. In case that more than 1 taster disagreed with the description, the tasting was repeated.

Results

TABLE 261.1

Color and Smell of the *Stevia* derived MRP samples

| Sample | Color | Smell |
|---|---|---|
| *Stevia* derived MRP (Reference) | Brown | Intensive Flowery, pleasant |
| *Stevia* derived MRP by SGA (Combination of GSGs and SGs) | Brown | Flowery, slightly acidic, pleasant |
| *Stevia* derived MRP by SGA (Combination of GSGs and SGs)/ NHDC | Brown | Flowery, slightly acidic, pleasant |
| *Stevia* derived MRP by SGA (Combination of GSGs and SGs)/ NHDC/Thaumatin | | Flowery, slightly acidic, pleasant |

TABLE 261.2

Sensory Evaluation of *Stevia* derived MRP samples

| Sample | Sweet | Flowery | Fruity/ Sour | Lingering |
|---|---|---|---|---|
| *Stevia* derived MRP (Reference) | 4 | 4 | 1 | 3 |
| *Stevia* derived MRP by SGA(Combination of GSGs and SGs) | 3 | 3 | 2 | 2 |
| *Stevia* derived MRP by SGA(Combination of GSGs and SGs)/NHDC | 3 | 3 | 3 | 2 |
| *Stevia* derived MRP by SGA(Combination of GSGs and SGs)/NHDC/Thaumatin | 4 | 3 | 3 | 3 |

TABLE 261.3

Sensory Evaluation of *Stevia* derived MRP samples in Red Bull Sugarfree

| Sample | Taste profile |
|---|---|
| Control (RB Sugar Free) | Typical for RB sugarfree, Sweet (4), harmonic (2), slightly metallic, poor mouth-feeling (2), acidic (4) |
| *Stevia* derived MRP (Reference) | Sweet (7), increased mouth-feeling (3), harmonic (3), acidic (4) |
| Stevia derived MRP by SGA(Combination of GSGs and SGs) | Sweet (6), increased mouth-feeling (3), harmonic (3), less acidic (3) |
| *Stevia* derived MRP by SGA(Combination of GSGs and SGs)/NHDC | Sweet (6), increased mouth-feeling (4), harmonic (4), less acidic (3) |
| *Stevia* derived MRP by SGA(Combination of GSGs and SGs)/NHDC/Thaumatin | Lingering Sweet (6), increased mouth-feeling (4), harmonic (4), acidic (4), |

The shaded portions was ranked best by 4 out of 4 tasters

Conclusion

The comparison of *Stevia* derived MRPs prepared with different SGs (*Stevia* extract or a combination of GSGs and SGs) yielded different sensor profiles as seen in Table 2. All samples can be used for enhancing taste, mouthfeel, or aroma of food or beverage products. The products that included the addition of NHDC or NHDC/Thaumatin before heating the sample mixture can be used for flavor or as a sweetener to enhance the taste, mouthfeel, or aroma of the food or beverage products.

When adding the different samples to a sugarfree beverage, again the source of *Stevia* Components including types of steviol glycosides, non-steviol glycosides substances such as volatile and non-volatile substances provide different taste profiles as seen in Table 3. Addition of NHDC improved the mouth-feel and harmony of taste impression yielding a substantially improved taste profile. Addition of NHDC/Thaumatin yielded an improved flavor profile with slight lingering sweetness.

This example showed that adding a dihydrochalcone, such as NHDC or its combination with a sweetener enhancer such as Thaumatin in the MRPs system, can enhance the taste, monthfeel and aroma of the products. The added amount of NHDC and its combination with Thaumatin in the formulation can be in the range of from about 0.1 ppm to about 99.5%.

This example can be extended to other dihydrochalcone glycosides, such as glycyphllin, pholorizin, trilobatin, naringin dihydrochalcone, and other dihydroflavoids.

Example 262

Different Ratios of Amino Acids and Reducing Sugar

Introduction

The following examples were prepared to investigate the effect of different ratios of amino acid donors to reducing sugars on the sensory properties of MRPs in a model example for lysine and fructose. in a second series of examples the effect of different amounts of steviol-glycosides were added to the model system described above for evaluation of the sensory properties of *Stevia*-derived MRPs.

Material and Methods

Materials:

D-(−)-Fructose, Lot #BCBC1225, Sigma Aldrich

L(+)-Lysine, Lot #0001442572, Sigma Aldrich

*Stevia* composition (referred as SGA): Combination of GSGs and SGs, Lot #3070301

Results

TABLE 262.1

Sensory test results for varying ratios of lysine:fructose

| Sample | Color | Flavor (10-point intensity scale) | | | |
|---|---|---|---|---|---|
| | | Sweet | Caramel-like | Pop-corn | Umami |
| 0.01 mM Lys + 10 mM Fru | Yellow | 2 | 4 | 0 | 0 |
| 1 mM Lys + 10 mM Fru | Yellow | 3 | 3 | 0 | 0 |
| 5 mM Lys + 10 mM Fru | Yellow | 4 | 1 | 1 | 0 |
| 10 mM Lys + 10 mM Fru | Yellow | 5 | 1 | 3 | 0 |
| 10 mM Lys + 5 mM Fru | Light yellow | 3 | 1 | 1 | 1 |
| 10 mM Lys + 1 mM Fru | Light yellow | 2 | 0 | 0 | 2 |
| 10 mM Lys + 0.01 mM Fru | Light yellow | 1 | 0 | 0 | 3 |

FIG. 285 is a graphical representation of senso es results for varying ratios of lysine, fructose.

TABLE 262.2

Sensory test results for varying ratios of *Stevia* composition (SGA: Combination of GSGs and SGs) added to fixed ratio of lysine/fructose

| Sample | Color | Flavor (10-point intensity scale) | | | | | |
|---|---|---|---|---|---|---|---|
| | | Sweet | Caramel | Honey | Flowery | Herbal | Kokumi |
| 10 mM Lys + 10 mM Fru | Yellow | 5 | 1 | 0 | 0 | 0 | 3 |
| 10 mM Lys + 10 mM Fru + 0.01 mM SGA* | Yellow | 5 | 3 | 0 | 0 | 0 | 5 |
| 10 mM Lys + 10 mM Fru + 1 mM SGA | Yellow | 5 | 0 | 3 | 0 | 0 | 6 |
| 10 mM Lys + 10 mM Fru + 5 mM SGA | Yellow | 6 | 0 | 3 | 2 | 0 | 6 |
| 10 mM Lys + 10 mM Fru + 10 mM SGA | Dark yellow | 6 | 0 | 4 | 3 | 0 | 7 |
| 10 mM Lys + 10 mM Fru + 20 mM SGA | Dark yellow | 7 | 0 | 4 | 4 | 0 | 6 |
| 10 mM Lys + 10 mM Fru + 40 mM SGA | Dark yellow | 8 | 0 | 5 | 1 | 2 | 6 |
| 10 mM Lys + 10 mM Fru + 60 mM SGA | Light brown | 8 | 0 | 4 | 1 | 3 | 5 |
| 10 mM Lys + 10 mM Fru + 80 mM SGA | Light brown | 9 | 0 | 3 | 0 | 3 | 5 |
| 10 mM Lys + 10 mM Fru + 100 mM SGA | Light brown | 9 | 0 | 1 | 0 | 5 | 4 |

*Molar weight of *Stevia* composition [Combination of GSGs and SGs, marked as SGA] was estimated to 1270 g/mol Methods:

Sample Preparation

Samples were dissolved as provided in Tables 1 and 2 in 10 mL phosphate buffer (0.2 M, pH 8.0) and heated to 100° C. for 2 hours.

Sensory Evaluation

Before tasting the tasters discussed the upcoming series of samples and tasted samples with predetermined attributes (sweet, caramel, popcorn, umami, honey, flowery, herbal (dried green spices), kokumi [series 2]) with varying intensities to find commonality in description. The intensity was rated on 0 (none)-5 (medium)-10 (intensive) scale. Four trained tasters blind taste tested independently all samples of a series. They were allowed to re-taste and made notes for the sensory attributes perceived including the intensity.

In the last step the attributes noted were discussed openly to find an acceptable description. In case that more than 1 taster disagreed with the description, the tasting was repeated.

FIG. 286 is a graphical representation of sensory test results for varying ratios of SGA added to fixed ratio of lysine/fructose.

Conclusions

Varying ratios of lysine: fructose yield, under the same conditions, (temperature, pH-value and duration of heating) MRPs with substantial different sensory properties. Not only the intensity but also the basic sensory type changes surprisingly. For example, at a ratio of 1:100 for lysine: fructose the MRPs' taste and smell is caramel/sugar-like whereas a ratio of 100:1 provides Umami smell/taste.

When adding increasing amounts of sweetening agent, such as a *Stevia* composition (for instance, a combination of GSGs and SGs) the sensory properties change gradually from sweet/caramel-like (no Combination of GSGs and SGs) to honey/fowery [ratio IMP: (*Stevia* composition:

Combination of GSGs and SGs) is 1:1-1:2] and finally to herbal notes [ratio MRP: *Stevia* composition (Combination of GSGs and SGs) is 1:10]. This test shows that (a) addition of sweetening agent, such as a combination of G-SG-s and SGs provides *Stevia*-derived MRPs with unique sensory properties and (b) different amounts of sweetening agents, such as combinations of GSGs and SGs added to a fixed ratio of lysine: fructose yield different sensory properties of the resulting *Stevia*-derived MRPs.

find a commonality for description, Thereafter the flavored samples were tasted at the use level to find an acceptable description of the flavors (taste, smell, intensity).

Four trained tasters blind tasted tested independently all samples of a series. They were allowed to re-taste and made notes for the sensory attributes perceived.

In the last step the attributes noted were discussed openly to find an acceptable description. In case that more than 1 taster disagreed with the description, the tasting was repeated.

TABLE 263.1

| No. | Sample, 10 ml | Heating time, min | Color | Flavor | Taste |
|---|---|---|---|---|---|
| 1 | 10 mM Lys + 10 mM Fru + 100 mg SGA | 10 | Yellow | Sugar Sweet | Sweet, no bitterness |
| 2 | 10 mM Lys + 10 mM Fru + 100 mg SGA | 20 | Yellow | Sugar Sweet | Sweet, slightly bitter |
| 3 | 10 mM Lys + 10 mM Fru + 100 mg SGA | 30 | Yellow | Sweet, honey | Sweet, slightly bitter |
| 4 | 10 mM Lys + 10 mM Fru + 100 mg SGA | 45 | Yellow | Sweet, herbal | Sweet, slightly bitter, herbal flavor |
| 5 | 10 mM Lys + 10 mM Fru + 100 mg SGA | 60 | Yellow | Herbal (Peppermint) | Sweet, slightly bitter, herbal flavor |
| 6 | 10 mM Lys + 10 mM Fru + 100 mg SGA | 90 | Yellow | Herbal, honey | Sweet, slightly bitter, flowery flavor |
| 7 | 10 mM Lys + 10 mM Fru + 100 mg SGA | 120 | Intensive yellow | Flowery, honey | Sweet, slightly bitter, flowery flavor |
| 8 | 10 mM Lys + 10 mM Xyl + 100 mg SGA | 10 | Yellow | Sweet, flowery | Sweet, no bitterness |
| 9 | 10 mM Lys + 10 mM Xyl + 100 mg SGA | 20 | Yellow | Plant oil, pungent | Sweet, slightly bitter |
| 10 | 10 mM Lys + 10 mM Xyl + 100 mg SGA | 30 | Yellow | Sugar Sweet | Sweet, slightly bitter |
| 11 | 10 mM Lys + 10 mM Xyl + 100 mg SGA | 45 | Yellow | Sugar sweet | Sweet, no bitterness, sugar candy flavor |
| 12 | 10 mM Lys + 10 mM Xyl + 100 mg SGA | 60 | Yellow | Sweet, honey | Sweet, no bitterness, honey flavor |
| 13 | 10 mM Lys + 10 mM Xyl + 100 mg SGA | 90 | Intensive yellow | Honey | Sweet, slightly bitter, honey flavor |
| 14 | 10 mM Lys + 10 mM Xyl + 100 mg SGA | 120 | Light brown | Honey | Sweet, slightly bitter, honey flavor |

The results showed that different compositions used in the Maillard reaction, either combinations of sugar donor and amine donors, or combination of sugar donors, amine donors, and sweetening agent could result in different tasting and aroma products. All products could be used as a flavor or sweetener. This example can be extended to any types of sugar donor, amine donor, or sweetening agent. The ratio of every ingredient used in the composition can be in the range of from about 0.1 to about 99.5%.

Example 263

Effect of Different Reaction Time

Materials:

D-H-Fructose, Lot #BCBC1225, Sigma Aldrich

L(±)-Lysine, Lot #0001442572, Sigma Aldrich

*Stevia* composition (Referred as SGA): combination of GSGs and SGs, Lot #3070301

Xylose: commercial sample sent by EPC

Conditions:

Solution: Water

Heating Type: Drying oven, 120° C.

Heating time: different (from 10 to 120 min)

Sensory Evaluation

Before tasting the tasters discussed the upcoming series of samples and tasted regular samples (without added flavor) to Taste impression of the obtained MRPs in soft beverage Materials: Gröbi Orange (181228 GO 1.5 G; 28.09.19 (11:55), Drink Star GmbH)

To determine the potential sweetness potency of the prepared MRPs and the effect of the heating time on their sweetness, the following concentrations of the MRPs were added to the soft beverage Gröbi Orange and sensory evaluated (see Experiments 1-3)[1].

TABLE 263.2

| Experiment 1 | | | |
|---|---|---|---|
| Beverage sample, 50 ml | MRP Sample | Concentration, ppm | Sensory evaluation |
| 1 | 1 (Lys + Fru + SGA, 10') | 8000 | ++++ |
| 2 | 2 (Lys + Fru + SGA, 20') | 7000 | ++++ |
| 3 | 3 (Lys + Fru + SGA, 30') | 6000 | +++ |
| 4 | 4 (Lys + Fru + SGA, 45') | 5000 | +++ |
| 5 | 5 (Lys + Fru + SGA, 60') | 4000 | ++ |
| 6 | 6 (Lys + Fru + SGA, 90') | 3000 | ++ |
| 7 | 7 (Lys + Fru + SGA, 120') | 2000 | + |

TABLE 263.2-continued

| Experiment 1 | | | |
|---|---|---|---|
| Beverage sample, 50 ml | MRP Sample | Concentration, ppm | Sensory evaluation |
| 8 | 8 (Lys + Xyl + SGA, 10') | 8000 | ++++ |
| 9 | 9 (Lys + Xyl + SGA, 20') | 7000 | ++++ |
| 10 | 10 (Lys + Xyl + SGA, 30') | 6000 | +++ |
| 11 | 11 (Lys + Xyl + SGA, 45') | 5000 | +++ |
| 12 | 12 (Lys + Xyl + SGA, 60') | 4000 | ++ |
| 13 | 13 (Lys + Xyl + SGA, 90') | 3000 | ++ |
| 14 | 14 (Lys + Xyl + SGA, 120') | 2000 | + |

[1]++++—strong sweet; +++—sweet; ++—light sweet; +—the same sweetness with the reference (beverage without MRPs)

TABLE 263.3

| Experiment 2 | | | |
|---|---|---|---|
| Beverage sample, 50 ml | MRP Sample | Concentration, ppm | Sensory evaluation |
| 1 | 1 (Lys + Fru + SGA, 10') | 2000 | + |
| 2 | 2 (Lys + Fru + SGA, 20') | 3000 | ++ |
| 3 | 3 (Lys + Fru + SGA, 30') | 4000 | ++ |
| 4 | 4 (Lys + Fru + SGA, 45') | 5000 | +++ |
| 5 | 5 (Lys + Fru + SGA, 60') | 6000 | +++ |
| 6 | 6 (Lys + Fru + SGA, 90') | 7000 | ++++ |
| 7 | 7 (Lys + Fru + SGA, 120') | 8000 | ++++ |
| 8 | 8 (Lys + Xyl + SGA, 10') | 2000 | + |
| 9 | 9 (Lys + Xyl + SGA, 20') | 3000 | ++ |
| 10 | 10 (Lys + Xyl + SGA, 30') | 4000 | ++ |
| 11 | 11 (Lys + Xyl + SGA, 45') | 5000 | +++ |
| 12 | 12 (Lys + Xyl + SGA, 60') | 6000 | +++ |
| 13 | 13 (Lys + Xyl + SGA, 90') | 7000 | ++++ |
| 14 | 14 (Lys + Xyl + SGA, 120') | 8000 | ++++ |

TABLE 263.4

| Experiment 3 | | | |
|---|---|---|---|
| Beverage sample, 50 ml | MRP Sample | Concentration, ppm | Sensory evaluation |
| 1 | 1 (Lys + Fru + SGA, 10') | 4000 | ++ |
| 2 | 2 (Lys + Fru + SGA, 20') | 4000 | ++ |
| 3 | 3 (Lys + Fru + SGA, 30') | 4000 | ++ |
| 4 | 4 (Lys + Fru + SGA, 45') | 4000 | ++ |
| 5 | 5 (Lys + Fru + SGA, 60') | 4000 | ++ |
| 6 | 6 (Lys + Fru + SGA, 90') | 4000 | ++ |
| 7 | 7 (Lys + Fru + SGA, 120') | 4000 | ++ |
| 8 | 8 (Lys + Xyl + SGA, 10') | 4000 | ++ |
| 9 | 9 (Lys + Xyl + SGA, 20') | 4000 | ++ |
| 10 | 10 (Lys + Xyl + SGA, 30') | 4000 | ++ |
| 11 | 11 (Lys + Xyl + SGA, 45') | 4000 | ++ |
| 12 | 12 (Lys + Xyl + SGA, 60') | 4000 | ++ |
| 13 | 13 (Lys + Xyl + SGA, 90') | 4000 | ++ |
| 14 | 14 (Lys + Xyl + SGA, 120') | 4000 | ++ |

Conclusion: Different compositions of sugar donor, amine donor, and sweetening agent under different reaction times during the Maillard reaction can create different tastes and aroma profile of the products. The products can be used for food, beverage, feed, cosmetics or in the pharmaceutical industry as a flavor or a sweetener. This example can be extended to any composition of sugar donor, amine donor and sweetening agent. The reaction temperature can vary from about 0 to about 200° centigrade, preferably from about 20 to about 180° centigrade. The PH value can vary from 1 to about 14, and the reaction time can vary from a few seconds to few days.

Example 264

Preparation and Sensory Analysis of Reacted *Stevia*-Derived MRPs Samples as Well as MRPs with and without Steviol Glycosides Aim: determine whether the addition of steviol glycosides to the samples before heating has a different effect than the addition of *Stevia* extracts to the samples after heating.

Materials:

D-Galactose, >99%, Lot #0391(00592V, Sigma-Aldrich

D-Xylose, >99%, STBG7912, Sigma Aldrich

L(±)-Glutamic acid, 58198, Merck

DL-Phenylalanine, 98%, Lot #51K1696, Sigma Aldrich

L-Proline, puriss, 11662, Loba Chemie

D-Valine, 98%, Lot #20H0295, Sigma Aldrich

Propylene glycol, ≥99.5%, Lot #MKBH3622V, Sigma Aldrich

Steviol glycosides (referred as Awesome-01, containing big molecules of steviol glycosides), Lot #20180702-11

Steviol glycosides (referred as Awesome SG95-01), Lot #20180501-1

RA80/TSG95, Lot #CT001/10-120901

Steviol glycosides (referred as Suprema TSG95), Lot #20180413

TABLE 264.1

Preparation methods of Reacted *Stevia*-derived MRPs, MRP and MRP + SG samples

| Sample | Preparation methods<br>1<br>Reacted *Stevia*-derived MRPs | 2<br>MRP | 3<br>MRP + SG[2] |
|---|---|---|---|
| Flora | 0.67 g xylose, 0.33 g phenylalanine and 4 g Suprema TSG95 were dissolved in 2.5 g deionized water. The solution was heated at about 100° C. for 2 h. After the reaction, the slurry was diluted by 25 g water. | 0.67 g xylose and 0.33 g phenylalanine were dissolved in 2.5 g deionized water. The solution was heated at about 100° C. for 2 h. After the reaction, the slurry was diluted by 25 g water. | 12.5 ml MRP + 2 g Suprema TSG95 |
| Tangerine | 0.8 g galactose, 1 g glutamic acid and 10 g Awesome SG95-01 is dissolved in 4 g deionized water. The solution was heated at about 100° C. for 2 h. After the reaction, the slurry was diluted by 25 g water. | 0.8 g galactose and 1 g glutamic acid were dissolved in 4 g deionized water. The solution was heated at about 100° C. for 2 h. After the reaction, the slurry was diluted by 25 g water. | 12.5 ml MRP + 5 g Awesome SG95-01 |
| Popcorn | 1 g galactose, 0.5 g proline and 3.5 g Awesome-01 were dissolved in 2.5 g deionized water. The solution was heated at about 100° C. for 3 h. After the reaction, the slurry was diluted by 25 g water. | 1 g galactose and 0.5 g proline were dissolved in 2.5 g deionized water. The solution was heated at about 100° C. for 3 h. After the reaction, the slurry was diluted by 25 g water. | 12.5 ml + 1.75 g Awesome-01 |
| Chocolate | 1 g xylose, 0.5 g valine and 3.5 g RA80/TSG95 were dissolved in 2.5 g deionized water. 0.5 g propylene glycol was added to the reaction mixture. The solution was heated at about 120° C. for 45 min. After the reaction, the slurry was diluted by 25 g water. | 1 g xylose and 0.5 g valine were dissolved in 2.5 g deionized water. 0.5 g propylene glycol was added to the reaction mixture. The solution was heated at about 120° C. for 45 min. After the reaction, the slurry was diluted by 25 g water. | 12.5 ml MRP + 1.75 g RA80/TSG95 |

[2]SG-Steviol glycoside

TABLE 264.2

Sensory evaluation of flavoring samples

| Samples | Sensory characteristics | Preparation method<br>1<br>Reacted *Stevia*-derived MRPs | 2<br>MRP | 3<br>MRP + SG |
|---|---|---|---|---|
| Floral | Appearance, color | Dark brown | Cappuccino Brown, slight precipitate | Dark brown |
| | Odor | Intensive flowery | Less intensive flowery than 1 | Less intensive flowery than 1 More intensive flowery than 2 |
| | Taste[3] | Intensive sweet, flowery flavor | Slightly Sweet, slightly bitter, no flowery flavor | Intensive sweet, slightly bitter, Slightly less flowery flavor than 1 |
| Tangerine | Appearance, color | Orange, slightly turbid | Yellow, slightly turbid | Orange, slightly turbid |
| | Odor | Intensive fruity and sour | Unpleasant artificial | Fruity and Sour, slightly artificial |

TABLE 264.2-continued

Sensory evaluation of flavoring samples

| Samples | Sensory characteristics | Preparation method<br>1<br>Reacted *Stevia*-derived MRPs | 2<br>MRP | 3<br>MRP + SG |
|---|---|---|---|---|
| | Taste[2] | Intensive sweet, fruity | Unpleasant artificial | Intensive sweet, slightly bitter, slightly less fruity than 1 |
| Popcorn | Appearance, color | Brown | Dark brown | Dark brown |
| | Odor | Popcorn | Unpleasant artificial | Popcorn, Slighty artificial |
| | Taste[2] | Intensive sweet, Popcorn | Unpleasant, intensively artificial | Intensive sweet, Popcorn, slightly bitter, |
| Chocolate | Appearance, color | Dark brown | Dark brown, slight precipitate | Dark brown |
| | Odor | Intensive Chocolate | Less intensive Chocolate than 1, slightly artificial | Less intensive Chocolate than 1 More intensive Chocolate than 2 |
| | Taste[2] | Intensive sweet, Chocolate | Slightly Sweet, Slightly bitter, slight;y Chocolate | Intensive sweet, Chocolate, very slightly bitter |

Taste impression of Reacted *Srevia*-derived MRPs MRP and MRP-HSG in homemade lemonade Preparation of homemade lemonade:

Squeeze the lemons with a lemon squeezer

Dilute the obtained lemon juice 1:5 with water

Add to the lemonade 4% sugar

TABLE 264.3

Sensory evaluation

| Samples | | Amount [μl/100 ml lemonade] | Taste impression |
|---|---|---|---|
| Floral | Reacted *Stevia*-derived MRPs | 150 | Pleasant sweet, sour, flowery flavor |
| | MRP | 150 | Less sweet, sour, less flowery flavor than Reacted *Stevia*-derived MRPs |
| | MRP + SG | 150 | Sweeter than Reacted *Stevia*-derived MRPs, less flowery flavor than Reacted *Stevia*-derived MRPs but more than MRP |
| Tangerine | Reacted *Stevia*-derived MRPs | 150 | Pleasant sweet, sour, intensive *citrus* notes |
| | MRP | 150 | Less sweet, sour, less *citrus* notes than Reacted *Stevia*-derived MRPs |
| | MRP + SG | 150 | Sweeter than Reacted *Stevia*-derived MRPs, less *citrus* notes than Reacted *Stevia*-derived MRPs but more than MRP, slightly lingering |
| Popcorn | Reacted *Stevia*-derived MRPs | 150 | Pleasant sweet sour, slight burnt sugar |
| | MRP | 150 | Less sweet, sour, burnt sugar/Popcorn |
| | MRP + SG | 150 | Pleasant sweet, sour, burnt sugar/Popcorn |
| Chocolate | Reacted *Stevia*-derived MRPs | 150 | Pleasant sweet, sour, strong and long-lasting Chocolate |
| | MRP | 150 | Less sweet, sour, strong and long-lasting Chocolate |
| | MRP + SG | 150 | Sweeter than Reacted *Stevia*-derived MRPs, sour, strong Chocolate |

Taste impression of Reacted *Stevia*-derived MRPs, MRP and MRP+SG in ketchup without added sugar Materials:

Ketchup without added sugar “Felix”, 31.12.2019 L8352 11:48, P 17189/15

Felix Tomaten Ketchup mild, 31.01.2020 L9003 14:41, P17079/24

Sensory evaluation of original ketchup samples: Both samples have a pleasant sweet-sour taste, spicy. The sweetness potency is almost the same, but Felix Ketchup without sugar has another sweetness profile and slightly more sour taste.

TABLE 264.4

Sensory evaluation of the ketchup samples without added sugar with Reacted *Stevia*-derived MRPs, MRP and MRP + SG[4]

| Samples | | Amount [μl/100 g ketchup] | Taste impression |
|---|---|---|---|
| Tangerine | Reacted *Stevia*-derived MRPs | 75 | Pleasant sweet, more harmonic and natural, milder than reference (Original Ketchup without added sugar) |
| | MRP | 75 | Less sweet than the Reacted *Stevia*-derived MRPs sample, no flavor modifying effects |
| | MRP + SG | 75 | Sweeter than the Reacted *Stevia*-derived MRPs sample, very slightly more harmonic and natural |
| Popcorn | Reacted *Stevia*-derived MRPs | 85 | Pleasant sweet, more harmonic and natural, milder than reference (Original Ketchup without added sugar) |
| | MRP | 85 | Less sweet than the Reacted *Stevia*-derived MRPs sample, no flavor modifying effects |
| | MRP + SG | 85 | Sweeter than the Reacted *Stevia*-derived MRPs sample, slightly more harmonic and natural |

[4]The samples Flora and Chocolate were not included to the analysis because these flavors do not harmonize well with the ketchup taste.

Conclusions: The results showed that all products, including conventional Maillard products, combinations of conventional Maillard products and sweetening agents, and reacted sweetening agent-derived Maillard products can be used as a flavor or a flavor modifier to improve the taste, mouthfeel and/or aroma of a food or beverage, preferably the combination of conventional Maillard products, and reacted sweetening agent-derived Maillard products, more preferably reacted sweetening agent-derived Maillard products. The results can be extended to any type of Maillard products, combination of conventional Maillard products and sweetening agent, or reacted sweetening agent-derived Maillard products, regardless of the composition of initial raw material and reaction condition.

Example 265

Vegetarian Foods with MRPs

Vegetarian foods have become popular. Regular proteins etc. are challenged to have similar tastes like meat, chicken fish, etc. Therefore, it is desirable to look for new solutions for meat-like, chicken-like or fish-like flavors. One embodiment of vegetarian foods includes compositions in this invention that provide flavor that is non-animal based compositions that have a meat-like, chicken-like or fish-like taste.

In certain MRPs, it is possible to have low soluble or insoluble amino acids or by products thereof in the final products. One embodiment herein comprises processes to use filtration methods to remove insoluble materials from any MRPs composition.

Compositions in this invention such as conventional MRPs (from a reducing sugar and an amine), or non-conventional (a non-reducing sugar material) *Stevia* derived MRPs, can provide quick onset of the sweetening agent or other high synthetic sweeteners. One embodiment comprises a method of using compositions in this invention to improve quick-onset of sweetening agent or other high synthetic sweeteners. Another embodiment herein is of sugar reduced foods and beverages including the compositions described throughout which can be used for quick onset sweetness.

Except for possible harmful substances created by the nature of cooking, MRPs occur naturally in bread, meat etc. by baking and grilling etc. The MRPs of such cooking do have a challenge of unpredictability, reproducibility, reproducible smells and or reproducible taste when prepared. The current embodiments overcome these disadvantages and provide reproducible taste, smell and are predictable, i.e. same amounts of the conventional and non-conventional MRPS described herein, when added to food or beverages even from different batches yield the same smell/taste in the same product. One embodiment described herein is to make the smell and taste profile of food and beverage predictable and reproducible with the use and inclusion of the compositions described herein.

Tabletops: tabletop sugar replacements in general lack good taste compared with sugar, especially for solid tabletop replacements. The inventors have found solutions to make tabletop sugar replacements more palatable. For instance, in one aspect, the product tastes like molasses and comprises compositions as such as described herein.

In general, amino acids could be classified by characteristics. One or more amino acids from the following categories can be selected and used in the embodiments described herein. The skilled artisan should understand that the inventors found optimum conditions to demonstrate Maillard reactions and formation of MRPs without limitation.

(1) Nonpolar Amino Acids

Ala: Alanine

Gly: Glycine

Ile: Isoleucine

Leu: Leucine

Met: Methionine

Trp: Tryptophan

Phe: Phenylalanine

Pro: Proline

Val: Valine (2) Polar Amino Acids

Cys: Cysteine

Ser: Serine

Thr: Threonine

Tyr: Tyrosine

Asn: Asparagine

Gin: Glutamine (3a) Polar Basic Amino Acids (Positively Charged

His: Histidine

Lys: Lysine

Arg: Arginine (3b) Polar Acidic Amino Acids (Negatively Charged)

Asp: Aspartate

Glu: Glutamate

Example 266

Baked Ham Flavor one or more compositions selected from sweetening agents, sweetener, sweetener enhancer could be added in ratio of from about 1 to about 99% on a weight/weight basis of total raw material into the following formulation to create a Baked ham flavor:

Water 10%

Porklard 5% to 10%

Cysteine 1% to 5% xylose 1% to 5%

Char Oil hickory 1% to 5%

Hydrolyzed vegetable protein 5% to 10% sunflower oil 50% to 75%

Mix them well with heating to 110 degree C. for two hours.

Cool with mixing to 95 degree C. for one hour.

Allow to separate and filter top oil layer while warm.

Example 267

Tea Flavor

Another example is to add one or more compositions selected from sweetening agent, sweetener, sweetener enhancer in ratio of from about 1 to about 99% on a weight to weight basis of total material in the following formulation to create tea flavored products:

Reducing sugar: high fructose corn syrup

Protein: theanine

Acids: citric acid or phosphoric acid

The ratio of reducing sugar and acid is 1 to 0.5. Theanine is from about 0.01 to about 0.5%.

1. The mixture was heated at 100 to 120 degree C. for 15 minutes,

2. Soluble tea solids was added to the solution and then heated at 182 degree C. for 30 minutes. The ratio of tea solids and reducing sugar is about 1:6 to about 2:8.

3. Distilled water was added to the mixture and kept at 100 degree C. for 45 minutes followed by filtration.

Example 268

Specific Vegetable Flavor

Add one or more compositions selected from sweetening agent, sweetener, and sweetener enhancer by ratio of from about 1 to about 99% on a weight to weight basis of total raw material in the following formulation to create specific vegetable flavored products:

Reducing sugars: glucose, fructose, or sucrose.

Dehydrated vegetables: cabbage, onion, leek, tomato, eggplant, broccoli sprouts, kidney beans, corn and bean sprouts.

Soybean oil 500~700 Kgs.

Selected vegetable 30~70 Kgs.

Sugar and water 25~50 Kgs.

Cysteine 0.001~0.05 Kgs.

The mixture was mixed uniformly and maintained at the temperature of 135 degree C. for 3 hours.

The solution was cooled down.

Example 269

Mushroom Flavor

Mushroom flavor products can be prepared by adding one or more compositions selected from sweetening agent, sweetener, and sweetener enhancer in ratio of from about 1 to about 99% on a weight to weight basis of total raw material by following procedures:

1. Mushroom Hydrolysate:

Milled dry mushroom 10 to about 30 grams were mixed with distilled waterin a ratio of 1:10 to about 1:50.

The mixtures were preheated at 85 degree C. for 30 minutes in order to denature protein.

After cooling the mixture to 0 degree C., the enzymatic hydrolysis was conducted in two steps.

a. The 1st step:

The pH of the mixture was adjusted to about 4 to about 6, then cellulose was added at a ratio of 2:100 or 5:100 while the temperature was between about 55 and about 70 degrees for 2~3 hours.

b. The 2nd step:

The pH was adjusted to 7, then neutral protease was added with at a ratio of 3:100.

The mixture was digested at 55 degree C. for another 2 hours.

The hydrolysate was heated at 1.00 degree C. or higher for 30 minutes to inactivate the enzymes and was then centrifuged.

The final supernatant was collected,

2. Maillard reaction of mushroom

D-xylose (0.05~0.20 g) and L-cysteine (0.10~0.20 g) were dissolved into 30 ml of mushroom hydrolysate.

The pH of the mixture was adjusted to 7.4-8.

Then the mixture was heated at 140 degree C. for 135 minutes.

Example 270

Cheese FFlavor

In another example, one or more compositions selected from sweetening agent, sweetener, sweetener enhancer in ratio of from about 1 to about 99% on a weight to weight basis of total raw material could be added in the following enzyme modified cheese flavor process:

Cheddar cheese base preparation:

Cheddar cheese: 48%

Water: 48%

Trisodium Citrate: 2%

Salt: 1.85%

Sorbic Acid: 0.15%

Method:

Cook the Cheddar cheese base, then cool cheddar cheese base to about 40~45 centigrade, add the enzyme (the enzyme could be one or more selected from Lipase AY30, R, Protease M, A2, P6, Glutaminase SD);

Mix thoroughly;

Pour the mixture into the jar provided, seal the lid;

Incubate for 7.5 hours at 45 centigrade;

Allow to cool.

Example 271

White Meat Flavor

In another example, one or more compositions selected from sweetening agent, sweetener, sweetener enhancer could be added in ratio of from about 1 to about 99% on weight to weight basis of total raw material in the following White meat reaction flavor preparation formulation:

1.25 g Cysteine, 1.00 g leucine, 1.25 g xylose, 2.00 g dextrose, 2.00 g salt, 3 g torula yeast bionis goldcell (one or more other type of yeasts such as bakers yeast Biospringer BA10, Antolysed Yeast D120/8-PW, Maxarome standard powder, Prime Extract Maxarome Selected, HVP(Protex 2538, Exter 301, Springer 2020, Gistex HUMLS could be used too), 1.5 g sunflower oil, and 13 g water.

Method: Make the mixture and heat it as per general process flavor's production method.

Example 272

Red Meat Flavor

In another example, one or more compositions selected from sweetening agent, sweetener, sweetener enhancer could be added in ratio of from about 1 to about 99% on a weight to weight basis of total raw material in the following Red meat reaction flavor preparation:

1.5 g cysteine hydrocholoride, 1.0 g methionine, 1.0 g thiamine, 1.0 g xylose, 1.5 g MSG,0.5 g ribotide, 9.0 g maxarome plus, 5.0 g gistex, 1.5 g onion powder, 1.0 g groundnut oil, 0.1 g black pepper oleoresin, and 26.0 g water.

Method: Weigh ingredients into screw cap bottles provided;

Mix thoroughly then measure the PH;

React under pressure at 125 centigrade for 30 minutes at 20 psi.

Example 273

Use Red Meat Flavor in Beef Burger

Above prepared flavors could be used in beef burger as an example:

102 g Minced beef, 100 g, Minced chicken, 36 g chopped onion, 5 g rusk (dry type), 3 g water, 2.5 g salt, 0.25 g ground black pepper and 1.25~3.00 g reaction flavors.

Method: weigh ingredients into a bowl; mix until ingredients combined; divide into 60 g portion; form into a burger shape, fry.

Again, it should be emphasized that one or more compositions selected from sweetening agent, sweetener, sweetener enhancer detailed herein can be added before, during or after the laillard reaction, preferably before and during the reaction without limitation of examples. The amine donor could be amino acid, peptide, protein or their mixture from either vegetable or animal source or their mixture. The fat could be either vegetable or animal source or their mixture, too.

Consumers are now open and willing to experiment with spices to experience new flavors like tamarind, lemongrass, ginger, kaffir lime, cinnamon and clove. From candy to beer to tea, everything with ginger is now fashionable. Ginger works well in alcoholic beverages as a mixer, in ginger beer itself, in confections, muffins and cookies.

Sodium metabisulfite, olive oil and ascorbic acid were found to be effective to stabilize the antibacterial activity. 1.5% CMC shows a good performance too. Ginseng is one of the top 10 bestselling herbal dietary supplements in US, but ginseng-containing products have been mostly limited to the beverage, despite a growing functional food market. The original ginseng flavors include bitterness and earthiness and must be minimized in order to establish potential success in the US market. The embodiments described herein can successfully solve this issue and make new ginseng food products such as cookies, snacks, cereals energy bars, chocolates and coffee with great taste.

Example 274

Improve the Flavor of Herbs

In Asia, especially south-east Asia, Rose, Jasmine, Pandan, Lemon grass, yellow ginger, blue ginger, lime leaf, curry leave. Lilies, basil, coriander, coconut etc. are specific local flavors. In East Asia, many herbs are used in the cooking such as *Artemisia argyi*, dandelion, *Codonopsis pilosula, Radix salviae* Miltiorrhizae, Membranous Milkvetch Root, *Rhizoma gastrodiae* etc. The inventors have found that adding sweetening agents, sweetening agents and Thaumatin could significantly improve the taste profile of these flavors and their added products. For example, one or more composition selected from sweetening agent, sweetener, sweetener enhancers could be added in ratio of from about 1 to about 99% on a weight to weight basis of total raw material in the following processes to prepare such flavored products:

Lilies as a raw material were washed and milled to give a lily slurry.

Alpha-amylase (0.1-0.8%) was added and treated at 70 degree C. for one and half hours.

Protease (0.05-0.20% by mass of the lily) was then added and heated at 55 degree C. for 70 minutes.

One or more composition selected from sweetening agent, sweetener, sweetener enhancers could be also added in following process:

Fenugreek Extract:

The seeds were roasted and crushed uniformly.

The seeds were extracted with ethyl alcohol, filtered to obtain a yellowish brown solution followed by concentration.

An extract 10 parts, glucose 1 part and proline 0.6 parts were mixed together and heated at 110~120 degree C. for 4~6 hours.

Example 275

Improve the Flavor of Savory

Savory is full of flavor, delicious and tasty-usually something that someone has cooked.

Savory foods are appetizing, pleasant or agreeable to the taste or smell, but there is a need to find suitable compatible a sweet taste balanced solution. One or more substances selected from sweetening agents, sweeteners, sweetener enhancers can be added into following formulation in ratio of 1~99% on a weight to weight basis of total raw material to produce well balanced sweet products:

1) Tomato sauce formula:

| | |
|---|---|
| olive oil | 25~50 grams |
| onion diced | 150~200 grams |
| garlic minced | 10~20 grams |
| tomato paste | 600~900 grams |
| salt | 5~10 grams |
| basil chopped | 10~20 grams |
| black pepper ground | 0.5~2 gram |

Cooking and mixing for 25 minutes

2) Grilled flavor formula:

Beef tallow or soybean oil is passed through a grilling device being heated at 450 degree C. continuously. The grilled flavor is collected through a condenser.

3) Roasted meat flavor:

A mixture of 8.0~10 grams of cysteine, 8.0~10 grams of thiamine, and 300 grams of vegetable protein hydrolysate is brought to 1000 grams by the addition of water and adjusted to a pH of 5.

The mixture is then boiled under reflux condition (100~110 degree C.) at atmospheric pressure for 3~5 hours and allowed to cool. A roasted meat flavor was formed.

4) Chicken base flavored products:

| | |
|---|---|
| water | 10% |
| hydrolyzed vegetable protein | 10~20% |
| xylose | 0.10~0.50% |
| cysteine | 0.20~0.50% |

Premixing to form slurry.

Adding premix to sunflower oil while mixing.

| | |
|---|---|
| sunflower oil | 50~80% |

Heating with constant mixing to about 100~110 degree C. for two to three hours.

Cool the mixture down to about 80 degree C. with mixing for another one hour.

Example 276

Improve the Tastes of Flavonoids

Flavonoids are an important and widespread group of plant natural products that possess many biological activities. These compounds are part of the wide range of substances called “polyphenols”, which are widely known mainly by their antioxidant properties, and are present in human dietaiy sources showing great health benefits.

Neohesperidine and naringin, which are flavanone glycosides present in citrus fruits and grapefruit, are responsible for the bitterness of citrus juices. These substances and their derivates such as neohesperidine chalcone, naringin chalcone, phloracetophenone, neohesperidine dihydrochalcone, naringin dihydrochalcone etc. can be good candidates for bitterness or sweetener enhancers. The inventors surprisingly found adding these components in the compositions described herein could help the masking the bitterness or aftertaste of other ingredients and made the taste cleaner. One embodiment includes the compositions described herein and further comprises flavonoids, more preferably flavonoids containing flavonone glycosides. The ratio of flavonoids in the composition could be in range of from about 0.1 ppm to 99.9%.

Metal salts of dihydrochalcone having the following formula:

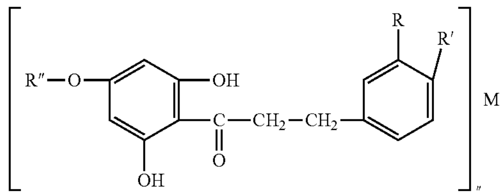

wherein R is selected from the group consisting of hydrogen and hydroxy, R' is selected from the group consisting of hydroxy, methoxy, ethoxy and propoxy, and R" is selected from the group consisting of neohesperidoxyl, B-rutinosyl and ß-D-glucosyl, M is a mono- or divalent metal selected from the group consisting of an alkali metal and an alkaline earth metal, and n is an integer from 1 to 2 corresponding to the valence of the selected metal M.

Typical compounds of the above formula are the alkali or alkaline earth metal monosalts of the following:

Neohesperidin dihydrochalcone, having the formula:

(I)

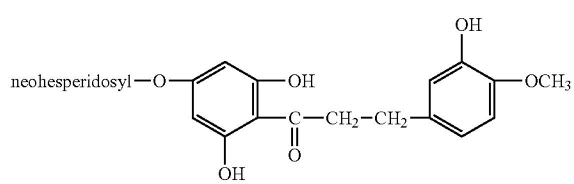

2,',4',6',3-tetrahydroxy-4-n-propoxydihydrochalcone 4'-ß neohesperidoside having the formula:

(II)

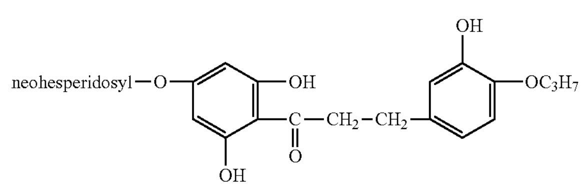

naringin dihydrochalcone of the formula:

(III)

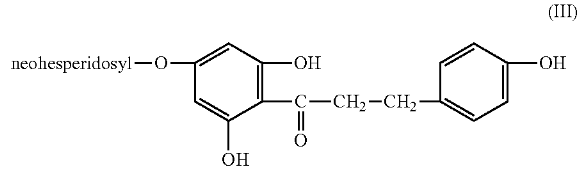

prunin dihydrochalcone of the formula:

(IV)

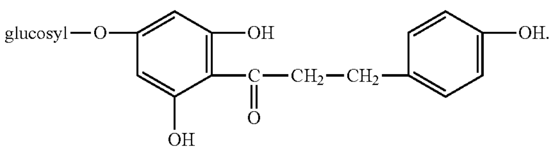

hesperidin dihydrochalcone having the formula (V)

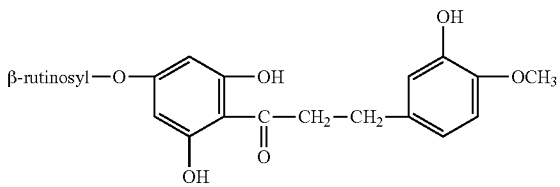

hesperitin dihydrochalcone glucoside having the formula:

(VI)

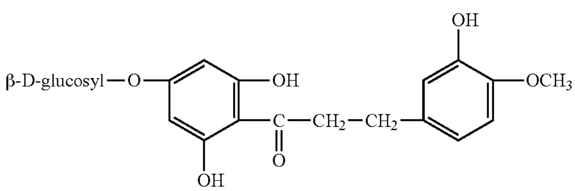

The alkali metal includes sodium, potassium, lithium, rubidium, caesium, and ammonium, while the term alkaline earth metal includes calcium, strontium and barium. Other alkali amino acids can serve as counterions. Thus embodiments of compositions described herein further comprise one or more salts of dihydrochalcone.

The composition described herein can further comprise one or more products selected from Trilobatin, phyllodulcin, Osladin, Polypodoside A, Eriodictyol, Homoeriodicyol sodium salt, hesperidin or hesperetin, Neohesperidin dihydrochalcone, naringin dihydrocholcone, or advantame to provide additional flavors and products. Another embodiment comprises of the compositions described herein and one or more of the aforementioned products, wherein the ratio of one or more products selected in the composition can be in the range of from about 0.1% to about 99.9%.

Advantame is high potency synthetic sweetener and can be used as a flavor enhancer. The inventors found that adding advantame into the compositions described herein can boost the flavor and taste profile of a food or beverage. In one aspect, Advantame can be added after conventional or non-conventional Maillard reaction. One embodiment provides compositions described herein which further comprise advantame, wherein the amount of advantame can be in the range of from about 0.01 ppm to about 100 ppm.

Creating a sweet enhanced meat process flavor can be obtained by adding a sweetening agent by using one or more of following ingredients: A source of Sulphur: Cysteine, (cystine), glutathione, methionine, thiamine, inorganic sulphides, meat extracts, egg derivatives; Amino Nitrogen Source: Amino acids, HVP's, yeast extracts, meat extracts; The Sugar Component: Pentose and hexose sugars, Vegetable powders, (onion powder, tomato powder), hydrolysed gums, dextrins, pectins, alginates. Fats and Oils: Animal fats, vegetable oils, coconut oil. Enzyme hydrolyzed oils and fats. Other Components: Herbs, spices, IMP, GMP, acids, etc.

Pigs, especially young pigs, appreciate good and pleasant tastes and aroma much the way young children do. Cats are notoriously fussy about the taste and smell of their feed. Feeds such as rapeseed meal, which has a bitter taste, are used as good protein sources for cattle, sheep, and horses. Even chickens are known for their taste discrimination, as chickens are selective to their feeds. Green, natural or organic farming of animals become more and more popular. Therefore, there is a need to find a solution to satisfy market requirements. An embodiment of feed or feed additives comprises the compositionsdescribed herein.

The intense sweetness and flavor/aroma. enhancement properties of the compositions described herein provide useful applications in improving the palatability of medicines, traditional Chinese medicine, food supplements, beverage, food containing herbs, particularly those with unpleasant long-lasting active ingredients not easily masked by sugar or glucose syrups, let alone sweetening agents or synthetic high intensity sweeteners. The inventors surprisingly found the compositions described herein can mask the unpleasant taste and smell of the products containing these substances, for instance Goji berries juice, sea buckthorn juice, milk thistle extract, *Ginkgo biloba* extract etc. Thus traditional Chinese medicine, or food supplements can be combined with one or more of compositions described herein, especially when used as a masking agent.

Except for a reduced sugar donor and an amine donor, sweetening agent(s) and all other ingredients can be either added before, during and after the conventional Maillard reaction, more preferably before and during the Maillard reaction. An embodiment of composition in this invention preparable by adding all ingredients in the Maillard reaction to react together.

Products such as maltol, ethyl-maltol, vanillin, ethyl vanillin, m-methylphenol, and m-(n)-propylphenol can further enhance the rnouthfeel, sweetness and aroma of the compositions described herein. One embodiment of compositions described herein further comprise one or more products selected from maltol, ethyl-maltol, vanillin, ethyl vanillin, m-methylpheonol, m-(n)propylphenol. For instance, combinations of standard (conventional) and maltol, standard (conventional) MRPs and Vanillin, Sweetening agent derived MRPs (non-conventional MRPs) and maltol, Sweetening agent derived MRPs and vanillin etc. are provided. For example, a food or beverage can include the compositions mentioned in this paragraph.

The *Stevia* extract containing volatile and unvolatile terpine and or terpinoids substances could be purified further in order to obtain the tasteful sweet profile with aroma. Treating the extract with a chromatographic column or other separation resins, or other separation methods, such as distillation, could reserve most of tasteful aroma terpine and or terpinoids substances containing oxygen in the structure and remove the unpleasant taste substances. An embodiment of *Stevia* extract comprises enriched aroma terpene substances containing oxygen in the structure. To enhance the citrus or tangerine taste, the inventors surprisingly found that good citrus materials could be obtained by heat processing of *Stevia* extract, especially *Stevia* extract containing terpines and or terpinoids under acidic conditions, especially in the presence of citric acid, tartaric acid, fumaric acid, lactic acid, malic acid etc., more preferably citric acid, Thus, substances such as linalool reacted with citric acid with or without a Maillard reaction. Vacuum distillation or column chromatography (such as by silica gel), any type of macroporous resins, for example smacropore resin, ion exchange resins produced by Dow, Sunresin can be used for further purification. One embodiment is a method to produce citrus flavored *Stevia* extract by using a heat process, with or without a Maillard reaction, under acidic conditions, more preferably with a Maillard reaction under citric acid conditions. One embodiment provides a citrus flavored Stavin extract preparable by heat processing with or without a Maillard reaction, preferably with a Maillard reaction under acidic conditions, more preferably under citric acid conditions.

Example 277

Different Solvents for the Maillard Reactions

The solvent used for Maillard reaction or carrier for products can be selected from any approved solvent or their mixture used in the food and beverage, feed, pharmaceuticals, or cosmetics industries. One embodiment herein provides any composition described herein comprises oral approved solvents.

For example, one or more products selected from following lists could be used as a solvent except water for the Maillard reaction or acting as carrier for Maillard reaction products. The ratio of solvent to reactants, solvent in total combination of solvent and reactants on weight to weight basis can be in range of 1% to 99%.

Acetone,
Benzyl alcohol
1,3-Butylene glycol
Carbon dioxide
Castor oil
Citric acid esters of mono- and di-glycerides
Ethyl acetate
Ethyl alcohol
Ethyl alcohol denatured with methanol
Glycerol (glycerin)
Glyceryl diacetate
Glyceryl triacetate (Triacetin)
Glyceryl tributyrate (Tributyrin)
Hexane
Isopropyl alcohol
Methyl alcohol
Methyl ethyl ketone (2-butanone)
Methylene chloride
Monoglycerides and diglycerides
Monoglyceride citrate
1,2-propylene glycol
Propylene glycol mono-esters and dieste s
Methyl citrate Citrus and tangerine have subtle difference. It could be exchangeable in this specification as flavor.

Example 278

Compounds from the Heating Process

Heat processing leads to breakdown of heat sensitive terpenes, aldehydes and ketones easily. Maillard reaction by products/degradation products, including furanone, can be responsible for off-flavors and can produce pigments which darken the color of the product. Compounds created from heat processing are classified into three groups:

1. Sugar dehydration/fragmentation products including furans, pyrones, cyclopentenes, carbonyl compounds and acids.

2. Amino acid degradation products including aldehydes, sulfur and nitrogen compounds (ammonia and amines).

3. Volatile produced by further interactions such as pyrroles, pyridines, pyrazines, imidazoles, oxoles, thiazoles, trithiolanes, thiophenes etc.

Maillard reactions can forms pyrazines (boiling point 115 degree C.), pyridines (b.p. 115 degree C.), pyroles (b.p. 1.29 degree C.), thiazole (b.p. 117 degree C.), thiophenes (b.p. 84 degree C.), oxazoles (b.p. 70 degree C.). These compounds belong to high volatile substances including caramel (b.p. 170 degree C.), phenol (b.p. 182 degree C.).

Formation of furan (b.p. 31 degree C.) belongs to low volatile substances.

An embodiment of any composition in this invention comprises one or more low volatile substances, and/or one or more high volatile substances resulting from a Maillard reaction.

Example 279

Selection of Amino Acids

The selection of amino acids from Arg, Cys, Gly, His, Lys, Val has the greatest effect of antioxidant activity. Xylose performs well in antioxidant activity too. Glucose-casein (milk) and lactose-casein show antioxidant properties. One embodiment provides methods to use Maillard Reaction products described herein to improve the antioxidant property of foods, bevereages, feeds and pharmaceutical products.

Example 280

Thermal Process Reaction Schemes

A thermal process flavouring is a product prepared for its flavouring properties by heating raw materials that are foodstuffs or constituents of foodstuffs. This process is analogous to the traditional home cooking of ingredients of plant and animal origin, Raw Materials that are Subject to Thermal Processing Quoted by IOFI Raw materials for process flavourings shall consist of one or more of the following:

14.5.1 Protein nitrogen sources:

Foods containing protein nitrogen (meat, poultry, eggs, dairy products, fish, seafood, cereals, vegetable products, fruits, yeasts) and their extracts Hydrolysis products of the above, autolyzed yeasts, peptides, amino acids and/or their salts.

14.5.2 Reducing Sugars

Examples: Maltose Syrup, glucose, fructose, galactose 14.5.3 Fat or fatty acid sources:

Foods containing fats and oils

Edible fats and oil from animal, marine or vegetable origin

Hydrogenated, transesterified and/or fractionated fats and oils

Hydrolysis products of the above.

Other raw materials listed in Table 1 below 14.6 Ingredients that may be Added After Thermal Processing 14.6.1 Flavourings as defined in the Codex Guidelines for the use of flavourings CAC/GL 66-2008 and flavour enhancers as defined by CAC/GL 36-1989.

14.6.2 Suitable non-flavouring food ingredients as listed in Annex I.

14.7 Preparation of Process Flavourings

Process flavourings are prepared by processing together raw materials listed under 14.5 as follows:

14.7.1 The product temperature during processing shall not exceed 180° C.

14.7.2 The processing time shall not exceed ¼ hour at 180° C., with correspondingly longer times at lower temperatures, i.e., a doubling of the heating time for each decrease of temperature by 10° C.

14.7.3 The pH during processing shall not exceed 8.

14.7.4 Flavourings, (14.6.1) and non-flavouring food ingredients (14.6.2) shall only be added after processing is completed, unless otherwise specified.

Materials Used in Processing Recommended by IOFI

Foodstuffs, herbs, spices, their extracts and flavouring substances identified therein.

Water

Thiamine and its hydrochloric acid salt

Ascorbic acid

Citric acid

Lactic acid

Fumaric acid

Malic acid

Succinic acid

Tartaric acid

The sodium, potassium, calcium, magnesium and ammonium salts of the above acids

Guanylic acid and inosinic acid and its sodium, potassium and calcium salts

Inositol

Sodium, potassium- and ammonium sulfides, hydrosulfides and polysulfides

Lecithin

Acids, bases and salts as pH, regulators:

Acetic acid, hydrochloric acid, phosphoric acid, sulfuric acid

Sodium, potassium, calcium and ammonium hydroxide

The salts of the above acids and bases

Polymethylsiloxane as antifoaming agent (not participating in the process).

It should be mentioned that "heat flavor", "reaction flavor", "processing flavor" and "maillard reaction flavors" are exchangeable in this specification of invention.

The compositions in final MRPs depends on conditions of reactions, such as sugar donor, amine donor, other added ingredients, the temperature, pH-value, the solvent and the duration of reaction. One compound which is formed in each Maillard reaction is the "Amadori rearrangement product (ARP)", which the inventor had already determined in many samples prepared in this invention. An embodiment of composition comprises any resultants from one or more selected from the following reactions:

1)

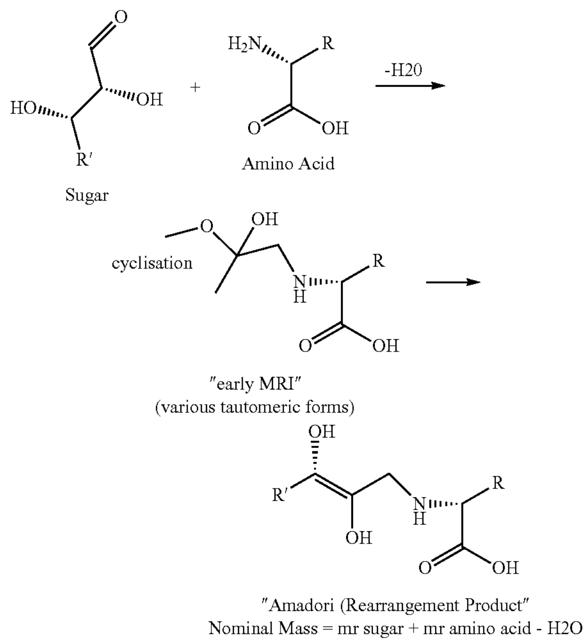

2)

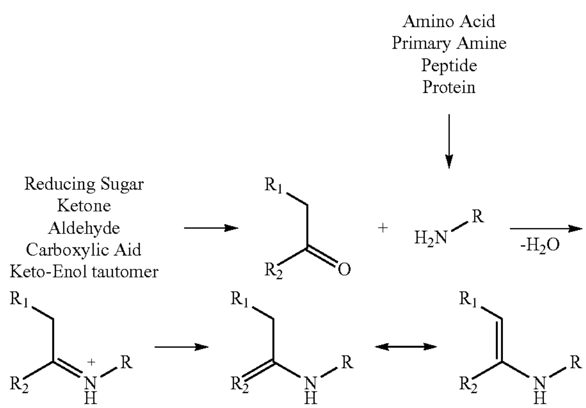

In these general formula of molecular structure, R, R1, R2 could represent any possible group in the structure.

The composition of final Maillard reaction products might contain remaining unreacted sugar donor, amine donor and other ingredients added in the reaction. By adjusting the reaction condition, the composition of final Maillard reaction products may not contain the remaining reactants. For instance, the reducing sugars in roasting cocoa beans disappeared after roasting 30 minutes. Amino acids were destroyed. Heating of threonine and glucose at 103 degree C. for 8 hours rapidly and extensively destroyed the amino acids. Other amino acids had the similar decomposition rate. The guidance of thermal processing flavors only regulates the precursors and temperature/pH condition. The residues are not mentioned. In this specification, the composition of final Maillard reaction products contains or does not contain the remaining unreacted reactants. The inventors have demonstrated several examples to show that the final Maillard reaction products either contain or do not contain the different reactants.

When a sweetening agent is added into the Maillard reaction, as demonstrated in many examples described throughout this application, the inventors surprisingly found an unconventional Maillard reaction could occur with sweetening agents such as steviol glycosides. A new substance could be formed in case the reaction condition is suitable like a reduced sugar and an amin acid. A representative example is demonstrated as follows:

As seen in following reaction scheme, the first reaction step between the reducing sugar and the amino group is a condensation reaction yielding a product which is usually denoted as MRI (Maillard Reaction Intermediate) or (after further reaction steps) Amadori Product, Both, MRI and Amadori Products share the same molar mass.

Reaction Scheme 1, Example of early Maillard reaction between xylose and phenylalanine

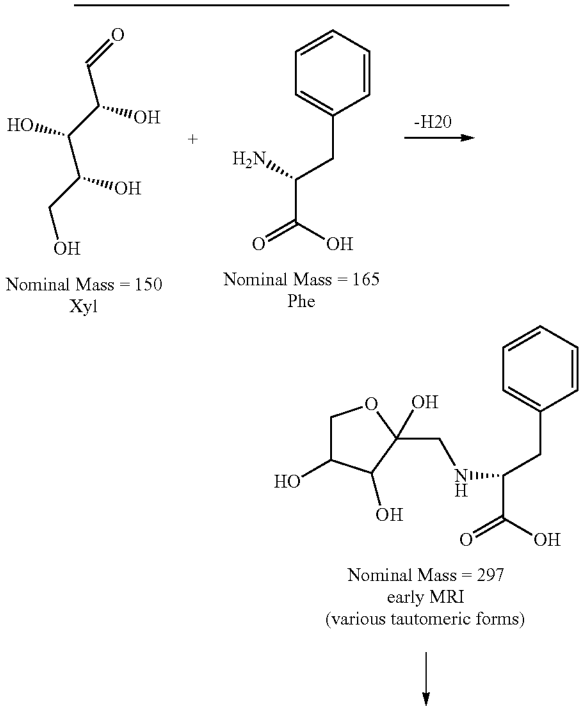

-continued

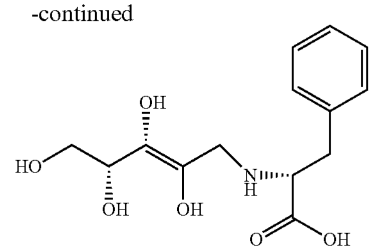

Nominal Mass = 297
late MRI

Reaction Scheme 2, General formation of Amadori products

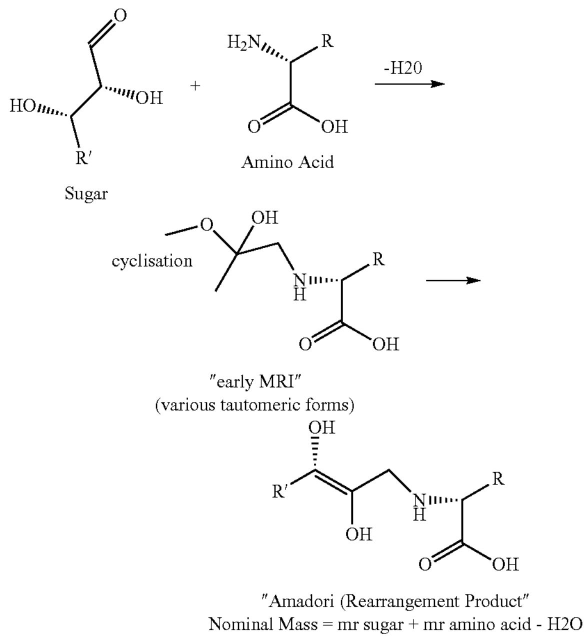

Basically the molar mass of any URI can calculated as molar mass of the sugar plus the molar mass of the amino acid minus 18.

Structural proposal (several isomers are formed) of MRP Phe-Reb-A between reaction of Phenylalanine and Reb-A could be drawn as follows:

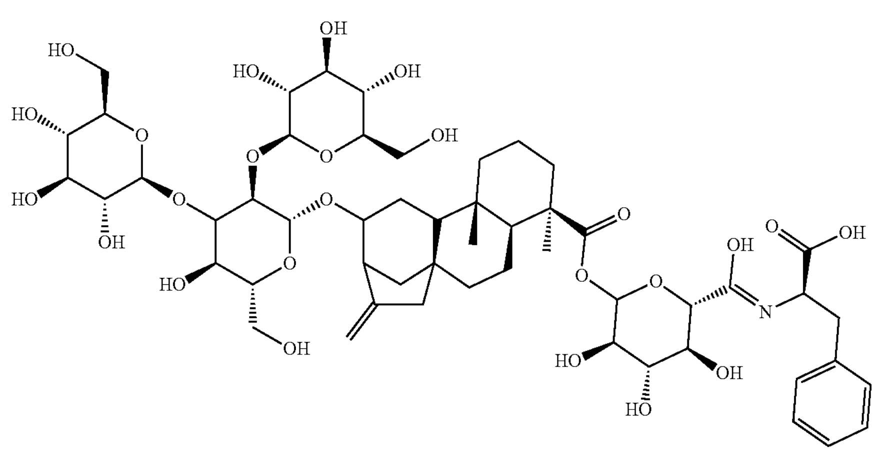

Nominal Mass = 1127

An embodiment of composition comprises the resulting products from the reaction between steviol glycosides and an amine donor.

Low solids content beverages such as tea, mineral enriched energy drinks, or low content juice flavored beverages always has had challenges when formulating them into low or no sugar versions because of poor mouthfeel. Adding the compositions described herein can solve this problem of poor mouthfeel and make it easier for formulators to develop low and no sugar versions.

Some sweeteners and sweetening enhancers are proteins or peptides, it or hydrolyzed products such as peptides, amino acids can be used directly in the Maillard reaction with or without amine donor. One embodiment provides MRPs that are prepareable by a sugar donor and a peptide and or protein sweetener and or sweetening enhancers with or without aanother amine donor. Another embodiment provided herein is a food, beverage, feed or pharma product including a composition described herein prepared by this method. Another embodiment, is a composition comprising the ingredients preparable by using peptide or protein sweetener, and or sweet enhancer, and or their hydrolyzed products as amine donor in a Maillard reaction or flavor preparation.

Some natural colors are peptide, proteins, such as spirulina blue, can be used as an amine donor with or without another amine donor in the Maillard reaction. An embodiment of MRPs is preparable by sugar donor and peptide, and or protein color with or without additional amine donor. An embodiment of a food, beverage, feed, pharmaceutical product comprises the ingredient prepared by using peptide or protein color as an amine donor in the Maillard reaction or flavor preparation.

Example 281

Proof of Amadoris in MRPs with SGs

Introduction

Following examples were performed to investigate the formation of Amadori-products from the aldose sugar xylose and different amino acids under various reaction conditions. Amadori products are defined reaction products of aldoses in the Maillard reaction. If ketoses are used instead of aldoses, the corresponding products are known as Heyns-products.

Part of the experiments were aimed to provide high amounts of Amadori products (reflux-heating in ethanol) whereas the second part was aimed to provide evidence for Amadori products and to evaluate the sensory properties.

In a second series of experiments xylose was replaced by Reb-A or Reb-B as sugar-donor to investigate whether these compounds participate in a Maillard reaction according to reaction scheme 1.

Table 281.1 depicts the nominal mass and the expected m/z-value for Amadoris products obtained with xylose and Amadori-like products with rebaudioside A (Reb-A) and rebaudioside B (Reb-B).

Reaction Scheme 1, possible reaction products for Reb-A and Reb-B in Maillard reaction

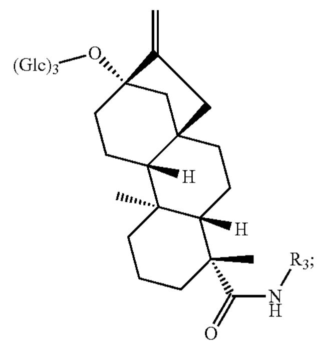

Reb-B + amino acid react to amide

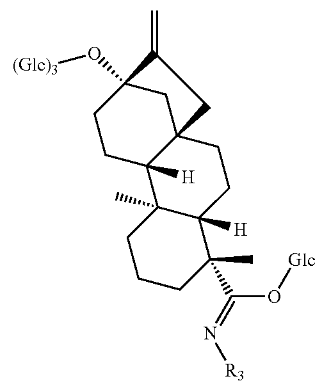

Reb-A + amino acid react to Schiff'sche base

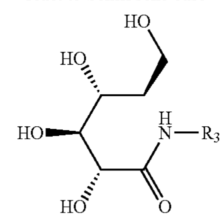

Reb-A or Reb set Glc free, Glc + amino acid yields Amadori product $R_3$: Amino acid residue; Glc... Glucose residue

TABLE 281.1

Nominal mass and m/z-values of Amadori and Amadori-like reaction products

| Amino Acid | Sugar Donor | Nominal Mass Reaction product | expected m/z $[M + H]^+$ | expected m/z $[M + Na]^+$ |
|---|---|---|---|---|
| Ala | Xyl | 221 | 222 | 244 |
| Gly | Xyl | 207 | 208 | 230 |
| Lys | Xyl | 278 | 279 | 301 |
| Glu | Xyl | 279 | 280 | 302 |
| Ala | Reb-A | 1038 | 1039 | 1061 |
| Gly | Reb-A | 1024 | 1025 | 1047 |
| Lys | Reb-A | 1078 | 1079 | 1101 |
| Glu | Reb-A | 1079 | 1080 | 1102 |
| Ala | Reb-B | 876 | 877 | 899 |
| Gly | Reb-B | 862 | 863 | 884 |
| Lys | Reb-B | 916 | 917 | 939 |

TABLE 281.1-continued

Nominal mass and m/z-values of Amadori and Amadori-like reaction products

| Amino Acid | Sugar Donor | Nominal Mass Reaction product | expected m/z $[M + H]^+$ | expected m/z $[M + Na]^+$ |
|---|---|---|---|---|
| Glu | Reb-B | 917 | 918 | 940 |
| Ala | Glc[1] | 251 | 252 | 274 |
| Gly | Glc | 237 | 238 | 260 |
| Lys | Glc | 308 | 309 | 331 |
| Glu | Glc | 309 | 310 | 332 |

Ala . . . Alanine;
Gly . . . Glycine;
Lys . . . Lysine;
GLu Glutamic acid,
Xyl . . . Xylose;
Glc . . . Glucose
[1]liberated from Reb-A or Reb-B Material and Methods Materials:

L-Alanine, ≥99.5%, Sigma Aldrich, CAS:56-41-7, PCode: 50409126, L(+)-Glutamic acid, 58198, Merck Glycine, Sigma-Aldrich ACS reagent, ≥98.5% 410225, L(+)-Lysine, Sigma Aldrich, L5501-5G, Lot #0001442572, Rebaudioside A, EPC-Lab, Lot No. RA.110117-01; (11171, RD-S12), Rebaudioside B, EPC-Lab, Lot No, RB100722; (11172, RD-S15), Sodium dihydrogen phosphate anhydrous, >99%, Fluka, 7558-80-7; EINECS: 2314492, D-Xylose, ≥99%, Sigma-Aldrich, STBG7912

Methods:

Sample Preparation

Dissolve samples as given in Tables 281.2 and 281.3 in 10 mL ethanol and heat under reflux conditions for 4 hours. Thereafter cool rapidly to room temperature.

Dissolve samples as given in Tables 281.3 to 281.6 in 10 mL phosphate buffer (0.2 M, pH 8.60), heat to 90° C. for 2 hours. Dissolve samples as given in Table 265.7 in 10 mL phosphate buffer (0.2 M, pH 8.60), heat to 90° C. for 2 hours, Analytical Conditions The HPLC system consisted of an Agilent 1100 system (autosampler, ternary gradient pump, column thermostat, VWD-UV/VIS detector, DAD-UV/VIS detector) connected in-line to an Agilent mass spectrometer (ESI-MS quadrupole G1956A VL). For HPLC analysis the reacted samples were injected after filtration (2 μm syringe filters).

The samples were separated at 0.9 ml/min on a Phenomenex Synergi Hydro-RP (150×3 mm) at 35° C. by gradient elution. Mobile Phase A consisted of a 0.1% formic acid in water. Mobile Phase B consisted of 0.1% formic acid in acetonitrile. The gradient started with 2% B, was increased linearly in 5 minutes to 15% B and kept at this condition for another 15 minutes. Injection volume was set to 20 μl.

The detectors were set to 205 nm (VWD), to 254 and 380 nm (DAD with spectra collection between 200-600 nm) and to ISI positive mode TIC m/z 120-800, Fragmentor 1000, Gain 2 (MS, 300° C., nitrogen 12 l/min, nebulizer setting 50 psig. Capillary voltage 4500 V).

Sensory Evaluation

For all samples the color and flavor were documented by the analyst and a second independent trained taster, Results On Table 281.2 and 281.3 the test results for the reaction of Xylose or Reb-A with selected amino acids after reflux heating for 4 hours in ethanol are shown. All samples appeared yellow to brown colored and provided a smell of burnt sugar. The analytical evaluation suggests in all samples that the Maillard reaction has been initiated. For chromatograms see FIG. 287.

TABLE 281.2

Analytical and Sensory test results for of amino acids and xylose after 4 hours reflux heating in 10 mL ethanol

| Sample | Color | Smell | Maillard Reaction product(s)* |
|---|---|---|---|
| 10 mM Ala + 10 mM Xyl | Brown | Burnt sugar, caramel | yes |
| 10 mM Gly + 10 mM Xyl | Yellow | Burnt sugar | yes |
| 10 mM Lys + 10 mM Xyl | Yellow | Popcorn, caramel | yes |
| 10 mM Glu + 10 mM Xyl | Brown | Burnt sugar, sour | yes |

*Amadori product detected by HPLC/MS

TABLE 281.3

Analytical and Sensory test results for of amino acids and Reb-A after 4 hours reflux heating in 10 mL ethanol

| Sample | Color | Smell | Maillard Reaction product* |
|---|---|---|---|
| 10 mM Ala + 10 mM Reb-A | Light yellow | Caramel | yes |
| 10 mM Gly + 10 mM Reb-A | Yellow | Burnt sugar | yes |
| 10 mM Lys + 10 mM Reb-A | Yellow | Popcorn | yes |
| 10 mM Glu + 10 mM Reb-A | Light yellow | Burnt sugar, fruity | yes |

*Amadori products and Amaori-like products detected by HPLC/MS

On Tables 281.4-281.5 the test results for the reaction of Xylose or Reb-A with selected amino acids after heating for 2 hours in phosphate buffer, pH=6, at 90° C. are shown. All samples appeared yellow to brown colored and provided a smell of burnt sugar. The analytical evaluation suggests in all samples that the Maillard reaction has been initiated.

TABLE 281.4

Analytical and Sensory test results for of amino acids and xylose after 2 hours at 90° C. in 10 mL phosphate buffer (pH = 6)

| Sample | Color | Smell | Maillard Reaction product* |
|---|---|---|---|
| 10 mM Ala + 10 mM Xyl | Colorless | Fruity | yes |
| 10 mM Gly + 10 mM Xyl | Colorless | Odorless | yes |
| 10 mM Lys + 10 mM Xyl | Yellow | Popcorn | yes |
| 10 mM Glu + 10 mM Xyl | Colorless | Sour | yes |

*Amadori product detected by HPLC/MS

TABLE 281.5

Analytical and Sensory test results for of amino acids and Reb-A after 2 hours at 90° C. in 10 mL phosphate buffer (pH = 6)

| Sample | Color | Smell | Maillard Reaction product* |
|---|---|---|---|
| 10 mM Ala + 10 mM Reb-A | Colorless | Plant Oil | yes |
| 10 mM Gly + 10 mM Reb-A | Colorless | Burnt sugar | yes |
| 10 mM Lys + 10 mM Reb-A | Yellow | Sweet, burnt sugar | yes |
| 10 mM Glu + 10 mM Reb-A | Colorless | Peppermint | yes |

*Amadori products and Amaori-like products detected by HPLC/MS

On Tables 281.6-281.7 the test results for the reaction of Reb-B with selected amino acids after heating for 2 hours in phosphate buffer, pH=6 or at 90° C. are shown. Samples heated at pH=6 appeared colorless and without smell. The analytical evaluation suggests that the Maillard reaction has not been initiated. Samples heated at pH=8 appeared yellow to brown colored and provided a smell of burnt sugar. The analytical evaluation suggests in all samples that the Maillard reaction has been initiated.

TABLE 281.6

Analytical and Sensory test results for of amino acids and Reb-B after 2 hours at 90° C. in 10 mL phosphate buffer (pH = 6)

| Sample | Color | Smell | Maillard Reaction product* |
|---|---|---|---|
| 5 mM Ala + 5 mM Reb-B | Colorless | Odorless | no |
| 5 mM Gly + 5 mM Reb-B | Colorless | Odorless | no |
| 5 mM Lys + 5 mM Reb-B | Colorless | Odorless | no |
| 5 mM Glu + 5 mM Reb-B | Colorless | Odorless | no |

TABLE 281.7

Analytical and Sensory test results for of amino acids and Reb-B after 2 hours at 90° C. in 10 mL phosphate buffer (pH = 8)

| Sample | Color | Smell | Amadori-like product* |
|---|---|---|---|
| 5 mM Ala + 5 mM Reb-B | Light yellow | Sweet, burnt sugar | yes |
| 5 mM Gly + 5 mM Reb-B | Light yellow | Sour, pungent | yes |
| 5 mM Lys + 5 mM Reb-B | Light yellow | Popcorn | yes |
| 5 mM Glu + 5 mM Reb-B | Light yellow | Cacao | yes |

Conclusion

These experiments showed that xylose and selected amino acids—when heated in ethanol—are converted to Maillard reaction products, more specifically to the expected Amadori products.

These experiments showed that Reb-A and selected amino acids—when heated in ethanol—react to Maillard reaction products, An Amadori product was observed which is formed from glucose, liberated from Reb-A, and amino acids. A second Maillard reaction product was observed which suggest a reaction between of Reb-A after loss of one glucose (most likely Reb-B) and amino acids.

These experiments showed that Reb-B and selected amino acid—when heated at pH=8 for 2 hours at 90° C. react to Maillard products.

Example 282

MRPs with Amadori Products

Materials:

L-Alanine, ≥99.5%, Sigma Aldrich, CAS:56-41-7, PCode: 50409126

L(+)-Glutamic acid, 58198, Merck

Glycine

L(+)-Lysine, Sigma Aldrich, L5501-5G, Lot #0001442572

Rebaudioside A, EPC-Lab, Lot No. RA110117-01; (11171, RD-S12)

Rebaudioside B. EPC-Lab, Lot No. 813100722; (11172, RD-S15)

Sodium dihydrogen phosphate anhydrous, >99%, Fluka, 7558-80-7; EINECS: 2314492

D-Xylose, ≥99%, Sigma-Aldrich, STBG7912

Sensory Evaluation

Before tasting the tasters are discussing the upcoming series of samples and taste regular samples (without added flavour) to find a common sense of the description. Thereafter the flavored samples were tasted at the use level to find a common sense on how to describe the flavors (taste, smell, intensity).

Four trained tasters were tasting blinded and independently all samples of a series. They were allowed to re-taste and are making notes for the sensory attributes perceived.

In the last step the attributes noted were discussed openly to find a compromise description. In case that more than 1 taster disagrees with the compromise, the tasting was repeated.

TABLE 282.1

| Sample | Solution, 10 ml | Heating time, h | Heating type | Color | Flavor |
|---|---|---|---|---|---|
| 10 mM Ala + 10 mM Xyl | MeOH | 4 | Refluxing | Dark brown | Sweet, caramel |
| 10 mM Gly + 10 mM Xyl | MeOH | 4 | Refluxing | Dark brown | Caramel |
| 10 mM Lys + 10 mM Xyl | MeOH | 4 | Refluxing | Light brown | Popcorn, caramel |
| 10 mM Glu + 10 mM Xyl | MeOH | 4 | Refluxing | Brown | Sour, pungent |
| 10 mM Ala + 10 mM Xyl | EtOH | 4 | Refluxing | Brown | Burnt sugar, caramel |
| 10 mM Gly + 10 mM Xyl | EtOH | 4 | Refluxing | Yellow | Burnt sugar |
| 10 mM Lys + 10 mM Xyl | EtOH | 4 | Refluxing | Yellow | Popcorn, caramel |
| 10 mM Glu + 10 mM Xyl | EtOH | 4 | Refluxing | Brown | Burnt sugar, sour |
| 10 mM Ala + 10 mM Xyl | Phosphate buffer, 0.2M, pH 6.0 | 2 | Drying oven, 90° C. | Colorless | Fruity |
| 10 mM Gly + 10 mM Xyl | Phosphate buffer, 0.2M, pH 6.0 | 2 | Drying oven, 90° C. | Colorless | Odorless |
| 10 mM Lys + 10 mM Xyl | Phosphate buffer, 0.2M, pH 6.0 | 2 | Drying oven, 90° C. | Yellow | Popcorn |

TABLE 282.1-continued

| Sample | Solution, 10 ml | Heating time, h | Heating type | Color | Flavor |
|---|---|---|---|---|---|
| 10 mM Glu + 10 mM Xyl | Phosphate buffer, 0.2M, pH 6.0 | 2 | Drying oven, 90° C. | Colorless | Sour |
| 10 mM Ala + 10 mM Reb-A | EtOH | 4 | Refluxing | Light yellow | Caramel |
| 10 mM Gly + 10 mM Reb-A | EtOH | 4 | Refluxing | Yellow | Burnt sugar |
| 10 mM Lys + 10 mM Reb-A | EtOH | 4 | Refluxing | Yellow | Popcorn |
| 10 mM Glu + 10 mM Reb-A | EtOH | 4 | Refluxing | Light yellow | Burnt sugar, fruity |
| 10 mM Ala + 10 mM Reb-A | Phosphate buffer, 0.2M, pH 6.0 | 2 | Drying oven, 90° C. | Colorless | Plant Oil |
| 10 mM Gly + 10 mM Reb-A | Phosphate buffer, 0.2M, pH 6.0 | 2 | Drying oven, 90° C. | Colorless | Burnt sugar |
| 10 mM Lys + 10 mM Reb-A | Phosphate buffer, 0.2M, pH 6.0 | 2 | Drying oven, 90° C. | Yellow | Sweet, burnt sugar |
| 10 mM Glu + 10 mM Reb-A | Phosphate buffer, 0.2M, pH 6.0 | 2 | Drying oven, 90° C. | Colorless | Peppermint |

TABLE 282.2

| Sample | Solution, 10 ml | Heating time, h | Heating type | Color | Flavor |
|---|---|---|---|---|---|
| 5 mM Ala + 5 mM Reb-B | Phosphate buffer, 0.2M, pH 8.0 | 4 | Refluxing | Light yellow | Sweet, caramel |
| 5 mM Gly + 5 mM Reb-B | Phosphate buffer, 0.2M, pH 8.0 | 4 | Refluxing | Light yellow | Burnt sugar |
| 5 mM Lys + 5 mM Reb-B | Phosphate buffer, 0.2M, pH 8.0 | 4 | Refluxing | Light yellow | Popcorn |
| 5 mM Glu + 5 mM Reb-B | Phosphate buffer, 0.2M, pH 8.0 | 4 | Refluxing | Light yellow | Cacao |
| 10 mM Ala + 10 mM Reb-B | Phosphate buffer, 0.2M, pH 6.0 | 2 | Drying oven, 90° C. | Colorless | Odorless |
| 10 mM Gly + 10 mM Reb-B | Phosphate buffer, 0.2M, pH 6.0 | 2 | Drying oven, 90° C. | Colorless | Odorless |
| 10 mM Lys + 10 mM Reb-B | Phosphate buffer, 0.2M, pH 6.0 | 2 | Drying oven, 90° C. | Colorless | Odorless |
| 10 mM Glu + 10 mM Reb-B | Phosphate buffer, 0.2M, pH 6.0 | 2 | Drying oven, 90° C. | Colorless | Odorless |
| 5 mM Ala + 5 mM Reb-B | Phosphate buffer, 0.2M, pH 6.0 | 2 | Drying oven, 90° C. | Colorless | Odorless |
| 5 mM Gly + 5 mM Reb-B | Phosphate buffer, 0.2M, pH 6.0 | 2 | Drying oven, 90° C. | Colorless | Odorless |
| 5 mM Lys + 5 mM Reb-B | Phosphate buffer, 0.2M, pH 6.0 | 2 | Drying oven, 90° C. | Colorless | Odorless |
| 5 mM Glu + 5 mM Reb-B | Phosphate buffer, 0.2M, pH 6.0 | 2 | Drying oven, 90° C. | Colorless | Odorless |
| 5 mM Ala + 5 mM Reb-B | Phosphate buffer, 0.2M, pH 8.0 | 2 | Drying oven, 90° C. | Light yellow | Sweet, burnt sugar |
| 5 mM Gly + 5 mM Reb-B | Phosphate buffer, 0.2M, pH 8.0 | 2 | Drying oven, 90° C. | Light yellow | Sour, pungent |
| 5 mM Lys + 5 mM Reb-B | Phosphate buffer, 0.2M, pH 8.0 | 2 | Drying oven, 90° C. | Light yellow | Popcorn |
| 5 mM Glu + 5 mM Reb-B | Phosphate buffer, 0.2M, pH 8.0 | 2 | Drying oven, 90° C. | Light yellow | Cacao |

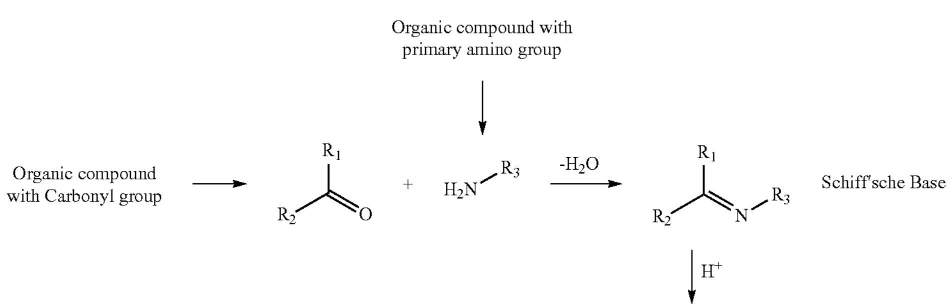

-continued

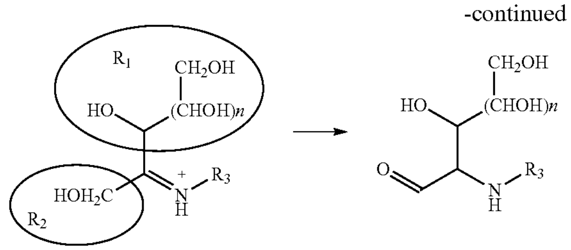

Ketose - Heyns Rearrangement

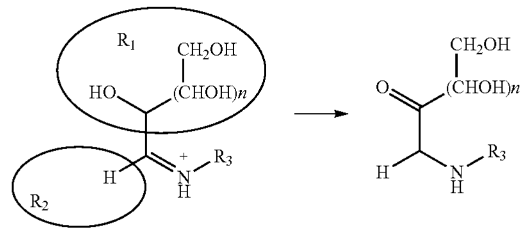

Aldose - Amadori Rearrangement

Reaction Scheme I:

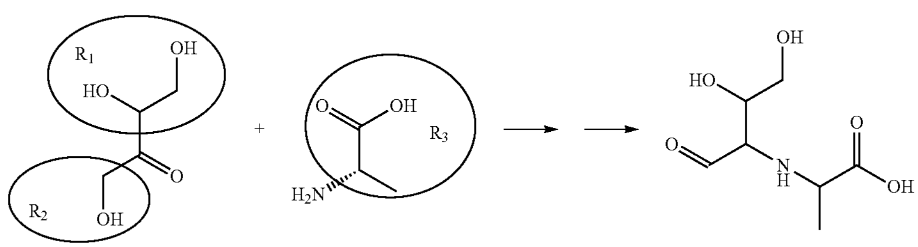

Example: Maillard reaction for Erythrulose + Alanine to the corresponding Heyns product

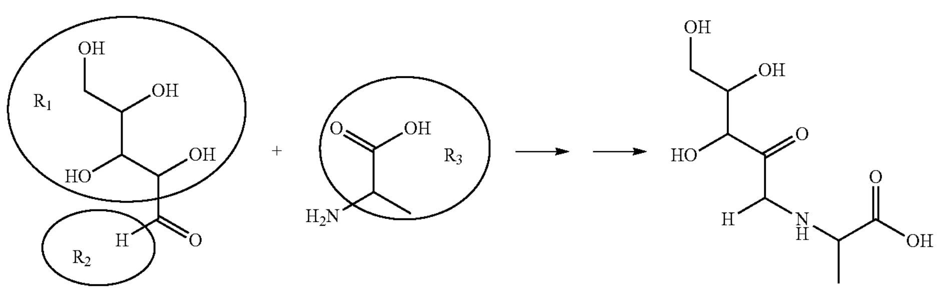

Example: Maillard reaction for Xylose + Alanine to the corresponding Amadori product R1 denotes the residue for any sugar chain in any possible chiral confirguration, including any reducing sugar with an unlimited number of glycosidic bound monosaccharides
R2 = H identifies the sugar as aldose in open chain form which is equivalent to the hemiacetal
R2 = CH2OH identifies the sugar as ketose in open chain form which is equivalent to the hemiacetal
R3 denotes any amino acid residue inclduing its D-, L- isomers, the amino-terminal end of peptides and proteins and any second or third amino group of amino acids.

Reaction Scheme II:

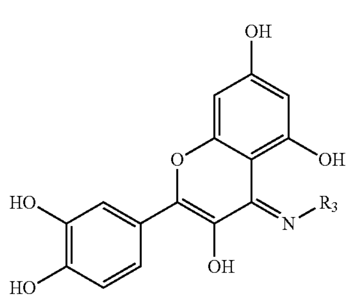

Schiff'sche Base of Quercetin
and a primary amine

-continued

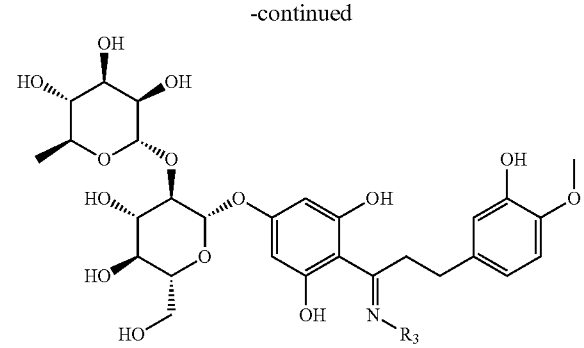

Schiff'sche Base of neohesperidinedihydrochalcone
and a primary amine

-continued

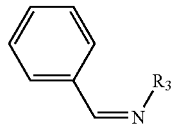

Schiff'sche Base of Benzaldehyde
and a primary amine

A Schiff'sche base is formed by the reaction of a carbonyl- and a primary amino-group. The Schiff'sche base is a very early reaction product of the Maillard Reaction.
R3 denotes any amino acid residue inclduing its D-, L- isomers, the amino-terminal end of peptides and proteins and any second amino group of amino acids.

Reaction Scheme III:

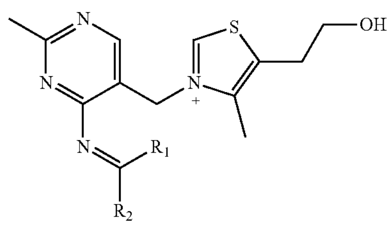

Schiff'sche Base of Thiamine
and a carbonyl-group

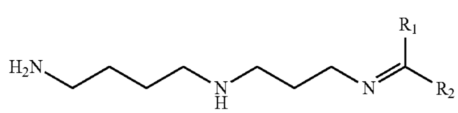

Schiff'sche Base of Spermidine
and a carbonyl-group

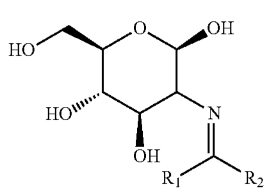

Schiff'sche Base of Glucosamine
and a carbonyl-group

A Schiff'sche base is formed by the reaction of a carbonyl- and a primary amino-group. The Schiff'sche base is a very early reaction product of the Maillard Reaction.
R1 denotes the residue for any sugar chain in any possible chiral confirguration, including any reducing sugar with an unlimited number of glycosidic bound monosaccharides
R2 = H identifies the sugar as aldose in open chain form which is equivalent to the hemiacetal
R2 = CH2OH identifies the sugar as ketose in open chain form which is equivalent to the hemiacetal Reaction Scheme IV:

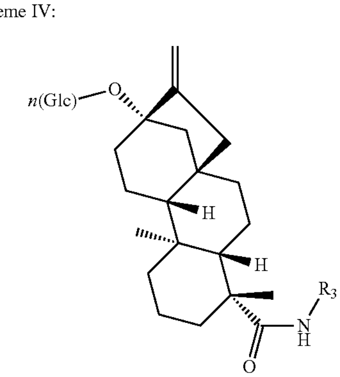

Reaction of Stevioglycoside with
free carboxylic group and primary
amine yields an amide

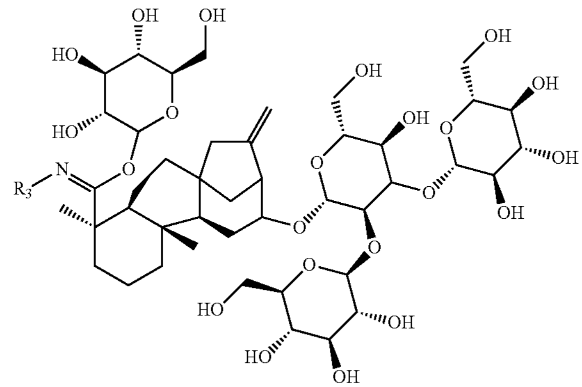

Reaction of Stevioglycoside with ester bound
glucose and amine yields a Schiff'sche base.

Stevioglycosides can react with an amino group yielding an amide or a Schiff'sche base (both possible intermediates of the Maillard reaction). Upon heating, monosaccharides are liberated from stevioglycosides which undergo Maillard reaction.
R3 denotes any amino acid residue inclduing its D-, L- isomers, the amino-terminal end of peptides and proteins and any second amino groups of amino acids.

What is claimed is:

1. A beverage comprising a Maillard reaction product (MRP) composition formed from a reaction mixture comprising:

(1) one or more *Stevia*-related components selected from the group consisting of *Stevia* extracts, glycosylated *Stevia* extracts, steviol glycosides, and glycosylated steviol glycosides; and (2) one or more amine donors having a free amino group, wherein components (1) and (2) undergo a Maillard reaction at a temperature in the range of 60° C.-250° C. and wherein the MRP is present in the beverage in an amount that an effect is observed.

2. The beverage of claim 1, wherein the MRP composition is present in the beverage in a final concentration of 1-15,000 ppm.

3. The beverage of claim 1, wherein the reaction mixture further comprises one or more reducing sugars having a free carbonyl group.

4. The beverage of claim 1, wherein the beverage comprises thaumatin, or neohesperidin dihydrochalcone (NHDC) or both.

5. The beverage of claim 1, wherein the reaction mixture comprises thaumatin, or NHDC, or both.

6. The beverage of claim 1, wherein the beverage further comprises a high intensity natural sweetener, wherein the natural high intensity sweetener comprises one or more *Stevia*-related components selected from the group consisting of *Stevia* extracts, glycosylated *Stevia* extracts, steviol glycosides, glycosylated steviol glycosides and combinations thereof.

7. The beverage of claim 1, wherein the beverage further comprises one or more sweeteners selected from the group consisting of sorbitol, xylitol, mannitol, sucralose, aspartame, acesulfame-K, neotame, erythritol, trehalose, raffinose, cellobiose tagatose, allulose, inulin, N—[N-[3-(3-hydroxy-4-methoxyphenyl)propyl]-alpha-aspartyl]-L-phenylalanine 1-methyl ester, glycyrrhizin, sodium cyclamate, brazzein, miraculin, curculin, pentadin, mabinlin, NHDC, thaumatin, naringin dihydrochalcone, maltol, ethyl maltol and advantame.

8. The beverage of claim 1, wherein the MRP composition has a citrus or tangerine flavor.

9. The beverage of claim 1, wherein the beverage does not contain any product made from roasted coffee beans.

10. The beverage of claim 1, wherein the beverage further comprises a product from roasted coffee beans and wherein the added MRP composition is not made from roasted coffee beans.

11. The beverage of claim 1, wherein the beverage is a carbonated soft beverage or a flavored water.

12. The beverage of claim 1, wherein the beverage is a fruit juice or a beverage comprising a fruit juice.

13. The beverage of claim 1, wherein the beverage is a dairy beverage or a beverage comprising a dairy product.

14. The beverage of claim 1, wherein the MRP composition comprises a non-steviol glycoside component and wherein the non-steviol glycoside component is present in an amount in the range of 0.1-99 wt % of the MRP composition.

15. The beverage of claim 1, wherein the MRP composition is present in the beverage in a final concentration of 10-1,000 ppm.

16. The beverage of claim 1, wherein the MRP composition is present in the beverage in a final concentration of 50-600 ppm.

17. The beverage of claim 1, wherein the beverage is a sugar-free beverage.

* * * * *